US008501038B2

(12) United States Patent
Kobayashi

(10) Patent No.: US 8,501,038 B2
(45) **Date of Patent: *Aug. 6, 2013**

(54) LIQUID CRYSTAL COMPOUND, LIQUID CRYSTAL COMPOSITION AND LIQUID CRYSTAL DISPLAY DEVICE

(75) Inventor: Masahide Kobayashi, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 13/140,021

(22) PCT Filed: Jan. 12, 2010

(86) PCT No.: PCT/JP2010/050208

§ 371 (c)(1), (2), (4) Date: Jun. 16, 2011

(87) PCT Pub. No.: WO2010/082558

PCT Pub. Date: Jul. 22, 2010

(65) Prior Publication Data

US 2012/0018672 A1 Jan. 26, 2012

(30) Foreign Application Priority Data

Jan. 16, 2009 (JP) ................................ 2009-008036

(51) Int. Cl.

| | |
|---|---|
| *C09K 19/00* | (2006.01) |
| *C09K 19/06* | (2006.01) |
| *C09K 19/52* | (2006.01) |
| *C09K 19/12* | (2006.01) |
| *C09K 19/02* | (2006.01) |

(52) U.S. Cl.

USPC ............. 252/299.66; 252/299.01; 252/299.6; 252/299.63; 428/1.1; 428/1.3; 349/1; 349/56; 349/182

(58) Field of Classification Search

USPC . 252/299.01, 299.6, 299.63, 299.66; 428/1.1, 428/1.3; 349/1, 56, 182

See application file for complete search history.

(56) References Cited

U.S. PATENT DOCUMENTS

| | | | | |
|---|---|---|---|---|
| 5,273,680 | A | 12/1993 | Gray et al. | |
| 6,210,603 | B1 | 4/2001 | Kondo et al. | |
| 7,211,302 | B2 * | 5/2007 | Manabe et | 428/1.1 |
| 2004/0006235 | A1 | 1/2004 | Pauluth et al. | |
| 2012/0168677 | A1 * | 7/2012 | Kobayashi et al. | 252/299.63 |

FOREIGN PATENT DOCUMENTS

| | | |
|---|---|---|
| JP | 2002-193853 | 7/2002 |
| WO | 89-08633 | 9/1989 |

* cited by examiner

*Primary Examiner* — Geraldina Visconti
(74) *Attorney, Agent, or Firm* — Jianq Chyun IP Office

(57) ABSTRACT

The invention provides a liquid crystal compound having a high stability to heat, light or the like, a wide temperature range of a nematic phase, a small viscosity, a large optical anisotropy and a suitable elastic constant $K_{33}$, and further having a suitable negative dielectric anisotropy and an excellent compatibility with other liquid crystal compounds. The invention also provides a liquid crystal composition including this liquid crystal compound and a liquid crystal display device containing this liquid crystal composition;

a liquid crystal compound represented by formula (a):

(a)

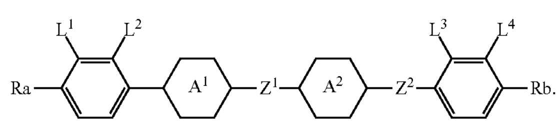

21 Claims, No Drawings

LIQUID CRYSTAL COMPOUND, LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2010/050208, filed on Jan. 12, 2010, which claims the priority benefit of Japan application no. 2009-008036, filed on Jan. 16, 2009. The entirety of each of the above-mentioned patent applications is hereby incorporated by reference herein and made a part of this specification.

FIELD OF THE INVENTION

The invention relates to a liquid crystal compound, a liquid crystal composition and a liquid crystal display device. More specifically, the invention relates to a fluorobenzene derivative having fluorine at a lateral position, which is liquid crystalline, a liquid crystal composition including this compound and having a nematic phase, and a liquid crystal display device containing this composition.

BACKGROUND OF THE INVENTION

A liquid crystal display device typified by a liquid crystal display panel, a liquid crystal display module and so forth utilizes optical anisotropy, dielectric anisotropy and so forth, which are possessed by a liquid crystal compound (in this invention the liquid crystal compound is used as a generic term for a compound having a liquid crystal phase such as a nematic phase or a smectic phase, and a compound having no liquid crystal phases but useful as a component of a liquid crystal composition). A variety of operating modes of this liquid crystal display device are known, such as a PC (phase change) mode, a TN (twisted nematic) mode, a STN (super twisted nematic) mode, a BTN (bistable twisted nematic) mode, a ECB (electrically controlled birefringence) mode, a OCB (optically compensated bend) mode, a IPS (in-plane switching) mode, a VA (vertical alignment) mode, a PSA (polymer sustained alignment).

In the operating mode, the ECB mode, the IPS mode, the VA mode and so forth utilize homeotropic orientation of liquid crystal molecules, and it is known that in particular the IPS mode and the VA mode are able to improve a limited viewing angle that is a disadvantage of a conventional display mode such as the TN mode or the STN mode.

A variety of liquid crystal compounds in which hydrogen on the benzene ring had been replaced by fluorine have conventionally been studied as a component of a liquid crystal composition having negative dielectric anisotropy, which can be used for liquid crystal display devices having these operating modes.

For example, the compounds (A) and (B), in which hydrogen on the benzene ring had been replaced by fluorine, were studied (see patent documents Nos. 1 and 2). However, these compounds did not have such a large negative dielectric anisotropy that satisfied market demand.

The compound (C) having a fluorine-substituted benzene was also studied (see patent document No. 3). However, this compound did not have such a large negative dielectric anisotropy that satisfied market demand.

The quarterphenyl compound (D) having a fluorine-substituted benzene was also studied (see patent document No. 4). However, this compound had a quite high melting point and a poor compatibility. The compound did not have such a large negative dielectric anisotropy that satisfied market demand.

The compound (E) having an ethylene bonding group and two fluorine-substituted benzene was also studied (see patent document No. 5). However, this compound (E) had a high melting point and a poor compatibility. The compound did not have such a large negative dielectric anisotropy that satisfied market demand.

(A)

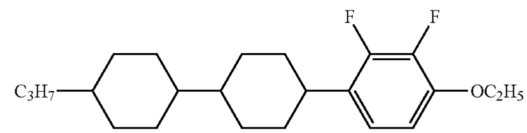

(B)

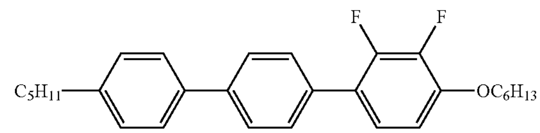

(C)

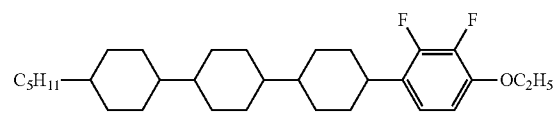

(D)

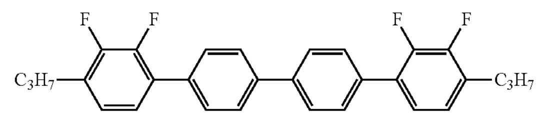

(E)

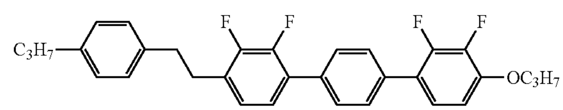

PRIOR ART

Patent Document

Patent document No. 1: JP H02-503441 A (1900).
Patent document No. 2: WO 89-002425 A.
Patent document No. 3: JP 2002-193853 A.
Patent document No. 4: EP 1,346,995 A (2003).
Patent document No. 5: WO 98-023564 A.

OUTLINE OF THE INVENTION

Subject to be Solved by the Invention

Accordingly, there are still subjects to be solved even in a liquid crystal display device having an operating mode such as an IPS mode or a VA mode, and, for example, an improvement of the response speed, an improvement of the contrast and a decrease in the driving voltage are expected.

A display device operated in the IPS mode or the VA mode described above mainly contains a liquid crystal composition having negative dielectric anisotropy, and a liquid crystal compound included in this liquid crystal composition is required to have the following characteristics shown in items (1) to (8), in order to improve the characteristics of the display device. That is to say:

(1) being chemically stable and physically stable,
(2) having a high clearing point (transition temperature between a liquid crystal phase and an isotropic phase),
(3) having a low minimum temperature of a liquid crystal phase (a nematic phase, a smectic phase and so forth), especially of the nematic phase,
(4) having a small viscosity,
(5) having a suitable optical anisotropy,
(6) having negative dielectric anisotropy with a large absolute value,
(7) having a suitable elastic constant $K_{33}$ ($K_{33}$: a bend elastic constant), and
(8) having an excellent compatibility with other liquid crystal compounds.

A voltage holding ratio can be increased when a composition including a chemically and physically stable liquid crystal compound, as described in item (1), is used for a display device.

The temperature range of a nematic phase can be increased in a composition that includes a liquid crystal compound having a high clearing point or a low minimum temperature of a liquid crystal phase as described in items (2) and (3), and thus the display device can be used in a wide temperature range.

When a composition that includes a compound having a small viscosity as described in item (4) and a compound having a large elastic constant $K_{33}$ as described in item (7) are used for a display device, the response speed can be improved. When a composition that includes a compound having a suitable optical anisotropy as described in item (5) is used for a display device, an improvement of the contrast in the display device can be expected. A device requires compositions having a small to large optical anisotropy, depending on the design of the device. Recently, a method for improving the response speed by means of a decreased cell thickness has been studied, whereby a liquid crystal composition having a large optical anisotropy is also required.

When a liquid crystal compound has a large negative dielectric anisotropy, the threshold voltage of the liquid crystal composition including this compound can be decreased. Hence, the driving voltage of a display device can be decreased and the electric power consumption can also be decreased, when the display device contains a composition that includes a compound having negative dielectric anisotropy with a large absolute value as described in item (6). The driving voltage of a display device can be decreased and the electric power consumption can also be decreased, when a display device contains a composition that includes a compound having a suitable elastic constant $K_{33}$ as described in item (7).

A liquid crystal compound is generally used in the form of a composition prepared by mixing it with many other liquid crystal compounds in order to exhibit characteristics that are difficult to be attained by a single compound. Accordingly, it is desirable that a liquid crystal compound used for a display device has an excellent compatibility with other liquid crystal compounds and so forth, as described in item (8). Since the display device may also be used in a wide temperature range including a lower temperature than the freezing point, the compound that exhibits an excellent compatibility even at a low temperature may be desirable.

The first aim of the invention is to provide a liquid crystal compound having a high stability to heat, light or the like, a wide temperature range of a nematic phase, a small viscosity, a large optical anisotropy and a suitable elastic constant $K_{33}$, and further having a large negative dielectric anisotropy and an excellent compatibility with other liquid crystal compounds.

The second aim of the invention is to provide a liquid crystal composition having a high stability to heat, light and so forth, a small viscosity, a large optical anisotropy, a large negative dielectric anisotropy, a suitable elastic constant $K_{33}$ and a low threshold voltage, and further having a high maximum temperature of a nematic phase (the phase transition temperature between a nematic phase and an isotropic phase) and a low minimum temperature of a nematic phase by the inclusion of the compound.

The third aim of the invention is to provide a liquid crystal display device containing the composition described above and having a short response time, low electric power consumption, a low driving voltage, a large contrast and a wide temperature range in which the device can be used.

Means for Solving the Subject

As a result of earnest studies in consideration of these subjects, the inventors have found that in a specific structure including phenylene in which hydrogen on a benzene ring is replaced by fluorine, a four-ring liquid crystal compound having two fluorine-substituted benzene at each end has a high stability to heat, light or the like, a wide temperature range of a nematic phase, a small viscosity, a large optical anisotropy and a suitable elastic constant $K_{33}$, and further has a large negative dielectric anisotropy and an excellent compatibility with other liquid crystal compounds. The inventors have also found that a liquid crystal composition that includes the compound has a high stability to heat, light or the like, a small viscosity, a large optical anisotropy, a suitable elastic constant $K_{33}$, a suitable and large dielectric anisotropy and a low threshold voltage, and further has a high maximum temperature of a nematic phase and a low minimum temperature of a nematic phase. The inventors have further found that a liquid crystal display device that contains the composition has a short response time, low electric power consumption, a low driving voltage, a large contrast ratio and a wide temperature range in which the device can be used. Thus, the inventors have completed the invention.

That is to say, the invention includes the items described in the following items.

Item 1. A liquid crystal compound represented by formula (a).

(a)

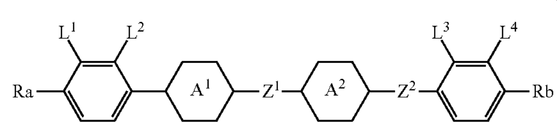

In formula (a), Ra and Rb are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^1$ and the ring $A^2$ are independently 1,4-phenylene, trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and the ring $A^1$ and the ring $A^2$ are not simultaneously 1,4-phenylene; $L^1$, $L^2$, $L^3$ and $L^4$ are independently hydrogen or fluorine, and at least three of them are fluorine; and $Z^1$ and $Z^2$ are independently a single bond, $—CH_2CH_2—$, $—CH{=}CH—$, $—C{\equiv}C—$, $—CH_2O—$, $—OCH_2—$, $—COO—$ or $—OCO—$.

Item 2. The liquid crystal compound according to item 1, wherein in formula (a), the ring $A^1$ and the ring $A^2$ are independently 1,4-phenylene, trans-1,4-cyclohexylene, 1,4-cyclohexenylene or tetrahydropyran-2,5-diyl.

Item 3. The liquid crystal compound according to item 2, wherein the compound is represented by formula (a-1).

(a-1)

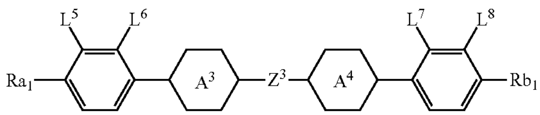

In formula (a-1), $Ra_1$ and $Rb_1$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^3$ is 1,4-phenylene, trans-1,4-cyclohexylene, 1,4-cyclohexenylene or tetrahydropyran-2,5-diyl; the ring $A^4$ is trans-1,4-cyclohexylene, 1,4-cyclohexenylene or tetrahydropyran-2,5-diyl; $L^5$, $L^6$, $L^7$ and $L^8$ are independently hydrogen or fluorine, and at least three of them are fluorine; and $Z^3$ is independently a single bond, —$CH_2CH_2$—, —CH═CH—, —$CH_2O$—, —$OCH_2$—, —COO— or —OCO—.

Item 4. The liquid crystal compound according to item 2, wherein the compound is represented by formula (a-2).

(a-2)

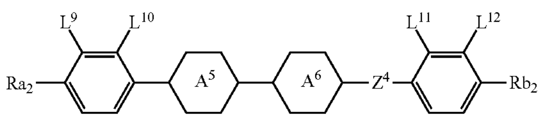

In formula (a-2), $Ra_2$ and $Rb_2$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^5$ and the ring $A^6$ are independently 1,4-phenylene, trans-1,4-cyclohexylene, 1,4-cyclohexenylene or tetrahydropyran-2,5-diyl, and the ring $A^5$ and the ring $A^6$ are not simultaneously 1,4-phenylene; $L^9$, $L^{10}$, $L^{11}$ and $L^{12}$ are independently hydrogen or fluorine, and at least three of them are fluorine; and $Z^4$ is independently —$CH_2CH_2$—, —CH═CH—, —$CH_2O$—, —$OCH_2$—, —COO— or —OCO—.

Item 5. The liquid crystal compound according to item 3, wherein the compound is represented by any one of formulas (a-3) to (a-8).

(a-3)

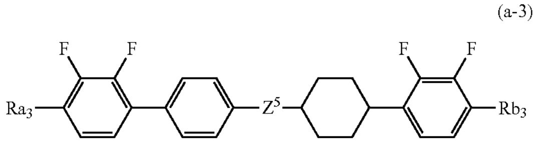

(a-4)

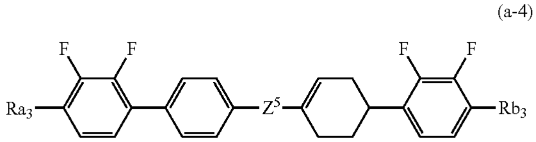

-continued (a-5)

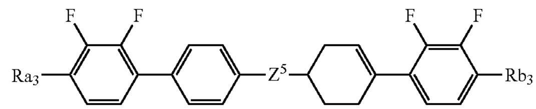

(a-6)

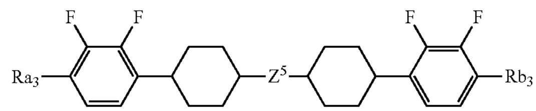

(a-7)

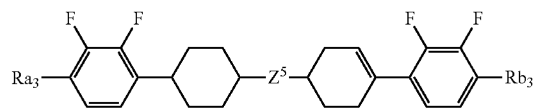

(a-8)

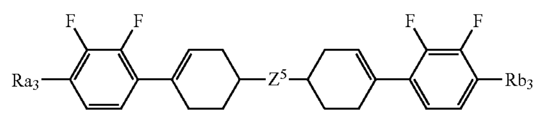

In formulas (a-3) to (a-8), $Ra_3$ and $Rb_3$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^5$ is a single bond, —$CH_2CH_2$—, —CH═CH—, —$CH_2O$—, —$OCH_2$—, —COO— or —OCO—.

Item 6. The liquid crystal compound according to item 4, wherein the compound is represented by any one of formulas (a-9) to (a-15).

(a-9)

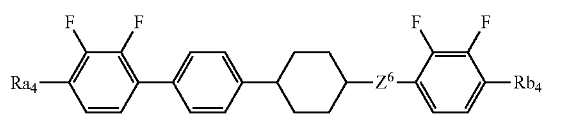

(a-10)

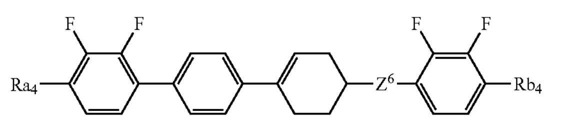

(a-11)

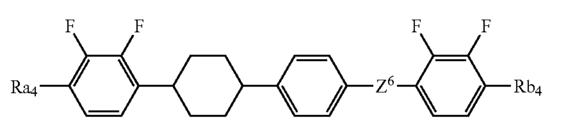

(a-12)

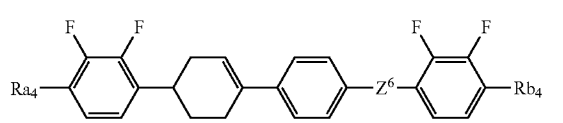

(a-13)

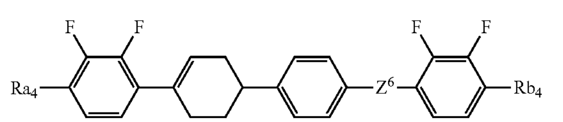

-continued (a-14)

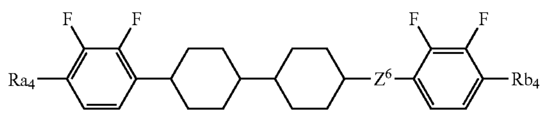

(a-15)

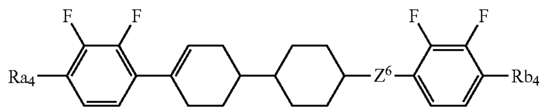

In formulas (a-9) to (a-15), $Ra_4$ and $Rb_4$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^6$ is independently —$CH_2CH_2$—, —CH═CH—, —$CH_2O$—, —$OCH_2$—, —COO— or —OCO—.

Item 7. The liquid crystal compound according to item 5, wherein in formulas (a-3) to (a-8), $Z^5$ is a single bond.

Item 8. The liquid crystal compound according to item 5, wherein in formulas (a-3) to (a-8), $Z^5$ is —OCO—.

Item 9. The liquid crystal compound according to item 5, wherein in formulas (a-3) to (a-8), $Z^5$ is —COO—.

Item 10. The liquid crystal compound according to item 5, wherein in formulas (a-3) to (a-8), $Z^5$ is —$OCH_2$—.

Item 11. The liquid crystal compound according to item 5, wherein in formulas (a-3) to (a-8), $Z^5$ is —$CH_2O$—.

Item 12. The liquid crystal compound according to item 5, wherein in formulas (a-3) to (a-8), $Z^5$ is —$CH_2CH_2$—.

Item 13. The liquid crystal compound according to item 6, wherein in formulas (a-9) to (a-15), $Z^6$ is —OCO—.

Item 14. The liquid crystal compound according to item 6, wherein in formulas (a-9) to (a-15), $Z^6$ is —COO—.

Item 15. The liquid crystal compound according to item 6, wherein in formulas (a-9) to (a-15), $Z^6$ is —$OCH_2$—.

Item 16. The liquid crystal compound according to item 6, wherein in formulas (a-9) to (a-15), $Z^6$ is —$CH_2O$—.

Item 17. The liquid crystal compound according to item 6, wherein in formulas (a-9) to (a-15), $Z^6$ is —$CH_2CH_2$—.

Item 18. A liquid crystal composition including at least one of the compounds according to anyone of items 1 to 17 as a first component and including at least one of the compounds represented by formulas (e-1) to (e-3) as a second component.

(e-1)

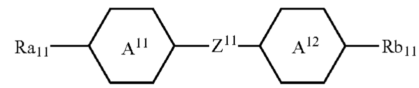

(e-2)

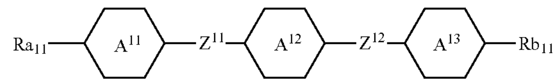

(e-3)

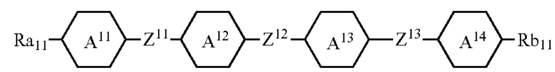

In formulas (e-1) to (e-3), $Ra_{11}$ and $Rb_{11}$ are independently alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{11}$, the ring $A^{12}$, the ring $A^{13}$ and the ring $A^{14}$ are independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are independently a single bond, —$CH_2CH_2$—, —CH═CH—, —C≡C—, —COO— or —$CH_2O$—.

Item 19. A liquid crystal composition, wherein a first component is at least one compound selected from the compounds represented by formula (a-1) according to item 3 and a second component is at least one compound selected from formulas (e-1) to (e-3) according to item 18.

Item 20. A liquid crystal composition, wherein a first component is at least one compound selected from the compounds represented by formula (a-2) according to item 4 and a second component is at least one compound selected from formulas (e-1) to (e-3) according to item 18.

Item 21. The liquid crystal composition according to any one of items 18 to 20, wherein the ratio of the first component is in the range of 5 to 60% by weight, and the ratio of the second component is in the range of 40 to 95% by weight, based on the total weight of the liquid crystal composition.

Item 22. The liquid crystal composition according to any one of items 18 to 21, including at least one compound selected from the group of compounds represented by formulas (g-1) to (g-6) and the group of compounds represented by formulas (i-1) to (i-4) as a third component, in addition to the first component and the second component.

(g-1)

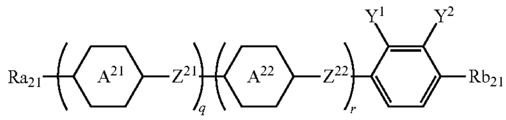

(g-2)

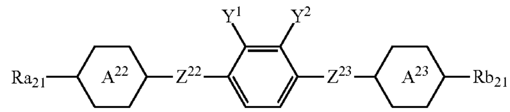

(g-3)

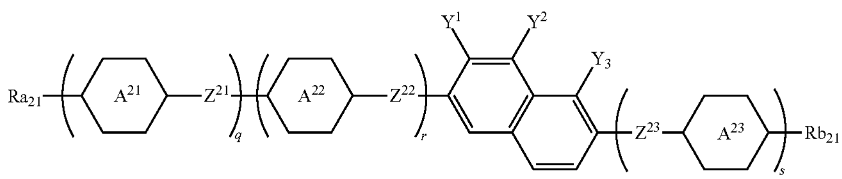

-continued (g-4)

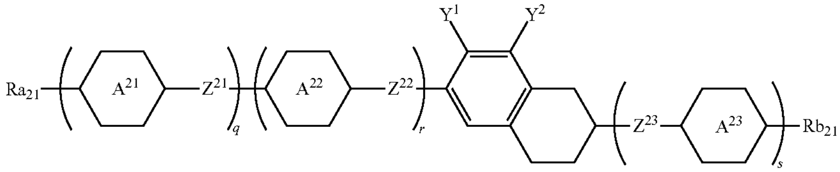

(g-5)

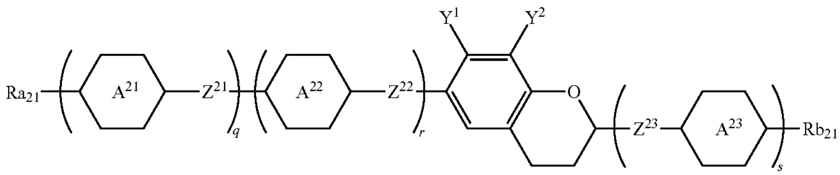

(g-6)

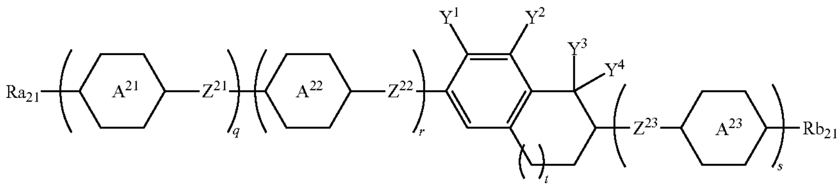

In formulas (g-1) to (g-6), $Ra_{21}$ and $Rb_{21}$ are independently hydrogen or alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{21}$, the ring $A^{22}$ and the ring $A^{23}$ are independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl; $Z^{21}$, $Z^{22}$ and $Z^{23}$ are independently a single bond, —$CH_2CH_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$— or —$CH_2O$—; $Y^1$, $Y^2$, $Y^3$ and $Y^4$ are independently fluorine or chlorine; q, r and s are independently 0, 1 or 2, q+r is 1 or 2, and q+r+s is 1, 2 or 3; and t is 0, 1 or 2.

(i-1)

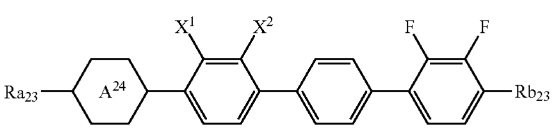

(i-2)

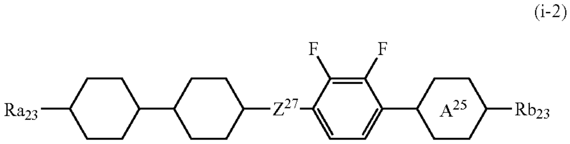

(i-3)

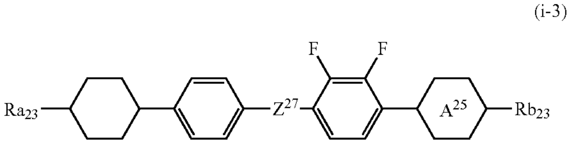

-continued (i-4)

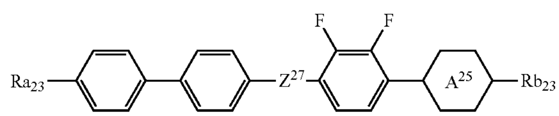

In formulas (i-1) to (i-4), $Ra_{23}$ and $Rb_{23}$ are independently alkyl having 1 to 8 carbons or alkoxy having 1 to 7 carbons; the ring $A^{24}$ is trans-1,4-cyclohexylene, 1,4-cyclohexenylene, 1,4-phenylene or tetrahydropyran-2,5-diyl; the ring $A^{25}$ is trans-1,4-cyclohexylene, 1,4-phenylene, 2-fluoro-1,4-phenylene or 3-fluoro-1,4-phenylene; $Z^{27}$ is independently a single bond, —$CH_2O$—, —COO— or —$CF_2O$—; and both $X^1$ and $X^2$ are fluorine, or one of them is fluorine and the other is hydrogen.

Item 23. The liquid crystal composition according to item 22, wherein the third component is at least one compound selected from the group of compounds represented by formulas (g-1-1) to (g-2-3).

(g-1-1)

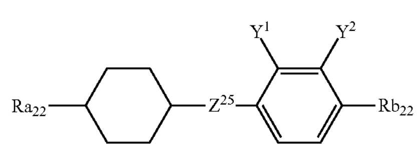

(g-1-2)

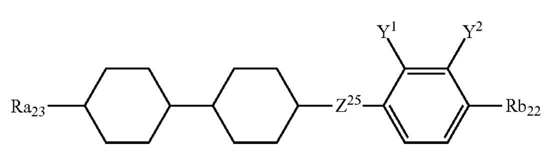

-continued (g-1-3)

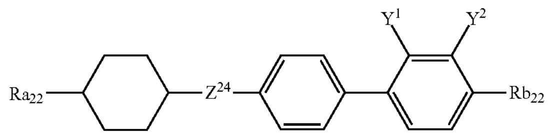

(g-1-4)

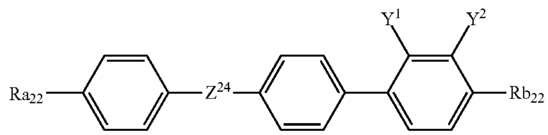

(g-2-1)

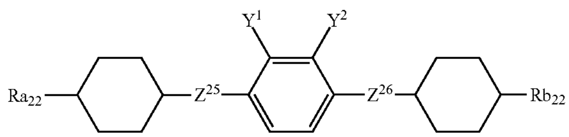

(g-2-2)

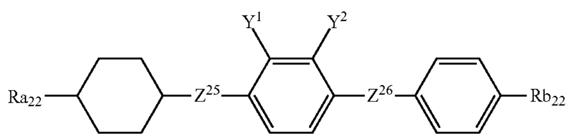

(g-2-3)

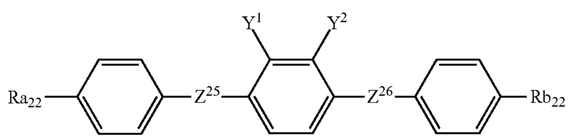

In formulas (g-1-1) to (g-2-3), $Ra_{22}$ and $Rb_{22}$ are independently alkyl having 1 to 8 carbons, alkenyl having 2 to 8 carbons or alkoxy having 1 to 7 carbons; $Z^{24}$, $Z^{25}$ and $Z^{26}$ are independently a single bond, —$CH_2CH_2$—, —COO—, —OCO—, —$CH_2O$— or —$OCH_2$—; and both $Y^1$ and $Y^2$ are fluorine, or one of them is fluorine and the other is chlorine.

Item 24. The liquid crystal composition according to any one of item 22 or 23, wherein the ratio of the first component is in the range of 5 to 60% by weight, the ratio of the second component is in the range of 20 to 75% by weight, and the ratio of the third component is in the range of 20 to 75% by weight, based on the total weight of the liquid crystal composition.

Item 25. A liquid crystal display device containing the liquid crystal composition according to any one of items 18 to 24.

Item 26. The liquid crystal display device according to item 25, wherein an operating mode of the liquid crystal display device is a VA mode, an IPS mode or a PSA mode, and a driving mode of the liquid crystal display device is an active matrix mode.

Usage of the terms in this specification is as follows. A liquid crystal compound is a generic term for a compound having a liquid crystal phase such as a nematic phase or a smectic phase, and for a compound having no liquid crystal phases but useful as a component for a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A maximum temperature of a nematic phase is the phase transition temperature between a nematic phase and an isotropic phase, and may simply be abbreviated to a clearing point or the maximum temperature. A minimum temperature of the nematic phase may simply be abbreviated to the minimum temperature. The compound represented by formula (a) may be abbreviated to the liquid crystal compound (a). The compound represented by formula (a) may simply be abbreviated to the compound (a). This abbreviation may apply to a compound represented by another formula. In each formula, the symbols B, D, E or the like surrounded by a hexagonal shape correspond to the ring B, the ring D, the ring E or the like, respectively. The amount of a compound that is expressed as a percentage means a weight percentage (% by weight) based on the total weight of the composition. A plurality of symbols such as the ring $A^1$, $Y^1$, B or the like were used in the same or different formulas, where these symbols may mean the same or different.

"Arbitrary" is used not only in cases where the position is arbitrary but also in cases where the number is arbitrary. However, it is not used in cases where the number is 0 (zero). The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, the expression "alkyl in which arbitrary —$CH_2$— may be replaced by —O— or —CH═CH—" includes alkyl, alkenyl, alkoxy, alkoxyalkyl, alkoxyalkenyl and alkenyloxyalkyl. Incidentally, it is undesirable in the invention that two successive —$CH_2$— are replaced by —O— to give —O—O—. It is also undesirable that terminal —$CH_2$— in alkyl is replaced by —O—. The invention will be further explained below.

Effect of the Invention

The liquid crystal compound of the invention has a high stability to heat, light or the like, a wide temperature range of a nematic phase, a small viscosity, a large optical anisotropy and a suitable elastic constant $K_{33}$ ($K_{33}$: a bend elastic constant), and further has a large negative dielectric anisotropy and an excellent compatibility with other liquid crystal compounds. The liquid crystal compound of the invention is quite excellent in view of the fact that the maximum temperature of a nematic phase has a tendency not to decrease, and moreover the optical anisotropy has a tendency to increase without an increase in the viscosity.

The liquid crystal composition of the invention has a small viscosity, a large optical anisotropy, a suitable elastic constant $K_{33}$, a large negative dielectric anisotropy and a low threshold voltage, and further has a high maximum temperature of a nematic phase and a low minimum temperature of a nematic phase. In particular, the liquid crystal composition of the invention is effective in a device that requires a large optical anisotropy, since it has a large optical anisotropy.

The liquid crystal display device of the invention is characterized by containing this liquid crystal composition, and has a short response time, low electric power consumption, a small driving voltage, a large contrast ratio, a wide temperature range in which the device can be used. Thus, the liquid crystal display device can be used preferably for a display mode such as a PC mode, a TN mode, a STN mode, an ECB mode, a OCB mode, an IPS mode, a VA mode or a PSA mode. It can be suitably used especially for a liquid crystal display device having the IPS mode, the VA mode or the PSA mode.

EMBODIMENT TO CARRY OUT THE INVENTION

The invention will be explained in more detail below.

Incidentally, in the following description, the amount of a compound that is expressed in a percentage means the weight percentage (% by weight) based on the total weight of the composition unless otherwise noted.

The Liquid Crystal Compound (a)

The compound of the invention has a structure represented by formula (a). Hereinafter the compound may be referred to as "the compound (a)."

(a)

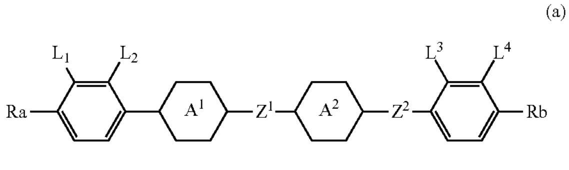

In formula (a), Ra and Rb are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The ring $A^1$ and the ring $A^2$ are independently 1,4-phenylene, trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and the ring $A^1$ and the ring $A^2$ are not simultaneously 1,4-phenylene.

$L^1$, $L^2$, $L^3$ and $L^4$ are independently hydrogen or fluorine, and at least three of them are fluorine; and $Z^1$ and $Z^2$ are independently a single bond, —$CH_2CH_2$—, —CH═CH—, —C≡C—, —$CH_2O$—, —$OCH_2$—, —COO— or —OCO—.

The compound (a) has two 1,4-phenylene, in which hydrogen at the 2- or 3-positions is replaced by fluorine, in each end, since at least three of $L^1$, $L^2$, $L^3$ and $L^4$ are fluorine, as described above.

The compound has a small viscosity, a suitable optical anisotropy, a suitable elastic constant $K_{33}$, a large negative dielectric anisotropy and an excellent compatibility with other liquid crystal compounds by having such a structure. It is particularly excellent in view of a large negative dielectric anisotropy without a decrease in the maximum temperature of a nematic phase and also without an increase in the viscosity.

Ra and Rb in the formula are hydrogen, alkyl having 1 to 10 carbons or alkenyl having 2 to 10 carbons, alkoxy having 1 to 9 carbons, alkoxyalkyl having 2 to 9 carbons or alkenyloxy having 2 to 9 carbons, and are, for example, $CH_3(CH_2)_3$—, —$CH_2$, $CH_3(CH_2)_2O$—, $CH_3$—O—$(CH_2)_2$—, $CH_3$—O—$CH_2$—O—, $H_2C$═CH—$(CH_2)_2$—, $CH_3$—CH═CH—$CH_2$— or $CH_3$—CH═CH—O—.

However, a group having adjacent oxygens, such as $CH_3$—O—O—$CH_2$—, or a group having adjacent double bond moieties, such as $CH_3$—CH═CH—CH═CH—, are undesirable in consideration of the stability of the compound.

It is desirable that the chain of carbon-carbon bonds in these groups is straight. When the chain of carbon-carbon bonds is straight, the temperature ranges of a liquid crystal phase can be increased and the viscosity can be decreased. When one of Ra and Rb is an optically active group, the compound is useful as a chiral dopant, and a reverse twisted domain which will occur in a liquid crystal display device can be prevented by the addition of the compound to a liquid crystal composition.

It is especially desirable that Ra and Rb are alkyl, alkoxy or alkenyl.

When Ra and Rb are alkyl, alkoxy or alkenyl, the temperature range of a liquid crystal phase in the liquid crystal compound can be increased.

A desirable configuration of —CH═CH— in the alkenyl depends on the position of the double bond.

A trans-configuration is desirable for the configuration of alkenyl having a double bond in the odd position, such as —CH═$CHCH_3$, —CH═$CHC_2H_5$, —CH═$CHC_3H_7$, —CH═$CHC_4H_9$, —$C_2H_4CH$═$CHCH_3$ or —$C_2H_4CH$═$CHC_2H_5$.

On the other hand, a cis-configuration is preferable for the configuration of alkenyl having a double bond in the even position, such as —$CH_2CH$═$CHCH_3$, —$CH_2CH$═$CHC_2H_5$ and —$CH_2CH$═$CHC_3H_7$. An alkenyl compound possessing a desirable configuration described above has a wide temperature range of a liquid crystal phase, a large elastic constant ratio $K_{33}/K_{11}$ ($K_{33}$: a bend elastic constant, $K_{11}$: a splay elastic constant), and a decreased viscosity. When this liquid crystal compound is added to a liquid crystal composition, the maximum temperature ($T_{NI}$) of a nematic phase can be increased.

Specific examples of the alkyl include —$CH_3$, —$C_2H_5$, —$C_3H_7$, —$C_4H_9$, —$C_5H_{11}$, —$C_6H_{13}$, —$C_7H_{15}$, —$C_9H_{19}$ or —$C_{10}H_{21}$;

specific examples of the alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$ or —$OC_9H_{19}$;

specific examples of the alkoxyalkyl include —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$ or $(CH_2)_5OCH_3$;

specific examples of the alkenyl include —CH═$CH_2$, —CH═$CHCH_3$, —$CH_2CH$═$CH_2$, —CH═$CHC_2H_5$, —$CH_2CH$═$CHCH_3$, —$(CH_2)_2CH$═$CH_2$, —CH═$CHC_3H_7$, —$CH_2CH$═$CHC_2H_5$, —$(CH_2)_2CH$═$CHCH_3$ or —$(CH_2)_3CH$═$CH_2$; and specific examples of the alkenyloxy include —$OCH_2CH$═$CH_2$, —$OCH_2CH$═$CHCH_3$ or —$OCH_2CH$═$CHC_2H_5$.

Accordingly, among the specific examples of $R^a$ and $R^b$, —$CH_3$, —$C_2H_5$, —$C_3H_7$, —$C_4H_9$, —$C_5H_{11}$, —$OCH_3$, —$OC_2H_5$, —$OC_3H_7$, —$OC_4H_9$, —$OC_5H_{11}$, —$CH_2$ $OCH_3$, —$(CH_2)_2OCH_3$, —$(CH_2)_3OCH_3$, —$CH_2CH$═$CH_2$, —$CH_2CH$═$CHCH_3$, —$(CH_2)_2CH$═$CH_2$, —$CH_2CH$═$CHC_2H_5$, —$(CH_2)_2CH$═$CHCH_3$, —$(CH_2)_3$ CH═$CH_2$, —$(CH_2)_3CH$═$CHCH_3$, —$(CH_2)_3$ CH═$CHC_2H_5$, —$(CH_2)_3CH$═$CHC_3H_7$, —$OCH_2CH$═$CH_2$—$OCH_2CH$═$CHCH_3$ or —$OCH_2CH$═$CHC_2H_5$ is desirable, and —$CH_3$, —$C_2H_5$, —$C_3H_7$, —$OCH_3$, —$OC_2H_5$, —$OC_3H_7$, —$OC_4H_9$, —$(CH_2)_2$ CH═$CH_2$, —$(CH_2)_2CH$═$CHCH_3$ or —$(CH_2)_2$ CH═$CHC_3H_7$ is more desirable.

The ring $A^1$ and the ring $A^2$ are 1,4-phenylene, trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl.

In these rings, 1,4-phenylene and trans-1,4-cyclohexylene are more desirable, and trans-1,4-cyclohexylene is most desirable.

In particular, when at least one of these rings is trans-1,4-cyclohexylene, the viscosity of the liquid crystal compound is decreased, and when the liquid crystal compound is added to a liquid crystal composition, the maximum temperature of a nematic phase ($T_{NI}$) is increased.

$L^1$, $L^2$, $L^3$ and $L^4$ are each independently a hydrogen atom or a fluorine atom, and at least three of them are fluorine atoms.

It is desirable that three of $L^1$, $L^2$, $L^3$ and $L^4$ are fluorine, since the melting point of the compound is decreased.

It is most desirable that all of $L^1$, $L^2$, $L^3$ and $L^4$ are fluorine, since the dielectric anisotropy of the compound is increased negatively.

$Z^1$ and $Z^2$ are a single bond, —$CH_2CH_2$—, —CH═CH—, —C≡C—, —$CH_2O$—, —$OCH_2$—, —COO— or —OCO—.

It is desirable that $Z^1$ and $Z^2$ are a single bond, —$CH_2CH_2$— or —CH═CH—, since the viscosity of the compound is decreased. It is more desirable that $Z^1$ and $Z^2$ are —COO— or —OCO—, since the maximum temperature of a nematic phase ($T_{NI}$) of the compound is increased. It is further desirable that $Z^1$ and $Z^2$ are —$CH_2O$— or —$OCH_2$—, the dielectric anisotropy of the compound is increased negatively.

A single bond, —$CH_2CH_2$—, —$CH_2O$— or —$OCH_2$— is desirable and a single bond and —$CH_2CH_2$— are more desirable in consideration of the stability of the compound.

A trans-configuration is desirable in the configuration of other groups attached to the double bond, when $Z^1$ and $Z^2$ are —CH═CH—. The temperature range of a liquid crystal phase of the liquid crystal compound is increased by the effect of such configuration, and the maximum temperature of a nematic phase ($T_{NI}$) is increased by the addition of the liquid crystal compound to a liquid crystal composition.

The temperature range of a liquid crystal phase is increased, the elastic constant ratio $K_{33}/K_{11}$ ($K_{33}$: a bend elastic constant, $K_{11}$: a splay elastic constant) is increased, and the viscosity of the compound is decreased when —CH═CH— is included in $Z^1$ and $Z^2$, and the maximum temperature of a nematic phase ($T_{NI}$) is increased when the liquid crystal compound is added to a liquid crystal composition.

Incidentally, the liquid crystal compound (a) may also contain isotopes such as $^2H$ (deuterium) and $^{13}C$ in a larger amount than the amount of the natural abundance, since such isotopes do not make a major difference in physical properties of the compound.

In the liquid crystal compound (a), it is possible to adjust physical properties, such as dielectric anisotropy, to desired values by suitably selecting Ra, Rb, the ring $A^1$, the ring $A^2$, $Z^1$ and $Z^2$.

Examples of desirable compounds among compounds represented by the compound (a) include the compound (a-1).

(a-1)

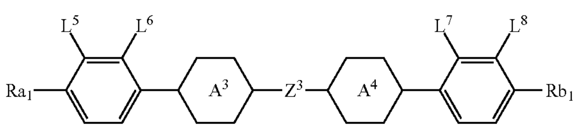

In formula (a-1), $Ra_1$ and $Rb_1$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The ring $A^3$ is 1,4-phenylene, trans-1,4-cyclohexylene, 1,4-cyclohexenylene or tetrahydropyran-2,5-diyl; and the ring $A^4$ is trans-1,4-cyclohexylene, 1,4-cyclohexenylene or tetrahydropyran-2,5-diyl.

$L^5$, $L^6$, $L^7$ and $L^8$ are independently hydrogen or fluorine, and at least three of them are fluorine.

$Z^3$ are independently a single bond, —$CH_2CH_2$—, —CH═CH—, —$CH_2O$—, —$OCH_2$—, —COO— or —OCO—.

Examples of desirable compounds among compounds shown by the compound (a) include the compound (a-2).

(a-2)

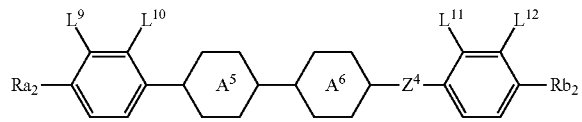

In formula (a-2), $Ra_2$ and $Rb_2$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The ring $A^5$ and the ring $A^6$ are independently 1,4-phenylene, trans-1,4-cyclohexylene, 1,4-cyclohexenylene or tetrahydropyran-2,5-diyl, and the ring $A^5$ and the ring $A^6$ are not simultaneously 1,4-phenylene.

$L^9$, $L^{10}$, $L^{11}$ and $L^{12}$ are independently hydrogen or fluorine, and at least three of them are fluorine.

$Z^4$ is independently —$CH_2CH_2$—, —CH═CH—, —$CH_2O$, —$OCH_2$—, —COO— or —OCO—.

Examples of most desirable compounds among compounds shown by the compound (a) include the compounds (a-3) to (a-15).

(a-3)

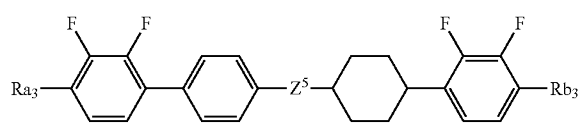

(a-4)

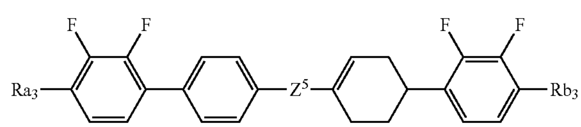

(a-5)

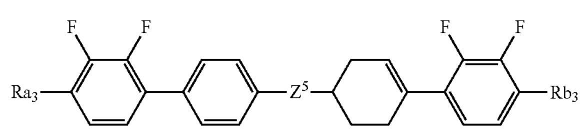

(a-6)

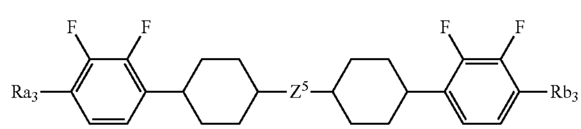

(a-7)

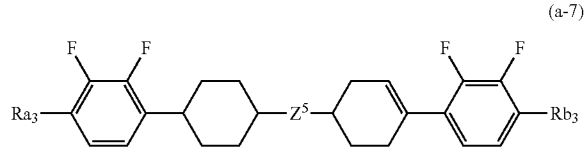

-continued (a-8)

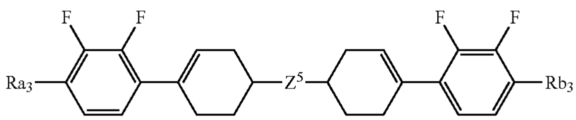

In formulas (a-3) to (a-8), $Ra_1$ and $Rb_3$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^5$ is a single bond, —$CH_2CH_2$—, —CH═CH—, —$CH_2O$—, —$OCH_2$—, —COO— or —OCO—.

(a-9)

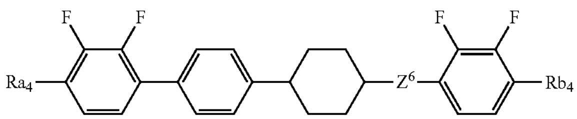

(a-10)

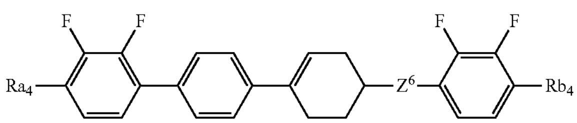

(a-11)

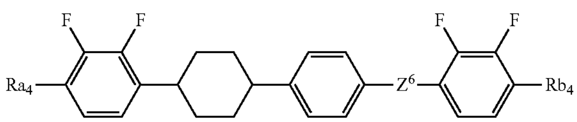

(a-12)

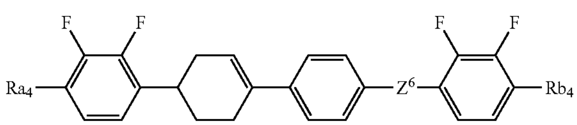

(a-13)

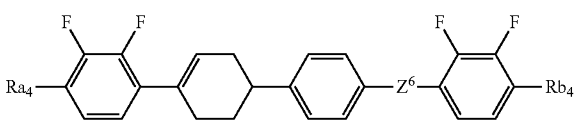

(a-14)

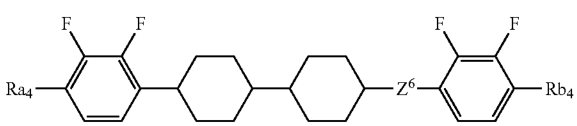

(a-15)

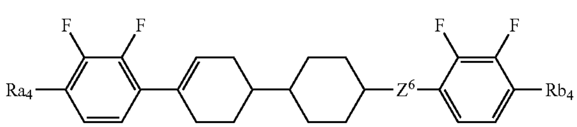

In formulas (a-9) to (a-15), $Ra_4$ and $Rb_4$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^6$ is independently —$CH_2CH_2$—, —CH═CH—, —$CH_2O$—, —$OCH_2$—, —COO— or —OCO—.

The liquid crystal compounds shown by the compounds (a-3) to (a-15) are desirable in view of stability to heat, light or the like, a lower minimum temperature of a liquid crystal phase, a higher maximum temperature of a nematic phase, a suitable optical anisotropy and a suitable elastic constant $K_{33}$ and a small viscosity, since it has a 1,4-phenylene group, a trans-1,4-cyclohexylene group or a 1,4-cyclohexenylene group, and the structure of the whole compound is asymmetric.

The liquid crystal compounds shown by the compounds (a-3) to (a-15) have a large negative dielectric anisotropy, stability to heat, light or the like, a wide temperature range of a nematic phase, a suitable optical anisotropy and a suitable elastic constant $K_{33}$. Among these, the compound where $Z^5$ and $Z^6$ are —CH═CH— is desirable in view of a lower the minimum temperature of a liquid crystal phase and a smaller viscosity nearly without a decrease in the maximum temperature of a nematic phase. The compound where $Z^5$ and $Z^6$ are —COO— or —OCO— is more desirable in view of a high maximum temperature of a nematic phase. The compound where $Z^5$ and $Z^6$ are —$CH_2CH_2$— is further desirable in view of a lower the minimum temperature of a liquid crystal phase, a higher compatibility and smaller viscosity. Further, the compound where $Z^5$ and $Z^6$ are —$CH_2O$— or —$OCH_2$— is the most desirable in view of a larger negative dielectric anisotropy and a smaller viscosity.

When a liquid crystal compound has a structure shown by the liquid crystal compounds (a-3) to (a-15), it has a large negative dielectric anisotropy and an excellent compatibility with the other liquid crystal compounds. It also has a high stability to heat, light or the like, a small viscosity, a large optical anisotropy and a suitable elastic constant $K_{33}$. A liquid crystal composition including the liquid crystal compound (a) is stable under conditions in which a liquid crystal display device is usually used, and this compound does not deposit its crystals (or its smectic phase) even when the composition is kept in storage at a low temperature.

Accordingly, the liquid crystal compound (a) can suitably utilized for a liquid crystal composition that is used for a liquid crystal display device having a display mode such as PC, TN, STN, ECB, OCB, IPS, VA or PSA, and utilized especially for a liquid crystal composition that is used for a liquid crystal display device having a display mode such as IPS, VA or PSA.

Preparation of the Liquid Crystal Compound (a)

The liquid crystal compound (a) can be synthesized by a suitable combination of techniques in synthetic organic chemistry. Methods of introducing objective terminal groups, rings and bonding groups into starting materials are described in books such as Organic Syntheses (John Wiley & Sons, Inc), Organic Reactions (John Wiley & Sons, Inc), Comprehensive Organic Synthesis (Pergamon Press) and New Experimental Chemistry Course (Shin Jikken Kagaku Kouza, in Japanese) (Maruzen Co., Ltd.).

Formation of the Bonding Group $Z^1$ or $Z^2$

One example of methods for forming the bonding group $Z^1$ is shown. Schemes for forming the bonding groups are illustrated as follows. In the schemes, $MSG^1$ or $MSG^2$ is a monovalent organic group. A plurality of the $MSG^1$ (or $MSG^2$) used in the schemes may be the same or different. The compounds (1A) to (1E) correspond to the liquid crystal compound (a).

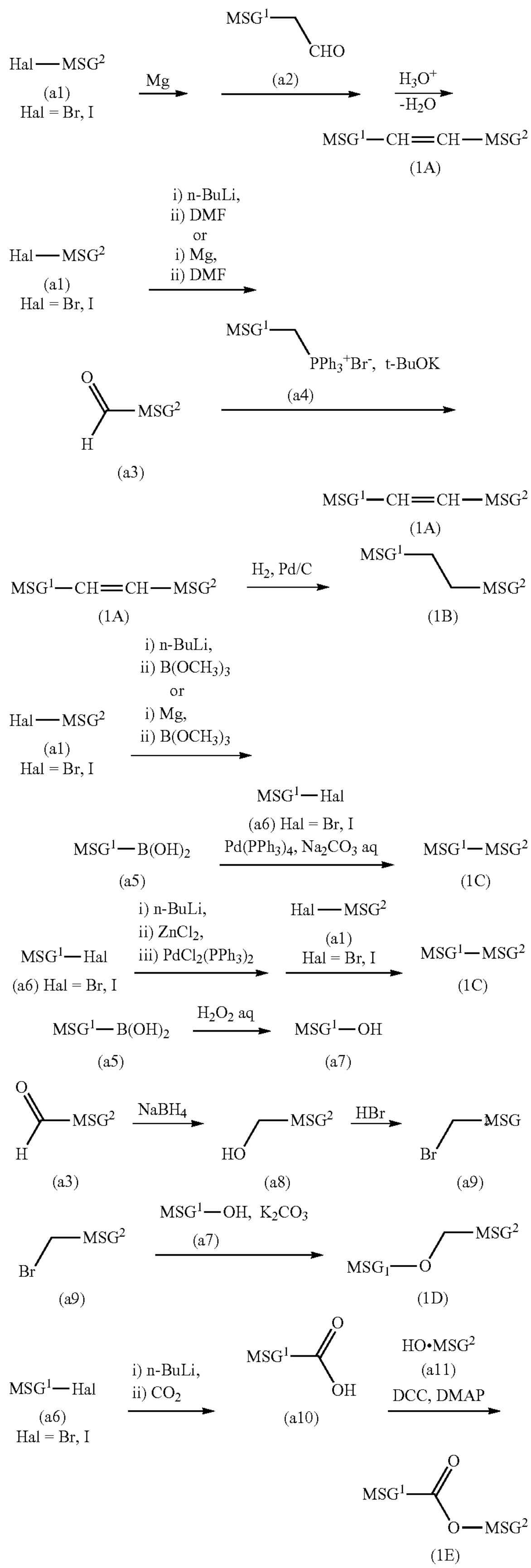

-continued

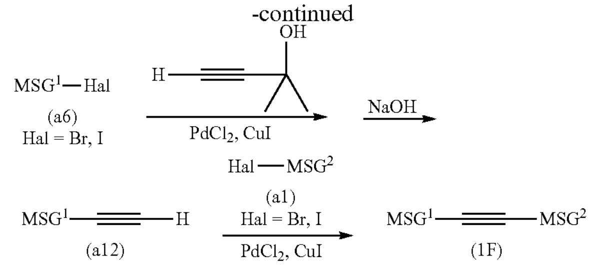

Formation of a Double Bond

The organohalogen compound (a1) having a monovalent organic group $MSG^2$ is allowed to react with magnesium to give a Grignard reagent. The reaction of the resulting Grignard reagent or a lithium salt with the aldehyde derivative (a2) gives a corresponding alcohol derivative. The corresponding compound (1A) can be prepared by dehydration of the resulting alcohol derivative in the presence of an acid catalyst such as p-toluenesulfonic acid or the like.

The organohalogen compound (a1) is allowed to react with butyllithium or magnesium, and then with a formamide such as N,N-dimethylformamide (DMF) to give the aldehyde derivative (a3). Then, the compound (1A) having a corresponding double bond can be prepared by the reaction of the resulting the aldehyde (a3) with a phosphorus ylide prepared by the treatment of the phosphonium salt (a4) with a base such as potassium t-butoxide. Incidentally, the cis-isomer is isomerized to the trans-isomer by the known method when the trans-isomer is requested, since the cis-isomer may be formed in this reaction depending on the reaction conditions.

Formation of —$CH_2CH_2$—

The compound (1B) can be prepared by the hydrogenation of the compound (1A) in the presence of a catalyst such as palladium on carbon (Pd/C).

Formation of a Single Bond

A Grignard reagent or a lithium salt is prepared by the reaction of the organohalogen compound (a1) with magnesium or butyllithium. The dihydroxyborane derivative (a5) is prepared by the reaction of the Grignard reagent or the lithium salt thus prepared with a boric acid ester such as trimethyl borate, and then by hydrolysis of the product in the presence of an acid such as hydrochloric acid. The compound (1C) can be prepared by the reaction of the dihydroxyborane derivative (a5) with the organohalogen compound (a6) in the presence of a catalyst, for example, of an aqueous carbonate solution and tetrakis(triphenylphosphine)palladium [$Pd(PPh_3)_4$].

The compound (1C) can also be prepared by the reaction of the organohalogen compound (a6) having a monovalent organic group MSG' with butyl lithium and further with zinc chloride, and then by the reaction of the resulting compound with the compound (a1) in the presence, for example, of a bistriphenylphosphinedichloropalladium [$Pd(PPh_3)_2Cl_2$] catalyst.

Formation of —$CH_2O$— or —$OCH_2$—

The oxidation of the dihydroxyborane derivative (a5) with an oxidizing agent such as hydrogen peroxide gives the alcohol derivative (a7). In a separate run, the reduction of the aldehyde derivative (a3) with a reducing agent such as sodium borohydride gives the alcohol derivative (a8). The halogenation of the resulting alcohol derivative (a8) with hydrobromic acid or the like gives the organohalogen compound (a9). The compound (1D) can be prepared by the reaction of the alcohol derivative (a8) thus obtained with the organohalogen compound (a9) in the presence of potassium carbonate or the like.

Formation of —COO— or —OCO—

The compound (a6) is allowed to react with n-butyllithium and then with carbon dioxide, giving the carboxylic acid derivative (a10). The compound (1E) having —COO— can be prepared by the dehydration of the carboxylic acid derivative (a10) and the phenol derivative (all) in the presence of DCC (1,3-dicyclohexylcarbodiimide) and DMAP (4-dimethylaminopyridine). The compounds having —OCO— can also be prepared according to this method.

Formation of —C≡C—

The compound (a6) is allowed to react with 2-methyl-3-butyn-2-ol in the presence of a catalyst of dichloropalladium and a copper halide, and the product is deprotected under basic conditions to give the compound (a12). The compound (a12) is allowed to react with the compound (a1) in the presence of a catalyst of dichloropalladium and a copper halide to give the compound (1F).

Formation of the Ring $A^1$ or the Ring $A^2$

Starting materials are commercially available, or methods for their syntheses are well known with regard to rings, such as trans-1,4-cyclohexylene, cyclohexene-1,4-diyl, 1,3-dioxane-2,5-diyl, tetrahydropyran-2,5-diyl, 1,4-phenylene, pyrimidine-2,5-diyl and pyridine-2,5-diyl.

Method for the Production of the Liquid Crystal Compound (a)

Examples of the production for the liquid crystal compound (a), that is to say, the liquid crystal compound represented by the general formula (a) will be shown below.

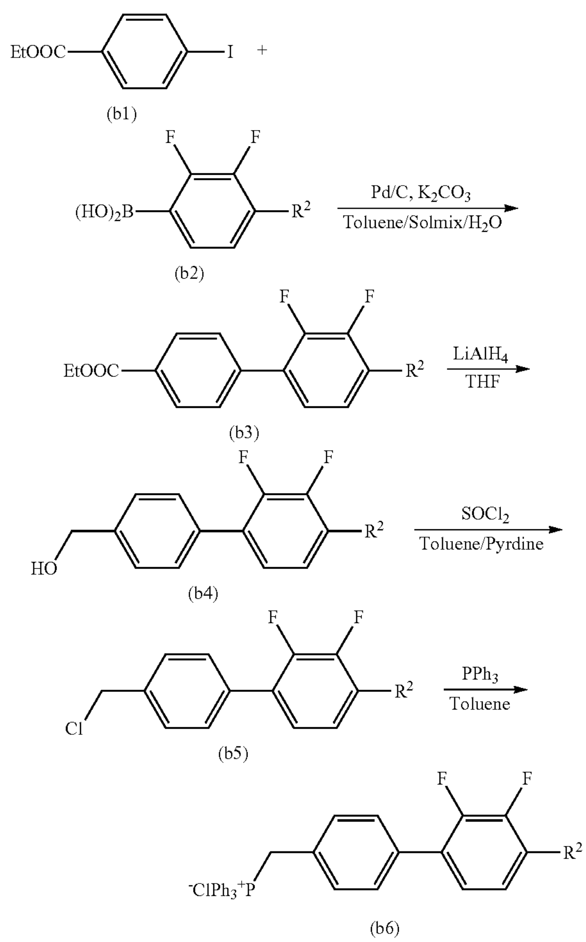

-continued

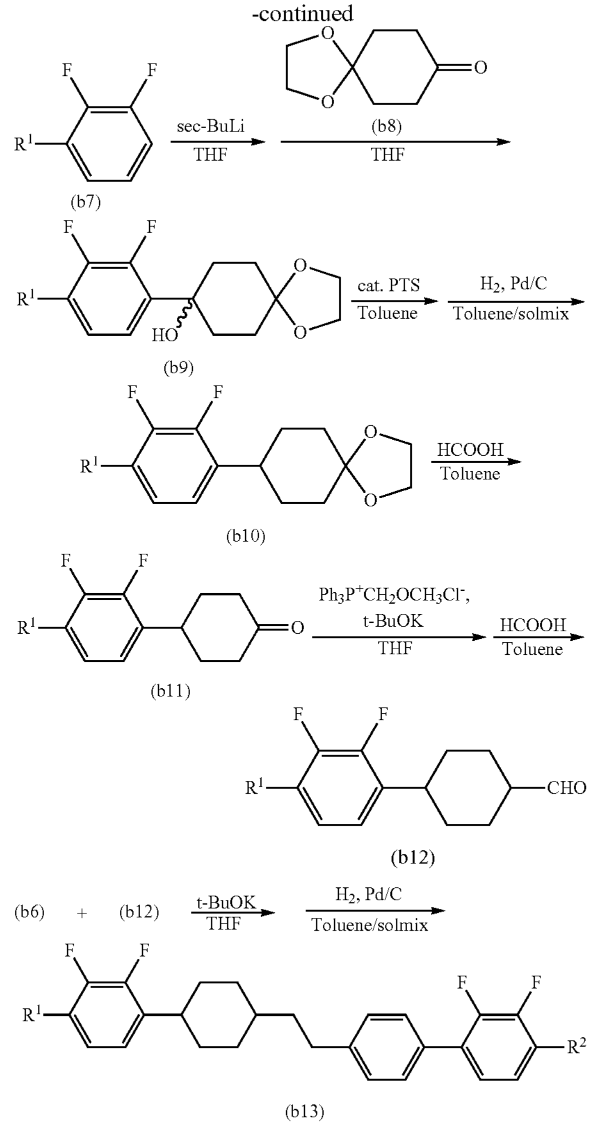

First, ethyl 4-iodobenzoate (b1) is allowed to react with dihydroxyborane derivative (b2) in the presence of potassium carbonate and a catalyst such as palladium on carbon or the like to give the compound (b3). Next, reduction of the compound (b3) with lithium aluminum hydride or the like gives the compound (b4). Then, chlorination with thionyl chloride or the like gives the compound (b5). The compound (b6) is obtained by the reaction of the compound (b5) with triphenylphosphine.

In a separate run, the difluorobenzene derivative (b7) was allowed to react with sec-BuLi to give a lithium salt. The lithium salt is allowed to react with the carbonyl derivative (b8) to give the alcohol derivative (b9). Dehydration of the resulting alcohol derivative (b9) in the presence of a catalyst such as p-toluenesulfonic acid or the like, and then hydrogenation of the product in the presence of a catalyst such as palladium on carbon gives the compound (b10). The resulting compound (b10) is allowed to react with formic acid or the like to give the carbonyl derivative (b11). The resulting the compound (b11) is allowed to react with methoxymethyltriphenylphosphonium chloride in the presence of a base such as potassium t-butoxide, and then with formic acid or the like to give the aldehyde derivative (b12).

Witting reaction of the compound (b6) obtained in the procedure described above with the aldehyde derivative (b12) in the presence of a base such as potassium t-butoxide, followed by hydrogenation of the product in the presence of a catalyst such as palladium on carbon gives the compound (b13), which is one example of the liquid crystal compound (a) of the invention.

The Liquid Crystal Composition

The liquid crystal composition of the invention will be explained below. This liquid crystal composition is characterized by including at least one kind of the liquid crystal compound (a) as a component. The composition may include two or more kinds of the liquid crystal compounds (a), or may be composed of the liquid crystal compound (a) alone. When the liquid crystal composition of the invention is prepared, its components can be selected, for example, by taking into consideration the dielectric anisotropy of the liquid crystal compound (a). The liquid crystal composition in which the components have been selected has a small viscosity, a large negative dielectric anisotropy, a suitable elastic constant $K_{33}$ and a low threshold voltage, and also has a high maximum temperature of a nematic phase (the phase transition temperature between a nematic phase and an isotropic phase) and a low minimum temperature of a nematic phase.

The Liquid Crystal Composition (1)

The liquid crystal composition of the invention (hereinafter, may be referred to as the liquid crystal composition (1)) further includes at least one compound selected from the group of liquid crystal compounds represented by formulas (e-1) to (e-3) (hereinafter, may be referred to as the compounds (e-1) to (e-3), respectively) as a second component, in addition to the liquid crystal compound (a).

nearly 0 (zero), the dielectric anisotropy of the liquid crystal composition including the compound can be adjusted so as to approach 0.

The compound (e-1) or (e-2) is effective in decreasing the viscosity and increasing the voltage holding ratio in the liquid crystal composition including the compound. The compound (e-3) is effective in increasing the maximum temperature of a nematic phase and increasing the voltage holding ratio in the liquid crystal composition including the compound.

In the ring $A^{11}$, the ring $A^{12}$, the ring $A^{13}$ and the ring $A^{14}$, the maximum temperature of a nematic phase can be increased in the liquid crystal composition including the compound where two or more of the ring is trans-1,4-cyclohexylene, and the optical anisotropy can be increased in the composition including the compound where two or more of the ring is 1,4-phenylene.

In the compounds (e-1) to (e-3), more desirable compounds are the compounds represented by formulas (2-1) to (2-74) (hereinafter, may be referred to as the compounds (2-1) to (2-74), respectively). In these compounds, the definition of $Ra_{11}$ and $Rb_{11}$ is the same with those described for the case of the compounds (e-1) to (e-3).

(2-1)

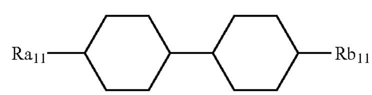

(e-1)

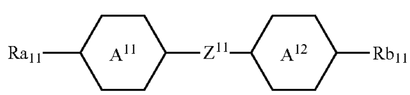

(e-2)

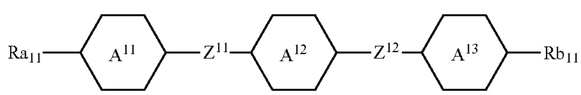

(e-3)

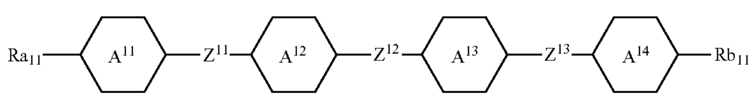

In formulas (e-1) to (e-3), $Ra_{11}$ and $Rb_{11}$ are independently alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine.

In formulas (e-1) to (e-3), the ring $A^{11}$, the ring $A^{12}$, the ring $A^{13}$ and the ring $A^{14}$ are independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl.

In formulas (e-1) to (e-3), $Z^{11}$, $Z^{12}$ and $Z^{13}$ are independently a single bond, —$CH_2CH_2$—, —CH═CH—, —C≡C—, —COO— or —$CH_2O$—.

A liquid crystal composition (a) decreases the viscosity and decrease the minimum temperature of a nematic phase by the addition of the compounds (e-1) to (e-3), which is a second component, to the liquid crystal compound (a). Since the dielectric anisotropy of the compounds (e-1) to (e-3) is -continued (2-2)

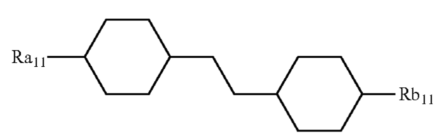

(2-3)

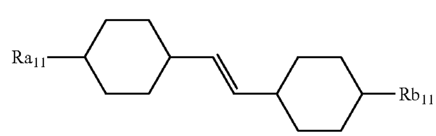

(2-4)

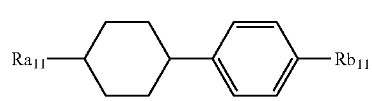

-continued
(2-5)
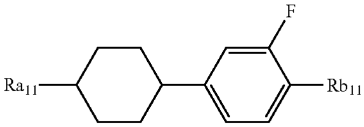
(2-6)
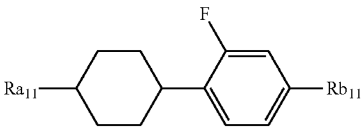
(2-7)
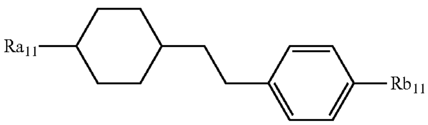
(2-8)
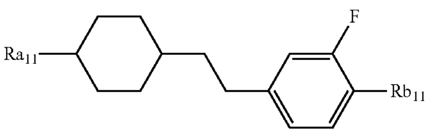
(2-9)
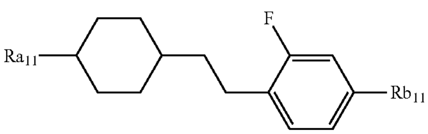
(2-10)
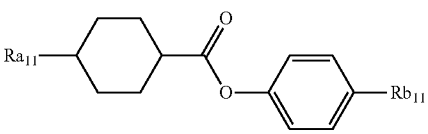
(2-11)
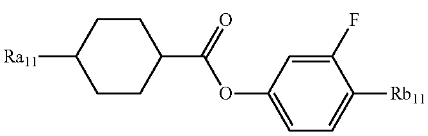
(2-12)
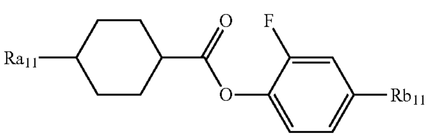
(2-13)
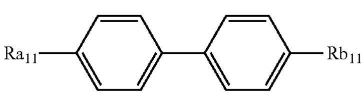
(2-14)
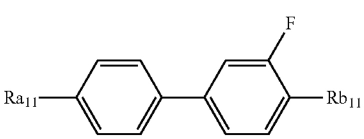
(2-15)
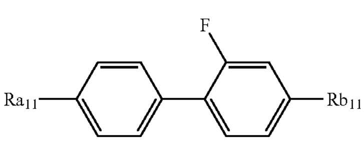
(2-16)
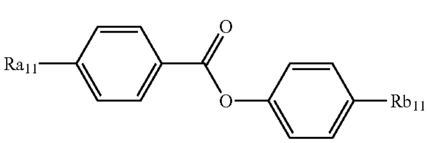
-continued
(2-17)
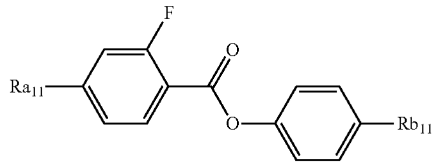
(2-18)
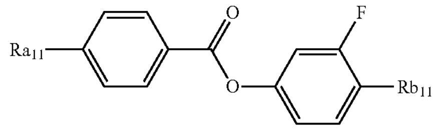
(2-19)
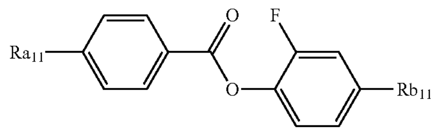
(2-20)
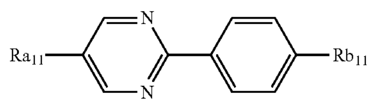
(2-21)
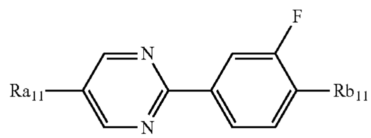
(2-22)
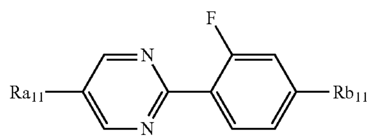
(2-23)
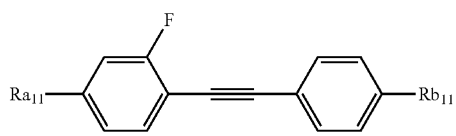
(2-24)
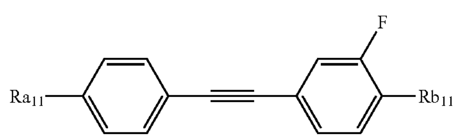
(2-25)
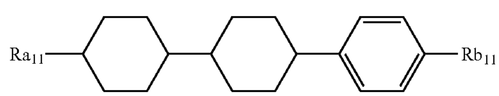
(2-26)
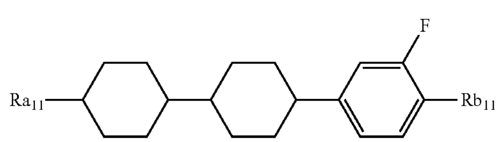
(2-27)
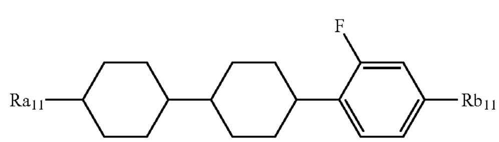

-continued
(2-28)
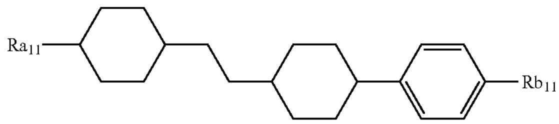
(2-29)
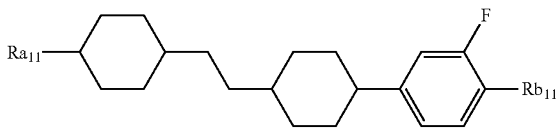
(2-30)
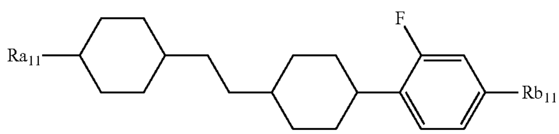
(2-31)
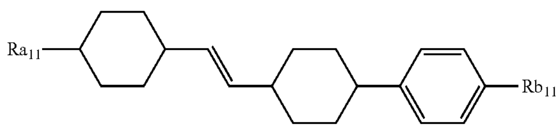
(2-32)
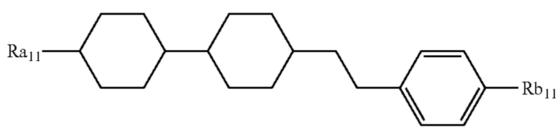
(2-33)
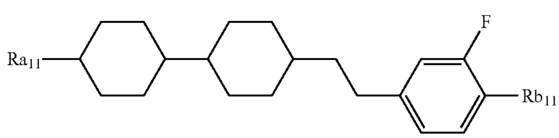
(2-34)
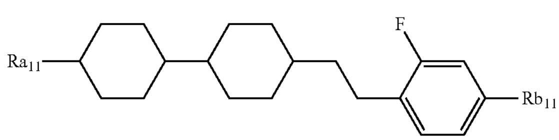
(2-35)
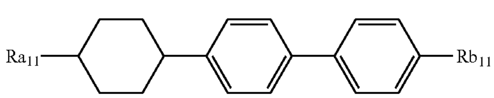
(2-36)
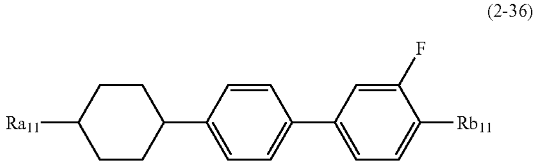
(2-37)
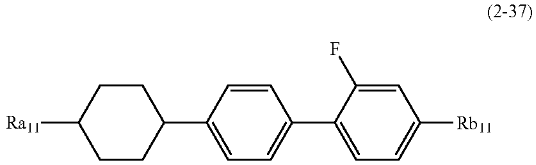
-continued
(2-38)
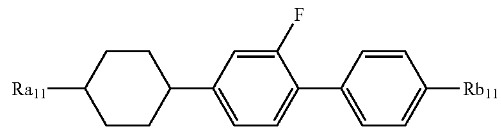
(2-39)
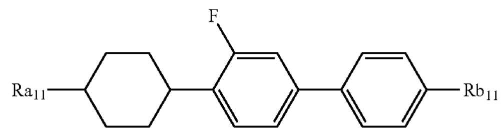
(2-40)
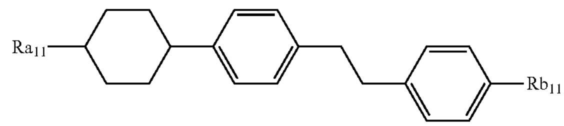
(2-41)
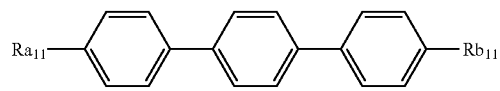
(2-42)
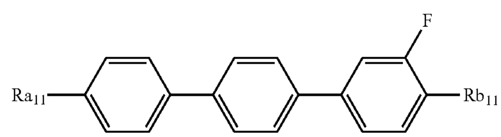
(2-43)
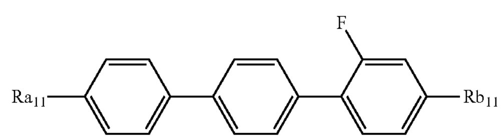
(2-44)
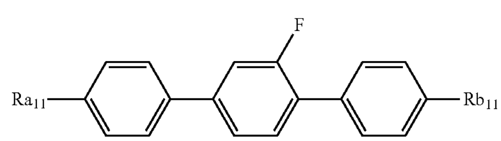
(2-45)
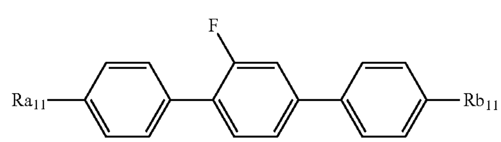
(2-46)
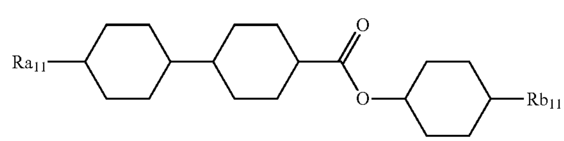
(2-47)
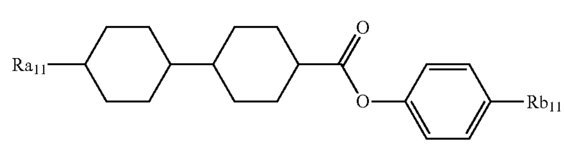

-continued
(2-48)
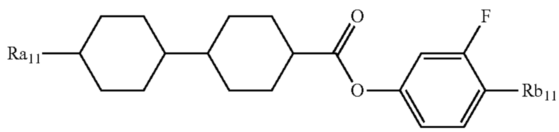
(2-49)
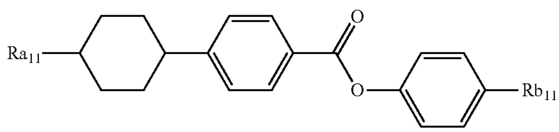
(2-50)
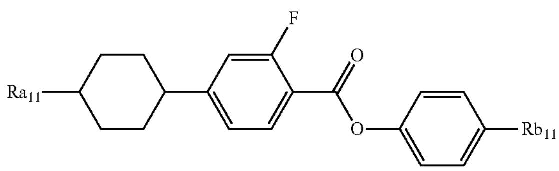
(2-51)
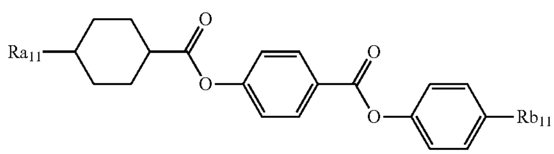
(2-52)
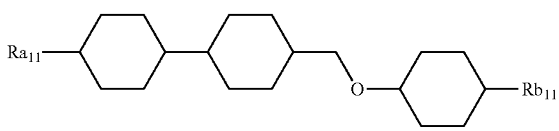
(2-53)
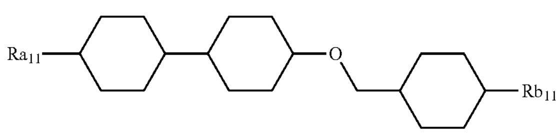
(2-54)
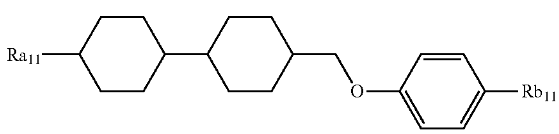
(2-55)
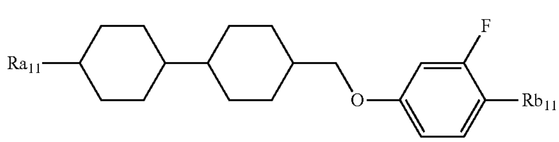
(2-56)
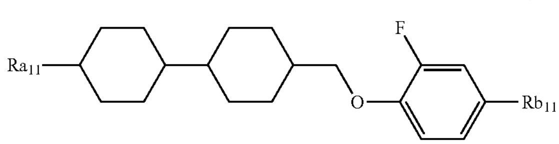
(2-57)
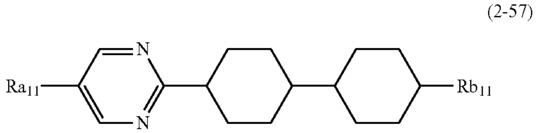
-continued
(2-58)
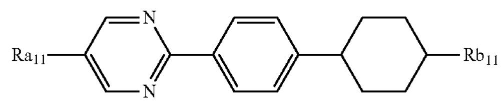
(2-59)
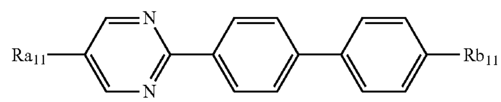
(2-60)
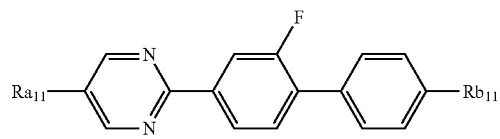
(2-61)
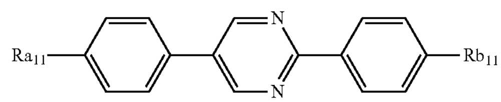
(2-62)
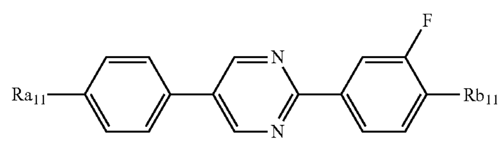
(2-63)
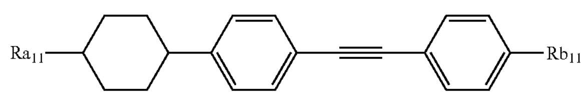
(2-64)
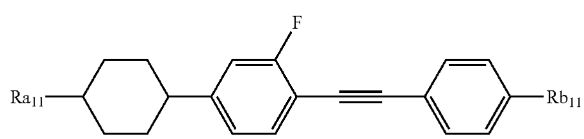
(2-65)
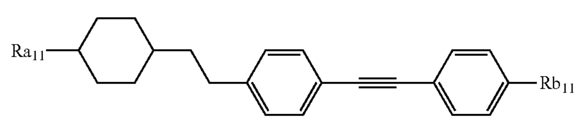
(2-66)
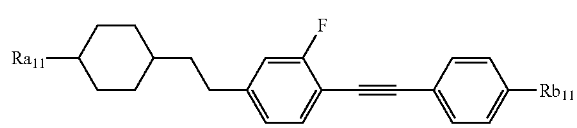
(2-67)
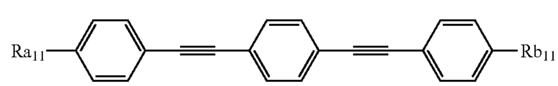
(2-68)
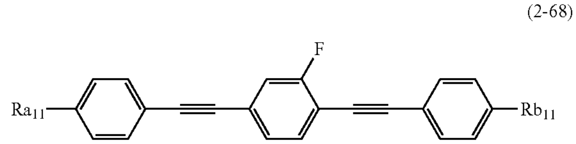
(2-69)
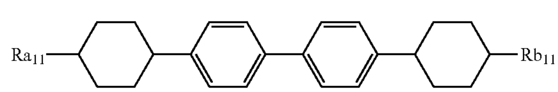

-continued (2-70)

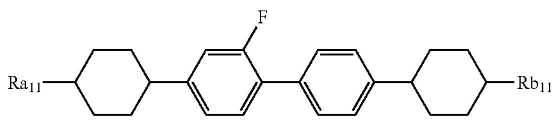

(2-71)

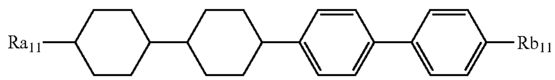

(2-72)

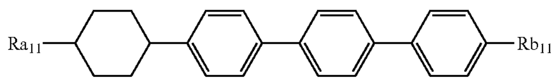

(2-73)

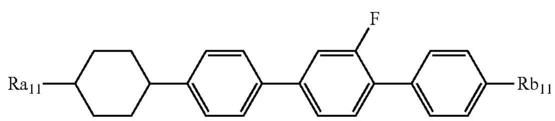

(2-74)

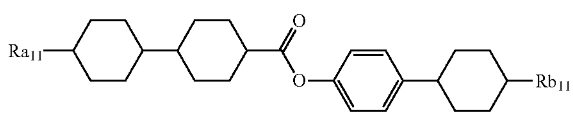

When the second component is the compounds (2-1) to (2-74), a liquid crystal composition having an excellent heat resistance and light resistance, a higher specific resistance value and a wide nematic phase can be prepared.

In particular, the liquid crystal composition (1), where the first component is at least one compound selected from the group of compounds represented by formulas (a-3) to (a-15), and the second component is at least one compound selected from the group of compounds represented by the compounds (e-1) to (e-3), has a quite excellent heat resistance and light resistance, a wider nematic phase, a larger voltage holding ratio, a smaller viscosity and a suitable elastic constant $K_{33}$.

The content of the second component in the liquid crystal composition (1) of the invention is not especially limited, and it is desirable that the content is increased in view of a decrease in viscosity. However, the liquid crystal composition has a tendency for the threshold voltage to increase, when the content of the second component is increased. Thus, it is more desirable that the content of the second component is in the range of 40 to 95% by weight based on the total weight of liquid crystal compounds included in the liquid crystal composition (1), and the content of the first component is in the range of 5 to 60% by weight based on the total weight of liquid crystal compounds included in the liquid crystal composition (1), when the liquid crystal composition of the invention is used for a liquid crystal device having a VA mode, for example.

The Liquid Crystal Composition (2)

A liquid crystal composition including at least one compound selected from the group of liquid crystal compounds represented by formulas (g-1) to (g-6) (hereinafter, may be abbreviated to compounds (g-1) to (g-6), respectively) as a third component, in addition to the first component and the second component is also desirable as the liquid crystal composition of the invention. The composition may be abbreviated to the liquid crystal composition (2).

(g-1)

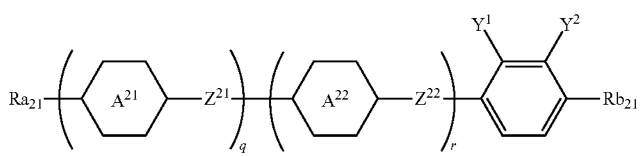

(g-2)

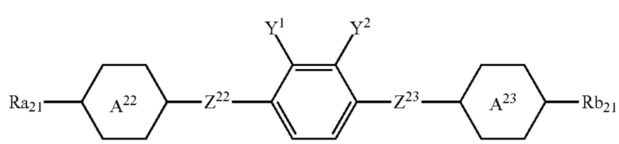

(g-3)

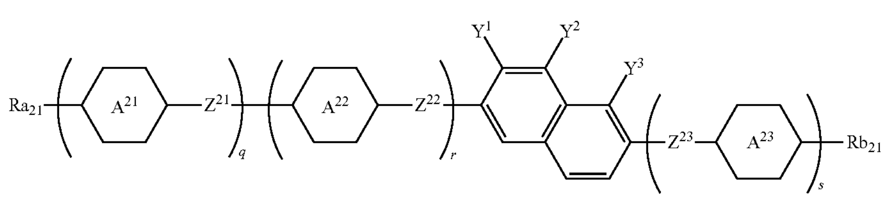

(g-4)

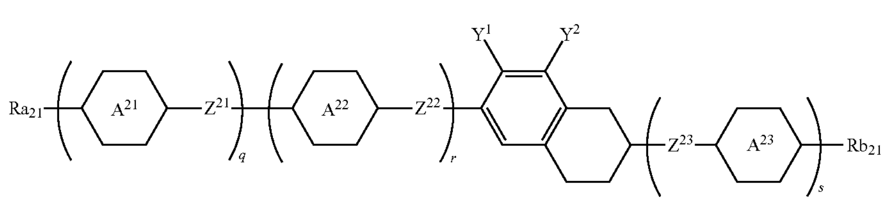

-continued (g-5)

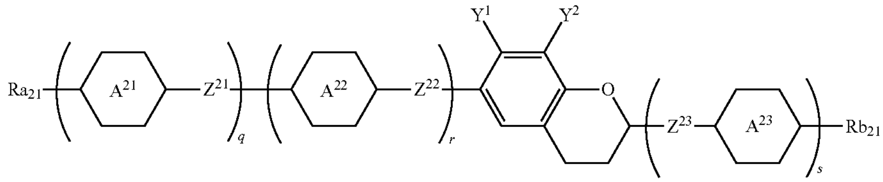

(g-6)

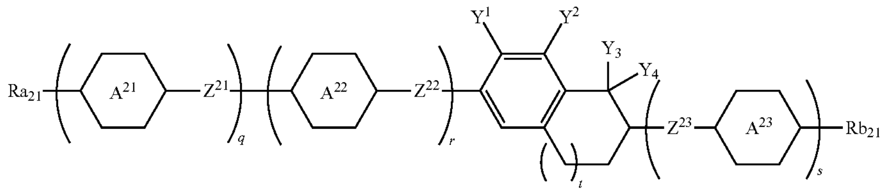

In formulas (g-1) to (g-6), $Ra_{21}$ and $Rb_{21}$ are independently hydrogen or alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine.

In formulas (g-1) to (g-6), the ring $A^{21}$, $A^{22}$ and $A^{23}$ are independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl.

In formulas (g-1) to (g-6), $Z^{21}$, $Z^{22}$ and $Z^{23}$ are independently a single bond, —$CH_2CH_2$—CH═CH—, —C≡C—, —$OCF_2$—, —$CF_2O$—, —$OCF_2CH_2CH_2$— $CH_2CH_2CF_2O$—, —COO—, —OCO—, —$OCH_2$— or —$CH_2O$—; and $Y^1$, $Y^2$, $Y^3$ and $Y^4$ are independently fluorine or chlorine.

In formulas (g-1) to (g-6), q, r and s are independently 0, 1 or 2, q+r is 1 or 2, and q+r+s is 1, 2 or 3; and t is 0, 1 or 2.

The liquid crystal composition (2) including the compounds (g-1) to (g-6) as a third component has a large negative dielectric anisotropy.

The liquid crystal composition that has a wide temperature range of a nematic phase, a small viscosity, a large negative dielectric anisotropy and a large specific resistance value is obtained, and the liquid crystal composition in which these physical properties are suitably balanced is obtained.

Among the compounds (g-1) to (g-6), at least one compound selected from the group of compounds represented by formulas (g-1-1) to (g-2-3) (hereinafter, may be abbreviated to the compounds (g-1-1) to (g-2-3), respectively) is desirable in view of a small viscosity, and heat resistance and light resistance.

(g-1-1)

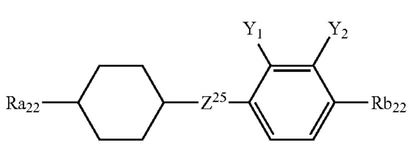

(g-1-2)

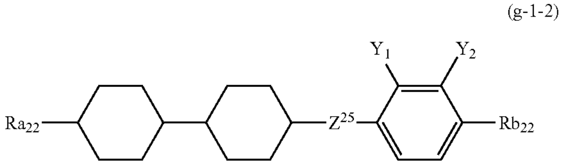

-continued (g-1-3)

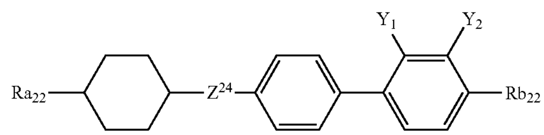

(g-1-4)

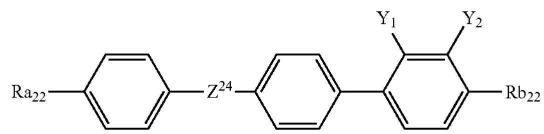

(g-2-1)

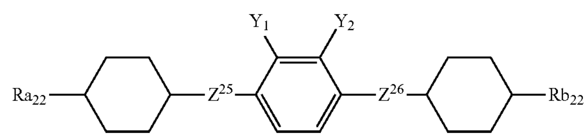

(g-2-2)

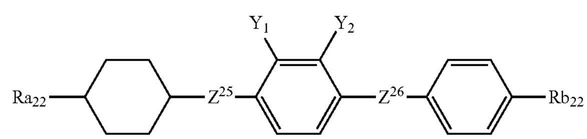

(g-2-3)

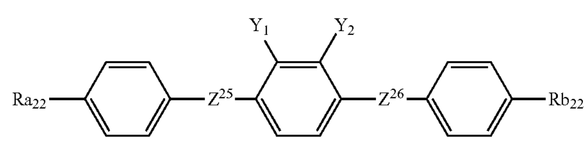

In formulas (g-1-1) to (g-2-3), $Ra_{22}$ and $Rb_{22}$ are independently alkyl having 1 to 8 carbons, alkenyl having 2 to 8 carbons or alkoxy having 1 to 7 carbons; $Z^{24}$, $Z^{25}$ and $Z^{26}$ are independently a single bond, —$CH_2CH_2$—, —COO—, —OCO—, —$CH_2O$— or —$OCH_2$—; and both $Y^1$ and $Y^2$ are fluorine, or one of them is fluorine and the other is chlorine.

The Liquid Crystal Composition (3)

A liquid crystal composition including at least one compound selected from the group of liquid crystal compounds represented by formulas (i-1) to (i-4) (hereinafter, may be abbreviated to the compounds (i-1) to (i-4), respectively) as a third component, in addition to the first component and the second component is also desirable as the liquid crystal composition of the invention. The composition may be abbreviated to the liquid crystal composition (3).

(i-1)

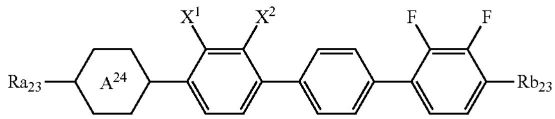

(i-2)

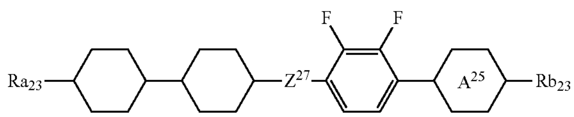

(i-3)

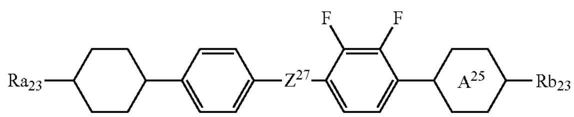

(i-4)

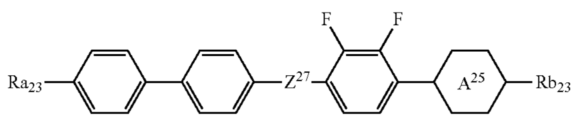

In formulas (i-1) to (i-4), $Ra_{23}$ and $Rb_{23}$ are independently alkyl having 1 to 8 carbons or alkoxy having 1 to 7 carbons; the ring $A^{24}$ is trans-1,4-cyclohexylene, 1,4-cyclohexenylene, 1,4-phenylene or tetrahydropyran-2,5-diyl; the ring $A^{25}$ is trans-1,4-cyclohexylene, 1,4-phenylene, 2-fluoro-1,4-phenylene or 3-fluoro-1,4-phenylene; $Z^{27}$ is independently a single bond, —$CH_2O$—, —COO— or —$CF_2O$—; and both $X^1$ and $X^2$ are fluorine, or one of them is fluorine and the other is hydrogen.

The composition (3) including at least one compound selected from the group of the compounds (i-1) to (i-4) as a third component is also desirable, since it is excellent in view of a small viscosity, heat resistance and light resistance.

The compounds (g-1) to (g-6), the compounds (g-1-1) to (g-2-3) and the compounds (i-1) to (i-4) can be properly used together with another component in order to obtain the desired physical properties.

The compounds (g-1-1), (g-1-2) and (i-2) can decrease the viscosity, decrease the threshold voltage value or decrease the minimum temperature of a nematic phase in the liquid crystal composition including the compound. The compounds (g-1-2), (g-1-3), (g-1-4) and (i-1) can decrease the threshold voltage value without decreasing the maximum temperature of a nematic phase in the liquid crystal composition including the compound.

The compounds (g-1-3), (g-2-2) and (i-3) can increase the optical anisotropy, and the compounds (g-1-4), (g-2-3), (i-1) and (i-4) can further increase the optical anisotropy.

The compounds (g-2-1), (g-2-2), (g-2-3), (i-2), (i-3) and (i-4) can decrease the minimum temperature of a nematic phase in the liquid crystal composition including the compound.

An example of the desirable liquid crystal composition includes a liquid crystal composition in which the first component is at least one compound selected from the group of the compounds of formulas (a-3) to (a-15), the second component is at least one compound selected from the group of the compounds represented by formulas (e-1) to (e-3), and the third component is at least one compound selected from the group of the compounds represented by formulas (g-1-1) to (g-2-3) and formulas (i-1) to (i-4). The liquid crystal composition having this formulation has an excellent heat resistance and light resistance, a wide temperature range of a nematic phase, a small viscosity, a high voltage holding ratio, a suitable optical anisotropy, a suitable dielectric anisotropy and a suitable elastic constant $K_{33}$. These physical properties are suitably balanced in the liquid crystal composition.

Among the third component, the compounds (3-1) to (3-118), which are typified by the compounds (g-1) and (g-2), are desirable. In these compounds, the definition of $Ra_{22}$ and $Rb_{22}$ is the same with those described for the case of the compounds (g-1-1) to (g-2-3).

(3-1)

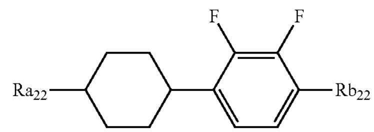

(3-2)

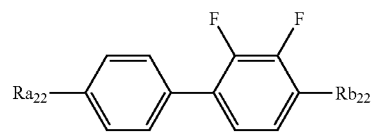

(3-3)

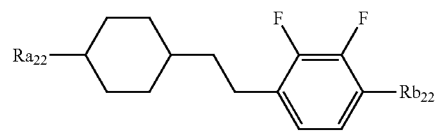

(3-4)

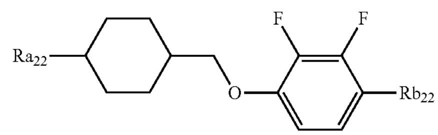

(3-5)

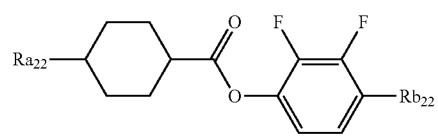

(3-6)

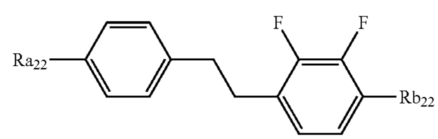

(3-7)

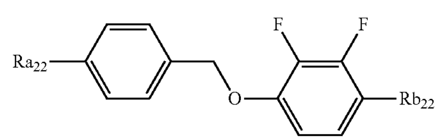

(3-8)

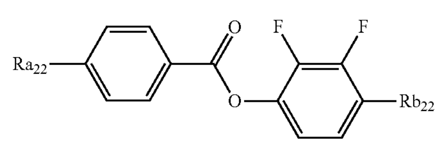

-continued
(3-9)
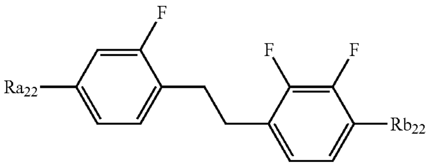
(3-10)
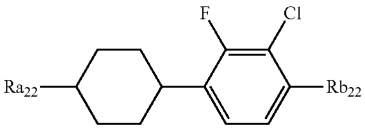
(3-11)
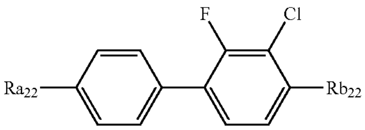
(3-12)
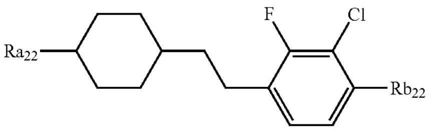
(3-13)
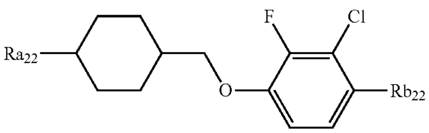
(3-14)
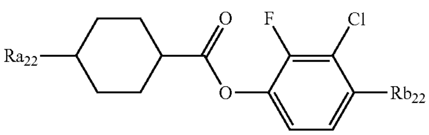
(3-15)
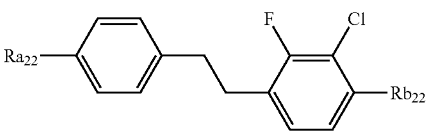
(3-16)
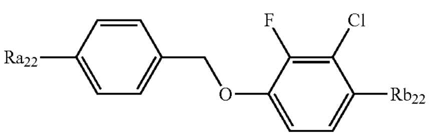
(3-17)
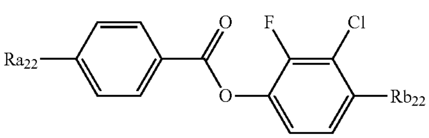
(3-18)
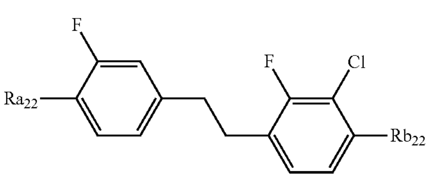
(3-19)
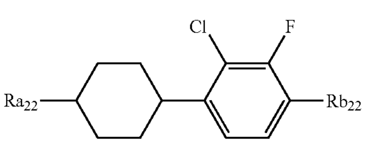
-continued
(3-20)
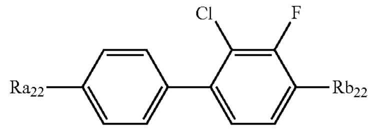
(3-21)
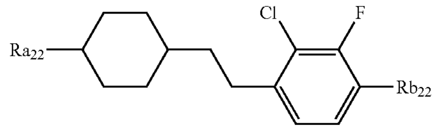
(3-22)
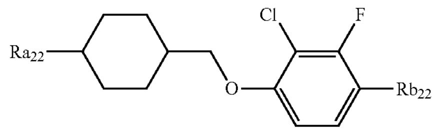
(3-23)
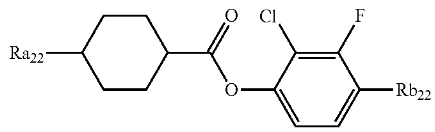
(3-24)
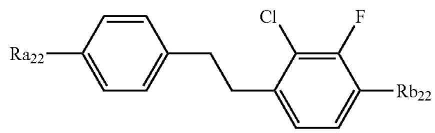
(3-25)
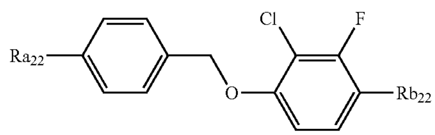
(3-26)
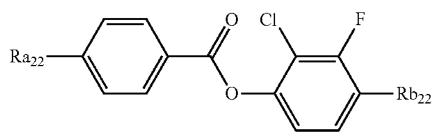
(3-27)
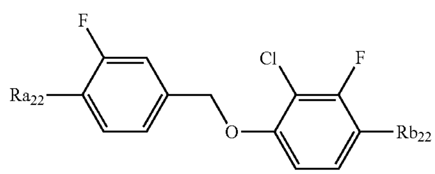
(3-28)
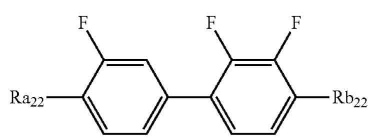
(3-29)
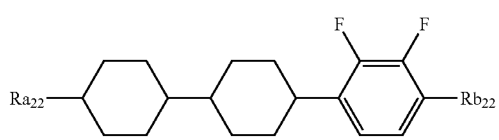
(3-30)
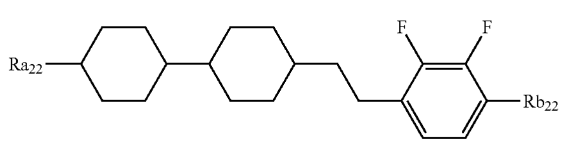

-continued
(3-31)
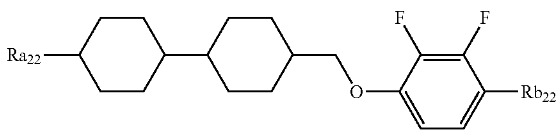
(3-32)
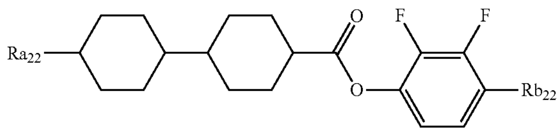
(3-33)
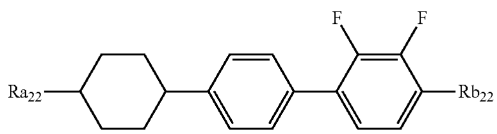
(3-34)
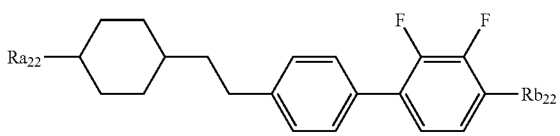
(3-35)
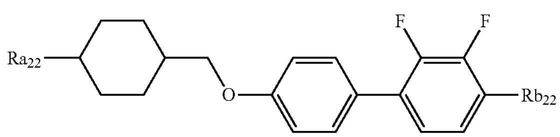
(3-36)
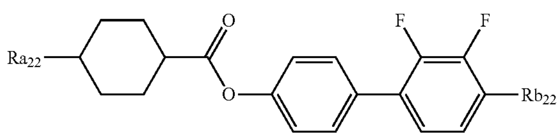
(3-37)
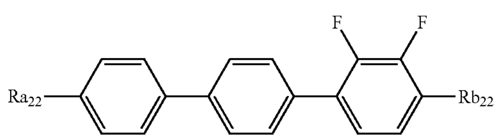
(3-38)
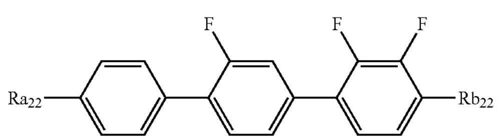
(3-39)
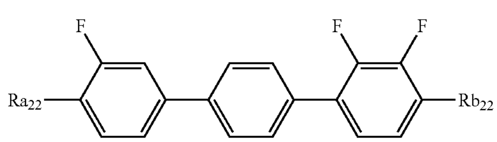
(3-40)
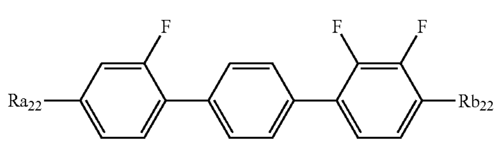
-continued
(3-41)
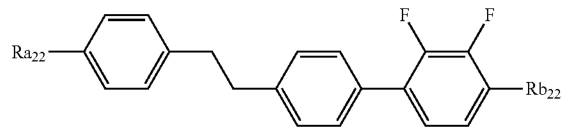
(3-42)
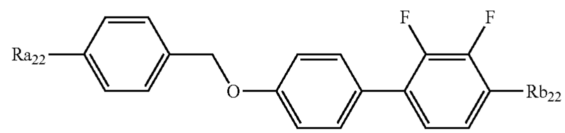
(3-43)
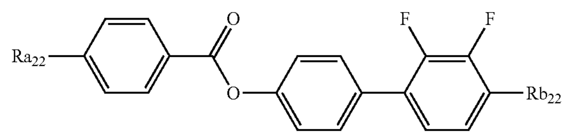
(3-44)
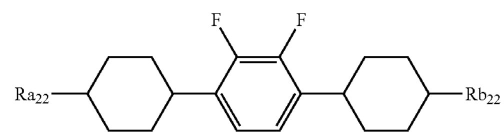
(3-45)
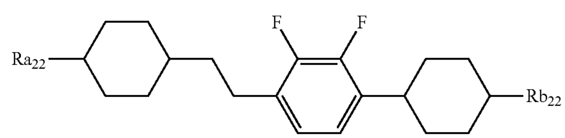
(3-46)
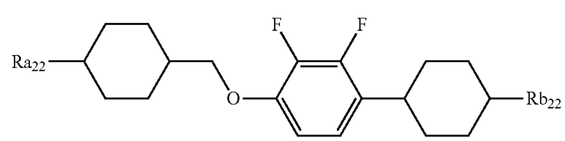
(3-47)
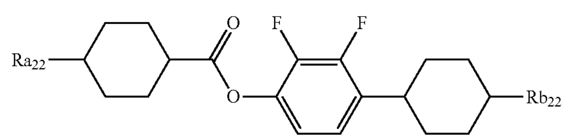
(3-48)
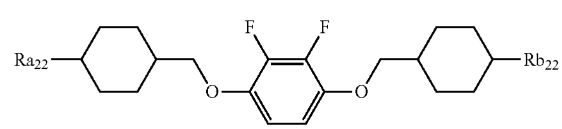
(3-49)
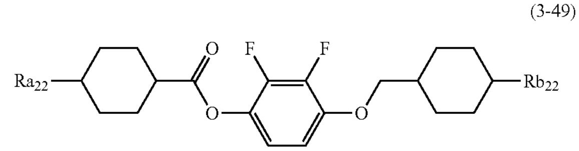
(3-50)
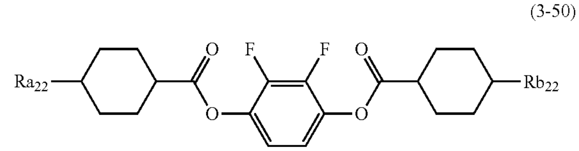

-continued
(3-51)
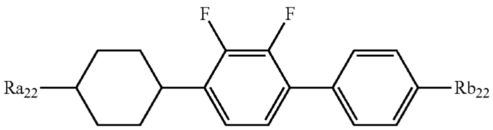
(3-52)
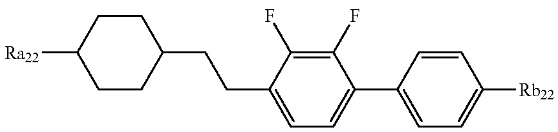
(3-53)
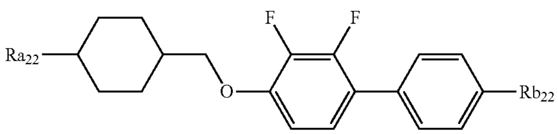
(3-54)
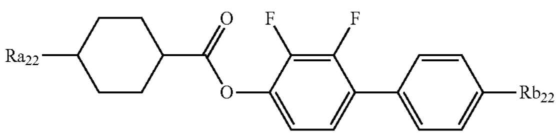
(3-55)
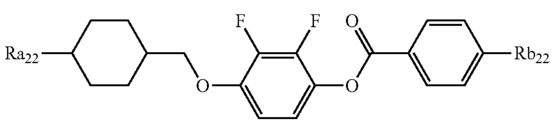
(3-56)
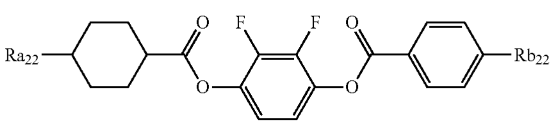
(3-57)
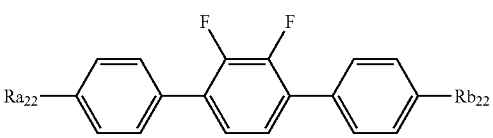
(3-58)
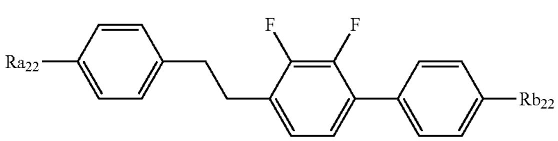
(3-59)
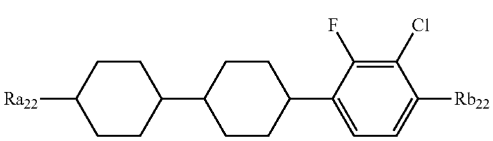
(3-60)
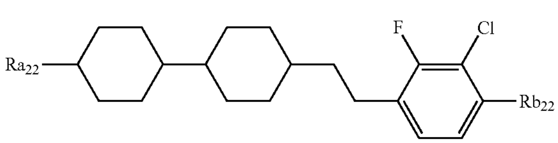
-continued
(3-61)
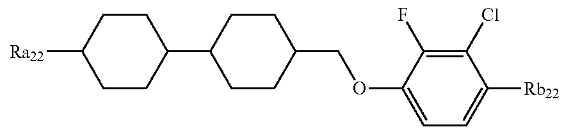
(3-62)
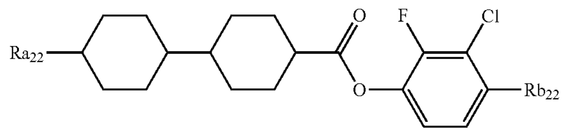
(3-63)
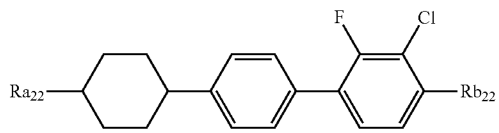
(3-64)
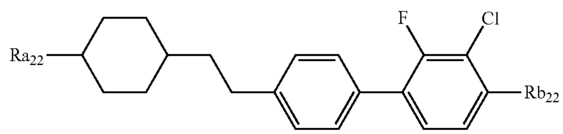
(3-65)
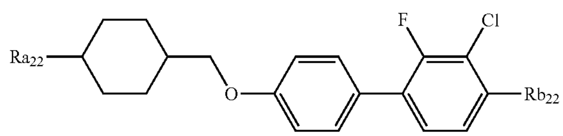
(3-66)
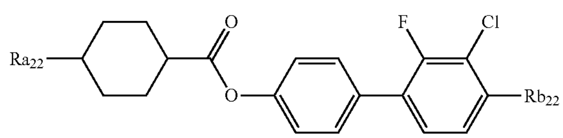
(3-67)
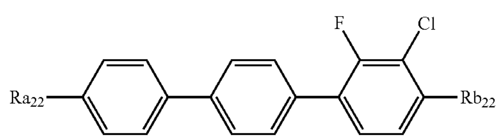
(3-68)
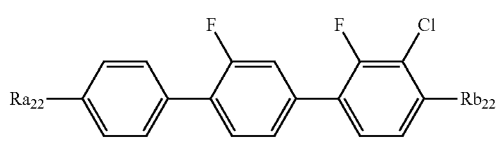
(3-69)
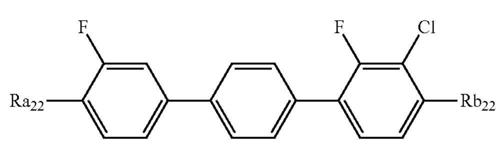
(3-70)
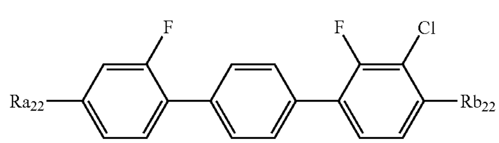

-continued
(3-71)
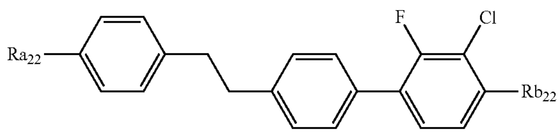
(3-72)
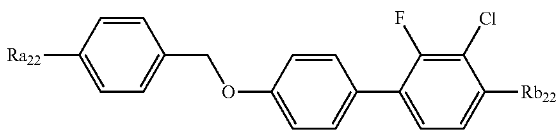
(3-73)
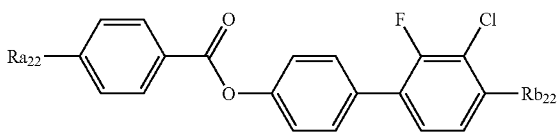
(3-74)
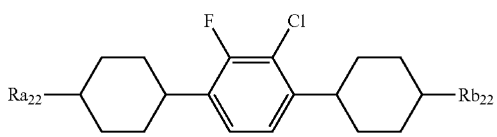
(3-75)
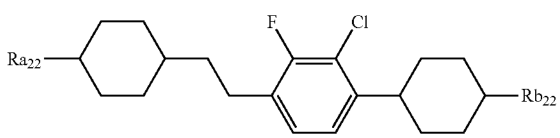
(3-76)
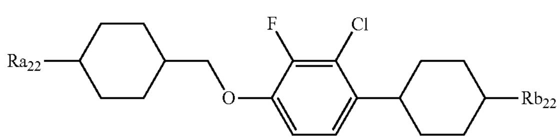
(3-77)
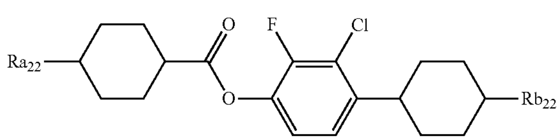
(3-78)
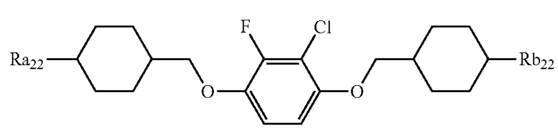
(3-79)
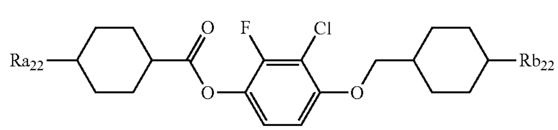
(3-80)
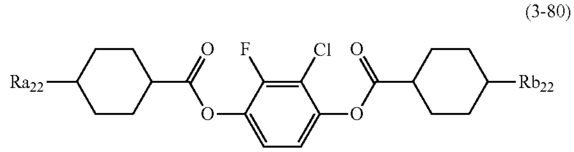
-continued
(3-81)
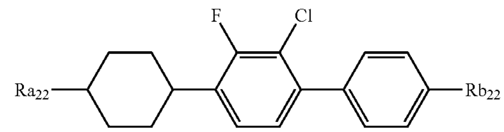
(3-82)
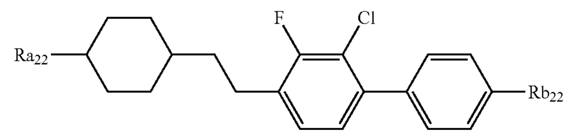
(3-83)
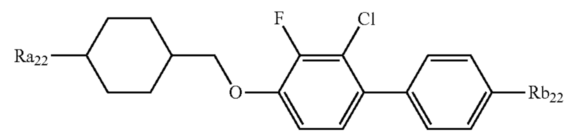
(3-84)
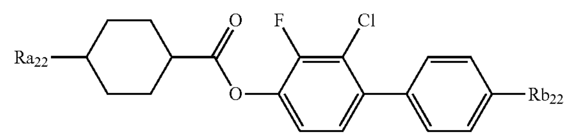
(3-85)
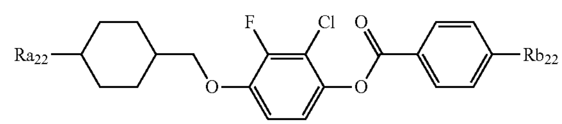
(3-86)
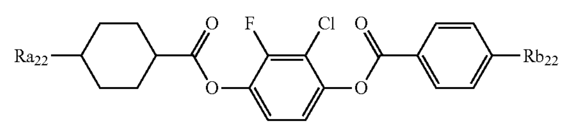
(3-87)
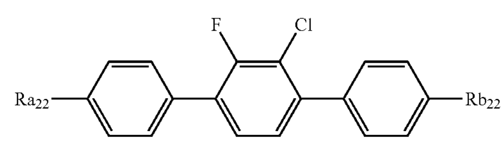
(3-88)
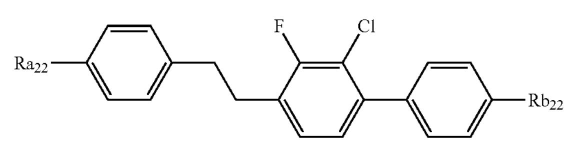
(3-89)
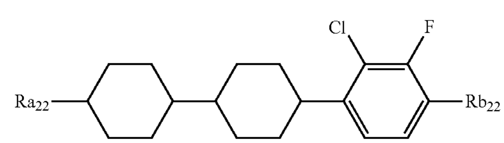
(3-90)
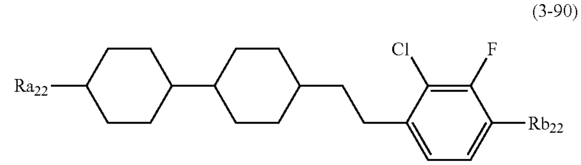

-continued
(3-91)
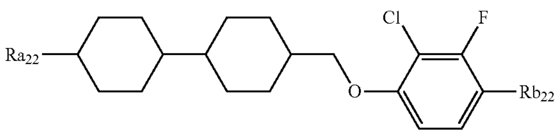
(3-92)
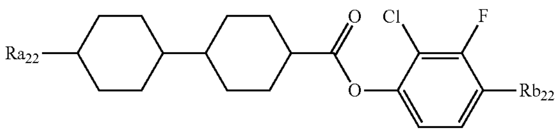
(3-93)
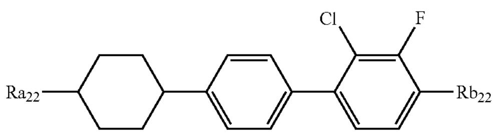
(3-94)
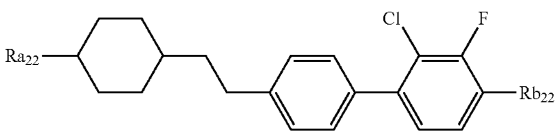
(3-95)
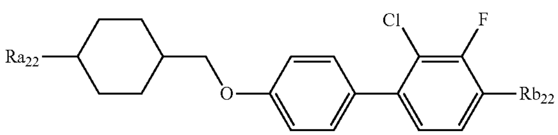
(3-96)
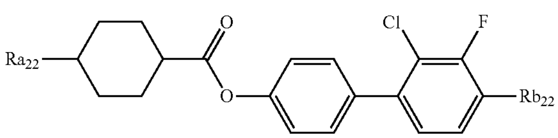
(3-97)
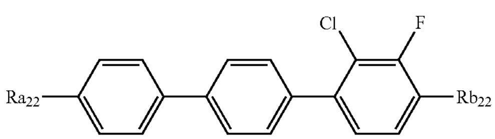
(3-98)
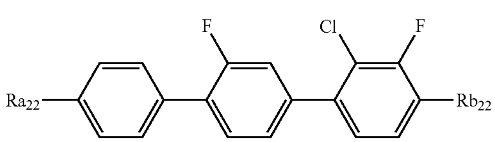
(3-99)
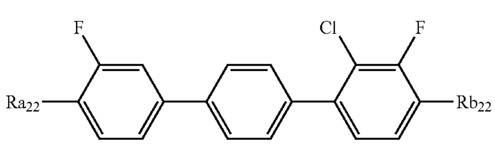
(3-100)
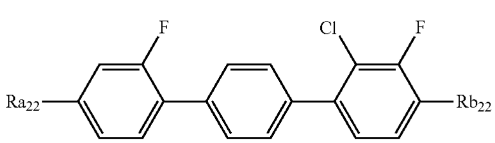
-continued
(3-101)
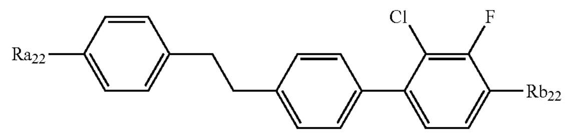
(3-102)
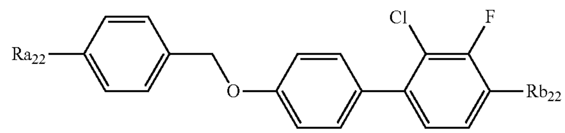
(3-103)
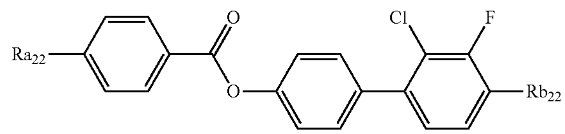
(3-104)
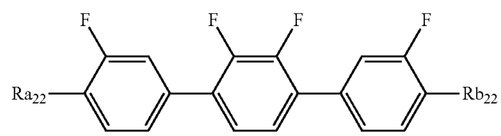
(3-105)
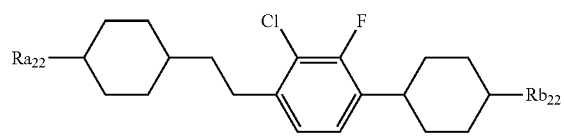
(3-106)
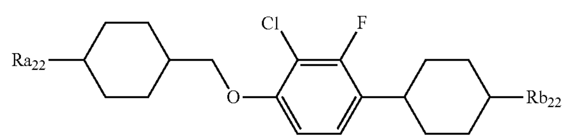
(3-107)
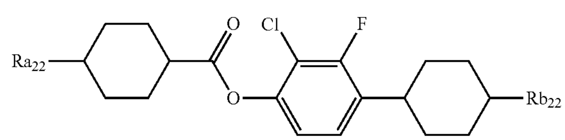
(3-108)
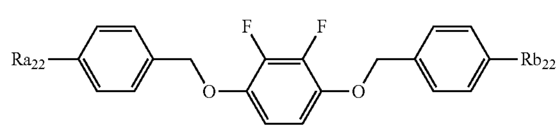
(3-109)
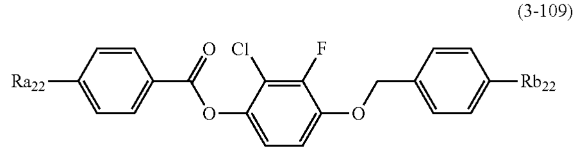
(3-110)
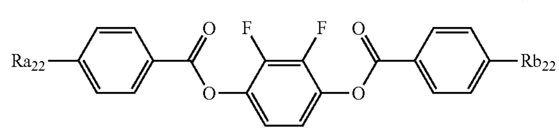

-continued
(3-111)
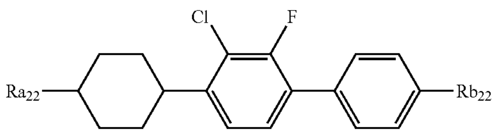
(3-112)
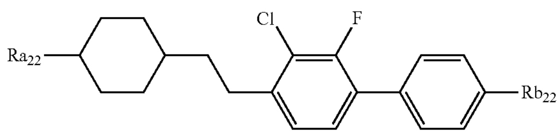
(3-113)
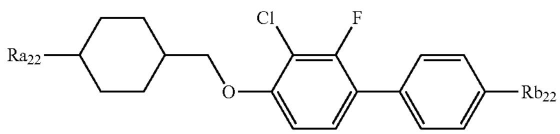
(3-114)
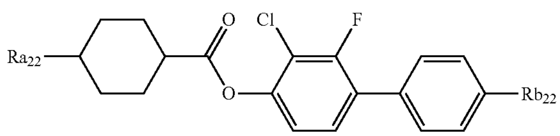
(3-115)
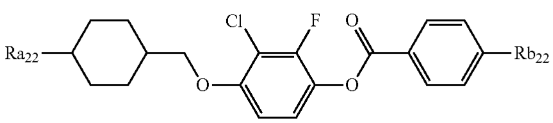
(3-116)
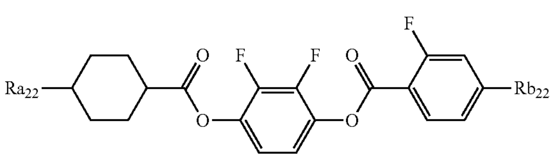
(3-117)
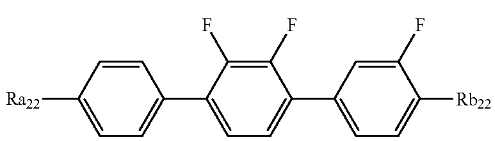
(3-118)
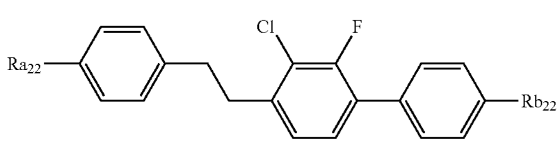
A compound having a condensed ring, such as the compounds (g-3) to (g-6), can decrease the threshold voltage value, and the compounds (3-119) to (3-144) are desirable in view of heat resistance or light resistance. In these compounds, the definition of $Ra_{21}$ and $Rb_{21}$ is the same with those described for the case of the compounds (g-3) to (g-6).
(3-119)
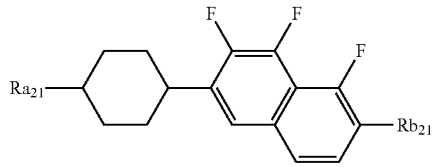
(3-120)
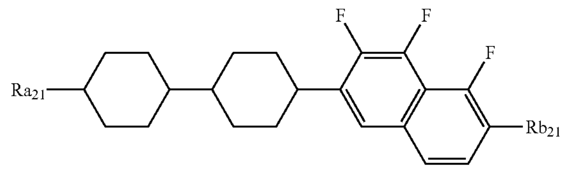
(3-121)
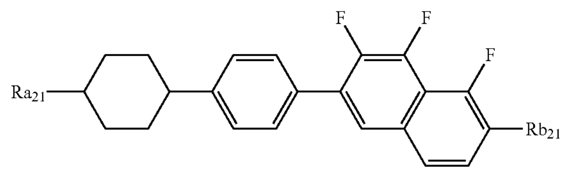
(3-122)
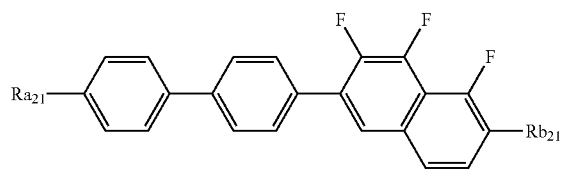
(3-123)
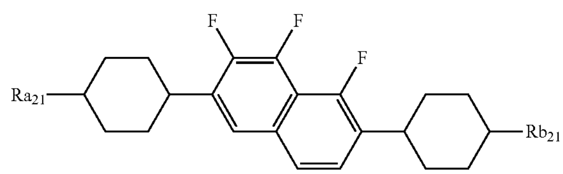
(3-124)
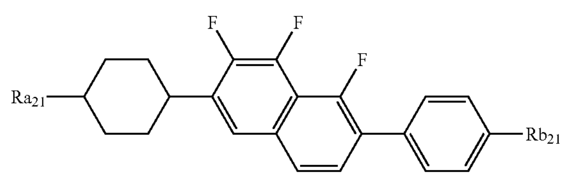
(3-125)
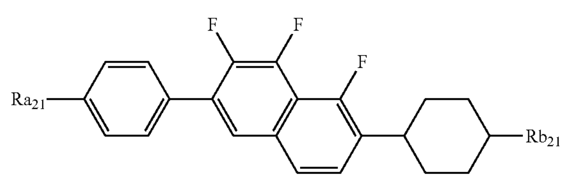
(3-126)
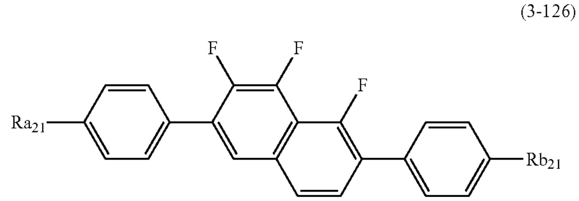

-continued
(3-127)
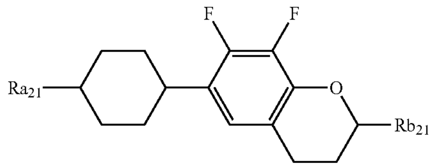
(3-128)
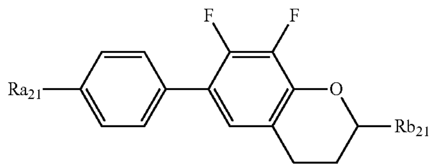
(3-129)
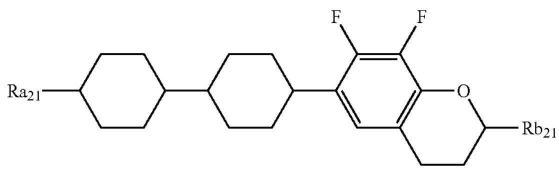
(3-130)
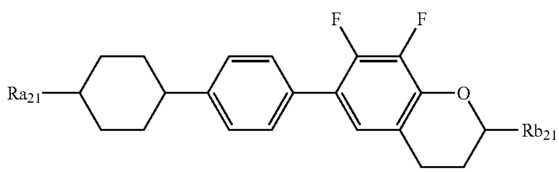
(3-131)
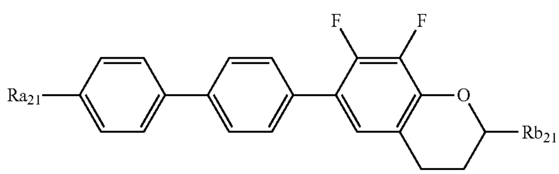
(3-132)
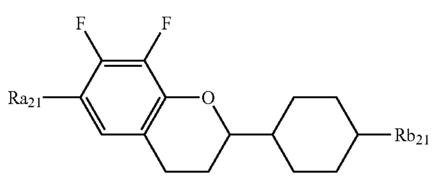
(3-133)
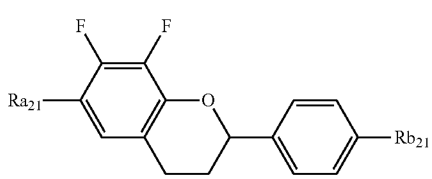
(3-134)
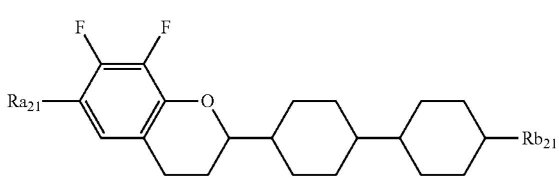
-continued
(3-135)
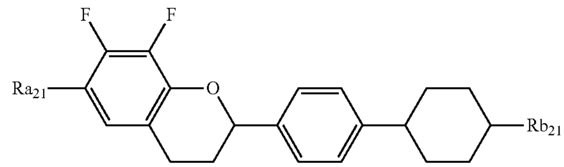
(3-136)
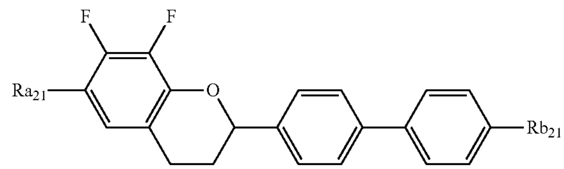
(3-137)
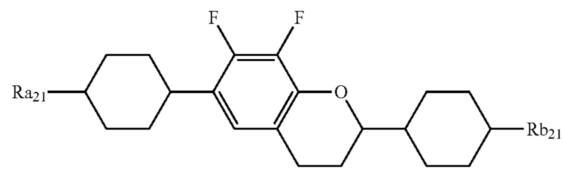
(3-138)
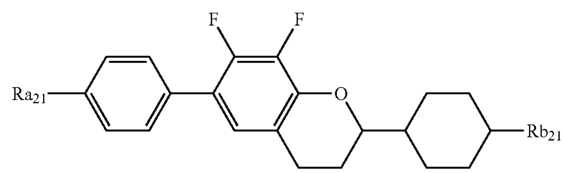
(3-139)
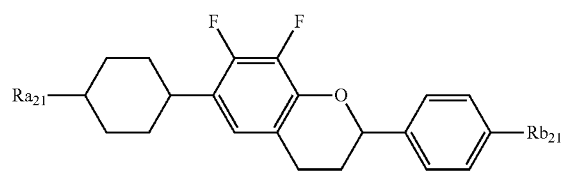
(3-140)
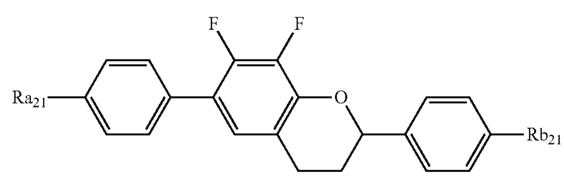
(3-141)
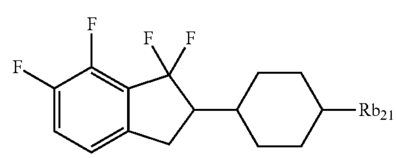
(3-142)
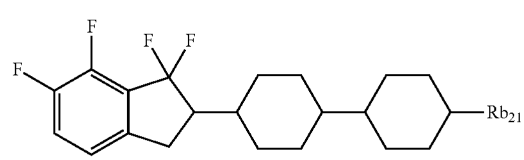

-continued (3-143)

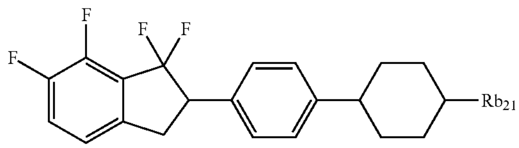

(3-144)

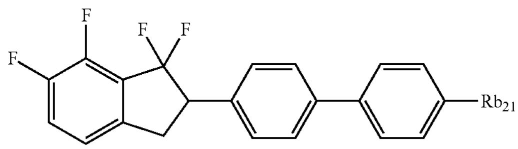

The content of the third component in the liquid crystal composition of the invention is desirable to be increased from the viewpoint that the absolute value of the negative dielectric anisotropy is not decreased.

The contents of the first component, the second component and the third component in the liquid crystal composition of the invention are not especially limited, and it is desirable that the ratio of the liquid crystal compound (a) is in the range of 5 to 60% by weight, the ratio of the second component is in the rang of 20 to 75% by weight, and the ratio of the third component is in the range of 20 to 75% by weight based on the total weight of the liquid crystal composition.

When the contents of the first component, the second component and the third component is within these ranges, the liquid crystal composition has an excellent heat resistance and light resistance, a wide temperature range of a nematic phase, a small viscosity, a high voltage holding ratio, a suitable optical anisotropy, a large dielectric anisotropy and a suitable elastic constant $K_{33}$. These physical properties are suitably balanced in the liquid crystal composition.

Aspects and so Forth of the Liquid Crystal Composition

In the liquid crystal composition of the invention, there is a case that another liquid crystal compound is further added, for example, for the purpose of further adjustment of characteristics in the liquid crystal composition, in addition to liquid crystal compounds of the first component, the second component, and the optional third component which is added as required. In the liquid crystal composition of the invention, there is a case that a liquid crystal compound other than the liquid crystal compound of the first component, the second component, and the optional third component of a liquid crystal compound that is added as required is not added in view of cost reduction, for example.

An additive such as an optically active compound, a coloring matter, an antifoaming agent, an ultraviolet light absorber, an antioxidant, a polymerizable compound and a polymerization initiator may be added to the liquid crystal composition of the invention.

When the optically active compound is added to liquid crystal composition of the invention, it induces a helical structure and gives a twist angle in liquid crystals.

A known chiral dopant is added as an optically active compound. The chiral dopant is effective in inducing a helical structure in liquid crystals, adjusting a necessary twist angle and thus preventing a reverse twist. Examples of the chiral dopant include the following optically active compounds (Op-1) to (Op-13). A desirable ratio of the optically active compound is 5% by weight or less. A more desirable ratio is in the range of 0.01% by weight to 2% by weight.

(Op-1)

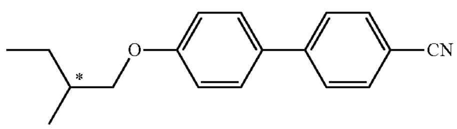

(Op-2)

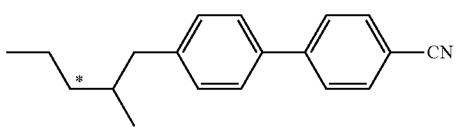

(Op-3)

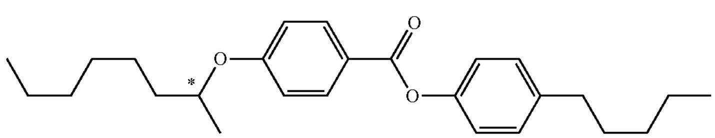

(Op-4)

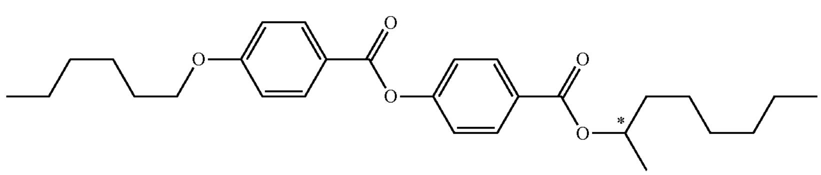

(Op-5)

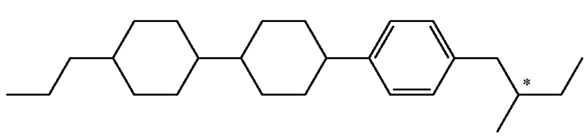

-continued
(Op-6)
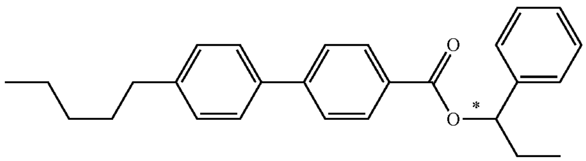
(Op-7)
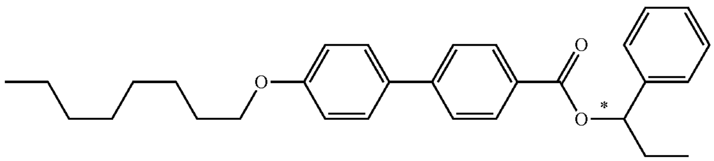
(Op-8)
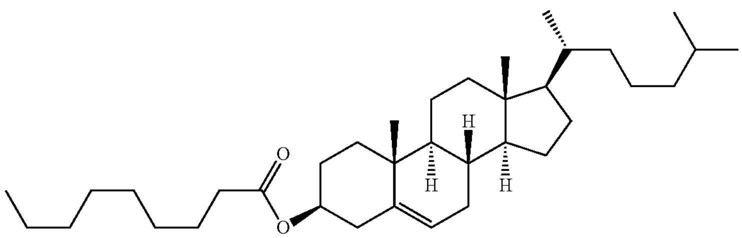
(Op-9)
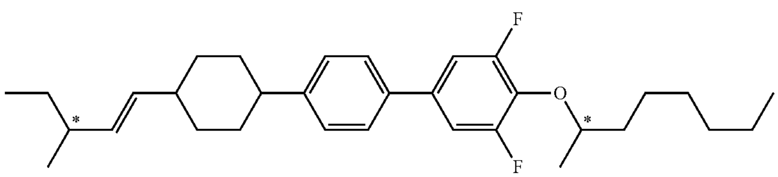
(Op-10)
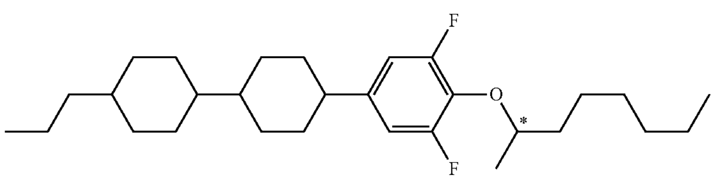
(Op-11)
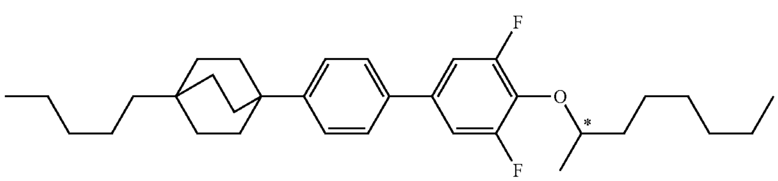
(Op-12)
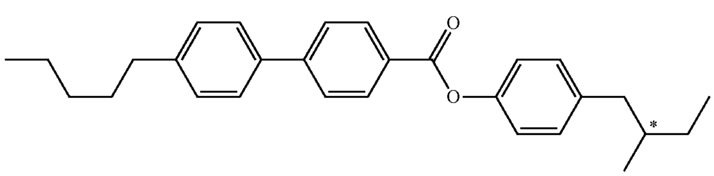
(Op-13)
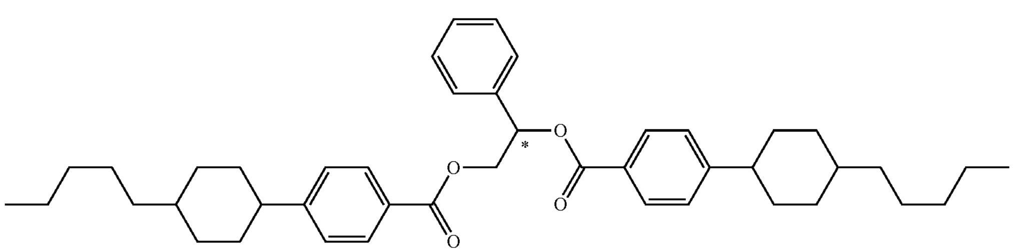

The liquid crystal composition can be applied to a liquid crystal display device having a GH (Guest host) mode, when a coloring matter was added to the liquid crystal composition of the invention.

When an antifoaming agent is added to the liquid crystal composition of the invention, foam formation can be prevented during transportation of the liquid crystal composition, or in the production process of the liquid crystal display device from the liquid crystal composition.

Deterioration of the liquid crystal composition or a liquid crystal display device containing the liquid crystal composition can be prevented when an ultraviolet light absorber or an antioxidant is added to the liquid crystal composition of the invention. For example, the antioxidant can suppress a decrease in the value of the specific resistance when the liquid crystal composition is heated.

The ultraviolet light absorber includes a benzophenone-ultraviolet light absorber, a benzoate-ultraviolet light absorber and a triazole-ultraviolet light absorber.

A specific example of the benzophenone-ultraviolet light absorber is 2-hydroxy-4-n-octoxybenzophenone.

A specific example of the benzoate-ultraviolet light absorber is 2,4-di-t-butylphenyl-3,5-di-t-butyl-4-hydroxybenzoate.

Specific examples of the triazole-ultraviolet light absorber is 2-(2-hydroxy-5-methylphenyl)benzotriazole, 2-[2-hydroxy-3-(3,4,5,6-tetrahydroxyphthalimide-methyl)-5-methylphenyl]benzotriazole and 2-(3-t-butyl-2-hydroxy-5-methylphenyl)-5-chlorobenzotriazole.

The antioxidant includes a phenol-antioxidant and an organosulfur antioxidant.

The antioxidant represented by formula (I) is desirable especially in view of a high effect of preventing oxidation without changing the values of physical properties of the liquid crystal composition.

(I)

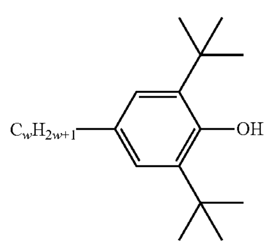

In formula (I), w is an integer from 1 to 15.

In the compound (I), desirable w is 1, 3, 5, 7 or 9. More desirable w is 1 or 7. The compound (I) where w is 1 is effective in preventing a decrease in specific resistance that is caused by heating under air, because it has a large volatility. The compound (I) where w is 7 is effective in maintaining a large voltage holding ratio at room temperature and also at a high temperature even after the device has been used for a long time, because it has a small volatility.

Specific examples of the phenol-antioxidant are 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis(6-t-butyl-3-methylphenol), 2,6-di-t-butyl-4-(2-octadecyloxycarbonyl)ethylphenol and pentaerythritoltetrakis[3-(3,5-di-t-butyl-4-hydroxyphenyl) propionate].

Specific examples of the organosulfur antioxidant are dilauryl-3,3'-thiopropionate, dimyristyl-3,3'-thiopropionate, distearyl-3,3'-thiopropionate, pentaerythritoltetrakis(3-laurylthiopropionate) and 2-mercaptobenzimidazole.

The content of the additive typified by the ultraviolet light absorber, the antioxidant and so forth is in the range that the aim of the invention is not failed and the aim to add the additive is attained.

When the ultraviolet light absorber or the antioxidant is added, for example, the content ratio is usually in the range of 10 ppm to 500 ppm, preferably in the range of 30 to 300 ppm, and more preferably in the range of 40 to 200 ppm based on the total weight of the liquid crystal composition of the invention.

Incidentally, the liquid crystal composition of the invention may include an impurity such as starting materials, side products, solvents used for the reactions or catalysts for the syntheses, which are contaminations in the step for synthesizing each compound that will be included in the liquid crystal composition, in the step for preparing the liquid crystal composition, and so forth.

A polymerizable compound is mixed with the composition for adjusting to a device having a PSA (polymer sustained alignment) mode. Desirable examples of the polymerizable compound include compounds having a polymerizable group, such as acrylates, methacrylates, vinyl, vinyloxy, propenyl ethers, epoxy (oxiranes, oxetanes) and vinyl ketones. Especially desirable examples of the polymerizable compound are acrylate derivatives or methacrylate derivatives. A desirable ratio of the polymerizable compound is 0.05% by weight or more for achieving its effect and is 10% by weight or less for avoiding a poor display. A more desirable ratio is in the range of 0.1% by weight to 2% by weight. The polymerizable compound is polymerized on irradiation with ultraviolet light or the like, preferably in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K.K.), each of which is a photopolymerization initiator, is suitable for radical polymerization. The polymerizable compound includes the photopolymerization initiator preferably in the range of 0.1% by weight to 5% by weight and most preferably in the range of 1% by weight to 3% by weight.

Method for Preparing the Liquid Crystal Composition

When each of component compounds in the liquid crystal composition of the invention is a liquid, for example, the composition can be prepared by mixing and shaking each of the compounds. When solids are included, the composition can be prepared by mixing each compound, and then shaking after the compounds have been heated and liquefied. Moreover, the liquid crystal composition of the invention can also be prepared according to other known methods.

Characteristics of the Liquid Crystal Composition

Since the maximum temperature of a nematic phase can be adjusted to 70° C. or higher and the minimum temperature of the nematic phase can be adjusted to −20° C. or lower in the liquid crystal composition of the invention, the temperature range of the nematic phase is wide. Accordingly, the liquid crystal display device containing this liquid crystal composition can be used in a wide temperature range.

It is desirable that the optical anisotropy in the liquid crystal composition of the invention is to the range of 0.05 to 0.18 by suitably adjusting the formulation or the like. More desirable optical anisotropy is in the range of 0.10 to 0.13.

In the liquid crystal composition of the invention, the liquid crystal composition having the dielectric anisotropy usually in the range of −5.0 to −2.0, preferably in the range of −4.5 to −2.5 can be obtained. The liquid crystal composition having the dielectric anisotropy in the range of −4.5 to −2.5 can suitably be used for a liquid crystal display device operated in an IPS mode, a VA mode or a PSA mode.

The Liquid Crystal Display Device

The liquid crystal composition of the invention can be used not only for the liquid crystal display devices having operating modes such as the PC, TN, STN, OCB and PSA modes which are driven by means of the AM mode, but also for liquid crystal display devices having operating modes such as the PC, TN, STN, OCB, VA and IPS modes which are driven by means of the passive matrix (PM) mode.

The liquid crystal display devices having the AM and PM modes can be applied to any of liquid crystal displays and so forth that have a reflection type, a transmission type, and a semi-transmission type.

Moreover, the liquid crystal composition of the invention can also be used for a dynamic scattering (DS) mode-device containing the liquid crystal composition to which a conducting agent is added, and a nematic curvilinear aligned phase (NCAP) device containing the liquid crystal composition microencapsulated, and a polymer dispersed (PD) device having a three-dimensional network polymer formed in the liquid crystal composition, for example, a polymer network (PN) device.

Since the liquid crystal composition of the invention has the characteristics described above, it can be suitably used for the liquid crystal display device having an AM mode which is driven by means of an operating mode such as the VA, IPS or PSA mode, wherein the liquid crystal composition having negative dielectric anisotropy is used, especially for the liquid crystal display device having the AM mode which is driven by means of the VA mode.

Incidentally, the direction of an electric field is perpendicular to liquid crystal layers in a liquid crystal display device which is driven by means of the TN mode, the VA mode or the like. On the other hand, the direction of an electric field is parallel to liquid crystal layers in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991-010936 A (U.S. Pat. No. 5,576,867).

EXAMPLES

Examples of the Liquid Crystal Compound (a)

The invention will be explained below in more detail. However, the invention is not limited to the examples. The term "%" means "% by weight," unless otherwise noted.

Analytical methods will be explained first, since the resulting compounds herein were identified on the basis of nuclear magnetic resonance spectra obtained by means of $^{1}$H-NMR analysis, gas chromatograms obtained by means of gas chromatography (GC) analysis and so forth.

$^{1}$H-NMR Analysis

A model DRX-500 apparatus (made by Bruker BioSpin Corporation) was used for measurement. Samples prepared in the examples and so forth were dissolved in deuterated solvents such as $CDCl_3$ in which the samples were soluble, and the measurement was carried out under the conditions of room temperature, thirty-two times of accumulation and 500 MHz. In the explanation of the nuclear magnetic resonance spectra obtained, the symbols s, d, t, q, quin, sex, m and br stand for a singlet, a doublet, a triplet, a quartet, a quintet, a sextet, a multiplet and line-broadening, respectively. Tetramethylsilane (TMS) was used as the standard reference material for the zero point of the chemical shift (δ values).

GC Analysis

A Gas Chromatograph Model GC-14B made by Shimadzu Corporation was used for measurement. A capillary column CBP1-M25-025 (length 25 m, bore 0.22 mm, film thickness 0.25 micrometer; dimethylpolysiloxane as a stationary liquid phase; non-polar) made by Shimadzu Corporation was used. Helium was used as a carrier gas, and its flow rate was adjusted to 1 ml per minute. The temperature of the sample injector was set at 280° C. and the temperature of the detector (FID) was set at 300° C.

A sample was dissolved in toluene to give a 1% by weight solution, and then 1 microliter of the solution obtained was injected into the sample injector.

Chromatopac Model C-R6A made by Shimadzu Corporation or its equivalent was used as a recorder. The obtained gas chromatogram showed the retention time of the peaks and the values of the peak areas corresponding to the component compounds.

Chloroform or hexane, for example, may also be used as a solvent for diluting the sample. The following capillary columns may also be used: DB-1 (length 30 m, bore 0.32 mm, film thickness 0.25 micrometer) made by Agilent Technologies Inc., HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd, and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds as components. An internal standard method using gas chromatograms is used in order to determine the composition ratio of the liquid crystal compounds in the liquid crystal composition more accurately by means of the gas chromatograms. Each liquid crystal compound (test-component) weighed accurately in a fixed amount and a liquid crystal compound serving as a standard (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction method based on the relative intensity of the peak area of each component to that of the standard reference material.

Samples for Measurement of Physical Property Values in Liquid Crystal Compounds and so Forth Two kinds of samples are used for measuring physical property values of a liquid crystal compound: one is the compound itself, and the other is a mixture of the compound and mother liquid crystals.

In the latter case using a sample in which the compound is mixed with mother liquid crystals, the measurement is carried out according to the following method. First, the sample is prepared by mixing 15% by weight of the liquid crystal compound obtained and 85% by weight of the mother liquid crystals. Then, extrapolated values are calculated from the measured values of the resulting sample by means of an extrapolation method based on the following formula. The extrapolated values are regarded as physical property values of this compound.

(Extrapolated value)=[100×(Measured value of sample)−(% by weight of mother liquid crystals)×(Measured value of mother liquid crystals)]/(% by weight of liquid crystal compound)

When a smectic phase or crystals deposits even at this ratio of the compound to the mother liquid crystals at 25° C., the ratio of the liquid crystal compound to the mother liquid crystals is changed in the order of (10% by weight: 90% by weight), (5% by weight: 95% by weight) and (1% by weight: 99% by weight). Physical property values of the sample are measured at the ratio in which the smectic phase or the crystals did not deposit at 25° C. Extrapolated values are determined according to the above equation, and regards as physical property values of the liquid crystal compound.

There are a variety of mother liquid crystals used for measurement and, for example, the formulation of the mother liquid crystals (i) is shown below.

The mother liquid crystals (i)

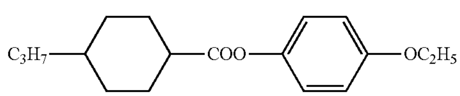

17.2%

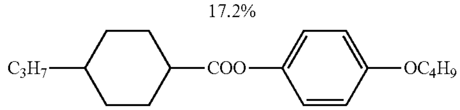

27.6%

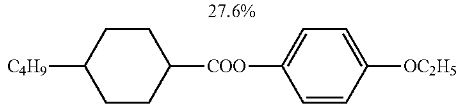

20.7%

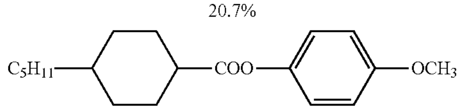

20.7%

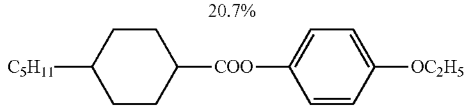

13.8%

Incidentally, in the case where physical property values of a liquid crystal composition were measured, the composition itself was used as a sample.

Methods for Measurement of Physical Property Values of a Liquid Crystal Compound and so Forth Physical property values were measured according to the following methods. Most of the measurement methods are those described in the Standard of Electronic Industries Association of Japan, EIAJ•ED-2521A, or those with some modifications. No TFT was attached to a TN device or a VA device used for measurement.

Among measured values, the values obtained from a liquid crystal compound itself as a sample and the values obtained form a liquid crystal compound composition itself as a sample, were described here as experimental data. When a sample was prepared by mixing the compound with mother liquid crystals, the values calculated from a measured value according to the extrapolation method were described here as extrapolated values.

Phase Structure and Transition Temperature (° C.)

Measurements were carried out according to the following methods (1) and (2).

(1) A compound was placed on a hot plate of a melting point apparatus (Hot Stage Model FP-52 made by Mettler Toledo International Inc.) equipped with a polarizing microscope, and the phase conditions and their changes were observed with the polarizing microscope while the compound was heated at the rate of 3° C. per minute, and the kinds of liquid crystal phases were specified.

(2) A sample was heated and then cooled at a rate of 3° C. per minute using a Perkin-Elmer differential scanning calorimeter, a DSC-7 System or a Diamond DSC System. The starting point of an endothermic peak or an exothermic peak caused by a phase change of the sample was obtained by means of the extrapolation, and thus the phase transition temperature was determined.

Hereinafter, the symbol C stood for crystals, which were expressed by $C_1$ or $C_2$ when the kinds of the crystals were distinguishable. The symbols S and N stood for a smectic phase and a nematic phase, respectively. The symbol I stood for a liquid (isotropic). When a smectic B phase and a smectic A phase were distinguishable in the smectic phases, they were expressed as SB and $S_A$, respectively. Phase transition temperatures were expressed, for example, as "C 50.0 N 100.0 I", which means that the phase transition temperature from crystals to a nematic phase (CN) is 50.0° C., and the phase transition temperature from the nematic phase to a liquid (NI) is 100.0° C. The same applied to the other descriptions.

Maximum Temperature of a Nematic Phase ($T_{NI}$; ° C.)

A sample (a liquid crystal composition, or a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature of a nematic phase meant a temperature measured when part of the sample began to change from a nematic phase to an isotropic liquid. Hereinafter, the maximum temperature of a nematic phase may simply be abbreviated to "maximum temperature."

Compatibility at Low Temperature

Samples were prepared by mixing a liquid crystal compound with mother liquid crystals so that the amount of the liquid crystal compound became 20% by weight, 15% by weight, 10% by weight, 5% by weight, 3% by weight and 1% by weight, and placed in glass vials. After these glass vials had been kept in a freezer at −10° C. or −20° C. for a certain period of time, they were observed as to whether or not crystals or a smectic phase had been deposited.

Viscosity (η; measured at 20° C.; mPa·s)

An E-type viscometer was used for measurement.

Rotational Viscosity (γ1; measured at 25° C.; mPa·s)

Measurement was carried out according to the method described in M. Imai, et al., Molecular Crystals and Liquid Crystals, vol. 259, p. 37 (1995). A sample (a liquid crystal composition, or a mixture of a liquid crystal compound and mother liquid crystals) was put in a VA device in which the distance between two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. Incidentally, the value of the dielectric anisotropy necessary for the present calculation was obtained by the method described below, under the heading "Dielectric Anisotropy."

Optical Anisotropy (Refractive Index Anisotropy; Δn; Measured at 25° C.)

Measurement was carried out using an Abbe refractometer with a polarizing plate attached to the ocular, on irradiation with light at a wavelength of 589 nanometers at 25° C. The surface of the main prism was rubbed in one direction, and then a sample (a liquid crystal composition, or a mixture of a liquid crystal compound and mother liquid crystals) was dropped onto the main prism. A refractive index (n||) was measured when the direction of the polarized light was parallel to that of the rubbing. A refractive index (n⊥) was measured when the direction of polarized light was perpendicular to that of the rubbing. The value of the refractive index anisotropy (Δn) was calculated from the equation: $\Delta n = n_{\|} - n_{\perp}$.

Dielectric Anisotropy (Δ∈; measured at 25° C.)

Dielectric anisotropy was measured by the following method.

An ethanol (20 mL) solution of octadecyltriethoxysilane (0.16 mL) was applied to a well-washed glass substrate. The glass substrate was rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film formed on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈||) in the major axis direction of the liquid crystal molecules was measured.

The sample (the liquid crystal composition, or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured.

The value of the dielectric anisotropy was calculated from the equation of $\Delta\epsilon = \epsilon_{\|} - \epsilon_{\perp}$.

Voltage Holding Ratio (VHR; Measured at 25° C.; %)

A TN device used for measurement had a polyimide-alignment film and the distance between two glass substrates (cell gap) was 6 micrometers. A sample (a liquid crystal composition, or a mixture of a liquid crystal compound and mother liquid crystals) was put in the device, and then the device was sealed with an adhesive polymerizable on irradiation with ultraviolet light. The TN device was charged by applying pulse voltage (60 microseconds at 5 V). Decreasing voltage was measured for 16.7 milliseconds with a High Speed Voltmeter, and the area A between a voltage curve and a horizontal axis in a unit period was measured. The area B was an area without the decrease. The voltage holding ratio was the percentage of the area A to the area B.

Elastic Constant ($K_{11}$ and $K_{33}$; measured at 25° C.)

An elastic constant measurement system Model EC-1 made by Toyo Corporation was used for measurement. A sample was put in a homeotropic cell in which the distance between two glass substrates (cell gap) was 20 micrometers. An electric charge of 20 volts to 0 volts was applied to the cell, and electrostatic capacity and applied voltage were measured. The measured values of the electrostatic capacity (C) and the applied voltage (V) were fitted to equation (2.98) and equation (2.101) in page 75 of the "Liquid Crystal Device Handbook" (Ekisho Debaisu Handobukku, in Japanese; The Nikkan Kogyo Shimbun, Ltd.) and the value of the elastic constant was obtained from equation (2.100).

Example 1

Preparation of 4-ethoxy-2,3-difluoro-4'-[4-butoxy-2,3-difluorophenyl-(trans-4-cyclohexylethyl)]-1,1'-biphenyl (No. 647)

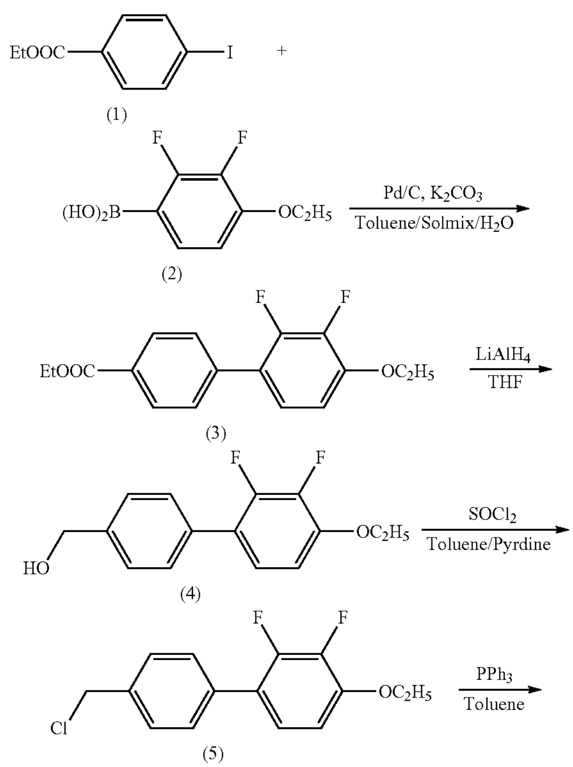

-continued

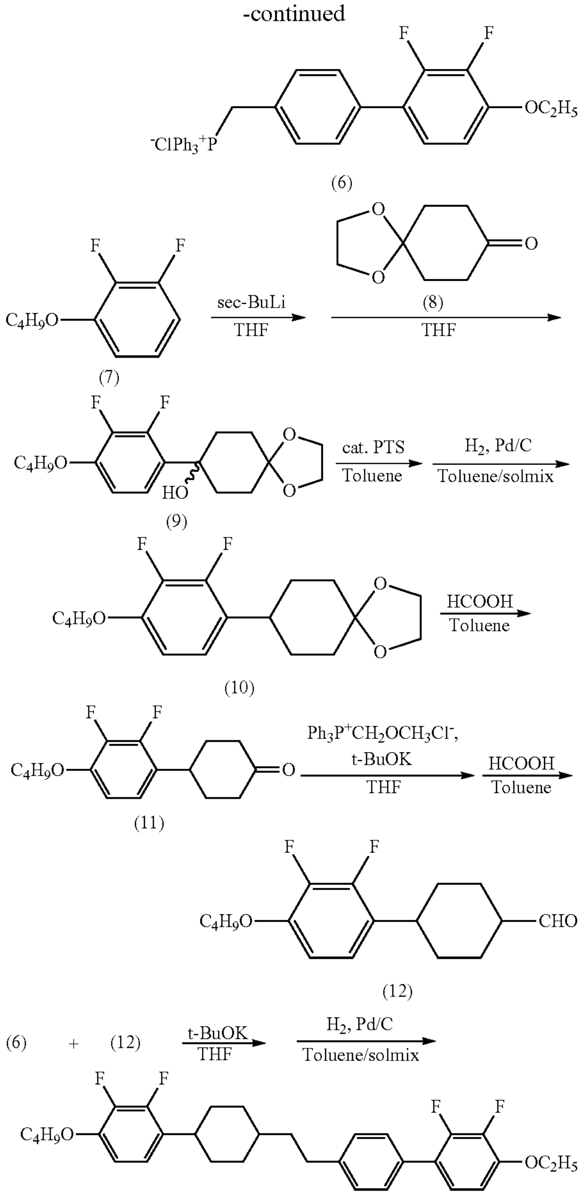

(NO. 647)

First Step

Ethyl 4-iodobenzoate (1) (25.0 g), 4-ethoxy-2,3-difluorophenylboronic acid (2) (20.1 g), potassium carbonate (25.0 g), Pd/C (0.25 g), toluene (100 ml), ethanol (100 ml) and water (100 ml) were added to a reaction vessel under an atmosphere of nitrogen, and heated to reflux for 2 hours. After the reaction solution had been cooled to 25° C., it was poured into water (500 ml) and toluene (500 ml), and mixed with them. The mixture was then allowed to stand until it had separated into two phases of organic and aqueous phases, and the extraction into an organic phase was carried out. The resulting organic phase was separated, and washed with water, and then dried over anhydrous magnesium sulfate. The solution was concentrated under reduced pressure, and the resulting residue was purified by column chromatography using silica gel as a stationary phase powder and toluene as an eluent. The product was further purified by recrystallization from ethanol and dried to give ethyl 4-ethoxy-2,3-difluoro-4'-biphenylbenzoate (3) (18.8 g). The yield based on the compound (1) was 67.9%.

Second Step

Lithium aluminum hydride (1.4 g) was suspended in THF (100 ml). The compound (3) (18.8 g) was added dropwise to the suspension in the temperature range of −20° C. to −10° C., and the stirring was continued in this temperature range for another 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The resulting organic phase was separated, and washed successively with water and brine, and then dried over anhydrous magnesium sulfate. The product was further purified by recrystallization from heptane and concentrated under reduced pressure to give (4-ethoxy-2,3-difluoro-4'-biphenyl)methanol (4) (12.0 g). The yield based on the compound (3) was 74.0%.

Third Step

The compound (4) (12.0 g), toluene (50 ml) and pyridine (0.12 ml) were added to a reaction vessel under an atmosphere of nitrogen, and heated at 45° C. for 1 hour. Then, thionyl chloride (3.6 ml) was added and heated to reflux in the temperature range of 45° C. to 55° C. for 2 hours. After the reaction solution had been cooled to 25° C., it was poured into water (200 ml) and toluene (200 ml), and mixed with them. The mixture was then allowed to stand until it had separated into two phases of organic and aqueous phases, and the extraction into an organic phase was carried out. The resulting organic phase was separated, and washed successively with a saturated aqueous solution of sodium hydrogencarbonate twice and water three times, and then dried over anhydrous magnesium sulfate. The resulting solution was concentrated under reduced pressure and the resulting residue was purified with a fractional operation by means of column chromatography using silica gel as a stationary phase powder and a mixed solvent of toluene/heptane (1/1 by volume) as an eluent. The product was further purified by recrystallization from Solmix A-11 and dried to give 4'-chloromethyl-4-ethoxy-2,3-difluoro-biphenyl (5) (9.4 g). The yield based on the compound (4) was 73.2%.

Fourth Step

The compound (5) (9.4 g), toluene (100 ml) and triphenylphosphine (17.4 g) were added to a reaction vessel under an atmosphere of nitrogen, and heated to reflux for 1 hours. After the reaction solution had been cooled to 25° C., deposits were filtered and washed with toluene three times, washing away the unreacted starting material. The resulting colorless solids were dried to leave 4'-(4-ethoxy-2,3-difluoro-1,1'-biphenyl)methyltriphenylphosphonium chloride (6) (9.0 g). The yield based on the compound (5) was 95.7%.

Fifth Step

3-Butoxy-1,2-difluorobenzene (7) (30.0 g) and THF (500 ml) were added to a reaction vessel under an atmosphere of nitrogen, and cooled to −74° C. n-Butyllithium (1.66 M in n-hexane solution; 120 ml) was added dropwise in the temperature range of −74° C. to −70° C. and the stirring was continued for another 2 hours. Successively, 1,4-dioxaspiro[4.5]decan-8-one (8) (30.2 g) in THF (200 ml) solution was added dropwise in the temperature range of −75° C. to −70° C., and the stirring was continued for another 8 hours while the mixture was allowed to come to 25° C. The resulting reaction mixture was poured into a 1N—HCl aqueous solution (500 ml) and ethyl acetate (500 ml) in a vessel and mixed with them. The mixture was then allowed to stand until it had separated into organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure to leave 8-(4-butoxy-2,3-difluorophenyl)-1,4-dioxaspiro[4.5]decan-8-ol (9) (55.0 g). The resulting compound (9) was a pale yellow oil.

Sixth Step

The compound (9) (55.0 g), p-toluenesulfonic acid (1.8 g) and toluene (300 ml) were mixed and the mixture was heated to reflux for 2 hours, while distilled water was removed. After the reaction mixture had been cooled to 30° C., water (500 ml) and toluene (900 ml) were added to the mixture and mixed with it. The mixture was then allowed to stand until it had separated into two phases of organic and aqueous phases, and the extraction into an organic phase was carried out. The resulting organic phase was separated, and washed successively with a saturated aqueous solution of sodium hydrogencarbonate and water, and then dried over anhydrous magnesium sulfate. The resulting solution was purified with a fractional operation by means of column chromatography using silica gel as a stationary phase powder and toluene as an eluent. The product was dissolved in a mixed solvent of toluene (150 ml) and Solmix A-11 (150 ml), and palladium on carbon (3.0 g) was added and then the mixture was stirred at room temperature under an atmosphere of hydrogen until hydrogen absorption had ceased. After the completion of the reaction, palladium on carbon was removed and the solvent was distilled off. The resulting residue was purified with a fractional operation by means of column chromatography using silica gel as a stationary phase powder and heptane as an eluent. The product was further purified by recrystallization from Solmix A-11 to give 8-(4-butoxy-2,3-difluorophenyl)-1,4-dioxaspiro[4.5]decane (10) (47.8 g). The yield based on the compound (9) was 84.0%.

Seventh Step

The compound (10) (47.8 g), formic acid (87%; 67.0 ml) and toluene (200 ml) were mixed, and the mixture was heated to reflux for 2 hours. After the reaction mixture had been cooled to 30° C., water (500 ml) and toluene (1,000 ml) were added to the mixture and mixed with it. The mixture was then allowed to stand until it had separated into two phases of organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure and the resulting residue was purified with a fractional operation by means of column chromatography using silica gel as a stationary phase powder and toluene as an eluent. The product was further purified by recrystallization from heptane to give 1-(4-butoxy-2,3-difluorophenyl)-cyclohexan-4-one (11) (40.4 g). The yield based on the compound (10) was 97.8%.

Eight Step

Well-dried methoxymethyltriphenylphosphonium chloride (40.8 g) and THF (200 ml) were mixed under an atmosphere of nitrogen, and cooled to −30° C. Potassium t-butoxide (t-BuOK) (13.4 g) was then added in two portions in the temperature range of −30° C. to −20° C. After the stirring had been continued for another 30 minutes at −20° C., the compound (11) (28.0 g) dissolved in THF (100 ml) was added dropwise in the temperature range of −30 to −20° C. After the stirring had been continued for another 30 minutes at −10° C., the reaction solution was poured into a mixture of water (200 ml) and toluene (200 ml), and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate.

The resulting solution was concentrated under reduced pressure and the resulting residue was purified with a fractional operation by means of column chromatography using silica gel as a stationary phase powder and toluene as an eluent. The resulting eluent was concentrated under reduced pressure to give 1-(4-butoxy-2,3-difluorophenyl)-4-methoxymethylenecyclohexane. Then, formic acid (87%; 45.5 g) and toluene (200 ml) were mixed and the mixture was heated to reflux for 2 hours. After the reaction mixture had been cooled to 30° C., water (100 ml) and toluene (200 ml) were added to the mixture and mixed with it. The mixture was then allowed to stand until it had separated into two phases of organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure to leave pale yellow solids. The residue was dissolved in toluene (50 ml) and added to a mixture cooled to 7° C. of sodium hydroxide (95%; 0.5 g) and methanol (200 ml) and the stirring was continued at 10° C. for another 2 hours. A 2N-aqueous solution of sodium hydroxide (100 ml) was then added, and the stirring was continued at 5° C. for another 2 hours. The resulting reaction solution was poured into a mixture of water (500 ml) and toluene (500 ml) and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The solvent was then distilled off under reduced pressure and the resulting residue was purified with a fractional operation by means of column chromatography using silica gel as a stationary phase powder and toluene as an eluent, and dried to give trans-4-(4-butoxy-2,3-difluorophenyl)-cyclohexanecarboaldehyde (12) (28.8 g). The yield based on the compound (11) was 98.3%.

Ninth Step

Well-dried 4'-(4-ethoxy-2,3-difluoro-1,1'-biphenyl)methyltriphenylphosphonium chloride (6) (15.0 g) and THF (100 ml) were mixed under an atmosphere of nitrogen, and cooled to −10° C. Then, potassium t-butoxide (t-BuOK) (3.1 g) was then added in two portions in the temperature range of −10° C. to −5° C. After the stirring had been continued at −10° C. for another 60 minutes, the compound (12) (8.1 g) dissolved in THF (30 ml) was added dropwise in the temperature range of −10 to −5° C. After the stirring had been continued at 0° C. for another 30 minutes, the reaction solution was poured into a mixture of water (100 ml) and toluene (50 ml) and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The resulting solution was concentrated under reduced pressure and the resulting residue was purified with a fractional operation by means of column chromatography using silica gel as a stationary phase powder and toluene as an eluent, and the eluent was concentrated under reduced pressure. The product was dissolved in a mixed solvent of toluene (150 ml) and Solmix A-11 (150 ml), and palladium on carbon (3.0 g) was added and then the mixture was stirred at room temperature under an atmosphere of hydrogen until hydrogen absorption had ceased. After the completion of the reaction, palladium on carbon was removed and the solvent was distilled off. The resulting residue was purified by recrystallization from a mixed solvent of ethyl acetate and Solmix A-11 (ethyl acetate:Solmix=1:4 by volume) to give 4-ethoxy-2,3-difluoro-4'-[4-butoxy-2,3-difluorophenyl-(trans-4-cyclohexylethyl)]-1,1'-biphenyl (No. 647) (8.35 g). The yield based on the compound (12) was 57.8%.

The chemical shift (δ, ppm) in $^{1}$H-NMR analysis was described below, and the compound obtained was identified as 4-ethoxy-2,3-difluoro-4'-[4-butoxy-2,3-difluorophenyl-(trans-4-cyclohexylethyl)]-1,1'-biphenyl (No. 647). The solvent for measurement was $CDCl_3$.

Chemical shift δ (ppm); 7.43 (dd, 2H), 7.26 (d, 2H), 7.09 (td, 1H), 6.83 (td, 1H), 6.79 (td, 1H), 6.66 (td, 1H), 4.14 (q, 2H), 4.00 (q, 2H), 2.77 (tt, 1H), 2.69 (t, 2H), 1.98-1.91 (m, 2H), 1.90-1.83 (m, 2H), 1.78 (quin, 2H), 1.63-1.56 (m, 2H), 1.55-1.32 (m, 8H), 1.20-1.10 (m, 2H) and 0.98 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 647) were as follows.

Transition temperature: C 74.2 $S_A$ 130.9 N 224.4 I.

$T_{NI}$=196.6° C.; Δ∈=−9.24; and Δn=0.200.

Example 2

Preparation of 4-butoxy-2,3-difluoro-4'-biphenoxymethyl-trans-4-(4-ethoxy-2,3-difluorophenyl) cyclohexane (No. 1539)

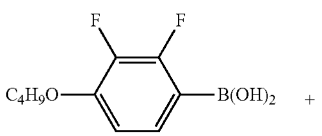

(13)

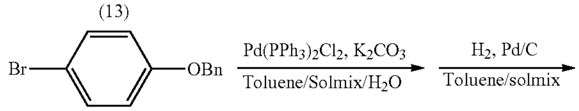

(14)

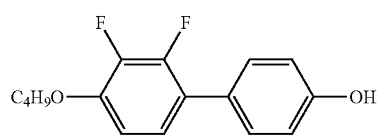

(15)

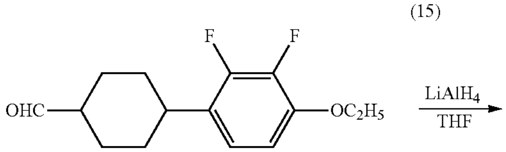

(16)

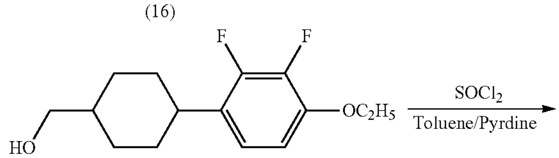

(17)

-continued

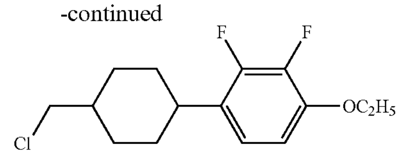

(18)

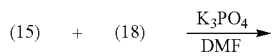

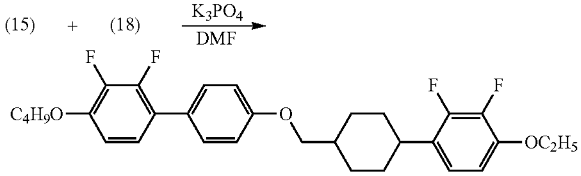

(NO. 1539)

First Step

4-Bromobenzoxybenzene (14) (5.0 g), 4-butoxy-2,3-difluorophenylboronic acid (13) (4.8 g), potassium carbonate (13.1 g), $Pd(Ph_3P)_2Cl_2$ (0.4 g), toluene (100 ml), Solmix A-11 (100 ml) and water (100 ml) were added to a reaction vessel under an atmosphere of nitrogen, and heated to reflux for 2 hours. After the reaction solution had been cooled to 25° C., it was poured into water (200 ml) and toluene (200 ml), and mixed with them. The mixture was then allowed to stand until it had separated into two phases of organic and aqueous phases, and the extraction into an organic phase was carried out. The resulting organic phase was separated, and washed with water and then dried over anhydrous magnesium sulfate. The solution was concentrated under reduced pressure, and the resulting residue was purified by column chromatography using silica gel as a stationary phase powder and toluene as an eluent. Palladium on carbon (3.0 g) was added and then the mixture was stirred at room temperature under an atmosphere of hydrogen until hydrogen absorption had ceased. After the completion of the reaction, palladium on carbon was removed and the solvent was distilled off. The resulting residue was purified by recrystallization from a mixed solvent of ethyl acetate and Solmix A-11 (ethyl acetate:Solmix=1:4 by volume) to give 4'-butoxy-2',3'-difluoro-1,1'-hydroxyphenol (15) (44.7 g). The yield based on the compound (14) was 90.8%.

Second Step

Lithium aluminum hydride (4.2 g) was suspended in THF (300 ml). trans-4-(4-Ethoxy-2,3-difluorophenyl)-cyclohexanecarboaldehyde (16) (50.0 g) was added dropwise to the suspension in the temperature range of −20° C. to −10° C., and the stirring was continued in this temperature range for another 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The resulting organic phase was separated, and washed successively with water and brine, and then dried over anhydrous magnesium sulfate. The product was further purified by recrystallization from heptane and concentrated under reduced pressure to give trans-4-(4-ethoxy-2,3-difluoro)-hydroxymethylcyclohexane (17) (47.6 g). The yield based on the compound (16) was 94.5%.

Third Step

The compound (17) (47.6 g), toluene (300 ml) and pyridine (0.5 ml) were added to a reaction vessel under an atmosphere of nitrogen, and the stirring was continued at 45° C. for another 1 hour. Thionyl chloride (14.0 ml) was then added in the temperature range of 45° C. to 55° C., and the mixture was heated to reflux for 2 hours. After the reaction solution had been cooled to 25° C., it was poured into water (300 ml) and toluene (300 ml), and mixed with them. The mixture was then allowed to stand until it had separated into two phases of organic and aqueous phases, and the extraction into an organic phase was carried out. The resulting organic phase was separated, and washed successively with a saturated aqueous solution of sodium hydrogencarbonate twice and water three times, and then dried over anhydrous magnesium sulfate. The resulting solution was concentrated under reduced pressure and the resulting residue was purified with a fractional operation by means of column chromatography using silica gel as a stationary phase powder and a mixed solvent of toluene/heptane (1/1 by volume) as an eluent. The product was further purified by recrystallization from Solmix A-11 to give 4-chloromethyl-(4-ethoxy-2,3-difluorophenyl)-cyclohexane (18) (47.6 g). The yield based on the compound (17) was 93.6%.

Fourth Step

4'-Butoxy-2',3'-difluoro-1,1'-hydroxyphenol (15) (2.0 g) and tripotassium phosphate ($K_3PO_4$) (3.2 g) were added to DMF (100 ml) under an atmosphere of nitrogen, and the mixture was stirred at 70° C. The compound (18) (1.7 g) was added to the mixture and the stirring was continued at 70° C. for another 7 hours. The resulting reaction mixture was cooled to 30° C., solids were filtered off, and then toluene (100 ml) and water (100 ml) were added to the filtrate and mixed with them. The mixture was then allowed to stand until it had separated into two phases of organic and aqueous phases, and the extraction into an organic phase was carried out. The resulting organic phase was separated, and washed with brine, and then dried over anhydrous magnesium sulfate. The solvent was then distilled off under reduced pressure and the resulting residue was purified with a fractional operation by means of column chromatography using silica gel as a stationary phase powder and a mixed solvent of heptane and toluene (heptane:toluene=1:2 by volume) as an eluent. The product was further purified by recrystallization from a mixed solvent of Solmix A-11 and heptane (Solmix A-11:heptane=1:2 by volume) to give 4-butoxy-2,3-difluoro-4'-[4-ethoxy-2,3-difluorophenyl-(trans-4-cyclohexyl)phenoxymethyl]-1,1'-biphenyl (No. 1539) 2.0 g). The yield based on the compound (18) was 63.9%.

The chemical shift (δ, ppm) in $^1$H-NMR analysis was described below, and the compound obtained was identified as 4-butoxy-2,3-difluoro-4'-[4-ethoxy-2,3-difluorophenyl-(trans-4-cyclohexyl)phenoxymethyl]-1,1'-biphenyl (No. 1539). The solvent for measurement was $CDCl_3$.

Chemical shift δ (ppm); 7.43 (d, 2H), 7.06 (td, 1H), 6.97 (d, 2H), 6.87 (td, 1H), 6.78 (td, 1H), 6.69 (td, 1H), 4.12 (t, 2H), 4.08 (q, 2H), 3.85 (d, 2H), 2.82 (tt, 1H), 2.10-2.02 (m, 2H), 1.98-1.79 (m, 5H), 1.56-1.48 (m, 4H), 1.45 (t, 3H), 1.34-1.23 (m, 2H) and 1.00 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 1539) were as follows.

Transition temperature: C 113.8 $S_A$ 143.4 N 224.1 I.

$T_{NI}$=202.6° C.; Δ∈=−8.83; and Δn=0.201.

Example 3

Preparation of trans-4-(trans-4-(4-butoxy-2,3-difluorophenyl)-cyclohexylethyl)-4-ethoxy-2,3-difluorophenylcyclohexane (No. 467)

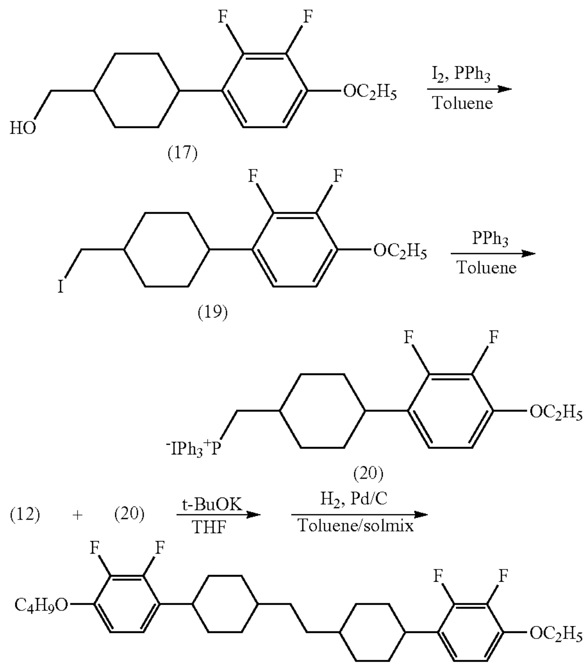

(NO. 467)

First Step

The compound (17) (30.0 g), imidazole (9.8 g) and triphenylphosphine (Ph3P) (37.8 g) were added to toluene (200 ml) under an atmosphere of nitrogen and the mixture was stirred at 5° C. Iodine (33.8 g) was added to the mixture in five times in the temperature range of 5 to 10° C. and the stirring was continued for another 3 hours, and then the completion of the reaction had been confirmed by means of GC analysis. Deposits were filtered off from the resulting reaction mixture and the solvent was distilled from the filtrate under reduced pressure. The resulting residue was purified with a fractional operation by means of column chromatography using silica gel as a stationary phase powder and heptane as an eluent, and dried to give trans-4-iodomethyl-(4-ethoxy-2,3-difluorophenyl)-cyclohexane (19) (24.7 g). The yield based on the compound (17) was 58.5%.

Incidentally, the compound (19) can be prepared by the method described in WO 2006-093102 A, for instance.

Second Step

The compound (19) (10.0 g), toluene (100 ml) and triphenylphosphine (13.8 g) were added to a reaction vessel under an atmosphere of nitrogen, and heated to reflux for 5 hours. After the reaction solution had been cooled to 25° C., deposits were filtered and washed with toluene three times, washing away the unreacted starting material. The resulting colorless solids were dried to leave trans-4-(4-ethoxy-2,3-difluoro)cyclohexylmethyltriphenylphosphonium iodide (20) (9.0 g). The yield based on the compound (19) was 84.6%.

Third Step

Well-dried trans-4-(4-ethoxy-2,3-difluoro)cyclohexylmethyltriphenylphosphonium iodide (20) (7.1 g) and THF (100 ml) were mixed under an atmosphere of nitrogen, and cooled to −10° C. Potassium t-butoxide (t-BuOK) (1.2 g) was the added in two portions in the temperature range of −10° C. to −5° C. After the stirring had been continued at −10° C. for another 60 minutes, the compound (12) (3.0 g) dissolved in THF (30 ml) was added dropwise in the temperature range of −10 to −5° C. The stirring was continued at 0° C. for another 30 minutes, the reaction solution was poured into a mixture of water (100 ml) and toluene (50 ml) and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The resulting solution was concentrated under reduced pressure and the resulting residue was purified with a fractional operation by means of column chromatography using silica gel as a stationary phase powder and toluene as an eluent, and the eluent was concentrated under reduced pressure. The residue was dissolved in a mixed solvent of toluene (150 ml) and Solmix A-11 (150 ml), and palladium on carbon (0.3 g) was added and then the mixture was stirred at room temperature under an atmosphere of hydrogen until hydrogen absorption had ceased. After the completion of the reaction, palladium on carbon was removed and the solvent was distilled off. The resulting residue was purified by recrystallization from a mixed solvent of ethyl acetate and Solmix A-11 (ethyl acetate:Solmix=1:4 by volume) to give trans-4-[trans-4-(2,3-difluoro-4-butoxyphenyl)-cyclohexylethyl]-2,3-difluoroethoxyphenylcyclohexane (No. 467) (2.5 g). The yield based on the compound (12) was 45.4%.

The chemical shift (δ, ppm) in $^{1}$H-NMR analysis was described below, and the compound obtained was identified as trans-4-[trans-4-(2,3-difluoro-4-butoxyphenyl)-cyclohexylethyl]-2,3-difluoroethoxyphenylcyclohexane (No. 467). The solvent for measurement was $CDCl_3$.

Chemical shift δ (ppm); 6.84 (td, 2H), 6.67 (td, 2H), 4.09 (q, 2H), 4.01 (t, 2H), 2.74 (tt, 2H), 1.86 (m, 8H), 1.78 (quin, 2H), 1.54-1.38 (m, 9H), 1.30-1.20 (m, 6H), 1.14-1.02 (m, 4H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 467) were as follows.

Transition temperature: C 99.4 $S_B$ 116.7 $S_A$ 124.3 N 237.5 I.

$T_{NI}$=200.6° C.; Δ∈=−7.52; and Δn=0.127.

Example 4

Preparation of trans-4'-(4-ethoxy-2,3-difluorophenyl)phenoxymethyl-trans-4-(4-butoxy-2,3-difluorophenyl)bicyclohexyl (No. 3677)

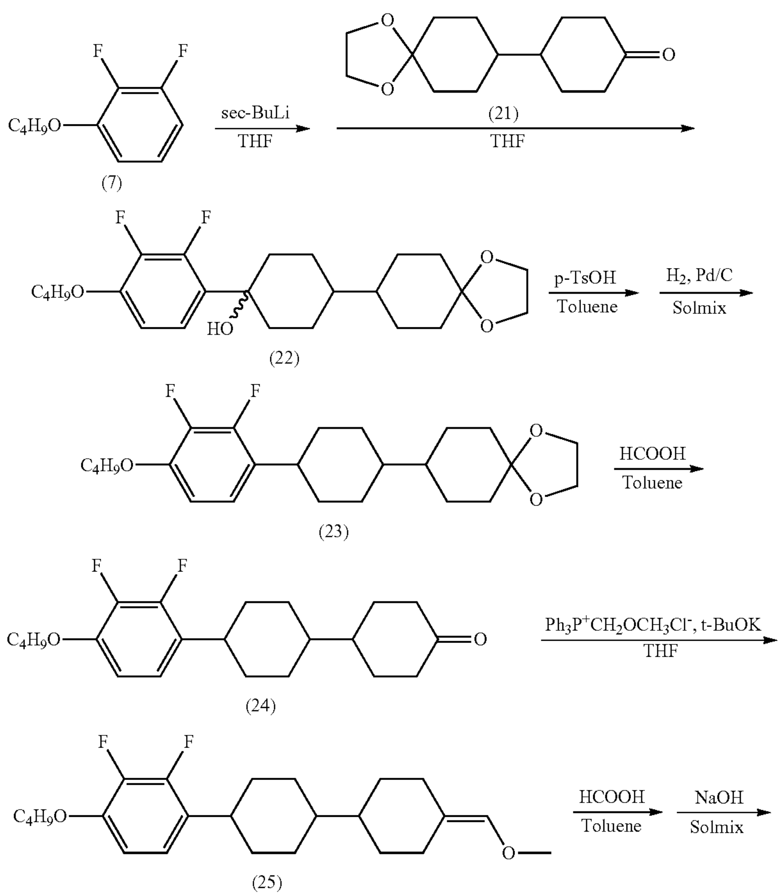

-continued

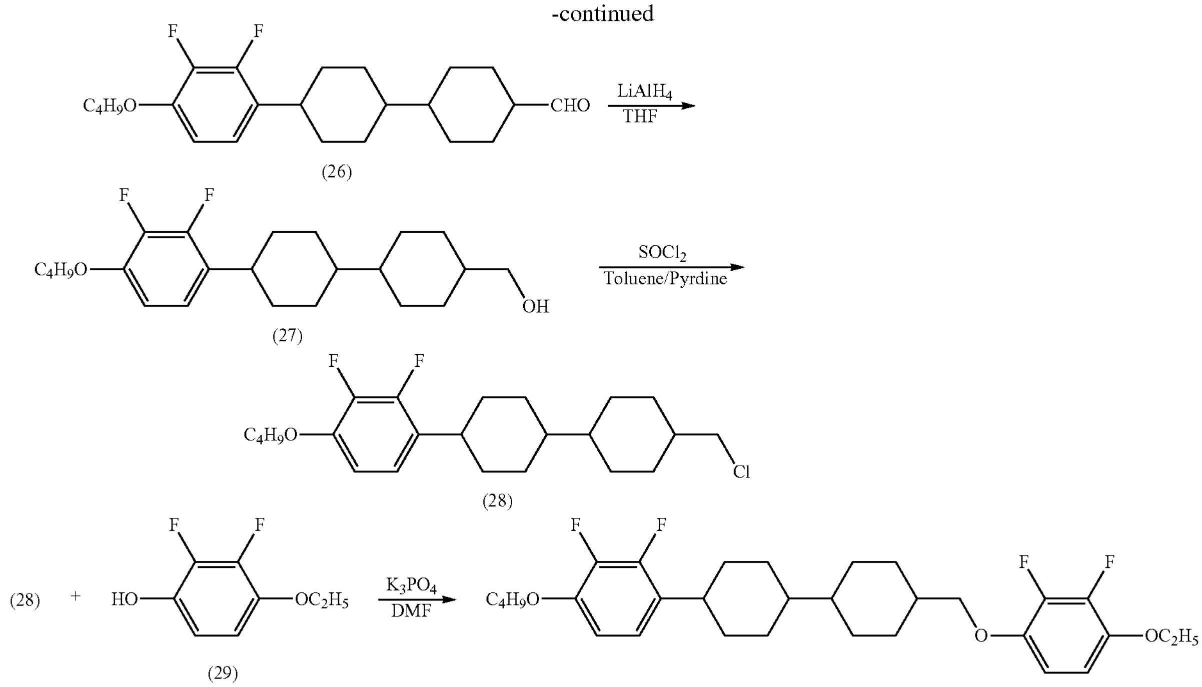

(26)

(27)

(28)

(29)

(NO. 3677)

First Step

3-Butoxy-1,2-difluorobenzene (7) (10.0 g) and THF (200 ml) were added to a reaction vessel under an atmosphere of nitrogen, and cooled to −74° C. sec-Butyllithium (1.00 M, in n-hexane and cyclohexane solution; 64.0 ml) was added dropwise in the temperature range of −74° C. to −70° C., and the stirring was continued for another 2 hours. Successively, 4-(1,4-dioxaspiro[4.5]decan-8-yl)-cyclohexanone (21) (12.8 g) in THF (50 ml) solution was added dropwise in the temperature range of −75° C. to −70° C., while the mixture was allowed to come to 25° C. The reaction mixture was poured into a 3%-aqueous solution of ammonium chloride (100 ml) and ethyl acetate (100 ml) in a vessel and mixed with them. The mixture was then allowed to stand until it had separated into two phases of organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure to leave 4-(1,4-dioxaspiro[4.5]decan-8-yl)-1-(4-butoxy-2,3-difluorophenyl)-cyclohexanol (22) (22.7 g). The resulting compound (22) was a pale yellow oil.

Second Step

The compound (22) (22.7 g), p-toluenesulfonic acid (0.68 g) and toluene (200 ml) were mixed and the mixture was heated to reflux for 2 hours, while distilled water was removed. After the reaction mixture had been cooled to 30° C., water (200 ml) and toluene (200 ml) were added to the mixture and mixed with it. The mixture was then allowed to stand until it had separated into two phases of organic and aqueous phases, and the extraction into an organic phase was carried out. The resulting organic phase was separated, and washed successively a saturated aqueous solution of sodium hydrogencarbonate and water, and dried over anhydrous magnesium sulfate. The resulting solution was purified with a fractional operation by means of column chromatography using silica gel as a stationary phase powder and toluene as an eluent, and dried. Palladium on carbon (3.0 g) was added and then the mixture was stirred at room temperature under an atmosphere of hydrogen until hydrogen absorption had ceased. After the completion of the reaction, palladium on carbon was removed and the solvent was distilled off. The resulting residue was purified by recrystallization from a mixed solvent of THF and heptane (THF:heptane=1:9 by volume) to give 8-[4-(4-butoxy-2,3-difluorophenyl)-cyclohexenyl]-1,4-dioxaspiro[4.5]decane (23) (7.7 g). The yield based on the compound (7) was 35.2%.

Third Step

The compound (23) (7.7 g), formic acid (87%; 8.7 g) and toluene (100 ml) were mixed and the mixture was heated to reflux for 2 hours. After the reaction mixture had been cooled to 30° C., water (200 ml) and toluene (200 ml) were added to the mixture and mixed with it. The mixture was then allowed to stand until it had separated into two phases of organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. Then the solvent was distilled off under reduced pressure, and the residue was purified by recrystallization from heptane solvent and dried to give 4'-(4-butoxy-2,3-difluorophenyl)-bicyclohexyl-4-one (24) (6.8 g). The yield based on the compound (23) was 99.0%.

Fourth Step

Well-dried methoxymethyltriphenylphosphonium chloride (7.9 g) and THF (100 ml) were mixed under an atmosphere of nitrogen, and cooled to −30° C. Then, potassium t-butoxide (t-BuOK) (2.6 g) was added in four portions in the temperature range of −30° C. to −20° C. After the stirring at −20° C. for another 30 minutes, the compound (24) (6.8 g) dissolved in THF (35 ml) was added dropwise in the temperature range of −30 to −20° C. After the mixture had been stirred at −10° C. for 30 minutes, the reaction solution was poured into a mixture water (200 ml) and toluene (100 ml) and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The resulting solution was concentrated under reduced pressure and the resulting residue was purified with a fractional operation by means of column chromatography using silica gel as a stationary phase powder and toluene as an eluent. The resulting eluent was concentrated under reduced pressure to leave 4-(4-butoxy-2,3-difluorophenyl)-4'-methoxymethylene-bicyclohexyl (25) (7.2 g). The yield based on the compound (24) was 95.5%.

Fifth Step

The compound (25) (7.2 g), formic acid (87%; 8.4 g) and toluene (100 ml) were mixed and the mixture was heated to reflux for 2 hours. After the reaction mixture had been cooled to 30° C., water (200 ml) and toluene (300 ml) were added to the mixture and mixed with it.

The mixture was then allowed to stand until it had separated into two phases of organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure to leave pale yellow solids (6.5 g). A mixture cooled to 7° C. of an aqueous 2N-sodium hydroxide solution (14 ml) and 2-propanol (28 ml) was added to the residue and the mixture was stirred at 10° C. for 2 hours. Then, an aqueous 2N-sodium hydroxide solution (20 ml) was added and the mixture was stirred at 5° C. for 2 hours. The resulting reaction solution was poured into a mixture of water (200 ml) and toluene (200 ml) and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The solvent was distilled off under reduced pressure and the resulting residue was purified by recrystallization from a mixed solvent of heptane and THF (heptane:THF=9:1 by volume) and dried to give 4'-(4-butoxy-2,3-difluorophenyl)-bicyclohexyl-trans-4-carboaldehyde (26) (6.0 g). The yield based on the compound (25) was 86.4%.

Sixth Step

Lithium aluminum hydride (4.2 g) was suspended in THF (300 ml). 4'-(4-butoxy-2,3-difluorophenyl)-bicyclohexyl-trans-4-carboaldehyde (26) (6.0 g) was added dropwise to the suspension in the temperature range of −20° C. to −10° C., and the stirring was continued in this temperature range for another 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The resulting organic phase was separated, and washed successively with water and brine, and then dried over anhydrous magnesium sulfate. The product was then purified by recrystallization from heptane and dried, and then concentrated under reduced pressure to give trans-4'-(4-butoxy-2,3-difluorophenyl)-trans-4-hydroxymethylbicyclohexyl (27) (6.0 g). The yield based on the compound (26) was 99.5%.

Seventh Step

The compound (27) (6.0 g), toluene (100 ml) and pyridine (0.1 ml) were added to a reaction vessel under an atmosphere of nitrogen, and the stirring was continued at 45° C. for another 1 hour. Then, thionyl chloride (1.4 ml) was added in the temperature range of 45° C. to 55° C. and the mixture was heated to reflux for 2 hours. After the reaction solution had been cooled to 25° C., it was poured into water (100 ml) and toluene (100 ml), and mixed with them. The mixture was then allowed to stand until it had separated into two phases of organic and aqueous phases, and the extraction into an organic phase was carried out. The resulting organic phase was separated, and washed successively with a saturated aqueous solution of sodium hydrogencarbonate twice and water three times, and then dried over anhydrous magnesium sulfate. The resulting solution was concentrated under reduced pressure and the resulting residue was purified with a fractional operation by means of column chromatography using silica gel as a stationary phase powder and a mixed solvent of toluene/heptane (1/1 by volume) as an eluent. The product was further purified by recrystallization from Solmix A-11 and dried to give trans-4'-(4-butoxy-2,3-difluorophenyl)-trans-4-chloromethylbicyclohexyl (28) (6.2 g). The yield based on the compound (27) was 98.6%.

Eighth Step

4-Ethoxy-2,3-difluorophenol (15) (3.3 g) and tripotassium phosphate ($K_3PO_4$) (16.8 g) were added to DMF (100 ml) under an atmosphere of nitrogen and stirred at 80° C. The compound (28) (6.2 g) was added to the mixture and the stirring was continued at 80° C. for another 7 hours. The resulting reaction mixture was cooled to 30° C., solids were filtered off, and toluene (100 ml) and water (100 ml) were added to the filtrate and mixed with it. The mixture was then allowed to stand until it had separated into two phases of organic and aqueous phases, and the extraction into an organic phase was carried out. The resulting organic phase was separated, and washed successively with brine, and then dried over anhydrous magnesium sulfate. The solvent was then distilled off under reduced pressure and the resulting residue was purified with a fractional operation by means of column chromatography using silica gel as a stationary phase powder and a mixed solvent of heptane and toluene (heptane:toluene=1:2 by volume) as an eluent. The product was further purified by recrystallization from a mixed solvent of Solmix A-11 and heptane (Solmix A-11:heptane=1:2 by volume) and dried to give trans-4'-(4-ethoxy-2,3-difluorophenyl)phenoxymethyl-trans-4-(4-butoxy-2,3-difluorophenyl)bicyclohexyl (No. 3677) 3.6 g). The yield based on the compound (28) was 42.6%.

The chemical shift (δ, ppm) in $^1$H-NMR analysis was described below, and the compound obtained was identified as trans-4'-(4-ethoxy-2,3-difluorophenyl)phenoxymethyl-trans-4-(4-butoxy-2,3-difluorophenyl)bicyclohexyl (No. 3677). The solvent for measurement was $CDCl_3$.

Chemical shift δ (ppm); 6.83 (td, 1H), 6.67 (td, 1H), 6.61 (d, 2H), 4.07 (q, 2H), 4.01 (t, 2H), 3.77 (d, 2H), 2.73 (tt, 1H), 1.97-1.71 (m, 11H), 1.55-1.36 (m, 7H), 1.23-0.99 (m, 8H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 3677) were as follows.

Transition temperature: C 98.4 $S_A$ 113.4 N 235.4 I.

$T_{NI}$=200.6° C.; Δ∈=−9.73; and Δn=0.127.

Example 5

Preparation of trans-4-(4-ethoxy-2,3-difluorophenyl)cyclohexylbenzoic acid 4'-butoxy-2',3'-difluoro-1,1'-biphenyl ester (No. 2379)

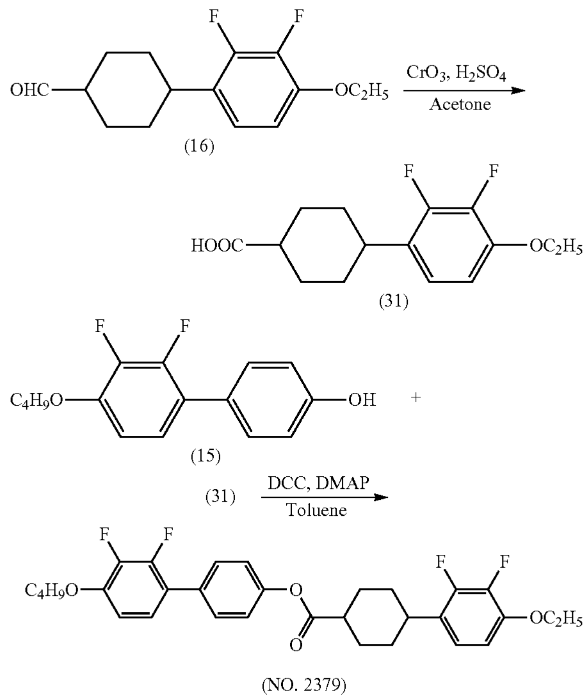

First Step

The compound (16) (10.0 g) and acetone (50 ml) were mixed and the mixture was stirred at 35° C. for 30 minutes. Jones reagent (8N) (4.7 ml) was added to the mixture in the temperature range of 30 to 40° C. and the mixture was stirred at 35° C. for 2 hours. After the reaction mixture had been cooled to 30° C., toluene (200 ml) and water (200 ml) were added to the mixture and mixed with it. The mixture was then allowed to stand until it had separated into two phases of organic and aqueous phases, and the extraction into an organic phase was carried out. The resulting organic phase was separated, and washed successively with water, an aqueous solution of sodium thiosulfate and water, and then dried over anhydrous magnesium sulfate, giving 4-ethoxy-2,3-difluoro-(trans-4-cyclohexyl)-carboxylic acid (31) (8.8 g). The yield based on the compound (16) was 83.1%.

Second Step

The compound (31) (1.2 g), 4'-butoxy-2',3'-difluoro-1,1'-hydroxyphenol (15) (1.0 g), 1,3-dicyclohexylcarbodiimide (DCC) (0.89 g) and 4-dimethylaminopyridine (DMAP) (0.05 g) were added to toluene (100 ml) under an atmosphere of nitrogen, and the mixture was stirred at 25° C. for 20 hours. After the completion of the reaction had been confirmed by means of GC analysis, toluene (100 ml) and water (100 ml) were added to the mixture and mixed with it. The mixture was then allowed to stand until it had separated into two phases of organic and aqueous phases, and the extraction into an organic phase was carried out. The resulting organic phase was separated, and washed with water and then dried over anhydrous magnesium sulfate. The resulting solution was concentrated under reduced pressure and the residue was purified with a fractional operation by means of column chromatography using silica gel as a stationary phase powder and toluene as an eluent. The product was further purified by recrystallization from a mixed solvent of heptane and THF (heptane:THF=2:1 by volume) and dried to give trans-4-(4-ethoxy-2,3-difluorophenyl)cyclohexylbenzoic acid 4'-butoxy-2',3'-difluoro-1,1'-biphenyl ester (No. 2379) (1.43 g). The yield based on the compound (15) was 63.6%.

The chemical shift (δ, ppm) in $^1$H-NMR analysis was described below, and the compound obtained was identified as trans-4-(4-ethoxy-2,3-difluorophenyl)cyclohexylbenzoic acid 4'-butoxy-2',3'-difluoro-1,1'-biphenyl ester (No. 2379). The solvent for measurement was $CDCl_3$.

Chemical shift δ (ppm); 7.51 (d, 2H), 7.15 (d, 2H), 7.08 (td, 1H), 6.86 (td, 1H), 6.80 (td, 1H), 6.69 (td, 1H), 4.14-4.06 (m, 4H), 2.86 (tt, 1H), 2.63 (tt, 1H), 2.33-2.26 (m, 2H), 2.04-1.97 (m, 2H), 1.87-1.72 (m, 4H), 1.62-1.50 (m, 4H), 1.46 (t, 3H) and 0.99 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 2379) were as follows.

Transition temperature: C 84.8 N 280.0 I.

$T_{NI}$=221.6° C.; Δ∈=−8.61; and Δn=0.185.

Example 6

Preparation of 4-(4-ethoxy-2,3-difluorophenyl)-trans-4'(4-butoxy-2,3-difluorophenyl)-bicyclohexyl-3-ene (No. 377)

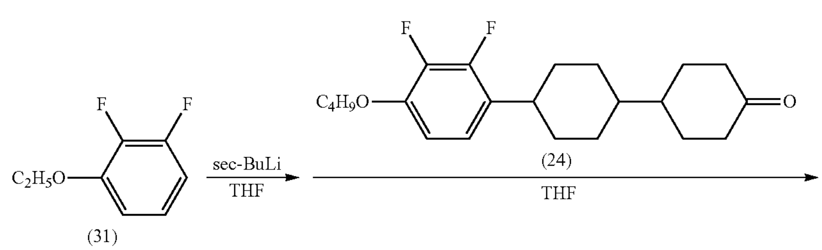

-continued

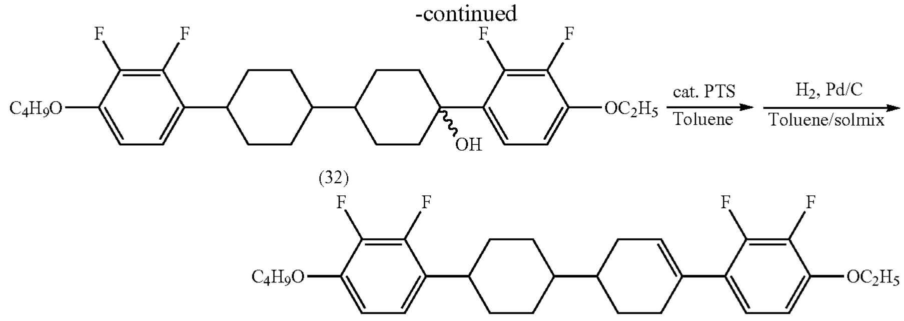

(32)

(NO. 377)

First Step

3-Ethoxy-1,2-difluorobenzene(31) (3.0 g) and THF (200 ml) were added to a reaction vessel under an atmosphere of nitrogen, and cooled to −74° C. sec-Butyllithium (1.00 M, in n-hexane and cyclohexane solution, 23.0 ml) was added to the mixture in the temperature range of −74° C. to −70° C., and the stirring was continued for another 2 hours. Successively, 4'-(4-butoxy-2,3-difluorophenyl)-bicyclohexyl-4-one (24) (7.0 g) in THF (50 ml) solution was added dropwise in the temperature range of −75° C. to −70° C., and the stirring was continued for another 8 hours while the mixture was allowed to come to 25° C. The reaction mixture was poured into a 3%-aqueous solution of ammonium chloride (100 ml) and ethyl acetate (100 ml) in a vessel and mixed with them. The mixture was then allowed to stand until it had separated into organic and aqueous phases, and the extraction into an organic phase was carried out. The resulting organic phase was separated, and washed successively with water, a saturated aqueous solution of sodium hydrogencarbonate and water, and then dried over anhydrous magnesium sulfate. The solvent was then distilled off under reduced pressure to leave 4-(4-ethoxy-2,3-difluorophenyl)-4'(4-butoxy-2,3-difluorophenyl)-bicyclohexyl-4-ol (32) (9.7 g). The resulting compound (32) was a pale yellow oil.

Second Step

The compound (32) (9.7 g), p-toluenesulfonic acid (0.29 g) and toluene (200 ml) were mixed and the mixture was heated to reflux for 2 hours, while distilled water was removed. After the reaction mixture had been cooled to 30° C., water (200 ml) and toluene (200 ml) were added to the mixture and mixed with it. The mixture was then allowed to stand until it had separated into two phases of organic and aqueous phases, and the extraction into an organic phase was carried out. The resulting organic phase was separated, and washed successively with a saturated aqueous solution of sodium hydrogencarbonate and water, and then dried over anhydrous magnesium sulfate. The resulting solution was purified with a fractional operation by means of column chromatography using silica gel as a stationary phase powder and toluene as an eluent, and dried. The resulting residue was purified by recrystallization from a mixed solvent of ethyl acetate and Solmix A-11 (ethyl acetate:Solmix A-11=1:4 by volume) to give 4-(4-ethoxy-2,3-difluorophenyl)-trans-4'(4-butoxy-2,3-difluorophenyl)-bicyclohexyl-3-ene (No. 377) (5.5 g). The yield based on the compound (31) was 55.5%.

The chemical shift (δ, ppm) in $^1$H-NMR analysis was described below, and the compound obtained was identified as 4-(4-ethoxy-2,3-difluorophenyl)-trans-4'(4-butoxy-2,3-difluorophenyl)-bicyclohexyl-3-ene (No. 377). The solvent for measurement was $CDCl_3$.

Chemical shift δ (ppm); 6.88 (td, 1H), 6.84 (td, 1H), 6.70-6.63 (m, 2H), 5.93 (m, 1H), 4.11 (q, 2H), 4.01 (t, 2H), 2.76 (tt, 1H), 2.49-2.32 (m, 2H), 2.31-2.22 (m, 1H), 2.03-1.83 (m, 6H), 1.78 (quin, 2H), 1.54-1.33 (m, 9H), 1.31-1.15 (m, 3H) and 0.97 (t, 3H).

Transition temperature was expressed in terms of measured values of the compound itself. Maximum temperature ($T_{NI}$), dielectric anisotropy ($\Delta\in$) and optical anisotropy (Δn) were expressed in terms of extrapolated values calculated from measured values of the sample, in which the compound was mixed with the mother liquid crystals (i), according to the extrapolation method described above. The physical property values of the compound (No. 377) were as follows.

Transition temperature: $C_1$ 65.2 $C_2$ 69.2 $S_A$ 182.9 N 269.5 I.

$T_{NI}$=216.6° C.; $\Delta\in$=−9.50; and Δn=0.158.

Example 7

A variety of compounds were prepared using starting materials corresponding to them according to the procedure shown in Examples 1 to 6, and they were confirmed as objective compounds.

4-(4-Ethoxy-2,3-difluorophenyl)-4'-(4-butoxy-2,3-difluorophenyl)-bicyclohexyl-3,3'-diene (No. 407)

(NO.407)

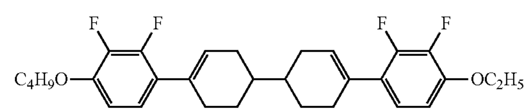

Chemical shift δ (ppm); 6.88 (td, 1H), 6.66 (td, 1H), 5.93 (m, 2H), 4.09 (q, 2H), 4.03 (t, 2H), 2.50-2.24 (m, 6H), 2.05-1.94 (m, 4H), 1.80 (quin, 2H), 1.60-1.37 (m, 11H) and 0.98 (t, 3H).

Transition temperature was expressed in terms of measured values of the compound itself. Maximum temperature ($T_{NI}$), dielectric anisotropy ($\Delta\in$) and optical anisotropy (Δn) were expressed in terms of extrapolated values calculated from measured values of the sample, in which the compound was mixed with the mother liquid crystals (i), according to the extrapolation method described above. The physical property values of the compound (No. 407) were as follows.

Transition temperature: C 87.1 $S_A$ 197.5 N 249.2 I.

$T_{NI}$=215.9° C.; $\Delta\in$=−9.50; and Δn=0.193.

Trans-4-(4-Ethoxy-2,3-difluorophenyl)-trans-4'-(4-butoxy-2,3-difluorophenyl)-1,1'-bicyclohexyl (No. 17)

(NO. 17)

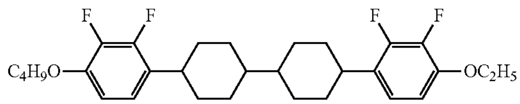

Chemical shift δ (ppm); 6.84 (t, 2H), 6.68 (t, 2H), 4.10 (q, 2H), 4.02 (t, 2H), 2.74 (tt, 2H), 1.94-1.83 (m, 8H), 1.79 (quin, 2H), 1.54-1.38 (m, 9H), 1.27-1.14 (m, 6H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 17) were as follows.

Transition temperature: C 99.4 $S_A$ 161.9 N 293.8 I.

$T_{NI}$=212.6° C.; Δ∈=−8.18; and Δn=0.141.

1-Butoxy-trans-4-(4-(4-(4-ethoxy-2,3-difluorophenyl)phenyl)cyclohexyl)-2,3-difluorobenzene (No. 3227)

(NO. 3227)

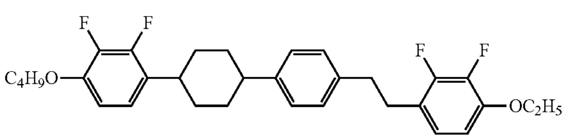

Chemical shift δ (ppm); 7.15 (dd, 4H), 6.89 (td, 1H), 6.78 (td, 1H), 6.70 (td, 1H), 6.64 (td, 1H), 4.10 (q, 2H), 4.03 (t, 2H), 2.86 (m, 5H), 2.57 (mt, 1H), 2.00 (m, 4H), 1.81 (quin, 2H), 1.70-1.57 (m, 4H), 1.51 (q, 2H), 1.45 (t, 3H) and 0.99 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 3227) were as follows.

Transition temperature: C 87.9 $S_A$ 103.8 N 202.9 I.

$T_{NI}$=168.6° C.; Δ∈=−7.25; and Δn=0.165.

1-Butoxy-4-(4-(4-(4-ethoxy-2,3-difluorophenyl)phenyl)cyclohexyl-3-eneyl)-2,3-difluorobenzene (No. 3587)

(NO. 3587)

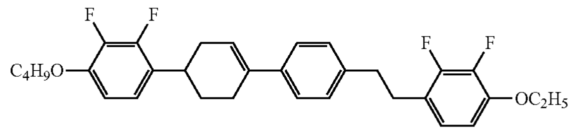

Chemical shift δ (ppm); 7.32 (d, 2H), 7.12 (d, 2H), 6.89 (td, 1H), 6.75 (td, 1H), 6.69 (td, 1H), 6.62 (td, 1H), 6.17 (m, 1H), 4.09 (q, 2H), 4.03 (t, 2H), 3.16 (m, 1H), 2.87 (m, 4H), 2.64-2.47 (m, 3H), 2.54-2.45 (m, 1H), 2.09-2.02 (m, 1H), 1.97-1.88 (m, 1H), 1.80 (quip, 2H), 1.50 (q, 2H), 1.44 (t, 3H) and 0.98 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 3587) were as follows.

Transition temperature: $C_1$ 84.9 $C_2$ 100.5 $S_A$ 135.3 N 186.9 I.

$T_{NI}$=175.3° C.; Δ∈=−8.47; and Δn=0.186.

Trans-4-[(4'-Ethoxy-2',3'-difluoro-1,1'-biphenyl)-4-butoxy-2,3-difluorophenyl]cyclohexane (No. 197)

(NO. 197)

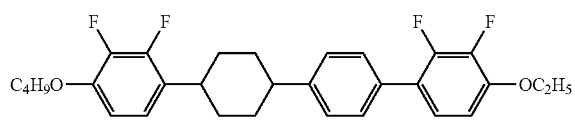

Chemical shift δ (ppm); 7.46 (d, 2H), 7.32 (d, 2H), 7.10 (td, 1H), 6.89 (td, 1H), 6.79 (td, 1H), 6.70 (td, 1H), 4.16 (q, 2H), 4.03 (t, 2H), 2.90 (m, 1H), 2.64 (m, 1H), 2.09-1.97 (m, 4H), 1.80 (quin, 2H), 1.74-1.60 (m, 4H), 1.53-1.45 (m, 5H) and 0.98 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 197) were as follows.

Transition temperature: C 119.0 ($S_A$ 157.3) N 295.0 I.

$T_{NI}$=214.6° C.; Δ∈=−8.81; and Δn=0.240.

Trans-4-(4-Ethoxy-2,3-difluorophenylethyl)-trans-4'-(4-butoxy-2,3-difluorophenyl)-1,1'-bicyclohexyl (No. 3047)

(NO. 3047)

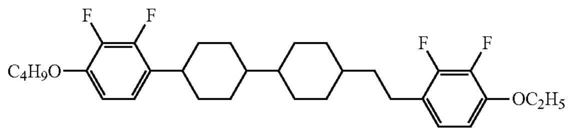

Chemical shift δ (ppm); 6.81 (m, 2H), 6.66 (q, 2H), 4.10 (q, 2H), 4.02 (t, 2H), 2.70 (tt, 1H), 2.60 (t, 2H), 1.90-1.72 (m, 10H), 1.54-1.36 (m, 9H) and 1.24-0.98 (m, 12H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 3047) were as follows.

Transition temperature: $C_1$ 62.6 $S_A$ 169.7 N 242.5 I.

$T_{NI}$=201.3° C.; Δ∈=−7.47; and Δn=0.142.

4'-Ethoxy-2',3'-difluoro-1,1'-biphenylbenzoic acid trans-4-(4-butoxy-2,3-difluorophenyl)cyclohexyl ester (No. 2769)

(NO. 2769)

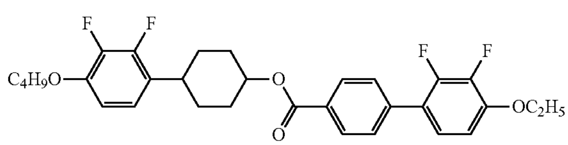

Chemical shift δ (ppm); 8.11 (d, 2H), 7.59 (d, 2H), 7.13 (t, 1H), 6.86 (t, 1H), 6.82 (t, 1H), 6.99 (t, 1H), 5.05 (m, 1H), 4.17 (q, 2H), 4.03 (t, 2H), 2.86 (tt, 1H), 2.24 (m, 2H), 2.00-1.94 (m, 2H), 1.79 (quin, 2H), 1.74-1.61 (m, 4H), 1.54-1.45 (m, 5H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 2769) were as follows.

Transition temperature: C 129.0 N 275.8 I.

$T_{NI}$=205.6° C.; Δ∈=−7.14; and Δn=0.214.

Trans-4-(4-Ethoxy-2,3-difluorophenyl)cyclohexylbenzoic acid trans-4-(4-butoxy-2,3-difluorophenyl)cyclohexyl ester (No. 2207)

(NO. 2207)

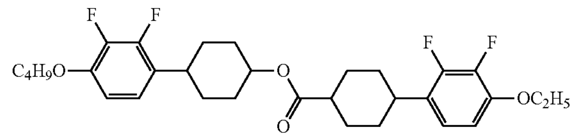

Chemical shift δ (ppm); 6.83 (t, 2H), 6.67 (t, 2H), 4.80 (m, 1H), 4.10 (q, 2H), 4.01 (t, 2H), 2.80 (tt, 2H), 2.33 (tt, 1H), 2.09 (m, 4H), 1.98-1.88 (m, 4H), 1.79 (quin, 2H), 1.66-1.46 (m, 13H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 2207) were as follows.

Transition temperature: C 108.7 N 244.6 I.

$T_{NI}$=174.6° C.; Δ∈=−6.95; and Δn=0.136.

Trans-4-(4-Butoxy-2,3-difluorophenyl)-trans-4'-1,1'-bicyclohexylbenzoic acid 4-ethoxy-2,3-difluorophenyl ester (No. 4937)

(NO. 4937)

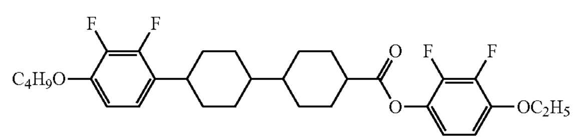

Chemical shift δ (ppm); 6.83 (t, 1H), 6.79 (t, 1H), 6.69 (t, 1H), 6.67 (t, 1H), 4.10 (q, 2H), 4.01 (t, 2H), 2.73 (tt, 1H), 2.51 (tt, 1H), 2.18 (m, 2H), 1.93-1.82 (m, 6H), 1.78 (quin, 2H), 1.62-1.36 (m, 9H), 1.25-1.06 (m, 6H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 4937) were as follows.

Transition temperature: C 91.2 $S_C$ 151.5 $S_A$ 182.8 N 244.6

$T_{NI}$=200.6° C.; Δ∈=−7.99; and Δn=0.127. I.

4-Ethoxy-2,3-difluorophenylbenzoic acid trans-4-(4-butoxy-2,3-difluorophenyl)-trans-4'-1,1'-bicyclohexyl ester (No. 5717)

(NO. 5717)

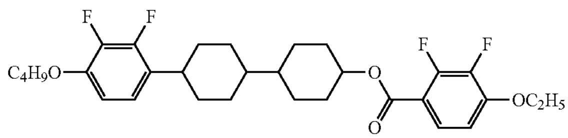

Chemical shift δ (ppm); 7.66 (t, 1H), 6.83 (t, 1H), 6.74 (t, 1H), 6.67 (t, 1H), 4.91 (m, 1H), 4.17 (q, 2H), 4.01 (t, 2H), 2.73 (tt, 1H), 2.13 (m, 2H), 1.93-1.82 (m, 6H), 1.78 (quin, 2H), 1.54-1.36 (m, 9H), 1.25-1.12 (m, 6H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 5717) were as follows.

Transition temperature: C 118.8 $S_A$ 133.1 N 294.0 I.

$T_{NI}$=235.9° C.; Δ∈=−8.11; and Δn=0.148.

4-(4-Ethoxy-3-fluorophenyl)-4'(4-butoxy-2,3-difluorophenyl)-bicyclohexyl-3-ene (No. 409)

(NO. 409)

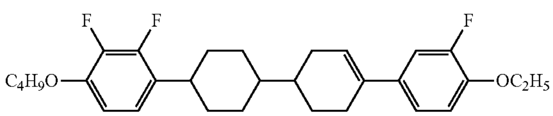

Chemical shift δ (ppm); 7.13 (dd, 1H), 7.08 (dd, 1H), 6.88 (t, 1H), 6.84 (t, 1H), 6.67 (t, 1H), 6.06 (m, 1H), 4.10 (q, 2H), 4.01 (t, 2H), 2.74 (tt, 2H), 2.49-2.24 (m, 3H), 2.02-1.85 (m, 6H), 1.79 (quin, 2H), 1.54-1.33 (m, 8H), 1.30-1.15 (m, 3H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 409) were as follows.

Transition temperature: C 58.2 $S_A$ 190.3 N 275.4 I.

$T_{NI}$=229.3° C.; Δ∈=−6.39; and Δn=0.180.

4-(4-Ethoxy-2-fluorophenyl)-trans-4'-(4-butoxy-2,3-difluorophenyl)-bicyclohexyl-3-ene (No. 410)

(NO. 410)

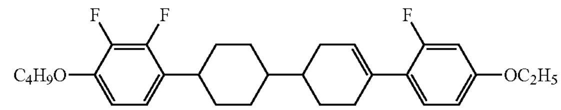

Chemical shift δ (ppm); 7.13 (t, 1H), 6.84 (t, 1H), 6.67 (t, 1H), 6.62 (dd, 1H), 6.56 (dd, 1H), 5.88 (m, 1H), 4.00 (m, 4H), 2.76 (tt, 1H), 2.49-2.34 (m, 2H), 2.26 (dt, 1H), 2.02-1.86 (m, 6H), 1.79 (quin, 2H), 1.54-1.34 (m, 9H), 1.30-1.15 (m, 3H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 410) were as follows.

Transition temperature: C 71.5 $S_A$ 125.3 N 272.7 I.

$T_{NI}$=220.6° C.; Δ∈=−5.19; and Δn=0.176.

Trans-4-(4-Ethoxy-3-fluorophenyl)-trans-4'-(4-butoxy-2,3-difluorophenyl)-bicyclohexyl (No. 137)

(NO. 137)

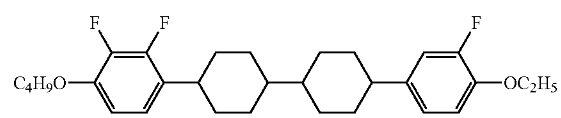

Chemical shift δ (ppm); 6.93 (d, 1H), 6.87 (m, 2H), 6.84 (t, 1H), 6.67 (t, 1H), 4.08 (q, 2H), 4.01 (t, 2H), 2.74 (tt, 1H), 2.39 (tt, 1H), 1.95-1.82 (m, 8H), 1.79 (quin, 2H), 1.55-1.33 (m, 9H), 1.27-1.11 (m, 6H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 137) were as follows.

Transition temperature: C 78.2 $S_B$ 124.4 $S_A$ 160.2 N 297.7

$T_{NI}$=219.9° C.; Δ∈=−6.22; and Δn=0.160. I.

Trans-4-(4-Ethoxy-2-fluorophenyl)-trans-4'-(4-butoxy-2,3-difluorophenyl)-bicyclohexyl (No. 77)

(NO. 77)

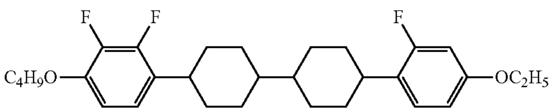

Chemical shift δ (ppm); 7.10 (t, 1H), 6.84 (t, 1H), 6.67 (t, 1H), 6.62 (dd, 1H), 6.56 (dd, 1H), 4.01 (q, 2H), 3.98 (t, 2H), 2.73 (m, 2H), 1.93-1.82 (m, 8H), 1.79 (quin, 2H), 1.55-1.37 (m, 9H), 1.26-1.15 (m, 6H) and 0.97 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample, in which the compound was mixed with the mother liquid crystals (i), according to the extrapolation method described above. The physical property values of the compound (No. 77) were as follows.

Transition temperature: C 90.8 $S_A$ 97.4 N 296.9 I.

$T_{NI}$=226.6° C.; Δ∈=−5.57; and Δn=0.158.

Example 8

The compound (No. 1) to the compound (No. 6180) shown below can be synthesized by synthetic methods similar to those described in Examples 1 to 7. Attached data were measured in accordance with the methods described above. Measured values of the compound itself were used for the transition temperature, and values converted from the measured values of the sample, in which the compound was mixed with the mother liquid crystals (i), by means of the extrapolation method described above were used for the maximum temperature ($T_{NI}$), the dielectric anisotropy (Δ∈) and the optical anisotropy (Δn).

TABLE 1

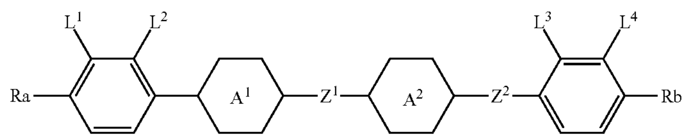

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1 | $CH_3O$ | F | F | 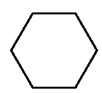 | — | 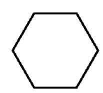 | — | F | F | $OCH_3$ | |
| 2 | $CH_3O$ | F | F | 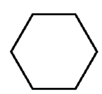 | — | 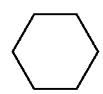 | — | F | F | $OC_2H_5$ | |
| 3 | $CH_3O$ | F | F | 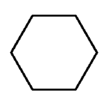 | — | 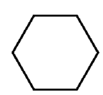 | — | F | F | $OC_3H_7$ | |
| 4 | $CH_3O$ | F | F | 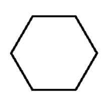 | — | 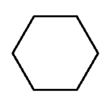 | — | F | F | $OC_4H_9$ | |
| 5 | $CH_3O$ | F | F | 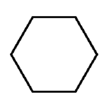 | — | 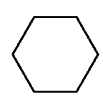 | — | F | F | $OC_5H_{11}$ | |
| 6 | $C_2H_5O$ | F | F | 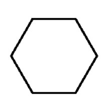 | — | 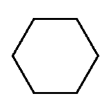 | — | F | F | $OCH_3$ | |
| 7 | $C_2H_5O$ | F | F | 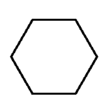 | — | 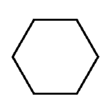 | — | F | F | $OC_2H_5$ | |
| 8 | $C_2H_5O$ | F | F | 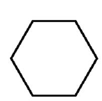 | — | 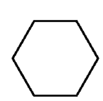 | — | F | F | $OC_3H_7$ | |
| 9 | $C_2H_5O$ | F | F | 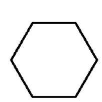 | — | 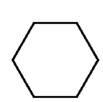 | — | F | F | $OC_4H_9$ | |

TABLE 1-continued

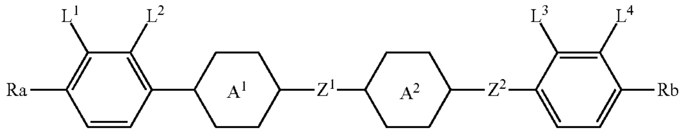

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 10 | $C_2H_5O$ | F | F | 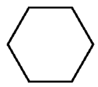 | — | 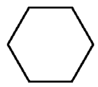 | — | F | F | $OC_5H_{11}$ | |
| 11 | $C_3H_7O$ | F | F | 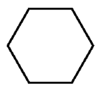 | — | 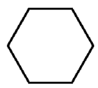 | — | F | F | $OCH_3$ | |
| 12 | $C_3H_7O$ | F | F | 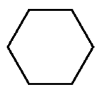 | — | 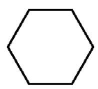 | — | F | F | $OC_2H_5$ | |
| 13 | $C_3H_7O$ | F | F | 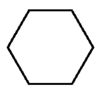 | — | 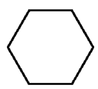 | — | F | F | $OC_3H_7$ | |
| 14 | $C_3H_7O$ | F | F | 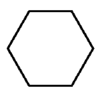 | — | 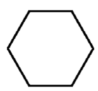 | — | F | F | $OC_4H_9$ | |
| 15 | $C_3H_7O$ | F | F | 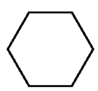 | — | 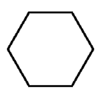 | — | F | F | $OC_5H_{11}$ | |

TABLE 2

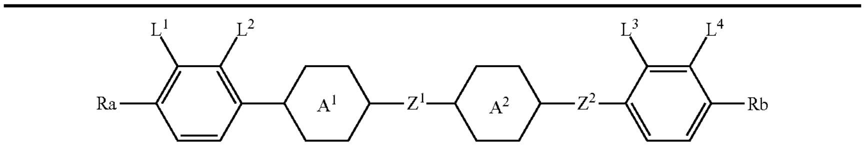

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 16 | $C_4H_9O$ | F | F | 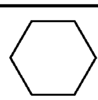 | — | 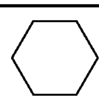 | — | F | F | $OCH_3$ | |
| 17 | $C_4H_9O$ | F | F | 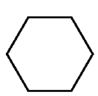 | — | 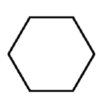 | — | F | F | $OC_2H_5$ | C 99.4 $S_A$ 161.9 N 293.8 I $T_{NI}$: 212.6° C., Δε: −8.18, Δn: 0.141 |
| 18 | $C_4H_9O$ | F | F | 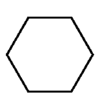 | — | 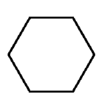 | — | F | F | $OC_3H_7$ | |
| 19 | $C_4H_9O$ | F | F | 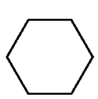 | — | 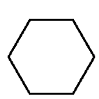 | — | F | F | $OC_4H_9$ | |
| 20 | $C_4H_9O$ | F | F | 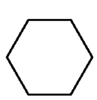 | — | 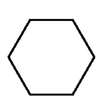 | — | F | F | $OC_5H_{11}$ | |
| 21 | $C_5H_{11}O$ | F | F | 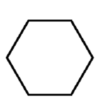 | — | 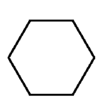 | — | F | F | $OCH_3$ | |

TABLE 2-continued

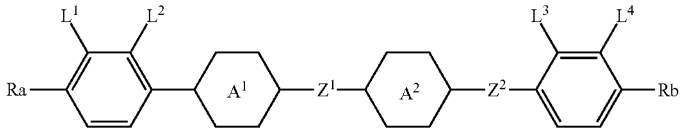

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 22 | $C_5H_{11}O$ | F | F | 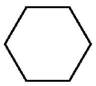 | — | 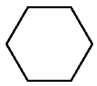 | — | F | F | $OC_2H_5$ | |
| 23 | $C_5H_{11}O$ | F | F | 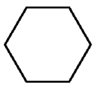 | — | 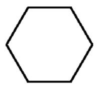 | — | F | F | $OC_3H_7$ | |
| 24 | $C_5H_{11}O$ | F | F | 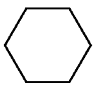 | — | 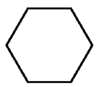 | — | F | F | $OC_4H_9$ | |
| 25 | $C_5H_{11}O$ | F | F | 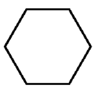 | — | 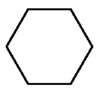 | — | F | F | $OC_5H_{11}$ | |
| 26 | $C_2H_5$ | F | F | 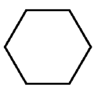 | — | 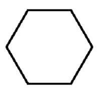 | — | F | F | $C_4H_9$ | |
| 27 | $C_5H_{11}$ | F | F | 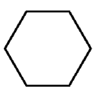 | — | 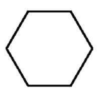 | — | F | F | $C_2H_5$ | |
| 28 | $C_2H_5$ | F | F | 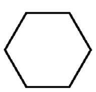 | — | 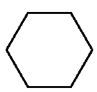 | — | F | F | $OC_4H_9$ | |
| 29 | $CH_2{=}CH$ | F | F | 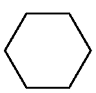 | — | 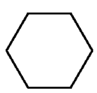 | — | F | F | $OC_3H_7$ | |
| 30 | $CH_2{=}CH$ | F | F | 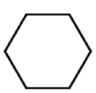 | — | 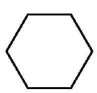 | — | F | F | $OC_5H_{11}$ | |

TABLE 3

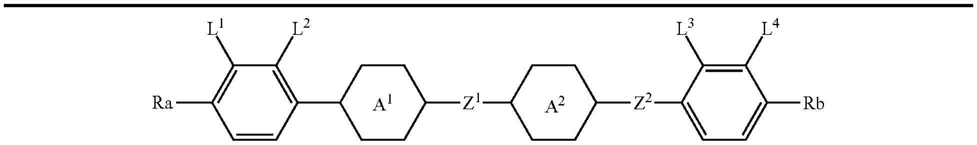

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 31 | $CH_2{=}CHO$ | F | F | 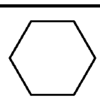 | — | 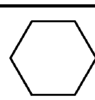 | — | F | F | $OC_3H_7$ | |
| 32 | $CH_2{=}CHCH_2O$ | F | F | 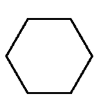 | — | 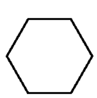 | — | F | F | $OC_5H_{11}$ | |

TABLE 3-continued

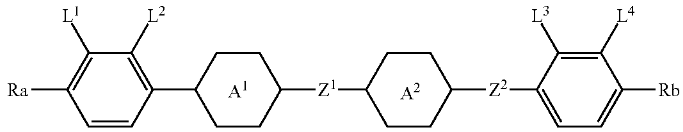

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 33 | $CH_2{=}CHCH_2O$ | F | F | 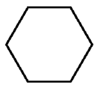 | — | 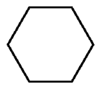 | — | F | F | $OC_3H_7$ | |
| 34 | $CH_2{=}CHC_2H_5O$ | F | F | 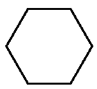 | — | 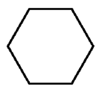 | — | F | F | $OC_5H_{11}$ | |
| 35 | $CH_2{=}CHC_2H_5O$ | F | F | 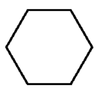 | — | 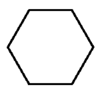 | — | F | F | $OC_2H_5$ | |
| 36 | $CH_2{=}CHC_2H_5O$ | F | F | 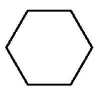 | — | 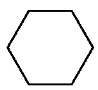 | — | F | F | $OC_3H_7$ | |
| 37 | $CH_3CH{=}CHCH_2O$ | F | F | 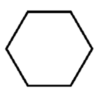 | — | 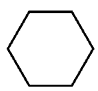 | — | F | F | $OCH_3$ | |
| 38 | $CH_3CH{=}CHCH_2O$ | F | F | 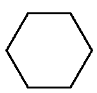 | — | 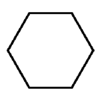 | — | F | F | $OC_2H_5$ | |
| 39 | $C_3H_7O$ | F | F | 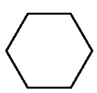 | — | 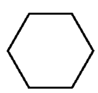 | — | F | F | $OCH{=}CH_2$ | |
| 40 | $C_3H_7O$ | F | F | 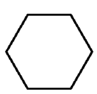 | — | 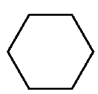 | — | F | F | $OCH_2CH{=}CH_2$ | |
| 41 | $C_4H_9O$ | F | F | 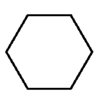 | — | 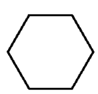 | — | F | F | $OCH_2CH{=}CH_2$ | |
| 42 | $C_5H_{11}O$ | F | F | 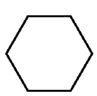 | — | 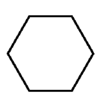 | — | F | F | $OCH_2CH{=}CH_2$ | |
| 43 | $CH_3O$ | F | F | 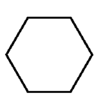 | — | 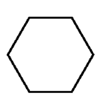 | — | F | F | $OC_2H_5CH{=}CH_2$ | |
| 44 | $C_2H_5O$ | F | F | 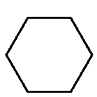 | — | 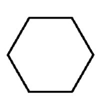 | — | F | F | $OC_2H_5CH{=}CH_2$ | |
| 45 | $C_3H_7O$ | F | F | 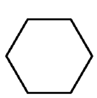 | — | 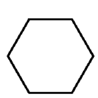 | — | F | F | $OC_2H_5CH{=}CH_2$ | |

TABLE 4
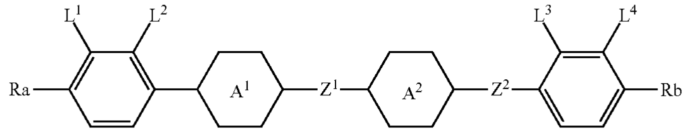
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 46 | $CH_3O$ | F | F | 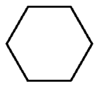 | — | 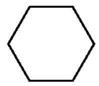 | — | F | F | $OCH_2CH{=}CHCH_3$ | |
| 47 | $C_2H_5O$ | F | F | 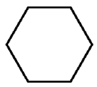 | — | 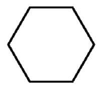 | — | F | F | $OCH_2CH{=}CHCH_3$ | |
| 48 | $C_3H_7O$ | F | F | 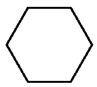 | — | 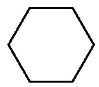 | — | F | F | $OCH_2CH{=}CHCH_3$ | |
| 49 | $CH_2{=}CHCH_2O$ | F | F | 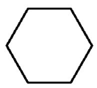 | — | 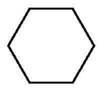 | — | F | F | $OCH{=}CH_2$ | |
| 50 | $CH_2{=}CHC_2H_5O$ | F | F | 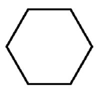 | — | 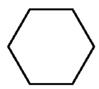 | — | F | F | $OCH_2CH{=}CH_2$ | |
| 51 | $C_3H_7OCH_2$ | F | F | 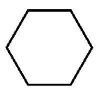 | — | 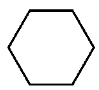 | — | F | F | $OC_3H_7$ | |
| 52 | $C_5H_{11}O$ | F | F | 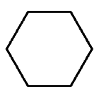 | — | 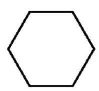 | — | F | F | $OC_2H_5CH{=}CH_2$ | |
| 53 | $C_3H_7O$ | F | F | 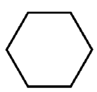 | — | 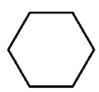 | — | F | F | H | |
| 54 | $C_5H_{11}O$ | F | F | 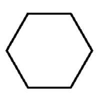 | — | 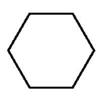 | — | F | F | $OC_9H_{19}$ | |
| 55 | $C_3H_7O$ | F | F | 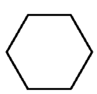 | — | 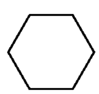 | — | F | F | $C_2H_5$ | |
| 56 | $C_5H_{11}O$ | F | F | 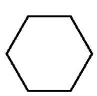 | — | 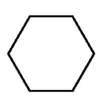 | — | F | F | $C_3H_7$ | |
| 57 | H | F | F | 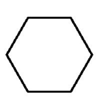 | — | 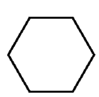 | — | F | F | $OC_4H_9$ | |
| 58 | $C_7H_{15}O$ | F | F | 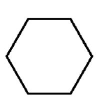 | — | 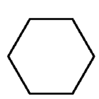 | — | F | F | $OC_4H_9$ | |
| 59 | $C_2H_5O$ | F | F | 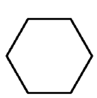 | — | 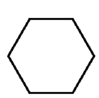 | — | F | F | $OC_6H_{13}$ | |

TABLE 4-continued
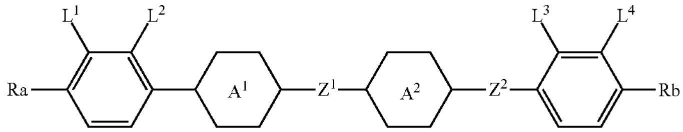
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 60 | $CH_3O$ | F | F | 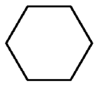 | — | 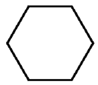 | — | F | F | $C_2H_5$ | |
TABLE 5
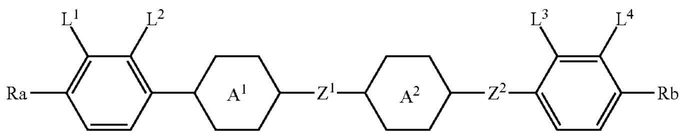
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 61 | $CH_3O$ | F | F | 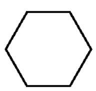 | — | 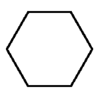 | — | F | H | $OCH_3$ | |
| 62 | $CH_3O$ | F | F | 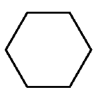 | — | 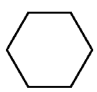 | — | F | H | $OC_2H_5$ | |
| 63 | $CH_3O$ | F | F | 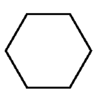 | — | 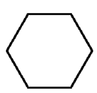 | — | F | H | $OC_3H_7$ | |
| 64 | $CH_3O$ | F | F | 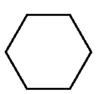 | — | 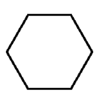 | — | F | H | $OC_4H_9$ | |
| 65 | $CH_3O$ | F | F | 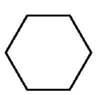 | — | 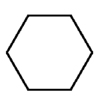 | — | F | H | $OC_5H_{11}$ | |
| 66 | $C_2H_5O$ | F | F | 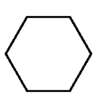 | — | 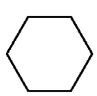 | — | F | H | $OCH_3$ | |
| 67 | $C_2H_5O$ | F | F | 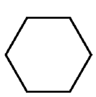 | — | 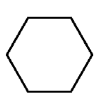 | — | F | H | $OC_2H_5$ | |
| 68 | $C_2H_5O$ | F | F | 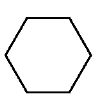 | — | 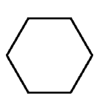 | — | F | H | $OC_3H_7$ | |
| 69 | $C_2H_5O$ | F | F | 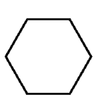 | — | 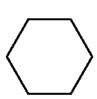 | — | F | H | $OC_4H_9$ | |
| 70 | $C_2H_5O$ | F | F | 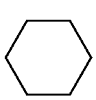 | — | 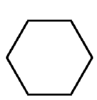 | — | F | H | $OC_5H_{11}$ | |

TABLE 5-continued

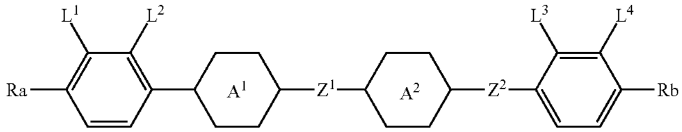

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 71 | $C_3H_7O$ | F | F | 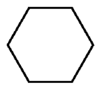 | — | 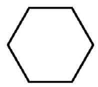 | — | F | H | $OCH_3$ | |
| 72 | $C_3H_7O$ | F | F | 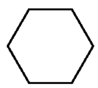 | — | 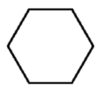 | — | F | H | $OC_2H_5$ | |
| 73 | $C_3H_7O$ | F | F | 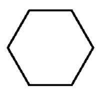 | — | 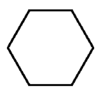 | — | F | H | $OC_3H_7$ | |
| 74 | $C_3H_7O$ | F | F | 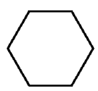 | — | 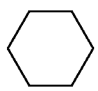 | — | F | H | $OC_4H_9$ | |
| 75 | $C_3H_7O$ | F | F | 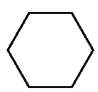 | — | 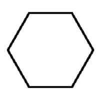 | — | F | H | $OC_5H_{11}$ | |

TABLE 6

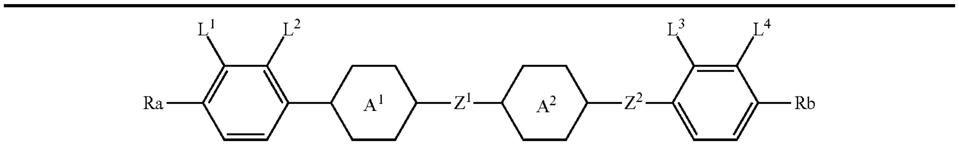

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 76 | $C_4H_9O$ | F | F | 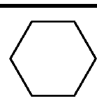 | — | 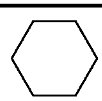 | — | F | H | $OCH_3$ | C 90.8 SA 97.4 N 296.9 I<br>TNI: 226.6° C., Δε: −5.57, Δn: 0.158 |
| 77 | $C_4H_9O$ | F | F | 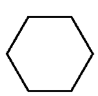 | — | 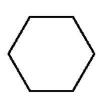 | — | F | H | $OC_2H_5$ | |
| 78 | $C_4H_9O$ | F | F | 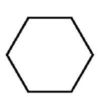 | — | 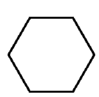 | — | F | H | $OC_3H_7$ | |
| 79 | $C_4H_9O$ | F | F | 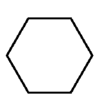 | — | 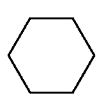 | — | F | H | $OC_4H_9$ | |
| 80 | $C_4H_9O$ | F | F | 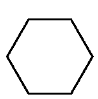 | — | 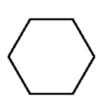 | — | F | H | $OC_5H_{11}$ | |
| 81 | $C_5H_{11}O$ | F | F | 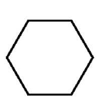 | — | 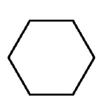 | — | F | H | $OCH_3$ | |

TABLE 6-continued

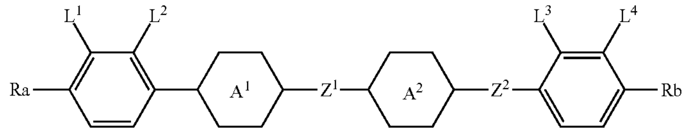

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 82 | $C_5H_{11}O$ | F | F | 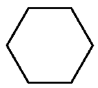 | — | 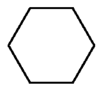 | — | F | H | $OC_2H_5$ | |
| 83 | $C_5H_{11}O$ | F | F | 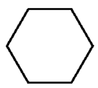 | — | 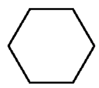 | — | F | H | $OC_3H_7$ | |
| 84 | $C_5H_{11}O$ | F | F | 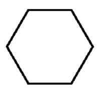 | — | 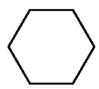 | — | F | H | $OC_4H_9$ | |
| 85 | $C_5H_{11}O$ | F | F | 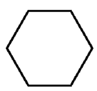 | — | 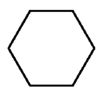 | — | F | H | $OC_5H_{11}$ | |
| 86 | $C_2H_5$ | F | F | 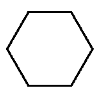 | — | 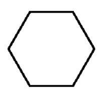 | — | F | H | $C_4H_9$ | |
| 87 | $C_5H_{11}$ | F | F | 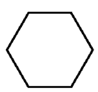 | — | 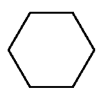 | — | F | H | $C_2H_5$ | |
| 88 | $C_2H_5$ | F | F | 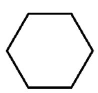 | — | 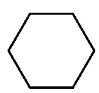 | — | F | H | $OC_4H_9$ | |
| 89 | $CH_2{=}CH$ | F | F | 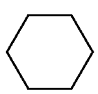 | — | 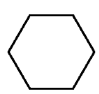 | — | F | H | $OC_3H_7$ | |
| 90 | $CH_2{=}CH$ | F | F | 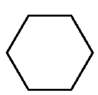 | — | 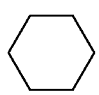 | — | F | H | $OC_5H_{11}$ | |

TABLE 7

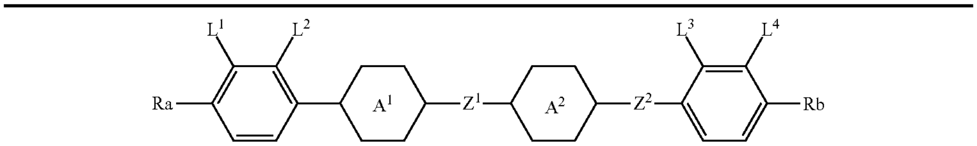

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 91 | $CH_2{=}CHO$ | F | F | 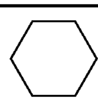 | — | 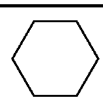 | — | F | H | $OC_3H_7$ | |
| 92 | $CH_2{=}CHCH_2O$ | F | F | 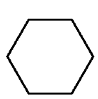 | — | 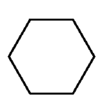 | — | F | H | $OC_5H_{11}$ | |

TABLE 7-continued

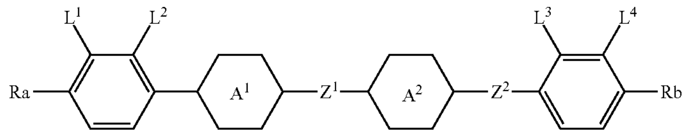

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 93 | $CH_2{=}CHCH_2O$ | F | F | 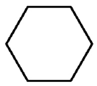 | — | 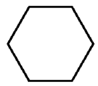 | — | F | H | $OC_3H_7$ | |
| 94 | $CH_2{=}CHC_2H_5O$ | F | F | 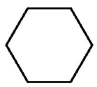 | — | 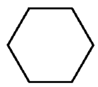 | — | F | H | $OC_5H_{11}$ | |
| 95 | $CH_2{=}CHC_2H_5O$ | F | F | 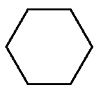 | — | 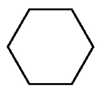 | — | F | H | $OC_2H_5$ | |
| 96 | $CH_2{=}CHC_2H_5O$ | F | F | 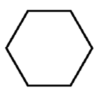 | — | 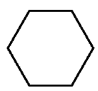 | — | F | H | $OC_3H_7$ | |
| 97 | $CH_3CH{=}CHCH_2O$ | F | F | 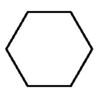 | — | 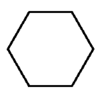 | — | F | H | $OCH_3$ | |
| 98 | $CH_3CH{=}CHCH_2O$ | F | F | 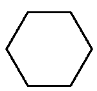 | — | 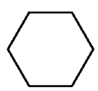 | — | F | H | $OC_2H_5$ | |
| 99 | $C_3H_7O$ | F | F | 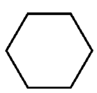 | — | 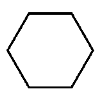 | — | F | H | $OCH{=}CH_2$ | |
| 100 | $C_3H_7O$ | F | F | 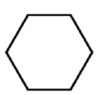 | — | 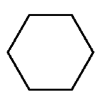 | — | F | H | $OCH_2CH{=}CH_2$ | |
| 101 | $C_4H_9O$ | F | F | 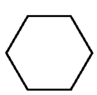 | — | 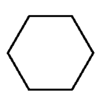 | — | F | H | $OCH_2CH{=}CH_2$ | |
| 102 | $C_5H_{11}O$ | F | F | 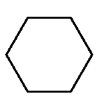 | — | 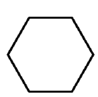 | — | F | H | $OCH_2CH{=}CH_2$ | |
| 103 | $CH_3O$ | F | F | 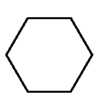 | — | 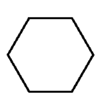 | — | F | H | $OC_2H_5CH{=}CH_2$ | |
| 104 | $C_2H_5O$ | F | F | 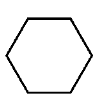 | — | 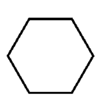 | — | F | H | $OC_2H_5CH{=}CH_2$ | |
| 105 | $C_3H_7O$ | F | F | 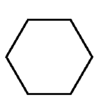 | — | 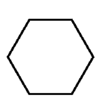 | — | F | H | $OC_2H_5CH{=}CH_2$ | |

TABLE 8
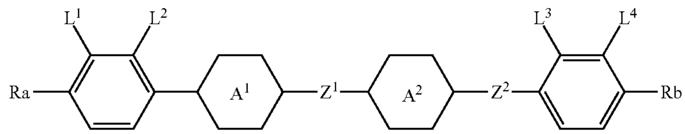
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 106 | $CH_3O$ | F | F | 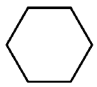 | — | 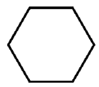 | — | F | H | $OCH_2CH{=}CHCH_3$ | |
| 107 | $C_2H_5O$ | F | F | 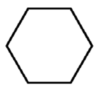 | — | 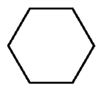 | — | F | H | $OCH_2CH{=}CHCH_3$ | |
| 108 | $C_3H_7O$ | F | F | 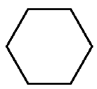 | — | 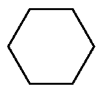 | — | F | H | $OCH_2CH{=}CHCH_3$ | |
| 109 | $CH_2{=}CHCH_2O$ | F | F | 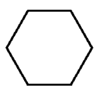 | — | 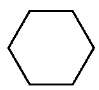 | — | F | H | $OCH{=}CH_2$ | |
| 110 | $CH_2{=}CHC_2H_5O$ | F | F | 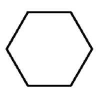 | — | 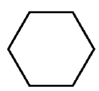 | — | F | H | $OCH_2CH{=}CH_2$ | |
| 111 | $C_3H_7OCH_2$ | F | F | 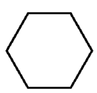 | — | 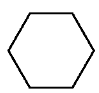 | — | F | H | $OC_3H_7$ | |
| 112 | $C_5H_{11}O$ | F | F | 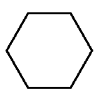 | — | 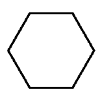 | — | F | H | $OC_2H_5CH{=}CH_2$ | |
| 113 | $C_3H_7O$ | F | F | 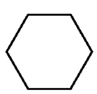 | — | 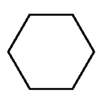 | — | F | H | H | |
| 114 | $C_5H_{11}O$ | F | F | 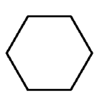 | — | 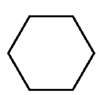 | — | F | H | $OC_9H_{19}$ | |
| 115 | $C_3H_7O$ | F | F | 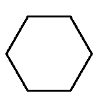 | — | 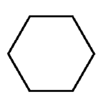 | — | F | H | $C_2H_5$ | |
| 116 | $C_5H_{11}O$ | F | F | 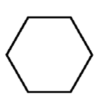 | — | 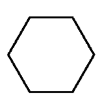 | — | F | H | $C_3H_7$ | |
| 117 | H | F | F | 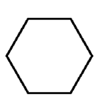 | — | 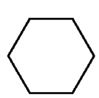 | — | F | H | $OC_4H_9$ | |
| 118 | $C_7H_{15}O$ | F | F | 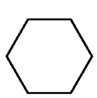 | — | 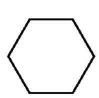 | — | F | H | $OC_4H_9$ | |

TABLE 8-continued

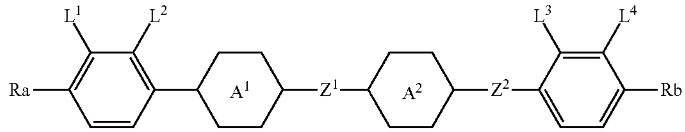

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 119 | $C_2H_5O$ | F | F | 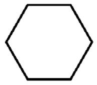 | — | 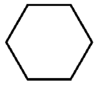 | — | F | H | $OC_6H_{13}$ | |
| 120 | $CH_3O$ | F | F | 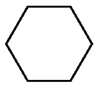 | — | 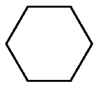 | — | F | H | $C_2H_5$ | |

TABLE 9

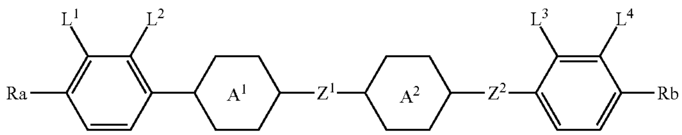

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 121 | $CH_3O$ | F | F | 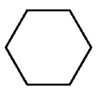 | — | 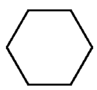 | — | H | F | $OCH_3$ | |
| 122 | $CH_3O$ | F | F | 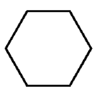 | — | 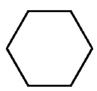 | — | H | F | $OC_2H_5$ | |
| 123 | $CH_3O$ | F | F | 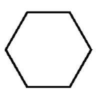 | — | 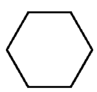 | — | H | F | $OC_3H_7$ | |
| 124 | $CH_3O$ | F | F | 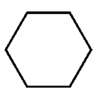 | — | 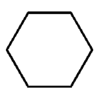 | — | H | F | $OC_4H_9$ | |
| 125 | $CH_3O$ | F | F | 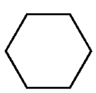 | — | 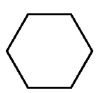 | — | H | F | $OC_5H_{11}$ | |
| 126 | $C_2H_5O$ | F | F | 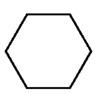 | — | 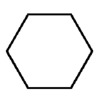 | — | H | F | $OCH_3$ | |
| 127 | $C_2H_5O$ | F | F | 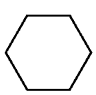 | — | 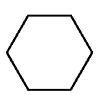 | — | H | F | $OC_2H_5$ | |
| 128 | $C_2H_5O$ | F | F | 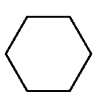 | — | 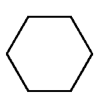 | — | H | F | $OC_3H_7$ | |
| 129 | $C_2H_5O$ | F | F | 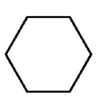 | — | 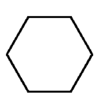 | — | H | F | $OC_4H_9$ | |
| 130 | $C_2H_5O$ | F | F | 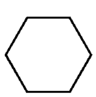 | — | 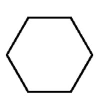 | — | H | F | $OC_5H_{11}$ | |

TABLE 9-continued

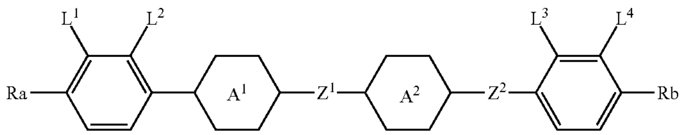

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 131 | $C_3H_7O$ | F | F | 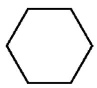 | — | 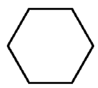 | — | H | F | $OCH_3$ | |
| 132 | $C_3H_7O$ | F | F | 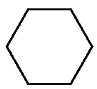 | — | 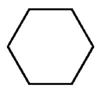 | — | H | F | $OC_2H_5$ | |
| 133 | $C_3H_7O$ | F | F | 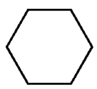 | — | 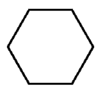 | — | H | F | $OC_3H_7$ | |
| 134 | $C_3H_7O$ | F | F | 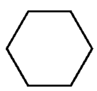 | — | 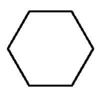 | — | H | F | $OC_4H_9$ | |
| 135 | $C_3H_7O$ | F | F | 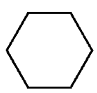 | — | 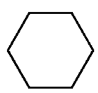 | — | H | F | $OC_5H_{11}$ | |

TABLE 10

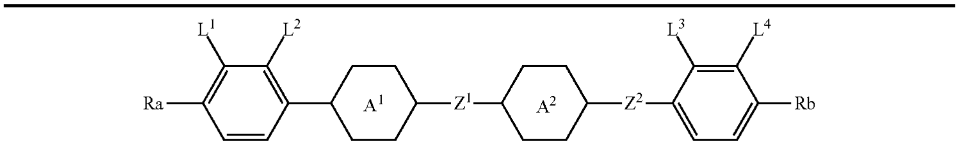

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 136 | $C_4H_9O$ | F | F | 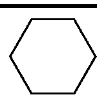 | — | 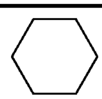 | — | H | F | $OCH_3$ | C 78.2 SB 124.4 SA 160.2 N 297.7 I<br>TNI: 219.9° C., Δϵ: −6.22, Δn: 0.160 |
| 137 | $C_4H_9O$ | F | F | 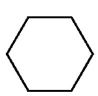 | — | 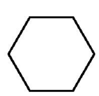 | — | H | F | $OC_2H_5$ | |
| 138 | $C_4H_9O$ | F | F | 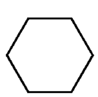 | — | 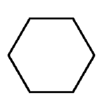 | — | H | F | $OC_3H_7$ | |
| 139 | $C_4H_9O$ | F | F | 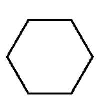 | — | 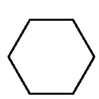 | — | H | F | $OC_4H_9$ | |
| 140 | $C_4H_9O$ | F | F | 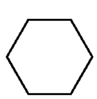 | — | 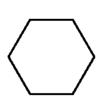 | — | H | F | $OC_5H_{11}$ | |
| 141 | $C_5H_{11}O$ | F | F | 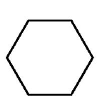 | — | 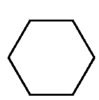 | — | H | F | $OCH_3$ | |

TABLE 10-continued

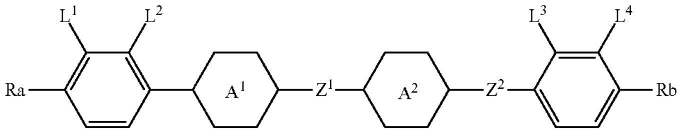

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 142 | $C_5H_{11}O$ | F | F | 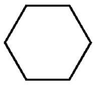 | — | 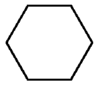 | — | H | F | $OC_2H_5$ | |
| 143 | $C_5H_{11}O$ | F | F | 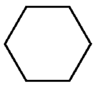 | — | 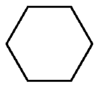 | — | H | F | $OC_3H_7$ | |
| 144 | $C_5H_{11}O$ | F | F | 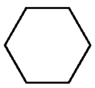 | — | 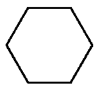 | — | H | F | $OC_4H_9$ | |
| 145 | $C_5H_{11}O$ | F | F | 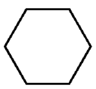 | — | 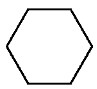 | — | H | F | $OC_5H_{11}$ | |
| 146 | $C_2H_5$ | F | F | 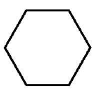 | — | 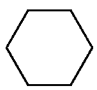 | — | H | F | $C_4H_9$ | |
| 147 | $C_5H_{11}$ | F | F | 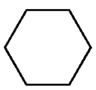 | — | 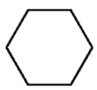 | — | H | F | $C_2H_5$ | |
| 148 | $C_2H_5$ | F | F | 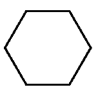 | — | 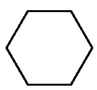 | — | H | F | $OC_4H_9$ | |
| 149 | $CH_2{=}CH$ | F | F | 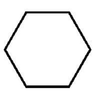 | — | 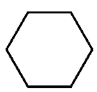 | — | H | F | $OC_3H_7$ | |
| 150 | $CH_2{=}CH$ | F | F | 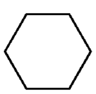 | — | 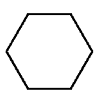 | — | H | F | $OC_5H_{11}$ | |

TABLE 11

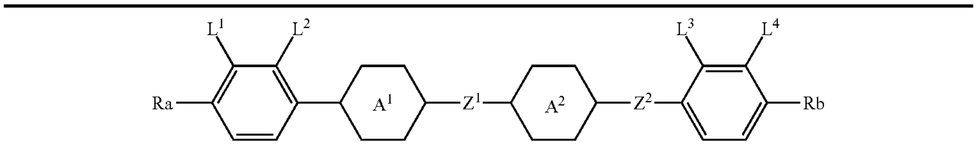

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 151 | $CH_2{=}CHO$ | F | F | 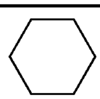 | — | 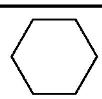 | — | H | F | $OC_3H_7$ | |
| 152 | $CH_2{=}CHCH_2O$ | F | F | 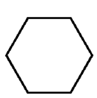 | — | 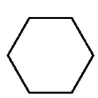 | — | H | F | $OC_5H_{11}$ | |
| 153 | $CH_2{=}CHCH_2O$ | F | F | 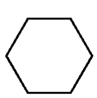 | — | 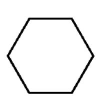 | — | H | F | $OC_3H_7$ | |

TABLE 11-continued

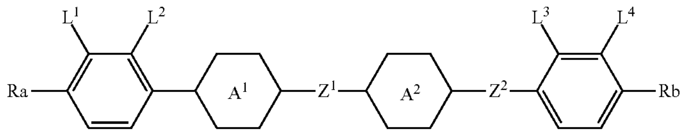

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 154 | $CH_2{=}CHC_2H_5O$ | F | F | 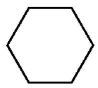 | — | 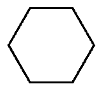 | — | H | F | $OC_5H_{11}$ | |
| 155 | $CH_2{=}CHC_2H_5O$ | F | F | 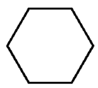 | — | 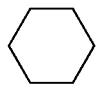 | — | H | F | $OC_2H_5$ | |
| 156 | $CH_2{=}CHC_2H_5O$ | F | F | 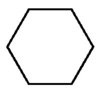 | — | 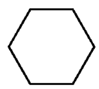 | — | H | F | $OC_3H_7$ | |
| 157 | $CH_3CH{=}CHCH_2O$ | F | F | 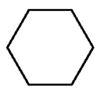 | — | 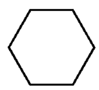 | — | H | F | $OCH_3$ | |
| 158 | $CH_3CH{=}CHCH_2O$ | F | F | 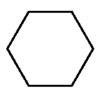 | — | 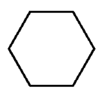 | — | H | F | $OC_2H_5$ | |
| 159 | $C_3H_7O$ | F | F | 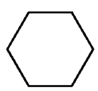 | — | 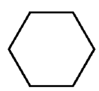 | — | H | F | $OCH{=}CH_2$ | |
| 160 | $C_3H_7O$ | F | F | 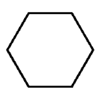 | — | 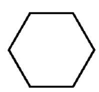 | — | H | F | $OCH_2CH{=}CH_2$ | |
| 161 | $C_4H_9O$ | F | F | 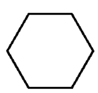 | — | 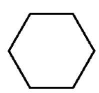 | — | H | F | $OCH_2CH{=}CH_2$ | |
| 162 | $C_5H_{11}O$ | F | F | 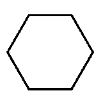 | — | 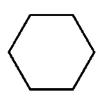 | — | H | F | $OCH_2CH{=}CH_2$ | |
| 163 | $CH_3O$ | F | F | 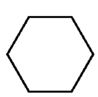 | — | 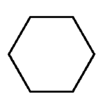 | — | H | F | $OC_2H_5CH{=}CH_2$ | |
| 164 | $C_2H_5O$ | F | F | 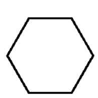 | — | 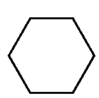 | — | H | F | $OC_2H_5CH{=}CH_2$ | |
| 165 | $C_3H_7O$ | F | F | 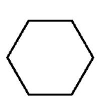 | — | 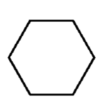 | — | H | F | $OC_2H_5CH{=}CH_2$ | |

TABLE 12
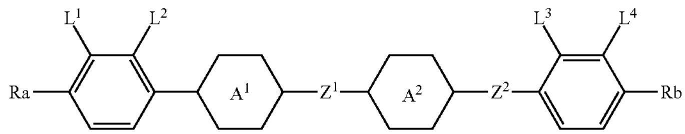
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 166 | $CH_3O$ | F | F | 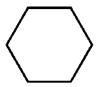 | — | 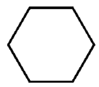 | — | H | F | $OCH_2CH{=}CHCH_3$ | |
| 167 | $C_2H_5O$ | F | F | 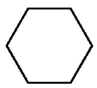 | — | 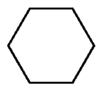 | — | H | F | $OCH_2CH{=}CHCH_3$ | |
| 168 | $C_3H_7O$ | F | F | 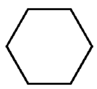 | — | 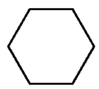 | — | H | F | $OCH_2CH{=}CHCH_3$ | |
| 169 | $CH_2{=}CHCH_2O$ | F | F | 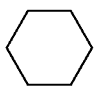 | — | 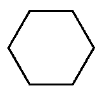 | — | H | F | $OCH{=}CH_2$ | |
| 170 | $CH_2{=}CHC_2H_5O$ | F | F | 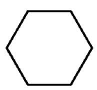 | — | 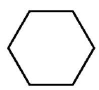 | — | H | F | $OCH_2CH{=}CH_2$ | |
| 171 | $C_3H_7OCH_2$ | F | F | 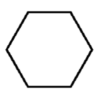 | — | 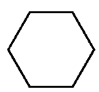 | — | H | F | $OC_3H_7$ | |
| 172 | $C_5H_{11}O$ | F | F | 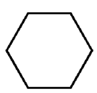 | — | 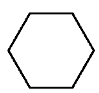 | — | H | F | $OC_2H_5CH{=}CH_2$ | |
| 173 | $C_3H_7O$ | F | F | 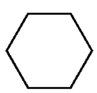 | — | 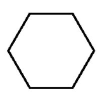 | — | H | F | H | |
| 174 | $C_5H_{11}O$ | F | F | 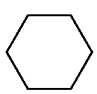 | — | 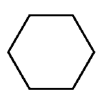 | — | H | F | $OC_9H_{19}$ | |
| 175 | $C_3H_7O$ | F | F | 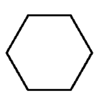 | — | 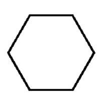 | — | H | F | $C_2H_5$ | |
| 176 | $C_5H_{11}O$ | F | F | 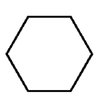 | — | 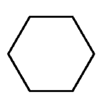 | — | H | F | $C_3H_7$ | |
| 177 | H | F | F | 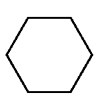 | — | 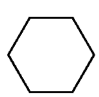 | — | H | F | $OC_4H_9$ | |
| 178 | $C_7H_{15}O$ | F | F | 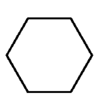 | — | 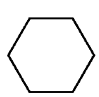 | — | H | F | $OC_4H_9$ | |

TABLE 12-continued

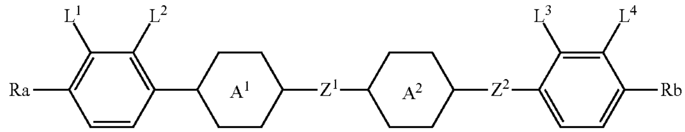

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 179 | $C_2H_5O$ | F | F | 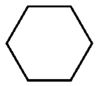 | — | 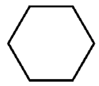 | — | H | F | $OC_6H_{13}$ | |
| 180 | $CH_3O$ | F | F | 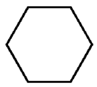 | — | 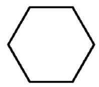 | — | H | F | $C_2H_5$ | |

TABLE 13

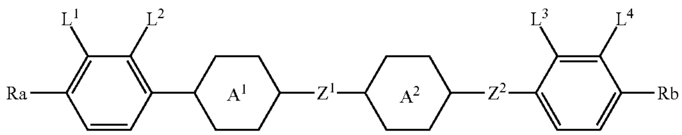

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 181 | $CH_3O$ | F | F | 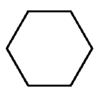 | — | 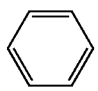 | — | F | F | $OCH_3$ | |
| 182 | $CH_3O$ | F | F | 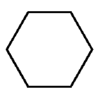 | — | 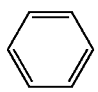 | — | F | F | $OC_2H_5$ | |
| 183 | $CH_3O$ | F | F | 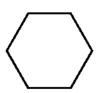 | — |  | — | F | F | $OC_3H_7$ | |
| 184 | $CH_3O$ | F | F | 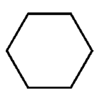 | — | 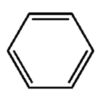 | — | F | F | $OC_4H_9$ | |
| 185 | $CH_3O$ | F | F | 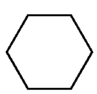 | — | 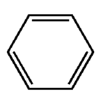 | — | F | F | $OC_5H_{11}$ | |
| 186 | $C_2H_5O$ | F | F | 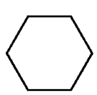 | — | 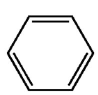 | — | F | F | $OCH_3$ | |
| 187 | $C_2H_5O$ | F | F | 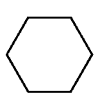 | — | 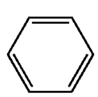 | — | F | F | $OC_2H_5$ | |
| 188 | $C_2H_5O$ | F | F | 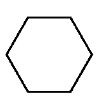 | — | 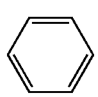 | — | F | F | $OC_3H_7$ | |
| 189 | $C_2H_5O$ | F | F | 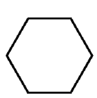 | — | 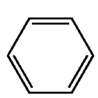 | — | F | F | $OC_4H_9$ | |
| 190 | $C_2H_5O$ | F | F | 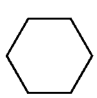 | — | 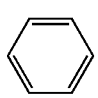 | — | F | F | $OC_5H_{11}$ | |

TABLE 13-continued

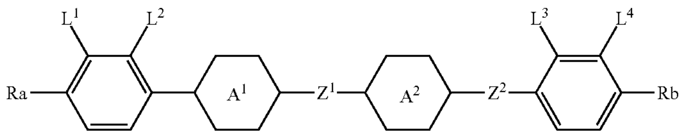

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 191 | $C_3H_7O$ | F | F | 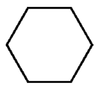 | — | 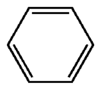 | — | F | F | $OCH_3$ | |
| 192 | $C_3H_7O$ | F | F | 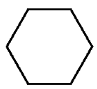 | — |  | — | F | F | $OC_2H_5$ | |
| 193 | $C_3H_7O$ | F | F | 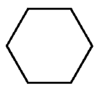 | — | 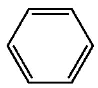 | — | F | F | $OC_3H_7$ | |
| 194 | $C_3H_7O$ | F | F | 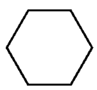 | — |  | — | F | F | $OC_4H_9$ | |
| 195 | $C_3H_7O$ | F | F | 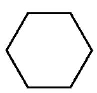 | — | 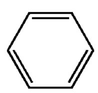 | — | F | F | $OC_5H_{11}$ | |

TABLE 14

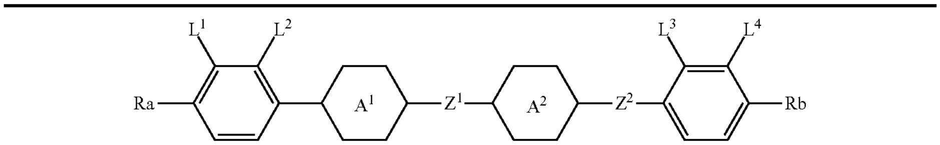

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 196 | $C_4H_9O$ | F | F | 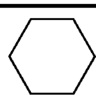 | — | 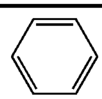 | — | F | F | $OCH_3$ | C 119.0 ($S_A$ 157.3) N 295.0 I $T_{NI}$: 214.6° C., Δϵ: −8.81, Δn: 0.240 |
| 197 | $C_4H_9O$ | F | F | 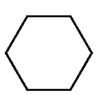 | — | 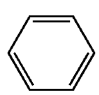 | — | F | F | $OC_2H_5$ | |
| 198 | $C_4H_9O$ | F | F | 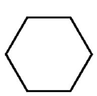 | — | 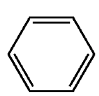 | — | F | F | $OC_3H_7$ | |
| 199 | $C_4H_9O$ | F | F | 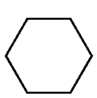 | — | 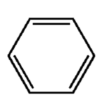 | — | F | F | $OC_4H_9$ | |
| 200 | $C_4H_9O$ | F | F | 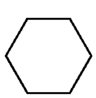 | — | 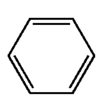 | — | F | F | $OC_5H_{11}$ | |
| 201 | $C_5H_{11}O$ | F | F | 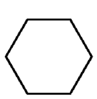 | — | 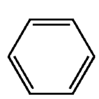 | — | F | F | $OCH_3$ | |

TABLE 14-continued

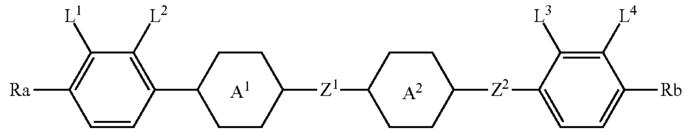

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 202 | $C_5H_{11}O$ | F | F | 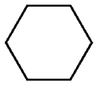 | — | 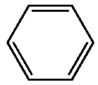 | — | F | F | $OC_2H_5$ | |
| 203 | $C_5H_{11}O$ | F | F | 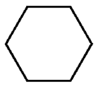 | — | 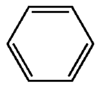 | — | F | F | $OC_3H_7$ | |
| 204 | $C_5H_{11}O$ | F | F | 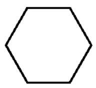 | — | 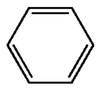 | — | F | F | $OC_4H_9$ | |
| 205 | $C_5H_{11}O$ | F | F | 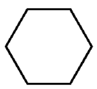 | — | 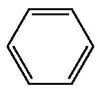 | — | F | F | $OC_5H_{11}$ | |
| 206 | $C_2H_5$ | F | F | 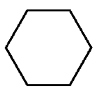 | — | 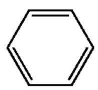 | — | F | F | $C_4H_9$ | |
| 207 | $C_5H_{11}$ | F | F | 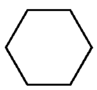 | — |  | — | F | F | $C_2H_5$ | |
| 208 | $C_2H_5$ | F | F | 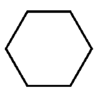 | — |  | — | F | F | $OC_4H_9$ | |
| 209 | $CH_2{=}CH$ | F | F | 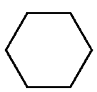 | — |  | — | F | F | $OC_3H_7$ | |
| 210 | $CH_2{=}CH$ | F | F | 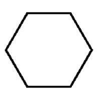 | — |  | — | F | F | $OC_5H_{11}$ | |

TABLE 15

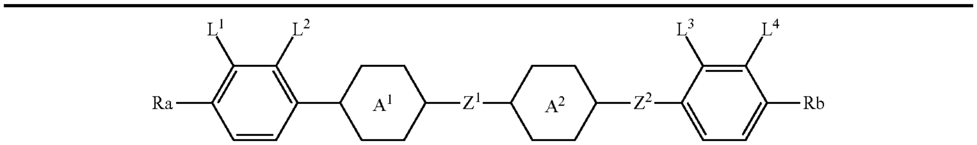

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 211 | $CH_2{=}CHO$ | F | F | 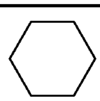 | — | 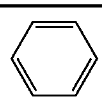 | — | F | F | $OC_3H_7$ | |
| 212 | $CH_2{=}CHCH_2O$ | F | F | 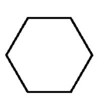 | — | 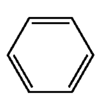 | — | F | F | $OC_5H_{11}$ | |
| 213 | $CH_2{=}CHCH_2O$ | F | F | 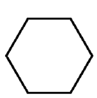 | — | 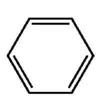 | — | F | F | $OC_3H_7$ | |

TABLE 15-continued

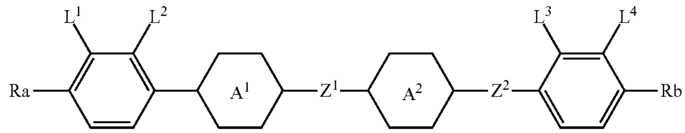

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 214 | $CH_2{=}CHC_2H_5O$ | F | F | 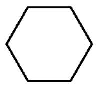 | — | 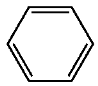 | — | F | F | $OC_5H_{11}$ | |
| 215 | $CH_2{=}CHC_2H_5O$ | F | F | 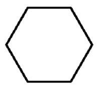 | — | 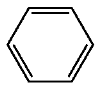 | — | F | F | $OC_2H_5$ | |
| 216 | $CH_2{=}CHC_2H_5O$ | F | F | 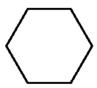 | — | 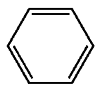 | — | F | F | $OC_3H_7$ | |
| 217 | $CH_3CH{=}CHCH_2O$ | F | F | 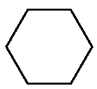 | — | 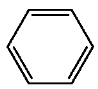 | — | F | F | $OCH_3$ | |
| 218 | $CH_3CH{=}CHCH_2O$ | F | F | 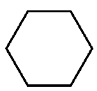 | — |  | — | F | F | $OC_2H_5$ | |
| 219 | $C_3H_7O$ | F | F | 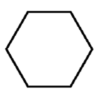 | — |  | — | F | F | $OCH{=}CH_2$ | |
| 220 | $C_3H_7O$ | F | F | 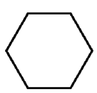 | — | 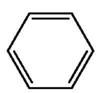 | — | F | F | $OCH_2CH{=}CH_2$ | |
| 221 | $C_4H_9O$ | F | F | 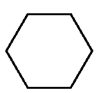 | — | 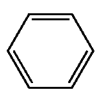 | — | F | F | $OCH_2CH{=}CH_2$ | |
| 222 | $C_5H_{11}O$ | F | F | 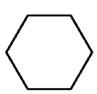 | — | 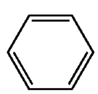 | — | F | F | $OCH_2CH{=}CH_2$ | |
| 223 | $CH_3O$ | F | F | 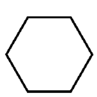 | — | 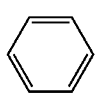 | — | F | F | $OC_2H_5CH{=}CH_2$ | |
| 224 | $C_2H_5O$ | F | F | 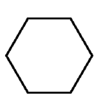 | — | 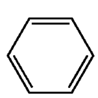 | — | F | F | $OC_2H_5CH{=}CH_2$ | |
| 225 | $C_3H_7O$ | F | F | 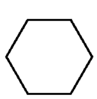 | — | 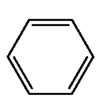 | — | F | F | $OC_2H_5CH{=}CH_2$ | |

TABLE 16
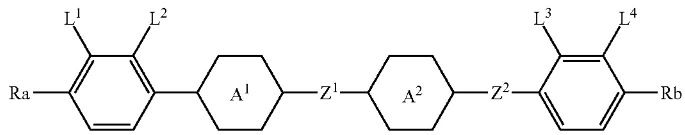
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 226 | $CH_3O$ | F | F | 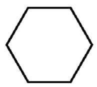 | — | 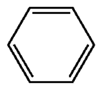 | — | F | F | $OCH_2CH{=}CHCH_3$ | |
| 227 | $C_2H_5O$ | F | F | 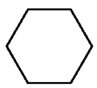 | — | 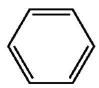 | — | F | F | $OCH_2CH{=}CHCH_3$ | |
| 228 | $C_3H_7O$ | F | F | 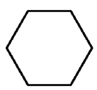 | — | 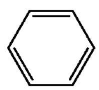 | — | F | F | $OCH_2CH{=}CHCH_3$ | |
| 229 | $CH_2{=}CHCH_2O$ | F | F | 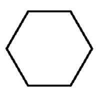 | — | 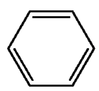 | — | F | F | $OCH{=}CH_2$ | |
| 230 | $CH_2{=}CHC_2H_5O$ | F | F | 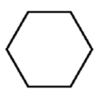 | — | 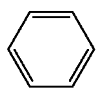 | — | F | F | $OCH_2CH{=}CH_2$ | |
| 231 | $C_3H_7OCH_2$ | F | F | 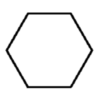 | — | 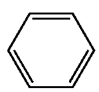 | — | F | F | $OC_3H_7$ | |
| 232 | $C_5H_{11}O$ | F | F | 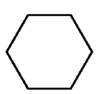 | — | 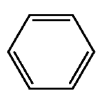 | — | F | F | $OC_2H_5CH{=}CH_2$ | |
| 233 | $C_3H_7O$ | F | F | 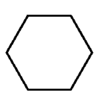 | — | 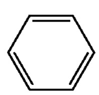 | — | F | F | H | |
| 234 | $C_5H_{11}O$ | F | F | 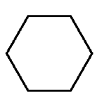 | — | 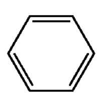 | — | F | F | $OC_9H_{19}$ | |
| 235 | $C_3H_7O$ | F | F | 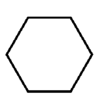 | — | 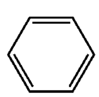 | — | F | F | $C_2H_5$ | |
| 236 | $C_5H_{11}O$ | F | F | 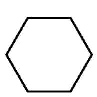 | — | 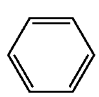 | — | F | F | $C_3H_7$ | |
| 237 | H | F | F | 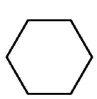 | — | 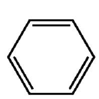 | — | F | F | $OC_4H_9$ | |
| 238 | $C_7H_{15}O$ | F | F | 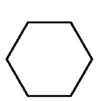 | — | 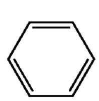 | — | F | F | $OC_4H_9$ | |

TABLE 16-continued
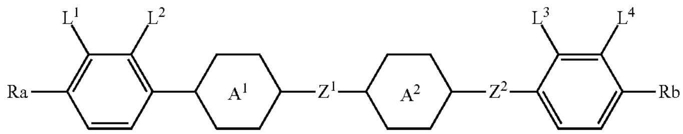
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 239 | $C_2H_5O$ | F | F | 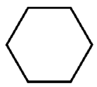 | — | 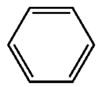 | — | F | F | $OC_6H_{13}$ | |
| 240 | $CH_3O$ | F | F | 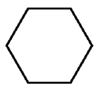 | — | 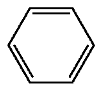 | — | F | F | $C_2H_5$ | |
TABLE 17
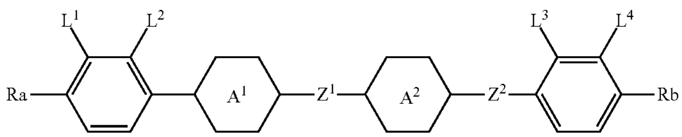
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 241 | $CH_3O$ | F | F | 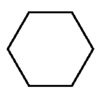 | — |  | — | F | H | $OCH_3$ | |
| 242 | $CH_3O$ | F | F | 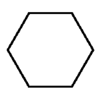 | — | 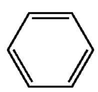 | — | F | H | $OC_2H_5$ | |
| 243 | $CH_3O$ | F | F | 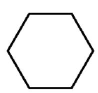 | — | 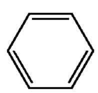 | — | F | H | $OC_3H_7$ | |
| 244 | $CH_3O$ | F | F | 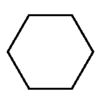 | — | 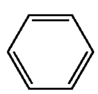 | — | F | H | $OC_4H_9$ | |
| 245 | $CH_3O$ | F | F | 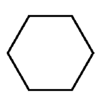 | — | 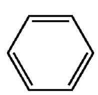 | — | F | H | $OC_5H_{11}$ | |
| 246 | $C_2H_5O$ | F | F | 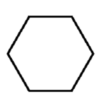 | — | 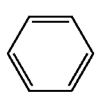 | — | F | H | $OCH_3$ | |
| 247 | $C_2H_5O$ | F | F | 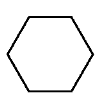 | — | 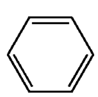 | — | F | H | $OC_2H_5$ | |
| 248 | $C_2H_5O$ | F | F | 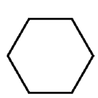 | — | 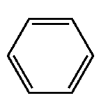 | — | F | H | $OC_3H_7$ | |
| 249 | $C_2H_5O$ | F | F | 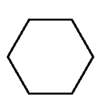 | — | 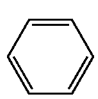 | — | F | H | $OC_4H_9$ | |

TABLE 17-continued
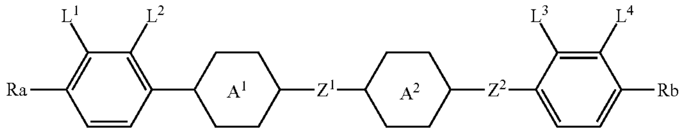
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 250 | $C_2H_5O$ | F | F | 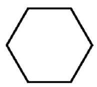 | — | 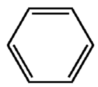 | — | F | H | $OC_5H_{11}$ | |
| 251 | $C_3H_7O$ | F | F | 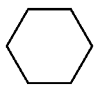 | — | 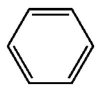 | — | F | H | $OCH_3$ | |
| 252 | $C_3H_7O$ | F | F | 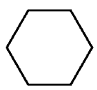 | — | 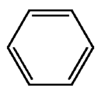 | — | F | H | $OC_2H_5$ | |
| 253 | $C_3H_7O$ | F | F | 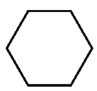 | — |  | — | F | H | $OC_3H_7$ | |
| 254 | $C_3H_7O$ | F | F | 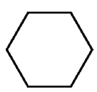 | — | 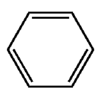 | — | F | H | $OC_4H_9$ | |
| 255 | $C_3H_7O$ | F | F | 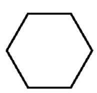 | — | 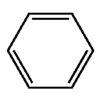 | — | F | H | $OC_5H_{11}$ | |
TABLE 18
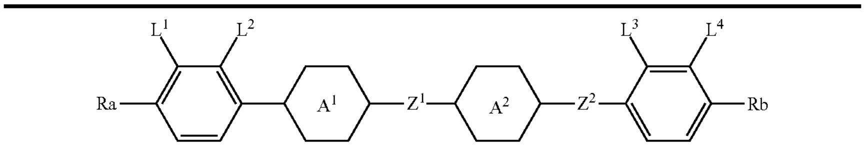
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 256 | $C_4H_9O$ | F | F | 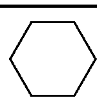 | — | 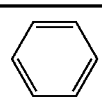 | — | F | H | $OCH_3$ | |
| 257 | $C_4H_9O$ | F | F | 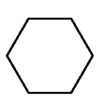 | — | 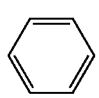 | — | F | H | $OC_2H_5$ | |
| 258 | $C_4H_9O$ | F | F | 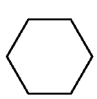 | — | 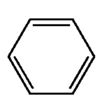 | — | F | H | $OC_3H_7$ | |
| 259 | $C_4H_9O$ | F | F | 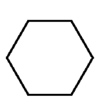 | — | 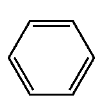 | — | F | H | $OC_4H_9$ | |
| 260 | $C_4H_9O$ | F | F | 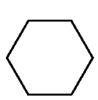 | — | 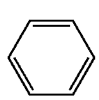 | — | F | H | $OC_5H_{11}$ | |

TABLE 18-continued
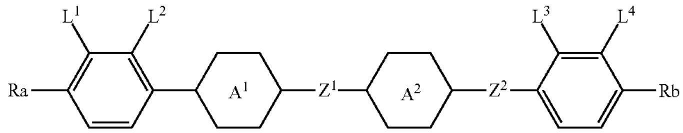
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 261 | $C_5H_{11}O$ | F | F | 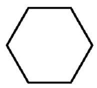 | — | 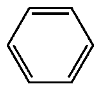 | — | F | H | $OCH_3$ | |
| 262 | $C_5H_{11}O$ | F | F | 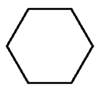 | — | 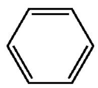 | — | F | H | $OC_2H_5$ | |
| 263 | $C_5H_{11}O$ | F | F | 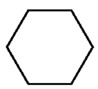 | — | 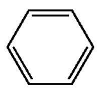 | — | F | H | $OC_3H_7$ | |
| 264 | $C_5H_{11}O$ | F | F | 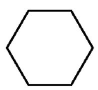 | — |  | — | F | H | $OC_4H_9$ | |
| 265 | $C_5H_{11}O$ | F | F | 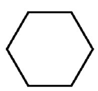 | — |  | — | F | H | $OC_5H_{11}$ | |
| 266 | $C_2H_5$ | F | F | 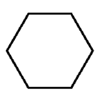 | — | 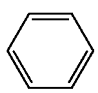 | — | F | H | $C_4H_9$ | |
| 267 | $C_5H_{11}$ | F | F | 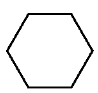 | — | 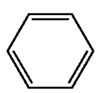 | — | F | H | $C_2H_5$ | |
| 268 | $C_2H_5$ | F | F | 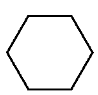 | — | 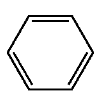 | — | F | H | $OC_4H_9$ | |
| 269 | $CH_2{=}CH$ | F | F | 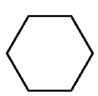 | — | 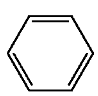 | — | F | H | $OC_3H_7$ | |
| 270 | $CH_2{=}CH$ | F | F | 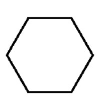 | — | 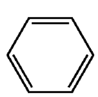 | — | F | H | $OC_5H_{11}$ | |
TABLE 19
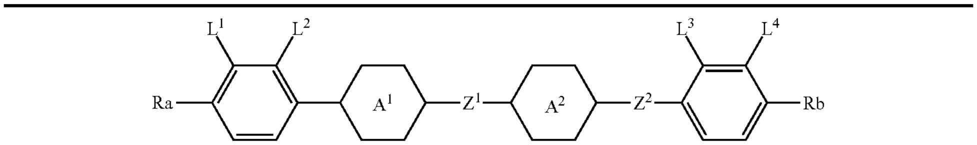
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 271 | $CH_2{=}CHO$ | F | F | 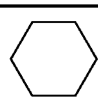 | — | 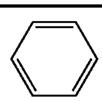 | — | F | H | $OC_3H_7$ | |

TABLE 19-continued

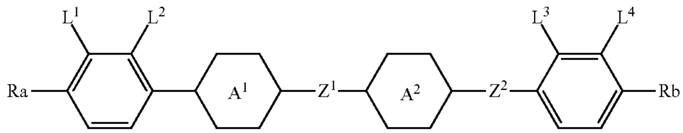

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 272 | $CH_2$═$CHCH_2O$ | F | F | 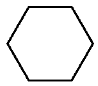 | — | 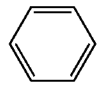 | — | F | H | $OC_5H_{11}$ | |
| 273 | $CH_2$═$CHCH_2O$ | F | F | 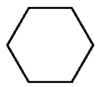 | — | 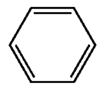 | — | F | H | $OC_3H_7$ | |
| 274 | $CH_2$═$CHC_2H_5O$ | F | F | 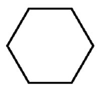 | — | 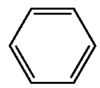 | — | F | H | $OC_5H_{11}$ | |
| 275 | $CH_2$═$CHC_2H_5O$ | F | F | 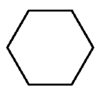 | — | 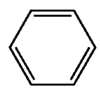 | — | F | H | $OC_2H_5$ | |
| 276 | $CH_2$═$CHC_2H_5O$ | F | F | 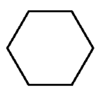 | — | 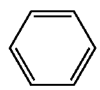 | — | F | H | $OC_3H_7$ | |
| 277 | $CH_3CH$═$CHCH_2O$ | F | F | 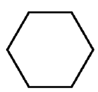 | — | 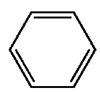 | — | F | H | $OCH_3$ | |
| 278 | $CH_3CH$═$CHCH_2O$ | F | F | 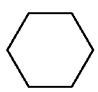 | — | 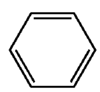 | — | F | H | $OC_2H_5$ | |
| 279 | $C_3H_7O$ | F | F | 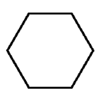 | — | 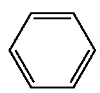 | — | F | H | $OCH$═$CH_2$ | |
| 280 | $C_3H_7O$ | F | F | 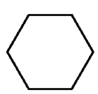 | — | 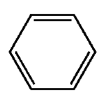 | — | F | H | $OCH_2CH$═$CH_2$ | |
| 281 | $C_4H_9O$ | F | F | 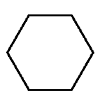 | — | 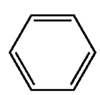 | — | F | H | $OCH_2CH$═$CH_2$ | |
| 282 | $C_5H_{11}O$ | F | F | 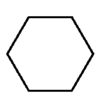 | — | 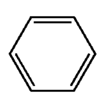 | — | F | H | $OCH_2CH$═$CH_2$ | |
| 283 | $CH_3O$ | F | F | 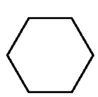 | — | 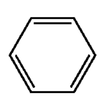 | — | F | H | $OC_2H_5CH$═$CH_2$ | |
| 284 | $C_2H_5O$ | F | F | 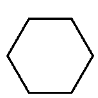 | — | 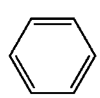 | — | F | H | $OC_2H_5CH$═$CH_2$ | |
| 285 | $C_3H_7O$ | F | F | 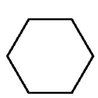 | — | 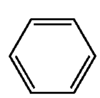 | — | F | H | $OC_2H_5CH$═$CH_2$ | |

TABLE 20
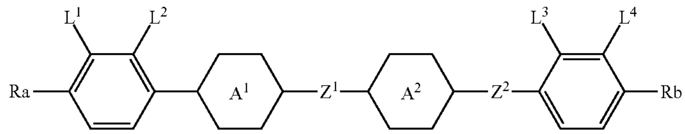
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 286 | $CH_3O$ | F | F | 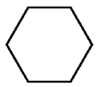 | — |  | — | F | H | $OCH_2CH{=}CHCH_3$ | |
| 287 | $C_2H_5O$ | F | F | 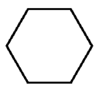 | — |  | — | F | H | $OCH_2CH{=}CHCH_3$ | |
| 288 | $C_3H_7O$ | F | F | 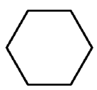 | — | 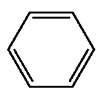 | — | F | H | $OCH_2CH{=}CHCH_3$ | |
| 289 | $CH_2{=}CHCH_2O$ | F | F | 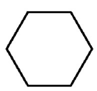 | — | 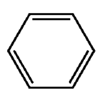 | — | F | H | $OCH{=}CH_2$ | |
| 290 | $CH_2{=}CHC_2H_5O$ | F | F | 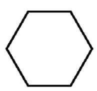 | — | 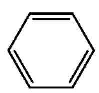 | — | F | H | $OCH_2CH{=}CH_2$ | |
| 291 | $C_3H_7OCH_2$ | F | F | 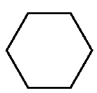 | — | 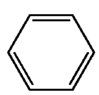 | — | F | H | $OC_3H_7$ | |
| 292 | $C_5H_{11}O$ | F | F | 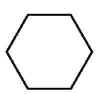 | — | 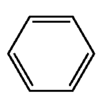 | — | F | H | $OC_2H_5CH{=}CH_2$ | |
| 293 | $C_3H_7O$ | F | F | 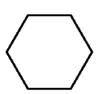 | — | 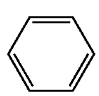 | — | F | H | H | |
| 294 | $C_5H_{11}O$ | F | F | 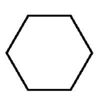 | — | 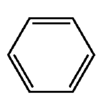 | — | F | H | $OC_9H_{19}$ | |
| 295 | $C_3H_7O$ | F | F | 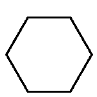 | — | 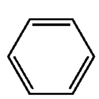 | — | F | H | $C_2H_5$ | |
| 296 | $C_5H_{11}O$ | F | F | 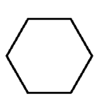 | — | 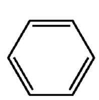 | — | F | H | $C_3H_7$ | |
| 297 | H | F | F | 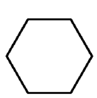 | — | 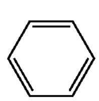 | — | F | H | $OC_4H_9$ | |
| 298 | $C_7H_{15}O$ | F | F | 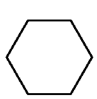 | — | 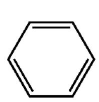 | — | F | H | $OC_4H_9$ | |

TABLE 20-continued
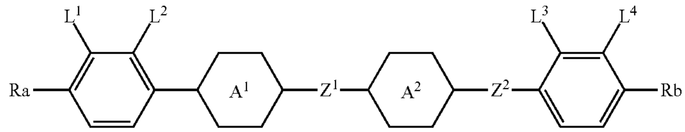
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 299 | $C_2H_5O$ | F | F | 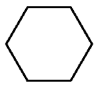 | — | 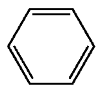 | — | F | H | $OC_6H_{13}$ | |
| 300 | $CH_3O$ | F | F | 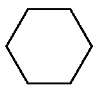 | — |  | — | F | H | $C_2H_5$ | |
TABLE 21
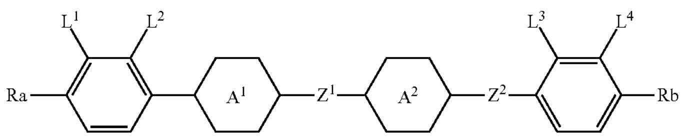
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 301 | $CH_3O$ | F | F | 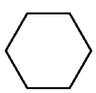 | — |  | — | H | F | $OCH_3$ | |
| 302 | $CH_3O$ | F | F | 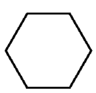 | — |  | — | H | F | $OC_2H_5$ | |
| 303 | $CH_3O$ | F | F | 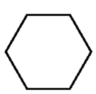 | — |  | — | H | F | $OC_3H_7$ | |
| 304 | $CH_3O$ | F | F | 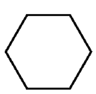 | — | 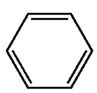 | — | H | F | $OC_4H_9$ | |
| 305 | $CH_3O$ | F | F | 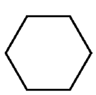 | — | 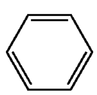 | — | H | F | $OC_5H_{11}$ | |
| 306 | $C_2H_5O$ | F | F | 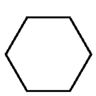 | — | 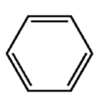 | — | H | F | $OCH_3$ | |
| 307 | $C_2H_5O$ | F | F | 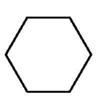 | — | 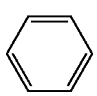 | — | H | F | $OC_2H_5$ | |
| 308 | $C_2H_5O$ | F | F | 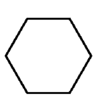 | — | 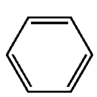 | — | H | F | $OC_3H_7$ | |
| 309 | $C_2H_5O$ | F | F | 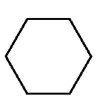 | — | 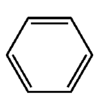 | — | H | F | $OC_4H_9$ | |

TABLE 21-continued

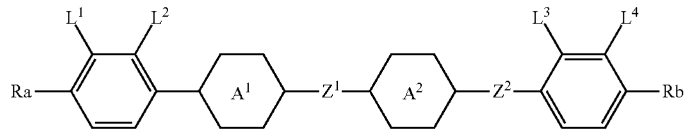

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 310 | $C_2H_5O$ | F | F | 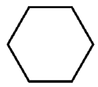 | — | 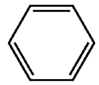 | — | H | F | $OC_5H_{11}$ | |
| 311 | $C_3H_7O$ | F | F | 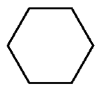 | — | 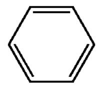 | — | H | F | $OCH_3$ | |
| 312 | $C_3H_7O$ | F | F | 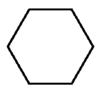 | — | 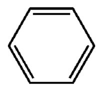 | — | H | F | $OC_2H_5$ | |
| 313 | $C_3H_7O$ | F | F | 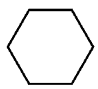 | — | 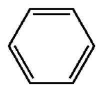 | — | H | F | $OC_3H_7$ | |
| 314 | $C_3H_7O$ | F | F | 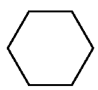 | — | 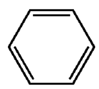 | — | H | F | $OC_4H_9$ | |
| 315 | $C_3H_7O$ | F | F | 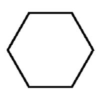 | — | 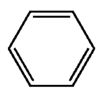 | — | H | F | $OC_5H_{11}$ | |

TABLE 22

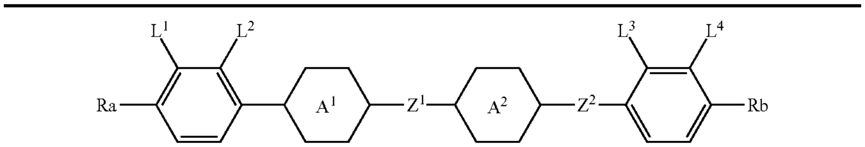

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 316 | $C_4H_9O$ | F | F | 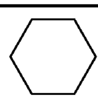 | — | 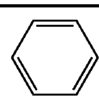 | — | H | F | $OCH_3$ | |
| 317 | $C_4H_9O$ | F | F | 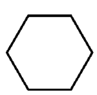 | — | 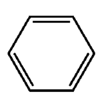 | — | H | F | $OC_2H_5$ | |
| 318 | $C_4H_9O$ | F | F | 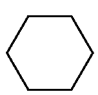 | — | 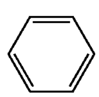 | — | H | F | $OC_3H_7$ | |
| 319 | $C_4H_9O$ | F | F | 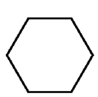 | — | 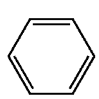 | — | H | F | $OC_4H_9$ | |
| 320 | $C_4H_9O$ | F | F | 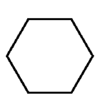 | — | 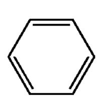 | — | H | F | $OC_5H_{11}$ | |
| 321 | $C_5H_{11}O$ | F | F | 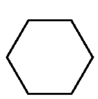 | — | 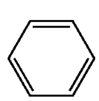 | — | H | F | $OCH_3$ | |

TABLE 22-continued

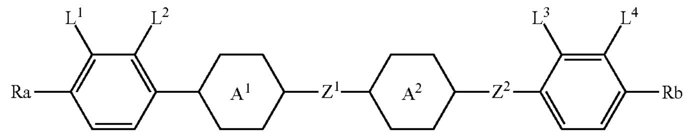

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 322 | $C_5H_{11}O$ | F | F | 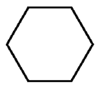 | — | 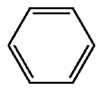 | — | H | F | $OC_2H_5$ | |
| 323 | $C_5H_{11}O$ | F | F | 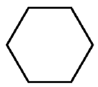 | — | 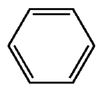 | — | H | F | $OC_3H_7$ | |
| 324 | $C_5H_{11}O$ | F | F | 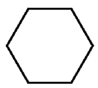 | — | 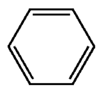 | — | H | F | $OC_4H_9$ | |
| 325 | $C_5H_{11}O$ | F | F | 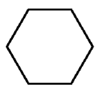 | — | 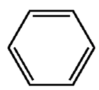 | — | H | F | $OC_5H_{11}$ | |
| 326 | $C_2H_5$ | F | F | 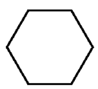 | — | 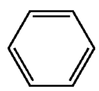 | — | H | F | $C_4H_9$ | |
| 327 | $C_5H_{11}$ | F | F | 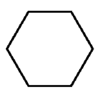 | — |  | — | H | F | $C_2H_5$ | |
| 328 | $C_2H_5$ | F | F | 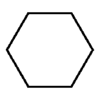 | — | 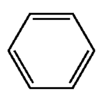 | — | H | F | $OC_4H_9$ | |
| 329 | $CH_2{=}CH$ | F | F | 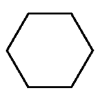 | — | 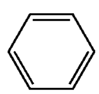 | — | H | F | $OC_3H_7$ | |
| 330 | $CH_2{=}CH$ | F | F | 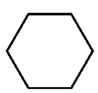 | — | 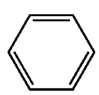 | — | H | F | $OC_5H_{11}$ | |

TABLE 23

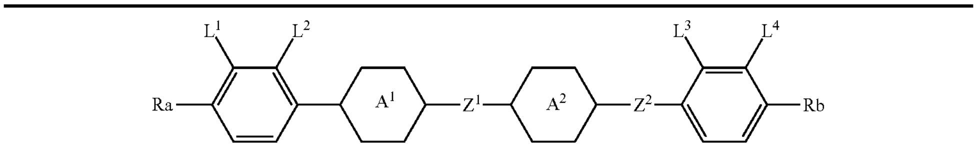

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 331 | $CH_2{=}CHO$ | F | F | 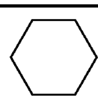 | — | 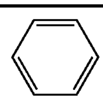 | — | H | F | $OC_3H_7$ | |
| 332 | $CH_2{=}CHCH_2O$ | F | F | 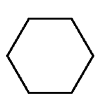 | — | 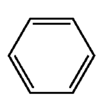 | — | H | F | $OC_5H_{11}$ | |

TABLE 23-continued

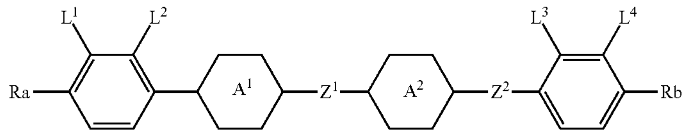

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 333 | $CH_2{=}CHCH_2O$ | F | F | 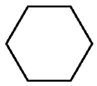 | — |  | — | H | F | $OC_3H_7$ | |
| 334 | $CH_2{=}CHC_2H_5O$ | F | F | 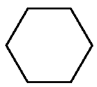 | — | 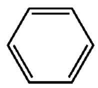 | — | H | F | $OC_5H_{11}$ | |
| 335 | $CH_2{=}CHC_2H_5O$ | F | F | 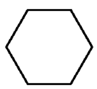 | — |  | — | H | F | $OC_2H_5$ | |
| 336 | $CH_2{=}CHC_2H_5O$ | F | F | 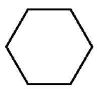 | — |  | — | H | F | $OC_3H_7$ | |
| 337 | $CH_3CH{=}CHCH_2O$ | F | F | 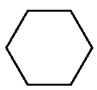 | — | 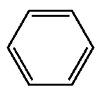 | — | H | F | $OCH_3$ | |
| 338 | $CH_3CH{=}CHCH_2O$ | F | F | 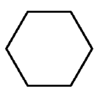 | — | 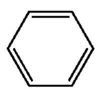 | — | H | F | $OC_2H_5$ | |
| 339 | $C_3H_7O$ | F | F | 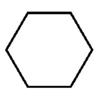 | — | 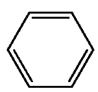 | — | H | F | $OCH{=}CH_2$ | |
| 340 | $C_3H_7O$ | F | F | 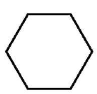 | — | 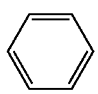 | — | H | F | $OCH_2CH{=}CH_2$ | |
| 341 | $C_4H_9O$ | F | F | 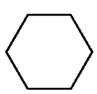 | — | 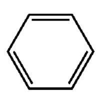 | — | H | F | $OCH_2CH{=}CH_2$ | |
| 342 | $C_5H_{11}O$ | F | F | 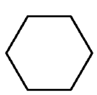 | — | 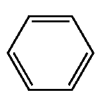 | — | H | F | $OCH_2CH{=}CH_2$ | |
| 343 | $CH_3O$ | F | F | 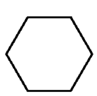 | — | 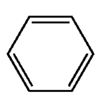 | — | H | F | $OC_2H_5CH{=}CH_2$ | |
| 344 | $C_2H_5O$ | F | F | 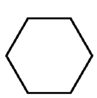 | — | 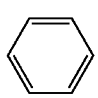 | — | H | F | $OC_2H_5CH{=}CH_2$ | |
| 345 | $C_3H_7O$ | F | F | 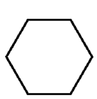 | — | 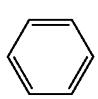 | — | H | F | $OC_2H_5CH{=}CH_2$ | |

TABLE 24
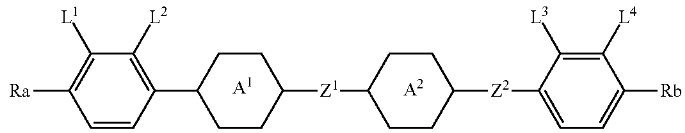
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 346 | $CH_3O$ | F | F | 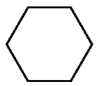 | — | 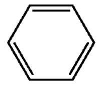 | — | H | F | $OCH_2CH{=}CHCH_3$ | |
| 347 | $C_2H_5O$ | F | F | 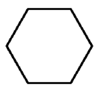 | — | 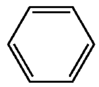 | — | H | F | $OCH_2CH{=}CHCH_3$ | |
| 348 | $C_3H_7O$ | F | F | 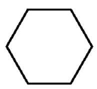 | — | 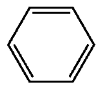 | — | H | F | $OCH_2CH{=}CHCH_3$ | |
| 349 | $CH_2{=}CHCH_2O$ | F | F | 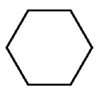 | — | 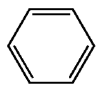 | — | H | F | $OCH{=}CH_2$ | |
| 350 | $CH_2{=}CHC_2H_5O$ | F | F | 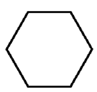 | — | 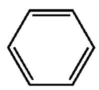 | — | H | F | $OCH_2CH{=}CH_2$ | |
| 351 | $C_3H_7OCH_2$ | F | F | 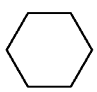 | — |  | — | H | F | $OC_3H_7$ | |
| 352 | $C_5H_{11}O$ | F | F | 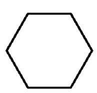 | — | 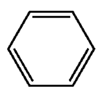 | — | H | F | $OC_2H_5CH{=}CH_2$ | |
| 353 | $C_3H_7O$ | F | F | 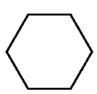 | — | 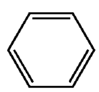 | — | H | F | H | |
| 354 | $C_5H_{11}O$ | F | F | 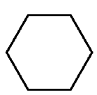 | — | 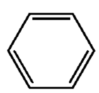 | — | H | F | $OC_9H_{19}$ | |
| 355 | $C_3H_7O$ | F | F | 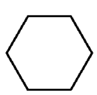 | — | 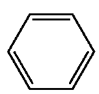 | — | H | F | $C_2H_5$ | |
| 356 | $C_5H_{11}O$ | F | F | 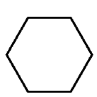 | — | 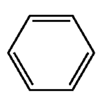 | — | H | F | $C_3H_7$ | |
| 357 | H | F | F | 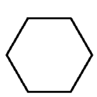 | — | 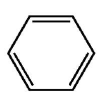 | — | H | F | $OC_4H_9$ | |
| 358 | $C_7H_{15}O$ | F | F | 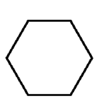 | — | 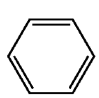 | — | H | F | $OC_4H_9$ | |

TABLE 24-continued
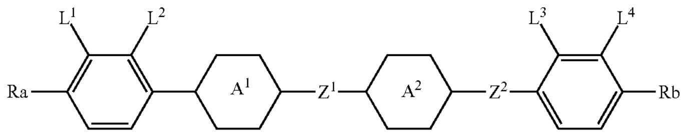
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 359 | $C_2H_5O$ | F | F | 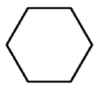 | — | 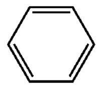 | — | H | F | $OC_6H_{13}$ | |
| 360 | $CH_3O$ | F | F | 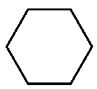 | — | 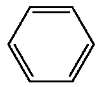 | — | H | F | $C_2H_5$ | |
TABLE 25
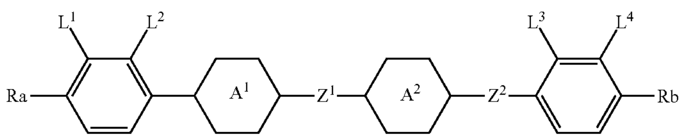
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 361 | $CH_3O$ | F | F | 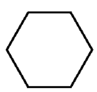 | — | 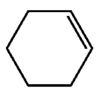 | — | F | F | $OCH_3$ | |
| 362 | $CH_3O$ | F | F | 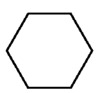 | — | 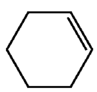 | — | F | F | $OC_2H_5$ | |
| 363 | $CH_3O$ | F | F | 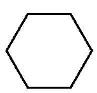 | — | 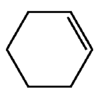 | — | F | F | $OC_3H_7$ | |
| 364 | $CH_3O$ | F | F | 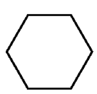 | — | 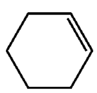 | — | F | F | $OC_4H_9$ | |
| 365 | $CH_3O$ | F | F | 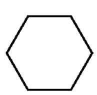 | — | 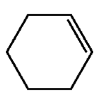 | — | F | F | $OC_5H_{11}$ | |
| 366 | $C_2H_5O$ | F | F | 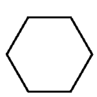 | — | 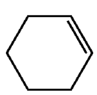 | — | F | F | $OCH_3$ | |
| 367 | $C_2H_5O$ | F | F | 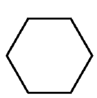 | — | 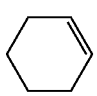 | — | F | F | $OC_2H_5$ | |
| 368 | $C_2H_5O$ | F | F | 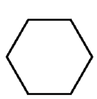 | — | 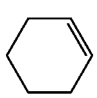 | — | F | F | $OC_3H_7$ | |
| 369 | $C_2H_5O$ | F | F | 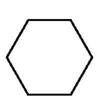 | — | 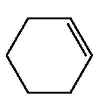 | — | F | F | $OC_4H_9$ | |

TABLE 25-continued

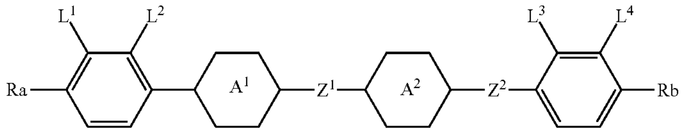

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 370 | $C_2H_5O$ | F | F | 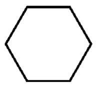 | — | 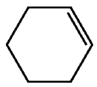 | — | F | F | $OC_5H_{11}$ | |
| 371 | $C_3H_7O$ | F | F | 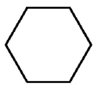 | — | 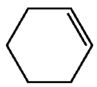 | — | F | F | $OCH_3$ | |
| 372 | $C_3H_7O$ | F | F | 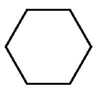 | — | 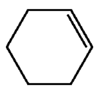 | — | F | F | $OC_2H_5$ | |
| 373 | $C_3H_7O$ | F | F | 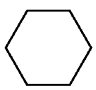 | — | 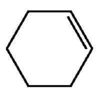 | — | F | F | $OC_3H_7$ | |
| 374 | $C_3H_7O$ | F | F | 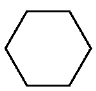 | — | 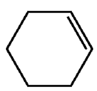 | — | F | F | $OC_4H_9$ | |
| 375 | $C_3H_7O$ | F | F | 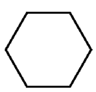 | — | 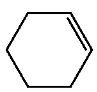 | — | F | F | $OC_5H_{11}$ | |

TABLE 26

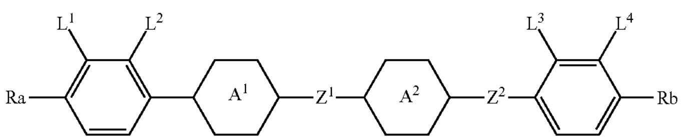

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 376 | $C_4H_9O$ | F | F | 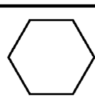 | — | 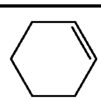 | — | F | F | $OCH_3$ | $C_1$ 65.2 $C_2$ 69.2 $S_A$ 182.9 N 269.5 I $T_{NI}$: 216.6° C. Δε: −9.5 Δn: 0.158 |
| 377 | $C_4H_9O$ | F | F | 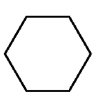 | — | 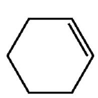 | — | F | F | $OC_2H_5$ | |
| 378 | $C_4H_9O$ | F | F | 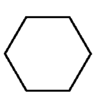 | — | 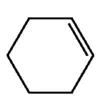 | — | F | F | $OC_3H_7$ | |
| 379 | $C_4H_9O$ | F | F | 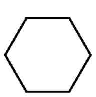 | — | 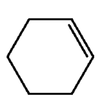 | — | F | F | $OC_4H_9$ | |
| 380 | $C_4H_9O$ | F | F | 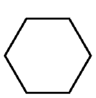 | — | 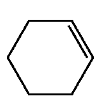 | — | F | F | $OC_5H_{11}$ | |

TABLE 26-continued
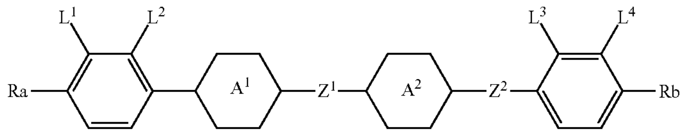
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 381 | $C_5H_{11}O$ | F | F | 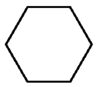 | — | 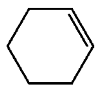 | — | F | F | $OCH_3$ | |
| 382 | $C_5H_{11}O$ | F | F | 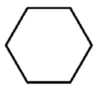 | — | 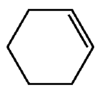 | — | F | F | $OC_2H_5$ | |
| 383 | $C_5H_{11}O$ | F | F | 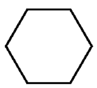 | — | 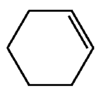 | — | F | F | $OC_3H_7$ | |
| 384 | $C_5H_{11}O$ | F | F | 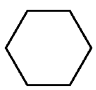 | — | 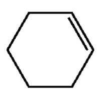 | — | F | F | $OC_4H_9$ | |
| 385 | $C_5H_{11}O$ | F | F | 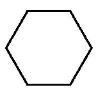 | — | 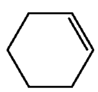 | — | F | F | $OC_5H_{11}$ | |
| 386 | $C_2H_5$ | F | F | 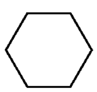 | — | 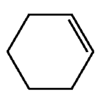 | — | F | F | $C_4H_9$ | |
| 387 | $C_5H_{11}$ | F | F | 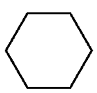 | — | 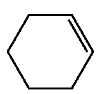 | — | F | F | $C_2H_5$ | |
| 388 | $C_2H_5$ | F | F | 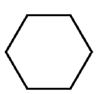 | — | 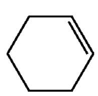 | — | F | F | $OC_4H_9$ | |
| 389 | $CH_2{=}CH$ | F | F | 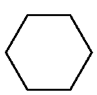 | — | 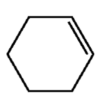 | — | F | F | $OC_3H_7$ | |
| 390 | $CH_2{=}CH$ | F | F | 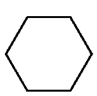 | — | 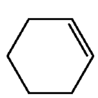 | — | F | F | $OC_5H_{11}$ | |
TABLE 27
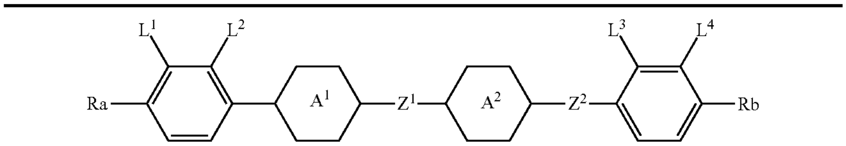
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 391 | $CH_3O$ | F | F | 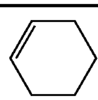 | — | 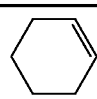 | — | F | F | $OCH_3$ | |

TABLE 27-continued
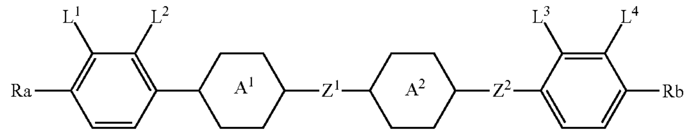
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 392 | $CH_3O$ | F | F | 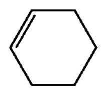 | — | 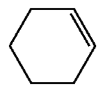 | — | F | F | $OC_2H_5$ | |
| 393 | $CH_3O$ | F | F | 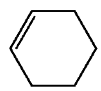 | — | 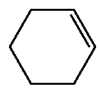 | — | F | F | $OC_3H_7$ | |
| 394 | $CH_3O$ | F | F | 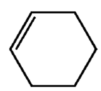 | — | 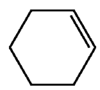 | — | F | F | $OC_4H_9$ | |
| 395 | $CH_3O$ | F | F | 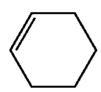 | — | 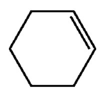 | — | F | F | $OC_5H_{11}$ | |
| 396 | $C_2H_5O$ | F | F | 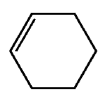 | — | 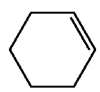 | — | F | F | $OCH_3$ | |
| 397 | $C_2H_5O$ | F | F | 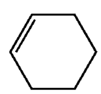 | — | 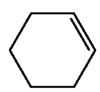 | — | F | F | $OC_2H_5$ | |
| 398 | $C_2H_5O$ | F | F | 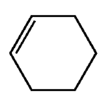 | — | 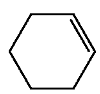 | — | F | F | $OC_3H_7$ | |
| 399 | $C_2H_5O$ | F | F | 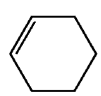 | — | 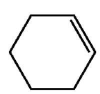 | — | F | F | $OC_4H_9$ | |
| 400 | $C_2H_5O$ | F | F | 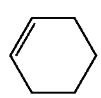 | — | 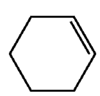 | — | F | F | $OC_5H_{11}$ | |
| 401 | $C_3H_7O$ | F | F | 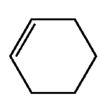 | — | 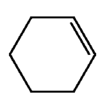 | — | F | F | $OCH_3$ | |
| 402 | $C_3H_7O$ | F | F | 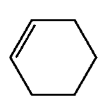 | — | 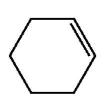 | — | F | F | $OC_2H_5$ | |
| 403 | $C_3H_7O$ | F | F | 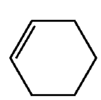 | — | 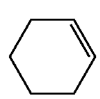 | — | F | F | $OC_3H_7$ | |
| 404 | $C_3H_7O$ | F | F | 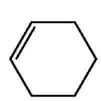 | — | 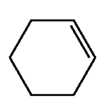 | — | F | F | $OC_4H_9$ | |
| 405 | $C_3H_7O$ | F | F | 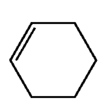 | — | 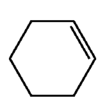 | — | F | F | $OC_5H_{11}$ | |

TABLE 28
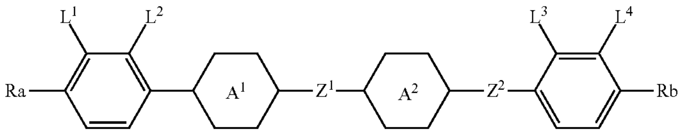
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 406 | $C_4H_9O$ | F | F | 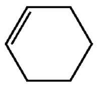 | — | 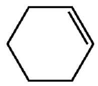 | — | F | F | $OCH_3$ | |
| 407 | $C_4H_9O$ | F | F | 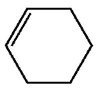 | — | 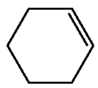 | — | F | F | $OC_2H_5$ | C 87.1 $S_A$ 197.5 N 249.2 I $T_{NI}$: 215.9° C. Δε: −9.5 Δn: 0.193 |
| 408 | $C_4H_9O$ | F | F | 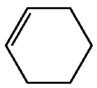 | — | 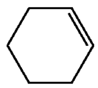 | — | F | F | $OC_3H_7$ | |
| 409 | $C_4H_9O$ | F | F | 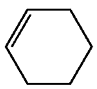 | — | 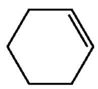 | — | F | F | $OC_4H_9$ | C 58.2 SA 190.3 N 275.4 I TNI: 229.3° C. Δε: −6.39 Δn: 0.180 |
| 410 | $C_4H_9O$ | F | F | 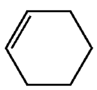 | — | 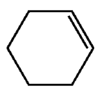 | — | F | F | $OC_5H_{11}$ | C 71.5 SA 125.3 N 272.7 I TNI: 220.6° C. Δε: −5.19 Δn: 0.176 |
| 411 | $C_5H_{11}O$ | F | F | 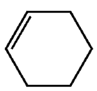 | — | 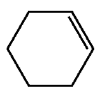 | — | F | F | $OCH_3$ | |
| 412 | $C_5H_{11}O$ | F | F | 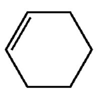 | — | 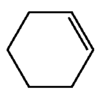 | — | F | F | $OC_2H_5$ | |
| 413 | $C_5H_{11}O$ | F | F | 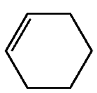 | — | 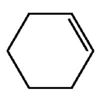 | — | F | F | $OC_3H_7$ | |
| 414 | $C_5H_{11}O$ | F | F | 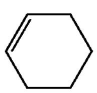 | — | 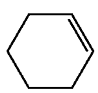 | — | F | F | $OC_4H_9$ | |
| 415 | $C_5H_{11}O$ | F | F | 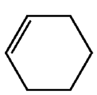 | — | 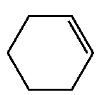 | — | F | F | $OC_5H_{11}$ | |
| 416 | $C_2H_5$ | F | F | 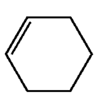 | — | 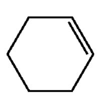 | — | F | F | $C_4H_9$ | |
| 417 | $C_5H_{11}$ | F | F | 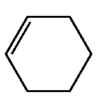 | — | 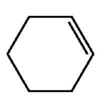 | — | F | F | $C_2H_5$ | |
| 418 | $C_2H_5$ | F | F | 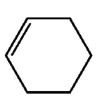 | — | 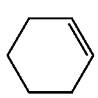 | — | F | F | $OC_4H_9$ | |

TABLE 28-continued
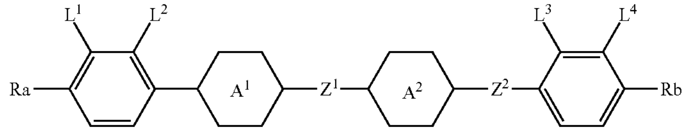
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 419 | $CH_2{=}CH$ | F | F | 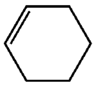 | — | 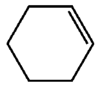 | — | F | F | $OC_3H_7$ | |
| 420 | $CH_2{=}CH$ | F | F | 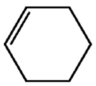 | — | 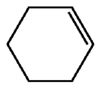 | — | F | F | $OC_5H_{11}$ | |
TABLE 29
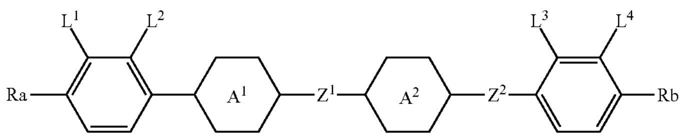
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 421 | $CH_3O$ | F | F | 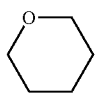 | — | 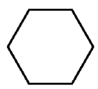 | — | F | F | $OCH_3$ | |
| 422 | $CH_3O$ | F | F | 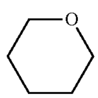 | — | 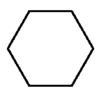 | — | F | F | $OC_2H_5$ | |
| 423 | $CH_3O$ | F | F | 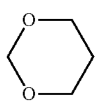 | — | 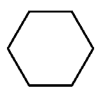 | — | F | F | $OC_3H_7$ | |
| 424 | $CH_3O$ | F | F | 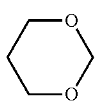 | — | 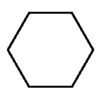 | — | F | F | $OC_4H_9$ | |
| 425 | $CH_3O$ | F | F | 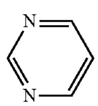 | — | 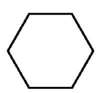 | — | F | F | $OC_5H_{11}$ | |
| 426 | $C_2H_5O$ | F | F | 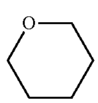 | — | 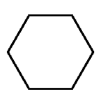 | — | F | F | $OCH_3$ | |
| 427 | $C_2H_5O$ | F | F | 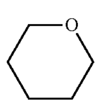 | — | 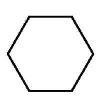 | — | F | F | $OC_2H_5$ | |
| 428 | $C_2H_5O$ | F | F | 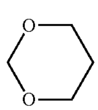 | — | 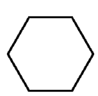 | — | F | F | $OC_3H_7$ | |
| 429 | $C_2H_5O$ | F | F | 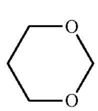 | — | 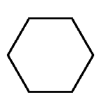 | — | F | F | $OC_4H_9$ | |

TABLE 29-continued
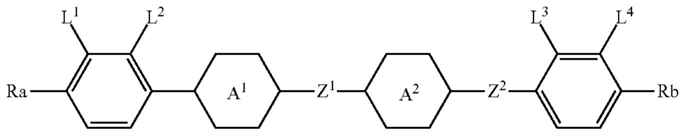
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 430 | $C_2H_5O$ | F | F | 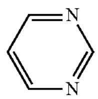 | — | 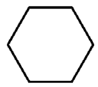 | — | F | F | $OC_5H_{11}$ | |
| 431 | $C_3H_7O$ | F | F | 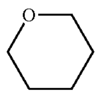 | — | 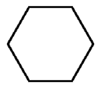 | — | F | F | $OCH_3$ | |
| 432 | $C_3H_7O$ | F | F | 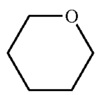 | — | 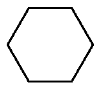 | — | F | F | $OC_2H_5$ | |
| 433 | $C_3H_7O$ | F | F | 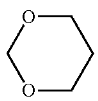 | — | 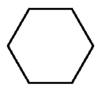 | — | F | F | $OC_3H_7$ | |
| 434 | $C_3H_7O$ | F | F | 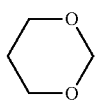 | — | 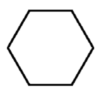 | — | F | F | $OC_4H_9$ | |
| 435 | $C_3H_7O$ | F | F | 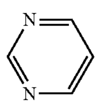 | — | 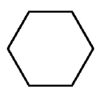 | — | F | F | $OC_5H_{11}$ | |
TABLE 30
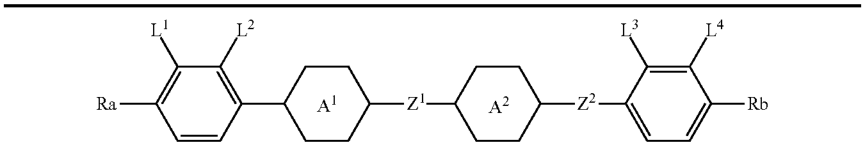
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 436 | $C_4H_9O$ | F | F | 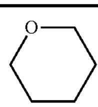 | — | 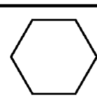 | — | F | F | $OCH_3$ | |
| 437 | $C_4H_9O$ | F | F | 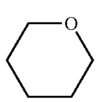 | — | 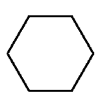 | — | F | F | $OC_2H_5$ | |
| 438 | $C_4H_9O$ | F | F | 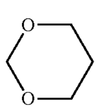 | — | 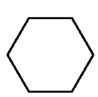 | — | F | F | $OC_3H_7$ | |
| 439 | $C_4H_9O$ | F | F | 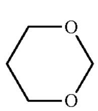 | — | 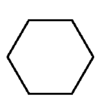 | — | F | F | $OC_4H_9$ | |

TABLE 30-continued
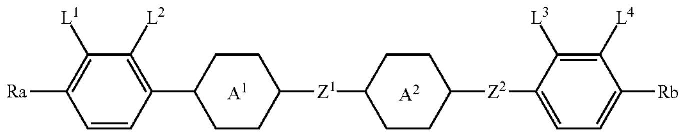
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 440 | $C_4H_9O$ | F | F | 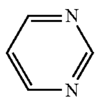 | — | 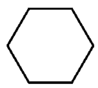 | — | F | F | $OC_5H_{11}$ | |
| 441 | $C_5H_{11}O$ | F | F | 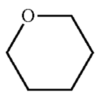 | — | 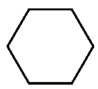 | — | F | F | $OCH_3$ | |
| 442 | $C_5H_{11}O$ | F | F | 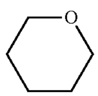 | — | 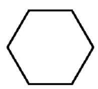 | — | F | F | $OC_2H_5$ | |
| 443 | $C_5H_{11}O$ | F | F | 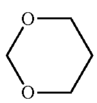 | — | 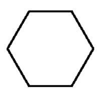 | — | F | F | $OC_3H_7$ | |
| 444 | $C_5H_{11}O$ | F | F | 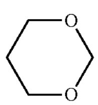 | — | 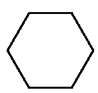 | — | F | F | $OC_4H_9$ | |
| 445 | $C_5H_{11}O$ | F | F | 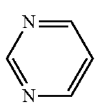 | — | 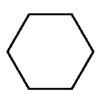 | — | F | F | $OC_5H_{11}$ | |
| 446 | $C_2H_5$ | F | F | 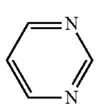 | — | 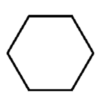 | — | F | F | $C_4H_9$ | |
| 447 | $C_5H_{11}$ | F | F | 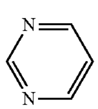 | — | 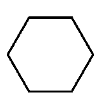 | — | F | F | $C_2H_5$ | |
| 448 | $C_2H_5$ | F | F | 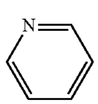 | — | 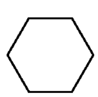 | — | F | F | $OC_4H_9$ | |
| 449 | $CH_2{=}CH$ | F | F | 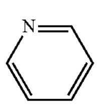 | — | 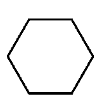 | — | F | F | $OC_3H_7$ | |
| 450 | $CH_2{=}CH$ | F | F | 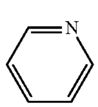 | — | 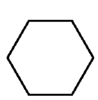 | — | F | F | $OC_5H_{11}$ | |

TABLE 31

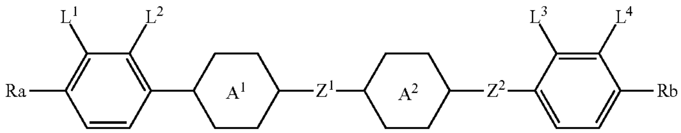

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 451 | $CH_3O$ | F | F | 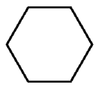 | $CH_2CH_2$ | 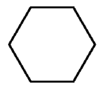 | — | F | F | $OCH_3$ | |
| 452 | $CH_3O$ | F | F | 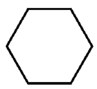 | $CH_2CH_2$ | 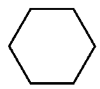 | — | F | F | $OC_2H_5$ | |
| 453 | $CH_3O$ | F | F | 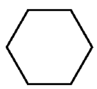 | $CH_2CH_2$ | 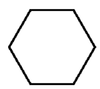 | — | F | F | $OC_3H_7$ | |
| 454 | $CH_3O$ | F | F | 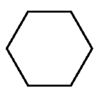 | $CH_2CH_2$ | 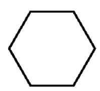 | — | F | F | $OC_4H_9$ | |
| 455 | $CH_3O$ | F | F | 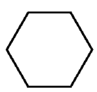 | $CH_2CH_2$ | 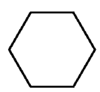 | — | F | F | $OC_5H_{11}$ | |
| 456 | $C_2H_5O$ | F | F | 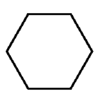 | $CH_2CH_2$ | 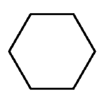 | — | F | F | $OCH_3$ | |
| 457 | $C_2H_5O$ | F | F | 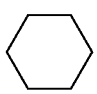 | $CH_2CH_2$ | 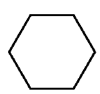 | — | F | F | $OC_2H_5$ | |
| 458 | $C_2H_5O$ | F | F | 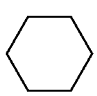 | $CH_2CH_2$ | 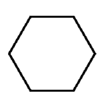 | — | F | F | $OC_3H_7$ | |
| 459 | $C_2H_5O$ | F | F | 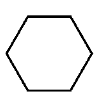 | $CH_2CH_2$ | 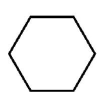 | — | F | F | $OC_4H_9$ | |
| 460 | $C_2H_5O$ | F | F | 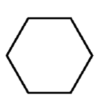 | $CH_2CH_2$ | 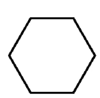 | — | F | F | $OC_5H_{11}$ | |
| 461 | $C_3H_7O$ | F | F | 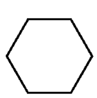 | $CH_2CH_2$ | 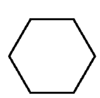 | — | F | F | $OCH_3$ | |
| 462 | $C_3H_7O$ | F | F | 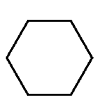 | $CH_2CH_2$ | 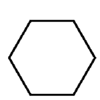 | — | F | F | $OC_2H_5$ | |
| 463 | $C_3H_7O$ | F | F | 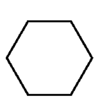 | $CH_2CH_2$ | 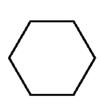 | — | F | F | $OC_3H_7$ | |

TABLE 31-continued

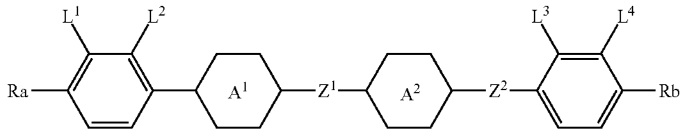

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 464 | $C_3H_7O$ | F | F | 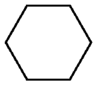 | $CH_2CH_2$ | 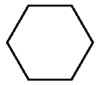 | — | F | F | $OC_4H_9$ | |
| 465 | $C_3H_7O$ | F | F | 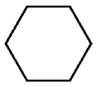 | $CH_2CH_2$ | 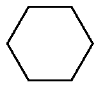 | — | F | F | $OC_5H_{11}$ | |

TABLE 32

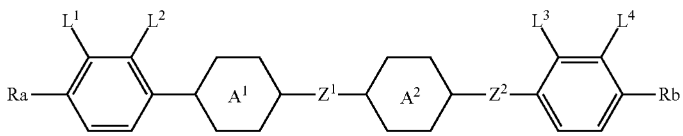

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 466 | $C_4H_9O$ | F | F | 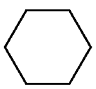 | $CH_2CH_2$ | 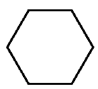 | — | F | F | $OCH_3$ | C 99.4 $S_B$ 116.7 $S_A$ 124.3 N 237.5 I $T_{NI}$: 200.6° C., Δε: −7.52, Δn: 0.127 |
| 467 | $C_4H_9O$ | F | F | 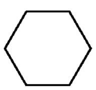 | $CH_2CH_2$ | 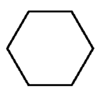 | — | F | F | $OC_2H_5$ | |
| 468 | $C_4H_9O$ | F | F | 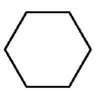 | $CH_2CH_2$ | 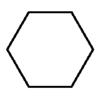 | — | F | F | $OC_3H_7$ | |
| 469 | $C_4H_9O$ | F | F | 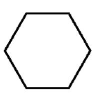 | $CH_2CH_2$ | 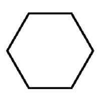 | — | F | F | $OC_4H_9$ | |
| 470 | $C_4H_9O$ | F | F | 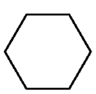 | $CH_2CH_2$ | 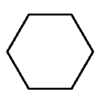 | — | F | F | $OC_5H_{11}$ | |
| 471 | $C_5H_{11}O$ | F | F | 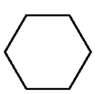 | $CH_2CH_2$ | 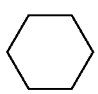 | — | F | F | $OCH_3$ | |
| 472 | $C_5H_{11}O$ | F | F | 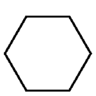 | $CH_2CH_2$ | 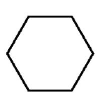 | — | F | F | $OC_2H_5$ | |
| 473 | $C_5H_{11}O$ | F | F | 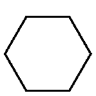 | $CH_2CH_2$ | 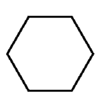 | — | F | F | $OC_3H_7$ | |
| 474 | $C_5H_{11}O$ | F | F | 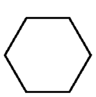 | $CH_2CH_2$ | 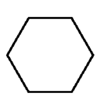 | — | F | F | $OC_4H_9$ | |
| 475 | $C_5H_{11}O$ | F | F | 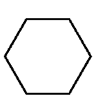 | $CH_2CH_2$ | 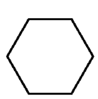 | — | F | F | $OC_5H_{11}$ | |

TABLE 32-continued

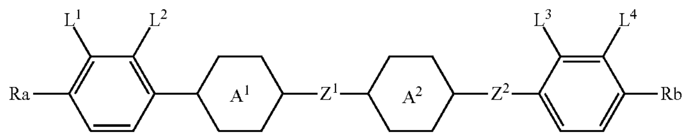

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 476 | $C_2H_5$ | F | F | 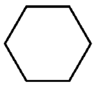 | $CH_2CH_2$ | 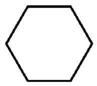 | — | F | F | $C_4H_9$ | |
| 477 | $C_5H_{11}$ | F | F | 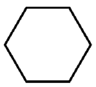 | $CH_2CH_2$ | 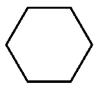 | — | F | F | $C_2H_5$ | |
| 478 | $C_2H_5$ | F | F | 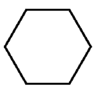 | $CH_2CH_2$ | 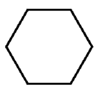 | — | F | F | $OC_4H_9$ | |
| 479 | $CH_2{=}CH$ | F | F | 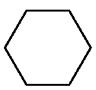 | $CH_2CH_2$ | 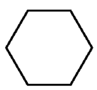 | — | F | F | $OC_3H_7$ | |
| 480 | $CH_2{=}CH$ | F | F | 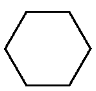 | $CH_2CH_2$ | 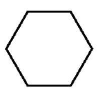 | — | F | F | $OC_5H_{11}$ | |

TABLE 33

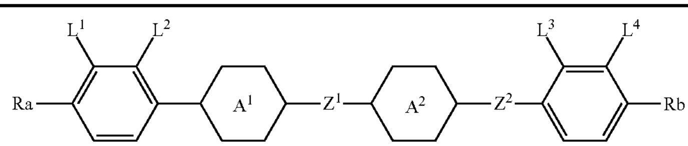

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 481 | $CH_2{=}CHO$ | F | F | 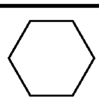 | $CH_2CH_2$ | 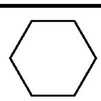 | — | F | F | $OC_3H_7$ | |
| 482 | $CH_2{=}CHCH_2O$ | F | F | 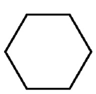 | $CH_2CH_2$ | 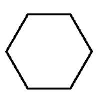 | — | F | F | $OC_5H_{11}$ | |
| 483 | $CH_2{=}CHCH_2O$ | F | F | 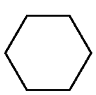 | $CH_2CH_2$ | 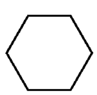 | — | F | F | $OC_3H_7$ | |
| 484 | $CH_2{=}CHC_2H_5O$ | F | F | 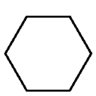 | $CH_2CH_2$ | 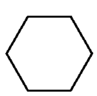 | — | F | F | $OC_5H_{11}$ | |
| 485 | $CH_2{=}CHC_2H_5O$ | F | F | 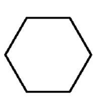 | $CH_2CH_2$ | 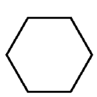 | — | F | F | $OC_2H_5$ | |
| 486 | $CH_2{=}CHC_2H_5O$ | F | F | 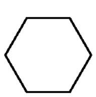 | $CH_2CH_2$ | 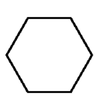 | — | F | F | $OC_3H_7$ | |

TABLE 33-continued

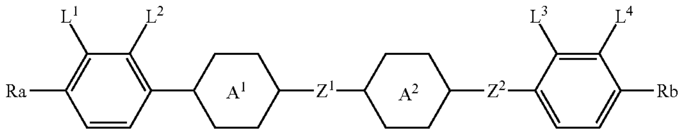

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 487 | $CH_3CH{=}CHCH_2O$ | F | F | 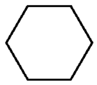 | $CH_2CH_2$ | 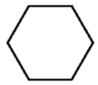 | — | F | F | $OCH_3$ | |
| 488 | $CH_3CH{=}CHCH_2O$ | F | F | 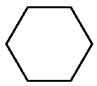 | $CH_2CH_2$ | 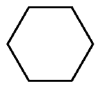 | — | F | F | $OC_2H_5$ | |
| 489 | $C_3H_7O$ | F | F | 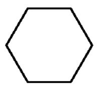 | $CH_2CH_2$ | 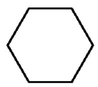 | — | F | F | $OCH{=}CH_2$ | |
| 490 | $C_3H_7O$ | F | F | 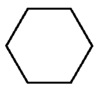 | $CH_2CH_2$ | 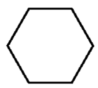 | — | F | F | $OCH_2CH{=}CH_2$ | |
| 491 | $C_4H_9O$ | F | F | 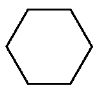 | $CH_2CH_2$ | 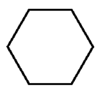 | — | F | F | $OCH_2CH{=}CH_2$ | |
| 492 | $C_5H_{11}O$ | F | F | 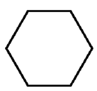 | $CH_2CH_2$ | 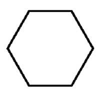 | — | F | F | $OCH_2CH{=}CH_2$ | |
| 493 | $CH_3O$ | F | F | 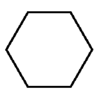 | $CH_2CH_2$ | 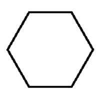 | — | F | F | $OC_2H_5CH{=}CH_2$ | |
| 494 | $C_2H_5O$ | F | F | 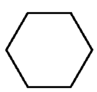 | $CH_2CH_2$ | 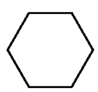 | — | F | F | $OC_2H_5CH{=}CH_2$ | |
| 495 | $C_3H_7O$ | F | F | 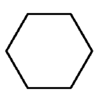 | $CH_2CH_2$ | 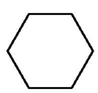 | — | F | F | $OC_2H_5CH{=}CH_2$ | |

TABLE 34

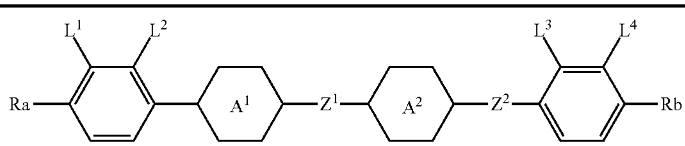

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 496 | $CH_3O$ | F | F | 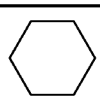 | $CH_2CH_2$ | 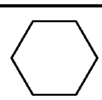 | — | F | F | $OCH_2CH{=}CHCH_3$ | |
| 497 | $C_2H_5O$ | F | F | 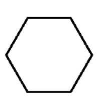 | $CH_2CH_2$ | 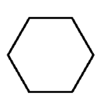 | — | F | F | $OCH_2CH{=}CHCH_3$ | |
| 498 | $C_3H_7O$ | F | F | 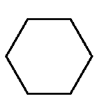 | $CH_2CH_2$ | 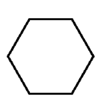 | — | F | F | $OCH_2CH{=}CHCH_3$ | |

TABLE 34-continued

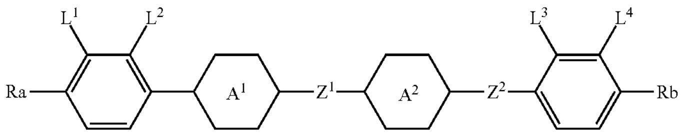

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 499 | $CH_2{=}CHCH_2O$ | F | F | 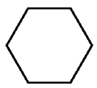 | $CH_2CH_2$ | 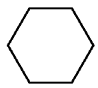 | — | F | F | $OCH{=}CH_2$ | |
| 500 | $CH_2{=}CHC_2H_5O$ | F | F | 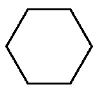 | $CH_2CH_2$ | 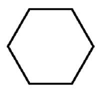 | — | F | F | $OCH_2CH{=}CH_2$ | |
| 501 | $C_3H_7OCH_2$ | F | F | 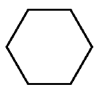 | $CH_2CH_2$ | 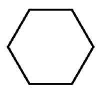 | — | F | F | $OC_3H_7$ | |
| 502 | $C_5H_{11}O$ | F | F | 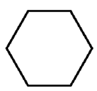 | $CH_2CH_2$ | 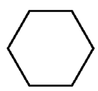 | — | F | F | $OC_2H_5CH{=}CH_2$ | |
| 503 | $C_3H_7O$ | F | F | 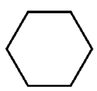 | $CH_2CH_2$ | 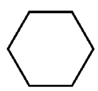 | — | F | F | H | |
| 504 | $C_5H_{11}O$ | F | F | 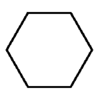 | $CH_2CH_2$ | 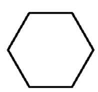 | — | F | F | $OC_9H_{19}$ | |
| 505 | $C_3H_7O$ | F | F | 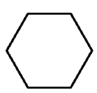 | $CH_2CH_2$ | 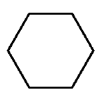 | — | F | F | $C_2H_5$ | |
| 506 | $C_5H_{11}O$ | F | F | 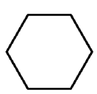 | $CH_2CH_2$ | 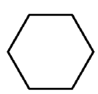 | — | F | F | $C_3H_7$ | |
| 507 | H | F | F | 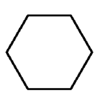 | $CH_2CH_2$ | 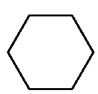 | — | F | F | $OC_4H_9$ | |
| 508 | $C_7H_{15}O$ | F | F | 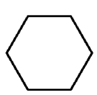 | $CH_2CH_2$ | 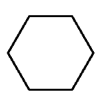 | — | F | F | $OC_4H_9$ | |
| 509 | $C_2H_5O$ | F | F | 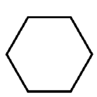 | $CH_2CH_2$ | 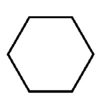 | — | F | F | $OC_6H_{13}$ | |
| 510 | $CH_3O$ | F | F | 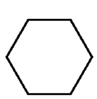 | $CH_2CH_2$ | 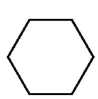 | — | F | F | $C_2H_5$ | |

TABLE 35

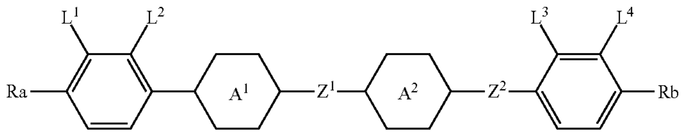

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 511 | $CH_3O$ | F | F | 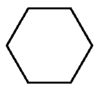 | $CH_2CH_2$ | 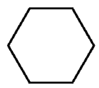 | — | F | H | $OCH_3$ | |
| 512 | $CH_3O$ | F | F | 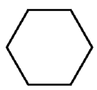 | $CH_2CH_2$ | 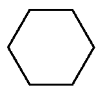 | — | F | H | $OC_2H_5$ | |
| 513 | $CH_3O$ | F | F | 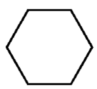 | $CH_2CH_2$ | 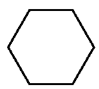 | — | F | H | $OC_3H_7$ | |
| 514 | $CH_3O$ | F | F | 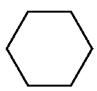 | $CH_2CH_2$ | 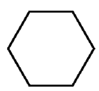 | — | F | H | $OC_4H_9$ | |
| 515 | $CH_3O$ | F | F | 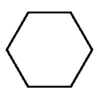 | $CH_2CH_2$ | 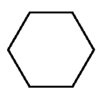 | — | F | H | $OC_5H_{11}$ | |
| 516 | $C_2H_5O$ | F | F | 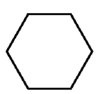 | $CH_2CH_2$ | 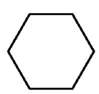 | — | F | H | $OCH_3$ | |
| 517 | $C_2H_5O$ | F | F | 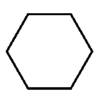 | $CH_2CH_2$ | 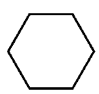 | — | F | H | $OC_2H_5$ | |
| 518 | $C_2H_5O$ | F | F | 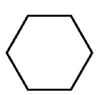 | $CH_2CH_2$ | 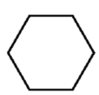 | — | F | H | $OC_3H_7$ | |
| 519 | $C_2H_5O$ | F | F | 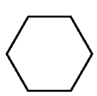 | $CH_2CH_2$ | 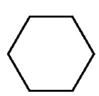 | — | F | H | $OC_4H_9$ | |
| 520 | $C_2H_5O$ | F | F | 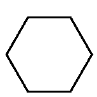 | $CH_2CH_2$ | 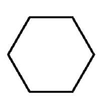 | — | F | H | $OC_5H_{11}$ | |
| 521 | $C_3H_7O$ | F | F | 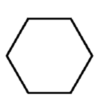 | $CH_2CH_2$ | 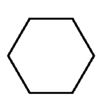 | — | F | H | $OCH_3$ | |
| 522 | $C_3H_7O$ | F | F | 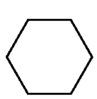 | $CH_2CH_2$ | 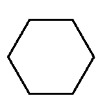 | — | F | H | $OC_2H_5$ | |
| 523 | $C_3H_7O$ | F | F | 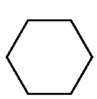 | $CH_2CH_2$ | 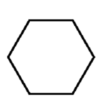 | — | F | H | $OC_3H_7$ | |

TABLE 35-continued

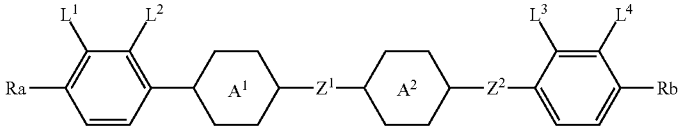

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 524 | $C_3H_7O$ | F | F | 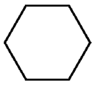 | $CH_2CH_2$ | 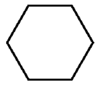 | — | F | H | $OC_4H_9$ | |
| 525 | $C_3H_7O$ | F | F | 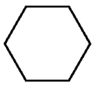 | $CH_2CH_2$ | 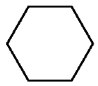 | — | F | H | $OC_5H_{11}$ | |

TABLE 36

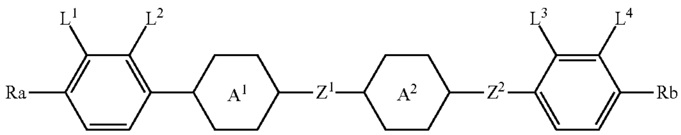

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 526 | $C_4H_9O$ | F | F | 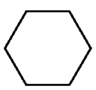 | $CH_2CH_2$ | 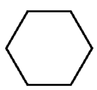 | — | F | H | $OCH_3$ | |
| 527 | $C_4H_9O$ | F | F | 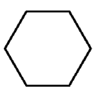 | $CH_2CH_2$ | 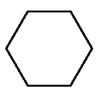 | — | F | H | $OC_2H_5$ | |
| 528 | $C_4H_9O$ | F | F | 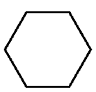 | $CH_2CH_2$ | 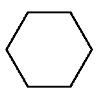 | — | F | H | $OC_3H_7$ | |
| 529 | $C_4H_9O$ | F | F | 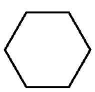 | $CH_2CH_2$ | 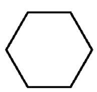 | — | F | H | $OC_4H_9$ | |
| 530 | $C_4H_9O$ | F | F | 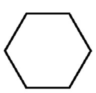 | $CH_2CH_2$ | 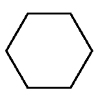 | — | F | H | $OC_5H_{11}$ | |
| 531 | $C_5H_{11}O$ | F | F | 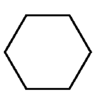 | $CH_2CH_2$ | 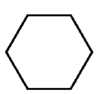 | — | F | H | $OCH_3$ | |
| 532 | $C_5H_{11}O$ | F | F | 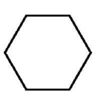 | $CH_2CH_2$ | 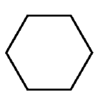 | — | F | H | $OC_2H_5$ | |
| 533 | $C_5H_{11}O$ | F | F | 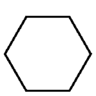 | $CH_2CH_2$ | 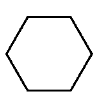 | — | F | H | $OC_3H_7$ | |
| 534 | $C_5H_{11}O$ | F | F | 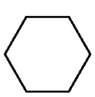 | $CH_2CH_2$ | 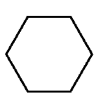 | — | F | H | $OC_4H_9$ | |
| 535 | $C_5H_{11}O$ | F | F | 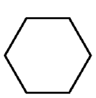 | $CH_2CH_2$ | 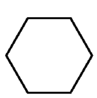 | — | F | H | $OC_5H_{11}$ | |

TABLE 36-continued

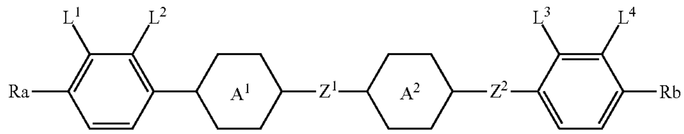

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 536 | $C_2H_5$ | F | F | 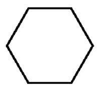 | $CH_2CH_2$ | 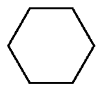 | — | F | H | $C_4H_9$ | |
| 537 | $C_5H_{11}$ | F | F | 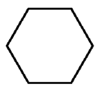 | $CH_2CH_2$ | 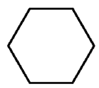 | — | F | H | $C_2H_5$ | |
| 538 | $C_2H_5$ | F | F | 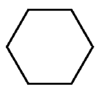 | $CH_2CH_2$ | 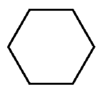 | — | F | H | $OC_4H_9$ | |
| 539 | $CH_2{=}CH$ | F | F | 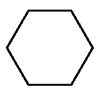 | $CH_2CH_2$ | 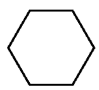 | — | F | H | $OC_3H_7$ | |
| 540 | $CH_2{=}CH$ | F | F | 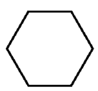 | $CH_2CH_2$ | 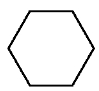 | — | F | H | $OC_5H_{11}$ | |

TABLE 37

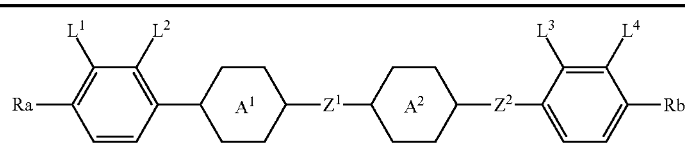

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 541 | $CH_2{=}CHO$ | F | F | 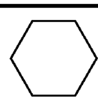 | $CH_2CH_2$ | 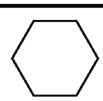 | — | F | H | $OC_3H_7$ | |
| 542 | $CH_2{=}CHCH_2O$ | F | F | 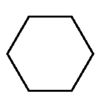 | $CH_2CH_2$ | 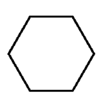 | — | F | H | $OC_5H_{11}$ | |
| 543 | $CH_2{=}CHCH_2O$ | F | F | 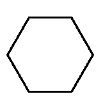 | $CH_2CH_2$ | 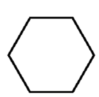 | — | F | H | $OC_3H_7$ | |
| 544 | $CH_2{=}CHC_2H_5O$ | F | F | 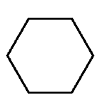 | $CH_2CH_2$ | 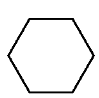 | — | F | H | $OC_5H_{11}$ | |
| 545 | $CH_2{=}CHC_2H_5O$ | F | F | 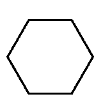 | $CH_2CH_2$ | 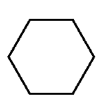 | — | F | H | $OC_2H_5$ | |
| 546 | $CH_2{=}CHC_2H_5O$ | F | F | 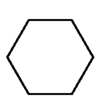 | $CH_2CH_2$ | 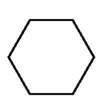 | — | F | H | $OC_3H_7$ | |

TABLE 37-continued

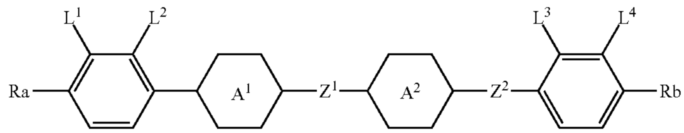

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 547 | $CH_3CH{=}CHCH_2O$ | F | F | 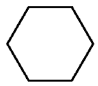 | $CH_2CH_2$ | 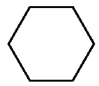 | — | F | H | $OCH_3$ | |
| 548 | $CH_3CH{=}CHCH_2O$ | F | F | 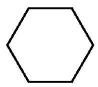 | $CH_2CH_2$ | 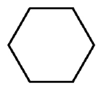 | — | F | H | $OC_2H_5$ | |
| 549 | $C_3H_7O$ | F | F | 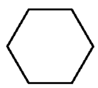 | $CH_2CH_2$ | 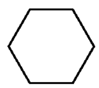 | — | F | H | $OCH{=}CH_2$ | |
| 550 | $C_3H_7O$ | F | F | 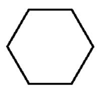 | $CH_2CH_2$ | 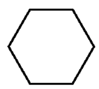 | — | F | H | $OCH_2CH{=}CH_2$ | |
| 551 | $C_4H_9O$ | F | F | 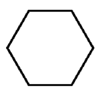 | $CH_2CH_2$ | 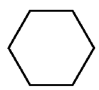 | — | F | H | $OCH_2CH{=}CH_2$ | |
| 552 | $C_5H_{11}O$ | F | F | 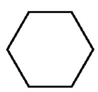 | $CH_2CH_2$ | 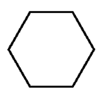 | — | F | H | $OCH_2CH{=}CH_2$ | |
| 553 | $CH_3O$ | F | F | 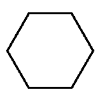 | $CH_2CH_2$ | 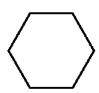 | — | F | H | $OC_2H_5CH{=}CH_2$ | |
| 554 | $C_2H_5O$ | F | F | 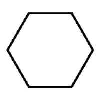 | $CH_2CH_2$ | 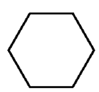 | — | F | H | $OC_2H_5CH{=}CH_2$ | |
| 555 | $C_3H_7O$ | F | F | 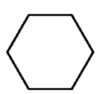 | $CH_2CH_2$ | 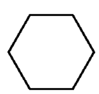 | — | F | H | $OC_2H_5CH{=}CH_2$ | |

TABLE 38

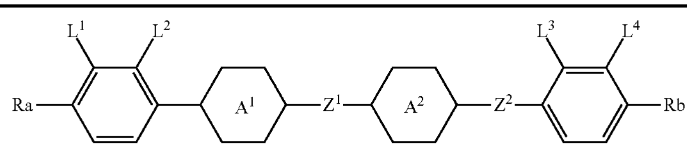

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 556 | $CH_3O$ | F | F | 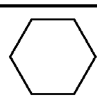 | $CH_2CH_2$ | 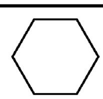 | — | F | H | $OCH_2CH{=}CHCH_3$ | |
| 557 | $C_2H_5O$ | F | F | 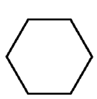 | $CH_2CH_2$ | 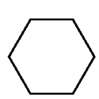 | — | F | H | $OCH_2CH{=}CHCH_3$ | |
| 558 | $C_3H_7O$ | F | F | 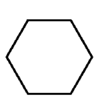 | $CH_2CH_2$ | 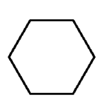 | — | F | H | $OCH_2CH{=}CHCH_3$ | |

TABLE 38-continued

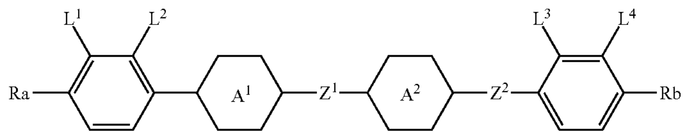

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 559 | $CH_2{=}CHCH_2O$ | F | F | 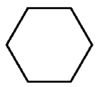 | $CH_2CH_2$ | 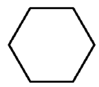 | — | F | H | $OCH{=}CH_2$ | |
| 560 | $CH_2{=}CHC_2H_5O$ | F | F | 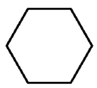 | $CH_2CH_2$ | 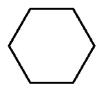 | — | F | H | $OCH_2CH{=}CH_2$ | |
| 561 | $C_3H_7OCH_2$ | F | F | 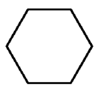 | $CH_2CH_2$ | 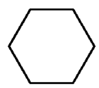 | — | F | H | $OC_3H_7$ | |
| 562 | $C_5H_{11}O$ | F | F | 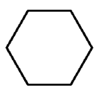 | $CH_2CH_2$ | 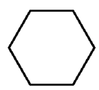 | — | F | H | $OC_2H_5CH{=}CH_2$ | |
| 563 | $C_3H_7O$ | F | F | 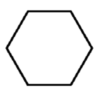 | $CH_2CH_2$ | 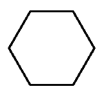 | — | F | H | H | |
| 564 | $C_5H_{11}O$ | F | F | 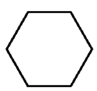 | $CH_2CH_2$ | 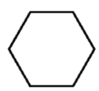 | — | F | H | $OC_9H_{19}$ | |
| 565 | $C_3H_7O$ | F | F | 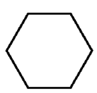 | $CH_2CH_2$ | 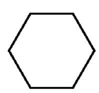 | — | F | H | $C_2H_5$ | |
| 566 | $C_5H_{11}O$ | F | F | 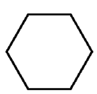 | $CH_2CH_2$ | 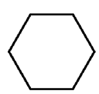 | — | F | H | $C_3H_7$ | |
| 567 | H | F | F | 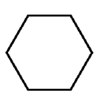 | $CH_2CH_2$ | 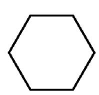 | — | F | H | $OC_4H_9$ | |
| 568 | $C_7H_{15}O$ | F | F | 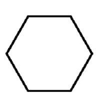 | $CH_2CH_2$ | 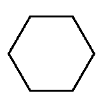 | — | F | H | $OC_4H_9$ | |
| 569 | $C_2H_5O$ | F | F | 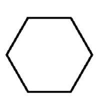 | $CH_2CH_2$ | 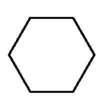 | — | F | H | $OC_6H_{13}$ | |
| 570 | $CH_3O$ | F | F | 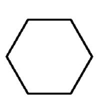 | $CH_2CH_2$ | 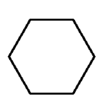 | — | F | H | $C_2H_5$ | |

TABLE 39

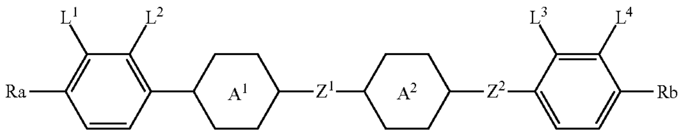

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 571 | $CH_3O$ | F | F | 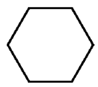 | $CH_2CH_2$ | 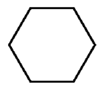 | — | H | F | $OCH_3$ | |
| 572 | $CH_3O$ | F | F | 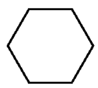 | $CH_2CH_2$ | 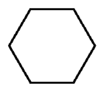 | — | H | F | $OC_2H_5$ | |
| 573 | $CH_3O$ | F | F | 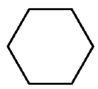 | $CH_2CH_2$ | 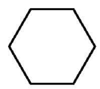 | — | H | F | $OC_3H_7$ | |
| 574 | $CH_3O$ | F | F | 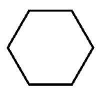 | $CH_2CH_2$ | 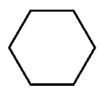 | — | H | F | $OC_4H_9$ | |
| 575 | $CH_3O$ | F | F | 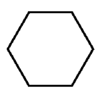 | $CH_2CH_2$ | 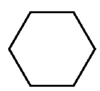 | — | H | F | $OC_5H_{11}$ | |
| 576 | $C_2H_5O$ | F | F | 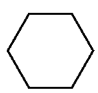 | $CH_2CH_2$ | 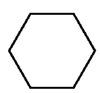 | — | H | F | $OCH_3$ | |
| 577 | $C_2H_5O$ | F | F | 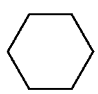 | $CH_2CH_2$ | 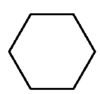 | — | H | F | $OC_2H_5$ | |
| 578 | $C_2H_5O$ | F | F | 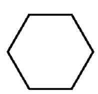 | $CH_2CH_2$ | 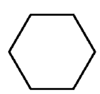 | — | H | F | $OC_3H_7$ | |
| 579 | $C_2H_5O$ | F | F | 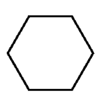 | $CH_2CH_2$ | 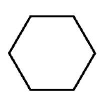 | — | H | F | $OC_4H_9$ | |
| 580 | $C_2H_5O$ | F | F | 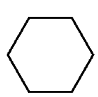 | $CH_2CH_2$ | 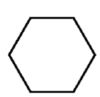 | — | H | F | $OC_5H_{11}$ | |
| 581 | $C_3H_7O$ | F | F | 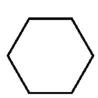 | $CH_2CH_2$ | 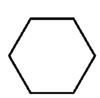 | — | H | F | $OCH_3$ | |
| 582 | $C_3H_7O$ | F | F | 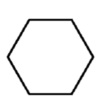 | $CH_2CH_2$ | 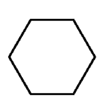 | — | H | F | $OC_2H_5$ | |
| 583 | $C_3H_7O$ | F | F | 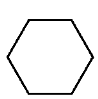 | $CH_2CH_2$ | 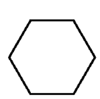 | — | H | F | $OC_3H_7$ | |

TABLE 39-continued

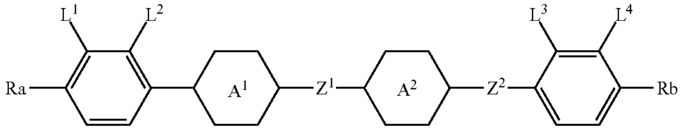

| No. | Ra | L¹ | L² | A¹ | Z¹ | A² | Z² | L³ | L⁴ | Rb | Physical property values |
|---|---|---|---|---|---|---|---|---|---|---|---|
| 584 | $C_3H_7O$ | F | F | 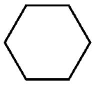 | $CH_2CH_2$ | 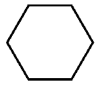 | — | H | F | $OC_4H_9$ | |
| 585 | $C_3H_7O$ | F | F | 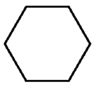 | $CH_2CH_2$ | 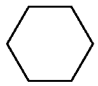 | — | H | F | $OC_5H_{11}$ | |

TABLE 40

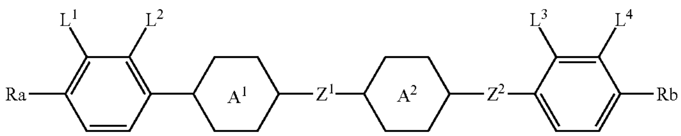

| No. | Ra | L¹ | L² | A¹ | Z¹ | A² | Z² | L³ | L⁴ | Rb | Physical property values |
|---|---|---|---|---|---|---|---|---|---|---|---|
| 586 | $C_4H_9O$ | F | F | 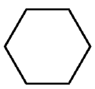 | $CH_2CH_2$ | 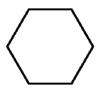 | — | H | F | $OCH_3$ | |
| 587 | $C_4H_9O$ | F | F | 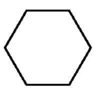 | $CH_2CH_2$ | 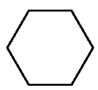 | — | H | F | $OC_2H_5$ | |
| 588 | $C_4H_9O$ | F | F | 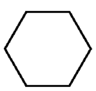 | $CH_2CH_2$ | 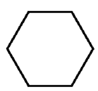 | — | H | F | $OC_3H_7$ | |
| 589 | $C_4H_9O$ | F | F | 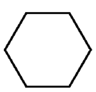 | $CH_2CH_2$ | 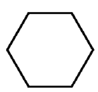 | — | H | F | $OC_4H_9$ | |
| 590 | $C_4H_9O$ | F | F | 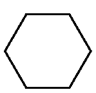 | $CH_2CH_2$ | 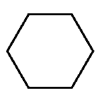 | — | H | F | $OC_5H_{11}$ | |
| 591 | $C_5H_{11}O$ | F | F | 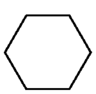 | $CH_2CH_2$ | 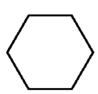 | — | H | F | $OCH_3$ | |
| 592 | $C_5H_{11}O$ | F | F | 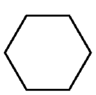 | $CH_2CH_2$ | 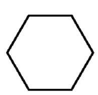 | — | H | F | $OC_2H_5$ | |
| 593 | $C_5H_{11}O$ | F | F | 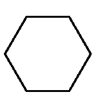 | $CH_2CH_2$ | 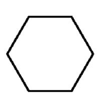 | — | H | F | $OC_3H_7$ | |
| 594 | $C_5H_{11}O$ | F | F | 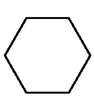 | $CH_2CH_2$ | 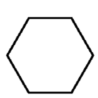 | — | H | F | $OC_4H_9$ | |
| 595 | $C_5H_{11}O$ | F | F | 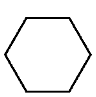 | $CH_2CH_2$ | 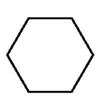 | — | H | F | $OC_5H_{11}$ | |

TABLE 40-continued

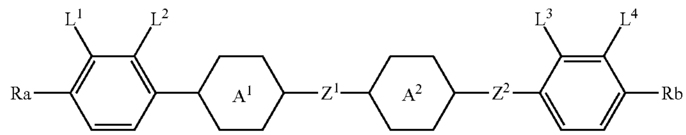

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 596 | $C_2H_5$ | F | F | 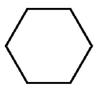 | $CH_2CH_2$ | 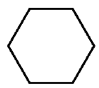 | — | H | F | $C_4H_9$ | |
| 597 | $C_5H_{11}$ | F | F | 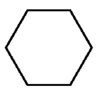 | $CH_2CH_2$ | 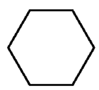 | — | H | F | $C_2H_5$ | |
| 598 | $C_2H_5$ | F | F | 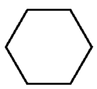 | $CH_2CH_2$ | 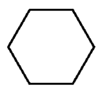 | — | H | F | $OC_4H_9$ | |
| 599 | $CH_2{=\!=}CH$ | F | F | 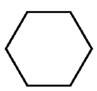 | $CH_2CH_2$ | 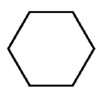 | — | H | F | $OC_3H_7$ | |
| 600 | $CH_2{=\!=}CH$ | F | F | 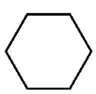 | $CH_2CH_2$ | 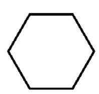 | — | H | F | $OC_5H_{11}$ | |

TABLE 41

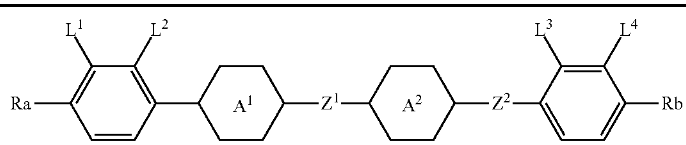

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 601 | $CH_2{=\!=}CHO$ | F | F | 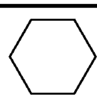 | $CH_2CH_2$ | 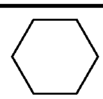 | — | H | F | $OC_3H_7$ | |
| 602 | $CH_2{=\!=}CHCH_2O$ | F | F | 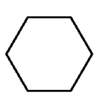 | $CH_2CH_2$ | 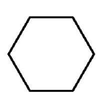 | — | H | F | $OC_5H_{11}$ | |
| 603 | $CH_2{=\!=}CHCH_2O$ | F | F | 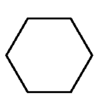 | $CH_2CH_2$ | 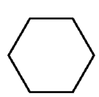 | — | H | F | $OC_3H_7$ | |
| 604 | $CH_2{=\!=}CHC_2H_5O$ | F | F | 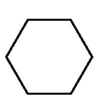 | $CH_2CH_2$ | 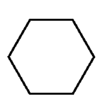 | — | H | F | $OC_5H_{11}$ | |
| 605 | $CH_2{=\!=}CHC_2H_5O$ | F | F | 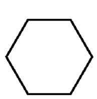 | $CH_2CH_2$ | 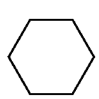 | — | H | F | $OC_2H_5$ | |
| 606 | $CH_2{=\!=}CHC_2H_5O$ | F | F | 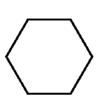 | $CH_2CH_2$ | 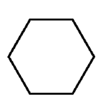 | — | H | F | $OC_3H_7$ | |

TABLE 41-continued

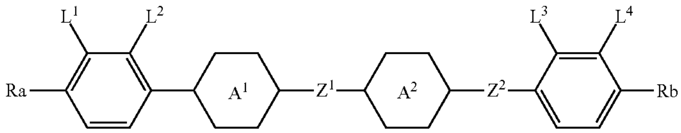

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 607 | $CH_3CH{=}CHCH_2O$ | F | F | 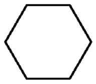 | $CH_2CH_2$ | 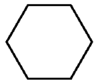 | — | H | F | $OCH_3$ | |
| 608 | $CH_3CH{=}CHCH_2O$ | F | F | 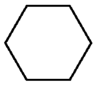 | $CH_2CH_2$ | 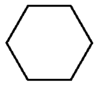 | — | H | F | $OC_2H_5$ | |
| 609 | $C_3H_7O$ | F | F | 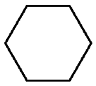 | $CH_2CH_2$ | 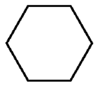 | — | H | F | $OCH{=}CH_2$ | |
| 610 | $C_3H_7O$ | F | F | 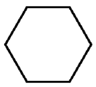 | $CH_2CH_2$ | 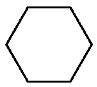 | — | H | F | $OCH_2CH{=}CH_2$ | |
| 611 | $C_4H_9O$ | F | F | 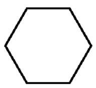 | $CH_2CH_2$ | 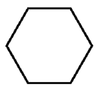 | — | H | F | $OCH_2CH{=}CH_2$ | |
| 612 | $C_5H_{11}O$ | F | F | 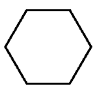 | $CH_2CH_2$ | 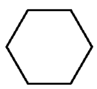 | — | H | F | $OCH_2CH{=}CH_2$ | |
| 613 | $CH_3O$ | F | F | 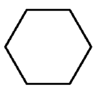 | $CH_2CH_2$ | 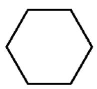 | — | H | F | $OC_2H_5CH{=}CH_2$ | |
| 614 | $C_2H_5O$ | F | F | 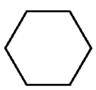 | $CH_2CH_2$ | 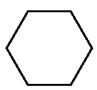 | — | H | F | $OC_2H_5CH{=}CH_2$ | |
| 615 | $C_3H_7O$ | F | F | 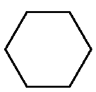 | $CH_2CH_2$ | 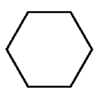 | — | H | F | $OC_2H_5CH{=}CH_2$ | |

TABLE 42

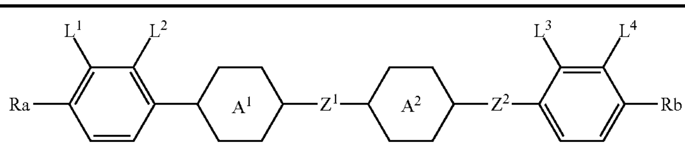

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 616 | $CH_3O$ | F | F | 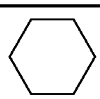 | $CH_2CH_2$ | 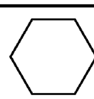 | — | H | F | $OCH_2CH{=}CHCH_3$ | |
| 617 | $C_2H_5O$ | F | F | 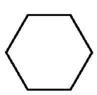 | $CH_2CH_2$ | 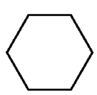 | — | H | F | $OCH_2CH{=}CHCH_3$ | |
| 618 | $C_3H_7O$ | F | F | 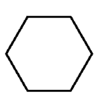 | $CH_2CH_2$ | 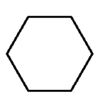 | — | H | F | $OCH_2CH{=}CHCH_3$ | |

TABLE 42-continued

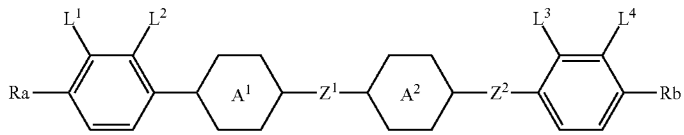

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 619 | $CH_2{=}CHCH_2O$ | F | F | 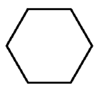 | $CH_2CH_2$ | 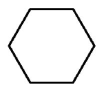 | — | H | F | $OCH{=}CH_2$ | |
| 620 | $CH_2{=}CHC_2H_5O$ | F | F | 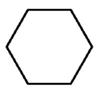 | $CH_2CH_2$ | 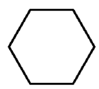 | — | H | F | $OCH_2CH{=}CH_2$ | |
| 621 | $C_3H_7OCH_2$ | F | F | 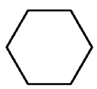 | $CH_2CH_2$ | 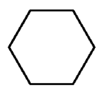 | — | H | F | $OC_3H_7$ | |
| 622 | $C_5H_{11}O$ | F | F | 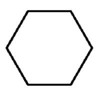 | $CH_2CH_2$ | 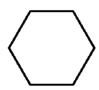 | — | H | F | $OC_2H_5CH{=}CH_2$ | |
| 623 | $C_3H_7O$ | F | F | 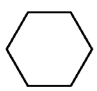 | $CH_2CH_2$ | 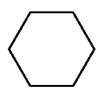 | — | H | F | H | |
| 624 | $C_5H_{11}O$ | F | F | 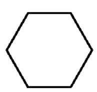 | $CH_2CH_2$ | 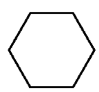 | — | H | F | $OC_9H_{19}$ | |
| 625 | $C_3H_7O$ | F | F | 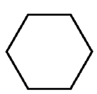 | $CH_2CH_2$ | 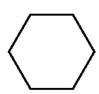 | — | H | F | $C_2H_5$ | |
| 626 | $C_5H_{11}O$ | F | F | 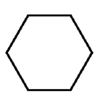 | $CH_2CH_2$ | 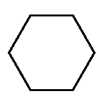 | — | H | F | $C_3H_7$ | |
| 627 | H | F | F | 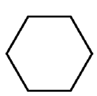 | $CH_2CH_2$ | 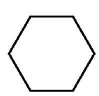 | — | H | F | $OC_4H_9$ | |
| 628 | $C_7H_{15}O$ | F | F | 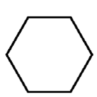 | $CH_2CH_2$ | 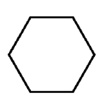 | — | H | F | $OC_4H_9$ | |
| 629 | $C_2H_5O$ | F | F | 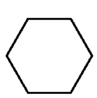 | $CH_2CH_2$ | 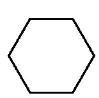 | — | H | F | $OC_6H_{13}$ | |
| 630 | $CH_3O$ | F | F | 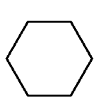 | $CH_2CH_2$ | 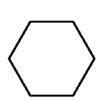 | — | H | F | $C_2H_5$ | |

TABLE 43

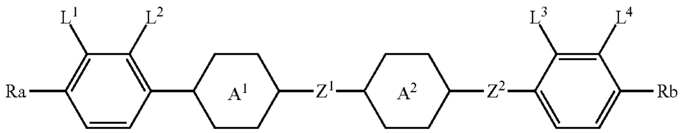

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 631 | $CH_3O$ | F | F | 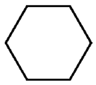 | $CH_2CH_2$ | 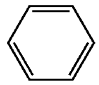 | — | F | F | $OCH_3$ | |
| 632 | $CH_3O$ | F | F | 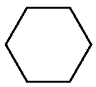 | $CH_2CH_2$ | 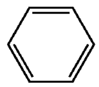 | — | F | F | $OC_2H_5$ | |
| 633 | $CH_3O$ | F | F | 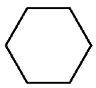 | $CH_2CH_2$ | 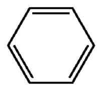 | — | F | F | $OC_3H_7$ | |
| 634 | $CH_3O$ | F | F | 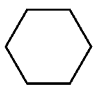 | $CH_2CH_2$ |  | — | F | F | $OC_4H_9$ | |
| 635 | $CH_3O$ | F | F | 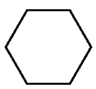 | $CH_2CH_2$ |  | — | F | F | $OC_5H_{11}$ | |
| 636 | $C_2H_5O$ | F | F | 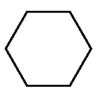 | $CH_2CH_2$ |  | — | F | F | $OCH_3$ | |
| 637 | $C_2H_5O$ | F | F | 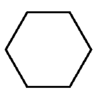 | $CH_2CH_2$ |  | — | F | F | $OC_2H_5$ | |
| 638 | $C_2H_5O$ | F | F | 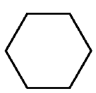 | $CH_2CH_2$ | 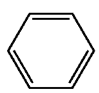 | — | F | F | $OC_3H_7$ | |
| 639 | $C_2H_5O$ | F | F | 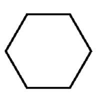 | $CH_2CH_2$ | 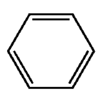 | — | F | F | $OC_4H_9$ | |
| 640 | $C_2H_5O$ | F | F | 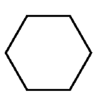 | $CH_2CH_2$ | 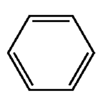 | — | F | F | $OC_5H_{11}$ | |
| 641 | $C_3H_7O$ | F | F | 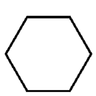 | $CH_2CH_2$ | 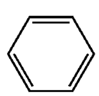 | — | F | F | $OCH_3$ | |
| 642 | $C_3H_7O$ | F | F | 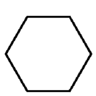 | $CH_2CH_2$ | 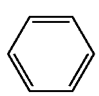 | — | F | F | $OC_2H_5$ | |
| 643 | $C_3H_7O$ | F | F | 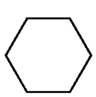 | $CH_2CH_2$ | 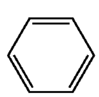 | — | F | F | $OC_3H_7$ | |

TABLE 43-continued

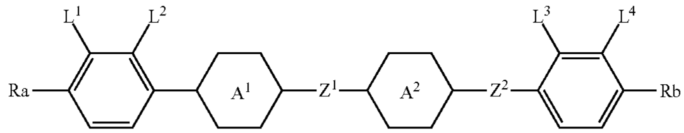

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 644 | $C_3H_7O$ | F | F | 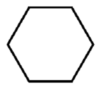 | $CH_2CH_2$ | 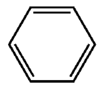 | — | F | F | $OC_4H_9$ | |
| 645 | $C_3H_7O$ | F | F | 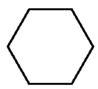 | $CH_2CH_2$ |  | — | F | F | $OC_5H_{11}$ | |

TABLE 44

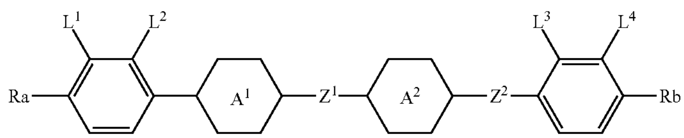

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 646 | $C_4H_9O$ | F | F | 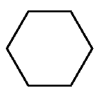 | $CH_2CH_2$ | 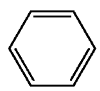 | — | F | F | $OCH_3$ | |
| 647 | $C_4H_9O$ | F | F | 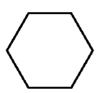 | $CH_2CH_2$ | 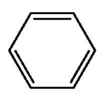 | — | F | F | $OC_2H_5$ | |
| 648 | $C_4H_9O$ | F | F | 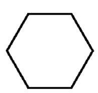 | $CH_2CH_2$ | 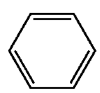 | — | F | F | $OC_3H_7$ | |
| 649 | $C_4H_9O$ | F | F | 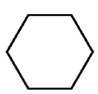 | $CH_2CH_2$ | 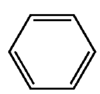 | — | F | F | $OC_4H_9$ | |
| 650 | $C_4H_9O$ | F | F | 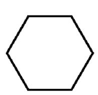 | $CH_2CH_2$ | 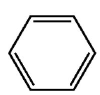 | — | F | F | $OC_5H_{11}$ | |
| 651 | $C_5H_{11}O$ | F | F | 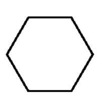 | $CH_2CH_2$ | 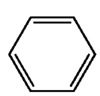 | — | F | F | $OCH_3$ | |
| 652 | $C_5H_{11}O$ | F | F | 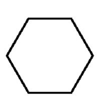 | $CH_2CH_2$ | 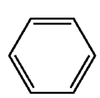 | — | F | F | $OC_2H_5$ | |
| 653 | $C_5H_{11}O$ | F | F | 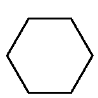 | $CH_2CH_2$ | 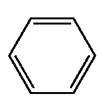 | — | F | F | $OC_3H_7$ | |
| 654 | $C_5H_{11}O$ | F | F | 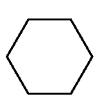 | $CH_2CH_2$ | 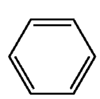 | — | F | F | $OC_4H_9$ | |
| 655 | $C_5H_{11}O$ | F | F | 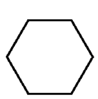 | $CH_2CH_2$ | 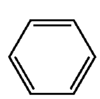 | — | F | F | $OC_5H_{11}$ | |

TABLE 44-continued

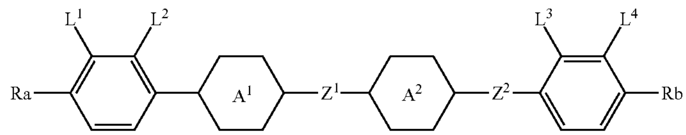

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 656 | $C_2H_5$ | F | F | 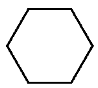 | $CH_2CH_2$ | 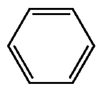 | — | F | F | $C_4H_9$ | |
| 657 | $C_5H_{11}$ | F | F | 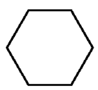 | $CH_2CH_2$ |  | — | F | F | $C_2H_5$ | |
| 658 | $C_2H_5$ | F | F | 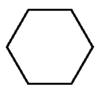 | $CH_2CH_2$ |  | — | F | F | $OC_4H_9$ | |
| 659 | $CH_2{=\!=}CH$ | F | F | 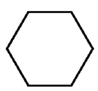 | $CH_2CH_2$ | 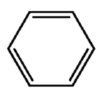 | — | F | F | $OC_3H_7$ | |
| 660 | $CH_2{=\!=}CH$ | F | F | 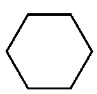 | $CH_2CH_2$ | 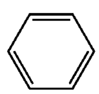 | — | F | F | $OC_5H_{11}$ | |

TABLE 45

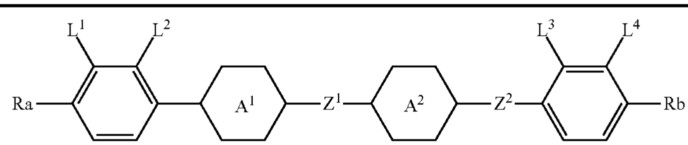

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 661 | $CH_2{=\!=}CHO$ | F | F | 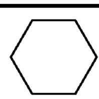 | $CH_2CH_2$ | 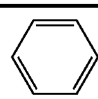 | — | F | F | $OC_3H_7$ | |
| 662 | $CH_2{=\!=}CHCH_2O$ | F | F | 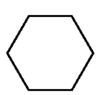 | $CH_2CH_2$ | 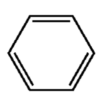 | — | F | F | $OC_5H_{11}$ | |
| 663 | $CH_2{=\!=}CHCH_2O$ | F | F | 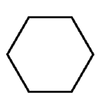 | $CH_2CH_2$ | 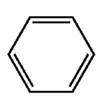 | — | F | F | $OC_3H_7$ | |
| 664 | $CH_2{=\!=}CHC_2H_5O$ | F | F | 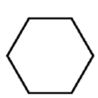 | $CH_2CH_2$ | 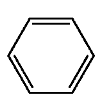 | — | F | F | $OC_5H_{11}$ | |
| 665 | $CH_2{=\!=}CHC_2H_5O$ | F | F | 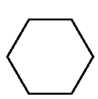 | $CH_2CH_2$ | 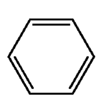 | — | F | F | $OC_2H_5$ | |
| 666 | $CH_2{=\!=}CHC_2H_5O$ | F | F | 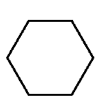 | $CH_2CH_2$ | 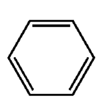 | — | F | F | $OC_3H_7$ | |

TABLE 45-continued

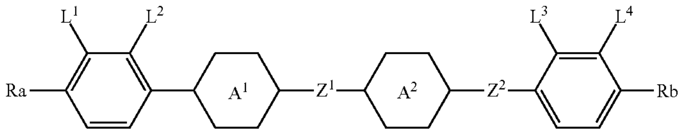

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 667 | $CH_3CH{=}CHCH_2O$ | F | F | 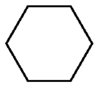 | $CH_2CH_2$ | 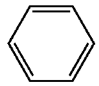 | — | F | F | $OCH_3$ | |
| 668 | $CH_3CH{=}CHCH_2O$ | F | F | 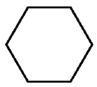 | $CH_2CH_2$ | 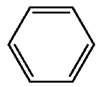 | — | F | F | $OC_2H_5$ | |
| 669 | $C_3H_7O$ | F | F | 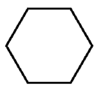 | $CH_2CH_2$ | 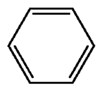 | — | F | F | $OCH{=}CH_2$ | |
| 670 | $C_3H_7O$ | F | F | 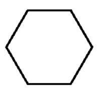 | $CH_2CH_2$ |  | — | F | F | $OCH_2CH{=}CH_2$ | |
| 671 | $C_4H_9O$ | F | F | 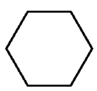 | $CH_2CH_2$ | 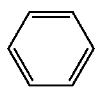 | — | F | F | $OCH_2CH{=}CH_2$ | |
| 672 | $C_5H_{11}O$ | F | F | 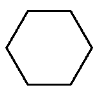 | $CH_2CH_2$ | 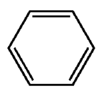 | — | F | F | $OCH_2CH{=}CH_2$ | |
| 673 | $CH_3O$ | F | F | 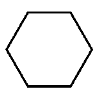 | $CH_2CH_2$ | 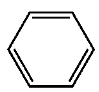 | — | F | F | $OC_2H_5CH{=}CH_2$ | |
| 674 | $C_2H_5O$ | F | F | 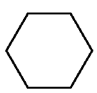 | $CH_2CH_2$ | 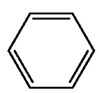 | — | F | F | $OC_2H_5CH{=}CH_2$ | |
| 675 | $C_3H_7O$ | F | F | 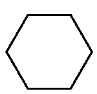 | $CH_2CH_2$ | 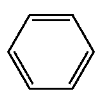 | — | F | F | $OC_2H_5CH{=}CH_2$ | |

TABLE 46

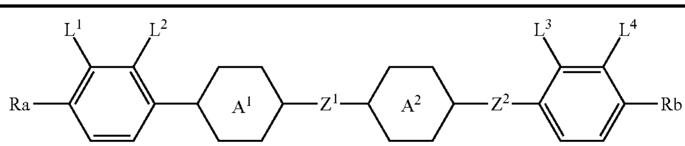

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 676 | $CH_3O$ | F | F | 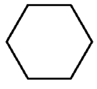 | $CH_2CH_2$ |  | — | F | F | $OCH_2CH{=}CHCH_3$ | |
| 677 | $C_2H_5O$ | F | F | 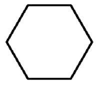 | $CH_2CH_2$ | 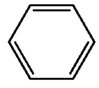 | — | F | F | $OCH_2CH{=}CHCH_3$ | |
| 678 | $C_3H_7O$ | F | F | 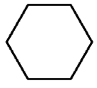 | $CH_2CH_2$ | 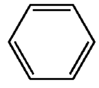 | — | F | F | $OCH_2CH{=}CHCH_3$ | |

TABLE 46-continued

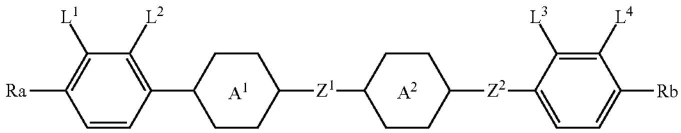

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 679 | $CH_2{=}CHCH_2O$ | F | F | 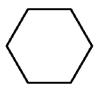 | $CH_2CH_2$ | 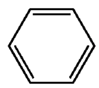 | — | F | F | $OCH{=}CH_2$ | |
| 680 | $CH_2{=}CHC_2H_5O$ | F | F | 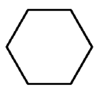 | $CH_2CH_2$ | 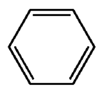 | — | F | F | $OCH_2CH{=}CH_2$ | |
| 681 | $C_3H_7OCH_2$ | F | F | 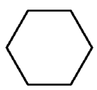 | $CH_2CH_2$ | 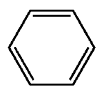 | — | F | F | $OC_3H_7$ | |
| 682 | $C_5H_{11}O$ | F | F | 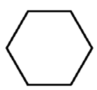 | $CH_2CH_2$ | 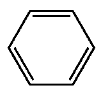 | — | F | F | $OC_2H_5CH{=}CH_2$ | |
| 683 | $C_3H_7O$ | F | F | 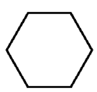 | $CH_2CH_2$ | 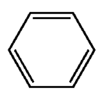 | — | F | F | H | |
| 684 | $C_5H_{11}O$ | F | F | 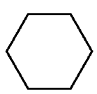 | $CH_2CH_2$ | 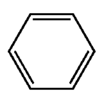 | — | F | F | $OC_9H_{19}$ | |
| 685 | $C_3H_7O$ | F | F | 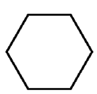 | $CH_2CH_2$ | 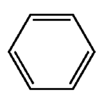 | — | F | F | $C_2H_5$ | |
| 686 | $C_5H_{11}O$ | F | F | 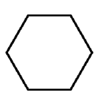 | $CH_2CH_2$ | 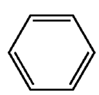 | — | F | F | $C_3H_7$ | |
| 687 | H | F | F | 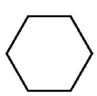 | $CH_2CH_2$ | 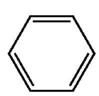 | — | F | F | $OC_4H_9$ | |
| 688 | $C_7H_{15}O$ | F | F | 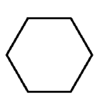 | $CH_2CH_2$ | 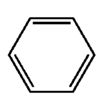 | — | F | F | $OC_4H_9$ | |
| 689 | $C_2H_5O$ | F | F | 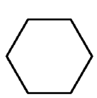 | $CH_2CH_2$ | 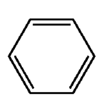 | — | F | F | $OC_6H_{13}$ | |
| 690 | $CH_3O$ | F | F | 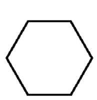 | $CH_2CH_2$ | 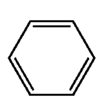 | — | F | F | $C_2H_5$ | |

TABLE 47

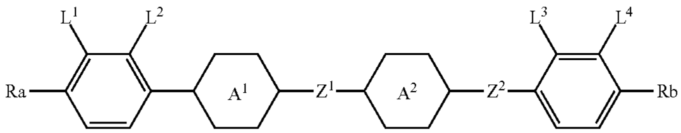

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 691 | $CH_3O$ | F | F | 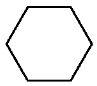 | $CH_2CH_2$ | 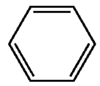 | — | F | H | $OCH_3$ | |
| 692 | $CH_3O$ | F | F | 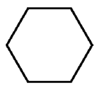 | $CH_2CH_2$ | 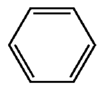 | — | F | H | $OC_2H_5$ | |
| 693 | $CH_3O$ | F | F | 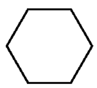 | $CH_2CH_2$ | 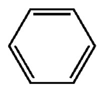 | — | F | H | $OC_3H_7$ | |
| 694 | $CH_3O$ | F | F | 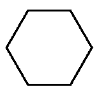 | $CH_2CH_2$ | 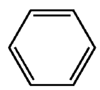 | — | F | H | $OC_4H_9$ | |
| 695 | $CH_3O$ | F | F | 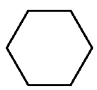 | $CH_2CH_2$ | 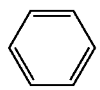 | — | F | H | $OC_5H_{11}$ | |
| 696 | $C_2H_5O$ | F | F | 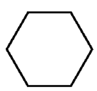 | $CH_2CH_2$ | 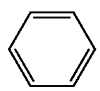 | — | F | H | $OCH_3$ | |
| 697 | $C_2H_5O$ | F | F | 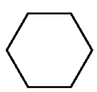 | $CH_2CH_2$ | 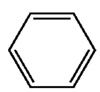 | — | F | H | $OC_2H_5$ | |
| 698 | $C_2H_5O$ | F | F | 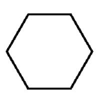 | $CH_2CH_2$ | 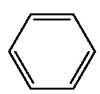 | — | F | H | $OC_3H_7$ | |
| 699 | $C_2H_5O$ | F | F | 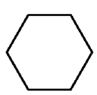 | $CH_2CH_2$ | 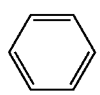 | — | F | H | $OC_4H_9$ | |
| 700 | $C_2H_5O$ | F | F | 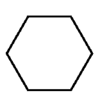 | $CH_2CH_2$ | 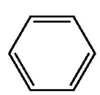 | — | F | H | $OC_5H_{11}$ | |
| 701 | $C_3H_7O$ | F | F | 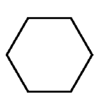 | $CH_2CH_2$ | 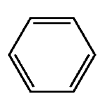 | — | F | H | $OCH_3$ | |
| 702 | $C_3H_7O$ | F | F | 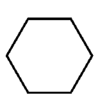 | $CH_2CH_2$ | 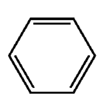 | — | F | H | $OC_2H_5$ | |
| 703 | $C_3H_7O$ | F | F | 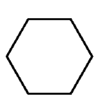 | $CH_2CH_2$ | 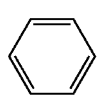 | — | F | H | $OC_3H_7$ | |

TABLE 47-continued

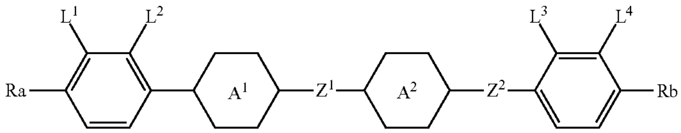

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 704 | $C_3H_7O$ | F | F | 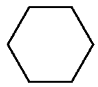 | $CH_2CH_2$ | 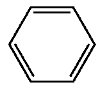 | — | F | H | $OC_4H_9$ | |
| 705 | $C_3H_7O$ | F | F | 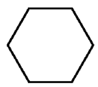 | $CH_2CH_2$ | 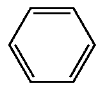 | — | F | H | $OC_5H_{11}$ | |

TABLE 48

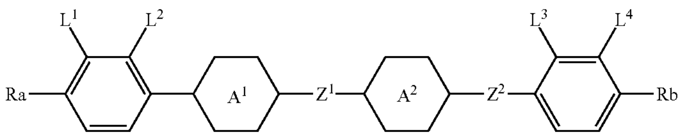

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 706 | $C_4H_9O$ | F | F | 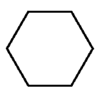 | $CH_2CH_2$ | 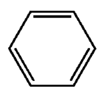 | — | F | H | $OCH_3$ | |
| 707 | $C_4H_9O$ | F | F | 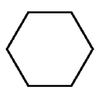 | $CH_2CH_2$ | 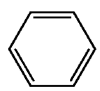 | — | F | H | $OC_2H_5$ | |
| 708 | $C_4H_9O$ | F | F | 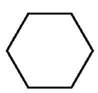 | $CH_2CH_2$ | 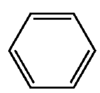 | — | F | H | $OC_3H_7$ | |
| 709 | $C_4H_9O$ | F | F | 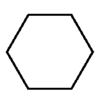 | $CH_2CH_2$ | 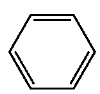 | — | F | H | $OC_4H_9$ | |
| 710 | $C_4H_9O$ | F | F | 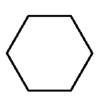 | $CH_2CH_2$ | 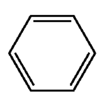 | — | F | H | $OC_5H_{11}$ | |
| 711 | $C_5H_{11}O$ | F | F | 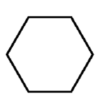 | $CH_2CH_2$ | 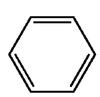 | — | F | H | $OCH_3$ | |
| 712 | $C_5H_{11}O$ | F | F | 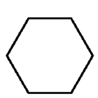 | $CH_2CH_2$ | 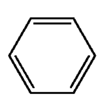 | — | F | H | $OC_2H_5$ | |
| 713 | $C_5H_{11}O$ | F | F | 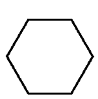 | $CH_2CH_2$ | 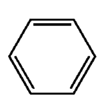 | — | F | H | $OC_3H_7$ | |
| 714 | $C_5H_{11}O$ | F | F | 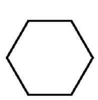 | $CH_2CH_2$ | 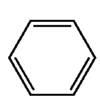 | — | F | H | $OC_4H_9$ | |
| 715 | $C_5H_{11}O$ | F | F | 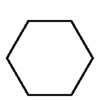 | $CH_2CH_2$ | 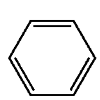 | — | F | H | $OC_5H_{11}$ | |

TABLE 48-continued

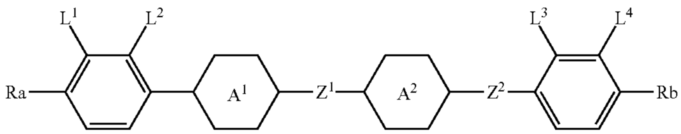

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 716 | $C_2H_5$ | F | F | 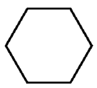 | $CH_2CH_2$ | 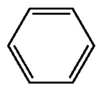 | — | F | H | $C_4H_9$ | |
| 717 | $C_5H_{11}$ | F | F | 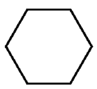 | $CH_2CH_2$ | 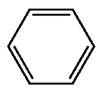 | — | F | H | $C_2H_5$ | |
| 718 | $C_2H_5$ | F | F | 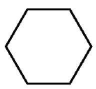 | $CH_2CH_2$ | 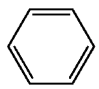 | — | F | H | $OC_4H_9$ | |
| 719 | $CH_2{=}CH$ | F | F | 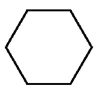 | $CH_2CH_2$ | 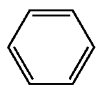 | — | F | H | $OC_3H_7$ | |
| 720 | $CH_2{=}CH$ | F | F | 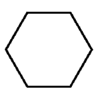 | $CH_2CH_2$ | 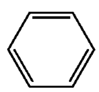 | — | F | H | $OC_5H_{11}$ | |

TABLE 49

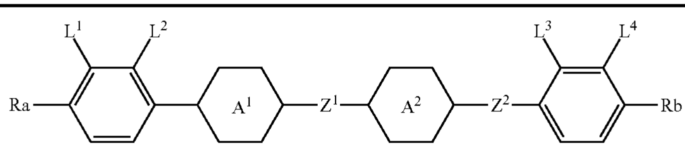

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 721 | $CH_2{=}CHO$ | F | F | 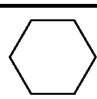 | $CH_2CH_2$ | 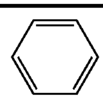 | — | F | H | $OC_3H_7$ | |
| 722 | $CH_2{=}CHCH_2O$ | F | F | 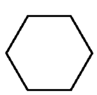 | $CH_2CH_2$ | 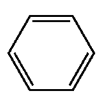 | — | F | H | $OC_5H_{11}$ | |
| 723 | $CH_2{=}CHCH_2O$ | F | F | 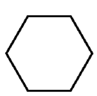 | $CH_2CH_2$ | 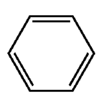 | — | F | H | $OC_3H_7$ | |
| 724 | $CH_2{=}CHC_2H_5O$ | F | F | 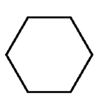 | $CH_2CH_2$ | 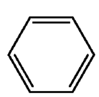 | — | F | H | $OC_5H_{11}$ | |
| 725 | $CH_2{=}CHC_2H_5O$ | F | F | 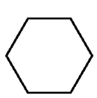 | $CH_2CH_2$ | 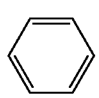 | — | F | H | $OC_2H_5$ | |
| 726 | $CH_2{=}CHC_2H_5O$ | F | F | 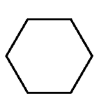 | $CH_2CH_2$ | 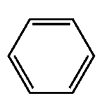 | — | F | H | $OC_3H_7$ | |

TABLE 49-continued

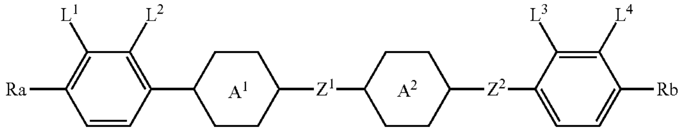

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 727 | $CH_3CH{=}CHCH_2O$ | F | F | 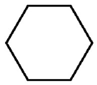 | $CH_2CH_2$ | 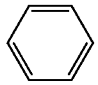 | — | F | H | $OCH_3$ | |
| 728 | $CH_3CH{=}CHCH_2O$ | F | F | 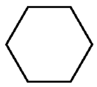 | $CH_2CH_2$ | 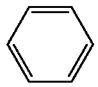 | — | F | H | $OC_2H_5$ | |
| 729 | $C_3H_7O$ | F | F | 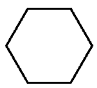 | $CH_2CH_2$ | 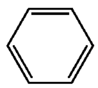 | — | F | H | $OCH{=}CH_2$ | |
| 730 | $C_3H_7O$ | F | F | 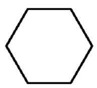 | $CH_2CH_2$ | 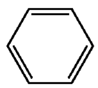 | — | F | H | $OCH_2CH{=}CH_2$ | |
| 731 | $C_4H_9O$ | F | F | 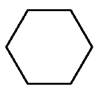 | $CH_2CH_2$ | 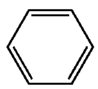 | — | F | H | $OCH_2CH{=}CH_2$ | |
| 732 | $C_5H_{11}O$ | F | F | 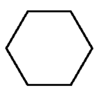 | $CH_2CH_2$ |  | — | F | H | $OCH_2CH{=}CH_2$ | |
| 733 | $CH_3O$ | F | F | 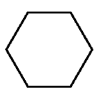 | $CH_2CH_2$ |  | — | F | H | $OC_2H_5CH{=}CH_2$ | |
| 734 | $C_2H_5O$ | F | F | 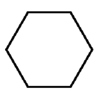 | $CH_2CH_2$ |  | — | F | H | $OC_2H_5CH{=}CH_2$ | |
| 735 | $C_3H_7O$ | F | F | 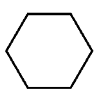 | $CH_2CH_2$ | 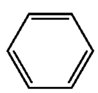 | — | F | H | $OC_2H_5CH{=}CH_2$ | |

TABLE 50

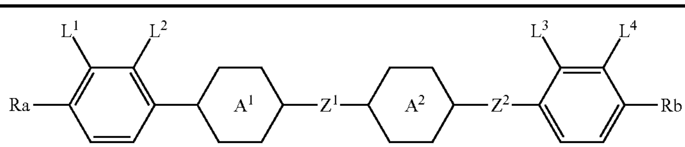

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 736 | $CH_3O$ | F | F | 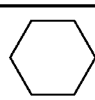 | $CH_2CH_2$ | 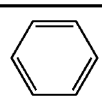 | — | F | H | $OCH_2CH{=}CHCH_3$ | |
| 737 | $C_2H_5O$ | F | F | 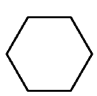 | $CH_2CH_2$ | 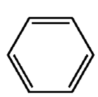 | — | F | H | $OCH_2CH{=}CHCH_3$ | |
| 738 | $C_3H_7O$ | F | F | 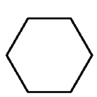 | $CH_2CH_2$ | 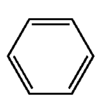 | — | F | H | $OCH_2CH{=}CHCH_3$ | |

TABLE 50-continued

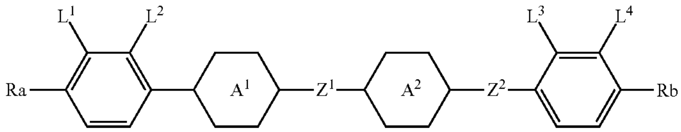

| No. | Ra | L1 | L2 | A1 | Z1 | A2 | Z2 | L3 | L4 | Rb | Physical property values |
|---|---|---|---|---|---|---|---|---|---|---|---|
| 739 | $CH_2$=$CHCH_2O$ | F | F | 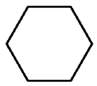 | $CH_2CH_2$ | 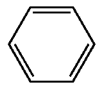 | — | F | H | OCH=$CH_2$ | |
| 740 | $CH_2$=$CHCH_5O$ | F | F | 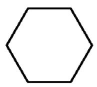 | $CH_2CH_2$ | 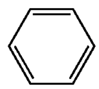 | — | F | H | $OCH_2CH$=$CH_2$ | |
| 741 | $C_3H_7OCH_2$ | F | F | 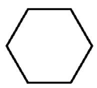 | $CH_2CH_2$ | 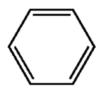 | — | F | H | $CO_3$H7 | |
| 742 | $C_5H_{11}O$ | F | F | 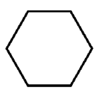 | $CH_2CH_2$ | 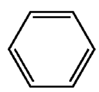 | — | F | H | $OC_2H_5CH$=$CH_2$ | |
| 743 | $C_3H_7O$ | F | F | 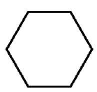 | $CH_2CH_2$ | 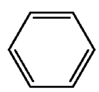 | — | F | H | H | |
| 744 | $C_5H_{11}O$ | F | F | 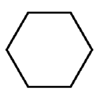 | $CH_2CH_2$ | 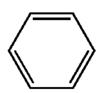 | — | F | H | $OC_9H_{19}$ | |
| 745 | $C_3H_7O$ | F | F | 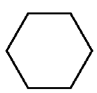 | $CH_2CH_2$ | 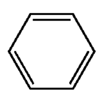 | — | F | H | $C_2H_5$ | |
| 746 | $C_5H_{11}O$ | F | F | 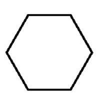 | $CH_2CH_2$ | 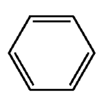 | — | F | H | $C_3H_7$ | |
| 747 | H | F | F | 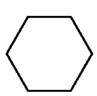 | $CH_2CH_2$ | 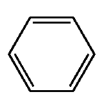 | — | F | H | $OC_4H_9$ | |
| 748 | $C_7H_{15}O$ | F | F | 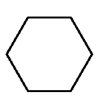 | $CH_2CH_2$ | 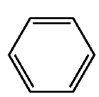 | — | F | H | $OC_4H_9$ | |
| 749 | $C_2H_5O$ | F | F | 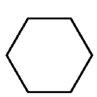 | $CH_2CH_2$ | 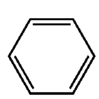 | — | F | H | $OC_6H_{13}$ | |
| 750 | $CH_3O$ | F | F | 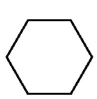 | $CH_2CH_2$ | 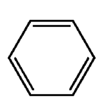 | — | F | H | $C_2H_5$ | |

TABLE 51

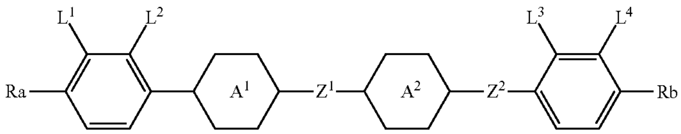

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 751 | $CH_3O$ | F | F | 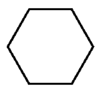 | $CH_2CH_2$ | 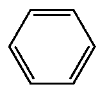 | — | H | F | $OCH_3$ | |
| 752 | $CH_3O$ | F | F | 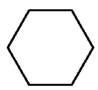 | $CH_2CH_2$ | 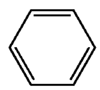 | — | H | F | $OC_2H_5$ | |
| 753 | $CH_3O$ | F | F | 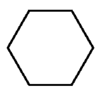 | $CH_2CH_2$ | 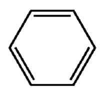 | — | H | F | $OC_3H_7$ | |
| 754 | $CH_3O$ | F | F | 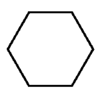 | $CH_2CH_2$ | 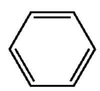 | — | H | F | $OC_4H_9$ | |
| 755 | $CH_3O$ | F | F | 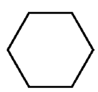 | $CH_2CH_2$ | 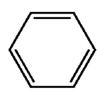 | — | H | F | $OC_5H_{11}$ | |
| 756 | $C_2H_5O$ | F | F | 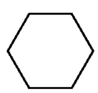 | $CH_2CH_2$ | 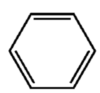 | — | H | F | $OCH_3$ | |
| 757 | $C_2H_5O$ | F | F | 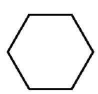 | $CH_2CH_2$ | 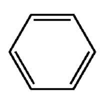 | — | H | F | $OC_2H_5$ | |
| 758 | $C_2H_5O$ | F | F | 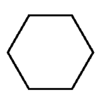 | $CH_2CH_2$ | 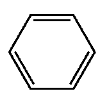 | — | H | F | $OC_3H_7$ | |
| 759 | $C_2H_5O$ | F | F | 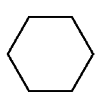 | $CH_2CH_2$ | 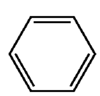 | — | H | F | $OC_4H_9$ | |
| 760 | $C_2H_5O$ | F | F | 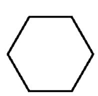 | $CH_2CH_2$ | 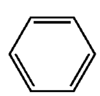 | — | H | F | $OC_5H_{11}$ | |
| 761 | $C_3H_7O$ | F | F | 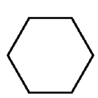 | $CH_2CH_2$ | 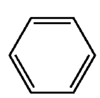 | — | H | F | $OCH_3$ | |
| 762 | $C_3H_7O$ | F | F | 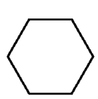 | $CH_2CH_2$ | 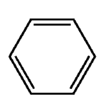 | — | H | F | $OC_2H_5$ | |
| 763 | $C_3H_7O$ | F | F | 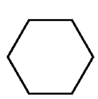 | $CH_2CH_2$ | 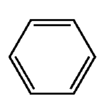 | — | H | F | $OC_3H_7$ | |

TABLE 51-continued

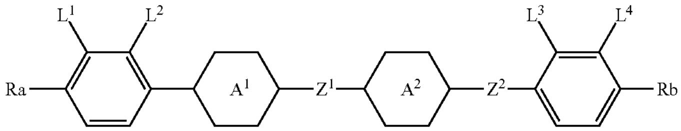

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 764 | $C_3H_7O$ | F | F | 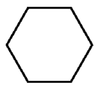 | $CH_2CH_2$ | 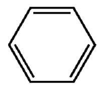 | — | H | F | $OC_4H_9$ | |
| 765 | $C_3H_7O$ | F | F | 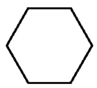 | $CH_2CH_2$ | 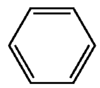 | — | H | F | $OC_5H_{11}$ | |

TABLE 52

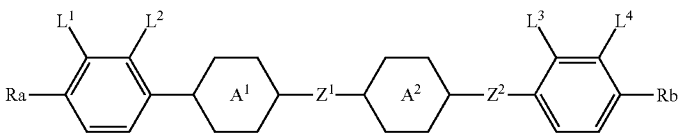

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 766 | $C_4H_9O$ | F | F | 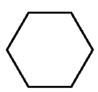 | $CH_2CH_2$ | 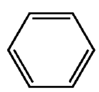 | — | H | F | $OCH_3$ | |
| 767 | $C_4H_9O$ | F | F | 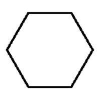 | $CH_2CH_2$ | 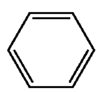 | — | H | F | $OC_2H_5$ | |
| 768 | $C_4H_9O$ | F | F | 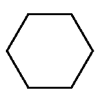 | $CH_2CH_2$ | 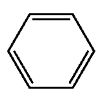 | — | H | F | $OC_3H_7$ | |
| 769 | $C_4H_9O$ | F | F | 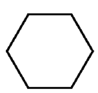 | $CH_2CH_2$ | 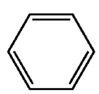 | — | H | F | $OC_4H_9$ | |
| 770 | $C_4H_9O$ | F | F | 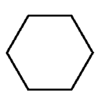 | $CH_2CH_2$ | 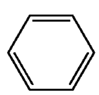 | — | H | F | $OC_5H_{11}$ | |
| 771 | $C_5H_{11}O$ | F | F | 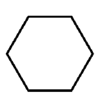 | $CH_2CH_2$ | 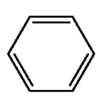 | — | H | F | $OCH_3$ | |
| 772 | $C_5H_{11}O$ | F | F | 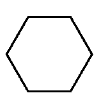 | $CH_2CH_2$ | 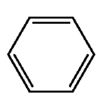 | — | H | F | $OC_2H_5$ | |
| 773 | $C_5H_{11}O$ | F | F | 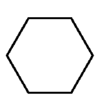 | $CH_2CH_2$ | 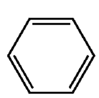 | — | H | F | $OC_3H_7$ | |
| 774 | $C_5H_{11}O$ | F | F | 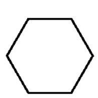 | $CH_2CH_2$ | 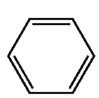 | — | H | F | $OC_4H_9$ | |
| 775 | $C_5H_{11}O$ | F | F | 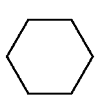 | $CH_2CH_2$ | 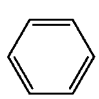 | — | H | F | $OC_5H_{11}$ | |

TABLE 52-continued

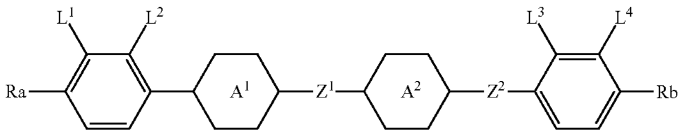

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 776 | $C_2H_5$ | F | F | 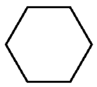 | $CH_2CH_2$ | 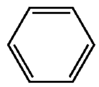 | — | H | F | $C_4H_9$ | |
| 777 | $C_5H_{11}$ | F | F | 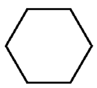 | $CH_2CH_2$ | 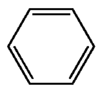 | — | H | F | $C_2H_5$ | |
| 778 | $C_2H_5$ | F | F | 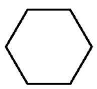 | $CH_2CH_2$ |  | — | H | F | $OC_4H_9$ | |
| 779 | $CH_2{=}CH$ | F | F | 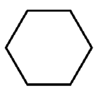 | $CH_2CH_2$ | 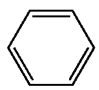 | — | H | F | $OC_3H_7$ | |
| 780 | $CH_2{=}CH$ | F | F | 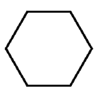 | $CH_2CH_2$ | 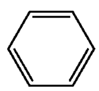 | — | H | F | $OC_5H_{11}$ | |

TABLE 53

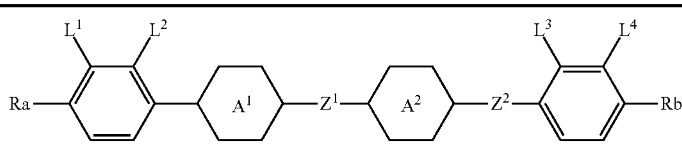

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 781 | $CH_2{=}CHO$ | F | F | 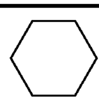 | $CH_2CH_2$ | 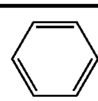 | — | H | F | $OC_3H_7$ | |
| 782 | $CH_2{=}CHCH_2O$ | F | F | 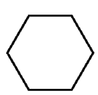 | $CH_2CH_2$ | 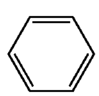 | — | H | F | $OC_5H_{11}$ | |
| 783 | $CH_2{=}CHCH_2O$ | F | F | 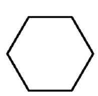 | $CH_2CH_2$ | 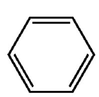 | — | H | F | $OC_3H_7$ | |
| 784 | $CH_2{=}CHC_2H_5O$ | F | F | 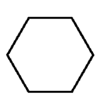 | $CH_2CH_2$ | 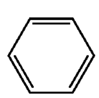 | — | H | F | $OC_5H_{11}$ | |
| 785 | $CH_2{=}CHC_2H_5O$ | F | F | 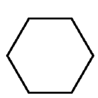 | $CH_2CH_2$ | 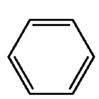 | — | H | F | $OC_2H_5$ | |
| 786 | $CH_2{=}CHC_2H_5O$ | F | F | 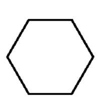 | $CH_2CH_2$ | 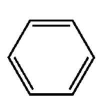 | — | H | F | $OC_3H_7$ | |

TABLE 53-continued

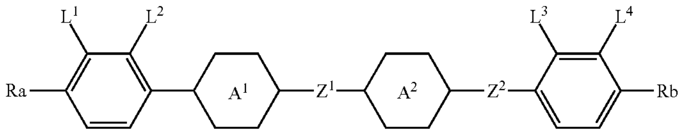

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 787 | $CH_3CH{=}CHCH_2O$ | F | F | 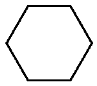 | $CH_2CH_2$ | 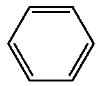 | — | H | F | $OCH_3$ | |
| 788 | $CH_3CH{=}CHCH_2O$ | F | F | 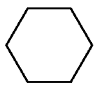 | $CH_2CH_2$ | 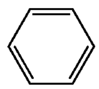 | — | H | F | $OC_2H_5$ | |
| 789 | $C_3H_7O$ | F | F | 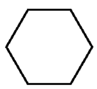 | $CH_2CH_2$ | 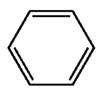 | — | H | F | $OCH{=}CH_2$ | |
| 790 | $C_3H_7O$ | F | F | 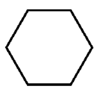 | $CH_2CH_2$ | 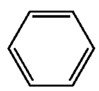 | — | H | F | $OCH_2CH{=}CH_2$ | |
| 791 | $C_4H_9O$ | F | F | 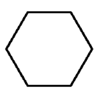 | $CH_2CH_2$ | 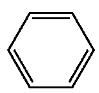 | — | H | F | $OCH_2CH{=}CH_2$ | |
| 792 | $C_5H_{11}O$ | F | F | 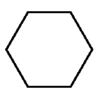 | $CH_2CH_2$ | 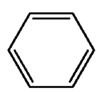 | — | H | F | $OCH_2CH{=}CH_2$ | |
| 793 | $CH_3O$ | F | F | 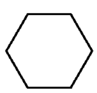 | $CH_2CH_2$ | 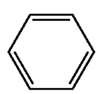 | — | H | F | $OC_2H_5CH{=}CH_2$ | |
| 794 | $C_2H_5O$ | F | F | 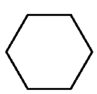 | $CH_2CH_2$ | 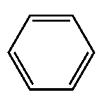 | — | H | F | $OC_2H_5CH{=}CH_2$ | |
| 795 | $C_3H_7O$ | F | F | 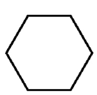 | $CH_2CH_2$ | 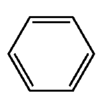 | — | H | F | $OC_2H_5CH{=}CH_2$ | |

TABLE 54

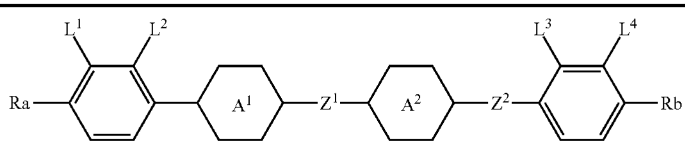

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 796 | $CH_3O$ | F | F | 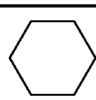 | $CH_2CH_2$ | 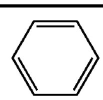 | — | H | F | $OCH_2CH{=}CHCH_3$ | |
| 797 | $C_2H_5O$ | F | F | 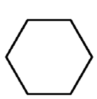 | $CH_2CH_2$ | 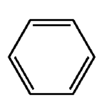 | — | H | F | $OCH_2CH{=}CHCH_3$ | |

TABLE 54-continued

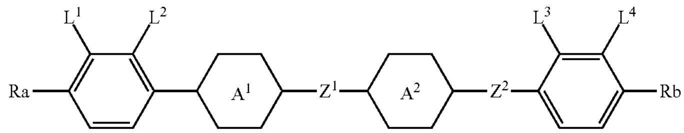

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 798 | $C_3H_7O$ | F | F | 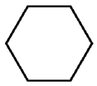 | $CH_2CH_2$ | 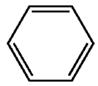 | — | H | F | $OCH_2CH{=}CHCH_3$ | |
| 799 | $CH_2{=}CHCH_2O$ | F | F | 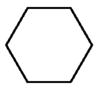 | $CH_2CH_2$ | 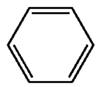 | — | H | F | $OCH{=}CH_2$ | |
| 800 | $CH_2{=}CHC_2H_2O$ | F | F | 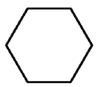 | $CH_2CH_2$ | 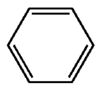 | — | H | F | $OCH_2CH{=}CH_2$ | |
| 801 | $C_3H_7OCH_2$ | F | F | 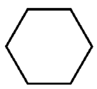 | $CH_2CH_2$ | 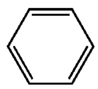 | — | H | F | $OC_3H_7$ | |
| 802 | $C_5H_{11}O$ | F | F | 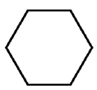 | $CH_2CH_2$ | 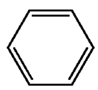 | — | H | F | $OC_2H_5CH{=}CH_2$ | |
| 803 | $C_3H_7O$ | F | F | 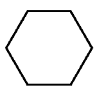 | $CH_2CH_2$ | 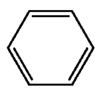 | — | H | F | H | |
| 804 | $C_5H_{11}O$ | F | F | 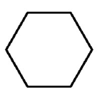 | $CH_2CH_2$ | 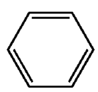 | — | H | F | $OC_9H_{19}$ | |
| 805 | $C_3H_7O$ | F | F | 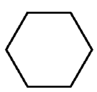 | $CH_2CH_2$ | 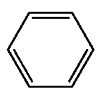 | — | H | F | $C_2H_5$ | |
| 806 | $C_5H_{11}O$ | F | F | 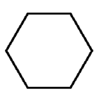 | $CH_2CH_2$ | 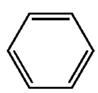 | — | H | F | $C_3H_7$ | |
| 807 | H | F | F | 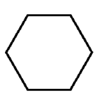 | $CH_2CH_2$ | 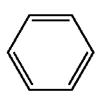 | — | H | F | $OC_4H_9$ | |
| 808 | $C_7H_{15}O$ | F | F | 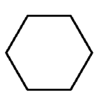 | $CH_2CH_2$ | 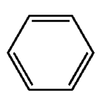 | — | H | F | $OC_4H_9$ | |
| 809 | $C_2H_5O$ | F | F | 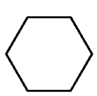 | $CH_2CH_2$ | 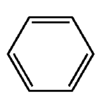 | — | H | F | $OC_6H_{13}$ | |
| 810 | $CH_3O$ | F | F | 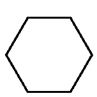 | $CH_2CH_2$ | 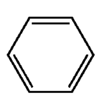 | — | H | F | $C_2H_5$ | |

TABLE 55

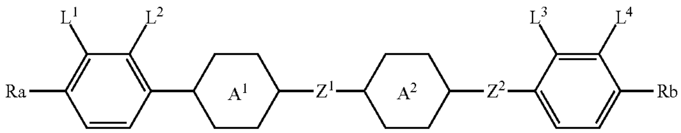

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 811 | $CH_3O$ | F | F | 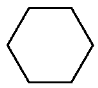 | $CH_2CH_2$ | 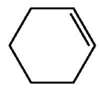 | — | F | F | $OCH_3$ | |
| 812 | $CH_3O$ | F | F | 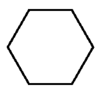 | $CH_2CH_2$ | 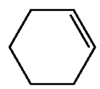 | — | F | F | $OC_2H_5$ | |
| 813 | $CH_3O$ | F | F | 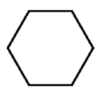 | $CH_2CH_2$ | 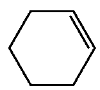 | — | F | F | $OC_3H_7$ | |
| 814 | $CH_3O$ | F | F | 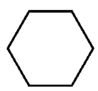 | $CH_2CH_2$ | 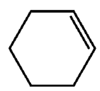 | — | F | F | $OC_4H_9$ | |
| 815 | $CH_3O$ | F | F | 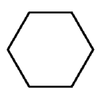 | $CH_2CH_2$ | 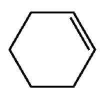 | — | F | F | $OC_5H_{11}$ | |
| 816 | $C_2H_5O$ | F | F | 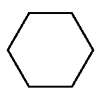 | $CH_2CH_2$ | 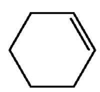 | — | F | F | $OCH_3$ | |
| 817 | $C_2H_5O$ | F | F | 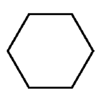 | $CH_2CH_2$ | 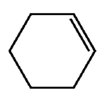 | — | F | F | $OC_2H_5$ | |
| 818 | $C_2H_5O$ | F | F | 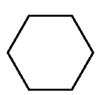 | $CH_2CH_2$ | 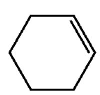 | — | F | F | $OC_3H_7$ | |
| 819 | $C_2H_5O$ | F | F | 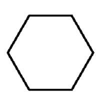 | $CH_2CH_2$ | 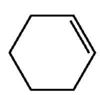 | — | F | F | $OC_4H_9$ | |
| 820 | $C_2H_5O$ | F | F | 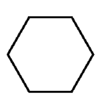 | $CH_2CH_2$ | 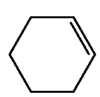 | — | F | F | $OC_5H_{11}$ | |
| 821 | $C_3H_7O$ | F | F | 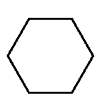 | $CH_2CH_2$ | 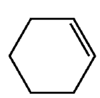 | — | F | F | $OCH_3$ | |
| 822 | $C_3H_7O$ | F | F | 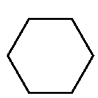 | $CH_2CH_2$ | 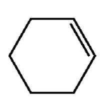 | — | F | F | $OC_2H_5$ | |
| 823 | $C_3H_7O$ | F | F | 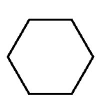 | $CH_2CH_2$ | 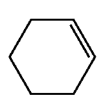 | — | F | F | $OC_3H_7$ | |

TABLE 55-continued

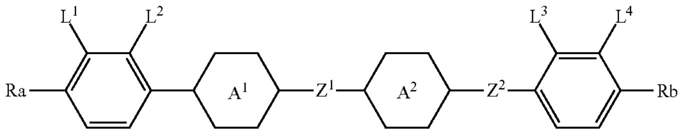

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 824 | $C_3H_7O$ | F | F | 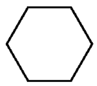 | $CH_2CH_2$ | 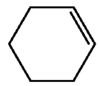 | — | F | F | $OC_4H_9$ | |
| 825 | $C_3H_7O$ | F | F | 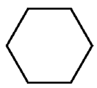 | $CH_2CH_2$ | 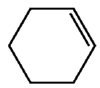 | — | F | F | $OC_5H_{11}$ | |

TABLE 56

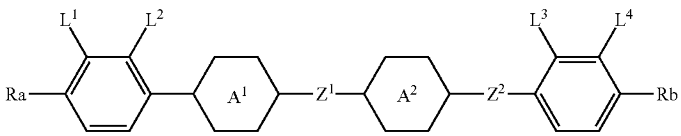

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 826 | $C_4H_9O$ | F | F | 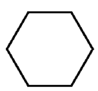 | $CH_2CH_2$ | 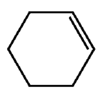 | — | F | F | $OCH_3$ | |
| 827 | $C_4H_9O$ | F | F | 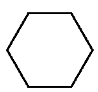 | $CH_2CH_2$ | 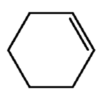 | — | F | F | $OC_2H_5$ | |
| 828 | $C_4H_9O$ | F | F | 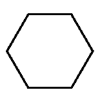 | $CH_2CH_2$ | 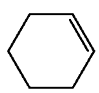 | — | F | F | $OC_3H_7$ | |
| 829 | $C_4H_9O$ | F | F | 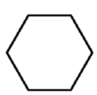 | $CH_2CH_2$ | 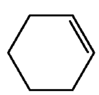 | — | F | F | $OC_4H_9$ | |
| 830 | $C_4H_9O$ | F | F | 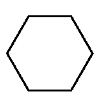 | $CH_2CH_2$ | 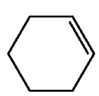 | — | F | F | $OC_5H_{11}$ | |
| 831 | $OC_5H_{11}$ | F | F | 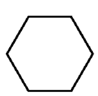 | $CH_2CH_2$ | 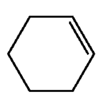 | — | F | F | $OCH_3$ | |
| 832 | $C_5H_{11}O$ | F | F | 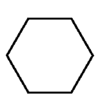 | $CH_2CH_2$ | 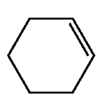 | — | F | F | $OC_2H_5$ | |
| 833 | $C_5H_{11}O$ | F | F | 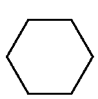 | $CH_2CH_2$ | 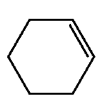 | — | F | F | $OC_3H_7$ | |
| 834 | $C_5H_{11}O$ | F | F | 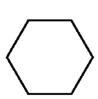 | $CH_2CH_2$ | 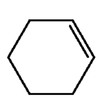 | — | F | F | $OC_4H_9$ | |
| 835 | $C_5H_{11}O$ | F | F | 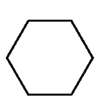 | $CH_2CH_2$ | 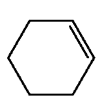 | — | F | F | $OC_5H_{11}$ | |

TABLE 56-continued

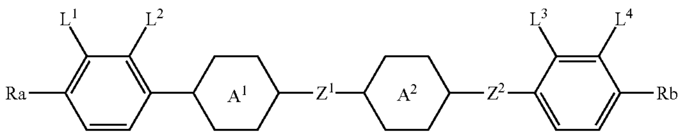

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 836 | $C_2H_5$ | F | F | 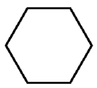 | $CH_2CH_2$ | 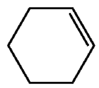 | — | F | F | $OC_4H_9$ | |
| 837 | $C_5H_{11}$ | F | F | 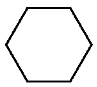 | $CH_2CH_2$ | 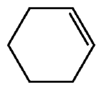 | — | F | F | $C_2H_5$ | |
| 838 | $C_2H_5$ | F | F | 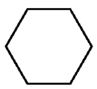 | $CH_2CH_2$ | 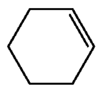 | — | F | F | $OC_4H_9$ | |
| 839 | $CH_2{=}CH$ | F | F | 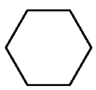 | $CH_2CH_2$ | 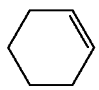 | — | F | F | $OC_3H_7$ | |
| 840 | $CH_2{=}CH$ | F | F | 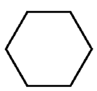 | $CH_2CH_2$ | 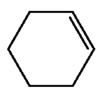 | — | F | F | $OC_5H_{11}$ | |

TABLE 57

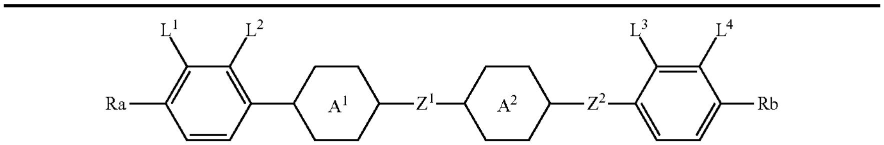

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 841 | $CH_3O$ | F | F | 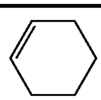 | $CH_2CH_2$ | 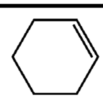 | — | F | F | $OCH_3$ | |
| 842 | $CH_3O$ | F | F | 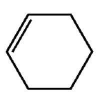 | $CH_2CH_2$ | 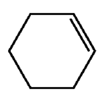 | — | F | F | $OC_2H_5$ | |
| 843 | $CH_3O$ | F | F | 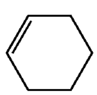 | $CH_2CH_2$ | 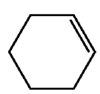 | — | F | F | $OC_3H_7$ | |
| 844 | $CH_3O$ | F | F | 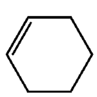 | $CH_2CH_2$ | 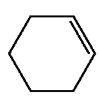 | — | F | F | $OC_4H_9$ | |
| 845 | $CH_3O$ | F | F | 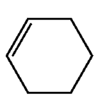 | $CH_2CH_2$ | 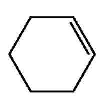 | — | F | F | $OC_5H_{11}$ | |
| 846 | $C_2H_5O$ | F | F | 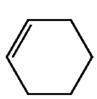 | $CH_2CH_2$ | 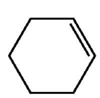 | — | F | F | $OCH_3$ | |

TABLE 57-continued

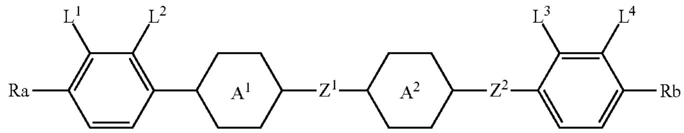

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 847 | $C_2H_5O$ | F | F | 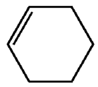 | $CH_2CH_2$ | 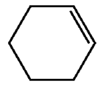 | — | F | F | $OC_2H_5$ | |
| 848 | $C_2H_5O$ | F | F | 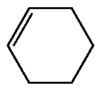 | $CH_2CH_2$ | 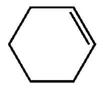 | — | F | F | $OC_3H_7$ | |
| 849 | $C_2H_5O$ | F | F | 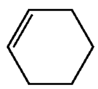 | $CH_2CH_2$ | 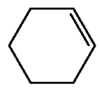 | — | F | F | $OC_4H_9$ | |
| 850 | $C_2H_5O$ | F | F | 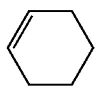 | $CH_2CH_2$ | 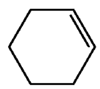 | — | F | F | $OC_5H_{11}$ | |
| 851 | $C_3H_7O$ | F | F | 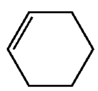 | $CH_2CH_2$ | 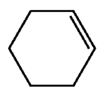 | — | F | F | $OCH_3$ | |
| 852 | $C_3H_7O$ | F | F | 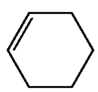 | $CH_2CH_2$ | 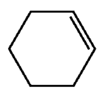 | — | F | F | $OC_2H_5$ | |
| 853 | $C_3H_7O$ | F | F | 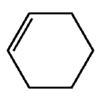 | $CH_2CH_2$ | 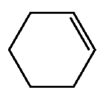 | — | F | F | $OC_3H_7$ | |
| 854 | $C_3H_7O$ | F | F | 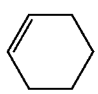 | $CH_2CH_2$ | 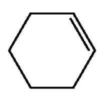 | — | F | F | $OC_4H_9$ | |
| 855 | $C_3H_7O$ | F | F | 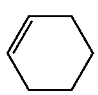 | $CH_2CH_2$ | 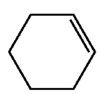 | — | F | F | $OC_5H_{11}$ | |

TABLE 58

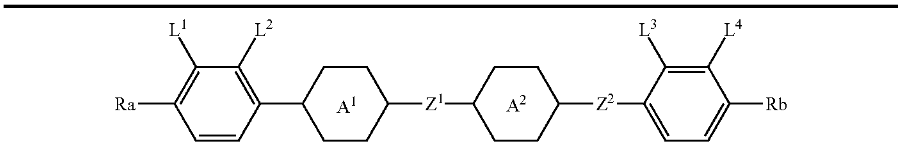

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 856 | $C_4H_9O$ | F | F | 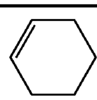 | $CH_2CH_2$ | 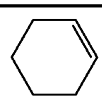 | — | F | F | $OCH_3$ | |
| 857 | $C_4H_9O$ | F | F | 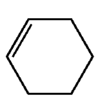 | $CH_2CH_2$ | 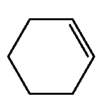 | — | F | F | $OC_2H_5$ | |
| 858 | $C_4H_9O$ | F | F | 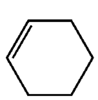 | $CH_2CH_2$ | 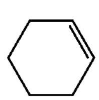 | — | F | F | $OC_3H_7$ | |

TABLE 58-continued

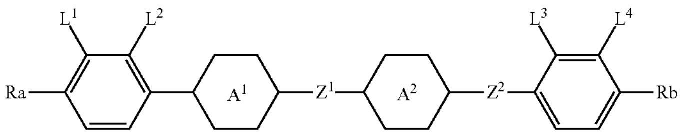

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 859 | $C_4H_9O$ | F | F | 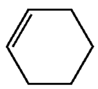 | $CH_2CH_2$ | 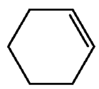 | — | F | F | $OC_4H_9$ | |
| 860 | $C_4H_9O$ | F | F | 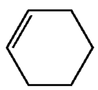 | $CH_2CH_2$ | 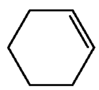 | — | F | F | $OC_5H_{11}$ | |
| 861 | $C_5H_{11}O$ | F | F | 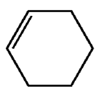 | $CH_2CH_2$ | 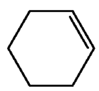 | — | F | F | $OCH_3$ | |
| 862 | $C_5H_{11}O$ | F | F | 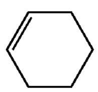 | $CH_2CH_2$ | 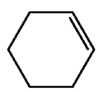 | — | F | F | $OC_2H_5$ | |
| 863 | $C_5H_{11}O$ | F | F | 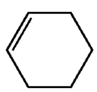 | $CH_2CH_2$ | 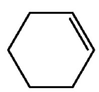 | — | F | F | $OC_3H_7$ | |
| 864 | $C_5H_{11}O$ | F | F | 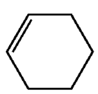 | $CH_2CH_2$ | 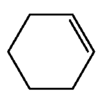 | — | F | F | $OC_4H_9$ | |
| 865 | $C_5H_{11}O$ | F | F | 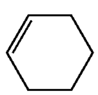 | $CH_2CH_2$ | 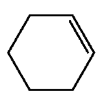 | — | F | F | $OC_5H_{11}$ | |
| 866 | $C_2H_5$ | F | F | 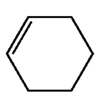 | $CH_2CH_2$ | 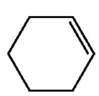 | — | F | F | $C_4H_9$ | |
| 867 | $C_5H_{11}$ | F | F | 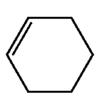 | $CH_2CH_2$ | 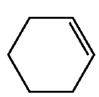 | — | F | F | $C_2H_5$ | |
| 868 | $C_2H_5$ | F | F | 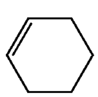 | $CH_2CH_2$ | 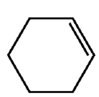 | — | F | F | $OC_3H_7$ | |
| 869 | $CH_2{=}CH$ | F | F | 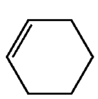 | $CH_2CH_2$ | 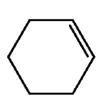 | — | F | F | $OC_4H_9$ | |
| 870 | $CH_2{=}CH$ | F | F | 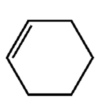 | $CH_2CH_2$ | 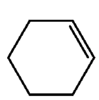 | — | F | F | $OC_5H_{11}$ | |

TABLE 59

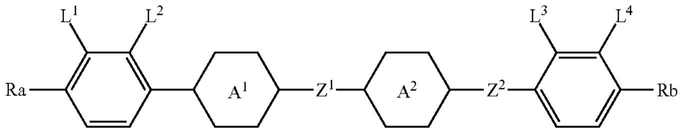

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 871 | $CH_3O$ | F | F | 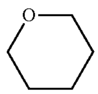  | $CH_2CH_2$ | 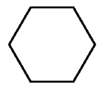 | — | F | F | $OCH_3$ | |
| 872 | $CH_3O$ | F | F | 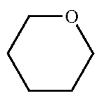  | $CH_2CH_2$ | 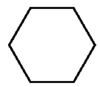 | — | F | F | $OC_2H_5$ | |
| 873 | $CH_3O$ | F | F | 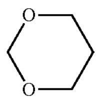  | $CH_2CH_2$ | 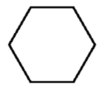 | — | F | F | $OC_3H_7$ | |
| 874 | $CH_3O$ | F | F | 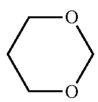  | $CH_2CH_2$ | 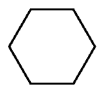 | — | F | F | $OC_4H_9$ | |
| 875 | $CH_3O$ | F | F | 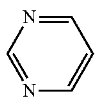  | $CH_2CH_2$ | 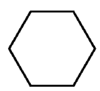 | — | F | F | $OC_5H_{11}$ | |
| 876 | $C_2H_5O$ | F | F | 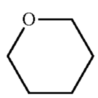  | $CH_2CH_2$ | 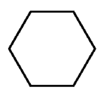 | — | F | F | $OCH_3$ | |
| 877 | $C_2H_5O$ | F | F | 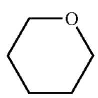  | $CH_2CH_2$ | 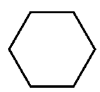 | — | F | F | $OC_2H_5$ | |
| 878 | $C_2H_5O$ | F | F | 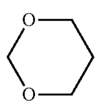  | $CH_2CH_2$ | 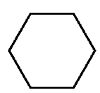 | — | F | F | $OC_3H_7$ | |
| 879 | $C_2H_5O$ | F | F | 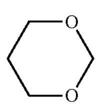  | $CH_2CH_2$ | 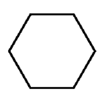 | — | F | F | $OC_4H_9$ | |
| 880 | $C_2H_5O$ | F | F | 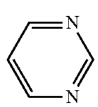  | $CH_2CH_2$ | 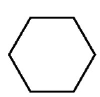 | — | F | F | $OC_5H_{11}$ | |
| 881 | $C_3H_7O$ | F | F | 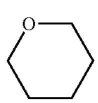  | $CH_2CH_2$ | 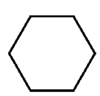 | — | F | F | $OCH_3$ | |
| 882 | $C_3H_7O$ | F | F | 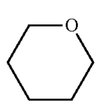  | $CH_2CH_2$ | 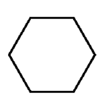 | — | F | F | $OC_2H_5$ | |
| 883 | $C_3H_7O$ | F | F | 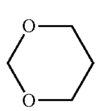  | $CH_2CH_2$ | 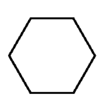 | — | F | F | $OC_3H_7$ | |

TABLE 59-continued

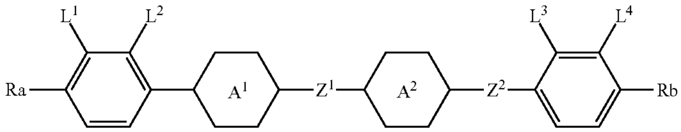

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 884 | $C_3H_7O$ | F | F | 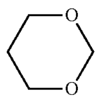 | $CH_2CH_2$ | 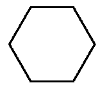 | — | F | F | $OC_4H_9$ | |
| 885 | $C_3H_7O$ | F | F | 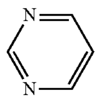 | $CH_2CH_2$ | 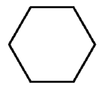 | — | F | F | $OC_5H_{11}$ | |

TABLE 60

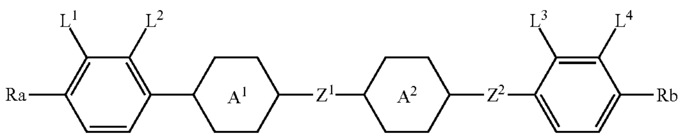

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 886 | $C_4H_9O$ | F | F | 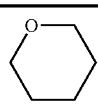 | $CH_2CH_2$ | 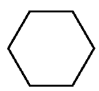 | — | F | F | $OCH_3$ | |
| 887 | $C_4H_9O$ | F | F | 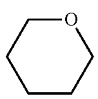 | $CH_2CH_2$ | 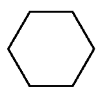 | — | F | F | $OC_2H_5$ | |
| 888 | $C_4H_9O$ | F | F | 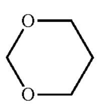 | $CH_2CH_2$ | 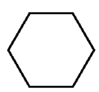 | — | F | F | $OC_3H_7$ | |
| 889 | $C_4H_9O$ | F | F | 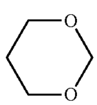 | $CH_2CH_2$ | 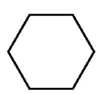 | — | F | F | $OC_4H_9$ | |
| 890 | $C_4H_9O$ | F | F | 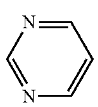 | $CH_2CH_2$ | 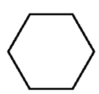 | — | F | F | $OC_5H_{11}$ | |
| 891 | $C_5H_{11}O$ | F | F | 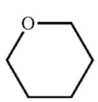 | $CH_2CH_2$ | 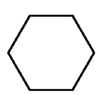 | — | F | F | $OCH_3$ | |
| 892 | $C_5H_{11}O$ | F | F | 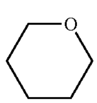 | $CH_2CH_2$ | 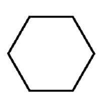 | — | F | F | $OC_2H_5$ | |
| 893 | $C_5H_{11}O$ | F | F | 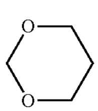 | $CH_2CH_2$ | 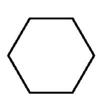 | — | F | F | $OC_3H_7$ | |
| 894 | $C_5H_{11}O$ | F | F | 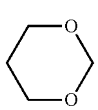 | $CH_2CH_2$ | 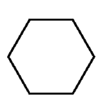 | — | F | F | $OC_4H_9$ | |

TABLE 60-continued

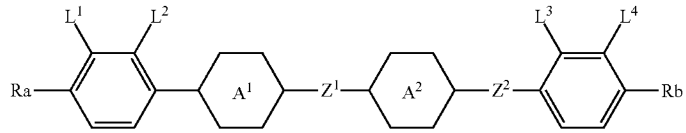

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 895 | $C_5H_{11}O$ | F | F | 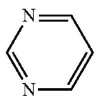 | $CH_2CH_2$ | 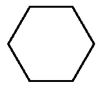 | — | F | F | $OC_5H_{11}$ | |
| 896 | $C_2H_5$ | F | F | 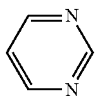 | $CH_2CH_2$ | 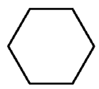 | — | F | F | $C_4H_9$ | |
| 897 | $C_5H_{11}$ | F | F | 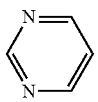 | $CH_2CH_2$ | 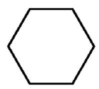 | — | F | F | $C_2H_5$ | |
| 898 | $C_2H_5$ | F | F | 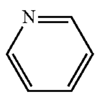 | $CH_2CH_2$ | 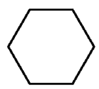 | — | F | F | $OC_4H_9$ | |
| 899 | $CH_2{=}CH$ | F | F | 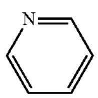 | $CH_2CH_2$ | 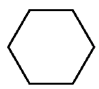 | — | F | F | $OC_3H_7$ | |
| 900 | $CH_2{=}CH$ | F | F | 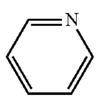 | $CH_2CH_2$ | 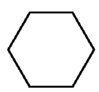 | — | F | F | $OC_5H_{11}$ | |

TABLE 61

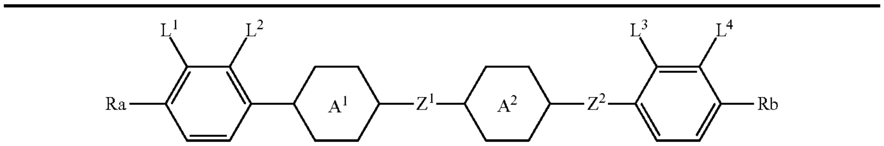

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 901 | $CH_3O$ | F | F | 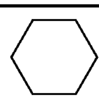 | $CH{=}CH$ | 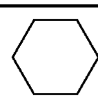 | — | F | F | $OCH_3$ | |
| 902 | $CH_3O$ | F | F | 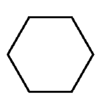 | $CH{=}CH$ | 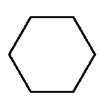 | — | F | F | $OC_2H_5$ | |
| 903 | $CH_3O$ | F | F | 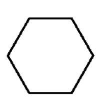 | $CH{=}CH$ | 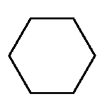 | — | F | F | $OC_3H_7$ | |
| 904 | $CH_3O$ | F | F | 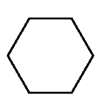 | $CH{=}CH$ | 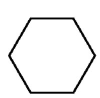 | — | F | F | $OC_4H_9$ | |
| 905 | $CH_3O$ | F | F | 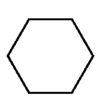 | $CH{=}CH$ | 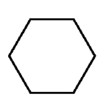 | — | F | F | $OC_5H_{11}$ | |

TABLE 61-continued

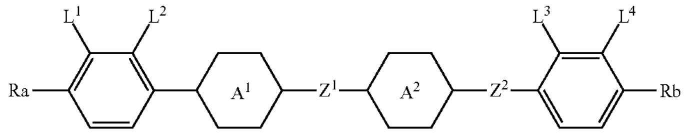

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 906 | $C_2H_5O$ | F | F | 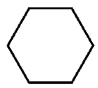 | CH═CH | 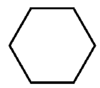 | — | F | F | $OCH_3$ | |
| 907 | $C_2H_5O$ | F | F | 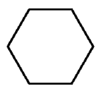 | CH═CH | 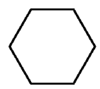 | — | F | F | $OC_2H_5$ | |
| 908 | $C_2H_5O$ | F | F | 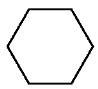 | CH═CH | 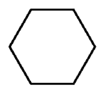 | — | F | F | $OC_3H_7$ | |
| 909 | $C_2H_5O$ | F | F | 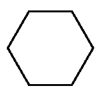 | CH═CH | 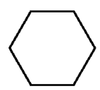 | — | F | F | $OC_4H_9$ | |
| 910 | $C_2H_5O$ | F | F | 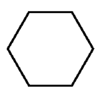 | CH═CH | 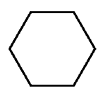 | — | F | F | $OC_5H_{11}$ | |
| 911 | $C_3H_7O$ | F | F | 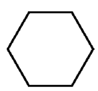 | CH═CH | 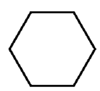 | — | F | F | $OCH_3$ | |
| 912 | $C_3H_7O$ | F | F | 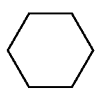 | CH═CH | 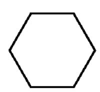 | — | F | F | $OC_2H_5$ | |
| 913 | $C_3H_7O$ | F | F | 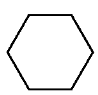 | CH═CH | 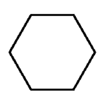 | — | F | F | $OC_3H_7$ | |
| 914 | $C_3H_7O$ | F | F | 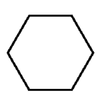 | CH═CH | 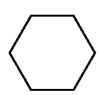 | — | F | F | $OC_4H_9$ | |
| 915 | $C_3H_7O$ | F | F | 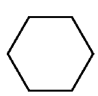 | CH═CH | 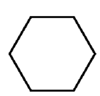 | — | F | F | $OC_5H_{11}$ | |

TABLE 62

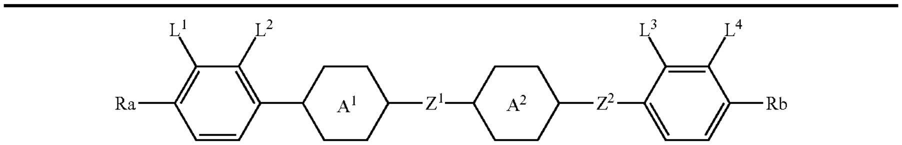

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 916 | $C_4H_9O$ | F | F | 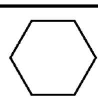 | CH═CH | 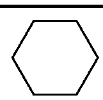 | — | F | F | $OCH_3$ | |
| 917 | $C_4H_9O$ | F | F | 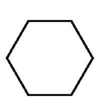 | CH═CH | 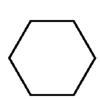 | — | F | F | $OC_2H_5$ | |

TABLE 62-continued

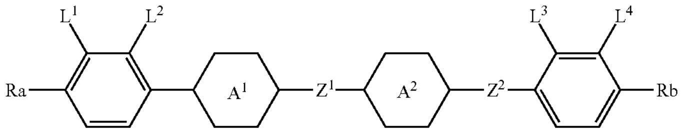

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 918 | $C_4H_9O$ | F | F | 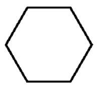 | CH═CH | 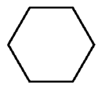 | — | F | F | $OC_3H_7$ | |
| 919 | $C_4H_9O$ | F | F | 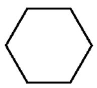 | CH═CH | 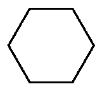 | — | F | F | $OC_4H_9$ | |
| 920 | $C_4H_9O$ | F | F | 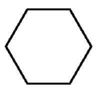 | CH═CH | 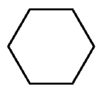 | — | F | F | $OC_5H_{11}$ | |
| 921 | $C_5H_{11}O$ | F | F | 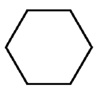 | CH═CH | 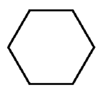 | — | F | F | $OCH_3$ | |
| 922 | $C_5H_{11}O$ | F | F | 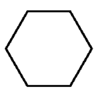 | CH═CH | 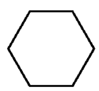 | — | F | F | $OC_2H_5$ | |
| 923 | $C_5H_{11}O$ | F | F | 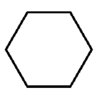 | CH═CH | 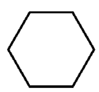 | — | F | F | $OC_3H_7$ | |
| 924 | $C_5H_{11}O$ | F | F | 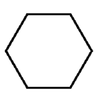 | CH═CH | 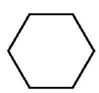 | — | F | F | $OC_4H_9$ | |
| 925 | $C_5H_{11}O$ | F | F | 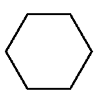 | CH═CH | 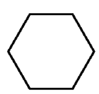 | — | F | F | $OC_5H_{11}$ | |
| 926 | $C_2H_5$ | F | F | 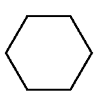 | CH═CH | 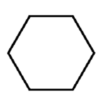 | — | F | F | $C_4H_9$ | |
| 927 | $C_5H_{11}$ | F | F | 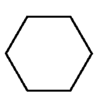 | CH═CH | 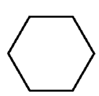 | — | F | F | $C_2H_5$ | |
| 928 | $C_2H_5$ | F | F | 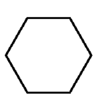 | CH═CH | 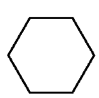 | — | F | F | $OC_4H_9$ | |
| 929 | $CH_2$═CH | F | F | 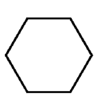 | CH═CH | 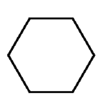 | — | F | F | $OC_3H_7$ | |
| 930 | $CH_2$═CH | F | F | 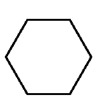 | CH═CH | 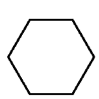 | — | F | F | $OC_5H_{11}$ | |

TABLE 63

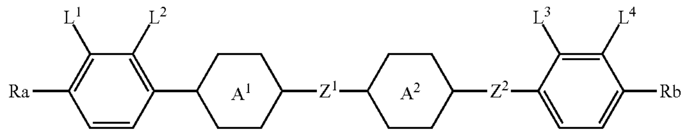

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 931 | $CH_2{=}CHO$ | F | F | 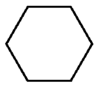 | CH═CH | 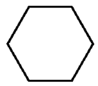 | — | F | F | $OC_3H_7$ | |
| 932 | $CH_2{=}CHCH_2O$ | F | F | 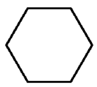 | CH═CH | 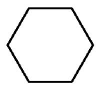 | — | F | F | $OC_5H_{11}$ | |
| 933 | $CH_2{=}CHCH_2O$ | F | F | 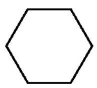 | CH═CH | 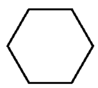 | — | F | F | $OC_3H_7$ | |
| 934 | $CH_2{=}CHC_2H_5O$ | F | F | 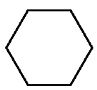 | CH═CH | 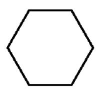 | — | F | F | $OC_5H_{11}$ | |
| 935 | $CH_2{=}CHC_2H_5O$ | F | F | 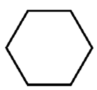 | CH═CH | 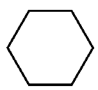 | — | F | F | $OC_2H_5$ | |
| 936 | $CH_2{=}CHC_2H_5O$ | F | F | 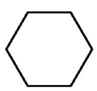 | CH═CH | 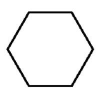 | — | F | F | $OC_3H_7$ | |
| 937 | $CH_3CH{=}CHCH_2O$ | F | F | 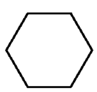 | CH═CH | 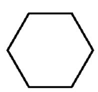 | — | F | F | $OCH_3$ | |
| 938 | $CH_3CH{=}CHCH_2O$ | F | F | 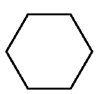 | CH═CH | 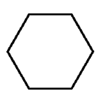 | — | F | F | $OC_2H_5$ | |
| 939 | $C_3H_7O$ | F | F | 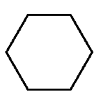 | CH═CH | 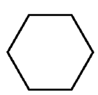 | — | F | F | $OCH{=}CH_2$ | |
| 940 | $C_3H_7O$ | F | F | 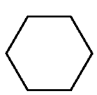 | CH═CH | 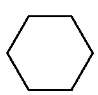 | — | F | F | $OCH_2CH{=}CH_2$ | |
| 941 | $C_4H_9O$ | F | F | 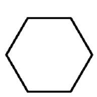 | CH═CH | 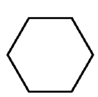 | — | F | F | $OCH_2CH{=}CH_2$ | |
| 942 | $C_5H_{11}O$ | F | F | 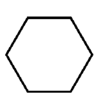 | CH═CH | 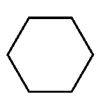 | — | F | F | $OCH_2CH{=}CH_2$ | |
| 943 | $CH_3O$ | F | F | 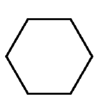 | CH═CH | 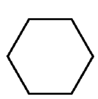 | — | F | F | $OC_2H_5CH{=}CH_2$ | |

TABLE 63-continued

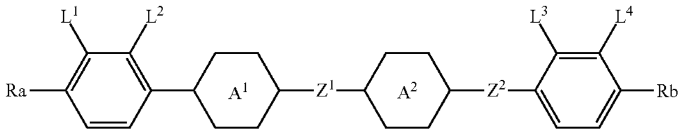

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 944 | $C_2H_5O$ | F | F | 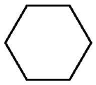 | CH═CH | 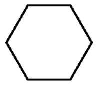 | — | F | F | $OC_2H_5CH{=}CH_2$ | |
| 945 | $C_3H_7O$ | F | F | 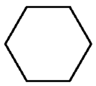 | CH═CH | 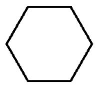 | — | F | F | $OC_2H_5CH{=}CH_2$ | |

TABLE 64

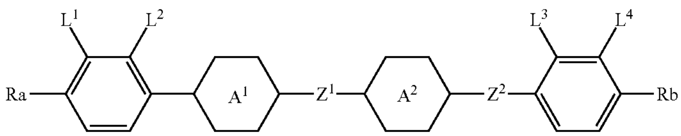

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 946 | $CH_3O$ | F | F | 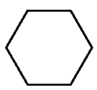 | CH═CH | 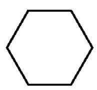 | — | F | F | $OCH_2CH{=}CHCH_3$ | |
| 947 | $C_2H_5O$ | F | F | 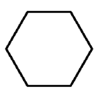 | CH═CH | 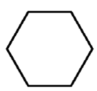 | — | F | F | $OCH_2CH{=}CHCH_3$ | |
| 948 | $C_3H_7O$ | F | F | 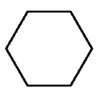 | CH═CH | 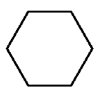 | — | F | F | $OCH_2CH{=}CHCH_3$ | |
| 949 | $CH_2{=}CHCH_2O$ | F | F | 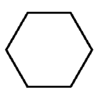 | CH═CH | 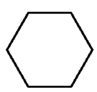 | — | F | F | $OCH{=}CH_2$ | |
| 950 | $CH_2{=}CHC_2H_5O$ | F | F | 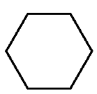 | CH═CH | 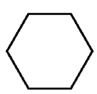 | — | F | F | $OCH_2CH{=}CH_2$ | |
| 951 | $C_3H_7OCH_2$ | F | F | 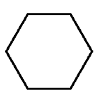 | CH═CH | 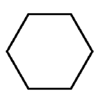 | — | F | F | $OC_3H_7$ | |
| 952 | $C_5H_{11}O$ | F | F | 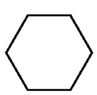 | CH═CH | 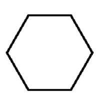 | — | F | F | $OC_2H_5CH{=}CH_2$ | |
| 953 | $C_3H_7O$ | F | F | 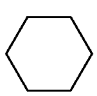 | CH═CH | 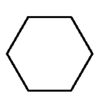 | — | F | F | H | |
| 954 | $C_5H_{11}O$ | F | F | 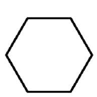 | CH═CH | 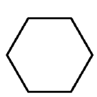 | — | F | F | $OC_9H_{19}$ | |
| 955 | $C_3H_7O$ | F | F | 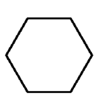 | CH═CH | 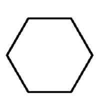 | — | F | F | $C_2H_5$ | |

TABLE 64-continued

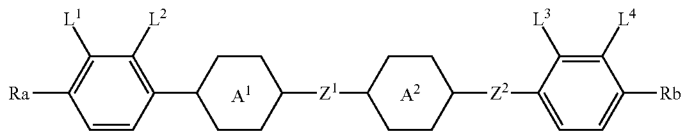

| No. | Ra | L¹ | L² | A¹ | Z¹ | A² | Z² | L³ | L⁴ | Rb | Physical property values |
|---|---|---|---|---|---|---|---|---|---|---|---|
| 956 | $C_5H_{11}O$ | F | F | 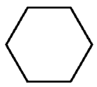 | CH═CH | 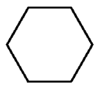 | — | F | F | $C_3H_7$ | |
| 957 | H | F | F | 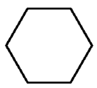 | CH═CH | 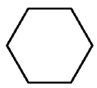 | — | F | F | $OC_4H_9$ | |
| 958 | $C_7H_{15}O$ | F | F | 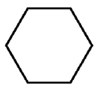 | CH═CH | 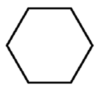 | — | F | F | $OC_4H_9$ | |
| 959 | $C_2H_5O$ | F | F | 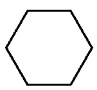 | CH═CH | 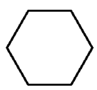 | — | F | F | $OC_6H_{13}$ | |
| 960 | $CH_3O$ | F | F | 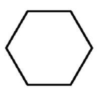 | CH═CH | 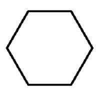 | — | F | F | $C_2H_5$ | |

TABLE 65

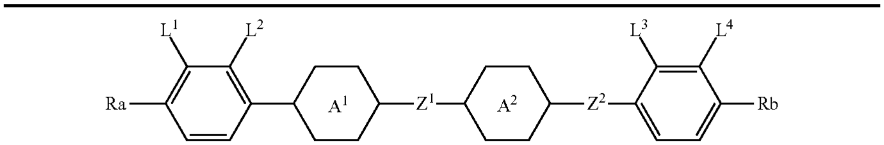

| No. | Ra | L¹ | L² | A¹ | Z¹ | A² | Z² | L³ | L⁴ | Rb | Physical property values |
|---|---|---|---|---|---|---|---|---|---|---|---|
| 961 | $CH_3O$ | F | F | 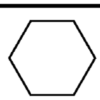 | CH═CH | 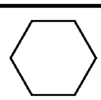 | — | F | H | $OCH_3$ | |
| 962 | $CH_3O$ | F | F | 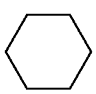 | CH═CH | 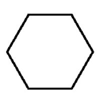 | — | F | H | $OC_2H_5$ | |
| 963 | $CH_3O$ | F | F | 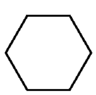 | CH═CH | 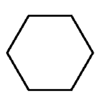 | — | F | H | $OC_3H_7$ | |
| 964 | $CH_3O$ | F | F | 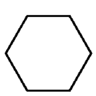 | CH═CH | 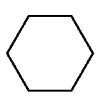 | — | F | H | $OC_4H_9$ | |
| 965 | $CH_3O$ | F | F | 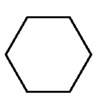 | CH═CH | 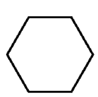 | — | F | H | $OC_5H_{11}$ | |
| 966 | $C_2H_5O$ | F | F | 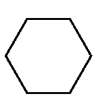 | CH═CH | 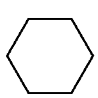 | — | F | H | $OCH_3$ | |

TABLE 65-continued

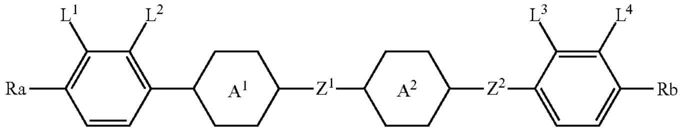

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 967 | $C_2H_5O$ | F | F | 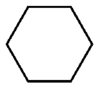 | CH═CH | 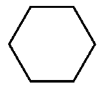 | — | F | H | $OC_2H_5$ | |
| 968 | $C_2H_5O$ | F | F | 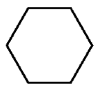 | CH═CH | 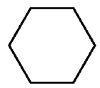 | — | F | H | $OC_3H_7$ | |
| 969 | $C_2H_5O$ | F | F | 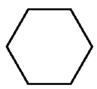 | CH═CH | 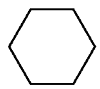 | — | F | H | $OC_4H_9$ | |
| 970 | $C_2H_5O$ | F | F | 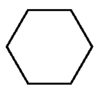 | CH═CH | 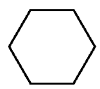 | — | F | H | $OC_5H_{11}$ | |
| 971 | $C_3H_7O$ | F | F | 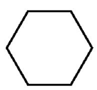 | CH═CH | 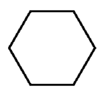 | — | F | H | $OCH_3$ | |
| 972 | $C_3H_7O$ | F | F | 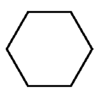 | CH═CH | 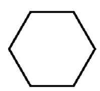 | — | F | H | $OC_2H_5$ | |
| 973 | $C_3H_7O$ | F | F | 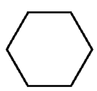 | CH═CH | 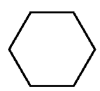 | — | F | H | $OC_3H_7$ | |
| 974 | $C_3H_7O$ | F | F | 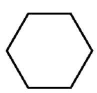 | CH═CH | 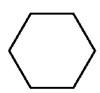 | — | F | H | $OC_4H_9$ | |
| 975 | $C_3H_7O$ | F | F | 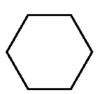 | CH═CH | 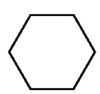 | — | F | H | $OC_5H_{11}$ | |

TABLE 66

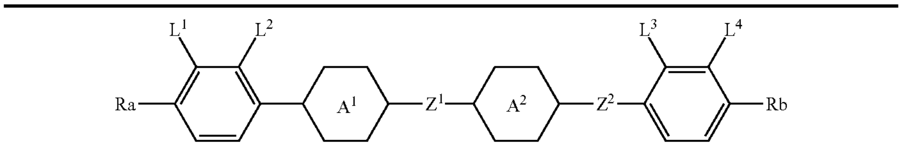

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 976 | $C_4H_9O$ | F | F | 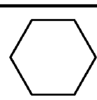 | CH═CH | 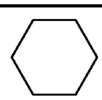 | — | F | H | $OCH_3$ | |
| 977 | $C_4H_9O$ | F | F | 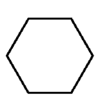 | CH═CH | 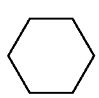 | — | F | H | $OC_2H_5$ | |
| 978 | $C_4H_9O$ | F | F | 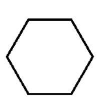 | CH═CH | 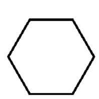 | — | F | H | $OC_3H_7$ | |

TABLE 66-continued

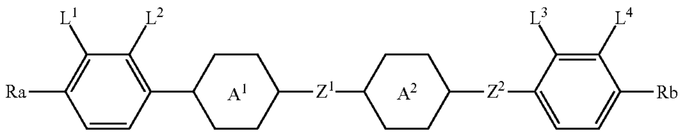

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 979 | $C_4H_9O$ | F | F | 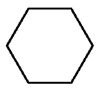 | CH═CH | 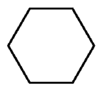 | — | F | H | $OC_4H_9$ | |
| 980 | $C_4H_9O$ | F | F | 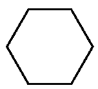 | CH═CH | 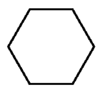 | — | F | H | $OC_5H_{11}$ | |
| 981 | $C_5H_{11}O$ | F | F | 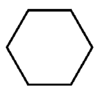 | CH═CH | 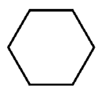 | — | F | H | $OCH_3$ | |
| 982 | $C_5H_{11}O$ | F | F | 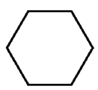 | CH═CH | 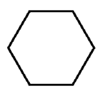 | — | F | H | $OC_2H_5$ | |
| 983 | $C_5H_{11}O$ | F | F | 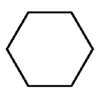 | CH═CH | 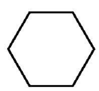 | — | F | H | $OC_3H_7$ | |
| 984 | $C_5H_{11}O$ | F | F | 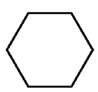 | CH═CH | 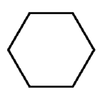 | — | F | H | $OC_4H_9$ | |
| 985 | $C_5H_{11}O$ | F | F | 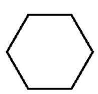 | CH═CH | 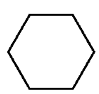 | — | F | H | $OC_5H_{11}$ | |
| 986 | $C_2H_5$ | F | F | 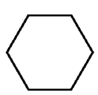 | CH═CH | 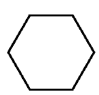 | — | F | H | $C_4H_9$ | |
| 987 | $C_5H_{11}$ | F | F | 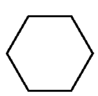 | CH═CH | 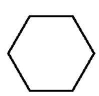 | — | F | H | $C_2H_5$ | |
| 988 | $C_2H_5$ | F | F | 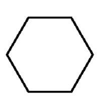 | CH═CH | 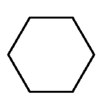 | — | F | H | $OC_4H_9$ | |
| 989 | $CH_2$═CH | F | F | 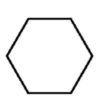 | CH═CH | 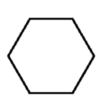 | — | F | H | $OC_3H_7$ | |
| 990 | $CH_2$═CH | F | F | 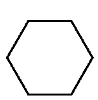 | CH═CH | 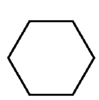 | — | F | H | $OC_5H_{11}$ | |

TABLE 67

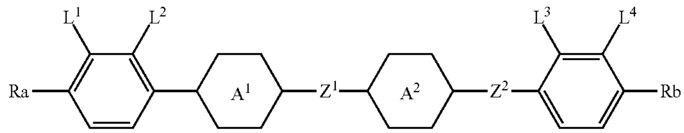

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 991 | $CH_2{=}CHO$ | F | F | 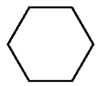 | CH=CH | 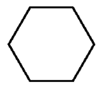 | — | F | H | $OC_3H_7$ | |
| 992 | $CH_2{=}CHCH_2O$ | F | F | 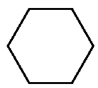 | CH=CH | 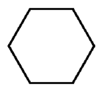 | — | F | H | $OC_5H_{11}$ | |
| 993 | $CH_2{=}CHCH_2O$ | F | F | 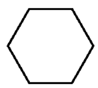 | CH=CH | 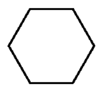 | — | F | H | $OC_3H_7$ | |
| 994 | $CH_2{=}CHC_2H_5O$ | F | F | 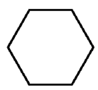 | CH=CH | 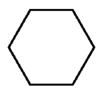 | — | F | H | $OC_5H_{11}$ | |
| 995 | $CH_2{=}CHC_2H_5O$ | F | F | 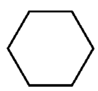 | CH=CH | 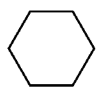 | — | F | H | $OC_2H_5$ | |
| 996 | $CH_2{=}CHC_2H_5O$ | F | F | 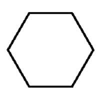 | CH=CH | 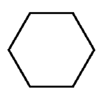 | — | F | H | $OC_3H_7$ | |
| 997 | $CH_3CH{=}CHCH_2O$ | F | F | 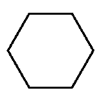 | CH=CH | 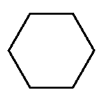 | — | F | H | $OCH_3$ | |
| 998 | $CH_3CH{=}CHCH_2O$ | F | F | 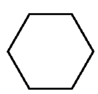 | CH=CH | 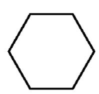 | — | F | H | $OC_2H_5$ | |
| 999 | $C_3H_7O$ | F | F | 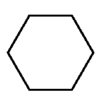 | CH=CH | 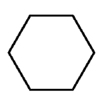 | — | F | H | $OCH{=}CH_2$ | |
| 1000 | $C_3H_7O$ | F | F | 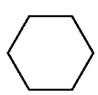 | CH=CH | 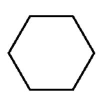 | — | F | H | $OCH_2CH{=}CH_2$ | |
| 1001 | $C_4H_9O$ | F | F | 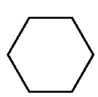 | CH=CH | 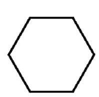 | — | F | H | $OCH_2CH{=}CH_2$ | |
| 1002 | $C_5H_{11}O$ | F | F | 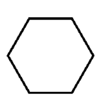 | CH=CH | 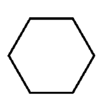 | — | F | H | $OCH_2CH{=}CH_2$ | |
| 1003 | $CH_3O$ | F | F | 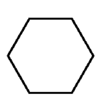 | CH=CH | 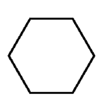 | — | F | H | $OC_2H_5CH{=}CH_2$ | |

TABLE 67-continued

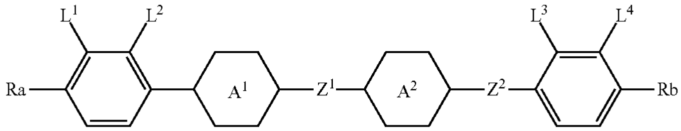

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1004 | $C_2H_5O$ | F | F | 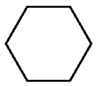 | CH═CH | 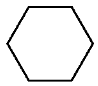 | — | F | H | $OC_2H_5CH{=}CH_2$ | |
| 1005 | $C_3H_7O$ | F | F | 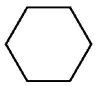 | CH═CH | 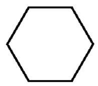 | — | F | H | $OC_2H_5CH{=}CH_2$ | |

TABLE 68

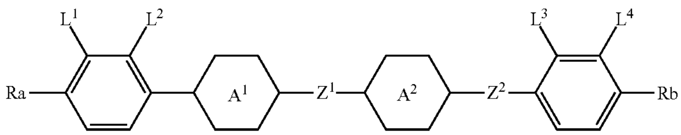

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1006 | $CH_3O$ | F | F | 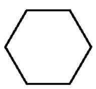 | CH═CH | 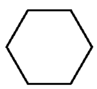 | — | F | H | $OCH_2CH{=}CHCH_3$ | |
| 1007 | $C_2H_5O$ | F | F | 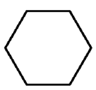 | CH═CH | 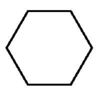 | — | F | H | $OCH_2CH{=}CHCH_3$ | |
| 1008 | $C_3H_7O$ | F | F | 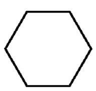 | CH═CH | 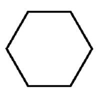 | — | F | H | $OCH_2CH{=}CHCH_3$ | |
| 1009 | $CH_2{=}CHCH_2O$ | F | F | 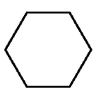 | CH═CH | 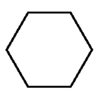 | — | F | H | $OCH{=}CH_2$ | |
| 1010 | $CH_2{=}CHC_2H_5O$ | F | F | 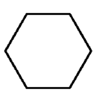 | CH═CH | 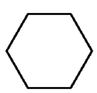 | — | F | H | $OCH_2CH{=}CH_2$ | |
| 1011 | $C_3H_7OCH_2$ | F | F | 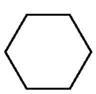 | CH═CH | 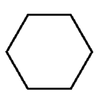 | — | F | H | $OC_3H_7$ | |
| 1012 | $C_5H_{11}O$ | F | F | 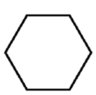 | CH═CH | 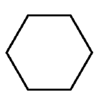 | — | F | H | $OC_2H_5CH{=}CH_2$ | |
| 1013 | $C_3H_7O$ | F | F | 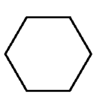 | CH═CH | 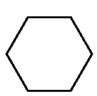 | — | F | H | H | |
| 1014 | $C_5H_{11}O$ | F | F | 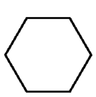 | CH═CH | 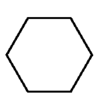 | — | F | H | $OC_9H_{19}$ | |

TABLE 68-continued

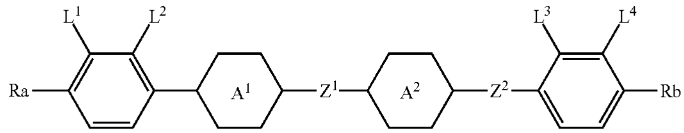

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1015 | $C_3H_7O$ | F | F | 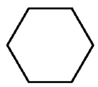 | CH═CH | 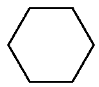 | — | F | H | $C_2H_5$ | |
| 1016 | $C_5H_{11}O$ | F | F | 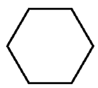 | CH═CH | 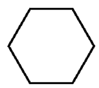 | — | F | H | $C_3H_7$ | |
| 1017 | H | F | F | 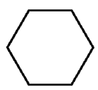 | CH═CH | 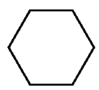 | — | F | H | $OC_4H_9$ | |
| 1018 | $C_7H_{15}O$ | F | F | 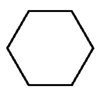 | CH═CH | 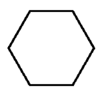 | — | F | H | $OC_4H_9$ | |
| 1019 | $C_2H_5O$ | F | F | 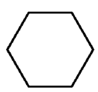 | CH═CH | 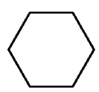 | — | F | H | $OC_6H_{13}$ | |
| 1020 | $CH_3O$ | F | F | 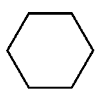 | CH═CH | 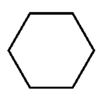 | — | F | H | $C_2H_5$ | |

TABLE 69

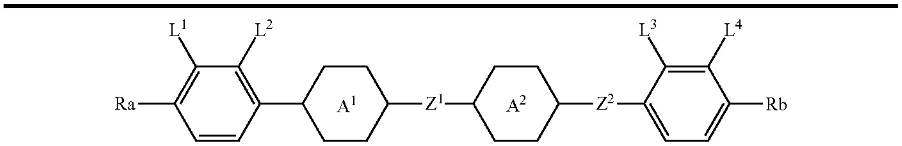

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1021 | $CH_3O$ | F | F | 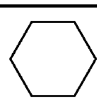 | CH═CH | 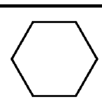 | — | H | F | $OCH_3$ | |
| 1022 | $CH_3O$ | F | F | 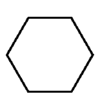 | CH═CH | 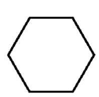 | — | H | F | $OC_2H_5$ | |
| 1023 | $CH_3O$ | F | F | 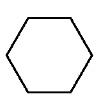 | CH═CH | 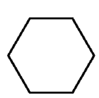 | — | H | F | $OC_3H_7$ | |
| 1024 | $CH_3O$ | F | F | 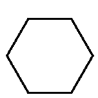 | CH═CH | 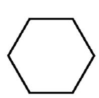 | — | H | F | $OC_4H_9$ | |
| 1025 | $CH_3O$ | F | F | 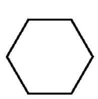 | CH═CH | 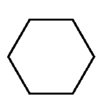 | — | H | F | $OC_5H_{11}$ | |

TABLE 69-continued

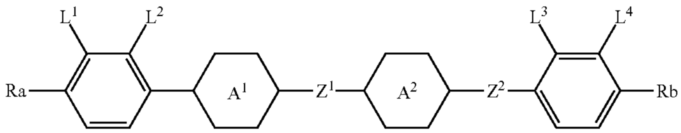

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1026 | $C_2H_5O$ | F | F | 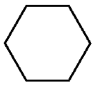 | CH═CH | 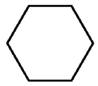 | — | H | F | $OCH_3$ | |
| 1027 | $C_2H_5O$ | F | F | 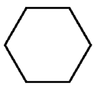 | CH═CH | 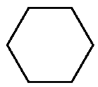 | — | H | F | $OC_2H_5$ | |
| 1028 | $C_2H_5O$ | F | F | 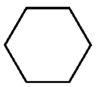 | CH═CH | 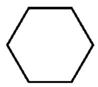 | — | H | F | $OC_3H_7$ | |
| 1029 | $C_2H_5O$ | F | F | 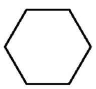 | CH═CH | 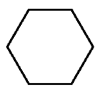 | — | H | F | $OC_4H_9$ | |
| 1030 | $C_2H_5O$ | F | F | 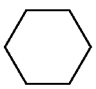 | CH═CH | 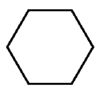 | — | H | F | $OC_5H_{11}$ | |
| 1031 | $C_3H_7O$ | F | F | 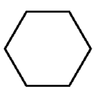 | CH═CH | 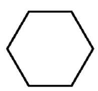 | — | H | F | $OCH_3$ | |
| 1032 | $C_3H_7O$ | F | F | 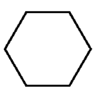 | CH═CH | 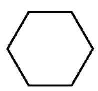 | — | H | F | $OC_2H_5$ | |
| 1033 | $C_3H_7O$ | F | F | 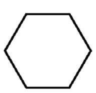 | CH═CH | 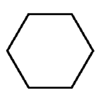 | — | H | F | $OC_3H_7$ | |
| 1034 | $C_3H_7O$ | F | F | 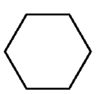 | CH═CH | 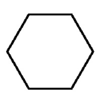 | — | H | F | $OC_4H_9$ | |
| 1035 | $C_3H_7O$ | F | F | 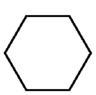 | CH═CH | 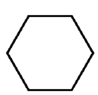 | — | H | F | $OC_5H_{11}$ | |

TABLE 70

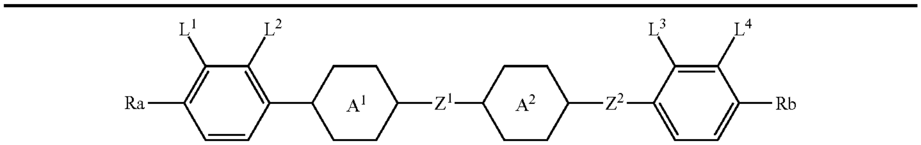

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1036 | $C_4H_9O$ | F | F | 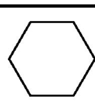 | CH═CH | 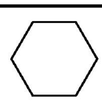 | — | H | F | $OCH_3$ | |

TABLE 70-continued

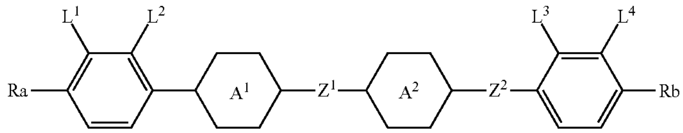

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1037 | $C_4H_9O$ | F | F | 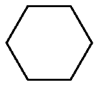 | CH═CH | 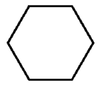 | — | H | F | $OC_2H_5$ | |
| 1038 | $C_4H_9O$ | F | F | 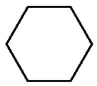 | CH═CH | 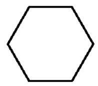 | — | H | F | $OC_3H_7$ | |
| 1039 | $C_4H_9O$ | F | F | 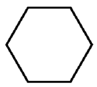 | CH═CH | 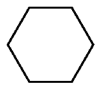 | — | H | F | $OC_4H_9$ | |
| 1040 | $C_4H_9O$ | F | F | 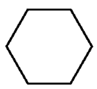 | CH═CH | 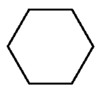 | — | H | F | $OC_5H_{11}$ | |
| 1041 | $C_5H_{11}O$ | F | F | 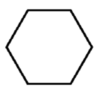 | CH═CH | 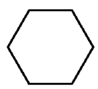 | — | H | F | $OCH_3$ | |
| 1042 | $C_5H_{11}O$ | F | F | 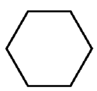 | CH═CH | 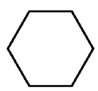 | — | H | F | $OC_2H_5$ | |
| 1043 | $C_5H_{11}O$ | F | F | 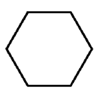 | CH═CH | 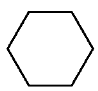 | — | H | F | $OC_3H_7$ | |
| 1044 | $C_5H_{11}O$ | F | F | 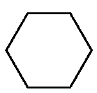 | CH═CH | 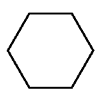 | — | H | F | $OC_4H_9$ | |
| 1045 | $C_5H_{11}O$ | F | F | 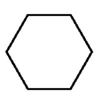 | CH═CH | 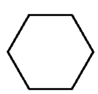 | — | H | F | $OC_5H_{11}$ | |
| 1046 | $C_2H_5$ | F | F | 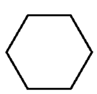 | CH═CH | 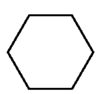 | — | H | F | $C_4H_9$ | |
| 1047 | $C_5H_{11}$ | F | F | 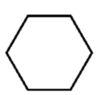 | CH═CH | 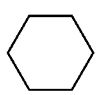 | — | H | F | $C_2H_5$ | |
| 1048 | $C_2H_5$ | F | F | 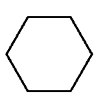 | CH═CH | 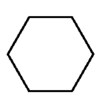 | — | H | F | $OC_4H_9$ | |
| 1049 | CH2═CH | F | F | 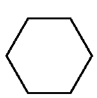 | CH═CH | 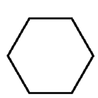 | — | H | F | $OC_3H_7$ | |
| 1050 | CH2═CH | F | F | 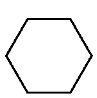 | CH═CH | 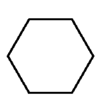 | — | H | F | $OC_5H_{11}$ | |

TABLE 71

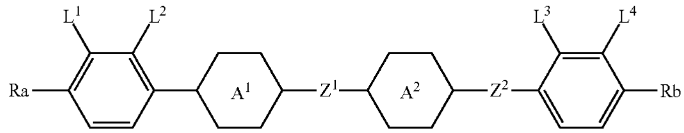

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1051 | $CH_2{=}CHO$ | F | F | 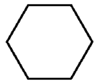 | CH=CH | 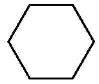 | — | H | F | $OC_3H_7$ | |
| 1052 | $CH_2{=}CHCH_2O$ | F | F | 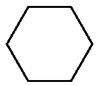 | CH=CH | 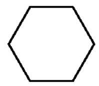 | — | H | F | $OC_5H_{11}$ | |
| 1053 | $CH_2{=}CHCH_2O$ | F | F | 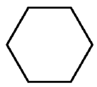 | CH=CH | 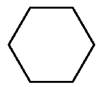 | — | H | F | $OC_3H_7$ | |
| 1054 | $CH_2{=}CHC_2H_5O$ | F | F | 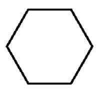 | CH=CH | 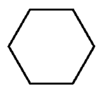 | — | H | F | $OC_5H_{11}$ | |
| 1055 | $CH_2{=}CHC_2H_5O$ | F | F | 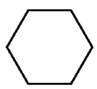 | CH=CH | 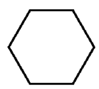 | — | H | F | $OC_2H_5$ | |
| 1056 | $CH_2{=}CHC_2H_5O$ | F | F | 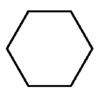 | CH=CH | 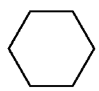 | — | H | F | $OC_3H_7$ | |
| 1057 | $CH_3CH{=}CHCH_2O$ | F | F | 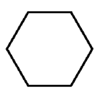 | CH=CH | 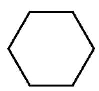 | — | H | F | $OCH_3$ | |
| 1058 | $CH_3CH{=}CHCH_2O$ | F | F | 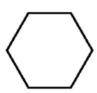 | CH=CH | 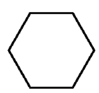 | — | H | F | $OC_2H_5$ | |
| 1059 | $C_3H_7O$ | F | F | 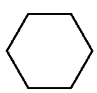 | CH=CH | 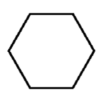 | — | H | F | $OCH{=}CH_2$ | |
| 1060 | $C_3H_7O$ | F | F | 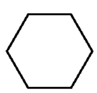 | CH=CH | 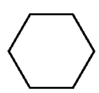 | — | H | F | $OCH_2CH{=}CH_2$ | |
| 1061 | $C_4H_9O$ | F | F | 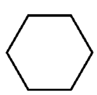 | CH=CH | 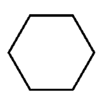 | — | H | F | $OCH_2CH{=}CH_2$ | |
| 1062 | $C_5H_{11}O$ | F | F | 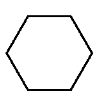 | CH=CH | 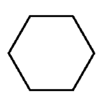 | — | H | F | $OCH_2CH{=}CH_2$ | |
| 1063 | $CH_3O$ | F | F | 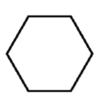 | CH=CH | 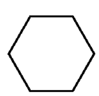 | — | H | F | $OC_2H_5CH{=}CH_2$ | |
| 1064 | $C_2H_5O$ | F | F | 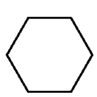 | CH=CH | 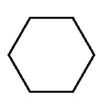 | — | H | F | $OC_2H_5CH{=}CH_2$ | |

TABLE 71-continued

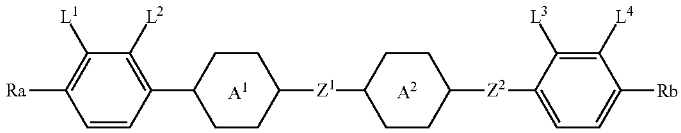

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1065 | $C_3H_7O$ | F | F | 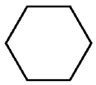 | CH═CH | 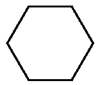 | — | H | F | $OC_2H_5CH{=}CH_2$ | |

TABLE 72

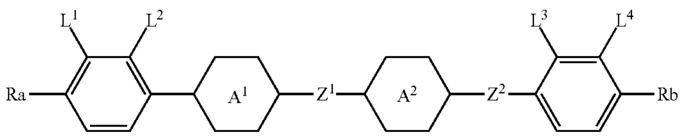

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1066 | $CH_3O$ | F | F | 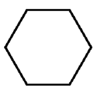 | CH═CH | 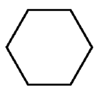 | — | H | F | $OCH_2CH{=}CHCH_3$ | |
| 1067 | $C_2H_5O$ | F | F | 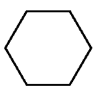 | CH═CH | 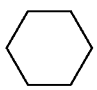 | — | H | F | $OCH_2CH{=}CHCH_3$ | |
| 1068 | $C_3H_7O$ | F | F | 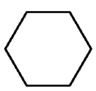 | CH═CH | 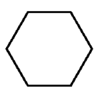 | — | H | F | $OCH_2CH{=}CHCH_3$ | |
| 1069 | $CH_2{=}CHCH_2O$ | F | F | 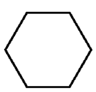 | CH═CH | 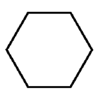 | — | H | F | $OCH{=}CH_2$ | |
| 1070 | $CH_2{=}CHC_2H_5O$ | F | F | 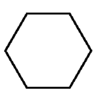 | CH═CH | 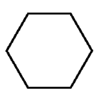 | — | H | F | $OCH_2CH{=}CH_2$ | |
| 1071 | $C_3H_7OCH_2$ | F | F | 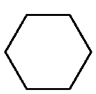 | CH═CH | 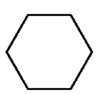 | — | H | F | $OC_3H_7$ | |
| 1072 | $C_5H_{11}O$ | F | F | 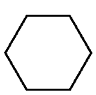 | CH═CH | 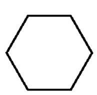 | — | H | F | $OC_2H_5CH{=}CH_2$ | |
| 1073 | $C_3H_7O$ | F | F | 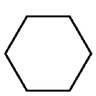 | CH═CH | 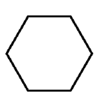 | — | H | F | H | |
| 1074 | $C_5H_{11}O$ | F | F | 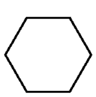 | CH═CH | 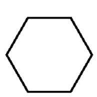 | — | H | F | $OC_9H_{19}$ | |
| 1075 | $C_3H_7O$ | F | F | 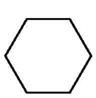 | CH═CH | 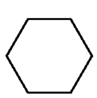 | — | H | F | $C_2H_5$ | |

TABLE 72-continued

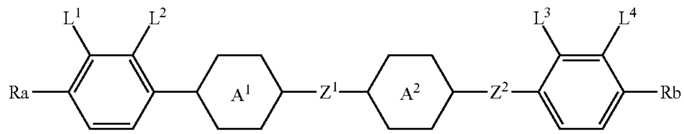

| No. | Ra | L¹ | L² | A¹ | Z¹ | A² | Z² | L³ | L⁴ | Rb | Physical property values |
|---|---|---|---|---|---|---|---|---|---|---|---|
| 1076 | $C_5H_{11}O$ | F | F | 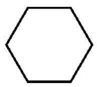 | CH═CH | 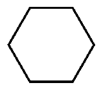 | — | H | F | $C_3H_7$ | |
| 1077 | H | F | F | 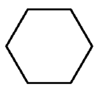 | CH═CH | 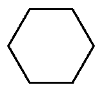 | — | H | F | $OC_4H_9$ | |
| 1078 | $C_7H_{15}O$ | F | F | 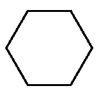 | CH═CH | 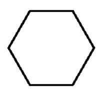 | — | H | F | $OC_4H_9$ | |
| 1079 | $C_2H_5O$ | F | F | 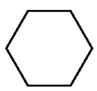 | CH═CH | 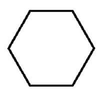 | — | H | F | $OC_6H_{13}$ | |
| 1080 | $CH_3O$ | F | F | 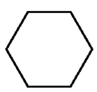 | CH═CH | 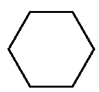 | — | H | F | $C_2H_5$ | |

TABLE 73

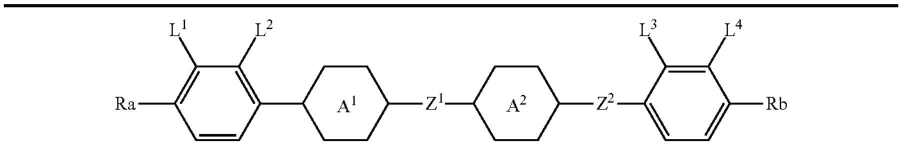

| No. | Ra | L¹ | L² | A¹ | Z¹ | A² | Z² | L³ | L⁴ | Rb | Physical property values |
|---|---|---|---|---|---|---|---|---|---|---|---|
| 1081 | $CH_3O$ | F | F | 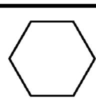 | CH═CH | 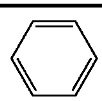 | — | F | F | $OCH_3$ | |
| 1082 | $CH_3O$ | F | F | 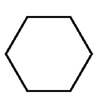 | CH═CH | 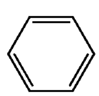 | — | F | F | $OC_2H_5$ | |
| 1083 | $CH_3O$ | F | F | 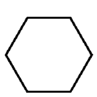 | CH═CH | 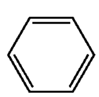 | — | F | F | $OC_3H_7$ | |
| 1084 | $CH_3O$ | F | F | 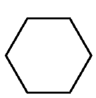 | CH═CH | 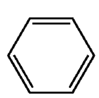 | — | F | F | $OC_4H_9$ | |
| 1085 | $CH_3O$ | F | F | 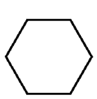 | CH═CH | 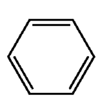 | — | F | F | $OC_5H_{11}$ | |
| 1086 | $C_2H_5O$ | F | F | 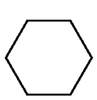 | CH═CH | 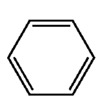 | — | F | F | $OCH_3$ | |

TABLE 73-continued

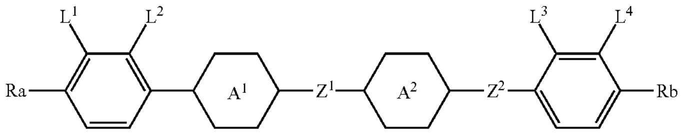

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1087 | $C_2H_5O$ | F | F | 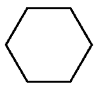 | CH═CH | 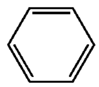 | — | F | F | $OC_2H_5$ | |
| 1088 | $C_2H_5O$ | F | F | 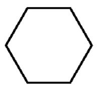 | CH═CH | 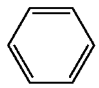 | — | F | F | $OC_3H_7$ | |
| 1089 | $C_2H_5O$ | F | F | 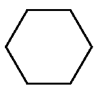 | CH═CH | 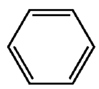 | — | F | F | $OC_4H_9$ | |
| 1090 | $C_2H_5O$ | F | F | 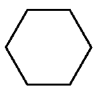 | CH═CH |  | — | F | F | $OC_5H_{11}$ | |
| 1091 | $C_3H_7O$ | F | F | 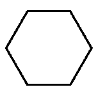 | CH═CH | 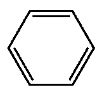 | — | F | F | $OCH_3$ | |
| 1092 | $C_3H_7O$ | F | F | 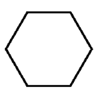 | CH═CH | 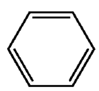 | — | F | F | $OC_2H_5$ | |
| 1093 | $C_3H_7O$ | F | F | 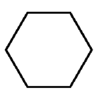 | CH═CH | 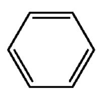 | — | F | F | $OC_3H_7$ | |
| 1094 | $C_3H_7O$ | F | F | 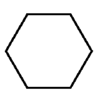 | CH═CH | 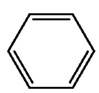 | — | F | F | $OC_4H_9$ | |
| 1095 | $C_3H_7O$ | F | F | 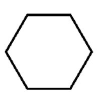 | CH═CH | 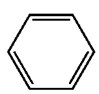 | — | F | F | $OC_5H_{11}$ | |

TABLE 74

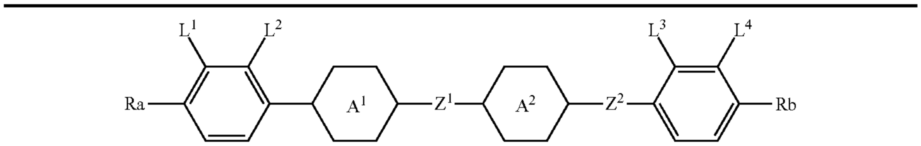

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1096 | $C_4H_9O$ | F | F | 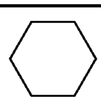 | CH═CH | 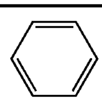 | — | F | F | $OCH_3$ | |
| 1097 | $C_4H_9O$ | F | F | 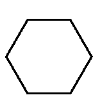 | CH═CH | 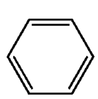 | — | F | F | $OC_2H_5$ | |

TABLE 74-continued

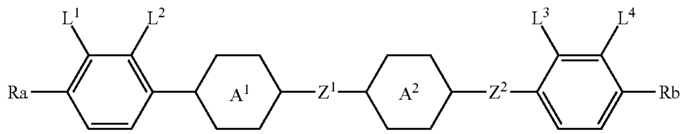

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1098 | $C_4H_9O$ | F | F | 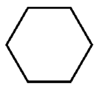 | CH=CH | 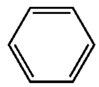 | — | F | F | $OC_3H_7$ | |
| 1099 | $C_4H_9O$ | F | F | 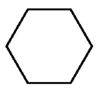 | CH=CH | 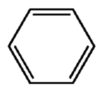 | — | F | F | $OC_4H_9$ | |
| 1100 | $C_4H_9O$ | F | F | 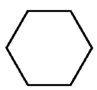 | CH=CH | 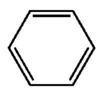 | — | F | F | $OC_5H_{11}$ | |
| 1101 | $C_5H_{11}O$ | F | F | 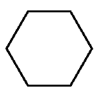 | CH=CH | 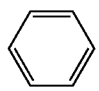 | — | F | F | $OCH_3$ | |
| 1102 | $C_5H_{11}O$ | F | F | 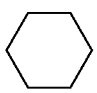 | CH=CH | 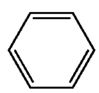 | — | F | F | $OC_2H_5$ | |
| 1103 | $C_5H_{11}O$ | F | F | 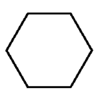 | CH=CH | 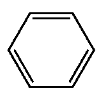 | — | F | F | $OC_3H_7$ | |
| 1104 | $C_5H_{11}O$ | F | F | 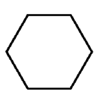 | CH=CH | 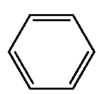 | — | F | F | $OC_4H_9$ | |
| 1105 | $C_5H_{11}O$ | F | F | 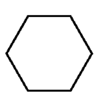 | CH=CH | 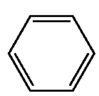 | — | F | F | $OC_5H_{11}$ | |
| 1106 | $C_2H_5$ | F | F | 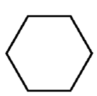 | CH=CH | 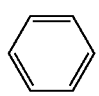 | — | F | F | $C_4H_9$ | |
| 1107 | $C_5H_{11}$ | F | F | 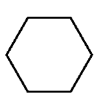 | CH=CH | 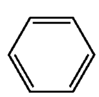 | — | F | F | $C_2H_5$ | |
| 1108 | $C_2H_5$ | F | F | 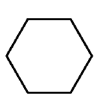 | CH=CH | 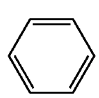 | — | F | F | $OC_4H_9$ | |
| 1109 | $CH_2$=CH | F | F | 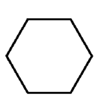 | CH=CH | 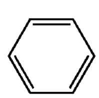 | — | F | F | $OC_3H_7$ | |
| 1110 | $CH_2$=CH | F | F | 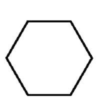 | CH=CH | 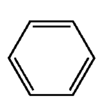 | — | F | F | $OC_5H_{11}$ | |

TABLE 75

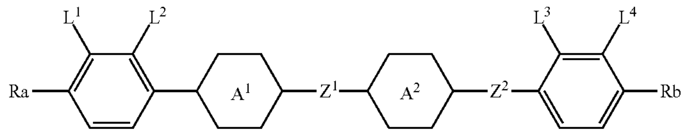

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1111 | $CH_2{=}CHO$ | F | F | 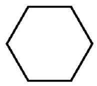 | CH=CH | 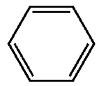 | — | F | F | $OC_3H_7$ | |
| 1112 | $CH_2{=}CHCH_2O$ | F | F | 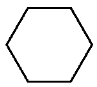 | CH=CH | 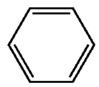 | — | F | F | $OC_5H_{11}$ | |
| 1113 | $CH_2{=}CHCH_2O$ | F | F | 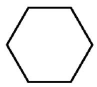 | CH=CH | 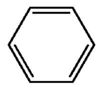 | — | F | F | $OC_3H_7$ | |
| 1114 | $CH_2{=}CHC_2H_5O$ | F | F | 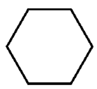 | CH=CH |  | — | F | F | $OC_5H_{11}$ | |
| 1115 | $CH_2{=}CHC_2H_5O$ | F | F | 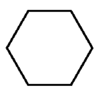 | CH=CH | 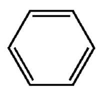 | — | F | F | $OC_2H_5$ | |
| 1116 | $CH_2{=}CHC_2H_5O$ | F | F | 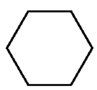 | CH=CH | 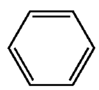 | — | F | F | $OC_3H_7$ | |
| 1117 | $CH_3CH{=}CHCH_2O$ | F | F | 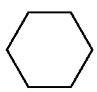 | CH=CH |  | — | F | F | $OCH_3$ | |
| 1118 | $CH_3CH{=}CHCH_2O$ | F | F | 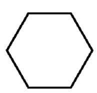 | CH=CH | 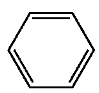 | — | F | F | $OC_2H_5$ | |
| 1119 | $C_3H_7O$ | F | F | 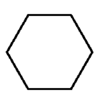 | CH=CH | 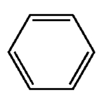 | — | F | F | $OCH{=}CH_2$ | |
| 1120 | $C_3H_7O$ | F | F | 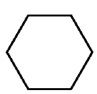 | CH=CH | 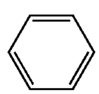 | — | F | F | $OCH_2CH{=}CH_2$ | |
| 1121 | $C_4H_9O$ | F | F | 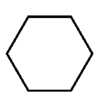 | CH=CH | 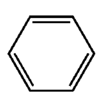 | — | F | F | $OCH_2CH{=}CH_2$ | |
| 1122 | $C_5H_{11}O$ | F | F | 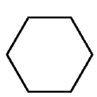 | CH=CH | 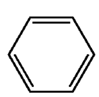 | — | F | F | $OCH_2CH{=}CH_2$ | |
| 1123 | $CH_3O$ | F | F | 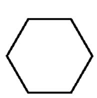 | CH=CH | 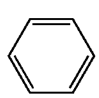 | — | F | F | $OC_2H_5CH{=}CH_2$ | |

TABLE 75-continued

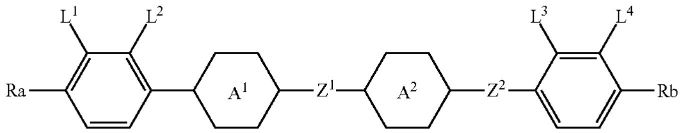

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1124 | $C_2H_5O$ | F | F | 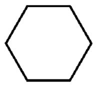 | CH═CH |  | — | F | F | $OC_2H_5CH{=}CH_2$ | |
| 1125 | $C_3H_7O$ | F | F | 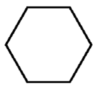 | CH═CH | 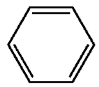 | — | F | F | $OC_2H_5CH{=}CH_2$ | |

TABLE 76

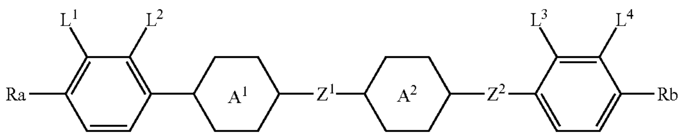

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1126 | $CH_3O$ | F | F | 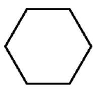 | CH═CH | 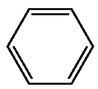 | — | F | F | $OCH_2CH{=}CHCH_3$ | |
| 1127 | $C_2H_5O$ | F | F | 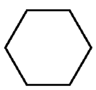 | CH═CH | 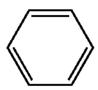 | — | F | F | $OCH_2CH{=}CHCH_3$ | |
| 1128 | $C_3H_7O$ | F | F | 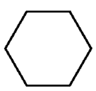 | CH═CH |  | — | F | F | $OCH_2CH{=}CHCH_3$ | |
| 1129 | $CH_2{=}CHCH_2O$ | F | F | 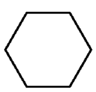 | CH═CH |  | — | F | F | $OCH{=}CH_2$ | |
| 1130 | $CH_2{=}CHC_2H_5O$ | F | F | 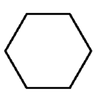 | CH═CH | 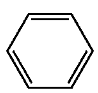 | — | F | F | $OCH_2CH{=}CH_2$ | |
| 1131 | $C_3H_7OCH_2$ | F | F | 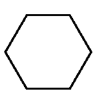 | CH═CH | 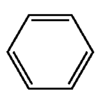 | — | F | F | $OC_3H_7$ | |
| 1132 | $C_5H_{11}O$ | F | F | 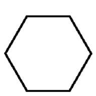 | CH═CH | 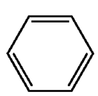 | — | F | F | $OC_2H_5CH{=}CH_2$ | |
| 1133 | $C_3H_7O$ | F | F | 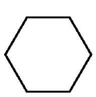 | CH═CH | 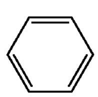 | — | F | F | H | |
| 1134 | $C_5H_{11}O$ | F | F | 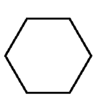 | CH═CH | 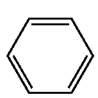 | — | F | F | $OC_9H_{19}$ | |
| 1135 | $C_3H_7O$ | F | F | 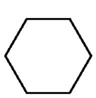 | CH═CH | 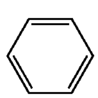 | — | F | F | $C_2H_5$ | |

TABLE 76-continued

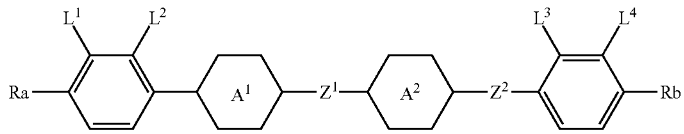

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1136 | $C_5H_{11}O$ | F | F | 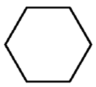 | CH═CH |  | — | F | F | $C_3H_7$ | |
| 1137 | H | F | F | 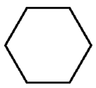 | CH═CH |  | — | F | F | $OC_4H_9$ | |
| 1138 | $C_7H_{15}O$ | F | F | 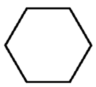 | CH═CH | 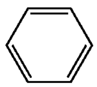 | — | F | F | $OC_4H_9$ | |
| 1139 | $C_2H_5O$ | F | F | 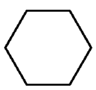 | CH═CH |  | — | F | F | $OC_6H_{13}$ | |
| 1140 | $CH_3O$ | F | F | 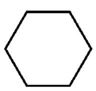 | CH═CH |  | — | F | F | $C_2H_5$ | |

TABLE 77

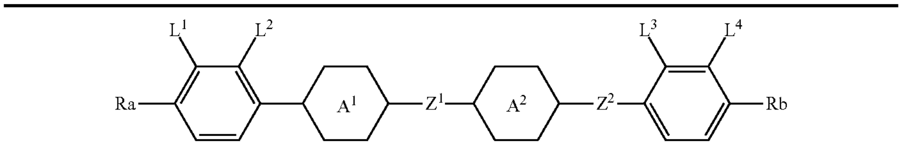

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1141 | $CH_3O$ | F | F | 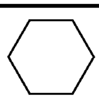 | CH═CH | 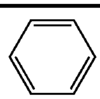 | — | F | H | $OCH_3$ | |
| 1142 | $CH_3O$ | F | F | 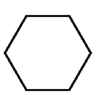 | CH═CH | 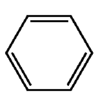 | — | F | H | $OC_2H_5$ | |
| 1143 | $CH_3O$ | F | F | 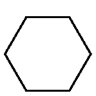 | CH═CH | 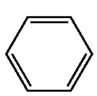 | — | F | H | $OC_3H_7$ | |
| 1144 | $CH_3O$ | F | F | 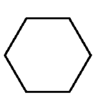 | CH═CH | 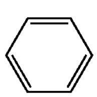 | — | F | H | $OC_4H_9$ | |
| 1145 | $CH_3O$ | F | F | 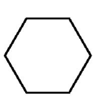 | CH═CH | 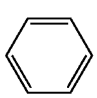 | — | F | H | $OC_5H_{11}$ | |
| 1146 | $C_2H_5O$ | F | F | 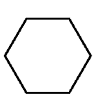 | CH═CH | 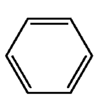 | — | F | H | $OCH_3$ | |

TABLE 77-continued

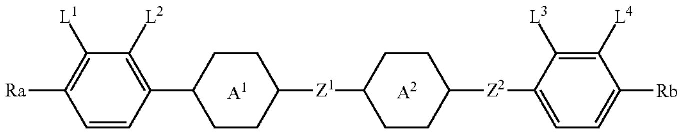

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1147 | $C_2H_5O$ | F | F | 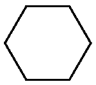 | CH═CH | 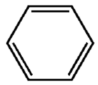 | — | F | H | $OC_2H_5$ | |
| 1148 | $C_2H_5O$ | F | F | 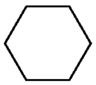 | CH═CH | 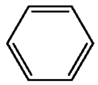 | — | F | H | $OC_3H_7$ | |
| 1149 | $C_2H_5O$ | F | F | 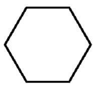 | CH═CH | 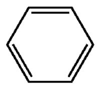 | — | F | H | $OC_4H_9$ | |
| 1150 | $C_2H_5O$ | F | F | 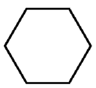 | CH═CH | 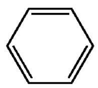 | — | F | H | $OC_5H_{11}$ | |
| 1151 | $C_3H_7O$ | F | F | 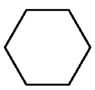 | CH═CH |  | — | F | H | $OCH_3$ | |
| 1152 | $C_3H_7O$ | F | F | 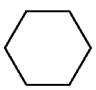 | CH═CH |  | — | F | H | $OC_2H_5$ | |
| 1153 | $C_3H_7O$ | F | F | 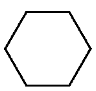 | CH═CH | 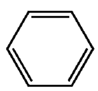 | — | F | H | $OC_3H_7$ | |
| 1154 | $C_3H_7O$ | F | F | 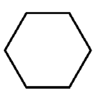 | CH═CH |  | — | F | H | $OC_4H_9$ | |
| 1155 | $C_3H_7O$ | F | F | 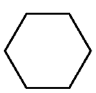 | CH═CH | 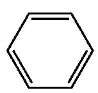 | — | F | H | $OC_5H_{11}$ | |

TABLE 78

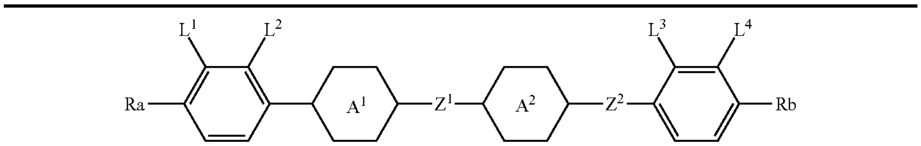

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1156 | $C_4H_9O$ | F | F | 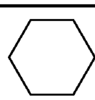 | CH═CH | 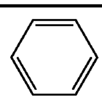 | — | F | H | $OCH_3$ | |
| 1157 | $C_4H_9O$ | F | F | 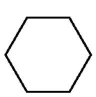 | CH═CH | 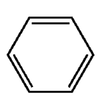 | — | F | H | $OC_2H_5$ | |
| 1158 | $C_4H_9O$ | F | F | 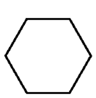 | CH═CH | 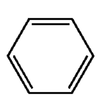 | — | F | H | $OC_3H_7$ | |

TABLE 78-continued

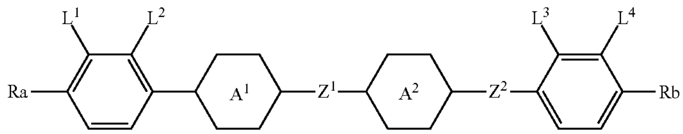

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1159 | $C_4H_9O$ | F | F | 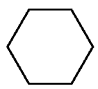 | CH=CH | 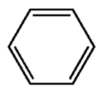 | — | F | H | $OC_4H_9$ | |
| 1160 | $C_4H_9O$ | F | F | 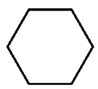 | CH=CH | 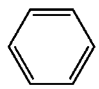 | — | F | H | $OC_5H_{11}$ | |
| 1161 | $C_5H_{11}O$ | F | F | 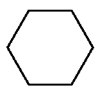 | CH=CH | 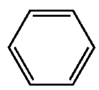 | — | F | H | $OCH_3$ | |
| 1162 | $C_5H_{11}O$ | F | F | 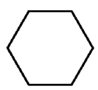 | CH=CH | 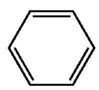 | — | F | H | $OC_2H_5$ | |
| 1163 | $C_5H_{11}O$ | F | F | 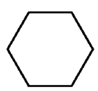 | CH=CH | 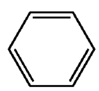 | — | F | H | $OC_3H_7$ | |
| 1164 | $C_5H_{11}O$ | F | F | 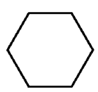 | CH=CH | 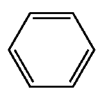 | — | F | H | $OC_4H_9$ | |
| 1165 | $C_5H_{11}O$ | F | F | 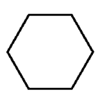 | CH=CH | 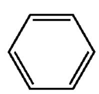 | — | F | H | $OC_5H_{11}$ | |
| 1166 | $C_2H_5$ | F | F | 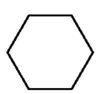 | CH=CH | 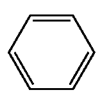 | — | F | H | $C_4H_9$ | |
| 1167 | $C_5H_{11}$ | F | F | 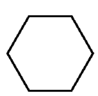 | CH=CH | 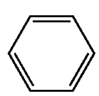 | — | F | H | $C_2H_5$ | |
| 1168 | $C_2H_5$ | F | F | 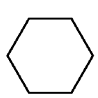 | CH=CH | 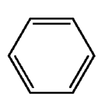 | — | F | H | $OC_4H_9$ | |
| 1169 | $CH_2$=CH | F | F | 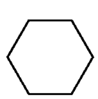 | CH=CH | 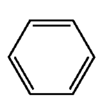 | — | F | H | $OC_3H_7$ | |
| 1170 | $CH_2$=CH | F | F | 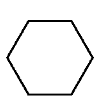 | CH=CH | 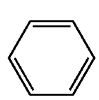 | — | F | H | $OC_5H_{11}$ | |

TABLE 79

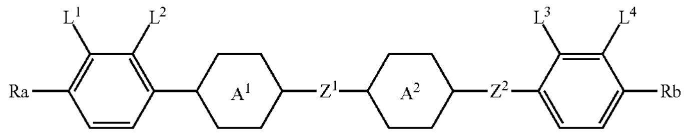

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1171 | $CH_2{=}CHO$ | F | F | 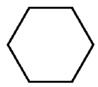 | CH=CH | 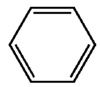 | — | F | H | $OC_3H_7$ | |
| 1172 | $CH_2{=}CHCH_2O$ | F | F | 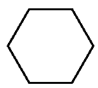 | CH=CH | 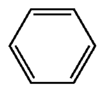 | — | F | H | $OC_5H_{11}$ | |
| 1173 | $CH_2{=}CHCH_2O$ | F | F | 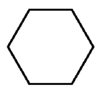 | CH=CH | 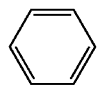 | — | F | H | $OC_3H_7$ | |
| 1174 | $CH_2{=}CHC_2H_5O$ | F | F | 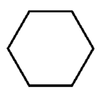 | CH=CH | 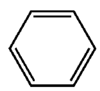 | — | F | H | $OC_5H_{11}$ | |
| 1175 | $CH_2{=}CHC_2H_5O$ | F | F | 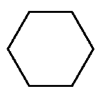 | CH=CH | 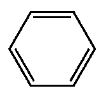 | — | F | H | $OC_2H_5$ | |
| 1176 | $CH_2{=}CHC_2H_5O$ | F | F | 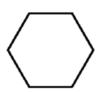 | CH=CH | 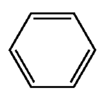 | — | F | H | $OC_3H_7$ | |
| 1177 | $CH_3CH{=}CHCH_2O$ | F | F | 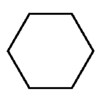 | CH=CH | 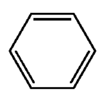 | — | F | H | $OCH_3$ | |
| 1178 | $CH_3CH{=}CHCH_2O$ | F | F | 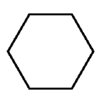 | CH=CH | 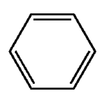 | — | F | H | $OC_2H_5$ | |
| 1179 | $C_3H_7O$ | F | F | 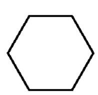 | CH=CH | 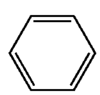 | — | F | H | $OCH{=}CH_2$ | |
| 1180 | $C_3H_7O$ | F | F | 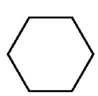 | CH=CH | 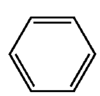 | — | F | H | $OCH_2CH{=}CH_2$ | |
| 1181 | $C_4H_9O$ | F | F | 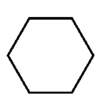 | CH=CH | 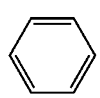 | — | F | H | $OCH_2CH{=}CH_2$ | |
| 1182 | $C_5H_{11}O$ | F | F | 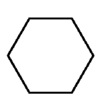 | CH=CH | 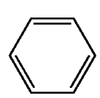 | — | F | H | $OCH_2CH{=}CH_2$ | |
| 1183 | $CH_3O$ | F | F | 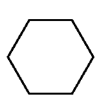 | CH=CH | 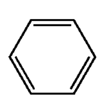 | — | F | H | $OC_2H_5CH{=}CH_2$ | |

TABLE 79-continued

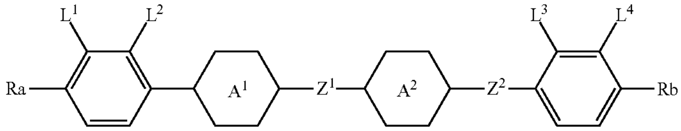

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1184 | $C_2H_5O$ | F | F | 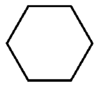 | CH═CH |  | — | F | H | $OC_2H_5CH{=}CH_2$ | |
| 1185 | $C_3H_7O$ | F | F | 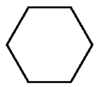 | CH═CH | 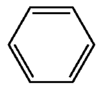 | — | F | H | $OC_2H_5CH{=}CH_2$ | |

TABLE 80

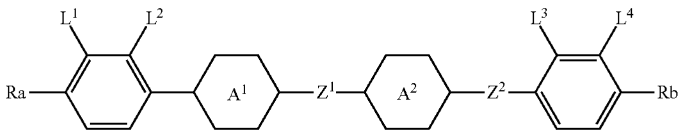

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1186 | $CH_3O$ | F | F | 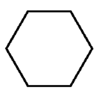 | CH═CH | 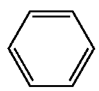 | — | F | H | $OCH_2CH{=}CHCH_3$ | |
| 1187 | $C_2H_5O$ | F | F | 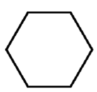 | CH═CH | 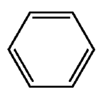 | — | F | H | $OCH_2CH{=}CHCH_3$ | |
| 1188 | $C_3H_7O$ | F | F | 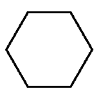 | CH═CH | 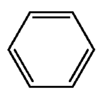 | — | F | H | $OCH_2CH{=}CHCH_3$ | |
| 1189 | $CH_2{=}CHCH_2O$ | F | F | 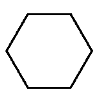 | CH═CH | 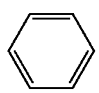 | — | F | H | $OCH{=}CH_2$ | |
| 1190 | $CH_2{=}CHC_2H_5O$ | F | F | 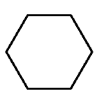 | CH═CH | 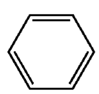 | — | F | H | $OCH_2CH{=}CH_2$ | |
| 1191 | $C_3H_7OCH_2$ | F | F | 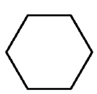 | CH═CH | 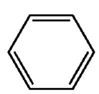 | — | F | H | $OC_3H_7$ | |
| 1192 | $C_5H_{11}O$ | F | F | 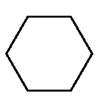 | CH═CH | 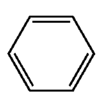 | — | F | H | $OC_2H_5CH{=}CH_2$ | |
| 1193 | $C_3H_7O$ | F | F | 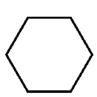 | CH═CH | 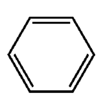 | — | F | H | H | |
| 1194 | $C_5H_{11}O$ | F | F | 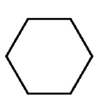 | CH═CH | 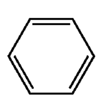 | — | F | H | $OC_9H_{19}$ | |
| 1195 | $C_3H_7O$ | F | F | 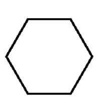 | CH═CH | 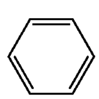 | — | F | H | $C_2H_5$ | |

TABLE 80-continued

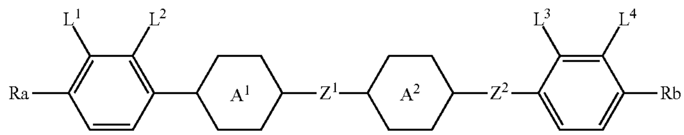

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1196 | $C_5H_{11}O$ | F | F | 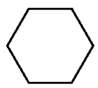 | CH═CH | 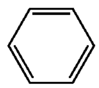 | — | F | H | $C_3H_7$ | |
| 1197 | H | F | F | 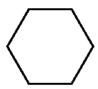 | CH═CH | 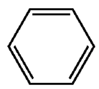 | — | F | H | $OC_4H_9$ | |
| 1198 | $C_7H_{15}O$ | F | F | 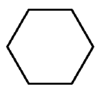 | CH═CH | 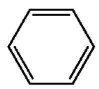 | — | F | H | $OC_4H_9$ | |
| 1199 | $C_2H_5O$ | F | F | 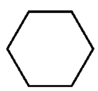 | CH═CH | 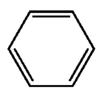 | — | F | H | $OC_6H_{13}$ | |
| 1200 | $CH_3O$ | F | F | 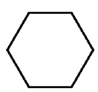 | CH═CH | 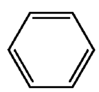 | — | F | H | $C_2H_5$ | |

TABLE 81

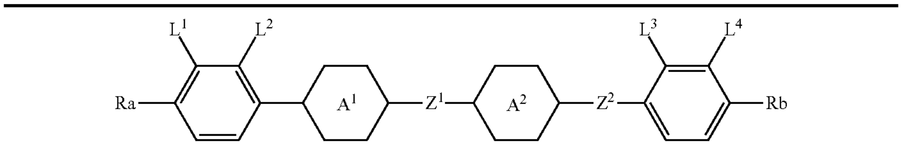

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1201 | $CH_3O$ | F | F | 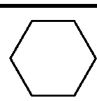 | CH═CH | 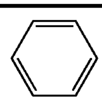 | — | H | F | $OCH_3$ | |
| 1202 | $CH_3O$ | F | F | 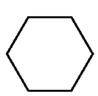 | CH═CH | 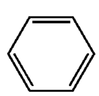 | — | H | F | $OC_2H_5$ | |
| 1203 | $CH_3O$ | F | F | 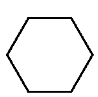 | CH═CH | 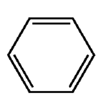 | — | H | F | $OC_3H_7$ | |
| 1204 | $CH_3O$ | F | F | 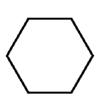 | CH═CH | 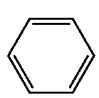 | — | H | F | $OC_4H_9$ | |
| 1205 | $CH_3O$ | F | F | 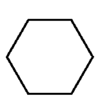 | CH═CH | 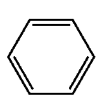 | — | H | F | $OC_5H_{11}$ | |
| 1206 | $C_2H_5O$ | F | F | 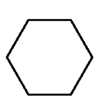 | CH═CH | 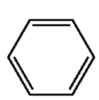 | — | H | F | $OCH_3$ | |

TABLE 81-continued

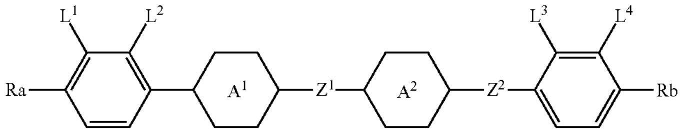

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1207 | $C_2H_5O$ | F | F | 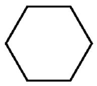 | CH═CH |  | — | H | F | $OC_2H_5$ | |
| 1208 | $C_2H_5O$ | F | F | 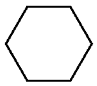 | CH═CH | 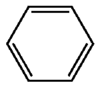 | — | H | F | $OC_3H_7$ | |
| 1209 | $C_2H_5O$ | F | F | 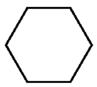 | CH═CH | 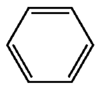 | — | H | F | $OC_4H_9$ | |
| 1210 | $C_2H_5O$ | F | F | 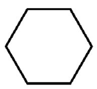 | CH═CH |  | — | H | F | $OC_5H_{11}$ | |
| 1211 | $C_3H_7O$ | F | F | 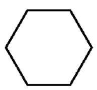 | CH═CH | 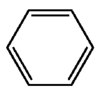 | — | H | F | $OCH_3$ | |
| 1212 | $C_3H_7O$ | F | F | 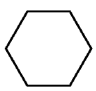 | CH═CH |  | — | H | F | $OC_2H_5$ | |
| 1213 | $C_3H_7O$ | F | F | 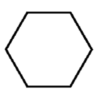 | CH═CH | 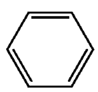 | — | H | F | $OC_3H_7$ | |
| 1214 | $C_3H_7O$ | F | F | 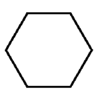 | CH═CH | 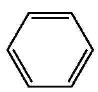 | — | H | F | $OC_4H_9$ | |
| 1215 | $C_3H_7O$ | F | F | 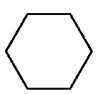 | CH═CH | 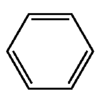 | — | H | F | $OC_5H_{11}$ | |

TABLE 82

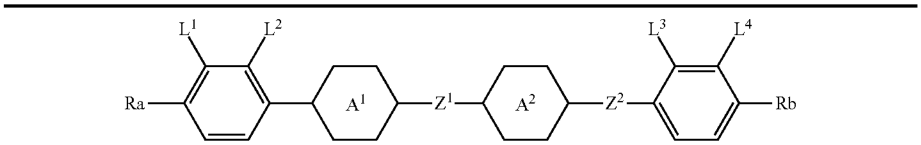

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1216 | $C_4H_9O$ | F | F | 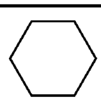 | CH═CH | 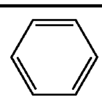 | — | H | F | $OCH_3$ | |
| 1217 | $C_4H_9O$ | F | F | 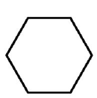 | CH═CH | 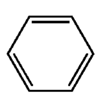 | — | H | F | $OC_2H_5$ | |
| 1218 | $C_4H_9O$ | F | F | 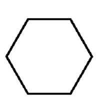 | CH═CH | 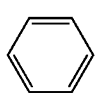 | — | H | F | $OC_3H_7$ | |

TABLE 82-continued
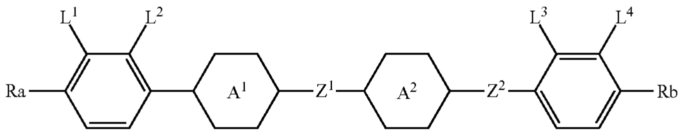
| No. | Ra | L¹ | L² | A¹ | Z¹ | A² | Z² | L³ | L⁴ | Rb | Physical property values |
|---|---|---|---|---|---|---|---|---|---|---|---|
| 1219 | $C_4H_9O$ | F | F | 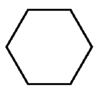 | CH═CH | 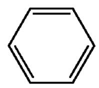 | — | H | F | $OC_4H_9$ | |
| 1220 | $C_4H_9O$ | F | F | 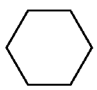 | CH═CH | 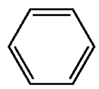 | — | H | F | $OC_5H_{11}$ | |
| 1221 | $C_5H_{11}O$ | F | F | 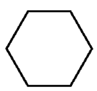 | CH═CH | 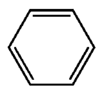 | — | H | F | $OCH_3$ | |
| 1222 | $C_5H_{11}O$ | F | F | 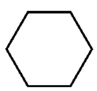 | CH═CH | 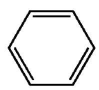 | — | H | F | $OC_2H_5$ | |
| 1223 | $C_5H_{11}O$ | F | F | 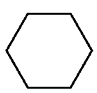 | CH═CH | 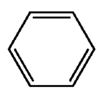 | — | H | F | $OC_3H_7$ | |
| 1224 | $C_5H_{11}O$ | F | F | 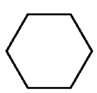 | CH═CH | 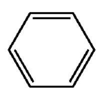 | — | H | F | $OC_4H_9$ | |
| 1225 | $C_5H_{11}O$ | F | F | 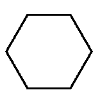 | CH═CH | 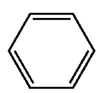 | — | H | F | $OC_5H_{11}$ | |
| 1226 | $C_2H_5$ | F | F | 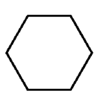 | CH═CH | 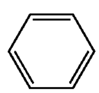 | — | H | F | $C_4H_9$ | |
| 1227 | $C_5H_{11}$ | F | F | 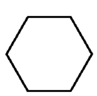 | CH═CH | 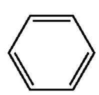 | — | H | F | $C_2H_5$ | |
| 1228 | $C_2H_5$ | F | F | 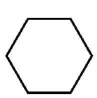 | CH═CH | 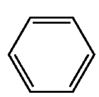 | — | H | F | $OC_4H_9$ | |
| 1229 | $CH_2$═CH | F | F | 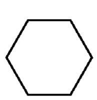 | CH═CH | 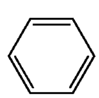 | — | H | F | $OC_3H_7$ | |
| 1230 | $CH_2$═CH | F | F | 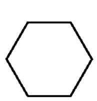 | CH═CH | 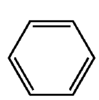 | — | H | F | $OC_5H_{11}$ | |

TABLE 83

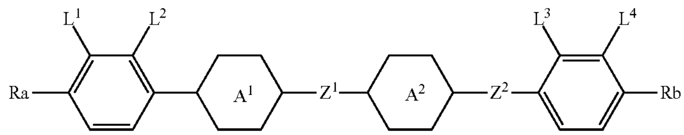

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1231 | $CH_2$═CHO | F | F | 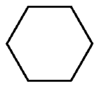 | CH═CH | 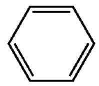 | — | H | F | $OC_3H_7$ | |
| 1232 | $CH_2$═$CHCH_2O$ | F | F | 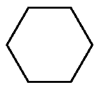 | CH═CH | 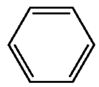 | — | H | F | $OC_5H_{11}$ | |
| 1233 | $CH_2$═$CHCH_2O$ | F | F | 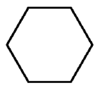 | CH═CH | 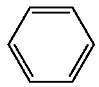 | — | H | F | $OC_3H_7$ | |
| 1234 | $CH_2$═$CHC_2H_5O$ | F | F | 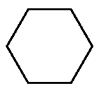 | CH═CH | 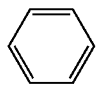 | — | H | F | $OC_5H_{11}$ | |
| 1235 | $CH_2$═$CHC_2H_5O$ | F | F | 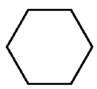 | CH═CH | 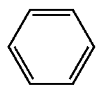 | — | H | F | $OC_2H_5$ | |
| 1236 | $CH_2$═$CHC_2H_5O$ | F | F | 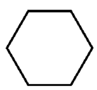 | CH═CH | 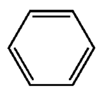 | — | H | F | $OC_3H_7$ | |
| 1237 | $CH_3CH$═$CHCH_2O$ | F | F | 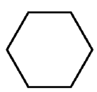 | CH═CH |  | — | H | F | $OCH_3$ | |
| 1238 | $CH_3CH$═$CHCH_2O$ | F | F | 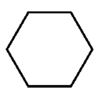 | CH═CH | 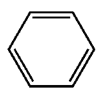 | — | H | F | $OC_2H_5$ | |
| 1239 | $C_3H_7O$ | F | F | 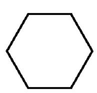 | CH═CH | 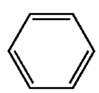 | — | H | F | OCH═$CH_2$ | |
| 1240 | $C_3H_7O$ | F | F | 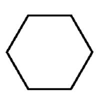 | CH═CH | 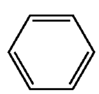 | — | H | F | $OCH_2CH$═$CH_2$ | |
| 1241 | $C_4H_9O$ | F | F | 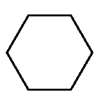 | CH═CH | 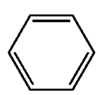 | — | H | F | $OCH_2CH$═$CH_2$ | |
| 1242 | $C_5H_{11}O$ | F | F | 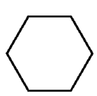 | CH═CH | 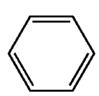 | — | H | F | $OCH_2CH$═$CH_2$ | |
| 1243 | $CH_3O$ | F | F | 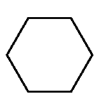 | CH═CH | 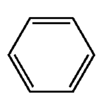 | — | H | F | $OC_2H_5CH$═$CH_2$ | |

TABLE 83-continued

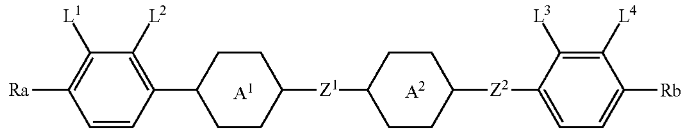

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1244 | $C_2H_5O$ | F | F | 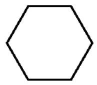 | CH═CH | 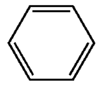 | — | H | F | $OC_2H_5CH{=}CH_2$ | |
| 1245 | $C_3H_7O$ | F | F | 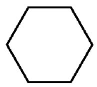 | CH═CH | 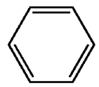 | — | H | F | $OC_2H_5CH{=}CH_2$ | |

TABLE 84

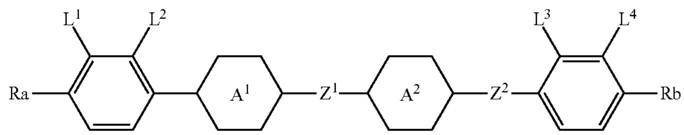

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1246 | $CH_3O$ | F | F | 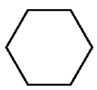 | CH═CH | 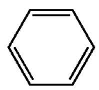 | — | H | F | $OCH_2CH{=}CHCH_3$ | |
| 1247 | $C_2H_5O$ | F | F | 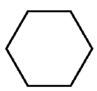 | CH═CH | 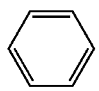 | — | H | F | $OCH_2CH{=}CHCH_3$ | |
| 1248 | $C_3H_7O$ | F | F | 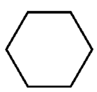 | CH═CH | 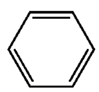 | — | H | F | $OCH_2CH{=}CHCH_3$ | |
| 1249 | $CH_2{=}CHCH_2O$ | F | F | 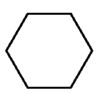 | CH═CH | 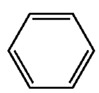 | — | H | F | $OCH{=}CH_2$ | |
| 1250 | $CH_2{=}CHC_2H_5O$ | F | F | 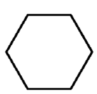 | CH═CH | 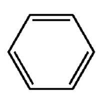 | — | H | F | $OCH_2CH{=}CH_2$ | |
| 1251 | $C_3H_7OCH_2$ | F | F | 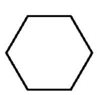 | CH═CH | 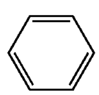 | — | H | F | $OC_3H_7$ | |
| 1252 | $C_5H_{11}O$ | F | F | 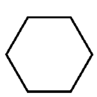 | CH═CH | 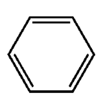 | — | H | F | $OC_2H_5CH{=}CH_2$ | |
| 1253 | $C_3H_7O$ | F | F | 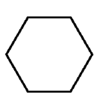 | CH═CH | 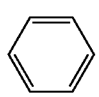 | — | H | F | H | |
| 1254 | $C_5H_{11}O$ | F | F | 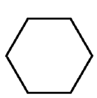 | CH═CH | 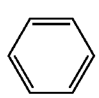 | — | H | F | $OC_9H_{19}$ | |
| 1255 | $C_3H_7O$ | F | F | 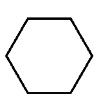 | CH═CH | 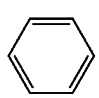 | — | H | F | $C_2H_5$ | |

TABLE 84-continued

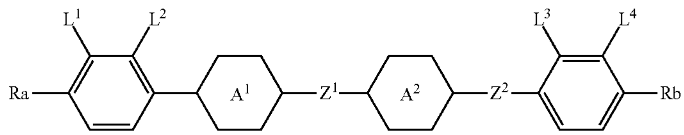

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1256 | $C_5H_{11}O$ | F | F | 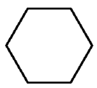 | CH═CH | 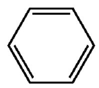 | — | H | F | $C_3H_7$ | |
| 1257 | H | F | F | 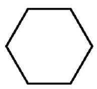 | CH═CH | 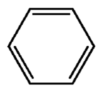 | — | H | F | $OC_4H_9$ | |
| 1258 | $C_7H_{15}O$ | F | F | 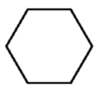 | CH═CH | 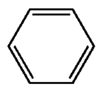 | — | H | F | $OC_4H_9$ | |
| 1259 | $C_2H_5O$ | F | F | 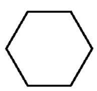 | CH═CH | 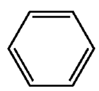 | — | H | F | $OC_6H_{13}$ | |
| 1260 | $CH_3O$ | F | F | 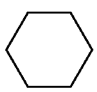 | CH═CH | 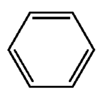 | — | H | F | $C_2H_5$ | |

TABLE 85

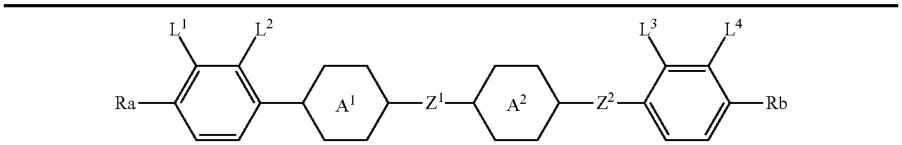

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1261 | $CH_3O$ | F | F | 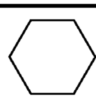 | CH═CH | 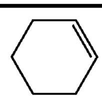 | — | F | F | $OCH_3$ | |
| 1262 | $CH_3O$ | F | F | 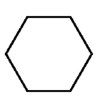 | CH═CH | 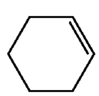 | — | F | F | $OC_2H_5$ | |
| 1263 | $CH_3O$ | F | F | 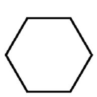 | CH═CH | 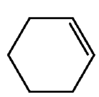 | — | F | F | $OC_3H_7$ | |
| 1264 | $CH_3O$ | F | F | 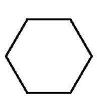 | CH═CH | 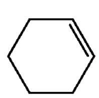 | — | F | F | $OC_4H_9$ | |
| 1265 | $CH_3O$ | F | F | 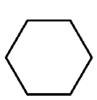 | CH═CH | 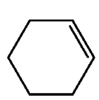 | — | F | F | $OC_5H_{11}$ | |
| 1266 | $C_2H_5O$ | F | F | 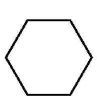 | CH═CH | 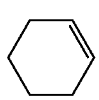 | — | F | F | $OCH_3$ | |

TABLE 85-continued

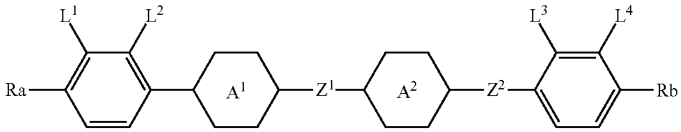

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1267 | $C_2H_5O$ | F | F | 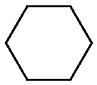 | CH═CH | 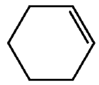 | — | F | F | $OC_2H_5$ | |
| 1268 | $C_2H_5O$ | F | F | 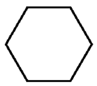 | CH═CH | 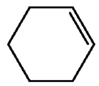 | — | F | F | $OC_3H_7$ | |
| 1269 | $C_2H_5O$ | F | F | 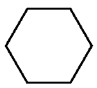 | CH═CH | 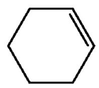 | — | F | F | $OC_4H_9$ | |
| 1270 | $C_2H_5O$ | F | F | 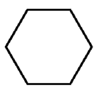 | CH═CH | 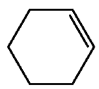 | — | F | F | $OC_5H_{11}$ | |
| 1271 | $C_3H_7O$ | F | F | 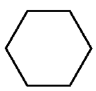 | CH═CH | 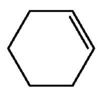 | — | F | F | $OCH_3$ | |
| 1272 | $C_3H_7O$ | F | F | 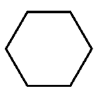 | CH═CH | 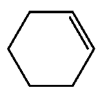 | — | F | F | $OC_2H_5$ | |
| 1273 | $C_3H_7O$ | F | F | 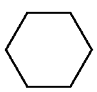 | CH═CH | 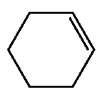 | — | F | F | $OC_3H_7$ | |
| 1274 | $C_3H_7O$ | F | F | 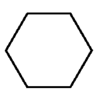 | CH═CH | 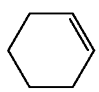 | — | F | F | $OC_4H_9$ | |
| 1275 | $C_3H_7O$ | F | F | 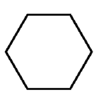 | CH═CH | 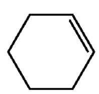 | — | F | F | $OC_5H_{11}$ | |

TABLE 86

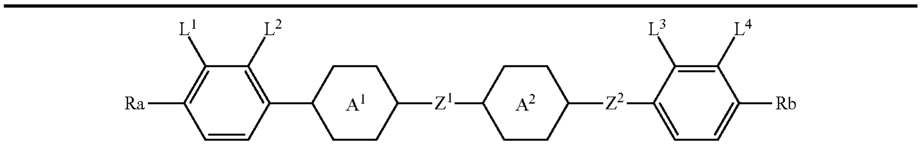

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1276 | $C_4H_9O$ | F | F | 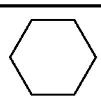 | CH═CH | 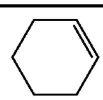 | — | F | F | $OCH_3$ | |
| 1277 | $C_4H_9O$ | F | F | 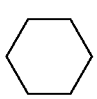 | CH═CH | 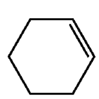 | — | F | F | $OC_2H_5$ | |
| 1278 | $C_4H_9O$ | F | F | 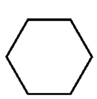 | CH═CH | 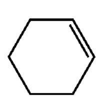 | — | F | F | $OC_3H_7$ | |

TABLE 86-continued

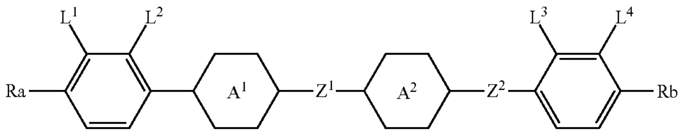

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1279 | $C_4H_9O$ | F | F | 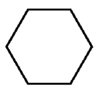 | CH═CH | 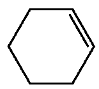 | — | F | F | $OC_4H_9$ | |
| 1280 | $C_4H_9O$ | F | F | 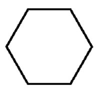 | CH═CH | 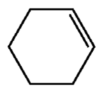 | — | F | F | $OC_5H_{11}$ | |
| 1281 | $C_5H_{11}O$ | F | F | 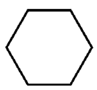 | CH═CH | 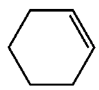 | — | F | F | $OCH_3$ | |
| 1282 | $C_5H_{11}O$ | F | F | 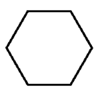 | CH═CH | 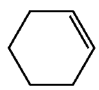 | — | F | F | $OC_2H_5$ | |
| 1283 | $C_5H_{11}O$ | F | F | 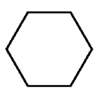 | CH═CH | 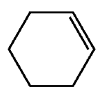 | — | F | F | $OC_3H_7$ | |
| 1284 | $C_5H_{11}O$ | F | F | 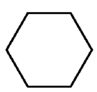 | CH═CH | 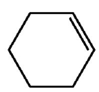 | — | F | F | $OC_4H_9$ | |
| 1285 | $C_5H_{11}O$ | F | F | 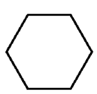 | CH═CH | 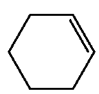 | — | F | F | $OC_5H_{11}$ | |
| 1286 | $C_2H_5$ | F | F | 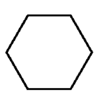 | CH═CH | 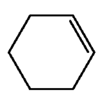 | — | F | F | $C_4H_9$ | |
| 1287 | $C_5H_{11}$ | F | F | 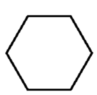 | CH═CH | 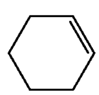 | — | F | F | $C_2H_5$ | |
| 1288 | $C_2H_5$ | F | F | 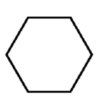 | CH═CH | 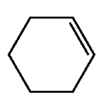 | — | F | F | $OC_4H_9$ | |
| 1289 | $CH_2$═CH | F | F | 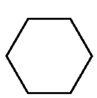 | CH═CH | 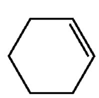 | — | F | F | $OC_3H_7$ | |
| 1290 | $CH_2$═CH | F | F | 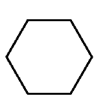 | CH═CH | 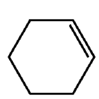 | — | F | F | $OC_5H_{11}$ | |

TABLE 87

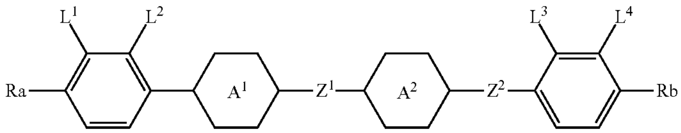

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1291 | $CH_3O$ | F | F | 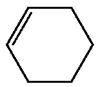 | CH═CH | 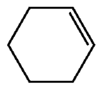 | — | F | F | $OCH_3$ | |
| 1292 | $CH_3O$ | F | F | 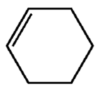 | CH═CH | 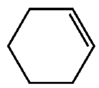 | — | F | F | $OC_2H_5$ | |
| 1293 | $CH_3O$ | F | F | 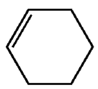 | CH═CH | 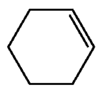 | — | F | F | $OC_3H_7$ | |
| 1294 | $CH_3O$ | F | F | 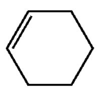 | CH═CH | 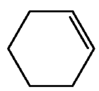 | — | F | F | $OC_4H_9$ | |
| 1295 | $CH_3O$ | F | F | 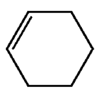 | CH═CH | 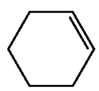 | — | F | F | $OC_5H_{11}$ | |
| 1296 | $C_2H_5O$ | F | F | 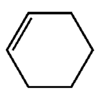 | CH═CH | 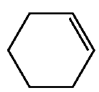 | — | F | F | $OCH_3$ | |
| 1297 | $C_2H_5O$ | F | F | 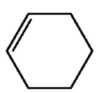 | CH═CH | 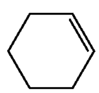 | — | F | F | $OC_2H_5$ | |
| 1298 | $C_2H_5O$ | F | F | 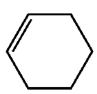 | CH═CH | 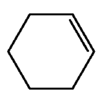 | — | F | F | $OC_3H_7$ | |
| 1299 | $C_2H_5O$ | F | F | 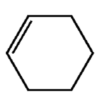 | CH═CH | 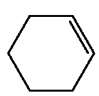 | — | F | F | $OC_4H_9$ | |
| 1300 | $C_2H_5O$ | F | F | 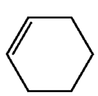 | CH═CH | 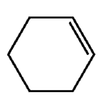 | — | F | F | $OC_5H_{11}$ | |
| 1301 | $C_3H_7O$ | F | F | 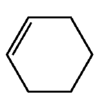 | CH═CH | 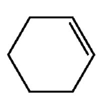 | — | F | F | $OCH_3$ | |
| 1302 | $C_3H_7O$ | F | F | 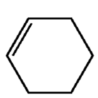 | CH═CH | 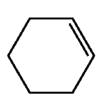 | — | F | F | $OC_2H_5$ | |
| 1303 | $C_3H_7O$ | F | F | 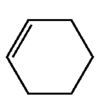 | CH═CH | 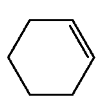 | — | F | F | $OC_3H_7$ | |

TABLE 87-continued

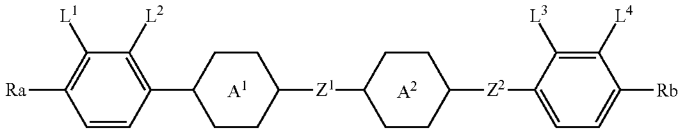

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1304 | $C_3H_7O$ | F | F | 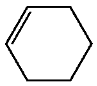 | CH=CH | 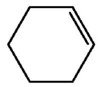 | — | F | F | $OC_4H_9$ | |
| 1305 | $C_3H_7O$ | F | F | 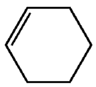 | CH=CH | 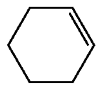 | — | F | F | $OC_5H_{11}$ | |

TABLE 88

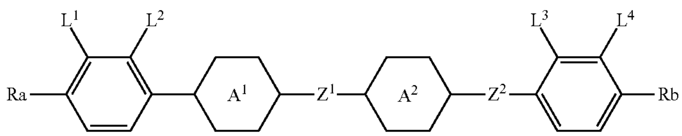

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1306 | $C_4H_9O$ | F | F | 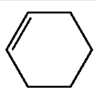 | CH=CH | 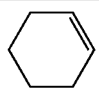 | — | F | F | $OCH_3$ | |
| 1307 | $C_4H_9O$ | F | F | 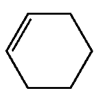 | CH=CH | 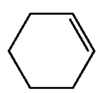 | — | F | F | $OC_2H_5$ | |
| 1308 | $C_4H_9O$ | F | F | 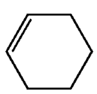 | CH=CH | 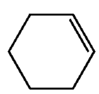 | — | F | F | $OC_3H_7$ | |
| 1309 | $C_4H_9O$ | F | F | 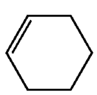 | CH=CH | 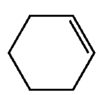 | — | F | F | $OC_4H_9$ | |
| 1310 | $C_4H_9O$ | F | F | 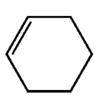 | CH=CH | 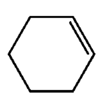 | — | F | F | $OC_5H_{11}$ | |
| 1311 | $C_5H_{11}O$ | F | F | 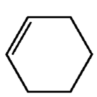 | CH=CH | 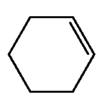 | — | F | F | $OCH_3$ | |
| 1312 | $C_5H_{11}O$ | F | F | 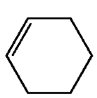 | CH=CH | 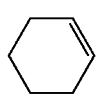 | — | F | F | $OC_2H_5$ | |
| 1313 | $C_5H_{11}O$ | F | F | 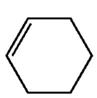 | CH=CH | 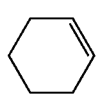 | — | F | F | $OC_3H_7$ | |
| 1314 | $C_5H_{11}O$ | F | F | 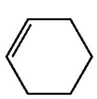 | CH=CH | 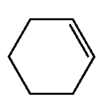 | — | F | F | $OC_4H_9$ | |
| 1315 | $C_5H_{11}O$ | F | F | 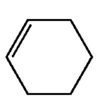 | CH=CH | 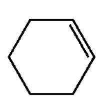 | — | F | F | $OC_5H_{11}$ | |

TABLE 88-continued

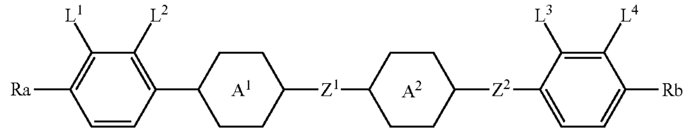

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1316 | $C_2H_5$ | F | F | 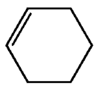 | CH═CH | 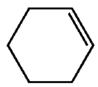 | — | F | F | $C_4H_9$ | |
| 1317 | $C_5H_{11}$ | F | F | 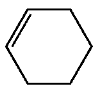 | CH═CH | 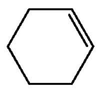 | — | F | F | $C_2H_5$ | |
| 1318 | $C_2H_5$ | F | F | 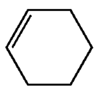 | CH═CH | 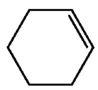 | — | F | F | $OC_4H_9$ | |
| 1319 | $CH_2$═CH | F | F | 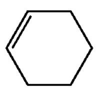 | CH═CH | 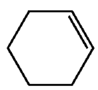 | — | F | F | $OC_3H_7$ | |
| 1320 | $CH_2$═CH | F | F | 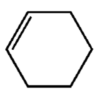 | CH═CH | 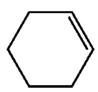 | — | F | F | $OC_5H_{11}$ | |

TABLE 89

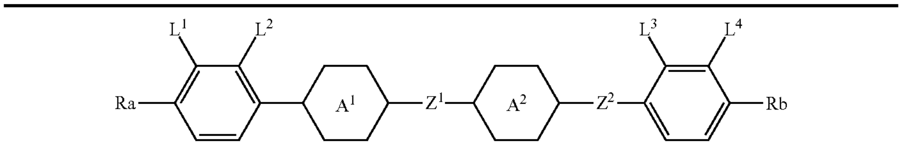

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1321 | $CH_3O$ | F | F | 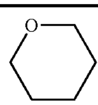 | CH═CH | 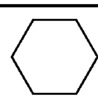 | — | F | F | $OCH_3$ | |
| 1322 | $CH_3O$ | F | F | 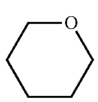 | CH═CH | 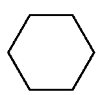 | — | F | F | $OC_2H_5$ | |
| 1323 | $CH_3O$ | F | F | 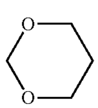 | CH═CH | 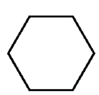 | — | F | F | $OC_3H_7$ | |
| 1324 | $CH_3O$ | F | F | 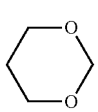 | CH═CH | 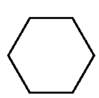 | — | F | F | $OC_4H_9$ | |
| 1325 | $CH_3O$ | F | F | 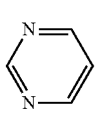 | CH═CH | 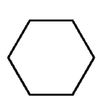 | — | F | F | $OC_5H_{11}$ | |
| 1326 | $C_2H_5O$ | F | F | 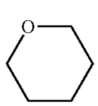 | CH═CH | 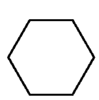 | — | F | F | $OCH_3$ | |

TABLE 89-continued

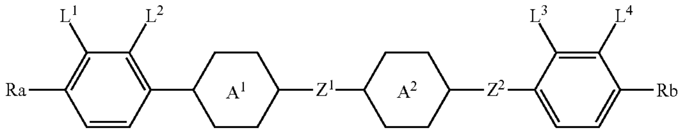

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1327 | $C_2H_5O$ | F | F | 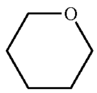 | CH═CH | 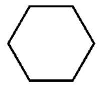 | — | F | F | $OC_2H_5$ | |
| 1328 | $C_2H_5O$ | F | F | 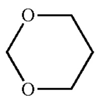 | CH═CH | 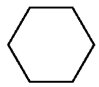 | — | F | F | $OC_3H_7$ | |
| 1329 | $C_2H_5O$ | F | F | 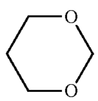 | CH═CH | 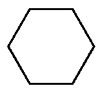 | — | F | F | $OC_4H_9$ | |
| 1330 | $C_2H_5O$ | F | F | 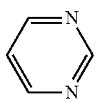 | CH═CH | 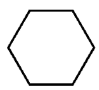 | — | F | F | $OC_5H_{11}$ | |
| 1331 | $C_3H_7O$ | F | F | 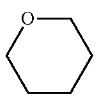 | CH═CH | 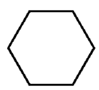 | — | F | F | $OCH_3$ | |
| 1332 | $C_3H_7O$ | F | F | 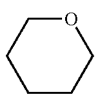 | CH═CH | 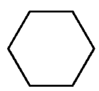 | — | F | F | $OC_2H_5$ | |
| 1333 | $C_3H_7O$ | F | F | 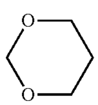 | CH═CH | 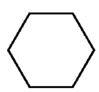 | — | F | F | $OC_3H_7$ | |
| 1334 | $C_3H_7O$ | F | F | 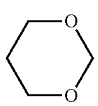 | CH═CH | 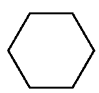 | — | F | F | $OC_4H_9$ | |
| 1335 | $C_3H_7O$ | F | F | 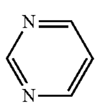 | CH═CH | 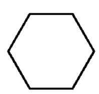 | — | F | F | $OC_5H_{11}$ | |

TABLE 90

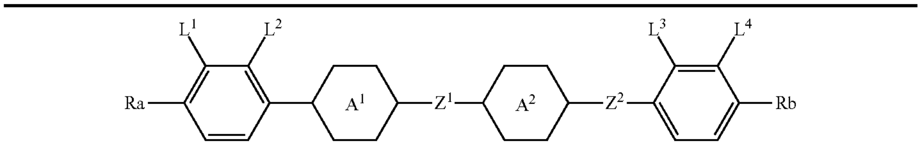

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1336 | $C_4H_9O$ | F | F | 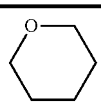 | CH═CH | 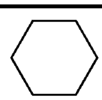 | — | F | F | $OCH_3$ | |
| 1337 | $C_4H_9O$ | F | F | 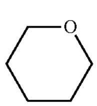 | CH═CH | 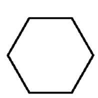 | — | F | F | $OC_2H_5$ | |

TABLE 90-continued

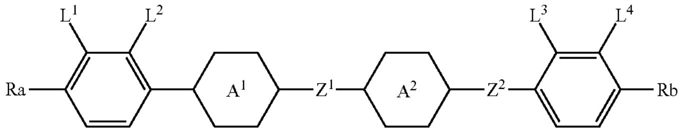

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1338 | $C_4H_9O$ | F | F | 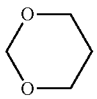 | CH═CH | 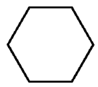 | — | F | F | $OC_3H_7$ | |
| 1339 | $C_4H_9O$ | F | F | 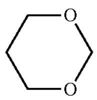 | CH═CH | 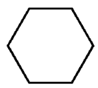 | — | F | F | $OC_4H_9$ | |
| 1340 | $C_4H_9O$ | F | F | 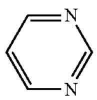 | CH═CH | 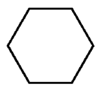 | — | F | F | $OC_5H_{11}$ | |
| 1341 | $C_5H_{11}O$ | F | F | 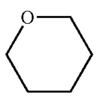 | CH═CH | 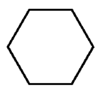 | — | F | F | $OCH_3$ | |
| 1342 | $C_5H_{11}O$ | F | F | 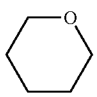 | CH═CH | 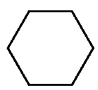 | — | F | F | $OC_2H_5$ | |
| 1343 | $C_5H_{11}O$ | F | F | 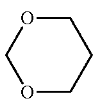 | CH═CH | 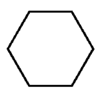 | — | F | F | $OC_3H_7$ | |
| 1344 | $C_5H_{11}O$ | F | F | 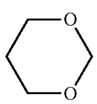 | CH═CH | 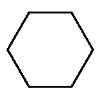 | — | F | F | $OC_4H_9$ | |
| 1345 | $C_5H_{11}O$ | F | F | 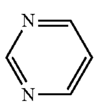 | CH═CH | 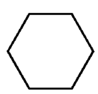 | — | F | F | $OC_5H_{11}$ | |
| 1346 | $C_2H_5$ | F | F | 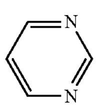 | CH═CH | 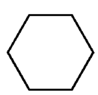 | — | F | F | $C_4H_9$ | |
| 1347 | $C_5H_{11}$ | F | F | 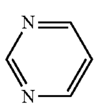 | C≡C | 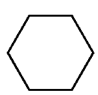 | — | F | F | $C_2H_5$ | |
| 1348 | $C_2H_5$ | F | F | 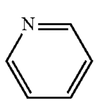 | CH═CH | 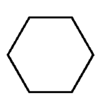 | — | F | F | $OC_4H_9$ | |
| 1349 | $CH_2$═CH | F | F | 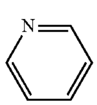 | C≡C | 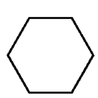 | — | F | F | $OC_3H_7$ | |
| 1350 | $CH_2$═CH | F | F | 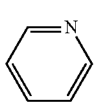 | CH═CH | 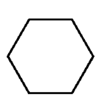 | — | F | F | $OC_5H_{11}$ | |

TABLE 91

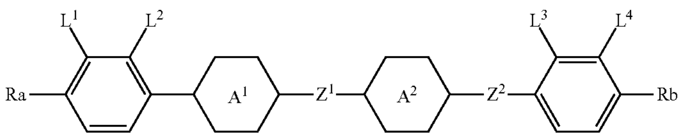

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1351 | $CH_3O$ | F | F | 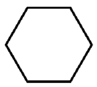 | $CH_2O$ | 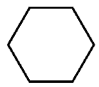 | — | F | F | $OCH_3$ | |
| 1352 | $CH_3O$ | F | F | 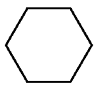 | $CH_2O$ | 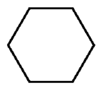 | — | F | F | $OC_2H_5$ | |
| 1353 | $CH_3O$ | F | F | 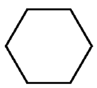 | $CH_2O$ | 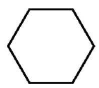 | — | F | F | $OC_3H_7$ | |
| 1354 | $CH_3O$ | F | F | 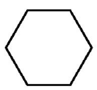 | $CH_2O$ | 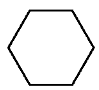 | — | F | F | $OC_4H_9$ | |
| 1355 | $CH_3O$ | F | F | 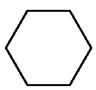 | $CH_2O$ | 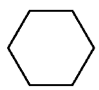 | — | F | F | $OC_5H_{11}$ | |
| 1356 | $C_2H_5O$ | F | F | 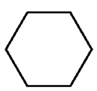 | $CH_2O$ | 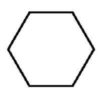 | — | F | F | $OCH_3$ | |
| 1357 | $C_2H_5O$ | F | F | 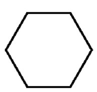 | $CH_2O$ | 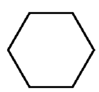 | — | F | F | $OC_2H_5$ | |
| 1358 | $C_2H_5O$ | F | F | 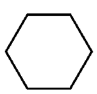 | $CH_2O$ | 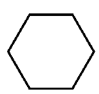 | — | F | F | $OC_3H_7$ | |
| 1359 | $C_2H_5O$ | F | F | 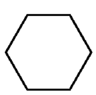 | $CH_2O$ | 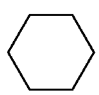 | — | F | F | $OC_4H_9$ | |
| 1360 | $C_2H_5O$ | F | F | 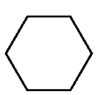 | $CH_2O$ | 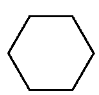 | — | F | F | $OC_5H_{11}$ | |
| 1361 | $C_3H_7O$ | F | F | 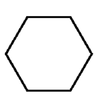 | $CH_2O$ | 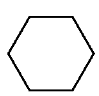 | — | F | F | $OCH_3$ | |
| 1362 | $C_3H_7O$ | F | F | 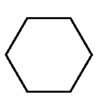 | $CH_2O$ | 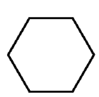 | — | F | F | $OC_2H_5$ | |
| 1363 | $C_3H_7O$ | F | F | 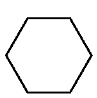 | $CH_2O$ | 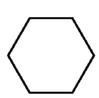 | — | F | F | $OC_3H_7$ | |

TABLE 91-continued

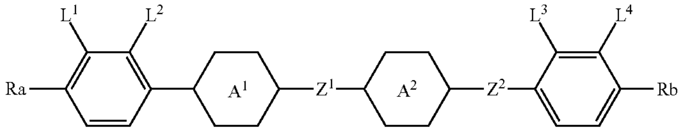

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1364 | $C_3H_7O$ | F | F | 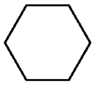 | $CH_2O$ | 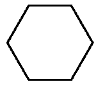 | — | F | F | $OC_4H_9$ | |
| 1365 | $C_3H_7O$ | F | F | 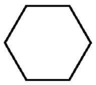 | $CH_2O$ | 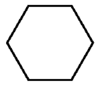 | — | F | F | $OC_5H_{11}$ | |

TABLE 92

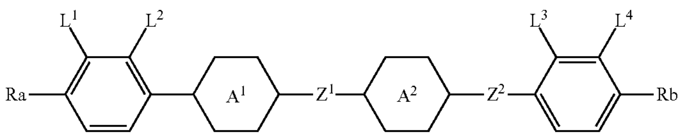

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1366 | $C_4H_9O$ | F | F | 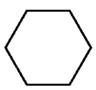 | $CH_2O$ | 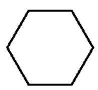 | — | F | F | $OCH_3$ | |
| 1367 | $C_4H_9O$ | F | F | 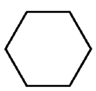 | $CH_2O$ | 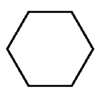 | — | F | F | $OC_2H_5$ | |
| 1368 | $C_4H_9O$ | F | F | 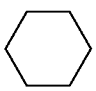 | $CH_2O$ | 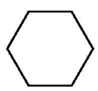 | — | F | F | $OC_3H_7$ | |
| 1369 | $C_4H_9O$ | F | F | 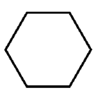 | $CH_2O$ | 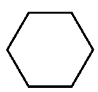 | — | F | F | $OC_4H_9$ | |
| 1370 | $C_4H_9O$ | F | F | 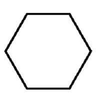 | $CH_2O$ | 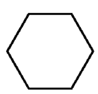 | — | F | F | $OC_5H_{11}$ | |
| 1371 | $C_5H_{11}O$ | F | F | 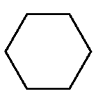 | $CH_2O$ | 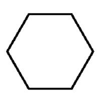 | — | F | F | $OCH_3$ | |
| 1372 | $C_5H_{11}O$ | F | F | 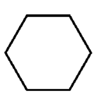 | $CH_2O$ | 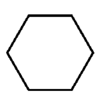 | — | F | F | $OC_2H_5$ | |
| 1373 | $C_5H_{11}O$ | F | F | 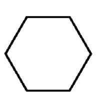 | $CH_2O$ | 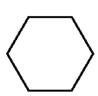 | — | F | F | $OC_3H_7$ | |
| 1374 | $C_5H_{11}O$ | F | F | 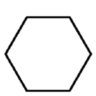 | $CH_2O$ | 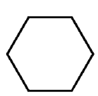 | — | F | F | $OC_4H_9$ | |
| 1375 | $C_5H_{11}O$ | F | F | 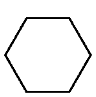 | $CH_2O$ | 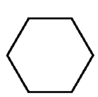 | — | F | F | $OC_5H_{11}$ | |

TABLE 92-continued

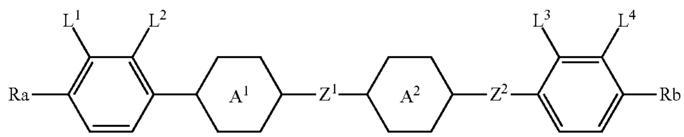

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1376 | $C_2H_5$ | F | F | 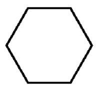 | $CH_2O$ | 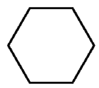 | — | F | F | $C_4H_9$ | |
| 1377 | $C_5H_{11}$ | F | F | 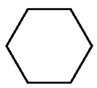 | $CH_2O$ | 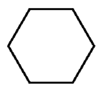 | — | F | F | $C_2H_5$ | |
| 1378 | $C_2H_5$ | F | F | 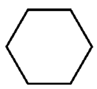 | $CH_2O$ | 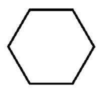 | — | F | F | $OC_4H_9$ | |
| 1379 | $CH_2{=}CH$ | F | F | 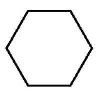 | $CH_2O$ | 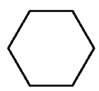 | — | F | F | $OC_3H_7$ | |
| 1380 | $CH_2{=}CH$ | F | F | 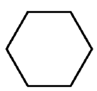 | $CH_2O$ | 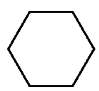 | — | F | F | $OC_5H_{11}$ | |

TABLE 93

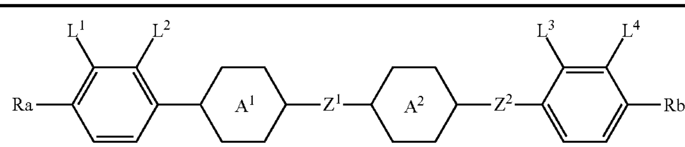

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1381 | $CH_2{=}CHO$ | F | F | 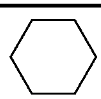 | $CH_2O$ | 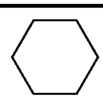 | — | F | F | $OC_3H_7$ | |
| 1382 | $CH_2{=}CHCH_2O$ | F | F | 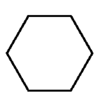 | $CH_2O$ | 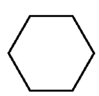 | — | F | F | $OC_5H_{11}$ | |
| 1383 | $CH_2{=}CHCH_2O$ | F | F | 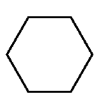 | $CH_2O$ | 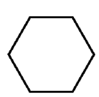 | — | F | F | $OC_3H_7$ | |
| 1384 | $CH_2{=}CHC_2H_5O$ | F | F | 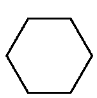 | $CH_2O$ | 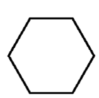 | — | F | F | $OC_5H_{11}$ | |
| 1385 | $CH_2{=}CHC_2H_5O$ | F | F | 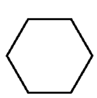 | $CH_2O$ | 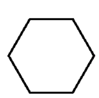 | — | F | F | $OC_2H_5$ | |
| 1386 | $CH_2{=}CHC_2H_5O$ | F | F | 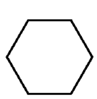 | $CH_2O$ | 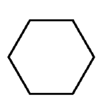 | — | F | F | $OC_3H_7$ | |

TABLE 93-continued

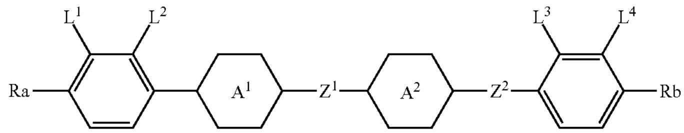

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1387 | $CH_3CH{=}CHCH_2O$ | F | F | 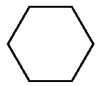 | $CH_2O$ | 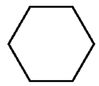 | — | F | F | $OCH_3$ | |
| 1388 | $CH_3CH{=}CHCH_2O$ | F | F | 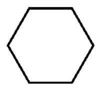 | $CH_2O$ | 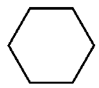 | — | F | F | $OC_2H_5$ | |
| 1389 | $C_3H_7O$ | F | F | 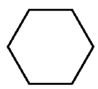 | $CH_2O$ | 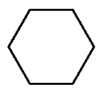 | — | F | F | $OCH{=}CH_2$ | |
| 1390 | $C_3H_7O$ | F | F | 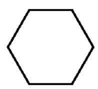 | $CH_2O$ | 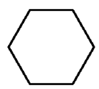 | — | F | F | $OCH_2CH{=}CH_2$ | |
| 1391 | $C_4H_9O$ | F | F | 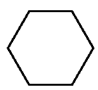 | $CH_2O$ | 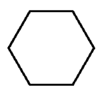 | — | F | F | $OCH_2CH{=}CH_2$ | |
| 1392 | $C_5H_{11}O$ | F | F | 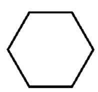 | $CH_2O$ | 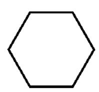 | — | F | F | $OCH_2CH{=}CH_2$ | |
| 1393 | $CH_3O$ | F | F | 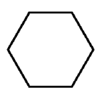 | $CH_2O$ | 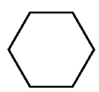 | — | F | F | $OC_2H_5CH{=}CH_2$ | |
| 1394 | $C_2H_5O$ | F | F | 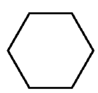 | $CH_2O$ | 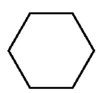 | — | F | F | $OC_2H_5CH{=}CH_2$ | |
| 1395 | $C_3H_7O$ | F | F | 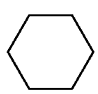 | $CH_2O$ | 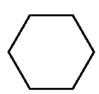 | — | F | F | $OC_2H_5CH{=}CH_2$ | |

TABLE 94

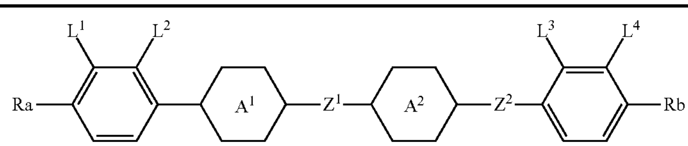

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1396 | $CH_3O$ | F | F | 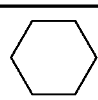 | $CH_2O$ | 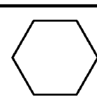 | — | F | F | $OCH_2CH{=}CHCH_3$ | |
| 1397 | $C_2H_5O$ | F | F | 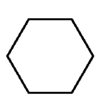 | $CH_2O$ | 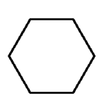 | — | F | F | $OCH_2CH{=}CHCH_3$ | |
| 1398 | $C_3H_7O$ | F | F | 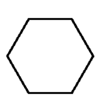 | $CH_2O$ | 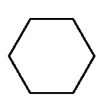 | — | F | F | $OCH_2CH{=}CHCH_3$ | |

TABLE 94-continued

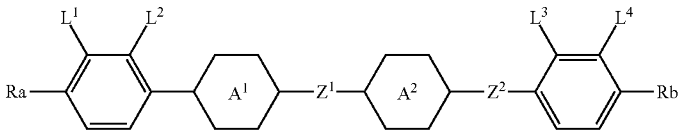

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1399 | $CH_2{=}CHCH_2O$ | F | F | 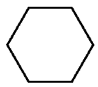 | $CH_2O$ | 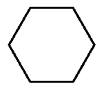 | — | F | F | $OCH{=}CH_2$ | |
| 1400 | $CH_2{=}CHC_2H_5O$ | F | F | 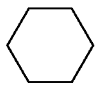 | $CH_2O$ | 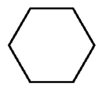 | — | F | F | $OCH_2CH{=}CH_2$ | |
| 1401 | $C_3H_7OCH_2$ | F | F | 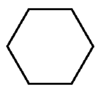 | $CH_2O$ | 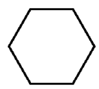 | — | F | F | $OC_3H_7$ | |
| 1402 | $C_5H_{11}O$ | F | F | 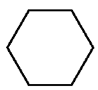 | $CH_2O$ | 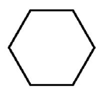 | — | F | F | $OC_2H_5CH{=}CH_2$ | |
| 1403 | $C_3H_7O$ | F | F | 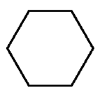 | $CH_2O$ | 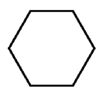 | — | F | F | H | |
| 1404 | $C_5H_{11}O$ | F | F | 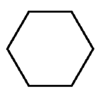 | $CH_2O$ | 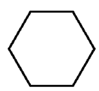 | — | F | F | $OC_9H_{19}$ | |
| 1405 | $C_3H_7O$ | F | F | 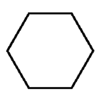 | $CH_2O$ | 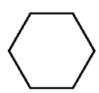 | — | F | F | $C_2H_5$ | |
| 1406 | $C_5H_{11}O$ | F | F | 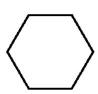 | $CH_2O$ | 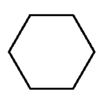 | — | F | F | $C_3H_7$ | |
| 1407 | H | F | F | 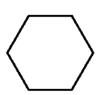 | $CH_2O$ | 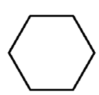 | — | F | F | $OC_4H_9$ | |
| 1408 | $C_7H_{15}O$ | F | F | 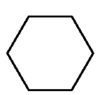 | $CH_2O$ | 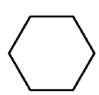 | — | F | F | $OC_4H_9$ | |
| 1409 | $C_2H_5O$ | F | F | 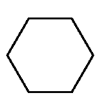 | $CH_2O$ | 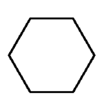 | — | F | F | $OC_6H_{13}$ | |
| 1410 | $CH_3O$ | F | F | 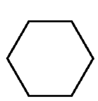 | $CH_2O$ | 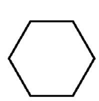 | — | F | F | $C_2H_5$ | |

TABLE 95

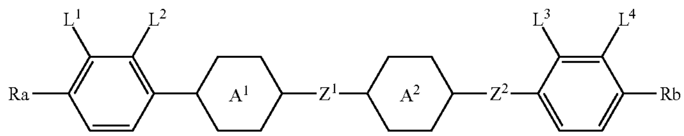

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1411 | $CH_3O$ | F | F | 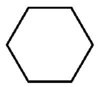 | $CH_2O$ | 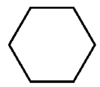 | — | F | H | $OCH_3$ | |
| 1412 | $CH_3O$ | F | F | 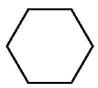 | $CH_2O$ | 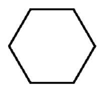 | — | F | H | $OC_2H_5$ | |
| 1413 | $CH_3O$ | F | F | 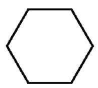 | $CH_2O$ | 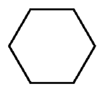 | — | F | H | $OC_3H_7$ | |
| 1414 | $CH_3O$ | F | F | 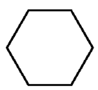 | $CH_2O$ | 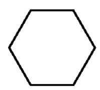 | — | F | H | $OC_4H_9$ | |
| 1415 | $CH_3O$ | F | F | 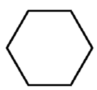 | $CH_2O$ | 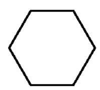 | — | F | H | $OC_5H_{11}$ | |
| 1416 | $C_2H_5O$ | F | F | 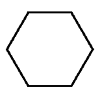 | $CH_2O$ | 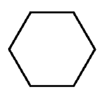 | — | F | H | $OCH_3$ | |
| 1417 | $C_2H_5O$ | F | F | 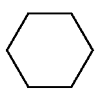 | $CH_2O$ | 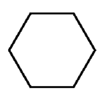 | — | F | H | $OC_2H_5$ | |
| 1418 | $C_2H_5O$ | F | F | 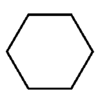 | $CH_2O$ | 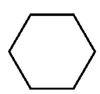 | — | F | H | $OC_3H_7$ | |
| 1419 | $C_2H_5O$ | F | F | 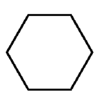 | $CH_2O$ | 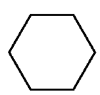 | — | F | H | $OC_4H_9$ | |
| 1420 | $C_2H_5O$ | F | F | 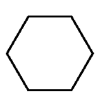 | $CH_2O$ | 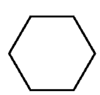 | — | F | H | $OC_5H_{11}$ | |
| 1421 | $C_3H_7O$ | F | F | 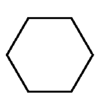 | $CH_2O$ | 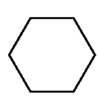 | — | F | H | $OCH_3$ | |
| 1422 | $C_3H_7O$ | F | F | 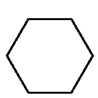 | $CH_2O$ | 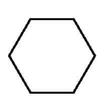 | — | F | H | $OC_2H_5$ | |
| 1423 | $C_3H_7O$ | F | F | 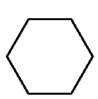 | $CH_2O$ | 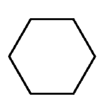 | — | F | H | $OC_3H_7$ | |

TABLE 95-continued

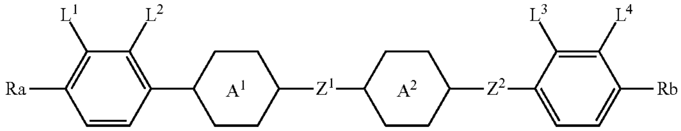

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1424 | $C_3H_7O$ | F | F | 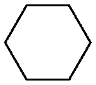 | $CH_2O$ | 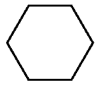 | — | F | H | $OC_4H_9$ | |
| 1425 | $C_3H_7O$ | F | F | 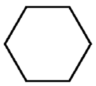 | $CH_2O$ | 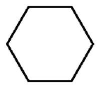 | — | F | H | $OC_5H_{11}$ | |

TABLE 96

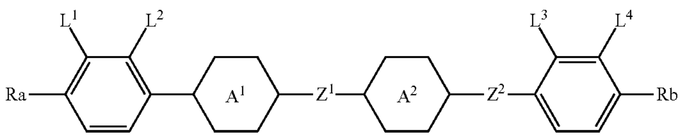

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1426 | $C_4H_9O$ | F | F | 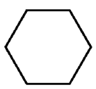 | $CH_2O$ | 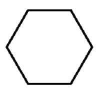 | — | F | H | $OCH_3$ | |
| 1427 | $C_4H_9O$ | F | F | 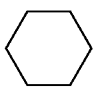 | $CH_2O$ | 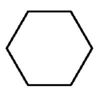 | — | F | H | $OC_2H_5$ | |
| 1428 | $C_4H_9O$ | F | F | 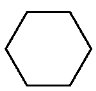 | $CH_2O$ | 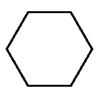 | — | F | H | $OC_3H_7$ | |
| 1429 | $C_4H_9O$ | F | F | 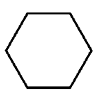 | $CH_2O$ | 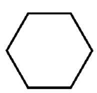 | — | F | H | $OC_4H_9$ | |
| 1430 | $C_4H_9O$ | F | F | 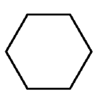 | $CH_2O$ | 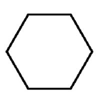 | — | F | H | $OC_5H_{11}$ | |
| 1431 | $C_5H_{11}O$ | F | F | 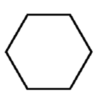 | $CH_2O$ | 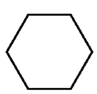 | — | F | H | $OCH_3$ | |
| 1432 | $C_5H_{11}O$ | F | F | 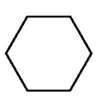 | $CH_2O$ | 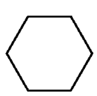 | — | F | H | $OC_2H_5$ | |
| 1433 | $C_5H_{11}O$ | F | F | 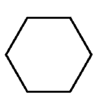 | $CH_2O$ | 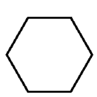 | — | H | H | $OC_3H_7$ | |
| 1434 | $C_5H_{11}O$ | F | F | 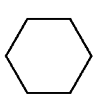 | $CH_2O$ | 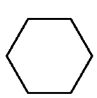 | — | H | H | $OC_4H_9$ | |
| 1435 | $C_5H_{11}O$ | F | F | 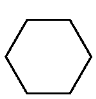 | $CH_2O$ | 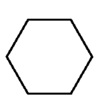 | — | F | H | $OC_5H_{11}$ | |

TABLE 96-continued

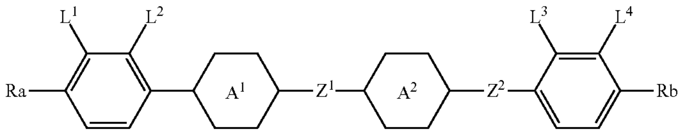

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1436 | $C_2H_5$ | F | F | 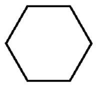 | $CH_2O$ | 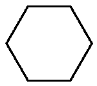 | — | F | H | $C_4H_9$ | |
| 1437 | $C_5H_{11}$ | F | F | 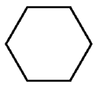 | $CH_2O$ | 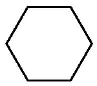 | — | F | H | $C_2H_5$ | |
| 1438 | $C_2H_5$ | F | F | 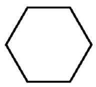 | $CH_2O$ | 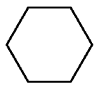 | — | F | H | $OC_4H_9$ | |
| 1439 | $CH_2$=CH | F | F | 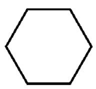 | $CH_2O$ | 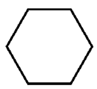 | — | F | H | $OC_3H_7$ | |
| 1440 | $CH_2$=CH | F | F | 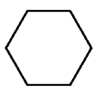 | $CH_2O$ | 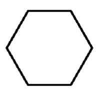 | — | F | H | $OC_5H_{11}$ | |

TABLE 97

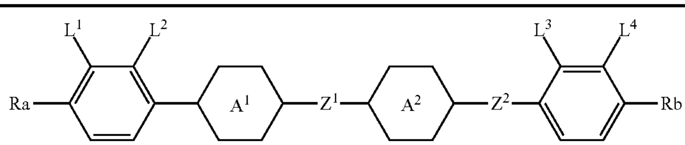

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1441 | $CH_2$=CHO | F | F | 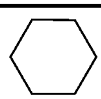 | $CH_2O$ | 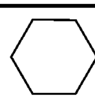 | — | F | H | $OC_3H_7$ | |
| 1442 | $CH_2$=$CHCH_2O$ | F | F | 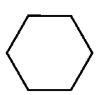 | $CH_2O$ | 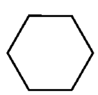 | — | F | H | $OC_5H_{11}$ | |
| 1443 | $CH_2$=$CHCH_2O$ | F | F | 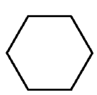 | $CH_2O$ | 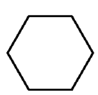 | — | F | H | $OC_3H_7$ | |
| 1444 | $CH_2$=$CHC_2H_5O$ | F | F | 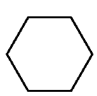 | $CH_2O$ | 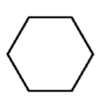 | — | F | H | $OC_5H_{11}$ | |
| 1445 | $CH_2$=$CHC_2H_5O$ | F | F | 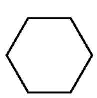 | $CH_2O$ | 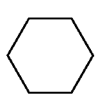 | — | F | H | $OC_2H_5$ | |
| 1446 | $CH_2$=$CHC_2H_5O$ | F | F | 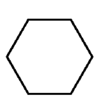 | $CH_2O$ | 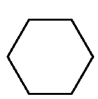 | — | F | H | $OC_3H_7$ | |

TABLE 97-continued

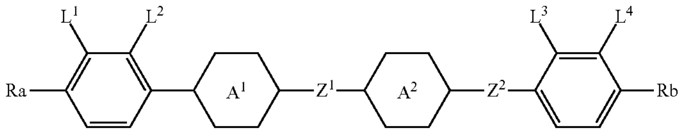

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1447 | $CH_3CH{=}CHCH_2O$ | F | F | 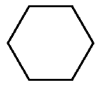 | $CH_2O$ | 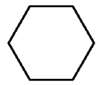 | — | F | H | $OCH_3$ | |
| 1448 | $CH_3CH{=}CHCH_2O$ | F | F | 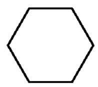 | $CH_2O$ | 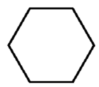 | — | F | H | $OC_2H_5$ | |
| 1449 | $C_3H_7O$ | F | F | 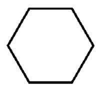 | $CH_2O$ | 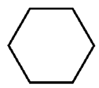 | — | F | H | $OCH{=}CH_2$ | |
| 1450 | $C_3H_7O$ | F | F | 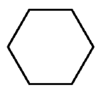 | $CH_2O$ | 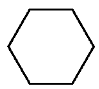 | — | F | H | $OCH_2CH{=}CH_2$ | |
| 1451 | $C_4H_9O$ | F | F | 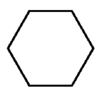 | $CH_2O$ | 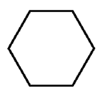 | — | F | H | $OCH_2CH{=}CH_2$ | |
| 1452 | $C_5H_{11}O$ | F | F | 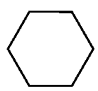 | $CH_2O$ | 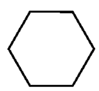 | — | F | H | $OCH_2CH{=}CH_2$ | |
| 1453 | $CH_3O$ | F | F | 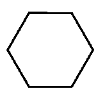 | $CH_2O$ | 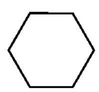 | — | F | H | $OC_2H_5CH{=}CH_2$ | |
| 1454 | $C_2H_5O$ | F | F | 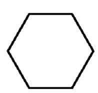 | $CH_2O$ | 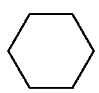 | — | F | H | $OC_2H_5CH{=}CH_2$ | |
| 1455 | $C_3H_7O$ | F | F | 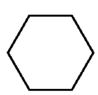 | $CH_2O$ | 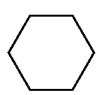 | — | F | H | $OC_2H_5CH{=}CH_2$ | |

TABLE 98

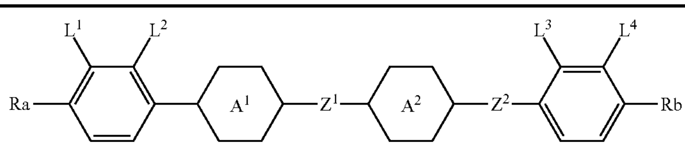

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1456 | $CH_3O$ | F | F | 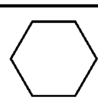 | $CH_2O$ | 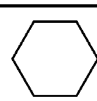 | — | F | H | $OCH_2CH{=}CHCH_3$ | |
| 1457 | $C_2H_5O$ | F | F | 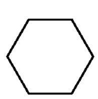 | $CH_2O$ | 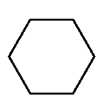 | — | F | H | $OCH_2CH{=}CHCH_3$ | |
| 1458 | $C_3H_7O$ | F | F | 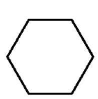 | $CH_2O$ | 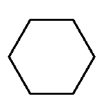 | — | F | H | $OCH_2CH{=}CHCH_3$ | |

TABLE 98-continued

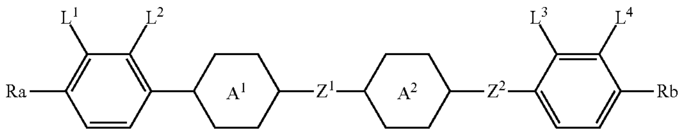

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1459 | $CH_2{=}CHCH_2O$ | F | F | 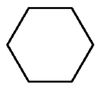 | $CH_2O$ | 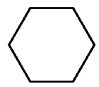 | — | F | H | $OCH{=}CH_2$ | |
| 1460 | $CH_2{=}CHC_2H_5O$ | F | F | 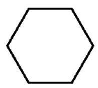 | $CH_2O$ | 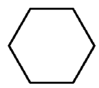 | — | F | H | $OCH_2CH{=}CH_2$ | |
| 1461 | $C_3H_7OCH_2$ | F | F | 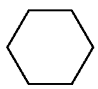 | $CH_2O$ | 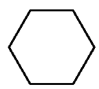 | — | F | H | $OC_3H_7$ | |
| 1462 | $C_5H_{11}O$ | F | F | 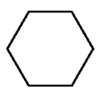 | $CH_2O$ | 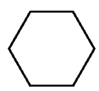 | — | F | H | $OC_2H_5CH{=}CH_2$ | |
| 1463 | $C_3H_7O$ | F | F | 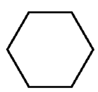 | $CH_2O$ | 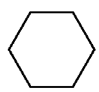 | — | F | H | H | |
| 1464 | $C_5H_{11}O$ | F | F | 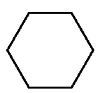 | $CH_2O$ | 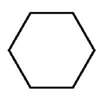 | — | F | H | $OC_9H_{19}$ | |
| 1465 | $C_3H_7O$ | F | F | 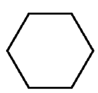 | $CH_2O$ | 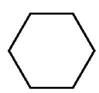 | — | F | H | $C_2H_5$ | |
| 1466 | $C_5H_{11}O$ | F | F | 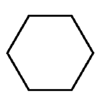 | $CH_2O$ | 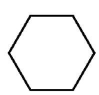 | — | F | H | $C_3H_7$ | |
| 1467 | H | F | F | 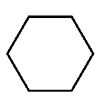 | $CH_2O$ | 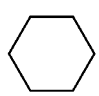 | — | F | H | $OC_4H_9$ | |
| 1468 | $C_7H_{15}O$ | F | F | 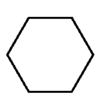 | $CH_2O$ | 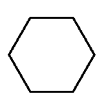 | — | F | H | $OC_4H_9$ | |
| 1469 | $C_2H_5O$ | F | F | 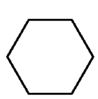 | $CH_2O$ | 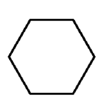 | — | F | H | $OC_6H_{13}$ | |
| 1470 | $CH_3O$ | F | F | 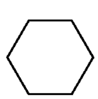 | $CH_2O$ | 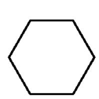 | — | F | H | $C_2H_5$ | |

TABLE 99

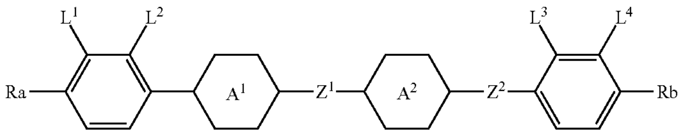

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1471 | $CH_3O$ | F | F | 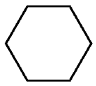 | $CH_2O$ | 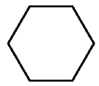 | — | H | F | $OCH_3$ | |
| 1472 | $CH_3O$ | F | F | 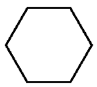 | $CH_2O$ | 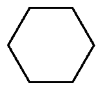 | — | H | F | $OC_2H_5$ | |
| 1473 | $CH_3O$ | F | F | 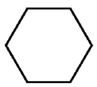 | $CH_2O$ | 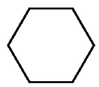 | — | H | F | $OC_3H_7$ | |
| 1474 | $CH_3O$ | F | F | 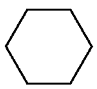 | $CH_2O$ | 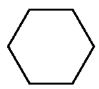 | — | H | F | $OC_4H_9$ | |
| 1475 | $CH_3O$ | F | F | 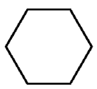 | $CH_2O$ | 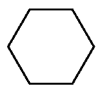 | — | H | F | $OC_5H_{11}$ | |
| 1476 | $C_2H_5O$ | F | F | 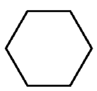 | $CH_2O$ | 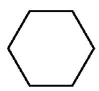 | — | H | F | $OCH_3$ | |
| 1477 | $C_2H_5O$ | F | F | 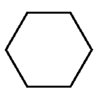 | $CH_2O$ | 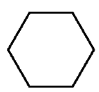 | — | H | F | $OC_2H_5$ | |
| 1478 | $C_2H_5O$ | F | F | 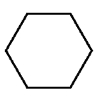 | $CH_2O$ | 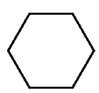 | — | H | F | $OC_3H_7$ | |
| 1479 | $C_2H_5O$ | F | F | 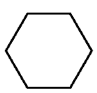 | $CH_2O$ | 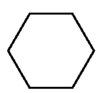 | — | H | F | $OC_4H_9$ | |
| 1480 | $C_2H_5O$ | F | F | 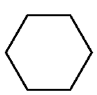 | $CH_2O$ | 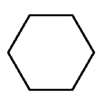 | — | H | F | $OC_5H_{11}$ | |
| 1481 | $C_3H_7O$ | F | F | 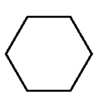 | $CH_2O$ | 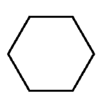 | — | H | F | $OCH_3$ | |
| 1482 | $C_3H_7O$ | F | F | 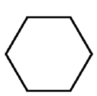 | $CH_2O$ | 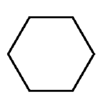 | — | H | F | $OC_2H_5$ | |
| 1483 | $C_3H_7O$ | F | F | 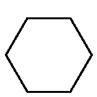 | $CH_2O$ | 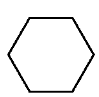 | — | H | F | $OC_3H_7$ | |

TABLE 99-continued

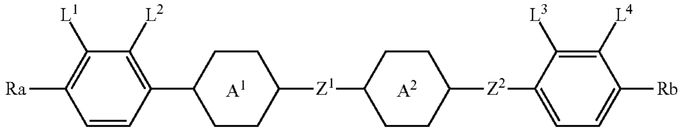

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1484 | $C_3H_7O$ | F | F | 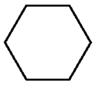 | $CH_2O$ | 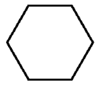 | — | H | F | $OC_4H_9$ | |
| 1485 | $C_3H_7O$ | F | F | 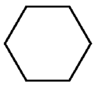 | $CH_2O$ | 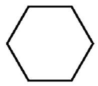 | — | H | F | $OC_5H_{11}$ | |

TABLE 100

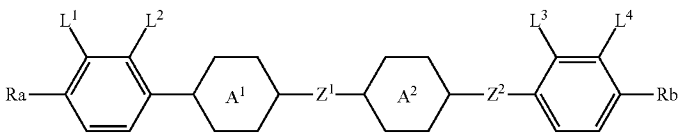

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1486 | $C_4H_9O$ | F | F | 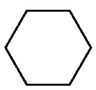 | $CH_2O$ | 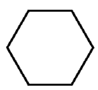 | — | H | F | $OCH_3$ | |
| 1487 | $C_4H_9O$ | F | F | 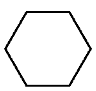 | $CH_2O$ | 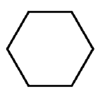 | — | H | F | $OC_2H_5$ | |
| 1488 | $C_4H_9O$ | F | F | 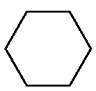 | $CH_2O$ | 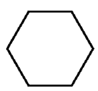 | — | H | F | $OC_3H_7$ | |
| 1489 | $C_4H_9O$ | F | F | 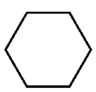 | $CH_2O$ | 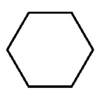 | — | H | F | $OC_4H_9$ | |
| 1490 | $C_4H_9O$ | F | F | 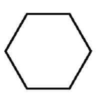 | $CH_2O$ | 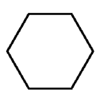 | — | H | F | $OC_5H_{11}$ | |
| 1491 | $C_5H_{11}O$ | F | F | 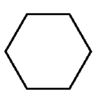 | $CH_2O$ | 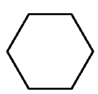 | — | H | F | $OCH_3$ | |
| 1492 | $C_5H_{11}O$ | F | F | 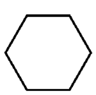 | $CH_2O$ | 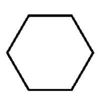 | — | H | F | $OC_2H_5$ | |
| 1493 | $C_5H_{11}O$ | F | F | 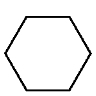 | $CH_2O$ | 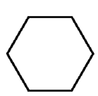 | — | H | F | $OC_3H_7$ | |
| 1494 | $C_5H_{11}O$ | F | F | 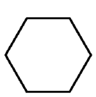 | $CH_2O$ | 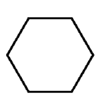 | — | H | F | $OC_4H_9$ | |
| 1495 | $C_5H_{11}O$ | F | F | 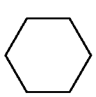 | $CH_2O$ | 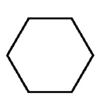 | — | H | F | $OC_5H_{11}$ | |

TABLE 100-continued

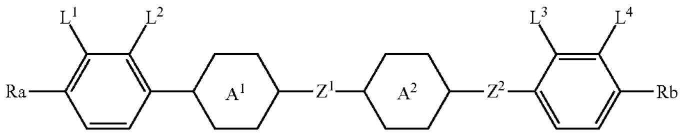

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1496 | $C_2H_5$ | F | F | 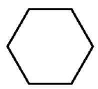 | $CH_2O$ | 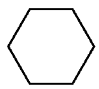 | — | H | F | $C_4H_9$ | |
| 1497 | $C_5H_{11}$ | F | F | 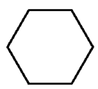 | $CH_2O$ | 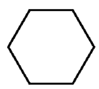 | — | H | F | $C_2H_5$ | |
| 1498 | $C_2H_5$ | F | F | 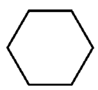 | $CH_2O$ | 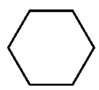 | — | H | F | $OC_4H_9$ | |
| 1499 | $CH_2{=}CH$ | F | F | 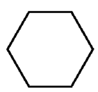 | $CH_2O$ | 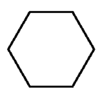 | — | H | F | $OC_3H_7$ | |
| 1500 | $CH_2{=}CH$ | F | F | 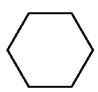 | $CH_2O$ | 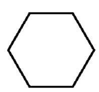 | — | H | F | $OC_5H_{11}$ | |

TABLE 101

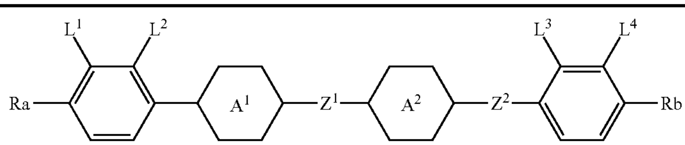

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1501 | $CH_2{=}CHO$ | F | F | 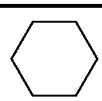 | $CH_2O$ | 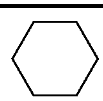 | — | H | F | $OC_3H_7$ | |
| 1502 | $CH_2{=}CHCH_2O$ | F | F | 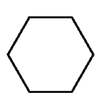 | $CH_2O$ | 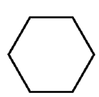 | — | H | F | $OC_5H_{11}$ | |
| 1503 | $CH_2{=}CHCH_2O$ | F | F | 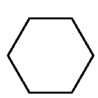 | $CH_2O$ | 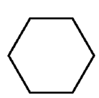 | — | H | F | $OC_3H_7$ | |
| 1504 | $CH_2{=}CHC_2H_5O$ | F | F | 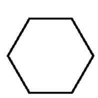 | $CH_2O$ | 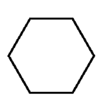 | — | H | F | $OC_5H_{11}$ | |
| 1505 | $CH_2{=}CHC_2H_5O$ | F | F | 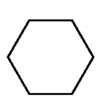 | $CH_2O$ | 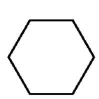 | — | H | F | $OC_2H_5$ | |
| 1506 | $CH_2{=}CHC_2H_5O$ | F | F | 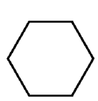 | $CH_2O$ | 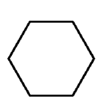 | — | H | F | $OC_3H_7$ | |

TABLE 101-continued

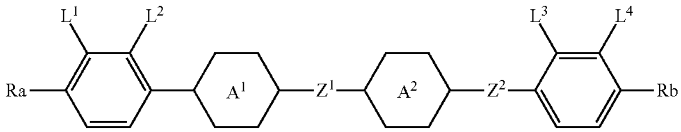

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1507 | $CH_3CH{=}CHCH_2O$ | F | F | 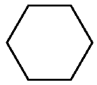 | $CH_2O$ | 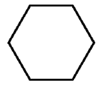 | — | H | F | $OCH_3$ | |
| 1508 | $CH_3CH{=}CHCH_2O$ | F | F | 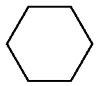 | $CH_2O$ | 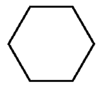 | — | H | F | $OC_2H_5$ | |
| 1509 | $C_3H_7O$ | F | F | 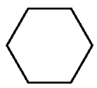 | $CH_2O$ | 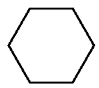 | — | H | F | $OCH{=}CH_2$ | |
| 1510 | $C_3H_7O$ | F | F | 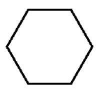 | $CH_2O$ | 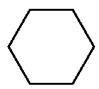 | — | H | F | $OCH_2CH{=}CH_2$ | |
| 1511 | $C_4H_9O$ | F | F | 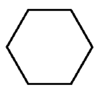 | $CH_2O$ | 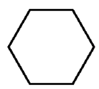 | — | H | F | $OCH_2CH{=}CH_2$ | |
| 1512 | $C_5H_{11}O$ | F | F | 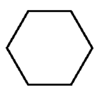 | $CH_2O$ | 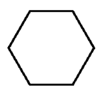 | — | H | F | $OCH_2CH{=}CH_2$ | |
| 1513 | $CH_3O$ | F | F | 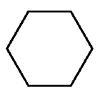 | $CH_2O$ | 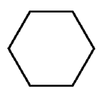 | — | H | F | $OC_2H_5CH{=}CH_2$ | |
| 1514 | $C_2H_5O$ | F | F | 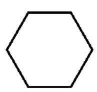 | $CH_2O$ | 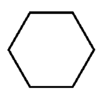 | — | H | F | $OC_2H_5CH{=}CH_2$ | |
| 1515 | $C_3H_7O$ | F | F | 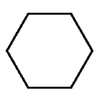 | $CH_2O$ | 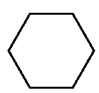 | — | H | F | $OC_2H_5CH{=}CH_2$ | |

TABLE 102

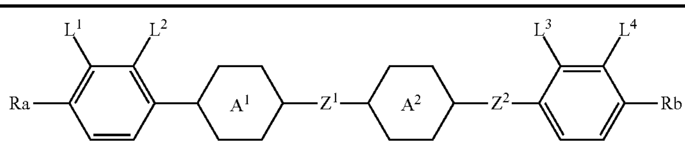

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1516 | $CH_3O$ | F | F | 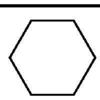 | $CH_2O$ | 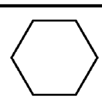 | — | H | F | $OCH_2CH{=}CHCH_3$ | |
| 1517 | $C_2H_5O$ | F | F | 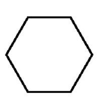 | $CH_2O$ | 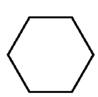 | — | H | F | $OCH_2CH{=}CHCH_3$ | |
| 1518 | $C_3H_7O$ | F | F | 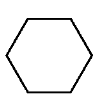 | $CH_2O$ | 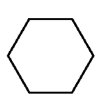 | — | H | F | $OCH_2CH{=}CHCH_3$ | |

TABLE 102-continued

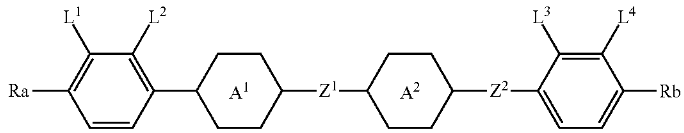

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1519 | $CH_2{=}CHCH_2O$ | F | F | 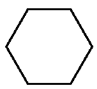 | $CH_2O$ | 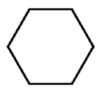 | — | H | F | $OCH{=}CH_2$ | |
| 1520 | $CH_2{=}CHC_2H_5O$ | F | F | 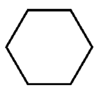 | $CH_2O$ | 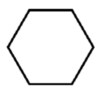 | — | H | F | $OCH_2CH{=}CH_2$ | |
| 1521 | $C_3H_7OCH_2$ | F | F | 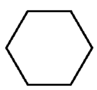 | $CH_2O$ | 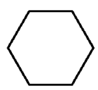 | — | H | F | $OC_3H_7$ | |
| 1522 | $C_5H_{11}O$ | F | F | 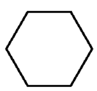 | $CH_2O$ | 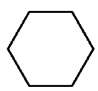 | — | H | F | $OC_2H_5CH{=}CH_2$ | |
| 1523 | $C_3H_7O$ | F | F | 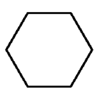 | $CH_2O$ | 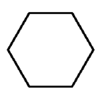 | — | H | F | H | |
| 1524 | $C_5H_{11}O$ | F | F | 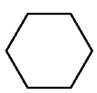 | $CH_2O$ | 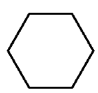 | — | H | F | $OC_9H_{19}$ | |
| 1525 | $C_3H_7O$ | F | F | 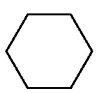 | $CH_2O$ | 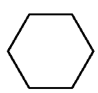 | — | H | F | $C_2H_5$ | |
| 1526 | $C_5H_{11}O$ | F | F | 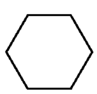 | $CH_2O$ | 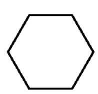 | — | H | F | $C_3H_7$ | |
| 1527 | H | F | F | 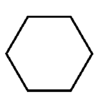 | $CH_2O$ | 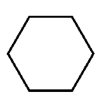 | — | H | F | $OC_4H_9$ | |
| 1528 | $C_7H_{15}O$ | F | F | 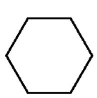 | $CH_2O$ | 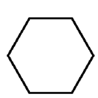 | — | H | F | $OC_4H_9$ | |
| 1529 | $C_2H_5O$ | F | F | 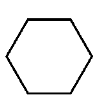 | $CH_2O$ | 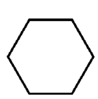 | — | H | F | $OC_6H_{13}$ | |
| 1530 | $CH_3O$ | F | F | 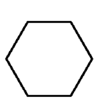 | $CH_2O$ | 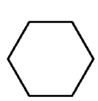 | — | H | F | $C_2H_5$ | |

TABLE 103

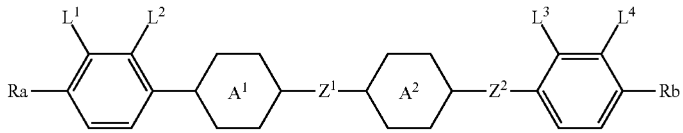

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1531 | $CH_3O$ | F | F | 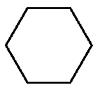 | $CH_2O$ | 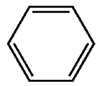 | — | F | F | $OCH_3$ | |
| 1532 | $CH_3O$ | F | F | 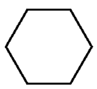 | $CH_2O$ | 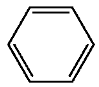 | — | F | F | $OC_2H_5$ | |
| 1533 | $CH_3O$ | F | F | 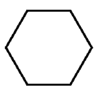 | $CH_2O$ | 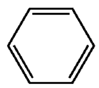 | — | F | F | $OC_3H_7$ | |
| 1534 | $CH_3O$ | F | F | 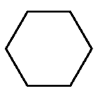 | $CH_2O$ |  | — | F | F | $OC_4H_9$ | |
| 1535 | $CH_3O$ | F | F | 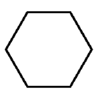 | $CH_2O$ | 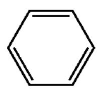 | — | F | F | $OC_5H_{11}$ | |
| 1536 | $C_2HO$ | F | F | 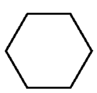 | $CH_2O$ | 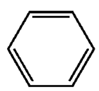 | — | F | F | $OCH_3$ | |
| 1537 | $C_2H_5O$ | F | F | 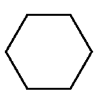 | $CH_2O$ |  | — | F | F | $OC_2H_5$ | |
| 1538 | $C_2H_5O$ | F | F | 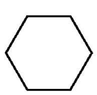 | $CH_2O$ | 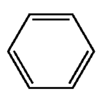 | — | F | F | $OC_3H_7$ | |
| 1539 | $C_2H_5O$ | F | F | 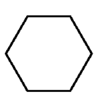 | $CH_2O$ | 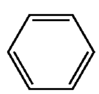 | — | F | F | $OC_4H_9$ | C 113.8 $S_A$ 143.4 N 224.1 I $T_{NI}$: 202.6° C., Δ ϵ: −8.83, Δn: 0.201 |
| 1540 | $C_2H_5O$ | F | F | 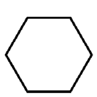 | $CH_2O$ | 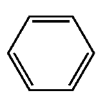 | — | F | F | $OC_5H_{11}$ | |
| 1541 | $C_3H_7O$ | F | F | 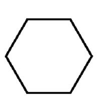 | $CH_2O$ | 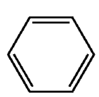 | — | F | F | $OCH_3$ | |
| 1542 | $C_3H_7O$ | F | F | 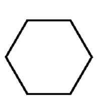 | $CH_2O$ | 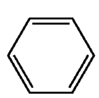 | — | F | F | $OC_2H_5$ | |
| 1543 | $C_3H_7O$ | F | F | 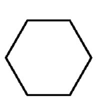 | $CH_2O$ | 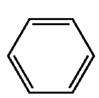 | — | F | F | $OC_3H_7$ | |

TABLE 103-continued

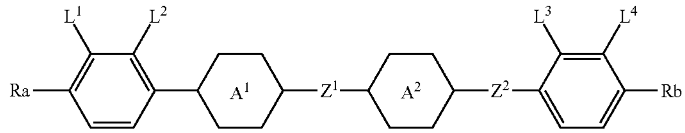

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1544 | $C_3H_7O$ | F | F | 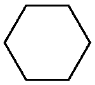 | $CH_2O$ | 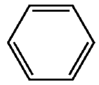 | — | F | F | $OC_4H_9$ | |
| 1545 | $C_3H_7O$ | F | F | 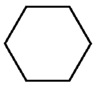 | $CH_2O$ | 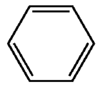 | — | F | F | $OC_5H_{11}$ | |

TABLE 104

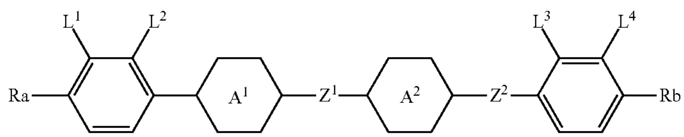

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1546 | $C_4H_9O$ | F | F | 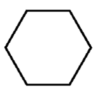 | $CH_2O$ |  | — | F | F | $OCH_3$ | |
| 1547 | $C_4H_9O$ | F | F | 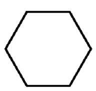 | $CH_2O$ |  | — | F | F | $OC_2H_5$ | |
| 1548 | $C_4H_9O$ | F | F | 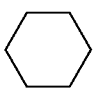 | $CH_2O$ |  | — | F | F | $OC_3H_7$ | |
| 1549 | $C_4H_9O$ | F | F | 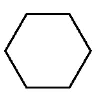 | $CH_2O$ |  | — | F | F | $OC_4H_9$ | |
| 1550 | $C_4H_9O$ | F | F | 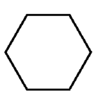 | $CH_2O$ | 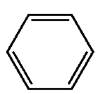 | — | F | F | $OC_5H_{11}$ | |
| 1551 | $C_5H_{11}O$ | F | F | 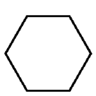 | $CH_2O$ | 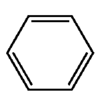 | — | F | F | $OCH_3$ | |
| 1552 | $C_5H_{11}O$ | F | F | 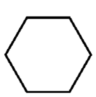 | $CH_2O$ | 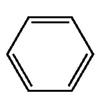 | — | F | F | $OC_2H_5$ | |
| 1553 | $C_5H_{11}O$ | F | F | 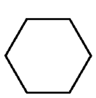 | $CH_2O$ | 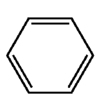 | — | F | F | $OC_3H_7$ | |
| 1554 | $C_5H_{11}O$ | F | F | 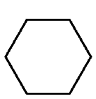 | $CH_2O$ | 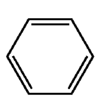 | — | F | F | $OC_4H_9$ | |
| 1555 | $C_5H_{11}O$ | F | F | 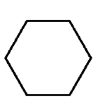 | $CH_2O$ | 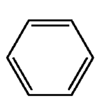 | — | F | F | $OC_5H_{11}$ | |

TABLE 104-continued

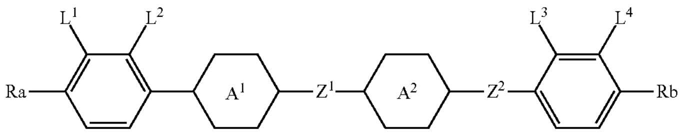

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1556 | $C_2H_5$ | F | F | 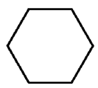 | $CH_2O$ | 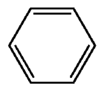 | — | F | F | $C_4H_9$ | |
| 1557 | $C_5H_{11}$ | F | F | 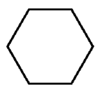 | $CH_2O$ | 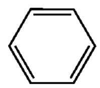 | — | F | F | $C_2H_5$ | |
| 1558 | $C_2H_5$ | F | F | 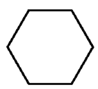 | $CH_2O$ | 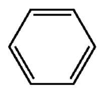 | — | F | F | $OC_4H_9$ | |
| 1559 | $CH_2{=}CH$ | F | F | 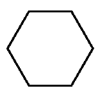 | $CH_2O$ | 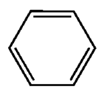 | — | F | F | $OC_3H_7$ | |
| 1560 | $CH_2{=}CH$ | F | F | 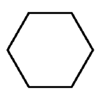 | $CH_2O$ | 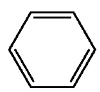 | — | F | F | $OC_5H_{11}$ | |

TABLE 105

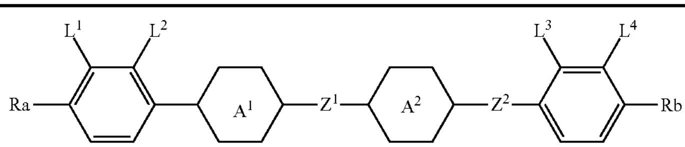

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1561 | $CH_2{=}CHO$ | F | F | 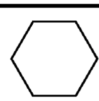 | $CH_2O$ | 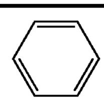 | — | F | F | $OC_3H_7$ | |
| 1562 | $CH_2{=}CHCH_2O$ | F | F | 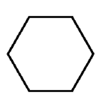 | $CH_2O$ | 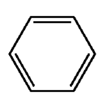 | — | F | F | $OC_5H_{11}$ | |
| 1563 | $CH_2{=}CHCH_2O$ | F | F | 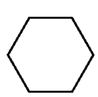 | $CH_2O$ | 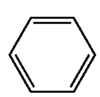 | — | F | F | $OC_3H_7$ | |
| 1564 | $CH_2{=}CHC_2H_5O$ | F | F | 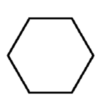 | $CH_2O$ | 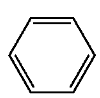 | — | F | F | $OC_5H_{11}$ | |
| 1565 | $CH_2{=}CHC_2H_5O$ | F | F | 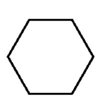 | $CH_2O$ | 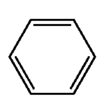 | — | F | F | $OC_2H_5$ | |
| 1566 | $CH_2{=}CHC_2H_5O$ | F | F | 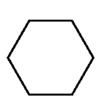 | $CH_2O$ | 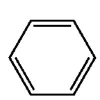 | — | F | F | $OC_3H_7$ | |

TABLE 105-continued

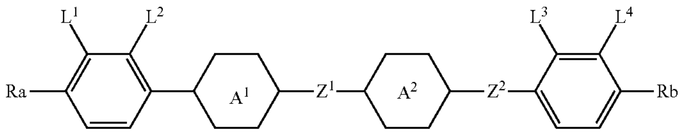

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1567 | $CH_3CH{=}CHCH_2O$ | F | F | 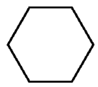 | $CH_2O$ | 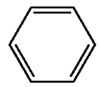 | — | F | F | $OCH_3$ | |
| 1568 | $CH_3CH{=}CHCH_2O$ | F | F | 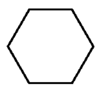 | $CH_2O$ | 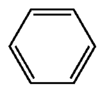 | — | F | F | $OC_2H_5$ | |
| 1569 | $C_3H_7O$ | F | F | 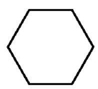 | $CH_2O$ | 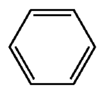 | — | F | F | $OCH{=}CH_2$ | |
| 1570 | $C_3H_7O$ | F | F | 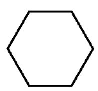 | $CH_2O$ | 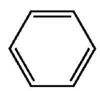 | — | F | F | $OCH_2CH{=}CH_2$ | |
| 1571 | $C_4H_9O$ | F | F | 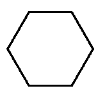 | $CH_2O$ | 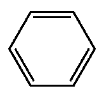 | — | F | F | $OCH_2CH{=}CH_2$ | |
| 1572 | $C_5H_{11}O$ | F | F | 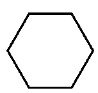 | $CH_2O$ | 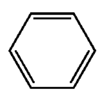 | — | F | F | $OCH_2CH{=}CH_2$ | |
| 1573 | $CH_3O$ | F | F | 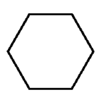 | $CH_2O$ | 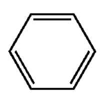 | — | F | F | $OC_2H_5CH{=}CH_2$ | |
| 1574 | $C_2H_5O$ | F | F | 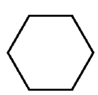 | $CH_2O$ | 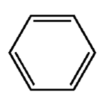 | — | F | F | $OC_2H_5CH{=}CH_2$ | |
| 1575 | $C_3H_7O$ | F | F | 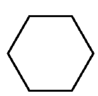 | $CH_2O$ | 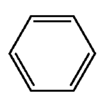 | — | F | F | $OC_2H_5CH{=}CH_2$ | |

TABLE 106

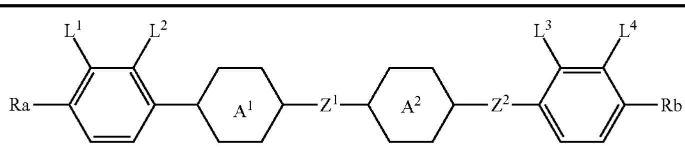

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1576 | $CH_3O$ | F | F | 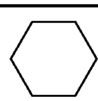 | $CH_2O$ | 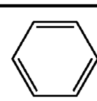 | — | F | F | $OCH_2CH{=}CHCH_3$ | |
| 1577 | $C_2H_5O$ | F | F | 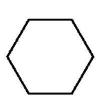 | $CH_2O$ | 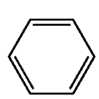 | — | F | F | $OCH_2CH{=}CHCH_3$ | |

TABLE 106-continued

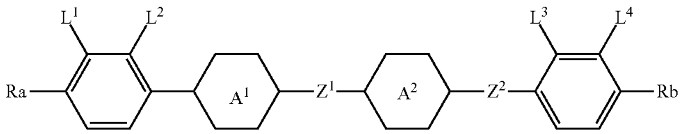

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1578 | $C_3H_7O$ | F | F | 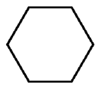 | $CH_2O$ | 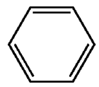 | — | F | F | $OCH_2CH{=}CHCH_3$ | |
| 1579 | $CH_2{=}CHCH_2O$ | F | F | 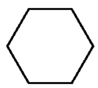 | $CH_2O$ | 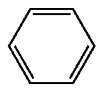 | — | F | F | $OCH{=}CH_2$ | |
| 1580 | $CH_2{=}CHC_2H_5O$ | F | F | 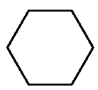 | $CH_2O$ | 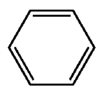 | — | F | F | $OCH_2CH{=}CH_2$ | |
| 1581 | $C_3H_7OCH_2$ | F | F | 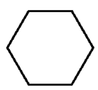 | $CH_2O$ | 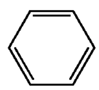 | — | F | F | $OC_3H_7$ | |
| 1582 | $C_5H_{11}O$ | F | F | 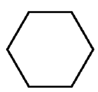 | $CH_2O$ | 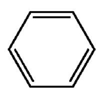 | — | F | F | $OC_2H_5CH{=}CH_2$ | |
| 1583 | $C_3H_7O$ | F | F | 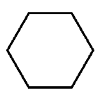 | $CH_2O$ | 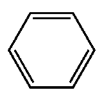 | — | F | F | H | |
| 1584 | $C_5H_{11}O$ | F | F | 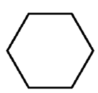 | $CH_2O$ | 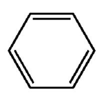 | — | F | F | $OC_9H_{19}$ | |
| 1585 | $C_3H_7O$ | F | F | 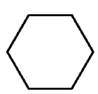 | $CH_2O$ | 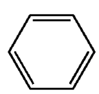 | — | F | F | $C_2H_5$ | |
| 1586 | $C_5H_{11}O$ | F | F | 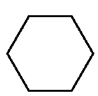 | $CH_2O$ | 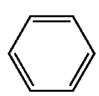 | — | F | F | $C_3H_7$ | |
| 1587 | H | F | F | 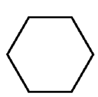 | $CH_2O$ | 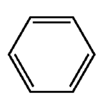 | — | F | F | $OC_4H_9$ | |
| 1588 | $C_7H_{15}O$ | F | F | 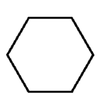 | $CH_2O$ | 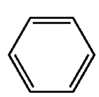 | — | F | F | $OC_4H_9$ | |
| 1589 | $C_2H_5O$ | F | F | 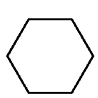 | $CH_2O$ | 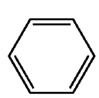 | — | F | F | $OC_6H_{13}$ | |
| 1590 | $CH_3O$ | F | F | 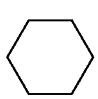 | $CH_2O$ | 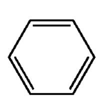 | — | F | F | $C_2H_5$ | |

TABLE 107

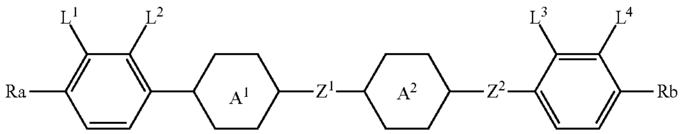

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1591 | $CH_3O$ | F | F | 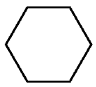 | $CH_2O$ | 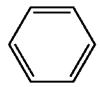 | — | F | H | $OCH_3$ | |
| 1592 | $CH_3O$ | F | F | 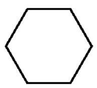 | $CH_2O$ | 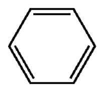 | — | F | H | $OC_2H_5$ | |
| 1593 | $CH_3O$ | F | F | 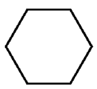 | $CH_2O$ | 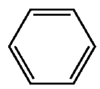 | — | F | H | $OC_3H_7$ | |
| 1594 | $CH_3O$ | F | F | 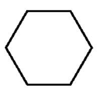 | $CH_2O$ | 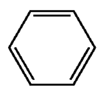 | — | F | H | $OC_4H_9$ | |
| 1595 | $CH_3O$ | F | F | 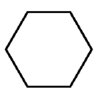 | $CH_2O$ | 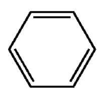 | — | F | H | $OC_5H_{11}$ | |
| 1596 | $C_2H_5O$ | F | F | 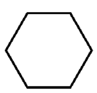 | $CH_2O$ | 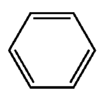 | — | F | H | $OCH_3$ | |
| 1597 | $C_2H_5O$ | F | F | 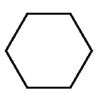 | $CH_2O$ | 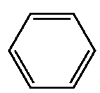 | — | F | H | $OC_2H_5$ | |
| 1598 | $C_2H_5O$ | F | F | 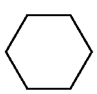 | $CH_2O$ | 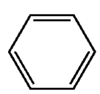 | — | F | H | $OC_3H_7$ | |
| 1599 | $C_2H_5O$ | F | F | 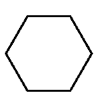 | $CH_2O$ | 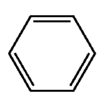 | — | F | H | $OC_4H_9$ | |
| 1600 | $C_2H_5O$ | F | F | 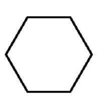 | $CH_2O$ | 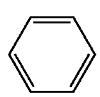 | — | F | H | $OC_5H_{11}$ | |
| 1601 | $C_3H_7O$ | F | F | 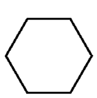 | $CH_2O$ | 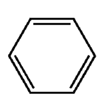 | — | F | H | $OCH_3$ | |
| 1602 | $C_3H_7O$ | F | F | 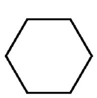 | $CH_2O$ | 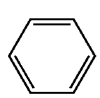 | — | F | H | $OC_2H_5$ | |
| 1603 | $C_3H_7O$ | F | F | 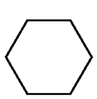 | $CH_2O$ | 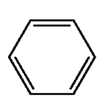 | — | F | H | $OC_3H_7$ | |

TABLE 107-continued

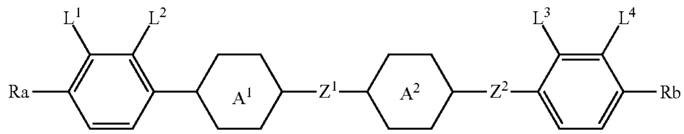

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1604 | $C_3H_7O$ | F | F | 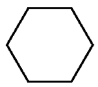 | $CH_2O$ | 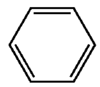 | — | F | H | $OC_4H_9$ | |
| 1605 | $C_3H_7O$ | F | F | 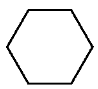 | $CH_2O$ | 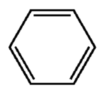 | — | F | H | $OC_5H_{11}$ | |

TABLE 108

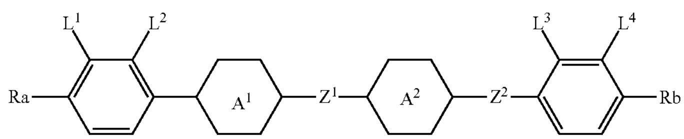

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1606 | $C_4H_9O$ | F | F | 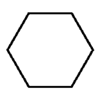 | $CH_2O$ | 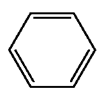 | — | F | H | $OCH_3$ | |
| 1607 | $C_4H_9O$ | F | F | 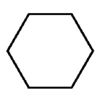 | $CH_2O$ | 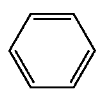 | — | F | H | $OC_2H_5$ | |
| 1608 | $C_4H_9O$ | F | F | 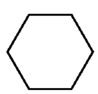 | $CH_2O$ | 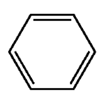 | — | F | H | $OC_3H_7$ | |
| 1609 | $C_4H_9O$ | F | F | 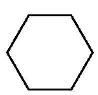 | $CH_2O$ | 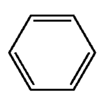 | — | F | H | $OC_4H_9$ | |
| 1610 | $C_4H_9O$ | F | F | 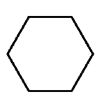 | $CH_2O$ | 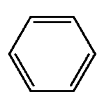 | — | F | H | $OC_5H_{11}$ | |
| 1611 | $C_5H_{11}O$ | F | F | 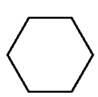 | $CH_2O$ | 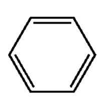 | — | F | H | $OCH_3$ | |
| 1612 | $C_5H_{11}O$ | F | F | 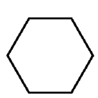 | $CH_2O$ | 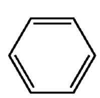 | — | F | H | $OC_2H_5$ | |
| 1613 | $C_5H_{11}O$ | F | F | 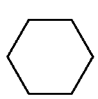 | $CH_2O$ | 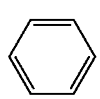 | — | F | H | $OC_3H_7$ | |
| 1614 | $C_5H_{11}O$ | F | F | 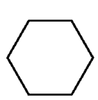 | $CH_2O$ | 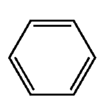 | — | F | H | $OC_4H_9$ | |

TABLE 108-continued

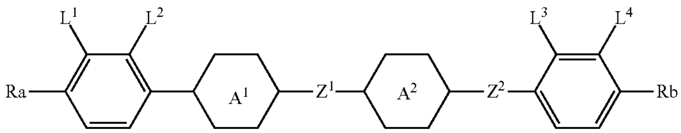

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1615 | $C_5H_{11}O$ | F | F | 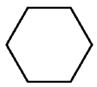 | $CH_2O$ | 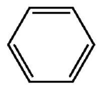 | — | F | H | $OC_5H_{11}$ | |
| 1616 | $C_2H_5$ | F | F | 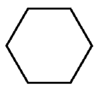 | $CH_2O$ | 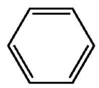 | — | F | H | $C_4H_9$ | |
| 1617 | $C_5H_{11}$ | F | F | 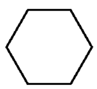 | $CH_2O$ |  | — | F | H | $C_2H_5$ | |
| 1618 | $C_2H_5$ | F | F | 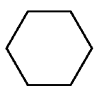 | $CH_2O$ | 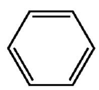 | — | F | H | $OC_4H_9$ | |
| 1619 | $CH_2{=}CH$ | F | F | 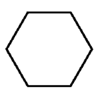 | $CH_2O$ | 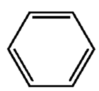 | — | F | H | $OC_3H_7$ | |
| 1620 | $CH_2{=}CH$ | F | F | 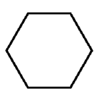 | $CH_2O$ | 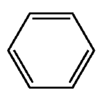 | — | F | H | $OC_5H_{11}$ | |

TABLE 109

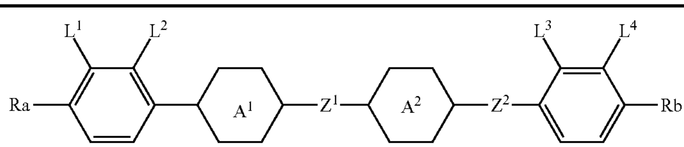

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1621 | $CH_2{=}CHO$ | F | F | 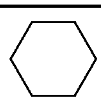 | $CH_2O$ | 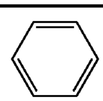 | — | F | H | $OC_3H_7$ | |
| 1622 | $CH_2{=}CHCH_2O$ | F | F | 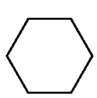 | $CH_2O$ | 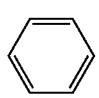 | — | F | H | $OC_5H_{11}$ | |
| 1623 | $CH_2{=}CHCH_2O$ | F | F | 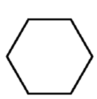 | $CH_2O$ | 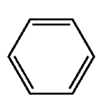 | — | F | H | $OC_3H_7$ | |
| 1624 | $CH_2{=}CHC_2H_5O$ | F | F | 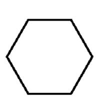 | $CH_2O$ | 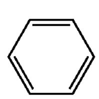 | — | F | H | $OC_5H_{11}$ | |
| 1625 | $CH_2{=}CHC_2H_5O$ | F | F | 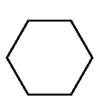 | $CH_2O$ | 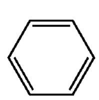 | — | F | H | $OC_2H_5$ | |

TABLE 109-continued
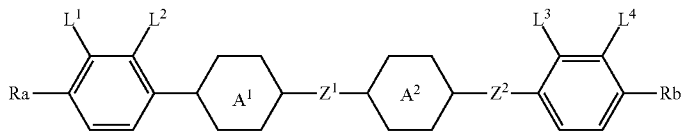
| No. | Ra | L1 | L2 | A1 | Z1 | A2 | Z2 | L3 | L4 | Rb | Physical property values |
|---|---|---|---|---|---|---|---|---|---|---|---|
| 1626 | $CH_2{=}CHC_2H_5O$ | F | F | 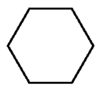 | $CH_2O$ | 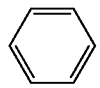 | — | F | H | $OC_3H_7$ | |
| 1627 | $CH_3CH{=}CHCH_2O$ | F | F | 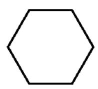 | $CH_2O$ | 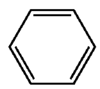 | — | F | H | $OCH_3$ | |
| 1628 | $CH_3CH{=}CHCH_2O$ | F | F | 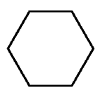 | $CH_2O$ | 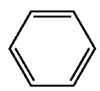 | — | F | H | $OC_2H_5$ | |
| 1629 | $C_3H_7O$ | F | F | 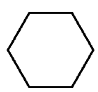 | $CH_2O$ | 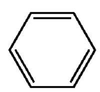 | — | F | H | $OCH{=}CH_2$ | |
| 1630 | $C_3H_7O$ | F | F | 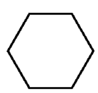 | $CH_2O$ | 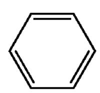 | — | F | H | $OCH_2CH{=}CH_2$ | |
| 1631 | $C_4H_9O$ | F | F | 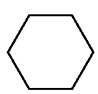 | $CH_2O$ | 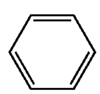 | — | F | H | $OCH_2CH{=}CH_2$ | |
| 1632 | $C_5H_{11}O$ | F | F | 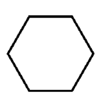 | $CH_2O$ | 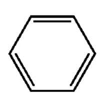 | — | F | H | $OCH_2CH{=}CH_2$ | |
| 1633 | $CH_3O$ | F | F | 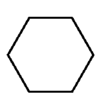 | $CH_2O$ | 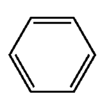 | — | F | H | $OC_2H_5CH{=}CH_2$ | |
| 1634 | $C_2H_5O$ | F | F | 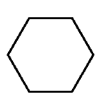 | $CH_2O$ | 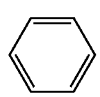 | — | F | H | $OC_2H_5CH{=}CH_2$ | |
| 1635 | $C_3H_7O$ | F | F | 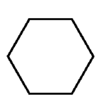 | $CH_2O$ | 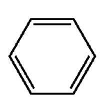 | — | F | H | $OC_2H_5CH{=}CH_2$ | |

TABLE 110

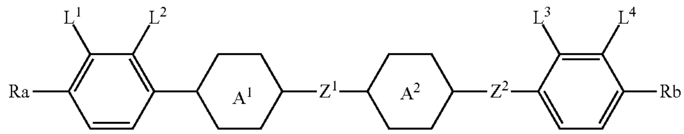

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1636 | $CH_3O$ | F | F | 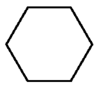 | $CH_2O$ | 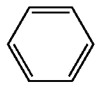 | — | F | H | $OCH_2CH{=}CHCH_3$ | |
| 1637 | $C_2H_5O$ | F | F | 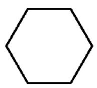 | $CH_2O$ | 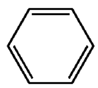 | — | F | H | $OCH_2CH{=}CHCH_3$ | |
| 1638 | $C_3H_7O$ | F | F | 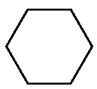 | $CH_2O$ | 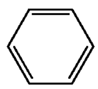 | — | F | H | $OCH_2CH{=}CHCH_3$ | |
| 1639 | $CH_2{=}CHCH_2O$ | F | F | 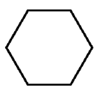 | $CH_2O$ | 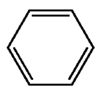 | — | F | H | $OCH{=}CH_2$ | |
| 1640 | $CH_2{=}CHC_2H_5O$ | F | F | 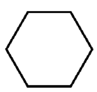 | $CH_2O$ | 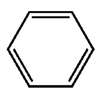 | — | F | H | $OCH_2CH{=}CH_2$ | |
| 1641 | $C_3H_7OCH_2$ | F | F | 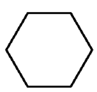 | $CH_2O$ | 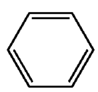 | — | F | H | $OC_3H_7$ | |
| 1642 | $C_5H_{11}O$ | F | F | 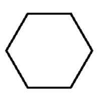 | $CH_2O$ | 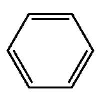 | — | F | H | $OC_2H_5CH{=}CH_2$ | |
| 1643 | $C_3H_7O$ | F | F | 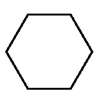 | $CH_2O$ | 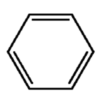 | — | F | H | H | |
| 1644 | $C_5H_{11}O$ | F | F | 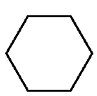 | $CH_2O$ | 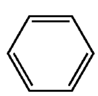 | — | F | H | $OC_9H_{19}$ | |
| 1645 | $C_3H_7O$ | F | F | 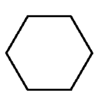 | $CH_2O$ | 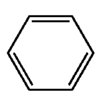 | — | F | H | $C_2H_5$ | |
| 1646 | $C_5H_{11}O$ | F | F | 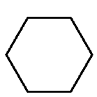 | $CH_2O$ | 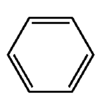 | — | F | H | $C_3H_7$ | |
| 1647 | H | F | F | 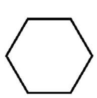 | $CH_2O$ | 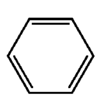 | — | F | H | $OC_4H_9$ | |
| 1648 | $C_7H_{15}O$ | F | F | 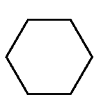 | $CH_2O$ | 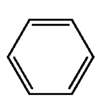 | — | F | H | $OC_4H_9$ | |

TABLE 110-continued

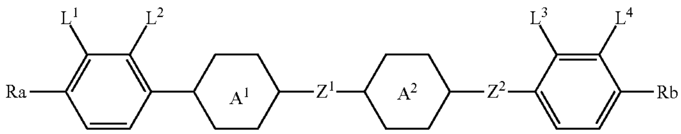

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1649 | $C_2H_5O$ | F | F | 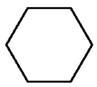 | $CH_2O$ | 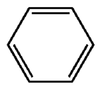 | — | F | H | $OC_6H_{13}$ | |
| 1650 | $CH_3O$ | F | F | 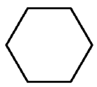 | $CH_2O$ | 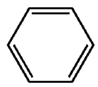 | — | F | H | $C_2H_5$ | |

TABLE 111

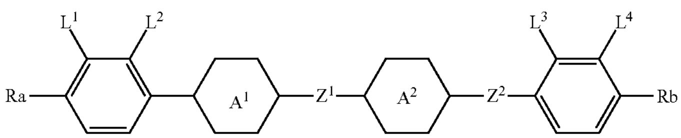

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1651 | $CH_3O$ | F | F | 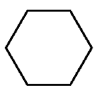 | $CH_2O$ | 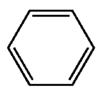 | — | H | F | $OCH_3$ | |
| 1652 | $CH_3O$ | F | F | 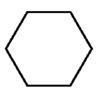 | $CH_2O$ | 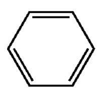 | — | H | F | $OC_2H_5$ | |
| 1653 | $CH_3O$ | F | F | 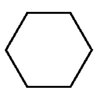 | $CH_2O$ | 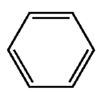 | — | H | F | $OC_3H_7$ | |
| 1654 | $CH_3O$ | F | F | 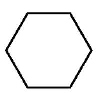 | $CH_2O$ | 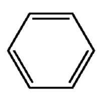 | — | H | F | $OC_4H_9$ | |
| 1655 | $CH_3O$ | F | F | 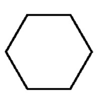 | $CH_2O$ | 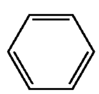 | — | H | F | $OC_5H_{11}$ | |
| 1656 | $C_2H_5O$ | F | F | 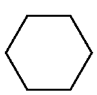 | $CH_2O$ | 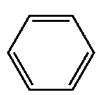 | — | H | F | $OCH_3$ | |
| 1657 | $C_2H_5O$ | F | F | 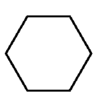 | $CH_2O$ | 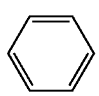 | — | H | F | $OC_2H_5$ | |
| 1658 | $C_2H_5O$ | F | F | 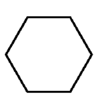 | $CH_2O$ | 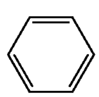 | — | H | F | $OC_3H_7$ | |
| 1659 | $C_2H_5O$ | F | F | 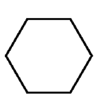 | $CH_2O$ | 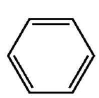 | — | H | F | $OC_4H_9$ | |

TABLE 111-continued

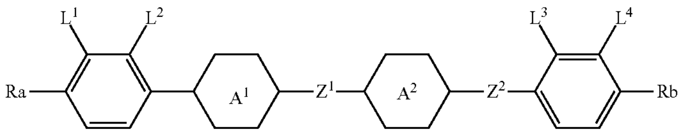

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1660 | $C_2H_5O$ | F | F | 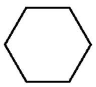 | $CH_2O$ | 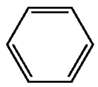 | — | H | F | $OC_5H_{11}$ | |
| 1661 | $C_3H_7O$ | F | F | 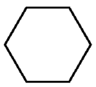 | $CH_2O$ | 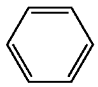 | — | H | F | $OCH_3$ | |
| 1662 | $C_3H_7O$ | F | F | 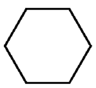 | $CH_2O$ | 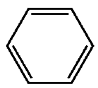 | — | H | F | $OC_2H_5$ | |
| 1663 | $C_3H_7O$ | F | F | 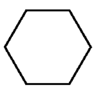 | $CH_2O$ | 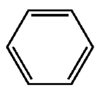 | — | H | F | $OC_3H_7$ | |
| 1664 | $C_3H_7O$ | F | F | 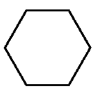 | $CH_2O$ |  | — | H | F | $OC_4H_9$ | |
| 1665 | $C_3H_7O$ | F | F | 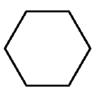 | $CH_2O$ |  | — | H | F | $OC_5H_{11}$ | |

TABLE 112

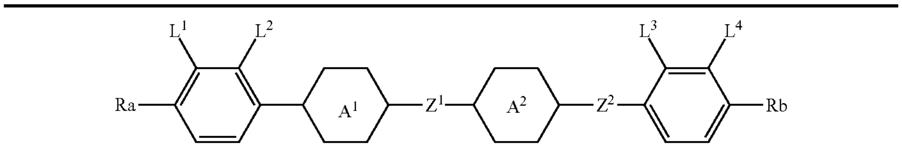

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1666 | $C_4H_9O$ | F | F | 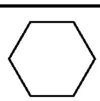 | $CH_2O$ | 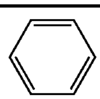 | — | H | F | $OCH_3$ | |
| 1667 | $C_4H_9O$ | F | F | 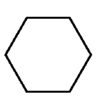 | $CH_2O$ | 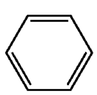 | — | H | F | $OC_2H_5$ | |
| 1668 | $C_4H_9O$ | F | F | 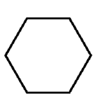 | $CH_2O$ | 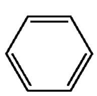 | — | H | F | $OC_3H_7$ | |
| 1669 | $C_4H_9O$ | F | F | 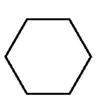 | $CH_2O$ | 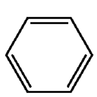 | — | H | F | $OC_4H_9$ | |
| 1670 | $C_4H_9O$ | F | F | 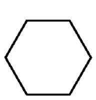 | $CH_2O$ | 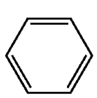 | — | H | F | $OC_5H_{11}$ | |

TABLE 112-continued

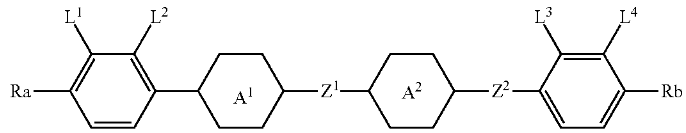

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1671 | $C_5H_{11}O$ | F | F | 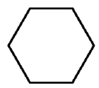 | $CH_2O$ | 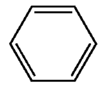 | — | H | F | $OCH_3$ | |
| 1672 | $C_5H_{11}O$ | F | F | 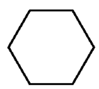 | $CH_2O$ | 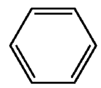 | — | H | F | $OC_2H_5$ | |
| 1673 | $C_5H_{11}O$ | F | F | 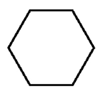 | $CH_2O$ | 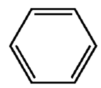 | — | H | F | $OC_3H_7$ | |
| 1674 | $C_5H_{11}O$ | F | F | 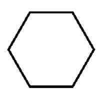 | $CH_2O$ | 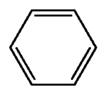 | — | H | F | $OC_4H_9$ | |
| 1675 | $C_5H_{11}O$ | F | F | 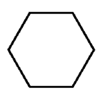 | $CH_2O$ | 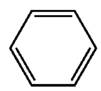 | — | H | F | $OC_5H_{11}$ | |
| 1676 | $C_2H_5$ | F | F | 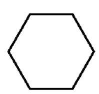 | $CH_2O$ | 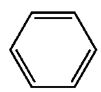 | — | H | F | $C_4H_9$ | |
| 1677 | $C_5H_{11}$ | F | F | 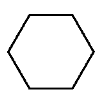 | $CH_2O$ | 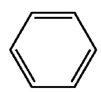 | — | H | F | $C_2H_5$ | |
| 1678 | $C_2H_5$ | F | F | 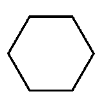 | $CH_2O$ | 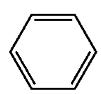 | — | H | F | $OC_4H_9$ | |
| 1679 | $CH_2{=}CH$ | F | F | 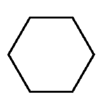 | $CH_2O$ | 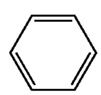 | — | H | F | $OC_3H_7$ | |
| 1680 | $CH_2{=}CH$ | F | F | 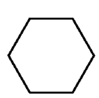 | $CH_2O$ | 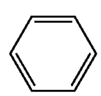 | — | H | F | $OC_5H_{11}$ | |

TABLE 113

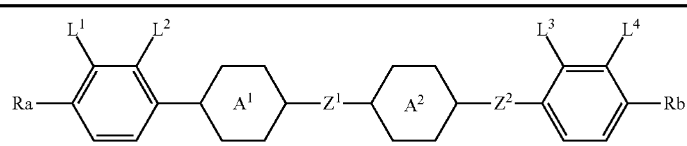

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1681 | $CH_2{=}CHO$ | F | F | 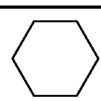 | $CH_2O$ | 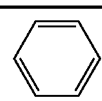 | — | H | F | $OC_3H_7$ | |

TABLE 113-continued

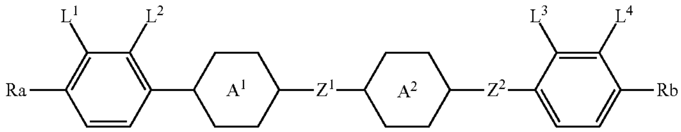

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1682 | $CH_2{=}CHCH_2O$ | F | F | 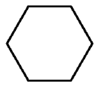 | $CH_2O$ | 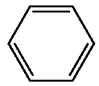 | — | H | F | $OC_5H_{11}$ | |
| 1683 | $CH_2{=}CHCH_2O$ | F | F | 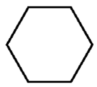 | $CH_2O$ | 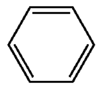 | — | H | F | $OC_3H_7$ | |
| 1684 | $CH_2{=}CHC_2H_5O$ | F | F | 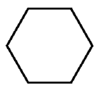 | $CH_2O$ | 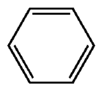 | — | H | F | $OC_5H_{11}$ | |
| 1685 | $CH_2{=}CHC_2H_5O$ | F | F | 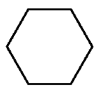 | $CH_2O$ | 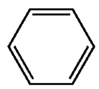 | — | H | F | $OC_2H_5$ | |
| 1686 | $CH_2{=}CHC_2H_5O$ | F | F | 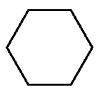 | $CH_2O$ |  | — | H | F | $OC_3H_7$ | |
| 1687 | $CH_3CH{=}CHCH_2O$ | F | F | 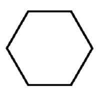 | $CH_2O$ | 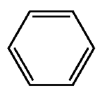 | — | H | F | $OCH_3$ | |
| 1688 | $CH_3CH{=}CHCH_2O$ | F | F | 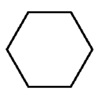 | $CH_2O$ | 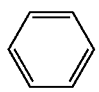 | — | H | F | $OC_2H_5$ | |
| 1689 | $C_3H_7O$ | F | F | 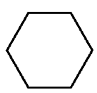 | $CH_2O$ | 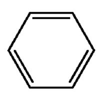 | — | H | F | $OCH{=}CH_2$ | |
| 1690 | $C_3H_7O$ | F | F | 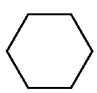 | $CH_2O$ | 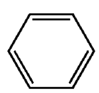 | — | H | F | $OCH_2CH{=}CH_2$ | |
| 1691 | $C_4H_9O$ | F | F | 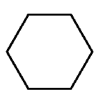 | $CH_2O$ | 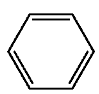 | — | H | F | $OCH_2CH{=}CH_2$ | |
| 1692 | $C_5H_{11}O$ | F | F | 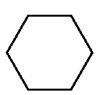 | $CH_2O$ | 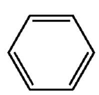 | — | H | F | $OCH_2CH{=}CH_2$ | |
| 1693 | $CH_3O$ | F | F | 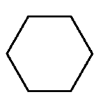 | $CH_2O$ | 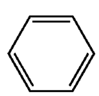 | — | H | F | $OC_2H_5CH{=}CH_2$ | |
| 1694 | $C_2H_5O$ | F | F | 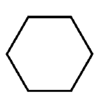 | $CH_2O$ | 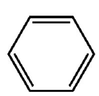 | — | H | F | $OC_2H_5CH{=}CH_2$ | |
| 1695 | $C_3H_7O$ | F | F | 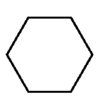 | $CH_2O$ | 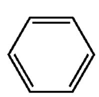 | — | H | F | $OC_2H_5CH{=}CH_2$ | |

TABLE 114

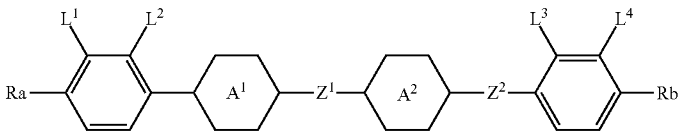

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1696 | $CH_3O$ | F | F | 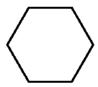 | $CH_2O$ | 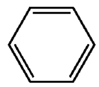 | — | H | F | $OCH_2CH{=}CHCH_3$ | |
| 1697 | $C_2H_5O$ | F | F | 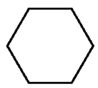 | $CH_2O$ | 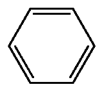 | — | H | F | $OCH_2CH{=}CHCH_3$ | |
| 1698 | $C_3H_7O$ | F | F | 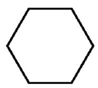 | $CH_2O$ | 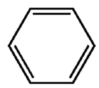 | — | H | F | $OCH_2CH{=}CHCH_3$ | |
| 1699 | $CH_2{=}CHCH_2O$ | F | F | 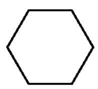 | $CH_2O$ | 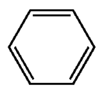 | — | H | F | $OCH{=}CH_2$ | |
| 1700 | $CH_2{=}CHC_2H_5O$ | F | F | 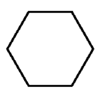 | $CH_2O$ | 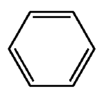 | — | H | F | $OCH_2CH{=}CH_2$ | |
| 1701 | $C_3H_7OCH_2$ | F | F | 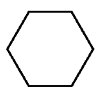 | $CH_2O$ |  | — | H | F | $OC_3H_7$ | |
| 1702 | $C_5H_{11}O$ | F | F | 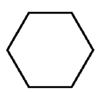 | $CH_2O$ | 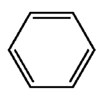 | — | H | F | $OC_2H_5CH{=}CH_2$ | |
| 1703 | $C_3H_7O$ | F | F | 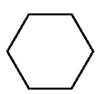 | $CH_2O$ | 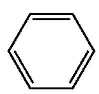 | — | H | F | H | |
| 1704 | $C_5H_{11}O$ | F | F | 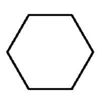 | $CH_2O$ | 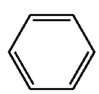 | — | H | F | $OC_9H_{19}$ | |
| 1705 | $C_3H_7O$ | F | F | 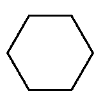 | $CH_2O$ | 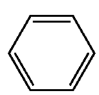 | — | H | F | $C_2H_5$ | |
| 1706 | $C_5H_{11}O$ | F | F | 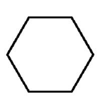 | $CH_2O$ | 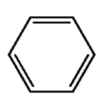 | — | H | F | $C_3H_7$ | |
| 1707 | H | F | F | 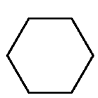 | $CH_2O$ | 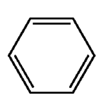 | — | H | F | $OC_4H_9$ | |
| 1708 | $C_7H_{15}O$ | F | F | 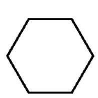 | $CH_2O$ | 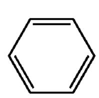 | — | H | F | $OC_4H_9$ | |

TABLE 114-continued

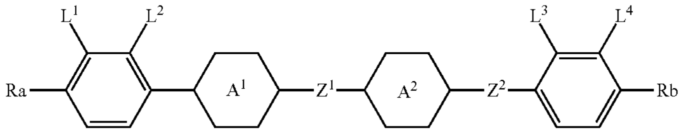

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1709 | $C_2H_5O$ | F | F | 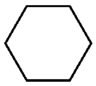 | $CH_2O$ |  | — | H | F | $OC_6H_{13}$ | |
| 1710 | $CH_3O$ | F | F | 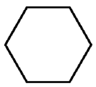 | $CH_2O$ | 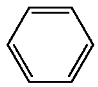 | — | H | F | $C_2H_5$ | |

TABLE 115

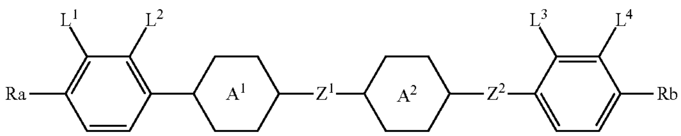

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1711 | $CH_3O$ | F | F | 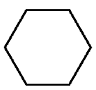 | $CH_2O$ | 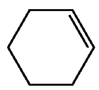 | — | F | F | $OCH_3$ | |
| 1712 | $CH_3O$ | F | F | 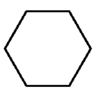 | $CH_2O$ | 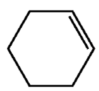 | — | F | F | $OC_2H_5$ | |
| 1713 | $CH_3O$ | F | F | 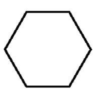 | $CH_2O$ | 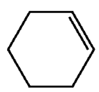 | — | F | F | $OC_3H_7$ | |
| 1714 | $CH_3O$ | F | F | 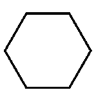 | $CH_2O$ | 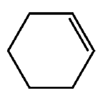 | — | F | F | $OC_4H_9$ | |
| 1715 | $CH_3O$ | F | F | 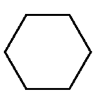 | $CH_2O$ | 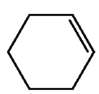 | — | F | F | $OC_5H_{11}$ | |
| 1716 | $C_2H_5O$ | F | F | 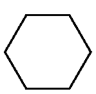 | $CH_2O$ | 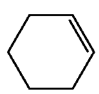 | — | F | F | $OCH_3$ | |
| 1717 | $C_2H_5O$ | F | F | 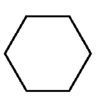 | $CH_2O$ | 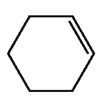 | — | F | F | $OC_2H_5$ | |
| 1718 | $C_2H_5O$ | F | F | 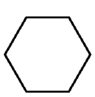 | $CH_2O$ | 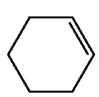 | — | F | F | $OC_3H_7$ | |
| 1719 | $C_2H_5O$ | F | F | 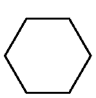 | $CH_2O$ | 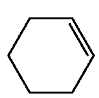 | — | F | F | $OC_4H_9$ | |
| 1720 | $C_2H_5O$ | F | F | 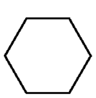 | $CH_2O$ | 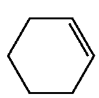 | — | F | F | $OC_5H_{11}$ | |

TABLE 115-continued

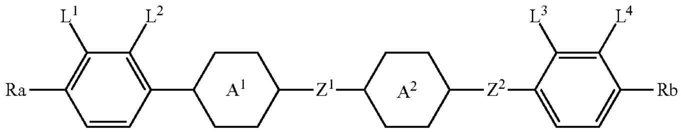

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1721 | $C_3H_7O$ | F | F | 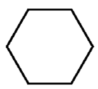 | $CH_2O$ | 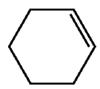 | — | F | F | $OCH_3$ | |
| 1722 | $C_3H_7O$ | F | F | 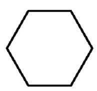 | $CH_2O$ | 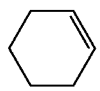 | — | F | F | $OC_2H_5$ | |
| 1723 | $C_3H_7O$ | F | F | 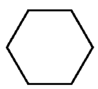 | $CH_2O$ | 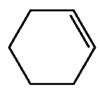 | — | F | F | $OC_3H_7$ | |
| 1724 | $C_3H_7O$ | F | F | 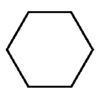 | $CH_2O$ | 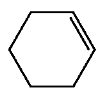 | — | F | F | $OC_4H_9$ | |
| 1725 | $C_3H_7O$ | F | F | 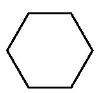 | $CH_2O$ | 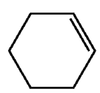 | — | F | F | $OC_5H_{11}$ | |

TABLE 116

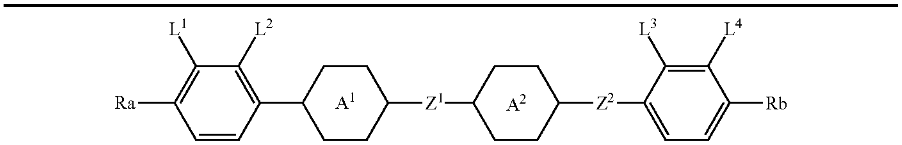

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1726 | $C_4H_9O$ | F | F | 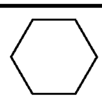 | $CH_2O$ | 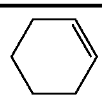 | — | F | F | $OCH_3$ | |
| 1727 | $C_4H_9O$ | F | F | 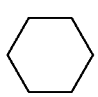 | $CH_2O$ | 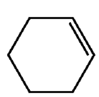 | — | F | F | $OC_2H_5$ | |
| 1728 | $C_4H_9O$ | F | F | 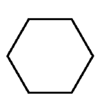 | $CH_2O$ | 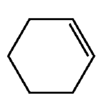 | — | F | F | $OC_3H_7$ | |
| 1729 | $C_4H_9O$ | F | F | 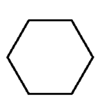 | $CH_2O$ | 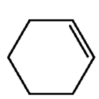 | — | F | F | $OC_4H_9$ | |
| 1730 | $C_4H_9O$ | F | F | 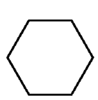 | $CH_2O$ | 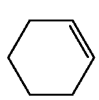 | — | F | F | $OC_5H_{11}$ | |
| 1731 | $C_5H_{11}O$ | F | F | 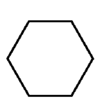 | $CH_2O$ | 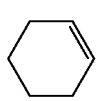 | — | F | F | $OCH_3$ | |

TABLE 116-continued

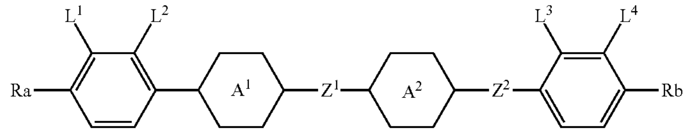

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1732 | $C_5H_{11}O$ | F | F | 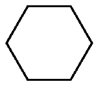 | $CH_2O$ | 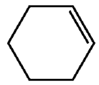 | — | F | F | $OC_2H_5$ | |
| 1733 | $C_5H_{11}O$ | F | F | 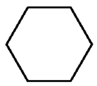 | $CH_2O$ | 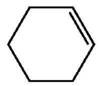 | — | F | F | $OC_3H_7$ | |
| 1734 | $C_5H_{11}O$ | F | F | 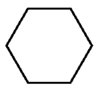 | $CH_2O$ | 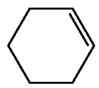 | — | F | F | $OC_4H_9$ | |
| 1735 | $C_5H_{11}O$ | F | F | 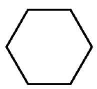 | $CH_2O$ | 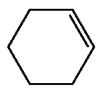 | — | F | F | $OC_5H_{11}$ | |
| 1736 | $C_2H_5$ | F | F | 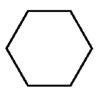 | $CH_2O$ | 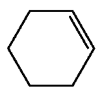 | — | F | F | $C_4H_9$ | |
| 1737 | $C_5H_{11}$ | F | F | 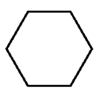 | $CH_2O$ | 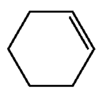 | — | F | F | $C_2H_5$ | |
| 1738 | $C_2H_5$ | F | F | 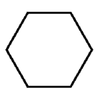 | $CH_2O$ | 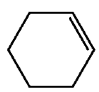 | — | F | F | $OC_4H_9$ | |
| 1739 | $CH_2{=}CH$ | F | F | 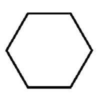 | $CH_2O$ | 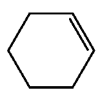 | — | F | F | $OC_3H_7$ | |
| 1740 | $CH_2{=}CH$ | F | F | 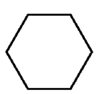 | $CH_2O$ | 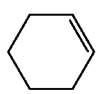 | — | F | F | $OC_5H_{11}$ | |

TABLE 117

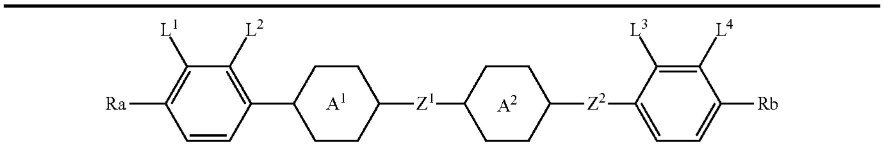

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1741 | $CH_3O$ | F | F | 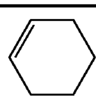 | $CH_2O$ | 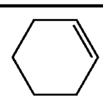 | — | F | F | $OCH_3$ | |
| 1742 | $CH_3O$ | F | F | 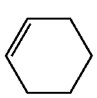 | $CH_2O$ | 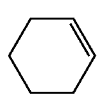 | — | F | F | $OC_2H_5$ | |
| 1743 | $CH_3O$ | F | F | 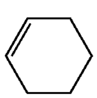 | $CH_2O$ | 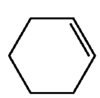 | — | F | F | $OC_3H_7$ | |

TABLE 117-continued

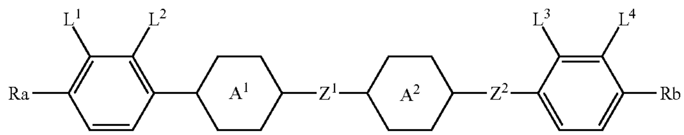

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1744 | $CH_3O$ | F | F | 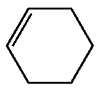 | $CH_2O$ | 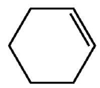 | — | F | F | $OC_4H_9$ | |
| 1745 | $CH_3O$ | F | F | 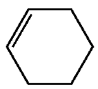 | $CH_2O$ | 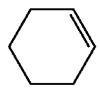 | — | F | F | $OC_5H_{11}$ | |
| 1746 | $C_2H_5O$ | F | F | 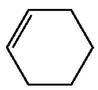 | $CH_2O$ | 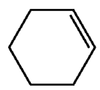 | — | F | F | $OCH_3$ | |
| 1747 | $C_2H_5O$ | F | F | 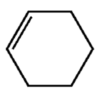 | $CH_2O$ | 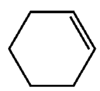 | — | F | F | $OC_2H_5$ | |
| 1748 | $C_2H_5O$ | F | F | 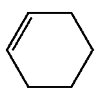 | $CH_2O$ | 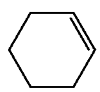 | — | F | F | $OC_3H_7$ | |
| 1749 | $C_2H_5O$ | F | F | 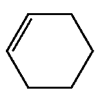 | $CH_2O$ | 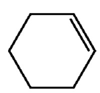 | — | F | F | $OC_4H_9$ | |
| 1750 | $C_2H_5O$ | F | F | 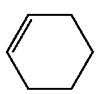 | $CH_2O$ | 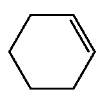 | — | F | F | $OC_5H_{11}$ | |
| 1751 | $C_3H_7O$ | F | F | 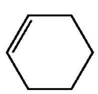 | $CH_2O$ | 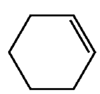 | — | F | F | $OCH_3$ | |
| 1752 | $C_3H_7O$ | F | F | 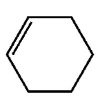 | $CH_2O$ | 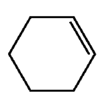 | — | F | F | $OC_2H_5$ | |
| 1753 | $C_3H_7O$ | F | F | 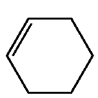 | $CH_2O$ | 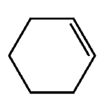 | — | F | F | $OC_3H_7$ | |
| 1754 | $C_3H_7O$ | F | F | 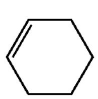 | $CH_2O$ | 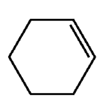 | — | F | F | $OC_4H_9$ | |
| 1755 | $C_3H_7O$ | F | F | 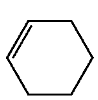 | $CH_2O$ | 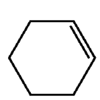 | — | F | F | $OC_5H_{11}$ | |

TABLE 118

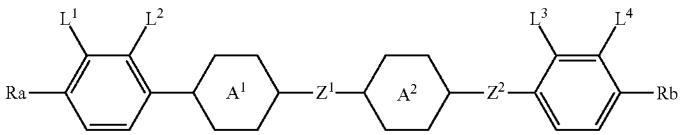

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1756 | $C_4H_9O$ | F | F | 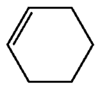 | $CH_2O$ | 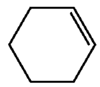 | — | F | F | $OCH_3$ | |
| 1757 | $C_4H_9O$ | F | F | 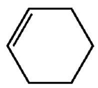 | $CH_2O$ | 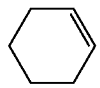 | — | F | F | $OC_2H_5$ | |
| 1758 | $C_4H_9O$ | F | F | 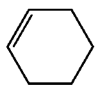 | $CH_2O$ | 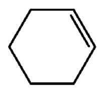 | — | F | F | $OC_3H_7$ | |
| 1759 | $C_4H_9O$ | F | F | 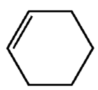 | $CH_2O$ | 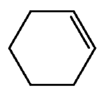 | — | F | F | $OC_4H_9$ | |
| 1760 | $C_4H_9O$ | F | F | 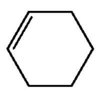 | $CH_2O$ | 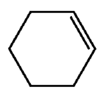 | — | F | F | $OC_5H_{11}$ | |
| 1761 | $C_5H_{11}O$ | F | F | 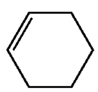 | $CH_2O$ | 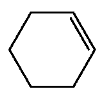 | — | F | F | $OCH_3$ | |
| 1762 | $C_5H_{11}O$ | F | F | 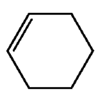 | $CH_2O$ | 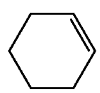 | — | F | F | $OC_2H_5$ | |
| 1763 | $C_5H_{11}O$ | F | F | 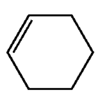 | $CH_2O$ | 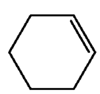 | — | F | F | $OC_3H_7$ | |
| 1764 | $C_5H_{11}O$ | F | F | 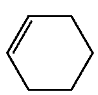 | $CH_2O$ | 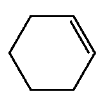 | — | F | F | $OC_4H_9$ | |
| 1765 | $C_5H_{11}O$ | F | F | 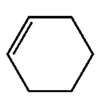 | $CH_2O$ | 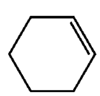 | — | F | F | $OC_5H_{11}$ | |
| 1766 | $C_2H_5$ | F | F | 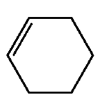 | $CH_2O$ | 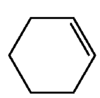 | — | F | F | $C_4H_9$ | |
| 1767 | $C_5H_{11}$ | F | F | 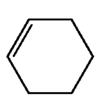 | $CH_2O$ | 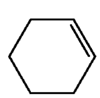 | — | F | F | $C_2H_5$ | |
| 1768 | $C_2H_5$ | F | F | 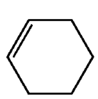 | $CH_2O$ | 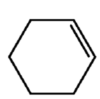 | — | F | F | $OC_4H_9$ | |

TABLE 118-continued

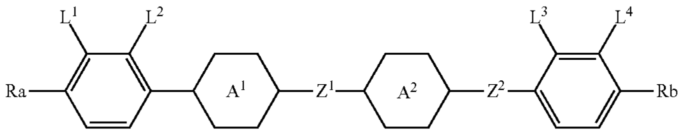

| No. | Ra | L1 | L2 | A1 | Z1 | A2 | Z2 | L3 | L4 | Rb | Physical property values |
|---|---|---|---|---|---|---|---|---|---|---|---|
| 1769 | $CH_2$═CH | F | F | 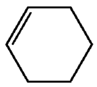 | $CH_2O$ | 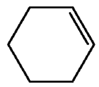 | — | F | F | $OC_3H_7$ | |
| 1770 | $CH_2$═CH | F | F | 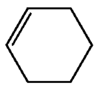 | $CH_2O$ | 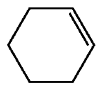 | — | F | F | $OC_5H_{11}$ | |

TABLE 119

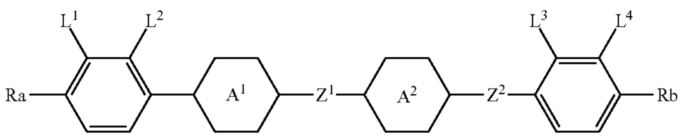

| No. | Ra | L1 | L2 | A1 | Z1 | A2 | Z2 | L3 | L4 | Rb | Physical property values |
|---|---|---|---|---|---|---|---|---|---|---|---|
| 1771 | $CH_3O$ | F | F | 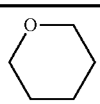 | $CH_2O$ | 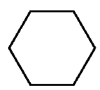 | — | F | F | $OCH_3$ | |
| 1772 | $CH_3O$ | F | F | 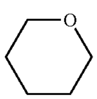 | $CH_2O$ | 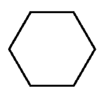 | — | F | F | $OC_2H_5$ | |
| 1773 | $CH_3O$ | F | F | 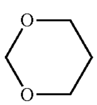 | $CH_2O$ | 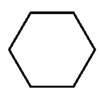 | — | F | F | $OC_3H_7$ | |
| 1774 | $CH_3O$ | F | F | 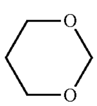 | $CH_2O$ | 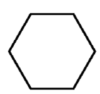 | — | F | F | $OC_4H_9$ | |
| 1775 | $CH_3O$ | F | F | 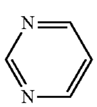 | $CH_2O$ | 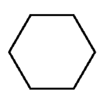 | — | F | F | $OC_5H_{11}$ | |
| 1776 | $C_2H_5O$ | F | F | 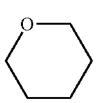 | $CH_2O$ | 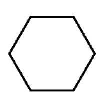 | — | F | F | $OCH_3$ | |
| 1777 | $C_2H_5O$ | F | F | 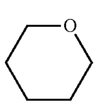 | $CH_2O$ | 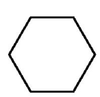 | — | F | F | $OC_2H_5$ | |
| 1778 | $C_2H_5O$ | F | F | 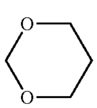 | $CH_2O$ | 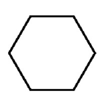 | — | F | F | $OC_3H_7$ | |
| 1779 | $C_2H_5O$ | F | F | 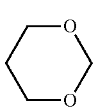 | $CH_2O$ | 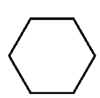 | — | F | F | $OC_4H_9$ | |

TABLE 119-continued

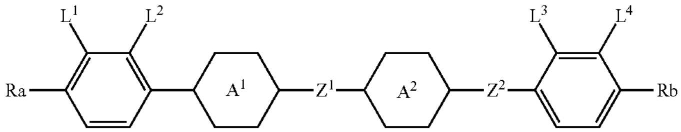

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1780 | $C_2H_5O$ | F | F | 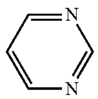 | $CH_2O$ | 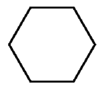 | — | F | F | $OC_5H_{11}$ | |
| 1781 | $C_3H_7O$ | F | F | 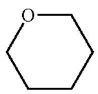 | $CH_2O$ | 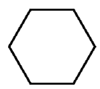 | — | F | F | $OCH_3$ | |
| 1782 | $C_3H_7O$ | F | F | 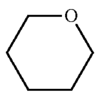 | $CH_2O$ | 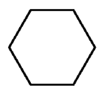 | — | F | F | $OC_2H_5$ | |
| 1783 | $C_3H_7O$ | F | F | 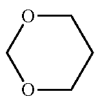 | $CH_2O$ | 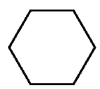 | — | F | F | $OC_3H_7$ | |
| 1784 | $C_3H_7O$ | F | F | 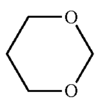 | $CH_2O$ | 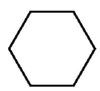 | — | F | F | $OC_4H_9$ | |
| 1785 | $C_3H_7O$ | F | F | 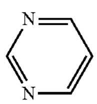 | $CH_2O$ | 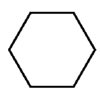 | — | F | F | $OC_5H_{11}$ | |

TABLE 120

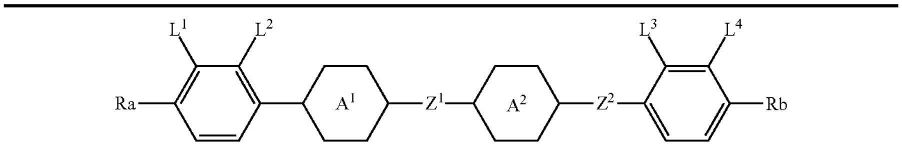

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1786 | $C_4H_9O$ | F | F | 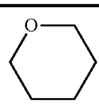 | $CH_2O$ | 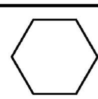 | — | F | F | $OCH_3$ | |
| 1787 | $C_4H_9O$ | F | F | 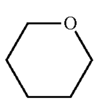 | $CH_2O$ | 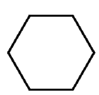 | — | F | F | $OC_2H_5$ | |
| 1788 | $C_4H_9O$ | F | F | 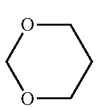 | $CH_2O$ | 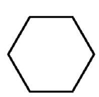 | — | F | F | $OC_3H_7$ | |
| 1789 | $C_4H_9O$ | F | F | 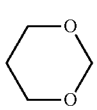 | $CH_2O$ | 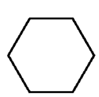 | — | F | F | $OC_4H_9$ | |
| 1790 | $C_4H_9O$ | F | F | 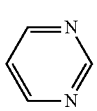 | $CH_2O$ | 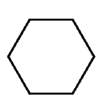 | — | F | F | $OC_5H_{11}$ | |

TABLE 120-continued

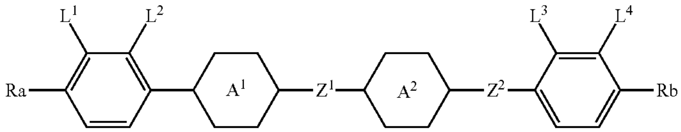

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1791 | $C_5H_{11}O$ | F | F | 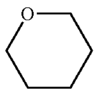 | $CH_2O$ | 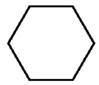 | — | F | F | $OCH_3$ | |
| 1792 | $C_5H_{11}O$ | F | F | 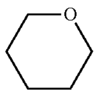 | $CH_2O$ | 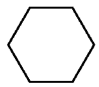 | — | F | F | $OC_2H_5$ | |
| 1793 | $C_5H_{11}O$ | F | F | 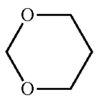 | $CH_2O$ | 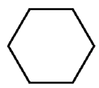 | — | F | F | $OC_3H_7$ | |
| 1794 | $C_5H_{11}O$ | F | F | 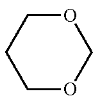 | $CH_2O$ | 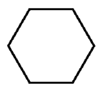 | — | F | F | $OC_4H_9$ | |
| 1795 | $C_5H_{11}O$ | F | F | 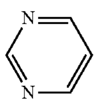 | $CH_2O$ | 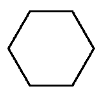 | — | F | F | $OC_5H_{11}$ | |
| 1796 | $C_2H_5$ | F | F | 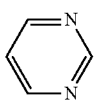 | $CH_2O$ | 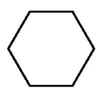 | — | F | F | $C_4H_9$ | |
| 1797 | $C_5H_{11}$ | F | F | 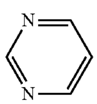 | $CH_2O$ | 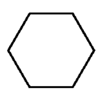 | — | F | F | $C_2H_5$ | |
| 1798 | $C_2H_5$ | F | F | 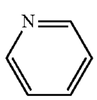 | $CH_2O$ | 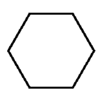 | — | F | F | $OC_4H_9$ | |
| 1799 | $CH_2{=}CH$ | F | F | 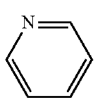 | $CH_2O$ | 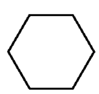 | — | F | F | $OC_3H_7$ | |
| 1800 | $CH_2{=}CH$ | F | F | 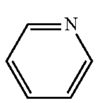 | $CH_2O$ | 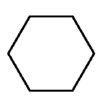 | — | F | F | $OC_5H_{11}$ | |

TABLE 121

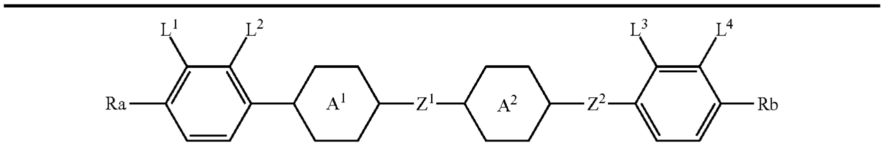

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1801 | $CH_3O$ | F | F | 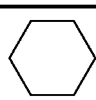 | $OCH_2$ | 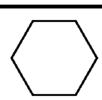 | — | F | H | $OCH_3$ | |

TABLE 121-continued

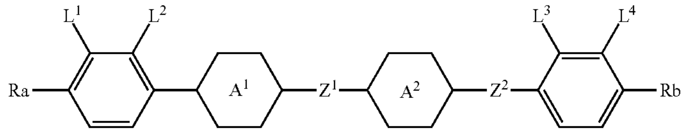

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1802 | $CH_3O$ | F | F | 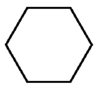 | $OCH_2$ | 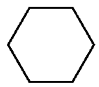 | — | F | H | $OC_2H_5$ | |
| 1803 | $CH_3O$ | F | F | 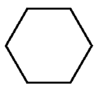 | $OCH_2$ | 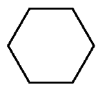 | — | F | H | $OC_3H_7$ | |
| 1804 | $CH_3O$ | F | F | 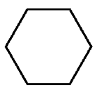 | $OCH_2$ | 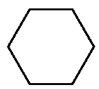 | — | F | H | $OC_4H_9$ | |
| 1805 | $CH_3O$ | F | F | 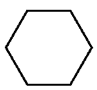 | $OCH_2$ | 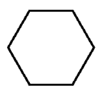 | — | F | H | $OC_5H_{11}$ | |
| 1806 | $C_2H_5O$ | F | F | 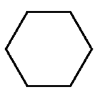 | $OCH_2$ | 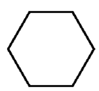 | — | F | H | $OCH_3$ | |
| 1807 | $C_2H_5O$ | F | F | 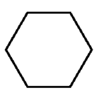 | $OCH_2$ | 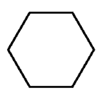 | — | F | H | $OC_2H_5$ | |
| 1808 | $C_2H_5O$ | F | F | 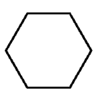 | $OCH_2$ | 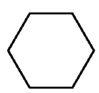 | — | F | H | $OC_3H_7$ | |
| 1809 | $C_2H_5O$ | F | F | 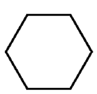 | $OCH_2$ | 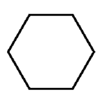 | — | F | H | $OC_4H_9$ | |
| 1810 | $C_2H_5O$ | F | F | 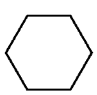 | $OCH_2$ | 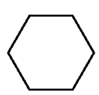 | — | F | H | $OC_5H_{11}$ | |
| 1811 | $C_3H_7O$ | F | F | 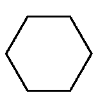 | $OCH_2$ | 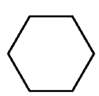 | — | F | H | $OCH_3$ | |
| 1812 | $C_3H_7O$ | F | F | 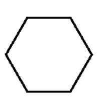 | $OCH_2$ | 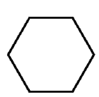 | — | F | H | $OC_2H_5$ | |
| 1813 | $C_3H_7O$ | F | F | 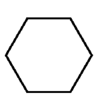 | $OCH_2$ | 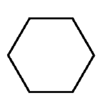 | — | F | H | $OC_3H_7$ | |
| 1814 | $C_3H_7O$ | F | F | 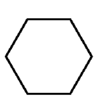 | $OCH_2$ | 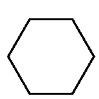 | — | F | H | $OC_4H_9$ | |
| 1815 | $C_3H_7O$ | F | F | 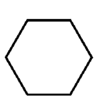 | $OCH_2$ | 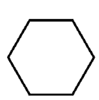 | — | F | H | $OC_5H_{11}$ | |

TABLE 122

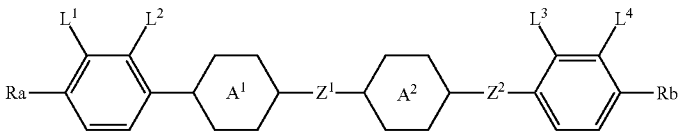

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1816 | $C_4H_9O$ | F | F | 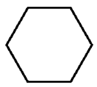 | $OCH_2$ | 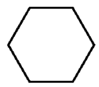 | — | F | H | $OCH_3$ | |
| 1817 | $C_4H_9O$ | F | F | 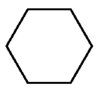 | $OCH_2$ | 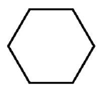 | — | F | H | $OC_2H_5$ | |
| 1818 | $C_4H_9O$ | F | F | 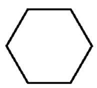 | $OCH_2$ | 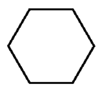 | — | F | H | $OC_3H_7$ | |
| 1819 | $C_4H_9O$ | F | F | 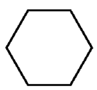 | $OCH_2$ | 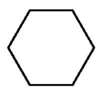 | — | F | H | $OC_4H_9$ | |
| 1820 | $C_4H_9O$ | F | F | 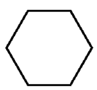 | $OCH_2$ | 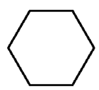 | — | F | H | $OC_5H_{11}$ | |
| 1821 | $C_5H_{11}O$ | F | F | 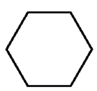 | $OCH_2$ | 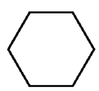 | — | F | H | $OCH_3$ | |
| 1822 | $C_5H_{11}O$ | F | F | 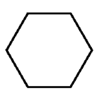 | $OCH_2$ | 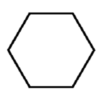 | — | F | H | $OC_2H_5$ | |
| 1823 | $C_5H_{11}O$ | F | F | 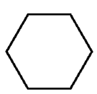 | $OCH_2$ | 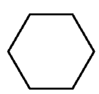 | — | F | H | $OC_3H_7$ | |
| 1824 | $C_5H_{11}O$ | F | F | 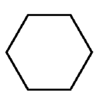 | $OCH_2$ | 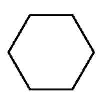 | — | F | H | $OC_4H_9$ | |
| 1825 | $C_5H_{11}O$ | F | F | 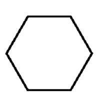 | $OCH_2$ | 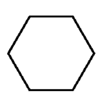 | — | F | H | $OC_5H_{11}$ | |
| 1826 | $C_2H_5$ | F | F | 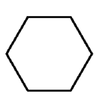 | $OCH_2$ | 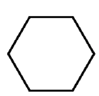 | — | F | H | $C_4H_9$ | |
| 1827 | $C_5H_{11}$ | F | F | 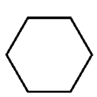 | $OCH_2$ | 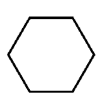 | — | F | H | $C_2H_5$ | |
| 1828 | $C_2H_5$ | F | F | 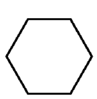 | $OCH_2$ | 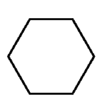 | — | F | H | $OC_4H_9$ | |

TABLE 122-continued

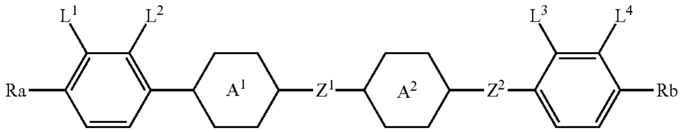

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1829 | $CH_2$═CH | F | F | 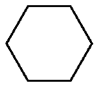 | $OCH_2$ | 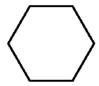 | — | F | H | $OC_3H_7$ | |
| 1830 | $CH_2$═CH | F | F | 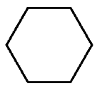 | $OCH_2$ | 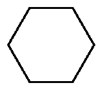 | — | F | H | $OC_5H_{11}$ | |

TABLE 123

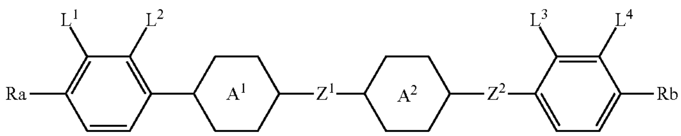

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1831 | $CH_2$═CHO | F | F | 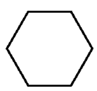 | $OCH_2$ | 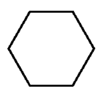 | — | F | H | $OC_3H_7$ | |
| 1832 | $CH_2$═$CHCH_2O$ | F | F | 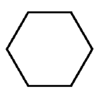 | $OCH_2$ | 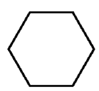 | — | F | H | $OC_5H_{11}$ | |
| 1833 | $CH_2$═$CHCH_2O$ | F | F | 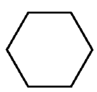 | $OCH_2$ | 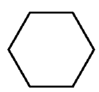 | — | F | H | $OC_3H_7$ | |
| 1834 | $CH_2$═$CHC_2H_5O$ | F | F | 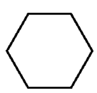 | $OCH_2$ | 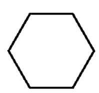 | — | F | H | $OC_5H_{11}$ | |
| 1835 | $CH_2$═$CHC_2H_5O$ | F | F | 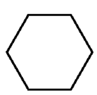 | $OCH_2$ | 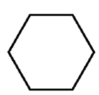 | — | F | H | $OC_2H_5$ | |
| 1836 | $CH_2$═$CHC_2H_5O$ | F | F | 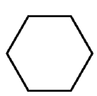 | $OCH_2$ | 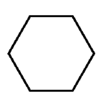 | — | F | H | $OC_3H_7$ | |
| 1837 | $CH_3CH$═$CHCH_2O$ | F | F | 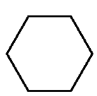 | $OCH_2$ | 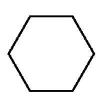 | — | F | H | $OCH_3$ | |
| 1838 | $CH_3CH$═$CHCH_2O$ | F | F | 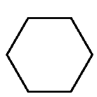 | $OCH_2$ | 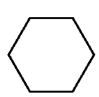 | — | F | H | $OC_2H_5$ | |
| 1839 | $C_3H_7O$ | F | F | 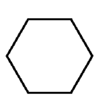 | $OCH_2$ | 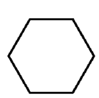 | — | F | H | OCH═$CH_2$ | |
| 1840 | $C_3H_7O$ | F | F | 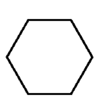 | $OCH_2$ | 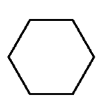 | — | F | H | $OCH_2CH$═$CH_2$ | |

TABLE 123-continued

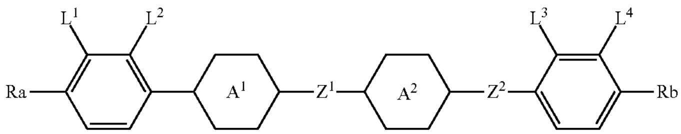

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1841 | $C_4H_9O$ | F | F | 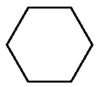 | $OCH_2$ | 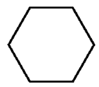 | — | F | H | $OCH_2CH{=}CH_2$ | |
| 1842 | $C_5H_{11}O$ | F | F | 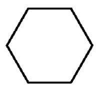 | $OCH_2$ | 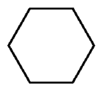 | — | F | H | $OCH_2CH{=}CH_2$ | |
| 1843 | $CH_3O$ | F | F | 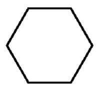 | $OCH_2$ | 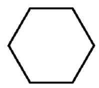 | — | F | H | $OC_2H_5CH{=}CH_2$ | |
| 1844 | $C_2H_5O$ | F | F | 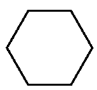 | $OCH_2$ | 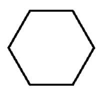 | — | F | H | $OC_2H_5CH{=}CH_2$ | |
| 1845 | $C_3H_7O$ | F | F | 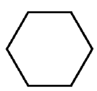 | $OCH_2$ | 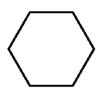 | — | F | H | $OC_2H_5CH{=}CH_2$ | |

TABLE 124

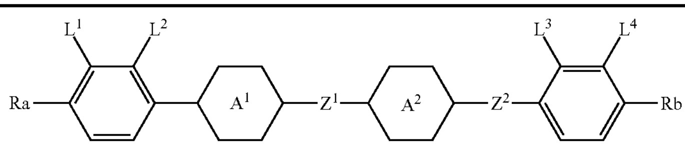

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1846 | $CH_3O$ | F | F | 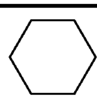 | $OCH_2$ | 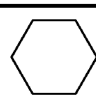 | — | F | H | $OCH_2CH{=}CHCH_3$ | |
| 1847 | $C_2H_5O$ | F | F | 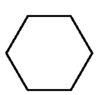 | $OCH_2$ | 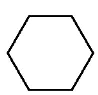 | — | F | H | $OCH_2CH{=}CHCH_3$ | |
| 1848 | $C_3H_7O$ | F | F | 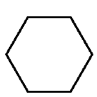 | $OCH_2$ | 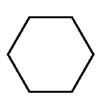 | — | F | H | $OCH_2CH{=}CHCH_3$ | |
| 1849 | $CH_2{=}CHCH_2O$ | F | F | 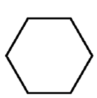 | $OCH_2$ | 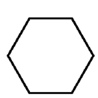 | — | F | H | $OCH{=}CH_2$ | |
| 1850 | $CH_2{=}CHC_2H_5O$ | F | F | 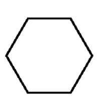 | $OCH_2$ | 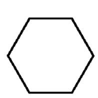 | — | F | H | $OCH_2CH{=}CH_2$ | |
| 1851 | $C_3H_7OCH_2$ | F | F | 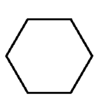 | $OCH_2$ | 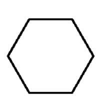 | — | F | H | $OC_3H_7$ | |

TABLE 124-continued

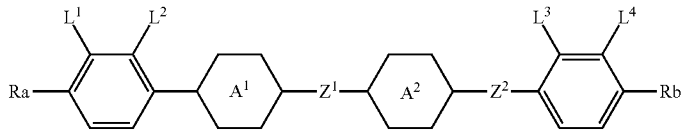

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1852 | $C_5H_{11}O$ | F | F | 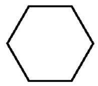 | $OCH_2$ | 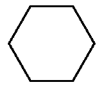 | — | F | H | $OC_2H_5CH{=}CH_2$ | |
| 1853 | $C_3H_7O$ | F | F | 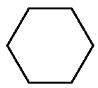 | $OCH_2$ | 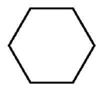 | — | F | H | H | |
| 1854 | $C_5H_{11}O$ | F | F | 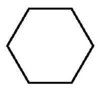 | $OCH_2$ | 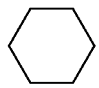 | — | F | H | $OC_9H_{19}$ | |
| 1855 | $C_3H_7O$ | F | F | 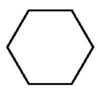 | $OCH_2$ | 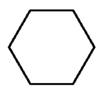 | — | F | H | $C_2H_5$ | |
| 1856 | $C_5H_{11}O$ | F | F | 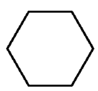 | $OCH_2$ | 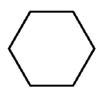 | — | F | H | $C_3H_7$ | |
| 1857 | H | F | F | 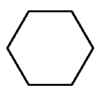 | $OCH_2$ | 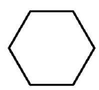 | — | F | H | $OC_4H_9$ | |
| 1858 | $C_7H_{15}O$ | F | F | 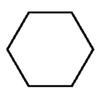 | $OCH_2$ | 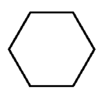 | — | F | H | $OC_4H_9$ | |
| 1859 | $C_2H_5O$ | F | F | 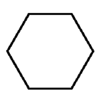 | $OCH_2$ | 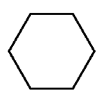 | — | F | H | $OC_6H_{13}$ | |
| 1860 | $CH_3O$ | F | F | 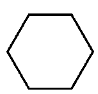 | $OCH_2$ | 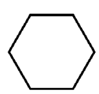 | — | F | H | $C_2H_5$ | |

TABLE 125

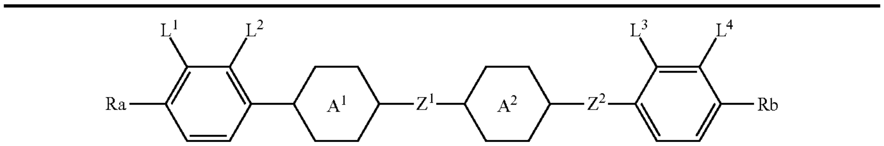

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1861 | $CH_3O$ | F | F | 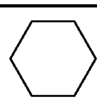 | $OCH_2$ | 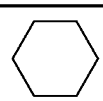 | — | H | F | $OCH_3$ | |
| 1862 | $CH_3O$ | F | F | 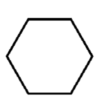 | $OCH_2$ | 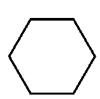 | — | H | F | $OC_2H_5$ | |
| 1863 | $CH_3O$ | F | F | 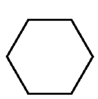 | $OCH_2$ | 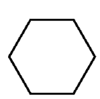 | — | H | F | $OC_3H_7$ | |

TABLE 125-continued

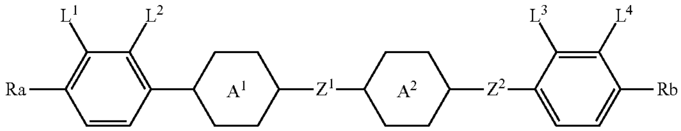

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1864 | $CH_3O$ | F | F | 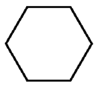 | $OCH_2$ | 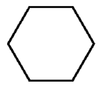 | — | H | F | $OC_4H_9$ | |
| 1865 | $CH_3O$ | F | F | 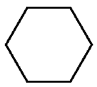 | $OCH_2$ | 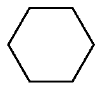 | — | H | F | $OC_5H_{11}$ | |
| 1866 | $C_2H_5O$ | F | F | 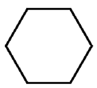 | $OCH_2$ | 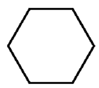 | — | H | F | $OCH_3$ | |
| 1867 | $C_2H_5O$ | F | F | 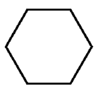 | $OCH_2$ | 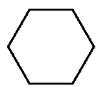 | — | H | F | $OC_2H_5$ | |
| 1868 | $C_2H_5O$ | F | F | 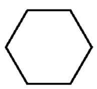 | $OCH_2$ | 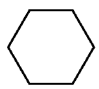 | — | H | F | $OC_3H_7$ | |
| 1869 | $C_2H_5O$ | F | F | 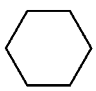 | $OCH_2$ | 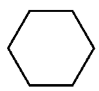 | — | H | F | $OC_4H_9$ | |
| 1870 | $C_2H_5O$ | F | F | 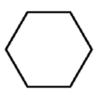 | $OCH_2$ | 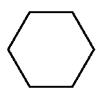 | — | H | F | $OC_5H_{11}$ | |
| 1871 | $C_3H_7O$ | F | F | 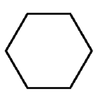 | $OCH_2$ | 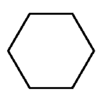 | — | H | F | $OCH_3$ | |
| 1872 | $C_3H_7O$ | F | F | 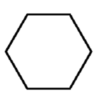 | $OCH_2$ | 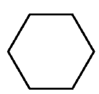 | — | H | F | $OC_2H_5$ | |
| 1873 | $C_3H_7O$ | F | F | 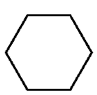 | $OCH_2$ | 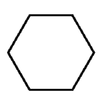 | — | H | F | $OC_3H_7$ | |
| 1874 | $C_3H_7O$ | F | F | 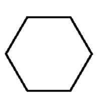 | $OCH_2$ | 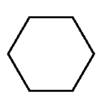 | — | H | F | $OC_4H_9$ | |
| 1875 | $C_3H_7O$ | F | F | 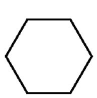 | $OCH_2$ | 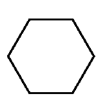 | — | H | F | $OC_5H_{11}$ | |

TABLE 126

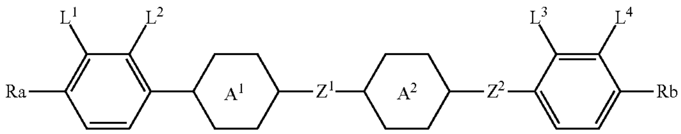

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1876 | $C_4H_9O$ | F | F | 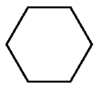 | $OCH_2$ | 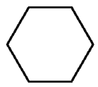 | — | H | F | $OCH_3$ | |
| 1877 | $C_4H_9O$ | F | F | 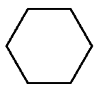 | $OCH_2$ | 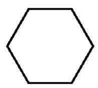 | — | H | F | $OC_2H_5$ | |
| 1878 | $C_4H_9O$ | F | F | 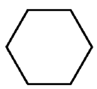 | $OCH_2$ | 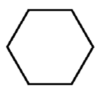 | — | H | F | $OC_3H_7$ | |
| 1879 | $C_4H_9O$ | F | F | 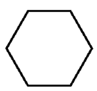 | $OCH_2$ | 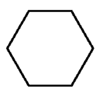 | — | H | F | $OC_4H_9$ | |
| 1880 | $C_4H_9O$ | F | F | 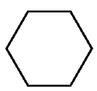 | $OCH_2$ | 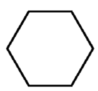 | — | H | F | $OC_5H_{11}$ | |
| 1881 | $C_5H_{11}O$ | F | F | 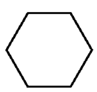 | $OCH_2$ | 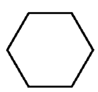 | — | H | F | $OCH_3$ | |
| 1882 | $C_5H_{11}O$ | F | F | 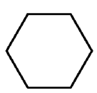 | $OCH_2$ | 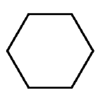 | — | H | F | $OC_2H_5$ | |
| 1883 | $C_5H_{11}O$ | F | F | 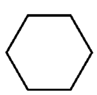 | $OCH_2$ | 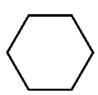 | — | H | F | $OC_3H_7$ | |
| 1884 | $C_5H_{11}O$ | F | F | 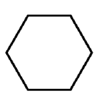 | $OCH_2$ | 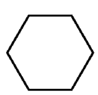 | — | H | F | $OC_4H_9$ | |
| 1885 | $C_5H_{11}O$ | F | F | 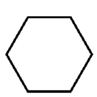 | $OCH_2$ | 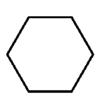 | — | H | F | $OC_5H_{11}$ | |
| 1886 | $C_2H_5$ | F | F | 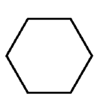 | $OCH_2$ | 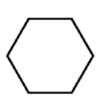 | — | H | F | $C_4H_9$ | |
| 1887 | $C_5H_{11}$ | F | F | 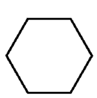 | $OCH_2$ | 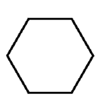 | — | H | F | $C_2H_5$ | |
| 1888 | $C_2H_5$ | F | F | 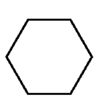 | $OCH_2$ | 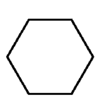 | — | H | F | $OC_4H_9$ | |

TABLE 126-continued

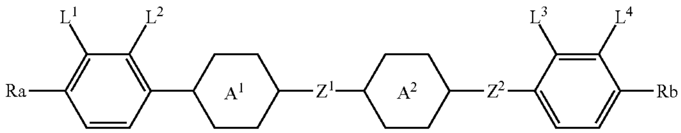

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1889 | $CH_2$=CH | F | F | 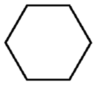 | $OCH_2$ | 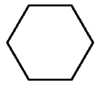 | — | H | F | $OC_3H_7$ | |
| 1890 | $CH_2$=CH | F | F | 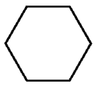 | $OCH_2$ | 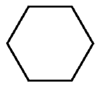 | — | H | F | $OC_5H_{11}$ | |

TABLE 127

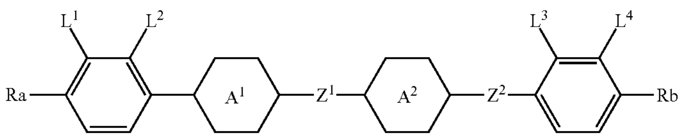

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1891 | $CH_2$=CHO | F | F | 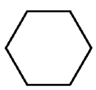 | $OCH_2$ | 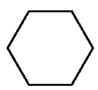 | — | H | F | $OC_3H_7$ | |
| 1892 | $CH_2$=$CHCH_2O$ | F | F | 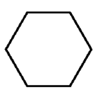 | $OCH_2$ | 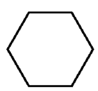 | — | H | F | $OC_5H_{11}$ | |
| 1893 | $CH_2$=$CHCH_2O$ | F | F | 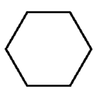 | $OCH_2$ | 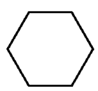 | — | H | F | $OC_3H_7$ | |
| 1894 | $CH_2$=$CHC_2H_5O$ | F | F | 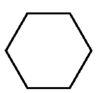 | $OCH_2$ | 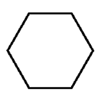 | — | H | F | $OC_5H_{11}$ | |
| 1895 | $CH_2$=$CHC_2H_5O$ | F | F | 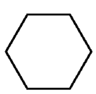 | $OCH_2$ | 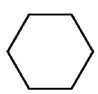 | — | H | F | $OC_2H_5$ | |
| 1896 | $CH_2$=$CHC_2H_5O$ | F | F | 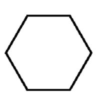 | $OCH_2$ | 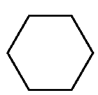 | — | H | F | $OC_3H_7$ | |
| 1897 | $CH_3CH$=$CHCH_2O$ | F | F | 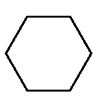 | $OCH_2$ | 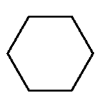 | — | H | F | $OCH_3$ | |
| 1898 | $CH_3CH$=$CHCH_2O$ | F | F | 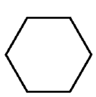 | $OCH_2$ | 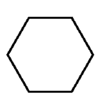 | — | H | F | $OC_2H_5$ | |
| 1899 | $C_3H_7O$ | F | F | 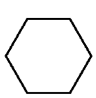 | $OCH_2$ | 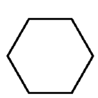 | — | H | F | OCH=$CH_2$ | |
| 1900 | $C_3H_7O$ | F | F | 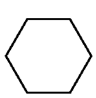 | $OCH_2$ | 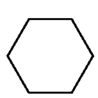 | — | H | F | $OCH_2CH$=$CH_2$ | |

TABLE 127-continued

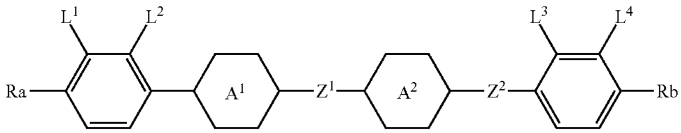

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1901 | $C_4H_9O$ | F | F | 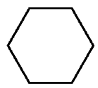 | $OCH_2$ | 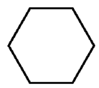 | — | H | F | $OCH_2CH{=}CH_2$ | |
| 1902 | $C_5H_{11}O$ | F | F | 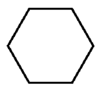 | $OCH_2$ | 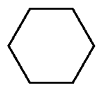 | — | H | F | $OCH_2CH{=}CH_2$ | |
| 1903 | $CH_3O$ | F | F | 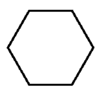 | $OCH_2$ | 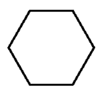 | — | H | F | $OC_2H_5CH{=}CH_2$ | |
| 1904 | $C_2H_5O$ | F | F | 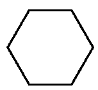 | $OCH_2$ | 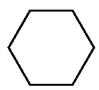 | — | H | F | $OC_2H_5CH{=}CH_2$ | |
| 1905 | $C_3H_7O$ | F | F | 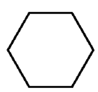 | $OCH_2$ | 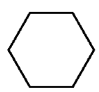 | — | H | F | $OC_2H_5CH{=}CH_2$ | |

TABLE 128

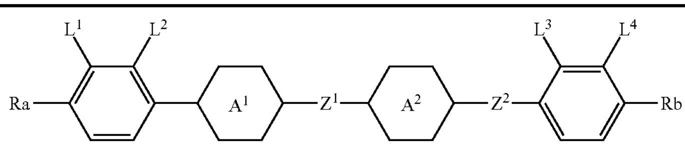

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1906 | $CH_3O$ | F | F | 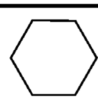 | $OCH_2$ | 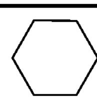 | — | H | F | $OCH_2CH{=}CHCH_3$ | |
| 1907 | $C_2H_5O$ | F | F | 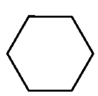 | $OCH_2$ | 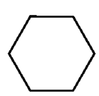 | — | H | F | $OCH_2CH{=}CHCH_3$ | |
| 1908 | $C_3H_7O$ | F | F | 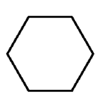 | $OCH_2$ | 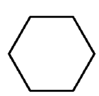 | — | H | F | $OCH_2CH{=}CHCH_3$ | |
| 1909 | $CH_2{=}CHCH_2O$ | F | F | 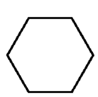 | $OCH_2$ | 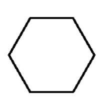 | — | H | F | $OCH{=}CH_2$ | |
| 1910 | $CH_2{=}CHC_2H_5O$ | F | F | 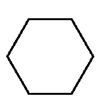 | $OCH_2$ | 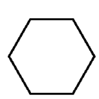 | — | H | F | $OCH_2CH{=}CH_2$ | |
| 1911 | $C_3H_7OCH_2$ | F | F | 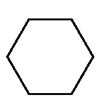 | $OCH_2$ | 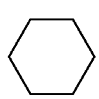 | — | H | F | $OC_3H_7$ | |

TABLE 128-continued

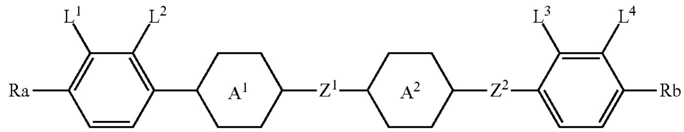

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1912 | $C_5H_{11}O$ | F | F | 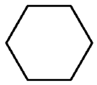 | $OCH_2$ | 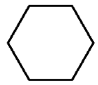 | — | H | F | $OC_2H_5CH{=}CH_2$ | |
| 1913 | $C_3H_7O$ | F | F | 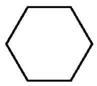 | $OCH_2$ | 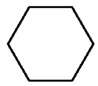 | — | H | F | H | |
| 1914 | $C_5H_{11}O$ | F | F | 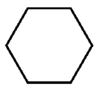 | $OCH_2$ | 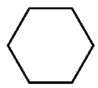 | — | H | F | $OC_9H_{19}$ | |
| 1915 | $C_3H_7O$ | F | F | 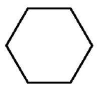 | $OCH_2$ | 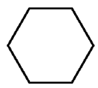 | — | H | F | $C_2H_5$ | |
| 1916 | $C_5H_{11}O$ | F | F | 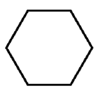 | $OCH_2$ | 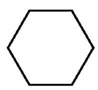 | — | H | F | $C_3H_7$ | |
| 1917 | H | F | F | 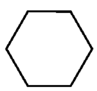 | $OCH_2$ | 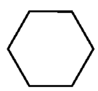 | — | H | F | $OC_4H_9$ | |
| 1918 | $C_7H_{15}O$ | F | F | 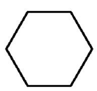 | $OCH_2$ | 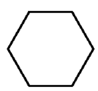 | — | H | F | $OC_4H_9$ | |
| 1919 | $C_2H_5O$ | F | F | 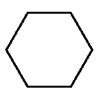 | $OCH_2$ | 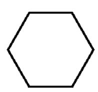 | — | H | F | $OC_6H_{13}$ | |
| 1920 | $CH_3O$ | F | F | 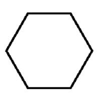 | $OCH_2$ | 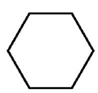 | — | H | F | $C_2H_5$ | |

TABLE 129

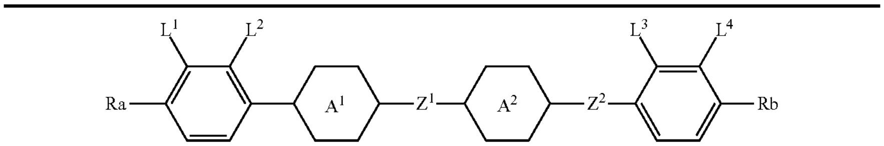

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1921 | $CH_3O$ | F | F | 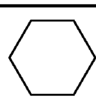 | $OCH_2$ | 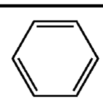 | — | F | F | $OCH_3$ | |
| 1922 | $CH_3O$ | F | F | 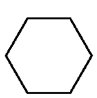 | $OCH_2$ | 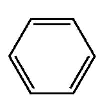 | — | F | F | $OC_2H_5$ | |
| 1923 | $CH_3O$ | F | F | 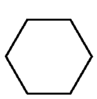 | $OCH_2$ | 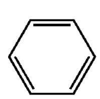 | — | F | F | $OC_3H_7$ | |

TABLE 129-continued

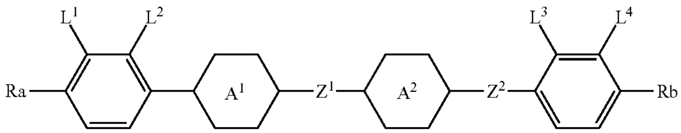

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1924 | $CH_3O$ | F | F | 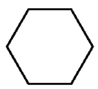 | $OCH_2$ |  | — | F | F | $OC_4H_9$ | |
| 1925 | $CH_3O$ | F | F | 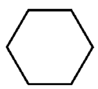 | $OCH_2$ | 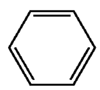 | — | F | F | $OC_5H_{11}$ | |
| 1926 | $C_2H_5O$ | F | F | 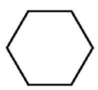 | $OCH_2$ | 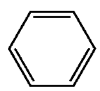 | — | F | F | $OCH_3$ | |
| 1927 | $C_2H_5O$ | F | F | 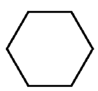 | $OCH_2$ | 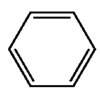 | — | F | F | $OC_2H_5$ | |
| 1928 | $C_2H_5O$ | F | F | 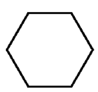 | $OCH_2$ | 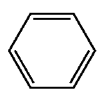 | — | F | F | $OC_3H_7$ | |
| 1929 | $C_2H_5O$ | F | F | 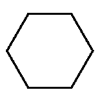 | $OCH_2$ | 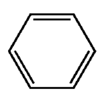 | — | F | F | $OC_4H_9$ | |
| 1930 | $C_2H_5O$ | F | F | 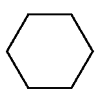 | $OCH_2$ | 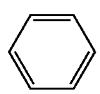 | — | F | F | $OC_5H_{11}$ | |
| 1931 | $C_3H_7O$ | F | F | 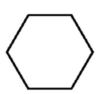 | $OCH_2$ | 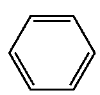 | — | F | F | $OCH_3$ | |
| 1932 | $C_3H_7O$ | F | F | 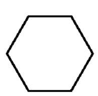 | $OCH_2$ | 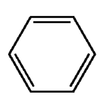 | — | F | F | $OC_2H_5$ | |
| 1933 | $C_3H_7O$ | F | F | 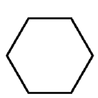 | $OCH_2$ | 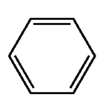 | — | F | F | $OC_3H_7$ | |
| 1934 | $C_3H_7O$ | F | F | 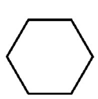 | $OCH_2$ | 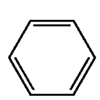 | — | F | F | $OC_4H_9$ | |
| 1935 | $C_3H_7O$ | F | F | 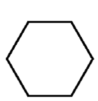 | $OCH_2$ | 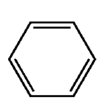 | — | F | F | $OC_5H_{11}$ | |

TABLE 130
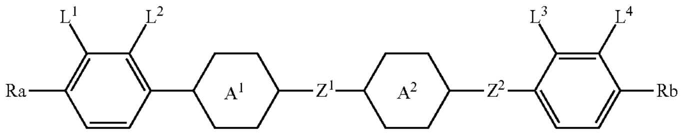
| No. | Ra | L¹ | L² | A¹ | Z¹ | A² | Z² | L³ | L⁴ | Rb | Physical property values |
|---|---|---|---|---|---|---|---|---|---|---|---|
| 1936 | $C_4H_9O$ | F | F | 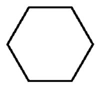 | $OCH_2$ | 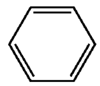 | — | F | F | $OCH_3$ | |
| 1937 | $C_4H_9O$ | F | F | 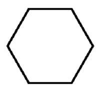 | $OCH_2$ | 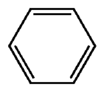 | — | F | F | $OC_2H_5$ | |
| 1938 | $C_4H_9O$ | F | F | 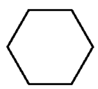 | $OCH_2$ |  | — | F | F | $OC_3H_7$ | |
| 1939 | $C_4H_9O$ | F | F | 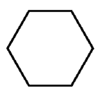 | $OCH_2$ | 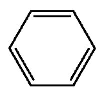 | — | F | F | $OC_4H_9$ | |
| 1940 | $C_4H_9O$ | F | F | 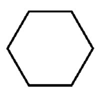 | $OCH_2$ | 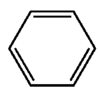 | — | F | F | $OC_5H_{11}$ | |
| 1941 | $C_5H_{11}O$ | F | F | 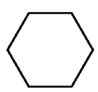 | $OCH_2$ | 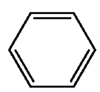 | — | F | F | $OCH_3$ | |
| 1942 | $C_5H_{11}O$ | F | F | 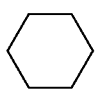 | $OCH_2$ | 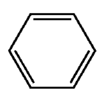 | — | F | F | $OC_2H_5$ | |
| 1943 | $C_5H_{11}O$ | F | F | 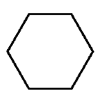 | $OCH_2$ | 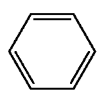 | — | F | F | $OC_3H_7$ | |
| 1944 | $C_5H_{11}O$ | F | F | 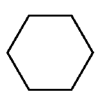 | $OCH_2$ | 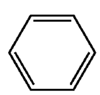 | — | F | F | $OC_4H_9$ | |
| 1945 | $C_5H_{11}O$ | F | F | 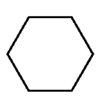 | $OCH_2$ | 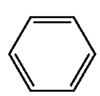 | — | F | F | $OC_5H_{11}$ | |
| 1946 | $C_2H_5$ | F | F | 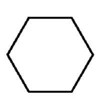 | $OCH_2$ | 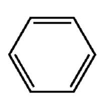 | — | F | F | $C_4H_9$ | |
| 1947 | $C_5H_{11}$ | F | F | 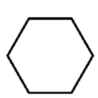 | $OCH_2$ | 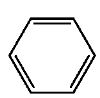 | — | F | F | $C_2H_5$ | |
| 1948 | $C_2H_5$ | F | F | 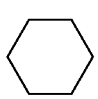 | $OCH_2$ | 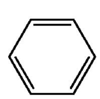 | — | F | F | $OC_4H_9$ | |

TABLE 130-continued

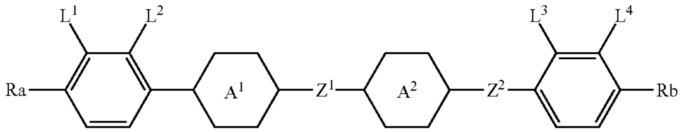

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1949 | $CH_2{=}CH$ | F | F | 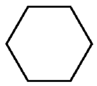 | $OCH_2$ | 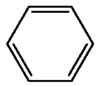 | — | F | F | $OC_3H_7$ | |
| 1950 | $CH_2{=}CH$ | F | F | 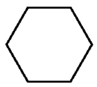 | $OCH_2$ | 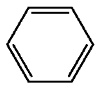 | — | F | F | $OC_5H_{11}$ | |

TABLE 131

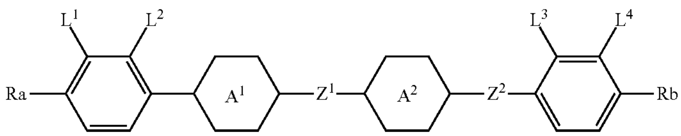

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1951 | $CH_2{=}CHO$ | F | F | 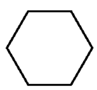 | $OCH_2$ |  | — | F | F | $OC_3H_7$ | |
| 1952 | $CH_2{=}CHCH_2O$ | F | F | 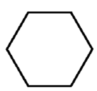 | $OCH_2$ | 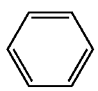 | — | F | F | $OC_5H_{11}$ | |
| 1953 | $CH_2{=}CHCH_2O$ | F | F | 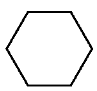 | $OCH_2$ | 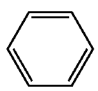 | — | F | F | $OC_3H_7$ | |
| 1954 | $CH_2{=}CHC_2H_5O$ | F | F | 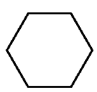 | $OCH_2$ |  | — | F | F | $OC_5H_{11}$ | |
| 1955 | $CH_2{=}CHC_2H_5O$ | F | F | 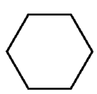 | $OCH_2$ | 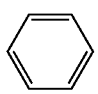 | — | F | F | $OC_2H_5$ | |
| 1956 | $CH_2{=}CHC_2H_5O$ | F | F | 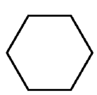 | $OCH_2$ | 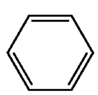 | — | F | F | $OC_3H_7$ | |
| 1957 | $CH_3CH{=}CHCH_2O$ | F | F | 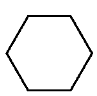 | $OCH_2$ | 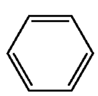 | — | F | F | $OCH_3$ | |
| 1958 | $CH_3CH{=}CHCH_2O$ | F | F | 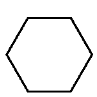 | $OCH_2$ | 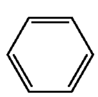 | — | F | F | $OC_2H_5$ | |
| 1959 | $C_3H_7O$ | F | F | 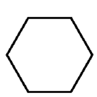 | $OCH_2$ | 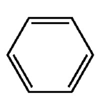 | — | F | F | $OCH{=}CH_2$ | |
| 1960 | $C_3H_7O$ | F | F | 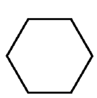 | $OCH_2$ | 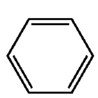 | — | F | F | $OCH_2CH{=}CH_2$ | |

TABLE 131-continued

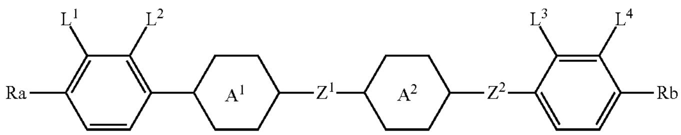

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1961 | $C_4H_9O$ | F | F | 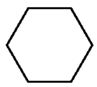 | $OCH_2$ | 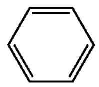 | — | F | F | $OCH_2CH{=}CH_2$ | |
| 1962 | $C_5H_{11}O$ | F | F | 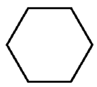 | $OCH_2$ | 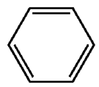 | — | F | F | $OCH_2CH{=}CH_2$ | |
| 1963 | $CH_3O$ | F | F | 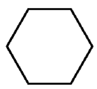 | $OCH_2$ | 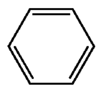 | — | F | F | $OC_2H_5CH{=}CH_2$ | |
| 1964 | $C_2H_5O$ | F | F | 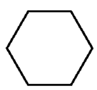 | $OCH_2$ | 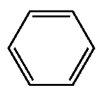 | — | F | F | $OC_2H_5CH{=}CH_2$ | |
| 1965 | $C_3H_7O$ | F | F | 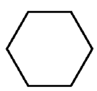 | $OCH_2$ | 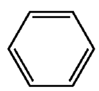 | — | F | F | $OC_2H_5CH{=}CH_2$ | |

TABLE 132

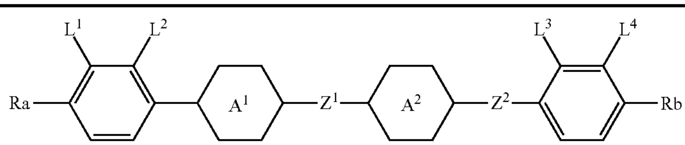

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1966 | $CH_3O$ | F | F | 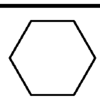 | $OCH_2$ | 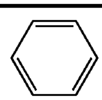 | — | F | F | $OCH_2CH{=}CHCH_3$ | |
| 1967 | $C_2H_5O$ | F | F | 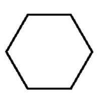 | $OCH_2$ | 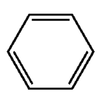 | — | F | F | $OCH_2CH{=}CHCH_3$ | |
| 1968 | $C_3H_7O$ | F | F | 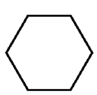 | $OCH_2$ | 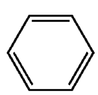 | — | F | F | $OCH_2CH{=}CHCH_3$ | |
| 1969 | $CH_2{=}CHCH_2O$ | F | F | 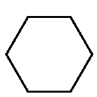 | $OCH_2$ | 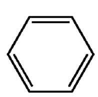 | — | F | F | $OCH{=}CH_2$ | |
| 1970 | $CH_2{=}CHC_2H_5O$ | F | F | 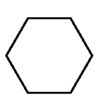 | $OCH_2$ | 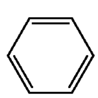 | — | F | F | $OCH_2CH{=}CH_2$ | |
| 1971 | $C_3H_7OCH_2$ | F | F | 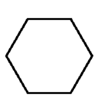 | $OCH_2$ | 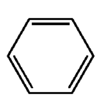 | — | F | F | $OC_3H_7$ | |

TABLE 132-continued

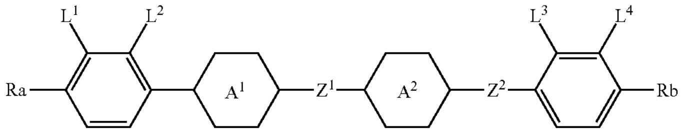

| No. | Ra | L¹ | L² | A¹ | Z¹ | A² | Z² | L³ | L⁴ | Rb | Physical property values |
|---|---|---|---|---|---|---|---|---|---|---|---|
| 1972 | $C_5H_{11}O$ | F | F | 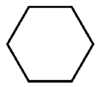 | $OCH_2$ | 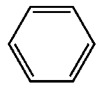 | — | F | F | $OC_2H_5CH{=}CH_2$ | |
| 1973 | $C_3H_7O$ | F | F | 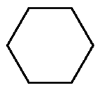 | $OCH_2$ | 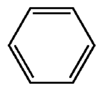 | — | F | F | H | |
| 1974 | $C_5H_{11}O$ | F | F | 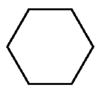 | $OCH_2$ | 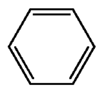 | — | F | F | $OC_9H_{19}$ | |
| 1975 | $C_3H_7O$ | F | F | 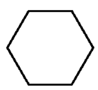 | $OCH_2$ | 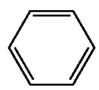 | — | F | F | $C_2H_5$ | |
| 1976 | $C_5H_{11}O$ | F | F | 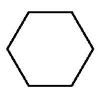 | $OCH_2$ | 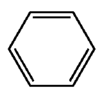 | — | F | F | $C_3H_7$ | |
| 1977 | H | F | F | 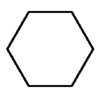 | $OCH_2$ | 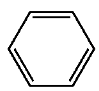 | — | F | F | $OC_4H_9$ | |
| 1978 | $C_7H_{15}O$ | F | F | 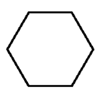 | $OCH_2$ | 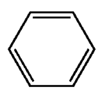 | — | F | F | $OC_4H_9$ | |
| 1979 | $C_2H_5O$ | F | F | 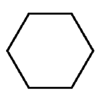 | $OCH_2$ | 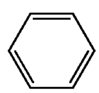 | — | F | F | $OC_6H_{13}$ | |
| 1980 | $CH_3O$ | F | F | 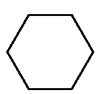 | $OCH_2$ | 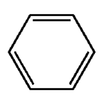 | — | F | F | $C_2H_5$ | |

TABLE 133

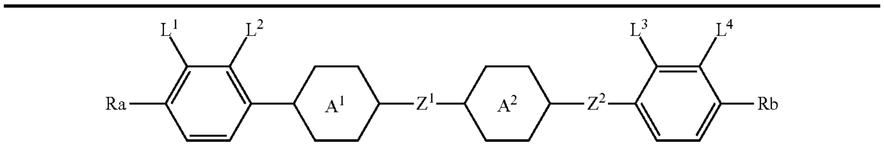

| No. | Ra | L¹ | L² | A¹ | Z¹ | A² | Z² | L³ | L⁴ | Rb | Physical property values |
|---|---|---|---|---|---|---|---|---|---|---|---|
| 1981 | $CH_3O$ | F | F | 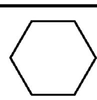 | $OCH_2$ | 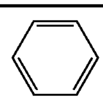 | — | F | H | $OCH_3$ | |
| 1982 | $CH_3O$ | F | F | 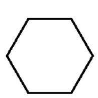 | $OCH_2$ | 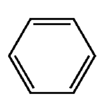 | — | F | H | $OC_2H_5$ | |
| 1983 | $CH_3O$ | F | F | 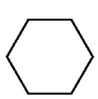 | $OCH_2$ | 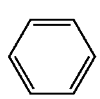 | — | F | H | $OC_3H_7$ | |

TABLE 133-continued

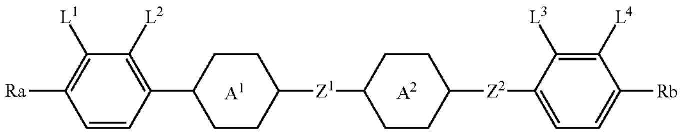

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1984 | $CH_3O$ | F | F | 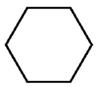 | $OCH_2$ | 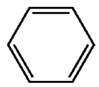 | — | F | H | $OC_4H_9$ | |
| 1985 | $CH_3O$ | F | F | 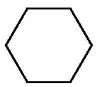 | $OCH_2$ | 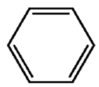 | — | F | H | $OC_5H_{11}$ | |
| 1986 | $C_2H_5O$ | F | F | 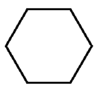 | $OCH_2$ | 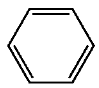 | — | F | H | $OCH_3$ | |
| 1987 | $C_2H_5O$ | F | F | 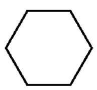 | $OCH_2$ | 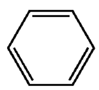 | — | F | H | $OC_2H_5$ | |
| 1988 | $C_2H_5O$ | F | F | 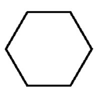 | $OCH_2$ | 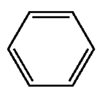 | — | F | H | $OC_3H_7$ | |
| 1989 | $C_2H_5O$ | F | F | 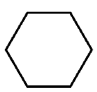 | $OCH_2$ |  | — | F | H | $OC_4H_9$ | |
| 1990 | $C_2H_5O$ | F | F | 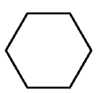 | $OCH_2$ | 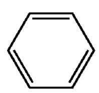 | — | F | H | $OC_5H_{11}$ | |
| 1991 | $C_3H_7O$ | F | F | 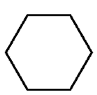 | $OCH_2$ | 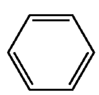 | — | F | H | $OCH_3$ | |
| 1992 | $C_3H_7O$ | F | F | 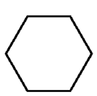 | $OCH_2$ | 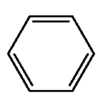 | — | F | H | $OC_2H_5$ | |
| 1993 | $C_3H_7O$ | F | F | 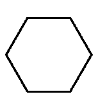 | $OCH_2$ | 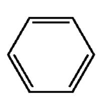 | — | F | H | $OC_3H_7$ | |
| 1994 | $C_3H_7O$ | F | F | 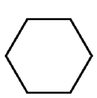 | $OCH_2$ | 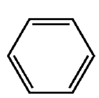 | — | F | H | $OC_4H_9$ | |
| 1995 | $C_3H_7O$ | F | F | 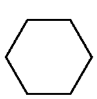 | $OCH_2$ | 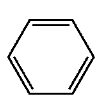 | — | F | H | $OC_5H_{11}$ | |

TABLE 134

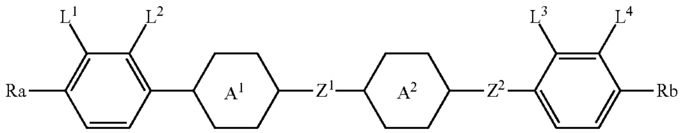

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 1996 | $C_4H_9O$ | F | F | 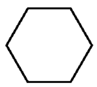 | $OCH_2$ | 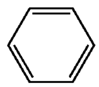 | — | F | H | $OCH_3$ | |
| 1997 | $C_4H_9O$ | F | F | 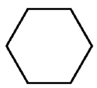 | $OCH_2$ | 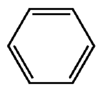 | — | F | H | $OC_2H_5$ | |
| 1998 | $C_4H_9O$ | F | F | 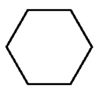 | $OCH_2$ |  | — | F | H | $OC_3H_7$ | |
| 1999 | $C_4H_9O$ | F | F | 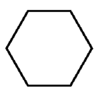 | $OCH_2$ |  | — | F | H | $OC_4H_9$ | |
| 2000 | $C_4H_9O$ | F | F | 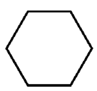 | $OCH_2$ |  | — | F | H | $OC_5H_{11}$ | |
| 2001 | $C_5H_{11}O$ | F | F | 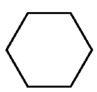 | $OCH_2$ | 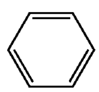 | — | F | H | $OCH_3$ | |
| 2002 | $C_5H_{11}O$ | F | F | 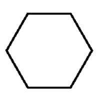 | $OCH_2$ | 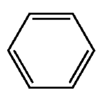 | — | F | H | $OC_2H_5$ | |
| 2003 | $C_5H_{11}O$ | F | F | 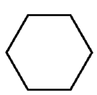 | $OCH_2$ | 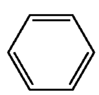 | — | F | H | $OC_3H_7$ | |
| 2004 | $C_5H_{11}O$ | F | F | 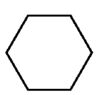 | $OCH_2$ | 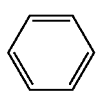 | — | F | H | $OC_4H_9$ | |
| 2005 | $C_5H_{11}O$ | F | F | 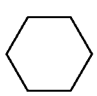 | $OCH_2$ | 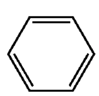 | — | F | H | $OC_5H_{11}$ | |
| 2006 | $C_2H_5$ | F | F | 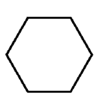 | $OCH_2$ | 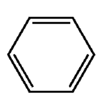 | — | F | H | $C_4H_9$ | |
| 2007 | $C_5H_{11}$ | F | F | 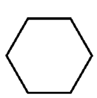 | $OCH_2$ | 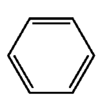 | — | F | H | $C_2H_5$ | |
| 2008 | $C_2H_5$ | F | F | 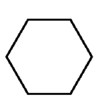 | $OCH_2$ | 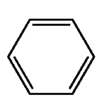 | — | F | H | $OC_4H_9$ | |

TABLE 134-continued

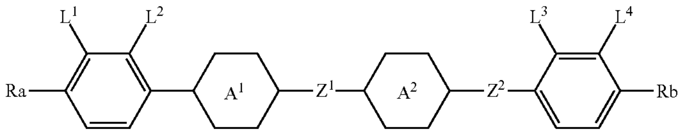

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2009 | $CH_2{=}CH$ | F | F | 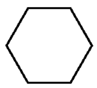 | $OCH_2$ | 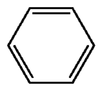 | — | F | H | $OC_3H_7$ | |
| 2010 | $CH_2{=}CH$ | F | F | 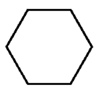 | $OCH_2$ |  | — | F | H | $OC_5H_{11}$ | |

TABLE 135

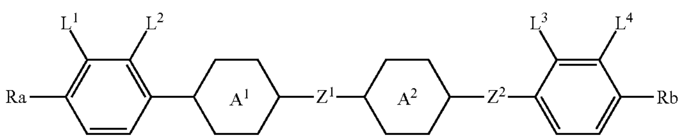

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2011 | $CH_2{=}CHO$ | F | F | 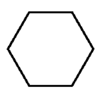 | $OCH_2$ | 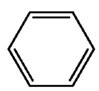 | — | F | H | $OC_3H_7$ | |
| 2012 | $CH_2{=}CHCH_2O$ | F | F | 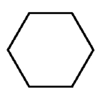 | $OCH_2$ | 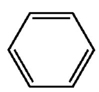 | — | F | H | $OC_5H_{11}$ | |
| 2013 | $CH_2{=}CHCH_2O$ | F | F | 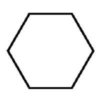 | $OCH_2$ | 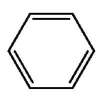 | — | F | H | $OC_3H_7$ | |
| 2014 | $CH_2{=}CHC_2H_5O$ | F | F | 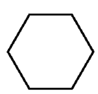 | $OCH_2$ | 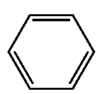 | — | F | H | $OC_5H_{11}$ | |
| 2015 | $CH_2{=}CHC_2H_5O$ | F | F | 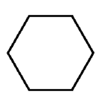 | $OCH_2$ | 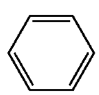 | — | F | H | $OC_2H_5$ | |
| 2016 | $CH_2{=}CHC_2H_5O$ | F | F | 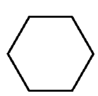 | $OCH_2$ | 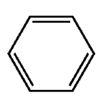 | — | F | H | $OC_3H_7$ | |
| 2017 | $CH_3CH{=}CHCH_2O$ | F | F | 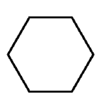 | $OCH_2$ | 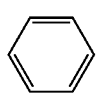 | — | F | H | $OCH_3$ | |
| 2018 | $CH_3CH{=}CHCH_2O$ | F | F | 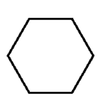 | $OCH_2$ | 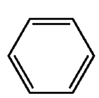 | — | F | H | $OC_2H_5$ | |
| 2019 | $C_3H_7O$ | F | F | 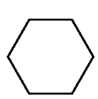 | $OCH_2$ | 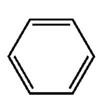 | — | F | H | $OCH{=}CH_2$ | |

TABLE 135-continued

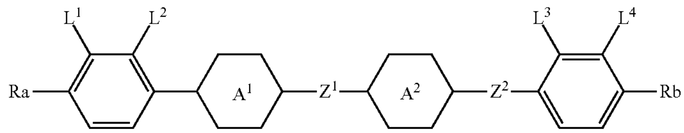

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2020 | $C_3H_7O$ | F | F | 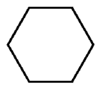 | $OCH_2$ | 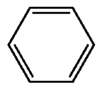 | — | F | H | $OCH_2CH{=}CH_2$ | |
| 2021 | $C_4H_9O$ | F | F | 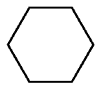 | $OCH_2$ | 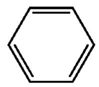 | — | F | H | $OCH_2CH{=}CH_2$ | |
| 2022 | $C_5H_{11}O$ | F | F | 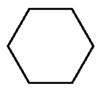 | $OCH_2$ | 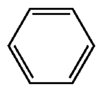 | — | F | H | $OCH_2CH{=}CH_2$ | |
| 2023 | $CH_3O$ | F | F | 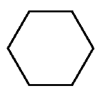 | $OCH_2$ | 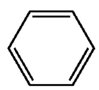 | — | F | H | $OC_2H_5CH{=}CH_2$ | |
| 2024 | $C_2H_5O$ | F | F | 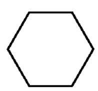 | $OCH_2$ | 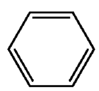 | — | F | H | $OC_2H_5CH{=}CH_2$ | |
| 2025 | $C_3H_7O$ | F | F | 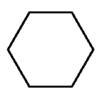 | $OCH_2$ | 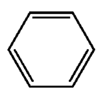 | — | F | H | $OC_2H_5CH{=}CH_2$ | |

TABLE 136

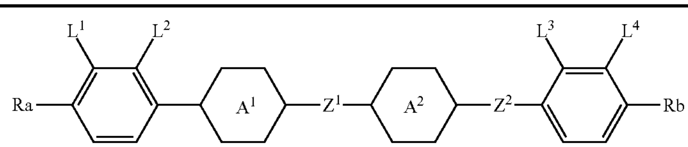

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2026 | $CH_3O$ | F | F | 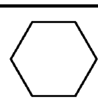 | $OCH_2$ | 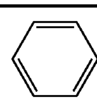 | — | F | H | $OCH_2CH{=}CHCH_3$ | |
| 2027 | $C_2H_5O$ | F | F | 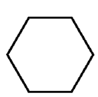 | $OCH_2$ | 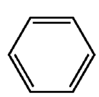 | — | F | H | $OCH_2CH{=}CHCH_3$ | |
| 2028 | $C_3H_7O$ | F | F | 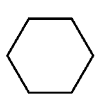 | $OCH_2$ | 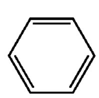 | — | F | H | $OCH_2CH{=}CHCH_3$ | |
| 2029 | $CH_2{=}CHCH_2O$ | F | F | 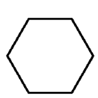 | $OCH_2$ | 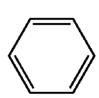 | — | F | H | $OCH{=}CH_2$ | |
| 2030 | $CH_2{=}CHC_2H_5O$ | F | F | 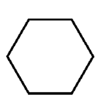 | $OCH_2$ | 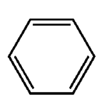 | — | F | H | $OCH_2CH{=}CH_2$ | |

TABLE 136-continued

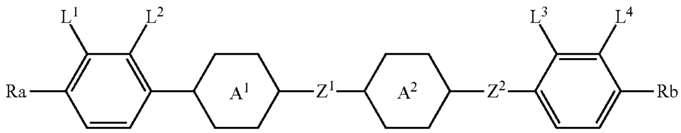

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2031 | $C_3H_7OCH_2$ | F | F | 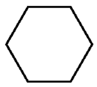 | $OCH_2$ | 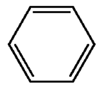 | — | F | H | $OC_3H_7$ | |
| 2032 | $C_5H_{11}O$ | F | F | 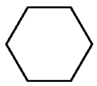 | $OCH_2$ | 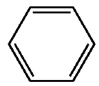 | — | F | H | $OC_2H_5CH{=}CH_2$ | |
| 2033 | $C_3H_7O$ | F | F | 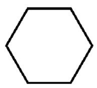 | $OCH_2$ | 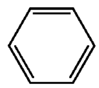 | — | F | H | H | |
| 2034 | $C_5H_{11}O$ | F | F | 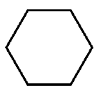 | $OCH_2$ | 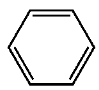 | — | F | H | $OC_9H_{19}$ | |
| 2035 | $C_3H_7O$ | F | F | 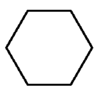 | $OCH_2$ | 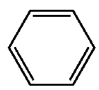 | — | F | H | $C_2H_5$ | |
| 2036 | $C_5H_{11}O$ | F | F | 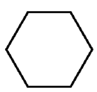 | $OCH_2$ | 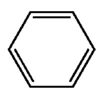 | — | F | H | $C_3H_7$ | |
| 2037 | H | F | F | 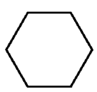 | $OCH_2$ | 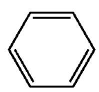 | — | F | H | $OC_4H_9$ | |
| 2038 | $C_7H_{15}O$ | F | F | 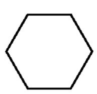 | $OCH_2$ | 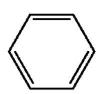 | — | F | H | $OC_4H_9$ | |
| 2039 | $C_2H_5O$ | F | F | 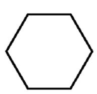 | $OCH_2$ | 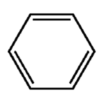 | — | F | H | $OC_6H_{13}$ | |
| 2040 | $CH_3O$ | F | F | 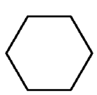 | $OCH_2$ | 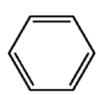 | — | F | H | $C_2H_5$ | |

TABLE 137

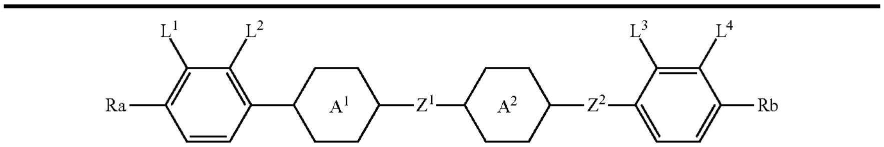

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2041 | $CH_3O$ | F | F | 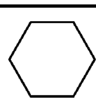 | $OCH_2$ | 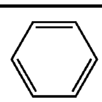 | — | H | F | $OCH_3$ | |

TABLE 137-continued

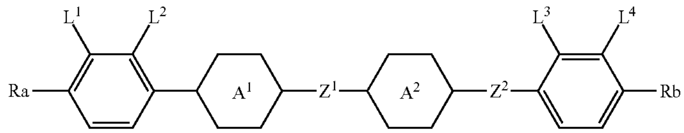

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2042 | $CH_3O$ | F | F | 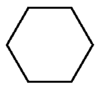 | $OCH_2$ | 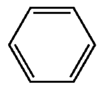 | — | H | F | $OC_2H_5$ | |
| 2043 | $CH_3O$ | F | F | 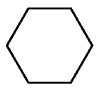 | $OCH_2$ | 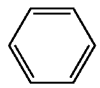 | — | H | F | $OC_3H_7$ | |
| 2044 | $CH_3O$ | F | F | 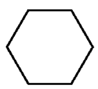 | $OCH_2$ | 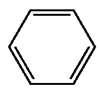 | — | H | F | $OC_4H_9$ | |
| 2045 | $CH_3O$ | F | F | 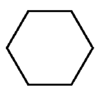 | $OCH_2$ | 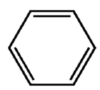 | — | H | F | $OC_5H_{11}$ | |
| 2046 | $C_2H_5O$ | F | F | 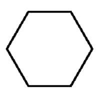 | $OCH_2$ | 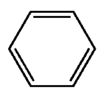 | — | H | F | $OCH_3$ | |
| 2047 | $C_2H_5O$ | F | F | 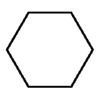 | $OCH_2$ | 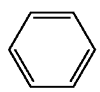 | — | H | F | $OC_2H_5$ | |
| 2048 | $C_2H_5O$ | F | F | 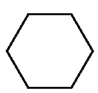 | $OCH_2$ | 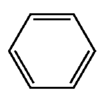 | — | H | F | $OC_3H_7$ | |
| 2049 | $C_2H_5O$ | F | F | 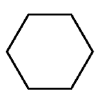 | $OCH_2$ | 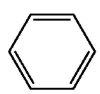 | — | H | F | $OC_4H_9$ | |
| 2050 | $C_2H_5O$ | F | F | 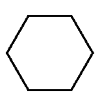 | $OCH_2$ | 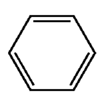 | — | H | F | $OC_5H_{11}$ | |
| 2051 | $C_3H_7O$ | F | F | 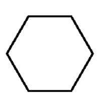 | $OCH_2$ | 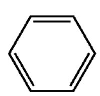 | — | H | F | $OCH_3$ | |
| 2052 | $C_3H_7O$ | F | F | 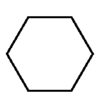 | $OCH_2$ | 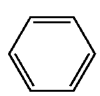 | — | H | F | $OC_2H_5$ | |
| 2053 | $C_3H_7O$ | F | F | 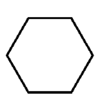 | $OCH_2$ | 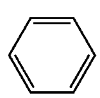 | — | H | F | $OC_3H_7$ | |
| 2054 | $C_3H_7O$ | F | F | 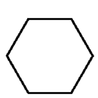 | $OCH_2$ | 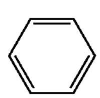 | — | H | F | $OC_4H_9$ | |
| 2055 | $C_3H_7O$ | F | F | 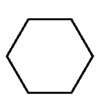 | $OCH_2$ | 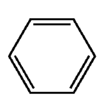 | — | H | F | $OC_5H_{11}$ | |

TABLE 138
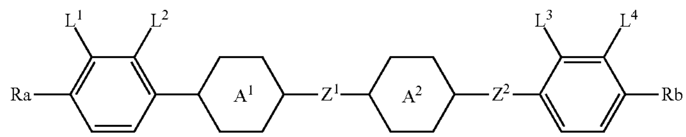
| No. | Ra | L¹ | L² | A¹ | Z¹ | A² | Z² | L³ | L⁴ | Rb | Physical property values |
|---|---|---|---|---|---|---|---|---|---|---|---|
| 2056 | $C_4H_9O$ | F | F | 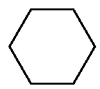 | $OCH_2$ | 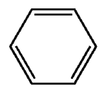 | — | H | F | $OCH_3$ | |
| 2057 | $C_4H_9O$ | F | F | 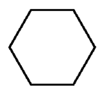 | $OCH_2$ | 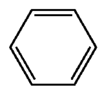 | — | H | F | $OC_2H_5$ | |
| 2058 | $C_4H_9O$ | F | F | 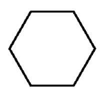 | $OCH_2$ | 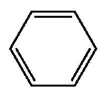 | — | H | F | $OC_3H_7$ | |
| 2059 | $C_4H_9O$ | F | F | 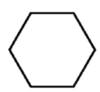 | $OCH_2$ | 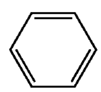 | — | H | F | $OC_4H_9$ | |
| 2060 | $C_4H_9O$ | F | F | 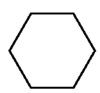 | $OCH_2$ | 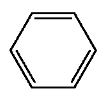 | — | H | F | $OC_5H_{11}$ | |
| 2061 | $C_5H_{11}O$ | F | F | 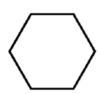 | $OCH_2$ | 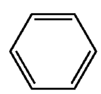 | — | H | F | $OCH_3$ | |
| 2062 | $C_5H_{11}O$ | F | F | 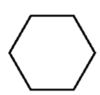 | $OCH_2$ | 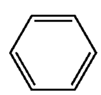 | — | H | F | $OC_2H_5$ | |
| 2063 | $C_5H_{11}O$ | F | F | 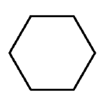 | $OCH_2$ | 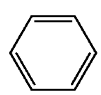 | — | H | F | $OC_3H_7$ | |
| 2064 | $C_5H_{11}O$ | F | F | 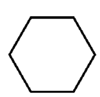 | $OCH_2$ | 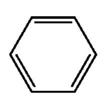 | — | H | F | $OC_4H_9$ | |
| 2065 | $C_5H_{11}O$ | F | F | 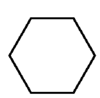 | $OCH_2$ | 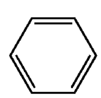 | — | H | F | $OC_5H_{11}$ | |
| 2066 | $C_2H_5$ | F | F | 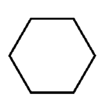 | $OCH_2$ | 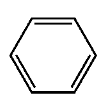 | — | H | F | $C_4H_9$ | |
| 2067 | $C_5H_{11}$ | F | F | 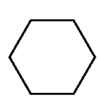 | $OCH_2$ | 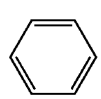 | — | H | F | $C_2H_5$ | |
| 2068 | $C_2H_5$ | F | F | 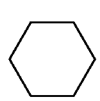 | $OCH_2$ | 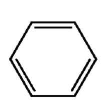 | — | H | F | $OC_4H_9$ | |

TABLE 138-continued

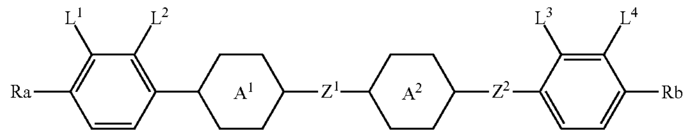

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2069 | $CH_2{=}CH$ | F | F | 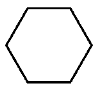 | $OCH_2$ | 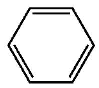 | — | H | F | $OC_3H_7$ | |
| 2070 | $CH_2{=}CH$ | F | F | 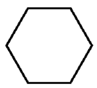 | $OCH_2$ | 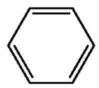 | — | H | F | $OC_5H_{11}$ | |

TABLE 139

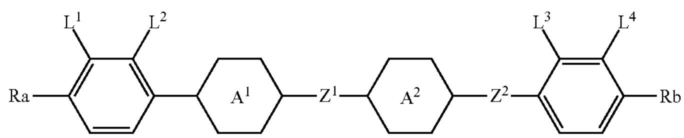

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2071 | $CH_2{=}CHO$ | F | F | 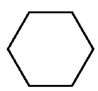 | $OCH_2$ | 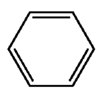 | — | H | F | $OC_3H_7$ | |
| 2072 | $CH_2{=}CHCH_2O$ | F | F | 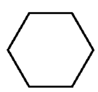 | $OCH_2$ | 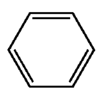 | — | H | F | $OC_5H_{11}$ | |
| 2073 | $CH_2{=}CHCH_2O$ | F | F | 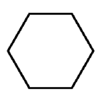 | $OCH_2$ | 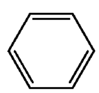 | — | H | F | $OC_3H_7$ | |
| 2074 | $CH_2{=}CHC_2H_5O$ | F | F | 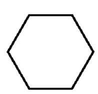 | $OCH_2$ | 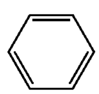 | — | H | F | $OC_5H_{11}$ | |
| 2075 | $CH_2{=}CHC_2H_5O$ | F | F | 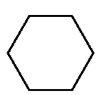 | $OCH_2$ | 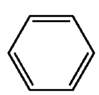 | — | H | F | $OC_2H_5$ | |
| 2076 | $CH_2{=}CHC_2H_5O$ | F | F | 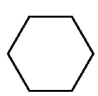 | $OCH_2$ | 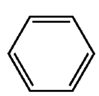 | — | H | F | $OC_3H_7$ | |
| 2077 | $CH_3CH{=}CHCH_2O$ | F | F | 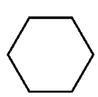 | $OCH_2$ | 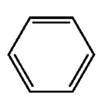 | — | H | F | $OCH_3$ | |
| 2078 | $CH_3CH{=}CHCH_2O$ | F | F | 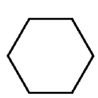 | $OCH_2$ | 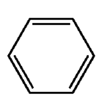 | — | H | F | $OC_2H_5$ | |
| 2079 | $C_3H_7O$ | F | F | 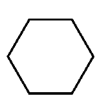 | $OCH_2$ | 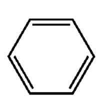 | — | H | F | $OCH{=}CH_2$ | |

TABLE 139-continued

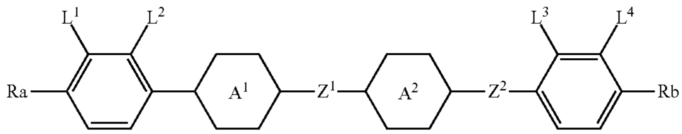

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2080 | $C_3H_7O$ | F | F | 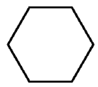 | $OCH_2$ | 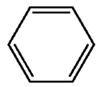 | — | H | F | $OCH_2CH{=}CH_2$ | |
| 2081 | $C_4H_9O$ | F | F | 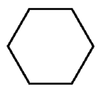 | $OCH_2$ | 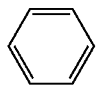 | — | H | F | $OCH_2CH{=}CH_2$ | |
| 2082 | $C_5H_{11}O$ | F | F | 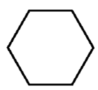 | $OCH_2$ | 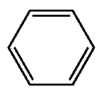 | — | H | F | $OCH_2CH{=}CH_2$ | |
| 2083 | $CH_3O$ | F | F | 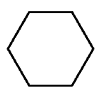 | $OCH_2$ | 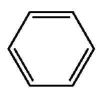 | — | H | F | $OC_2H_5CH{=}CH_2$ | |
| 2084 | $C_2H_5O$ | F | F | 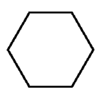 | $OCH_2$ | 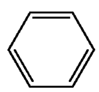 | — | H | F | $OC_2H_5CH{=}CH_2$ | |
| 2085 | $C_3H_7O$ | F | F | 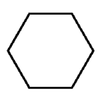 | $OCH_2$ | 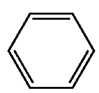 | — | H | F | $OC_2H_5CH{=}CH_2$ | |

TABLE 140

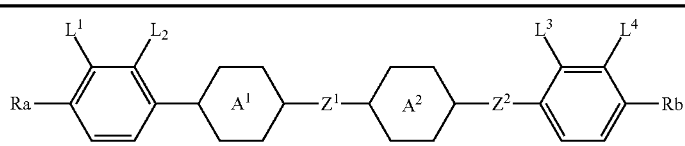

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2086 | $CH_3O$ | F | F | 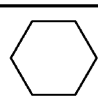 | $OCH_2$ | 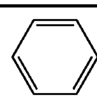 | — | H | F | $OCH_2CH{=}CHCH_3$ | |
| 2087 | $C_2H_5O$ | F | F | 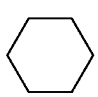 | $OCH_2$ | 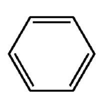 | — | H | F | $OCH_2CH{=}CHCH_3$ | |
| 2088 | $C_3H_7O$ | F | F | 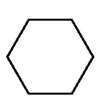 | $OCH_2$ | 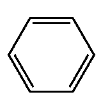 | — | H | F | $OCH_2CH{=}CHCH_3$ | |
| 2089 | $CH_2{=}CHCH_2O$ | F | F | 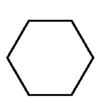 | $OCH_2$ | 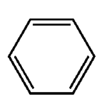 | — | H | F | $OCH{=}CH_2$ | |
| 2090 | $CH_2{=}CHC_2H_5O$ | F | F | 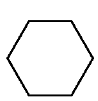 | $OCH_2$ | 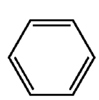 | — | H | F | $OCH_2CH{=}CH_2$ | |

TABLE 140-continued

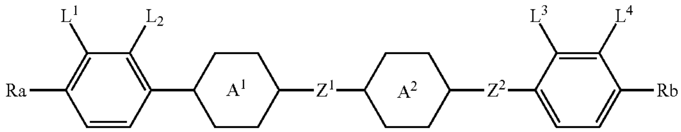

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2091 | $C_3H_7OCH_2$ | F | F | 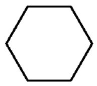 | $OCH_2$ | 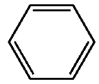 | — | H | F | $OC_3H_7$ | |
| 2092 | $C_5H_{11}O$ | F | F | 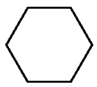 | $OCH_2$ | 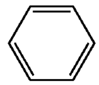 | — | H | F | $OC_2H_5CH{=}CH_2$ | |
| 2093 | $C_3H_7O$ | F | F | 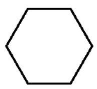 | $OCH_2$ | 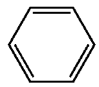 | — | H | F | H | |
| 2094 | $C_5H_{11}O$ | F | F | 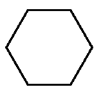 | $OCH_2$ | 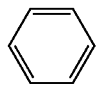 | — | H | F | $OC_9H_{19}$ | |
| 2095 | $C_3H_7O$ | F | F | 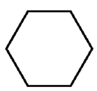 | $OCH_2$ |  | — | H | F | $C_2H_5$ | |
| 2096 | $C_5H_{11}O$ | F | F | 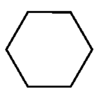 | $OCH_2$ | 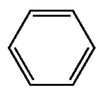 | — | H | F | $C_3H_7$ | |
| 2097 | H | F | F | 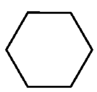 | $OCH_2$ | 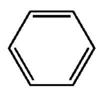 | — | H | F | $OC_4H_9$ | |
| 2098 | $C_7H_{15}O$ | F | F | 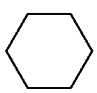 | $OCH_2$ | 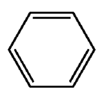 | — | H | F | $OC_4H_9$ | |
| 2099 | $C_2H_5O$ | F | F | 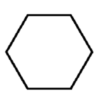 | $OCH_2$ | 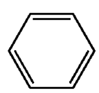 | — | H | F | $OC_6H_{13}$ | |
| 2100 | $CH_3O$ | F | F | 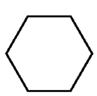 | $OCH_2$ | 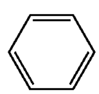 | — | H | F | $C_2H_5$ | |

TABLE 141

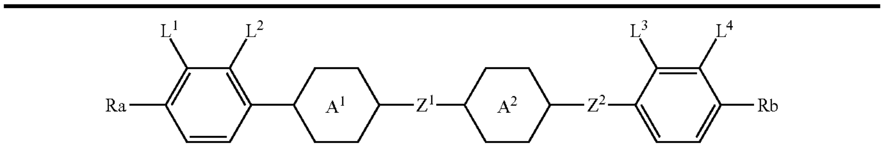

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2101 | $CH_3O$ | F | F | 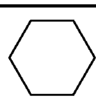 | $OCH_2$ | 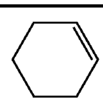 | — | F | F | $OCH_3$ | |
| 2102 | $CH_3O$ | F | F | 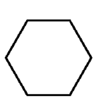 | $OCH_2$ | 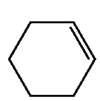 | — | F | F | $OC_2H_5$ | |

TABLE 141-continued

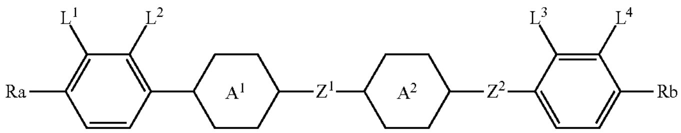

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2103 | $CH_3O$ | F | F | 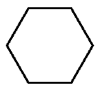 | $OCH_2$ | 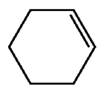 | — | F | F | $OC_3H_7$ | |
| 2104 | $CH_3O$ | F | F | 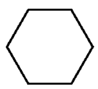 | $OCH_2$ | 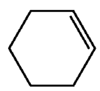 | — | F | F | $OC_4H_9$ | |
| 2105 | $CH_3O$ | F | F | 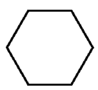 | $OCH_2$ | 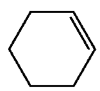 | — | F | F | $OC_5H_{11}$ | |
| 2106 | $C_2H_5O$ | F | F | 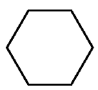 | $OCH_2$ | 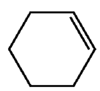 | — | F | F | $OCH_3$ | |
| 2107 | $C_2H_5O$ | F | F | 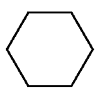 | $OCH_2$ | 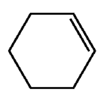 | — | F | F | $OC_2H_5$ | |
| 2108 | $C_2H_5O$ | F | F | 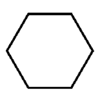 | $OCH_2$ | 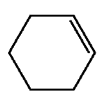 | — | F | F | $OC_3H_7$ | |
| 2109 | $C_2H_5O$ | F | F | 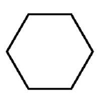 | $OCH_2$ | 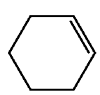 | — | F | F | $OC_4H_9$ | |
| 2110 | $C_2H_5O$ | F | F | 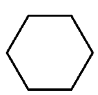 | $OCH_2$ | 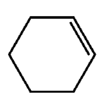 | — | F | F | $OC_5H_{11}$ | |
| 2111 | $C_3H_7O$ | F | F | 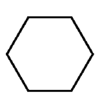 | $OCH_2$ | 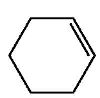 | — | F | F | $OCH_3$ | |
| 2112 | $C_3H_7O$ | F | F | 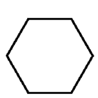 | $OCH_2$ | 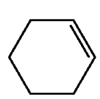 | — | F | F | $OC_2H_5$ | |
| 2113 | $C_3H_7O$ | F | F | 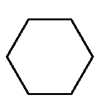 | $OCH_2$ | 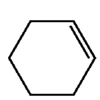 | — | F | F | $OC_3H_7$ | |
| 2114 | $C_3H_7O$ | F | F | 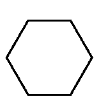 | $OCH_2$ | 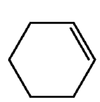 | — | F | F | $OC_4H_9$ | |
| 2115 | $C_3H_7O$ | F | F | 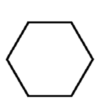 | $OCH_2$ | 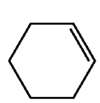 | — | F | F | $OC_5H_{11}$ | |

TABLE 142

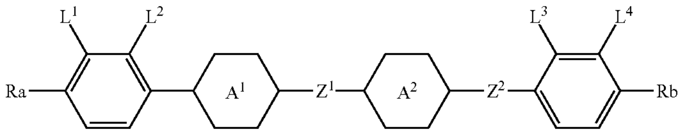

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2116 | $C_4H_9O$ | F | F | 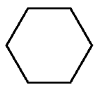 | $OCH_2$ | 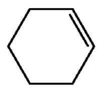 | — | F | F | $OCH_3$ | |
| 2117 | $C_4H_9O$ | F | F | 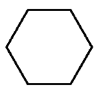 | $OCH_2$ | 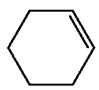 | — | F | F | $OC_2H_5$ | |
| 2118 | $C_4H_9O$ | F | F | 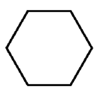 | $OCH_2$ | 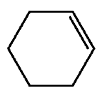 | — | F | F | $OC_3H_7$ | |
| 2119 | $C_4H_9O$ | F | F | 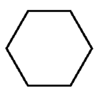 | $OCH_2$ | 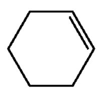 | — | F | F | $OC_4H_9$ | |
| 2120 | $C_4H_9O$ | F | F | 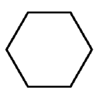 | $OCH_2$ | 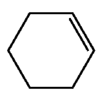 | — | F | F | $OC_5H_{11}$ | |
| 2121 | $C_5H_{11}O$ | F | F | 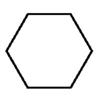 | $OCH_2$ | 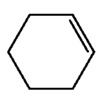 | — | F | F | $OCH_3$ | |
| 2122 | $C_5H_{11}O$ | F | F | 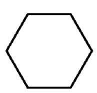 | $OCH_2$ | 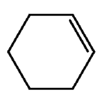 | — | F | F | $OC_2H_5$ | |
| 2123 | $C_5H_{11}O$ | F | F | 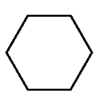 | $OCH_2$ | 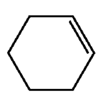 | — | F | F | $OC_3H_7$ | |
| 2124 | $C_5H_{11}O$ | F | F | 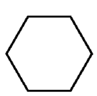 | $OCH_2$ | 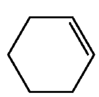 | — | F | F | $OC_4H_9$ | |
| 2125 | $C_5H_{11}O$ | F | F | 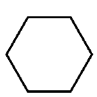 | $OCH_2$ | 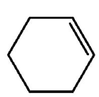 | — | F | F | $OC_5H_{11}$ | |
| 2156 | $C_2H_5$ | F | F | 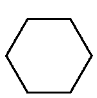 | $OCH_2$ | 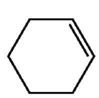 | — | F | F | $C_4H_9$ | |
| 2157 | $C_5H_{11}$ | F | F | 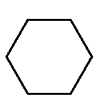 | $OCH_2$ | 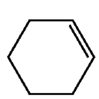 | — | F | F | $C_2H_5$ | |
| 2158 | $C_2H_5$ | F | F | 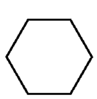 | $OCH_2$ | 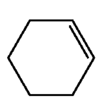 | — | F | F | $OC_4H_9$ | |

TABLE 142-continued

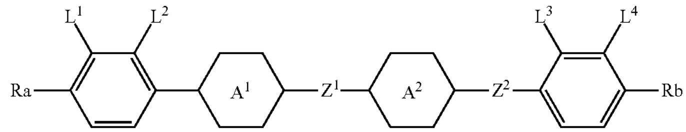

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2159 | $CH_2{=}CH$ | F | F | 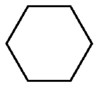 | $OCH_2$ | 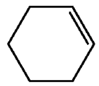 | — | F | F | $OC_3H_7$ | |
| 2160 | $CH_2{=}CH$ | F | F | 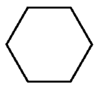 | $OCH_2$ | 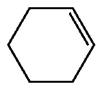 | — | F | F | $OC_5H_{11}$ | |

TABLE 143

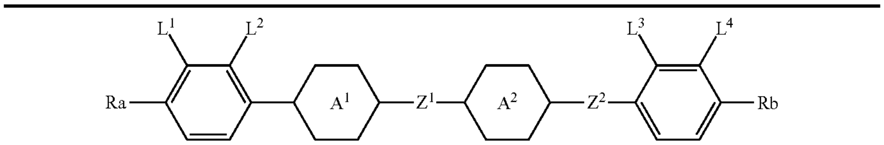

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2161 | $CH_3O$ | F | F | 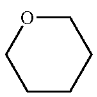 | $OCH_2$ | 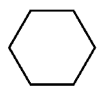 | — | F | F | $OCH_3$ | |
| 2162 | $CH_3O$ | F | F | 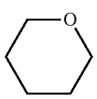 | $OCH_2$ | 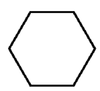 | — | F | F | $OC_2H_5$ | |
| 2163 | $CH_3O$ | F | F | 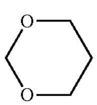 | $OCH_2$ | 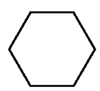 | — | F | F | $OC_3H_7$ | |
| 2164 | $CH_3O$ | F | F | 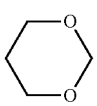 | $OCH_2$ | 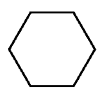 | — | F | F | $OC_4H_9$ | |
| 2165 | $CH_3O$ | F | F | 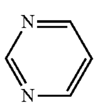 | $OCH_2$ | 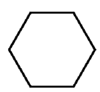 | — | F | F | $OC_5H_{11}$ | |
| 2166 | $C_2H_5O$ | F | F | 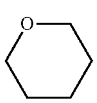 | $OCH_2$ | 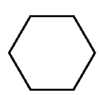 | — | F | F | $OCH_3$ | |
| 2167 | $C_2H_5O$ | F | F | 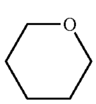 | $OCH_2$ | 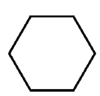 | — | F | F | $OC_2H_5$ | |
| 2168 | $C_2H_5O$ | F | F | 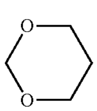 | $OCH_2$ | 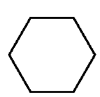 | — | F | F | $OC_3H_7$ | |
| 2169 | $C_2H_5O$ | F | F | 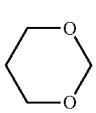 | $OCH_2$ | 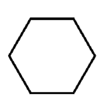 | — | F | F | $OC_4H_9$ | |

TABLE 143-continued

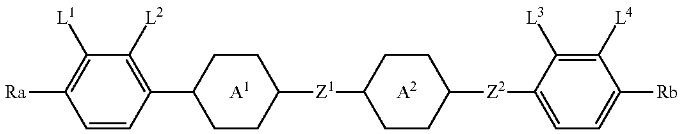

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2170 | $C_2H_5O$ | F | F | 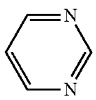 | $OCH_2$ | 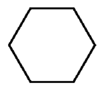 | — | F | F | $OC_5H_{11}$ | |
| 2171 | $C_3H_7O$ | F | F | 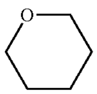 | $OCH_2$ | 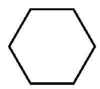 | — | F | F | $OCH_3$ | |
| 2172 | $C_3H_7O$ | F | F | 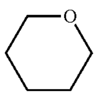 | $OCH_2$ | 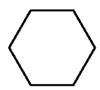 | — | F | F | $OC_2H_5$ | |
| 2173 | $C_3H_7O$ | F | F | 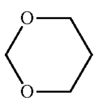 | $OCH_2$ | 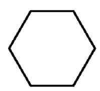 | — | F | F | $OC_3H_7$ | |
| 2174 | $C_3H_7O$ | F | F | 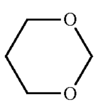 | $OCH_2$ | 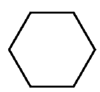 | — | F | F | $OC_4H_9$ | |
| 2175 | $C_3H_7O$ | F | F | 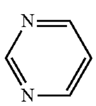 | $OCH_2$ | 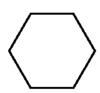 | — | F | F | $OC_5H_{11}$ | |

TABLE 144

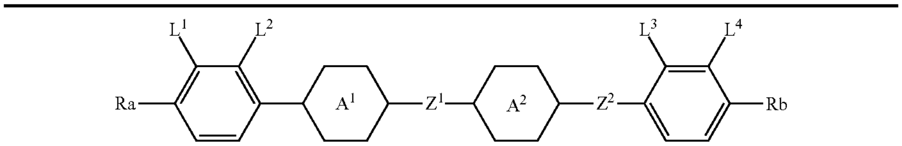

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2176 | $C_4H_9O$ | F | F | 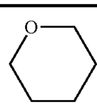 | $OCH_2$ | 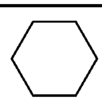 | — | F | F | $OCH_3$ | |
| 2177 | $C_4H_9O$ | F | F | 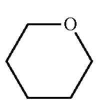 | $OCH_2$ | 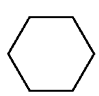 | — | F | F | $OC_2H_5$ | |
| 2178 | $C_4H_9O$ | F | F | 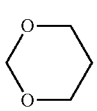 | $OCH_2$ | 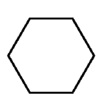 | — | F | F | $OC_3H_7$ | |
| 2179 | $C_4H_9O$ | F | F | 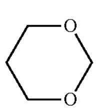 | $OCH_2$ | 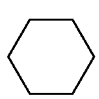 | — | F | F | $OC_4H_9$ | |

TABLE 144-continued
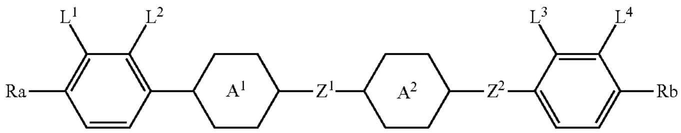
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2180 | $C_4H_9O$ | F | F | 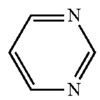 | $OCH_2$ | 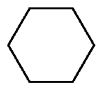 | — | F | F | $OC_5H_{11}$ | |
| 2181 | $C_5H_{11}O$ | F | F | 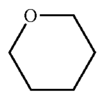 | $OCH_2$ | 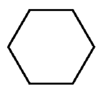 | — | F | F | $OCH_3$ | |
| 2182 | $C_5H_{11}O$ | F | F | 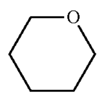 | $OCH_2$ | 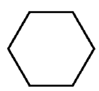 | — | F | F | $OC_2H_5$ | |
| 2183 | $C_5H_{11}O$ | F | F | 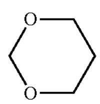 | $OCH_2$ | 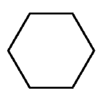 | — | F | F | $OC_3H_7$ | |
| 2184 | $C_5H_{11}O$ | F | F | 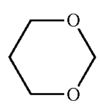 | $OCH_2$ | 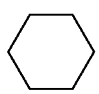 | — | F | F | $OC_4H_9$ | |
| 2185 | $C_5H_{11}O$ | F | F | 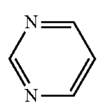 | $OCH_2$ | 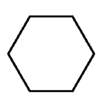 | — | F | F | $OC_5H_{11}$ | |
| 2186 | $C_2H_5$ | F | F | 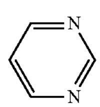 | $OCH_2$ | 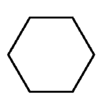 | — | F | F | $C_4H_9$ | |
| 2187 | $C_5H_{11}$ | F | F | 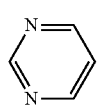 | $OCH_2$ | 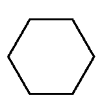 | — | F | F | $C_2H_5$ | |
| 2188 | $C_2H_5$ | F | F | 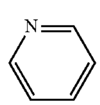 | $OCH_2$ | 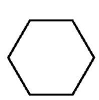 | — | F | F | $OC_4H_9$ | |
| 2189 | $CH_2{=}CH$ | F | F | 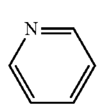 | $OCH_2$ | 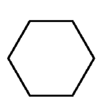 | — | F | F | $OC_3H_7$ | |
| 2190 | $CH_2{=}CH$ | F | F | 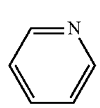 | $OCH_2$ | 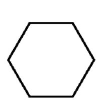 | — | F | F | $OC_5H_{11}$ | |

TABLE 145
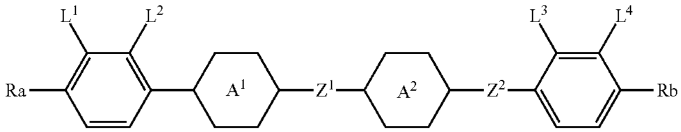
COO = 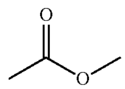
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2191 | $CH_3O$ | F | F | 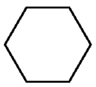 | COO | 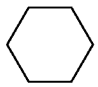 | — | F | F | $OCH_3$ | |
| 2192 | $CH_3O$ | F | F | 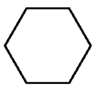 | COO | 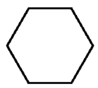 | — | F | F | $OC_2H_5$ | |
| 2193 | $CH_3O$ | F | F | 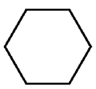 | COO | 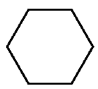 | — | F | F | $OC_3H_7$ | |
| 2194 | $CH_3O$ | F | F | 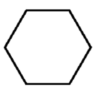 | COO | 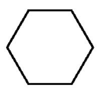 | — | F | F | $OC_4H_9$ | |
| 2195 | $CH_3O$ | F | F | 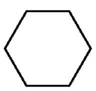 | COO | 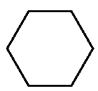 | — | F | F | $OC_5H_{11}$ | |
| 2196 | $C_2HO$ | F | F | 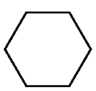 | COO | 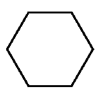 | — | F | F | $OCH_3$ | |
| 2197 | $C_2H_5O$ | F | F | 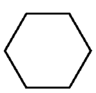 | COO | 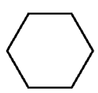 | — | F | F | $OC_2H_5$ | |
| 2198 | $C_2H_5O$ | F | F | 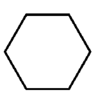 | COO | 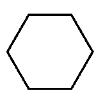 | — | F | F | $OC_3H_7$ | |
| 2199 | $C_2H_5O$ | F | F | 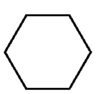 | COO | 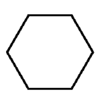 | — | F | F | $OC_4H_9$ | |
| 2200 | $C_2H_5O$ | F | F | 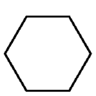 | COO | 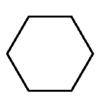 | — | F | F | $OC_5H_{11}$ | |
| 2201 | $C_3H_7O$ | F | F | 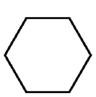 | COO | 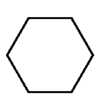 | — | F | F | $OCH_3$ | |
| 2202 | $C_3H_7O$ | F | F | 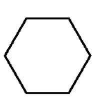 | COO | 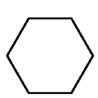 | — | F | F | $OC_2H_5$ | |
| 2203 | $C_3H_7O$ | F | F | 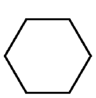 | COO | 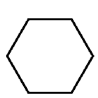 | — | F | F | $OC_3H_7$ | |

TABLE 145-continued

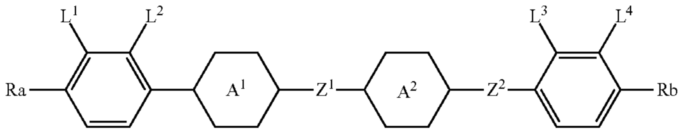

COO = 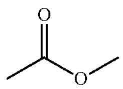

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2204 | $C_3H_7O$ | F | F | 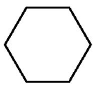 | COO | 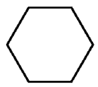 | — | F | F | $OC_4H_9$ | |
| 2205 | $C_3H_7O$ | F | F | 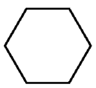 | COO | 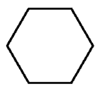 | — | F | F | $OC_5H_{11}$ | |

TABLE 146

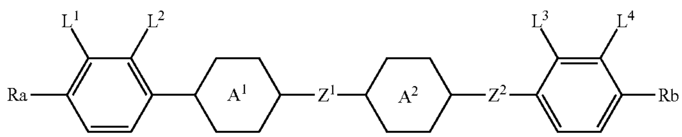

COO = 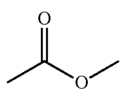

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2206 | $C_4H_9O$ | F | F | 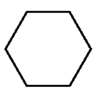 | COO | 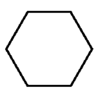 | — | F | F | $OCH_3$ | |
| 2207 | $C_4H_9O$ | F | F | 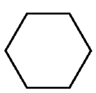 | COO | 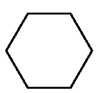 | — | F | F | $OC_2H_5$ | C 108.7 N 244.6 I<br>TNI: 174.6° C., Δ ϵ: −6.95 Δn: 0.136 |
| 2208 | $C_4H_9O$ | F | F | 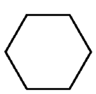 | COO | 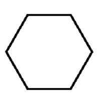 | — | F | F | $OC_3H_7$ | |
| 2209 | $C_4H_9O$ | F | F | 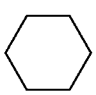 | COO | 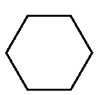 | — | F | F | $OC_4H_9$ | |
| 2210 | $C_4H_9O$ | F | F | 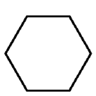 | COO | 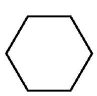 | — | F | F | $OC_5H_{11}$ | |
| 2211 | $C_5H_{11}O$ | F | F | 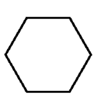 | COO | 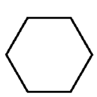 | — | F | F | $OCH_3$ | |
| 2212 | $C_5H_{11}O$ | F | F | 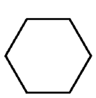 | COO | 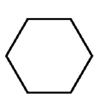 | — | F | F | $OC_2H_5$ | |

TABLE 146-continued
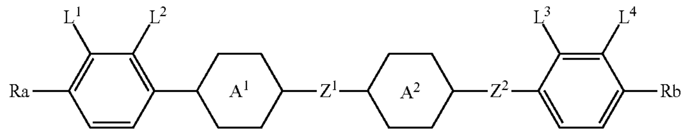
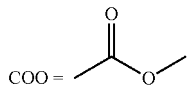
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2213 | $C_5H_{11}O$ | F | F | 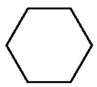 | COO | 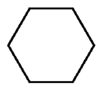 | — | F | F | $OC_3H_7$ | |
| 2214 | $C_5H_{11}O$ | F | F | 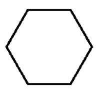 | COO | 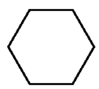 | — | F | F | $OC_4H_9$ | |
| 2215 | $C_5H_{11}O$ | F | F | 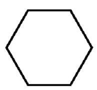 | COO | 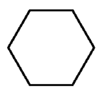 | — | F | F | $OC_5H_{11}$ | |
| 2216 | $C_2H_5$ | F | F | 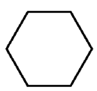 | COO | 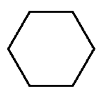 | — | F | F | $C_4H_9$ | |
| 2217 | $C_5H_{11}$ | F | F | 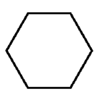 | COO | 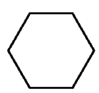 | — | F | F | $C_2H_5$ | |
| 2218 | $C_2H_5$ | F | F | 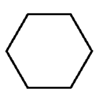 | COO | 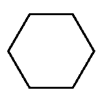 | — | F | F | $OC_4H_9$ | |
| 2219 | $CH_2{=}CH$ | F | F | 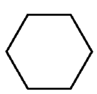 | COO | 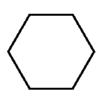 | — | F | F | $OC_3H_7$ | |
| 2220 | $CH_2{=}CH$ | F | F | 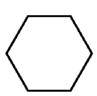 | COO | 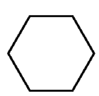 | — | F | F | $OC_5H_{11}$ | |
TABLE 147
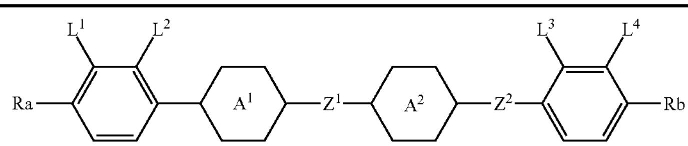
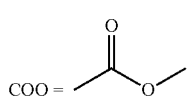
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2221 | $CH_2{=}CHO$ | F | F | 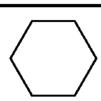 | COO | 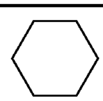 | — | F | F | $OC_3H_7$ | |

TABLE 147-continued

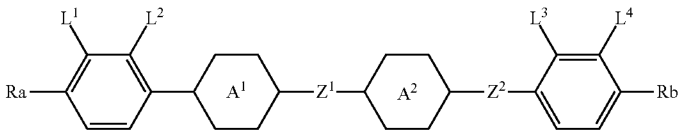

COO = 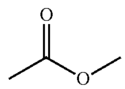

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2222 | $CH_2$═$CHCH_2O$ | F | F | 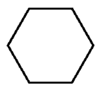 | COO | 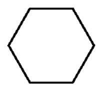 | — | F | F | $OC_5H_{11}$ | |
| 2223 | $CH_2$═$CHCH_2O$ | F | F | 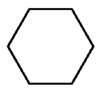 | COO | 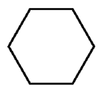 | — | F | F | $OC_3H_7$ | |
| 2224 | $CH_2$═$CHC_2H_5O$ | F | F | 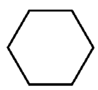 | COO | 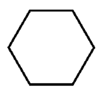 | — | F | F | $OC_5H_{11}$ | |
| 2225 | $CH_2$═$CHC_2H_5O$ | F | F | 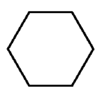 | COO | 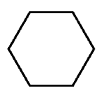 | — | F | F | $OC_2H_5$ | |
| 2226 | $CH_2$═$CHC_2H_5O$ | F | F | 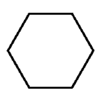 | COO | 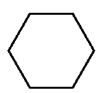 | — | F | F | $OC_3H_7$ | |
| 2227 | $CH_3CH$═$CHCH_2O$ | F | F | 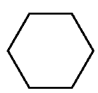 | COO | 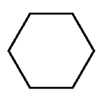 | — | F | F | $OCH_3$ | |
| 2228 | $CH_3CH$═$CHCH_2O$ | F | F | 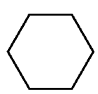 | COO | 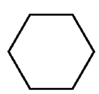 | — | F | F | $OC_2H_5$ | |
| 2229 | $C_3H_7O$ | F | F | 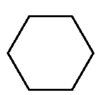 | COO | 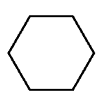 | — | F | F | $OCH$═$CH_2$ | |
| 2230 | $C_3H_7O$ | F | F | 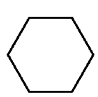 | COO | 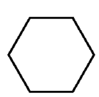 | — | F | F | $OCH_2CH$═$CH_2$ | |
| 2231 | $C_4H_9O$ | F | F | 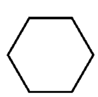 | COO | 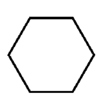 | — | F | F | $OCH_2CH$═$CH_2$ | |
| 2232 | $C_5H_{11}O$ | F | F | 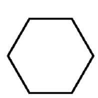 | COO | 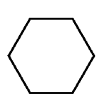 | — | F | F | $OCH_2CH$═$CH_2$ | |
| 2233 | $CH_3O$ | F | F | 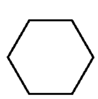 | COO | 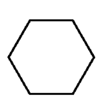 | — | F | F | $OC_2H_5CH$═$CH_2$ | |

TABLE 147-continued

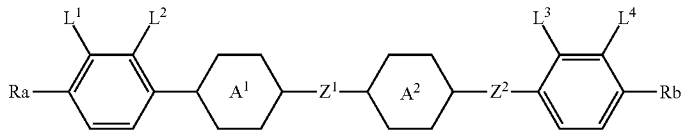

COO = 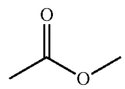

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2234 | $C_2H_5O$ | F | F | 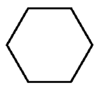 | COO | 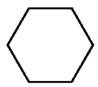 | — | F | F | $OC_2H_5CH{=}CH_2$ | |
| 2235 | $C_3H_7O$ | F | F | 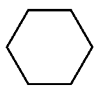 | COO | 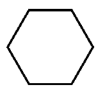 | — | F | F | $OC_2H_5CH{=}CH_2$ | |

TABLE 148

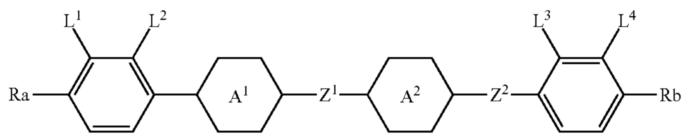

COO = 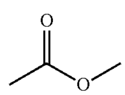

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2236 | $CH_3O$ | F | F | 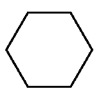 | COO | 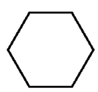 | — | F | F | $OCH_2CH{=}CHCH_3$ | |
| 2237 | $C_2H_5O$ | F | F | 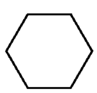 | COO | 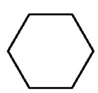 | — | F | F | $OCH_2CH{=}CHCH_3$ | |
| 2238 | $C_3H_7O$ | F | F | 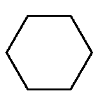 | COO | 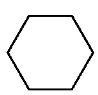 | — | F | F | $OCH_2CH{=}CHCH_3$ | |
| 2239 | $CH_2{=}CHCH_2O$ | F | F | 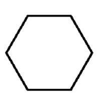 | COO | 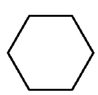 | — | F | F | $OCH{=}CH_2$ | |
| 2240 | $CH_2{=}CHC_2H_5O$ | F | F | 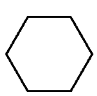 | COO | 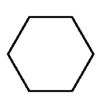 | — | F | F | $OCH_2CH{=}CH_2$ | |
| 2241 | $C_3H_7OCH_2$ | F | F | 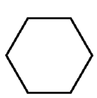 | COO | 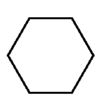 | — | F | F | $OC_3H_7$ | |
| 2242 | $C_5H_{11}O$ | F | F | 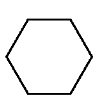 | COO | 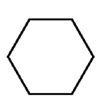 | — | F | F | $OC_2H_5CH{=}CH_2$ | |

TABLE 148-continued
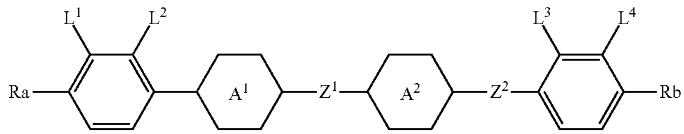
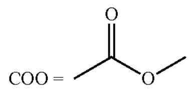
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2243 | $C_3H_7O$ | F | F | 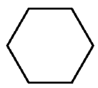 | COO | 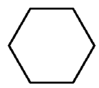 | — | F | F | H | |
| 2244 | $C_5H_{11}O$ | F | F | 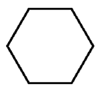 | COO | 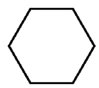 | — | F | F | $OC_9H_{19}$ | |
| 2245 | $C_3H_7O$ | F | F | 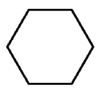 | COO | 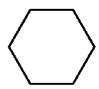 | — | F | F | $C_2H_5$ | |
| 2246 | $C_5H_{11}O$ | F | F | 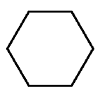 | COO | 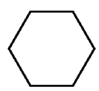 | — | F | F | $C_3H_7$ | |
| 2247 | H | F | F | 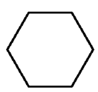 | COO | 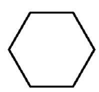 | — | F | F | $OC_4H_9$ | |
| 2248 | $C_7H_{15}O$ | F | F | 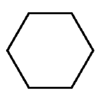 | COO | 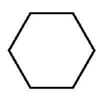 | — | F | F | $OC_4H_9$ | |
| 2249 | $C_2H_5O$ | F | F | 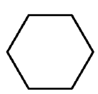 | COO | 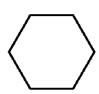 | — | F | F | $OC_6H_{13}$ | |
| 2250 | $CH_3O$ | F | F | 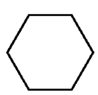 | COO | 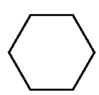 | — | F | F | $C_2H_5$ | |
TABLE 149
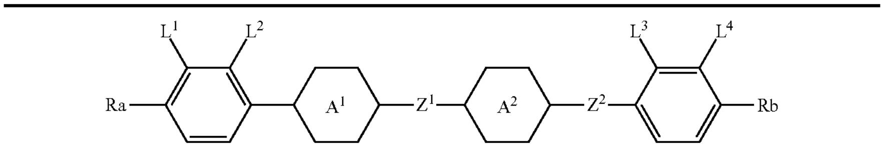
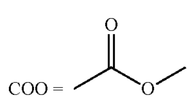
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2251 | $CH_3O$ | F | F | 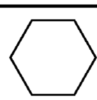 | COO | 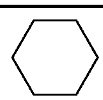 | — | F | H | $OCH_3$ | |

TABLE 149-continued
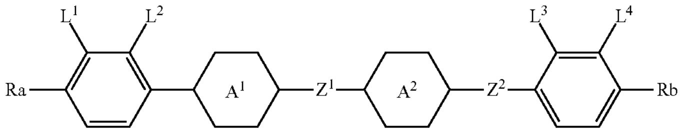
COO = 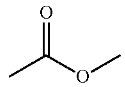
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2252 | $CH_3O$ | F | F | 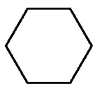 | COO | 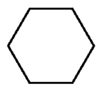 | — | F | H | $OC_2H_5$ | |
| 2253 | $CH_3O$ | F | F | 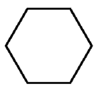 | COO | 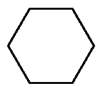 | — | F | H | $OC_3H_7$ | |
| 2254 | $CH_3O$ | F | F | 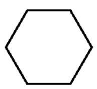 | COO | 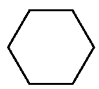 | — | F | H | $OC_4H_9$ | |
| 2255 | $CH_3O$ | F | F | 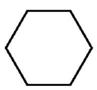 | COO | 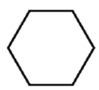 | — | F | H | $OC_5H_{11}$ | |
| 2256 | $C_2H_5O$ | F | F | 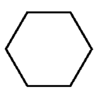 | COO | 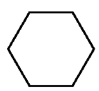 | — | F | H | $OCH_3$ | |
| 2257 | $C_2H_5O$ | F | F | 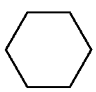 | COO | 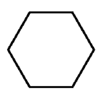 | — | F | H | $OC_2H_5$ | |
| 2258 | $C_2H_5O$ | F | F | 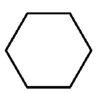 | COO | 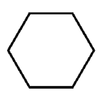 | — | F | H | $OC_3H_7$ | |
| 2259 | $C_2H_5O$ | F | F | 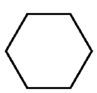 | COO | 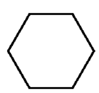 | — | F | H | $OC_4H_9$ | |
| 2260 | $C_2H_5O$ | F | F | 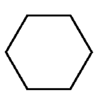 | COO | 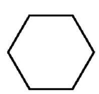 | — | F | H | $OC_5H_{11}$ | |
| 2261 | $C_3H_7O$ | F | F | 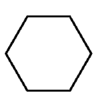 | COO | 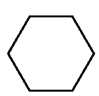 | — | F | H | $OCH_3$ | |
| 2262 | $C_3H_7O$ | F | F | 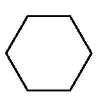 | COO | 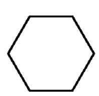 | — | F | H | $OC_2H_5$ | |
| 2263 | $C_3H_7O$ | F | F | 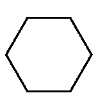 | COO | 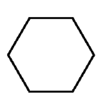 | — | F | H | $OC_3H_7$ | |

TABLE 149-continued

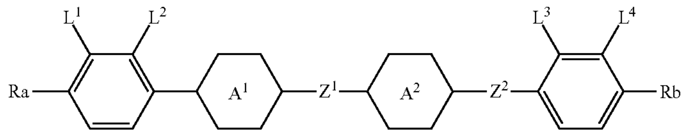

COO = 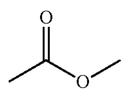

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2264 | $C_3H_7O$ | F | F | 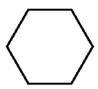 | COO | 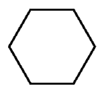 | — | F | H | $OC_4H_9$ | |
| 2265 | $C_3H_7O$ | F | F | 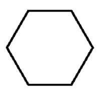 | COO | 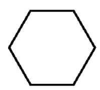 | — | F | H | $OC_5H_{11}$ | |

TABLE 150

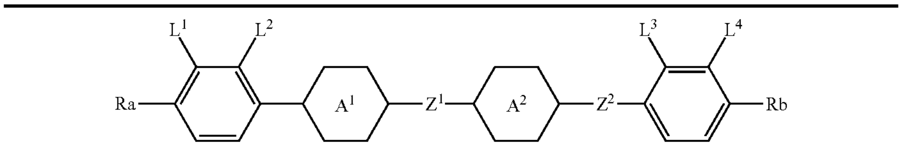

COO = 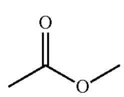

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2266 | $C_4H_9O$ | F | F | 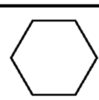 | COO | 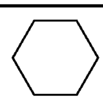 | — | F | H | $OCH_3$ | |
| 2267 | $C_4H_9O$ | F | F | 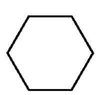 | COO | 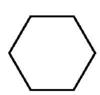 | — | F | H | $OC_2H_5$ | |
| 2268 | $C_4H_9O$ | F | F | 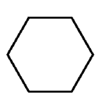 | COO | 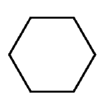 | — | F | H | $OC_3H_7$ | |
| 2269 | $C_4H_9O$ | F | F | 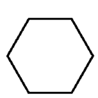 | COO | 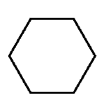 | — | F | H | $OC_4H_9$ | |
| 2270 | $C_4H_9O$ | F | F | 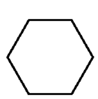 | COO | 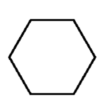 | — | F | H | $OC_5H_{11}$ | |
| 2271 | $C_5H_{11}O$ | F | F | 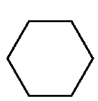 | COO | 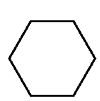 | — | F | H | $OCH_3$ | |
| 2272 | $C_5H_{11}O$ | F | F | 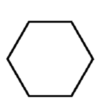 | COO | 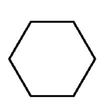 | — | F | H | $OC_2H_5$ | |

TABLE 150-continued

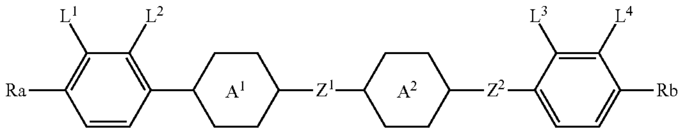

COO = 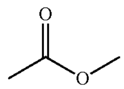

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2273 | $C_5H_{11}O$ | F | F | 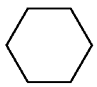 | COO | 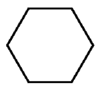 | — | F | H | $OC_3H_7$ | |
| 2274 | $C_5H_{11}O$ | F | F | 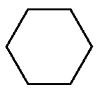 | COO | 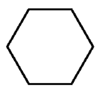 | — | F | H | $OC_4H_9$ | |
| 2275 | $C_5H_{11}O$ | F | F | 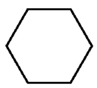 | COO | 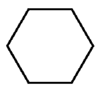 | — | F | H | $OC_5H_{11}$ | |
| 2276 | $C_2H_5$ | F | F | 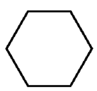 | COO | 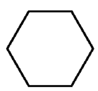 | — | F | H | $C_4H_9$ | |
| 2277 | $C_5H_{11}$ | F | F | 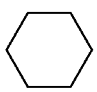 | COO | 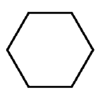 | — | F | H | $C_2H_5$ | |
| 2278 | $C_2H_5$ | F | F | 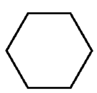 | COO | 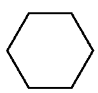 | — | F | H | $OC_4H_9$ | |
| 2279 | $CH_2{=}CH$ | F | F | 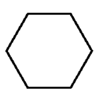 | COO | 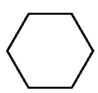 | — | F | H | $OC_3H_7$ | |
| 2280 | $CH_2{=}CH$ | F | F | 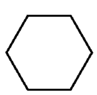 | COO | 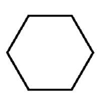 | — | F | H | $OC_5H_{11}$ | |

TABLE 151

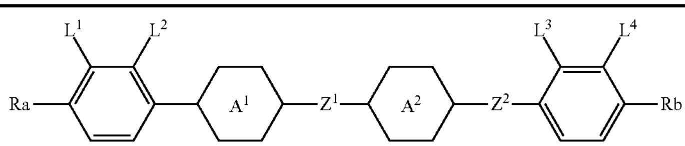

COO = 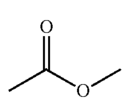

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2281 | $CH_2{=}CHO$ | F | F | 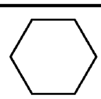 | COO | 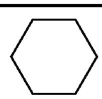 | — | F | H | $OC_3H_7$ | |

TABLE 151-continued

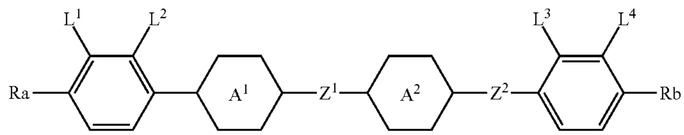

COO = 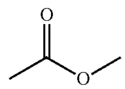

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2282 | $CH_2{=}CHCH_2O$ | F | F | 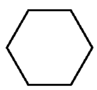 | COO | 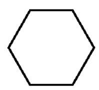 | — | F | H | $OC_5H_{11}$ | |
| 2283 | $CH_2{=}CHCH_2O$ | F | F | 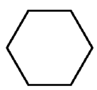 | COO | 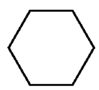 | — | F | H | $OC_3H_7$ | |
| 2284 | $CH_2{=}CHC_2H_5O$ | F | F | 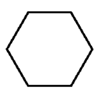 | COO | 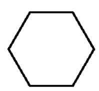 | — | F | H | $OC_5H_{11}$ | |
| 2285 | $CH_2{=}CHC_2H_5O$ | F | F | 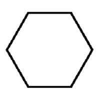 | COO | 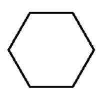 | — | F | H | $OC_2H_5$ | |
| 2286 | $CH_2{=}CHC_2H_5O$ | F | F | 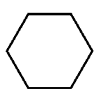 | COO | 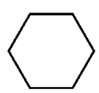 | — | F | H | $OC_3H_7$ | |
| 2287 | $CH_3CH{=}CHCH_2O$ | F | F | 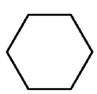 | COO | 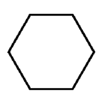 | — | F | H | $OCH_3$ | |
| 2288 | $CH_3CH{=}CHCH_2O$ | F | F | 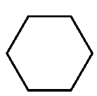 | COO | 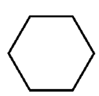 | — | F | H | $OC_2H_5$ | |
| 2289 | $C_3H_7O$ | F | F | 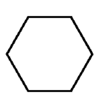 | COO | 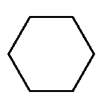 | — | F | H | $OCH{=}CH_2$ | |
| 2290 | $C_3H_7O$ | F | F | 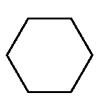 | COO | 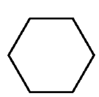 | — | F | H | $OCH_2CH{=}CH_2$ | |
| 2291 | $C_4H_9O$ | F | F | 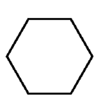 | COO | 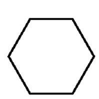 | — | F | H | $OCH_2CH{=}CH_2$ | |
| 2292 | $C_5H_{11}O$ | F | F | 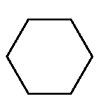 | COO | 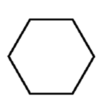 | — | F | H | $OCH_2CH{=}CH_2$ | |
| 2293 | $CH_3O$ | F | F | 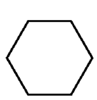 | COO | 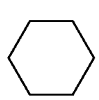 | — | F | H | $OC_2H_5CH{=}CH_2$ | |

TABLE 151-continued

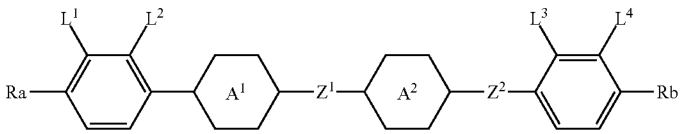

COO = 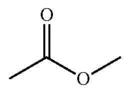

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2294 | $C_2H_5O$ | F | F | 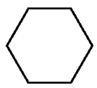 | COO | 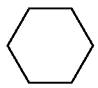 | — | F | H | $OC_2H_5CH{=}CH_2$ | |
| 2295 | $C_3H_7O$ | F | F | 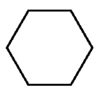 | COO | 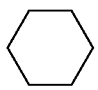 | — | F | H | $OC_2H_5CH{=}CH_2$ | |

TABLE 152

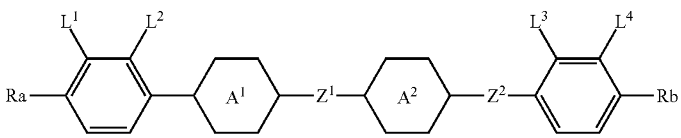

COO = 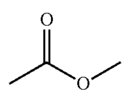

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2296 | $CH_3O$ | F | F | 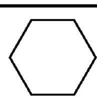 | COO | 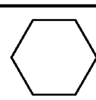 | — | F | H | $OCH_2CH{=}CHCH_3$ | |
| 2297 | $C_2H_5O$ | F | F | 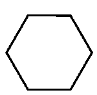 | COO | 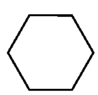 | — | F | H | $OCH_2CH{=}CHCH_3$ | |
| 2298 | $C_3H_7O$ | F | F | 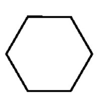 | COO | 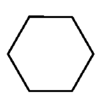 | — | F | H | $OCH_2CH{=}CHCH_3$ | |
| 2299 | $CH_2{=}CHCH_2O$ | F | F | 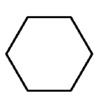 | COO | 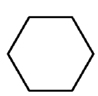 | — | F | H | $OCH{=}CH_2$ | |
| 2300 | $CH_2{=}CHC_2H_5O$ | F | F | 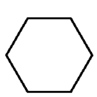 | COO | 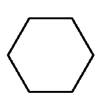 | — | F | H | $OCH_2CH{=}CH_2$ | |
| 2301 | $C_3H_7OCH_2$ | F | F | 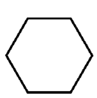 | COO | 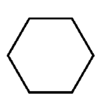 | — | F | H | $OC_3H_7$ | |
| 2302 | $C_5H_{11}O$ | F | F | 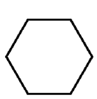 | COO | 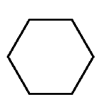 | — | F | H | $OC_2H_5CH{=}CH_2$ | |

TABLE 152-continued
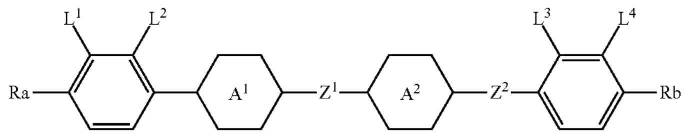
COO = 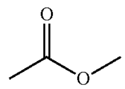
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2303 | $C_3H_7O$ | F | F | 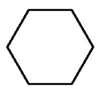 | COO | 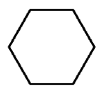 | — | F | H | H | |
| 2304 | $C_5H_{11}O$ | F | F | 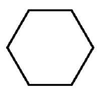 | COO | 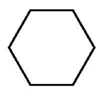 | — | F | H | $OC_9H_{19}$ | |
| 2305 | $C_3H_7O$ | F | F | 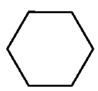 | COO | 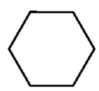 | — | F | H | $C_2H_5$ | |
| 2306 | $C_5H_{11}O$ | F | F | 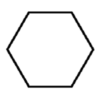 | COO | 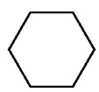 | — | F | H | $C_3H_7$ | |
| 2307 | H | F | F | 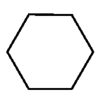 | COO | 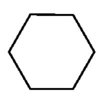 | — | F | H | $OC_4H_9$ | |
| 2308 | $C_7H_{15}O$ | F | F | 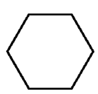 | COO | 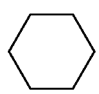 | — | F | H | $OC_4H_9$ | |
| 2309 | $C_2H_5O$ | F | F | 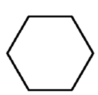 | COO | 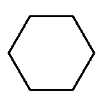 | — | F | H | $OC_6H_{13}$ | |
| 2310 | $CH_3O$ | F | F | 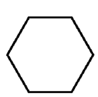 | COO | 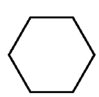 | — | F | H | $C_2H_5$ | |
TABLE 153
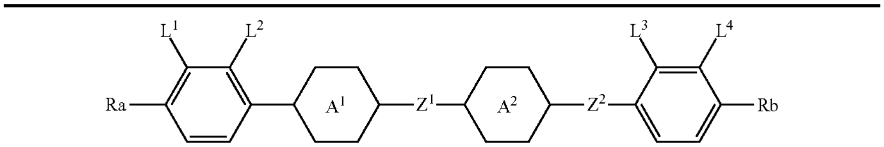
COO = 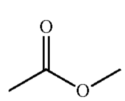
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2311 | $CH_3O$ | F | F | 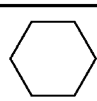 | COO | 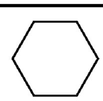 | — | H | F | $OCH_3$ | |

TABLE 153-continued
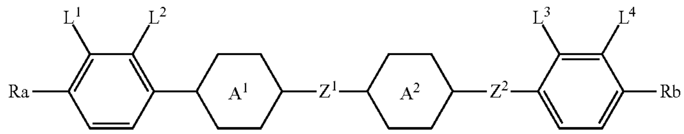
COO = 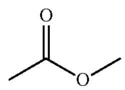
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2312 | $CH_3O$ | F | F | 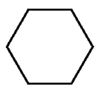 | COO | 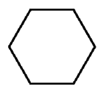 | — | H | F | $OC_2H_5$ | |
| 2313 | $CH_3O$ | F | F | 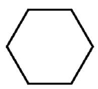 | COO | 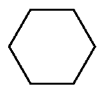 | — | H | F | $OC_3H_7$ | |
| 2314 | $CH_3O$ | F | F | 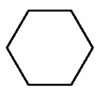 | COO | 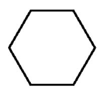 | — | H | F | $OC_4H_9$ | |
| 2315 | $CH_3O$ | F | F | 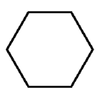 | COO | 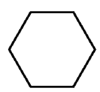 | — | H | F | $OC_5H_{11}$ | |
| 2316 | $C_2H_5O$ | F | F | 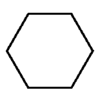 | COO | 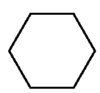 | — | H | F | $OCH_3$ | |
| 2317 | $C_2H_5O$ | F | F | 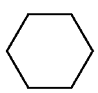 | COO | 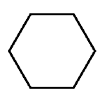 | — | H | F | $OC_2H_5$ | |
| 2318 | $C_2H_5O$ | F | F | 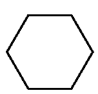 | COO | 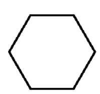 | — | H | F | $OC_3H_7$ | |
| 2319 | $C_2H_5O$ | F | F | 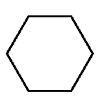 | COO | 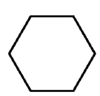 | — | H | F | $OC_4H_9$ | |
| 2320 | $C_2H_5O$ | F | F | 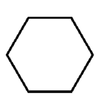 | COO | 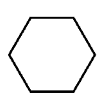 | — | H | F | $OC_5H_{11}$ | |
| 2321 | $C_3H_7O$ | F | F | 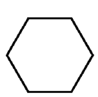 | COO | 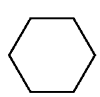 | — | H | F | $OCH_3$ | |
| 2322 | $C_3H_7O$ | F | F | 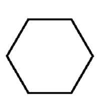 | COO | 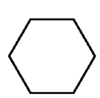 | — | H | F | $OC_2H_5$ | |
| 2323 | $C_3H_7O$ | F | F | 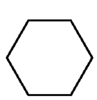 | COO | 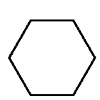 | — | H | F | $OC_3H_7$ | |

TABLE 153-continued

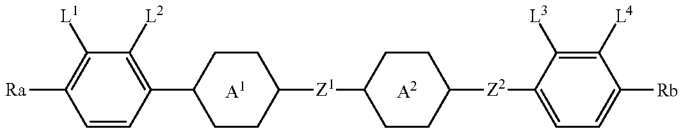

COO = 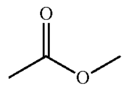

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2324 | $C_3H_7O$ | F | F | 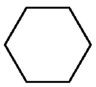 | COO | 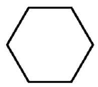 | — | H | F | $OC_4H_9$ | |
| 2325 | $C_3H_7O$ | F | F | 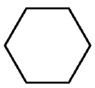 | COO | 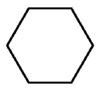 | — | H | F | $OC_5H_{11}$ | |

TABLE 154

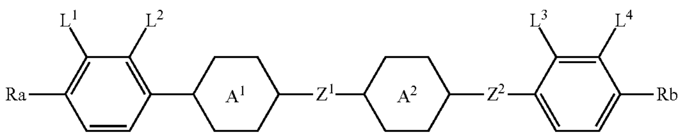

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2326 | $C_4H_9O$ | F | F | 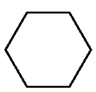 | COO | 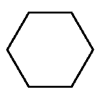 | — | H | F | $OCH_3$ | |
| 2327 | $C_4H_9O$ | F | F | 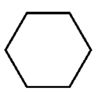 | COO | 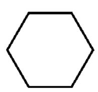 | — | H | F | $OC_2H_5$ | |
| 2328 | $C_4H_9O$ | F | F | 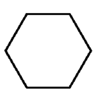 | COO | 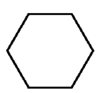 | — | H | F | $OC_3H_7$ | |
| 2329 | $C_4H_9O$ | F | F | 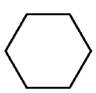 | COO | 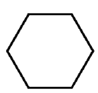 | — | H | F | $OC_4H_9$ | |
| 2330 | $C_4H_9O$ | F | F | 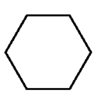 | COO | 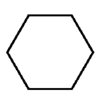 | — | H | F | $OC_5H_{11}$ | |
| 2331 | $C_5H_{11}O$ | F | F | 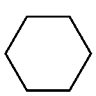 | COO | 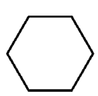 | — | H | F | $OCH_3$ | |
| 2332 | $C_5H_{11}O$ | F | F | 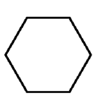 | COO | 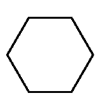 | — | H | F | $OC_2H_5$ | |
| 2333 | $C_5H_{11}O$ | F | F | 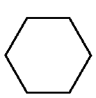 | COO | 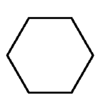 | — | H | F | $OC_3H_7$ | |

TABLE 154-continued

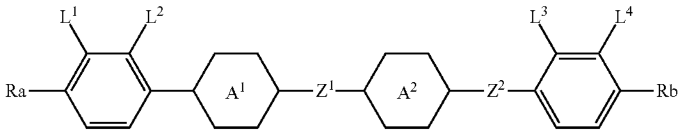

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2334 | $C_5H_{11}O$ | F | F | 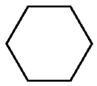 | COO | 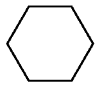 | — | H | F | $OC_4H_9$ | |
| 2335 | $C_5H_{11}O$ | F | F | 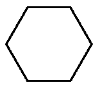 | COO | 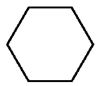 | — | H | F | $OC_5H_{11}$ | |
| 2336 | $C_2H_5$ | F | F | 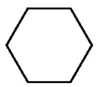 | COO | 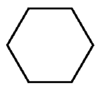 | — | H | F | $C_4H_9$ | |
| 2337 | $C_5H_{11}$ | F | F | 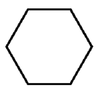 | COO | 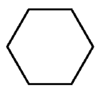 | — | H | F | $C_2H_5$ | |
| 2338 | $C_2H_5$ | F | F | 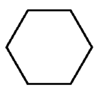 | COO | 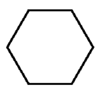 | — | H | F | $OC_4H_9$ | |
| 2339 | $CH_2{=}CH$ | F | F | 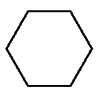 | COO | 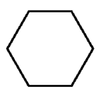 | — | H | F | $OC_3H_7$ | |
| 2340 | $CH_2{=}CH$ | F | F | 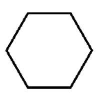 | COO | 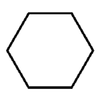 | — | H | F | $OC_5H_{11}$ | |

TABLE 155

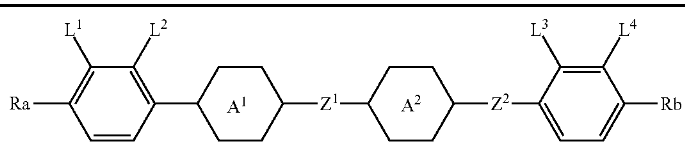

COO = 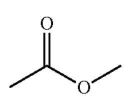

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2341 | $CH_2{=}CHO$ | F | F | 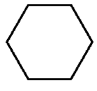 | COO | 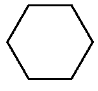 | — | H | F | $OC_3H_7$ | |
| 2342 | $CH_2{=}CHCH_2O$ | F | F | 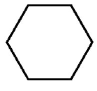 | COO | 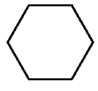 | — | H | F | $OC_5H_{11}$ | |
| 2343 | $CH_2{=}CHCH_2O$ | F | F | 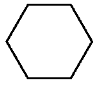 | COO | 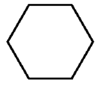 | — | H | F | $OC_3H_7$ | |

TABLE 155-continued

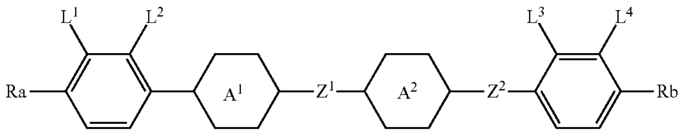

COO = 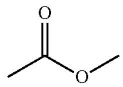

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2344 | $CH_2$═$CHC_2H_5O$ | F | F | 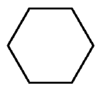 | COO | 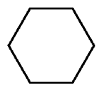 | — | H | F | $OC_5H_{11}$ | |
| 2345 | $CH_2$═$CHC_2H_5O$ | F | F | 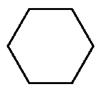 | COO | 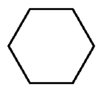 | — | H | F | $OC_2H_5$ | |
| 2346 | $CH_2$═$CHC_2H_5O$ | F | F | 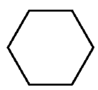 | COO | 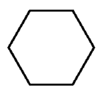 | — | H | F | $OC_3H_7$ | |
| 2347 | $CH_3CH$═$CHCH_2O$ | F | F | 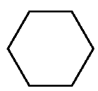 | COO | 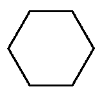 | — | H | F | $OCH_3$ | |
| 2348 | $CH_3CH$═$CHCH_2O$ | F | F | 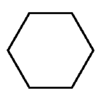 | COO | 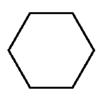 | — | H | F | $OC_2H_5$ | |
| 2349 | $C_3H_7O$ | F | F | 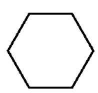 | COO | 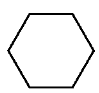 | — | H | F | OCH═$CH_2$ | |
| 2350 | $C_3H_7O$ | F | F | 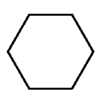 | COO | 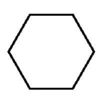 | — | H | F | $OCH_2CH$═$CH_2$ | |
| 2351 | $C_4H_9O$ | F | F | 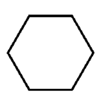 | COO | 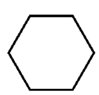 | — | H | F | $OCH_2CH$═$CH_2$ | |
| 2352 | $C_5H_{11}O$ | F | F | 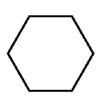 | COO | 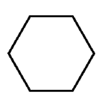 | — | H | F | $OCH_2CH$═$CH_2$ | |
| 2353 | $CH_3O$ | F | F | 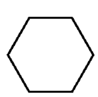 | COO | 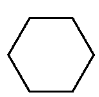 | — | H | F | $OC_2H_5CH$═$CH_2$ | |
| 2354 | $C_2H_5O$ | F | F | 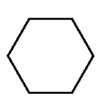 | COO | 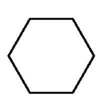 | — | H | F | $OC_2H_5CH$═$CH_2$ | |
| 2355 | $C_3H_7O$ | F | F | 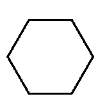 | COO | 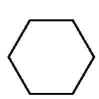 | — | H | F | $OC_2H_5CH$═$CH_2$ | |

TABLE 156

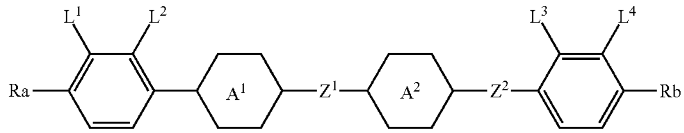

COO = 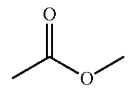

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2356 | $CH_3O$ | F | F | 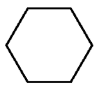 | COO | 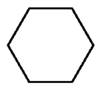 | — | H | F | $OCH_2CH{=}CHCH_3$ | |
| 2357 | $C_2H_5O$ | F | F | 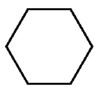 | COO | 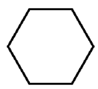 | — | H | F | $OCH_2CH{=}CHCH_3$ | |
| 2358 | $C_3H_7O$ | F | F | 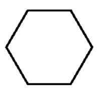 | COO | 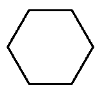 | — | H | F | $OCH_2CH{=}CHCH_3$ | |
| 2359 | $CH_2{=}CHCH_2O$ | F | F | 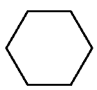 | COO | 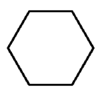 | — | H | F | $OCH{=}CH_2$ | |
| 2360 | $CH_2{=}CHC_2H_5O$ | F | F | 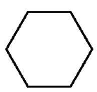 | COO | 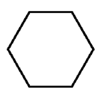 | — | H | F | $OCH_2CH{=}CH_2$ | |
| 2361 | $C_3H_7OCH_2$ | F | F | 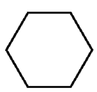 | COO | 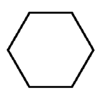 | — | H | F | $OC_3H_7$ | |
| 2362 | $C_5H_{11}O$ | F | F | 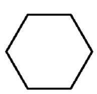 | COO | 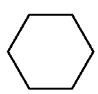 | — | H | F | $OC_2H_5CH{=}CH_2$ | |
| 2363 | $C_3H_7O$ | F | F | 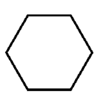 | COO | 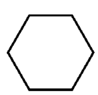 | — | H | F | H | |
| 2364 | $C_5H_{11}O$ | F | F | 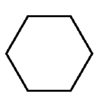 | COO | 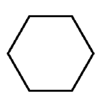 | — | H | F | $OC_9H_{19}$ | |
| 2365 | $C_3H_7O$ | F | F | 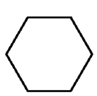 | COO | 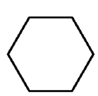 | — | H | F | $C_2H_5$ | |
| 2366 | $C_5H_{11}O$ | F | F | 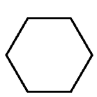 | COO | 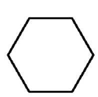 | — | H | F | $C_3H_7$ | |
| 2367 | H | F | F | 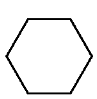 | COO | 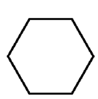 | — | H | F | $OC_4H_9$ | |
| 2368 | $C_7H_{15}O$ | F | F | 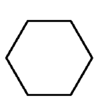 | COO | 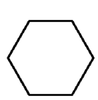 | — | H | F | $OC_4H_9$ | |

TABLE 156-continued
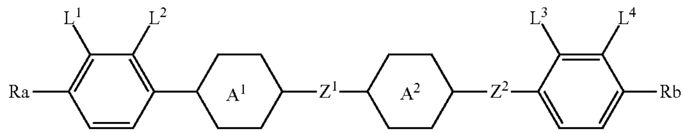
COO = 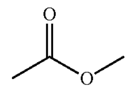
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2369 | $C_2H_5O$ | F | F | 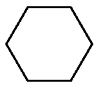 | COO | 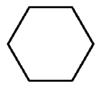 | — | H | F | $OC_6H_{13}$ | |
| 2370 | $CH_3O$ | F | F | 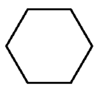 | COO | 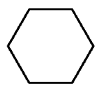 | — | H | F | $C_2H_5$ | |
TABLE 157
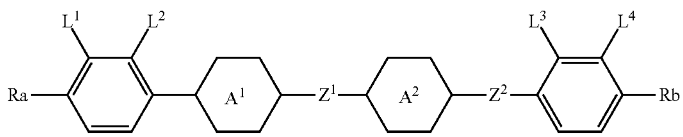
COO = 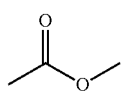
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2371 | $CH_3O$ | F | F | 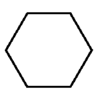 | COO | 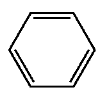 | — | F | F | $OCH_3$ | |
| 2372 | $CH_3O$ | F | F | 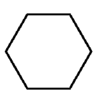 | COO | 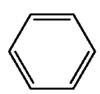 | — | F | F | $OC_2H_5$ | |
| 2373 | $CH_3O$ | F | F | 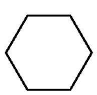 | COO | 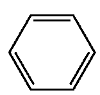 | — | F | F | $OC_3H_7$ | |
| 2374 | $CH_3O$ | F | F | 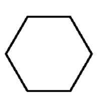 | COO | 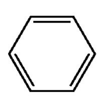 | — | F | F | $OC_4H_9$ | |
| 2375 | $CH_3O$ | F | F | 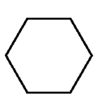 | COO | 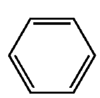 | — | F | F | $OC_5H_{11}$ | |
| 2376 | $C_2H_5O$ | F | F | 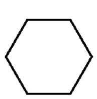 | COO | 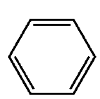 | — | F | F | $OCH_3$ | |
| 2377 | $C_2H_5O$ | F | F | 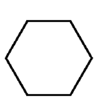 | COO | 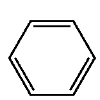 | — | F | F | $OC_2H_5$ | |

TABLE 157-continued

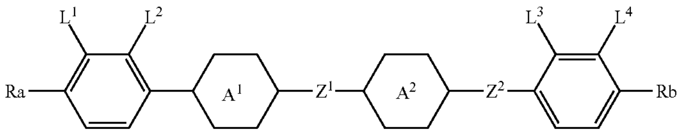

COO = 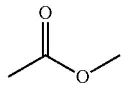

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2378 | $C_2H_5O$ | F | F | 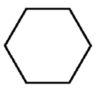 | COO | 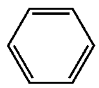 | — | F | F | $OC_3H_7$ | |
| 2379 | $C_2H_5O$ | F | F | 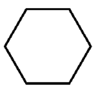 | COO |  | — | F | F | $OC_4H_9$ | C 84.8 N 280.0 I<br>$T_{NI}$: 221.6° C., Δε: −8.61, Δn: 0.185 |
| 2380 | $C_2H_5O$ | F | F | 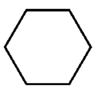 | COO |  | — | F | F | $OC_5H_{11}$ | |
| 2381 | $C_3H_7O$ | F | F | 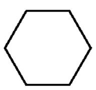 | COO | 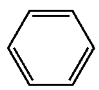 | — | F | F | $OCH_3$ | |
| 2382 | $C_3H_7O$ | F | F | 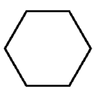 | COO |  | — | F | F | $OC_2H_5$ | |
| 2383 | $C_3H_7O$ | F | F | 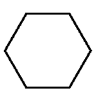 | COO | 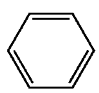 | — | F | F | $OC_3H_7$ | |
| 2384 | $C_3H_7O$ | F | F | 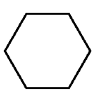 | COO | 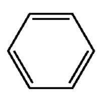 | — | F | F | $OC_4H_9$ | |
| 2385 | $C_3H_7O$ | F | F | 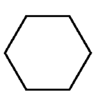 | COO | 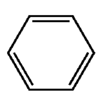 | — | F | F | $OC_5H_{11}$ | |

TABLE 158

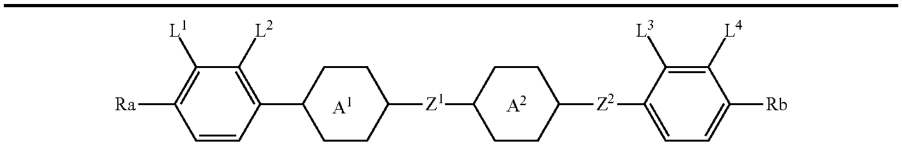

COO = 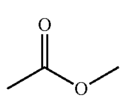

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2386 | $C_4H_9O$ | F | F | 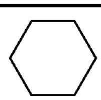 | COO | 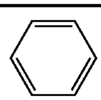 | — | F | F | $OCH_3$ | |

TABLE 158-continued
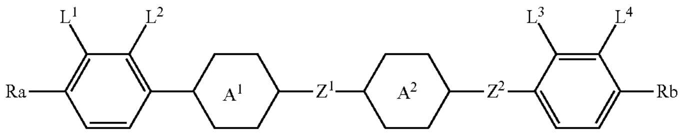
COO = 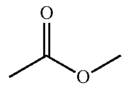
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2387 | $C_4H_9O$ | F | F | 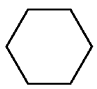 | COO |  | — | F | F | $OC_2H_5$ | |
| 2388 | $C_4H_9O$ | F | F | 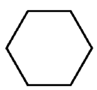 | COO | 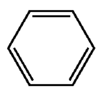 | — | F | F | $OC_3H_7$ | |
| 2389 | $C_4H_9O$ | F | F | 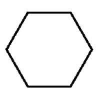 | COO | 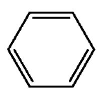 | — | F | F | $OC_4H_9$ | |
| 2390 | $C_4H_9O$ | F | F | 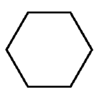 | COO | 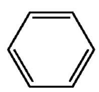 | — | F | F | $OC_5H_{11}$ | |
| 2391 | $C_5H_{11}O$ | F | F | 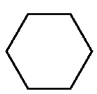 | COO | 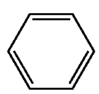 | — | F | F | $OCH_3$ | |
| 2392 | $C_5H_{11}O$ | F | F | 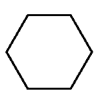 | COO | 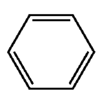 | — | F | F | $OC_2H_5$ | |
| 2393 | $C_5H_{11}O$ | F | F | 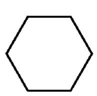 | COO | 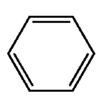 | — | F | F | $OC_3H_7$ | |
| 2394 | $C_5H_{11}O$ | F | F | 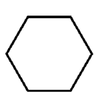 | COO | 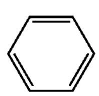 | — | F | F | $OC_4H_9$ | |
| 2395 | $C_5H_{11}O$ | F | F | 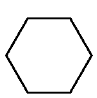 | COO | 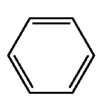 | — | F | F | $OC_5H_{11}$ | |
| 2396 | $C_2H_5$ | F | F | 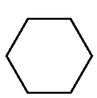 | COO | 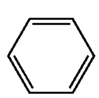 | — | F | F | $C_4H_9$ | |
| 2397 | $C_5H_{11}$ | F | F | 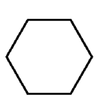 | COO | 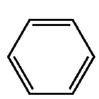 | — | F | F | $C_2H_5$ | |
| 2398 | $C_2H_5$ | F | F | 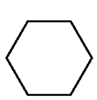 | COO | 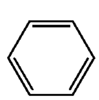 | — | F | F | $OC_4H_9$ | |

TABLE 158-continued

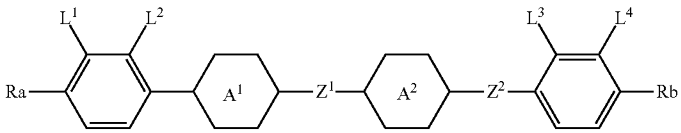

COO = 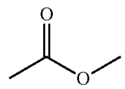

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2399 | $CH_2$=CH | F | F | 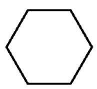 | COO | 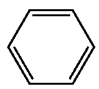 | — | F | F | $OC_3H_7$ | |
| 2400 | $CH_2$=CH | F | F | 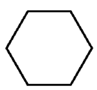 | COO | 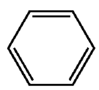 | — | F | F | $OC_5H_{11}$ | |

TABLE 159

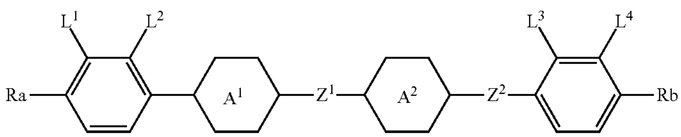

COO = 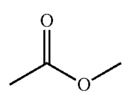

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2401 | $CH_2$=CHO | F | F | 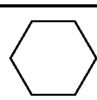 | COO | 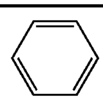 | — | F | F | $OC_3H_7$ | |
| 2402 | $CH_2$=$CHCH_2O$ | F | F | 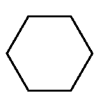 | COO | 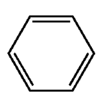 | — | F | F | $OC_5H_{11}$ | |
| 2403 | $CH_2$=$CHCH_2O$ | F | F | 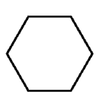 | COO | 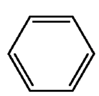 | — | F | F | $OC_3H_7$ | |
| 2404 | $CH_2$=$CHC_2H_5O$ | F | F | 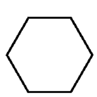 | COO | 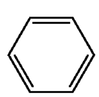 | — | F | F | $OC_5H_{11}$ | |
| 2405 | $CH_2$=$CHC_2H_5O$ | F | F | 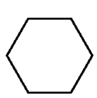 | COO | 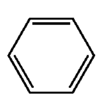 | — | F | F | $OC_2H_5$ | |
| 2406 | $CH_2$=$CHC_2H_5O$ | F | F | 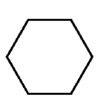 | COO | 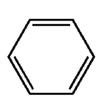 | — | F | F | $OC_3H_7$ | |
| 2407 | $CH_3CH$=$CHCH_2O$ | F | F | 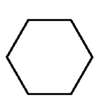 | COO | 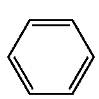 | — | F | F | $OCH_3$ | |

TABLE 159-continued

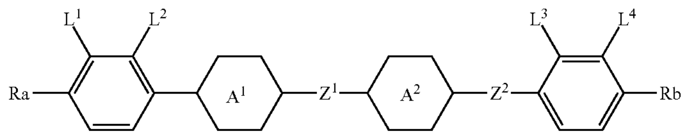

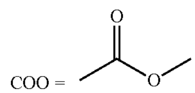

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2408 | $CH_3CH{=}CHCH_2O$ | F | F | 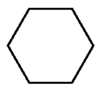 | COO | 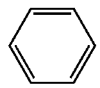 | — | F | F | $OC_2H_5$ | |
| 2409 | $C_3H_7O$ | F | F | 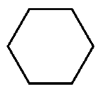 | COO | 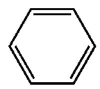 | — | F | F | $OCH{=}CH_2$ | |
| 2410 | $C_3H_7O$ | F | F | 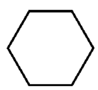 | COO | 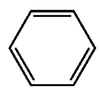 | — | F | F | $OCH_2CH{=}CH_2$ | |
| 2411 | $C_4H_9O$ | F | F | 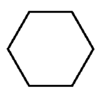 | COO | 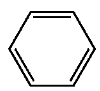 | — | F | F | $OCH_2CH{=}CH_2$ | |
| 2412 | $C_5H_{11}O$ | F | F | 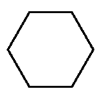 | COO | 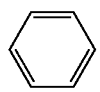 | — | F | F | $OCH_2CH{=}CH_2$ | |
| 2413 | $CH_3O$ | F | F | 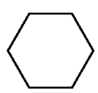 | COO | 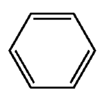 | — | F | F | $OC_2H_5CH{=}CH_2$ | |
| 2414 | $C_2H_5O$ | F | F | 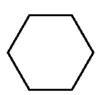 | COO | 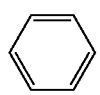 | — | F | F | $OC_2H_5CH{=}CH_2$ | |
| 2415 | $C_3H_7O$ | F | F | 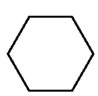 | COO | 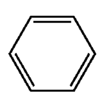 | — | F | F | $OC_2H_5CH{=}CH_2$ | |

TABLE 160

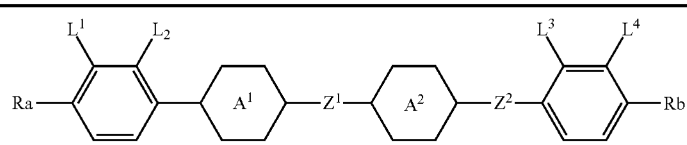

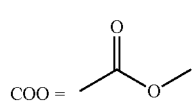

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2416 | $CH_3O$ | F | F | 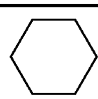 | COO | 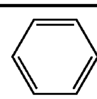 | — | F | F | $OCH_2CH{=}CHCH_3$ | |

TABLE 160-continued

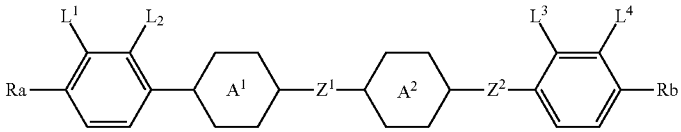

COO = 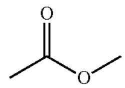

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2417 | $C_2H_5O$ | F | F | 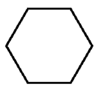 | COO | 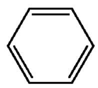 | — | F | F | $OCH_2CH{=}CHCH_3$ | |
| 2418 | $C_3H_7O$ | F | F | 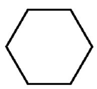 | COO |  | — | F | F | $OCH_2CH{=}CHCH_3$ | |
| 2419 | $CH_2{=}CHCH_2O$ | F | F | 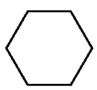 | COO |  | — | F | F | $OCH{=}CH_2$ | |
| 2420 | $CH_2{=}CHC_2H_5O$ | F | F | 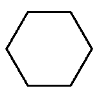 | COO | 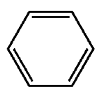 | — | F | F | $OCH_2CH{=}CH_2$ | |
| 2421 | $C_3H_7OCH_2$ | F | F | 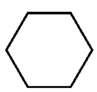 | COO |  | — | F | F | $OC_3H_7$ | |
| 2422 | $C_5H_{11}O$ | F | F | 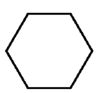 | COO | 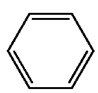 | — | F | F | $OC_2H_5CH{=}CH_2$ | |
| 2423 | $C_3H_7O$ | F | F | 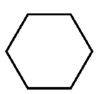 | COO | 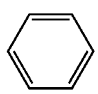 | — | F | F | H | |
| 2424 | $C_5H_{11}O$ | F | F | 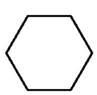 | COO | 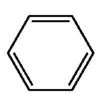 | — | F | F | $OC_9H_{19}$ | |
| 2425 | $C_3H_7O$ | F | F | 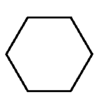 | COO | 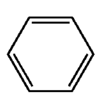 | — | F | F | $C_2H_5$ | |
| 2426 | $C_5H_{11}O$ | F | F | 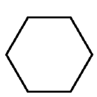 | COO | 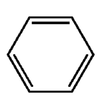 | — | F | F | $C_3H_7$ | |
| 2427 | H | F | F | 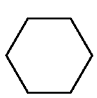 | COO | 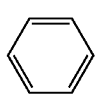 | — | F | F | $OC_4H_9$ | |
| 2428 | $C_7H_{15}O$ | F | F | 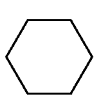 | COO | 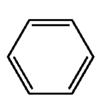 | — | F | F | $OC_4H_9$ | |

TABLE 160-continued
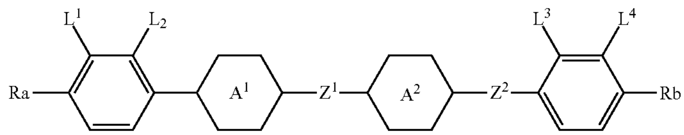
COO = 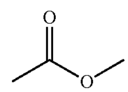
| No. | Ra | L¹ | L² | A¹ | Z¹ | A² | Z² | L³ | L⁴ | Rb | Physical property values |
|---|---|---|---|---|---|---|---|---|---|---|---|
| 2429 | $C_2H_5O$ | F | F | 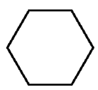 | COO | 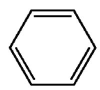 | — | F | F | $OC_6H_{13}$ | |
| 2430 | $CH_3O$ | F | F | 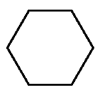 | COO | 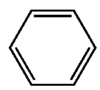 | — | F | F | $C_2H_5$ | |
TABLE 161
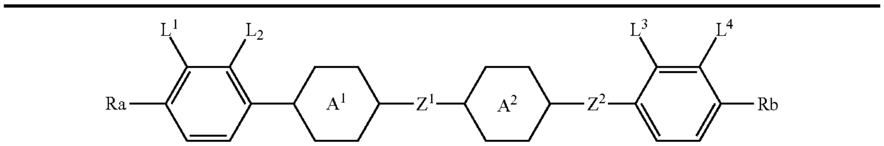
COO = 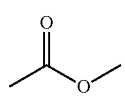
| No. | Ra | L¹ | L² | A¹ | Z¹ | A² | Z² | L³ | L⁴ | Rb | Physical property values |
|---|---|---|---|---|---|---|---|---|---|---|---|
| 2431 | $CH_3O$ | F | F | 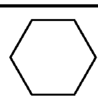 | COO | 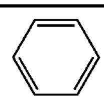 | — | F | H | $OCH_3$ | |
| 2432 | $CH_3O$ | F | F | 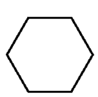 | COO | 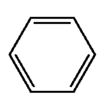 | — | F | H | $OC_2H_5$ | |
| 2433 | $CH_3O$ | F | F | 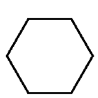 | COO | 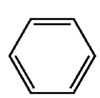 | — | F | H | $OC_3H_7$ | |
| 2434 | $CH_3O$ | F | F | 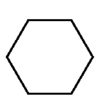 | COO | 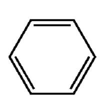 | — | F | H | $OC_4H_9$ | |
| 2435 | $CH_3O$ | F | F | 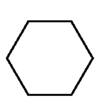 | COO | 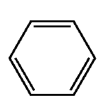 | — | F | H | $OC_5H_{11}$ | |
| 2436 | $C_2H_5O$ | F | F | 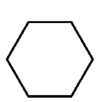 | COO | 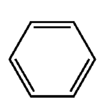 | — | F | H | $OCH_3$ | |
| 2437 | $C_2H_5O$ | F | F | 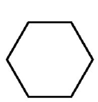 | COO | 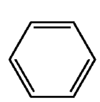 | — | F | H | $OC_2H_5$ | |

TABLE 161-continued

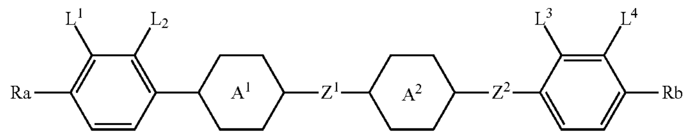

COO = 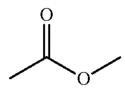

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2438 | $C_2H_5O$ | F | F | 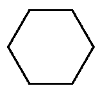 | COO | 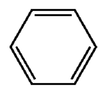 | — | F | H | $OC_3H_7$ | |
| 2439 | $C_2H_5O$ | F | F | 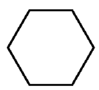 | COO | 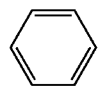 | — | F | H | $OC_4H_9$ | |
| 2440 | $C_2H_5O$ | F | F | 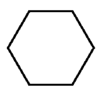 | COO | 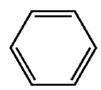 | — | F | H | $OC_5H_{11}$ | |
| 2441 | $C_3H_7O$ | F | F | 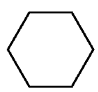 | COO | 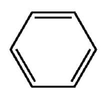 | — | F | H | $OCH_3$ | |
| 2442 | $C_3H_7O$ | F | F | 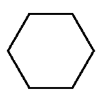 | COO | 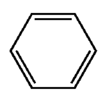 | — | F | H | $OC_2H_5$ | |
| 2443 | $C_3H_7O$ | F | F | 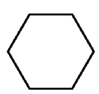 | COO | 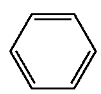 | — | F | H | $OC_3H_7$ | |
| 2444 | $C_3H_7O$ | F | F | 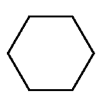 | COO | 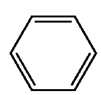 | — | F | H | $OC_4H_9$ | |
| 2445 | $C_3H_7O$ | F | F | 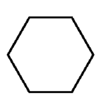 | COO | 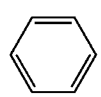 | — | F | H | $OC_5H_{11}$ | |

TABLE 162

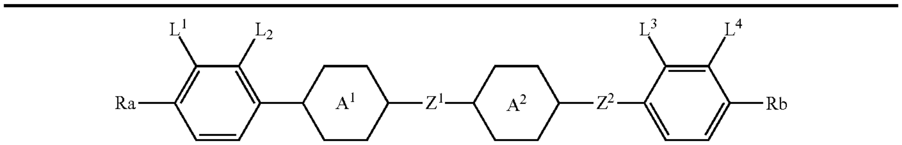

COO = 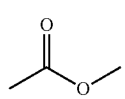

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2446 | $C_4H_9O$ | F | F | 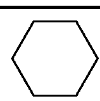 | COO | 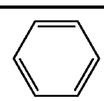 | — | F | H | $OCH_3$ | |

TABLE 162-continued
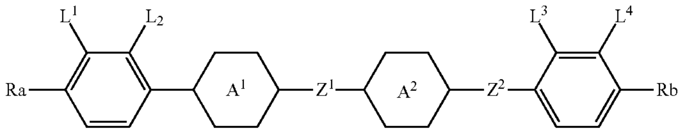
COO = 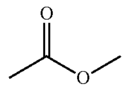
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2447 | $C_4H_9O$ | F | F | 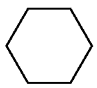 | COO | 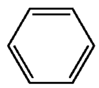 | — | F | H | $OC_2H_5$ | |
| 2448 | $C_4H_9O$ | F | F | 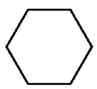 | COO |  | — | F | H | $OC_3H_7$ | |
| 2449 | $C_4H_9O$ | F | F | 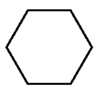 | COO |  | — | F | H | $OC_4H_9$ | |
| 2450 | $C_4H_9O$ | F | F | 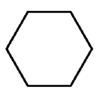 | COO | 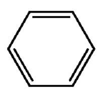 | — | F | H | $OC_5H_{11}$ | |
| 2451 | $C_5H_{11}O$ | F | F | 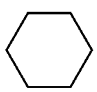 | COO |  | — | F | H | $OCH_3$ | |
| 2452 | $C_5H_{11}O$ | F | F | 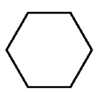 | COO |  | — | F | H | $OC_2H_5$ | |
| 2453 | $C_5H_{11}O$ | F | F | 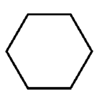 | COO | 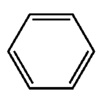 | — | F | H | $OC_3H_7$ | |
| 2454 | $C_5H_{11}O$ | F | F | 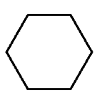 | COO | 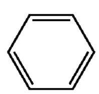 | — | F | H | $OC_4H_9$ | |
| 2455 | $C_5H_{11}O$ | F | F | 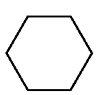 | COO | 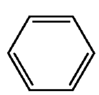 | — | F | H | $OC_5H_{11}$ | |
| 2456 | $C_2H_5$ | F | F | 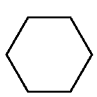 | COO | 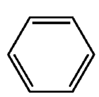 | — | F | H | $C_4H_9$ | |
| 2457 | $C_5H_{11}$ | F | F | 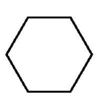 | COO | 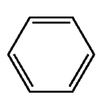 | — | F | H | $C_2H_5$ | |
| 2458 | $C_2H_5$ | F | F | 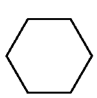 | COO | 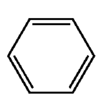 | — | F | H | $OC_4H_9$ | |

TABLE 162-continued

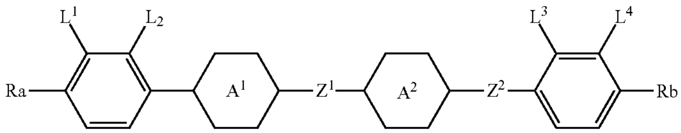

COO = 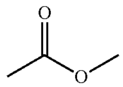

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2459 | $CH_2$═CH | F | F | 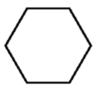 | COO | 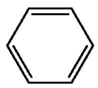 | — | F | H | $OC_3H_7$ | |
| 2460 | $CH_2$═CH | F | F | 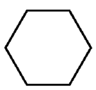 | COO |  | — | F | H | $OC_5H_{11}$ | |

TABLE 163

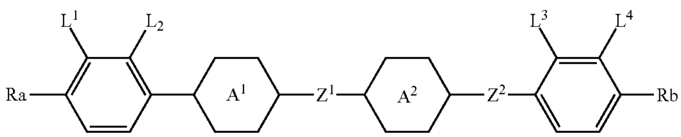

COO = 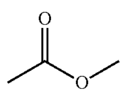

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2461 | $CH_2$═CHO | F | F | 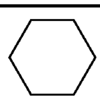 | COO | 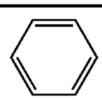 | — | F | H | $OC_3H_7$ | |
| 2462 | $CH_2$═$CHCH_2O$ | F | F | 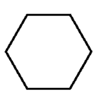 | COO | 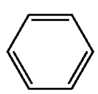 | — | F | H | $OC_5H_{11}$ | |
| 2463 | $CH_2$═$CHCH_2O$ | F | F | 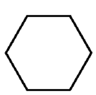 | COO | 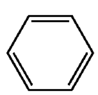 | — | F | H | $OC_3H_7$ | |
| 2464 | $CH_2$═$CHC_2H_5O$ | F | F | 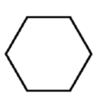 | COO | 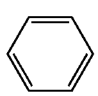 | — | F | H | $OC_5H_{11}$ | |
| 2465 | $CH_2$═$CHC_2H_5O$ | F | F | 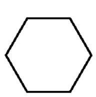 | COO | 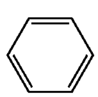 | — | F | H | $OC_2H_5$ | |
| 2466 | $CH_2$═$CHC_2H_5O$ | F | F | 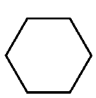 | COO | 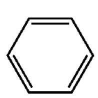 | — | F | H | $OC_3H_7$ | |
| 2467 | $CH_3CH$═$CHCH_2O$ | F | F | 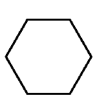 | COO | 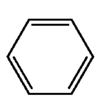 | — | F | H | $OCH_3$ | |

TABLE 163-continued

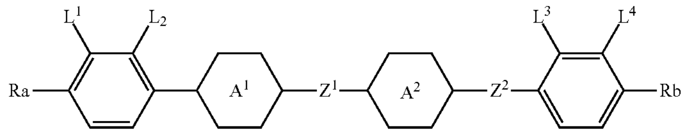

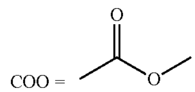

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2468 | $CH_3CH{=}CHCH_2O$ | F | F | 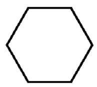 | COO | 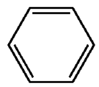 | — | F | H | $OC_2H_5$ | |
| 2469 | $C_3H_7O$ | F | F | 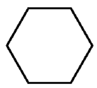 | COO | 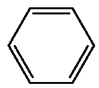 | — | F | H | $OCH{=}CH_2$ | |
| 2470 | $C_3H_7O$ | F | F | 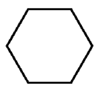 | COO | 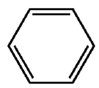 | — | F | H | $OCH_2CH{=}CH_2$ | |
| 2471 | $C_4H_9O$ | F | F | 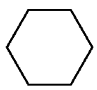 | COO | 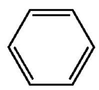 | — | F | H | $OCH_2CH{=}CH_2$ | |
| 2472 | $C_5H_{11}O$ | F | F | 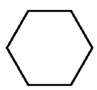 | COO | 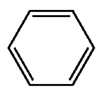 | — | F | H | $OCH_2CH{=}CH_2$ | |
| 2473 | $CH_3O$ | F | F | 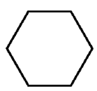 | COO | 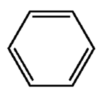 | — | F | H | $OC_2H_5CH{=}CH_2$ | |
| 2474 | $C_2H_5O$ | F | F | 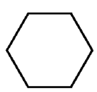 | COO | 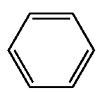 | — | F | H | $OC_2H_5CH{=}CH_2$ | |
| 2475 | $C_3H_7O$ | F | F | 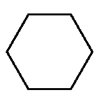 | COO | 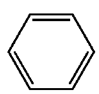 | — | F | H | $OC_2H_5CH{=}CH_2$ | |

TABLE 164

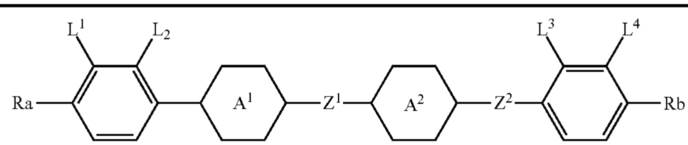

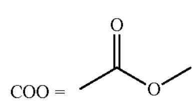

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2476 | $CH_3O$ | F | F | 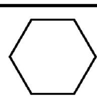 | COO | 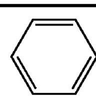 | — | F | H | $OCH_2CH{=}CHCH_3$ | |

TABLE 164-continued

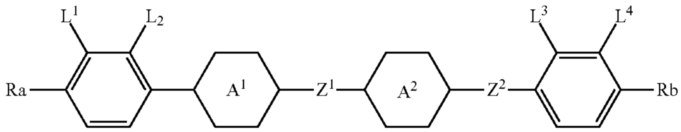

COO = 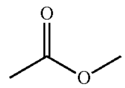

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2477 | $C_2H_5O$ | F | F | 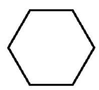 | COO | 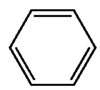 | — | F | H | $OCH_2CH{=}CHCH_3$ | |
| 2478 | $C_3H_7O$ | F | F | 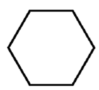 | COO | 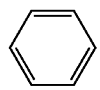 | — | F | H | $OCH_2CH{=}CHCH_3$ | |
| 2479 | $CH_2{=}CHCH_2O$ | F | F | 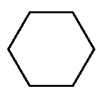 | COO | 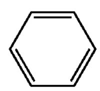 | — | F | H | $OCH{=}CH_2$ | |
| 2480 | $CH_2{=}CHC_2H_5O$ | F | F | 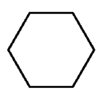 | COO | 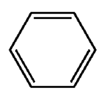 | — | F | H | $OCH_2CH{=}CH_2$ | |
| 2481 | $C_3H_7OCH_2$ | F | F | 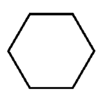 | COO | 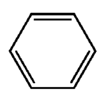 | — | F | H | $OC_3H_7$ | |
| 2482 | $C_5H_{11}O$ | F | F | 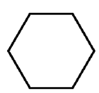 | COO | 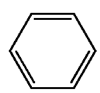 | — | F | H | $OC_2H_5CH{=}CH_2$ | |
| 2483 | $C_3H_7O$ | F | F | 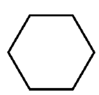 | COO | 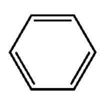 | — | F | H | H | |
| 2484 | $C_5H_{11}O$ | F | F | 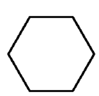 | COO | 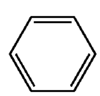 | — | F | H | $OC_9H_{19}$ | |
| 2485 | $C_3H_7O$ | F | F | 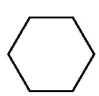 | COO | 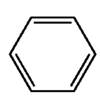 | — | F | H | $C_2H_5$ | |
| 2486 | $C_5H_{11}O$ | F | F | 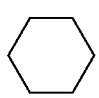 | COO | 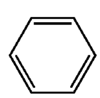 | — | F | H | $C_3H_7$ | |
| 2487 | H | F | F | 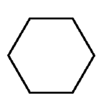 | COO | 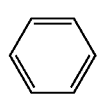 | — | F | H | $OC_4H_9$ | |
| 2488 | $C_7H_{15}O$ | F | F | 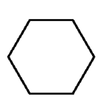 | COO | 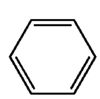 | — | F | H | $OC_4H_9$ | |

TABLE 164-continued
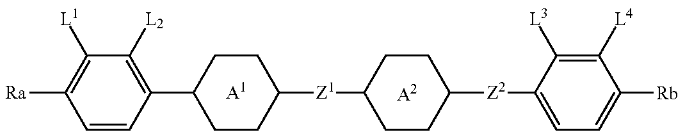
COO = 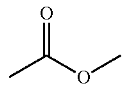
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2489 | $C_2H_5O$ | F | F | 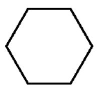 | COO | 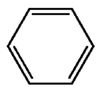 | — | F | H | $OC_6H_{13}$ | |
| 2490 | $CH_3O$ | F | F | 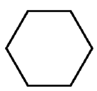 | COO | 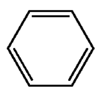 | — | F | H | $C_2H_5$ | |
TABLE 165
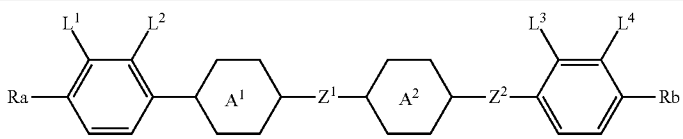
COO = 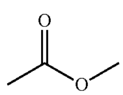
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2491 | $CH_3O$ | F | F | 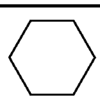 | COO | 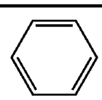 | — | H | F | $OCH_3$ | |
| 2492 | $CH_3O$ | F | F | 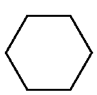 | COO | 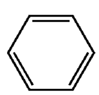 | — | H | F | $OC_2H_5$ | |
| 2493 | $CH_3O$ | F | F | 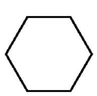 | COO | 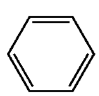 | — | H | F | $OC_3H_7$ | |
| 2494 | $CH_3O$ | F | F | 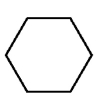 | COO | 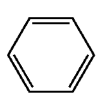 | — | H | F | $OC_4H_9$ | |
| 2495 | $CH_3O$ | F | F | 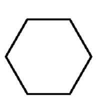 | COO | 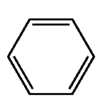 | — | H | F | $OC_5H_{11}$ | |
| 2496 | $C_2H_5O$ | F | F | 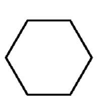 | COO | 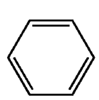 | — | H | F | $OCH_3$ | |
| 2497 | $C_2H_5O$ | F | F | 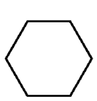 | COO | 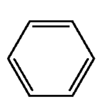 | — | H | F | $OC_2H_5$ | |

TABLE 165-continued

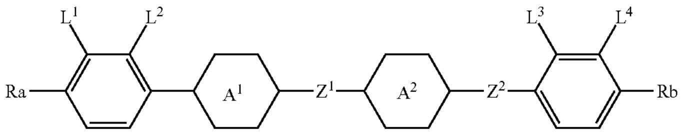

COO = 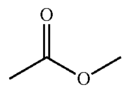

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2498 | $C_2H_5O$ | F | F | 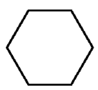 | COO | 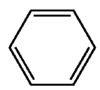 | — | H | F | $OC_3H_7$ | |
| 2499 | $C_2H_5O$ | F | F | 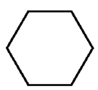 | COO | 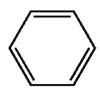 | — | H | F | $OC_4H_9$ | |
| 2500 | $C_2H_5O$ | F | F | 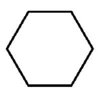 | COO | 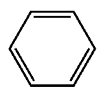 | — | H | F | $OC_5H_{11}$ | |
| 2501 | $C_3H_7O$ | F | F | 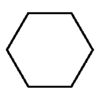 | COO | 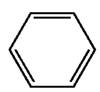 | — | H | F | $OCH_3$ | |
| 2502 | $C_3H_7O$ | F | F | 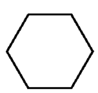 | COO | 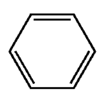 | — | H | F | $OC_2H_5$ | |
| 2503 | $C_3H_7O$ | F | F | 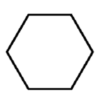 | COO | 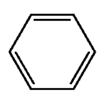 | — | H | F | $OC_3H_7$ | |
| 2504 | $C_3H_7O$ | F | F | 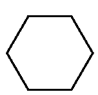 | COO | 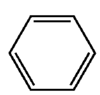 | — | H | F | $OC_4H_9$ | |
| 2505 | $C_3H_7O$ | F | F | 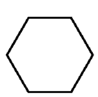 | COO | 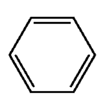 | — | H | F | $OC_5H_{11}$ | |

TABLE 166

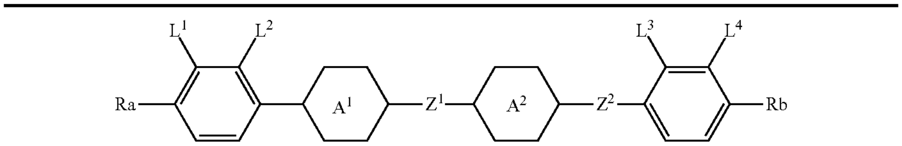

COO = 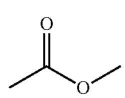

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2506 | $C_4H_9O$ | F | F | 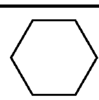 | COO | 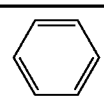 | — | H | F | $OCH_3$ | |

TABLE 166-continued
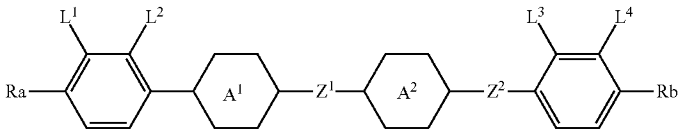
COO = 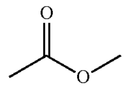
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2507 | $C_4H_9O$ | F | F | 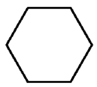 | COO | 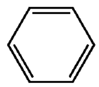 | — | H | F | $OC_2H_5$ | |
| 2508 | $C_4H_9O$ | F | F | 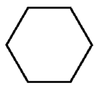 | COO | 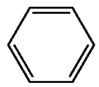 | — | H | F | $OC_3H_7$ | |
| 2509 | $C_4H_9O$ | F | F | 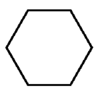 | COO | 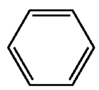 | — | H | F | $OC_4H_9$ | |
| 2510 | $C_4H_9O$ | F | F | 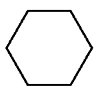 | COO | 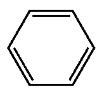 | — | H | F | $OC_5H_{11}$ | |
| 2511 | $C_5H_{11}O$ | F | F | 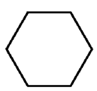 | COO | 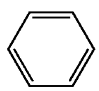 | — | H | F | $OCH_3$ | |
| 2512 | $C_5H_{11}O$ | F | F | 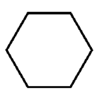 | COO | 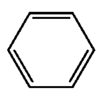 | — | H | F | $OC_2H_5$ | |
| 2513 | $C_5H_{11}O$ | F | F | 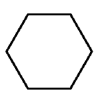 | COO | 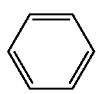 | — | H | F | $OC_3H_7$ | |
| 2514 | $C_5H_{11}O$ | F | F | 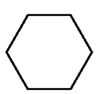 | COO | 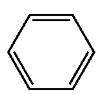 | — | H | F | $OC_4H_9$ | |
| 2515 | $C_5H_{11}O$ | F | F | 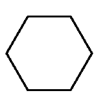 | COO | 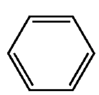 | — | H | F | $OC_5H_{11}$ | |
| 2516 | $C_2H_5$ | F | F | 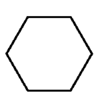 | COO | 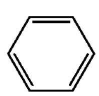 | — | H | F | $C_4H_9$ | |
| 2517 | $C_5H_{11}$ | F | F | 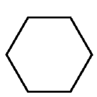 | COO | 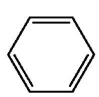 | — | H | F | $C_2H_5$ | |
| 2518 | $C_2H_5$ | F | F | 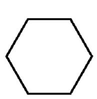 | COO | 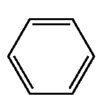 | — | H | F | $OC_4H_9$ | |

TABLE 166-continued

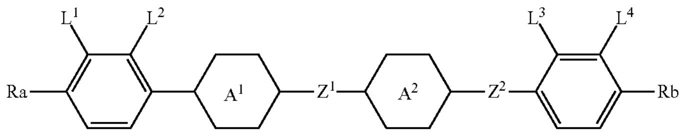

COO = 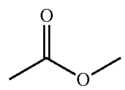

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2519 | $CH_2{=}CH$ | F | F | 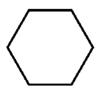 | COO |  | — | H | F | $OC_3H_7$ | |
| 2520 | $CH_2{=}CH$ | F | F | 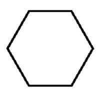 | COO |  | — | H | F | $OC_5H_{11}$ | |

TABLE 167

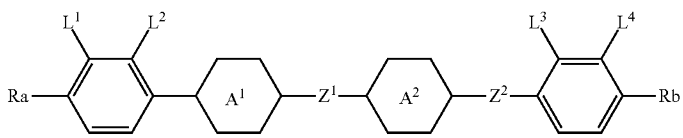

COO = 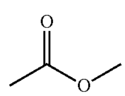

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2521 | $CH_2{=}CHO$ | F | F | 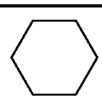 | COO | 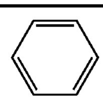 | — | H | F | $OC_3H_7$ | |
| 2522 | $CH_2{=}CHCH_2O$ | F | F | 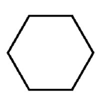 | COO | 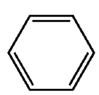 | — | H | F | $OC_5H_{11}$ | |
| 2523 | $CH_2{=}CHCH_2O$ | F | F | 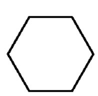 | COO | 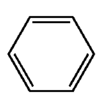 | — | H | F | $OC_3H_7$ | |
| 2524 | $CH_2{=}CHC_2H_5O$ | F | F | 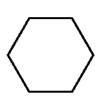 | COO | 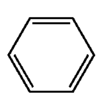 | — | H | F | $OC_5H_{11}$ | |
| 2525 | $CH_2{=}CHC_2H_5O$ | F | F | 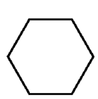 | COO | 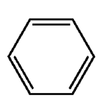 | — | H | F | $OC_2H_5$ | |
| 2526 | $CH_2{=}CHC_2H_5O$ | F | F | 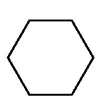 | COO | 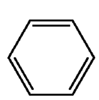 | — | H | F | $OC_3H_7$ | |
| 2527 | $CH_3CH{=}CHCH_2O$ | F | F | 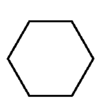 | COO | 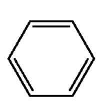 | — | H | F | $OCH_3$ | |

TABLE 167-continued

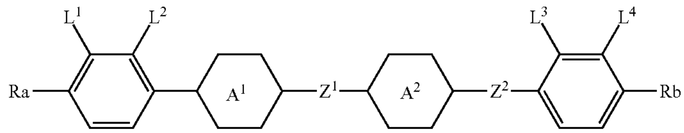

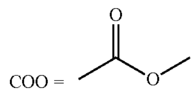

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2528 | $CH_3CH{=}CHCH_2O$ | F | F | 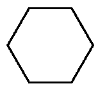 | COO | 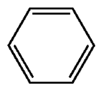 | — | H | F | $OC_2H_5$ | |
| 2529 | $C_3H_7O$ | F | F | 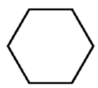 | COO | 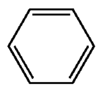 | — | H | F | $OCH{=}CH_2$ | |
| 2530 | $C_3H_7O$ | F | F | 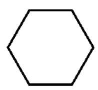 | COO | 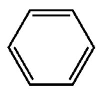 | — | H | F | $OCH_2CH{=}CH_2$ | |
| 2531 | $C_4H_9O$ | F | F | 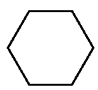 | COO |  | — | H | F | $OCH_2CH{=}CH_2$ | |
| 2532 | $C_5H_{11}O$ | F | F | 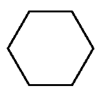 | COO | 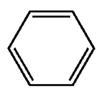 | — | H | F | $OCH_2CH{=}CH_2$ | |
| 2533 | $CH_3O$ | F | F | 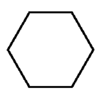 | COO | 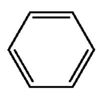 | — | H | F | $OC_2H_5CH{=}CH_2$ | |
| 2534 | $C_2H_5O$ | F | F | 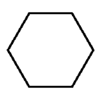 | COO | 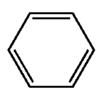 | — | H | F | $OC_2H_5CH{=}CH_2$ | |
| 2535 | $C_3H_7O$ | F | F | 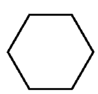 | COO | 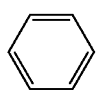 | — | H | F | $OC_2H_5CH{=}CH_2$ | |

TABLE 168

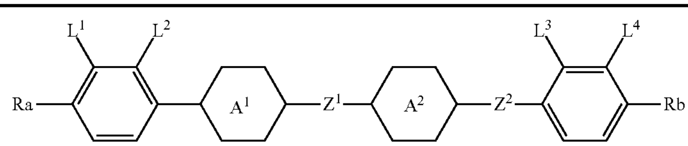

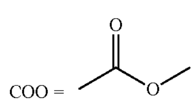

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2536 | $CH_3O$ | F | F | 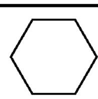 | COO | 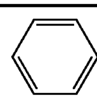 | — | H | F | $OCH_2CH{=}CHCH_3$ | |

TABLE 168-continued

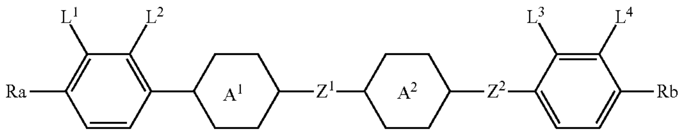

COO = 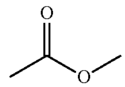

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2537 | $C_2H_5O$ | F | F | 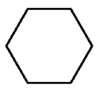 | COO | 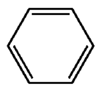 | — | H | F | $OCH_2CH{=}CHCH_3$ | |
| 2538 | $C_3H_7O$ | F | F | 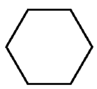 | COO | 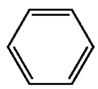 | — | H | F | $OCH_2CH{=}CHCH_3$ | |
| 2539 | $CH_2{=}CHCH_2O$ | F | F | 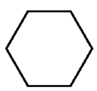 | COO | 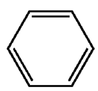 | — | H | F | $OCH{=}CH_2$ | |
| 2540 | $CH_2{=}CHC_2H_5O$ | F | F | 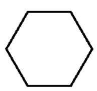 | COO | 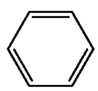 | — | H | F | $OCH_2CH{=}CH_2$ | |
| 2541 | $C_3H_7OCH_2$ | F | F | 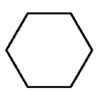 | COO | 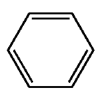 | — | H | F | $OC_3H_7$ | |
| 2542 | $C_5H_{11}O$ | F | F | 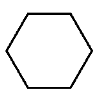 | COO | 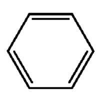 | — | H | F | $OC_2H_5CH{=}CH_2$ | |
| 2543 | $C_3H_7O$ | F | F | 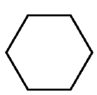 | COO | 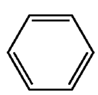 | — | H | F | H | |
| 2544 | $C_5H_{11}O$ | F | F | 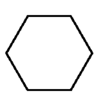 | COO | 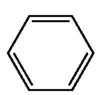 | — | H | F | $OC_9H_{19}$ | |
| 2545 | $C_3H_7O$ | F | F | 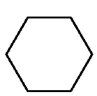 | COO | 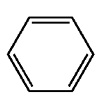 | — | H | F | $C_2H_5$ | |
| 2546 | $C_5H_{11}O$ | F | F | 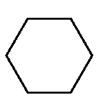 | COO | 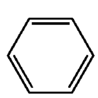 | — | H | F | $C_3H_7$ | |
| 2547 | H | F | F | 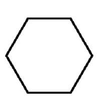 | COO | 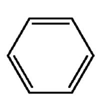 | — | H | F | $OC_4H_9$ | |
| 2548 | $C_7H_{15}O$ | F | F | 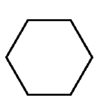 | COO | 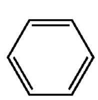 | — | H | F | $OC_4H_9$ | |

TABLE 168-continued
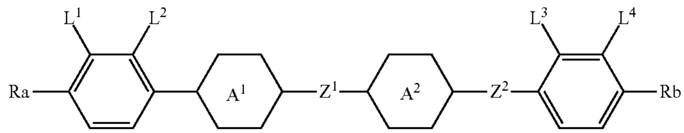
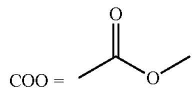
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2549 | $C_2H_5O$ | F | F | 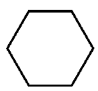 | COO | 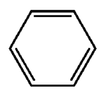 | — | H | F | $OC_6H_{13}$ | |
| 2550 | $CH_3O$ | F | F | 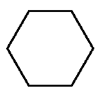 | COO | 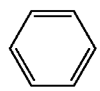 | — | H | F | $C_2H_5$ | |
TABLE 169
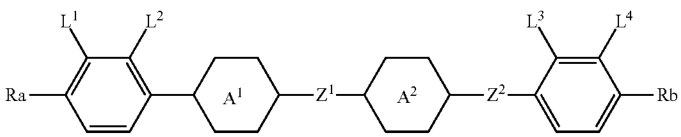
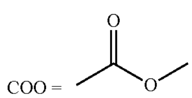
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2551 | $CH_3O$ | F | F | 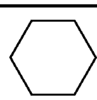 | COO | 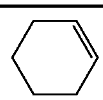 | — | F | F | $OCH_3$ | |
| 2552 | $CH_3O$ | F | F | 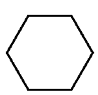 | COO | 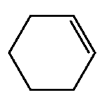 | — | F | F | $OC_2H_5$ | |
| 2553 | $CH_3O$ | F | F | 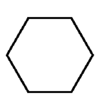 | COO | 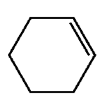 | — | F | F | $OC_3H_7$ | |
| 2554 | $CH_3O$ | F | F | 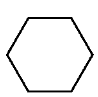 | COO | 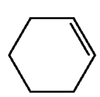 | — | F | F | $OC_4H_9$ | |
| 2555 | $CH_3O$ | F | F | 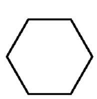 | COO | 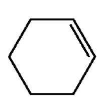 | — | F | F | $OC_5H_{11}$ | |
| 2556 | $C_2H_5O$ | F | F | 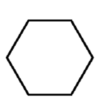 | COO | 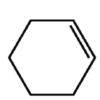 | — | F | F | $OCH_3$ | |
| 2557 | $C_2H_5O$ | F | F | 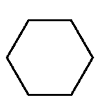 | COO | 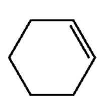 | — | F | F | $OC_2H_5$ | |

TABLE 169-continued

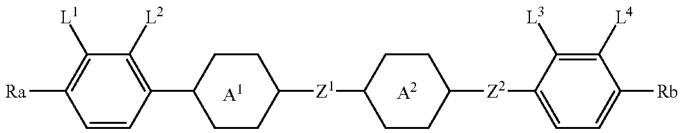

COO = 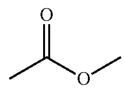

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2558 | $C_2H_5O$ | F | F | 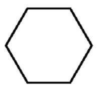 | COO | 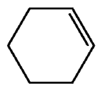 | — | F | F | $OC_3H_7$ | |
| 2559 | $C_2H_5O$ | F | F | 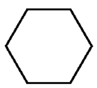 | COO | 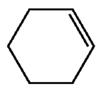 | — | F | F | $OC_4H_9$ | |
| 2560 | $C_2H_5O$ | F | F | 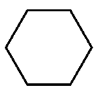 | COO | 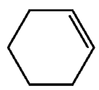 | — | F | F | $OC_5H_{11}$ | |
| 2561 | $C_3H_7O$ | F | F | 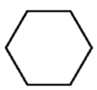 | COO | 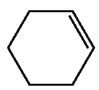 | — | F | F | $OCH_3$ | |
| 2562 | $C_3H_7O$ | F | F | 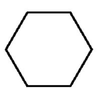 | COO | 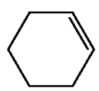 | — | F | F | $OC_2H_5$ | |
| 2563 | $C_3H_7O$ | F | F | 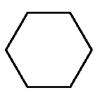 | COO | 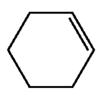 | — | F | F | $OC_3H_7$ | |
| 2564 | $C_3H_7O$ | F | F | 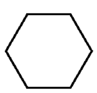 | COO | 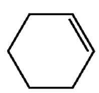 | — | F | F | $OC_4H_9$ | |
| 2565 | $C_3H_7O$ | F | F | 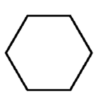 | COO | 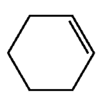 | — | F | F | $OC_5H_{11}$ | |

TABLE 170

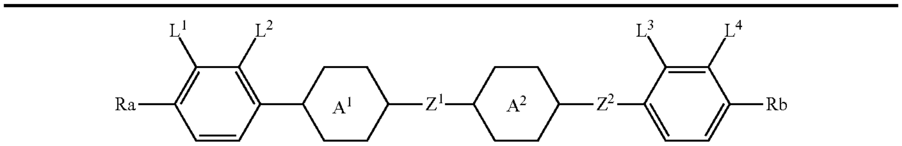

COO = 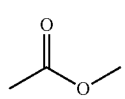

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2566 | $C_4H_9O$ | F | F | 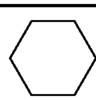 | COO | 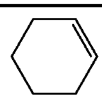 | — | F | F | $OCH_3$ | |

TABLE 170-continued
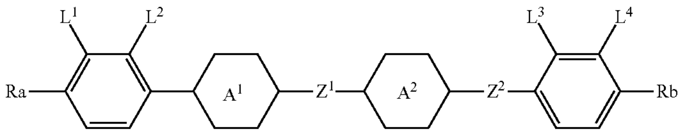
COO = 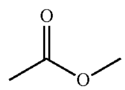
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2567 | $C_4H_9O$ | F | F | 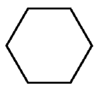 | COO | 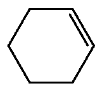 | — | F | F | $OC_2H_5$ | |
| 2568 | $C_4H_9O$ | F | F | 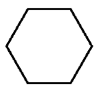 | COO | 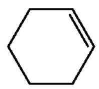 | — | F | F | $OC_3H_7$ | |
| 2569 | $C_4H_9O$ | F | F | 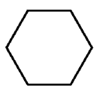 | COO | 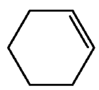 | — | F | F | $OC_4H_9$ | |
| 2570 | $C_4H_9O$ | F | F | 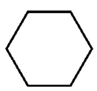 | COO | 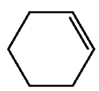 | — | F | F | $OC_5H_{11}$ | |
| 2571 | $C_5H_{11}O$ | F | F | 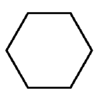 | COO | 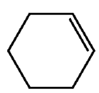 | — | F | F | $OCH_3$ | |
| 2572 | $C_5H_{11}O$ | F | F | 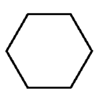 | COO | 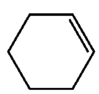 | — | F | F | $OC_2H_5$ | |
| 2573 | $C_5H_{11}O$ | F | F | 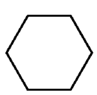 | COO | 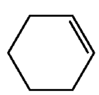 | — | F | F | $OC_3H_7$ | |
| 2574 | $C_5H_{11}O$ | F | F | 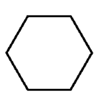 | COO | 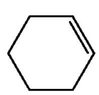 | — | F | F | $OC_4H_9$ | |
| 2575 | $C_5H_{11}O$ | F | F | 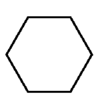 | COO | 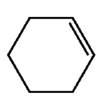 | — | F | F | $OC_5H_{11}$ | |
| 2576 | $C_2H_5$ | F | F | 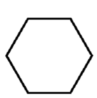 | COO | 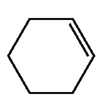 | — | F | F | $C_4H_9$ | |
| 2577 | $C_5H_{11}$ | F | F | 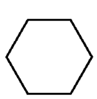 | COO | 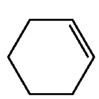 | — | F | F | $C_2H_5$ | |
| 2578 | $C_2H_5$ | F | F | 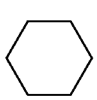 | COO | 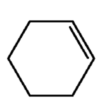 | — | F | F | $OC_4H_9$ | |

TABLE 170-continued

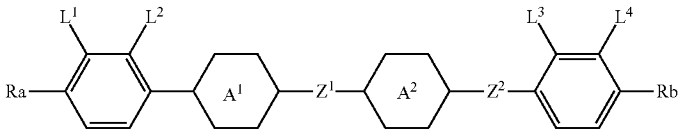

COO = 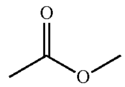

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2579 | $CH_2$=CH | F | F | 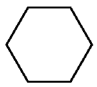 | COO | 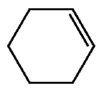 | — | F | F | $OC_3H_7$ | |
| 2580 | $CH_2$=CH | F | F | 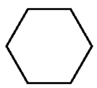 | COO | 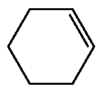 | — | F | F | $OC_5H_{11}$ | |

TABLE 171

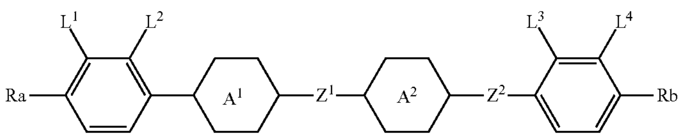

COO = 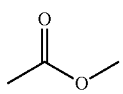

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2581 | $CH_3O$ | F | F | 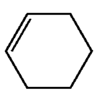 | COO | 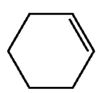 | — | F | F | $OCH_3$ | |
| 2582 | $CH_3O$ | F | F | 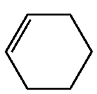 | COO | 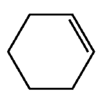 | — | F | F | $OC_2H_5$ | |
| 2583 | $CH_3O$ | F | F | 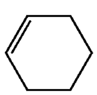 | COO | 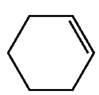 | — | F | F | $OC_3H_7$ | |
| 2584 | $CH_3O$ | F | F | 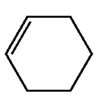 | COO | 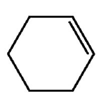 | — | F | F | $OC_4H_9$ | |
| 2585 | $CH_3O$ | F | F | 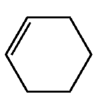 | COO | 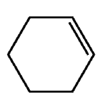 | — | F | F | $OC_5H_{11}$ | |
| 2586 | $C_2H_5O$ | F | F | 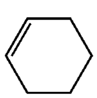 | COO | 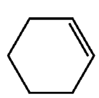 | — | F | F | $OCH_3$ | |
| 2587 | $C_2H_5O$ | F | F | 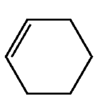 | COO | 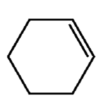 | — | F | F | $OC_2H_5$ | |

TABLE 171-continued

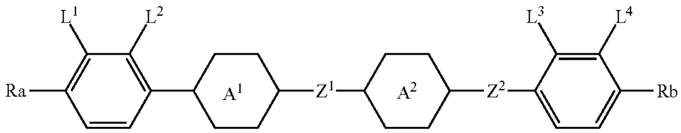

COO = 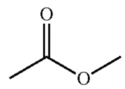

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2588 | $C_2H_5O$ | F | F | 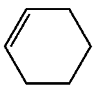 | COO | 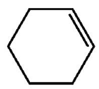 | — | F | F | $OC_3H_7$ | |
| 2589 | $C_2H_5O$ | F | F | 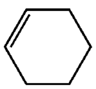 | COO | 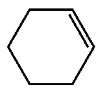 | — | F | F | $OC_4H_9$ | |
| 2590 | $C_2H_5O$ | F | F | 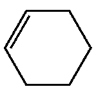 | COO | 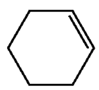 | — | F | F | $OC_5H_{11}$ | |
| 2591 | $C_3H_7O$ | F | F | 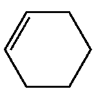 | COO | 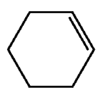 | — | F | F | $OCH_3$ | |
| 2592 | $C_3H_7O$ | F | F | 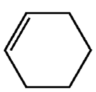 | COO | 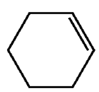 | — | F | F | $OC_2H_5$ | |
| 2593 | $C_3H_7O$ | F | F | 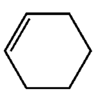 | COO | 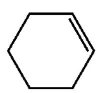 | — | F | F | $OC_3H_7$ | |
| 2594 | $C_3H_7O$ | F | F | 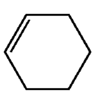 | COO | 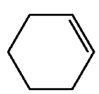 | — | F | F | $OC_4H_9$ | |
| 2595 | $C_3H_7O$ | F | F | 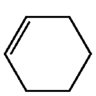 | COO | 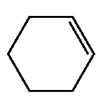 | — | F | F | $OC_5H_{11}$ | |

TABLE 172

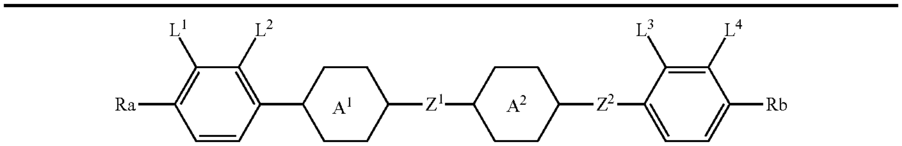

COO = 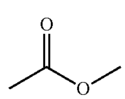

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2596 | $C_4H_9O$ | F | F | 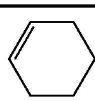 | COO | 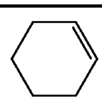 | — | F | F | $OCH_3$ | |

TABLE 172-continued
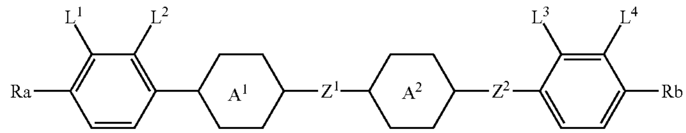
COO = 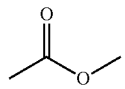
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2597 | $C_4H_9O$ | F | F | 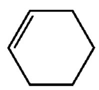 | COO | 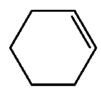 | — | F | F | $OC_2H_5$ | |
| 2598 | $C_4H_9O$ | F | F | 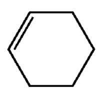 | COO | 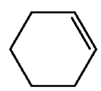 | — | F | F | $OC_3H_7$ | |
| 2599 | $C_4H_9O$ | F | F | 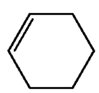 | COO | 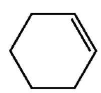 | — | F | F | $OC_4H_9$ | |
| 2600 | $C_4H_9O$ | F | F | 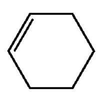 | COO | 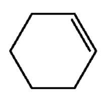 | — | F | F | $OC_5H_{11}$ | |
| 2601 | $C_5H_{11}O$ | F | F | 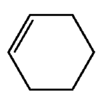 | COO | 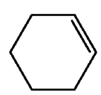 | — | F | F | $OCH_3$ | |
| 2602 | $C_5H_{11}O$ | F | F | 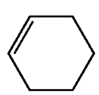 | COO | 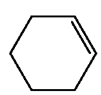 | — | F | F | $OC_2H_5$ | |
| 2603 | $C_5H_{11}O$ | F | F | 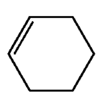 | COO | 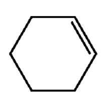 | — | F | F | $OC_3H_7$ | |
| 2604 | $C_5H_{11}O$ | F | F | 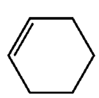 | COO | 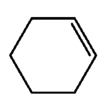 | — | F | F | $OC_4H_9$ | |
| 2605 | $C_5H_{11}O$ | F | F | 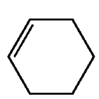 | COO | 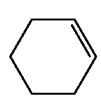 | — | F | F | $OC_5H_{11}$ | |
| 2606 | $C_2H_5$ | F | F | 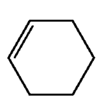 | COO | 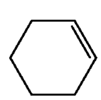 | — | F | F | $C_4H_9$ | |
| 2607 | $C_5H_{11}$ | F | F | 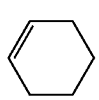 | COO | 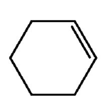 | — | F | F | $C_2H_5$ | |
| 2608 | $C_2H_5$ | F | F | 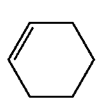 | COO | 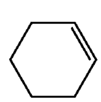 | — | F | F | $OC_4H_9$ | |

TABLE 172-continued
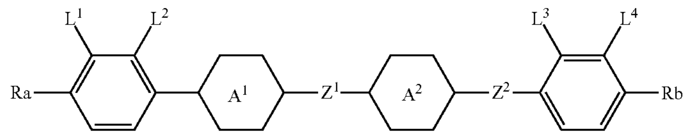
COO = 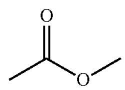
| No. | Ra | L1 | L2 | A1 | Z1 | A2 | Z2 | L3 | L4 | Rb | Physical property values |
|---|---|---|---|---|---|---|---|---|---|---|---|
| 2609 | $CH_2$═CH | F | F | 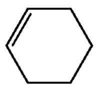 | COO | 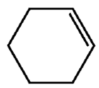 | — | F | F | $OC_3H_7$ | |
| 2610 | $CH_2$═CH | F | F | 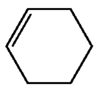 | COO | 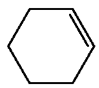 | — | F | F | $OC_5H_{11}$ | |
TABLE 173
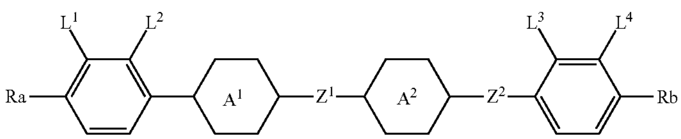
COO = 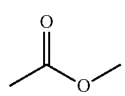
| No. | Ra | L1 | L2 | A1 | Z1 | A2 | Z2 | L3 | L4 | Rb | Physical property values |
|---|---|---|---|---|---|---|---|---|---|---|---|
| 2611 | $CH_3O$ | F | F | 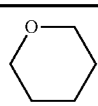 | COO | 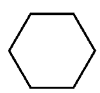 | — | F | F | $OCH_3$ | |
| 2612 | $CH_3O$ | F | F | 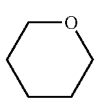 | COO | 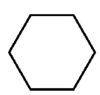 | — | F | F | $OC_2H_5$ | |
| 2613 | $CH_3O$ | F | F | 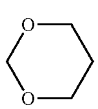 | COO | 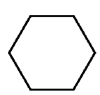 | — | F | F | $OC_3H_7$ | |
| 2614 | $CH_3O$ | F | F | 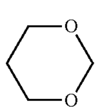 | COO | 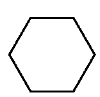 | — | F | F | $OC_4H_9$ | |
| 2615 | $CH_3O$ | F | F | 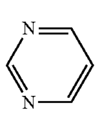 | COO | 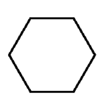 | — | F | F | $OC_5H_{11}$ | |
| 2616 | $C_2H_5O$ | F | F | 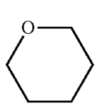 | COO | 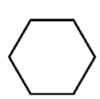 | — | F | F | $OCH_3$ | |

TABLE 173-continued
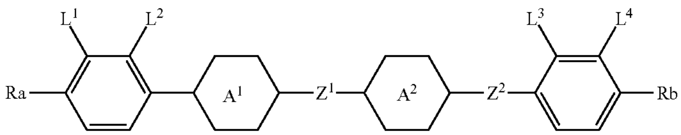
COO = 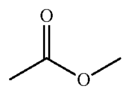
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2617 | $C_2H_5O$ | F | F | 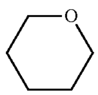 | COO | 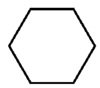 | — | F | F | $OC_2H_5$ | |
| 2618 | $C_2H_5O$ | F | F | 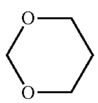 | COO | 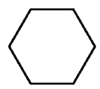 | — | F | F | $OC_3H_7$ | |
| 2619 | $C_2H_5O$ | F | F | 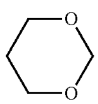 | COO | 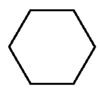 | — | F | F | $OC_4H_9$ | |
| 2620 | $C_2H_5O$ | F | F | 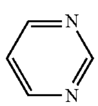 | COO | 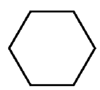 | — | F | F | $OC_5H_{11}$ | |
| 2621 | $C_3H_7O$ | F | F | 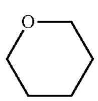 | COO | 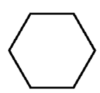 | — | F | F | $OCH_3$ | |
| 2622 | $C_3H_7O$ | F | F | 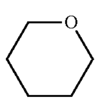 | COO | 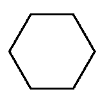 | — | F | F | $OC_2H_5$ | |
| 2623 | $C_3H_7O$ | F | F | 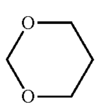 | COO | 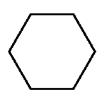 | — | F | F | $OC_3H_7$ | |
| 2624 | $C_3H_7O$ | F | F | 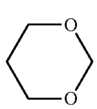 | COO | 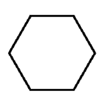 | — | F | F | $OC_4H_9$ | |
| 2625 | $C_3H_7O$ | F | F | 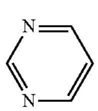 | COO | 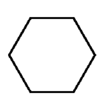 | — | F | F | $OC_5H_{11}$ | |

TABLE 174
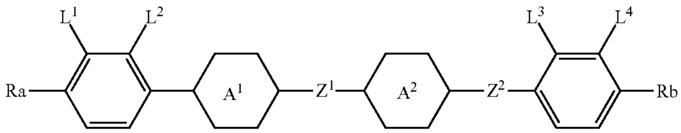
COO = 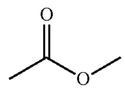
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2626 | $C_4H_9O$ | F | F | 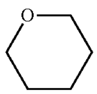 | COO | 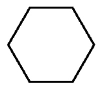 | — | F | F | $OCH_3$ | |
| 2627 | $C_4H_9O$ | F | F | 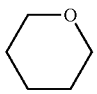 | COO | 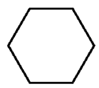 | — | F | F | $OC_2H_5$ | |
| 2628 | $C_4H_9O$ | F | F | 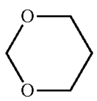 | COO | 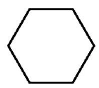 | — | F | F | $OC_3H_7$ | |
| 2629 | $C_4H_9O$ | F | F | 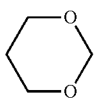 | COO | 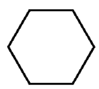 | — | F | F | $OC_4H_9$ | |
| 2630 | $C_4H_9O$ | F | F | 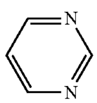 | COO | 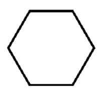 | — | F | F | $OC_5H_{11}$ | |
| 2631 | $C_5H_{11}O$ | F | F | 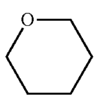 | COO | 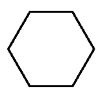 | — | F | F | $OCH_3$ | |
| 2632 | $C_5H_{11}O$ | F | F | 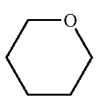 | COO | 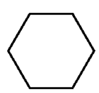 | — | F | F | $OC_2H_5$ | |
| 2633 | $C_5H_{11}O$ | F | F | 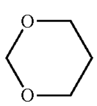 | COO | 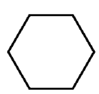 | — | F | F | $OC_3H_7$ | |
| 2634 | $C_5H_{11}O$ | F | F | 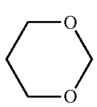 | COO | 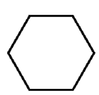 | — | F | F | $OC_4H_9$ | |
| 2635 | $C_5H_{11}O$ | F | F | 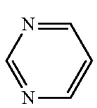 | COO | 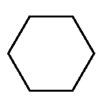 | — | F | F | $OC_5H_{11}$ | |
| 2636 | $C_2H_5$ | F | F | 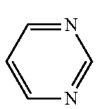 | COO | 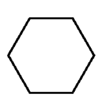 | — | F | F | $C_4H_9$ | |
| 2637 | $C_5H_{11}$ | F | F | 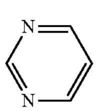 | COO | 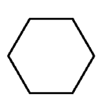 | — | F | F | $C_2H_5$ | |

TABLE 174-continued
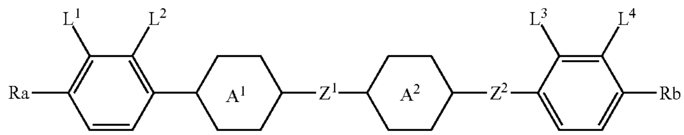
COO = 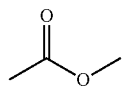
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2638 | $C_2H_5$ | F | F | 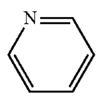 | COO | 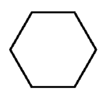 | — | F | F | $OC_4H_9$ | |
| 2639 | $CH_2{=}CH$ | F | F | 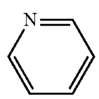 | COO | 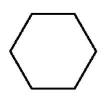 | — | F | F | $OC_3H_7$ | |
| 2640 | $CH_2{=}CH$ | F | F | 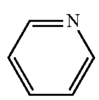 | COO | 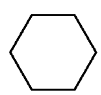 | — | F | F | $OC_5H_{11}$ | |
TABLE 175
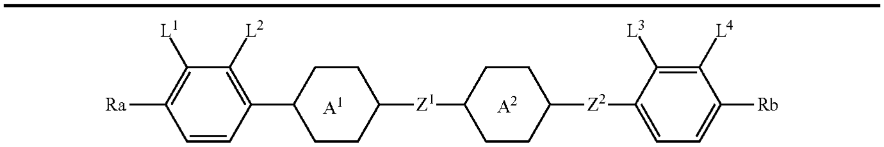
OCO = 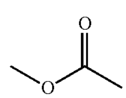
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2641 | $CH_3O$ | F | F | 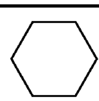 | OCO | 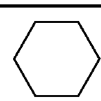 | — | F | H | $OCH_3$ | |
| 2642 | $CH_3O$ | F | F | 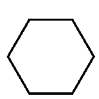 | OCO | 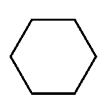 | — | F | H | $OC_2H_5$ | |
| 2643 | $CH_3O$ | F | F | 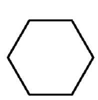 | OCO | 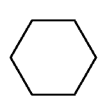 | — | F | H | $OC_3H_7$ | |
| 2644 | $CH_3O$ | F | F | 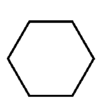 | OCO | 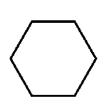 | — | F | H | $OC_4H_9$ | |
| 2645 | $CH_3O$ | F | F | 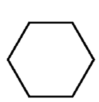 | OCO | 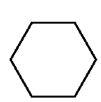 | — | F | H | $OC_5H_{11}$ | |

TABLE 175-continued
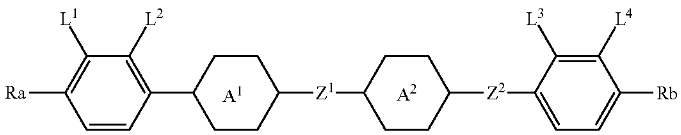
OCO = 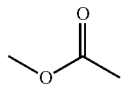
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2646 | $C_2H_5O$ | F | F | 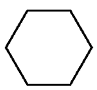 | OCO | 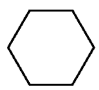 | — | F | H | $OCH_3$ | |
| 2647 | $C_2H_5O$ | F | F | 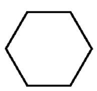 | OCO | 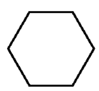 | — | F | H | $OC_2H_5$ | |
| 2648 | $C_2H_5O$ | F | F | 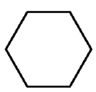 | OCO | 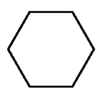 | — | F | H | $OC_3H_7$ | |
| 2649 | $C_2H_5O$ | F | F | 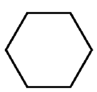 | OCO | 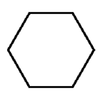 | — | F | H | $OC_4H_9$ | |
| 2650 | $C_2H_5O$ | F | F | 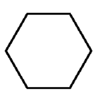 | OCO | 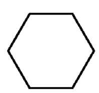 | — | F | H | $OC_5H_{11}$ | |
| 2651 | $C_3H_7O$ | F | F | 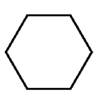 | OCO | 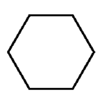 | — | F | H | $OCH_3$ | |
| 2652 | $C_3H_7O$ | F | F | 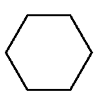 | OCO | 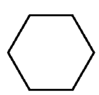 | — | F | H | $OC_2H_5$ | |
| 2653 | $C_3H_7O$ | F | F | 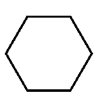 | OCO | 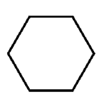 | — | F | H | $OC_3H_7$ | |
| 2654 | $C_3H_7O$ | F | F | 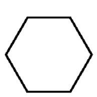 | OCO | 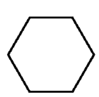 | — | F | H | $OC_4H_9$ | |
| 2655 | $C_3H_7O$ | F | F | 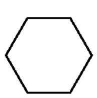 | OCO | 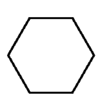 | — | F | H | $OC_5H_{11}$ | |

TABLE 176
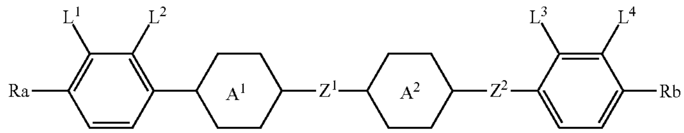
OCO = 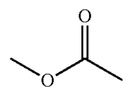
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2656 | $C_4H_9O$ | F | F | 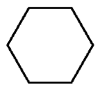 | OCO | 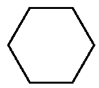 | — | F | H | $OCH_3$ | |
| 2657 | $C_4H_9O$ | F | F | 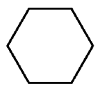 | OCO | 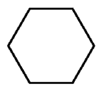 | — | F | H | $OC_2H_5$ | |
| 2658 | $C_4H_9O$ | F | F | 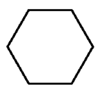 | OCO | 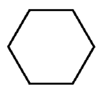 | — | F | H | $OC_3H_7$ | |
| 2659 | $C_4H_9O$ | F | F | 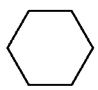 | OCO | 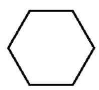 | — | F | H | $OC_4H_9$ | |
| 2660 | $C_4H_9O$ | F | F | 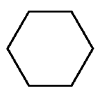 | OCO | 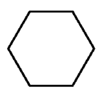 | — | F | H | $OC_5H_{11}$ | |
| 2661 | $C_5H_{11}O$ | F | F | 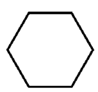 | OCO | 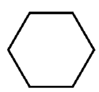 | — | F | H | $OCH_3$ | |
| 2662 | $C_5H_{11}O$ | F | F | 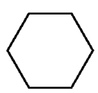 | OCO | 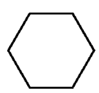 | — | F | H | $OC_2H_5$ | |
| 2663 | $C_5H_{11}O$ | F | F | 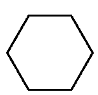 | OCO | 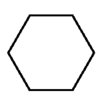 | — | F | H | $OC_3H_7$ | |
| 2664 | $C_5H_{11}O$ | F | F | 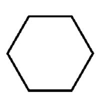 | OCO | 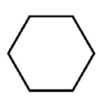 | — | F | H | $OC_4H_9$ | |
| 2665 | $C_5H_{11}O$ | F | F | 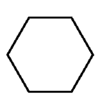 | OCO | 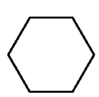 | — | F | H | $OC_5H_{11}$ | |
| 2666 | $C_2H_5$ | F | F | 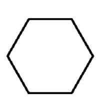 | OCO | 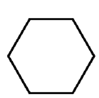 | — | F | H | $C_4H_9$ | |
| 2667 | $C_5H_{11}$ | F | F | 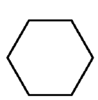 | OCO | 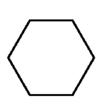 | — | F | H | $C_2H_5$ | |
| 2668 | $C_2H_5$ | F | F | 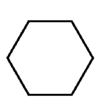 | OCO | 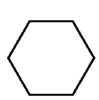 | — | F | H | $OC_4H_9$ | |

TABLE 176-continued

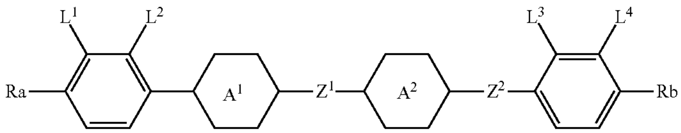

OCO = 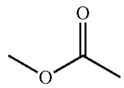

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2669 | $CH_2{=}CH$ | F | F | 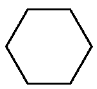 | OCO | 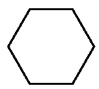 | — | F | H | $OC_3H_7$ | |
| 2670 | $CH_2{=}CH$ | F | F | 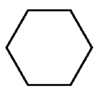 | OCO | 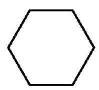 | — | F | H | $OC_5H_{11}$ | |

TABLE 177

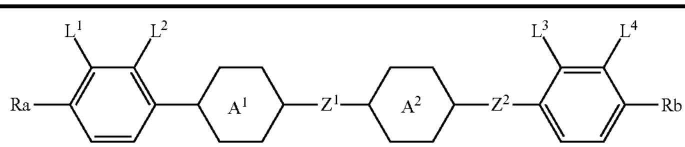

OCO = 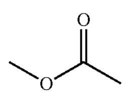

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2671 | $CH_2{=}CHO$ | F | F | 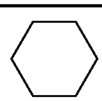 | OCO | 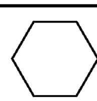 | — | F | H | $OC_3H_7$ | |
| 2672 | $CH_2{=}CHCH_2O$ | F | F | 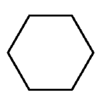 | OCO | 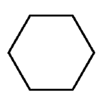 | — | F | H | $OC_5H_{11}$ | |
| 2673 | $CH_2{=}CHCH_2O$ | F | F | 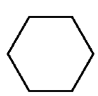 | OCO | 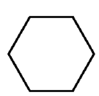 | — | F | H | $OC_3H_7$ | |
| 2674 | $CH_2{=}CHC_2H_5O$ | F | F | 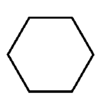 | OCO | 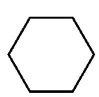 | — | F | H | $OC_5H_{11}$ | |
| 2675 | $CH_2{=}CHC_2H_5O$ | F | F | 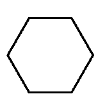 | OCO | 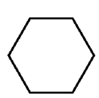 | — | F | H | $OC_2H_5$ | |
| 2676 | $CH_2{=}CHC_2H_5O$ | F | F | 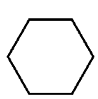 | OCO | 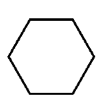 | — | F | H | $OC_3H_7$ | |
| 2677 | $CH_3CH{=}CHCH_2O$ | F | F | 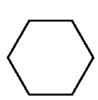 | OCO | 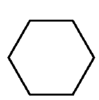 | — | F | H | $OCH_3$ | |

TABLE 177-continued

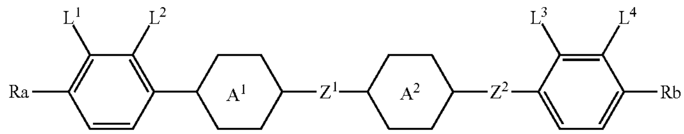

OCO = 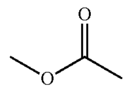

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2678 | $CH_3CH{=}CHCH_2O$ | F | F | 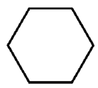 | OCO | 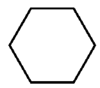 | — | F | H | $OC_2H_5$ | |
| 2679 | $C_3H_7O$ | F | F | 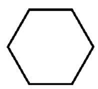 | OCO | 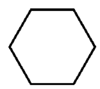 | — | F | H | $OCH{=}CH_2$ | |
| 2680 | $C_3H_7O$ | F | F | 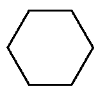 | OCO | 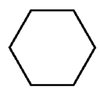 | — | F | H | $OCH_2CH{=}CH_2$ | |
| 2681 | $C_4H_9O$ | F | F | 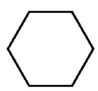 | OCO | 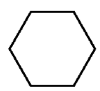 | — | F | H | $OCH_2CH{=}CH_2$ | |
| 2682 | $C_5H_{11}O$ | F | F | 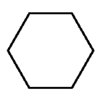 | OCO | 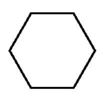 | — | F | H | $OCH_2CH{=}CH_2$ | |
| 2683 | $CH_3O$ | F | F | 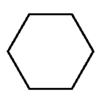 | OCO | 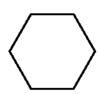 | — | F | H | $OC_2H_5CH{=}CH_2$ | |
| 2684 | $C_2H_5O$ | F | F | 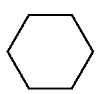 | OCO | 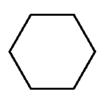 | — | F | H | $OC_2H_5CH{=}CH_2$ | |
| 2685 | $C_3H_7O$ | F | F | 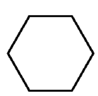 | OCO | 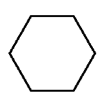 | — | F | H | $OC_2H_5CH{=}CH_2$ | |

TABLE 178

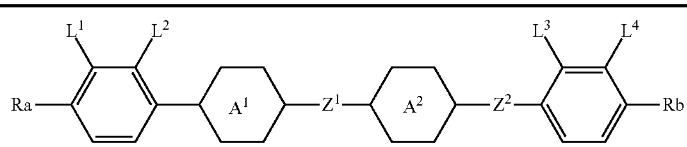

OCO = 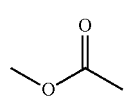

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2686 | $CH_3O$ | F | F | 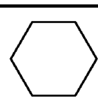 | OCO | 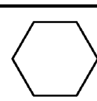 | — | F | H | $OCH_2CH{=}CHCH_3$ | |

TABLE 178-continued

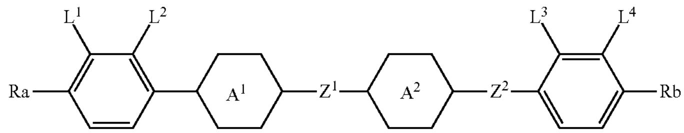

OCO = 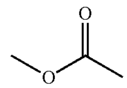

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2687 | $C_2H_5O$ | F | F | 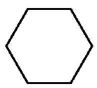 | OCO | 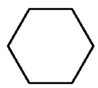 | — | F | H | $OCH_2CH{=}CHCH_3$ | |
| 2688 | $C_3H_7O$ | F | F | 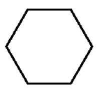 | OCO | 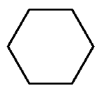 | — | F | H | $OCH_2CH{=}CHCH_3$ | |
| 2689 | $CH_2{=}CHCH_2O$ | F | F | 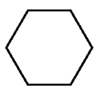 | OCO | 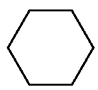 | — | F | H | $OCH{=}CH_2$ | |
| 2690 | $CH_2{=}CHC_2H_5O$ | F | F | 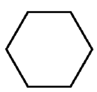 | OCO | 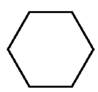 | — | F | H | $OCH_2CH{=}CH_2$ | |
| 2691 | $C_3H_7OCH_2$ | F | F | 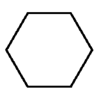 | OCO | 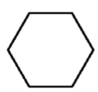 | — | F | H | $OC_3H_7$ | |
| 2692 | $C_5H_{11}O$ | F | F | 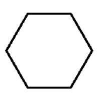 | OCO | 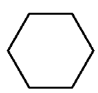 | — | F | H | $OC_2H_5CH{=}CH_2$ | |
| 2693 | $C_3H_7O$ | F | F | 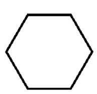 | OCO | 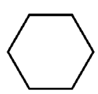 | — | F | H | H | |
| 2694 | $C_5H_{11}O$ | F | F | 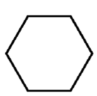 | OCO | 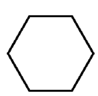 | — | F | H | $OC_9H_{19}$ | |
| 2695 | $C_3H_7O$ | F | F | 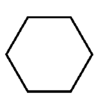 | OCO | 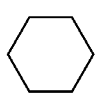 | — | F | H | $C_2H_5$ | |
| 2696 | $C_5H_{11}O$ | F | F | 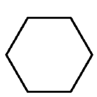 | OCO | 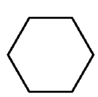 | — | F | H | $C_3H_7$ | |
| 2697 | H | F | F | 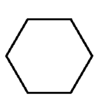 | OCO | 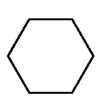 | — | F | H | $OC_4H_9$ | |
| 2698 | $C_7H_{15}O$ | F | F | 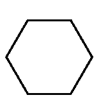 | OCO | 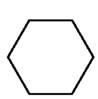 | — | F | H | $OC_4H_9$ | |

TABLE 178-continued
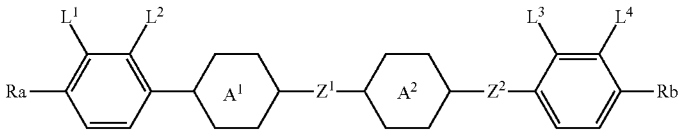
OCO = 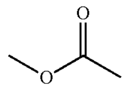
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2699 | $C_2H_5O$ | F | F | 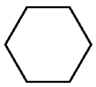 | OCO | 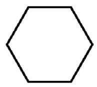 | — | F | H | $OC_6H_{13}$ | |
| 2700 | $CH_3O$ | F | F | 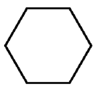 | OCO | 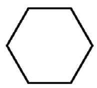 | — | F | H | $C_2H_5$ | |
TABLE 179
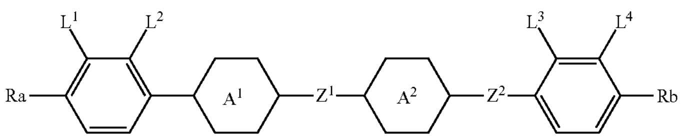
OCO = 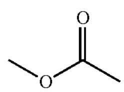
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2701 | $CH_3O$ | F | F | 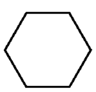 | OCO | 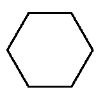 | — | H | F | $OCH_3$ | |
| 2702 | $CH_3O$ | F | F | 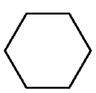 | OCO | 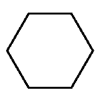 | — | H | F | $OC_2H_5$ | |
| 2703 | $CH_3O$ | F | F | 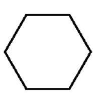 | OCO | 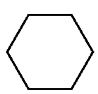 | — | H | F | $OC_3H_7$ | |
| 2704 | $CH_3O$ | F | F | 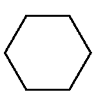 | OCO | 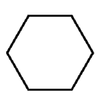 | — | H | F | $OC_4H_9$ | |
| 2705 | $CH_3O$ | F | F | 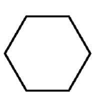 | OCO | 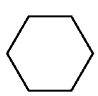 | — | H | F | $OC_5H_{11}$ | |
| 2706 | $C_2H_5O$ | F | F | 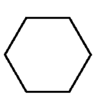 | OCO | 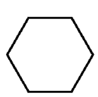 | — | H | F | $OCH_3$ | |
| 2707 | $C_2H_5O$ | F | F | 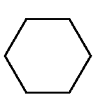 | OCO | 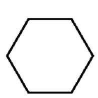 | — | H | F | $OC_2H_5$ | |

TABLE 179-continued

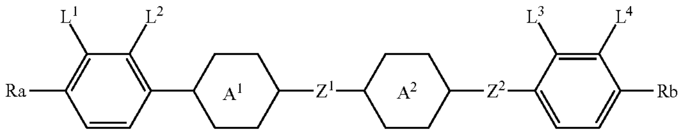

OCO = 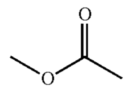

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2708 | $C_2H_5O$ | F | F | 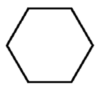 | OCO | 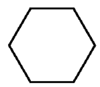 | — | H | F | $OC_3H_7$ | |
| 2709 | $C_2H_5O$ | F | F | 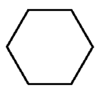 | OCO | 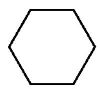 | — | H | F | $OC_4H_9$ | |
| 2710 | $C_2H_5O$ | F | F | 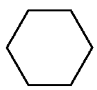 | OCO | 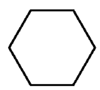 | — | H | F | $OC_5H_{11}$ | |
| 2711 | $C_3H_7O$ | F | F | 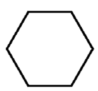 | OCO | 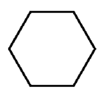 | — | H | F | $OCH_3$ | |
| 2712 | $C_3H_7O$ | F | F | 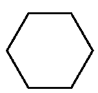 | OCO | 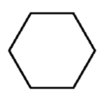 | — | H | F | $OC_2H_5$ | |
| 2713 | $C_3H_7O$ | F | F | 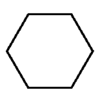 | OCO | 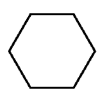 | — | H | F | $OC_3H_7$ | |
| 2714 | $C_3H_7O$ | F | F | 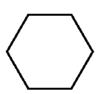 | OCO | 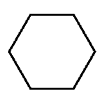 | — | H | F | $OC_4H_9$ | |
| 2715 | $C_3H_7O$ | F | F | 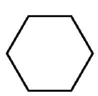 | OCO | 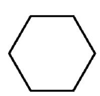 | — | H | F | $OC_5H_{11}$ | |

TABLE 180

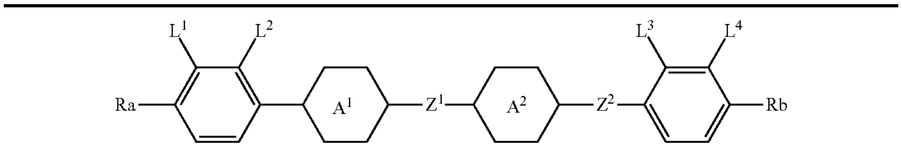

OCO = 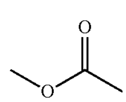

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2716 | $C_4H_9O$ | F | F | 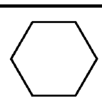 | OCO | 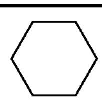 | — | H | F | $OCH_3$ | |

TABLE 180-continued
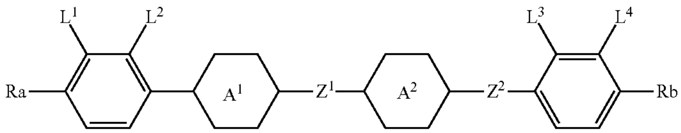
OCO = 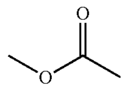
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2717 | $C_4H_9O$ | F | F | 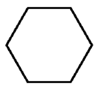 | OCO | 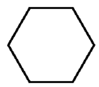 | — | H | F | $OC_2H_5$ | |
| 2718 | $C_4H_9O$ | F | F | 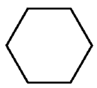 | OCO | 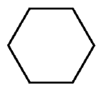 | — | H | F | $OC_3H_7$ | |
| 2719 | $C_4H_9O$ | F | F | 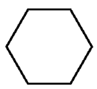 | OCO | 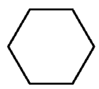 | — | H | F | $OC_4H_9$ | |
| 2720 | $C_4H_9O$ | F | F | 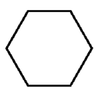 | OCO | 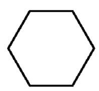 | — | H | F | $OC_5H_{11}$ | |
| 2721 | $C_5H_{11}O$ | F | F | 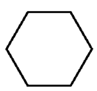 | OCO | 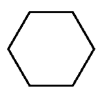 | — | H | F | $OCH_3$ | |
| 2722 | $C_5H_{11}O$ | F | F | 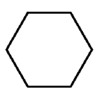 | OCO | 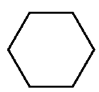 | — | H | F | $OC_2H_5$ | |
| 2723 | $C_5H_{11}O$ | F | F | 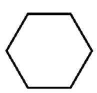 | OCO | 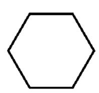 | — | H | F | $OC_3H_7$ | |
| 2724 | $C_5H_{11}O$ | F | F | 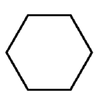 | OCO | 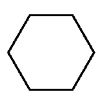 | — | H | F | $OC_4H_9$ | |
| 2725 | $C_5H_{11}O$ | F | F | 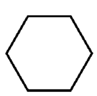 | OCO | 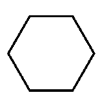 | — | H | F | $OC_5H_{11}$ | |
| 2726 | $C_2H_5$ | F | F | 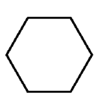 | OCO | 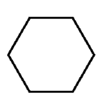 | — | H | F | $C_4H_9$ | |
| 2727 | $C_5H_{11}$ | F | F | 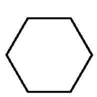 | OCO | 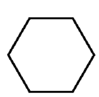 | — | H | F | $C_2H_5$ | |
| 2728 | $C_2H_5$ | F | F | 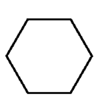 | OCO | 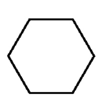 | — | H | F | $OC_4H_9$ | |

TABLE 180-continued

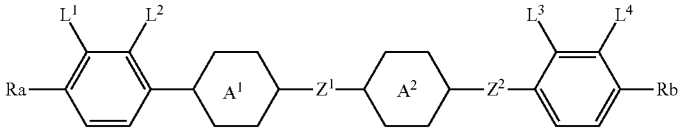

OCO = 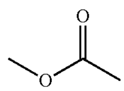

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2729 | $CH_2$═CH | F | F | 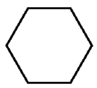 | OCO | 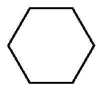 | — | H | F | $OC_3H_7$ | |
| 2730 | $CH_2$═CH | F | F | 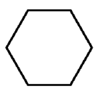 | OCO | 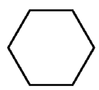 | — | H | F | $OC_5H_{11}$ | |

TABLE 181

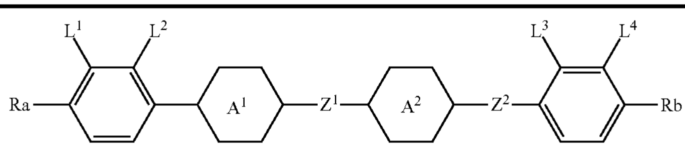

OCO = 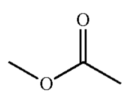

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2731 | $CH_2$═CHO | F | F | 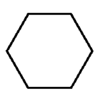 | OCO | 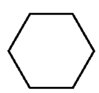 | — | H | F | $OC_3H_7$ | |
| 2732 | $CH_2$═$CHCH_2O$ | F | F | 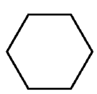 | OCO | 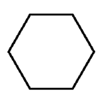 | — | H | F | $OC_5H_{11}$ | |
| 2733 | $CH_2$═$CHCH_2O$ | F | F | 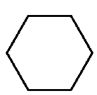 | OCO | 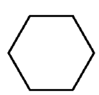 | — | H | F | $OC_3H_7$ | |
| 2734 | $CH_2$═$CHC_2H_5O$ | F | F | 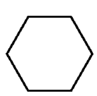 | OCO | 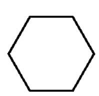 | — | H | F | $OC_5H_{11}$ | |
| 2735 | $CH_2$═$CHC_2H_5O$ | F | F | 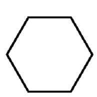 | OCO | 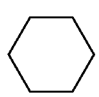 | — | H | F | $OC_2H_5$ | |
| 2736 | $CH_2$═$CHC_2H_5O$ | F | F | 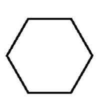 | OCO | 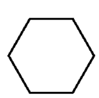 | — | H | F | $OC_3H_7$ | |
| 2737 | $CH_3CH$═$CHCH_2O$ | F | F | 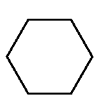 | OCO | 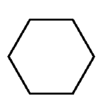 | — | H | F | $OCH_3$ | |

TABLE 181-continued

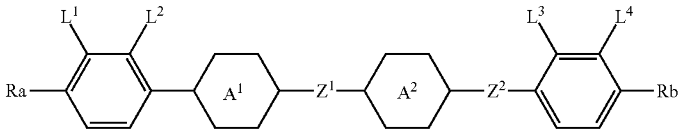

OCO = 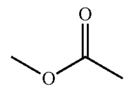

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2738 | $CH_3CH{=}CHCH_2O$ | F | F | 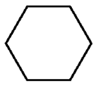 | OCO | 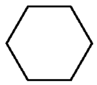 | — | H | F | $OC_2H_5$ | |
| 2739 | $C_3H_7O$ | F | F | 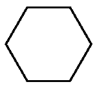 | OCO | 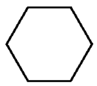 | — | H | F | $OCH{=}CH_2$ | |
| 2740 | $C_3H_7O$ | F | F | 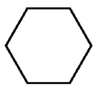 | OCO | 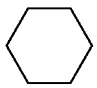 | — | H | F | $OCH_2CH{=}CH_2$ | |
| 2741 | $C_4H_9O$ | F | F | 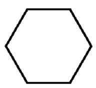 | OCO | 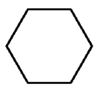 | — | H | F | $OCH_2CH{=}CH_2$ | |
| 2742 | $C_5H_{11}O$ | F | F | 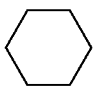 | OCO | 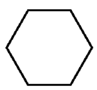 | — | H | F | $OCH_2CH{=}CH_2$ | |
| 2743 | $CH_3O$ | F | F | 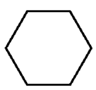 | OCO | 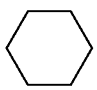 | — | H | F | $OC_2H_5CH{=}CH_2$ | |
| 2744 | $C_2H_5O$ | F | F | 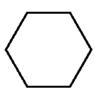 | OCO | 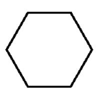 | — | H | F | $OC_2H_5CH{=}CH_2$ | |
| 2745 | $C_3H_7O$ | F | F | 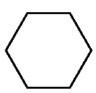 | OCO | 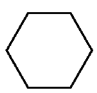 | — | H | F | $OC_2H_5CH{=}CH_2$ | |

TABLE 182

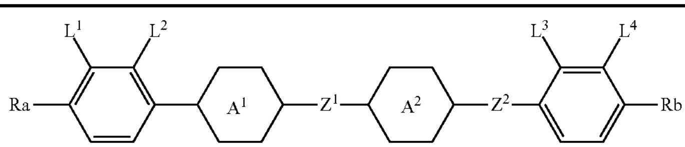

OCO = 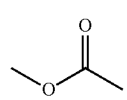

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2746 | $CH_3O$ | F | F | 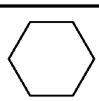 | OCO | 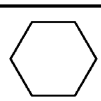 | — | H | F | $OCH_2CH{=}CHCH_3$ | |

TABLE 182-continued

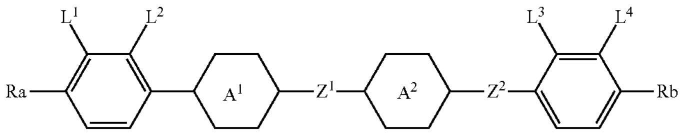

OCO = 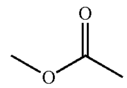

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2747 | $C_2H_5O$ | F | F | 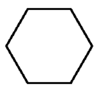 | OCO | 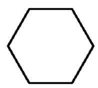 | — | H | F | $OCH_2CH{=}CHCH_3$ | |
| 2748 | $C_3H_7O$ | F | F | 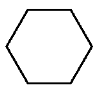 | OCO | 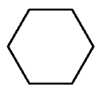 | — | H | F | $OCH_2CH{=}CHCH_3$ | |
| 2749 | $CH_2{=}CHCH_2O$ | F | F | 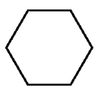 | OCO | 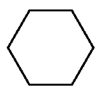 | — | H | F | $OCH{=}CH_2$ | |
| 2750 | $CH_2{=}CHC_2H_5O$ | F | F | 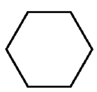 | OCO | 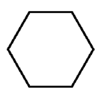 | — | H | F | $OCH_2CH{=}CH_2$ | |
| 2751 | $C_3H_7OCH_2$ | F | F | 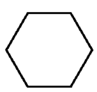 | OCO | 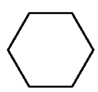 | — | H | F | $OC_3H_7$ | |
| 2752 | $C_5H_{11}O$ | F | F | 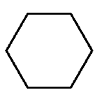 | OCO | 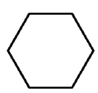 | — | H | F | $OC_2H_5CH{=}CH_2$ | |
| 2753 | $C_3H_7O$ | F | F | 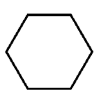 | OCO | 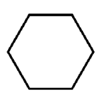 | — | H | F | H | |
| 2754 | $C_5H_{11}O$ | F | F | 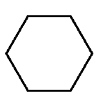 | OCO | 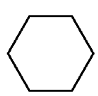 | — | H | F | $OC_9H_{19}$ | |
| 2755 | $C_3H_7O$ | F | F | 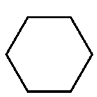 | OCO | 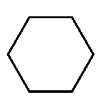 | — | H | F | $C_2H_5$ | |
| 2756 | $C_5H_{11}O$ | F | F | 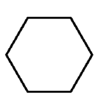 | OCO | 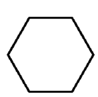 | — | H | F | $C_3H_7$ | |
| 2757 | H | F | F | 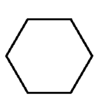 | OCO | 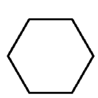 | — | H | F | $OC_4H_9$ | |
| 2758 | $C_7H_{15}O$ | F | F | 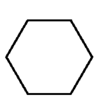 | OCO | 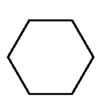 | — | H | F | $OC_4H_9$ | |

TABLE 182-continued
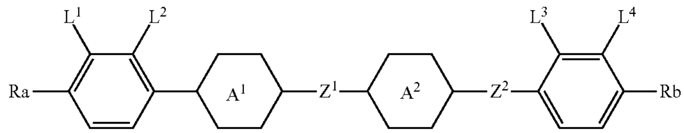
OCO = 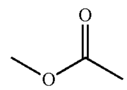
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2759 | $C_2H_5O$ | F | F | 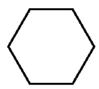 | OCO | 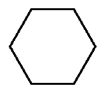 | — | H | F | $OC_6H_{13}$ | |
| 2760 | $CH_3O$ | F | F | 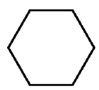 | OCO | 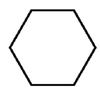 | — | H | F | $C_2H_5$ | |
TABLE 183
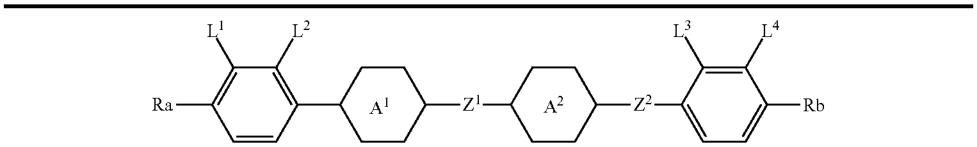
OCO = 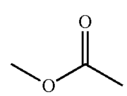
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2761 | $CH_3O$ | F | F | 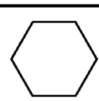 | OCO | 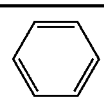 | — | F | F | $OCH_3$ | |
| 2762 | $CH_3O$ | F | F | 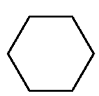 | OCO | 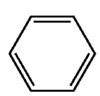 | — | F | F | $OC_2H_5$ | |
| 2763 | $CH_3O$ | F | F | 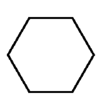 | OCO | 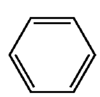 | — | F | F | $OC_3H_7$ | |
| 2764 | $CH_3O$ | F | F | 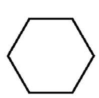 | OCO | 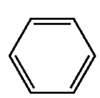 | — | F | F | $OC_4H_9$ | |
| 2765 | $CH_3O$ | F | F | 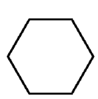 | OCO | 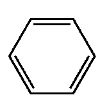 | — | F | F | $OC_5H_{11}$ | |
| 2766 | $C_2H_5O$ | F | F | 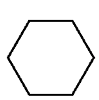 | OCO | 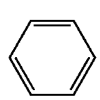 | — | F | F | $OCH_3$ | |
| 2767 | $C_2H_5O$ | F | F | 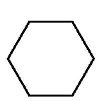 | OCO | 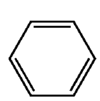 | — | F | F | $OC_2H_5$ | |

TABLE 183-continued

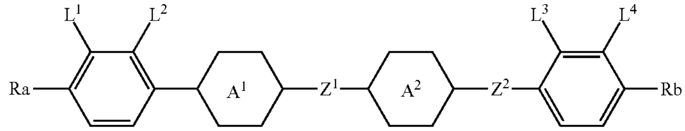

OCO =
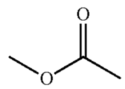

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2768 | $C_2H_5O$ | F | F | 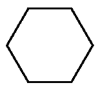 | OCO | 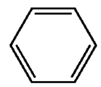 | — | F | F | $OC_3H_7$ | |
| 2769 | $C_2H_5O$ | F | F | 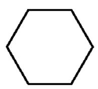 | OCO | 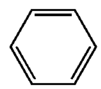 | — | F | F | $OC_4H_9$ | C 129.0 N 275.8 I<br>TNI: 205.6° C., Δε: −7.14, Δn: 0.214 |
| 2770 | $C_2H_5O$ | F | F | 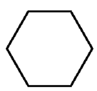 | OCO | 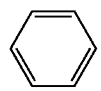 | — | F | F | $OC_5H_{11}$ | |
| 2771 | $C_3H_7O$ | F | F | 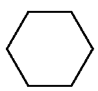 | OCO | 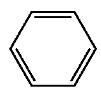 | — | F | F | $OCH_3$ | |
| 2772 | $C_3H_7O$ | F | F | 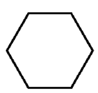 | OCO | 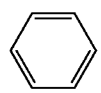 | — | F | F | $OC_2H_5$ | |
| 2773 | $C_3H_7O$ | F | F | 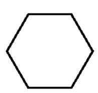 | OCO | 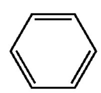 | — | F | F | $OC_3H_7$ | |
| 2774 | $C_3H_7O$ | F | F | 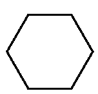 | OCO | 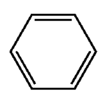 | — | F | F | $OC_4H_9$ | |
| 2775 | $C_3H_7O$ | F | F | 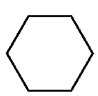 | OCO | 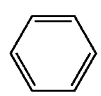 | — | F | F | $OC_5H_{11}$ | |

TABLE 184

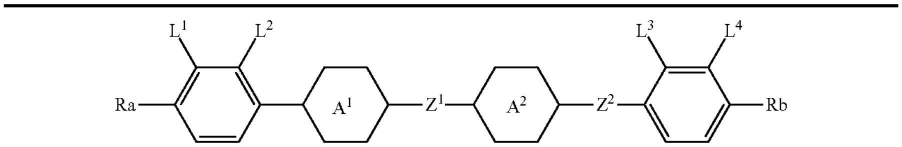

OCO =
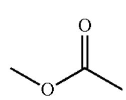

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2776 | $C_4H_9O$ | F | F | 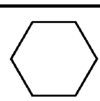 | OCO | 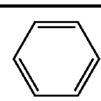 | — | F | F | $OCH_3$ | |

TABLE 184-continued
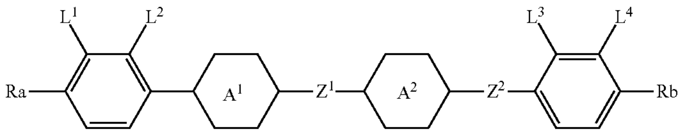
OCO = 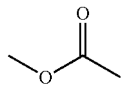
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2777 | $C_4H_9O$ | F | F | 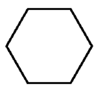 | OCO | 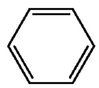 | — | F | F | $OC_2H_5$ | |
| 2778 | $C_4H_9O$ | F | F | 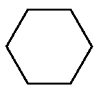 | OCO | 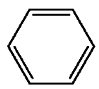 | — | F | F | $OC_3H_7$ | |
| 2779 | $C_4H_9O$ | F | F | 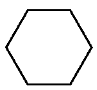 | OCO | 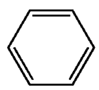 | — | F | F | $OC_4H_9$ | |
| 2780 | $C_4H_9O$ | F | F | 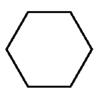 | OCO | 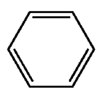 | — | F | F | $OC_5H_{11}$ | |
| 2781 | $C_5H_{11}O$ | F | F | 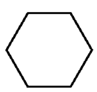 | OCO | 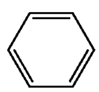 | — | F | F | $OCH_3$ | |
| 2782 | $C_5H_{11}O$ | F | F | 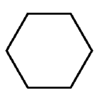 | OCO | 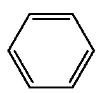 | — | F | F | $OC_2H_5$ | |
| 2783 | $C_5H_{11}O$ | F | F | 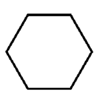 | OCO | 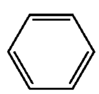 | — | F | F | $OC_3H_7$ | |
| 2784 | $C_5H_{11}O$ | F | F | 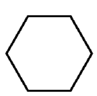 | OCO | 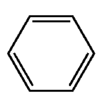 | — | F | F | $OC_4H_9$ | |
| 2785 | $C_5H_{11}O$ | F | F | 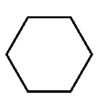 | OCO | 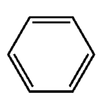 | — | F | F | $OC_5H_{11}$ | |
| 2786 | $C_2H_5$ | F | F | 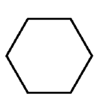 | OCO | 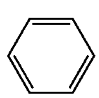 | — | F | F | $C_4H_9$ | |
| 2787 | $C_5H_{11}$ | F | F | 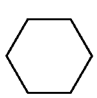 | OCO | 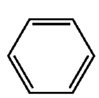 | — | F | F | $C_2H_5$ | |
| 2788 | $C_2H_5$ | F | F | 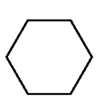 | OCO | 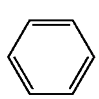 | — | F | F | $OC_4H_9$ | |

TABLE 184-continued

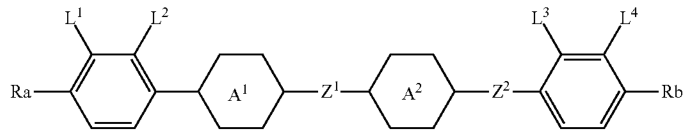

OCO = 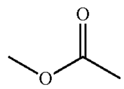

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2789 | $CH_2$═CH | F | F | 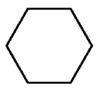 | OCO | 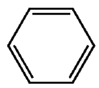 | — | F | F | $OC_3H_7$ | |
| 2790 | $CH_2$═CH | F | F | 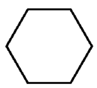 | OCO | 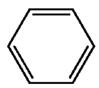 | — | F | F | $OC_5H_{11}$ | |

TABLE 185

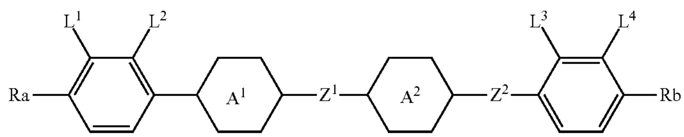

OCO = 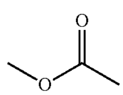

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2791 | $CH_2$═CHO | F | F | 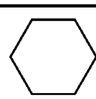 | OCO | 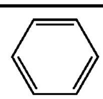 | — | F | F | $OC_3H_7$ | |
| 2792 | $CH_2$═$CHCH_2O$ | F | F | 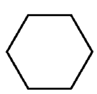 | OCO | 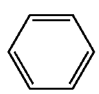 | — | F | F | $OC_5H_{11}$ | |
| 2793 | $CH_2$═$CHCH_2O$ | F | F | 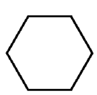 | OCO | 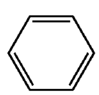 | — | F | F | $OC_3H_7$ | |
| 2794 | $CH_2$═$CHC_2H_5O$ | F | F | 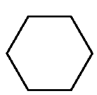 | OCO | 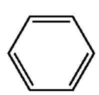 | — | F | F | $OC_5H_{11}$ | |
| 2795 | $CH_2$═$CHC_2H_5O$ | F | F | 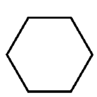 | OCO | 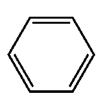 | — | F | F | $OC_2H_5$ | |
| 2796 | $CH_2$═$CHC_2H_5O$ | F | F | 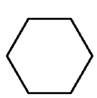 | OCO | 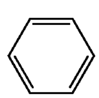 | — | F | F | $OC_3H_7$ | |
| 2797 | $CH_3CH$═$CHCH_2O$ | F | F | 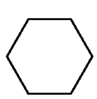 | OCO | 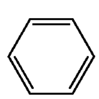 | — | F | F | $OCH_3$ | |

TABLE 185-continued

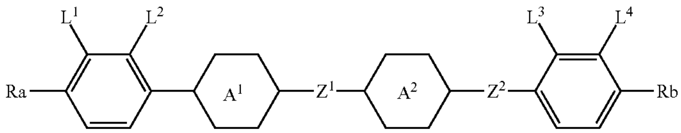

OCO = 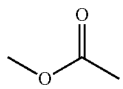

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2798 | $CH_3CH{=}CHCH_2O$ | F | F | 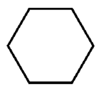 | OCO | 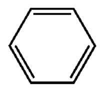 | — | F | F | $OC_2H_5$ | |
| 2799 | $C_3H_7O$ | F | F | 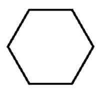 | OCO | 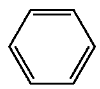 | — | F | F | $OCH{=}CH_2$ | |
| 2800 | $C_3H_7O$ | F | F | 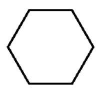 | OCO | 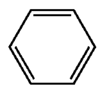 | — | F | F | $OCH_2CH{=}CH_2$ | |
| 2801 | $C_4H_9O$ | F | F | 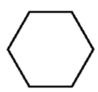 | OCO | 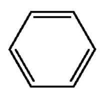 | — | F | F | $OCH_2CH{=}CH_2$ | |
| 2802 | $C_5H_{11}O$ | F | F | 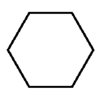 | OCO | 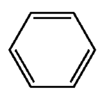 | — | F | F | $OCH_2CH{=}CH_2$ | |
| 2803 | $CH_3O$ | F | F | 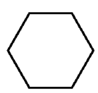 | OCO | 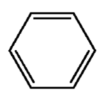 | — | F | F | $OC_2H_5CH{=}CH_2$ | |
| 2804 | $C_2H_5O$ | F | F | 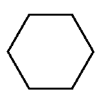 | OCO | 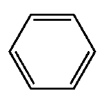 | — | F | F | $OC_2H_5CH{=}CH_2$ | |
| 2805 | $C_3H_7O$ | F | F | 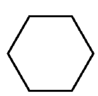 | OCO | 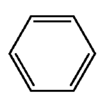 | — | F | F | $OC_2H_5CH{=}CH_2$ | |

TABLE 186

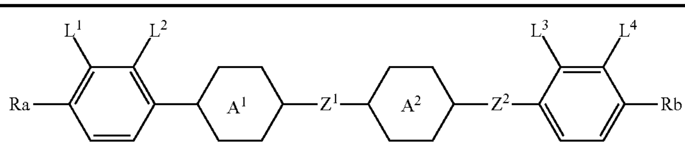

OCO = 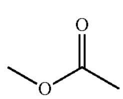

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2806 | $CH_3O$ | F | F | 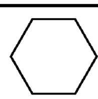 | OCO | 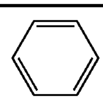 | — | F | F | $OCH_2CH{=}CHCH_3$ | |

TABLE 186-continued

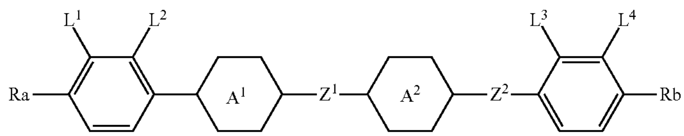

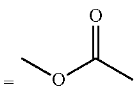

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2807 | $C_2H_5O$ | F | F | 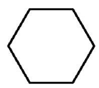 | OCO | 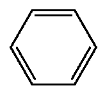 | — | F | F | $OCH_2CH{=}CHCH_3$ | |
| 2808 | $C_3H_7O$ | F | F | 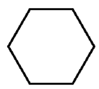 | OCO | 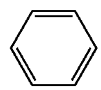 | — | F | F | $OCH_2CH{=}CHCH_3$ | |
| 2809 | $CH_2{=}CHCH_2O$ | F | F | 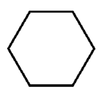 | OCO | 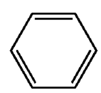 | — | F | F | $OCH{=}CH_2$ | |
| 2810 | $CH_2{=}CHC_2H_5O$ | F | F | 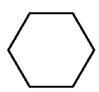 | OCO | 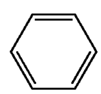 | — | F | F | $OCH_2CH{=}CH_2$ | |
| 2811 | $C_3H_7OCH_2$ | F | F | 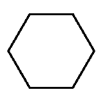 | OCO | 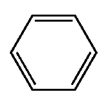 | — | F | F | $OC_3H_7$ | |
| 2812 | $C_5H_{11}O$ | F | F | 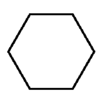 | OCO | 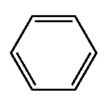 | — | F | F | $OC_2H_5CH{=}CH_2$ | |
| 2813 | $C_3H_7O$ | F | F | 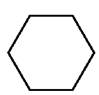 | OCO | 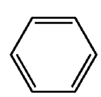 | — | F | F | H | |
| 2814 | $C_5H_{11}O$ | F | F | 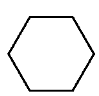 | OCO | 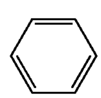 | — | F | F | $OC_9H_{19}$ | |
| 2815 | $C_3H_7O$ | F | F | 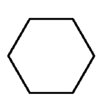 | OCO | 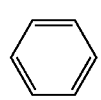 | — | F | F | $C_2H_5$ | |
| 2816 | $C_5H_{11}O$ | F | F | 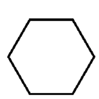 | OCO | 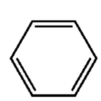 | — | F | F | $C_3H_7$ | |
| 2817 | H | F | F | 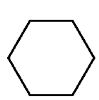 | OCO | 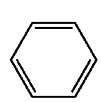 | — | F | F | $OC_4H_9$ | |
| 2818 | $C_7H_{15}O$ | F | F | 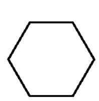 | OCO | 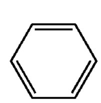 | — | F | F | $OC_4H_9$ | |

TABLE 186-continued
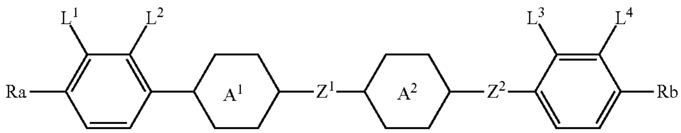
OCO = 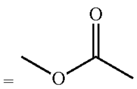
| No. | Ra | L1 | L2 | A1 | Z1 | A2 | Z2 | L3 | L4 | Rb | Physical property values |
|---|---|---|---|---|---|---|---|---|---|---|---|
| 2819 | $C_2H_5O$ | F | F | 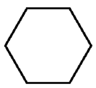 | OCO | 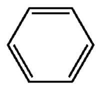 | — | F | F | $OC_6H_{13}$ | |
| 2820 | $CH_3O$ | F | F | 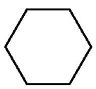 | OCO | 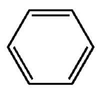 | — | F | F | $C_2H_5$ | |
TABLE 187
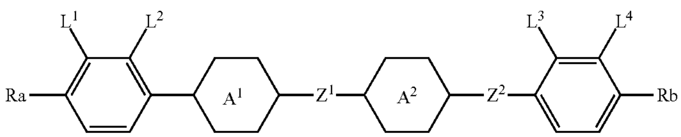
OCO = 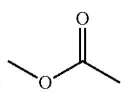
| No. | Ra | L1 | L2 | A1 | Z1 | A2 | Z2 | L3 | L4 | Rb | Physical property values |
|---|---|---|---|---|---|---|---|---|---|---|---|
| 2821 | $CH_3O$ | F | F | 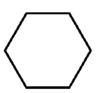 | OCO | 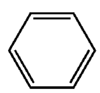 | — | F | H | $OCH_3$ | |
| 2822 | $CH_3O$ | F | F | 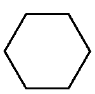 | OCO | 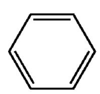 | — | F | H | $OC_2H_5$ | |
| 2823 | $CH_3O$ | F | F | 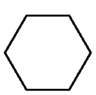 | OCO | 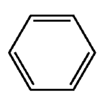 | — | F | H | $OC_3H_7$ | |
| 2824 | $CH_3O$ | F | F | 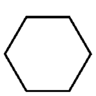 | OCO | 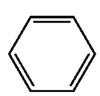 | — | F | H | $OC_4H_9$ | |
| 2825 | $CH_3O$ | F | F | 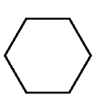 | OCO | 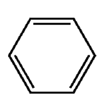 | — | F | H | $OC_5H_{11}$ | |
| 2826 | $C_2H_5O$ | F | F | 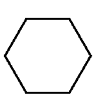 | OCO | 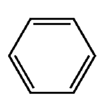 | — | F | H | $OCH_3$ | |
| 2827 | $C_2H_5O$ | F | F | 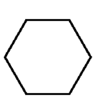 | OCO | 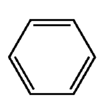 | — | F | H | $OC_2H_5$ | |

TABLE 187-continued

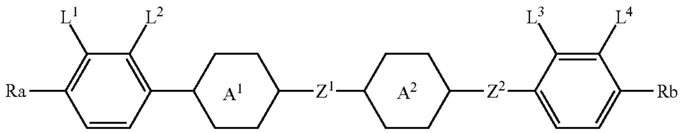

OCO = 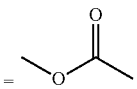

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2828 | $C_2H_5O$ | F | F | 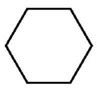 | OCO | 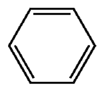 | — | F | H | $OC_3H_7$ | |
| 2829 | $C_2H_5O$ | F | F | 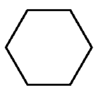 | OCO | 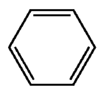 | — | F | H | $OC_4H_9$ | |
| 2830 | $C_2H_5O$ | F | F | 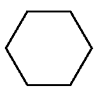 | OCO | 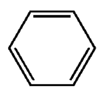 | — | F | H | $OC_5H_{11}$ | |
| 2831 | $C_3H_7O$ | F | F | 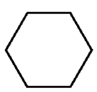 | OCO | 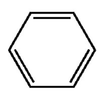 | — | F | H | $OCH_3$ | |
| 2832 | $C_3H_7O$ | F | F | 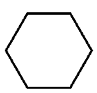 | OCO | 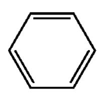 | — | F | H | $OC_2H_5$ | |
| 2833 | $C_3H_7O$ | F | F | 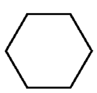 | OCO | 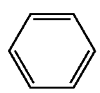 | — | F | H | $OC_3H_7$ | |
| 2834 | $C_3H_7O$ | F | F | 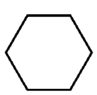 | OCO | 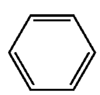 | — | F | H | $OC_4H_9$ | |
| 2835 | $C_3H_7O$ | F | F | 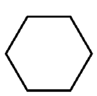 | OCO | 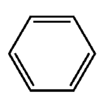 | — | F | H | $OC_5H_{11}$ | |

TABLE 188

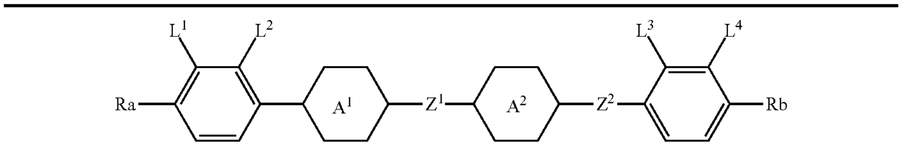

OCO = 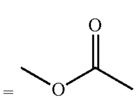

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2836 | $C_4H_9O$ | F | F | 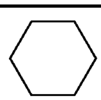 | OCO | 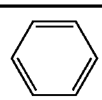 | — | F | H | $OCH_3$ | |

TABLE 188-continued
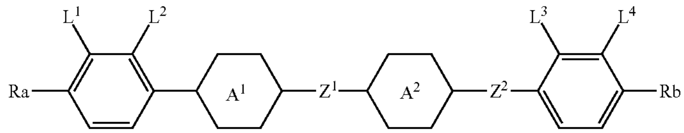
OCO = 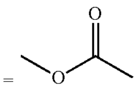
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2837 | $C_4H_9O$ | F | F | 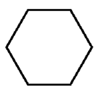 | OCO | 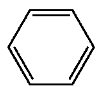 | — | F | H | $OC_2H_5$ | |
| 2838 | $C_4H_9O$ | F | F | 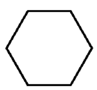 | OCO | 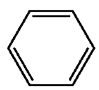 | — | F | H | $OC_3H_7$ | |
| 2839 | $C_4H_9O$ | F | F | 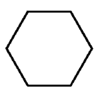 | OCO | 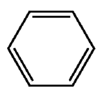 | — | F | H | $OC_4H_9$ | |
| 2840 | $C_4H_9O$ | F | F | 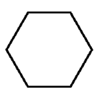 | OCO | 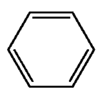 | — | F | H | $OC_5H_{11}$ | |
| 2841 | $C_5H_{11}O$ | F | F | 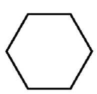 | OCO | 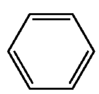 | — | F | H | $OCH_3$ | |
| 2842 | $C_5H_{11}O$ | F | F | 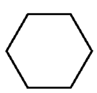 | OCO | 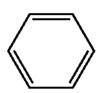 | — | F | H | $OC_2H_5$ | |
| 2843 | $C_5H_{11}O$ | F | F | 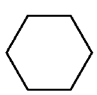 | OCO | 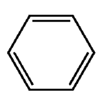 | — | F | H | $OC_3H_7$ | |
| 2844 | $C_5H_{11}O$ | F | F | 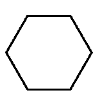 | OCO | 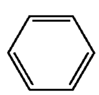 | — | F | H | $OC_4H_9$ | |
| 2845 | $C_5H_{11}O$ | F | F | 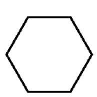 | OCO | 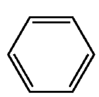 | — | F | H | $OC_5H_{11}$ | |
| 2846 | $C_2H_5$ | F | F | 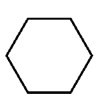 | OCO | 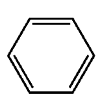 | — | F | H | $C_4H_9$ | |
| 2847 | $C_5H_{11}$ | F | F | 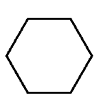 | OCO | 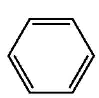 | — | F | H | $C_2H_5$ | |
| 2848 | $C_2H_5$ | F | F | 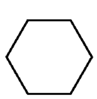 | OCO | 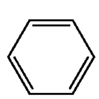 | — | F | H | $OC_4H_9$ | |

TABLE 188-continued

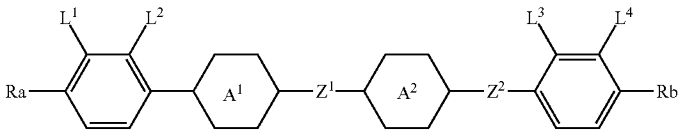

OCO = 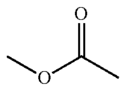

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2849 | $CH_2{=}CH$ | F | F | 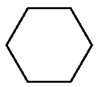 | OCO | 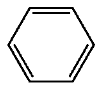 | — | F | H | $OC_3H_7$ | |
| 2850 | $CH_2{=}CH$ | F | F | 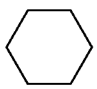 | OCO | 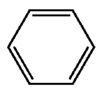 | — | F | H | $OC_5H_{11}$ | |

TABLE 189

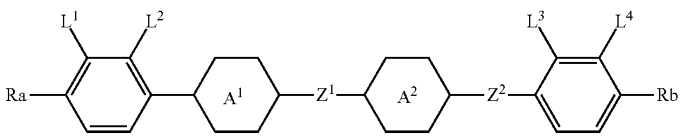

OCO = 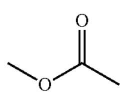

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2851 | $CH_2{=}CHO$ | F | F | 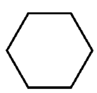 | OCO | 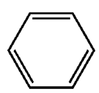 | — | F | H | $OC_3H_7$ | |
| 2852 | $CH_2{=}CHCH_2O$ | F | F | 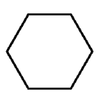 | OCO | 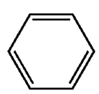 | — | F | H | $OC_5H_{11}$ | |
| 2853 | $CH_2{=}CHCH_2O$ | F | F | 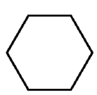 | OCO | 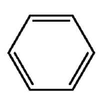 | — | F | H | $OC_3H_7$ | |
| 2854 | $CH_2{=}CHC_2H_5O$ | F | F | 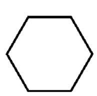 | OCO | 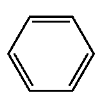 | — | F | H | $OC_5H_{11}$ | |
| 2855 | $CH_2{=}CHC_2H_5O$ | F | F | 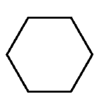 | OCO | 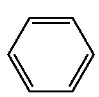 | — | F | H | $OC_2H_5$ | |
| 2856 | $CH_2{=}CHC_2H_5O$ | F | F | 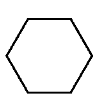 | OCO | 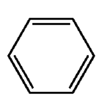 | — | F | H | $OC_3H_7$ | |
| 2857 | $CH_3CH{=}CHCH_2O$ | F | F | 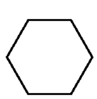 | OCO | 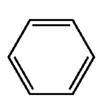 | — | F | H | $OCH_3$ | |

TABLE 189-continued

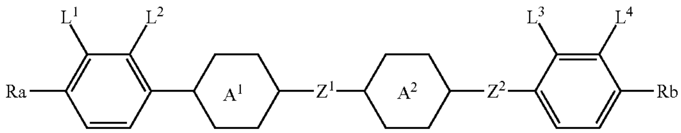

OCO = 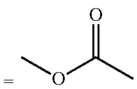

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2858 | $CH_3CH{=}CHCH_2O$ | F | F | 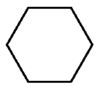 | OCO | 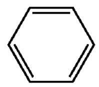 | — | F | H | $OC_2H_5$ | |
| 2859 | $C_3H_7O$ | F | F | 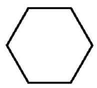 | OCO | 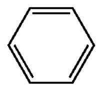 | — | F | H | $OCH{=}CH_2$ | |
| 2860 | $C_3H_7O$ | F | F | 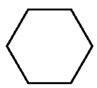 | OCO | 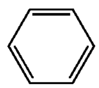 | — | F | H | $OCH_2CH{=}CH_2$ | |
| 2861 | $C_4H_9O$ | F | F | 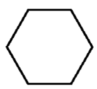 | OCO |  | — | F | H | $OCH_2CH{=}CH_2$ | |
| 2862 | $C_5H_{11}O$ | F | F | 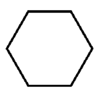 | OCO | 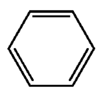 | — | F | H | $OCH_2CH{=}CH_2$ | |
| 2863 | $CH_3O$ | F | F | 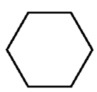 | OCO | 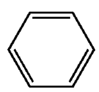 | — | F | H | $OC_2H_5CH{=}CH_2$ | |
| 2864 | $C_2H_5O$ | F | F | 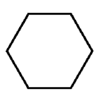 | OCO | 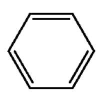 | — | F | H | $OC_2H_5CH{=}CH_2$ | |
| 2865 | $C_3H_7O$ | F | F | 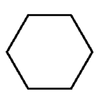 | OCO | 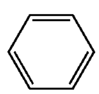 | — | F | H | $OC_2H_5CH{=}CH_2$ | |

TABLE 190

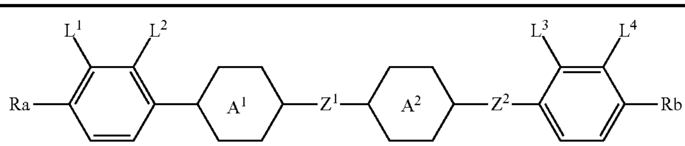

OCO = 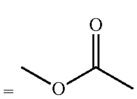

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2866 | $CH_3O$ | F | F | 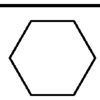 | OCO | 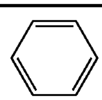 | — | F | H | $OCH_2CH{=}CHCH_3$ | |

TABLE 190-continued

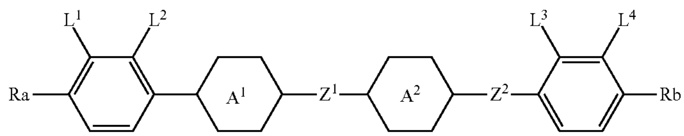

OCO = 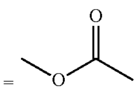

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2867 | $C_2H_5O$ | F | F | 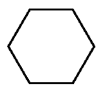 | OCO | 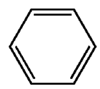 | — | F | H | $OCH_2CH{=}CHCH_3$ | |
| 2868 | $C_3H_7O$ | F | F | 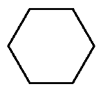 | OCO | 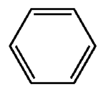 | — | F | H | $OCH_2CH{=}CHCH_3$ | |
| 2869 | $CH_2{=}CHCH_2O$ | F | F | 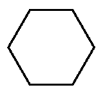 | OCO | 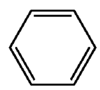 | — | F | H | $OCH{=}CH_2$ | |
| 2870 | $CH_2{=}CHC_2H_5O$ | F | F | 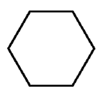 | OCO | 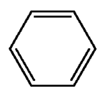 | — | F | H | $OCH_2CH{=}CH_2$ | |
| 2871 | $C_3H_7OCH_2$ | F | F | 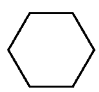 | OCO | 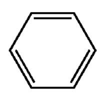 | — | F | H | $OC_3H_7$ | |
| 2872 | $C_5H_{11}O$ | F | F | 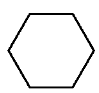 | OCO | 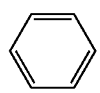 | — | F | H | $OC_2H_5CH{=}CH_2$ | |
| 2873 | $C_3H_7O$ | F | F | 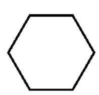 | OCO | 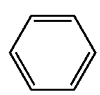 | — | F | H | H | |
| 2874 | $C_5H_{11}O$ | F | F | 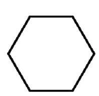 | OCO | 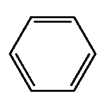 | — | F | H | $OC_9H_{19}$ | |
| 2875 | $C_3H_7O$ | F | F | 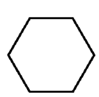 | OCO | 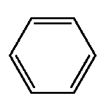 | — | F | H | $C_2H_5$ | |
| 2876 | $C_5H_{11}O$ | F | F | 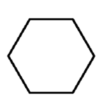 | OCO | 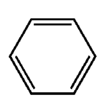 | — | F | H | $C_3H_7$ | |
| 2877 | H | F | F | 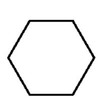 | OCO | 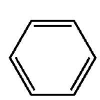 | — | F | H | $OC_4H_9$ | |
| 2878 | $C_7H_{15}O$ | F | F | 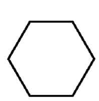 | OCO | 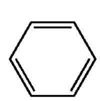 | — | F | H | $OC_4H_9$ | |

TABLE 190-continued
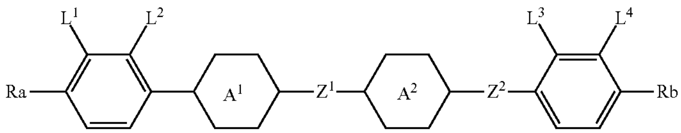
OCO = 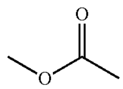
| No. | Ra | L¹ | L² | A¹ | Z¹ | A² | Z² | L³ | L⁴ | Rb | Physical property values |
|---|---|---|---|---|---|---|---|---|---|---|---|
| 2879 | $C_2H_5O$ | F | F | 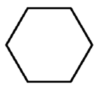 | OCO | 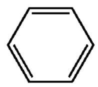 | — | F | H | $OC_6H_{13}$ | |
| 2880 | $CH_3O$ | F | F | 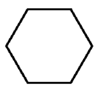 | OCO | 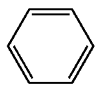 | — | F | H | $C_2H_5$ | |
TABLE 191
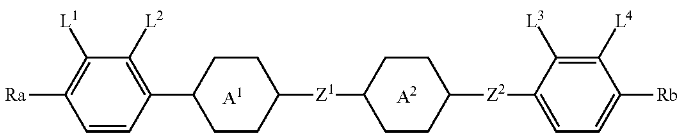
OCO = 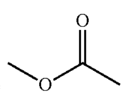
| No. | Ra | L¹ | L² | A¹ | Z¹ | A² | Z² | L³ | L⁴ | Rb | Physical property values |
|---|---|---|---|---|---|---|---|---|---|---|---|
| 2881 | $CH_3O$ | F | F | 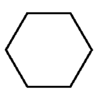 | OCO | 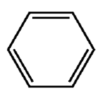 | — | H | F | $OCH_3$ | |
| 2882 | $CH_3O$ | F | F | 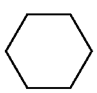 | OCO | 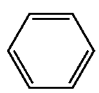 | — | H | F | $OC_2H_5$ | |
| 2883 | $CH_3O$ | F | F | 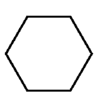 | OCO | 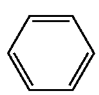 | — | H | F | $OC_3H_7$ | |
| 2884 | $CH_3O$ | F | F | 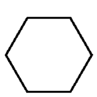 | OCO | 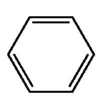 | — | H | F | $OC_4H_9$ | |
| 2885 | $CH_3O$ | F | F | 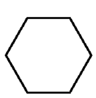 | OCO | 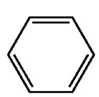 | — | H | F | $OC_5H_{11}$ | |
| 2886 | $C_2H_5O$ | F | F | 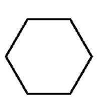 | OCO | 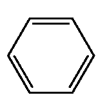 | — | H | F | $OCH_3$ | |
| 2887 | $C_2H_5O$ | F | F | 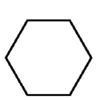 | OCO | 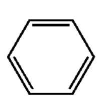 | — | H | F | $OC_2H_5$ | |

TABLE 191-continued

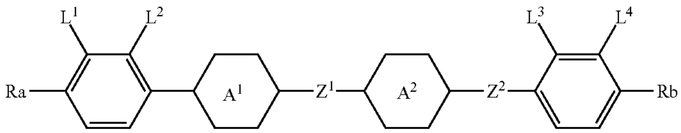

OCO = 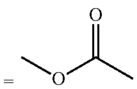

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2888 | $C_2H_5O$ | F | F | 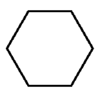 | OCO | 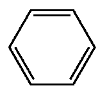 | — | H | F | $OC_3H_7$ | |
| 2889 | $C_2H_5O$ | F | F | 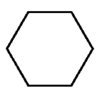 | OCO | 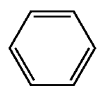 | — | H | F | $OC_4H_9$ | |
| 2890 | $C_2H_5O$ | F | F | 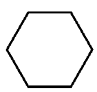 | OCO | 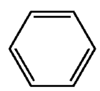 | — | H | F | $OC_5H_{11}$ | |
| 2891 | $C_3H_7O$ | F | F | 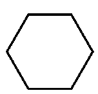 | OCO | 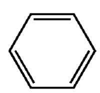 | — | H | F | $OCH_3$ | |
| 2892 | $C_3H_7O$ | F | F | 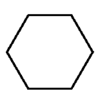 | OCO | 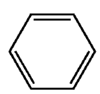 | — | H | F | $OC_2H_5$ | |
| 2893 | $C_3H_7O$ | F | F | 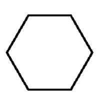 | OCO | 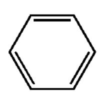 | — | H | F | $OC_3H_7$ | |
| 2894 | $C_3H_7O$ | F | F | 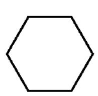 | OCO | 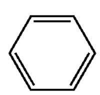 | — | H | F | $OC_4H_9$ | |
| 2895 | $C_3H_7O$ | F | F | 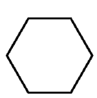 | OCO | 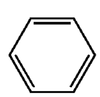 | — | H | F | $OC_5H_{11}$ | |

TABLE 192

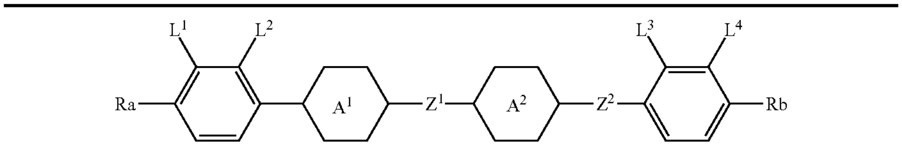

OCO = 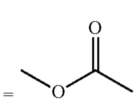

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2896 | $C_4H_9O$ | F | F | 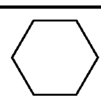 | OCO | 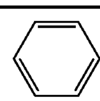 | — | H | F | $OCH_3$ | |

TABLE 192-continued
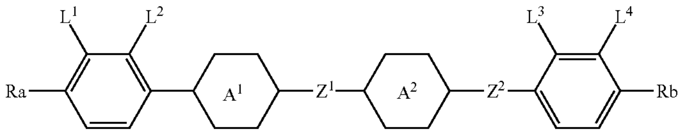
OCO = 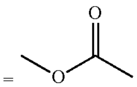
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2897 | $C_4H_9O$ | F | F | 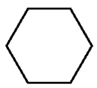 | OCO |  | — | H | F | $OC_2H_5$ | |
| 2898 | $C_4H_9O$ | F | F | 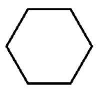 | OCO | 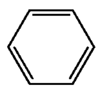 | — | H | F | $OC_3H_7$ | |
| 2899 | $C_4H_9O$ | F | F | 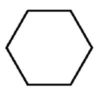 | OCO |  | — | H | F | $OC_4H_9$ | |
| 2900 | $C_4H_9O$ | F | F | 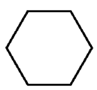 | OCO |  | — | H | F | $OC_5H_{11}$ | |
| 2901 | $C_5H_{11}O$ | F | F | 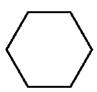 | OCO | 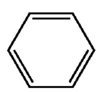 | — | H | F | $OCH_3$ | |
| 2902 | $C_5H_{11}O$ | F | F | 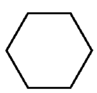 | OCO | 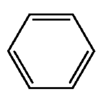 | — | H | F | $OC_2H_5$ | |
| 2903 | $C_5H_{11}O$ | F | F | 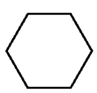 | OCO | 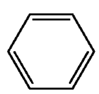 | — | H | F | $OC_3H_7$ | |
| 2904 | $C_5H_{11}O$ | F | F | 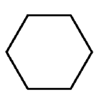 | OCO | 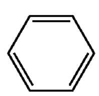 | — | H | F | $OC_4H_9$ | |
| 2905 | $C_5H_{11}O$ | F | F | 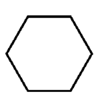 | OCO | 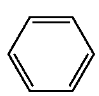 | — | H | F | $OC_5H_{11}$ | |
| 2906 | $C_2H_5$ | F | F | 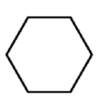 | OCO | 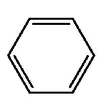 | — | H | F | $C_4H_9$ | |
| 2907 | $C_5H_{11}$ | F | F | 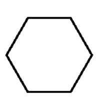 | OCO | 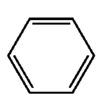 | — | H | F | $C_2H_5$ | |
| 2908 | $C_2H_5$ | F | F | 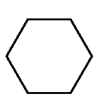 | OCO | 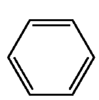 | — | H | F | $OC_4H_9$ | |

TABLE 192-continued

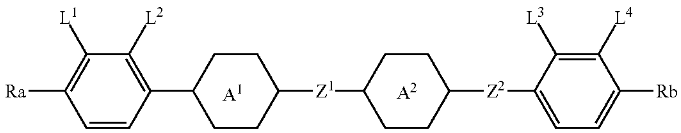

OCO = 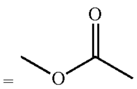

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2909 | $CH_2{=}CH$ | F | F | 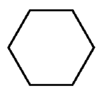 | OCO | 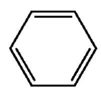 | — | H | F | $OC_3H_7$ | |
| 2910 | $CH_2{=}CH$ | F | F | 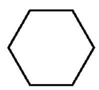 | OCO | 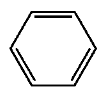 | — | H | F | $OC_5H_{11}$ | |

TABLE 193

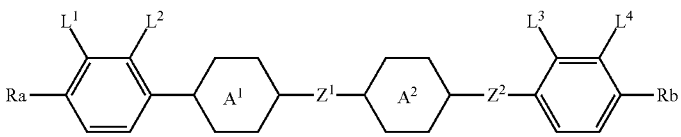

OCO = 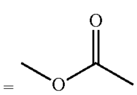

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2911 | $CH_2{=}CHO$ | F | F | 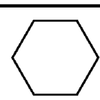 | OCO | 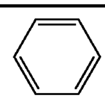 | — | H | F | $OC_3H_7$ | |
| 2912 | $CH_2{=}CHCH_2O$ | F | F | 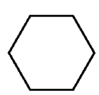 | OCO | 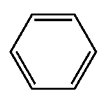 | — | H | F | $OC_5H_{11}$ | |
| 2913 | $CH_2{=}CHCH_2O$ | F | F | 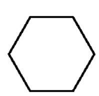 | OCO | 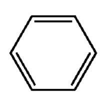 | — | H | F | $OC_3H_7$ | |
| 2914 | $CH_2{=}CHC_2H_5O$ | F | F | 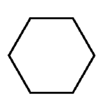 | OCO | 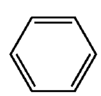 | — | H | F | $OC_5H_{11}$ | |
| 2915 | $CH_2{=}CHC_2H_5O$ | F | F | 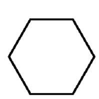 | OCO | 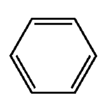 | — | H | F | $OC_2H_5$ | |
| 2916 | $CH_2{=}CHC_2H_5O$ | F | F | 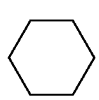 | OCO | 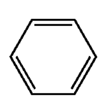 | — | H | F | $OC_3H_7$ | |
| 2917 | $CH_3CH{=}CHCH_2O$ | F | F | 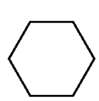 | OCO | 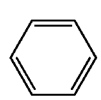 | — | H | F | $OCH_3$ | |

TABLE 193-continued
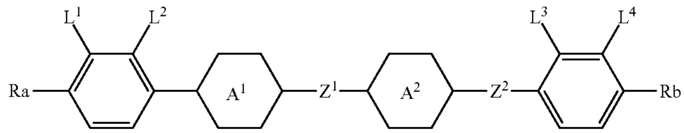
OCO = 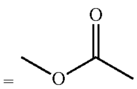
| No. | Ra | L1 | L2 | A1 | Z1 | A2 | Z2 | L3 | L4 | Rb | Physical property values |
|---|---|---|---|---|---|---|---|---|---|---|---|
| 2918 | $CH_3CH{=}CHCH_2O$ | F | F | 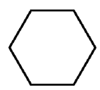 | OCO | 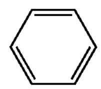 | — | H | F | $OC_2H_5$ | |
| 2919 | $C_3H_7O$ | F | F | 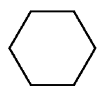 | OCO | 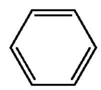 | — | H | F | $OCH{=}CH_2$ | |
| 2920 | $C_3H_7O$ | F | F | 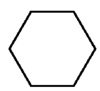 | OCO | 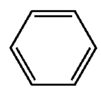 | — | H | F | $OCH_2CH{=}CH_2$ | |
| 2921 | $C_4H_9O$ | F | F | 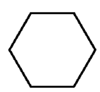 | OCO | 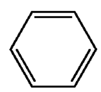 | — | H | F | $OCH_2CH{=}CH_2$ | |
| 2922 | $C_5H_{11}O$ | F | F | 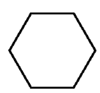 | OCO | 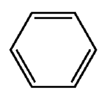 | — | H | F | $OCH_2CH{=}CH_2$ | |
| 2923 | $CH_3O$ | F | F | 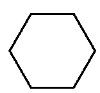 | OCO | 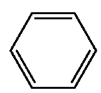 | — | H | F | $OC_2H_5CH{=}CH_2$ | |
| 2924 | $C_2H_5O$ | F | F | 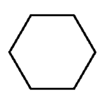 | OCO | 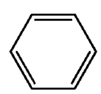 | — | H | F | $OC_2H_5CH{=}CH_2$ | |
| 2925 | $C_3H_7O$ | F | F | 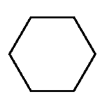 | OCO | 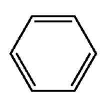 | — | H | F | $OC_2H_5CH{=}CH_2$ | |
TABLE 194
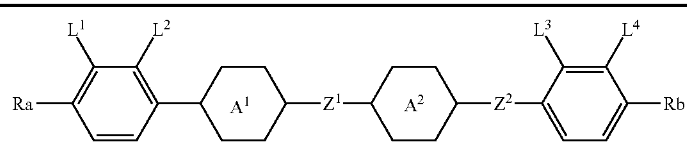
OCO = 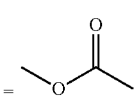
| No. | Ra | L1 | L2 | A1 | Z1 | A2 | Z2 | L3 | L4 | Rb | Physical property values |
|---|---|---|---|---|---|---|---|---|---|---|---|
| 2926 | $CH_3O$ | F | F | 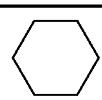 | OCO | 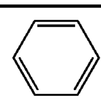 | — | H | F | $OCH_2CH{=}CHCH_3$ | |

TABLE 194-continued

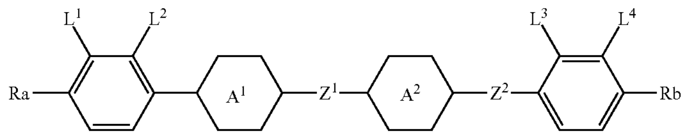

OCO = 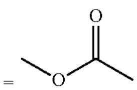

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2927 | $C_2H_5O$ | F | F | 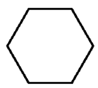 | OCO | 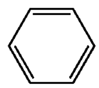 | — | H | F | $OCH_2CH{=}CHCH_3$ | |
| 2928 | $C_3H_7O$ | F | F | 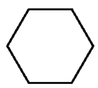 | OCO | 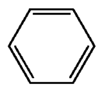 | — | H | F | $OCH_2CH{=}CHCH_3$ | |
| 2929 | $CH_2{=}CHCH_2O$ | F | F | 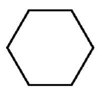 | OCO | 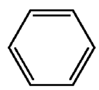 | — | H | F | $OCH{=}CH_2$ | |
| 2930 | $CH_2{=}CHC_2H_5O$ | F | F | 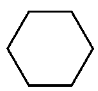 | OCO | 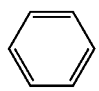 | — | H | F | $OCH_2CH{=}CH_2$ | |
| 2931 | $C_3H_7OCH_2$ | F | F | 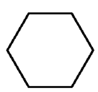 | OCO | 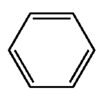 | — | H | F | $OC_3H_7$ | |
| 2932 | $C_5H_{11}O$ | F | F | 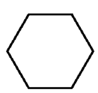 | OCO | 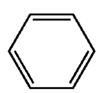 | — | H | F | $OC_2H_5CH{=}CH_2$ | |
| 2933 | $C_3H_7O$ | F | F | 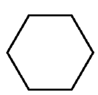 | OCO | 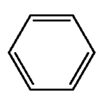 | — | H | F | H | |
| 2934 | $C_5H_{11}O$ | F | F | 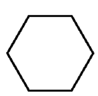 | OCO | 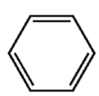 | — | H | F | $OC_9H_{19}$ | |
| 2935 | $C_3H_7O$ | F | F | 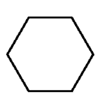 | OCO | 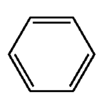 | — | H | F | $C_2H_5$ | |
| 2936 | $C_5H_{11}O$ | F | F | 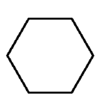 | OCO | 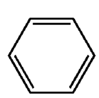 | — | H | F | $C_3H_7$ | |
| 2937 | H | F | F | 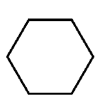 | OCO | 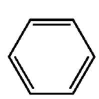 | — | H | F | $OC_4H_9$ | |
| 2938 | $C_7H_{15}O$ | F | F | 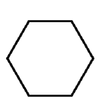 | OCO | 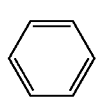 | — | H | F | $OC_4H_9$ | |

TABLE 194-continued
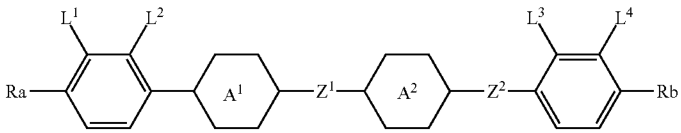
OCO = 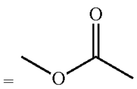
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2939 | $C_2H_5O$ | F | F | 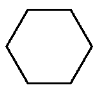 | OCO | 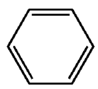 | — | H | F | $OC_6H_{13}$ | |
| 2940 | $CH_3O$ | F | F | 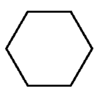 | OCO |  | — | H | F | $C_2H_5$ | |
TABLE 195
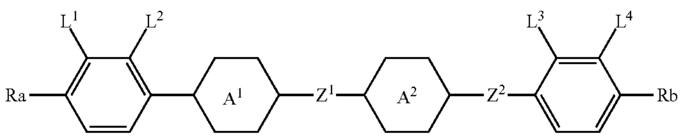
OCO = 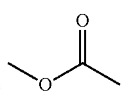
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2941 | $CH_3O$ | F | F | 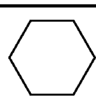 | OCO | 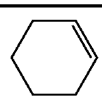 | — | F | F | $OCH_3$ | |
| 2942 | $CH_3O$ | F | F | 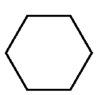 | OCO | 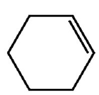 | — | F | F | $OC_2H_5$ | |
| 2943 | $CH_3O$ | F | F | 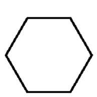 | OCO | 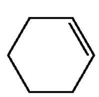 | — | F | F | $OC_3H_7$ | |
| 2944 | $CH_3O$ | F | F | 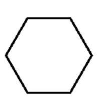 | OCO | 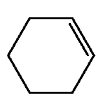 | — | F | F | $OC_4H_9$ | |
| 2945 | $CH_3O$ | F | F | 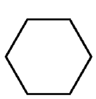 | OCO | 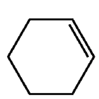 | — | F | F | $OC_5H_{11}$ | |
| 2946 | $C_2H_5O$ | F | F | 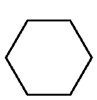 | OCO | 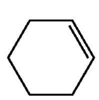 | — | F | F | $OCH_3$ | |
| 2947 | $C_2H_5O$ | F | F | 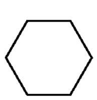 | OCO | 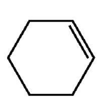 | — | F | F | $OC_2H_5$ | |

TABLE 195-continued

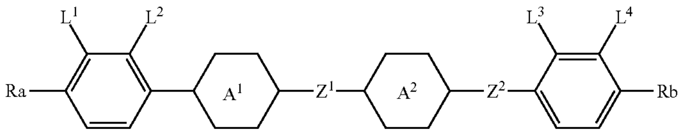

OCO = 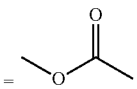

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2948 | $C_2H_5O$ | F | F | 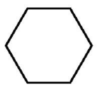 | OCO | 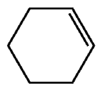 | — | F | F | $OC_3H_7$ | |
| 2949 | $C_2H_5O$ | F | F | 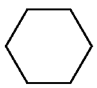 | OCO | 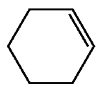 | — | F | F | $OC_4H_9$ | |
| 2950 | $C_2H_5O$ | F | F | 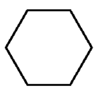 | OCO | 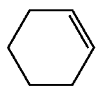 | — | F | F | $OC_5H_{11}$ | |
| 2951 | $C_3H_7O$ | F | F | 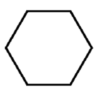 | OCO | 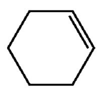 | — | F | F | $OCH_3$ | |
| 2952 | $C_3H_7O$ | F | F | 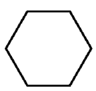 | OCO | 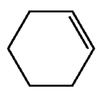 | — | F | F | $OC_2H_5$ | |
| 2953 | $C_3H_7O$ | F | F | 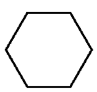 | OCO | 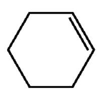 | — | F | F | $OC_3H_7$ | |
| 2954 | $C_3H_7O$ | F | F | 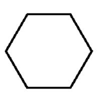 | OCO | 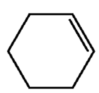 | — | F | F | $OC_4H_9$ | |
| 2955 | $C_3H_7O$ | F | F | 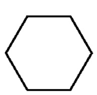 | OCO | 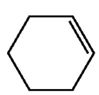 | — | F | F | $OC_5H_{11}$ | |

TABLE 196

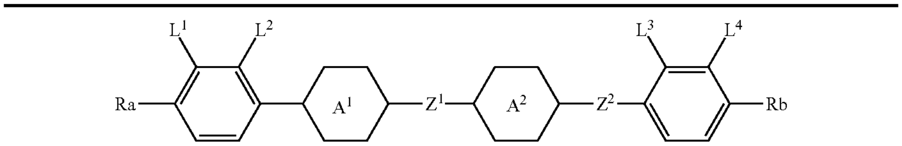

OCO = 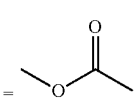

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2956 | $C_4H_9O$ | F | F | 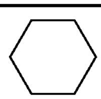 | OCO | 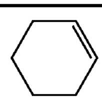 | — | F | F | $OCH_3$ | |

TABLE 196-continued
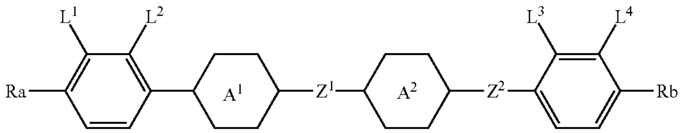
OCO = 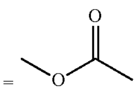
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2957 | $C_4H_9O$ | F | F | 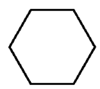 | OCO | 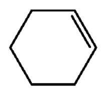 | — | F | F | $OC_2H_5$ | |
| 2958 | $C_4H_9O$ | F | F | 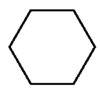 | OCO | 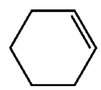 | — | F | F | $OC_3H_7$ | |
| 2959 | $C_4H_9O$ | F | F | 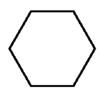 | OCO | 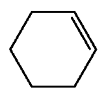 | — | F | F | $OC_4H_9$ | |
| 2960 | $C_4H_9O$ | F | F | 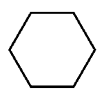 | OCO | 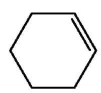 | — | F | F | $OC_5H_{11}$ | |
| 2961 | $C_5H_{11}O$ | F | F | 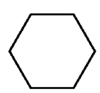 | OCO | 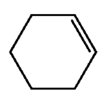 | — | F | F | $OCH_3$ | |
| 2962 | $C_5H_{11}O$ | F | F | 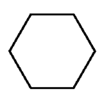 | OCO | 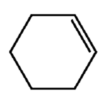 | — | F | F | $OC_2H_5$ | |
| 2963 | $C_5H_{11}O$ | F | F | 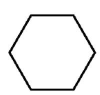 | OCO | 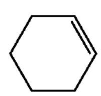 | — | F | F | $OC_3H_7$ | |
| 2964 | $C_5H_{11}O$ | F | F | 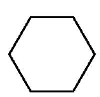 | OCO | 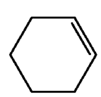 | — | F | F | $OC_4H_9$ | |
| 2965 | $C_5H_{11}O$ | F | F | 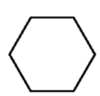 | OCO | 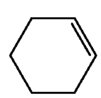 | — | F | F | $OC_5H_{11}$ | |
| 2966 | $C_2H_5$ | F | F | 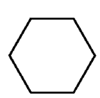 | OCO | 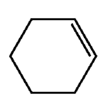 | — | F | F | $C_4H_9$ | |
| 2967 | $C_5H_{11}$ | F | F | 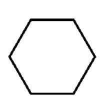 | OCO | 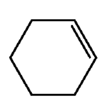 | — | F | F | $C_2H_5$ | |
| 2968 | $C_2H_5$ | F | F | 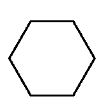 | OCO | 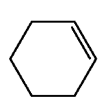 | — | F | F | $OC_4H_9$ | |

TABLE 196-continued

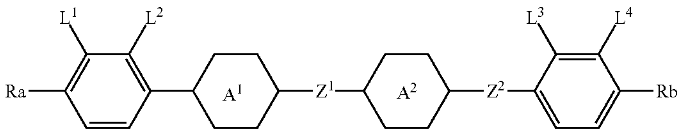

OCO = 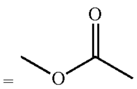

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2969 | $CH_2$═CH | F | F | 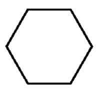 | OCO | 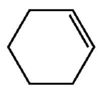 | — | F | F | $OC_3H_7$ | |
| 2970 | $CH_2$═CH | F | F | 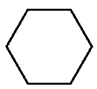 | OCO | 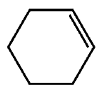 | — | F | F | $OC_5H_{11}$ | |

TABLE 197

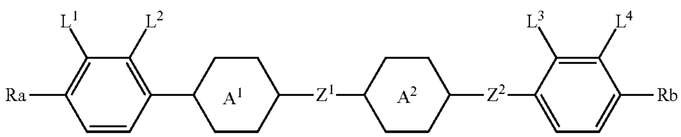

OCO = 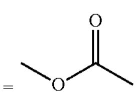

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2971 | $CH_3O$ | F | F | 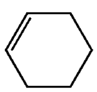 | OCO | 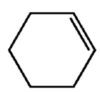 | — | F | F | $OCH_3$ | |
| 2972 | $CH_3O$ | F | F | 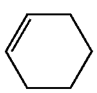 | OCO | 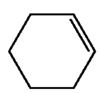 | — | F | F | $OC_2H_5$ | |
| 2973 | $CH_3O$ | F | F | 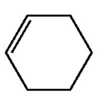 | OCO | 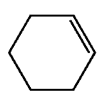 | — | F | F | $OC_3H_7$ | |
| 2974 | $CH_3O$ | F | F | 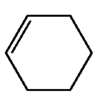 | OCO | 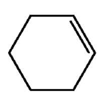 | — | F | F | $OC_4H_9$ | |
| 2975 | $CH_3O$ | F | F | 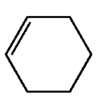 | OCO | 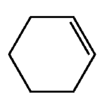 | — | F | F | $OC_5H_{11}$ | |
| 2976 | $C_2H_5O$ | F | F | 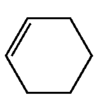 | OCO | 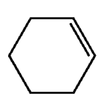 | — | F | F | $OCH_3$ | |
| 2977 | $C_2H_5O$ | F | F | 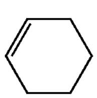 | OCO | 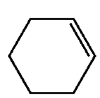 | — | F | F | $OC_2H_5$ | |

TABLE 197-continued

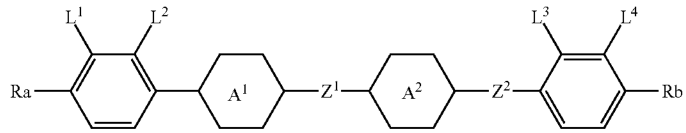

OCO = 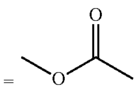

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2978 | $C_2H_5O$ | F | F | 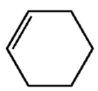 | OCO | 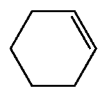 | — | F | F | $OC_3H_7$ | |
| 2979 | $C_2H_5O$ | F | F | 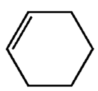 | OCO | 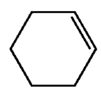 | — | F | F | $OC_4H_9$ | |
| 2980 | $C_2H_5O$ | F | F | 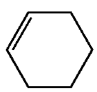 | OCO | 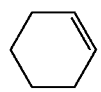 | — | F | F | $OC_5H_{11}$ | |
| 2981 | $C_3H_7O$ | F | F | 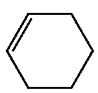 | OCO | 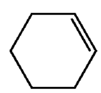 | — | F | F | $OCH_3$ | |
| 2982 | $C_3H_7O$ | F | F | 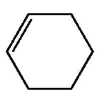 | OCO | 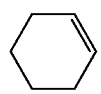 | — | F | F | $OC_2H_5$ | |
| 2983 | $C_3H_7O$ | F | F | 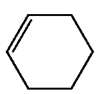 | OCO | 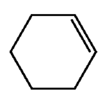 | — | F | F | $OC_3H_7$ | |
| 2984 | $C_3H_7O$ | F | F | 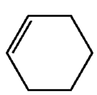 | OCO | 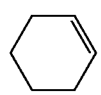 | — | F | F | $OC_4H_9$ | |
| 2985 | $C_3H_7O$ | F | F | 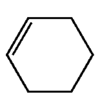 | OCO | 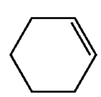 | — | F | F | $OC_5H_{11}$ | |

TABLE 198

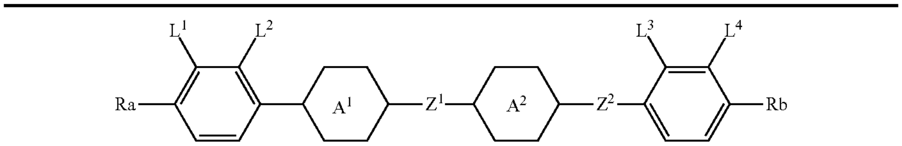

OCO = 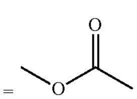

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2986 | $C_4H_9O$ | F | F | 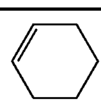 | OCO | 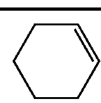 | — | F | F | $OCH_3$ | |

TABLE 198-continued
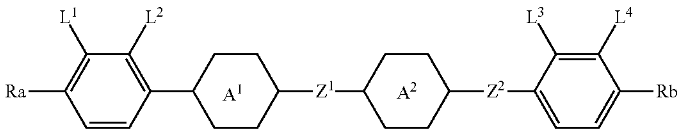
OCO = 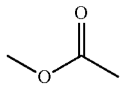
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2987 | $C_4H_9O$ | F | F | 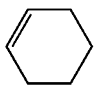 | OCO | 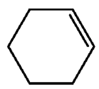 | — | F | F | $OC_2H_5$ | |
| 2988 | $C_4H_9O$ | F | F | 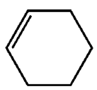 | OCO | 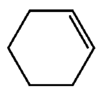 | — | F | F | $OC_3H_7$ | |
| 2989 | $C_4H_9O$ | F | F | 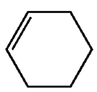 | OCO | 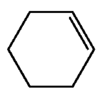 | — | F | F | $OC_4H_9$ | |
| 2990 | $C_4H_9O$ | F | F | 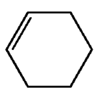 | OCO | 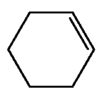 | — | F | F | $OC_5H_{11}$ | |
| 2991 | $C_5H_{11}O$ | F | F | 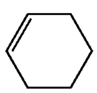 | OCO | 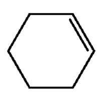 | — | F | F | $OCH_3$ | |
| 2992 | $C_5H_{11}O$ | F | F | 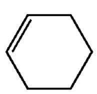 | OCO | 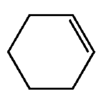 | — | F | F | $OC_2H_5$ | |
| 2993 | $C_5H_{11}O$ | F | F | 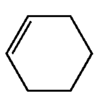 | OCO | 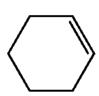 | — | F | F | $OC_3H_7$ | |
| 2994 | $C_5H_{11}O$ | F | F | 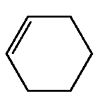 | OCO | 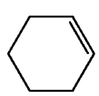 | — | F | F | $OC_4H_9$ | |
| 2995 | $C_5H_{11}O$ | F | F | 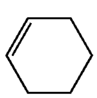 | OCO | 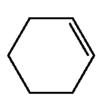 | — | F | F | $OC_5H_{11}$ | |
| 2996 | $C_2H_5$ | F | F | 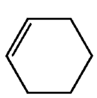 | OCO | 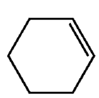 | — | F | F | $C_4H_9$ | |
| 2997 | $C_5H_{11}$ | F | F | 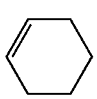 | OCO | 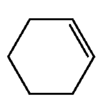 | — | F | F | $C_2H_5$ | |
| 2998 | $C_2H_5$ | F | F | 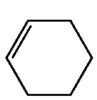 | OCO | 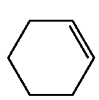 | — | F | F | $OC_4H_9$ | |

TABLE 198-continued

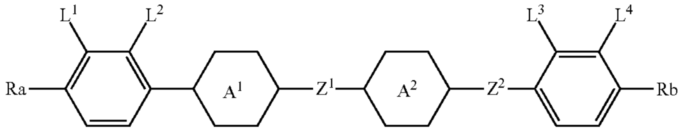

OCO = 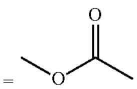

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 2999 | $CH_2$═CH | F | F | 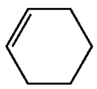 | OCO | 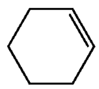 | — | F | F | $OC_3H_7$ | |
| 3000 | $CH_2$═CH | F | F | 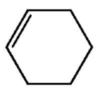 | OCO | 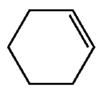 | — | F | F | $OC_5H_{11}$ | |

TABLE 199

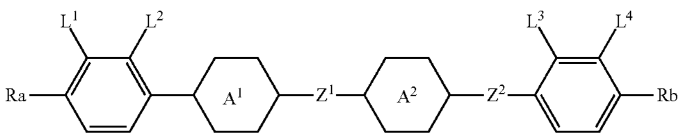

OCO = 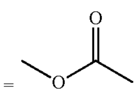

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3001 | $CH_3O$ | F | F | 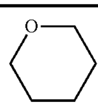 | OCO | 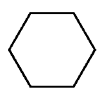 | — | F | F | $OCH_3$ | |
| 3002 | $CH_3O$ | F | F | 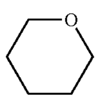 | OCO | 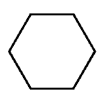 | — | F | F | $OC_2H_5$ | |
| 3003 | $CH_3O$ | F | F | 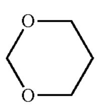 | OCO | 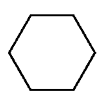 | — | F | F | $OC_3H_7$ | |
| 3004 | $CH_3O$ | F | F | 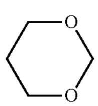 | OCO | 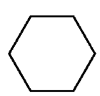 | — | F | F | $OC_4H_9$ | |
| 3005 | $CH_3O$ | F | F | 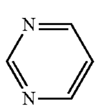 | OCO | 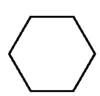 | — | F | F | $OC_5H_{11}$ | |
| 3006 | $C_2H_5O$ | F | F | 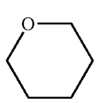 | OCO | 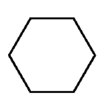 | — | F | F | $OCH_3$ | |
| 3007 | $C_2H_5O$ | F | F | 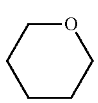 | OCO | 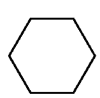 | — | F | F | $OC_2H_5$ | |

TABLE 199-continued

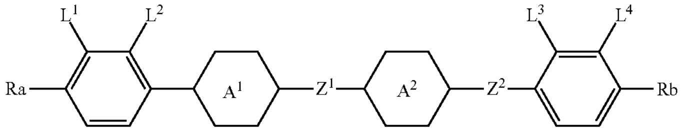

OCO = 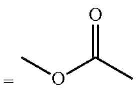

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3008 | $C_2H_5O$ | F | F | 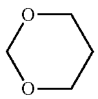 | OCO | 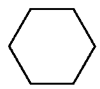 | — | F | F | $OC_3H_7$ | |
| 3009 | $C_2H_5O$ | F | F | 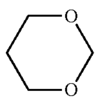 | OCO | 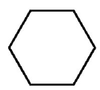 | — | F | F | $OC_4H_9$ | |
| 3010 | $C_2H_5O$ | F | F | 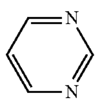 | OCO | 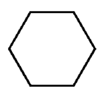 | — | F | F | $OC_5H_{11}$ | |
| 3011 | $C_3H_7O$ | F | F | 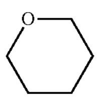 | OCO | 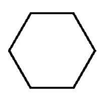 | — | F | F | $OCH_3$ | |
| 3012 | $C_3H_7O$ | F | F | 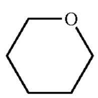 | OCO | 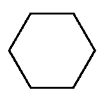 | — | F | F | $OC_2H_5$ | |
| 3013 | $C_3H_7O$ | F | F | 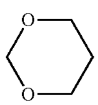 | OCO | 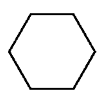 | — | F | F | $OC_3H_7$ | |
| 3014 | $C_3H_7O$ | F | F | 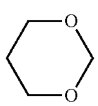 | OCO | 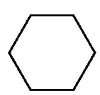 | — | F | F | $OC_4H_9$ | |
| 3015 | $C_3H_7O$ | F | F | 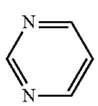 | OCO | 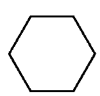 | — | F | F | $OC_5H_{11}$ | |

TABLE 200

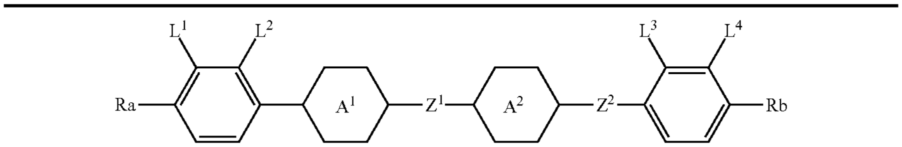

OCO = 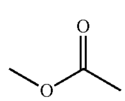

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3016 | $C_4H_9O$ | F | F | 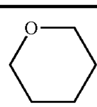 | OCO | 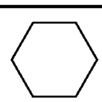 | — | F | F | $OCH_3$ | |

TABLE 200-continued
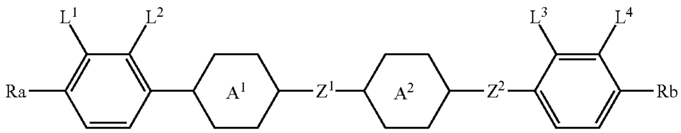
OCO = 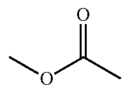
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3017 | $C_4H_9O$ | F | F | 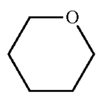 | OCO | 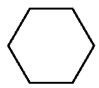 | — | F | F | $OC_2H_5$ | |
| 3018 | $C_4H_9O$ | F | F | 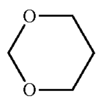 | OCO | 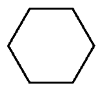 | — | F | F | $OC_3H_7$ | |
| 3019 | $C_4H_9O$ | F | F | 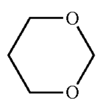 | OCO | 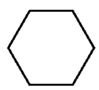 | — | F | F | $OC_4H_9$ | |
| 3020 | $C_4H_9O$ | F | F | 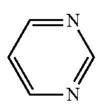 | OCO | 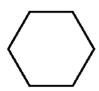 | — | F | F | $OC_5H_{11}$ | |
| 3021 | $C_5H_{11}O$ | F | F | 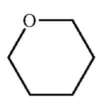 | OCO | 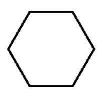 | — | F | F | $OCH_3$ | |
| 3022 | $C_5H_{11}O$ | F | F | 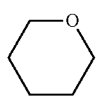 | OCO | 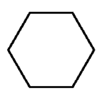 | — | F | F | $OC_2H_5$ | |
| 3023 | $C_5H_{11}O$ | F | F | 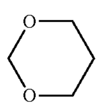 | OCO | 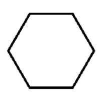 | — | F | F | $OC_3H_7$ | |
| 3024 | $C_5H_{11}O$ | F | F | 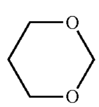 | OCO | 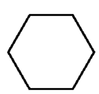 | — | F | F | $OC_4H_9$ | |
| 3025 | $C_5H_{11}O$ | F | F | 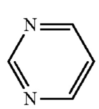 | OCO | 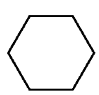 | — | F | F | $OC_5H_{11}$ | |
| 3026 | $C_2H_5$ | F | F | 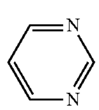 | OCO | 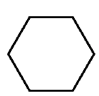 | — | F | F | $C_4H_9$ | |
| 3027 | $C_5H_{11}$ | F | F | 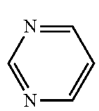 | OCO | 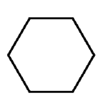 | — | F | F | $C_2H_5$ | |
| 3028 | $C_2H_5$ | F | F | 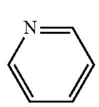 | OCO | 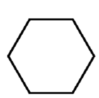 | — | F | F | $OC_4H_9$ | |

TABLE 200-continued

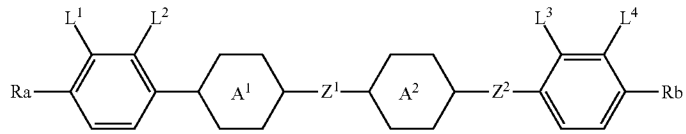

OCO = 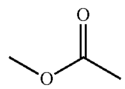

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3029 | $CH_2$=CH | F | F | 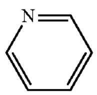 | OCO | 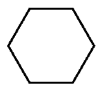 | — | F | F | $OC_3H_7$ | |
| 3030 | $CH_2$=CH | F | F | 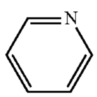 | OCO | 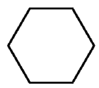 | — | F | F | $OC_5H_{11}$ | |

TABLE 201

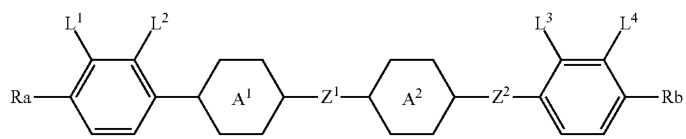

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3031 | $CH_3O$ | F | F | 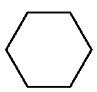 | — | 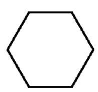 | $CH_2CH_2$ | F | F | $OCH_3$ | |
| 3032 | $CH_3O$ | F | F | 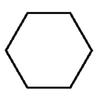 | — | 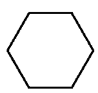 | $CH_2CH_2$ | F | F | $OC_2H_5$ | |
| 3033 | $CH_3O$ | F | F | 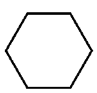 | — | 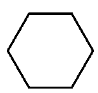 | $CH_2CH_2$ | F | F | $OC_3H_7$ | |
| 3034 | $CH_3O$ | F | F | 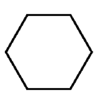 | — | 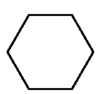 | $CH_2CH_2$ | F | F | $OC_4H_9$ | |
| 3035 | $CH_3O$ | F | F | 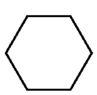 | — | 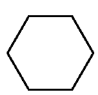 | $CH_2CH_2$ | F | F | $OC_5H_{11}$ | |
| 3036 | $C_2H_5O$ | F | F | 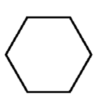 | — | 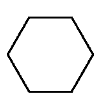 | $CH_2CH_2$ | F | F | $OCH_3$ | |
| 3037 | $C_2H_5O$ | F | F | 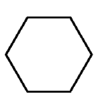 | — | 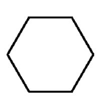 | $CH_2CH_2$ | F | F | $OC_2H_5$ | |
| 3038 | $C_2H_5O$ | F | F | 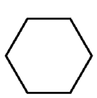 | — | 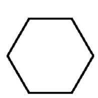 | $CH_2CH_2$ | F | F | $OC_3H_7$ | |

TABLE 201-continued

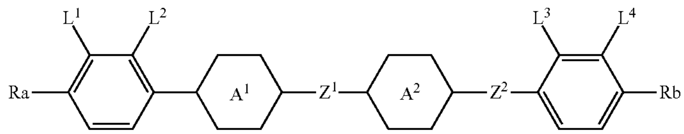

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3039 | $C_2H_5O$ | F | F | 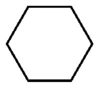 | — | 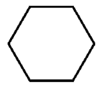 | $CH_2CH_2$ | F | F | $OC_4H_9$ | |
| 3040 | $C_2H_5O$ | F | F | 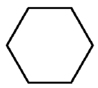 | — | 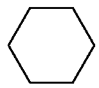 | $CH_2CH_2$ | F | F | $OC_5H_{11}$ | |
| 3041 | $C_3H_7O$ | F | F | 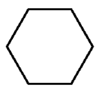 | — | 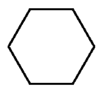 | $CH_2CH_2$ | F | F | $OCH_3$ | |
| 3042 | $C_3H_7O$ | F | F | 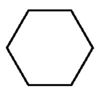 | — | 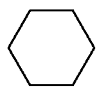 | $CH_2CH_2$ | F | F | $OC_2H_5$ | |
| 3043 | $C_3H_7O$ | F | F | 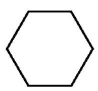 | — | 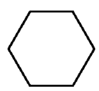 | $CH_2CH_2$ | F | F | $OC_3H_7$ | |
| 3044 | $C_3H_7O$ | F | F | 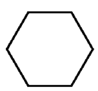 | — | 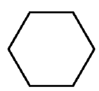 | $CH_2CH_2$ | F | F | $OC_4H_9$ | |
| 3045 | $C_3H_7O$ | F | F | 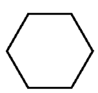 | — | 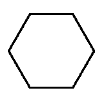 | $CH_2CH_2$ | F | F | $OC_5H_{11}$ | |

TABLE 202

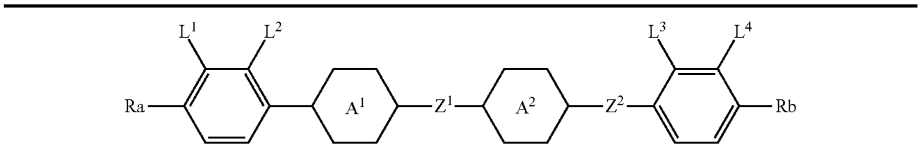

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3046 | $C_4H_9O$ | F | F | 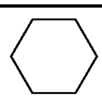 | — | 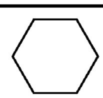 | $CH_2CH_2$ | F | F | $OCH_3$ | |
| 3047 | $C_4H_9O$ | F | F | 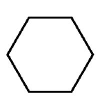 | — | 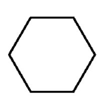 | $CH_2CH_2$ | F | F | $OC_2H_5$ | C 62.6 $S_A$ 169.7 N 242.5 I $T_{NI}$: 201.3° C., Δϵ: −7.47, Δn: 0.142 |
| 3048 | $C_4H_9O$ | F | F | 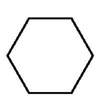 | — | 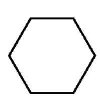 | $CH_2CH_2$ | F | F | $OC_3H_7$ | |
| 3049 | $C_4H_9O$ | F | F | 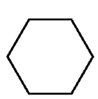 | — | 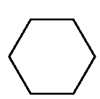 | $CH_2CH_2$ | F | F | $OC_4H_9$ | |
| 3050 | $C_4H_9O$ | F | F | 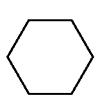 | — | 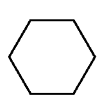 | $CH_2CH_2$ | F | F | $OC_5H_{11}$ | |

TABLE 202-continued

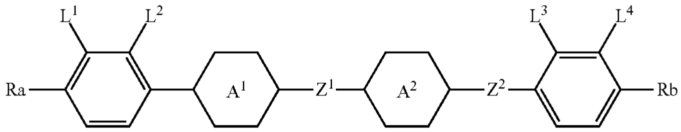

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3051 | $C_5H_{11}O$ | F | F | 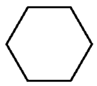 | — | 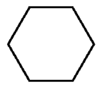 | $CH_2CH_2$ | F | F | $OCH_3$ | |
| 3052 | $C_5H_{11}O$ | F | F | 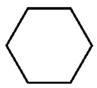 | — | 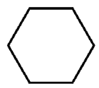 | $CH_2CH_2$ | F | F | $OC_2H_5$ | |
| 3053 | $C_5H_{11}O$ | F | F | 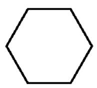 | — | 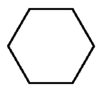 | $CH_2CH_2$ | F | F | $OC_3H_7$ | |
| 3054 | $C_5H_{11}O$ | F | F | 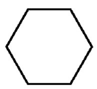 | — | 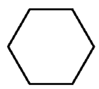 | $CH_2CH_2$ | F | F | $OC_4H_9$ | |
| 3055 | $C_5H_{11}O$ | F | F | 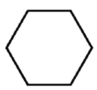 | — | 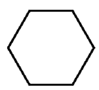 | $CH_2CH_2$ | F | F | $OC_5H_{11}$ | |
| 3056 | $C_2H_5$ | F | F | 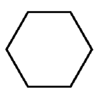 | — | 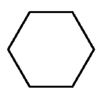 | $CH_2CH_2$ | F | F | $C_4H_9$ | |
| 3057 | $C_5H_{11}$ | F | F | 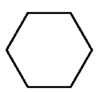 | — | 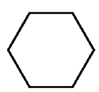 | $CH_2CH_2$ | F | F | $C_2H_5$ | |
| 3058 | $C_2H_5$ | F | F | 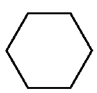 | — | 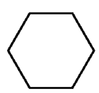 | $CH_2CH_2$ | F | F | $OC_4H_9$ | |
| 3059 | $CH_2{=}CH$ | F | F | 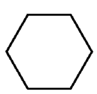 | — | 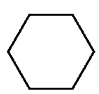 | $CH_2CH_2$ | F | F | $OC_3H_7$ | |
| 3060 | $CH_2{=}CH$ | F | F | 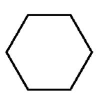 | — | 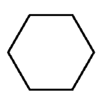 | $CH_2CH_2$ | F | F | $OC_5H_{11}$ | |

TABLE 203

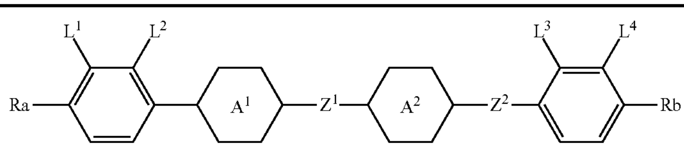

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3061 | $CH_2{=}CHO$ | F | F | 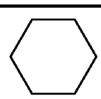 | — | 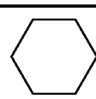 | $CH_2CH_2$ | F | F | $OC_3H_7$ | |

TABLE 203-continued

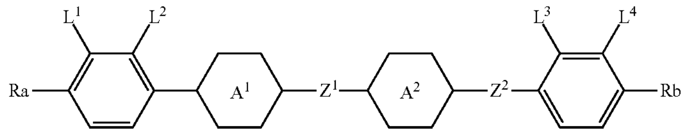

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3062 | $CH_2$═$CHCH_2O$ | F | F | 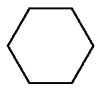 | — | 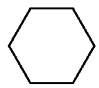 | $CH_2CH_2$ | F | F | $OC_5H_{11}$ | |
| 3063 | $CH_2$═$CHCH_2O$ | F | F | 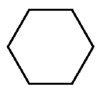 | — | 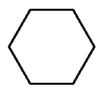 | $CH_2CH_2$ | F | F | $OC_3H_7$ | |
| 3064 | $CH_2$═$CHC_2H_5O$ | F | F | 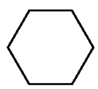 | — | 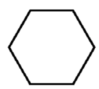 | $CH_2CH_2$ | F | F | $OC_5H_{11}$ | |
| 3065 | $CH_2$═$CHC_2H_5O$ | F | F | 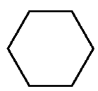 | — | 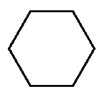 | $CH_2CH_2$ | F | F | $OC_2H_5$ | |
| 3066 | $CH_2$═$CHC_2H_5O$ | F | F | 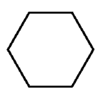 | — | 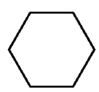 | $CH_2CH_2$ | F | F | $OC_3H_7$ | |
| 3067 | $CH_3CH$═$CHCH_2O$ | F | F | 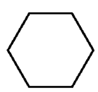 | — | 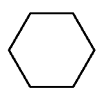 | $CH_2CH_2$ | F | F | $OCH_3$ | |
| 3068 | $CH_3CH$═$CHCH_2O$ | F | F | 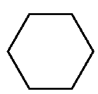 | — | 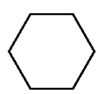 | $CH_2CH_2$ | F | F | $OC_2H_5$ | |
| 3069 | $C_3H_7O$ | F | F | 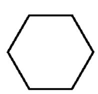 | — | 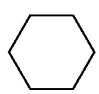 | $CH_2CH_2$ | F | F | $OCH$═$CH_2$ | |
| 3070 | $C_3H_7O$ | F | F | 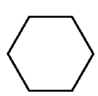 | — | 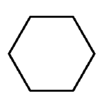 | $CH_2CH_2$ | F | F | $OCH_2CH$═$CH_2$ | |
| 3071 | $C_4H_9O$ | F | F | 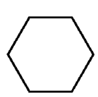 | — | 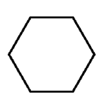 | $CH_2CH_2$ | F | F | $OCH_2CH$═$CH_2$ | |
| 3072 | $C_5H_{11}O$ | F | F | 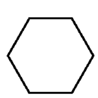 | — | 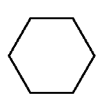 | $CH_2CH_2$ | F | F | $OCH_2CH$═$CH_2$ | |
| 3073 | $CH_3O$ | F | F | 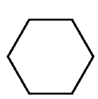 | — | 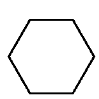 | $CH_2CH_2$ | F | F | $OC_2H_5CH$═$CH_2$ | |
| 3074 | $C_2H_5O$ | F | F | 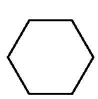 | — | 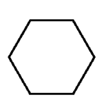 | $CH_2CH_2$ | F | F | $OC_2H_5CH$═$CH_2$ | |
| 3075 | $C_3H_7O$ | F | F | 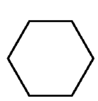 | — | 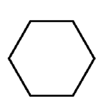 | $CH_2CH_2$ | F | F | $OC_2H_5CH$═$CH_2$ | |

TABLE 204

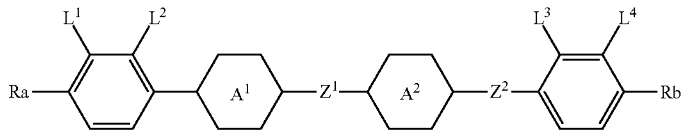

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3076 | $CH_3O$ | F | F | 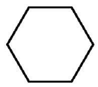 | — | 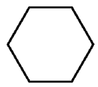 | $CH_2CH_2$ | F | F | $OCH_2CH{=}CHCH_3$ | |
| 3077 | $C_2H_5O$ | F | F | 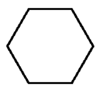 | — | 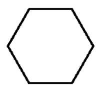 | $CH_2CH_2$ | F | F | $OCH_2CH{=}CHCH_3$ | |
| 3078 | $C_3H_7O$ | F | F | 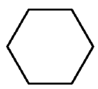 | — | 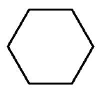 | $CH_2CH_2$ | F | F | $OCH_2CH{=}CHCH_3$ | |
| 3079 | $CH_2{=}CHCH_2O$ | F | F | 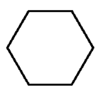 | — | 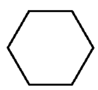 | $CH_2CH_2$ | F | F | $OCH{=}CH_2$ | |
| 3080 | $CH_2{=}CHC_2H_5O$ | F | F | 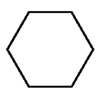 | — | 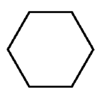 | $CH_2CH_2$ | F | F | $OCH_2CH{=}CH_2$ | |
| 3081 | $C_3H_7OCH_2$ | F | F | 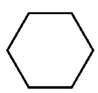 | — | 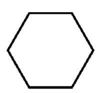 | $CH_2CH_2$ | F | F | $OC_3H_7$ | |
| 3082 | $C_5H_{11}O$ | F | F | 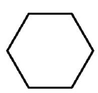 | — | 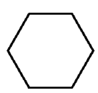 | $CH_2CH_2$ | F | F | $OC_2H_5CH{=}CH_2$ | |
| 3083 | $C_3H_7O$ | F | F | 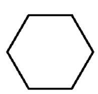 | — | 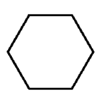 | $CH_2CH_2$ | F | F | H | |
| 3084 | $C_5H_{11}O$ | F | F | 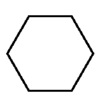 | — | 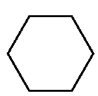 | $CH_2CH_2$ | F | F | $OC_9H_{19}$ | |
| 3085 | $C_3H_7O$ | F | F | 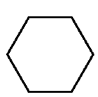 | — | 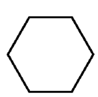 | $CH_2CH_2$ | F | F | $C_2H_5$ | |
| 3086 | $C_5H_{11}O$ | F | F | 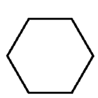 | — | 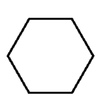 | $CH_2CH_2$ | F | F | $C_3H_7$ | |
| 3087 | H | F | F | 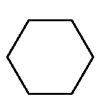 | — | 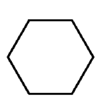 | $CH_2CH_2$ | F | F | $OC_4H_9$ | |
| 3088 | $C_7H_{15}O$ | F | F | 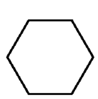 | — | 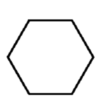 | $CH_2CH_2$ | F | F | $OC_4H_9$ | |

TABLE 204-continued

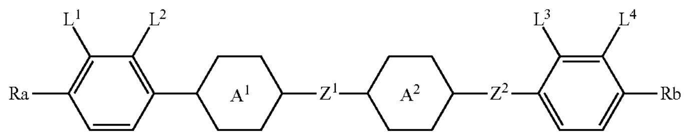

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3089 | $C_2H_5O$ | F | F | 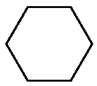 | — | 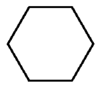 | $CH_2CH_2$ | F | F | $OC_6H_{13}$ | |
| 3090 | $CH_3O$ | F | F | 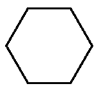 | — | 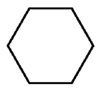 | $CH_2CH_2$ | F | F | $C_2H_5$ | |

TABLE 205

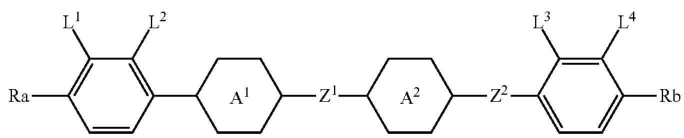

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3091 | $CH_3O$ | H | F | 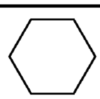 | — | 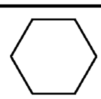 | $CH_2CH_2$ | F | F | $OCH_3$ | |
| 3092 | $CH_3O$ | H | F | 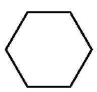 | — | 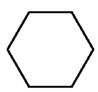 | $CH_2CH_2$ | F | F | $OC_2H_5$ | |
| 3093 | $CH_3O$ | H | F | 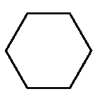 | — | 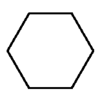 | $CH_2CH_2$ | F | F | $OC_3H_7$ | |
| 3094 | $CH_3O$ | H | F | 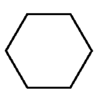 | — | 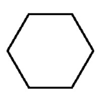 | $CH_2CH_2$ | F | F | $OC_4H_9$ | |
| 3095 | $CH_3O$ | H | F | 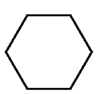 | — | 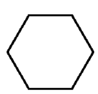 | $CH_2CH_2$ | F | F | $OC_5H_{11}$ | |
| 3096 | $C_2H_5O$ | H | F | 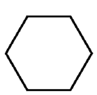 | — | 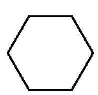 | $CH_2CH_2$ | F | F | $OCH_3$ | |
| 3097 | $C_2H_5O$ | H | F | 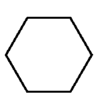 | — | 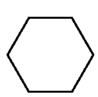 | $CH_2CH_2$ | F | F | $OC_2H_5$ | |
| 3098 | $C_2H_5O$ | H | F | 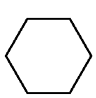 | — | 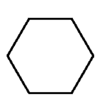 | $CH_2CH_2$ | F | F | $OC_3H_7$ | |
| 3099 | $C_2H_5O$ | H | F | 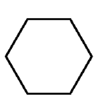 | — | 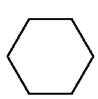 | $CH_2CH_2$ | F | F | $OC_4H_9$ | |

TABLE 205-continued

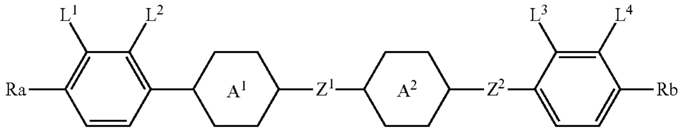

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3100 | $C_2H_5O$ | H | F | 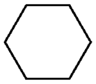 | — | 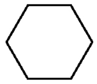 | $CH_2CH_2$ | F | F | $OC_5H_{11}$ | |
| 3101 | $C_3H_7O$ | H | F | 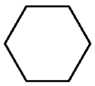 | — | 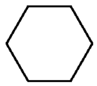 | $CH_2CH_2$ | F | F | $OCH_3$ | |
| 3102 | $C_3H_7O$ | H | F | 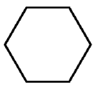 | — | 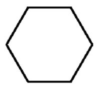 | $CH_2CH_2$ | F | F | $OC_2H_5$ | |
| 3103 | $C_3H_7O$ | H | F | 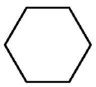 | — | 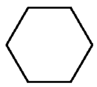 | $CH_2CH_2$ | F | F | $OC_3H_7$ | |
| 3104 | $C_3H_7O$ | H | F | 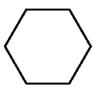 | — | 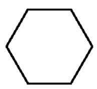 | $CH_2CH_2$ | F | F | $OC_4H_9$ | |
| 3105 | $C_3H_7O$ | H | F | 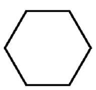 | — | 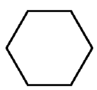 | $CH_2CH_2$ | F | F | $OC_5H_{11}$ | |

TABLE 206

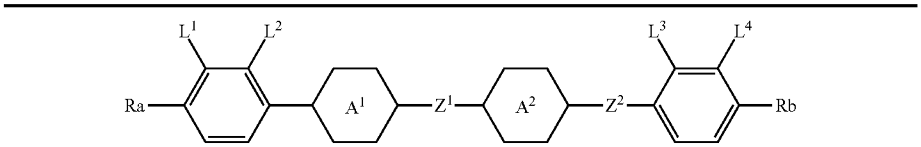

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3106 | $C_4H_9O$ | H | F | 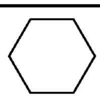 | — | 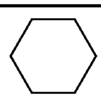 | $CH_2CH_2$ | F | F | $OCH_3$ | |
| 3107 | $C_4H_9O$ | H | F | 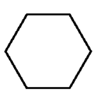 | — | 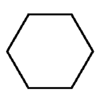 | $CH_2CH_2$ | F | F | $OC_2H_5$ | |
| 3108 | $C_4H_9O$ | H | F | 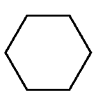 | — | 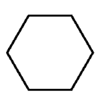 | $CH_2CH_2$ | F | F | $OC_3H_7$ | |
| 3109 | $C_4H_9O$ | H | F | 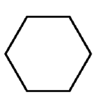 | — | 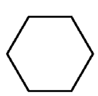 | $CH_2CH_2$ | F | F | $OC_4H_9$ | |
| 3110 | $C_4H_9O$ | H | F | 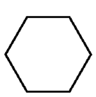 | — | 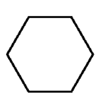 | $CH_2CH_2$ | F | F | $OC_5H_{11}$ | |
| 3111 | $C_5H_{11}O$ | H | F | 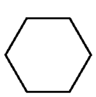 | — | 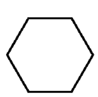 | $CH_2CH_2$ | F | F | $OCH_3$ | |

TABLE 206-continued

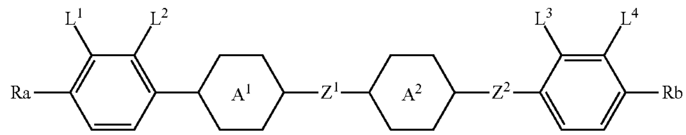

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3112 | $C_5H_{11}O$ | H | F | 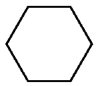 | — | 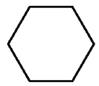 | $CH_2CH_2$ | F | F | $OC_2H_5$ | |
| 3113 | $C_5H_{11}O$ | H | F | 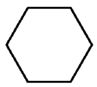 | — | 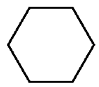 | $CH_2CH_2$ | F | F | $OC_3H_7$ | |
| 3114 | $C_5H_{11}O$ | H | F | 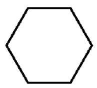 | — | 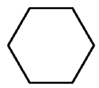 | $CH_2CH_2$ | F | F | $OC_4H_9$ | |
| 3115 | $C_5H_{11}O$ | H | F | 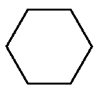 | — | 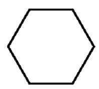 | $CH_2CH_2$ | F | F | $OC_5H_{11}$ | |
| 3116 | $C_2H_5$ | H | F | 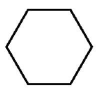 | — | 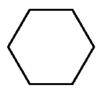 | $CH_2CH_2$ | F | F | $C_4H_9$ | |
| 3117 | $C_5H_{11}$ | H | F | 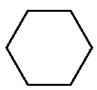 | — | 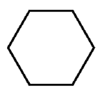 | $CH_2CH_2$ | F | F | $C_2H_5$ | |
| 3118 | $C_2H_5$ | H | F | 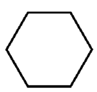 | — | 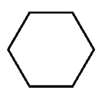 | $CH_2CH_2$ | F | F | $OC_4H_9$ | |
| 3119 | $CH_2{=}CH$ | H | F | 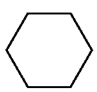 | — | 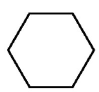 | $CH_2CH_2$ | F | F | $OC_3H_7$ | |
| 3120 | $CH_2{=}CH$ | H | F | 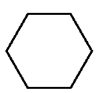 | — | 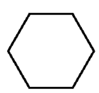 | $CH_2CH_2$ | F | F | $OC_5H_{11}$ | |

TABLE 207

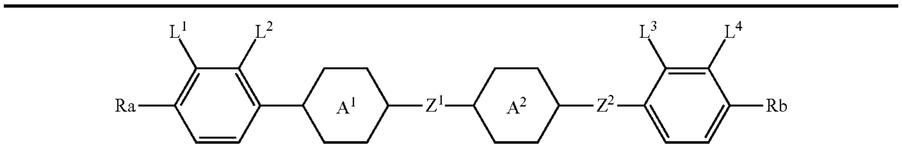

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3121 | $CH_3O$ | F | H | 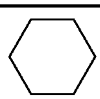 | — | 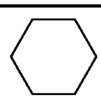 | $CH_2CH_2$ | F | F | $OCH_3$ | |
| 3122 | $CH_3O$ | F | H | 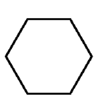 | — | 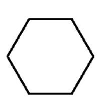 | $CH_2CH_2$ | F | F | $OC_2H_5$ | |

TABLE 207-continued

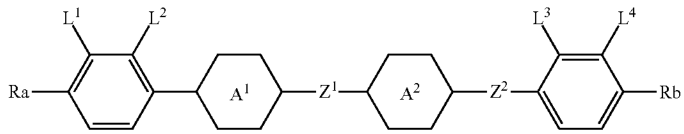

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3123 | $CH_3O$ | F | H | 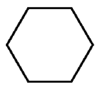 | — | 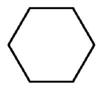 | $CH_2CH_2$ | F | F | $OC_3H_7$ | |
| 3124 | $CH_3O$ | F | H | 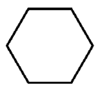 | — | 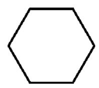 | $CH_2CH_2$ | F | F | $OC_4H_9$ | |
| 3125 | $CH_3O$ | F | H | 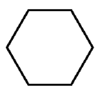 | — | 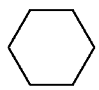 | $CH_2CH_2$ | F | F | $OC_5H_{11}$ | |
| 3126 | $C_2H_5O$ | F | H | 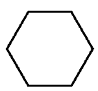 | — | 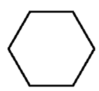 | $CH_2CH_2$ | F | F | $OCH_3$ | |
| 3127 | $C_2H_5O$ | F | H | 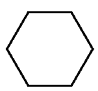 | — | 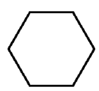 | $CH_2CH_2$ | F | F | $OC_2H_5$ | |
| 3128 | $C_2H_5O$ | F | H | 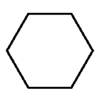 | — | 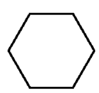 | $CH_2CH_2$ | F | F | $OC_3H_7$ | |
| 3129 | $C_2H_5O$ | F | H | 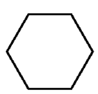 | — | 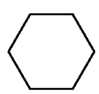 | $CH_2CH_2$ | F | F | $OC_4H_9$ | |
| 3130 | $C_2H_5O$ | F | H | 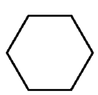 | — | 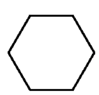 | $CH_2CH_2$ | F | F | $OC_5H_{11}$ | |
| 3131 | $C_3H_7O$ | F | H | 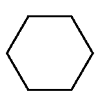 | — | 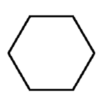 | $CH_2CH_2$ | F | F | $OCH_3$ | |
| 3132 | $C_3H_7O$ | F | H | 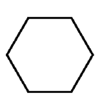 | — | 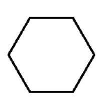 | $CH_2CH_2$ | F | F | $OC_2H_5$ | |
| 3133 | $C_3H_7O$ | F | H | 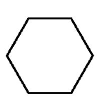 | — | 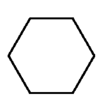 | $CH_2CH_2$ | F | F | $OC_3H_7$ | |
| 3134 | $C_3H_7O$ | F | H | 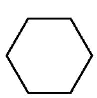 | — | 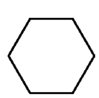 | $CH_2CH_2$ | F | F | $OC_4H_9$ | |
| 3135 | $C_3H_7O$ | F | H | 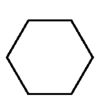 | — | 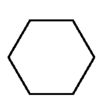 | $CH_2CH_2$ | F | F | $OC_5H_{11}$ | |

TABLE 208
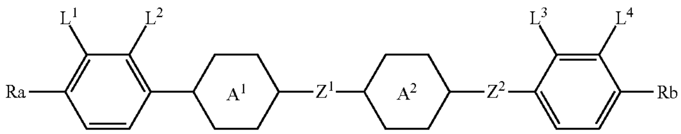
| No. | Ra | L1 | L2 | A1 | Z1 | A2 | Z2 | L3 | L4 | Rb | Physical property values |
|---|---|---|---|---|---|---|---|---|---|---|---|
| 3136 | $C_4H_9O$ | F | H | 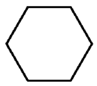 | — | 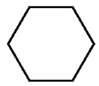 | $CH_2CH_2$ | F | F | $OCH_3$ | |
| 3137 | $C_4H_9O$ | F | H | 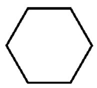 | — | 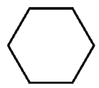 | $CH_2CH_2$ | F | F | $OC_2H_5$ | |
| 3138 | $C_4H_9O$ | F | H | 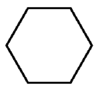 | — | 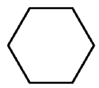 | $CH_2CH_2$ | F | F | $OC_3H_7$ | |
| 3139 | $C_4H_9O$ | F | H | 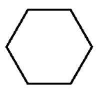 | — | 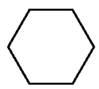 | $CH_2CH_2$ | F | F | $OC_4H_9$ | |
| 3140 | $C_4H_9O$ | F | H | 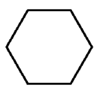 | — | 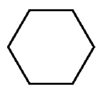 | $CH_2CH_2$ | F | F | $OC_5H_{11}$ | |
| 3141 | $C_5H_{11}O$ | F | H | 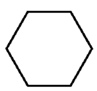 | — | 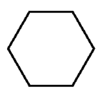 | $CH_2CH_2$ | F | F | $OCH_3$ | |
| 3142 | $C_5H_{11}O$ | F | H | 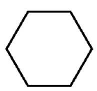 | — | 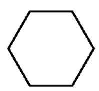 | $CH_2CH_2$ | F | F | $OC_2H_5$ | |
| 3143 | $C_5H_{11}O$ | F | H | 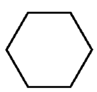 | — | 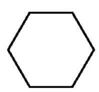 | $CH_2CH_2$ | F | F | $OC_3H_7$ | |
| 3144 | $C_5H_{11}O$ | F | H | 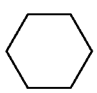 | — | 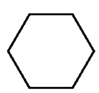 | $CH_2CH_2$ | F | F | $OC_4H_9$ | |
| 3145 | $C_5H_{11}O$ | F | H | 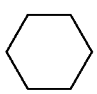 | — | 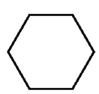 | $CH_2CH_2$ | F | F | $OC_5H_{11}$ | |
| 3146 | $C_2H_5$ | F | H | 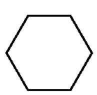 | — | 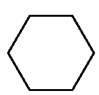 | $CH_2CH_2$ | F | F | $C_4H_9$ | |
| 3147 | $C_5H_{11}$ | F | H | 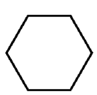 | — | 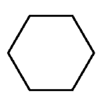 | $CH_2CH_2$ | F | F | $C_2H_5$ | |
| 3148 | $C_2H_5$ | F | H | 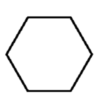 | — | 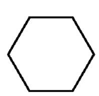 | $CH_2CH_2$ | F | F | $OC_4H_9$ | |

TABLE 208-continued

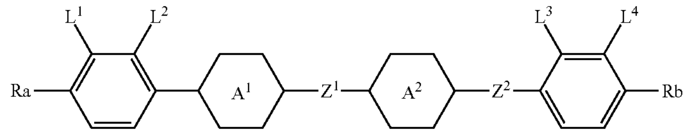

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3149 | $CH_2{=}CH$ | F | H | 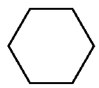 | — | 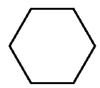 | $CH_2CH_2$ | F | F | $OC_3H_7$ | |
| 3150 | $CH_2{=}CH$ | F | H | 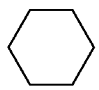 | — | 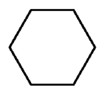 | $CH_2CH_2$ | F | F | $OC_5H_{11}$ | |

TABLE 209

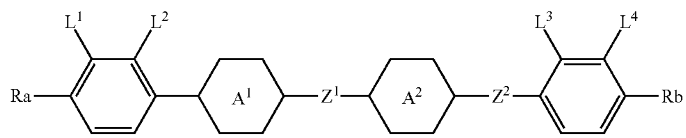

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3151 | $CH_3O$ | F | F | 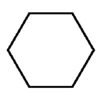 | — | 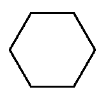 | $CH_2CH_2$ | H | F | $OCH_3$ | |
| 3152 | $CH_3O$ | F | F | 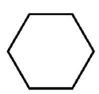 | — | 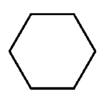 | $CH_2CH_2$ | H | F | $OC_2H_5$ | |
| 3153 | $CH_3O$ | F | F | 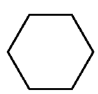 | — | 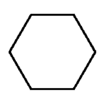 | $CH_2CH_2$ | H | F | $OC_3H_7$ | |
| 3154 | $CH_3O$ | F | F | 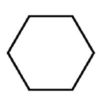 | — | 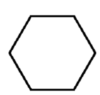 | $CH_2CH_2$ | H | F | $OC_4H_9$ | |
| 3155 | $CH_3O$ | F | F | 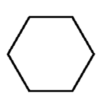 | — | 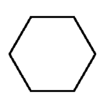 | $CH_2CH_2$ | H | F | $OC_5H_{11}$ | |
| 3156 | $C_2H_5O$ | F | F | 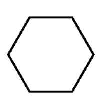 | — | 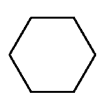 | $CH_2CH_2$ | H | F | $OCH_3$ | |
| 3157 | $C_2H_5O$ | F | F | 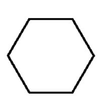 | — | 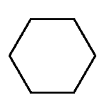 | $CH_2CH_2$ | H | F | $OC_2H_5$ | |
| 3158 | $C_2H_5O$ | F | F | 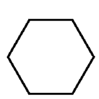 | — | 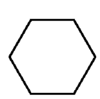 | $CH_2CH_2$ | H | F | $OC_3H_7$ | |
| 3159 | $C_2H_5O$ | F | F | 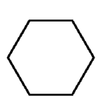 | — | 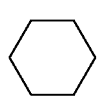 | $CH_2CH_2$ | H | F | $OC_4H_9$ | |

TABLE 209-continued

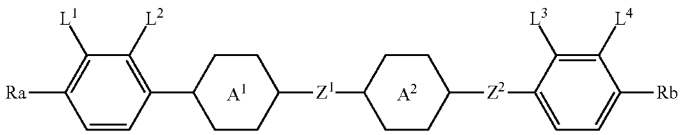

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3160 | $C_2H_5O$ | F | F | 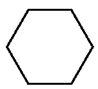 | — | 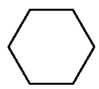 | $CH_2CH_2$ | H | F | $OC_5H_{11}$ | |
| 3161 | $C_3H_7O$ | F | F | 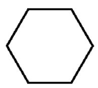 | — | 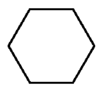 | $CH_2CH_2$ | H | F | $OCH_3$ | |
| 3162 | $C_3H_7O$ | F | F | 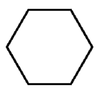 | — | 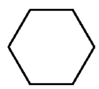 | $CH_2CH_2$ | H | F | $OC_2H_5$ | |
| 3163 | $C_3H_7O$ | F | F | 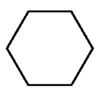 | — | 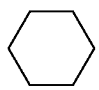 | $CH_2CH_2$ | H | F | $OC_3H_7$ | |
| 3164 | $C_3H_7O$ | F | F | 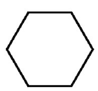 | — | 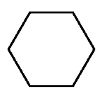 | $CH_2CH_2$ | H | F | $OC_4H_9$ | |
| 3165 | $C_3H_7O$ | F | F | 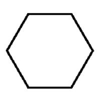 | — | 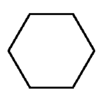 | $CH_2CH_2$ | H | F | $OC_5H_{11}$ | |

TABLE 210

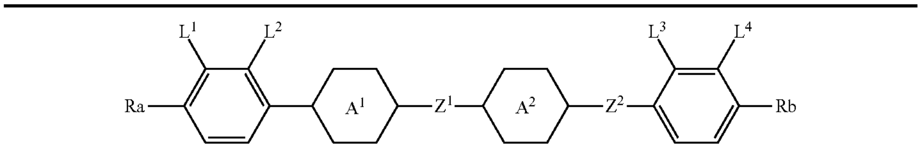

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3166 | $C_4H_9O$ | F | F | 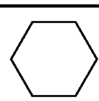 | — | 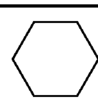 | $CH_2CH_2$ | H | F | $OCH_3$ | |
| 3167 | $C_4H_9O$ | F | F | 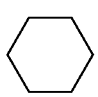 | — | 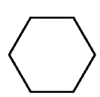 | $CH_2CH_2$ | H | F | $OC_2H_5$ | |
| 3168 | $C_4H_9O$ | F | F | 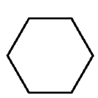 | — | 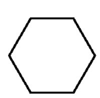 | $CH_2CH_2$ | H | F | $OC_3H_7$ | |
| 3169 | $C_4H_9O$ | F | F | 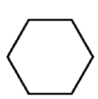 | — | 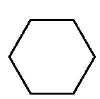 | $CH_2CH_2$ | H | F | $OC_4H_9$ | |
| 3170 | $C_4H_9O$ | F | F | 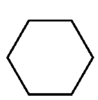 | — | 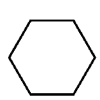 | $CH_2CH_2$ | H | F | $OC_5H_{11}$ | |

TABLE 210-continued

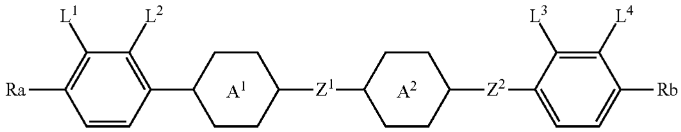

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3171 | $C_5H_{11}O$ | F | F | 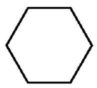 | — | 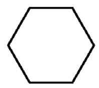 | $CH_2CH_2$ | H | F | $OCH_3$ | |
| 3172 | $C_5H_{11}O$ | F | F | 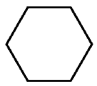 | — | 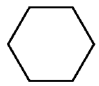 | $CH_2CH_2$ | H | F | $OC_2H_5$ | |
| 3173 | $C_5H_{11}O$ | F | F | 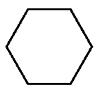 | — | 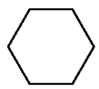 | $CH_2CH_2$ | H | F | $OC_3H_7$ | |
| 3174 | $C_5H_{11}O$ | F | F | 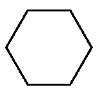 | — | 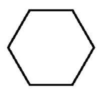 | $CH_2CH_2$ | H | F | $OC_4H_9$ | |
| 3175 | $C_5H_{11}O$ | F | F | 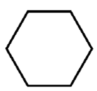 | — | 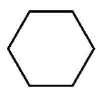 | $CH_2CH_2$ | H | F | $OC_5H_{11}$ | |
| 3176 | $C_2H_5$ | F | F | 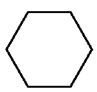 | — | 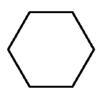 | $CH_2CH_2$ | H | F | $C_4H_9$ | |
| 3177 | $C_5H_{11}$ | F | F | 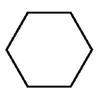 | — | 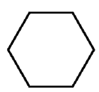 | $CH_2CH_2$ | H | F | $C_2H_5$ | |
| 3178 | $C_2H_5$ | F | F | 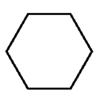 | — | 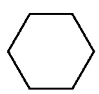 | $CH_2CH_2$ | H | F | $OC_4H_9$ | |
| 3179 | $CH_2{=}CH$ | F | F | 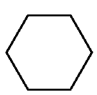 | — | 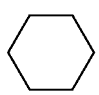 | $CH_2CH_2$ | H | F | $OC_3H_7$ | |
| 3180 | $CH_2{=}CH$ | F | F | 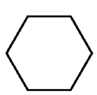 | — | 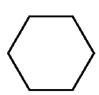 | $CH_2CH_2$ | H | F | $OC_5H_{11}$ | |

TABLE 211

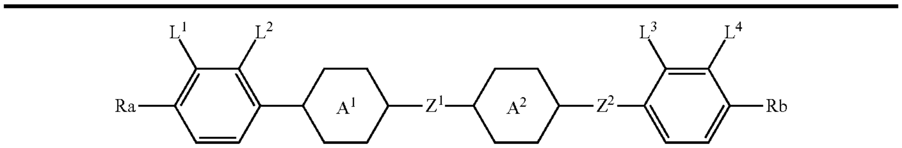

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3181 | $CH_3O$ | F | F | 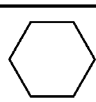 | — | 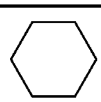 | $CH_2CH_2$ | F | H | $OCH_3$ | |

TABLE 211-continued

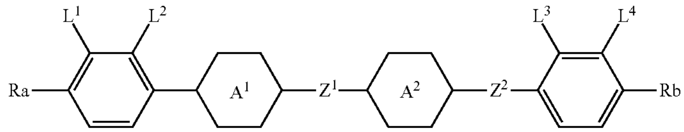

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3182 | $CH_3O$ | F | F | 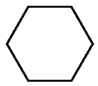 | — | 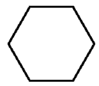 | $CH_2CH_2$ | F | H | $OC_2H_5$ | |
| 3183 | $CH_3O$ | F | F | 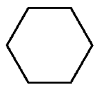 | — | 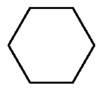 | $CH_2CH_2$ | F | H | $OC_3H_7$ | |
| 3184 | $CH_3O$ | F | F | 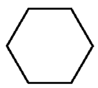 | — | 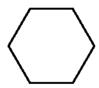 | $CH_2CH_2$ | F | H | $OC_4H_9$ | |
| 3185 | $CH_3O$ | F | F | 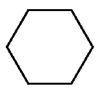 | — | 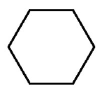 | $CH_2CH_2$ | F | H | $OC_5H_{11}$ | |
| 3186 | $C_2H_5O$ | F | F | 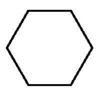 | — | 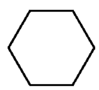 | $CH_2CH_2$ | F | H | $OCH_3$ | |
| 3187 | $C_2H_5O$ | F | F | 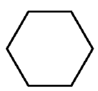 | — | 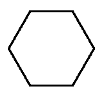 | $CH_2CH_2$ | F | H | $OC_2H_5$ | |
| 3188 | $C_2H_5O$ | F | F | 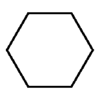 | — | 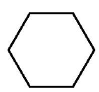 | $CH_2CH_2$ | F | H | $OC_3H_7$ | |
| 3189 | $C_2H_5O$ | F | F | 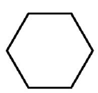 | — | 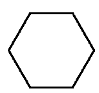 | $CH_2CH_2$ | F | H | $OC_4H_9$ | |
| 3190 | $C_2H_5O$ | F | F | 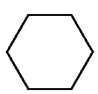 | — | 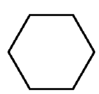 | $CH_2CH_2$ | F | H | $OC_5H_{11}$ | |
| 3191 | $C_3H_7O$ | F | F | 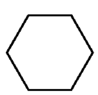 | — | 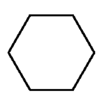 | $CH_2CH_2$ | F | H | $OCH_3$ | |
| 3192 | $C_3H_7O$ | F | F | 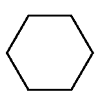 | — | 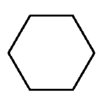 | $CH_2CH_2$ | F | H | $OC_2H_5$ | |
| 3193 | $C_3H_7O$ | F | F | 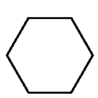 | — | 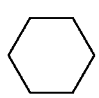 | $CH_2CH_2$ | F | H | $OC_3H_7$ | |
| 3194 | $C_3H_7O$ | F | F | 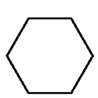 | — | 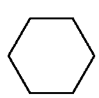 | $CH_2CH_2$ | F | H | $OC_4H_9$ | |
| 3195 | $C_3H_7O$ | F | F | 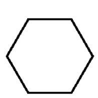 | — | 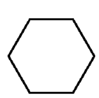 | $CH_2CH_2$ | F | H | $OC_5H_{11}$ | |

TABLE 212

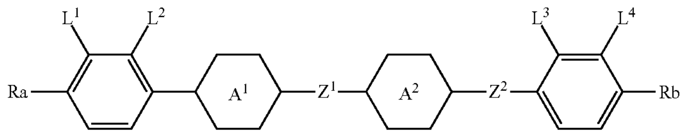

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3196 | $C_4H_9O$ | F | F | 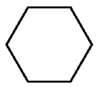 | — | 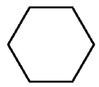 | $CH_2CH_2$ | F | H | $OCH_3$ | |
| 3197 | $C_4H_9O$ | F | F | 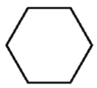 | — | 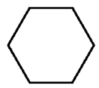 | $CH_2CH_2$ | F | H | $OC_2H_5$ | |
| 3198 | $C_4H_9O$ | F | F | 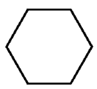 | — | 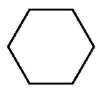 | $CH_2CH_2$ | F | H | $OC_3H_7$ | |
| 3199 | $C_4H_9O$ | F | F | 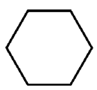 | — | 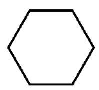 | $CH_2CH_2$ | F | H | $OC_4H_9$ | |
| 3200 | $C_4H_9O$ | F | F | 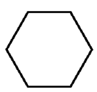 | — | 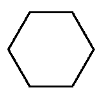 | $CH_2CH_2$ | F | H | $OC_5H_{11}$ | |
| 3201 | $C_5H_{11}O$ | F | F | 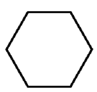 | — | 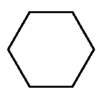 | $CH_2CH_2$ | F | H | $OCH_3$ | |
| 3202 | $C_5H_{11}O$ | F | F | 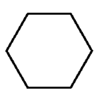 | — | 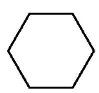 | $CH_2CH_2$ | F | H | $OC_2H_5$ | |
| 3203 | $C_5H_{11}O$ | F | F | 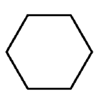 | — | 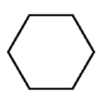 | $CH_2CH_2$ | F | H | $OC_3H_7$ | |
| 3204 | $C_5H_{11}O$ | F | F | 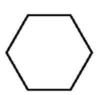 | — | 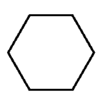 | $CH_2CH_2$ | F | H | $OC_4H_9$ | |
| 3205 | $C_5H_{11}O$ | F | F | 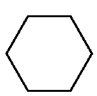 | — | 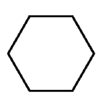 | $CH_2CH_2$ | F | H | $OC_5H_{11}$ | |
| 3206 | $C_2H_5$ | F | F | 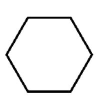 | — | 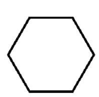 | $CH_2CH_2$ | F | H | $C_4H_9$ | |
| 3207 | $C_5H_{11}$ | F | F | 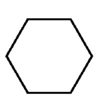 | — | 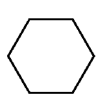 | $CH_2CH_2$ | F | H | $C_2H_5$ | |
| 3208 | $C_2H_5$ | F | F | 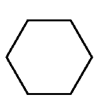 | — | 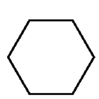 | $CH_2CH_2$ | F | H | $OC_4H_9$ | |

TABLE 212-continued

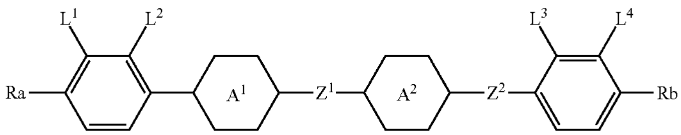

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3209 | $CH_2$═CH | F | F | 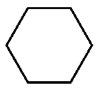 | — | 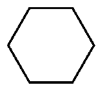 | $CH_2CH_2$ | F | H | $OC_3H_7$ | |
| 3210 | $CH_2$═CH | F | F | 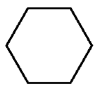 | — | 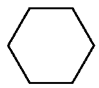 | $CH_2CH_2$ | F | H | $OC_5H_{11}$ | |

TABLE 213

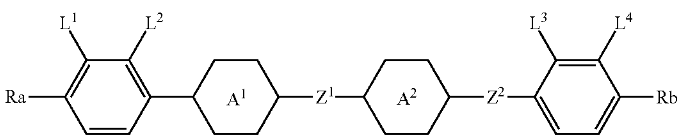

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3211 | $CH_3O$ | F | F | 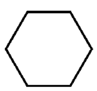 | — |  | $CH_2CH_2$ | F | F | $OCH_3$ | |
| 3212 | $CH_3O$ | F | F | 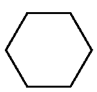 | — |  | $CH_2CH_2$ | F | F | $OC_2H_5$ | |
| 3213 | $CH_3O$ | F | F | 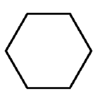 | — | 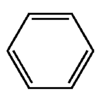 | $CH_2CH_2$ | F | F | $OC_3H_7$ | |
| 3214 | $CH_3O$ | F | F | 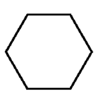 | — | 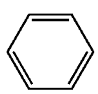 | $CH_2CH_2$ | F | F | $OC_4H_9$ | |
| 3215 | $CH_3O$ | F | F | 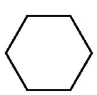 | — | 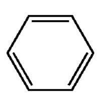 | $CH_2CH_2$ | F | F | $OC_5H_{11}$ | |
| 3216 | $C_2H_5O$ | F | F | 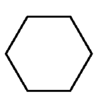 | — | 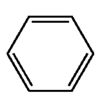 | $CH_2CH_2$ | F | F | $OCH_3$ | |
| 3217 | $C_2H_5O$ | F | F | 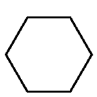 | — | 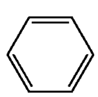 | $CH_2CH_2$ | F | F | $OC_2H_5$ | |
| 3218 | $C_2H_5O$ | F | F | 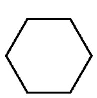 | — | 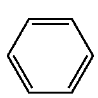 | $CH_2CH_2$ | F | F | $OC_3H_7$ | |
| 3219 | $C_2H_5O$ | F | F | 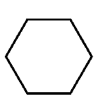 | — | 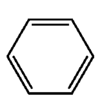 | $CH_2CH_2$ | F | F | $OC_4H_9$ | |

TABLE 213-continued

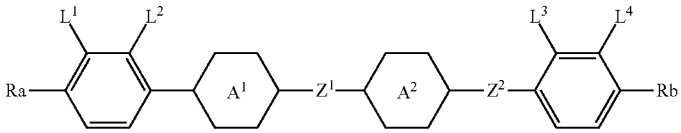

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3220 | $C_2H_5O$ | F | F | 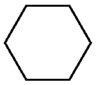 | — | 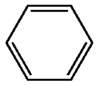 | $CH_2CH_2$ | F | F | $OC_5H_{11}$ | |
| 3221 | $C_3H_7O$ | F | F | 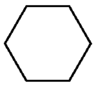 | — | 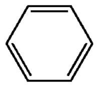 | $CH_2CH_2$ | F | F | $OCH_3$ | |
| 3222 | $C_3H_7O$ | F | F | 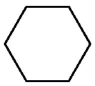 | — |  | $CH_2CH_2$ | F | F | $OC_2H_5$ | |
| 3223 | $C_3H_7O$ | F | F | 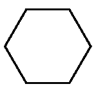 | — |  | $CH_2CH_2$ | F | F | $OC_3H_7$ | |
| 3224 | $C_3H_7O$ | F | F | 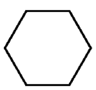 | — |  | $CH_2CH_2$ | F | F | $OC_4H_9$ | |
| 3225 | $C_3H_7O$ | F | F | 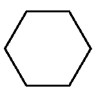 | — |  | $CH_2CH_2$ | F | F | $OC_5H_{11}$ | |

TABLE 214

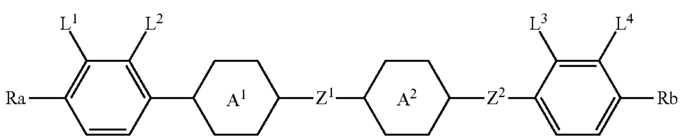

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3226 | $C_4H_9O$ | F | F | 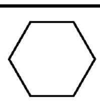 | — | 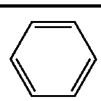 | $CH_2CH_2$ | F | F | $OCH_3$ | |
| 3227 | $C_4H_9O$ | F | F | 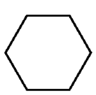 | — | 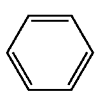 | $CH_2CH_2$ | F | F | $OC_2H_5$ | C 87.9 $S_A$ 103.8 N 202.9 I $T_{NI}$: 168.6° C., Δε: −7.25, Δn: 0.165 |
| 3228 | $C_4H_9O$ | F | F | 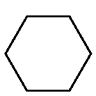 | — | 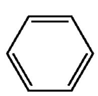 | $CH_2CH_2$ | F | F | $OC_3H_7$ | |
| 3229 | $C_4H_9O$ | F | F | 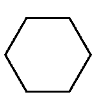 | — | 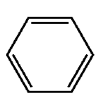 | $CH_2CH_2$ | F | F | $OC_4H_9$ | |
| 3230 | $C_4H_9O$ | F | F | 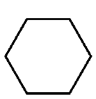 | — | 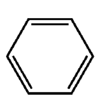 | $CH_2CH_2$ | F | F | $OC_5H_{11}$ | |

TABLE 214-continued

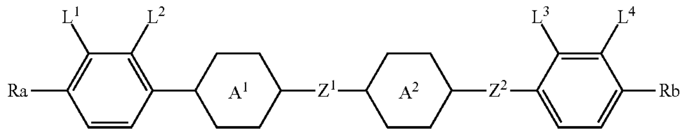

| No. | Ra | L¹ | L² | A¹ | Z¹ | A² | Z² | L³ | L⁴ | Rb | Physical property values |
|---|---|---|---|---|---|---|---|---|---|---|---|
| 3231 | $C_5H_{11}O$ | F | F | 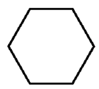 | — | 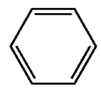 | $CH_2CH_2$ | F | F | $OCH_3$ | |
| 3232 | $C_5H_{11}O$ | F | F | 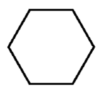 | — | 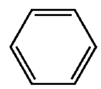 | $CH_2CH_2$ | F | F | $OC_2H_5$ | |
| 3233 | $C_5H_{11}O$ | F | F | 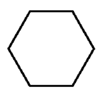 | — | 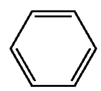 | $CH_2CH_2$ | F | F | $OC_3H_7$ | |
| 3234 | $C_5H_{11}O$ | F | F | 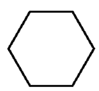 | — | 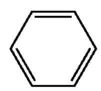 | $CH_2CH_2$ | F | F | $OC_4H_9$ | |
| 3235 | $C_5H_{11}O$ | F | F | 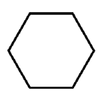 | — | 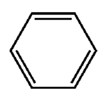 | $CH_2CH_2$ | F | F | $OC_5H_{11}$ | |
| 3236 | $C_2H_5$ | F | F | 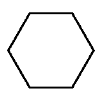 | — | 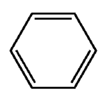 | $CH_2CH_2$ | F | F | $C_4H_9$ | |
| 3237 | $C_5H_{11}$ | F | F | 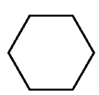 | — | 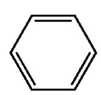 | $CH_2CH_2$ | F | F | $C_2H_5$ | |
| 3238 | $C_2H_5$ | F | F | 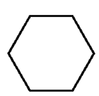 | — | 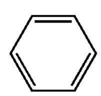 | $CH_2CH_2$ | F | F | $OC_4H_9$ | |
| 3239 | $CH_2{=}CH$ | F | F | 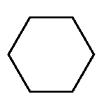 | — | 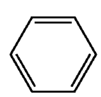 | $CH_2CH_2$ | F | F | $OC_3H_7$ | |
| 3240 | $CH_2{=}CH$ | F | F | 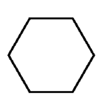 | — | 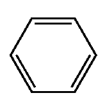 | $CH_2CH_2$ | F | F | $OC_5H_{11}$ | |

TABLE 215

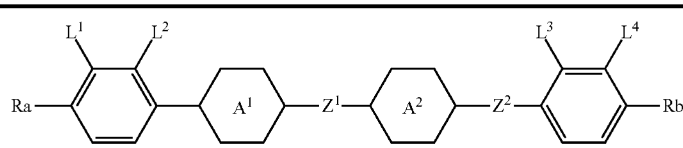

| No. | Ra | L¹ | L² | A¹ | Z¹ | A² | Z² | L³ | L⁴ | Rb | Physical property values |
|---|---|---|---|---|---|---|---|---|---|---|---|
| 3241 | $CH_2{=}CHO$ | F | F | 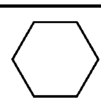 | — | 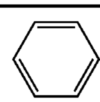 | $CH_2CH_2$ | F | F | $OC_3H_7$ | |

TABLE 215-continued

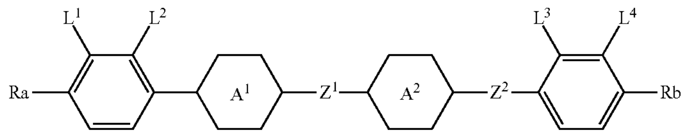

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3242 | $CH_2{=}CHCH_2O$ | F | F | 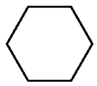 | — | 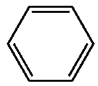 | $CH_2CH_2$ | F | F | $OC_5H_{11}$ | |
| 3243 | $CH_2{=}CHCH_2O$ | F | F | 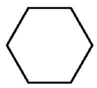 | — | 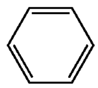 | $CH_2CH_2$ | F | F | $OC_3H_7$ | |
| 3244 | $CH_2{=}CHC_2H_5O$ | F | F | 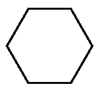 | — | 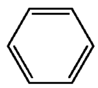 | $CH_2CH_2$ | F | F | $OC_5H_{11}$ | |
| 3245 | $CH_2{=}CHC_2H_5O$ | F | F | 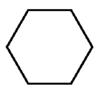 | — | 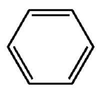 | $CH_2CH_2$ | F | F | $OC_2H_5$ | |
| 3246 | $CH_2{=}CHC_2H_5O$ | F | F | 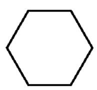 | — | 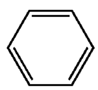 | $CH_2CH_2$ | F | F | $OC_3H_7$ | |
| 3247 | $CH_3CH{=}CHCH_2O$ | F | F | 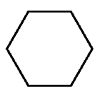 | — | 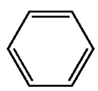 | $CH_2CH_2$ | F | F | $OCH_3$ | |
| 3248 | $CH_3CH{=}CHCH_2O$ | F | F | 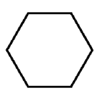 | — | 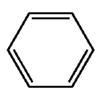 | $CH_2CH_2$ | F | F | $OC_2H_5$ | |
| 3249 | $C_3H_7O$ | F | F | 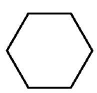 | — | 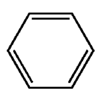 | $CH_2CH_2$ | F | F | $OCH{=}CH_2$ | |
| 3250 | $C_3H_7O$ | F | F | 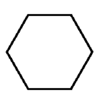 | — | 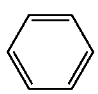 | $CH_2CH_2$ | F | F | $OCH_2CH{=}CH_2$ | |
| 3251 | $C_4H_9O$ | F | F | 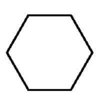 | — | 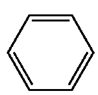 | $CH_2CH_2$ | F | F | $OCH_2CH{=}CH_2$ | |
| 3252 | $C_5H_{11}O$ | F | F | 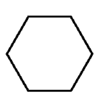 | — | 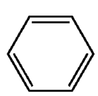 | $CH_2CH_2$ | F | F | $OCH_2CH{=}CH_2$ | |
| 3253 | $CH_3O$ | F | F | 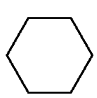 | — | 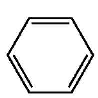 | $CH_2CH_2$ | F | F | $OC_2H_5CH{=}CH_2$ | |
| 3254 | $C_2H_5O$ | F | F | 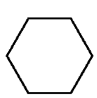 | — | 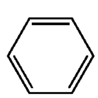 | $CH_2CH_2$ | F | F | $OC_2H_5CH{=}CH_2$ | |
| 3255 | $C_3H_7O$ | F | F | 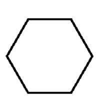 | — | 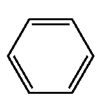 | $CH_2CH_2$ | F | F | $OC_2H_5CH{=}CH_2$ | |

TABLE 216

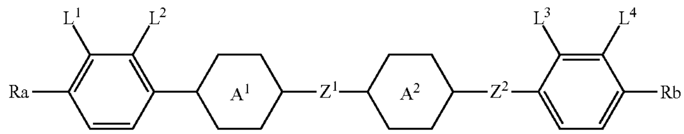

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3256 | $CH_3O$ | F | F | 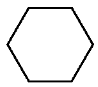 | — | 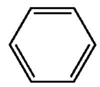 | $CH_2CH_2$ | F | F | $OCH_2CH{=}CHCH_3$ | |
| 3257 | $C_2H_5O$ | F | F | 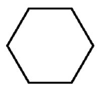 | — | 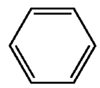 | $CH_2CH_2$ | F | F | $OCH_2CH{=}CHCH_3$ | |
| 3258 | $C_3H_7O$ | F | F | 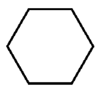 | — | 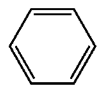 | $CH_2CH_2$ | F | F | $OCH_2CH{=}CHCH_3$ | |
| 3259 | $CH_2{=}CHCH_2O$ | F | F | 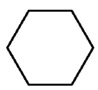 | — | 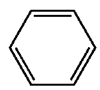 | $CH_2CH_2$ | F | F | $OCH{=}CH_2$ | |
| 3260 | $CH_2{=}CHC_2H_5O$ | F | F | 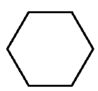 | — | 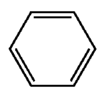 | $CH_2CH_2$ | F | F | $OCH_2CH{=}CH_2$ | |
| 3261 | $C_3H_7OCH_2$ | F | F | 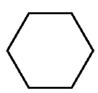 | — | 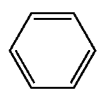 | $CH_2CH_2$ | F | F | $OC_3H_7$ | |
| 3262 | $C_5H_{11}O$ | F | F | 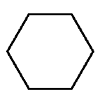 | — | 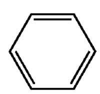 | $CH_2CH_2$ | F | F | $OC_2H_5CH{=}CH_2$ | |
| 3263 | $C_3H_7O$ | F | F | 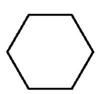 | — | 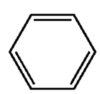 | $CH_2CH_2$ | F | F | H | |
| 3264 | $C_5H_{11}O$ | F | F | 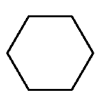 | — | 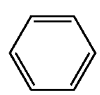 | $CH_2CH_2$ | F | F | $OC_9H_{19}$ | |
| 3265 | $C_3H_7O$ | F | F | 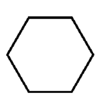 | — | 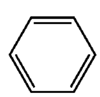 | $CH_2CH_2$ | F | F | $C_2H_5$ | |
| 3266 | $C_5H_{11}O$ | F | F | 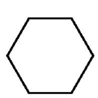 | — | 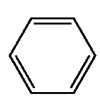 | $CH_2CH_2$ | F | F | $C_3H_7$ | |
| 3267 | H | F | F | 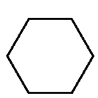 | — | 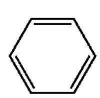 | $CH_2CH_2$ | F | F | $OC_4H_9$ | |
| 3268 | $C_7H_{15}O$ | F | F | 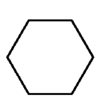 | — | 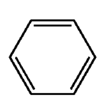 | $CH_2CH_2$ | F | F | $OC_4H_9$ | |

TABLE 216-continued

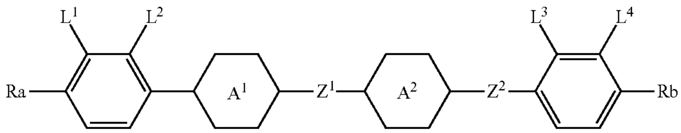

| No. | Ra | L¹ | L² | A¹ | Z¹ | A² | Z² | L³ | L⁴ | Rb | Physical property values |
|---|---|---|---|---|---|---|---|---|---|---|---|
| 3269 | $C_2H_5O$ | F | F | 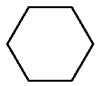 | — | 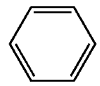 | $CH_2CH_2$ | F | F | $OC_6H_{13}$ | |
| 3270 | $CH_3O$ | F | F | 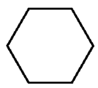 | — | 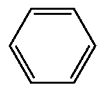 | $CH_2CH_2$ | F | F | $C_2H_5$ | |

TABLE 217

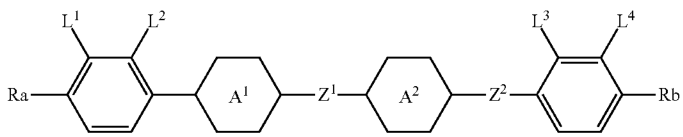

| No. | Ra | L¹ | L² | A¹ | Z¹ | A² | Z² | L³ | L⁴ | Rb | Physical property values |
|---|---|---|---|---|---|---|---|---|---|---|---|
| 3271 | $CH_3O$ | H | F | 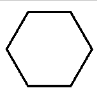 | — | 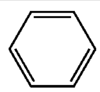 | $CH_2CH_2$ | F | F | $OCH_3$ | |
| 3272 | $CH_3O$ | H | F | 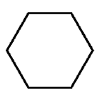 | — | 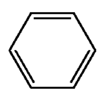 | $CH_2CH_2$ | F | F | $OC_2H_5$ | |
| 3273 | $CH_3O$ | H | F | 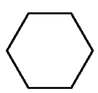 | — | 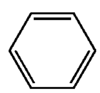 | $CH_2CH_2$ | F | F | $OC_3H_7$ | |
| 3274 | $CH_3O$ | H | F | 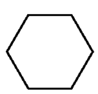 | — | 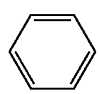 | $CH_2CH_2$ | F | F | $OC_4H_9$ | |
| 3275 | $CH_3O$ | H | F | 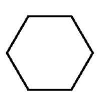 | — | 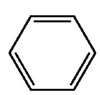 | $CH_2CH_2$ | F | F | $OC_5H_{11}$ | |
| 3276 | $C_2H_5O$ | H | F | 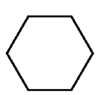 | — | 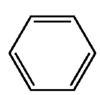 | $CH_2CH_2$ | F | F | $OCH_3$ | |
| 3277 | $C_2H_5O$ | H | F | 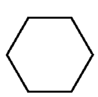 | — | 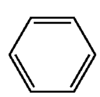 | $CH_2CH_2$ | F | F | $OC_2H_5$ | |
| 3278 | $C_2H_5O$ | H | F | 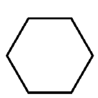 | — | 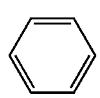 | $CH_2CH_2$ | F | F | $OC_3H_7$ | |
| 3279 | $C_2H_5O$ | H | F | 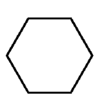 | — | 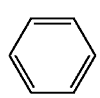 | $CH_2CH_2$ | F | F | $OC_4H_9$ | |
| 3280 | $C_2H_5O$ | H | F | 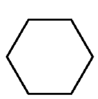 | — | 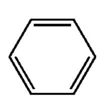 | $CH_2CH_2$ | F | F | $OC_5H_{11}$ | |

TABLE 217-continued

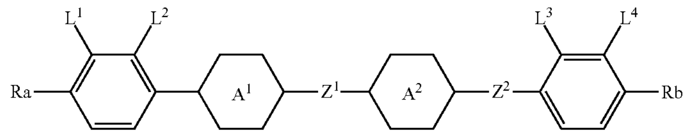

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3281 | $C_3H_7O$ | H | F | 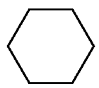 | — | 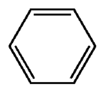 | $CH_2CH_2$ | F | F | $OCH_3$ | |
| 3282 | $C_3H_7O$ | H | F | 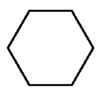 | — | 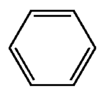 | $CH_2CH_2$ | F | F | $OC_2H_5$ | |
| 3283 | $C_3H_7O$ | H | F | 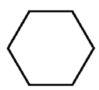 | — | 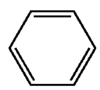 | $CH_2CH_2$ | F | F | $OC_3H_7$ | |
| 3284 | $C_3H_7O$ | H | F | 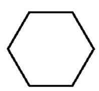 | — | 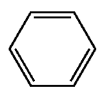 | $CH_2CH_2$ | F | F | $OC_4H_9$ | |
| 3285 | $C_3H_7O$ | H | F | 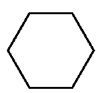 | — | 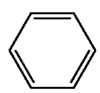 | $CH_2CH_2$ | F | F | $OC_5H_{11}$ | |

TABLE 218

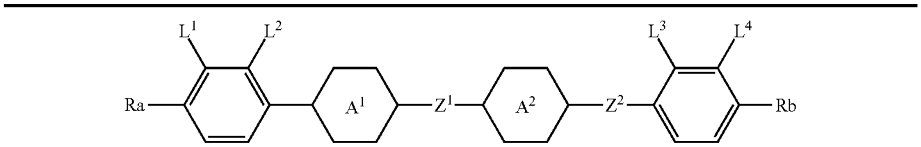

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3286 | $C_4H_9O$ | H | F | 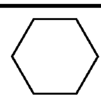 | — | 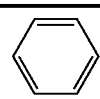 | $CH_2CH_2$ | F | F | $OCH_3$ | |
| 3287 | $C_4H_9O$ | H | F | 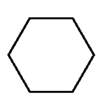 | — | 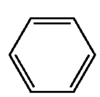 | $CH_2CH_2$ | F | F | $OC_2H_5$ | |
| 3288 | $C_4H_9O$ | H | F | 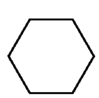 | — | 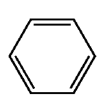 | $CH_2CH_2$ | F | F | $OC_3H_7$ | |
| 3289 | $C_4H_9O$ | H | F | 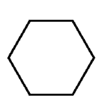 | — | 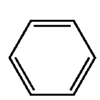 | $CH_2CH_2$ | F | F | $OC_4H_9$ | |
| 3290 | $C_4H_9O$ | H | F | 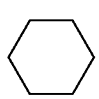 | — | 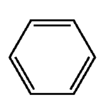 | $CH_2CH_2$ | F | F | $OC_5H_{11}$ | |
| 3291 | $C_5H_{11}O$ | H | F | 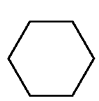 | — | 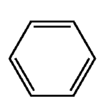 | $CH_2CH_2$ | F | F | $OCH_3$ | |

TABLE 218-continued

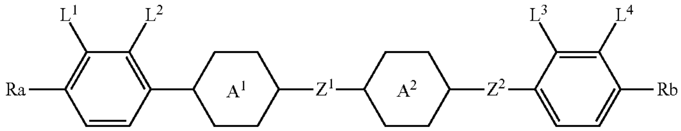

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3292 | $C_5H_{11}O$ | H | F | 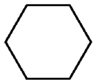 | — | 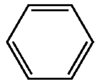 | $CH_2CH_2$ | F | F | $OC_2H_5$ | |
| 3293 | $C_5H_{11}O$ | H | F | 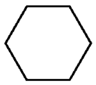 | — |  | $CH_2CH_2$ | F | F | $OC_3H_7$ | |
| 3294 | $C_5H_{11}O$ | H | F | 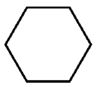 | — | 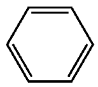 | $CH_2CH_2$ | F | F | $OC_4H_9$ | |
| 3295 | $C_5H_{11}O$ | H | F | 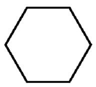 | — | 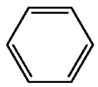 | $CH_2CH_2$ | F | F | $OC_5H_{11}$ | |
| 3296 | $C_2H_5$ | H | F | 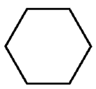 | — |  | $CH_2CH_2$ | F | F | $C_4H_9$ | |
| 3297 | $C_5H_{11}$ | H | F | 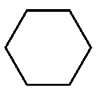 | — |  | $CH_2CH_2$ | F | F | $C_2H_5$ | |
| 3298 | $C_2H_5$ | H | F | 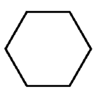 | — | 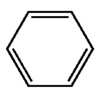 | $CH_2CH_2$ | F | F | $OC_4H_9$ | |
| 3299 | $CH_2{=}CH$ | H | F | 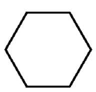 | — | 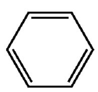 | $CH_2CH_2$ | F | F | $OC_3H_7$ | |
| 3300 | $CH_2{=}CH$ | H | F | 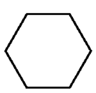 | — | 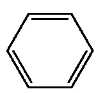 | $CH_2CH_2$ | F | F | $OC_5H_{11}$ | |

TABLE 219

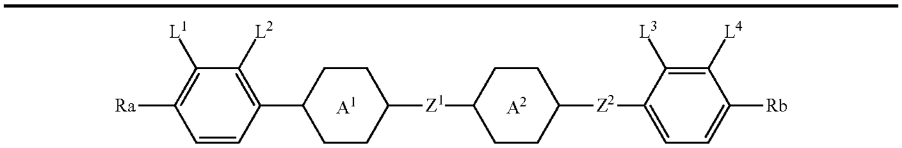

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3301 | $CH_3O$ | F | H | 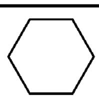 | — | 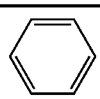 | $CH_2CH_2$ | F | F | $OCH_3$ | |
| 3302 | $CH_3O$ | F | H | 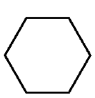 | — | 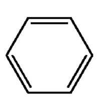 | $CH_2CH_2$ | F | F | $OC_2H_5$ | |
| 3303 | $CH_3O$ | F | H | 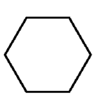 | — | 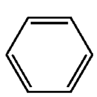 | $CH_2CH_2$ | F | F | $OC_3H_7$ | |

TABLE 219-continued

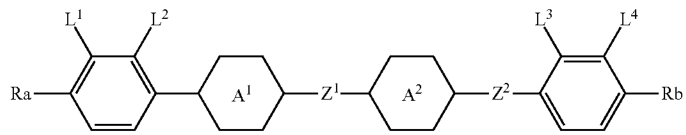

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3304 | $CH_3O$ | F | H | 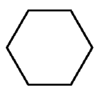 | — | 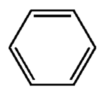 | $CH_2CH_2$ | F | F | $OC_4H_9$ | |
| 3305 | $CH_3O$ | F | H | 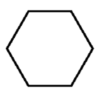 | — | 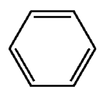 | $CH_2CH_2$ | F | F | $OC_5H_{11}$ | |
| 3306 | $C_2H_5O$ | F | H | 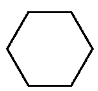 | — | 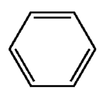 | $CH_2CH_2$ | F | F | $OCH_3$ | |
| 3307 | $C_2H_5O$ | F | H | 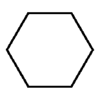 | — | 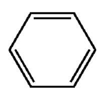 | $CH_2CH_2$ | F | F | $OC_2H_5$ | |
| 3308 | $C_2H_5O$ | F | H | 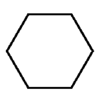 | — | 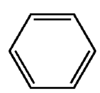 | $CH_2CH_2$ | F | F | $OC_3H_7$ | |
| 3309 | $C_2H_5O$ | F | H | 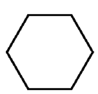 | — | 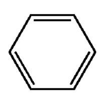 | $CH_2CH_2$ | F | F | $OC_4H_9$ | |
| 3310 | $C_2H_5O$ | F | H | 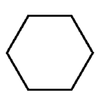 | — | 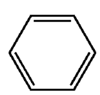 | $CH_2CH_2$ | F | F | $OC_5H_{11}$ | |
| 3311 | $C_3H_7O$ | F | H | 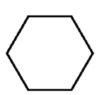 | — | 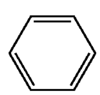 | $CH_2CH_2$ | F | F | $OCH_3$ | |
| 3312 | $C_3H_7O$ | F | H | 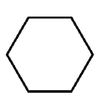 | — | 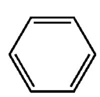 | $CH_2CH_2$ | F | F | $OC_2H_5$ | |
| 3313 | $C_3H_7O$ | F | H | 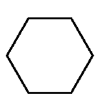 | — | 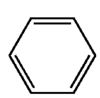 | $CH_2CH_2$ | F | F | $OC_3H_7$ | |
| 3314 | $C_3H_7O$ | F | H | 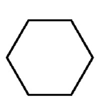 | — | 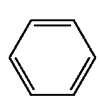 | $CH_2CH_2$ | F | F | $OC_4H_9$ | |
| 3315 | $C_3H_7O$ | F | H | 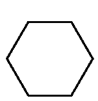 | — | 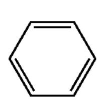 | $CH_2CH_2$ | F | F | $OC_5H_{11}$ | |

TABLE 220

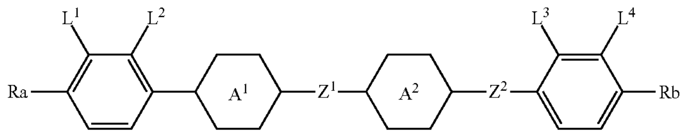

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3316 | $C_4H_9O$ | F | H | 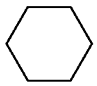 | — | 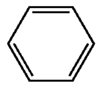 | $CH_2CH_2$ | F | F | $OCH_3$ | |
| 3317 | $C_4H_9O$ | F | H | 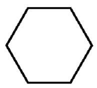 | — | 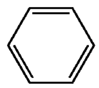 | $CH_2CH_2$ | F | F | $OC_2H_5$ | |
| 3318 | $C_4H_9O$ | F | H | 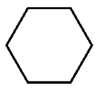 | — | 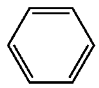 | $CH_2CH_2$ | F | F | $OC_3H_7$ | |
| 3319 | $C_4H_9O$ | F | H | 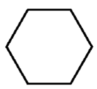 | — | 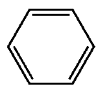 | $CH_2CH_2$ | F | F | $OC_4H_9$ | |
| 3320 | $C_4H_9O$ | F | H | 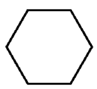 | — |  | $CH_2CH_2$ | F | F | $OC_5H_{11}$ | |
| 3321 | $C_5H_{11}O$ | F | H | 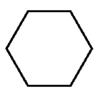 | — |  | $CH_2CH_2$ | F | F | $OCH_3$ | |
| 3322 | $C_5H_{11}O$ | F | H | 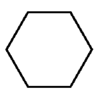 | — |  | $CH_2CH_2$ | F | F | $OC_2H_5$ | |
| 3323 | $C_5H_{11}O$ | F | H | 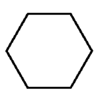 | — | 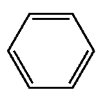 | $CH_2CH_2$ | F | F | $OC_3H_7$ | |
| 3324 | $C_5H_{11}O$ | F | H | 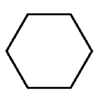 | — | 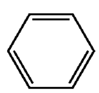 | $CH_2CH_2$ | F | F | $OC_4H_9$ | |
| 3325 | $C_5H_{11}O$ | F | H | 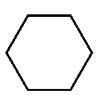 | — | 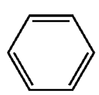 | $CH_2CH_2$ | F | F | $OC_5H_{11}$ | |
| 3326 | $C_2H_5$ | F | H | 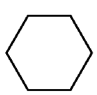 | — | 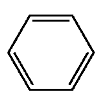 | $CH_2CH_2$ | F | F | $C_4H_9$ | |
| 3327 | $C_5H_{11}$ | F | H | 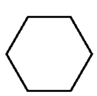 | — | 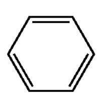 | $CH_2CH_2$ | F | F | $C_2H_5$ | |
| 3328 | $C_2H_5$ | F | H | 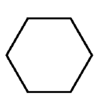 | — | 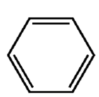 | $CH_2CH_2$ | F | F | $OC_4H_9$ | |

TABLE 220-continued

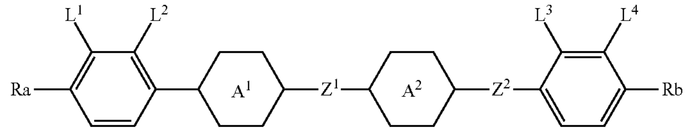

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3329 | $CH_2{=}CH$ | F | H | 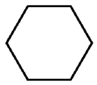 | — | 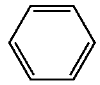 | $CH_2CH_2$ | F | F | $OC_3H_7$ | |
| 3330 | $CH_2{=}CH$ | F | H | 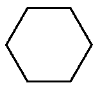 | — | 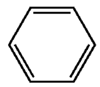 | $CH_2CH_2$ | F | F | $OC_5H_{11}$ | |

TABLE 221

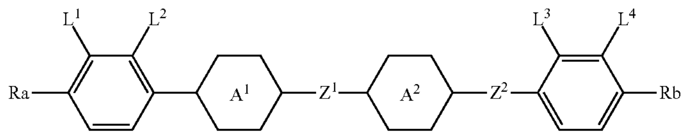

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3331 | $CH_3O$ | F | F | 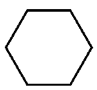 | — |  | $CH_2CH_2$ | H | F | $OCH_3$ | |
| 3332 | $CH_3O$ | F | F | 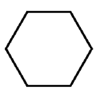 | — |  | $CH_2CH_2$ | H | F | $OC_2H_5$ | |
| 3333 | $CH_3O$ | F | F | 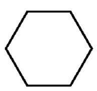 | — |  | $CH_2CH_2$ | H | F | $OC_3H_7$ | |
| 3334 | $CH_3O$ | F | F | 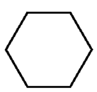 | — |  | $CH_2CH_2$ | H | F | $OC_4H_9$ | |
| 3335 | $CH_3O$ | F | F | 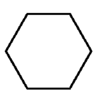 | — | 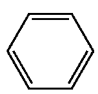 | $CH_2CH_2$ | H | F | $OC_5H_{11}$ | |
| 3336 | $C_2H_5O$ | F | F | 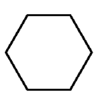 | — | 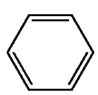 | $CH_2CH_2$ | H | F | $OCH_3$ | |
| 3337 | $C_2H_5O$ | F | F | 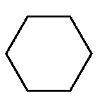 | — | 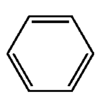 | $CH_2CH_2$ | H | F | $OC_2H_5$ | |
| 3338 | $C_2H_5O$ | F | F | 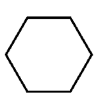 | — | 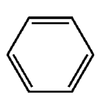 | $CH_2CH_2$ | H | F | $OC_3H_7$ | |
| 3339 | $C_2H_5O$ | F | F | 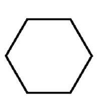 | — | 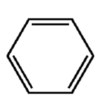 | $CH_2CH_2$ | H | F | $OC_4H_9$ | |
| 3340 | $C_2H_5O$ | F | F | 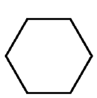 | — | 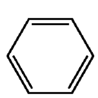 | $CH_2CH_2$ | H | F | $OC_5H_{11}$ | |

TABLE 221-continued

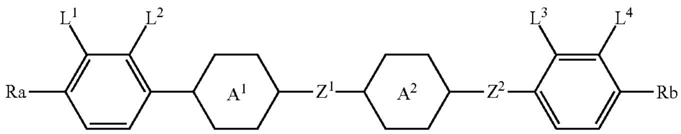

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3341 | $C_3H_7O$ | F | F | 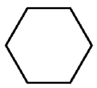 | — | 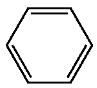 | $CH_2CH_2$ | H | F | $OCH_3$ | |
| 3342 | $C_3H_7O$ | F | F | 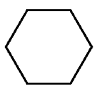 | — |  | $CH_2CH_2$ | H | F | $OC_2H_5$ | |
| 3343 | $C_3H_7O$ | F | F | 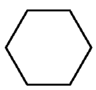 | — |  | $CH_2CH_2$ | H | F | $OC_3H_7$ | |
| 3344 | $C_3H_7O$ | F | F | 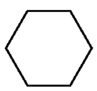 | — | 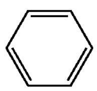 | $CH_2CH_2$ | H | F | $OC_4H_9$ | |
| 3345 | $C_3H_7O$ | F | F | 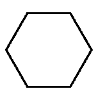 | — |  | $CH_2CH_2$ | H | F | $OC_5H_{11}$ | |

TABLE 222

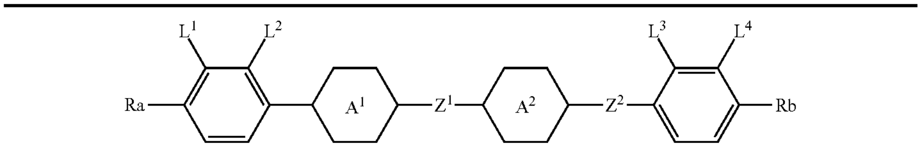

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3346 | $C_4H_9O$ | F | F | 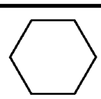 | — | 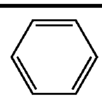 | $CH_2CH_2$ | H | F | $OCH_3$ | |
| 3347 | $C_4H_9O$ | F | F | 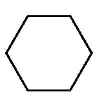 | — | 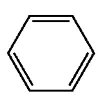 | $CH_2CH_2$ | H | F | $OC_2H_5$ | |
| 3348 | $C_4H_9O$ | F | F | 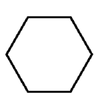 | — | 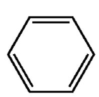 | $CH_2CH_2$ | H | F | $OC_3H_7$ | |
| 3349 | $C_4H_9O$ | F | F | 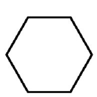 | — | 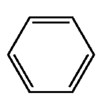 | $CH_2CH_2$ | H | F | $OC_4H_9$ | |
| 3350 | $C_4H_9O$ | F | F | 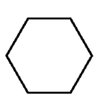 | — | 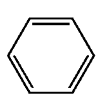 | $CH_2CH_2$ | H | F | $OC_5H_{11}$ | |
| 3351 | $C_5H_{11}O$ | F | F | 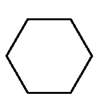 | — | 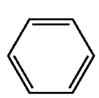 | $CH_2CH_2$ | H | F | $OCH_3$ | |

TABLE 222-continued

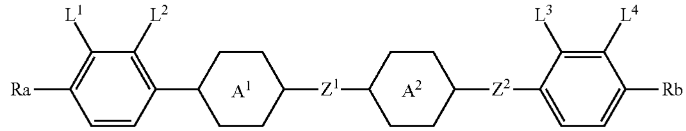

| No. | Ra | L[1] | L[2] | A[1] | Z[1] | A[2] | Z[2] | L[3] | L[4] | Rb | Physical property values |
|---|---|---|---|---|---|---|---|---|---|---|---|
| 3352 | $C_5H_{11}O$ | F | F | 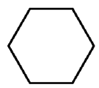 | — | 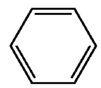 | $CH_2CH_2$ | H | F | $OC_2H_5$ | |
| 3353 | $C_5H_{11}O$ | F | F | 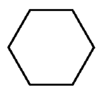 | — | 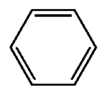 | $CH_2CH_2$ | H | F | $OC_3H_7$ | |
| 3354 | $C_5H_{11}O$ | F | F | 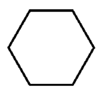 | — | 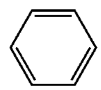 | $CH_2CH_2$ | H | F | $OC_4H_9$ | |
| 3355 | $C_5H_{11}O$ | F | F | 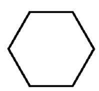 | — | 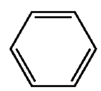 | $CH_2CH_2$ | H | F | $OC_5H_{11}$ | |
| 3356 | $C_2H_5$ | F | F | 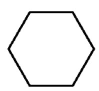 | — | 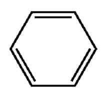 | $CH_2CH_2$ | H | F | $C_4H_9$ | |
| 3357 | $C_5H_{11}$ | F | F | 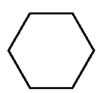 | — | 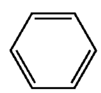 | $CH_2CH_2$ | H | F | $C_2H_5$ | |
| 3358 | $C_2H_5$ | F | F | 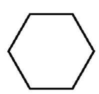 | — | 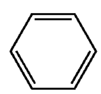 | $CH_2CH_2$ | H | F | $OC_4H_9$ | |
| 3359 | $CH_2{=}CH$ | F | F | 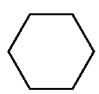 | — | 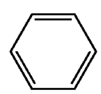 | $CH_2CH_2$ | H | F | $OC_3H_7$ | |
| 3360 | $CH_2{=}CH$ | F | F | 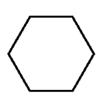 | — | 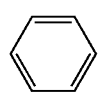 | $CH_2CH_2$ | H | F | $OC_5H_{11}$ | |

TABLE 223

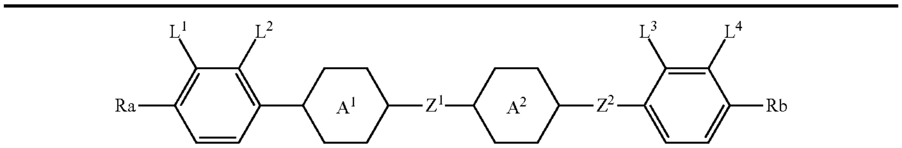

| No. | Ra | L[1] | L[2] | A[1] | Z[1] | A[2] | Z[2] | L[3] | L[4] | Rb | Physical property values |
|---|---|---|---|---|---|---|---|---|---|---|---|
| 3361 | $CH_3O$ | F | F | 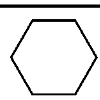 | — | 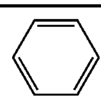 | $CH_2CH_2$ | F | H | $OCH_3$ | |
| 3362 | $CH_3O$ | F | F | 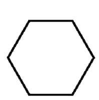 | — | 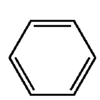 | $CH_2CH_2$ | F | H | $OC_2H_5$ | |
| 3363 | $CH_3O$ | F | F | 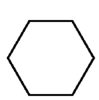 | — | 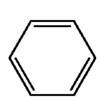 | $CH_2CH_2$ | F | H | $OC_3H_7$ | |

TABLE 223-continued

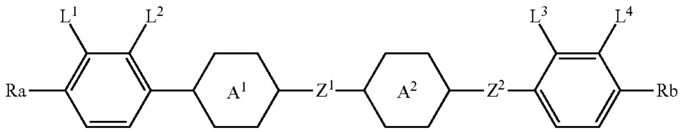

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3364 | $CH_3O$ | F | F | 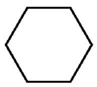 | — | 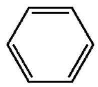 | $CH_2CH_2$ | F | H | $OC_4H_9$ | |
| 3365 | $CH_3O$ | F | F | 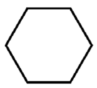 | — | 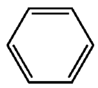 | $CH_2CH_2$ | F | H | $OC_5H_{11}$ | |
| 3366 | $C_2H_5O$ | F | F | 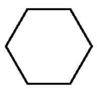 | — |  | $CH_2CH_2$ | F | H | $OCH_3$ | |
| 3367 | $C_2H_5O$ | F | F | 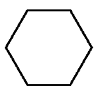 | — | 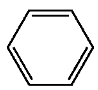 | $CH_2CH_2$ | F | H | $OC_2H_5$ | |
| 3368 | $C_2H_5O$ | F | F | 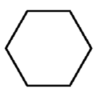 | — | 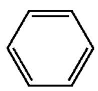 | $CH_2CH_2$ | F | H | $OC_3H_7$ | |
| 3369 | $C_2H_5O$ | F | F | 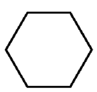 | — | 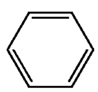 | $CH_2CH_2$ | F | H | $OC_4H_9$ | |
| 3370 | $C_2H_5O$ | F | F | 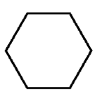 | — |  | $CH_2CH_2$ | F | H | $OC_5H_{11}$ | |
| 3371 | $C_3H_7O$ | F | F | 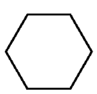 | — | 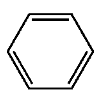 | $CH_2CH_2$ | F | H | $OCH_3$ | |
| 3372 | $C_3H_7O$ | F | F | 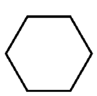 | — | 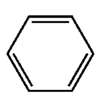 | $CH_2CH_2$ | F | H | $OC_2H_5$ | |
| 3373 | $C_3H_7O$ | F | F | 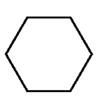 | — | 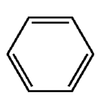 | $CH_2CH_2$ | F | H | $OC_3H_7$ | |
| 3374 | $C_3H_7O$ | F | F | 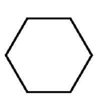 | — | 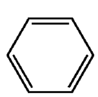 | $CH_2CH_2$ | F | H | $OC_4H_9$ | |
| 3375 | $C_3H_7O$ | F | F | 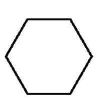 | — | 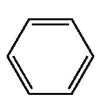 | $CH_2CH_2$ | F | H | $OC_5H_{11}$ | |

TABLE 224

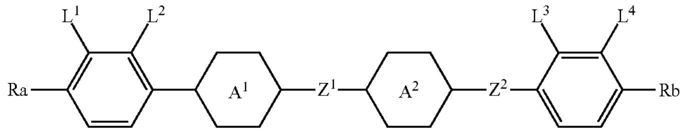

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3376 | $C_4H_9O$ | F | F | 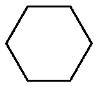 | — | 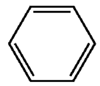 | $CH_2CH_2$ | F | H | $OCH_3$ | |
| 3377 | $C_4H_9O$ | F | F | 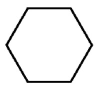 | — | 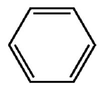 | $CH_2CH_2$ | F | H | $OC_2H_5$ | |
| 3378 | $C_4H_9O$ | F | F | 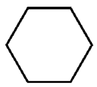 | — | 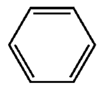 | $CH_2CH_2$ | F | H | $OC_3H_7$ | |
| 3379 | $C_4H_9O$ | F | F | 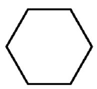 | — | 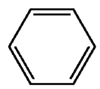 | $CH_2CH_2$ | F | H | $OC_4H_9$ | |
| 3380 | $C_4H_9O$ | F | F | 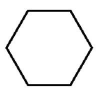 | — | 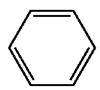 | $CH_2CH_2$ | F | H | $OC_5H_{11}$ | |
| 3381 | $C_5H_{11}O$ | F | F | 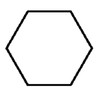 | — | 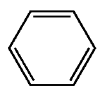 | $CH_2CH_2$ | F | H | $OCH_3$ | |
| 3382 | $C_5H_{11}O$ | F | F | 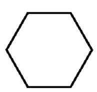 | — | 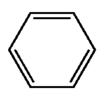 | $CH_2CH_2$ | F | H | $OC_2H_5$ | |
| 3383 | $C_5H_{11}O$ | F | F | 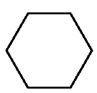 | — | 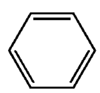 | $CH_2CH_2$ | F | H | $OC_3H_7$ | |
| 3384 | $C_5H_{11}O$ | F | F | 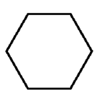 | — | 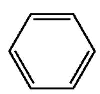 | $CH_2CH_2$ | F | H | $OC_4H_9$ | |
| 3385 | $C_5H_{11}O$ | F | F | 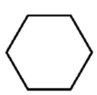 | — | 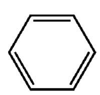 | $CH_2CH_2$ | F | H | $OC_5H_{11}$ | |
| 3386 | $C_2H_5$ | F | F | 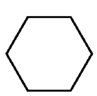 | — | 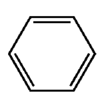 | $CH_2CH_2$ | F | H | $C_4H_9$ | |
| 3387 | $C_5H_{11}$ | F | F | 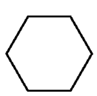 | — | 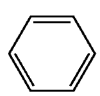 | $CH_2CH_2$ | F | H | $C_2H_5$ | |
| 3388 | $C_2H_5$ | F | F | 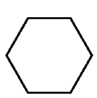 | — | 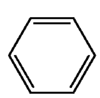 | $CH_2CH_2$ | F | H | $OC_4H_9$ | |

TABLE 224-continued

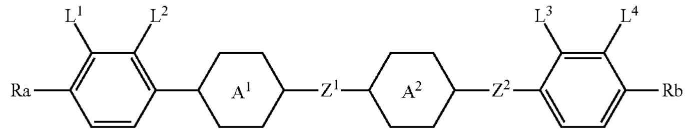

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3389 | $CH_2{=}CH$ | F | F | 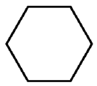 | — | 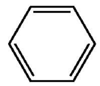 | $CH_2CH_2$ | F | H | $OC_3H_7$ | |
| 3390 | $CH_2{=}CH$ | F | F | 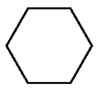 | — | 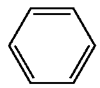 | $CH_2CH_2$ | F | H | $OC_5H_{11}$ | |

TABLE 225

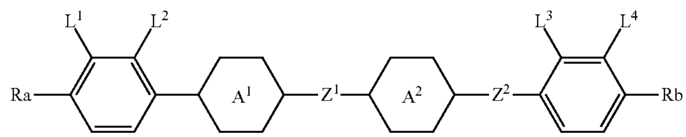

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3391 | $CH_3O$ | F | F |  | — | 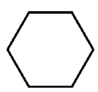 | $CH_2CH_2$ | F | F | $OCH_3$ | |
| 3392 | $CH_3O$ | F | F | 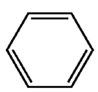 | — | 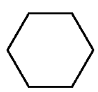 | $CH_2CH_2$ | F | F | $OC_2H_5$ | |
| 3393 | $CH_3O$ | F | F | 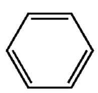 | — | 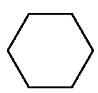 | $CH_2CH_2$ | F | F | $OC_3H_7$ | |
| 3394 | $CH_3O$ | F | F | 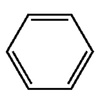 | — | 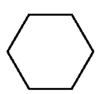 | $CH_2CH_2$ | F | F | $OC_4H_9$ | |
| 3395 | $CH_3O$ | F | F | 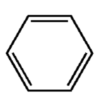 | — | 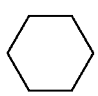 | $CH_2CH_2$ | F | F | $OC_5H_{11}$ | |
| 3396 | $C_2H_5O$ | F | F | 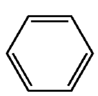 | — | 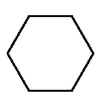 | $CH_2CH_2$ | F | F | $OCH_3$ | |
| 3397 | $C_2H_5O$ | F | F | 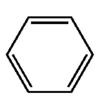 | — | 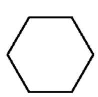 | $CH_2CH_2$ | F | F | $OC_2H_5$ | |
| 3398 | $C_2H_5O$ | F | F | 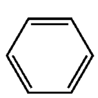 | — | 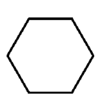 | $CH_2CH_2$ | F | F | $OC_3H_7$ | |
| 3399 | $C_2H_5O$ | F | F | 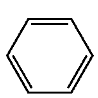 | — | 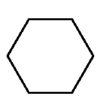 | $CH_2CH_2$ | F | F | $OC_4H_9$ | |
| 3400 | $C_2H_5O$ | F | F | 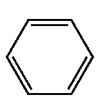 | — | 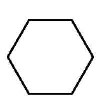 | $CH_2CH_2$ | F | F | $OC_5H_{11}$ | |

TABLE 225-continued

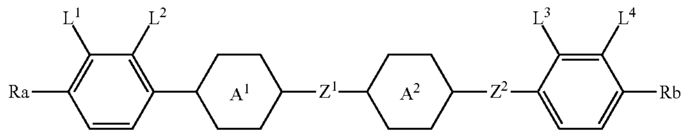

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3401 | $C_3H_7O$ | F | F |  | — | 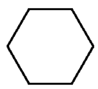 | $CH_2CH_2$ | F | F | $OCH_3$ | |
| 3402 | $C_3H_7O$ | F | F |  | — | 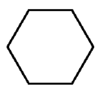 | $CH_2CH_2$ | F | F | $OC_2H_5$ | |
| 3403 | $C_3H_7O$ | F | F |  | — | 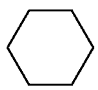 | $CH_2CH_2$ | F | F | $OC_3H_7$ | |
| 3404 | $C_3H_7O$ | F | F |  | — | 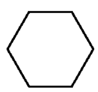 | $CH_2CH_2$ | F | F | $OC_4H_9$ | |
| 3405 | $C_3H_7O$ | F | F | 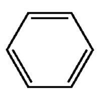 | — | 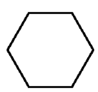 | $CH_2CH_2$ | F | F | $OC_5H_{11}$ | |

TABLE 226

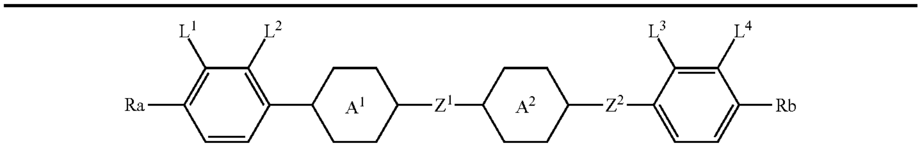

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3406 | $C_4H_9O$ | F | F | 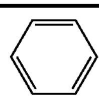 | — | 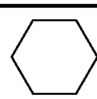 | $CH_2CH_2$ | F | F | $OCH_3$ | |
| 3407 | $C_4H_9O$ | F | F | 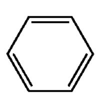 | — | 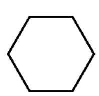 | $CH_2CH_2$ | F | F | $OC_2H_5$ | |
| 3408 | $C_4H_9O$ | F | F | 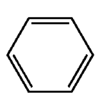 | — | 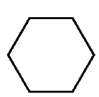 | $CH_2CH_2$ | F | F | $OC_3H_7$ | |
| 3409 | $C_4H_9O$ | F | F | 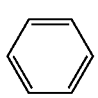 | — | 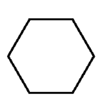 | $CH_2CH_2$ | F | F | $OC_4H_9$ | |
| 3410 | $C_4H_9O$ | F | F | 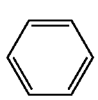 | — | 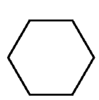 | $CH_2CH_2$ | F | F | $OC_5H_{11}$ | |
| 3411 | $C_5H_{11}O$ | F | F | 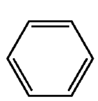 | — | 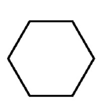 | $CH_2CH_2$ | F | F | $OCH_3$ | |

TABLE 226-continued

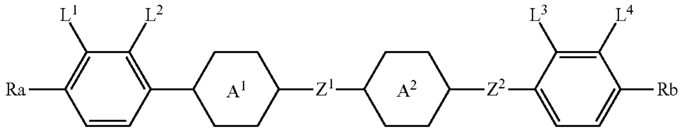

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3412 | $C_5H_{11}O$ | F | F | 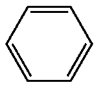 | — | 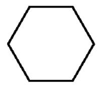 | $CH_2CH_2$ | F | F | $OC_2H_5$ | |
| 3413 | $C_5H_{11}O$ | F | F | 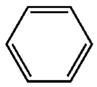 | — | 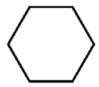 | $CH_2CH_2$ | F | F | $OC_3H_7$ | |
| 3414 | $C_5H_{11}O$ | F | F |  | — | 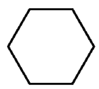 | $CH_2CH_2$ | F | F | $OC_4H_9$ | |
| 3415 | $C_5H_{11}O$ | F | F | 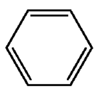 | — | 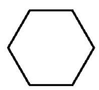 | $CH_2CH_2$ | F | F | $OC_5H_{11}$ | |
| 3416 | $C_2H_5$ | F | F |  | — | 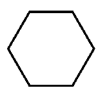 | $CH_2CH_2$ | F | F | $C_4H_9$ | |
| 3417 | $C_5H_{11}$ | F | F |  | — | 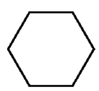 | $CH_2CH_2$ | F | F | $C_2H_5$ | |
| 3418 | $C_2H_5$ | F | F | 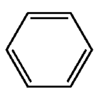 | — | 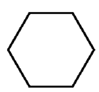 | $CH_2CH_2$ | F | F | $OC_4H_9$ | |
| 3419 | $CH_2{=}CH$ | F | F | 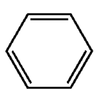 | — | 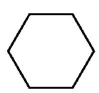 | $CH_2CH_2$ | F | F | $OC_3H_7$ | |
| 3420 | $CH_2{=}CH$ | F | F | 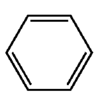 | — | 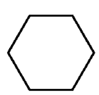 | $CH_2CH_2$ | F | F | $OC_5H_{11}$ | |

TABLE 227

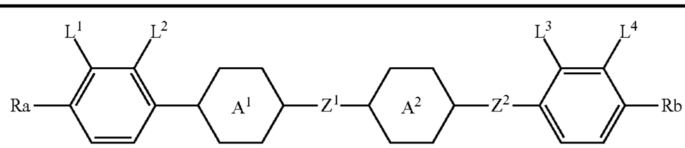

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3421 | $CH_2{=}CHO$ | F | F | 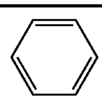 | — | 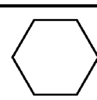 | $CH_2CH_2$ | F | F | $OC_3H_7$ | |
| 3422 | $CH_2{=}CHCH_2O$ | F | F | 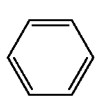 | — | 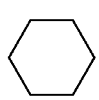 | $CH_2CH_2$ | F | F | $OC_5H_{11}$ | |
| 3423 | $CH_2{=}CHCH_2O$ | F | F | 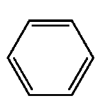 | — | 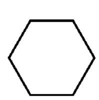 | $CH_2CH_2$ | F | F | $OC_3H_7$ | |

TABLE 227-continued

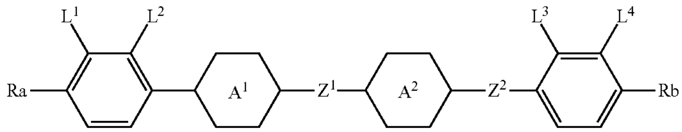

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3424 | $CH_2$═$CHC_2H_5O$ | F | F | 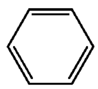 | — | 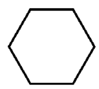 | $CH_2CH_2$ | F | F | $OC_5H_{11}$ | |
| 3425 | $CH_2$═$CHC_2H_5O$ | F | F |  | — | 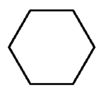 | $CH_2CH_2$ | F | F | $OC_2H_5$ | |
| 3426 | $CH_2$═$CHC_2H_5O$ | F | F |  | — | 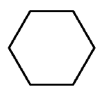 | $CH_2CH_2$ | F | F | $OC_3H_7$ | |
| 3427 | $CH_3CH$═$CHCH_2O$ | F | F | 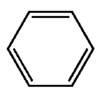 | — | 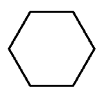 | $CH_2CH_2$ | F | F | $OCH_3$ | |
| 3428 | $CH_3CH$═$CHCH_2O$ | F | F | 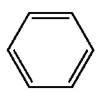 | — | 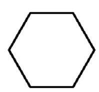 | $CH_2CH_2$ | F | F | $OC_2H_5$ | |
| 3429 | $C_3H_7O$ | F | F | 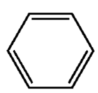 | — | 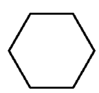 | $CH_2CH_2$ | F | F | $OCH$═$CH_2$ | |
| 3430 | $C_3H_7O$ | F | F | 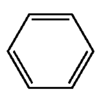 | — | 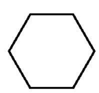 | $CH_2CH_2$ | F | F | $OCH_2CH$═$CH_2$ | |
| 3431 | $C_4H_9O$ | F | F | 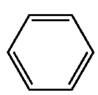 | — | 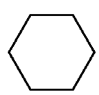 | $CH_2CH_2$ | F | F | $OCH_2CH$═$CH_2$ | |
| 3432 | $C_5H_{11}O$ | F | F | 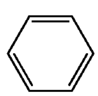 | — | 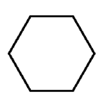 | $CH_2CH_2$ | F | F | $OCH_2CH$═$CH_2$ | |
| 3433 | $CH_3O$ | F | F | 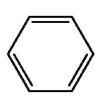 | — | 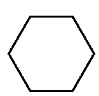 | $CH_2CH_2$ | F | F | $OC_2H_5CH$═$CH_2$ | |
| 3434 | $C_2H_5O$ | F | F | 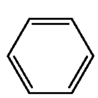 | — | 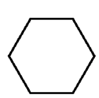 | $CH_2CH_2$ | F | F | $OC_2H_5CH$═$CH_2$ | |
| 3435 | $C_3H_7O$ | F | F | 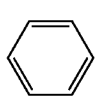 | — | 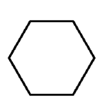 | $CH_2CH_2$ | F | F | $OC_2H_5CH$═$CH_2$ | |

TABLE 228

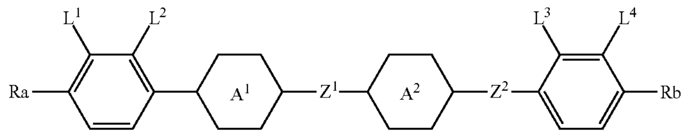

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3436 | $CH_3O$ | F | F | 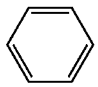 | — | 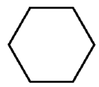 | $CH_2CH_2$ | F | F | $OCH_2CH{=}CHCH_3$ | |
| 3437 | $C_2H_5O$ | F | F | 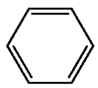 | — | 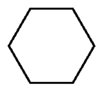 | $CH_2CH_2$ | F | F | $OCH_2CH{=}CHCH_3$ | |
| 3438 | $C_3H_7O$ | F | F | 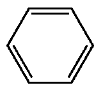 | — | 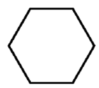 | $CH_2CH_2$ | F | F | $OCH_2CH{=}CHCH_3$ | |
| 3439 | $CH_2{=}CHCH_2O$ | F | F | 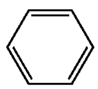 | — | 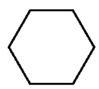 | $CH_2CH_2$ | F | F | $OCH{=}CH_2$ | |
| 3440 | $CH_2{=}CHC_2H_5O$ | F | F |  | — | 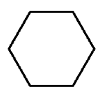 | $CH_2CH_2$ | F | F | $OCH_2CH{=}CH_2$ | |
| 3441 | $C_3H_7OCH_2$ | F | F |  | — | 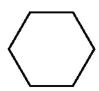 | $CH_2CH_2$ | F | F | $OC_3H_7$ | |
| 3442 | $C_5H_{11}O$ | F | F | 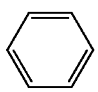 | — | 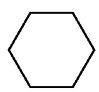 | $CH_2CH_2$ | F | F | $OC_2H_5CH{=}CH_2$ | |
| 3443 | $C_3H_7O$ | F | F | 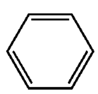 | — | 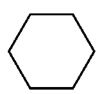 | $CH_2CH_2$ | F | F | H | |
| 3444 | $C_5H_{11}O$ | F | F | 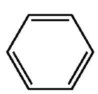 | — | 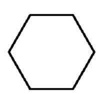 | $CH_2CH_2$ | F | F | $OC_9H_{19}$ | |
| 3445 | $C_3H_7O$ | F | F | 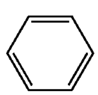 | — | 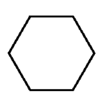 | $CH_2CH_2$ | F | F | $C_2H_5$ | |
| 3446 | $C_5H_{11}O$ | F | F | 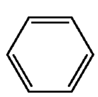 | — | 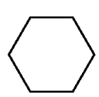 | $CH_2CH_2$ | F | F | $C_3H_7$ | |
| 3447 | H | F | F | 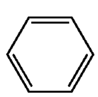 | — | 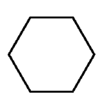 | $CH_2CH_2$ | F | F | $OC_4H_9$ | |
| 3448 | $C_7H_{15}O$ | F | F | 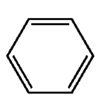 | — | 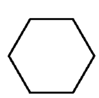 | $CH_2CH_2$ | F | F | $OC_4H_9$ | |

TABLE 228-continued

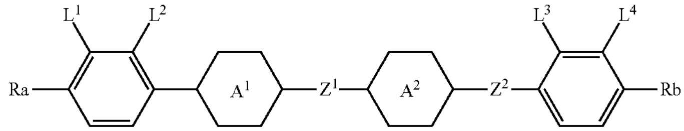

| No. | Ra | L1 | L2 | A1 | Z1 | A2 | Z2 | L3 | L4 | Rb | Physical property values |
|---|---|---|---|---|---|---|---|---|---|---|---|
| 3449 | $C_2H_5O$ | F | F | 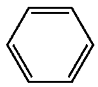 | — | 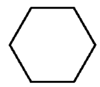 | $CH_2CH_2$ | F | F | $OC_6H_{13}$ | |
| 3450 | $CH_3O$ | F | F | 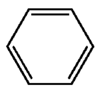 | — | 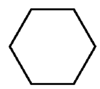 | $CH_2CH_2$ | F | F | $C_2H_5$ | |

TABLE 229

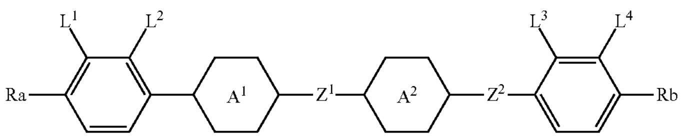

| No. | Ra | L1 | L2 | A1 | Z1 | A2 | Z2 | L3 | L4 | Rb | Physical property values |
|---|---|---|---|---|---|---|---|---|---|---|---|
| 3451 | $CH_3O$ | H | F | 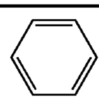 | — | 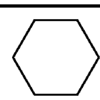 | $CH_2CH_2$ | F | F | $OCH_3$ | |
| 3452 | $CH_3O$ | H | F | 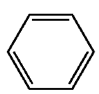 | — | 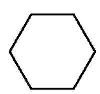 | $CH_2CH_2$ | F | F | $OC_2H_5$ | |
| 3453 | $CH_3O$ | H | F | 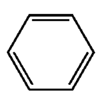 | — | 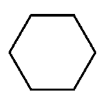 | $CH_2CH_2$ | F | F | $OC_3H_7$ | |
| 3454 | $CH_3O$ | H | F | 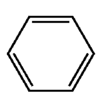 | — | 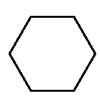 | $CH_2CH_2$ | F | F | $OC_4H_9$ | |
| 3455 | $CH_3O$ | H | F | 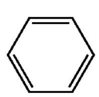 | — | 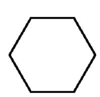 | $CH_2CH_2$ | F | F | $OC_5H_{11}$ | |
| 3456 | $C_2H_5O$ | H | F | 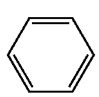 | — | 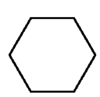 | $CH_2CH_2$ | F | F | $OCH_3$ | |
| 3457 | $C_2H_5O$ | H | F | 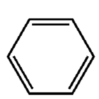 | — | 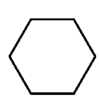 | $CH_2CH_2$ | F | F | $OC_2H_5$ | |
| 3458 | $C_2H_5O$ | H | F | 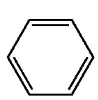 | — | 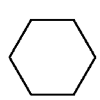 | $CH_2CH_2$ | F | F | $OC_3H_7$ | |
| 3459 | $C_2H_5O$ | H | F | 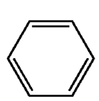 | — | 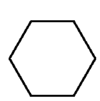 | $CH_2CH_2$ | F | F | $OC_4H_9$ | |
| 3460 | $C_2H_5O$ | H | F | 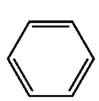 | — | 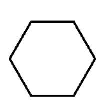 | $CH_2CH_2$ | F | F | $OC_5H_{11}$ | |

TABLE 229-continued

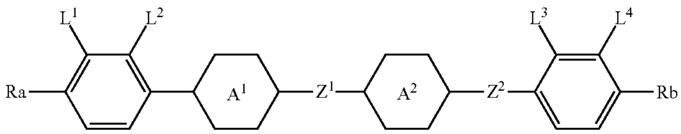

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3461 | $C_3H_7O$ | H | F |  | — | 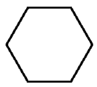 | $CH_2CH_2$ | F | F | $OCH_3$ | |
| 3462 | $C_3H_7O$ | H | F |  | — | 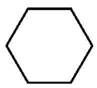 | $CH_2CH_2$ | F | F | $OC_2H_5$ | |
| 3463 | $C_3H_7O$ | H | F | 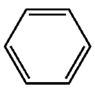 | — | 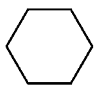 | $CH_2CH_2$ | F | F | $OC_3H_7$ | |
| 3464 | $C_3H_7O$ | H | F | 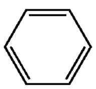 | — | 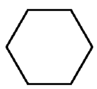 | $CH_2CH_2$ | F | F | $OC_4H_9$ | |
| 3465 | $C_3H_7O$ | H | F | 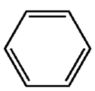 | — | 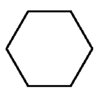 | $CH_2CH_2$ | F | F | $OC_5H_{11}$ | |

TABLE 230

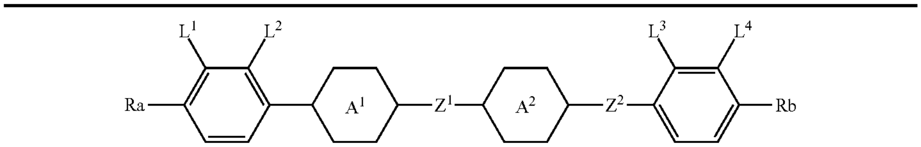

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3466 | $C_4H_9O$ | H | F | 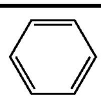 | — | 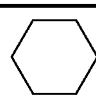 | $CH_2CH_2$ | F | F | $OCH_3$ | |
| 3467 | $C_4H_9O$ | H | F | 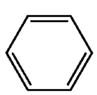 | — | 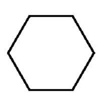 | $CH_2CH_2$ | F | F | $OC_2H_5$ | |
| 3468 | $C_4H_9O$ | H | F | 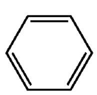 | — | 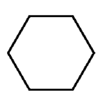 | $CH_2CH_2$ | F | F | $OC_3H_7$ | |
| 3469 | $C_4H_9O$ | H | F | 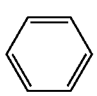 | — | 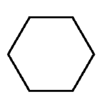 | $CH_2CH_2$ | F | F | $OC_4H_9$ | |
| 3470 | $C_4H_9O$ | H | F | 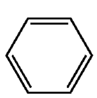 | — | 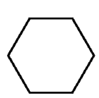 | $CH_2CH_2$ | F | F | $OC_5H_{11}$ | |
| 3471 | $C_5H_{11}O$ | H | F | 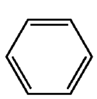 | — | 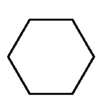 | $CH_2CH_2$ | F | F | $OCH_3$ | |

TABLE 230-continued

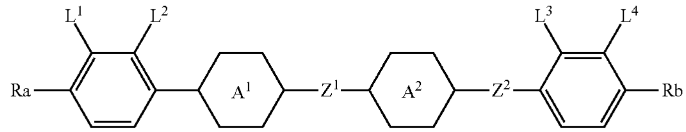

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3472 | $C_5H_{11}O$ | H | F | 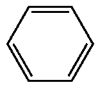 | — | 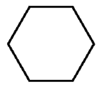 | $CH_2CH_2$ | F | F | $OC_2H_5$ | |
| 3473 | $C_5H_{11}O$ | H | F | 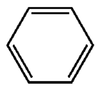 | — | 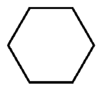 | $CH_2CH_2$ | F | F | $OC_3H_7$ | |
| 3474 | $C_5H_{11}O$ | H | F | 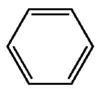 | — | 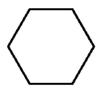 | $CH_2CH_2$ | F | F | $OC_4H_9$ | |
| 3475 | $C_5H_{11}O$ | H | F | 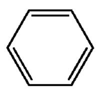 | — | 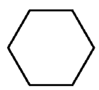 | $CH_2CH_2$ | F | F | $OC_5H_{11}$ | |
| 3476 | $C_2H_5$ | H | F |  | — | 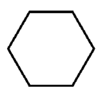 | $CH_2CH_2$ | F | F | $C_4H_9$ | |
| 3477 | $C_5H_{11}$ | H | F | 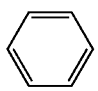 | — | 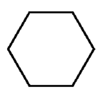 | $CH_2CH_2$ | F | F | $C_2H_5$ | |
| 3478 | $C_2H_5$ | H | F | 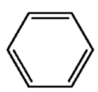 | — | 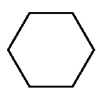 | $CH_2CH_2$ | F | F | $OC_4H_9$ | |
| 3479 | $CH_2{=}CH$ | H | F | 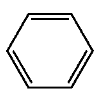 | — | 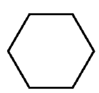 | $CH_2CH_2$ | F | F | $OC_3H_7$ | |
| 3480 | $CH_2{=}CH$ | H | F | 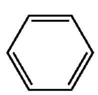 | — | 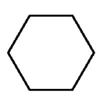 | $CH_2CH_2$ | F | F | $OC_5H_{11}$ | |

TABLE 231

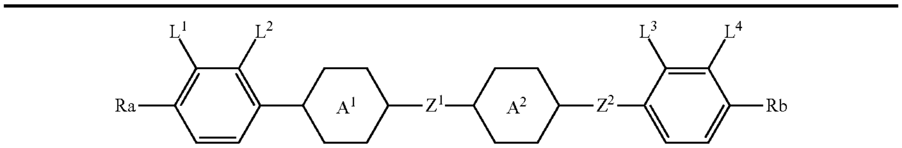

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3481 | $CH_3O$ | F | H | 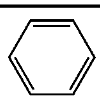 | — | 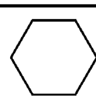 | $CH_2CH_2$ | F | F | $OCH_3$ | |
| 3482 | $CH_3O$ | F | H | 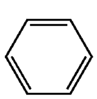 | — | 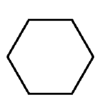 | $CH_2CH_2$ | F | F | $OC_2H_5$ | |
| 3483 | $CH_3O$ | F | H | 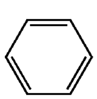 | — | 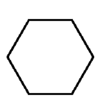 | $CH_2CH_2$ | F | F | $OC_3H_7$ | |

TABLE 231-continued

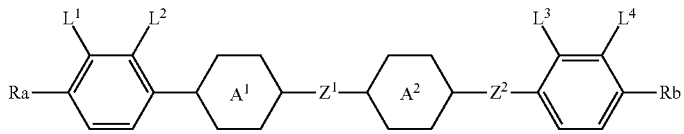

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3484 | $CH_3O$ | F | H |  | — | 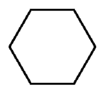 | $CH_2CH_2$ | F | F | $OC_4H_9$ | |
| 3485 | $CH_3O$ | F | H | 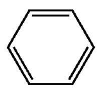 | — | 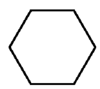 | $CH_2CH_2$ | F | F | $OC_5H_{11}$ | |
| 3486 | $C_2H_5O$ | F | H | 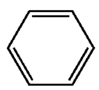 | — | 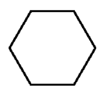 | $CH_2CH_2$ | F | F | $OCH_3$ | |
| 3487 | $C_2H_5O$ | F | H |  | — | 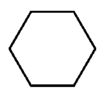 | $CH_2CH_2$ | F | F | $OC_2H_5$ | |
| 3488 | $C_2H_5O$ | F | H | 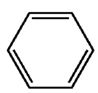 | — | 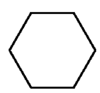 | $CH_2CH_2$ | F | F | $OC_3H_7$ | |
| 3489 | $C_2H_5O$ | F | H | 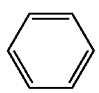 | — | 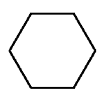 | $CH_2CH_2$ | F | F | $OC_4H_9$ | |
| 3490 | $C_2H_5O$ | F | H | 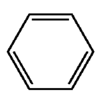 | — | 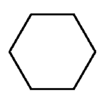 | $CH_2CH_2$ | F | F | $OC_5H_{11}$ | |
| 3491 | $C_3H_7O$ | F | H | 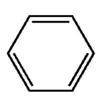 | — | 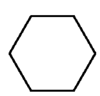 | $CH_2CH_2$ | F | F | $OCH_3$ | |
| 3492 | $C_3H_7O$ | F | H | 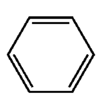 | — | 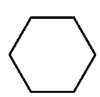 | $CH_2CH_2$ | F | F | $OC_2H_5$ | |
| 3493 | $C_3H_7O$ | F | H | 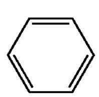 | — | 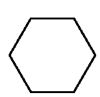 | $CH_2CH_2$ | F | F | $OC_3H_7$ | |
| 3494 | $C_3H_7O$ | F | H | 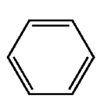 | — | 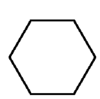 | $CH_2CH_2$ | F | F | $OC_4H_9$ | |
| 3495 | $C_3H_7O$ | F | H | 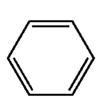 | — | 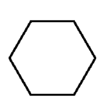 | $CH_2CH_2$ | F | F | $OC_5H_{11}$ | |

TABLE 232

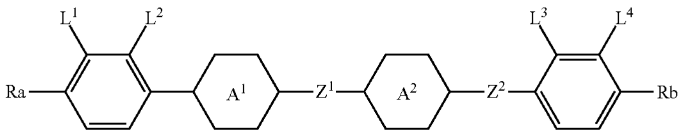

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3496 | $C_4H_9O$ | F | H | 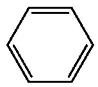 | — | 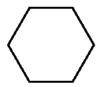 | $CH_2CH_2$ | F | F | $OCH_3$ | |
| 3497 | $C_4H_9O$ | F | H | 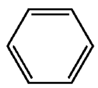 | — | 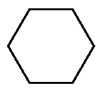 | $CH_2CH_2$ | F | F | $OC_2H_5$ | |
| 3498 | $C_4H_9O$ | F | H | 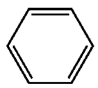 | — | 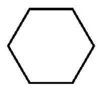 | $CH_2CH_2$ | F | F | $OC_3H_7$ | |
| 3499 | $C_4H_9O$ | F | H |  | — | 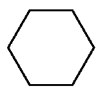 | $CH_2CH_2$ | F | F | $OC_4H_9$ | |
| 3500 | $C_4H_9O$ | F | H |  | — | 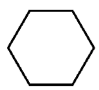 | $CH_2CH_2$ | F | F | $OC_5H_{11}$ | |
| 3501 | $C_5H_{11}O$ | F | H | 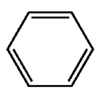 | — | 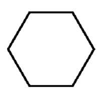 | $CH_2CH_2$ | F | F | $OCH_3$ | |
| 3502 | $C_5H_{11}O$ | F | H |  | — | 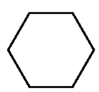 | $CH_2CH_2$ | F | F | $OC_2H_5$ | |
| 3503 | $C_5H_{11}O$ | F | H | 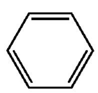 | — | 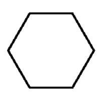 | $CH_2CH_2$ | F | F | $OC_3H_7$ | |
| 3504 | $C_5H_{11}O$ | F | H | 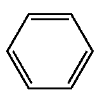 | — | 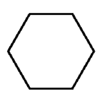 | $CH_2CH_2$ | F | F | $OC_4H_9$ | |
| 3505 | $C_5H_{11}O$ | F | H | 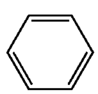 | — | 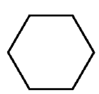 | $CH_2CH_2$ | F | F | $OC_5H_{11}$ | |
| 3506 | $C_2H_5$ | F | H | 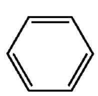 | — | 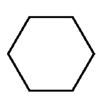 | $CH_2CH_2$ | F | F | $C_4H_9$ | |
| 3507 | $C_5H_{11}$ | F | H | 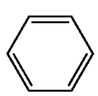 | — | 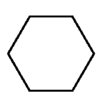 | $CH_2CH_2$ | F | F | $C_2H_5$ | |
| 3508 | $C_2H_5$ | F | H | 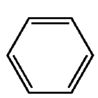 | — | 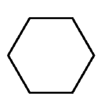 | $CH_2CH_2$ | F | F | $OC_4H_9$ | |

TABLE 232-continued

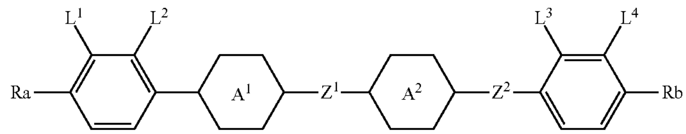

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3509 | $CH_2{=}CH$ | F | H |  | — | 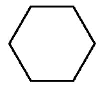 | $CH_2CH_2$ | F | F | $OC_3H_7$ | |
| 3510 | $CH_2{=}CH$ | F | H | 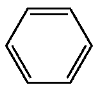 | — | 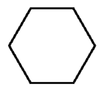 | $CH_2CH_2$ | F | F | $OC_5H_{11}$ | |

TABLE 233

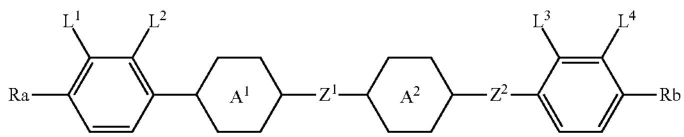

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3511 | $CH_3O$ | F | F |  | — | 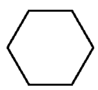 | $CH_2CH_2$ | H | F | $OCH_3$ | |
| 3512 | $CH_3O$ | F | F |  | — | 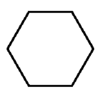 | $CH_2CH_2$ | H | F | $OC_2H_5$ | |
| 3513 | $CH_3O$ | F | F | 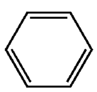 | — | 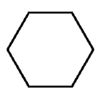 | $CH_2CH_2$ | H | F | $OC_3H_7$ | |
| 3514 | $CH_3O$ | F | F | 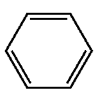 | — | 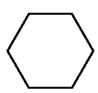 | $CH_2CH_2$ | H | F | $OC_4H_9$ | |
| 3515 | $CH_3O$ | F | F | 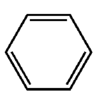 | — | 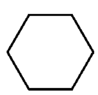 | $CH_2CH_2$ | H | F | $OC_5H_{11}$ | |
| 3516 | $C_2H_5O$ | F | F | 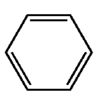 | — | 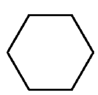 | $CH_2CH_2$ | H | F | $OCH_3$ | |
| 3517 | $C_2H_5O$ | F | F | 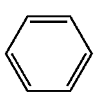 | — | 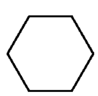 | $CH_2CH_2$ | H | F | $OC_2H_5$ | |
| 3518 | $C_2H_5O$ | F | F | 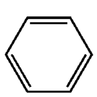 | — | 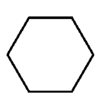 | $CH_2CH_2$ | H | F | $OC_3H_7$ | |
| 3519 | $C_2H_5O$ | F | F | 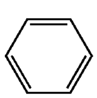 | — | 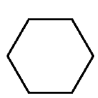 | $CH_2CH_2$ | H | F | $OC_4H_9$ | |
| 3520 | $C_2H_5O$ | F | F | 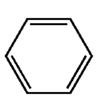 | — | 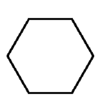 | $CH_2CH_2$ | H | F | $OC_5H_{11}$ | |

TABLE 233-continued

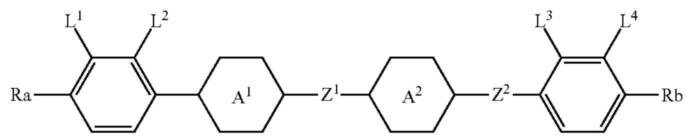

| No. | Ra | L1 | L2 | A1 | Z1 | A2 | Z2 | L3 | L4 | Rb | Physical property values |
|---|---|---|---|---|---|---|---|---|---|---|---|
| 3521 | $C_3H_7O$ | F | F |  | — | 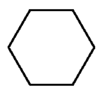 | $CH_2CH_2$ | H | F | $OCH_3$ | |
| 3522 | $C_3H_7O$ | F | F |  | — | 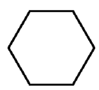 | $CH_2CH_2$ | H | F | $OC_2H_5$ | |
| 3523 | $C_3H_7O$ | F | F |  | — | 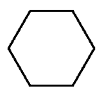 | $CH_2CH_2$ | H | F | $OC_3H_7$ | |
| 3524 | $C_3H_7O$ | F | F | 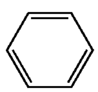 | — | 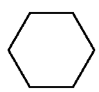 | $CH_2CH_2$ | H | F | $OC_4H_9$ | |
| 3525 | $C_3H_7O$ | F | F | 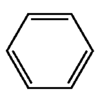 | — | 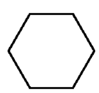 | $CH_2CH_2$ | H | F | $OC_5H_{11}$ | |

TABLE 234

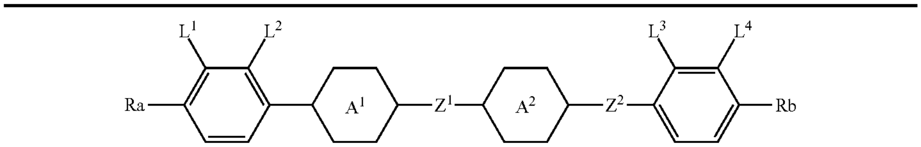

| No. | Ra | L1 | L2 | A1 | Z1 | A2 | Z2 | L3 | L4 | Rb | Physical property values |
|---|---|---|---|---|---|---|---|---|---|---|---|
| 3526 | $C_4H_9O$ | F | F | 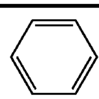 | — | 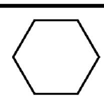 | $CH_2CH_2$ | H | F | $OCH_3$ | |
| 3527 | $C_4H_9O$ | F | F | 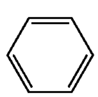 | — | 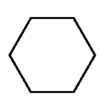 | $CH_2CH_2$ | H | F | $OC_2H_5$ | |
| 3528 | $C_4H_9O$ | F | F | 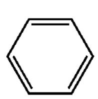 | — | 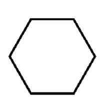 | $CH_2CH_2$ | H | F | $OC_3H_7$ | |
| 3529 | $C_4H_9O$ | F | F | 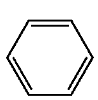 | — | 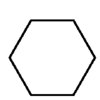 | $CH_2CH_2$ | H | F | $OC_4H_9$ | |
| 3530 | $C_4H_9O$ | F | F | 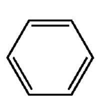 | — | 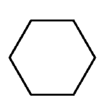 | $CH_2CH_2$ | H | F | $OC_5H_{11}$ | |
| 3531 | $C_5H_{11}O$ | F | F | 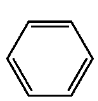 | — | 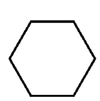 | $CH_2CH_2$ | H | F | $OCH_3$ | |

TABLE 234-continued

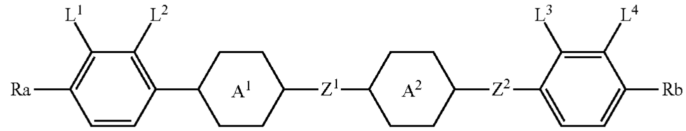

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3532 | $C_5H_{11}O$ | F | F | 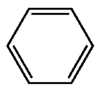 | — | 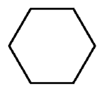 | $CH_2CH_2$ | H | F | $OC_2H_5$ | |
| 3533 | $C_5H_{11}O$ | F | F |  | — | 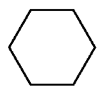 | $CH_2CH_2$ | H | F | $OC_3H_7$ | |
| 3534 | $C_5H_{11}O$ | F | F |  | — | 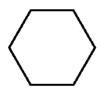 | $CH_2CH_2$ | H | F | $OC_4H_9$ | |
| 3535 | $C_5H_{11}O$ | F | F |  | — | 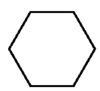 | $CH_2CH_2$ | H | F | $OC_5H_{11}$ | |
| 3536 | $C_2H_5$ | F | F | 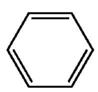 | — | 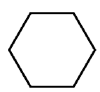 | $CH_2CH_2$ | H | F | $C_4H_9$ | |
| 3537 | $C_5H_{11}$ | F | F | 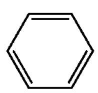 | — | 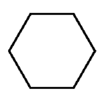 | $CH_2CH_2$ | H | F | $C_2H_5$ | |
| 3538 | $C_2H_5$ | F | F | 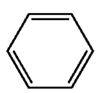 | — | 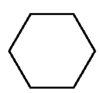 | $CH_2CH_2$ | H | F | $OC_4H_9$ | |
| 3539 | $CH_2{=}CH$ | F | F | 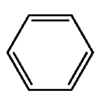 | — | 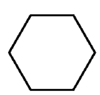 | $CH_2CH_2$ | H | F | $OC_3H_7$ | |
| 3540 | $CH_2{=}CH$ | F | F | 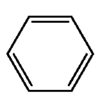 | — | 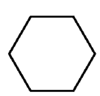 | $CH_2CH_2$ | H | F | $OC_5H_{11}$ | |

TABLE 235

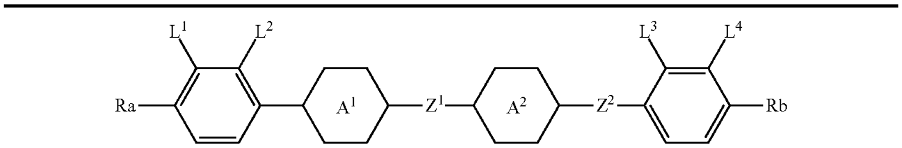

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3541 | $CH_3O$ | F | F | 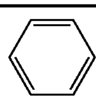 | — | 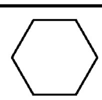 | $CH_2CH_2$ | F | H | $OCH_3$ | |
| 3542 | $CH_3O$ | F | F | 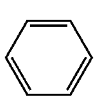 | — | 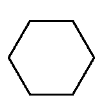 | $CH_2CH_2$ | F | H | $OC_2H_5$ | |
| 3543 | $CH_3O$ | F | F | 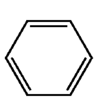 | — | 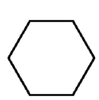 | $CH_2CH_2$ | F | H | $OC_3H_7$ | |

TABLE 235-continued

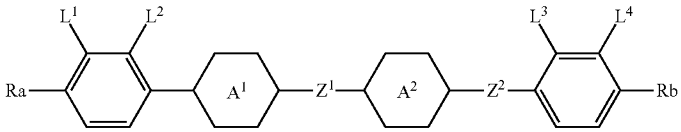

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3544 | $CH_3O$ | F | F | 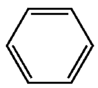 | — | 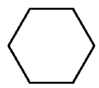 | $CH_2CH_2$ | F | H | $OC_4H_9$ | |
| 3545 | $CH_3O$ | F | F |  | — | 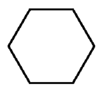 | $CH_2CH_2$ | F | H | $OC_5H_{11}$ | |
| 3546 | $C_2H_5O$ | F | F |  | — | 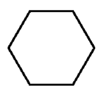 | $CH_2CH_2$ | F | H | $OCH_3$ | |
| 3547 | $C_2H_5O$ | F | F |  | — | 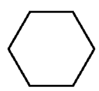 | $CH_2CH_2$ | F | H | $OC_2H_5$ | |
| 3548 | $C_2H_5O$ | F | F |  | — | 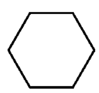 | $CH_2CH_2$ | F | H | $OC_3H_7$ | |
| 3549 | $C_2H_5O$ | F | F |  | — | 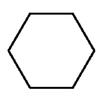 | $CH_2CH_2$ | F | H | $OC_4H_9$ | |
| 3550 | $C_2H_5O$ | F | F | 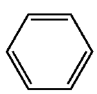 | — | 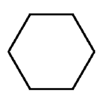 | $CH_2CH_2$ | F | H | $OC_5H_{11}$ | |
| 3551 | $C_3H_7O$ | F | F | 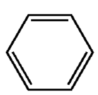 | — | 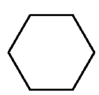 | $CH_2CH_2$ | F | H | $OCH_3$ | |
| 3552 | $C_3H_7O$ | F | F | 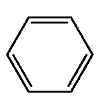 | — | 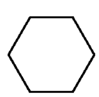 | $CH_2CH_2$ | F | H | $OC_2H_5$ | |
| 3553 | $C_3H_7O$ | F | F | 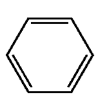 | — | 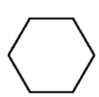 | $CH_2CH_2$ | F | H | $OC_3H_7$ | |
| 3554 | $C_3H_7O$ | F | F | 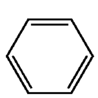 | — | 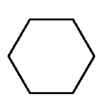 | $CH_2CH_2$ | F | H | $OC_4H_9$ | |
| 3555 | $C_3H_7O$ | F | F | 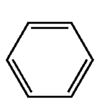 | — | 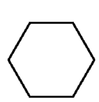 | $CH_2CH_2$ | F | H | $OC_5H_{11}$ | |

TABLE 236

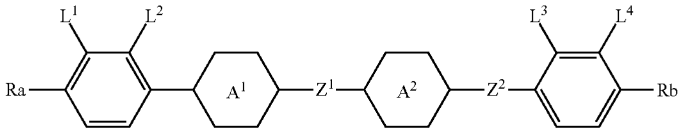

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3556 | $C_4H_9O$ | F | F |  | — | 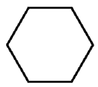 | $CH_2CH_2$ | F | H | $OCH_3$ | |
| 3557 | $C_4H_9O$ | F | F | 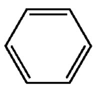 | — | 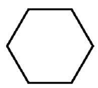 | $CH_2CH_2$ | F | H | $OC_2H_5$ | |
| 3558 | $C_4H_9O$ | F | F | 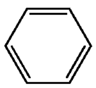 | — | 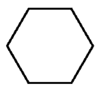 | $CH_2CH_2$ | F | H | $OC_3H_7$ | |
| 3559 | $C_4H_9O$ | F | F | 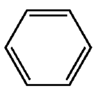 | — | 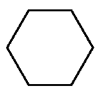 | $CH_2CH_2$ | F | H | $OC_4H_9$ | |
| 3560 | $C_4H_9O$ | F | F | 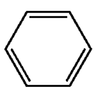 | — | 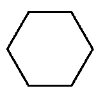 | $CH_2CH_2$ | F | H | $OC_5H_{11}$ | |
| 3561 | $C_5H_{11}O$ | F | F |  | — | 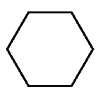 | $CH_2CH_2$ | F | H | $OCH_3$ | |
| 3562 | $C_5H_{11}O$ | F | F | 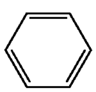 | — | 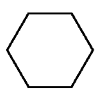 | $CH_2CH_2$ | F | H | $OC_2H_5$ | |
| 3563 | $C_5H_{11}O$ | F | F | 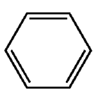 | — | 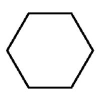 | $CH_2CH_2$ | F | H | $OC_3H_7$ | |
| 3564 | $C_5H_{11}O$ | F | F | 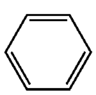 | — | 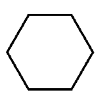 | $CH_2CH_2$ | F | H | $OC_4H_9$ | |
| 3565 | $C_5H_{11}O$ | F | F | 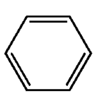 | — | 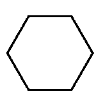 | $CH_2CH_2$ | F | H | $OC_5H_{11}$ | |
| 3566 | $C_2H_5$ | F | F | 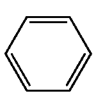 | — | 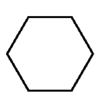 | $CH_2CH_2$ | F | H | $C_4H_9$ | |
| 3567 | $C_5H_{11}$ | F | F | 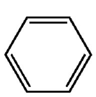 | — | 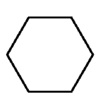 | $CH_2CH_2$ | F | H | $C_2H_5$ | |
| 3568 | $C_2H_5$ | F | F | 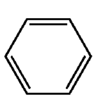 | — | 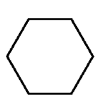 | $CH_2CH_2$ | F | H | $OC_4H_9$ | |

TABLE 236-continued

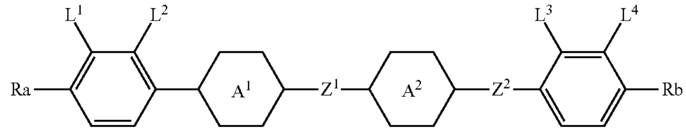

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3569 | $CH_2$═CH | F | F | 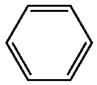 | — | 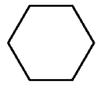 | $CH_2CH_2$ | F | H | $OC_3H_7$ | |
| 3570 | $CH_2$═CH | F | F | 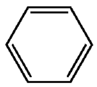 | — | 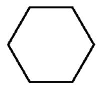 | $CH_2CH_2$ | F | H | $OC_5H_{11}$ | |

TABLE 237

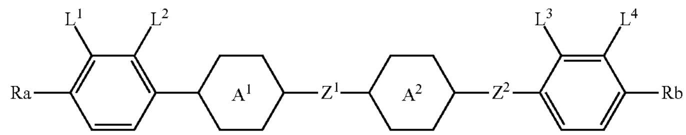

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3571 | $CH_3O$ | F | F | 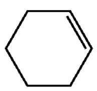 | — | 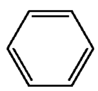 | $CH_2CH_2$ | F | F | $OCH_3$ | |
| 3572 | $CH_3O$ | F | F | 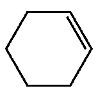 | — |  | $CH_2CH_2$ | F | F | $OC_2H_5$ | |
| 3573 | $CH_3O$ | F | F | 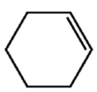 | — |  | $CH_2CH_2$ | F | F | $OC_3H_7$ | |
| 3574 | $CH_3O$ | F | F | 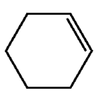 | — |  | $CH_2CH_2$ | F | F | $OC_4H_9$ | |
| 3575 | $CH_3O$ | F | F | 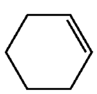 | — | 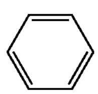 | $CH_2CH_2$ | F | F | $OC_5H_{11}$ | |
| 3576 | $C_2H_5O$ | F | F | 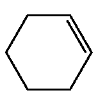 | — | 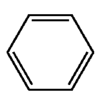 | $CH_2CH_2$ | F | F | $OCH_3$ | |
| 3577 | $C_2H_5O$ | F | F | 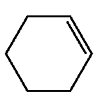 | — | 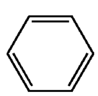 | $CH_2CH_2$ | F | F | $OC_2H_5$ | |
| 3578 | $C_2H_5O$ | F | F | 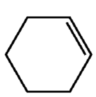 | — | 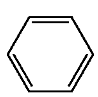 | $CH_2CH_2$ | F | F | $OC_3H_7$ | |
| 3579 | $C_2H_5O$ | F | F | 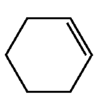 | — | 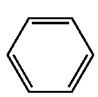 | $CH_2CH_2$ | F | F | $OC_4H_9$ | |
| 3580 | $C_2H_5O$ | F | F | 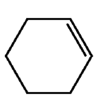 | — | 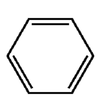 | $CH_2CH_2$ | F | F | $OC_5H_{11}$ | |

TABLE 237-continued

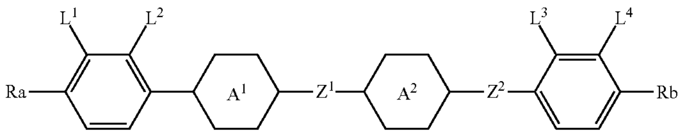

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3581 | $C_3H_7O$ | F | F | 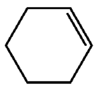 | — |  | $CH_2CH_2$ | F | F | $OCH_3$ | |
| 3582 | $C_3H_7O$ | F | F | 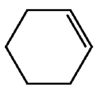 | — |  | $CH_2CH_2$ | F | F | $OC_2H_5$ | |
| 3583 | $C_3H_7O$ | F | F | 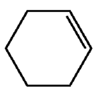 | — | 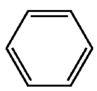 | $CH_2CH_2$ | F | F | $OC_3H_7$ | |
| 3584 | $C_3H_7O$ | F | F | 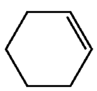 | — |  | $CH_2CH_2$ | F | F | $OC_4H_9$ | |
| 3585 | $C_3H_7O$ | F | F | 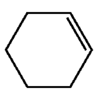 | — |  | $CH_2CH_2$ | F | F | $OC_5H_{11}$ | |

TABLE 238

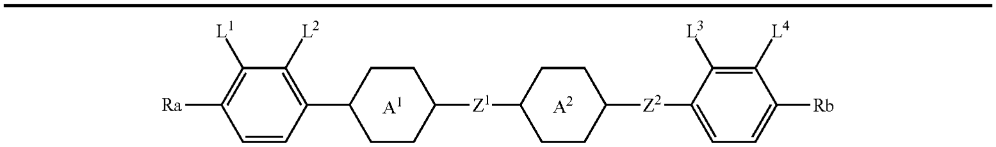

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3586 | $C_4H_9O$ | F | F | 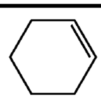 | — | 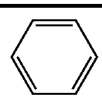 | $CH_2CH_2$ | F | F | $OCH_3$ | $C_1$ 84.9 $C_2$ 100.5 $S_A$ 135.3 N 186.9 I $T_{NI}$: 175.3° C., Δϵ: −8.47, Δn: 0.186 |
| 3587 | $C_4H_9O$ | F | F | 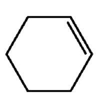 | — | 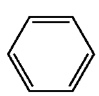 | $CH_2CH_2$ | F | F | $OC_2H_5$ | |
| 3588 | $C_4H_9O$ | F | F | 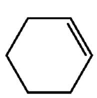 | — | 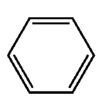 | $CH_2CH_2$ | F | F | $OC_3H_7$ | |
| 3589 | $C_4H_9O$ | F | F | 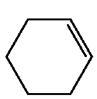 | — | 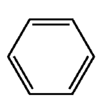 | $CH_2CH_2$ | F | F | $OC_4H_9$ | |
| 3590 | $C_4H_9O$ | F | F | 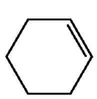 | — | 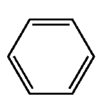 | $CH_2CH_2$ | F | F | $OC_5H_{11}$ | |
| 3591 | $C_5H_{11}O$ | F | F | 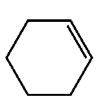 | — | 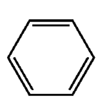 | $CH_2CH_2$ | F | F | $OCH_3$ | |

TABLE 238-continued

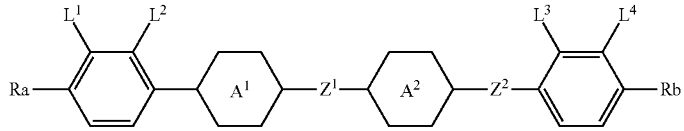

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3592 | $C_5H_{11}O$ | F | F | 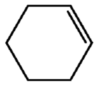 | — | 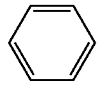 | $CH_2CH_2$ | F | F | $OC_2H_5$ | |
| 3593 | $C_5H_{11}O$ | F | F | 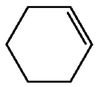 | — | 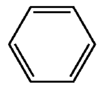 | $CH_2CH_2$ | F | F | $OC_3H_7$ | |
| 3594 | $C_5H_{11}O$ | F | F | 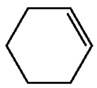 | — | 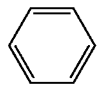 | $CH_2CH_2$ | F | F | $OC_4H_9$ | |
| 3595 | $C_5H_{11}O$ | F | F | 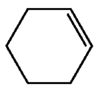 | — | 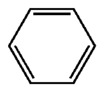 | $CH_2CH_2$ | F | F | $OC_5H_{11}$ | |
| 3596 | $C_2H_5$ | F | F | 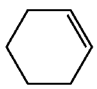 | — | 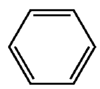 | $CH_2CH_2$ | F | F | $C_4H_9$ | |
| 3597 | $C_5H_{11}$ | F | F | 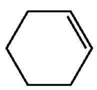 | — | 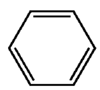 | $CH_2CH_2$ | F | F | $C_2H_5$ | |
| 3598 | $C_2H_5$ | F | F | 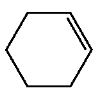 | — | 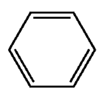 | $CH_2CH_2$ | F | F | $OC_4H_9$ | |
| 3599 | $CH_2{=}CH$ | F | F | 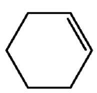 | — | 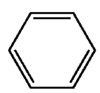 | $CH_2CH_2$ | F | F | $OC_3H_7$ | |
| 3600 | $CH_2{=}CH$ | F | F | 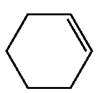 | — | 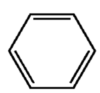 | $CH_2CH_2$ | F | F | $OC_5H_{11}$ | |

TABLE 239

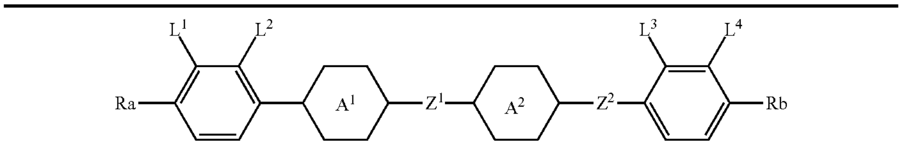

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3601 | $CH_3O$ | F | F | 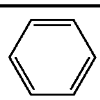 | — | 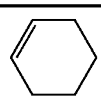 | $CH_2CH_2$ | F | F | $OCH_3$ | |
| 3602 | $CH_3O$ | F | F | 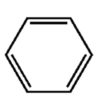 | — | 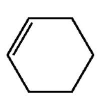 | $CH_2CH_2$ | F | F | $OC_2H_5$ | |
| 3603 | $CH_3O$ | F | F | 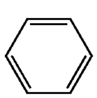 | — | 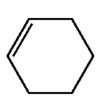 | $CH_2CH_2$ | F | F | $OC_3H_7$ | |

TABLE 239-continued

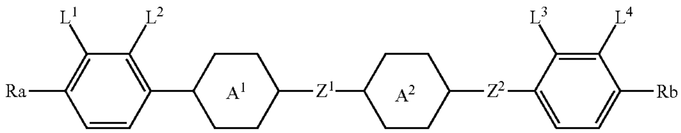

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3604 | $CH_3O$ | F | F |  | — | 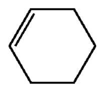 | $CH_2CH_2$ | F | F | $OC_4H_9$ | |
| 3605 | $CH_3O$ | F | F | 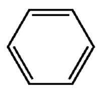 | — | 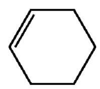 | $CH_2CH_2$ | F | F | $OC_5H_{11}$ | |
| 3606 | $C_2H_5O$ | F | F | 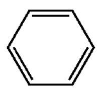 | — | 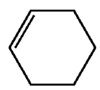 | $CH_2CH_2$ | F | F | $OCH_3$ | |
| 3607 | $C_2H_5O$ | F | F | 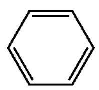 | — | 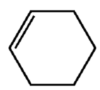 | $CH_2CH_2$ | F | F | $OC_2H_5$ | |
| 3608 | $C_2H_5O$ | F | F | 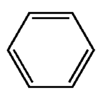 | — | 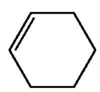 | $CH_2CH_2$ | F | F | $OC_3H_7$ | |
| 3609 | $C_2H_5O$ | F | F | 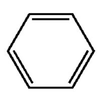 | — | 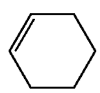 | $CH_2CH_2$ | F | F | $OC_4H_9$ | |
| 3610 | $C_2H_5O$ | F | F | 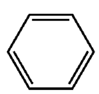 | — | 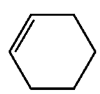 | $CH_2CH_2$ | F | F | $OC_5H_{11}$ | |
| 3611 | $C_3H_7O$ | F | F | 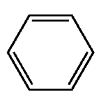 | — | 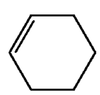 | $CH_2CH_2$ | F | F | $OCH_3$ | |
| 3612 | $C_3H_7O$ | F | F | 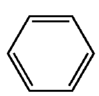 | — | 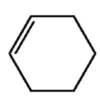 | $CH_2CH_2$ | F | F | $OC_2H_5$ | |
| 3613 | $C_3H_7O$ | F | F | 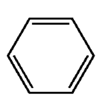 | — | 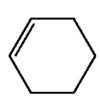 | $CH_2CH_2$ | F | F | $OC_3H_7$ | |
| 3614 | $C_3H_7O$ | F | F | 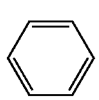 | — | 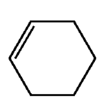 | $CH_2CH_2$ | F | F | $OC_4H_9$ | |
| 3615 | $C_3H_7O$ | F | F | 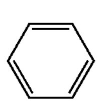 | — | 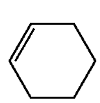 | $CH_2CH_2$ | F | F | $OC_5H_{11}$ | |

TABLE 240

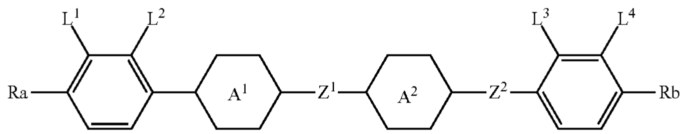

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3616 | $C_4H_9O$ | F | F | 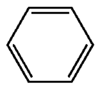 | — | 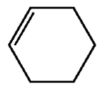 | $CH_2CH_2$ | F | F | $OCH_3$ | |
| 3617 | $C_4H_9O$ | F | F | 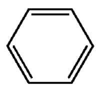 | — | 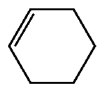 | $CH_2CH_2$ | F | F | $OC_2H_5$ | |
| 3618 | $C_4H_9O$ | F | F | 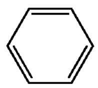 | — | 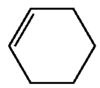 | $CH_2CH_2$ | F | F | $OC_3H_7$ | |
| 3619 | $C_4H_9O$ | F | F |  | — | 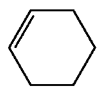 | $CH_2CH_2$ | F | F | $OC_4H_9$ | |
| 3620 | $C_4H_9O$ | F | F | 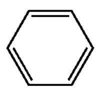 | — | 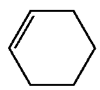 | $CH_2CH_2$ | F | F | $OC_5H_{11}$ | |
| 3621 | $C_5H_{11}O$ | F | F | 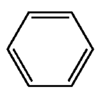 | — | 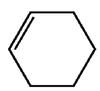 | $CH_2CH_2$ | F | F | $OCH_3$ | |
| 3622 | $C_5H_{11}O$ | F | F | 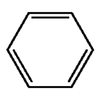 | — | 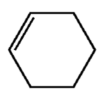 | $CH_2CH_2$ | F | F | $OC_2H_5$ | |
| 3623 | $C_5H_{11}O$ | F | F | 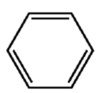 | — | 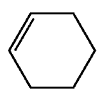 | $CH_2CH_2$ | F | F | $OC_3H_7$ | |
| 3624 | $C_5H_{11}O$ | F | F | 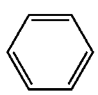 | — | 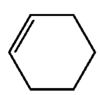 | $CH_2CH_2$ | F | F | $OC_4H_9$ | |
| 3625 | $C_5H_{11}O$ | F | F | 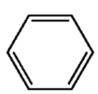 | — | 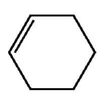 | $CH_2CH_2$ | F | F | $OC_5H_{11}$ | |
| 3626 | $C_2H_5$ | F | F | 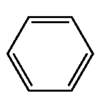 | — | 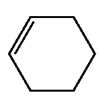 | $CH_2CH_2$ | F | F | $C_4H_9$ | |
| 3627 | $C_5H_{11}$ | F | F | 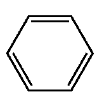 | — | 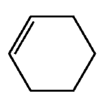 | $CH_2CH_2$ | F | F | $C_2H_5$ | |
| 3628 | $C_2H_5$ | F | F | 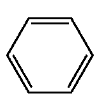 | — | 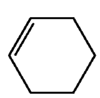 | $CH_2CH_2$ | F | F | $OC_4H_9$ | |

TABLE 240-continued

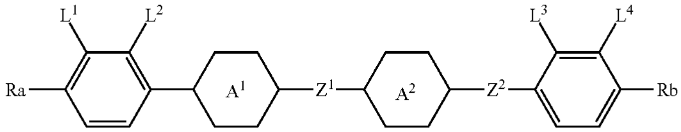

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3629 | $CH_2$=CH | F | F | 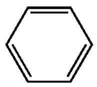 | — | 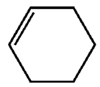 | $CH_2CH_2$ | F | F | $OC_3H_7$ | |
| 3630 | $CH_2$=CH | F | F | 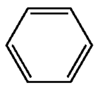 | — | 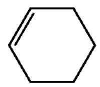 | $CH_2CH_2$ | F | F | $OC_5H_{11}$ | |

TABLE 241

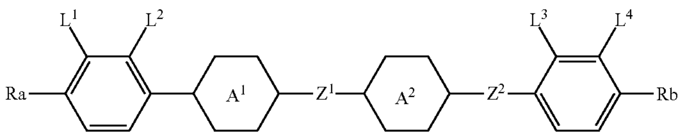

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3631 | $CH_3O$ | F | F | 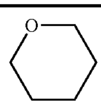 | — | 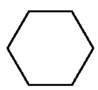 | $CH_2CH_2$ | F | F | $OCH_3$ | |
| 3632 | $CH_3O$ | F | F | 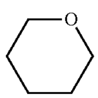 | — | 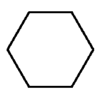 | $CH_2CH_2$ | F | F | $OC_2H_5$ | |
| 3633 | $CH_3O$ | F | F | 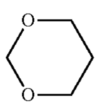 | — | 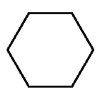 | $CH_2CH_2$ | F | F | $OC_3H_7$ | |
| 3634 | $CH_3O$ | F | F | 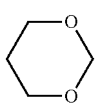 | — | 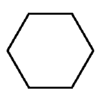 | $CH_2CH_2$ | F | F | $OC_4H_9$ | |
| 3635 | $CH_3O$ | F | F | 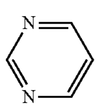 | — | 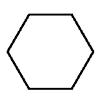 | $CH_2CH_2$ | F | F | $OC_5H_{11}$ | |
| 3636 | $C_2H_5O$ | F | F | 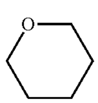 | — | 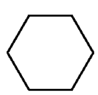 | $CH_2CH_2$ | F | F | $OCH_3$ | |
| 3637 | $C_2H_5O$ | F | F | 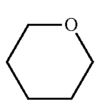 | — | 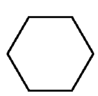 | $CH_2CH_2$ | F | F | $OC_2H_5$ | |
| 3638 | $C_2H_5O$ | F | F | 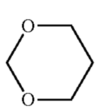 | — | 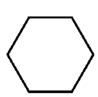 | $CH_2CH_2$ | F | F | $OC_3H_7$ | |
| 3639 | $C_2H_5O$ | F | F | 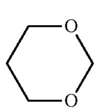 | — | 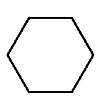 | $CH_2CH_2$ | F | F | $OC_4H_9$ | |

TABLE 241-continued

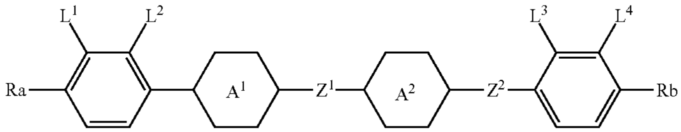

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3640 | $C_2H_5O$ | F | F | 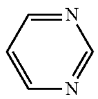 | — | 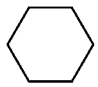 | $CH_2CH_2$ | F | F | $OC_5H_{11}$ | |
| 3641 | $C_3H_7O$ | F | F | 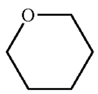 | — | 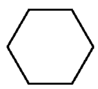 | $CH_2CH_2$ | F | F | $OCH_3$ | |
| 3642 | $C_3H_7O$ | F | F | 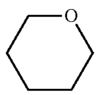 | — | 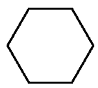 | $CH_2CH_2$ | F | F | $OC_2H_5$ | |
| 3643 | $C_3H_7O$ | F | F | 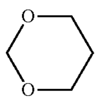 | — | 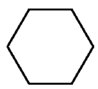 | $CH_2CH_2$ | F | F | $OC_3H_7$ | |
| 3644 | $C_3H_7O$ | F | F | 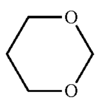 | — | 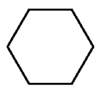 | $CH_2CH_2$ | F | F | $OC_4H_9$ | |
| 3645 | $C_3H_7O$ | F | F | 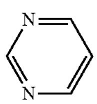 | — | 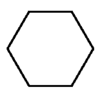 | $CH_2CH_2$ | F | F | $OC_5H_{11}$ | |

TABLE 242

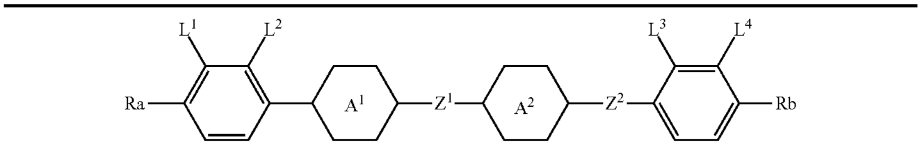

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3646 | $C_4H_9O$ | F | F | 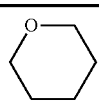 | — | 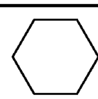 | $CH_2CH_2$ | F | F | $OCH_3$ | |
| 3647 | $C_4H_9O$ | F | F | 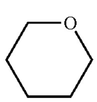 | — | 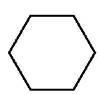 | $CH_2CH_2$ | F | F | $OC_2H_5$ | |
| 3648 | $C_4H_9O$ | F | F | 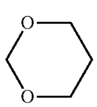 | — | 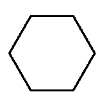 | $CH_2CH_2$ | F | F | $OC_3H_7$ | |
| 3649 | $C_4H_9O$ | F | F | 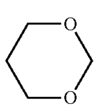 | — | 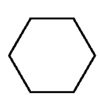 | $CH_2CH_2$ | F | F | $OC_4H_9$ | |
| 3650 | $C_4H_9O$ | F | F | 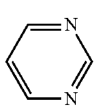 | — | 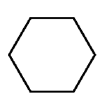 | $CH_2CH_2$ | F | F | $OC_5H_{11}$ | |

TABLE 242-continued

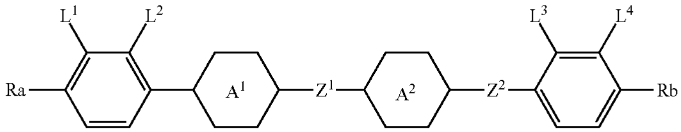

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3651 | $C_5H_{11}O$ | F | F | 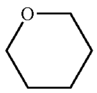 | — | 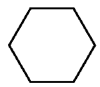 | $CH_2CH_2$ | F | F | $OCH_3$ | |
| 3652 | $C_5H_{11}O$ | F | F | 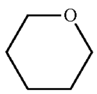 | — | 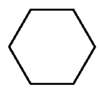 | $CH_2CH_2$ | F | F | $OC_2H_5$ | |
| 3653 | $C_5H_{11}O$ | F | F | 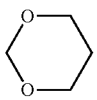 | — | 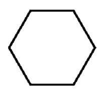 | $CH_2CH_2$ | F | F | $OC_3H_7$ | |
| 3654 | $C_5H_{11}O$ | F | F | 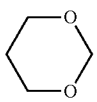 | — | 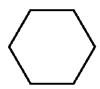 | $CH_2CH_2$ | F | F | $OC_4H_9$ | |
| 3655 | $C_5H_{11}O$ | F | F | 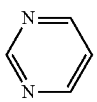 | — | 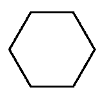 | $CH_2CH_2$ | F | F | $OC_5H_{11}$ | |
| 3656 | $C_2H_5$ | F | F | 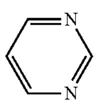 | — | 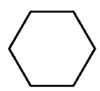 | $CH_2CH_2$ | F | F | $C_4H_9$ | |
| 3657 | $C_5H_{11}$ | F | F | 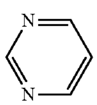 | — | 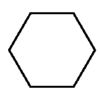 | $CH_2CH_2$ | F | F | $C_2H_5$ | |
| 3658 | $C_2H_5$ | F | F | 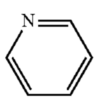 | — | 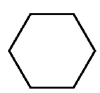 | $CH_2CH_2$ | F | F | $OC_4H_9$ | |
| 3659 | $CH_2{=}CH$ | F | F | 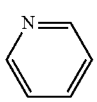 | — | 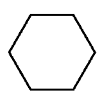 | $CH_2CH_2$ | F | F | $OC_3H_7$ | |
| 3660 | $CH_2{=}CH$ | F | F | 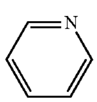 | — | 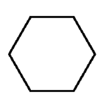 | $CH_2CH_2$ | F | F | $OC_5H_{11}$ | |

TABLE 243

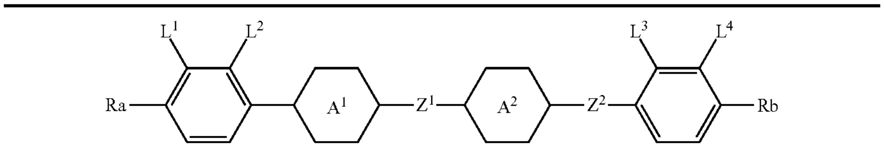

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3661 | $CH_3O$ | F | F | 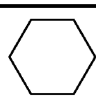 | — | 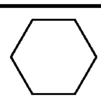 | $CH_2O$ | F | F | $OCH_3$ | |

TABLE 243-continued

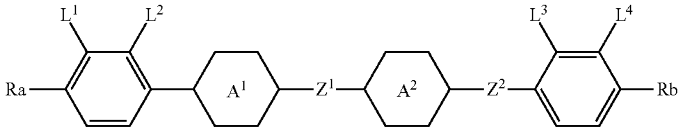

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3662 | $CH_3O$ | F | F | 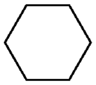 | — | 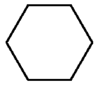 | $CH_2O$ | F | F | $OC_2H_5$ | |
| 3663 | $CH_3O$ | F | F | 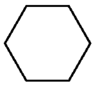 | — | 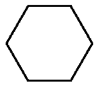 | $CH_2O$ | F | F | $OC_3H_7$ | |
| 3664 | $CH_3O$ | F | F | 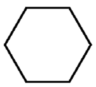 | — | 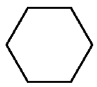 | $CH_2O$ | F | F | $OC_4H_9$ | |
| 3665 | $CH_3O$ | F | F | 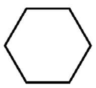 | — | 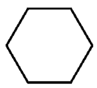 | $CH_2O$ | F | F | $OC_5H_{11}$ | |
| 3666 | $C_2H_5O$ | F | F | 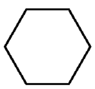 | — | 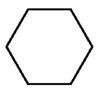 | $CH_2O$ | F | F | $OCH_3$ | |
| 3667 | $C_2H_5O$ | F | F | 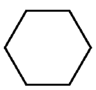 | — | 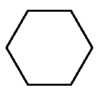 | $CH_2O$ | F | F | $OC_2H_5$ | |
| 3668 | $C_2H_5O$ | F | F | 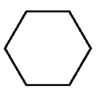 | — | 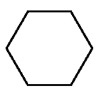 | $CH_2O$ | F | F | $OC_3H_7$ | |
| 3669 | $C_2H_5O$ | F | F | 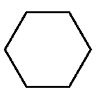 | — | 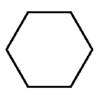 | $CH_2O$ | F | F | $OC_4H_9$ | |
| 3670 | $C_2H_5O$ | F | F | 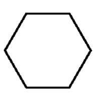 | — | 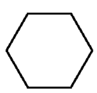 | $CH_2O$ | F | F | $OC_5H_{11}$ | |
| 3671 | $C_3H_7O$ | F | F | 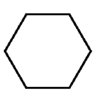 | — | 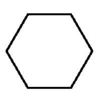 | $CH_2O$ | F | F | $OCH_3$ | |
| 3672 | $C_3H_7O$ | F | F | 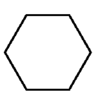 | — | 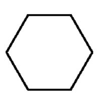 | $CH_2O$ | F | F | $OC_2H_5$ | |
| 3673 | $C_3H_7O$ | F | F | 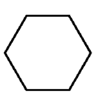 | — | 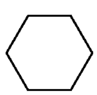 | $CH_2O$ | F | F | $OC_3H_7$ | |
| 3674 | $C_3H_7O$ | F | F | 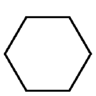 | — | 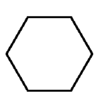 | $CH_2O$ | F | F | $OC_4H_9$ | |
| 3675 | $C_3H_7O$ | F | F | 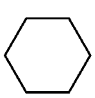 | — | 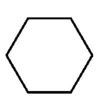 | $CH_2O$ | F | F | $OC_5H_{11}$ | |

TABLE 244

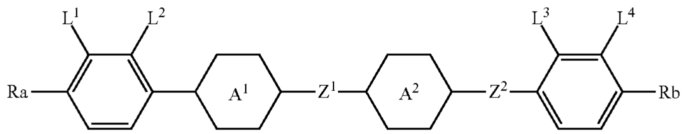

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3676 | $C_4H_9O$ | F | F | 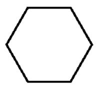 | — | 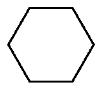 | $CH_2O$ | F | F | $OCH_3$ | C 98.4 $S_A$ 113.4 N 235.4 I $T_{NI}$: 200.6° C., Δϵ: −9.73, Δn: 0.127 |
| 3677 | $C_4H_9O$ | F | F | 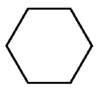 | — | 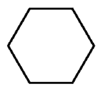 | $CH_2O$ | F | F | $OC_2H_5$ | |
| 3678 | $C_4H_9O$ | F | F | 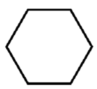 | — | 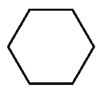 | $CH_2O$ | F | F | $OC_3H_7$ | |
| 3679 | $C_4H_9O$ | F | F | 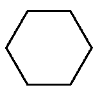 | — | 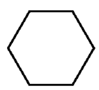 | $CH_2O$ | F | F | $OC_4H_9$ | |
| 3680 | $C_4H_9O$ | F | F | 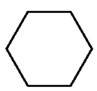 | — | 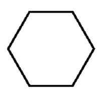 | $CH_2O$ | F | F | $OC_5H_{11}$ | |
| 3681 | $C_5H_{11}O$ | F | F | 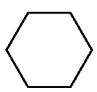 | — | 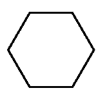 | $CH_2O$ | F | F | $OCH_3$ | |
| 3682 | $C_5H_{11}O$ | F | F | 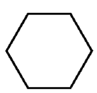 | — | 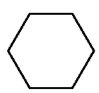 | $CH_2O$ | F | F | $OC_2H_5$ | |
| 3683 | $C_5H_{11}O$ | F | F | 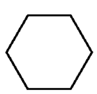 | — | 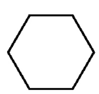 | $CH_2O$ | F | F | $OC_3H_7$ | |
| 3684 | $C_5H_{11}O$ | F | F | 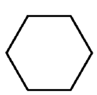 | — | 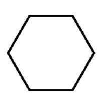 | $CH_2O$ | F | F | $OC_4H_9$ | |
| 3685 | $C_5H_{11}O$ | F | F | 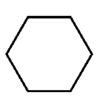 | — | 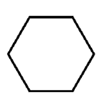 | $CH_2O$ | F | F | $OC_5H_{11}$ | |
| 3686 | $C_2H_5$ | F | F | 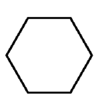 | — | 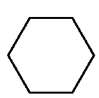 | $CH_2O$ | F | F | $C_4H_9$ | |
| 3687 | $C_5H_{11}$ | F | F | 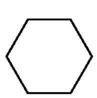 | — | 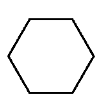 | $CH_2O$ | F | F | $C_2H_5$ | |
| 3688 | $C_2H_5$ | F | F | 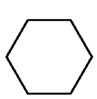 | — | 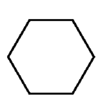 | $CH_2O$ | F | F | $OC_4H_9$ | |

TABLE 244-continued

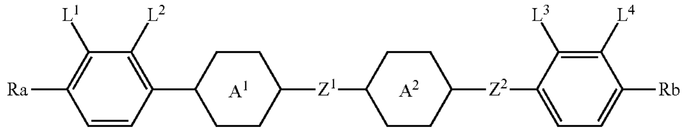

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3689 | $CH_2{=}CH$ | F | F | 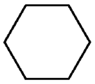 | — | 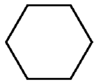 | $CH_2O$ | F | F | $OC_3H_7$ | |
| 3690 | $CH_2{=}CH$ | F | F | 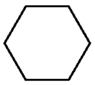 | — | 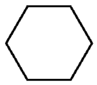 | $CH_2O$ | F | F | $OC_5H_{11}$ | |

TABLE 245

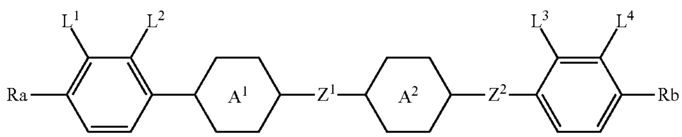

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3691 | $CH_2{=}CHO$ | F | F | 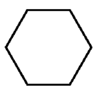 | — | 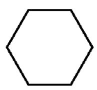 | $CH_2O$ | F | F | $OC_3H_7$ | |
| 3692 | $CH_2{=}CHCH_2O$ | F | F | 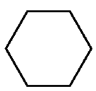 | — | 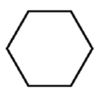 | $CH_2O$ | F | F | $OC_5H_{11}$ | |
| 3693 | $CH_2{=}CHCH_2O$ | F | F | 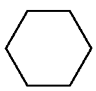 | — | 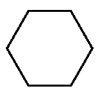 | $CH_2O$ | F | F | $OC_3H_7$ | |
| 3694 | $CH_2{=}CHC_2H_5O$ | F | F | 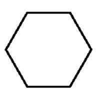 | — | 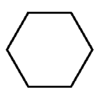 | $CH_2O$ | F | F | $OC_5H_{11}$ | |
| 3695 | $CH_2{=}CHC_2H_5O$ | F | F | 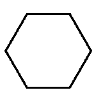 | — | 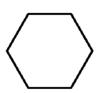 | $CH_2O$ | F | F | $OC_2H_5$ | |
| 3696 | $CH_2{=}CHC_2H_5O$ | F | F | 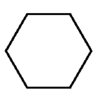 | — | 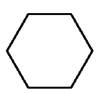 | $CH_2O$ | F | F | $OC_3H_7$ | |
| 3697 | $CH_3CH{=}CHCH_2O$ | F | F | 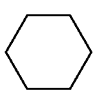 | — | 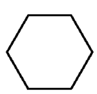 | $CH_2O$ | F | F | $OCH_3$ | |
| 3698 | $CH_3CH{=}CHCH_2O$ | F | F | 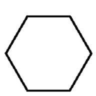 | — | 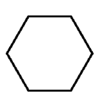 | $CH_2O$ | F | F | $OC_2H_5$ | |
| 3699 | $C_3H_7O$ | F | F | 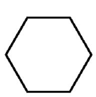 | — | 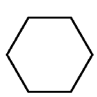 | $CH_2O$ | F | F | $OCH{=}CH_2$ | |
| 3700 | $C_3H_7O$ | F | F | 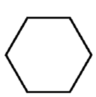 | — | 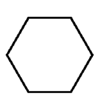 | $CH_2O$ | F | F | $OCH_2CH{=}CH_2$ | |

TABLE 245-continued

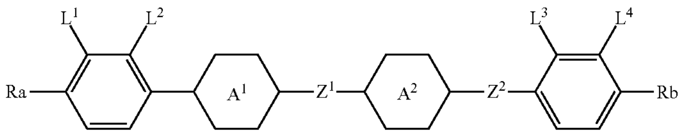

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3701 | $C_4H_9O$ | F | F | 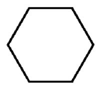 | — | 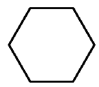 | $CH_2O$ | F | F | $OCH_2CH{=}CH_2$ | |
| 3702 | $C_5H_{11}O$ | F | F | 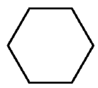 | — | 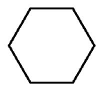 | $CH_2O$ | F | F | $OCH_2CH{=}CH_2$ | |
| 3703 | $CH_3O$ | F | F | 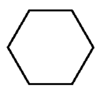 | — | 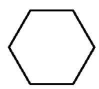 | $CH_2O$ | F | F | $OC_2H_5CH{=}CH_2$ | |
| 3704 | $C_2H_5O$ | F | F | 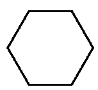 | — | 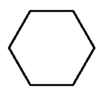 | $CH_2O$ | F | F | $OC_2H_5CH{=}CH_2$ | |
| 3705 | $C_3H_7O$ | F | F | 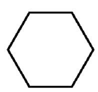 | — | 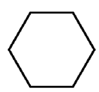 | $CH_2O$ | F | F | $OC_2H_5CH{=}CH_2$ | |

TABLE 246

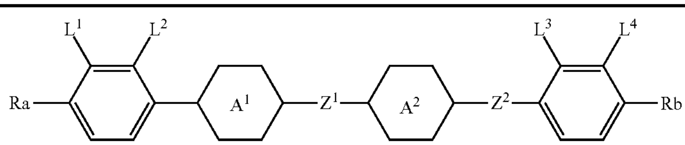

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3706 | $CH_3O$ | F | F | 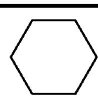 | — | 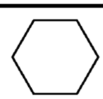 | $CH_2O$ | F | F | $OCH_2CH{=}CHCH_3$ | |
| 3707 | $C_2H_5O$ | F | F | 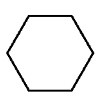 | — | 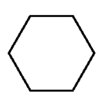 | $CH_2O$ | F | F | $OCH_2CH{=}CHCH_3$ | |
| 3708 | $C_3H_7O$ | F | F | 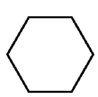 | — | 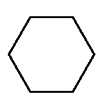 | $CH_2O$ | F | F | $OCH_2CH{=}CHCH_3$ | |
| 3709 | $CH_2{=}CHCH_2O$ | F | F | 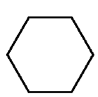 | — | 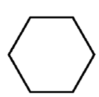 | $CH_2O$ | F | F | $OCH{=}CH_2$ | |
| 3710 | $CH_2{=}CHC_2H_5O$ | F | F | 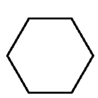 | — | 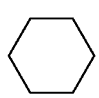 | $CH_2O$ | F | F | $OCH_2CH{=}CH_2$ | |
| 3711 | $C_3H_7OCH_2$ | F | F | 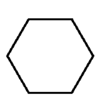 | — | 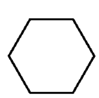 | $CH_2O$ | F | F | $OC_3H_7$ | |

TABLE 246-continued

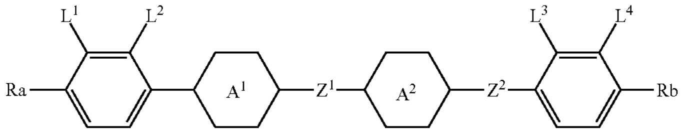

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3712 | $C_5H_{11}O$ | F | F | 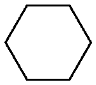 | — | 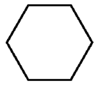 | $CH_2O$ | F | F | $OC_2H_5CH{=}CH_2$ | |
| 3713 | $C_3H_7O$ | F | F | 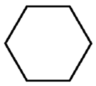 | — | 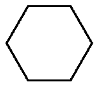 | $CH_2O$ | F | F | H | |
| 3714 | $C_5H_{11}O$ | F | F | 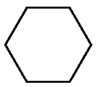 | — | 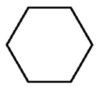 | $CH_2O$ | F | F | $OC_9H_{19}$ | |
| 3715 | $C_3H_7O$ | F | F | 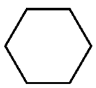 | — | 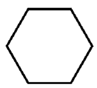 | $CH_2O$ | F | F | $C_2H_5$ | |
| 3716 | $C_5H_{11}O$ | F | F | 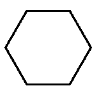 | — | 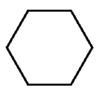 | $CH_2O$ | F | F | $C_3H_7$ | |
| 3717 | H | F | F | 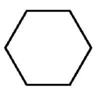 | — | 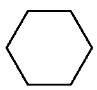 | $CH_2O$ | F | F | $OC_4H_9$ | |
| 3718 | $C_7H_{15}O$ | F | F | 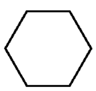 | — | 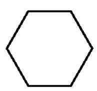 | $CH_2O$ | F | F | $OC_4H_9$ | |
| 3719 | $C_2H_5O$ | F | F | 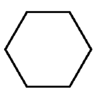 | — | 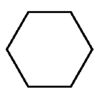 | $CH_2O$ | F | F | $OC_6H_{13}$ | |
| 3720 | $CH_3O$ | F | F | 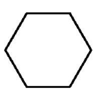 | — | 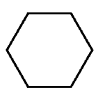 | $CH_2O$ | F | F | $C_2H_5$ | |

TABLE 247

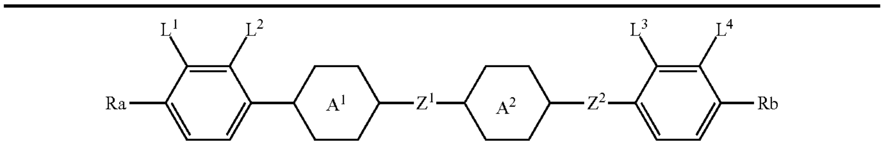

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3721 | $CH_3O$ | H | F | 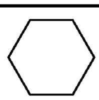 | — | 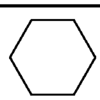 | $CH_2O$ | F | F | $OCH_3$ | |
| 3722 | $CH_3O$ | H | F | 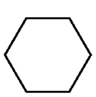 | — | 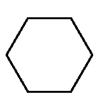 | $CH_2O$ | F | F | $OC_2H_5$ | |
| 3723 | $CH_3O$ | H | F | 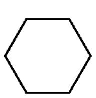 | — | 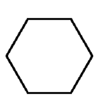 | $CH_2O$ | F | F | $OC_3H_7$ | |

TABLE 247-continued

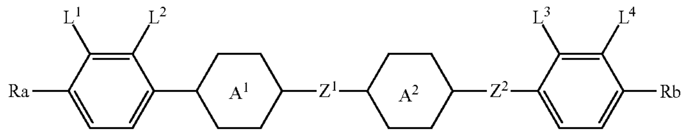

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3724 | $CH_3O$ | H | F | 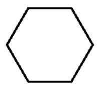 | — | 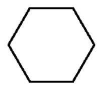 | $CH_2O$ | F | F | $OC_4H_9$ | |
| 3725 | $CH_3O$ | H | F | 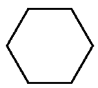 | — | 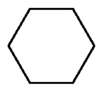 | $CH_2O$ | F | F | $OC_5H_{11}$ | |
| 3726 | $C_2H_5O$ | H | F | 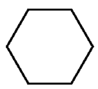 | — | 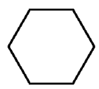 | $CH_2O$ | F | F | $OCH_3$ | |
| 3727 | $C_2H_5O$ | H | F | 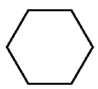 | — | 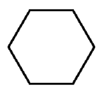 | $CH_2O$ | F | F | $OC_2H_5$ | |
| 3728 | $C_2H_5O$ | H | F | 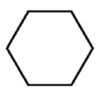 | — | 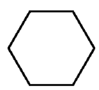 | $CH_2O$ | F | F | $OC_3H_7$ | |
| 3729 | $C_2H_5O$ | H | F | 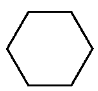 | — | 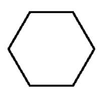 | $CH_2O$ | F | F | $OC_4H_9$ | |
| 3730 | $C_2H_5O$ | H | F | 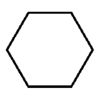 | — | 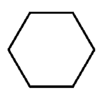 | $CH_2O$ | F | F | $OC_5H_{11}$ | |
| 3731 | $C_3H_7O$ | H | F | 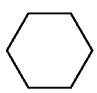 | — | 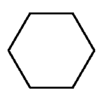 | $CH_2O$ | F | F | $OCH_3$ | |
| 3732 | $C_3H_7O$ | H | F | 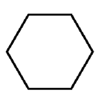 | — | 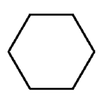 | $CH_2O$ | F | F | $OC_2H_5$ | |
| 3733 | $C_3H_7O$ | H | F | 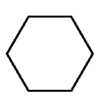 | — | 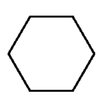 | $CH_2O$ | F | F | $OC_3H_7$ | |
| 3734 | $C_3H_7O$ | H | F | 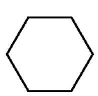 | — | 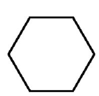 | $CH_2O$ | F | F | $OC_4H_9$ | |
| 3735 | $C_3H_7O$ | H | F | 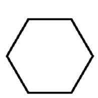 | — | 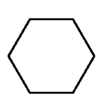 | $CH_2O$ | F | F | $OC_5H_{11}$ | |

TABLE 248

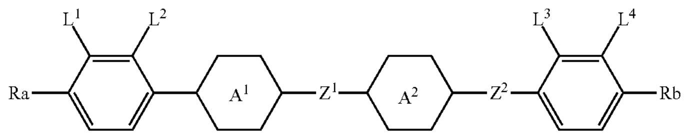

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3736 | $C_4H_9O$ | H | F | 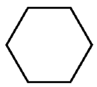 | — | 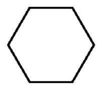 | $CH_2O$ | F | F | $OCH_3$ | |
| 3737 | $C_4H_9O$ | H | F | 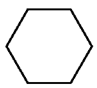 | — | 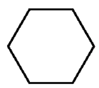 | $CH_2O$ | F | F | $OC_2H_5$ | |
| 3738 | $C_4H_9O$ | H | F | 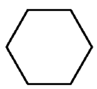 | — | 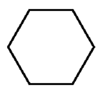 | $CH_2O$ | F | F | $OC_3H_7$ | |
| 3739 | $C_4H_9O$ | H | F | 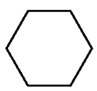 | — | 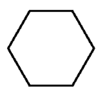 | $CH_2O$ | F | F | $OC_4H_9$ | |
| 3740 | $C_4H_9O$ | H | F | 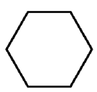 | — | 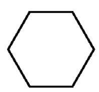 | $CH_2O$ | F | F | $OC_5H_{11}$ | |
| 3741 | $C_5H_{11}O$ | H | F | 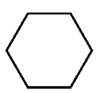 | — | 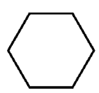 | $CH_2O$ | F | F | $OCH_3$ | |
| 3742 | $C_5H_{11}O$ | H | F | 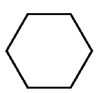 | — | 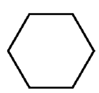 | $CH_2O$ | F | F | $OC_2H_5$ | |
| 3743 | $C_5H_{11}O$ | H | F | 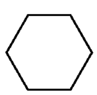 | — | 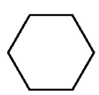 | $CH_2O$ | F | F | $OC_3H_7$ | |
| 3744 | $C_5H_{11}O$ | H | F | 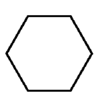 | — | 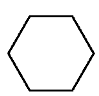 | $CH_2O$ | F | F | $OC_4H_9$ | |
| 3745 | $C_5H_{11}O$ | H | F | 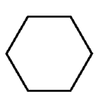 | — | 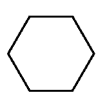 | $CH_2O$ | F | F | $OC_5H_{11}$ | |
| 3746 | $C_2H_5$ | H | F | 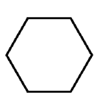 | — | 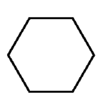 | $CH_2O$ | F | F | $C_4H_9$ | |
| 3747 | $C_5H_{11}$ | H | F | 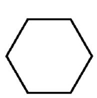 | — | 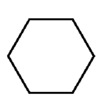 | $CH_2O$ | F | F | $C_2H_5$ | |
| 3748 | $C_2H_5$ | H | F | 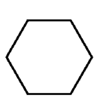 | — | 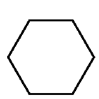 | $CH_2O$ | F | F | $OC_4H_9$ | |

TABLE 248-continued

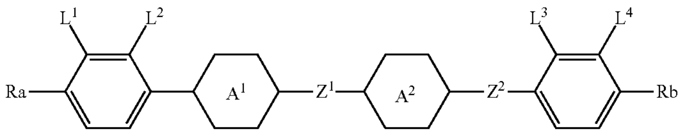

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3749 | $CH_2{=}CH$ | H | F | 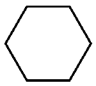 | — | 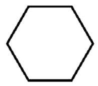 | $CH_2O$ | F | F | $OC_3H_7$ | |
| 3750 | $CH_2{=}CH$ | H | F | 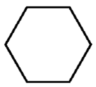 | — | 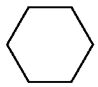 | $CH_2O$ | F | F | $OC_5H_{11}$ | |

TABLE 249

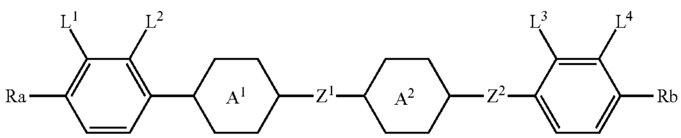

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3751 | $CH_3O$ | F | H | 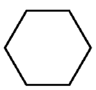 | — | 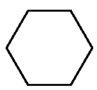 | $CH_2O$ | F | F | $OCH_3$ | |
| 3752 | $CH_3O$ | F | H | 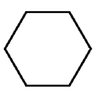 | — | 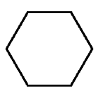 | $CH_2O$ | F | F | $OC_2H_5$ | |
| 3753 | $CH_3O$ | F | H | 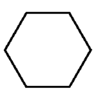 | — | 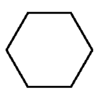 | $CH_2O$ | F | F | $OC_3H_7$ | |
| 3754 | $CH_3O$ | F | H | 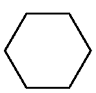 | — | 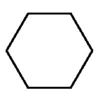 | $CH_2O$ | F | F | $OC_4H_9$ | |
| 3755 | $CH_3O$ | F | H | 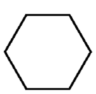 | — | 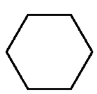 | $CH_2O$ | F | F | $OC_5H_{11}$ | |
| 3756 | $C_2H_5O$ | F | H | 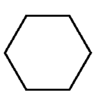 | — | 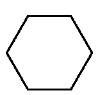 | $CH_2O$ | F | F | $OCH_3$ | |
| 3757 | $C_2H_5O$ | F | H | 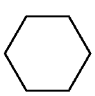 | — | 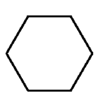 | $CH_2O$ | F | F | $OC_2H_5$ | |
| 3758 | $C_2H_5O$ | F | H | 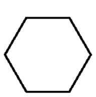 | — | 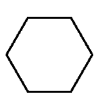 | $CH_2O$ | F | F | $OC_3H_7$ | |
| 3759 | $C_2H_5O$ | F | H | 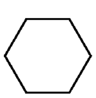 | — | 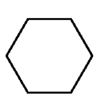 | $CH_2O$ | F | F | $OC_4H_9$ | |

TABLE 249-continued

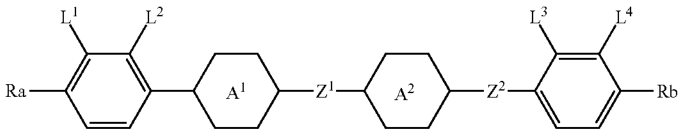

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3760 | $C_2H_5O$ | F | H | 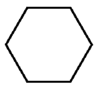 | — | 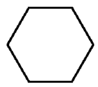 | $CH_2O$ | F | F | $OC_5H_{11}$ | |
| 3761 | $C_3H_7O$ | F | H | 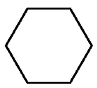 | — | 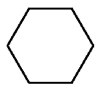 | $CH_2O$ | F | F | $OCH_3$ | |
| 3762 | $C_3H_7O$ | F | H | 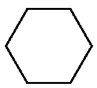 | — | 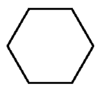 | $CH_2O$ | F | F | $OC_2H_5$ | |
| 3763 | $C_3H_7O$ | F | H | 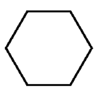 | — | 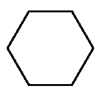 | $CH_2O$ | F | F | $OC_3H_7$ | |
| 3764 | $C_3H_7O$ | F | H | 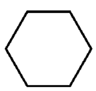 | — | 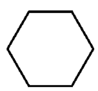 | $CH_2O$ | F | F | $OC_4H_9$ | |
| 3765 | $C_3H_7O$ | F | H | 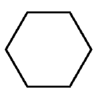 | — | 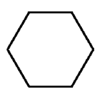 | $CH_2O$ | F | F | $OC_5H_{11}$ | |

TABLE 250

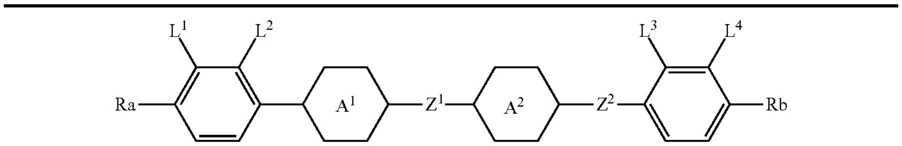

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3766 | $C_4H_9O$ | F | H | 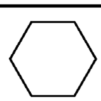 | — | 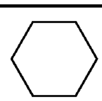 | $CH_2O$ | F | F | $OCH_3$ | |
| 3767 | $C_4H_9O$ | F | H | 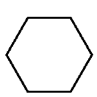 | — | 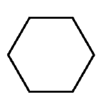 | $CH_2O$ | F | F | $OC_2H_5$ | |
| 3768 | $C_4H_9O$ | F | H | 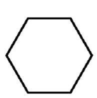 | — | 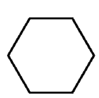 | $CH_2O$ | F | F | $OC_3H_7$ | |
| 3769 | $C_4H_9O$ | F | H | 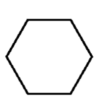 | — | 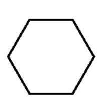 | $CH_2O$ | F | F | $OC_4H_9$ | |
| 3770 | $C_4H_9O$ | F | H | 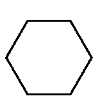 | — | 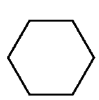 | $CH_2O$ | F | F | $OC_5H_{11}$ | |

TABLE 250-continued

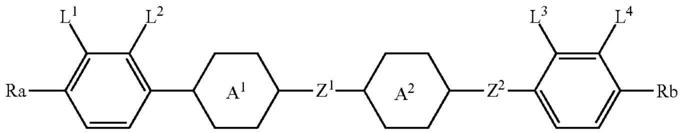

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3771 | $C_5H_{11}O$ | F | H | 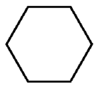 | — | 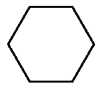 | $CH_2O$ | F | F | $OCH_3$ | |
| 3772 | $C_5H_{11}O$ | F | H | 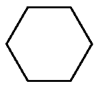 | — | 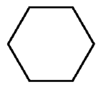 | $CH_2O$ | F | F | $OC_2H_5$ | |
| 3773 | $C_5H_{11}O$ | F | H | 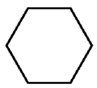 | — | 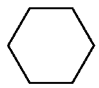 | $CH_2O$ | F | F | $OC_3H_7$ | |
| 3774 | $C_5H_{11}O$ | F | H | 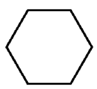 | — | 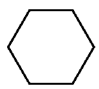 | $CH_2O$ | F | F | $OC_4H_9$ | |
| 3775 | $C_5H_{11}O$ | F | H | 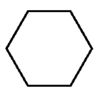 | — | 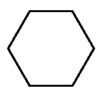 | $CH_2O$ | F | F | $OC_5H_{11}$ | |
| 3776 | $C_2H_5$ | F | H | 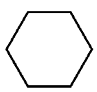 | — | 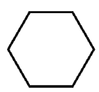 | $CH_2O$ | F | F | $C_4H_9$ | |
| 3777 | $C_5H_{11}$ | F | H | 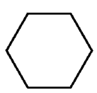 | — | 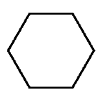 | $CH_2O$ | F | F | $C_2H_5$ | |
| 3778 | $C_2H_5$ | F | H | 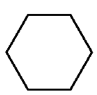 | — | 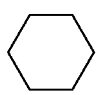 | $CH_2O$ | F | F | $OC_4H_9$ | |
| 3779 | $CH_2{=}CH$ | F | H | 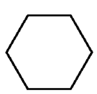 | — | 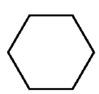 | $CH_2O$ | F | F | $OC_3H_7$ | |
| 3780 | $CH_2{=}CH$ | F | H | 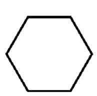 | — | 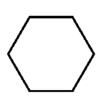 | $CH_2O$ | F | F | $OC_5H_{11}$ | |

TABLE 251

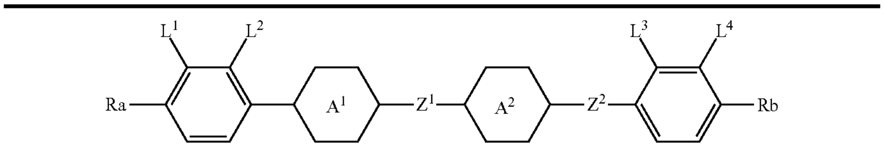

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3781 | $CH_3O$ | F | F | 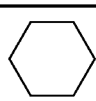 | — | 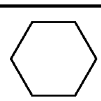 | $CH_2O$ | H | F | $OCH_3$ | |

TABLE 251-continued

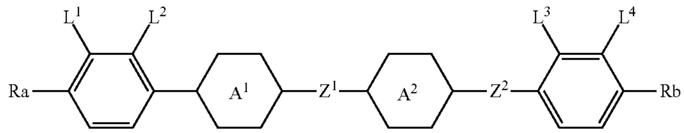

| No. | Ra | L¹ | L² | A¹ | Z¹ | A² | Z² | L³ | L⁴ | Rb | Physical property values |
|---|---|---|---|---|---|---|---|---|---|---|---|
| 3782 | $CH_3O$ | F | F | 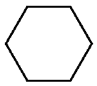 | — | 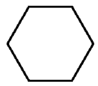 | $CH_2O$ | H | F | $OC_2H_5$ | |
| 3783 | $CH_3O$ | F | F | 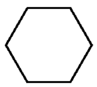 | — | 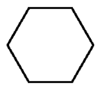 | $CH_2O$ | H | F | $OC_3H_7$ | |
| 3784 | $CH_3O$ | F | F | 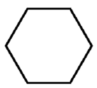 | — | 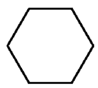 | $CH_2O$ | H | F | $OC_4H_9$ | |
| 3785 | $CH_3O$ | F | F | 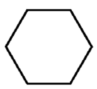 | — | 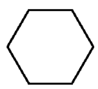 | $CH_2O$ | H | F | $OC_5H_{11}$ | |
| 3786 | $C_2H_5O$ | F | F | 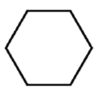 | — | 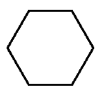 | $CH_2O$ | H | F | $OCH_3$ | |
| 3787 | $C_2H_5O$ | F | F | 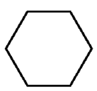 | — | 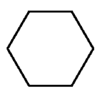 | $CH_2O$ | H | F | $OC_2H_5$ | |
| 3788 | $C_2H_5O$ | F | F | 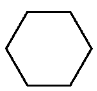 | — | 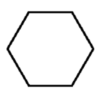 | $CH_2O$ | H | F | $OC_3H_7$ | |
| 3789 | $C_2H_5O$ | F | F | 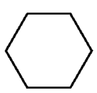 | — | 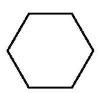 | $CH_2O$ | H | F | $OC_4H_9$ | |
| 3790 | $C_2H_5O$ | F | F | 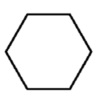 | — | 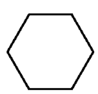 | $CH_2O$ | H | F | $OC_5H_{11}$ | |
| 3791 | $C_3H_7O$ | F | F | 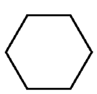 | — | 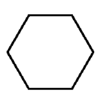 | $CH_2O$ | H | F | $OCH_3$ | |
| 3792 | $C_3H_7O$ | F | F | 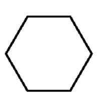 | — | 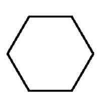 | $CH_2O$ | H | F | $OC_2H_5$ | |
| 3793 | $C_3H_7O$ | F | F | 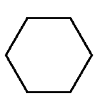 | — | 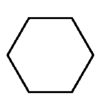 | $CH_2O$ | H | F | $OC_3H_7$ | |
| 3794 | $C_3H_7O$ | F | F | 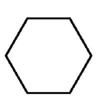 | — | 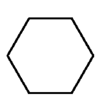 | $CH_2O$ | H | F | $OC_4H_9$ | |
| 3795 | $C_3H_7O$ | F | F | 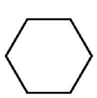 | — | 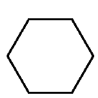 | $CH_2O$ | H | F | $OC_5H_{11}$ | |

TABLE 252
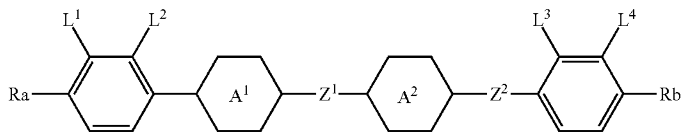
| No. | Ra | L¹ | L² | A¹ | Z¹ | A² | Z² | L³ | L⁴ | Rb | Physical property values |
|---|---|---|---|---|---|---|---|---|---|---|---|
| 3796 | $C_4H_9O$ | F | F | 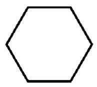 | — | 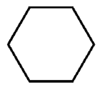 | $CH_2O$ | H | F | $OCH_3$ | |
| 3797 | $C_4H_9O$ | F | F | 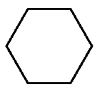 | — | 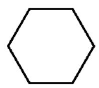 | $CH_2O$ | H | F | $OC_2H_5$ | |
| 3798 | $C_4H_9O$ | F | F | 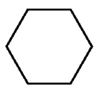 | — | 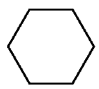 | $CH_2O$ | H | F | $OC_3H_7$ | |
| 3799 | $C_4H_9O$ | F | F | 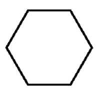 | — | 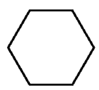 | $CH_2O$ | H | F | $OC_4H_9$ | |
| 3800 | $C_4H_9O$ | F | F | 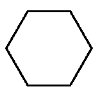 | — | 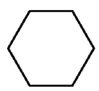 | $CH_2O$ | H | F | $OC_5H_{11}$ | |
| 3801 | $C_5H_{11}O$ | F | F | 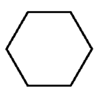 | — | 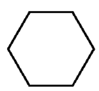 | $CH_2O$ | H | F | $OCH_3$ | |
| 3802 | $C_5H_{11}O$ | F | F | 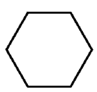 | — | 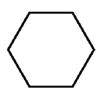 | $CH_2O$ | H | F | $OC_2H_5$ | |
| 3803 | $C_5H_{11}O$ | F | F | 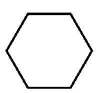 | — | 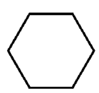 | $CH_2O$ | H | F | $OC_3H_7$ | |
| 3804 | $C_5H_{11}O$ | F | F | 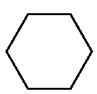 | — | 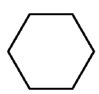 | $CH_2O$ | H | F | $OC_4H_9$ | |
| 3805 | $C_5H_{11}O$ | F | F | 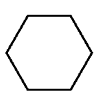 | — | 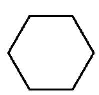 | $CH_2O$ | H | F | $OC_5H_{11}$ | |
| 3806 | $C_2H_5$ | F | F | 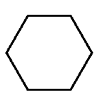 | — | 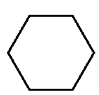 | $CH_2O$ | H | F | $C_4H_9$ | |
| 3807 | $C_5H_{11}$ | F | F | 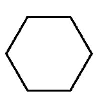 | — | 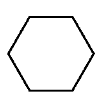 | $CH_2O$ | H | F | $C_2H_5$ | |
| 3808 | $C_2H_5$ | F | F | 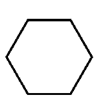 | — | 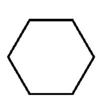 | $CH_2O$ | H | F | $OC_4H_9$ | |

TABLE 252-continued

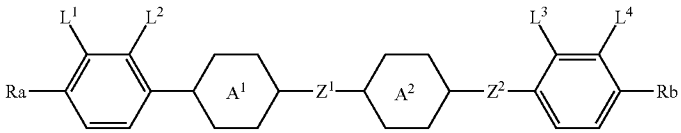

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3809 | $CH_2{=}CH$ | F | F | 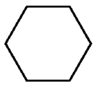 | — | 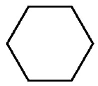 | $CH_2O$ | H | F | $OC_3H_7$ | |
| 3810 | $CH_2{=}CH$ | F | F | 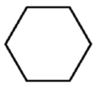 | — | 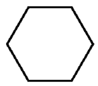 | $CH_2O$ | H | F | $OC_5H_{11}$ | |

TABLE 253

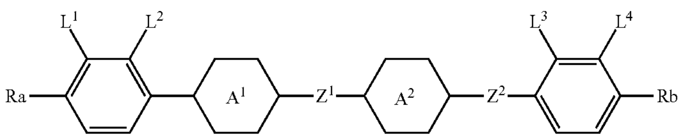

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3811 | $CH_3O$ | F | F | 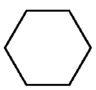 | — | 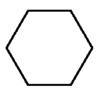 | $CH_2O$ | F | H | $OCH_3$ | |
| 3812 | $CH_3O$ | F | F | 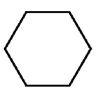 | — | 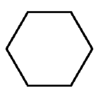 | $CH_2O$ | F | H | $OC_2H_5$ | |
| 3813 | $CH_3O$ | F | F | 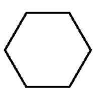 | — | 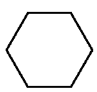 | $CH_2O$ | F | H | $OC_3H_7$ | |
| 3814 | $CH_3O$ | F | F | 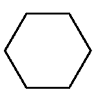 | — | 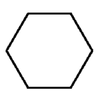 | $CH_2O$ | F | H | $OC_4H_9$ | |
| 3815 | $CH_3O$ | F | F | 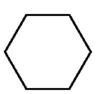 | — | 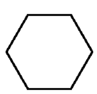 | $CH_2O$ | F | H | $OC_5H_{11}$ | |
| 3816 | $C_2H_5O$ | F | F | 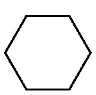 | — | 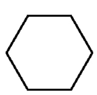 | $CH_2O$ | F | H | $OCH_3$ | |
| 3817 | $C_2H_5O$ | F | F | 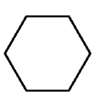 | — | 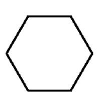 | $CH_2O$ | F | H | $OC_2H_5$ | |
| 3818 | $C_2H_5O$ | F | F | 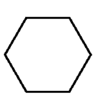 | — | 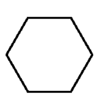 | $CH_2O$ | F | H | $OC_3H_7$ | |
| 3819 | $C_2H_5O$ | F | F | 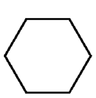 | — | 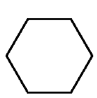 | $CH_2O$ | F | H | $OC_4H_9$ | |

TABLE 253-continued

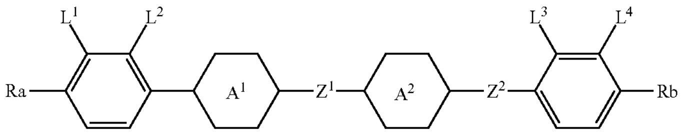

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3820 | $C_2H_5O$ | F | F | 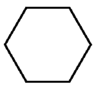 | — | 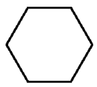 | $CH_2O$ | F | H | $OC_5H_{11}$ | |
| 3821 | $C_3H_7O$ | F | F | 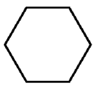 | — | 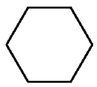 | $CH_2O$ | F | H | $OCH_3$ | |
| 3822 | $C_3H_7O$ | F | F | 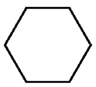 | — | 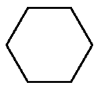 | $CH_2O$ | F | H | $OC_2H_5$ | |
| 3823 | $C_3H_7O$ | F | F | 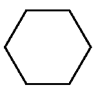 | — | 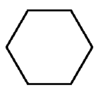 | $CH_2O$ | F | H | $OC_3H_7$ | |
| 3824 | $C_3H_7O$ | F | F | 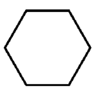 | — | 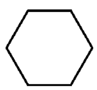 | $CH_2O$ | F | H | $OC_4H_9$ | |
| 3825 | $C_3H_7O$ | F | F | 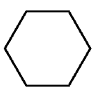 | — | 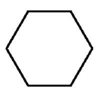 | $CH_2O$ | F | H | $OC_5H_{11}$ | |

TABLE 254

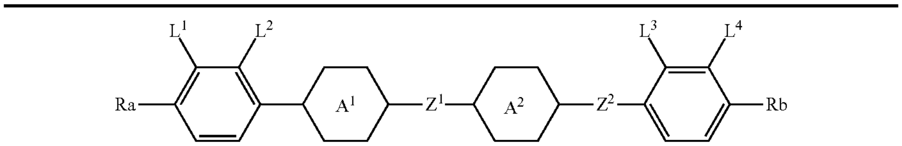

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3826 | $C_4H_9O$ | F | F | 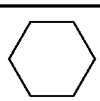 | — | 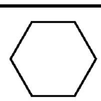 | $CH_2O$ | F | H | $OCH_3$ | |
| 3827 | $C_4H_9O$ | F | F | 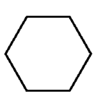 | — | 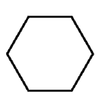 | $CH_2O$ | F | H | $OC_2H_5$ | |
| 3828 | $C_4H_9O$ | F | F | 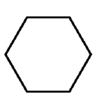 | — | 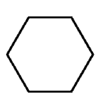 | $CH_2O$ | F | H | $OC_3H_7$ | |
| 3829 | $C_4H_9O$ | F | F | 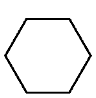 | — | 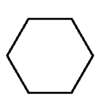 | $CH_2O$ | F | H | $OC_4H_9$ | |
| 3830 | $C_4H_9O$ | F | F | 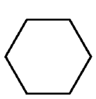 | — | 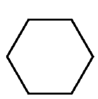 | $CH_2O$ | F | H | $OC_5H_{11}$ | |

TABLE 254-continued

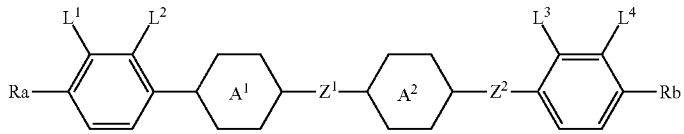

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3831 | $C_5H_{11}O$ | F | F | 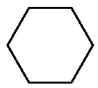 | — | 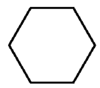 | $CH_2O$ | F | H | $OCH_3$ | |
| 3832 | $C_5H_{11}O$ | F | F | 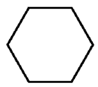 | — | 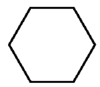 | $CH_2O$ | F | H | $OC_2H_5$ | |
| 3833 | $C_5H_{11}O$ | F | F | 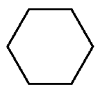 | — | 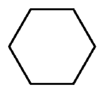 | $CH_2O$ | F | H | $OC_3H_7$ | |
| 3834 | $C_5H_{11}O$ | F | F | 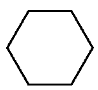 | — | 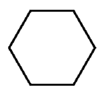 | $CH_2O$ | F | H | $OC_4H_9$ | |
| 3835 | $C_5H_{11}O$ | F | F | 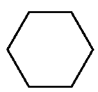 | — | 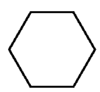 | $CH_2O$ | F | H | $OC_5H_{11}$ | |
| 3836 | $C_2H_5$ | F | F | 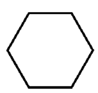 | — | 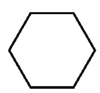 | $CH_2O$ | F | H | $C_4H_9$ | |
| 3837 | $C_5H_{11}$ | F | F | 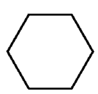 | — | 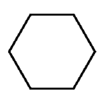 | $CH_2O$ | F | H | $C_2H_5$ | |
| 3838 | $C_2H_5$ | F | F | 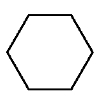 | — | 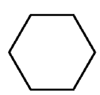 | $CH_2O$ | F | H | $OC_4H_9$ | |
| 3839 | $CH_2{=}CH$ | F | F | 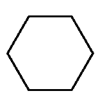 | — | 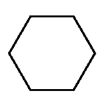 | $CH_2O$ | F | H | $OC_3H_7$ | |
| 3840 | $CH_2{=}CH$ | F | F | 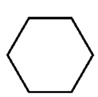 | — | 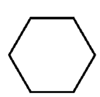 | $CH_2O$ | F | H | $OC_5H_{11}$ | |

TABLE 255

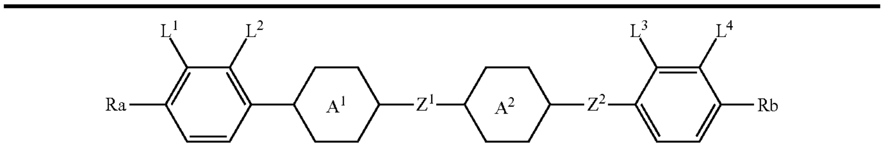

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3841 | $CH_3O$ | F | F | 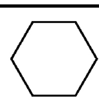 | — | 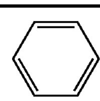 | $CH_2O$ | F | F | $OCH_3$ | |

TABLE 255-continued

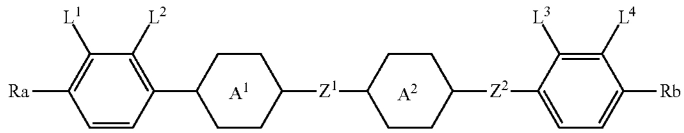

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3842 | $CH_3O$ | F | F | 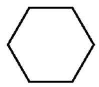 | — | 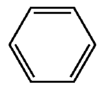 | $CH_2O$ | F | F | $OC_2H_5$ | |
| 3843 | $CH_3O$ | F | F | 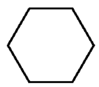 | — | 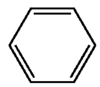 | $CH_2O$ | F | F | $OC_3H_7$ | |
| 3844 | $CH_3O$ | F | F | 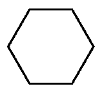 | — | 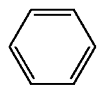 | $CH_2O$ | F | F | $OC_4H_9$ | |
| 3845 | $CH_3O$ | F | F | 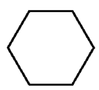 | — | 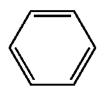 | $CH_2O$ | F | F | $OC_5H_{11}$ | |
| 3846 | $C_2H_5O$ | F | F | 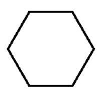 | — | 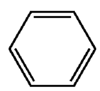 | $CH_2O$ | F | F | $OCH_3$ | |
| 3847 | $C_2H_5O$ | F | F | 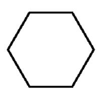 | — | 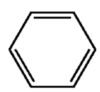 | $CH_2O$ | F | F | $OC_2H_5$ | |
| 3848 | $C_2H_5O$ | F | F | 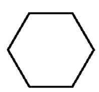 | — | 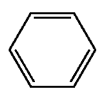 | $CH_2O$ | F | F | $OC_3H_7$ | |
| 3849 | $C_2H_5O$ | F | F | 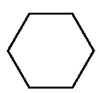 | — | 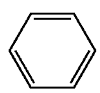 | $CH_2O$ | F | F | $OC_4H_9$ | |
| 3850 | $C_2H_5O$ | F | F | 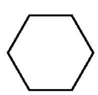 | — | 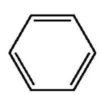 | $CH_2O$ | F | F | $OC_5H_{11}$ | |
| 3851 | $C_3H_7O$ | F | F | 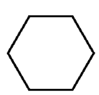 | — | 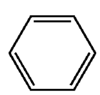 | $CH_2O$ | F | F | $OCH_3$ | |
| 3852 | $C_3H_7O$ | F | F | 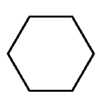 | — | 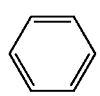 | $CH_2O$ | F | F | $OC_2H_5$ | |
| 3853 | $C_3H_7O$ | F | F | 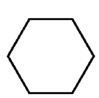 | — | 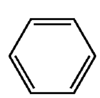 | $CH_2O$ | F | F | $OC_3H_7$ | |
| 3854 | $C_3H_7O$ | F | F | 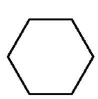 | — | 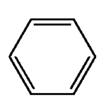 | $CH_2O$ | F | F | $OC_4H_9$ | |
| 3855 | $C_3H_7O$ | F | F | 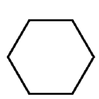 | — | 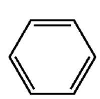 | $CH_2O$ | F | F | $OC_5H_{11}$ | |

TABLE 256

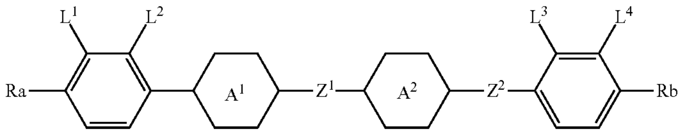

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3856 | $C_4H_9O$ | F | F | 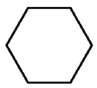 | — | 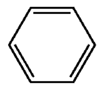 | $CH_2O$ | F | F | $OCH_3$ | |
| 3857 | $C_4H_9O$ | F | F | 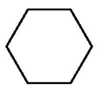 | — |  | $CH_2O$ | F | F | $OC_2H_5$ | |
| 3858 | $C_4H_9O$ | F | F | 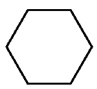 | — | 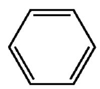 | $CH_2O$ | F | F | $OC_3H_7$ | |
| 3859 | $C_4H_9O$ | F | F | 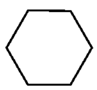 | — | 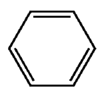 | $CH_2O$ | F | F | $OC_4H_9$ | |
| 3860 | $C_4H_9O$ | F | F | 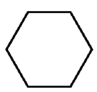 | — | 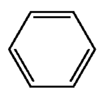 | $CH_2O$ | F | F | $OC_5H_{11}$ | |
| 3861 | $C_5H_{11}O$ | F | F | 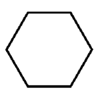 | — | 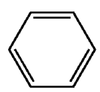 | $CH_2O$ | F | F | $OCH_3$ | |
| 3862 | $C_5H_{11}O$ | F | F | 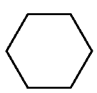 | — | 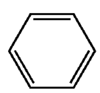 | $CH_2O$ | F | F | $OC_2H_5$ | |
| 3863 | $C_5H_{11}O$ | F | F | 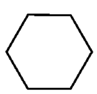 | — | 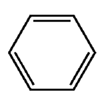 | $CH_2O$ | F | F | $OC_3H_7$ | |
| 3864 | $C_5H_{11}O$ | F | F | 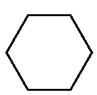 | — | 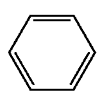 | $CH_2O$ | F | F | $OC_4H_9$ | |
| 3865 | $C_5H_{11}O$ | F | F | 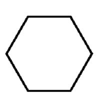 | — | 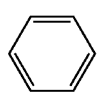 | $CH_2O$ | F | F | $OC_5H_{11}$ | |
| 3866 | $C_2H_5$ | F | F | 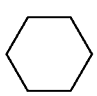 | — | 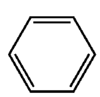 | $CH_2O$ | F | F | $C_4H_9$ | |
| 3867 | $C_5H_{11}$ | F | F | 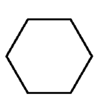 | — | 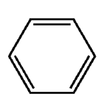 | $CH_2O$ | F | F | $C_2H_5$ | |
| 3868 | $C_2H_5$ | F | F | 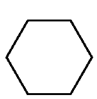 | — | 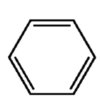 | $CH_2O$ | F | F | $OC_4H_9$ | |

TABLE 256-continued

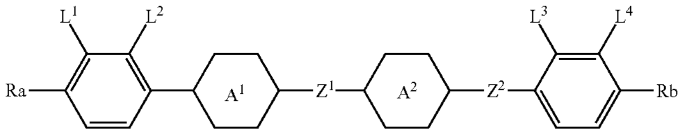

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3869 | $CH_2{=}CH$ | F | F | 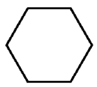 | — | 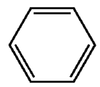 | $CH_2O$ | F | F | $OC_3H_7$ | |
| 3870 | $CH_2{=}CH$ | F | F | 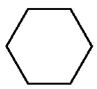 | — | 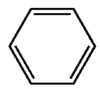 | $CH_2O$ | F | F | $OC_5H_{11}$ | |

TABLE 257

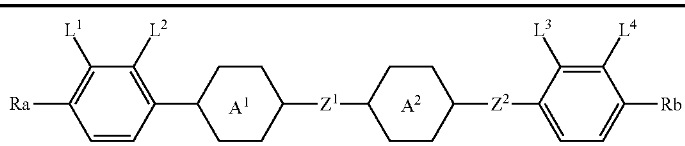

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3871 | $CH_2{=}CHO$ | F | F | 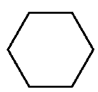 | — | 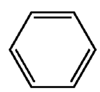 | $CH_2O$ | F | F | $OC_3H_7$ | |
| 3872 | $CH_2{=}CHCH_2O$ | F | F | 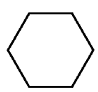 | — | 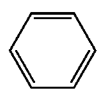 | $CH_2O$ | F | F | $OC_5H_{11}$ | |
| 3873 | $CH_2{=}CHCH_2O$ | F | F | 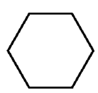 | — | 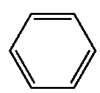 | $CH_2O$ | F | F | $OC_3H_7$ | |
| 3874 | $CH_2{=}CHC_2H_5O$ | F | F | 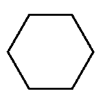 | — | 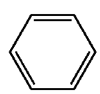 | $CH_2O$ | F | F | $OC_5H_{11}$ | |
| 3875 | $CH_2{=}CHC_2H_5O$ | F | F | 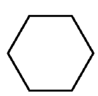 | — | 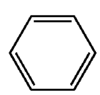 | $CH_2O$ | F | F | $OC_2H_5$ | |
| 3876 | $CH_2{=}CHC_2H_5O$ | F | F | 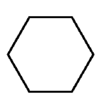 | — | 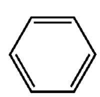 | $CH_2O$ | F | F | $OC_3H_7$ | |
| 3877 | $CH_3CH{=}CHCH_2O$ | F | F | 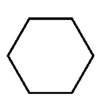 | — | 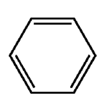 | $CH_2O$ | F | F | $OCH_3$ | |
| 3878 | $CH_3CH{=}CHCH_2O$ | F | F | 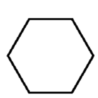 | — | 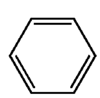 | $CH_2O$ | F | F | $OC_2H_5$ | |
| 3879 | $C_3H_7O$ | F | F | 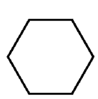 | — | 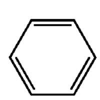 | $CH_2O$ | F | F | $OCH{=}CH_2$ | |
| 3880 | $C_3H_7O$ | F | F | 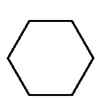 | — | 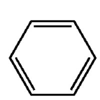 | $CH_2O$ | F | F | $OCH_2CH{=}CH_2$ | |

TABLE 257-continued

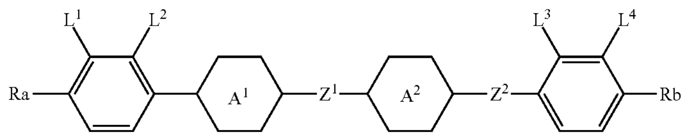

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3881 | $C_4H_9O$ | F | F | 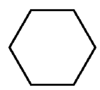 | — | 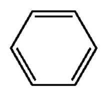 | $CH_2O$ | F | F | $OCH_2CH{=}CH_2$ | |
| 3882 | $C_5H_{11}O$ | F | F | 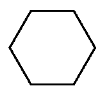 | — | 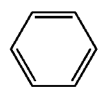 | $CH_2O$ | F | F | $OCH_2CH{=}CH_2$ | |
| 3883 | $CH_3O$ | F | F | 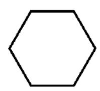 | — | 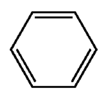 | $CH_2O$ | F | F | $OC_2H_5CH{=}CH_2$ | |
| 3884 | $C_2H_5O$ | F | F | 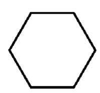 | — | 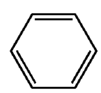 | $CH_2O$ | F | F | $OC_2H_5CH{=}CH_2$ | |
| 3885 | $C_3H_7O$ | F | F | 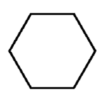 | — | 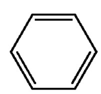 | $CH_2O$ | F | F | $OC_2H_5CH{=}CH_2$ | |

TABLE 258

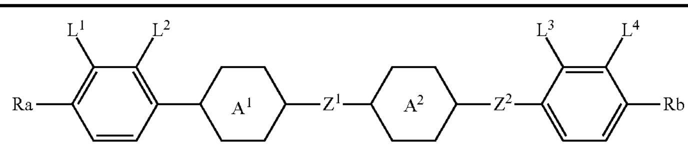

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3886 | $CH_3O$ | F | F | 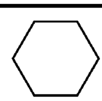 | — | 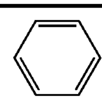 | $CH_2O$ | F | F | $OCH_2CH{=}CHCH_3$ | |
| 3887 | $C_2H_5O$ | F | F | 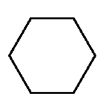 | — | 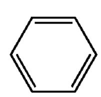 | $CH_2O$ | F | F | $OCH_2CH{=}CHCH_3$ | |
| 3888 | $C_3H_7O$ | F | F | 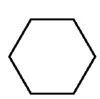 | — | 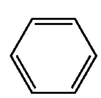 | $CH_2O$ | F | F | $OCH_2CH{=}CHCH_3$ | |
| 3889 | $CH_2{=}CHCH_2O$ | F | F | 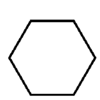 | — | 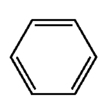 | $CH_2O$ | F | F | $OCH{=}CH_2$ | |
| 3890 | $CH_2{=}CHC_2H_5O$ | F | F | 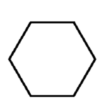 | — | 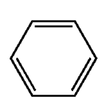 | $CH_2O$ | F | F | $OCH_2CH{=}CH_2$ | |
| 3891 | $C_3H_7OCH_2$ | F | F | 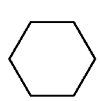 | — | 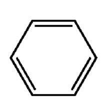 | $CH_2O$ | F | F | $OC_3H_7$ | |

TABLE 258-continued

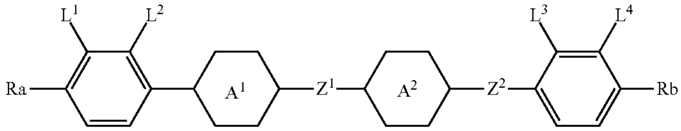

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3892 | $C_5H_{11}O$ | F | F | 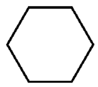 | — | 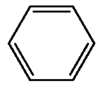 | $CH_2O$ | F | F | $OC_2H_5CH{=}CH_2$ | |
| 3893 | $C_3H_7O$ | F | F | 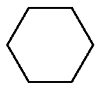 | — |  | $CH_2O$ | F | F | H | |
| 3894 | $C_5H_{11}O$ | F | F | 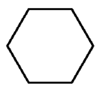 | — | 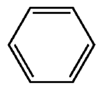 | $CH_2O$ | F | F | $OC_9H_{19}$ | |
| 3895 | $C_3H_7O$ | F | F | 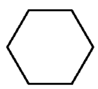 | — | 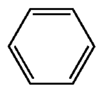 | $CH_2O$ | F | F | $C_2H_5$ | |
| 3896 | $C_5H_{11}O$ | F | F | 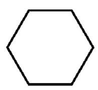 | — | 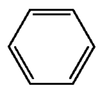 | $CH_2O$ | F | F | $C_3H_7$ | |
| 3897 | H | F | F | 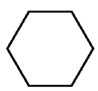 | — | 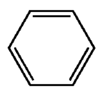 | $CH_2O$ | F | F | $OC_4H_9$ | |
| 3898 | $C_7H_{15}O$ | F | F | 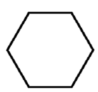 | — | 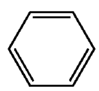 | $CH_2O$ | F | F | $OC_4H_9$ | |
| 3899 | $C_2H_5O$ | F | F | 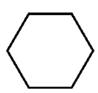 | — | 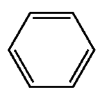 | $CH_2O$ | F | F | $OC_6H_{13}$ | |
| 3900 | $CH_3O$ | F | F | 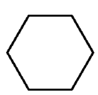 | — | 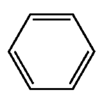 | $CH_2O$ | F | F | $C_2H_5$ | |

TABLE 259

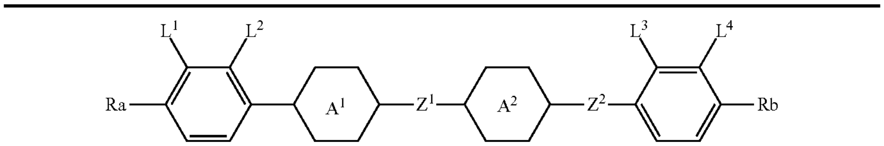

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3901 | $CH_3O$ | H | F | 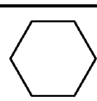 | — | 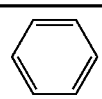 | $CH_2O$ | F | F | $OCH_3$ | |
| 3902 | $CH_3O$ | H | F | 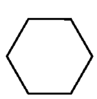 | — | 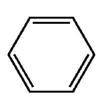 | $CH_2O$ | F | F | $OC_2H_5$ | |
| 3903 | $CH_3O$ | H | F | 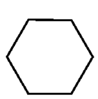 | — | 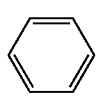 | $CH_2O$ | F | F | $OC_3H_7$ | |

TABLE 259-continued

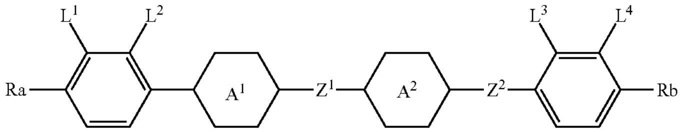

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3904 | $CH_3O$ | H | F | 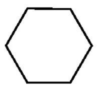 | — |  | $CH_2O$ | F | F | $OC_4H_9$ | |
| 3905 | $CH_3O$ | H | F | 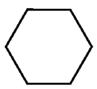 | — | 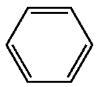 | $CH_2O$ | F | F | $OC_5H_{11}$ | |
| 3906 | $C_2H_5O$ | H | F | 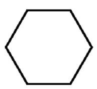 | — | 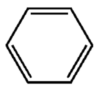 | $CH_2O$ | F | F | $OCH_3$ | |
| 3907 | $C_2H_5O$ | H | F | 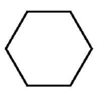 | — |  | $CH_2O$ | F | F | $OC_2H_5$ | |
| 3908 | $C_2H_5O$ | H | F | 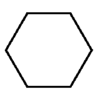 | — |  | $CH_2O$ | F | F | $OC_3H_7$ | |
| 3909 | $C_2H_5O$ | H | F | 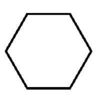 | — |  | $CH_2O$ | F | F | $OC_4H_9$ | |
| 3910 | $C_2H_5O$ | H | F | 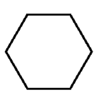 | — |  | $CH_2O$ | F | F | $OC_5H_{11}$ | |
| 3911 | $C_3H_7O$ | H | F | 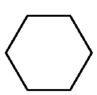 | — | 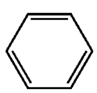 | $CH_2O$ | F | F | $OCH_3$ | |
| 3912 | $C_3H_7O$ | H | F | 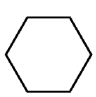 | — | 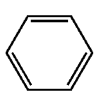 | $CH_2O$ | F | F | $OC_2H_5$ | |
| 3913 | $C_3H_7O$ | H | F | 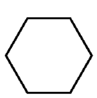 | — | 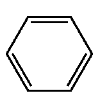 | $CH_2O$ | F | F | $OC_3H_7$ | |
| 3914 | $C_3H_7O$ | H | F | 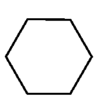 | — | 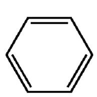 | $CH_2O$ | F | F | $OC_4H_9$ | |
| 3915 | $C_3H_7O$ | H | F | 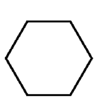 | — | 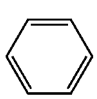 | $CH_2O$ | F | F | $OC_5H_{11}$ | |

TABLE 260
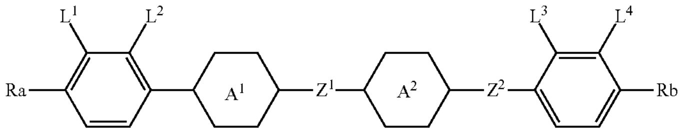
| No. | Ra | L¹ | L² | A¹ | Z¹ | A² | Z² | L³ | L⁴ | Rb | Physical property values |
|---|---|---|---|---|---|---|---|---|---|---|---|
| 3916 | $C_4H_9O$ | H | F | 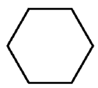 | — | 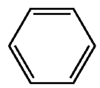 | $CH_2O$ | F | F | $OCH_3$ | |
| 3917 | $C_4H_9O$ | H | F | 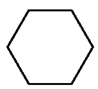 | — | 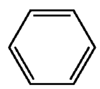 | $CH_2O$ | F | F | $OC_2H_5$ | |
| 3918 | $C_4H_9O$ | H | F | 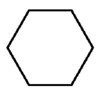 | — | 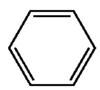 | $CH_2O$ | F | F | $OC_3H_7$ | |
| 3919 | $C_4H_9O$ | H | F | 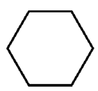 | — |  | $CH_2O$ | F | F | $OC_4H_9$ | |
| 3920 | $C_4H_9O$ | H | F | 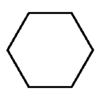 | — | 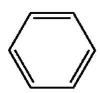 | $CH_2O$ | F | F | $OC_5H_{11}$ | |
| 3921 | $C_5H_{11}O$ | H | F | 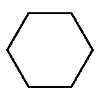 | — | 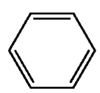 | $CH_2O$ | F | F | $OCH_3$ | |
| 3922 | $C_5H_{11}O$ | H | F | 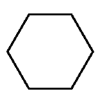 | — | 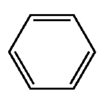 | $CH_2O$ | F | F | $OC_2H_5$ | |
| 3923 | $C_5H_{11}O$ | H | F | 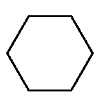 | — | 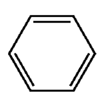 | $CH_2O$ | F | F | $OC_3H_7$ | |
| 3924 | $C_5H_{11}O$ | H | F | 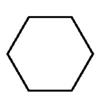 | — | 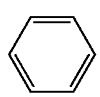 | $CH_2O$ | F | F | $OC_4H_9$ | |
| 3925 | $C_5H_{11}O$ | H | F | 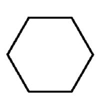 | — | 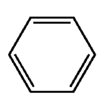 | $CH_2O$ | F | F | $OC_5H_{11}$ | |
| 3926 | $C_2H_5$ | H | F | 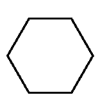 | — | 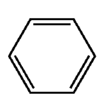 | $CH_2O$ | F | F | $C_4H_9$ | |
| 3927 | $C_5H_{11}$ | H | F | 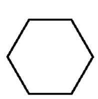 | — | 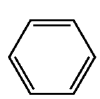 | $CH_2O$ | F | F | $C_2H_5$ | |
| 3928 | $C_2H_5$ | H | F | 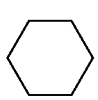 | — | 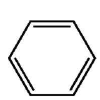 | $CH_2O$ | F | F | $OC_4H_9$ | |

TABLE 260-continued

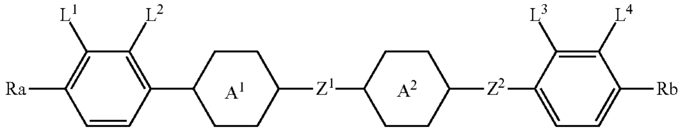

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3929 | $CH_2$=CH | H | F | 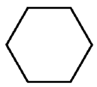 | — | 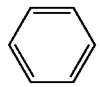 | $CH_2O$ | F | F | $OC_3H_7$ | |
| 3930 | $CH_2$=CH | H | F | 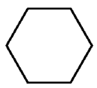 | — | 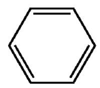 | $CH_2O$ | F | F | $OC_5H_{11}$ | |

TABLE 261

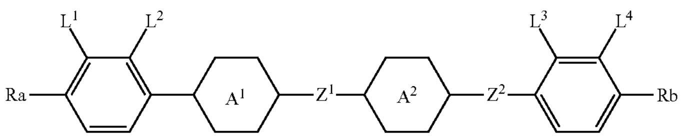

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3931 | $CH_3O$ | F | H | 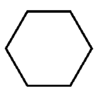 | — |  | $CH_2O$ | F | F | $OCH_3$ | |
| 3932 | $CH_3O$ | F | H | 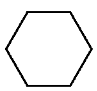 | — |  | $CH_2O$ | F | F | $OC_2H_5$ | |
| 3933 | $CH_3O$ | F | H | 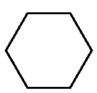 | — | 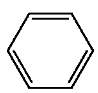 | $CH_2O$ | F | F | $OC_3H_7$ | |
| 3934 | $CH_3O$ | F | H | 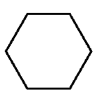 | — | 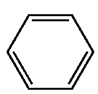 | $CH_2O$ | F | F | $OC_4H_9$ | |
| 3935 | $CH_3O$ | F | H | 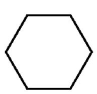 | — | 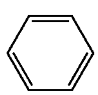 | $CH_2O$ | F | F | $OC_5H_{11}$ | |
| 3936 | $C_2H_5O$ | F | H | 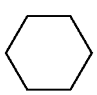 | — | 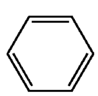 | $CH_2O$ | F | F | $OCH_3$ | |
| 3937 | $C_2H_5O$ | F | H | 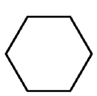 | — | 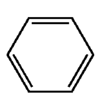 | $CH_2O$ | F | F | $OC_2H_5$ | |
| 3938 | $C_2H_5O$ | F | H | 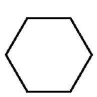 | — | 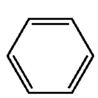 | $CH_2O$ | F | F | $OC_3H_7$ | |
| 3939 | $C_2H_5O$ | F | H | 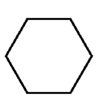 | — | 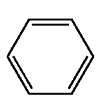 | $CH_2O$ | F | F | $OC_4H_9$ | |

TABLE 261-continued

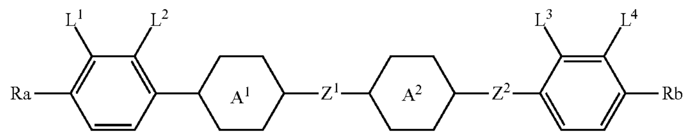

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3940 | $C_2H_5O$ | F | H | 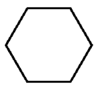 | — | 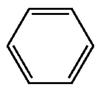 | $CH_2O$ | F | F | $OC_5H_{11}$ | |
| 3941 | $C_3H_7O$ | F | H | 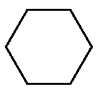 | — |  | $CH_2O$ | F | F | $OCH_3$ | |
| 3942 | $C_3H_7O$ | F | H | 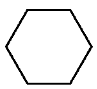 | — | 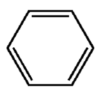 | $CH_2O$ | F | F | $OC_2H_5$ | |
| 3943 | $C_3H_7O$ | F | H | 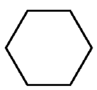 | — | 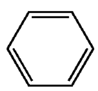 | $CH_2O$ | F | F | $OC_3H_7$ | |
| 3944 | $C_3H_7O$ | F | H | 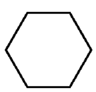 | — | 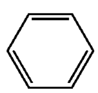 | $CH_2O$ | F | F | $OC_4H_9$ | |
| 3945 | $C_3H_7O$ | F | H | 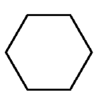 | — | 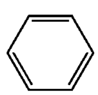 | $CH_2O$ | F | F | $OC_5H_{11}$ | |

TABLE 262

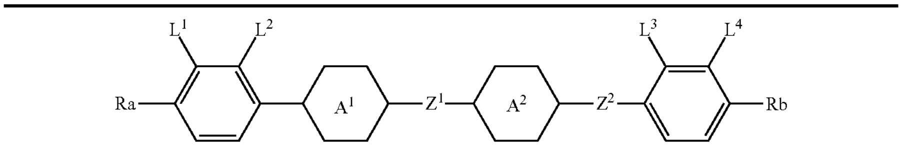

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3946 | $C_4H_9O$ | F | H | 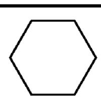 | — | 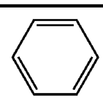 | $CH_2O$ | F | F | $OCH_3$ | |
| 3947 | $C_4H_9O$ | F | H | 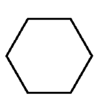 | — | 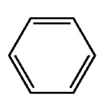 | $CH_2O$ | F | F | $OC_2H_5$ | |
| 3948 | $C_4H_9O$ | F | H | 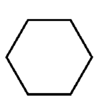 | — | 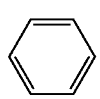 | $CH_2O$ | F | F | $OC_3H_7$ | |
| 3949 | $C_4H_9O$ | F | H | 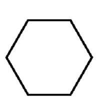 | — | 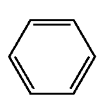 | $CH_2O$ | F | F | $OC_4H_9$ | |
| 3950 | $C_4H_9O$ | F | H | 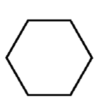 | — | 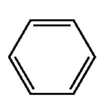 | $CH_2O$ | F | F | $OC_5H_{11}$ | |

TABLE 262-continued

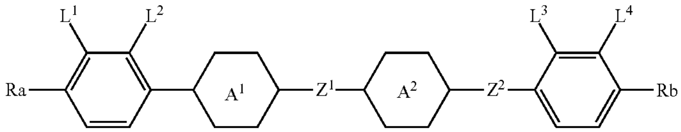

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3951 | $C_5H_{11}O$ | F | H | 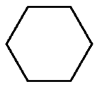 | — | 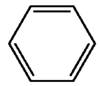 | $CH_2O$ | F | F | $OCH_3$ | |
| 3952 | $C_5H_{11}O$ | F | H | 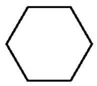 | — | 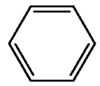 | $CH_2O$ | F | F | $OC_2H_5$ | |
| 3953 | $C_5H_{11}O$ | F | H | 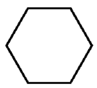 | — | 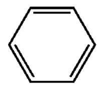 | $CH_2O$ | F | F | $OC_3H_7$ | |
| 3954 | $C_5H_{11}O$ | F | H | 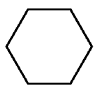 | — | 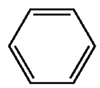 | $CH_2O$ | F | F | $OC_4H_9$ | |
| 3955 | $C_5H_{11}O$ | F | H | 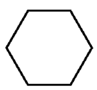 | — | 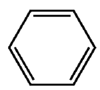 | $CH_2O$ | F | F | $OC_5H_{11}$ | |
| 3956 | $C_2H_5$ | F | H | 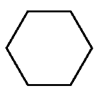 | — | 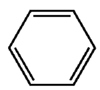 | $CH_2O$ | F | F | $C_4H_9$ | |
| 3957 | $C_5H_{11}$ | F | H | 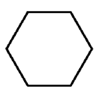 | — | 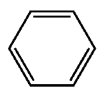 | $CH_2O$ | F | F | $C_2H_5$ | |
| 3958 | $C_2H_5$ | F | H | 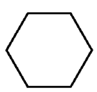 | — | 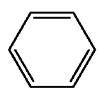 | $CH_2O$ | F | F | $OC_4H_9$ | |
| 3959 | $CH_2{=}CH$ | F | H | 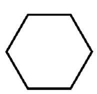 | — | 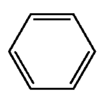 | $CH_2O$ | F | F | $OC_3H_7$ | |
| 3960 | $CH_2{=}CH$ | F | H | 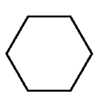 | — | 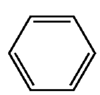 | $CH_2O$ | F | F | $OC_5H_{11}$ | |

TABLE 263

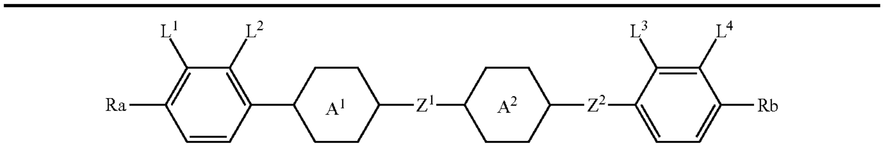

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3961 | $CH_3O$ | F | F | 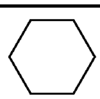 | — | 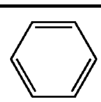 | $CH_2O$ | H | F | $OCH_3$ | |
| 3962 | $CH_3O$ | F | F | 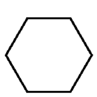 | — | 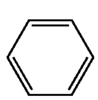 | $CH_2O$ | H | F | $OC_2H_5$ | |

TABLE 263-continued

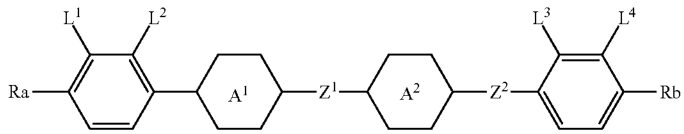

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3963 | $CH_3O$ | F | F | 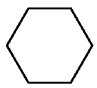 | — | 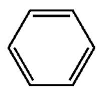 | $CH_2O$ | H | F | $OC_3H_7$ | |
| 3964 | $CH_3O$ | F | F | 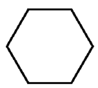 | — |  | $CH_2O$ | H | F | $OC_4H_9$ | |
| 3965 | $CH_3O$ | F | F | 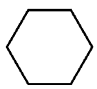 | — |  | $CH_2O$ | H | F | $OC_5H_{11}$ | |
| 3966 | $C_2H_5O$ | F | F | 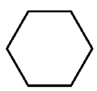 | — | 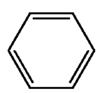 | $CH_2O$ | H | F | $OCH_3$ | |
| 3967 | $C_2H_5O$ | F | F | 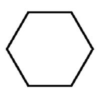 | — | 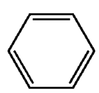 | $CH_2O$ | H | F | $OC_2H_5$ | |
| 3968 | $C_2H_5O$ | F | F | 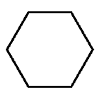 | — | 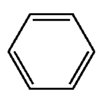 | $CH_2O$ | H | F | $OC_3H_7$ | |
| 3969 | $C_2H_5O$ | F | F | 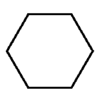 | — | 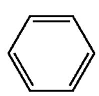 | $CH_2O$ | H | F | $OC_4H_9$ | |
| 3970 | $C_2H_5O$ | F | F | 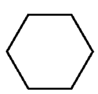 | — | 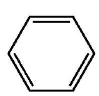 | $CH_2O$ | H | F | $OC_5H_{11}$ | |
| 3971 | $C_3H_7O$ | F | F | 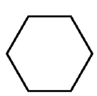 | — | 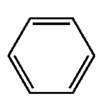 | $CH_2O$ | H | F | $OCH_3$ | |
| 3972 | $C_3H_7O$ | F | F | 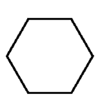 | — | 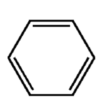 | $CH_2O$ | H | F | $OC_2H_5$ | |
| 3973 | $C_3H_7O$ | F | F | 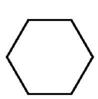 | — | 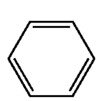 | $CH_2O$ | H | F | $OC_3H_7$ | |
| 3974 | $C_3H_7O$ | F | F | 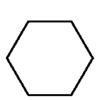 | — | 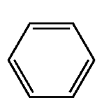 | $CH_2O$ | H | F | $OC_4H_9$ | |
| 3975 | $C_3H_7O$ | F | F | 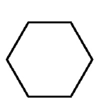 | — | 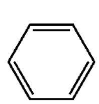 | $CH_2O$ | H | F | $OC_5H_{11}$ | |

TABLE 264

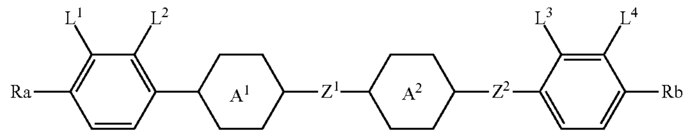

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3976 | $C_4H_9O$ | F | F | 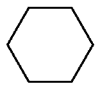 | — | 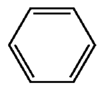 | $CH_2O$ | H | F | $OCH_3$ | |
| 3977 | $C_4H_9O$ | F | F | 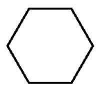 | — |  | $CH_2O$ | H | F | $OC_2H_5$ | |
| 3978 | $C_4H_9O$ | F | F | 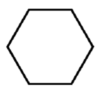 | — | 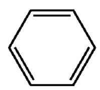 | $CH_2O$ | H | F | $OC_3H_7$ | |
| 3979 | $C_4H_9O$ | F | F | 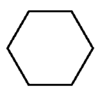 | — | 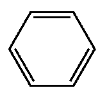 | $CH_2O$ | H | F | $OC_4H_9$ | |
| 3980 | $C_4H_9O$ | F | F | 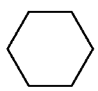 | — | 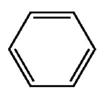 | $CH_2O$ | H | F | $OC_5H_{11}$ | |
| 3981 | $C_5H_{11}O$ | F | F | 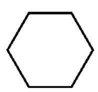 | — | 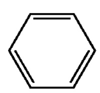 | $CH_2O$ | H | F | $OCH_3$ | |
| 3982 | $C_5H_{11}O$ | F | F | 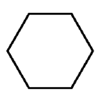 | — | 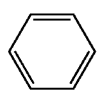 | $CH_2O$ | H | F | $OC_2H_5$ | |
| 3983 | $C_5H_{11}O$ | F | F | 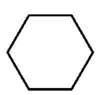 | — | 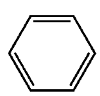 | $CH_2O$ | H | F | $OC_3H_7$ | |
| 3984 | $C_5H_{11}O$ | F | F | 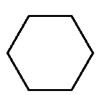 | — | 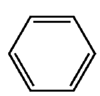 | $CH_2O$ | H | F | $OC_4H_9$ | |
| 3985 | $C_5H_{11}O$ | F | F | 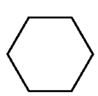 | — | 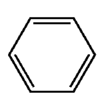 | $CH_2O$ | H | F | $OC_5H_{11}$ | |
| 3986 | $C_2H_5$ | F | F | 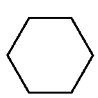 | — | 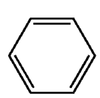 | $CH_2O$ | H | F | $C_4H_9$ | |
| 3987 | $C_5H_{11}$ | F | F | 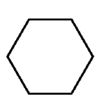 | — | 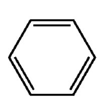 | $CH_2O$ | H | F | $C_2H_5$ | |
| 3988 | $C_2H_5$ | F | F | 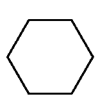 | — | 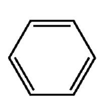 | $CH_2O$ | H | F | $OC_4H_9$ | |

TABLE 264-continued

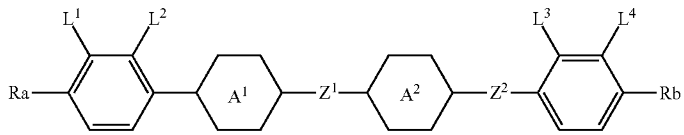

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3989 | $CH_2{=}CH$ | F | F | 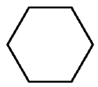 | — | 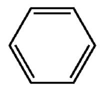 | $CH_2O$ | H | F | $OC_3H_7$ | |
| 3990 | $CH_2{=}CH$ | F | F | 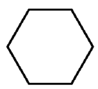 | — | 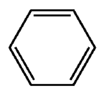 | $CH_2O$ | H | F | $OC_5H_{11}$ | |

TABLE 265

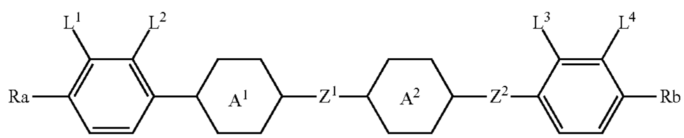

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 3991 | $CH_3O$ | F | F | 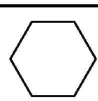 | — | 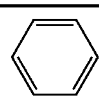 | $CH_2O$ | F | H | $OCH_3$ | |
| 3992 | $CH_3O$ | F | F | 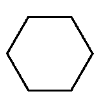 | — | 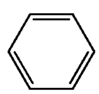 | $CH_2O$ | F | H | $OC_2H_5$ | |
| 3993 | $CH_3O$ | F | F | 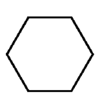 | — | 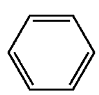 | $CH_2O$ | F | H | $OC_3H_7$ | |
| 3994 | $CH_3O$ | F | F | 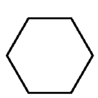 | — | 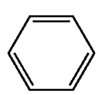 | $CH_2O$ | F | H | $OC_4H_9$ | |
| 3995 | $CH_3O$ | F | F | 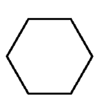 | — | 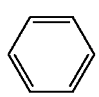 | $CH_2O$ | F | H | $OC_5H_{11}$ | |
| 3996 | $C_2H_5O$ | F | F | 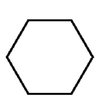 | — | 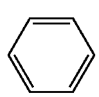 | $CH_2O$ | F | H | $OCH_3$ | |
| 3997 | $C_2H_5O$ | F | F | 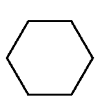 | — | 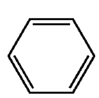 | $CH_2O$ | F | H | $OC_2H_5$ | |
| 3998 | $C_2H_5O$ | F | F | 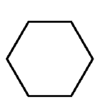 | — | 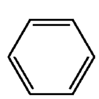 | $CH_2O$ | F | H | $OC_3H_7$ | |
| 3999 | $C_2H_5O$ | F | F | 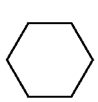 | — | 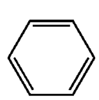 | $CH_2O$ | F | H | $OC_4H_9$ | |

TABLE 265-continued

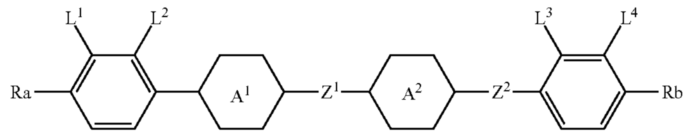

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4000 | $C_2H_5O$ | F | F | 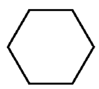 | — | 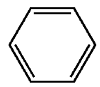 | $CH_2O$ | F | H | $OC_5H_{11}$ | |
| 4001 | $C_3H_7O$ | F | F | 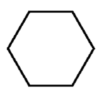 | — | 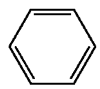 | $CH_2O$ | F | H | $OCH_3$ | |
| 4002 | $C_3H_7O$ | F | F | 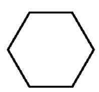 | — | 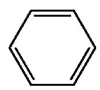 | $CH_2O$ | F | H | $OC_2H_5$ | |
| 4003 | $C_3H_7O$ | F | F | 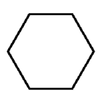 | — | 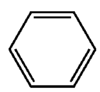 | $CH_2O$ | F | H | $OC_3H_7$ | |
| 4004 | $C_3H_7O$ | F | F | 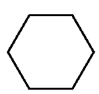 | — | 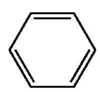 | $CH_2O$ | F | H | $OC_4H_9$ | |
| 4005 | $C_3H_7O$ | F | F | 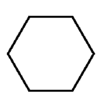 | — | 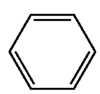 | $CH_2O$ | F | H | $OC_5H_{11}$ | |

TABLE 266

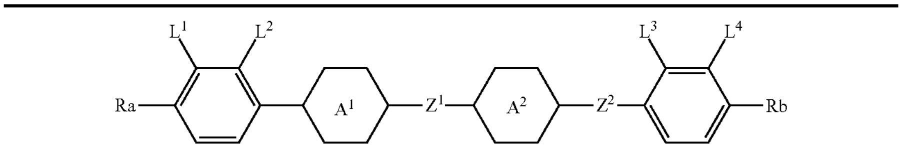

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4006 | $C_4H_9O$ | F | F | 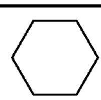 | — | 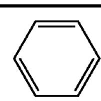 | $CH_2O$ | F | H | $OCH_3$ | |
| 4007 | $C_4H_9O$ | F | F | 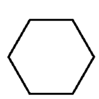 | — | 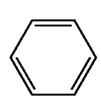 | $CH_2O$ | F | H | $OC_2H_5$ | |
| 4008 | $C_4H_9O$ | F | F | 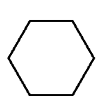 | — | 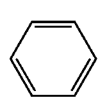 | $CH_2O$ | F | H | $OC_3H_7$ | |
| 4009 | $C_4H_9O$ | F | F | 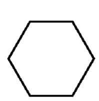 | — | 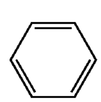 | $CH_2O$ | F | H | $OC_4H_9$ | |
| 4010 | $C_4H_9O$ | F | F | 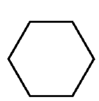 | — | 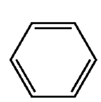 | $CH_2O$ | F | H | $OC_5H_{11}$ | |

TABLE 266-continued

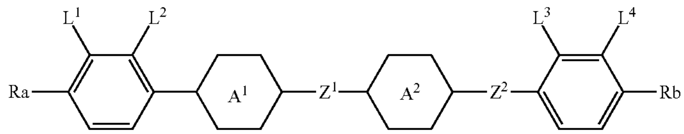

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4011 | $C_5H_{11}O$ | F | F | 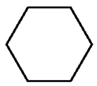 | — | 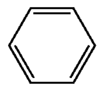 | $CH_2O$ | F | H | $OCH_3$ | |
| 4012 | $C_5H_{11}O$ | F | F | 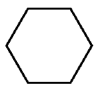 | — |  | $CH_2O$ | F | H | $OC_2H_5$ | |
| 4013 | $C_5H_{11}O$ | F | F | 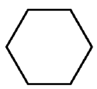 | — | 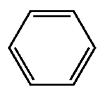 | $CH_2O$ | F | H | $OC_3H_7$ | |
| 4014 | $C_5H_{11}O$ | F | F | 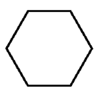 | — | 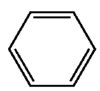 | $CH_2O$ | F | H | $OC_4H_9$ | |
| 4015 | $C_5H_{11}O$ | F | F | 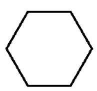 | — | 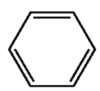 | $CH_2O$ | F | H | $OC_5H_{11}$ | |
| 4016 | $C_2H_5$ | F | F | 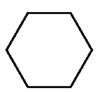 | — | 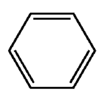 | $CH_2O$ | F | H | $C_4H_9$ | |
| 4017 | $C_5H_{11}$ | F | F | 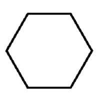 | — | 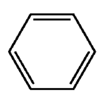 | $CH_2O$ | F | H | $C_2H_5$ | |
| 4018 | $C_2H_5$ | F | F | 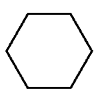 | — | 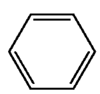 | $CH_2O$ | F | H | $OC_4H_9$ | |
| 4019 | $CH_2{=}CH$ | F | F | 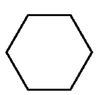 | — | 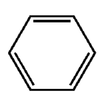 | $CH_2O$ | F | H | $OC_3H_7$ | |
| 4020 | $CH_2{=}CH$ | F | F | 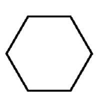 | — | 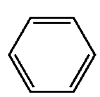 | $CH_2O$ | F | H | $OC_5H_{11}$ | |

TABLE 267

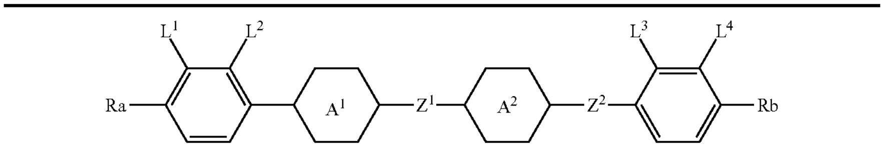

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4021 | $CH_3O$ | F | F | 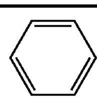 | — | 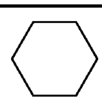 | $CH_2O$ | F | F | $OCH_3$ | |
| 4022 | $CH_3O$ | F | F | 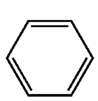 | — | 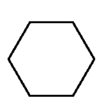 | $CH_2O$ | F | F | $OC_2H_5$ | |

TABLE 267-continued

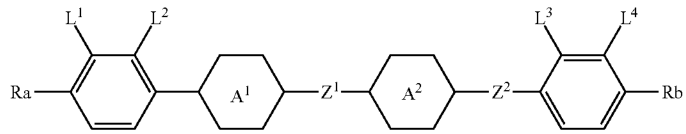

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4023 | $CH_3O$ | F | F |  | — | 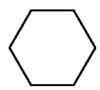 | $CH_2O$ | F | F | $OC_3H_7$ | |
| 4024 | $CH_3O$ | F | F |  | — | 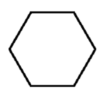 | $CH_2O$ | F | F | $OC_4H_9$ | |
| 4025 | $CH_3O$ | F | F | 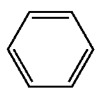 | — | 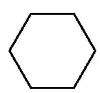 | $CH_2O$ | F | F | $OC_5H_{11}$ | |
| 4026 | $C_2H_5O$ | F | F | 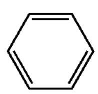 | — | 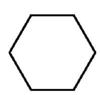 | $CH_2O$ | F | F | $OCH_3$ | |
| 4027 | $C_2H_5O$ | F | F | 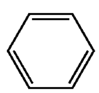 | — | 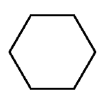 | $CH_2O$ | F | F | $OC_2H_5$ | |
| 4028 | $C_2H_5O$ | F | F | 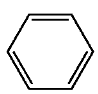 | — | 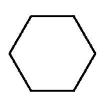 | $CH_2O$ | F | F | $OC_3H_7$ | |
| 4029 | $C_2H_5O$ | F | F | 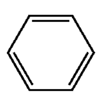 | — | 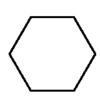 | $CH_2O$ | F | F | $OC_4H_9$ | |
| 4030 | $C_2H_5O$ | F | F | 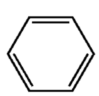 | — | 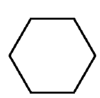 | $CH_2O$ | F | F | $OC_5H_{11}$ | |
| 4031 | $C_3H_7O$ | F | F | 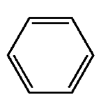 | — | 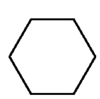 | $CH_2O$ | F | F | $OCH_3$ | |
| 4032 | $C_3H_7O$ | F | F | 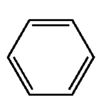 | — | 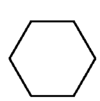 | $CH_2O$ | F | F | $OC_2H_5$ | |
| 4033 | $C_3H_7O$ | F | F | 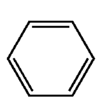 | — | 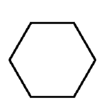 | $CH_2O$ | F | F | $OC_3H_7$ | |
| 4034 | $C_3H_7O$ | F | F | 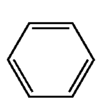 | — | 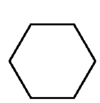 | $CH_2O$ | F | F | $OC_4H_9$ | |
| 4035 | $C_3H_7O$ | F | F | 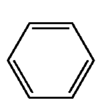 | — | 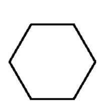 | $CH_2O$ | F | F | $OC_5H_{11}$ | |

TABLE 268

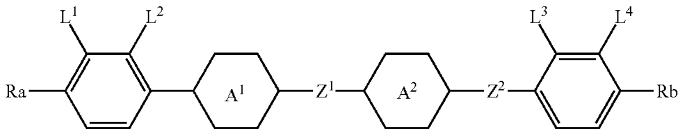

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4036 | $C_4H_9O$ | F | F |  | — | 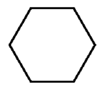 | $CH_2O$ | F | F | $OCH_3$ | |
| 4037 | $C_4H_9O$ | F | F |  | — | 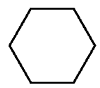 | $CH_2O$ | F | F | $OC_2H_5$ | |
| 4038 | $C_4H_9O$ | F | F | 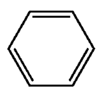 | — | 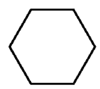 | $CH_2O$ | F | F | $OC_3H_7$ | |
| 4039 | $C_4H_9O$ | F | F | 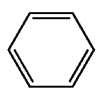 | — | 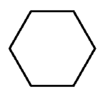 | $CH_2O$ | F | F | $OC_4H_9$ | |
| 4040 | $C_4H_9O$ | F | F | 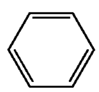 | — | 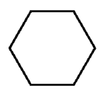 | $CH_2O$ | F | F | $OC_5H_{11}$ | |
| 4041 | $C_5H_{11}O$ | F | F | 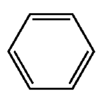 | — | 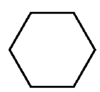 | $CH_2O$ | F | F | $OCH_3$ | |
| 4042 | $C_5H_{11}O$ | F | F | 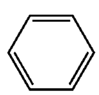 | — | 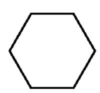 | $CH_2O$ | F | F | $OC_2H_5$ | |
| 4043 | $C_5H_{11}O$ | F | F | 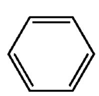 | — | 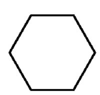 | $CH_2O$ | F | F | $OC_3H_7$ | |
| 4044 | $C_5H_{11}O$ | F | F | 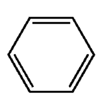 | — | 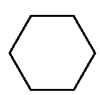 | $CH_2O$ | F | F | $OC_4H_9$ | |
| 4045 | $C_5H_{11}O$ | F | F | 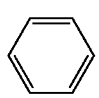 | — | 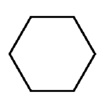 | $CH_2O$ | F | F | $OC_5H_{11}$ | |
| 4046 | $C_2H_5$ | F | F | 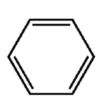 | — | 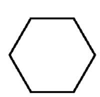 | $CH_2O$ | F | F | $C_4H_9$ | |
| 4047 | $C_5H_{11}$ | F | F | 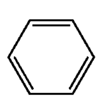 | — | 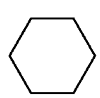 | $CH_2O$ | F | F | $C_2H_5$ | |
| 4048 | $C_2H_5$ | F | F | 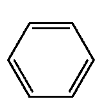 | — | 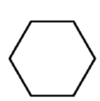 | $CH_2O$ | F | F | $OC_4H_9$ | |

TABLE 268-continued

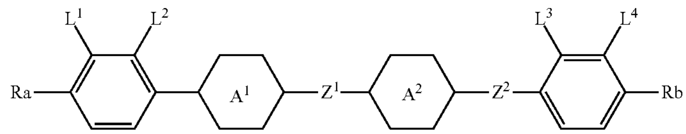

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4049 | $CH_2$═CH | F | F | 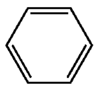 | — | 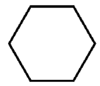 | $CH_2O$ | F | F | $OC_3H_7$ | |
| 4050 | $CH_2$═CH | F | F | 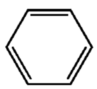 | — | 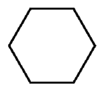 | $CH_2O$ | F | F | $OC_5H_{11}$ | |

TABLE 269

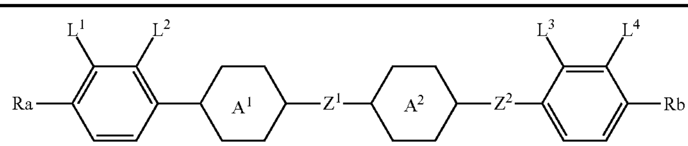

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4051 | $CH_2$═CHO | F | F |  | — | 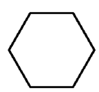 | $CH_2O$ | F | F | $OC_3H_7$ | |
| 4052 | $CH_2$═$CHCH_2O$ | F | F |  | — | 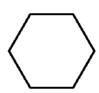 | $CH_2O$ | F | F | $OC_5H_{11}$ | |
| 4053 | $CH_2$═$CHCH_2O$ | F | F | 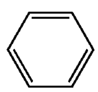 | — | 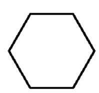 | $CH_2O$ | F | F | $OC_3H_7$ | |
| 4054 | $CH_2$═$CHC_2H_5O$ | F | F | 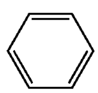 | — | 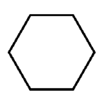 | $CH_2O$ | F | F | $OC_5H_{11}$ | |
| 4055 | $CH_2$═$CHC_2H_5O$ | F | F | 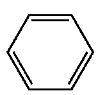 | — | 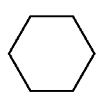 | $CH_2O$ | F | F | $OC_2H_5$ | |
| 4056 | $CH_2$═$CHC_2H_5O$ | F | F | 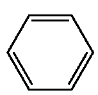 | — | 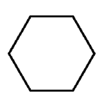 | $CH_2O$ | F | F | $OC_3H_7$ | |
| 4057 | $CH_3CH$═$CHCH_2O$ | F | F | 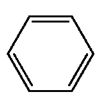 | — | 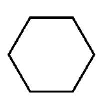 | $CH_2O$ | F | F | $OCH_3$ | |
| 4058 | $CH_3CH$═$CHCH_2O$ | F | F | 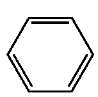 | — | 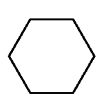 | $CH_2O$ | F | F | $OC_2H_5$ | |
| 4059 | $C_3H_7O$ | F | F | 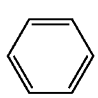 | — | 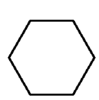 | $CH_2O$ | F | F | OCH═$CH_2$ | |

TABLE 269-continued

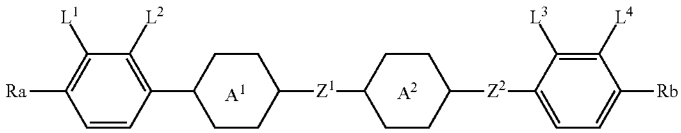

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4060 | $C_3H_7O$ | F | F | 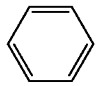 | — | 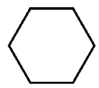 | $CH_2O$ | F | F | $OCH_2CH{=}CH_2$ | |
| 4061 | $C_4H_9O$ | F | F | 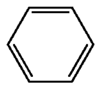 | — | 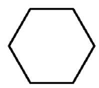 | $CH_2O$ | F | F | $OCH_2CH{=}CH_2$ | |
| 4062 | $C_5H_{11}O$ | F | F | 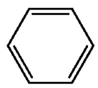 | — | 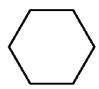 | $CH_2O$ | F | F | $OCH_2CH{=}CH_2$ | |
| 4063 | $CH_3O$ | F | F | 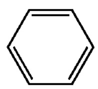 | — | 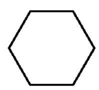 | $CH_2O$ | F | F | $OC_2H_5CH{=}CH_2$ | |
| 4064 | $C_2H_5O$ | F | F | 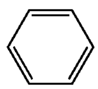 | — | 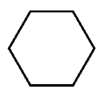 | $CH_2O$ | F | F | $OC_2H_5CH{=}CH_2$ | |
| 4065 | $C_3H_7O$ | F | F | 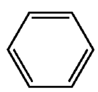 | — | 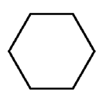 | $CH_2O$ | F | F | $OC_2H_5CH{=}CH_2$ | |

TABLE 270

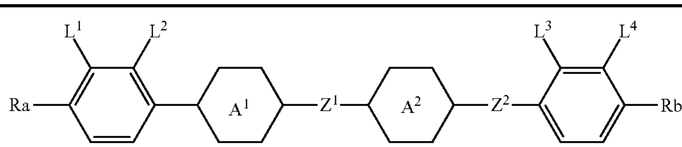

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4066 | $CH_3O$ | F | F | 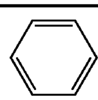 | — | 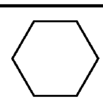 | $CH_2O$ | F | F | $OCH_2CH{=}CHCH_3$ | |
| 4067 | $C_2H_5O$ | F | F | 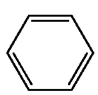 | — | 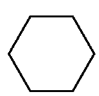 | $CH_2O$ | F | F | $OCH_2CH{=}CHCH_3$ | |
| 4068 | $C_3H_7O$ | F | F | 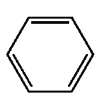 | — | 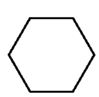 | $CH_2O$ | F | F | $OCH_2CH{=}CHCH_3$ | |
| 4069 | $CH_2{=}CHCH_2O$ | F | F | 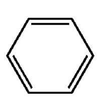 | — | 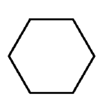 | $CH_2O$ | F | F | $OCH{=}CH_2$ | |
| 4070 | $CH_2{=}CHC_2H_5O$ | F | F | 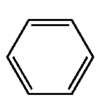 | — | 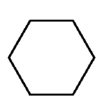 | $CH_2O$ | F | F | $OCH_2CH{=}CH_2$ | |
| 4071 | $C_3H_7OCH_2$ | F | F | 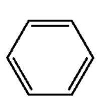 | — | 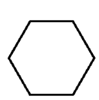 | $CH_2O$ | F | F | $OC_3H_7$ | |

TABLE 270-continued

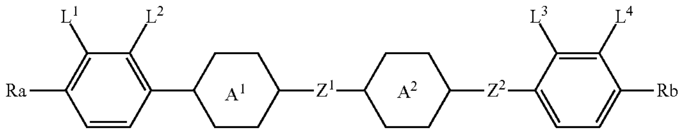

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4072 | $C_5H_{11}O$ | F | F | 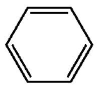 | — | 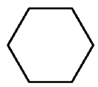 | $CH_2O$ | F | F | $OC_2H_5CH{=}CH_2$ | |
| 4073 | $C_3H_7O$ | F | F |  | — | 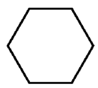 | $CH_2O$ | F | F | H | |
| 4074 | $C_5H_{11}O$ | F | F |  | — | 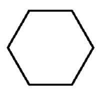 | $CH_2O$ | F | F | $OC_9H_{19}$ | |
| 4075 | $C_3H_7O$ | F | F | 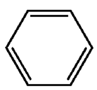 | — | 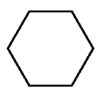 | $CH_2O$ | F | F | $C_2H_5$ | |
| 4076 | $C_5H_{11}O$ | F | F |  | — | 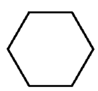 | $CH_2O$ | F | F | $C_3H_7$ | |
| 4077 | H | F | F |  | — | 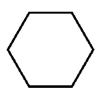 | $CH_2O$ | F | F | $OC_4H_9$ | |
| 4078 | $C_7H_{15}O$ | F | F | 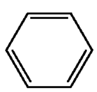 | — | 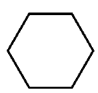 | $CH_2O$ | F | F | $OC_4H_9$ | |
| 4079 | $C_2H_5O$ | F | F | 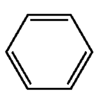 | — | 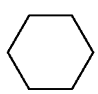 | $CH_2O$ | F | F | $OC_6H_{13}$ | |
| 4080 | $CH_3O$ | F | F | 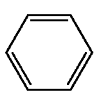 | — | 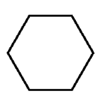 | $CH_2O$ | F | F | $C_2H_5$ | |

TABLE 271

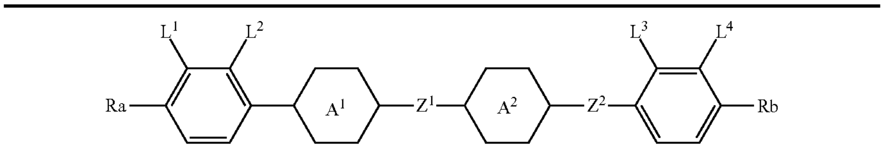

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4081 | $CH_3O$ | H | F | 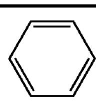 | — | 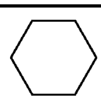 | $CH_2O$ | F | F | $OCH_3$ | |
| 4082 | $CH_3O$ | H | F | 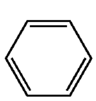 | — | 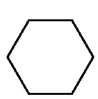 | $CH_2O$ | F | F | $OC_2H_5$ | |

TABLE 271-continued

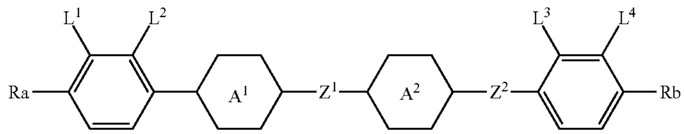

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4083 | $CH_3O$ | H | F | 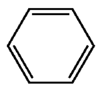 | — | 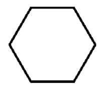 | $CH_2O$ | F | F | $OC_3H_7$ | |
| 4084 | $CH_3O$ | H | F |  | — | 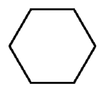 | $CH_2O$ | F | F | $OC_4H_9$ | |
| 4085 | $CH_3O$ | H | F |  | — | 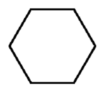 | $CH_2O$ | F | F | $OC_5H_{11}$ | |
| 4086 | $C_2H_5O$ | H | F |  | — | 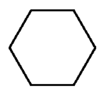 | $CH_2O$ | F | F | $OCH_3$ | |
| 4087 | $C_2H_5O$ | H | F | 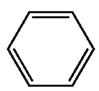 | — | 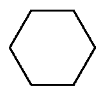 | $CH_2O$ | F | F | $OC_2H_5$ | |
| 4088 | $C_2H_5O$ | H | F | 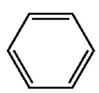 | — | 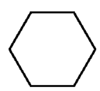 | $CH_2O$ | F | F | $OC_3H_7$ | |
| 4089 | $C_2H_5O$ | H | F | 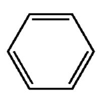 | — | 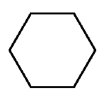 | $CH_2O$ | F | F | $OC_4H_9$ | |
| 4090 | $C_2H_5O$ | H | F | 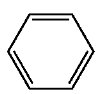 | — | 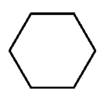 | $CH_2O$ | F | F | $OC_5H_{11}$ | |
| 4091 | $C_3H_7O$ | H | F | 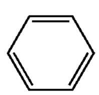 | — | 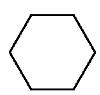 | $CH_2O$ | F | F | $OCH_3$ | |
| 4092 | $C_3H_7O$ | H | F | 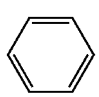 | — | 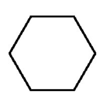 | $CH_2O$ | F | F | $OC_2H_5$ | |
| 4093 | $C_3H_7O$ | H | F | 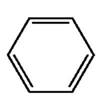 | — | 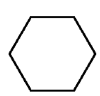 | $CH_2O$ | F | F | $OC_3H_7$ | |
| 4094 | $C_3H_7O$ | H | F | 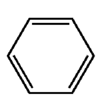 | — | 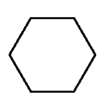 | $CH_2O$ | F | F | $OC_4H_9$ | |
| 4095 | $C_3H_7O$ | H | F | 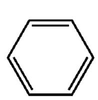 | — | 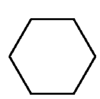 | $CH_2O$ | F | F | $OC_5H_{11}$ | |

TABLE 272
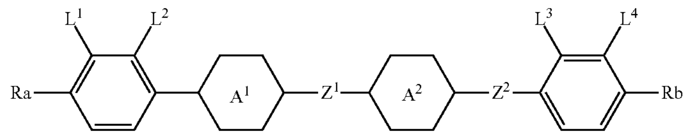
| No. | Ra | L1 | L2 | A1 | Z1 | A2 | Z2 | L3 | L4 | Rb | Physical property values |
|---|---|---|---|---|---|---|---|---|---|---|---|
| 4096 | $C_4H_9O$ | H | F | 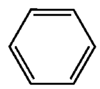 | — | 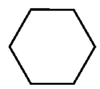 | $CH_2O$ | F | F | $OCH_3$ | |
| 4097 | $C_4H_9O$ | H | F | 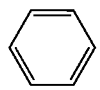 | — | 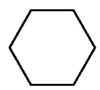 | $CH_2O$ | F | F | $OC_2H_5$ | |
| 4098 | $C_4H_9O$ | H | F | 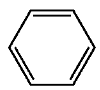 | — | 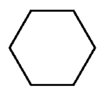 | $CH_2O$ | F | F | $OC_3H_7$ | |
| 4099 | $C_4H_9O$ | H | F | 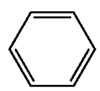 | — | 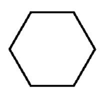 | $CH_2O$ | F | F | $OC_4H_9$ | |
| 4100 | $C_4H_9O$ | H | F | 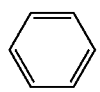 | — | 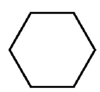 | $CH_2O$ | F | F | $OC_5H_{11}$ | |
| 4101 | $C_5H_{11}O$ | H | F | 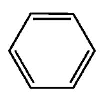 | — | 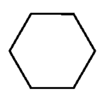 | $CH_2O$ | F | F | $OCH_3$ | |
| 4102 | $C_5H_{11}O$ | H | F | 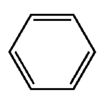 | — | 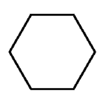 | $CH_2O$ | F | F | $OC_2H_5$ | |
| 4103 | $C_5H_{11}O$ | H | F | 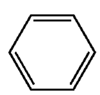 | — | 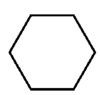 | $CH_2O$ | F | F | $OC_3H_7$ | |
| 4104 | $C_5H_{11}O$ | H | F | 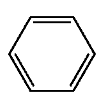 | — | 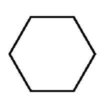 | $CH_2O$ | F | F | $OC_4H_9$ | |
| 4105 | $C_5H_{11}O$ | H | F | 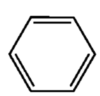 | — | 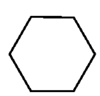 | $CH_2O$ | F | F | $OC_5H_{11}$ | |
| 4106 | $C_2H_5$ | H | F | 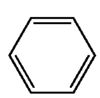 | — | 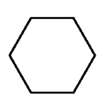 | $CH_2O$ | F | F | $C_4H_9$ | |
| 4107 | $C_5H_{11}$ | H | F | 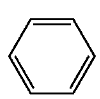 | — | 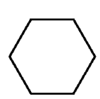 | $CH_2O$ | F | F | $C_2H_5$ | |
| 4108 | $C_2H_5$ | H | F | 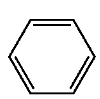 | — | 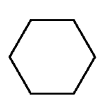 | $CH_2O$ | F | F | $OC_4H_9$ | |

TABLE 272-continued

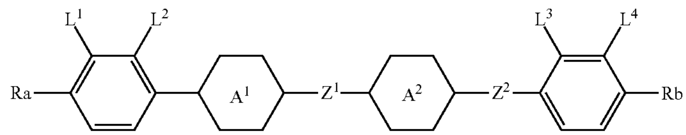

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4109 | $CH_2$=CH | H | F | 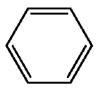 | — | 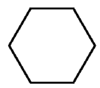 | $CH_2O$ | F | F | $OC_3H_7$ | |
| 4110 | $CH_2$=CH | H | F | 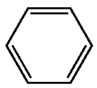 | — | 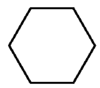 | $CH_2O$ | F | F | $OC_5H_{11}$ | |

TABLE 273

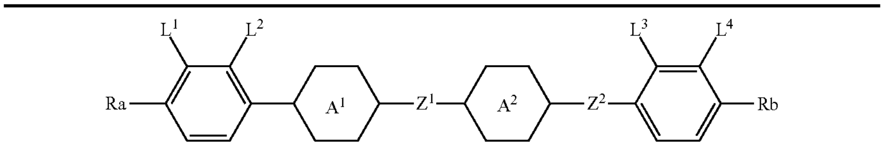

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4111 | $CH_3O$ | F | H | 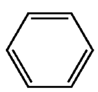 | — | 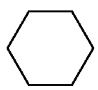 | $CH_2O$ | F | F | $OCH_3$ | |
| 4112 | $CH_3O$ | F | H | 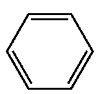 | — | 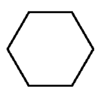 | $CH_2O$ | F | F | $OC_2H_5$ | |
| 4113 | $CH_3O$ | F | H | 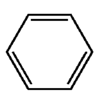 | — | 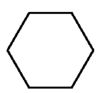 | $CH_2O$ | F | F | $OC_3H_7$ | |
| 4114 | $CH_3O$ | F | H | 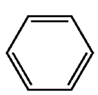 | — | 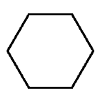 | $CH_2O$ | F | F | $OC_4H_9$ | |
| 4115 | $CH_3O$ | F | H | 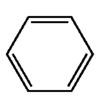 | — | 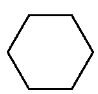 | $CH_2O$ | F | F | $OC_5H_{11}$ | |
| 4116 | $C_2H_5O$ | F | H | 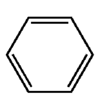 | — | 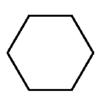 | $CH_2O$ | F | F | $OCH_3$ | |
| 4117 | $C_2H_5O$ | F | H | 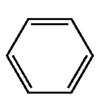 | — | 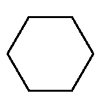 | $CH_2O$ | F | F | $OC_2H_5$ | |
| 4118 | $C_2H_5O$ | F | H | 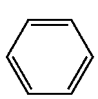 | — | 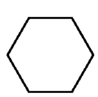 | $CH_2O$ | F | F | $OC_3H_7$ | |
| 4119 | $C_2H_5O$ | F | H | 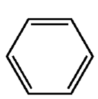 | — | 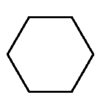 | $CH_2O$ | F | F | $OC_4H_9$ | |

TABLE 273-continued

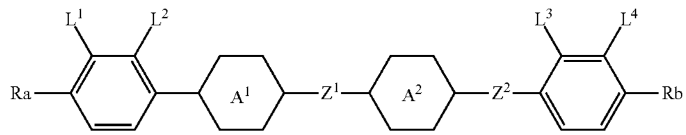

| No. | Ra | L1 | L2 | A1 | Z1 | A2 | Z2 | L3 | L4 | Rb | Physical property values |
|---|---|---|---|---|---|---|---|---|---|---|---|
| 4120 | $C_2H_5O$ | F | H |  | — | 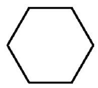 | $CH_2O$ | F | F | $OC_5H_{11}$ | |
| 4121 | $C_3H_7O$ | F | H |  | — | 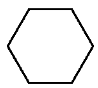 | $CH_2O$ | F | F | $OCH_3$ | |
| 4122 | $C_3H_7O$ | F | H |  | — | 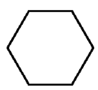 | $CH_2O$ | F | F | $OC_2H_5$ | |
| 4123 | $C_3H_7O$ | F | H | 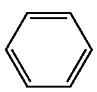 | — | 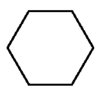 | $CH_2O$ | F | F | $OC_3H_7$ | |
| 4124 | $C_3H_7O$ | F | H | 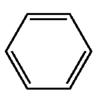 | — | 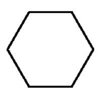 | $CH_2O$ | F | F | $OC_4H_9$ | |
| 4125 | $C_3H_7O$ | F | H | 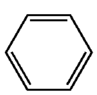 | — | 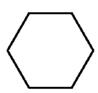 | $CH_2O$ | F | F | $OC_5H_{11}$ | |

TABLE 274

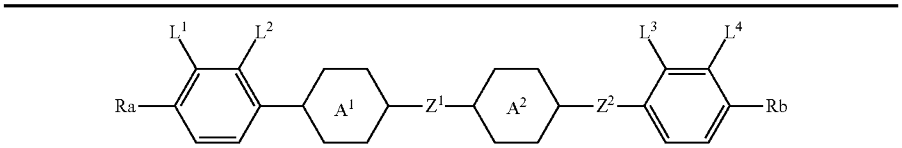

| No. | Ra | L1 | L2 | A1 | Z1 | A2 | Z2 | L3 | L4 | Rb | Physical property values |
|---|---|---|---|---|---|---|---|---|---|---|---|
| 4126 | $C_4H_9O$ | F | H | 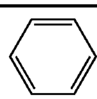 | — | 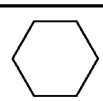 | $CH_2O$ | F | F | $OCH_3$ | |
| 4127 | $C_4H_9O$ | F | H | 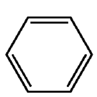 | — | 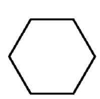 | $CH_2O$ | F | F | $OC_2H_5$ | |
| 4128 | $C_4H_9O$ | F | H | 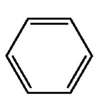 | — | 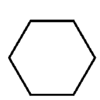 | $CH_2O$ | F | F | $OC_3H_7$ | |
| 4129 | $C_4H_9O$ | F | H | 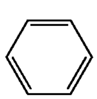 | — | 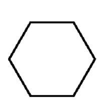 | $CH_2O$ | F | F | $OC_4H_9$ | |
| 4130 | $C_4H_9O$ | F | H | 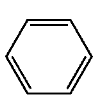 | — | 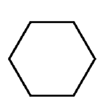 | $CH_2O$ | F | F | $OC_5H_{11}$ | |

TABLE 274-continued

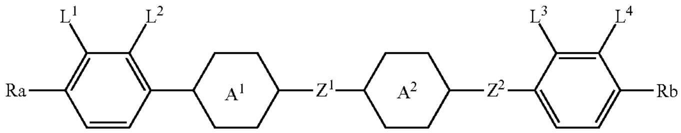

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4131 | $C_5H_{11}O$ | F | H | 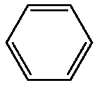 | — | 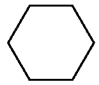 | $CH_2O$ | F | F | $OCH_3$ | |
| 4132 | $C_5H_{11}O$ | F | H |  | — | 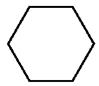 | $CH_2O$ | F | F | $OC_2H_5$ | |
| 4133 | $C_5H_{11}O$ | F | H | 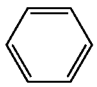 | — | 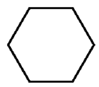 | $CH_2O$ | F | F | $OC_3H_7$ | |
| 4134 | $C_5H_{11}O$ | F | H | 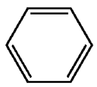 | — | 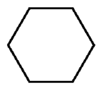 | $CH_2O$ | F | F | $OC_4H_9$ | |
| 4135 | $C_5H_{11}O$ | F | H |  | — | 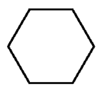 | $CH_2O$ | F | F | $OC_5H_{11}$ | |
| 4136 | $C_2H_5$ | F | H |  | — | 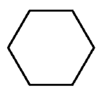 | $CH_2O$ | F | F | $C_4H_9$ | |
| 4137 | $C_5H_{11}$ | F | H |  | — | 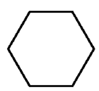 | $CH_2O$ | F | F | $C_2H_5$ | |
| 4138 | $C_2H_5$ | F | H |  | — | 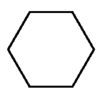 | $CH_2O$ | F | F | $OC_4H_9$ | |
| 4139 | $CH_2{=}CH$ | F | H | 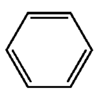 | — | 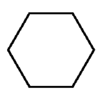 | $CH_2O$ | F | F | $OC_3H_7$ | |
| 4140 | $CH_2{=}CH$ | F | H | 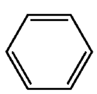 | — | 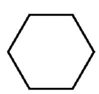 | $CH_2O$ | F | F | $OC_5H_{11}$ | |

TABLE 275

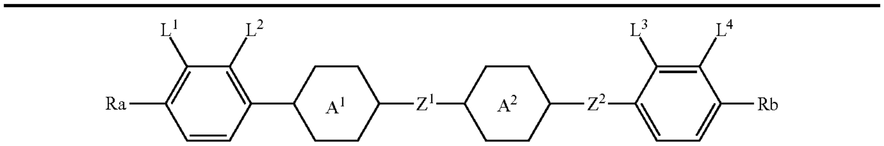

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4141 | $CH_3O$ | F | F | 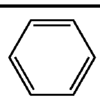 | — | 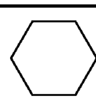 | $CH_2O$ | H | F | $OCH_3$ | |
| 4142 | $CH_3O$ | F | F | 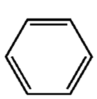 | — | 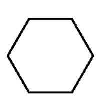 | $CH_2O$ | H | F | $OC_2H_5$ | |

TABLE 275-continued

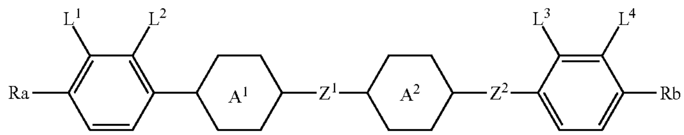

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4143 | $CH_3O$ | F | F |  | — | 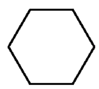 | $CH_2O$ | H | F | $OC_3H_7$ | |
| 4144 | $CH_3O$ | F | F | 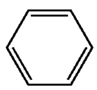 | — | 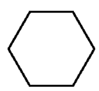 | $CH_2O$ | H | F | $OC_4H_9$ | |
| 4145 | $CH_3O$ | F | F |  | — | 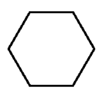 | $CH_2O$ | H | F | $OC_5H_{11}$ | |
| 4146 | $C_2H_5O$ | F | F | 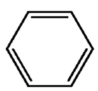 | — | 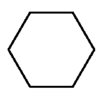 | $CH_2O$ | H | F | $OCH_3$ | |
| 4147 | $C_2H_5O$ | F | F | 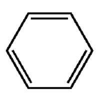 | — | 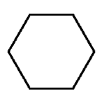 | $CH_2O$ | H | F | $OC_2H_5$ | |
| 4148 | $C_2H_5O$ | F | F | 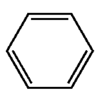 | — | 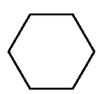 | $CH_2O$ | H | F | $OC_3H_7$ | |
| 4149 | $C_2H_5O$ | F | F | 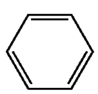 | — | 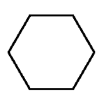 | $CH_2O$ | H | F | $OC_4H_9$ | |
| 4150 | $C_2H_5O$ | F | F | 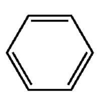 | — | 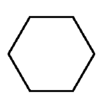 | $CH_2O$ | H | F | $OC_5H_{11}$ | |
| 4151 | $C_3H_7O$ | F | F | 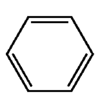 | — | 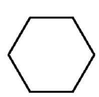 | $CH_2O$ | H | F | $OCH_3$ | |
| 4152 | $C_3H_7O$ | F | F | 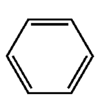 | — | 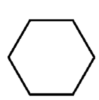 | $CH_2O$ | H | F | $OC_2H_5$ | |
| 4153 | $C_3H_7O$ | F | F | 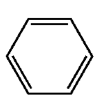 | — | 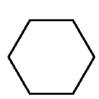 | $CH_2O$ | H | F | $OC_3H_7$ | |
| 4154 | $C_3H_7O$ | F | F | 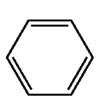 | — | 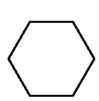 | $CH_2O$ | H | F | $OC_4H_9$ | |
| 4155 | $C_3H_7O$ | F | F | 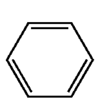 | — | 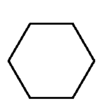 | $CH_2O$ | H | F | $OC_5H_{11}$ | |

TABLE 276

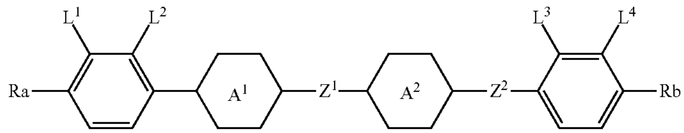

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4156 | $C_4H_9O$ | F | F | 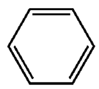 | — | 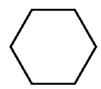 | $CH_2O$ | H | F | $OCH_3$ | |
| 4157 | $C_4H_9O$ | F | F | 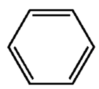 | — | 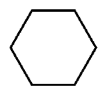 | $CH_2O$ | H | F | $OC_2H_5$ | |
| 4158 | $C_4H_9O$ | F | F | 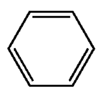 | — | 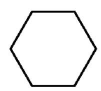 | $CH_2O$ | H | F | $OC_3H_7$ | |
| 4159 | $C_4H_9O$ | F | F | 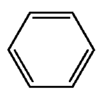 | — | 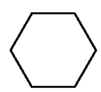 | $CH_2O$ | H | F | $OC_4H_9$ | |
| 4160 | $C_4H_9O$ | F | F | 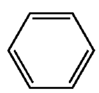 | — | 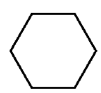 | $CH_2O$ | H | F | $OC_5H_{11}$ | |
| 4161 | $C_5H_{11}O$ | F | F | 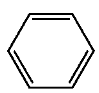 | — | 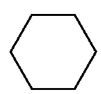 | $CH_2O$ | H | F | $OCH_3$ | |
| 4162 | $C_5H_{11}O$ | F | F | 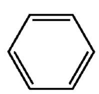 | — | 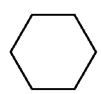 | $CH_2O$ | H | F | $OC_2H_5$ | |
| 4163 | $C_5H_{11}O$ | F | F | 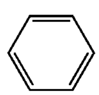 | — | 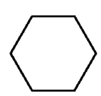 | $CH_2O$ | H | F | $OC_3H_7$ | |
| 4164 | $C_5H_{11}O$ | F | F | 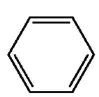 | — | 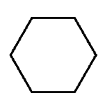 | $CH_2O$ | H | F | $OC_4H_9$ | |
| 4165 | $C_5H_{11}O$ | F | F | 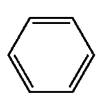 | — | 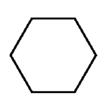 | $CH_2O$ | H | F | $OC_5H_{11}$ | |
| 4166 | $C_2H_5$ | F | F | 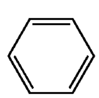 | — | 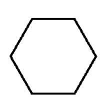 | $CH_2O$ | H | F | $C_4H_9$ | |
| 4167 | $C_5H_{11}$ | F | F | 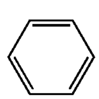 | — | 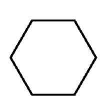 | $CH_2O$ | H | F | $C_2H_5$ | |
| 4168 | $C_2H_5$ | F | F | 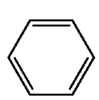 | — | 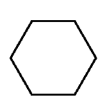 | $CH_2O$ | H | F | $OC_4H_9$ | |

TABLE 276-continued

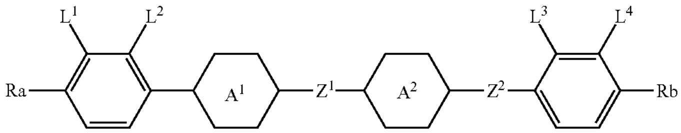

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4169 | $CH_2{=}CH$ | F | F |  | — | 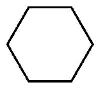 | $CH_2O$ | H | F | $OC_3H_7$ | |
| 4170 | $CH_2{=}CH$ | F | F |  | — | 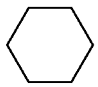 | $CH_2O$ | H | F | $OC_5H_{11}$ | |

TABLE 277

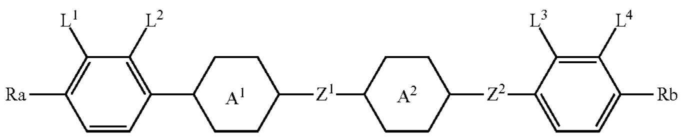

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4171 | $CH_3O$ | F | F |  | — | 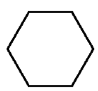 | $CH_2O$ | F | H | $OCH_3$ | |
| 4172 | $CH_3O$ | F | F | 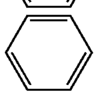 | — | 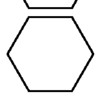 | $CH_2O$ | F | H | $OC_2H_5$ | |
| 4173 | $CH_3O$ | F | F | 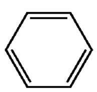 | — | 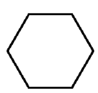 | $CH_2O$ | F | H | $OC_3H_7$ | |
| 4174 | $CH_3O$ | F | F | 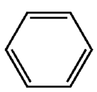 | — | 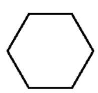 | $CH_2O$ | F | H | $OC_4H_9$ | |
| 4175 | $CH_3O$ | F | F | 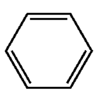 | — | 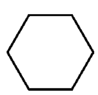 | $CH_2O$ | F | H | $OC_5H_{11}$ | |
| 4176 | $C_2H_5O$ | F | F | 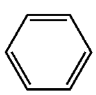 | — | 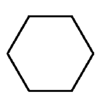 | $CH_2O$ | F | H | $OCH_3$ | |
| 4177 | $C_2H_5O$ | F | F | 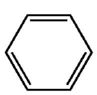 | — | 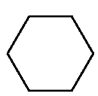 | $CH_2O$ | F | H | $OC_2H_5$ | |
| 4178 | $C_2H_5O$ | F | F | 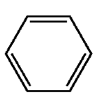 | — | 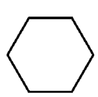 | $CH_2O$ | F | H | $OC_3H_7$ | |
| 4179 | $C_2H_5O$ | F | F | 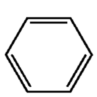 | — | 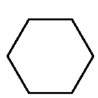 | $CH_2O$ | F | H | $OC_4H_9$ | |
| 4180 | $C_2H_5O$ | F | F | 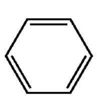 | — | 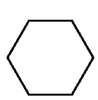 | $CH_2O$ | F | H | $OC_5H_{11}$ | |

TABLE 277-continued

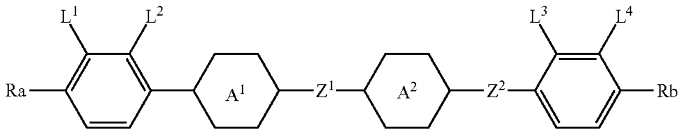

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4181 | $C_3H_7O$ | F | F | 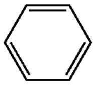 | — | 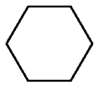 | $CH_2O$ | F | H | $OCH_3$ | |
| 4182 | $C_3H_7O$ | F | F |  | — | 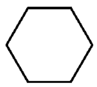 | $CH_2O$ | F | H | $OC_2H_5$ | |
| 4183 | $C_3H_7O$ | F | F |  | — | 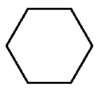 | $CH_2O$ | F | H | $OC_3H_7$ | |
| 4184 | $C_3H_7O$ | F | F |  | — | 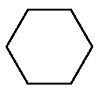 | $CH_2O$ | F | H | $OC_4H_9$ | |
| 4185 | $C_3H_7O$ | F | F | 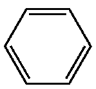 | — | 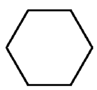 | $CH_2O$ | F | H | $OC_5H_{11}$ | |

TABLE 278

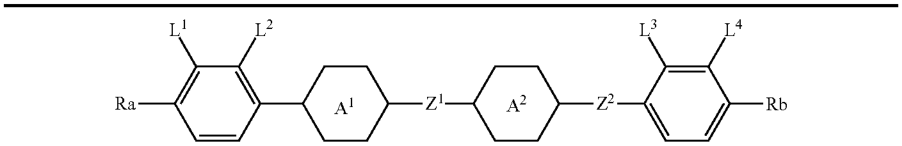

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4186 | $C_4H_9O$ | F | F | 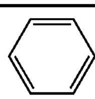 | — | 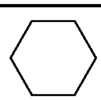 | $CH_2O$ | F | H | $OCH_3$ | |
| 4187 | $C_4H_9O$ | F | F |  | — | 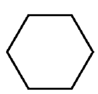 | $CH_2O$ | F | H | $OC_2H_5$ | |
| 4188 | $C_4H_9O$ | F | F | 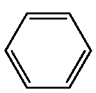 | — | 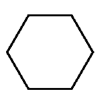 | $CH_2O$ | F | H | $OC_3H_7$ | |
| 4189 | $C_4H_9O$ | F | F | 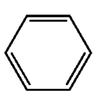 | — | 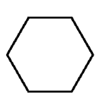 | $CH_2O$ | F | H | $OC_4H_9$ | |
| 4190 | $C_4H_9O$ | F | F | 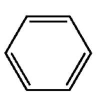 | — | 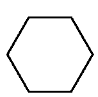 | $CH_2O$ | F | H | $OC_5H_{11}$ | |
| 4191 | $C_5H_{11}O$ | F | F | 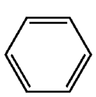 | — | 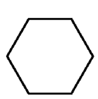 | $CH_2O$ | F | H | $OCH_3$ | |
| 4192 | $C_5H_{11}O$ | F | F | 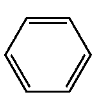 | — | 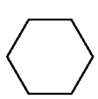 | $CH_2O$ | F | H | $OC_2H_5$ | |

TABLE 278-continued

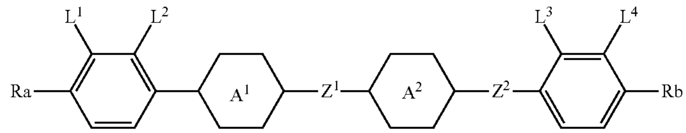

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4193 | $C_5H_{11}O$ | F | F | 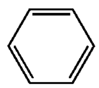 | — | 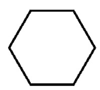 | $CH_2O$ | F | H | $OC_3H_7$ | |
| 4194 | $C_5H_{11}O$ | F | F | 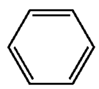 | — | 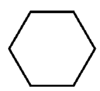 | $CH_2O$ | F | H | $OC_4H_9$ | |
| 4195 | $C_5H_{11}O$ | F | F |  | — | 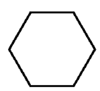 | $CH_2O$ | F | H | $OC_5H_{11}$ | |
| 4196 | $C_2H_5$ | F | F | 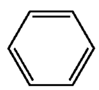 | — | 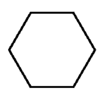 | $CH_2O$ | F | H | $C_4H_9$ | |
| 4197 | $C_5H_{11}$ | F | F | 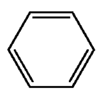 | — | 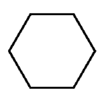 | $CH_2O$ | F | H | $C_2H_5$ | |
| 4198 | $C_2H_5$ | F | F | 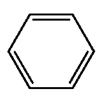 | — | 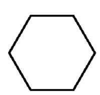 | $CH_2O$ | F | H | $OC_4H_9$ | |
| 4199 | $CH_2{=}CH$ | F | F | 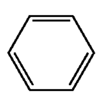 | — | 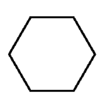 | $CH_2O$ | F | H | $OC_3H_7$ | |
| 4200 | $CH_2{=}CH$ | F | F | 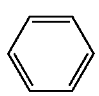 | — | 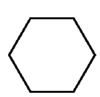 | $CH_2O$ | F | H | $OC_5H_{11}$ | |

TABLE 279

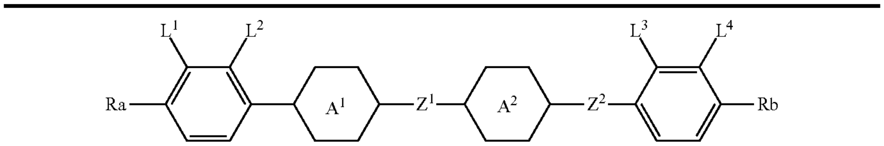

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4201 | $CH_3O$ | F | F | 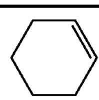 | — | 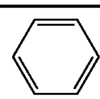 | $CH_2O$ | F | F | $OCH_3$ | |
| 4202 | $CH_3O$ | F | F | 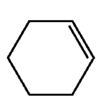 | — | 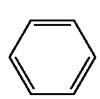 | $CH_2O$ | F | F | $OC_2H_5$ | |
| 4203 | $CH_3O$ | F | F | 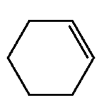 | — | 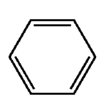 | $CH_2O$ | F | F | $OC_3H_7$ | |

TABLE 279-continued

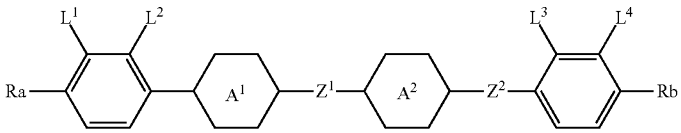

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4204 | $CH_3O$ | F | F | 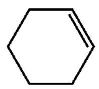 | — | 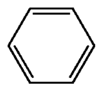 | $CH_2O$ | F | F | $OC_4H_9$ | |
| 4205 | $CH_3O$ | F | F | 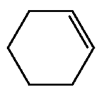 | — |  | $CH_2O$ | F | F | $OC_5H_{11}$ | |
| 4206 | $C_2H_5O$ | F | F | 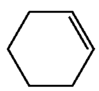 | — | 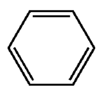 | $CH_2O$ | F | F | $OCH_3$ | |
| 4207 | $C_2H_5O$ | F | F | 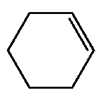 | — |  | $CH_2O$ | F | F | $OC_2H_5$ | |
| 4208 | $C_2H_5O$ | F | F | 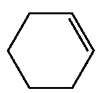 | — |  | $CH_2O$ | F | F | $OC_3H_7$ | |
| 4209 | $C_2H_5O$ | F | F | 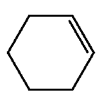 | — | 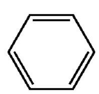 | $CH_2O$ | F | F | $OC_4H_9$ | |
| 4210 | $C_2H_5O$ | F | F | 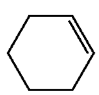 | — | 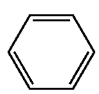 | $CH_2O$ | F | F | $OC_5H_{11}$ | |
| 4211 | $C_3H_7O$ | F | F | 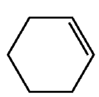 | — | 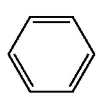 | $CH_2O$ | F | F | $OCH_3$ | |
| 4212 | $C_3H_7O$ | F | F | 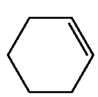 | — | 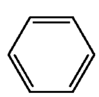 | $CH_2O$ | F | F | $OC_2H_5$ | |
| 4213 | $C_3H_7O$ | F | F | 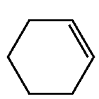 | — | 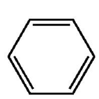 | $CH_2O$ | F | F | $OC_3H_7$ | |
| 4214 | $C_3H_7O$ | F | F | 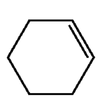 | — | 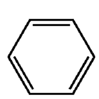 | $CH_2O$ | F | F | $OC_4H_9$ | |
| 4215 | $C_3H_7O$ | F | F | 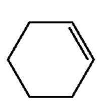 | — | 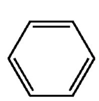 | $CH_2O$ | F | F | $OC_5H_{11}$ | |

TABLE 280
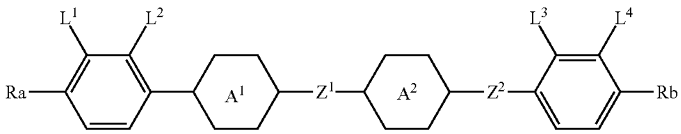
| No. | Ra | L¹ | L² | A¹ | Z¹ | A² | Z² | L³ | L⁴ | Rb | Physical property values |
|---|---|---|---|---|---|---|---|---|---|---|---|
| 4216 | $C_4H_9O$ | F | F | 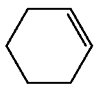 | — | 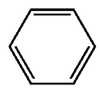 | $CH_2O$ | F | F | $OCH_3$ | |
| 4217 | $C_4H_9O$ | F | F | 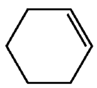 | — | 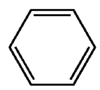 | $CH_2O$ | F | F | $OC_2H_5$ | |
| 4218 | $C_4H_9O$ | F | F | 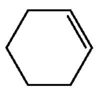 | — | 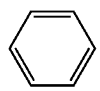 | $CH_2O$ | F | F | $OC_3H_7$ | |
| 4219 | $C_4H_9O$ | F | F | 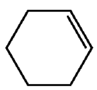 | — | 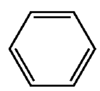 | $CH_2O$ | F | F | $OC_4H_9$ | |
| 4220 | $C_4H_9O$ | F | F | 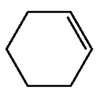 | — | 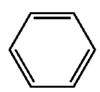 | $CH_2O$ | F | F | $OC_5H_{11}$ | |
| 4221 | $C_5H_{11}O$ | F | F | 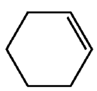 | — | 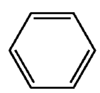 | $CH_2O$ | F | F | $OCH_3$ | |
| 4222 | $C_5H_{11}O$ | F | F | 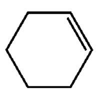 | — | 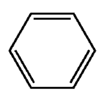 | $CH_2O$ | F | F | $OC_2H_5$ | |
| 4223 | $C_5H_{11}O$ | F | F | 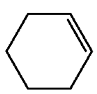 | — | 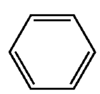 | $CH_2O$ | F | F | $OC_3H_7$ | |
| 4224 | $C_5H_{11}O$ | F | F | 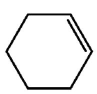 | — | 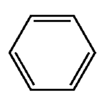 | $CH_2O$ | F | F | $OC_4H_9$ | |
| 4225 | $C_5H_{11}O$ | F | F | 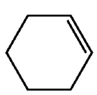 | — | 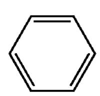 | $CH_2O$ | F | F | $OC_5H_{11}$ | |
| 4226 | $C_2H_5$ | F | F | 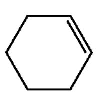 | — | 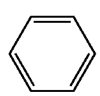 | $CH_2O$ | F | F | $C_4H_9$ | |
| 4227 | $C_5H_{11}$ | F | F | 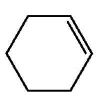 | — | 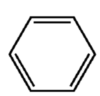 | $CH_2O$ | F | F | $C_2H_5$ | |
| 4228 | $C_2H_5$ | F | F | 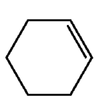 | — | 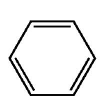 | $CH_2O$ | F | F | $OC_4H_9$ | |

TABLE 280-continued

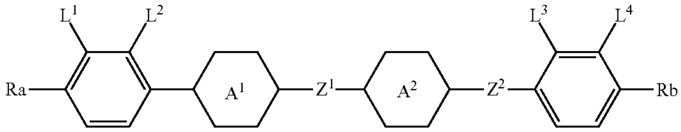

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4229 | $CH_2$═CH | F | F | 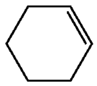 | — | 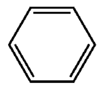 | $CH_2O$ | F | F | $OC_3H_7$ | |
| 4230 | $CH_2$═CH | F | F | 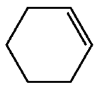 | — | 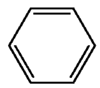 | $CH_2O$ | F | F | $OC_5H_{11}$ | |

TABLE 281

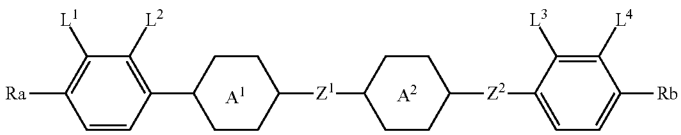

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4231 | $CH_3O$ | F | F |  | — | 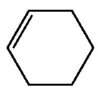 | $CH_2O$ | F | F | $OCH_3$ | |
| 4232 | $CH_3O$ | F | F | 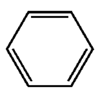 | — | 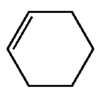 | $CH_2O$ | F | F | $OC_2H_5$ | |
| 4233 | $CH_3O$ | F | F | 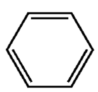 | — | 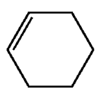 | $CH_2O$ | F | F | $OC_3H_7$ | |
| 4234 | $CH_3O$ | F | F | 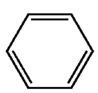 | — | 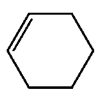 | $CH_2O$ | F | F | $OC_4H_9$ | |
| 4235 | $CH_3O$ | F | F | 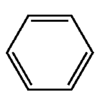 | — | 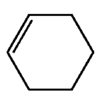 | $CH_2O$ | F | F | $OC_5H_{11}$ | |
| 4236 | $C_2H_5O$ | F | F | 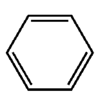 | — | 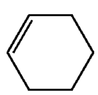 | $CH_2O$ | F | F | $OCH_3$ | |
| 4237 | $C_2H_5O$ | F | F | 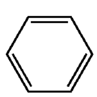 | — | 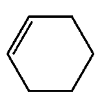 | $CH_2O$ | F | F | $OC_2H_5$ | |
| 4238 | $C_2H_5O$ | F | F | 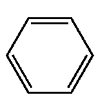 | — | 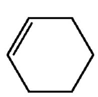 | $CH_2O$ | F | F | $OC_3H_7$ | |
| 4239 | $C_2H_5O$ | F | F | 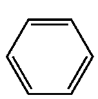 | — | 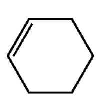 | $CH_2O$ | F | F | $OC_4H_9$ | |
| 4240 | $C_2H_5O$ | F | F | 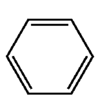 | — | 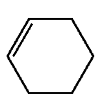 | $CH_2O$ | F | F | $OC_5H_{11}$ | |

TABLE 281-continued

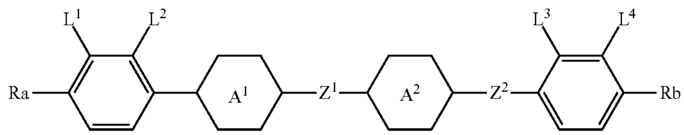

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4241 | $C_3H_7O$ | F | F | 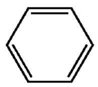 | — | 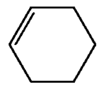 | $CH_2O$ | F | F | $OCH_3$ | |
| 4242 | $C_3H_7O$ | F | F | 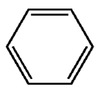 | — | 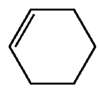 | $CH_2O$ | F | F | $OC_2H_5$ | |
| 4243 | $C_3H_7O$ | F | F | 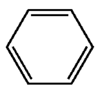 | — | 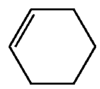 | $CH_2O$ | F | F | $OC_3H_7$ | |
| 4244 | $C_3H_7O$ | F | F | 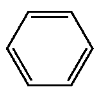 | — | 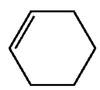 | $CH_2O$ | F | F | $OC_4H_9$ | |
| 4245 | $C_3H_7O$ | F | F |  | — | 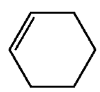 | $CH_2O$ | F | F | $OC_5H_{11}$ | |

TABLE 282

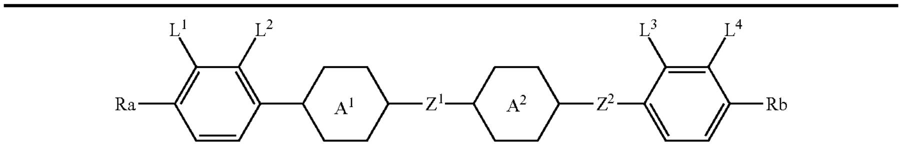

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4246 | $C_4H_9O$ | F | F | 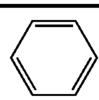 | — | 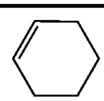 | $CH_2O$ | F | F | $OCH_3$ | |
| 4247 | $C_4H_9O$ | F | F | 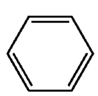 | — | 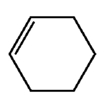 | $CH_2O$ | F | F | $OC_2H_5$ | |
| 4248 | $C_4H_9O$ | F | F | 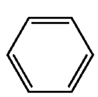 | — | 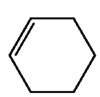 | $CH_2O$ | F | F | $OC_3H_7$ | |
| 4249 | $C_4H_9O$ | F | F | 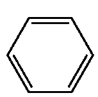 | — | 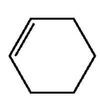 | $CH_2O$ | F | F | $OC_4H_9$ | |
| 4250 | $C_4H_9O$ | F | F | 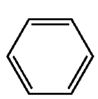 | — | 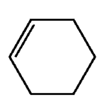 | $CH_2O$ | F | F | $OC_5H_{11}$ | |
| 4251 | $C_5H_{11}O$ | F | F | 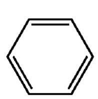 | — | 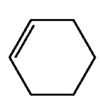 | $CH_2O$ | F | F | $OCH_3$ | |

TABLE 282-continued

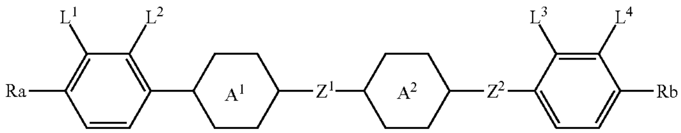

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4252 | $C_5H_{11}O$ | F | F | 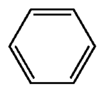 | — | 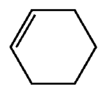 | $CH_2O$ | F | F | $OC_2H_5$ | |
| 4253 | $C_5H_{11}O$ | F | F |  | — | 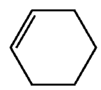 | $CH_2O$ | F | F | $OC_3H_7$ | |
| 4254 | $C_5H_{11}O$ | F | F | 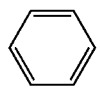 | — | 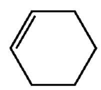 | $CH_2O$ | F | F | $OC_4H_9$ | |
| 4255 | $C_5H_{11}O$ | F | F | 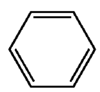 | — | 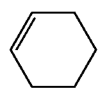 | $CH_2O$ | F | F | $OC_5H_{11}$ | |
| 4256 | $C_2H_5$ | F | F | 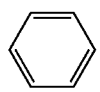 | — | 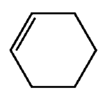 | $CH_2O$ | F | F | $C_4H_9$ | |
| 4257 | $C_5H_{11}$ | F | F | 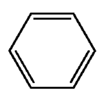 | — | 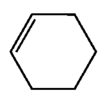 | $CH_2O$ | F | F | $C_2H_5$ | |
| 4258 | $C_2H_5$ | F | F | 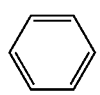 | — | 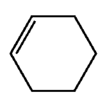 | $CH_2O$ | F | F | $OC_4H_9$ | |
| 4259 | $CH_2{=}CH$ | F | F | 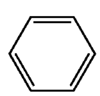 | — | 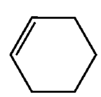 | $CH_2O$ | F | F | $OC_3H_7$ | |
| 4260 | $CH_2{=}CH$ | F | F | 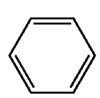 | — | 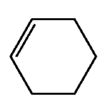 | $CH_2O$ | F | F | $OC_5H_{11}$ | |

TABLE 283

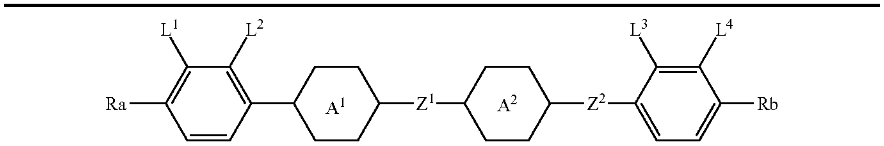

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4261 | $CH_3O$ | F | F | 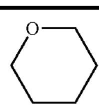 | — | 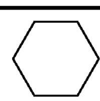 | $CH_2O$ | F | F | $OCH_3$ | |
| 4262 | $CH_3O$ | F | F | 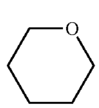 | — | 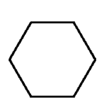 | $CH_2O$ | F | F | $OC_2H_5$ | |

TABLE 283-continued

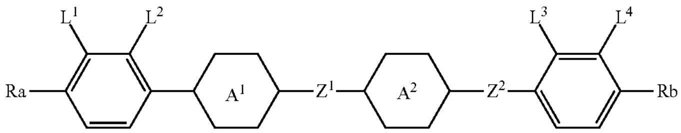

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4263 | $CH_3O$ | F | F | 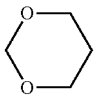 | — | 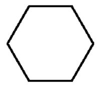 | $CH_2O$ | F | F | $OC_3H_7$ | |
| 4264 | $CH_3O$ | F | F | 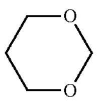 | — | 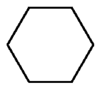 | $CH_2O$ | F | F | $OC_4H_9$ | |
| 4265 | $CH_3O$ | F | F | 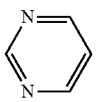 | — | 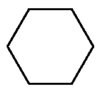 | $CH_2O$ | F | F | $OC_5H_{11}$ | |
| 4266 | $C_2H_5O$ | F | F | 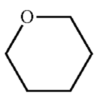 | — | 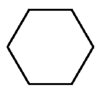 | $CH_2O$ | F | F | $OCH_3$ | |
| 4267 | $C_2H_5O$ | F | F | 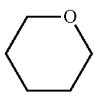 | — | 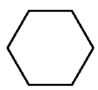 | $CH_2O$ | F | F | $OC_2H_5$ | |
| 4268 | $C_2H_5O$ | F | F | 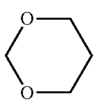 | — | 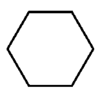 | $CH_2O$ | F | F | $OC_3H_7$ | |
| 4269 | $C_2H_5O$ | F | F | 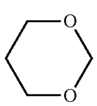 | — | 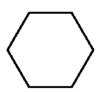 | $CH_2O$ | F | F | $OC_4H_9$ | |
| 4270 | $C_2H_5O$ | F | F | 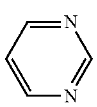 | — | 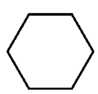 | $CH_2O$ | F | F | $OC_5H_{11}$ | |
| 4271 | $C_3H_7O$ | F | F | 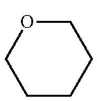 | — | 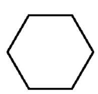 | $CH_2O$ | F | F | $OCH_3$ | |
| 4272 | $C_3H_7O$ | F | F | 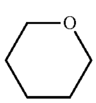 | — | 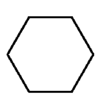 | $CH_2O$ | F | F | $OC_2H_5$ | |
| 4273 | $C_3H_7O$ | F | F | 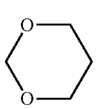 | — | 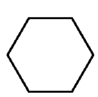 | $CH_2O$ | F | F | $OC_3H_7$ | |
| 4274 | $C_3H_7O$ | F | F | 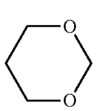 | — | 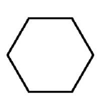 | $CH_2O$ | F | F | $OC_4H_9$ | |
| 4275 | $C_3H_7O$ | F | F | 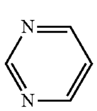 | — | 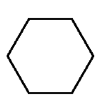 | $CH_2O$ | F | F | $OC_5H_{11}$ | |

TABLE 284

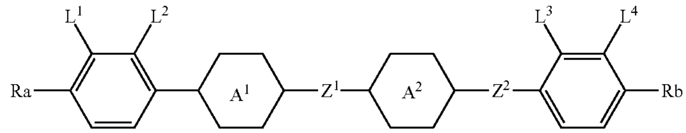

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4276 | $C_4H_9O$ | F | F | 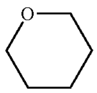 | — | 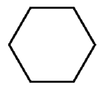 | $CH_2O$ | F | F | $OCH_3$ | |
| 4277 | $C_4H_9O$ | F | F | 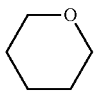 | — | 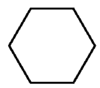 | $CH_2O$ | F | F | $OC_2H_5$ | |
| 4278 | $C_4H_9O$ | F | F | 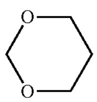 | — | 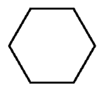 | $CH_2O$ | F | F | $OC_3H_7$ | |
| 4279 | $C_4H_9O$ | F | F | 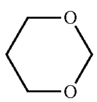 | — | 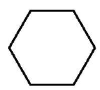 | $CH_2O$ | F | F | $OC_4H_9$ | |
| 4280 | $C_4H_9O$ | F | F | 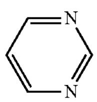 | — | 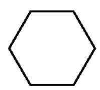 | $CH_2O$ | F | F | $OC_5H_{11}$ | |
| 4281 | $C_5H_{11}O$ | F | F | 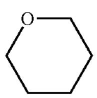 | — | 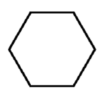 | $CH_2O$ | F | F | $OCH_3$ | |
| 4282 | $C_5H_{11}O$ | F | F | 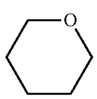 | — | 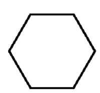 | $CH_2O$ | F | F | $OC_2H_5$ | |
| 4283 | $C_5H_{11}O$ | F | F | 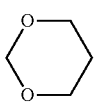 | — | 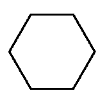 | $CH_2O$ | F | F | $OC_3H_7$ | |
| 4284 | $C_5H_{11}O$ | F | F | 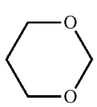 | — | 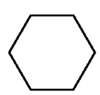 | $CH_2O$ | F | F | $OC_4H_9$ | |
| 4285 | $C_5H_{11}O$ | F | F | 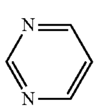 | — | 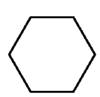 | $CH_2O$ | F | F | $OC_5H_{11}$ | |
| 4286 | $C_2H_5$ | F | F | 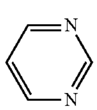 | — | 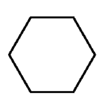 | $CH_2O$ | F | F | $C_4H_9$ | |
| 4287 | $C_5H_{11}$ | F | F | 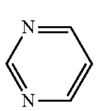 | — | 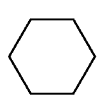 | $CH_2O$ | F | F | $C_2H_5$ | |
| 4288 | $C_2H_5$ | F | F | 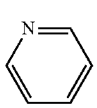 | — | 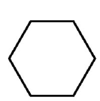 | $CH_2O$ | F | F | $OC_4H_9$ | |

TABLE 284-continued

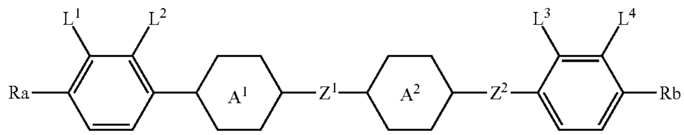

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4289 | $CH_2$═CH | F | F | 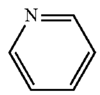 | — | 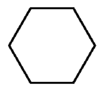 | $CH_2O$ | F | F | $OC_3H_7$ | |
| 4290 | $CH_2$═CH | F | F | 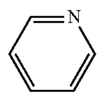 | — | 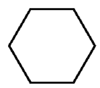 | $CH_2O$ | F | F | $OC_5H_{11}$ | |

TABLE 285

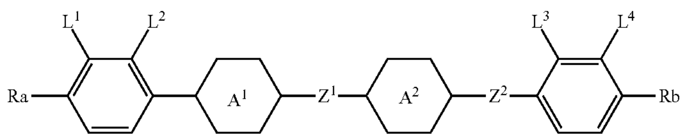

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4291 | $CH_3O$ | F | F | 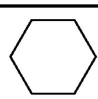 | — | 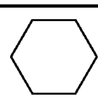 | $OCH_2$ | F | F | $OCH_3$ | |
| 4292 | $CH_3O$ | F | F | 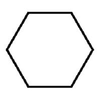 | — | 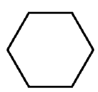 | $OCH_2$ | F | F | $OC_2H_5$ | |
| 4293 | $CH_3O$ | F | F | 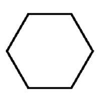 | — | 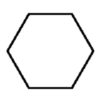 | $OCH_2$ | F | F | $OC_3H_7$ | |
| 4294 | $CH_3O$ | F | F | 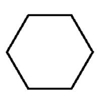 | — | 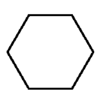 | $OCH_2$ | F | F | $OC_4H_9$ | |
| 4295 | $CH_3O$ | F | F | 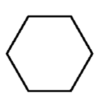 | — | 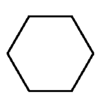 | $OCH_2$ | F | F | $OC_5H_{11}$ | |
| 4296 | $C_2H_5O$ | F | F | 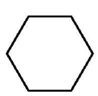 | — | 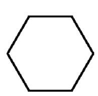 | $OCH_2$ | F | F | $OCH_3$ | |
| 4297 | $C_2H_5O$ | F | F | 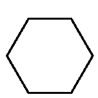 | — | 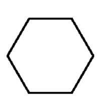 | $OCH_2$ | F | F | $OC_2H_5$ | |
| 4298 | $C_2H_5O$ | F | F | 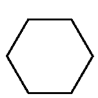 | — | 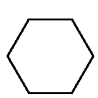 | $OCH_2$ | F | F | $OC_3H_7$ | |
| 4299 | $C_2H_5O$ | F | F | 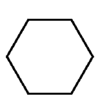 | — | 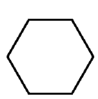 | $OCH_2$ | F | F | $OC_4H_9$ | |

TABLE 285-continued

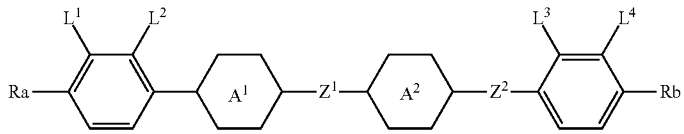

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4300 | $C_2H_5O$ | F | F | 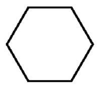 | — | 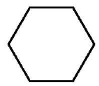 | $OCH_2$ | F | F | $OC_5H_{11}$ | |
| 4301 | $C_3H_7O$ | F | F | 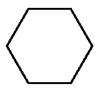 | — | 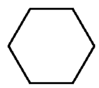 | $OCH_2$ | F | F | $OCH_3$ | |
| 4302 | $C_3H_7O$ | F | F | 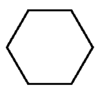 | — | 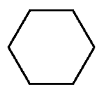 | $OCH_2$ | F | F | $OC_2H_5$ | |
| 4303 | $C_3H_7O$ | F | F | 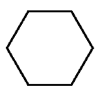 | — | 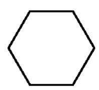 | $OCH_2$ | F | F | $OC_3H_7$ | |
| 4304 | $C_3H_7O$ | F | F | 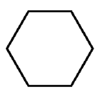 | — | 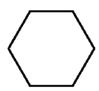 | $OCH_2$ | F | F | $OC_4H_9$ | |
| 4305 | $C_3H_7O$ | F | F | 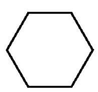 | — | 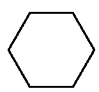 | $OCH_2$ | F | F | $OC_5H_{11}$ | |

TABLE 286

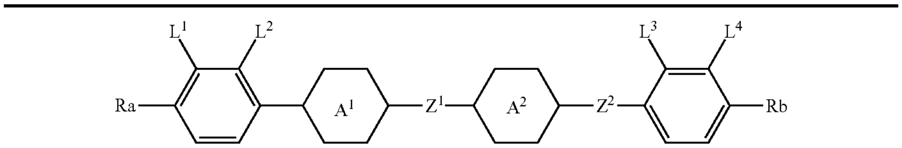

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4306 | $C_4H_9O$ | F | F | 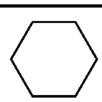 | — | 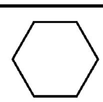 | $OCH_2$ | F | F | $OCH_3$ | |
| 4307 | $C_4H_9O$ | F | F | 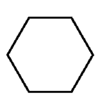 | — | 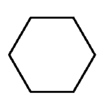 | $OCH_2$ | F | F | $OC_2H_5$ | |
| 4308 | $C_4H_9O$ | F | F | 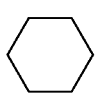 | — | 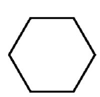 | $OCH_2$ | F | F | $OC_3H_7$ | |
| 4309 | $C_4H_9O$ | F | F | 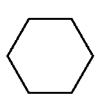 | — | 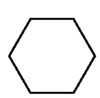 | $OCH_2$ | F | F | $OC_4H_9$ | |
| 4310 | $C_4H_9O$ | F | F | 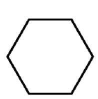 | — | 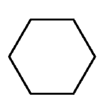 | $OCH_2$ | F | F | $OC_5H_{11}$ | |

TABLE 286-continued

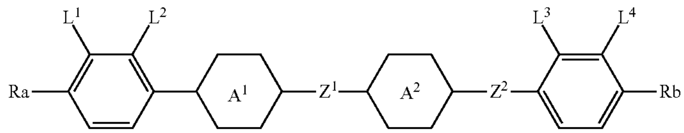

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4311 | $C_5H_{11}O$ | F | F | 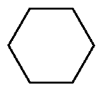 | — | 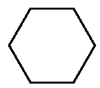 | $OCH_2$ | F | F | $OCH_3$ | |
| 4312 | $C_5H_{11}O$ | F | F | 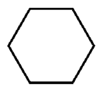 | — | 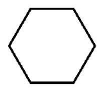 | $OCH_2$ | F | F | $OC_2H_5$ | |
| 4313 | $C_5H_{11}O$ | F | F | 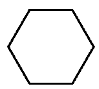 | — | 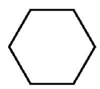 | $OCH_2$ | F | F | $OC_3H_7$ | |
| 4314 | $C_5H_{11}O$ | F | F | 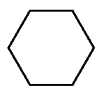 | — | 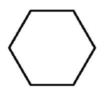 | $OCH_2$ | F | F | $OC_4H_9$ | |
| 4315 | $C_5H_{11}O$ | F | F | 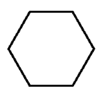 | — | 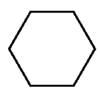 | $OCH_2$ | F | F | $OC_5H_{11}$ | |
| 4316 | $C_2H_5$ | F | F | 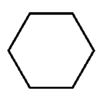 | — | 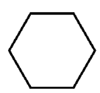 | $OCH_2$ | F | F | $C_4H_9$ | |
| 4317 | $C_5H_{11}$ | F | F | 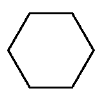 | — | 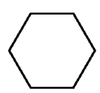 | $OCH_2$ | F | F | $C_2H_5$ | |
| 4318 | $C_2H_5$ | F | F | 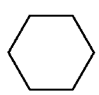 | — | 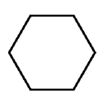 | $OCH_2$ | F | F | $OC_4H_9$ | |
| 4319 | $CH_2{=}CH$ | F | F | 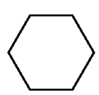 | — | 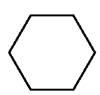 | $OCH_2$ | F | F | $OC_3H_7$ | |
| 4320 | $CH_2{=}CH$ | F | F | 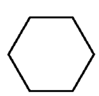 | — | 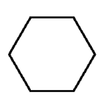 | $OCH_2$ | F | F | $OC_5H_{11}$ | |

TABLE 287

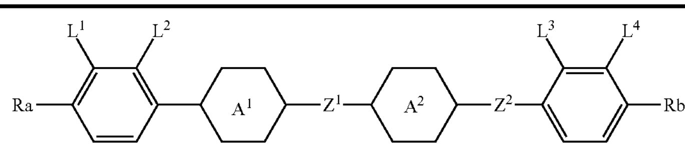

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4321 | $CH_2{=}CHO$ | F | F | 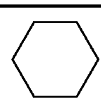 | — | 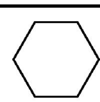 | $OCH_2$ | F | F | $OC_3H_7$ | |

TABLE 287-continued

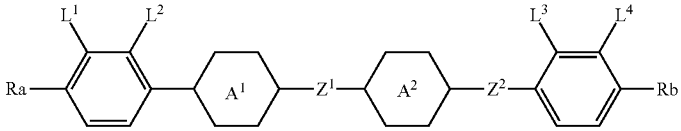

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4322 | $CH_2{=}CHCH_2O$ | F | F | 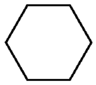 | — | 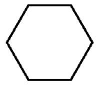 | $OCH_2$ | F | F | $OC_5H_{11}$ | |
| 4323 | $CH_2{=}CHCH_2O$ | F | F | 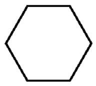 | — | 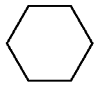 | $OCH_2$ | F | F | $OC_3H_7$ | |
| 4324 | $CH_2{=}CHC_2H_5O$ | F | F | 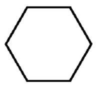 | — | 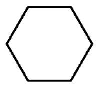 | $OCH_2$ | F | F | $OC_5H_{11}$ | |
| 4325 | $CH_2{=}CHC_2H_5O$ | F | F | 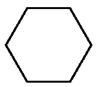 | — | 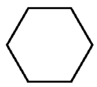 | $OCH_2$ | F | F | $OC_2H_5$ | |
| 4326 | $CH_2{=}CHC_2H_5O$ | F | F | 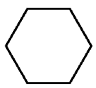 | — | 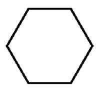 | $OCH_2$ | F | F | $OC_3H_7$ | |
| 4327 | $CH_3CH{=}CHCH_2O$ | F | F | 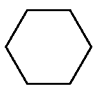 | — | 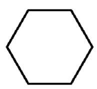 | $OCH_2$ | F | F | $OCH_3$ | |
| 4328 | $CH_3CH{=}CHCH_2O$ | F | F | 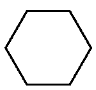 | — | 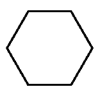 | $OCH_2$ | F | F | $OC_2H_5$ | |
| 4329 | $C_3H_7O$ | F | F | 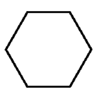 | — | 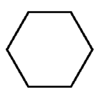 | $OCH_2$ | F | F | $OCH{=}CH_2$ | |
| 4330 | $C_3H_7O$ | F | F | 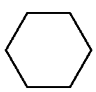 | — | 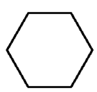 | $OCH_2$ | F | F | $OCH_2CH{=}CH_2$ | |
| 4331 | $C_4H_9O$ | F | F | 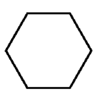 | — | 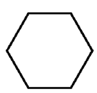 | $OCH_2$ | F | F | $OCH_2CH{=}CH_2$ | |
| 4332 | $C_5H_{11}O$ | F | F | 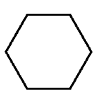 | — | 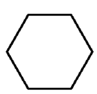 | $OCH_2$ | F | F | $OCH_2CH{=}CH_2$ | |
| 4333 | $CH_3O$ | F | F | 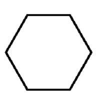 | — | 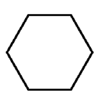 | $OCH_2$ | F | F | $OC_2H_5CH{=}CH_2$ | |
| 4334 | $C_2H_5O$ | F | F | 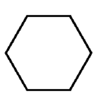 | — | 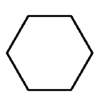 | $OCH_2$ | F | F | $OC_2H_5CH{=}CH_2$ | |
| 4335 | $C_3H_7O$ | F | F | 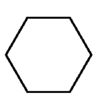 | — | 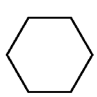 | $OCH_2$ | F | F | $OC_2H_5CH{=}CH_2$ | |

TABLE 288

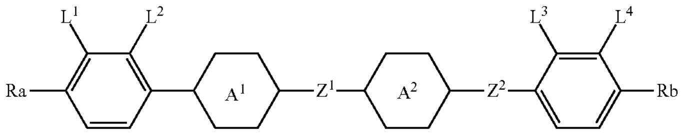

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4336 | $CH_3O$ | F | F | 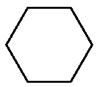 | — | 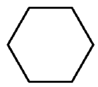 | $OCH_2$ | F | F | $OCH_2CH{=}CHCH_3$ | |
| 4337 | $C_2H_5O$ | F | F | 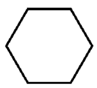 | — | 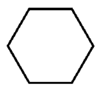 | $OCH_2$ | F | F | $OCH_2CH{=}CHCH_3$ | |
| 4338 | $C_3H_7O$ | F | F | 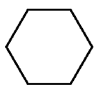 | — | 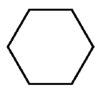 | $OCH_2$ | F | F | $OCH_2CH{=}CHCH_3$ | |
| 4339 | $CH_2{=}CHCH_2O$ | F | F | 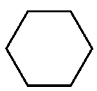 | — | 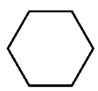 | $OCH_2$ | F | F | $OCH{=}CH_2$ | |
| 4340 | $CH_2{=}CHC_2H_5O$ | F | F | 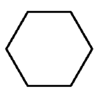 | — | 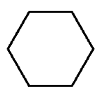 | $OCH_2$ | F | F | $OCH_2CH{=}CH_2$ | |
| 4341 | $C_3H_7OCH_2$ | F | F | 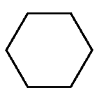 | — | 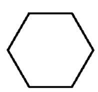 | $OCH_2$ | F | F | $OC_3H_7$ | |
| 4342 | $C_5H_{11}O$ | F | F | 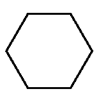 | — | 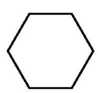 | $OCH_2$ | F | F | $OC_2H_5CH{=}CH_2$ | |
| 4343 | $C_3H_7O$ | F | F | 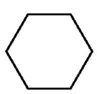 | — | 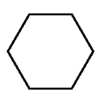 | $OCH_2$ | F | F | H | |
| 4344 | $C_5H_{11}O$ | F | F | 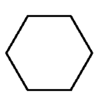 | — | 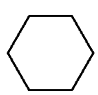 | $OCH_2$ | F | F | $OC_9H_{19}$ | |
| 4345 | $C_3H_7O$ | F | F | 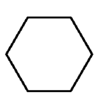 | — | 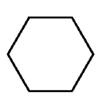 | $OCH_2$ | F | F | $C_2H_5$ | |
| 4346 | $C_5H_{11}O$ | F | F | 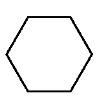 | — | 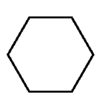 | $OCH_2$ | F | F | $C_3H_7$ | |
| 4347 | H | F | F | 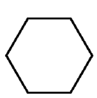 | — | 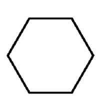 | $OCH_2$ | F | F | $OC_4H_9$ | |
| 4348 | $C_7H_{15}O$ | F | F | 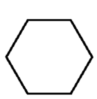 | — | 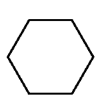 | $OCH_2$ | F | F | $OC_4H_9$ | |

TABLE 288-continued

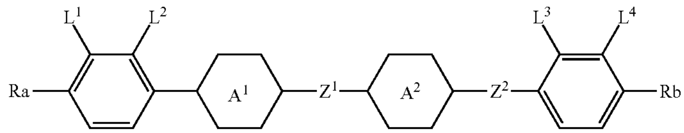

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4349 | $C_2H_5O$ | F | F | 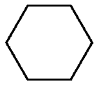 | — | 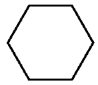 | $OCH_2$ | F | F | $OC_6H_{13}$ | |
| 4350 | $CH_3O$ | F | F | 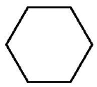 | — | 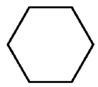 | $OCH_2$ | F | F | $C_2H_5$ | |

TABLE 289

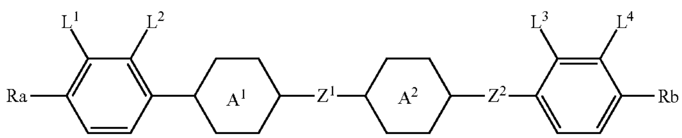

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4351 | $CH_3O$ | H | F | 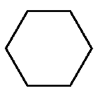 | — | 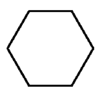 | $OCH_2$ | F | F | $OCH_3$ | |
| 4352 | $CH_3O$ | H | F | 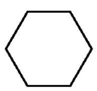 | — | 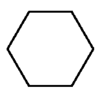 | $OCH_2$ | F | F | $OC_2H_5$ | |
| 4353 | $CH_3O$ | H | F | 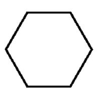 | — | 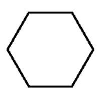 | $OCH_2$ | F | F | $OC_3H_7$ | |
| 4354 | $CH_3O$ | H | F | 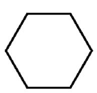 | — | 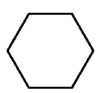 | $OCH_2$ | F | F | $OC_4H_9$ | |
| 4355 | $CH_3O$ | H | F | 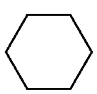 | — | 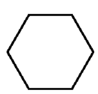 | $OCH_2$ | F | F | $OC_5H_{11}$ | |
| 4356 | $C_2H_5O$ | H | F | 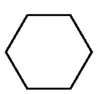 | — | 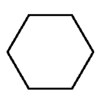 | $OCH_2$ | F | F | $OCH_3$ | |
| 4357 | $C_2H_5O$ | H | F | 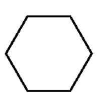 | — | 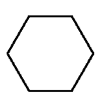 | $OCH_2$ | F | F | $OC_2H_5$ | |
| 4358 | $C_2H_5O$ | H | F | 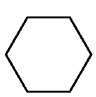 | — | 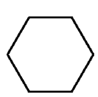 | $OCH_2$ | F | F | $OC_3H_7$ | |
| 4359 | $C_2H_5O$ | H | F | 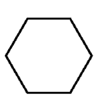 | — | 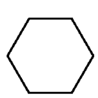 | $OCH_2$ | F | F | $OC_4H_9$ | |
| 4360 | $C_2H_5O$ | H | F | 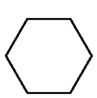 | — | 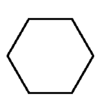 | $OCH_2$ | F | F | $OC_5H_{11}$ | |

TABLE 289-continued

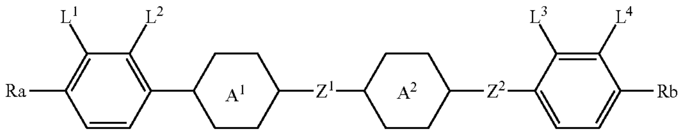

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4361 | $C_3H_7O$ | H | F | 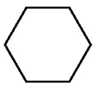 | — | 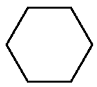 | $OCH_2$ | F | F | $OCH_3$ | |
| 4362 | $C_3H_7O$ | H | F | 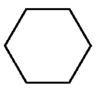 | — | 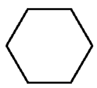 | $OCH_2$ | F | F | $OC_2H_5$ | |
| 4363 | $C_3H_7O$ | H | F | 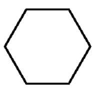 | — | 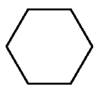 | $OCH_2$ | F | F | $OC_3H_7$ | |
| 4364 | $C_3H_7O$ | H | F | 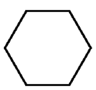 | — | 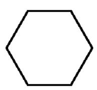 | $OCH_2$ | F | F | $OC_4H_9$ | |
| 4365 | $C_3H_7O$ | H | F | 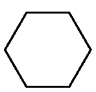 | — | 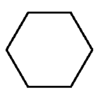 | $OCH_2$ | F | F | $OC_5H_{11}$ | |

TABLE 290

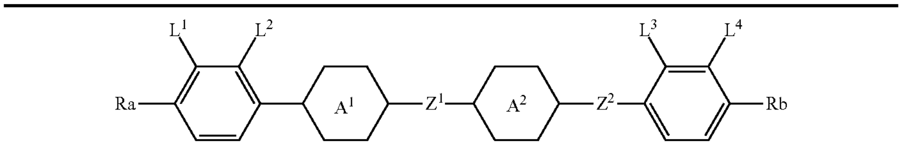

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4366 | $C_4H_9O$ | H | F | 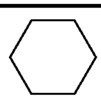 | — | 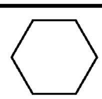 | $OCH_2$ | F | F | $OCH_3$ | |
| 4367 | $C_4H_9O$ | H | F | 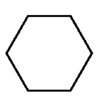 | — | 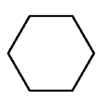 | $OCH_2$ | F | F | $OC_2H_5$ | |
| 4368 | $C_4H_9O$ | H | F | 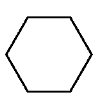 | — | 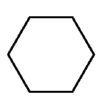 | $OCH_2$ | F | F | $OC_3H_7$ | |
| 4369 | $C_4H_9O$ | H | F | 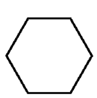 | — | 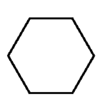 | $OCH_2$ | F | F | $OC_4H_9$ | |
| 4370 | $C_4H_9O$ | H | F | 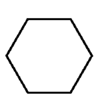 | — | 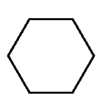 | $OCH_2$ | F | F | $OC_5H_{11}$ | |
| 4371 | $C_5H_{11}O$ | H | F | 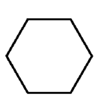 | — | 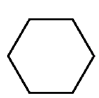 | $OCH_2$ | F | F | $OCH_3$ | |

TABLE 290-continued

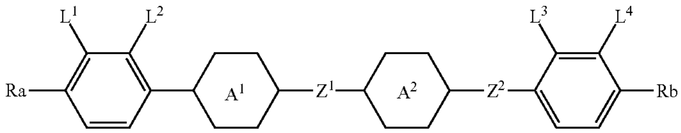

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4372 | $C_5H_{11}O$ | H | F | 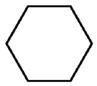 | — | 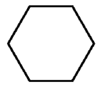 | $OCH_2$ | F | F | $OC_2H_5$ | |
| 4373 | $C_5H_{11}O$ | H | F | 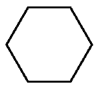 | — | 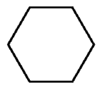 | $OCH_2$ | F | F | $OC_3H_7$ | |
| 4374 | $C_5H_{11}O$ | H | F | 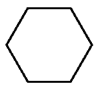 | — | 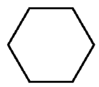 | $OCH_2$ | F | F | $OC_4H_9$ | |
| 4375 | $C_5H_{11}O$ | H | F | 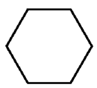 | — | 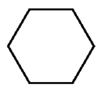 | $OCH_2$ | F | F | $OC_5H_{11}$ | |
| 4376 | $C_2H_5$ | H | F | 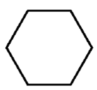 | — | 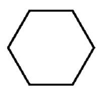 | $OCH_2$ | F | F | $C_4H_9$ | |
| 4377 | $C_5H_{11}$ | H | F | 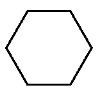 | — | 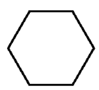 | $OCH_2$ | F | F | $C_2H_5$ | |
| 4378 | $C_2H_5$ | H | F | 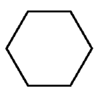 | — | 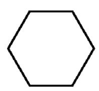 | $OCH_2$ | F | F | $OC_4H_9$ | |
| 4379 | $CH_2{=}CH$ | H | F | 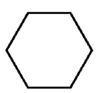 | — | 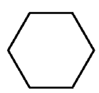 | $OCH_2$ | F | F | $OC_3H_7$ | |
| 4380 | $CH_2{=}CH$ | H | F | 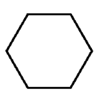 | — | 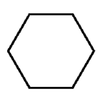 | $OCH_2$ | F | F | $OC_5H_{11}$ | |

TABLE 291

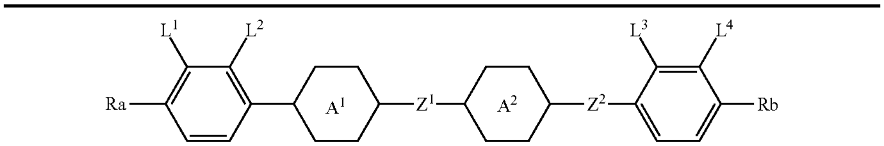

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4381 | $CH_3O$ | F | H | 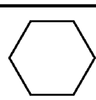 | — | 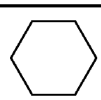 | $OCH_2$ | F | F | $OCH_3$ | |
| 4382 | $CH_3O$ | F | H | 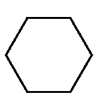 | — | 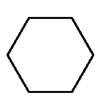 | $OCH_2$ | F | F | $OC_2H_5$ | |
| 4383 | $CH_3O$ | F | H | 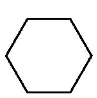 | — | 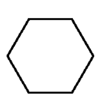 | $OCH_2$ | F | F | $OC_3H_7$ | |

TABLE 291-continued

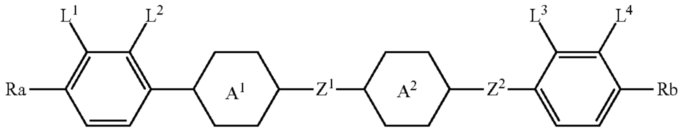

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4384 | $CH_3O$ | F | H | 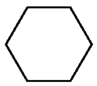 | — | 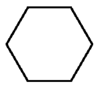 | $OCH_2$ | F | F | $OC_4H_9$ | |
| 4385 | $CH_3O$ | F | H | 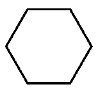 | — | 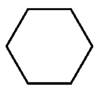 | $OCH_2$ | F | F | $OC_5H_{11}$ | |
| 4386 | $C_2H_5O$ | F | H | 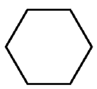 | — | 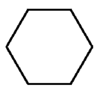 | $OCH_2$ | F | F | $OCH_3$ | |
| 4387 | $C_2H_5O$ | F | H | 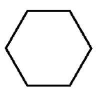 | — | 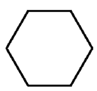 | $OCH_2$ | F | F | $OC_2H_5$ | |
| 4388 | $C_2H_5O$ | F | H | 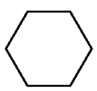 | — | 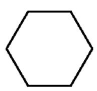 | $OCH_2$ | F | F | $OC_3H_7$ | |
| 4389 | $C_2H_5O$ | F | H | 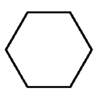 | — | 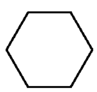 | $OCH_2$ | F | F | $OC_4H_9$ | |
| 4390 | $C_2H_5O$ | F | H | 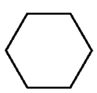 | — | 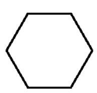 | $OCH_2$ | F | F | $OC_5H_{11}$ | |
| 4391 | $C_3H_7O$ | F | H | 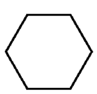 | — | 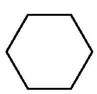 | $OCH_2$ | F | F | $OCH_3$ | |
| 4392 | $C_3H_7O$ | F | H | 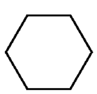 | — | 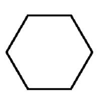 | $OCH_2$ | F | F | $OC_2H_5$ | |
| 4393 | $C_3H_7O$ | F | H | 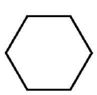 | — | 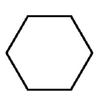 | $OCH_2$ | F | F | $OC_3H_7$ | |
| 4394 | $C_3H_7O$ | F | H | 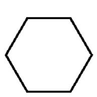 | — | 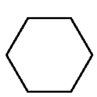 | $OCH_2$ | F | F | $OC_4H_9$ | |
| 4395 | $C_3H_7O$ | F | H | 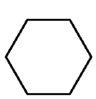 | — | 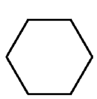 | $OCH_2$ | F | F | $OC_5H_{11}$ | |

TABLE 292

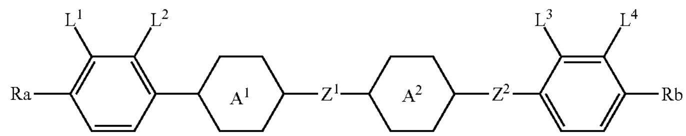

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4396 | $C_4H_9O$ | F | H | 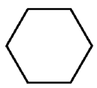 | — | 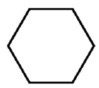 | $OCH_2$ | F | F | $OCH_3$ | |
| 4397 | $C_4H_9O$ | F | H | 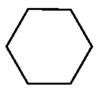 | — | 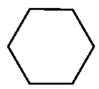 | $OCH_2$ | F | F | $OC_2H_5$ | |
| 4398 | $C_4H_9O$ | F | H | 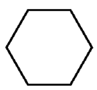 | — | 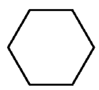 | $OCH_2$ | F | F | $OC_3H_7$ | |
| 4399 | $C_4H_9O$ | F | H | 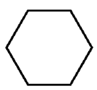 | — | 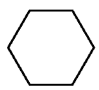 | $OCH_2$ | F | F | $OC_4H_9$ | |
| 4400 | $C_4H_9O$ | F | H | 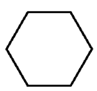 | — | 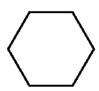 | $OCH_2$ | F | F | $OC_5H_{11}$ | |
| 4401 | $C_5H_{11}O$ | F | H | 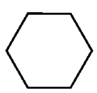 | — | 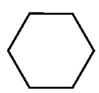 | $OCH_2$ | F | F | $OCH_3$ | |
| 4402 | $C_5H_{11}O$ | F | H | 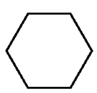 | — | 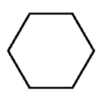 | $OCH_2$ | F | F | $OC_2H_5$ | |
| 4403 | $C_5H_{11}O$ | F | H | 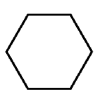 | — | 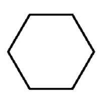 | $OCH_2$ | F | F | $OC_3H_7$ | |
| 4404 | $C_5H_{11}O$ | F | H | 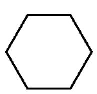 | — | 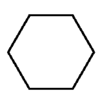 | $OCH_2$ | F | F | $OC_4H_9$ | |
| 4405 | $C_5H_{11}O$ | F | H | 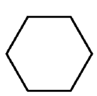 | — | 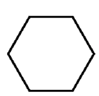 | $OCH_2$ | F | F | $OC_5H_{11}$ | |
| 4406 | $C_2H_5$ | F | H | 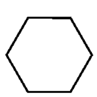 | — | 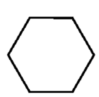 | $OCH_2$ | F | F | $C_4H_9$ | |
| 4407 | $C_5H_{11}$ | F | H | 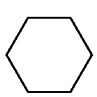 | — | 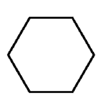 | $OCH_2$ | F | F | $C_2H_5$ | |
| 4408 | $C_2H_5$ | F | H | 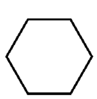 | — | 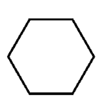 | $OCH_2$ | F | F | $OC_4H_9$ | |

TABLE 292-continued

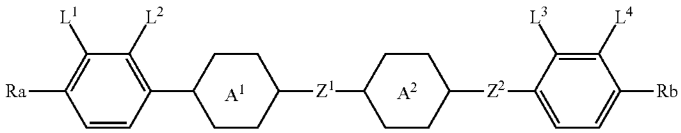

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4409 | $CH_2$=CH | F | H | 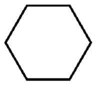 | — | 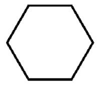 | $OCH_2$ | F | F | $OC_3H_7$ | |
| 4410 | $CH_2$=CH | F | H | 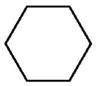 | — | 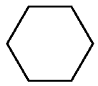 | $OCH_2$ | F | F | $OC_5H_{11}$ | |

TABLE 293

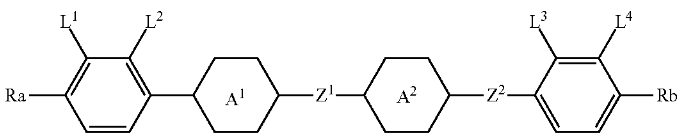

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4411 | $CH_3O$ | F | F | 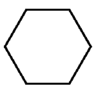 | — | 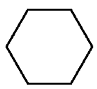 | $OCH_2$ | H | F | $OCH_3$ | |
| 4412 | $CH_3O$ | F | F | 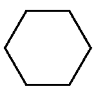 | — | 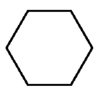 | $OCH_2$ | H | F | $OC_2H_5$ | |
| 4413 | $CH_3O$ | F | F | 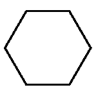 | — | 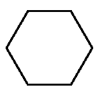 | $OCH_2$ | H | F | $OC_3H_7$ | |
| 4414 | $CH_3O$ | F | F | 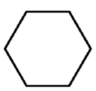 | — | 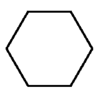 | $OCH_2$ | H | F | $OC_4H_9$ | |
| 4415 | $CH_3O$ | F | F | 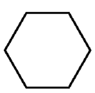 | — | 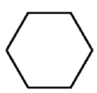 | $OCH_2$ | H | F | $OC_5H_{11}$ | |
| 4416 | $C_2H_5O$ | F | F | 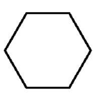 | — | 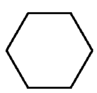 | $OCH_2$ | H | F | $OCH_3$ | |
| 4417 | $C_2H_5O$ | F | F | 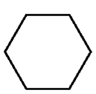 | — | 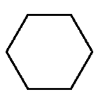 | $OCH_2$ | H | F | $OC_2H_5$ | |
| 4418 | $C_2H_5O$ | F | F | 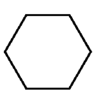 | — | 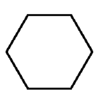 | $OCH_2$ | H | F | $OC_3H_7$ | |
| 4419 | $C_2H_5O$ | F | F | 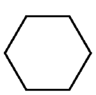 | — | 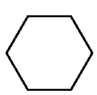 | $OCH_2$ | H | F | $OC_4H_9$ | |
| 4420 | $C_2H_5O$ | F | F | 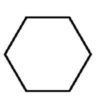 | — | 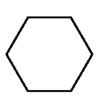 | $OCH_2$ | H | F | $OC_5H_{11}$ | |

TABLE 293-continued

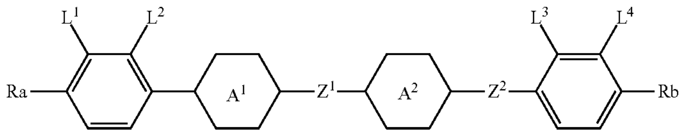

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4421 | $C_3H_7O$ | F | F | 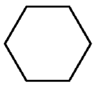 | — | 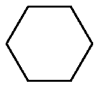 | $OCH_2$ | H | F | $OCH_3$ | |
| 4422 | $C_3H_7O$ | F | F | 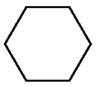 | — | 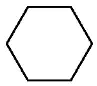 | $OCH_2$ | H | F | $OC_2H_5$ | |
| 4423 | $C_3H_7O$ | F | F | 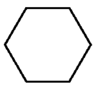 | — | 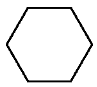 | $OCH_2$ | H | F | $OC_3H_7$ | |
| 4424 | $C_3H_7O$ | F | F | 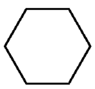 | — | 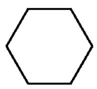 | $OCH_2$ | H | F | $OC_4H_9$ | |
| 4425 | $C_3H_7O$ | F | F | 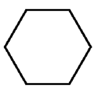 | — | 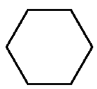 | $OCH_2$ | H | F | $OC_5H_{11}$ | |

TABLE 294

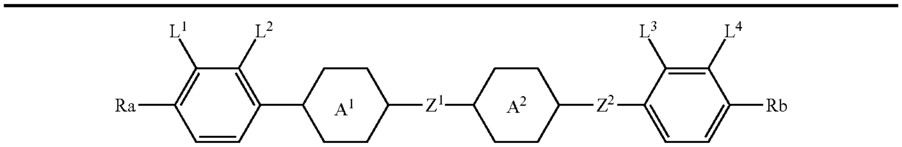

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4426 | $C_4H_9O$ | F | F | 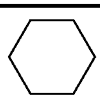 | — | 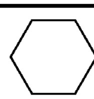 | $OCH_2$ | H | F | $OCH_3$ | |
| 4427 | $C_4H_9O$ | F | F | 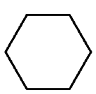 | — | 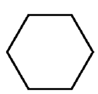 | $OCH_2$ | H | F | $OC_2H_5$ | |
| 4428 | $C_4H_9O$ | F | F | 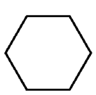 | — | 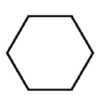 | $OCH_2$ | H | F | $OC_3H_7$ | |
| 4429 | $C_4H_9O$ | F | F | 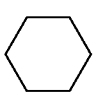 | — | 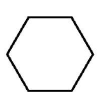 | $OCH_2$ | H | F | $OC_4H_9$ | |
| 4430 | $C_4H_9O$ | F | F | 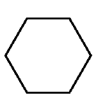 | — | 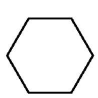 | $OCH_2$ | H | F | $OC_5H_{11}$ | |
| 4431 | $C_5H_{11}O$ | F | F | 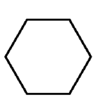 | — | 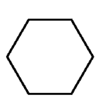 | $OCH_2$ | H | F | $OCH_3$ | |

TABLE 294-continued

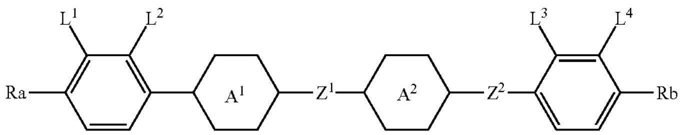

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4432 | $C_5H_{11}O$ | F | F | 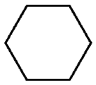 | — | 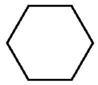 | $OCH_2$ | H | F | $OC_2H_5$ | |
| 4433 | $C_5H_{11}O$ | F | F | 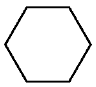 | — | 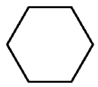 | $OCH_2$ | H | F | $OC_3H_7$ | |
| 4434 | $C_5H_{11}O$ | F | F | 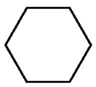 | — | 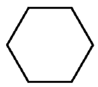 | $OCH_2$ | H | F | $OC_4H_9$ | |
| 4435 | $C_5H_{11}O$ | F | F | 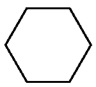 | — | 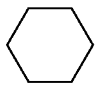 | $OCH_2$ | H | F | $OC_5H_{11}$ | |
| 4436 | $C_2H_5$ | F | F | 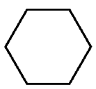 | — | 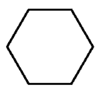 | $OCH_2$ | H | F | $C_4H_9$ | |
| 4437 | $C_5H_{11}$ | F | F | 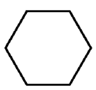 | — | 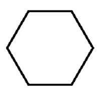 | $OCH_2$ | H | F | $C_2H_5$ | |
| 4438 | $C_2H_5$ | F | F | 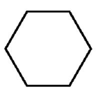 | — | 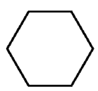 | $OCH_2$ | H | F | $OC_4H_9$ | |
| 4439 | $CH_2{=}CH$ | F | F | 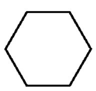 | — | 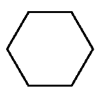 | $OCH_2$ | H | F | $OC_3H_7$ | |
| 4440 | $CH_2{=}CH$ | F | F | 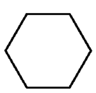 | — | 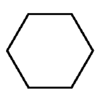 | $OCH_2$ | H | F | $OC_5H_{11}$ | |

TABLE 295

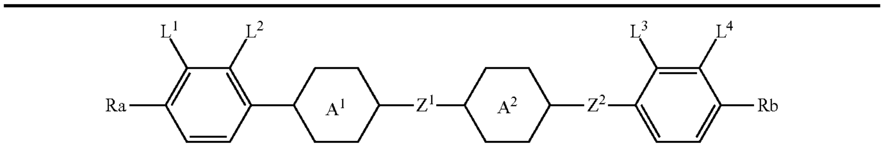

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4441 | $CH_3O$ | F | F | 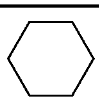 | — | 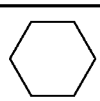 | $OCH_2$ | F | H | $OCH_3$ | |
| 4442 | $CH_3O$ | F | F | 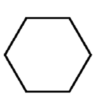 | — | 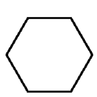 | $OCH_2$ | F | H | $OC_2H_5$ | |

TABLE 295-continued

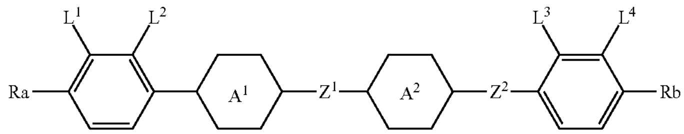

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4443 | $CH_3O$ | F | F | 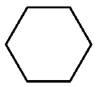 | — | 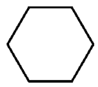 | $OCH_2$ | F | H | $OC_3H_7$ | |
| 4444 | $CH_3O$ | F | F | 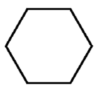 | — | 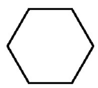 | $OCH_2$ | F | H | $OC_4H_9$ | |
| 4445 | $CH_3O$ | F | F | 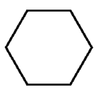 | — | 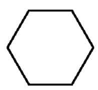 | $OCH_2$ | F | H | $OC_5H_{11}$ | |
| 4446 | $C_2H_5O$ | F | F | 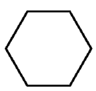 | — | 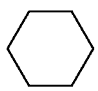 | $OCH_2$ | F | H | $OCH_3$ | |
| 4447 | $C_2H_5O$ | F | F | 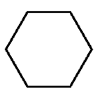 | — | 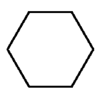 | $OCH_2$ | F | H | $OC_2H_5$ | |
| 4448 | $C_2H_5O$ | F | F | 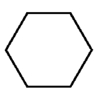 | — | 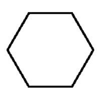 | $OCH_2$ | F | H | $OC_3H_7$ | |
| 4449 | $C_2H_5O$ | F | F | 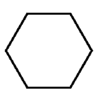 | — | 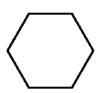 | $OCH_2$ | F | H | $OC_4H_9$ | |
| 4450 | $C_2H_5O$ | F | F | 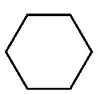 | — | 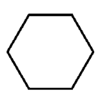 | $OCH_2$ | F | H | $OC_5H_{11}$ | |
| 4451 | $C_3H_7O$ | F | F | 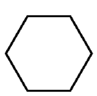 | — | 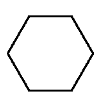 | $OCH_2$ | F | H | $OCH_3$ | |
| 4452 | $C_3H_7O$ | F | F | 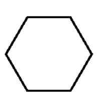 | — | 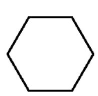 | $OCH_2$ | F | H | $OC_2H_5$ | |
| 4453 | $C_3H_7O$ | F | F | 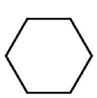 | — | 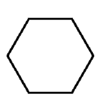 | $OCH_2$ | F | H | $OC_3H_7$ | |
| 4454 | $C_3H_7O$ | F | F | 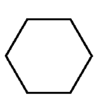 | — | 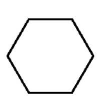 | $OCH_2$ | F | H | $OC_4H_9$ | |
| 4455 | $C_3H_7O$ | F | F | 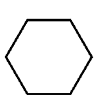 | — | 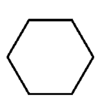 | $OCH_2$ | F | H | $OC_5H_{11}$ | |

TABLE 296

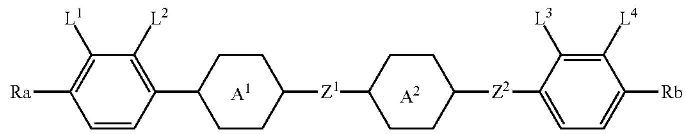

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4456 | $C_4H_9O$ | F | F | 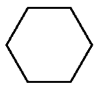 | — | 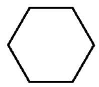 | $OCH_2$ | F | H | $OCH_3$ | |
| 4457 | $C_4H_9O$ | F | F | 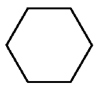 | — | 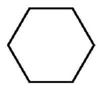 | $OCH_2$ | F | H | $OC_2H_5$ | |
| 4458 | $C_4H_9O$ | F | F | 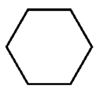 | — | 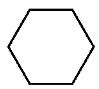 | $OCH_2$ | F | H | $OC_3H_7$ | |
| 4459 | $C_4H_9O$ | F | F | 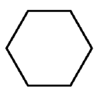 | — | 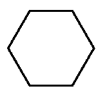 | $OCH_2$ | F | H | $OC_4H_9$ | |
| 4460 | $C_4H_9O$ | F | F | 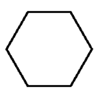 | — | 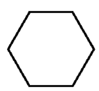 | $OCH_2$ | F | H | $OC_5H_{11}$ | |
| 4461 | $C_5H_{11}O$ | F | F | 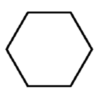 | — | 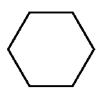 | $OCH_2$ | F | H | $OCH_3$ | |
| 4462 | $C_5H_{11}O$ | F | F | 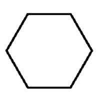 | — | 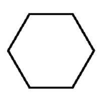 | $OCH_2$ | F | H | $OC_2H_5$ | |
| 4463 | $C_5H_{11}O$ | F | F | 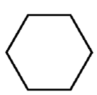 | — | 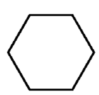 | $OCH_2$ | F | H | $OC_3H_7$ | |
| 4464 | $C_5H_{11}O$ | F | F | 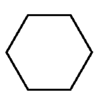 | — | 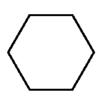 | $OCH_2$ | F | H | $OC_4H_9$ | |
| 4465 | $C_5H_{11}O$ | F | F | 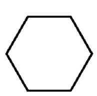 | — | 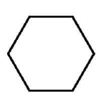 | $OCH_2$ | F | H | $OC_5H_{11}$ | |
| 4466 | $C_2H_5$ | F | F | 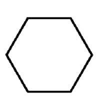 | — | 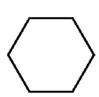 | $OCH_2$ | F | H | $C_4H_9$ | |
| 4467 | $C_5H_{11}$ | F | F | 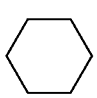 | — | 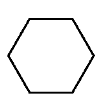 | $OCH_2$ | F | H | $C_2H_5$ | |
| 4468 | $C_2H_5$ | F | F | 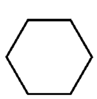 | — | 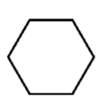 | $OCH_2$ | F | H | $OC_4H_9$ | |

TABLE 296-continued

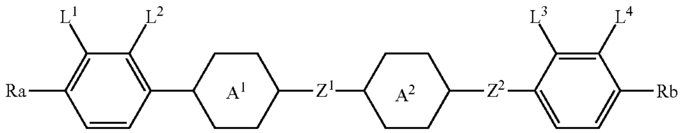

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4469 | $CH_2$=CH | F | F | 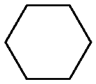 | — | 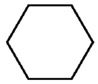 | $OCH_2$ | F | H | $OC_3H_7$ | |
| 4470 | $CH_2$=CH | F | F | 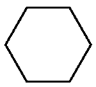 | — | 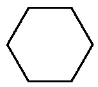 | $OCH_2$ | F | H | $OC_5H_{11}$ | |

TABLE 297

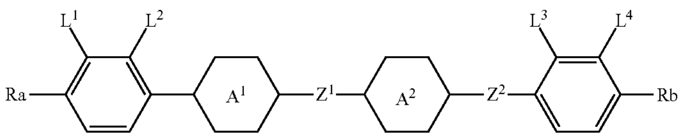

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4471 | $CH_3O$ | F | F | 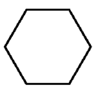 | — | 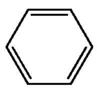 | $OCH_2$ | F | F | $OCH_3$ | |
| 4472 | $CH_3O$ | F | F | 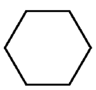 | — |  | $OCH_2$ | F | F | $OC_2H_5$ | |
| 4473 | $CH_3O$ | F | F | 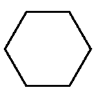 | — |  | $OCH_2$ | F | F | $OC_3H_7$ | |
| 4474 | $CH_3O$ | F | F | 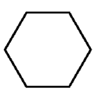 | — |  | $OCH_2$ | F | F | $OC_4H_9$ | |
| 4475 | $CH_3O$ | F | F | 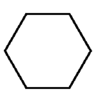 | — | 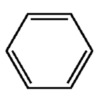 | $OCH_2$ | F | F | $OC_5H_{11}$ | |
| 4476 | $C_2H_5O$ | F | F | 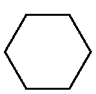 | — | 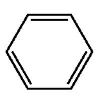 | $OCH_2$ | F | F | $OCH_3$ | |
| 4477 | $C_2H_5O$ | F | F | 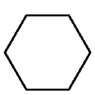 | — | 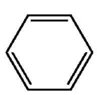 | $OCH_2$ | F | F | $OC_2H_5$ | |
| 4478 | $C_2H_5O$ | F | F | 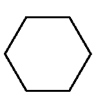 | — | 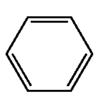 | $OCH_2$ | F | F | $OC_3H_7$ | |
| 4479 | $C_2H_5O$ | F | F | 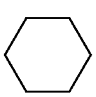 | — | 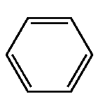 | $OCH_2$ | F | F | $OC_4H_9$ | |

TABLE 297-continued

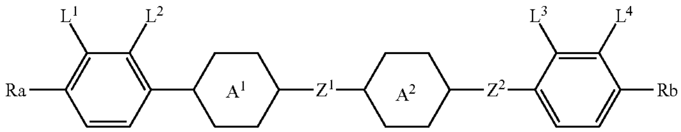

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4480 | $C_2H_5O$ | F | F | 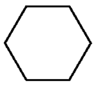 | — | 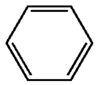 | $OCH_2$ | F | F | $OC_5H_{11}$ | |
| 4481 | $C_3H_7O$ | F | F | 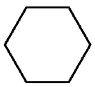 | — | 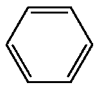 | $OCH_2$ | F | F | $OCH_3$ | |
| 4482 | $C_3H_7O$ | F | F | 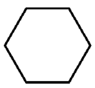 | — | 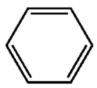 | $OCH_2$ | F | F | $OC_2H_5$ | |
| 4483 | $C_3H_7O$ | F | F | 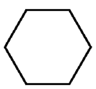 | — | 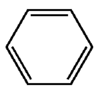 | $OCH_2$ | F | F | $OC_3H_7$ | |
| 4484 | $C_3H_7O$ | F | F | 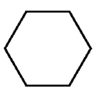 | — |  | $OCH_2$ | F | F | $OC_4H_9$ | |
| 4485 | $C_3H_7O$ | F | F | 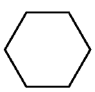 | — |  | $OCH_2$ | F | F | $OC_5H_{11}$ | |

TABLE 298

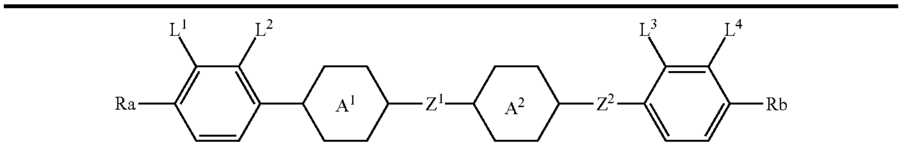

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4486 | $C_4H_9O$ | F | F | 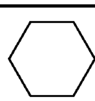 | — | 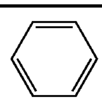 | $OCH_2$ | F | F | $OCH_3$ | |
| 4487 | $C_4H_9O$ | F | F | 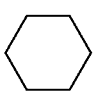 | — | 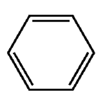 | $OCH_2$ | F | F | $OC_2H_5$ | |
| 4488 | $C_4H_9O$ | F | F | 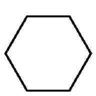 | — | 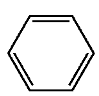 | $OCH_2$ | F | F | $OC_3H_7$ | |
| 4489 | $C_4H_9O$ | F | F | 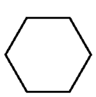 | — | 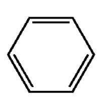 | $OCH_2$ | F | F | $OC_4H_9$ | |
| 4490 | $C_4H_9O$ | F | F | 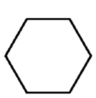 | — | 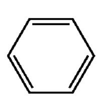 | $OCH_2$ | F | F | $OC_5H_{11}$ | |

TABLE 298-continued

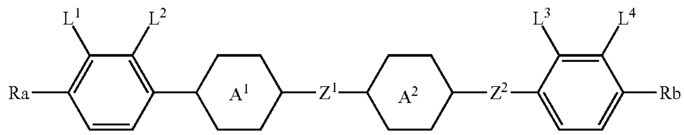

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4491 | $C_5H_{11}O$ | F | F | 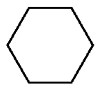 | — | 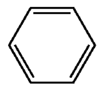 | $OCH_2$ | F | F | $OCH_3$ | |
| 4492 | $C_5H_{11}O$ | F | F | 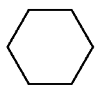 | — |  | $OCH_2$ | F | F | $OC_2H_5$ | |
| 4493 | $C_5H_{11}O$ | F | F | 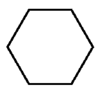 | — |  | $OCH_2$ | F | F | $OC_3H_7$ | |
| 4494 | $C_5H_{11}O$ | F | F | 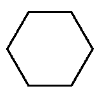 | — | 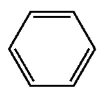 | $OCH_2$ | F | F | $OC_4H_9$ | |
| 4495 | $C_5H_{11}O$ | F | F | 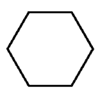 | — | 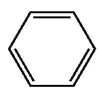 | $OCH_2$ | F | F | $OC_5H_{11}$ | |
| 4496 | $C_2H_5$ | F | F | 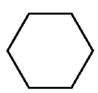 | — | 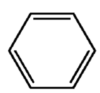 | $OCH_2$ | F | F | $C_4H_9$ | |
| 4497 | $C_5H_{11}$ | F | F | 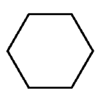 | — | 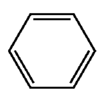 | $OCH_2$ | F | F | $C_2H_5$ | |
| 4498 | $C_2H_5$ | F | F | 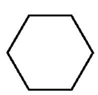 | — | 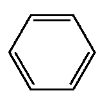 | $OCH_2$ | F | F | $OC_4H_9$ | |
| 4499 | $CH_2{=}CH$ | F | F | 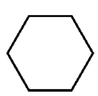 | — | 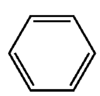 | $OCH_2$ | F | F | $OC_3H_7$ | |
| 4500 | $CH_2{=}CH$ | F | F | 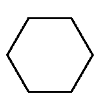 | — | 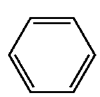 | $OCH_2$ | F | F | $OC_5H_{11}$ | |

TABLE 299

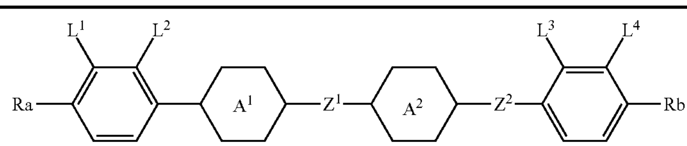

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4501 | $CH_2{=}CHO$ | F | F | 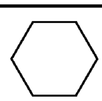 | — | 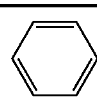 | $OCH_2$ | F | F | $OC_3H_7$ | |

TABLE 299-continued

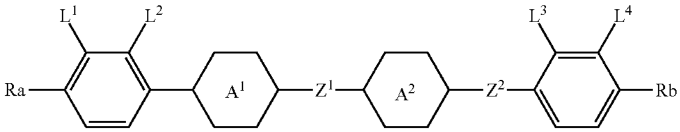

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4502 | $CH_2$═$CHCH_2O$ | F | F | 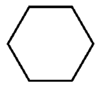 | — | 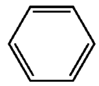 | $OCH_2$ | F | F | $OC_5H_{11}$ | |
| 4503 | $CH_2$═$CHCH_2O$ | F | F | 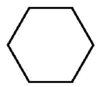 | — | 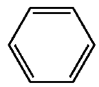 | $OCH_2$ | F | F | $OC_3H_7$ | |
| 4504 | $CH_2$═$CHC_2H_5O$ | F | F | 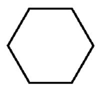 | — | 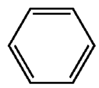 | $OCH_2$ | F | F | $OC_5H_{11}$ | |
| 4505 | $CH_2$═$CHC_2H_5O$ | F | F | 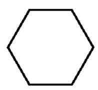 | — | 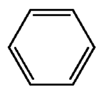 | $OCH_2$ | F | F | $OC_2H_5$ | |
| 4506 | $CH_2$═$CHC_2H_5O$ | F | F | 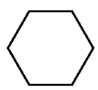 | — | 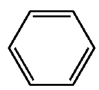 | $OCH_2$ | F | F | $OC_3H_7$ | |
| 4507 | $CH_3CH$═$CHCH_2O$ | F | F | 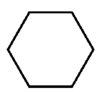 | — | 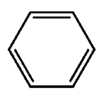 | $OCH_2$ | F | F | $OCH_3$ | |
| 4508 | $CH_3CH$═$CHCH_2O$ | F | F | 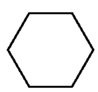 | — | 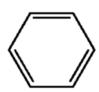 | $OCH_2$ | F | F | $OC_2H_5$ | |
| 4509 | $C_3H_7O$ | F | F | 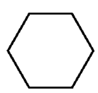 | — | 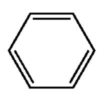 | $OCH_2$ | F | F | $OCH$═$CH_2$ | |
| 4510 | $C_3H_7O$ | F | F | 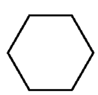 | — | 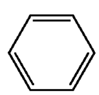 | $OCH_2$ | F | F | $OCH_2CH$═$CH_2$ | |
| 4511 | $C_4H_9O$ | F | F | 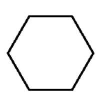 | — | 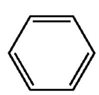 | $OCH_2$ | F | F | $OCH_2CH$═$CH_2$ | |
| 4512 | $C_5H_{11}O$ | F | F | 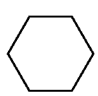 | — | 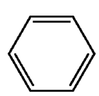 | $OCH_2$ | F | F | $OCH_2CH$═$CH_2$ | |
| 4513 | $CH_3O$ | F | F | 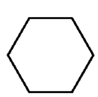 | — | 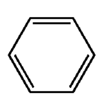 | $OCH_2$ | F | F | $OC_2H_5CH$═$CH_2$ | |
| 4514 | $C_2H_5O$ | F | F | 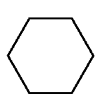 | — | 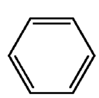 | $OCH_2$ | F | F | $OC_2H_5CH$═$CH_2$ | |
| 4515 | $C_3H_7O$ | F | F | 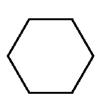 | — | 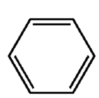 | $OCH_2$ | F | F | $OC_2H_5CH$═$CH_2$ | |

TABLE 300

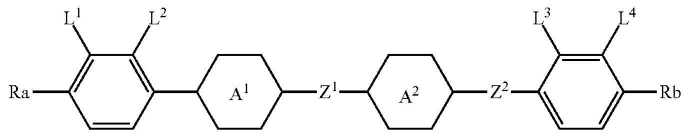

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4516 | $CH_3O$ | F | F | 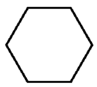 | — | 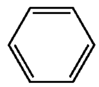 | $OCH_2$ | F | F | $OCH_2CH{=}CHCH_3$ | |
| 4517 | $C_2H_5O$ | F | F | 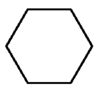 | — | 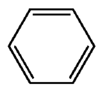 | $OCH_2$ | F | F | $OCH_2CH{=}CHCH_3$ | |
| 4518 | $C_3H_7O$ | F | F | 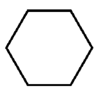 | — | 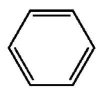 | $OCH_2$ | F | F | $OCH_2CH{=}CHCH_3$ | |
| 4519 | $CH_2{=}CHCH_2O$ | F | F | 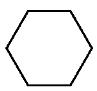 | — | 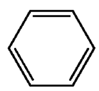 | $OCH_2$ | F | F | $OCH{=}CH_2$ | |
| 4520 | $CH_2{=}CHC_2H_5O$ | F | F | 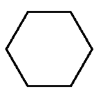 | — | 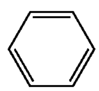 | $OCH_2$ | F | F | $OCH_2CH{=}CH_2$ | |
| 4521 | $C_3H_7OCH_2$ | F | F | 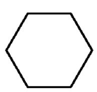 | — | 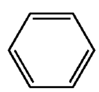 | $OCH_2$ | F | F | $OC_3H_7$ | |
| 4522 | $C_5H_{11}O$ | F | F | 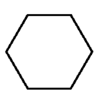 | — | 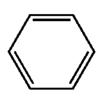 | $OCH_2$ | F | F | $OC_2H_5CH{=}CH_2$ | |
| 4523 | $C_3H_7O$ | F | F | 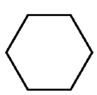 | — | 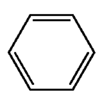 | $OCH_2$ | F | F | H | |
| 4524 | $C_5H_{11}O$ | F | F | 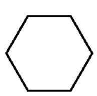 | — | 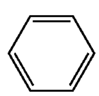 | $OCH_2$ | F | F | $OC_9H_{19}$ | |
| 4525 | $C_3H_7O$ | F | F | 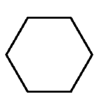 | — | 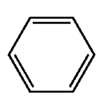 | $OCH_2$ | F | F | $C_2H_5$ | |
| 4526 | $C_5H_{11}O$ | F | F | 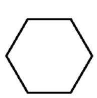 | — | 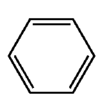 | $OCH_2$ | F | F | $C_3H_7$ | |
| 4527 | H | F | F | 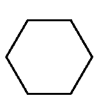 | — | 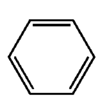 | $OCH_2$ | F | F | $OC_4H_9$ | |
| 4528 | $C_7H_{15}O$ | F | F | 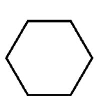 | — | 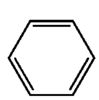 | $OCH_2$ | F | F | $OC_4H_9$ | |

TABLE 300-continued

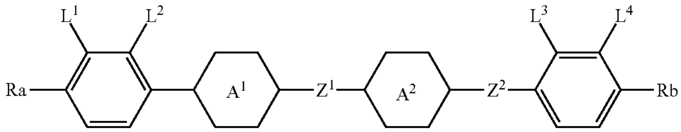

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4529 | $C_2H_5O$ | F | F | 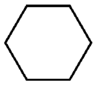 | — | 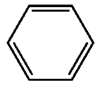 | $OCH_2$ | F | F | $OC_6H_{13}$ | |
| 4530 | $CH_3O$ | F | F | 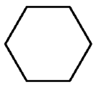 | — | 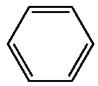 | $OCH_2$ | F | F | $C_2H_5$ | |

TABLE 301

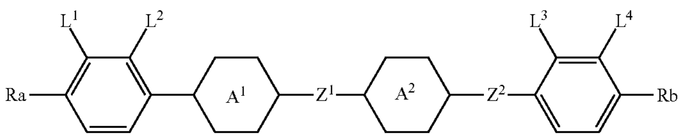

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4531 | $CH_3O$ | H | F | 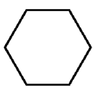 | — | 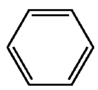 | $OCH_2$ | F | F | $OCH_3$ | |
| 4532 | $CH_3O$ | H | F | 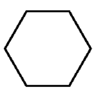 | — |  | $OCH_2$ | F | F | $OC_2H_5$ | |
| 4533 | $CH_3O$ | H | F | 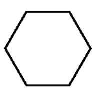 | — | 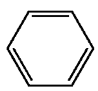 | $OCH_2$ | F | F | $OC_3H_7$ | |
| 4534 | $CH_3O$ | H | F | 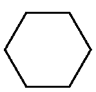 | — |  | $OCH_2$ | F | F | $OC_4H_9$ | |
| 4535 | $CH_3O$ | H | F | 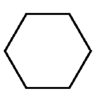 | — | 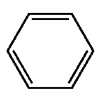 | $OCH_2$ | F | F | $OC_5H_{11}$ | |
| 4536 | $C_2H_5O$ | H | F | 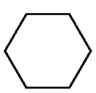 | — | 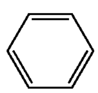 | $OCH_2$ | F | F | $OCH_3$ | |
| 4537 | $C_2H_5O$ | H | F | 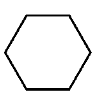 | — | 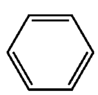 | $OCH_2$ | F | F | $OC_2H_5$ | |
| 4538 | $C_2H_5O$ | H | F | 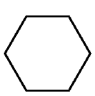 | — | 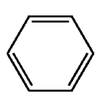 | $OCH_2$ | F | F | $OC_3H_7$ | |
| 4539 | $C_2H_5O$ | H | F | 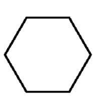 | — | 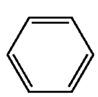 | $OCH_2$ | F | F | $OC_4H_9$ | |
| 4540 | $C_2H_5O$ | H | F | 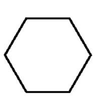 | — | 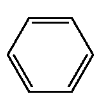 | $OCH_2$ | F | F | $OC_5H_{11}$ | |

TABLE 301-continued

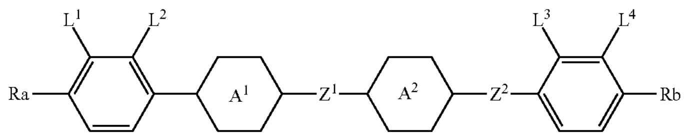

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4541 | $C_3H_7O$ | H | F | 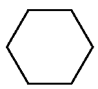 | — | 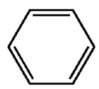 | $OCH_2$ | F | F | $OCH_3$ | |
| 4542 | $C_3H_7O$ | H | F | 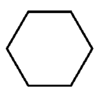 | — | 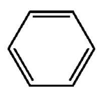 | $OCH_2$ | F | F | $OC_2H_5$ | |
| 4543 | $C_3H_7O$ | H | F | 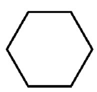 | — | 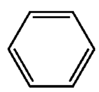 | $OCH_2$ | F | F | $OC_3H_7$ | |
| 4544 | $C_3H_7O$ | H | F | 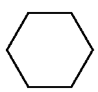 | — |  | $OCH_2$ | F | F | $OC_4H_9$ | |
| 4545 | $C_3H_7O$ | H | F | 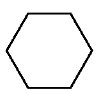 | — | 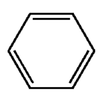 | $OCH_2$ | F | F | $OC_5H_{11}$ | |

TABLE 302

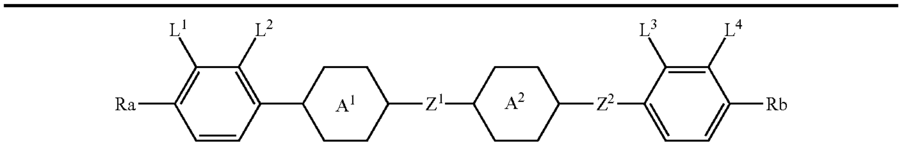

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4546 | $C_4H_9O$ | H | F | 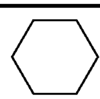 | — | 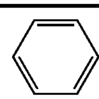 | $OCH_2$ | F | F | $OCH_3$ | |
| 4547 | $C_4H_9O$ | H | F | 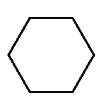 | — | 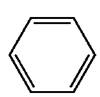 | $OCH_2$ | F | F | $OC_2H_5$ | |
| 4548 | $C_4H_9O$ | H | F | 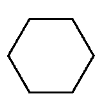 | — | 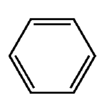 | $OCH_2$ | F | F | $OC_3H_7$ | |
| 4549 | $C_4H_9O$ | H | F | 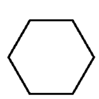 | — | 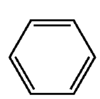 | $OCH_2$ | F | F | $OC_4H_9$ | |
| 4550 | $C_4H_9O$ | H | F | 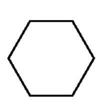 | — | 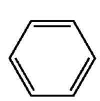 | $OCH_2$ | F | F | $OC_5H_{11}$ | |
| 4551 | $C_5H_{11}O$ | H | F | 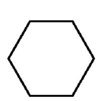 | — | 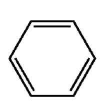 | $OCH_2$ | F | F | $OCH_3$ | |

TABLE 302-continued

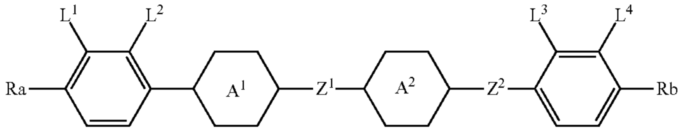

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4552 | $C_5H_{11}O$ | H | F | 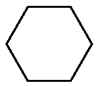 | — | 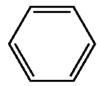 | $OCH_2$ | F | F | $OC_2H_5$ | |
| 4553 | $C_5H_{11}O$ | H | F | 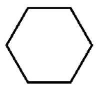 | — | 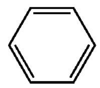 | $OCH_2$ | F | F | $OC_3H_7$ | |
| 4554 | $C_5H_{11}O$ | H | F | 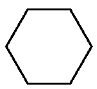 | — | 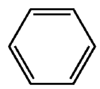 | $OCH_2$ | F | F | $OC_4H_9$ | |
| 4555 | $C_5H_{11}O$ | H | F | 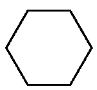 | — | 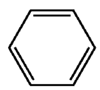 | $OCH_2$ | F | F | $OC_5H_{11}$ | |
| 4556 | $C_2H_5$ | H | F | 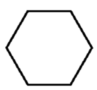 | — | 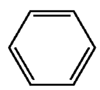 | $OCH_2$ | F | F | $C_4H_9$ | |
| 4557 | $C_5H_{11}$ | H | F | 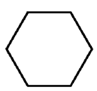 | — | 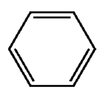 | $OCH_2$ | F | F | $C_2H_5$ | |
| 4558 | $C_2H_5$ | H | F | 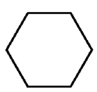 | — | 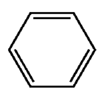 | $OCH_2$ | F | F | $OC_4H_9$ | |
| 4559 | $CH_2{=\!=}CH$ | H | F | 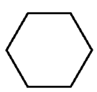 | — | 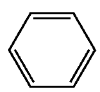 | $OCH_2$ | F | F | $OC_3H_7$ | |
| 4560 | $CH_2{=\!=}CH$ | H | F | 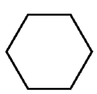 | — | 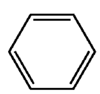 | $OCH_2$ | F | F | $OC_5H_{11}$ | |

TABLE 303

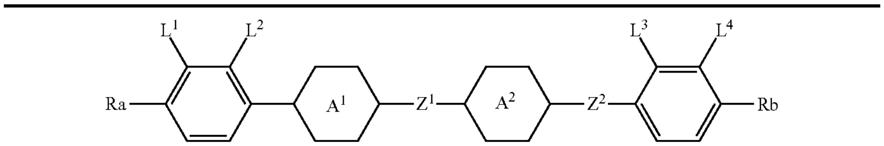

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4561 | $CH_3O$ | F | H | 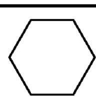 | — | 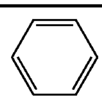 | $OCH_2$ | F | F | $OCH_3$ | |
| 4562 | $CH_3O$ | F | H | 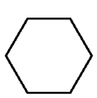 | — | 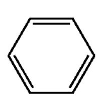 | $OCH_2$ | F | F | $OC_2H_5$ | |
| 4563 | $CH_3O$ | F | H | 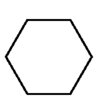 | — | 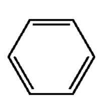 | $OCH_2$ | F | F | $OC_3H_7$ | |

TABLE 303-continued

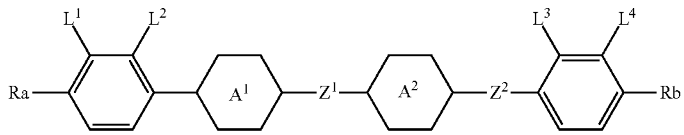

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4564 | $CH_3O$ | F | H | 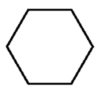 | — | 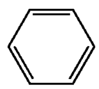 | $OCH_2$ | F | F | $OC_4H_9$ | |
| 4565 | $CH_3O$ | F | H | 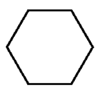 | — | 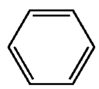 | $OCH_2$ | F | F | $OC_5H_{11}$ | |
| 4566 | $C_2H_5O$ | F | H | 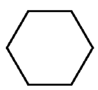 | — | 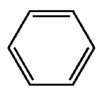 | $OCH_2$ | F | F | $OCH_3$ | |
| 4567 | $C_2H_5O$ | F | H | 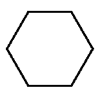 | — |  | $OCH_2$ | F | F | $OC_2H_5$ | |
| 4568 | $C_2H_5O$ | F | H | 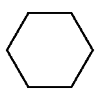 | — | 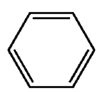 | $OCH_2$ | F | F | $OC_3H_7$ | |
| 4569 | $C_2H_5O$ | F | H | 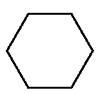 | — | 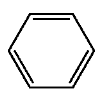 | $OCH_2$ | F | F | $OC_4H_9$ | |
| 4570 | $C_2H_5O$ | F | H | 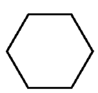 | — | 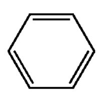 | $OCH_2$ | F | F | $OC_5H_{11}$ | |
| 4571 | $C_3H_7O$ | F | H | 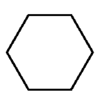 | — | 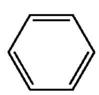 | $OCH_2$ | F | F | $OCH_3$ | |
| 4572 | $C_3H_7O$ | F | H | 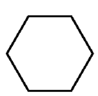 | — | 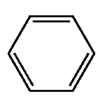 | $OCH_2$ | F | F | $OC_2H_5$ | |
| 4573 | $C_3H_7O$ | F | H | 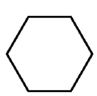 | — | 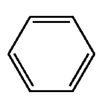 | $OCH_2$ | F | F | $OC_3H_7$ | |
| 4574 | $C_3H_7O$ | F | H | 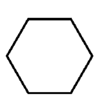 | — | 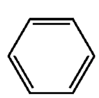 | $OCH_2$ | F | F | $OC_4H_9$ | |
| 4575 | $C_3H_7O$ | F | H | 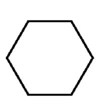 | — | 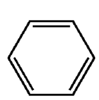 | $OCH_2$ | F | F | $OC_5H_{11}$ | |

TABLE 304

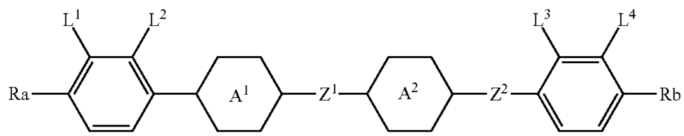

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4576 | $C_4H_9O$ | F | H | 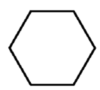 | — | 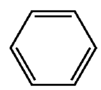 | $OCH_2$ | F | F | $OCH_3$ | |
| 4577 | $C_4H_9O$ | F | H | 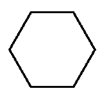 | — | 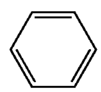 | $OCH_2$ | F | F | $OC_2H_5$ | |
| 4578 | $C_4H_9O$ | F | H | 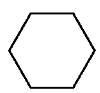 | — | 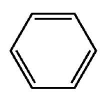 | $OCH_2$ | F | F | $OC_3H_7$ | |
| 4579 | $C_4H_9O$ | F | H | 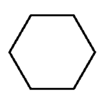 | — | 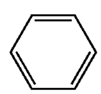 | $OCH_2$ | F | F | $OC_4H_9$ | |
| 4580 | $C_4H_9O$ | F | H | 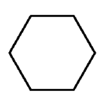 | — | 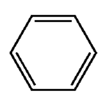 | $OCH_2$ | F | F | $OC_5H_{11}$ | |
| 4581 | $C_5H_{11}O$ | F | H | 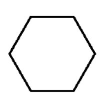 | — | 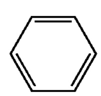 | $OCH_2$ | F | F | $OCH_3$ | |
| 4582 | $C_5H_{11}O$ | F | H | 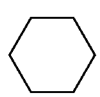 | — | 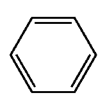 | $OCH_2$ | F | F | $OC_2H_5$ | |
| 4583 | $C_5H_{11}O$ | F | H | 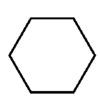 | — | 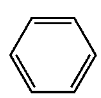 | $OCH_2$ | F | F | $OC_3H_7$ | |
| 4584 | $C_5H_{11}O$ | F | H | 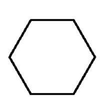 | — | 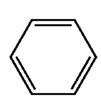 | $OCH_2$ | F | F | $OC_4H_9$ | |
| 4585 | $C_5H_{11}O$ | F | H | 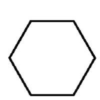 | — | 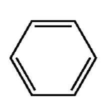 | $OCH_2$ | F | F | $OC_5H_{11}$ | |
| 4586 | $C_2H_5$ | F | H | 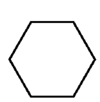 | — | 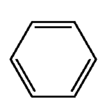 | $OCH_2$ | F | F | $C_4H_9$ | |
| 4587 | $C_5H_{11}$ | F | H | 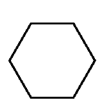 | — | 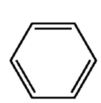 | $OCH_2$ | F | F | $C_2H_5$ | |
| 4588 | $C_2H_5$ | F | H | 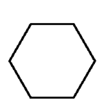 | — | 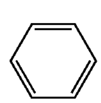 | $OCH_2$ | F | F | $OC_4H_9$ | |

TABLE 304-continued

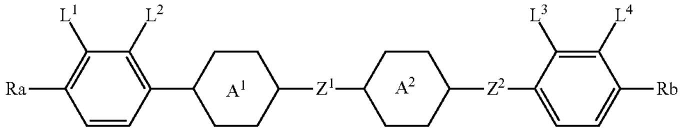

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4589 | $CH_2$=CH | F | H | 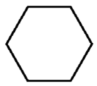 | — | 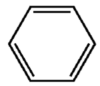 | $OCH_2$ | F | F | $OC_3H_7$ | |
| 4590 | $CH_2$=CH | F | H | 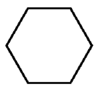 | — | 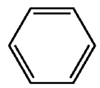 | $OCH_2$ | F | F | $OC_5H_{11}$ | |

TABLE 305

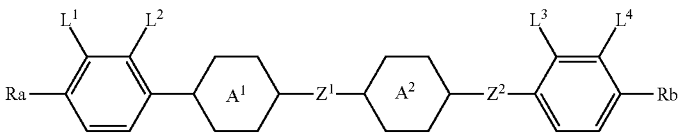

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4591 | $CH_3O$ | F | F | 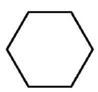 | — | 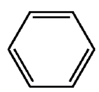 | $OCH_2$ | H | F | $OCH_3$ | |
| 4592 | $CH_3O$ | F | F | 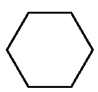 | — | 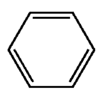 | $OCH_2$ | H | F | $OC_2H_5$ | |
| 4593 | $CH_3O$ | F | F | 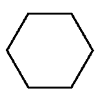 | — | 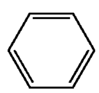 | $OCH_2$ | H | F | $OC_3H_7$ | |
| 4594 | $CH_3O$ | F | F | 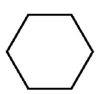 | — | 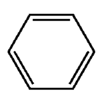 | $OCH_2$ | H | F | $OC_4H_9$ | |
| 4595 | $CH_3O$ | F | F | 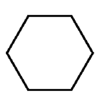 | — | 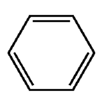 | $OCH_2$ | H | F | $OC_5H_{11}$ | |
| 4596 | $C_2H_5O$ | F | F | 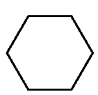 | — | 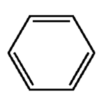 | $OCH_2$ | H | F | $OCH_3$ | |
| 4597 | $C_2H_5O$ | F | F | 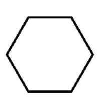 | — | 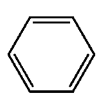 | $OCH_2$ | H | F | $OC_2H_5$ | |
| 4598 | $C_2H_5O$ | F | F | 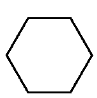 | — | 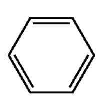 | $OCH_2$ | H | F | $OC_3H_7$ | |
| 4599 | $C_2H_5O$ | F | F | 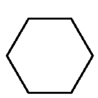 | — | 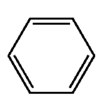 | $OCH_2$ | H | F | $OC_4H_9$ | |
| 4600 | $C_2H_5O$ | F | F | 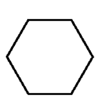 | — | 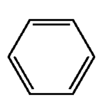 | $OCH_2$ | H | F | $OC_5H_{11}$ | |

TABLE 305-continued

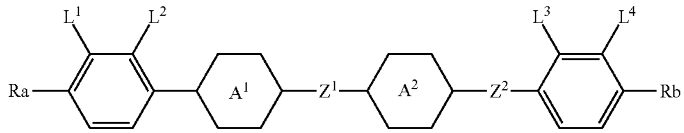

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4601 | $C_3H_7O$ | F | F | 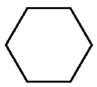 | — | 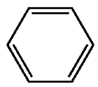 | $OCH_2$ | H | F | $OCH_3$ | |
| 4602 | $C_3H_7O$ | F | F | 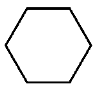 | — | 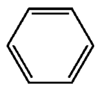 | $OCH_2$ | H | F | $OC_2H_5$ | |
| 4603 | $C_3H_7O$ | F | F | 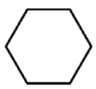 | — |  | $OCH_2$ | H | F | $OC_3H_7$ | |
| 4604 | $C_3H_7O$ | F | F | 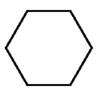 | — |  | $OCH_2$ | H | F | $OC_4H_9$ | |
| 4605 | $C_3H_7O$ | F | F | 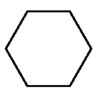 | — |  | $OCH_2$ | H | F | $OC_5H_{11}$ | |

TABLE 306

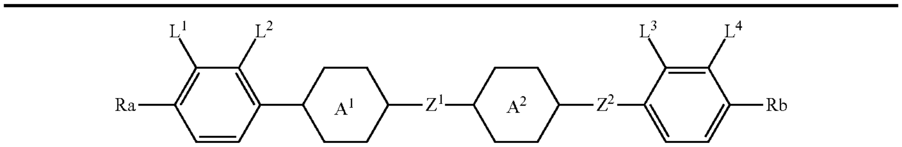

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4606 | $C_4H_9O$ | F | F | 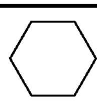 | — | 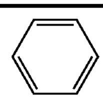 | $OCH_2$ | H | F | $OCH_3$ | |
| 4607 | $C_4H_9O$ | F | F | 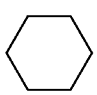 | — | 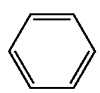 | $OCH_2$ | H | F | $OC_2H_5$ | |
| 4608 | $C_4H_9O$ | F | F | 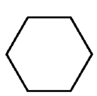 | — | 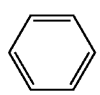 | $OCH_2$ | H | F | $OC_3H_7$ | |
| 4609 | $C_4H_9O$ | F | F | 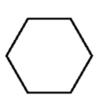 | — | 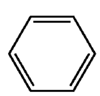 | $OCH_2$ | H | F | $OC_4H_9$ | |
| 4610 | $C_4H_9O$ | F | F | 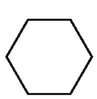 | — | 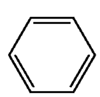 | $OCH_2$ | H | F | $OC_5H_{11}$ | |
| 4611 | $C_5H_{11}O$ | F | F | 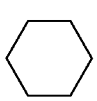 | — | 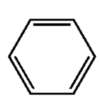 | $OCH_2$ | H | F | $OCH_3$ | |

TABLE 306-continued

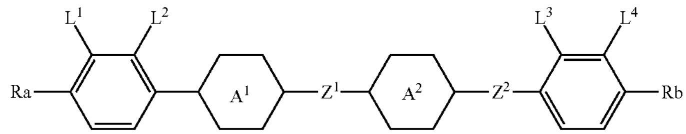

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4612 | $C_5H_{11}O$ | F | F | 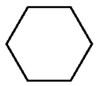 | — | 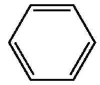 | $OCH_2$ | H | F | $OC_2H_5$ | |
| 4613 | $C_5H_{11}O$ | F | F | 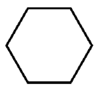 | — | 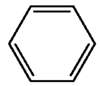 | $OCH_2$ | H | F | $OC_3H_7$ | |
| 4614 | $C_5H_{11}O$ | F | F | 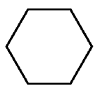 | — | 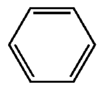 | $OCH_2$ | H | F | $OC_4H_9$ | |
| 4615 | $C_5H_{11}O$ | F | F | 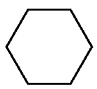 | — | 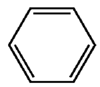 | $OCH_2$ | H | F | $OC_5H_{11}$ | |
| 4616 | $C_2H_5$ | F | F | 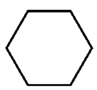 | — | 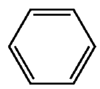 | $OCH_2$ | H | F | $C_4H_9$ | |
| 4617 | $C_5H_{11}$ | F | F | 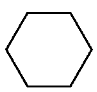 | — | 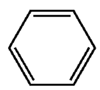 | $OCH_2$ | H | F | $C_2H_5$ | |
| 4618 | $C_2H_5$ | F | F | 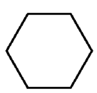 | — | 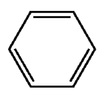 | $OCH_2$ | H | F | $OC_4H_9$ | |
| 4619 | $CH_2{=}CH$ | F | F | 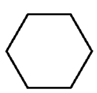 | — |  | $OCH_2$ | H | F | $OC_3H_7$ | |
| 4620 | $CH_2{=}CH$ | F | F | 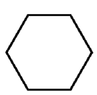 | — | 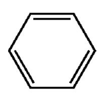 | $OCH_2$ | H | F | $OC_5H_{11}$ | |

TABLE 307

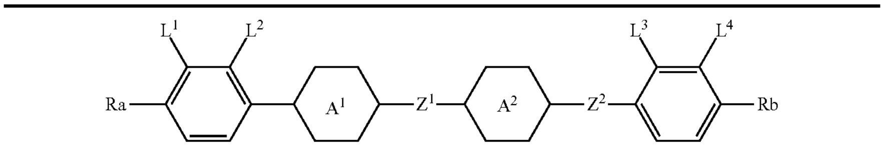

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4621 | $CH_3O$ | F | F | 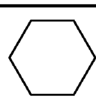 | — | 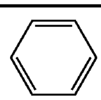 | $OCH_2$ | F | H | $OCH_3$ | |
| 4622 | $CH_3O$ | F | F | 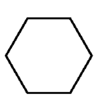 | — | 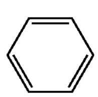 | $OCH_2$ | F | H | $OC_2H_5$ | |
| 4623 | $CH_3O$ | F | F | 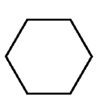 | — | 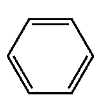 | $OCH_2$ | F | H | $OC_3H_7$ | |

TABLE 307-continued

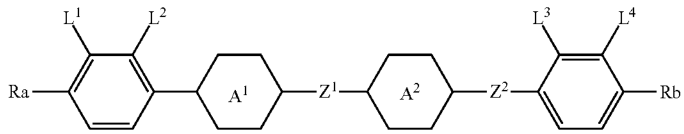

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4624 | $CH_3O$ | F | F | 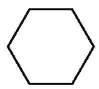 | — | 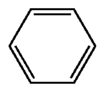 | $OCH_2$ | F | H | $OC_4H_9$ | |
| 4625 | $CH_3O$ | F | F | 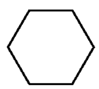 | — | 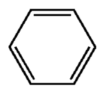 | $OCH_2$ | F | H | $OC_5H_{11}$ | |
| 4626 | $C_2H_5O$ | F | F | 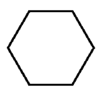 | — | 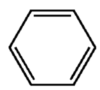 | $OCH_2$ | F | H | $OCH_3$ | |
| 4627 | $C_2H_5O$ | F | F | 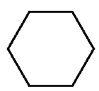 | — | 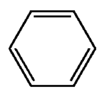 | $OCH_2$ | F | H | $OC_2H_5$ | |
| 4628 | $C_2H_5O$ | F | F | 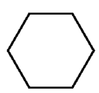 | — | 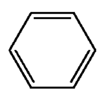 | $OCH_2$ | F | H | $OC_3H_7$ | |
| 4629 | $C_2H_5O$ | F | F | 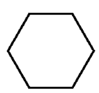 | — | 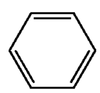 | $OCH_2$ | F | H | $OC_4H_9$ | |
| 4630 | $C_2H_5O$ | F | F | 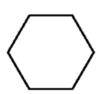 | — | 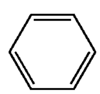 | $OCH_2$ | F | H | $OC_5H_{11}$ | |
| 4631 | $C_3H_7O$ | F | F | 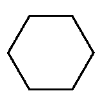 | — | 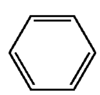 | $OCH_2$ | F | H | $OCH_3$ | |
| 4632 | $C_3H_7O$ | F | F | 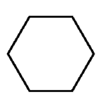 | — | 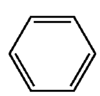 | $OCH_2$ | F | H | $OC_2H_5$ | |
| 4633 | $C_3H_7O$ | F | F | 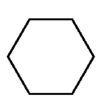 | — | 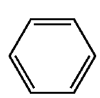 | $OCH_2$ | F | H | $OC_3H_7$ | |
| 4634 | $C_3H_7O$ | F | F | 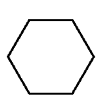 | — | 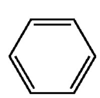 | $OCH_2$ | F | H | $OC_4H_9$ | |
| 4635 | $C_3H_7O$ | F | F | 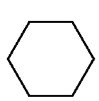 | — | 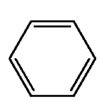 | $OCH_2$ | F | H | $OC_5H_{11}$ | |

TABLE 308

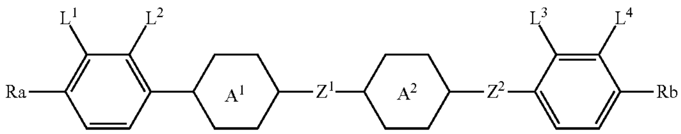

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4636 | $C_4H_9O$ | F | F | 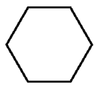 | — | 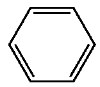 | $OCH_2$ | F | H | $OCH_3$ | |
| 4637 | $C_4H_9O$ | F | F | 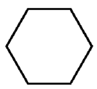 | — | 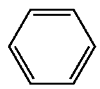 | $OCH_2$ | F | H | $OC_2H_5$ | |
| 4638 | $C_4H_9O$ | F | F | 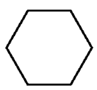 | — | 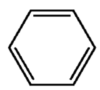 | $OCH_2$ | F | H | $OC_3H_7$ | |
| 4639 | $C_4H_9O$ | F | F | 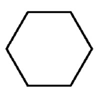 | — | 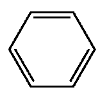 | $OCH_2$ | F | H | $OC_4H_9$ | |
| 4640 | $C_4H_9O$ | F | F | 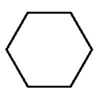 | — | 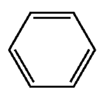 | $OCH_2$ | F | H | $OC_5H_{11}$ | |
| 4641 | $C_5H_{11}O$ | F | F | 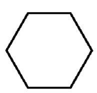 | — | 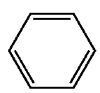 | $OCH_2$ | F | H | $OCH_3$ | |
| 4642 | $C_5H_{11}O$ | F | F | 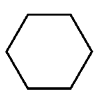 | — | 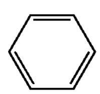 | $OCH_2$ | F | H | $OC_2H_5$ | |
| 4643 | $C_5H_{11}O$ | F | F | 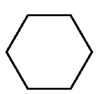 | — | 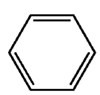 | $OCH_2$ | F | H | $OC_3H_7$ | |
| 4644 | $C_5H_{11}O$ | F | F | 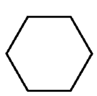 | — | 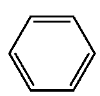 | $OCH_2$ | F | H | $OC_4H_9$ | |
| 4645 | $C_5H_{11}O$ | F | F | 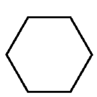 | — | 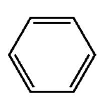 | $OCH_2$ | F | H | $OC_5H_{11}$ | |
| 4646 | $C_2H_5$ | F | F | 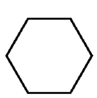 | — | 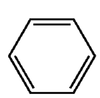 | $OCH_2$ | F | H | $C_4H_9$ | |
| 4647 | $C_5H_{11}$ | F | F | 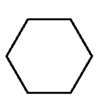 | — | 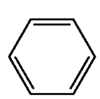 | $OCH_2$ | F | H | $C_2H_5$ | |
| 4648 | $C_2H_5$ | F | F | 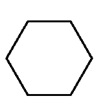 | — | 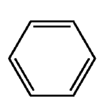 | $OCH_2$ | F | H | $OC_4H_9$ | |

TABLE 308-continued

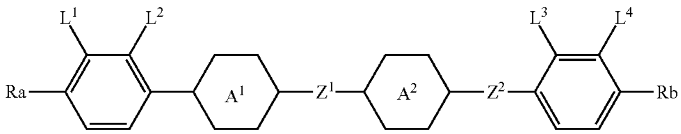

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4649 | $CH_2$═CH | F | F | 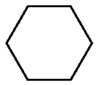 | — | 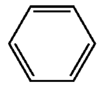 | $OCH_2$ | F | H | $OC_3H_7$ | |
| 4650 | $CH_2$═CH | F | F | 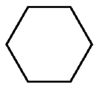 | — | 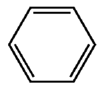 | $OCH_2$ | F | H | $OC_5H_{11}$ | |

TABLE 309

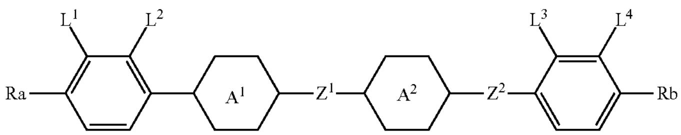

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4651 | $CH_3O$ | F | F | 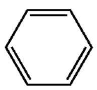 | — | 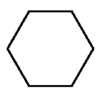 | $OCH_2$ | F | F | $OCH_3$ | |
| 4652 | $CH_3O$ | F | F | 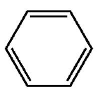 | — | 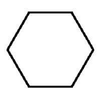 | $OCH_2$ | F | F | $OC_2H_5$ | |
| 4653 | $CH_3O$ | F | F |  | — | 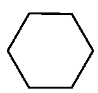 | $OCH_2$ | F | F | $OC_3H_7$ | |
| 4654 | $CH_3O$ | F | F | 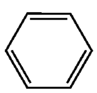 | — | 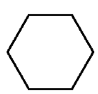 | $OCH_2$ | F | F | $OC_4H_9$ | |
| 4655 | $CH_3O$ | F | F | 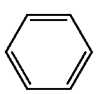 | — | 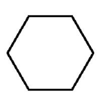 | $OCH_2$ | F | F | $OC_5H_{11}$ | |
| 4656 | $C_2H_5O$ | F | F | 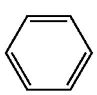 | — | 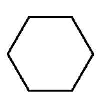 | $OCH_2$ | F | F | $OCH_3$ | |
| 4657 | $C_2H_5O$ | F | F | 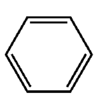 | — | 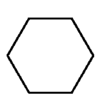 | $OCH_2$ | F | F | $OC_2H_5$ | |
| 4658 | $C_2H_5O$ | F | F | 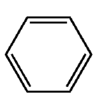 | — | 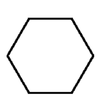 | $OCH_2$ | F | F | $OC_3H_7$ | |
| 4659 | $C_2H_5O$ | F | F | 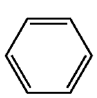 | — | 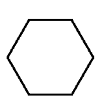 | $OCH_2$ | F | F | $OC_4H_9$ | |
| 4660 | $C_2H_5O$ | F | F | 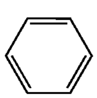 | — | 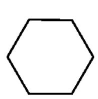 | $OCH_2$ | F | F | $OC_5H_{11}$ | |

TABLE 309-continued

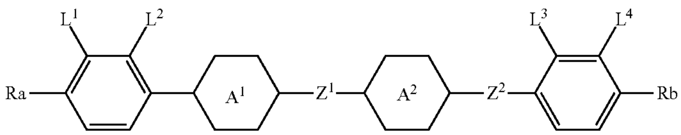

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4661 | $C_3H_7O$ | F | F | 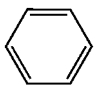 | — | 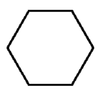 | $OCH_2$ | F | F | $OCH_3$ | |
| 4662 | $C_3H_7O$ | F | F | 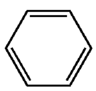 | — | 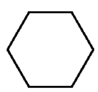 | $OCH_2$ | F | F | $OC_2H_5$ | |
| 4663 | $C_3H_7O$ | F | F | 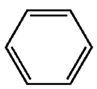 | — | 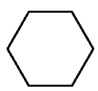 | $OCH_2$ | F | F | $OC_3H_7$ | |
| 4664 | $C_3H_7O$ | F | F | 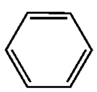 | — | 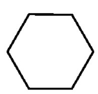 | $OCH_2$ | F | F | $OC_4H_9$ | |
| 4665 | $C_3H_7O$ | F | F | 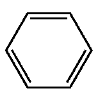 | — | 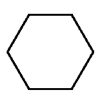 | $OCH_2$ | F | F | $OC_5H_{11}$ | |

TABLE 310

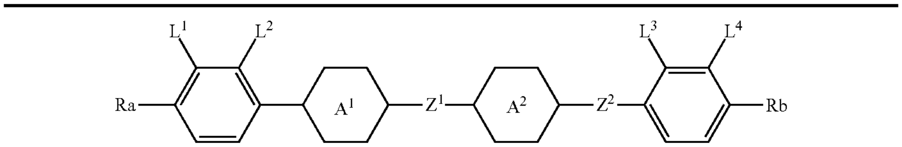

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4666 | $C_4H_9O$ | F | F | 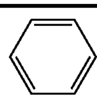 | — | 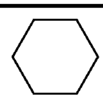 | $OCH_2$ | F | F | $OCH_3$ | |
| 4667 | $C_4H_9O$ | F | F | 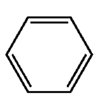 | — | 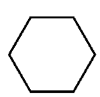 | $OCH_2$ | F | F | $OC_2H_5$ | |
| 4668 | $C_4H_9O$ | F | F | 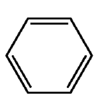 | — | 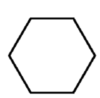 | $OCH_2$ | F | F | $OC_3H_7$ | |
| 4669 | $C_4H_9O$ | F | F | 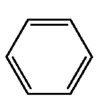 | — | 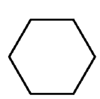 | $OCH_2$ | F | F | $OC_4H_9$ | |
| 4670 | $C_4H_9O$ | F | F | 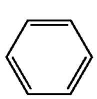 | — | 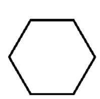 | $OCH_2$ | F | F | $OC_5H_{11}$ | |
| 4671 | $C_5H_{11}O$ | F | F | 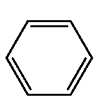 | — | 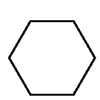 | $OCH_2$ | F | F | $OCH_3$ | |

TABLE 310-continued

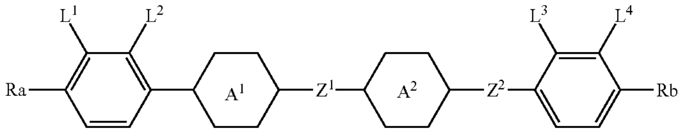

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4672 | $C_5H_{11}O$ | F | F | 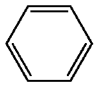 | — | 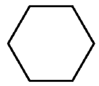 | $OCH_2$ | F | F | $OC_2H_5$ | |
| 4673 | $C_5H_{11}O$ | F | F |  | — | 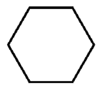 | $OCH_2$ | F | F | $OC_3H_7$ | |
| 4674 | $C_5H_{11}O$ | F | F | 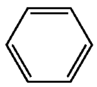 | — | 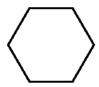 | $OCH_2$ | F | F | $OC_4H_9$ | |
| 4675 | $C_5H_{11}O$ | F | F |  | — | 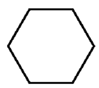 | $OCH_2$ | F | F | $OC_5H_{11}$ | |
| 4676 | $C_2H_5$ | F | F |  | — | 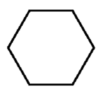 | $OCH_2$ | F | F | $C_4H_9$ | |
| 4677 | $C_5H_{11}$ | F | F |  | — | 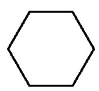 | $OCH_2$ | F | F | $C_2H_5$ | |
| 4678 | $C_2H_5$ | F | F |  | — | 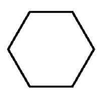 | $OCH_2$ | F | F | $OC_4H_9$ | |
| 4679 | $CH_2{=}CH$ | F | F | 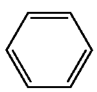 | — | 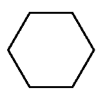 | $OCH_2$ | F | F | $OC_3H_7$ | |
| 4680 | $CH_2{=}CH$ | F | F | 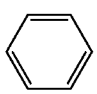 | — | 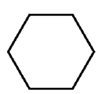 | $OCH_2$ | F | F | $OC_5H_{11}$ | |

TABLE 311

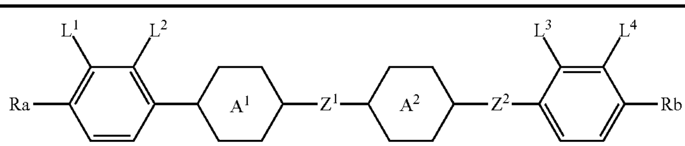

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4681 | $CH_2{=}CHO$ | F | F | 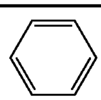 | — | 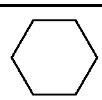 | $OCH_2$ | F | F | $OC_3H_7$ | |
| 4682 | $CH_2{=}CHCH_2O$ | F | F | 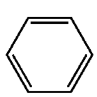 | — | 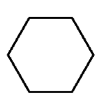 | $OCH_2$ | F | F | $OC_5H_{11}$ | |
| 4683 | $CH_2{=}CHCH_2O$ | F | F | 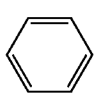 | — | 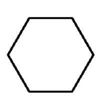 | $OCH_2$ | F | F | $OC_3H_7$ | |

TABLE 311-continued

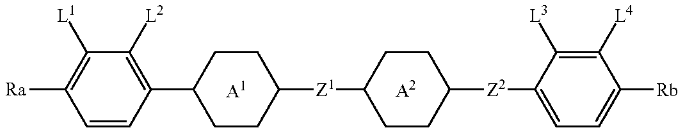

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4684 | $CH_2=CHC_2H_5O$ | F | F |  | — | 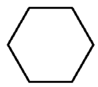 | $OCH_2$ | F | F | $OC_5H_{11}$ | |
| 4685 | $CH_2=CHC_2H_5O$ | F | F | 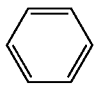 | — | 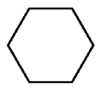 | $OCH_2$ | F | F | $OC_2H_5$ | |
| 4686 | $CH_2=CHC_2H_5O$ | F | F | 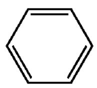 | — | 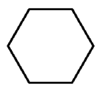 | $OCH_2$ | F | F | $OC_3H_7$ | |
| 4687 | $CH_3CH=CHCH_2O$ | F | F | 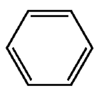 | — | 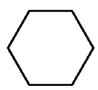 | $OCH_2$ | F | F | $OCH_3$ | |
| 4688 | $CH_3CH=CHCH_2O$ | F | F |  | — | 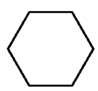 | $OCH_2$ | F | F | $OC_2H_5$ | |
| 4689 | $C_3H_7O$ | F | F | 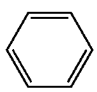 | — | 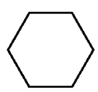 | $OCH_2$ | F | F | $OCH=CH_2$ | |
| 4690 | $C_3H_7O$ | F | F | 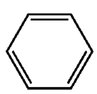 | — | 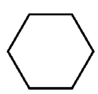 | $OCH_2$ | F | F | $OCH_2CH=CH_2$ | |
| 4691 | $C_4H_9O$ | F | F | 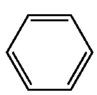 | — | 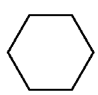 | $OCH_2$ | F | F | $OCH_2CH=CH_2$ | |
| 4692 | $C_5H_{11}O$ | F | F | 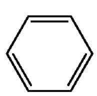 | — | 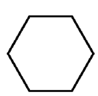 | $OCH_2$ | F | F | $OCH_2CH=CH_2$ | |
| 4693 | $CH_3O$ | F | F | 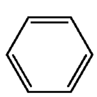 | — | 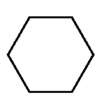 | $OCH_2$ | F | F | $OC_2H_5CH=CH_2$ | |
| 4694 | $C_2H_5O$ | F | F | 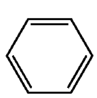 | — | 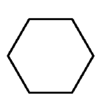 | $OCH_2$ | F | F | $OC_2H_5CH=CH_2$ | |
| 4695 | $C_3H_7O$ | F | F | 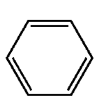 | — | 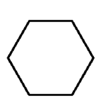 | $OCH_2$ | F | F | $OC_2H_5CH=CH_2$ | |

TABLE 312

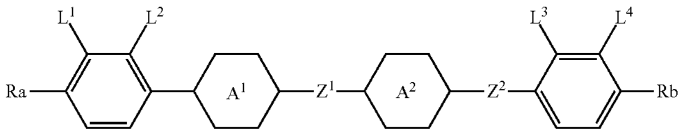

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4696 | $CH_3O$ | F | F | 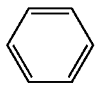 | — | 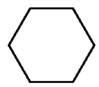 | $OCH_2$ | F | F | $OCH_2CH{=}CHCH_3$ | |
| 4697 | $C_2H_5O$ | F | F | 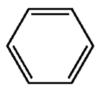 | — | 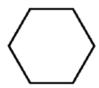 | $OCH_2$ | F | F | $OCH_2CH{=}CHCH_3$ | |
| 4698 | $C_3H_7O$ | F | F |  | — | 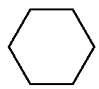 | $OCH_2$ | F | F | $OCH_2CH{=}CHCH_3$ | |
| 4699 | $CH_2{=}CHCH_2O$ | F | F | 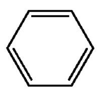 | — | 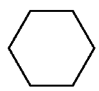 | $OCH_2$ | F | F | $OCH{=}CH_2$ | |
| 4700 | $CH_2{=}CHC_2H_5O$ | F | F | 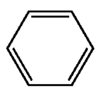 | — | 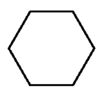 | $OCH_2$ | F | F | $OCH_2CH{=}CH_2$ | |
| 4701 | $C_3H_7OCH_2$ | F | F | 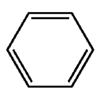 | — | 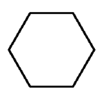 | $OCH_2$ | F | F | $OC_3H_7$ | |
| 4702 | $C_5H_{11}O$ | F | F |  | — | 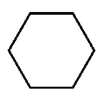 | $OCH_2$ | F | F | $OC_2H_5CH{=}CH_2$ | |
| 4703 | $C_3H_7O$ | F | F | 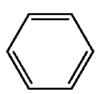 | — | 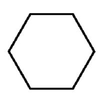 | $OCH_2$ | F | F | H | |
| 4704 | $C_5H_{11}O$ | F | F | 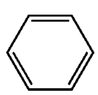 | — | 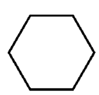 | $OCH_2$ | F | F | $OC_9H_{19}$ | |
| 4705 | $C_3H_7O$ | F | F | 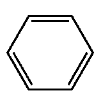 | — | 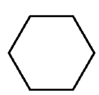 | $OCH_2$ | F | F | $C_2H_5$ | |
| 4706 | $C_5H_{11}O$ | F | F | 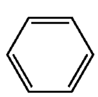 | — | 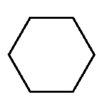 | $OCH_2$ | F | F | $C_3H_7$ | |
| 4707 | H | F | F | 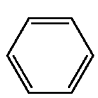 | — | 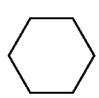 | $OCH_2$ | F | F | $OC_4H_9$ | |
| 4708 | $C_7H_{15}O$ | F | F | 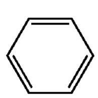 | — | 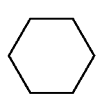 | $OCH_2$ | F | F | $OC_4H_9$ | |

TABLE 312-continued

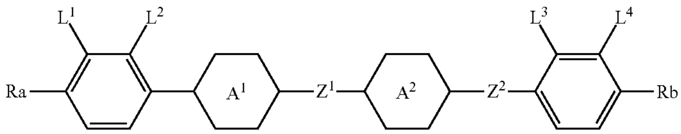

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4709 | $C_2H_5O$ | F | F | 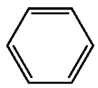 | — | 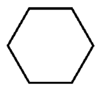 | $OCH_2$ | F | F | $OC_6H_{13}$ | |
| 4710 | $CH_3O$ | F | F |  | — | 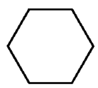 | $OCH_2$ | F | F | $C_2H_5$ | |

TABLE 313

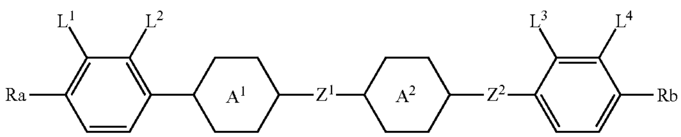

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4711 | $CH_3O$ | H | F |  | — | 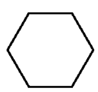 | $OCH_2$ | F | F | $OCH_3$ | |
| 4712 | $CH_3O$ | H | F |  | — | 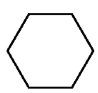 | $OCH_2$ | F | F | $OC_2H_5$ | |
| 4713 | $CH_3O$ | H | F | 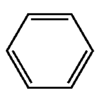 | — | 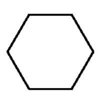 | $OCH_2$ | F | F | $OC_3H_7$ | |
| 4714 | $CH_3O$ | H | F | 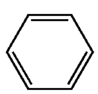 | — | 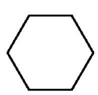 | $OCH_2$ | F | F | $OC_4H_9$ | |
| 4715 | $CH_3O$ | H | F | 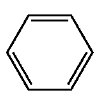 | — | 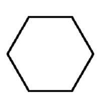 | $OCH_2$ | F | F | $OC_5H_{11}$ | |
| 4716 | $C_2H_5O$ | H | F | 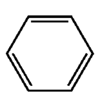 | — | 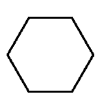 | $OCH_2$ | F | F | $OCH_3$ | |
| 4717 | $C_2H_5O$ | H | F | 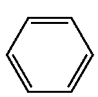 | — | 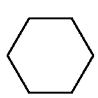 | $OCH_2$ | F | F | $OC_2H_5$ | |
| 4718 | $C_2H_5O$ | H | F | 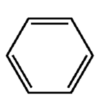 | — | 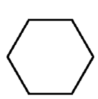 | $OCH_2$ | F | F | $OC_3H_7$ | |
| 4719 | $C_2H_5O$ | H | F | 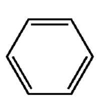 | — | 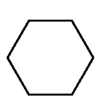 | $OCH_2$ | F | F | $OC_4H_9$ | |

TABLE 313-continued

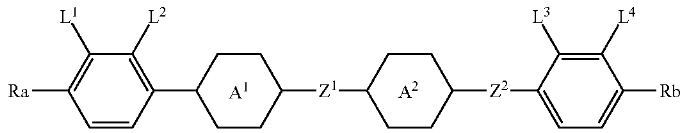

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4720 | $C_2H_5O$ | H | F | 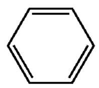 | — | 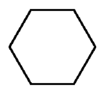 | $OCH_2$ | F | F | $OC_5H_{11}$ | |
| 4721 | $C_3H_7O$ | H | F |  | — | 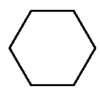 | $OCH_2$ | F | F | $OCH_3$ | |
| 4722 | $C_3H_7O$ | H | F | 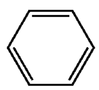 | — | 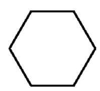 | $OCH_2$ | F | F | $OC_2H_5$ | |
| 4723 | $C_3H_7O$ | H | F |  | — | 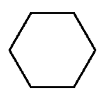 | $OCH_2$ | F | F | $OC_3H_7$ | |
| 4724 | $C_3H_7O$ | H | F | 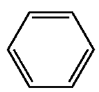 | — | 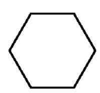 | $OCH_2$ | F | F | $OC_4H_9$ | |
| 4725 | $C_3H_7O$ | H | F | 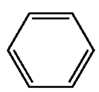 | — | 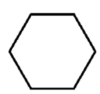 | $OCH_2$ | F | F | $OC_5H_{11}$ | |

TABLE 314

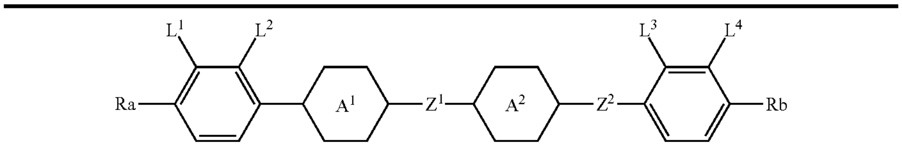

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4726 | $C_4H_9O$ | H | F | 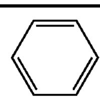 | — | 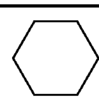 | $OCH_2$ | F | F | $OCH_3$ | |
| 4727 | $C_4H_9O$ | H | F | 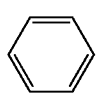 | — | 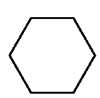 | $OCH_2$ | F | F | $OC_2H_5$ | |
| 4728 | $C_4H_9O$ | H | F | 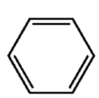 | — | 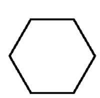 | $OCH_2$ | F | F | $OC_3H_7$ | |
| 4729 | $C_4H_9O$ | H | F | 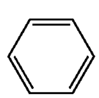 | — | 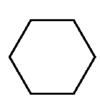 | $OCH_2$ | F | F | $OC_4H_9$ | |
| 4730 | $C_4H_9O$ | H | F | 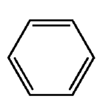 | — | 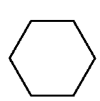 | $OCH_2$ | F | F | $OC_5H_{11}$ | |

TABLE 314-continued

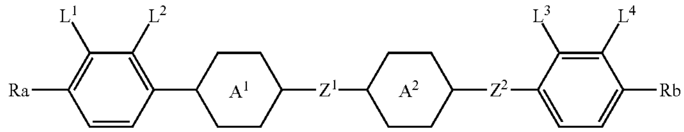

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4731 | $C_5H_{11}O$ | H | F | 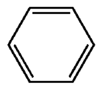 | — | 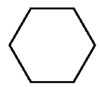 | $OCH_2$ | F | F | $OCH_3$ | |
| 4732 | $C_5H_{11}O$ | H | F | 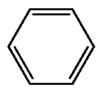 | — | 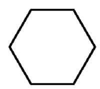 | $OCH_2$ | F | F | $OC_2H_5$ | |
| 4733 | $C_5H_{11}O$ | H | F | 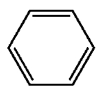 | — | 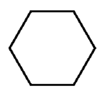 | $OCH_2$ | F | F | $OC_3H_7$ | |
| 4734 | $C_5H_{11}O$ | H | F | 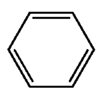 | — | 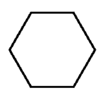 | $OCH_2$ | F | F | $OC_4H_9$ | |
| 4735 | $C_5H_{11}O$ | H | F | 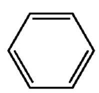 | — | 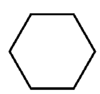 | $OCH_2$ | F | F | $OC_5H_{11}$ | |
| 4736 | $C_2H_5$ | H | F | 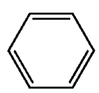 | — | 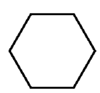 | $OCH_2$ | F | F | $C_4H_9$ | |
| 4737 | $C_5H_{11}$ | H | F | 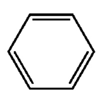 | — | 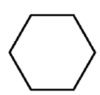 | $OCH_2$ | F | F | $C_2H_5$ | |
| 4738 | $C_2H_5$ | H | F | 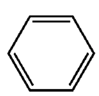 | — | 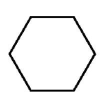 | $OCH_2$ | F | F | $OC_4H_9$ | |
| 4739 | $CH_2{=}CH$ | H | F | 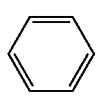 | — | 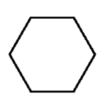 | $OCH_2$ | F | F | $OC_3H_7$ | |
| 4740 | $CH_2{=}CH$ | H | F | 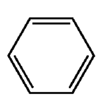 | — | 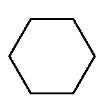 | $OCH_2$ | F | F | $OC_5H_{11}$ | |

TABLE 315

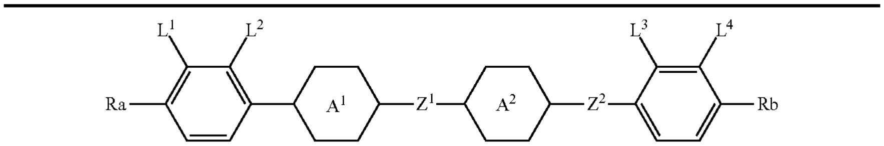

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4741 | $CH_3O$ | F | H | 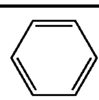 | — | 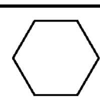 | $OCH_2$ | F | F | $OCH_3$ | |

TABLE 315-continued

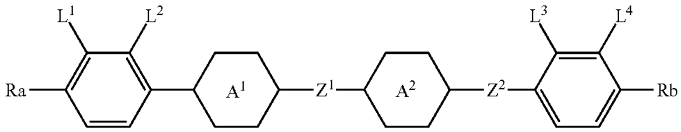

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4742 | $CH_3O$ | F | H |  | — | 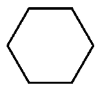 | $OCH_2$ | F | F | $OC_2H_5$ | |
| 4743 | $CH_3O$ | F | H | 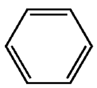 | — | 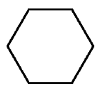 | $OCH_2$ | F | F | $OC_3H_7$ | |
| 4744 | $CH_3O$ | F | H |  | — | 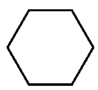 | $OCH_2$ | F | F | $OC_4H_9$ | |
| 4745 | $CH_3O$ | F | H | 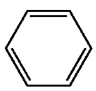 | — | 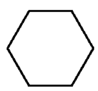 | $OCH_2$ | F | F | $OC_5H_{11}$ | |
| 4746 | $C_2H_5O$ | F | H |  | — | 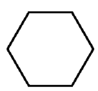 | $OCH_2$ | F | F | $OCH_3$ | |
| 4747 | $C_2H_5O$ | F | H | 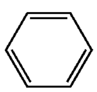 | — | 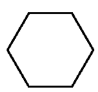 | $OCH_2$ | F | F | $OC_2H_5$ | |
| 4748 | $C_2H_5O$ | F | H | 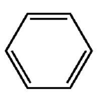 | — | 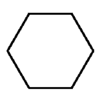 | $OCH_2$ | F | F | $OC_3H_7$ | |
| 4749 | $C_2H_5O$ | F | H | 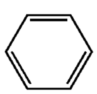 | — | 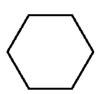 | $OCH_2$ | F | F | $OC_4H_9$ | |
| 4750 | $C_2H_5O$ | F | H | 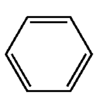 | — | 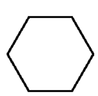 | $OCH_2$ | F | F | $OC_5H_{11}$ | |
| 4751 | $C_3H_7O$ | F | H | 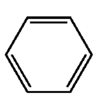 | — | 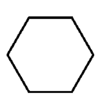 | $OCH_2$ | F | F | $OCH_3$ | |
| 4752 | $C_3H_7O$ | F | H | 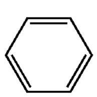 | — | 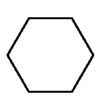 | $OCH_2$ | F | F | $OC_2H_5$ | |
| 4753 | $C_3H_7O$ | F | H | 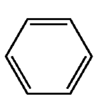 | — | 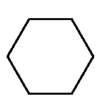 | $OCH_2$ | F | F | $OC_3H_7$ | |
| 4754 | $C_3H_7O$ | F | H | 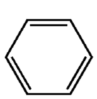 | — | 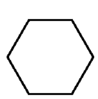 | $OCH_2$ | F | F | $OC_4H_9$ | |
| 4755 | $C_3H_7O$ | F | H | 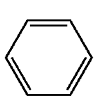 | — | 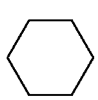 | $OCH_2$ | F | F | $OC_5H_{11}$ | |

TABLE 316

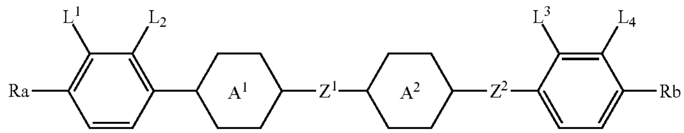

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4756 | $C_4H_9O$ | F | H | 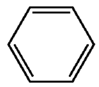 | — | 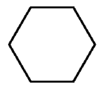 | $OCH_2$ | F | F | $OCH_3$ | |
| 4757 | $C_4H_9O$ | F | H | 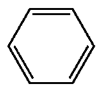 | — | 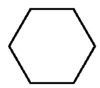 | $OCH_2$ | F | F | $OC_2H_5$ | |
| 4758 | $C_4H_9O$ | F | H | 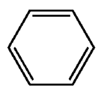 | — | 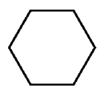 | $OCH_2$ | F | F | $OC_3H_7$ | |
| 4759 | $C_4H_9O$ | F | H | 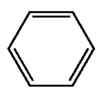 | — | 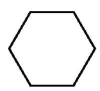 | $OCH_2$ | F | F | $OC_4H_9$ | |
| 4760 | $C_4H_9O$ | F | H | 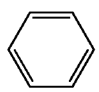 | — | 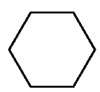 | $OCH_2$ | F | F | $OC_5H_{11}$ | |
| 4761 | $C_5H_{11}O$ | F | H | 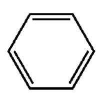 | — | 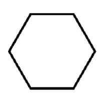 | $OCH_2$ | F | F | $OCH_3$ | |
| 4762 | $C_5H_{11}O$ | F | H | 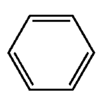 | — | 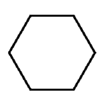 | $OCH_2$ | F | F | $OC_2H_5$ | |
| 4763 | $C_5H_{11}O$ | F | H | 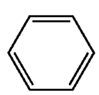 | — | 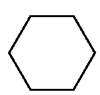 | $OCH_2$ | F | F | $OC_3H_7$ | |
| 4764 | $C_5H_{11}O$ | F | H | 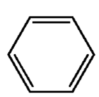 | — | 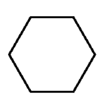 | $OCH_2$ | F | F | $OC_4H_9$ | |
| 4765 | $C_5H_{11}O$ | F | H | 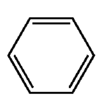 | — | 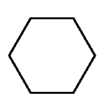 | $OCH_2$ | F | F | $OC_5H_{11}$ | |
| 4766 | $C_2H_5$ | F | H | 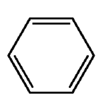 | — | 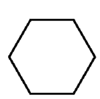 | $OCH_2$ | F | F | $C_4H_9$ | |
| 4767 | $C_5H_{11}$ | F | H | 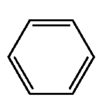 | — | 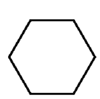 | $OCH_2$ | F | F | $C_2H_5$ | |
| 4768 | $C_2H_5$ | F | H | 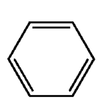 | — | 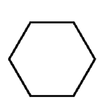 | $OCH_2$ | F | F | $OC_4H_9$ | |

TABLE 316-continued

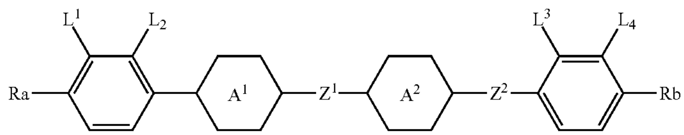

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4769 | $CH_2$═CH | F | H | 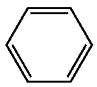 | — | 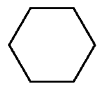 | $OCH_2$ | F | F | $OC_3H_7$ | |
| 4770 | $CH_2$═CH | F | H |  | — | 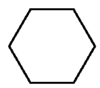 | $OCH_2$ | F | F | $OC_5H_{11}$ | |

TABLE 317

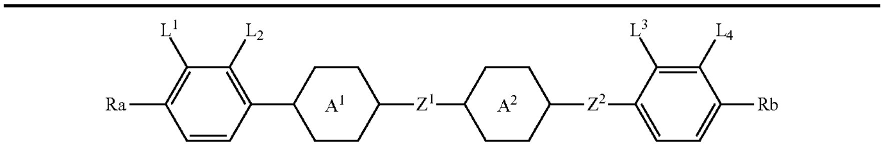

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4771 | $CH_3O$ | F | F | 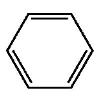 | — | 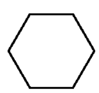 | $OCH_2$ | H | F | $OCH_3$ | |
| 4772 | $CH_3O$ | F | F | 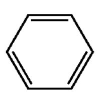 | — | 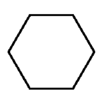 | $OCH_2$ | H | F | $OC_2H_5$ | |
| 4773 | $CH_3O$ | F | F | 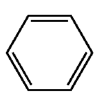 | — | 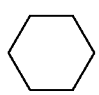 | $OCH_2$ | H | F | $OC_3H_7$ | |
| 4774 | $CH_3O$ | F | F | 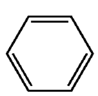 | — | 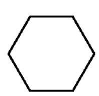 | $OCH_2$ | H | F | $OC_4H_9$ | |
| 4775 | $CH_3O$ | F | F | 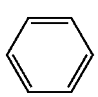 | — | 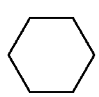 | $OCH_2$ | H | F | $OC_5H_{11}$ | |
| 4776 | $C_2H_5O$ | F | F | 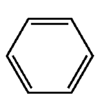 | — | 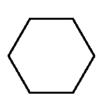 | $OCH_2$ | H | F | $OCH_3$ | |
| 4777 | $C_2H_5O$ | F | F | 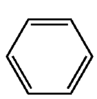 | — | 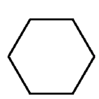 | $OCH_2$ | H | F | $OC_2H_5$ | |
| 4778 | $C_2H_5O$ | F | F | 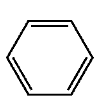 | — | 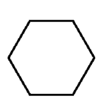 | $OCH_2$ | H | F | $OC_3H_7$ | |
| 4779 | $C_2H_5O$ | F | F | 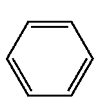 | — | 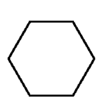 | $OCH_2$ | H | F | $OC_4H_9$ | |

TABLE 317-continued

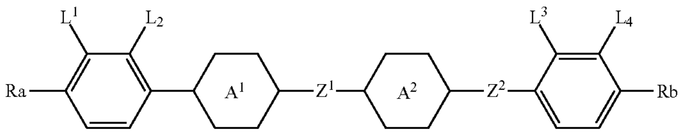

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4780 | $C_2H_5O$ | F | F |  | — | 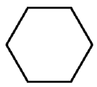 | $OCH_2$ | H | F | $OC_5H_{11}$ | |
| 4781 | $C_3H_7O$ | F | F |  | — | 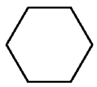 | $OCH_2$ | H | F | $OCH_3$ | |
| 4782 | $C_3H_7O$ | F | F | 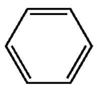 | — | 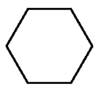 | $OCH_2$ | H | F | $OC_2H_5$ | |
| 4783 | $C_3H_7O$ | F | F | 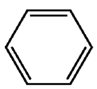 | — | 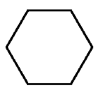 | $OCH_2$ | H | F | $OC_3H_7$ | |
| 4784 | $C_3H_7O$ | F | F | 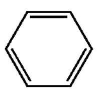 | — | 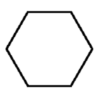 | $OCH_2$ | H | F | $OC_4H_9$ | |
| 4785 | $C_3H_7O$ | F | F | 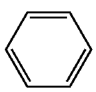 | — | 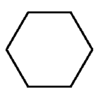 | $OCH_2$ | H | F | $OC_5H_{11}$ | |

TABLE 318

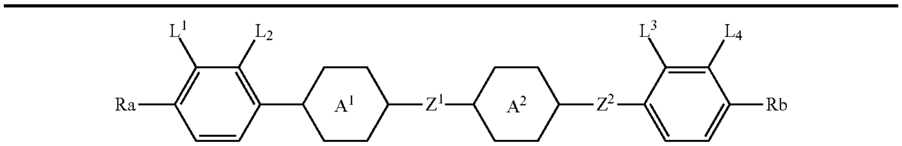

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4786 | $C_4H_9O$ | F | F | 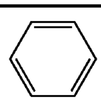 | — | 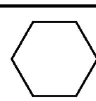 | $OCH_2$ | H | F | $OCH_3$ | |
| 4787 | $C_4H_9O$ | F | F | 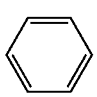 | — | 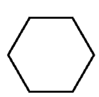 | $OCH_2$ | H | F | $OC_2H_5$ | |
| 4788 | $C_4H_9O$ | F | F | 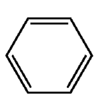 | — | 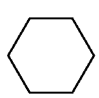 | $OCH_2$ | H | F | $OC_3H_7$ | |
| 4789 | $C_4H_9O$ | F | F | 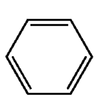 | — | 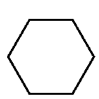 | $OCH_2$ | H | F | $OC_4H_9$ | |
| 4790 | $C_4H_9O$ | F | F | 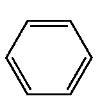 | — | 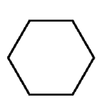 | $OCH_2$ | H | F | $OC_5H_{11}$ | |

TABLE 318-continued

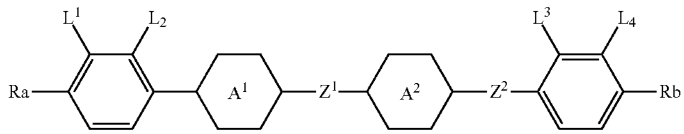

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4791 | $C_5H_{11}O$ | F | F | 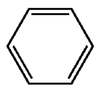 | — | 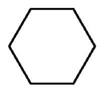 | $OCH_2$ | H | F | $OCH_3$ | |
| 4792 | $C_5H_{11}O$ | F | F | 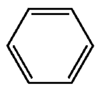 | — | 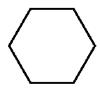 | $OCH_2$ | H | F | $OC_2H_5$ | |
| 4793 | $C_5H_{11}O$ | F | F | 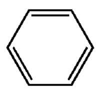 | — | 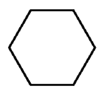 | $OCH_2$ | H | F | $OC_3H_7$ | |
| 4794 | $C_5H_{11}O$ | F | F |  | — | 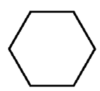 | $OCH_2$ | H | F | $OC_4H_9$ | |
| 4795 | $C_5H_{11}O$ | F | F |  | — | 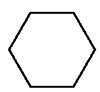 | $OCH_2$ | H | F | $OC_5H_{11}$ | |
| 4796 | $C_2H_5$ | F | F | 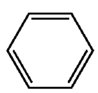 | — | 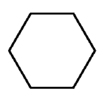 | $OCH_2$ | H | F | $C_4H_9$ | |
| 4797 | $C_5H_{11}$ | F | F | 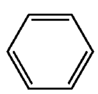 | — | 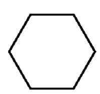 | $OCH_2$ | H | F | $C_2H_5$ | |
| 4798 | $C_2H_5$ | F | F | 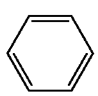 | — | 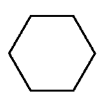 | $OCH_2$ | H | F | $OC_4H_9$ | |
| 4799 | $CH_2{=}CH$ | F | F | 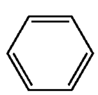 | — | 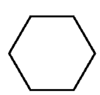 | $OCH_2$ | H | F | $OC_3H_7$ | |
| 4800 | $CH_2{=}CH$ | F | F | 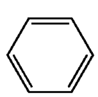 | — | 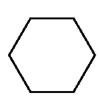 | $OCH_2$ | H | F | $OC_5H_{11}$ | |

TABLE 319

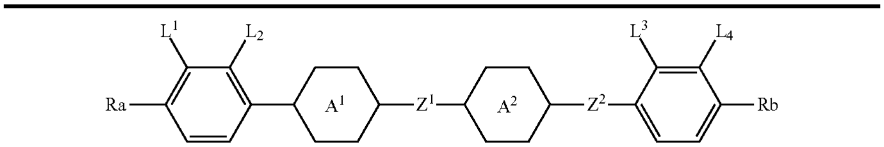

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4801 | $CH_3O$ | F | F | 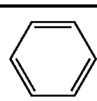 | — | 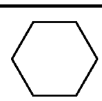 | $OCH_2$ | F | H | $OCH_3$ | |

TABLE 319-continued

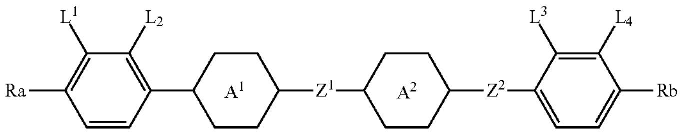

| No. | Ra | L¹ | L² | A¹ | Z¹ | A² | Z² | L³ | L⁴ | Rb | Physical property values |
|---|---|---|---|---|---|---|---|---|---|---|---|
| 4802 | $CH_3O$ | F | F |  | — | 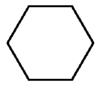 | $OCH_2$ | F | H | $OC_2H_5$ | |
| 4803 | $CH_3O$ | F | F |  | — | 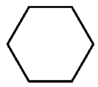 | $OCH_2$ | F | H | $OC_3H_7$ | |
| 4804 | $CH_3O$ | F | F |  | — | 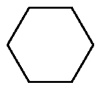 | $OCH_2$ | F | H | $OC_4H_9$ | |
| 4805 | $CH_3O$ | F | F |  | — | 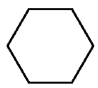 | $OCH_2$ | F | H | $OC_5H_{11}$ | |
| 4806 | $C_2H_5O$ | F | F | 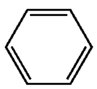 | — | 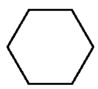 | $OCH_2$ | F | H | $OCH_3$ | |
| 4807 | $C_2H_5O$ | F | F |  | — | 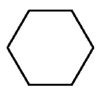 | $OCH_2$ | F | H | $OC_2H_5$ | |
| 4808 | $C_2H_5O$ | F | F |  | — | 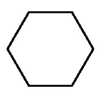 | $OCH_2$ | F | H | $OC_3H_7$ | |
| 4809 | $C_2H_5O$ | F | F | 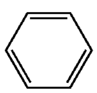 | — | 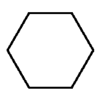 | $OCH_2$ | F | H | $OC_4H_9$ | |
| 4810 | $C_2H_5O$ | F | F | 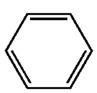 | — | 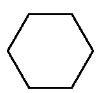 | $OCH_2$ | F | H | $OC_5H_{11}$ | |
| 4811 | $C_3H_7O$ | F | F | 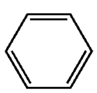 | — | 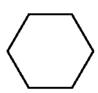 | $OCH_2$ | F | H | $OCH_3$ | |
| 4812 | $C_3H_7O$ | F | F | 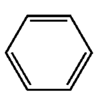 | — | 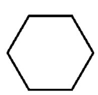 | $OCH_2$ | F | H | $OC_2H_5$ | |
| 4813 | $C_3H_7O$ | F | F | 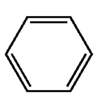 | — | 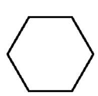 | $OCH_2$ | F | H | $OC_3H_7$ | |
| 4814 | $C_3H_7O$ | F | F | 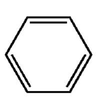 | — | 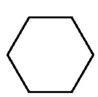 | $OCH_2$ | F | H | $OC_4H_9$ | |
| 4815 | $C_3H_7O$ | F | F | 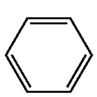 | — | 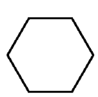 | $OCH_2$ | F | H | $OC_5H_{11}$ | |

TABLE 320

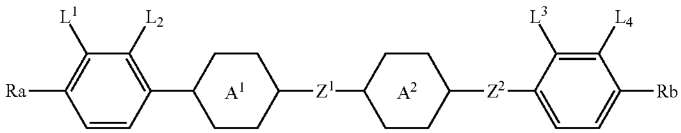

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4816 | $C_4H_9O$ | F | F | 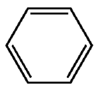 | — | 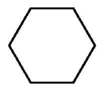 | $OCH_2$ | F | H | $OCH_3$ | |
| 4817 | $C_4H_9O$ | F | F |  | — | 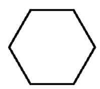 | $OCH_2$ | F | H | $OC_2H_5$ | |
| 4818 | $C_4H_9O$ | F | F |  | — | 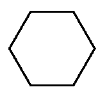 | $OCH_2$ | F | H | $OC_3H_7$ | |
| 4819 | $C_4H_9O$ | F | F |  | — | 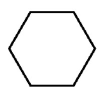 | $OCH_2$ | F | H | $OC_4H_9$ | |
| 4820 | $C_4H_9O$ | F | F | 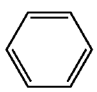 | — | 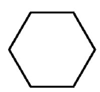 | $OCH_2$ | F | H | $OC_5H_{11}$ | |
| 4821 | $C_5H_{11}O$ | F | F | 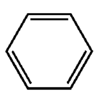 | — | 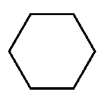 | $OCH_2$ | F | H | $OCH_3$ | |
| 4822 | $C_5H_{11}O$ | F | F | 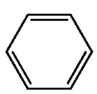 | — | 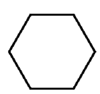 | $OCH_2$ | F | H | $OC_2H_5$ | |
| 4823 | $C_5H_{11}O$ | F | F | 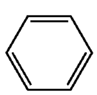 | — | 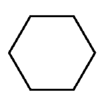 | $OCH_2$ | F | H | $OC_3H_7$ | |
| 4824 | $C_5H_{11}O$ | F | F | 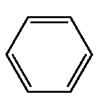 | — | 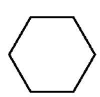 | $OCH_2$ | F | H | $OC_4H_9$ | |
| 4825 | $C_5H_{11}O$ | F | F | 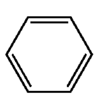 | — | 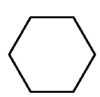 | $OCH_2$ | F | H | $OC_5H_{11}$ | |
| 4826 | $C_2H_5$ | F | F | 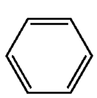 | — | 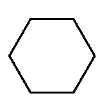 | $OCH_2$ | F | H | $C_4H_9$ | |
| 4827 | $C_5H_{11}$ | F | F | 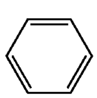 | — | 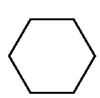 | $OCH_2$ | F | H | $C_2H_5$ | |
| 4828 | $C_2H_5$ | F | F | 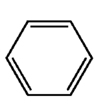 | — | 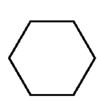 | $OCH_2$ | F | H | $OC_4H_9$ | |

TABLE 320-continued

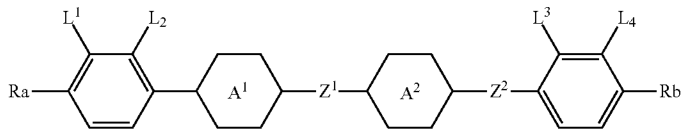

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4829 | $CH_2$═CH | F | F | 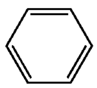 | — | 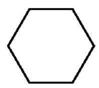 | $OCH_2$ | F | H | $OC_3H_7$ | |
| 4830 | $CH_2$═CH | F | F | 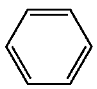 | — | 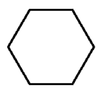 | $OCH_2$ | F | H | $OC_5H_{11}$ | |

TABLE 321

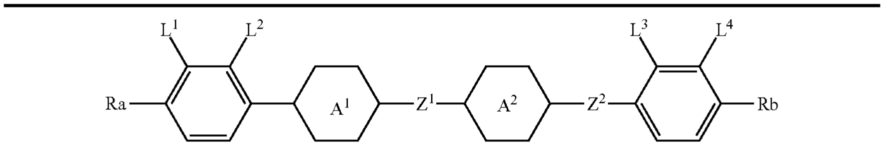

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4831 | $CH_3O$ | F | F | 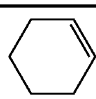 | — | 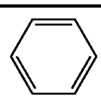 | $OCH_2$ | F | F | $OCH_3$ | |
| 4832 | $CH_3O$ | F | F | 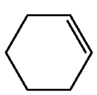 | — | 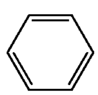 | $OCH_2$ | F | F | $OC_2H_5$ | |
| 4833 | $CH_3O$ | F | F | 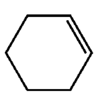 | — | 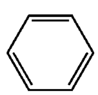 | $OCH_2$ | F | F | $OC_3H_7$ | |
| 4834 | $CH_3O$ | F | F | 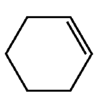 | — | 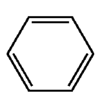 | $OCH_2$ | F | F | $OC_4H_9$ | |
| 4835 | $CH_3O$ | F | F | 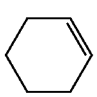 | — | 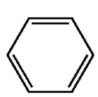 | $OCH_2$ | F | F | $OC_5H_{11}$ | |
| 4836 | $C_2H_5O$ | F | F | 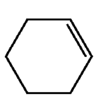 | — | 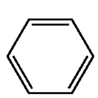 | $OCH_2$ | F | F | $OCH_3$ | |
| 4837 | $C_2H_5O$ | F | F | 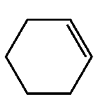 | — | 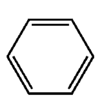 | $OCH_2$ | F | F | $OC_2H_5$ | |
| 4838 | $C_2H_5O$ | F | F | 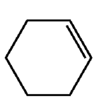 | — | 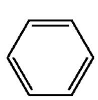 | $OCH_2$ | F | F | $OC_3H_7$ | |
| 4839 | $C_2H_5O$ | F | F | 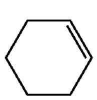 | — | 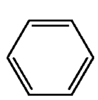 | $OCH_2$ | F | F | $OC_4H_9$ | |

TABLE 321-continued

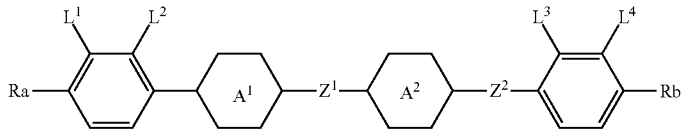

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4840 | $C_2H_5O$ | F | F | 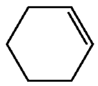 | — | 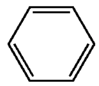 | $OCH_2$ | F | F | $OC_5H_{11}$ | |
| 4841 | $C_3H_7O$ | F | F | 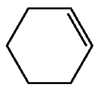 | — | 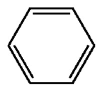 | $OCH_2$ | F | F | $OCH_3$ | |
| 4842 | $C_3H_7O$ | F | F | 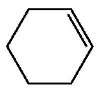 | — |  | $OCH_2$ | F | F | $OC_2H_5$ | |
| 4843 | $C_3H_7O$ | F | F | 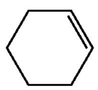 | — | 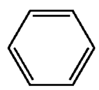 | $OCH_2$ | F | F | $OC_3H_7$ | |
| 4844 | $C_3H_7O$ | F | F | 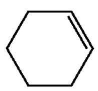 | — | 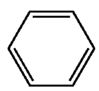 | $OCH_2$ | F | F | $OC_4H_9$ | |
| 4845 | $C_3H_7O$ | F | F | 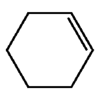 | — | 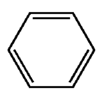 | $OCH_2$ | F | F | $OC_5H_{11}$ | |

TABLE 322

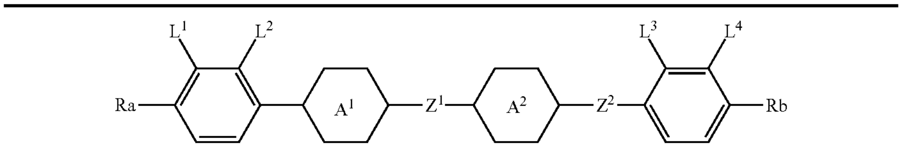

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4846 | $C_4H_9O$ | F | F | 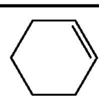 | — | 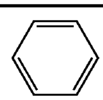 | $OCH_2$ | F | F | $OCH_3$ | |
| 4847 | $C_4H_9O$ | F | F | 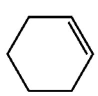 | — | 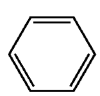 | $OCH_2$ | F | F | $OC_2H_5$ | |
| 4848 | $C_4H_9O$ | F | F | 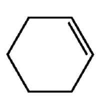 | — | 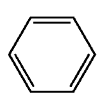 | $OCH_2$ | F | F | $OC_3H_7$ | |
| 4849 | $C_4H_9O$ | F | F | 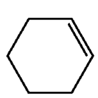 | — | 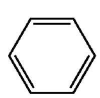 | $OCH_2$ | F | F | $OC_4H_9$ | |
| 4850 | $C_4H_9O$ | F | F | 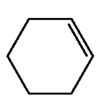 | — | 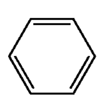 | $OCH_2$ | F | F | $OC_5H_{11}$ | |
| 4851 | $C_5H_{11}O$ | F | F | 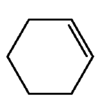 | — | 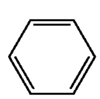 | $OCH_2$ | F | F | $OCH_3$ | |

TABLE 322-continued

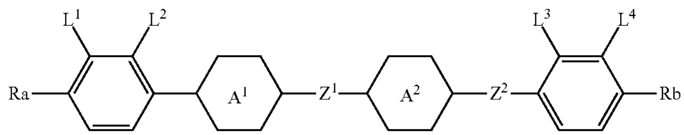

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4852 | $C_5H_{11}O$ | F | F | 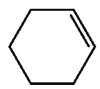 | — | 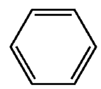 | $OCH_2$ | F | F | $OC_2H_5$ | |
| 4853 | $C_5H_{11}O$ | F | F | 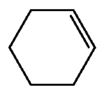 | — | 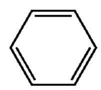 | $OCH_2$ | F | F | $OC_3H_7$ | |
| 4854 | $C_5H_{11}O$ | F | F | 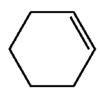 | — | 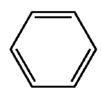 | $OCH_2$ | F | F | $OC_4H_9$ | |
| 4855 | $C_5H_{11}O$ | F | F | 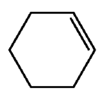 | — | 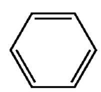 | $OCH_2$ | F | F | $OC_5H_{11}$ | |
| 4856 | $C_2H_5$ | F | F | 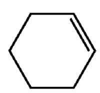 | — | 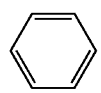 | $OCH_2$ | F | F | $C_4H_9$ | |
| 4857 | $C_5H_{11}$ | F | F | 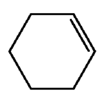 | — | 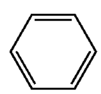 | $OCH_2$ | F | F | $C_2H_5$ | |
| 4858 | $C_2H_5$ | F | F | 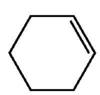 | — | 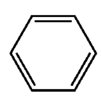 | $OCH_2$ | F | F | $OC_4H_9$ | |
| 4859 | $CH_2{=}CH$ | F | F | 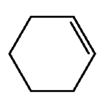 | — | 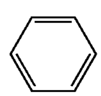 | $OCH_2$ | F | F | $OC_3H_7$ | |
| 4860 | $CH_2{=}CH$ | F | F | 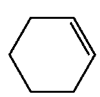 | — | 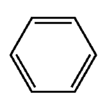 | $OCH_2$ | F | F | $OC_5H_{11}$ | |

TABLE 323

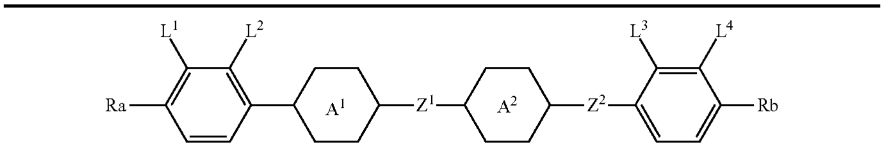

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4861 | $CH_3O$ | F | F | 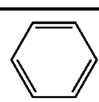 | — | 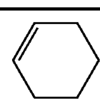 | $OCH_2$ | F | F | $OCH_3$ | |
| 4862 | $CH_3O$ | F | F | 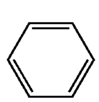 | — | 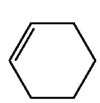 | $OCH_2$ | F | F | $OC_2H_5$ | |

TABLE 323-continued

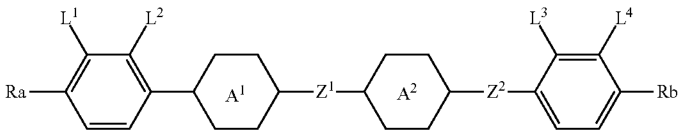

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4863 | $CH_3O$ | F | F |  | — | 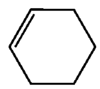 | $OCH_2$ | F | F | $OC_3H_7$ | |
| 4864 | $CH_3O$ | F | F |  | — | 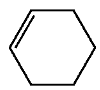 | $OCH_2$ | F | F | $OC_4H_9$ | |
| 4865 | $CH_3O$ | F | F | 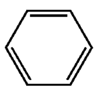 | — | 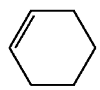 | $OCH_2$ | F | F | $OC_5H_{11}$ | |
| 4866 | $C_2H_5O$ | F | F |  | — | 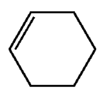 | $OCH_2$ | F | F | $OCH_3$ | |
| 4867 | $C_2H_5O$ | F | F |  | — | 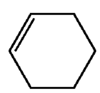 | $OCH_2$ | F | F | $OC_2H_5$ | |
| 4868 | $C_2H_5O$ | F | F | 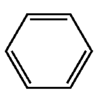 | — | 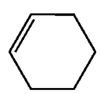 | $OCH_2$ | F | F | $OC_3H_7$ | |
| 4869 | $C_2H_5O$ | F | F | 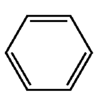 | — | 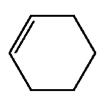 | $OCH_2$ | F | F | $OC_4H_9$ | |
| 4870 | $C_2H_5O$ | F | F | 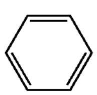 | — | 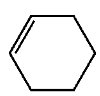 | $OCH_2$ | F | F | $OC_5H_{11}$ | |
| 4871 | $C_3H_7O$ | F | F | 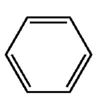 | — | 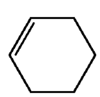 | $OCH_2$ | F | F | $OCH_3$ | |
| 4872 | $C_3H_7O$ | F | F | 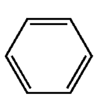 | — | 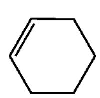 | $OCH_2$ | F | F | $OC_2H_5$ | |
| 4873 | $C_3H_7O$ | F | F | 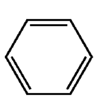 | — | 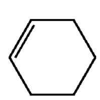 | $OCH_2$ | F | F | $OC_3H_7$ | |
| 4874 | $C_3H_7O$ | F | F | 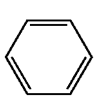 | — | 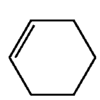 | $OCH_2$ | F | F | $OC_4H_9$ | |
| 4875 | $C_3H_7O$ | F | F | 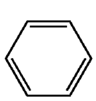 | — | 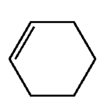 | $OCH_2$ | F | F | $OC_5H_{11}$ | |

TABLE 324

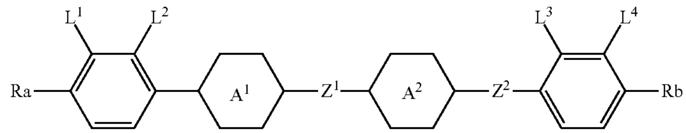

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4876 | $C_4H_9O$ | F | F |  | — | 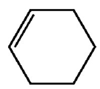 | $OCH_2$ | F | F | $OCH_3$ | |
| 4877 | $C_4H_9O$ | F | F | 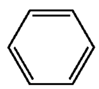 | — | 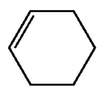 | $OCH_2$ | F | F | $OC_2H_5$ | |
| 4878 | $C_4H_9O$ | F | F | 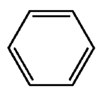 | — | 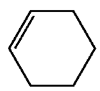 | $OCH_2$ | F | F | $OC_3H_7$ | |
| 4879 | $C_4H_9O$ | F | F | 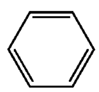 | — | 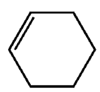 | $OCH_2$ | F | F | $OC_4H_9$ | |
| 4880 | $C_4H_9O$ | F | F | 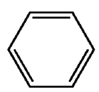 | — | 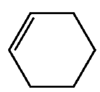 | $OCH_2$ | F | F | $OC_5H_{11}$ | |
| 4881 | $C_5H_{11}O$ | F | F | 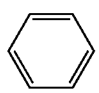 | — | 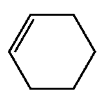 | $OCH_2$ | F | F | $OCH_3$ | |
| 4882 | $C_5H_{11}O$ | F | F | 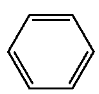 | — | 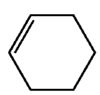 | $OCH_2$ | F | F | $OC_2H_5$ | |
| 4883 | $C_5H_{11}O$ | F | F | 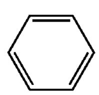 | — | 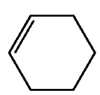 | $OCH_2$ | F | F | $OC_3H_7$ | |
| 4884 | $C_5H_{11}O$ | F | F | 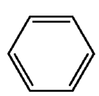 | — | 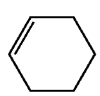 | $OCH_2$ | F | F | $OC_4H_9$ | |
| 4885 | $C_5H_{11}O$ | F | F | 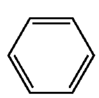 | — | 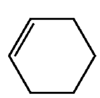 | $OCH_2$ | F | F | $OC_5H_{11}$ | |
| 4886 | $C_2H_5$ | F | F | 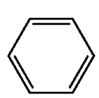 | — | 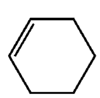 | $OCH_2$ | F | F | $C_4H_9$ | |
| 4887 | $C_5H_{11}$ | F | F | 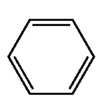 | — | 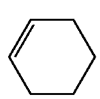 | $OCH_2$ | F | F | $C_2H_5$ | |
| 4888 | $C_2H_5$ | F | F | 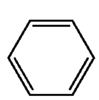 | — | 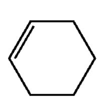 | $OCH_2$ | F | F | $OC_4H_9$ | |

TABLE 324-continued

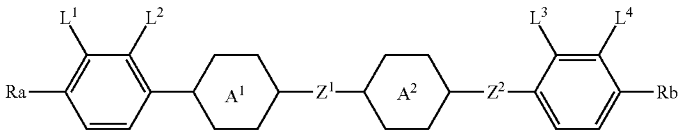

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4889 | $CH_2$═CH | F | F |  | — | 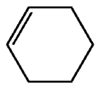 | $OCH_2$ | F | F | $OC_3H_7$ | |
| 4890 | $CH_2$═CH | F | F | 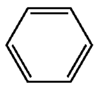 | — | 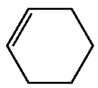 | $OCH_2$ | F | F | $OC_5H_{11}$ | |

TABLE 325

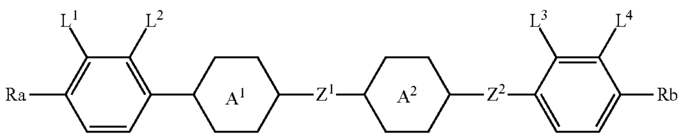

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4891 | $CH_3O$ | F | F | 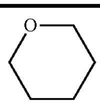 | — | 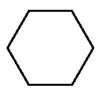 | $OCH_2$ | F | F | $OCH_3$ | |
| 4892 | $CH_3O$ | F | F | 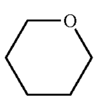 | — | 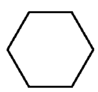 | $OCH_2$ | F | F | $OC_2H_5$ | |
| 4893 | $CH_3O$ | F | F | 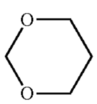 | — | 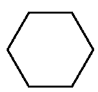 | $OCH_2$ | F | F | $OC_3H_7$ | |
| 4894 | $CH_3O$ | F | F | 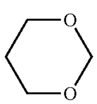 | — | 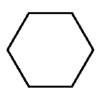 | $OCH_2$ | F | F | $OC_4H_9$ | |
| 4895 | $CH_3O$ | F | F | 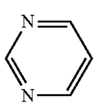 | — | 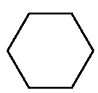 | $OCH_2$ | F | F | $OC_5H_{11}$ | |
| 4896 | $C_2H_5O$ | F | F | 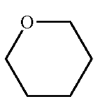 | — | 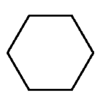 | $OCH_2$ | F | F | $OCH_3$ | |
| 4897 | $C_2H_5O$ | F | F | 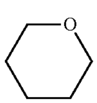 | — | 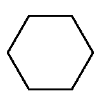 | $OCH_2$ | F | F | $OC_2H_5$ | |
| 4898 | $C_2H_5O$ | F | F | 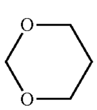 | — | 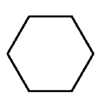 | $OCH_2$ | F | F | $OC_3H_7$ | |
| 4899 | $C_2H_5O$ | F | F | 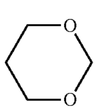 | — | 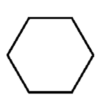 | $OCH_2$ | F | F | $OC_4H_9$ | |

TABLE 325-continued

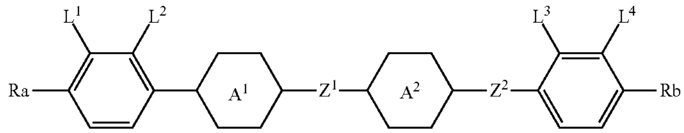

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4900 | $C_2H_5O$ | F | F | 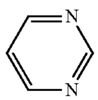 | — | 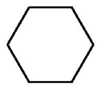 | $OCH_2$ | F | F | $OC_5H_{11}$ | |
| 4901 | $C_3H_7O$ | F | F | 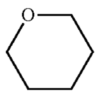 | — | 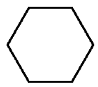 | $OCH_2$ | F | F | $OCH_3$ | |
| 4902 | $C_3H_7O$ | F | F | 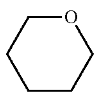 | — | 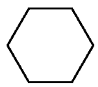 | $OCH_2$ | F | F | $OC_2H_5$ | |
| 4903 | $C_3H_7O$ | F | F | 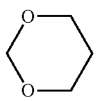 | — | 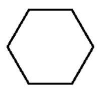 | $OCH_2$ | F | F | $OC_3H_7$ | |
| 4904 | $C_3H_7O$ | F | F | 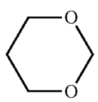 | — | 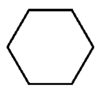 | $OCH_2$ | F | F | $OC_4H_9$ | |
| 4905 | $C_3H_7O$ | F | F | 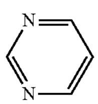 | — | 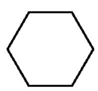 | $OCH_2$ | F | F | $OC_5H_{11}$ | |

TABLE 326

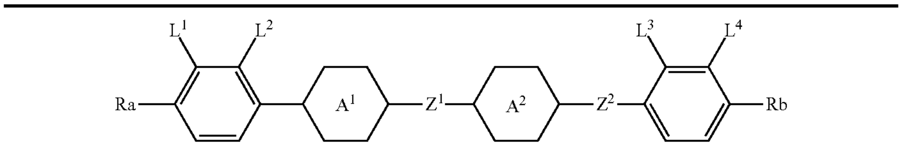

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4906 | $C_4H_9O$ | F | F | 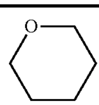 | — | 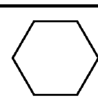 | $OCH_2$ | F | F | $OCH_3$ | |
| 4907 | $C_4H_9O$ | F | F | 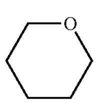 | — | 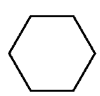 | $OCH_2$ | F | F | $OC_2H_5$ | |
| 4908 | $C_4H_9O$ | F | F | 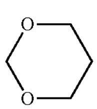 | — | 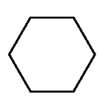 | $OCH_2$ | F | F | $OC_3H_7$ | |
| 4909 | $C_4H_9O$ | F | F | 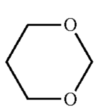 | — | 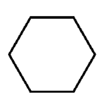 | $OCH_2$ | F | F | $OC_4H_9$ | |

TABLE 326-continued
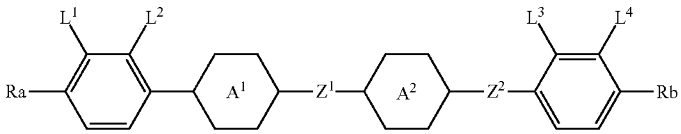
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4910 | $C_4H_9O$ | F | F | 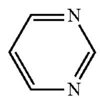 | — | 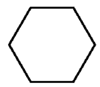 | $OCH_2$ | F | F | $OC_5H_{11}$ | |
| 4911 | $C_5H_{11}O$ | F | F | 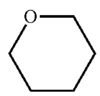 | — | 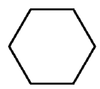 | $OCH_2$ | F | F | $OCH_3$ | |
| 4912 | $C_5H_{11}O$ | F | F | 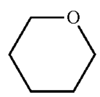 | — | 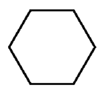 | $OCH_2$ | F | F | $OC_2H_5$ | |
| 4913 | $C_5H_{11}O$ | F | F | 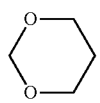 | — | 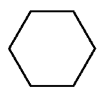 | $OCH_2$ | F | F | $OC_3H_7$ | |
| 4914 | $C_5H_{11}O$ | F | F | 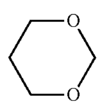 | — | 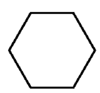 | $OCH_2$ | F | F | $OC_4H_9$ | |
| 4915 | $C_5H_{11}O$ | F | F | 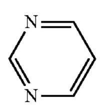 | — | 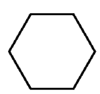 | $OCH_2$ | F | F | $OC_5H_{11}$ | |
| 4916 | $C_2H_5$ | F | F | 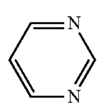 | — | 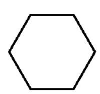 | $OCH_2$ | F | F | $C_4H_9$ | |
| 4917 | $C_5H_{11}$ | F | F | 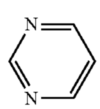 | — | 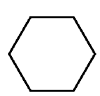 | $OCH_2$ | F | F | $C_2H_5$ | |
| 4918 | $C_2H_5$ | F | F | 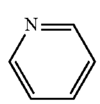 | — | 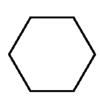 | $OCH_2$ | F | F | $OC_4H_9$ | |
| 4919 | $CH_2{=}CH$ | F | F | 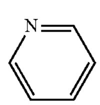 | — | 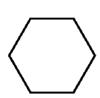 | $OCH_2$ | F | F | $OC_3H_7$ | |
| 4920 | $CH_2{=}CH$ | F | F | 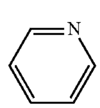 | — | 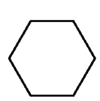 | $OCH_2$ | F | F | $OC_5H_{11}$ | |

TABLE 327
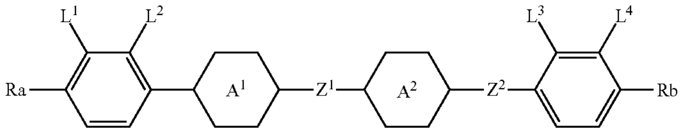
COO = 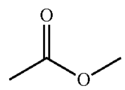
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4921 | $CH_3O$ | F | F | 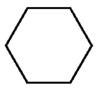 | — | 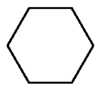 | COO | F | F | $OCH_3$ | |
| 4922 | $CH_3O$ | F | F | 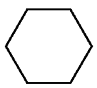 | — | 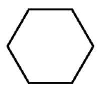 | COO | F | F | $OC_2H_5$ | |
| 4923 | $CH_3O$ | F | F | 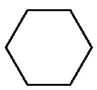 | — | 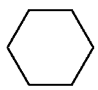 | COO | F | F | $OC_3H_7$ | |
| 4924 | $CH_3O$ | F | F | 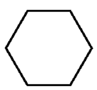 | — | 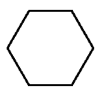 | COO | F | F | $OC_4H_9$ | |
| 4925 | $CH_3O$ | F | F | 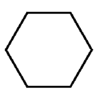 | — | 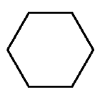 | COO | F | F | $OC_5H_{11}$ | |
| 4926 | $C_2H_5O$ | F | F | 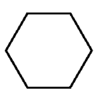 | — | 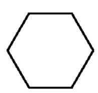 | COO | F | F | $OCH_3$ | |
| 4927 | $C_2H_5O$ | F | F | 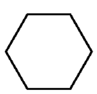 | — | 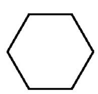 | COO | F | F | $OC_2H_5$ | |
| 4928 | $C_2H_5O$ | F | F | 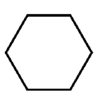 | — | 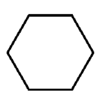 | COO | F | F | $OC_3H_7$ | |
| 4929 | $C_2H_5O$ | F | F | 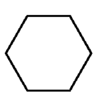 | — | 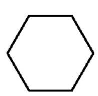 | COO | F | F | $OC_4H_9$ | |
| 4930 | $C_2H_5O$ | F | F | 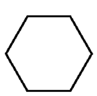 | — | 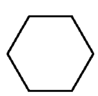 | COO | F | F | $OC_5H_{11}$ | |
| 4931 | $C_3H_7O$ | F | F | 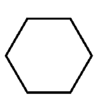 | — | 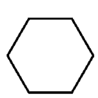 | COO | F | F | $OCH_3$ | |
| 4932 | $C_3H_7O$ | F | F | 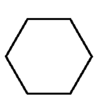 | — | 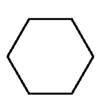 | COO | F | F | $OC_2H_5$ | |
| 4933 | $C_3H_7O$ | F | F | 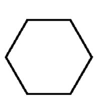 | — | 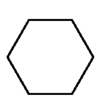 | COO | F | F | $OC_3H_7$ | |

TABLE 327-continued

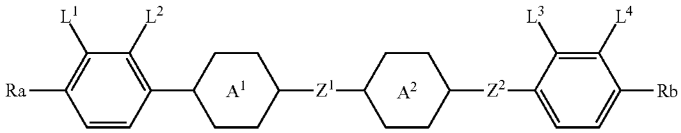

COO = 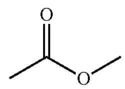

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4934 | $C_3H_7O$ | F | F | 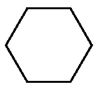 | — | 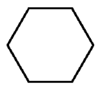 | COO | F | F | $OC_4H_9$ | |
| 4935 | $C_3H_7O$ | F | F | 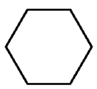 | — | 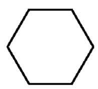 | COO | F | F | $OC_5H_{11}$ | |

TABLE 328

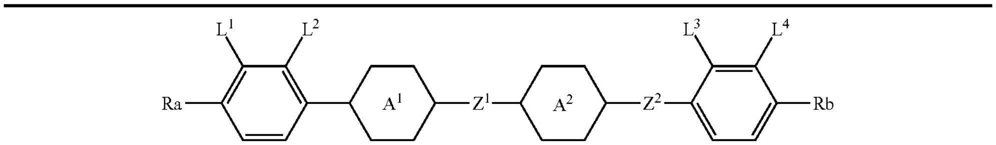

COO = 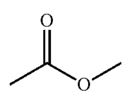

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4936 | $C_4H_9O$ | F | F | 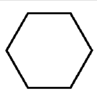 | — | 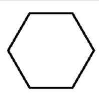 | COO | F | F | $OCH_3$ | C 91.2 SC 151.5 SA 182.8 N 293.8 I TNI: 200.6° C., Δϵ: −7.99, Δn: 0.127 |
| 4937 | $C_4H_9O$ | F | F | 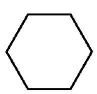 | — | 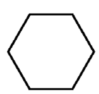 | COO | F | F | $OC_2H_5$ | |
| 4938 | $C_4H_9O$ | F | F | 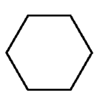 | — | 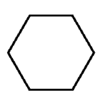 | COO | F | F | $OC_3H_7$ | |
| 4939 | $C_4H_9O$ | F | F | 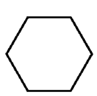 | — | 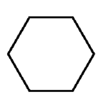 | COO | F | F | $OC_4H_9$ | |
| 4940 | $C_4H_9O$ | F | F | 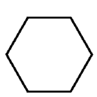 | — | 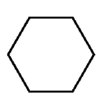 | COO | F | F | $OC_5H_{11}$ | |
| 4941 | $C_5H_{11}O$ | F | F | 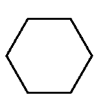 | — | 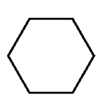 | COO | F | F | $OCH_3$ | |
| 4942 | $C_5H_{11}O$ | F | F | 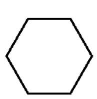 | — | 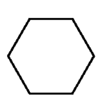 | COO | F | F | $OC_2H_5$ | |
| 4943 | $C_5H_{11}O$ | F | F | 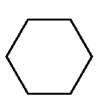 | — | 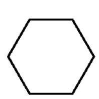 | COO | F | F | $OC_3H_7$ | |

TABLE 328-continued

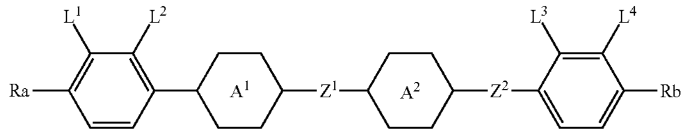

COO = 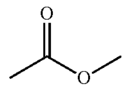

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4944 | $C_5H_{11}O$ | F | F | 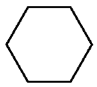 | — | 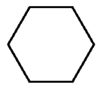 | COO | F | F | $OC_4H_9$ | |
| 4945 | $C_5H_{11}O$ | F | F | 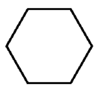 | — | 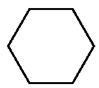 | COO | F | F | $OC_5H_{11}$ | |
| 4946 | $C_2H_5$ | F | F | 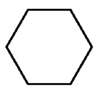 | — | 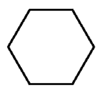 | COO | F | F | $C_4H_9$ | |
| 4947 | $C_5H_{11}$ | F | F | 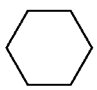 | — | 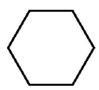 | COO | F | F | $C_2H_5$ | |
| 4948 | $C_2H_5$ | F | F | 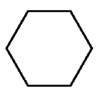 | — | 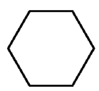 | COO | F | F | $OC_4H_9$ | |
| 4949 | $CH_2{=\!=}CH$ | F | F | 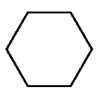 | — | 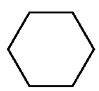 | COO | F | F | $OC_3H_7$ | |
| 4950 | $CH_2{=\!=}CH$ | F | F | 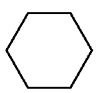 | — | 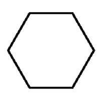 | COO | F | F | $OC_5H_{11}$ | |

TABLE 329

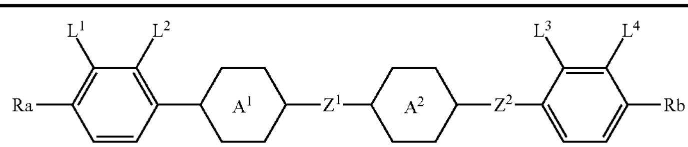

COO = 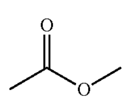

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4951 | $CH_2{=\!=}CHO$ | F | F | 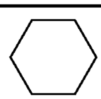 | — | 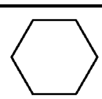 | COO | F | F | $OC_3H_7$ | |
| 4952 | $CH_2{=\!=}CHCH_2O$ | F | F | 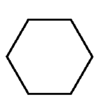 | — | 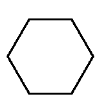 | COO | F | F | $OC_5H_{11}$ | |

TABLE 329-continued

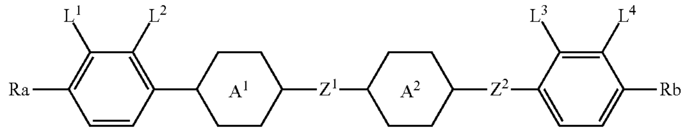

COO = 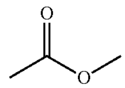

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4953 | $CH_2{=}CHCH_2O$ | F | F | 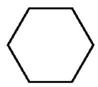 | — | 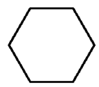 | COO | F | F | $OC_3H_7$ | |
| 4954 | $CH_2{=}CHC_2H_5O$ | F | F | 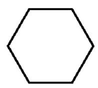 | — | 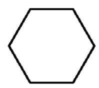 | COO | F | F | $OC_5H_{11}$ | |
| 4955 | $CH_2{=}CHC_2H_5O$ | F | F | 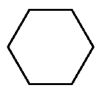 | — | 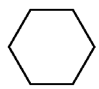 | COO | F | F | $OC_2H_5$ | |
| 4956 | $CH_2{=}CHC_2H_5O$ | F | F | 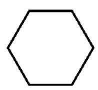 | — | 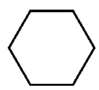 | COO | F | F | $OC_3H_7$ | |
| 4957 | $CH_3CH{=}CHCH_2O$ | F | F | 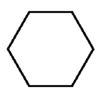 | — | 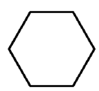 | COO | F | F | $OCH_3$ | |
| 4958 | $CH_3CH{=}CHCH_2O$ | F | F | 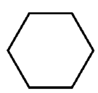 | — | 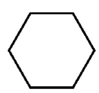 | COO | F | F | $OC_2H_5$ | |
| 4959 | $C_3H_7O$ | F | F | 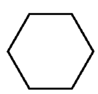 | — | 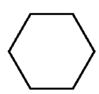 | COO | F | F | $OCH{=}CH_2$ | |
| 4960 | $C_3H_7O$ | F | F | 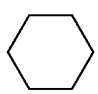 | — | 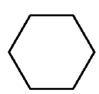 | COO | F | F | $OCH_2CH{=}CH_2$ | |
| 4961 | $C_4H_9O$ | F | F | 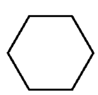 | — | 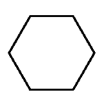 | COO | F | F | $OCH_2CH{=}CH_2$ | |
| 4962 | $C_5H_{11}O$ | F | F | 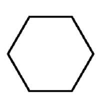 | — | 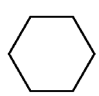 | COO | F | F | $OCH_2CH{=}CH_2$ | |
| 4963 | $CH_3O$ | F | F | 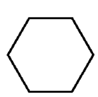 | — | 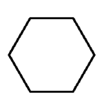 | COO | F | F | $OC_2H_5CH{=}CH_2$ | |
| 4964 | $C_2H_5O$ | F | F | 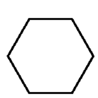 | — | 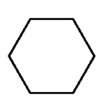 | COO | F | F | $OC_2H_5CH{=}CH_2$ | |
| 4965 | $C_3H_7O$ | F | F | 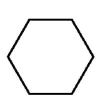 | — | 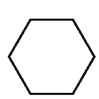 | COO | F | F | $OC_2H_5CH{=}CH_2$ | |

TABLE 330

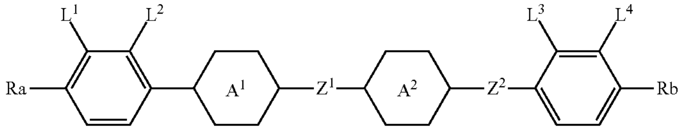

COO = 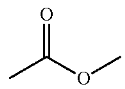

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4966 | $CH_3O$ | F | F | 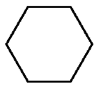 | — | 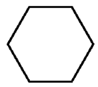 | COO | F | F | $OCH_2CH{=}CHCH_3$ | |
| 4967 | $C_2H_5O$ | F | F | 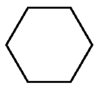 | — | 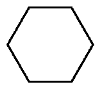 | COO | F | F | $OCH_2CH{=}CHCH_3$ | |
| 4968 | $C_3H_7O$ | F | F | 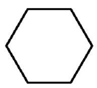 | — | 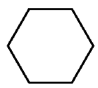 | COO | F | F | $OCH_2CH{=}CHCH_3$ | |
| 4969 | $CH_2{=}CHCH_2O$ | F | F | 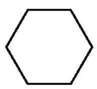 | — | 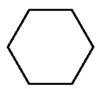 | COO | F | F | $OCH{=}CH_2$ | |
| 4970 | $CH_2{=}CHC_2H_5O$ | F | F | 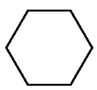 | — | 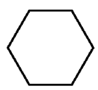 | COO | F | F | $OCH_2CH{=}CH_2$ | |
| 4971 | $C_3H_7OCH_2$ | F | F | 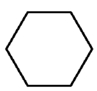 | — | 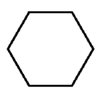 | COO | F | F | $OC_3H_7$ | |
| 4972 | $C_5H_{11}O$ | F | F | 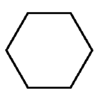 | — | 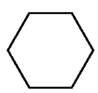 | COO | F | F | $OC_2H_5CH{=}CH_2$ | |
| 4973 | $C_3H_7O$ | F | F | 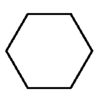 | — | 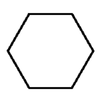 | COO | F | F | H | |
| 4974 | $C_5H_{11}O$ | F | F | 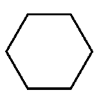 | — | 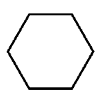 | COO | F | F | $OC_9H_{19}$ | |
| 4975 | $C_3H_7O$ | F | F | 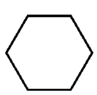 | — | 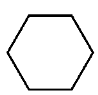 | COO | F | F | $C_2H_5$ | |
| 4976 | $C_5H_{11}O$ | F | F | 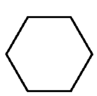 | — | 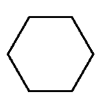 | COO | F | F | $C_3H_7$ | |
| 4977 | H | F | F | 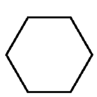 | — | 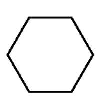 | COO | F | F | $OC_4H_9$ | |
| 4978 | $C_7H_{15}O$ | F | F | 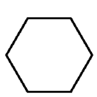 | — | 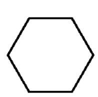 | COO | F | F | $OC_4H_9$ | |

TABLE 330-continued
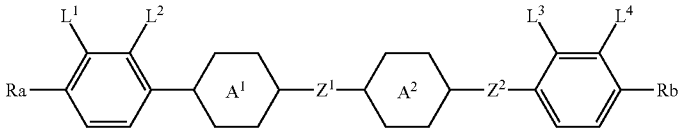
COO = 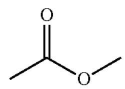
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4979 | $C_2H_5O$ | F | F | 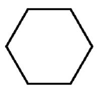 | — | 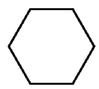 | COO | F | F | $OC_6H_{13}$ | |
| 4980 | $CH_3O$ | F | F | 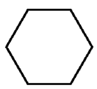 | — | 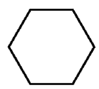 | COO | F | F | $C_2H_5$ | |
TABLE 331
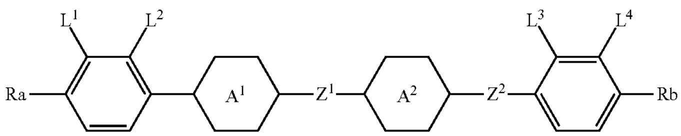
COO = 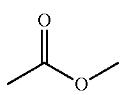
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4981 | $CH_3O$ | H | F | 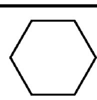 | — | 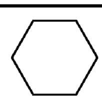 | COO | F | F | $OCH_3$ | |
| 4982 | $CH_3O$ | H | F | 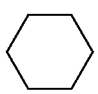 | — | 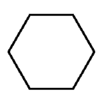 | COO | F | F | $OC_2H_5$ | |
| 4983 | $CH_3O$ | H | F | 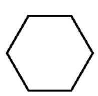 | — | 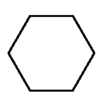 | COO | F | F | $OC_3H_7$ | |
| 4984 | $CH_3O$ | H | F | 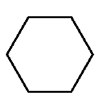 | — | 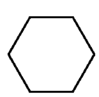 | COO | F | F | $OC_4H_9$ | |
| 4985 | $CH_3O$ | H | F | 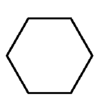 | — | 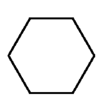 | COO | F | F | $OC_5H_{11}$ | |
| 4986 | $C_2H_5O$ | H | F | 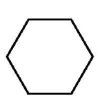 | — | 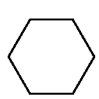 | COO | F | F | $OCH_3$ | |
| 4987 | $C_2H_5O$ | H | F | 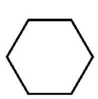 | — | 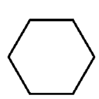 | COO | F | F | $OC_2H_5$ | |

TABLE 331-continued

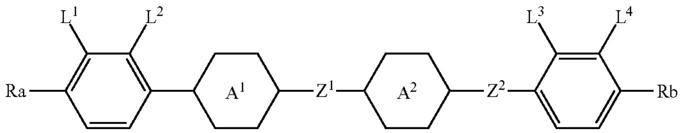

COO = 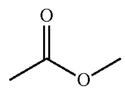

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4988 | $C_2H_5O$ | H | F | 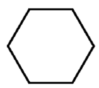 | — | 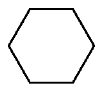 | COO | F | F | $OC_3H_7$ | |
| 4989 | $C_2H_5O$ | H | F | 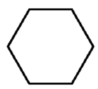 | — | 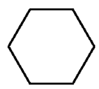 | COO | F | F | $OC_4H_9$ | |
| 4990 | $C_2H_5O$ | H | F | 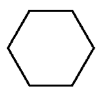 | — | 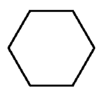 | COO | F | F | $OC_5H_{11}$ | |
| 4991 | $C_3H_7O$ | H | F | 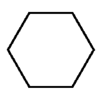 | — | 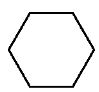 | COO | F | F | $OCH_3$ | |
| 4992 | $C_3H_7O$ | H | F | 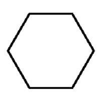 | — | 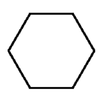 | COO | F | F | $OC_2H_5$ | |
| 4993 | $C_3H_7O$ | H | F | 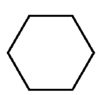 | — | 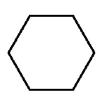 | COO | F | F | $OC_3H_7$ | |
| 4994 | $C_3H_7O$ | H | F | 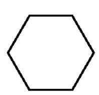 | — | 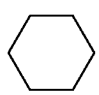 | COO | F | F | $OC_4H_9$ | |
| 4995 | $C_3H_7O$ | H | F | 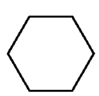 | — | 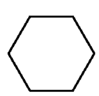 | COO | F | F | $OC_5H_{11}$ | |

TABLE 332

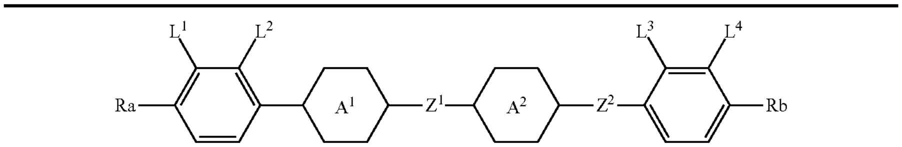

COO = 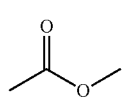

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4996 | $C_4H_9O$ | H | F | 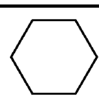 | — | 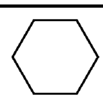 | COO | F | F | $OCH_3$ | |

TABLE 332-continued
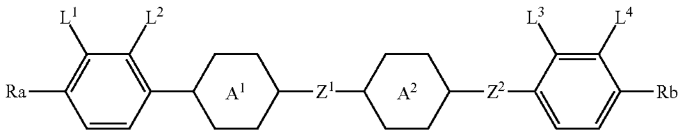
COO = 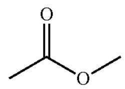
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 4997 | $C_4H_9O$ | H | F | 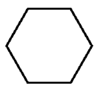 | — | 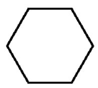 | COO | F | F | $OC_2H_5$ | |
| 4998 | $C_4H_9O$ | H | F | 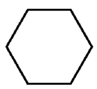 | — | 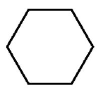 | COO | F | F | $OC_3H_7$ | |
| 4999 | $C_4H_9O$ | H | F | 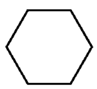 | — | 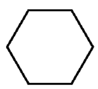 | COO | F | F | $OC_4H_9$ | |
| 5000 | $C_4H_9O$ | H | F | 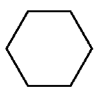 | — | 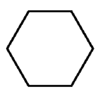 | COO | F | F | $OC_5H_{11}$ | |
| 5001 | $C_5H_{11}O$ | H | F | 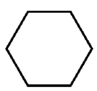 | — | 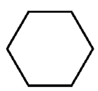 | COO | F | F | $OCH_3$ | |
| 5002 | $C_5H_{11}O$ | H | F | 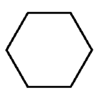 | — | 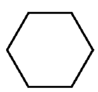 | COO | F | F | $OC_2H_5$ | |
| 5003 | $C_5H_{11}O$ | H | F | 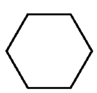 | — | 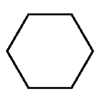 | COO | F | F | $OC_3H_7$ | |
| 5004 | $C_5H_{11}O$ | H | F | 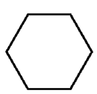 | — | 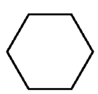 | COO | F | F | $OC_4H_9$ | |
| 5005 | $C_5H_{11}O$ | H | F | 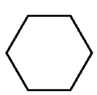 | — | 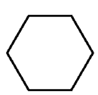 | COO | F | F | $OC_5H_{11}$ | |
| 5006 | $C_2H_5$ | H | F | 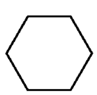 | — | 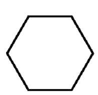 | COO | F | F | $C_4H_9$ | |
| 5007 | $C_5H_{11}$ | H | F | 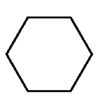 | — | 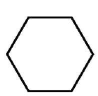 | COO | F | F | $C_2H_5$ | |
| 5008 | $C_2H_5$ | H | F | 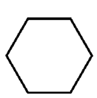 | — | 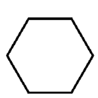 | COO | F | F | $OC_4H_9$ | |

TABLE 332-continued

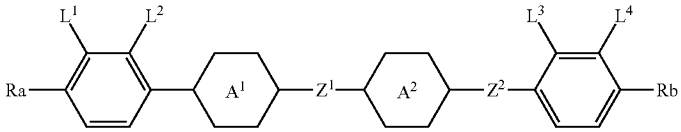

COO = 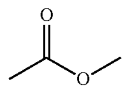

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5009 | $CH_2$═CH | H | F | 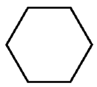 | — | 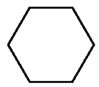 | COO | F | F | $OC_3H_7$ | |
| 5010 | $CH_2$═CH | H | F | 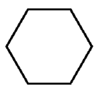 | — | 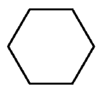 | COO | F | F | $OC_5H_{11}$ | |

TABLE 333

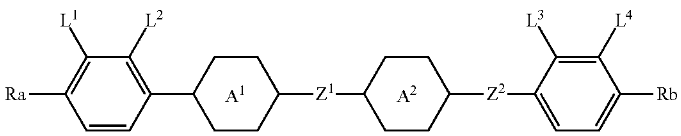

COO = 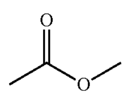

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5011 | $CH_3O$ | F | H | 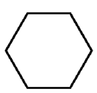 | — | 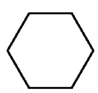 | COO | F | F | $OCH_3$ | |
| 5012 | $CH_3O$ | F | H | 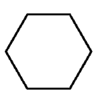 | — | 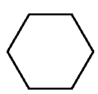 | COO | F | F | $OC_2H_5$ | |
| 5013 | $CH_3O$ | F | H | 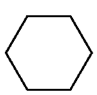 | — | 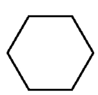 | COO | F | F | $OC_3H_7$ | |
| 5014 | $CH_3O$ | F | H | 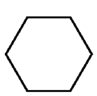 | — | 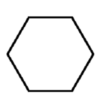 | COO | F | F | $OC_4H_9$ | |
| 5015 | $CH_3O$ | F | H | 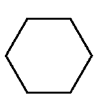 | — | 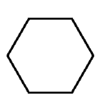 | COO | F | F | $OC_5H_{11}$ | |
| 5016 | $C_2H_5O$ | F | H | 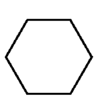 | — | 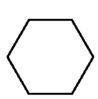 | COO | F | F | $OCH_3$ | |
| 5017 | $C_2H_5O$ | F | H | 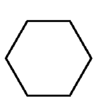 | — | 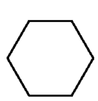 | COO | F | F | $OC_2H_5$ | |

TABLE 333-continued

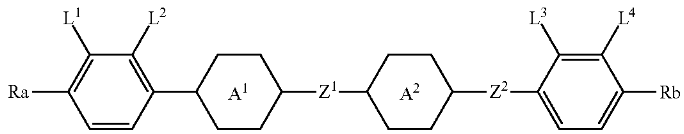

COO = 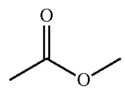

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5018 | $C_2H_5O$ | F | H | 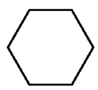 | — | 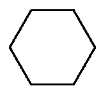 | COO | F | F | $OC_3H_7$ | |
| 5019 | $C_2H_5O$ | F | H | 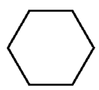 | — | 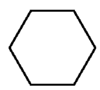 | COO | F | F | $OC_4H_9$ | |
| 5020 | $C_2H_5O$ | F | H | 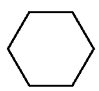 | — | 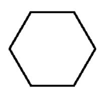 | COO | F | F | $OC_5H_{11}$ | |
| 5021 | $C_3H_7O$ | F | H | 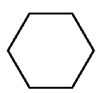 | — | 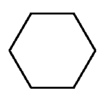 | COO | F | F | $OCH_3$ | |
| 5022 | $C_3H_7O$ | F | H | 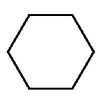 | — | 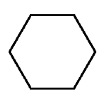 | COO | F | F | $OC_2H_5$ | |
| 5023 | $C_3H_7O$ | F | H | 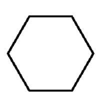 | — | 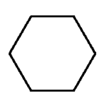 | COO | F | F | $OC_3H_7$ | |
| 5024 | $C_3H_7O$ | F | H | 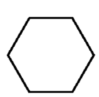 | — | 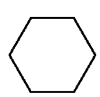 | COO | F | F | $OC_4H_9$ | |
| 5025 | $C_3H_7O$ | F | H | 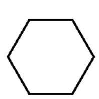 | — | 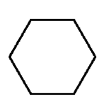 | COO | F | F | $OC_5H_{11}$ | |

TABLE 334

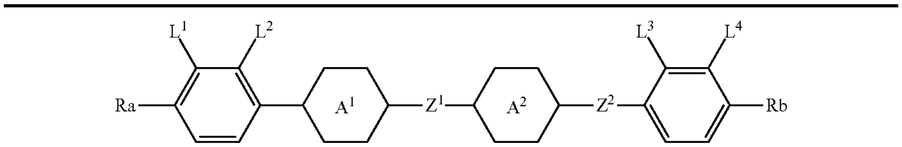

COO = 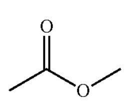

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5026 | $C_4H_9O$ | F | H | 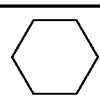 | — | 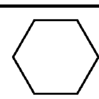 | COO | F | F | $OCH_3$ | |

TABLE 334-continued
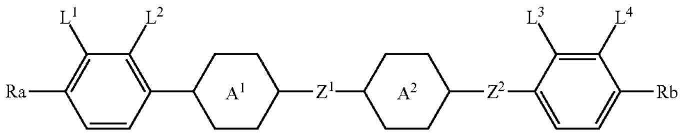
COO = 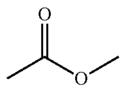
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5027 | $C_4H_9O$ | F | H | 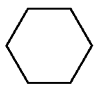 | — | 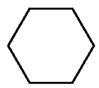 | COO | F | F | $OC_2H_5$ | |
| 5028 | $C_4H_9O$ | F | H | 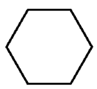 | — | 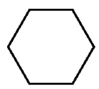 | COO | F | F | $OC_3H_7$ | |
| 5029 | $C_4H_9O$ | F | H | 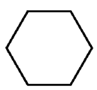 | — | 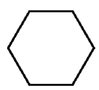 | COO | F | F | $OC_4H_9$ | |
| 5030 | $C_4H_9O$ | F | H | 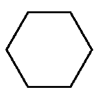 | — | 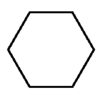 | COO | F | F | $OC_5H_{11}$ | |
| 5031 | $C_5H_{11}O$ | F | H | 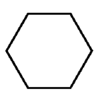 | — | 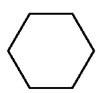 | COO | F | F | $OCH_3$ | |
| 5032 | $C_5H_{11}O$ | F | H | 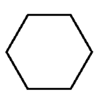 | — | 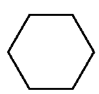 | COO | F | F | $OC_2H_5$ | |
| 5033 | $C_5H_{11}O$ | F | H | 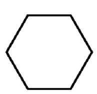 | — | 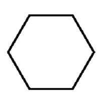 | COO | F | F | $OC_3H_7$ | |
| 5034 | $C_5H_{11}O$ | F | H | 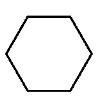 | — | 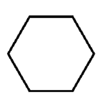 | COO | F | F | $OC_4H_9$ | |
| 5035 | $C_5H_{11}O$ | F | H | 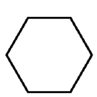 | — | 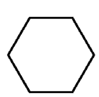 | COO | F | F | $OC_5H_{11}$ | |
| 5036 | $C_2H_5$ | F | H | 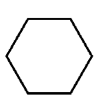 | — | 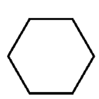 | COO | F | F | $C_4H_9$ | |
| 5037 | $C_5H_{11}$ | F | H | 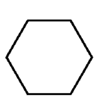 | — | 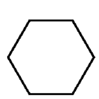 | COO | F | F | $C_2H_5$ | |
| 5038 | $C_2H_5$ | F | H | 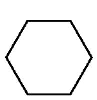 | — | 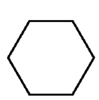 | COO | F | F | $OC_4H_9$ | |

TABLE 334-continued
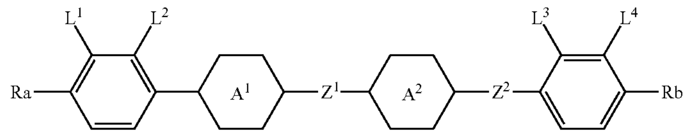
COO = 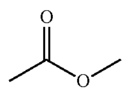
| No. | Ra | L¹ | L² | A¹ | Z¹ | A² | Z² | L³ | L⁴ | Rb | Physical property values |
|---|---|---|---|---|---|---|---|---|---|---|---|
| 5039 | $CH_2$=CH | F | H | 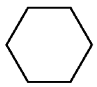 | — | 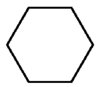 | COO | F | F | $OC_3H_7$ | |
| 5040 | $CH_2$=CH | F | H | 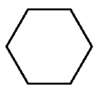 | — | 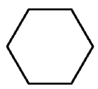 | COO | F | F | $OC_5H_{11}$ | |
TABLE 335
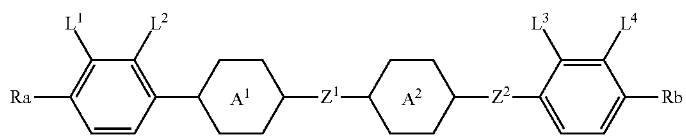
COO = 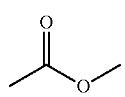
| No. | Ra | L¹ | L² | A¹ | Z¹ | A² | Z² | L³ | L⁴ | Rb | Physical property values |
|---|---|---|---|---|---|---|---|---|---|---|---|
| 5041 | $CH_3O$ | F | F | 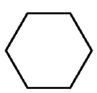 | — | 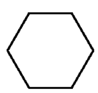 | COO | H | F | $OCH_3$ | |
| 5042 | $CH_3O$ | F | F | 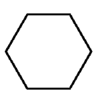 | — | 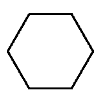 | COO | H | F | $OC_2H_5$ | |
| 5043 | $CH_3O$ | F | F | 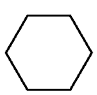 | — | 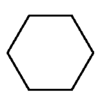 | COO | H | F | $OC_3H_7$ | |
| 5044 | $CH_3O$ | F | F | 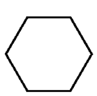 | — | 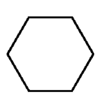 | COO | H | F | $OC_4H_9$ | |
| 5045 | $CH_3O$ | F | F | 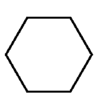 | — | 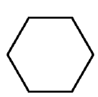 | COO | H | F | $OC_5H_{11}$ | |
| 5046 | $C_2H_5O$ | F | F | 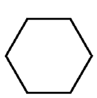 | — | 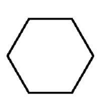 | COO | H | F | $OCH_3$ | |
| 5047 | $C_2H_5O$ | F | F | 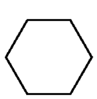 | — | 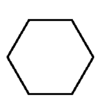 | COO | H | F | $OC_2H_5$ | |

TABLE 335-continued

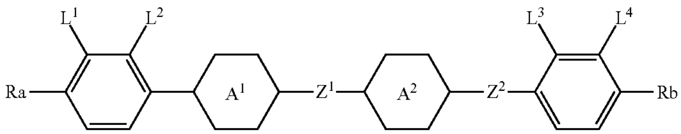

COO = 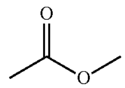

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5048 | $C_2H_5O$ | F | F | 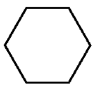 | — | 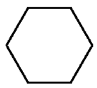 | COO | H | F | $OC_3H_7$ | |
| 5049 | $C_2H_5O$ | F | F | 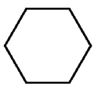 | — | 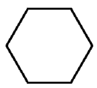 | COO | H | F | $OC_4H_9$ | |
| 5050 | $C_2H_5O$ | F | F | 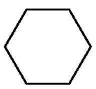 | — | 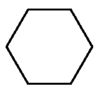 | COO | H | F | $OC_5H_{11}$ | |
| 5051 | $C_3H_7O$ | F | F | 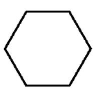 | — | 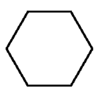 | COO | H | F | $OCH_3$ | |
| 5052 | $C_3H_7O$ | F | F | 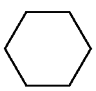 | — | 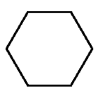 | COO | H | F | $OC_2H_5$ | |
| 5053 | $C_3H_7O$ | F | F | 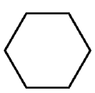 | — | 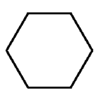 | COO | H | F | $OC_3H_7$ | |
| 5054 | $C_3H_7O$ | F | F | 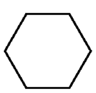 | — | 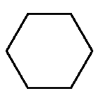 | COO | H | F | $OC_4H_9$ | |
| 5055 | $C_3H_7O$ | F | F | 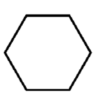 | — | 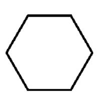 | COO | H | F | $OC_5H_{11}$ | |

TABLE 336

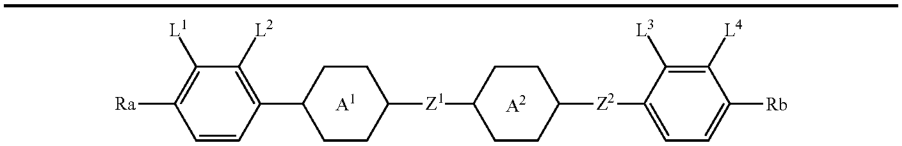

COO = 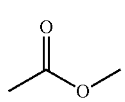

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5056 | $C_4H_9O$ | F | F | 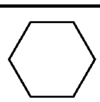 | — | 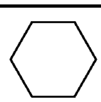 | COO | H | F | $OCH_3$ | |

TABLE 336-continued
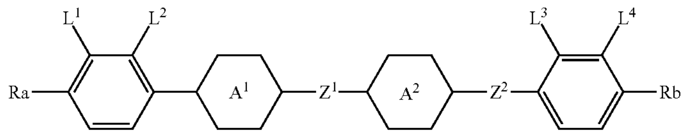
COO = 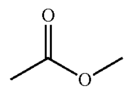
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5057 | $C_4H_9O$ | F | F | 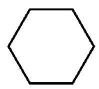 | — | 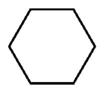 | COO | H | F | $OC_2H_5$ | |
| 5058 | $C_4H_9O$ | F | F | 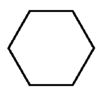 | — | 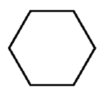 | COO | H | F | $OC_3H_7$ | |
| 5059 | $C_4H_9O$ | F | F | 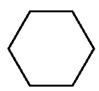 | — | 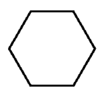 | COO | H | F | $OC_4H_9$ | |
| 5060 | $C_4H_9O$ | F | F | 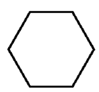 | — | 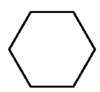 | COO | H | F | $OC_5H_{11}$ | |
| 5061 | $C_5H_{11}O$ | F | F | 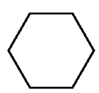 | — | 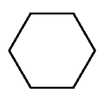 | COO | H | F | $OCH_3$ | |
| 5062 | $C_5H_{11}O$ | F | F | 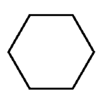 | — | 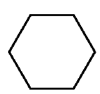 | COO | H | F | $OC_2H_5$ | |
| 5063 | $C_5H_{11}O$ | F | F | 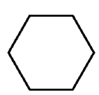 | — | 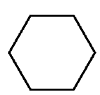 | COO | H | F | $OC_3H_7$ | |
| 5064 | $C_5H_{11}O$ | F | F | 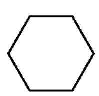 | — | 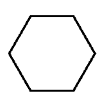 | COO | H | F | $OC_4H_9$ | |
| 5065 | $C_5H_{11}O$ | F | F | 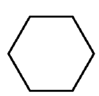 | — | 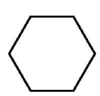 | COO | H | F | $OC_5H_{11}$ | |
| 5066 | $C_2H_5$ | F | F | 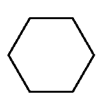 | — | 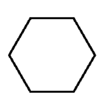 | COO | H | F | $C_4H_9$ | |
| 5067 | $C_5H_{11}$ | F | F | 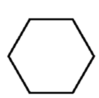 | — | 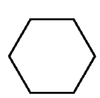 | COO | H | F | $C_2H_5$ | |
| 5068 | $C_2H_5$ | F | F | 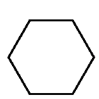 | — | 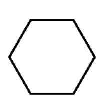 | COO | H | F | $OC_4H_9$ | |

TABLE 336-continued

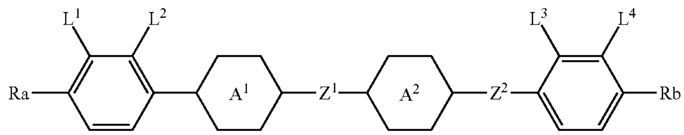

COO = 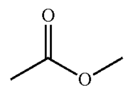

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5069 | $CH_2$═CH | F | F | 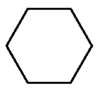 | — | 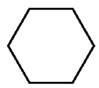 | COO | H | F | $OC_3H_7$ | |
| 5070 | $CH_2$═CH | F | F | 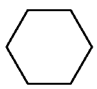 | — | 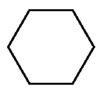 | COO | H | F | $OC_5H_{11}$ | |

TABLE 337

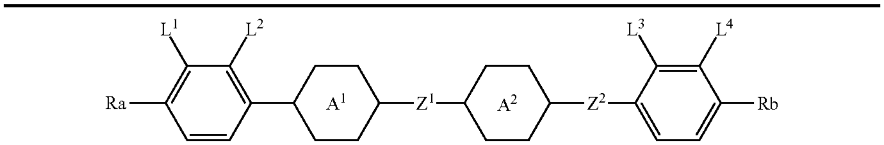

COO = 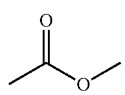

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5071 | $CH_3O$ | F | F | 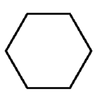 | — | 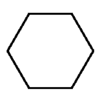 | COO | F | H | $OCH_3$ | |
| 5072 | $CH_3O$ | F | F | 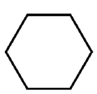 | — | 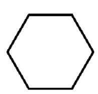 | COO | F | H | $OC_2H_5$ | |
| 5073 | $CH_3O$ | F | F | 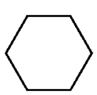 | — | 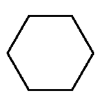 | COO | F | H | $OC_3H_7$ | |
| 5074 | $CH_3O$ | F | F | 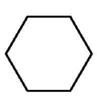 | — | 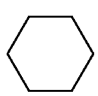 | COO | F | H | $OC_4H_9$ | |
| 5075 | $CH_3O$ | F | F | 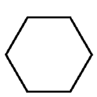 | — | 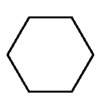 | COO | F | H | $OC_5H_{11}$ | |
| 5076 | $C_2H_5O$ | F | F | 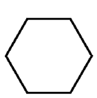 | — | 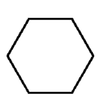 | COO | F | H | $OCH_3$ | |
| 5077 | $C_2H_5O$ | F | F | 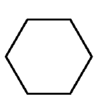 | — | 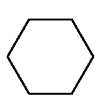 | COO | F | H | $OC_2H_5$ | |

TABLE 337-continued

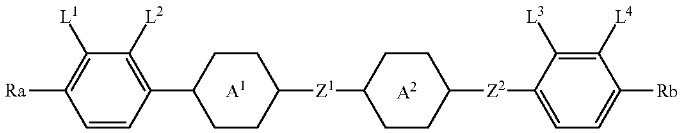

COO = 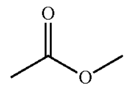

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5078 | $C_2H_5O$ | F | F | 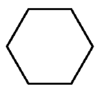 | — | 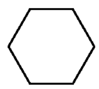 | COO | F | H | $OC_3H_7$ | |
| 5079 | $C_2H_5O$ | F | F | 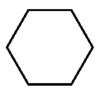 | — | 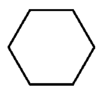 | COO | F | H | $OC_4H_9$ | |
| 5080 | $C_2H_5O$ | F | F | 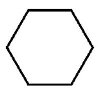 | — | 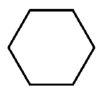 | COO | F | H | $OC_5H_{11}$ | |
| 5081 | $C_3H_7O$ | F | F | 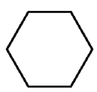 | — | 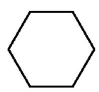 | COO | F | H | $OCH_3$ | |
| 5082 | $C_3H_7O$ | F | F | 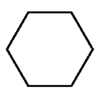 | — | 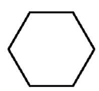 | COO | F | H | $OC_2H_5$ | |
| 5083 | $C_3H_7O$ | F | F | 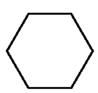 | — | 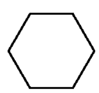 | COO | F | H | $OC_3H_7$ | |
| 5084 | $C_3H_7O$ | F | F | 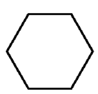 | — | 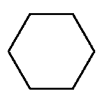 | COO | F | H | $OC_4H_9$ | |
| 5085 | $C_3H_7O$ | F | F | 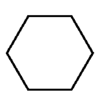 | — | 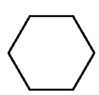 | COO | F | H | $OC_5H_{11}$ | |

TABLE 338

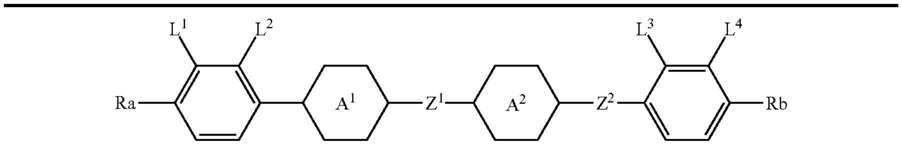

COO = 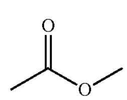

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5086 | $C_4H_9O$ | F | F | 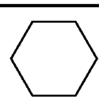 | — | 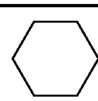 | COO | F | H | $OCH_3$ | |

TABLE 338-continued
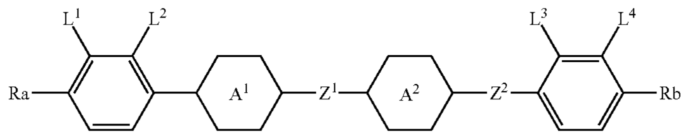
COO = 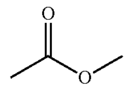
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5087 | $C_4H_9O$ | F | F | 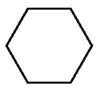 | — | 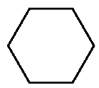 | COO | F | H | $OC_2H_5$ | |
| 5088 | $C_4H_9O$ | F | F | 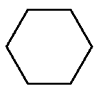 | — | 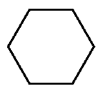 | COO | F | H | $OC_3H_7$ | |
| 5089 | $C_4H_9O$ | F | F | 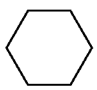 | — | 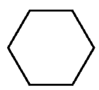 | COO | F | H | $OC_4H_9$ | |
| 5090 | $C_4H_9O$ | F | F | 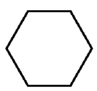 | — | 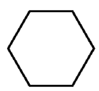 | COO | F | H | $OC_5H_{11}$ | |
| 5091 | $C_5H_{11}O$ | F | F | 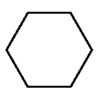 | — | 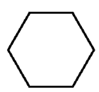 | COO | F | H | $OCH_3$ | |
| 5092 | $C_5H_{11}O$ | F | F | 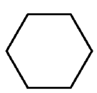 | — | 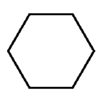 | COO | F | H | $OC_2H_5$ | |
| 5093 | $C_5H_{11}O$ | F | F | 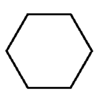 | — | 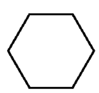 | COO | F | H | $OC_3H_7$ | |
| 5094 | $C_5H_{11}O$ | F | F | 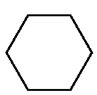 | — | 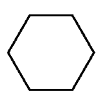 | COO | F | H | $OC_4H_9$ | |
| 5095 | $C_5H_{11}O$ | F | F | 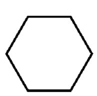 | — | 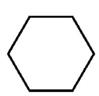 | COO | F | H | $OC_5H_{11}$ | |
| 5096 | $C_2H_5$ | F | F | 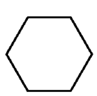 | — | 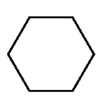 | COO | F | H | $C_4H_9$ | |
| 5097 | $C_5H_{11}$ | F | F | 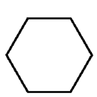 | — | 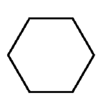 | COO | F | H | $C_2H_5$ | |
| 5098 | $C_2H_5$ | F | F | 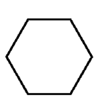 | — | 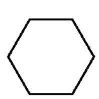 | COO | F | H | $OC_4H_9$ | |

TABLE 338-continued

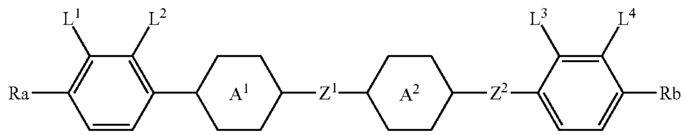

COO = 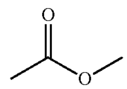

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5099 | $CH_2$=CH | F | F | 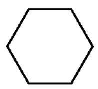 | — | 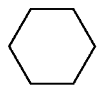 | COO | F | H | $OC_3H_7$ | |
| 5100 | $CH_2$=CH | F | F | 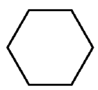 | — | 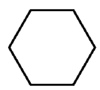 | COO | F | H | $OC_5H_{11}$ | |

TABLE 339

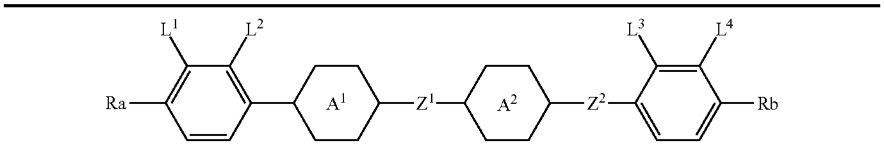

COO = 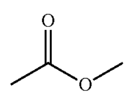

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5101 | $CH_3O$ | F | F | 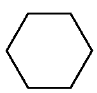 | — | 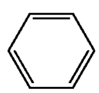 | COO | F | F | $OCH_3$ | |
| 5102 | $CH_3O$ | F | F | 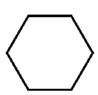 | — | 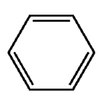 | COO | F | F | $OC_2H_5$ | |
| 5103 | $CH_3O$ | F | F | 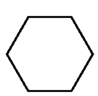 | — | 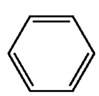 | COO | F | F | $OC_3H_7$ | |
| 5104 | $CH_3O$ | F | F | 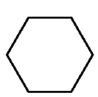 | — | 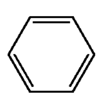 | COO | F | F | $OC_4H_9$ | |
| 5105 | $CH_3O$ | F | F | 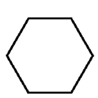 | — | 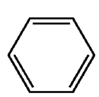 | COO | F | F | $OC_5H_{11}$ | |
| 5106 | $C_2H_5O$ | F | F | 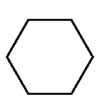 | — | 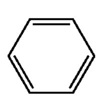 | COO | F | F | $OCH_3$ | |
| 5107 | $C_2H_5O$ | F | F | 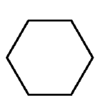 | — | 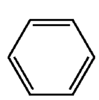 | COO | F | F | $OC_2H_5$ | |

TABLE 339-continued

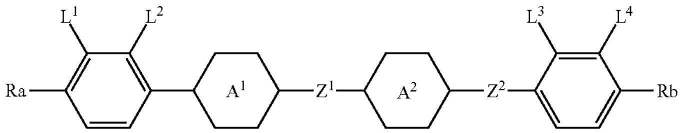

COO = 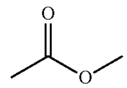

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5108 | $C_2H_5O$ | F | F | 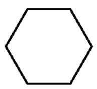 | — |  | COO | F | F | $OC_3H_7$ | |
| 5109 | $C_2H_5O$ | F | F | 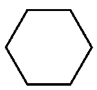 | — |  | COO | F | F | $OC_4H_9$ | |
| 5110 | $C_2H_5O$ | F | F | 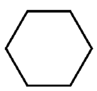 | — | 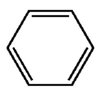 | COO | F | F | $OC_5H_{11}$ | |
| 5111 | $C_3H_7O$ | F | F | 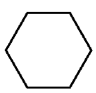 | — |  | COO | F | F | $OCH_3$ | |
| 5112 | $C_3H_7O$ | F | F | 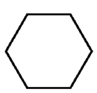 | — | 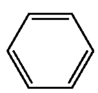 | COO | F | F | $OC_2H_5$ | |
| 5113 | $C_3H_7O$ | F | F | 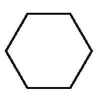 | — |  | COO | F | F | $OC_3H_7$ | |
| 5114 | $C_3H_7O$ | F | F | 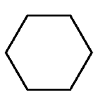 | — | 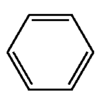 | COO | F | F | $OC_4H_9$ | |
| 5115 | $C_3H_7O$ | F | F | 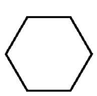 | — | 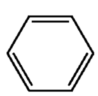 | COO | F | F | $OC_5H_{11}$ | |

TABLE 340

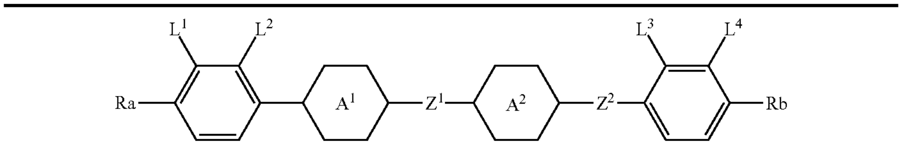

COO = 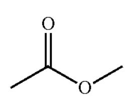

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5116 | $C_4H_9O$ | F | F | 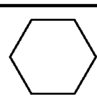 | — | 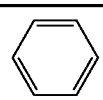 | COO | F | F | $OCH_3$ | |

TABLE 340-continued
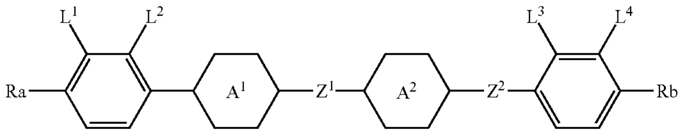
COO = 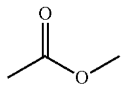
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5117 | $C_4H_9O$ | F | F | 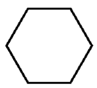 | — |  | COO | F | F | $OC_2H_5$ | |
| 5118 | $C_4H_9O$ | F | F | 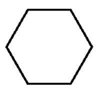 | — | 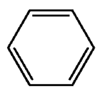 | COO | F | F | $OC_3H_7$ | |
| 5119 | $C_4H_9O$ | F | F | 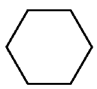 | — | 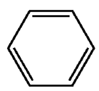 | COO | F | F | $OC_4H_9$ | |
| 5120 | $C_4H_9O$ | F | F | 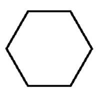 | — | 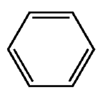 | COO | F | F | $OC_5H_{11}$ | |
| 5121 | $C_5H_{11}O$ | F | F | 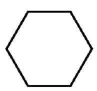 | — | 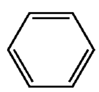 | COO | F | F | $OCH_3$ | |
| 5122 | $C_5H_{11}O$ | F | F | 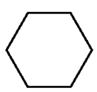 | — | 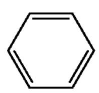 | COO | F | F | $OC_2H_5$ | |
| 5123 | $C_5H_{11}O$ | F | F | 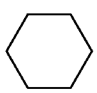 | — | 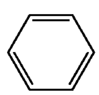 | COO | F | F | $OC_3H_7$ | |
| 5124 | $C_5H_{11}O$ | F | F | 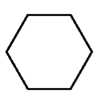 | — | 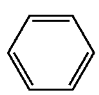 | COO | F | F | $OC_4H_9$ | |
| 5125 | $C_5H_{11}O$ | F | F | 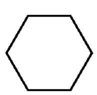 | — | 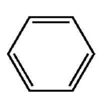 | COO | F | F | $OC_5H_{11}$ | |
| 5126 | $C_2H_5$ | F | F | 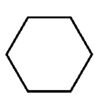 | — | 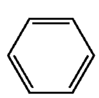 | COO | F | F | $C_4H_9$ | |
| 5127 | $C_5H_{11}$ | F | F | 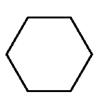 | — | 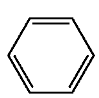 | COO | F | F | $C_2H_5$ | |
| 5128 | $C_2H_5$ | F | F | 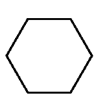 | — | 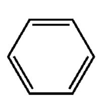 | COO | F | F | $OC_4H_9$ | |

TABLE 340-continued

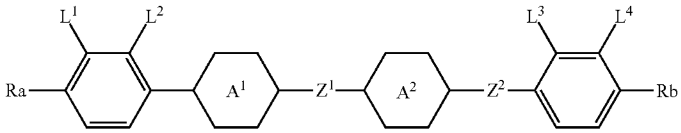

COO = 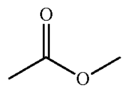

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5129 | $CH_2{=}CH$ | F | F | 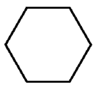 | — | 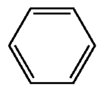 | COO | F | F | $OC_3H_7$ | |
| 5130 | $CH_2{=}CH$ | F | F | 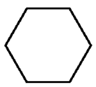 | — | 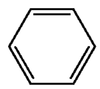 | COO | F | F | $OC_5H_{11}$ | |

TABLE 341

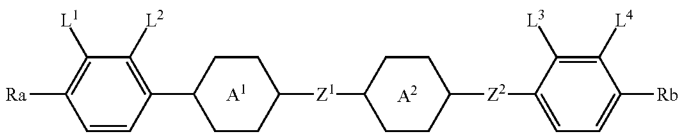

COO = 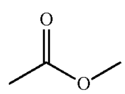

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5131 | $CH_2{=}CHO$ | F | F | 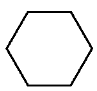 | — | 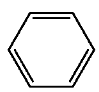 | COO | F | F | $OC_3H_7$ | |
| 5132 | $CH_2{=}CHCH_2O$ | F | F | 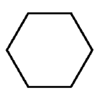 | — | 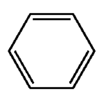 | COO | F | F | $OC_5H_{11}$ | |
| 5133 | $CH_2{=}CHCH_2O$ | F | F | 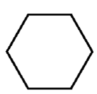 | — | 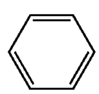 | COO | F | F | $OC_3H_7$ | |
| 5134 | $CH_2{=}CHC_2H_5O$ | F | F | 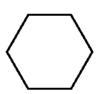 | — | 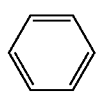 | COO | F | F | $OC_5H_{11}$ | |
| 5135 | $CH_2{=}CHC_2H_5O$ | F | F | 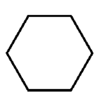 | — | 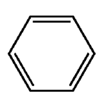 | COO | F | F | $OC_2H_5$ | |
| 5136 | $CH_2{=}CHC_2H_5O$ | F | F | 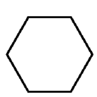 | — | 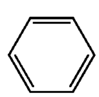 | COO | F | F | $OC_3H_7$ | |
| 5137 | $CH_3CH{=}CHCH_2O$ | F | F | 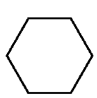 | — | 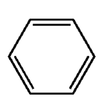 | COO | F | F | $OCH_3$ | |
| 5138 | $CH_3CH{=}CHCH_2O$ | F | F | 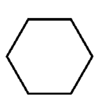 | — | 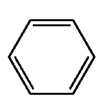 | COO | F | F | $OC_2H_5$ | |

TABLE 341-continued

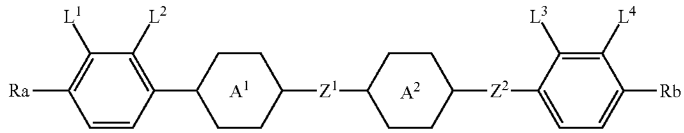

COO = 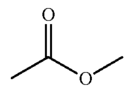

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5139 | $C_3H_7O$ | F | F | 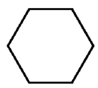 | — | 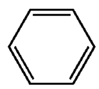 | COO | F | F | $OCH{=}CH_2$ | |
| 5140 | $C_3H_7O$ | F | F | 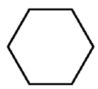 | — | 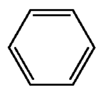 | COO | F | F | $OCH_2CH{=}CH_2$ | |
| 5141 | $C_4H_9O$ | F | F | 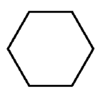 | — | 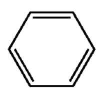 | COO | F | F | $OCH_2CH{=}CH_2$ | |
| 5142 | $C_5H_{11}O$ | F | F | 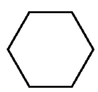 | — | 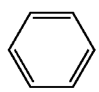 | COO | F | F | $OCH_2CH{=}CH_2$ | |
| 5143 | $CH_3O$ | F | F | 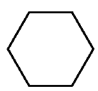 | — | 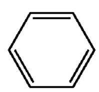 | COO | F | F | $OC_2H_5CH{=}CH_2$ | |
| 5144 | $C_2H_5O$ | F | F | 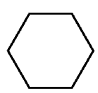 | — | 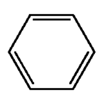 | COO | F | F | $OC_2H_5CH{=}CH_2$ | |
| 5145 | $C_3H_7O$ | F | F | 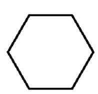 | — | 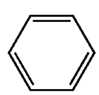 | COO | F | F | $OC_2H_5CH{=}CH_2$ | |

TABLE 342

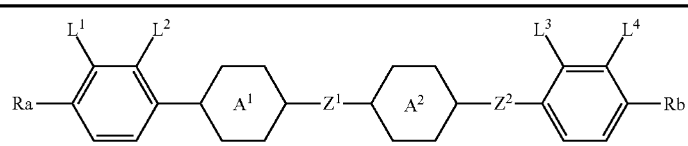

COO = 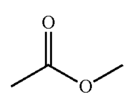

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5146 | $CH_3O$ | F | F | 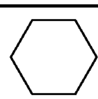 | — | 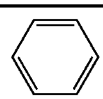 | COO | F | F | $OCH_2CH{=}CHCH_3$ | |
| 5147 | $C_2H_5O$ | F | F | 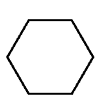 | — | 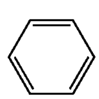 | COO | F | F | $OCH_2CH{=}CHCH_3$ | |

TABLE 342-continued

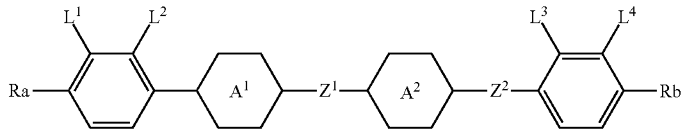

COO = 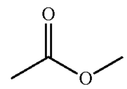

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5148 | $C_3H_7O$ | F | F | 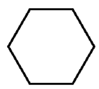 | — | 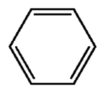 | COO | F | F | $OCH_2CH{=}CHCH_3$ | |
| 5149 | $CH_2{=}CHCH_2O$ | F | F | 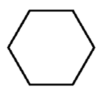 | — | 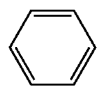 | COO | F | F | $OCH{=}CH_2$ | |
| 5150 | $CH_2{=}CHC_2H_5O$ | F | F | 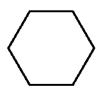 | — | 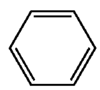 | COO | F | F | $OCH_2CH{=}CH_2$ | |
| 5151 | $C_3H_7OCH_2$ | F | F | 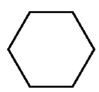 | — | 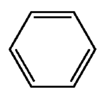 | COO | F | F | $OC_3H_7$ | |
| 5152 | $C_5H_{11}O$ | F | F | 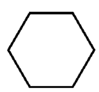 | — | 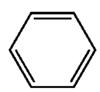 | COO | F | F | $OC_2H_5CH{=}CH_2$ | |
| 5153 | $C_3H_7O$ | F | F | 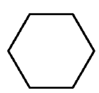 | — | 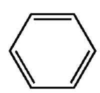 | COO | F | F | H | |
| 5154 | $C_5H_{11}O$ | F | F | 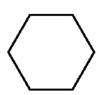 | — | 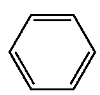 | COO | F | F | $OC_9H_{19}$ | |
| 5155 | $C_3H_7O$ | F | F | 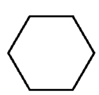 | — | 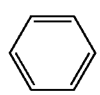 | COO | F | F | $C_2H_5$ | |
| 5156 | $C_5H_{11}O$ | F | F | 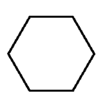 | — | 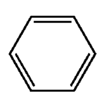 | COO | F | F | $C_3H_7$ | |
| 5157 | H | F | F | 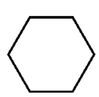 | — | 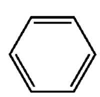 | COO | F | F | $OC_4H_9$ | |
| 5158 | $C_7H_{15}O$ | F | F | 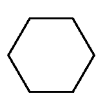 | — | 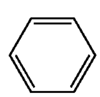 | COO | F | F | $OC_4H_9$ | |
| 5159 | $C_2H_5O$ | F | F | 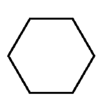 | — | 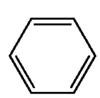 | COO | F | F | $OC_6H_{13}$ | |
| 5160 | $CH_3O$ | F | F | 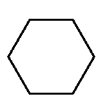 | — | 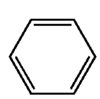 | COO | F | F | $C_2H_5$ | |

TABLE 343
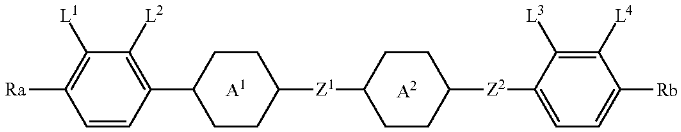
COO = 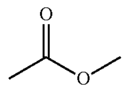
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5161 | $CH_3O$ | H | F | 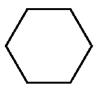 | — | 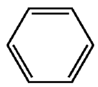 | COO | F | F | $OCH_3$ | |
| 5162 | $CH_3O$ | H | F | 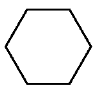 | — | 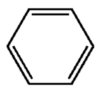 | COO | F | F | $OC_2H_5$ | |
| 5163 | $CH_3O$ | H | F | 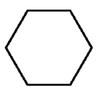 | — | 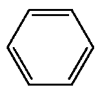 | COO | F | F | $OC_3H_7$ | |
| 5164 | $CH_3O$ | H | F | 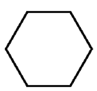 | — |  | COO | F | F | $OC_4H_9$ | |
| 5165 | $CH_3O$ | H | F | 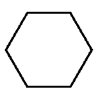 | — | 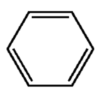 | COO | F | F | $OC_5H_{11}$ | |
| 5166 | $C_2H_5O$ | H | F | 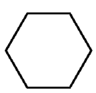 | — | 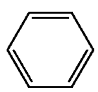 | COO | F | F | $OCH_3$ | |
| 5167 | $C_2H_5O$ | H | F | 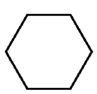 | — | 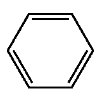 | COO | F | F | $OC_2H_5$ | |
| 5168 | $C_2H_5O$ | H | F | 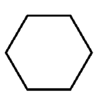 | — | 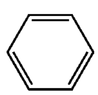 | COO | F | F | $OC_3H_7$ | |
| 5169 | $C_2H_5O$ | H | F | 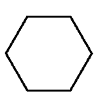 | — | 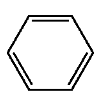 | COO | F | F | $OC_4H_9$ | |
| 5170 | $C_2H_5O$ | H | F | 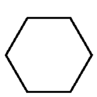 | — | 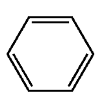 | COO | F | F | $OC_5H_{11}$ | |
| 5171 | $C_3H_7O$ | H | F | 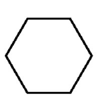 | — | 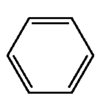 | COO | F | F | $OCH_3$ | |
| 5172 | $C_3H_7O$ | H | F | 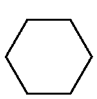 | — | 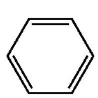 | COO | F | F | $OC_2H_5$ | |
| 5173 | $C_3H_7O$ | H | F | 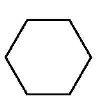 | — | 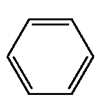 | COO | F | F | $OC_3H_7$ | |

TABLE 343-continued

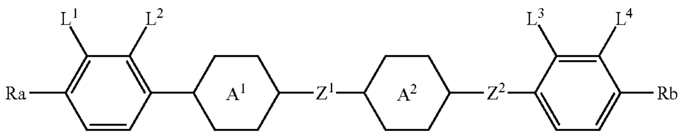

COO = 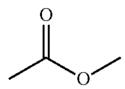

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5174 | $C_3H_7O$ | H | F | 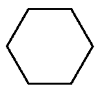 | — | 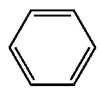 | COO | F | F | $OC_4H_9$ | |
| 5175 | $C_3H_7O$ | H | F | 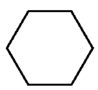 | — | 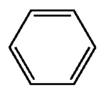 | COO | F | F | $OC_5H_{11}$ | |

TABLE 344

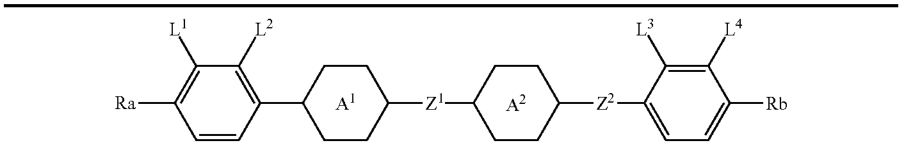

COO = 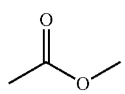

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5176 | $C_4H_9O$ | H | F | 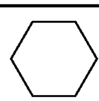 | — | 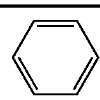 | COO | F | F | $OCH_3$ | |
| 5177 | $C_4H_9O$ | H | F | 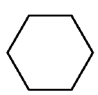 | — | 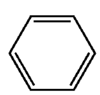 | COO | F | F | $OC_2H_5$ | |
| 5178 | $C_4H_9O$ | H | F | 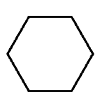 | — | 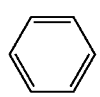 | COO | F | F | $OC_3H_7$ | |
| 5179 | $C_4H_9O$ | H | F | 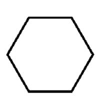 | — | 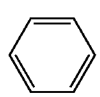 | COO | F | F | $OC_4H_9$ | |
| 5180 | $C_4H_9O$ | H | F | 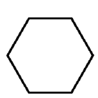 | — | 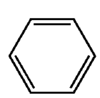 | COO | F | F | $OC_5H_{11}$ | |
| 5181 | $C_5H_{11}O$ | H | F | 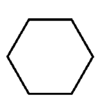 | — | 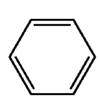 | COO | F | F | $OCH_3$ | |
| 5182 | $C_5H_{11}O$ | H | F | 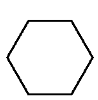 | — | 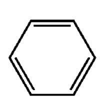 | COO | F | F | $OC_2H_5$ | |

TABLE 344-continued
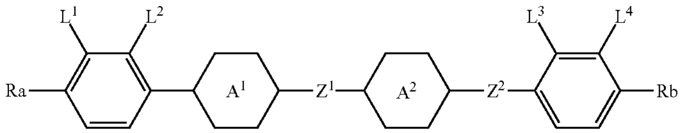
COO = 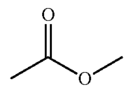
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5183 | $C_5H_{11}O$ | H | F | 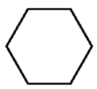 | — | 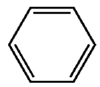 | COO | F | F | $OC_3H_7$ | |
| 5184 | $C_5H_{11}O$ | H | F | 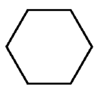 | — | 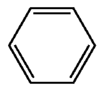 | COO | F | F | $OC_4H_9$ | |
| 5185 | $C_5H_{11}O$ | H | F | 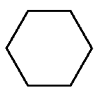 | — | 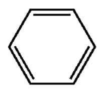 | COO | F | F | $OC_5H_{11}$ | |
| 5186 | $C_2H_5$ | H | F | 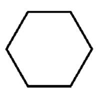 | — | 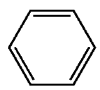 | COO | F | F | $C_4H_9$ | |
| 5187 | $C_5H_{11}$ | H | F | 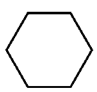 | — | 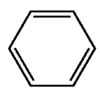 | COO | F | F | $C_2H_5$ | |
| 5188 | $C_2H_5$ | H | F | 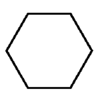 | — | 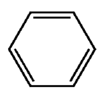 | COO | F | F | $OC_4H_9$ | |
| 5189 | $CH_2{=}CH$ | H | F | 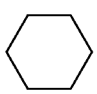 | — | 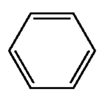 | COO | F | F | $OC_3H_7$ | |
| 5190 | $CH_2{=}CH$ | H | F | 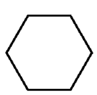 | — | 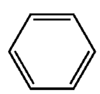 | COO | F | F | $OC_5H_{11}$ | |
TABLE 345
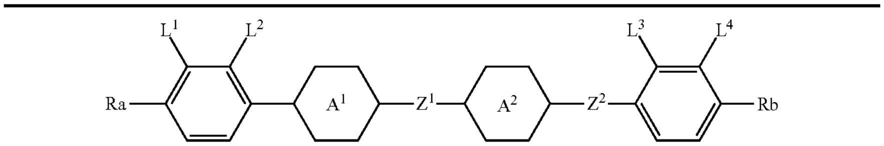
COO = 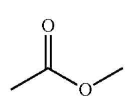
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5191 | $CH_3O$ | F | H | 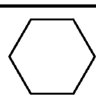 | — | 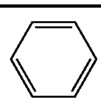 | COO | F | F | $OCH_3$ | |

TABLE 345-continued
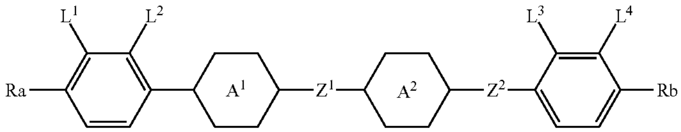
COO = 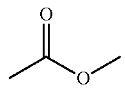
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5192 | $CH_3O$ | F | H | 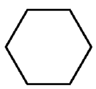 | — |  | COO | F | F | $OC_2H_5$ | |
| 5193 | $CH_3O$ | F | H | 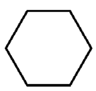 | — |  | COO | F | F | $OC_3H_7$ | |
| 5194 | $CH_3O$ | F | H | 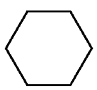 | — | 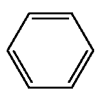 | COO | F | F | $OC_4H_9$ | |
| 5195 | $CH_3O$ | F | H | 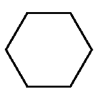 | — | 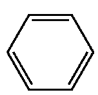 | COO | F | F | $OC_5H_{11}$ | |
| 5196 | $C_2H_5O$ | F | H | 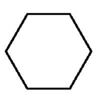 | — | 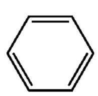 | COO | F | F | $OCH_3$ | |
| 5197 | $C_2H_5O$ | F | H | 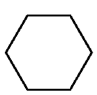 | — | 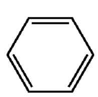 | COO | F | F | $OC_2H_5$ | |
| 5198 | $C_2H_5O$ | F | H | 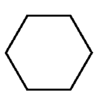 | — | 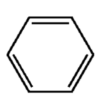 | COO | F | F | $OC_3H_7$ | |
| 5199 | $C_2H_5O$ | F | H | 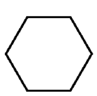 | — | 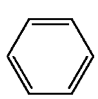 | COO | F | F | $OC_4H_9$ | |
| 5200 | $C_2H_5O$ | F | H | 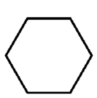 | — | 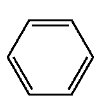 | COO | F | F | $OC_5H_{11}$ | |
| 5201 | $C_3H_7O$ | F | H | 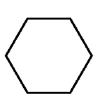 | — | 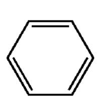 | COO | F | F | $OCH_3$ | |
| 5202 | $C_3H_7O$ | F | H | 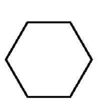 | — | 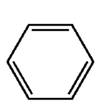 | COO | F | F | $OC_2H_5$ | |
| 5203 | $C_3H_7O$ | F | H | 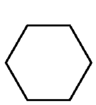 | — | 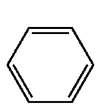 | COO | F | F | $OC_3H_7$ | |

TABLE 345-continued
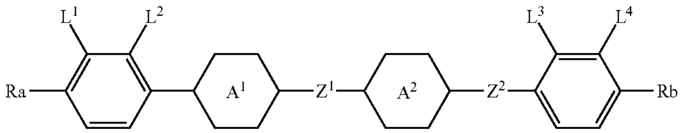
COO = 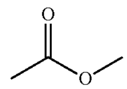
| No. | Ra | L¹ | L² | A¹ | Z¹ | A² | Z² | L³ | L⁴ | Rb | Physical property values |
|---|---|---|---|---|---|---|---|---|---|---|---|
| 5204 | $C_3H_7O$ | F | H | 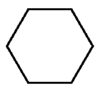 | — |  | COO | F | F | $OC_4H_9$ | |
| 5205 | $C_3H_7O$ | F | H | 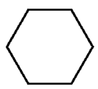 | — | 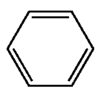 | COO | F | F | $OC_5H_{11}$ | |
TABLE 346
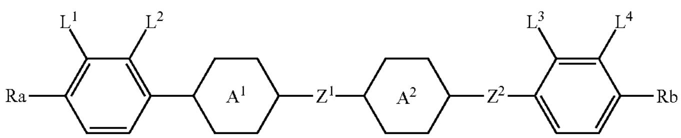
COO = 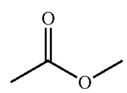
| No. | Ra | L¹ | L² | A¹ | Z¹ | A² | Z² | L³ | L⁴ | Rb | Physical property values |
|---|---|---|---|---|---|---|---|---|---|---|---|
| 5206 | $C_4H_9O$ | F | H | 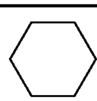 | — | 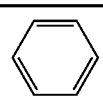 | COO | F | F | $OCH_3$ | |
| 5207 | $C_4H_9O$ | F | H | 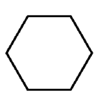 | — | 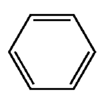 | COO | F | F | $OC_2H_5$ | |
| 5208 | $C_4H_9O$ | F | H | 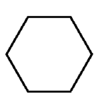 | — | 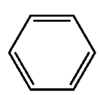 | COO | F | F | $OC_3H_7$ | |
| 5209 | $C_4H_9O$ | F | H | 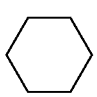 | — | 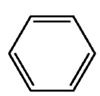 | COO | F | F | $OC_4H_9$ | |
| 5210 | $C_4H_9O$ | F | H | 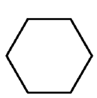 | — | 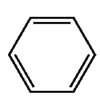 | COO | F | F | $OC_5H_{11}$ | |
| 5211 | $C_5H_{11}O$ | F | H | 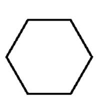 | — | 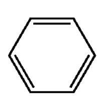 | COO | F | F | $OCH_3$ | |
| 5212 | $C_5H_{11}O$ | F | H | 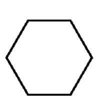 | — | 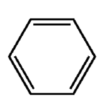 | COO | F | F | $OC_2H_5$ | |

TABLE 346-continued
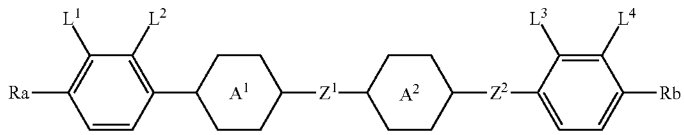
COO = 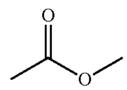
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5213 | $C_5H_{11}O$ | F | H | 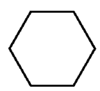 | — | 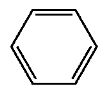 | COO | F | F | $OC_3H_7$ | |
| 5214 | $C_5H_{11}O$ | F | H | 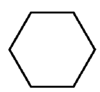 | — | 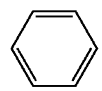 | COO | F | F | $OC_4H_9$ | |
| 5215 | $C_5H_{11}O$ | F | H | 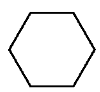 | — | 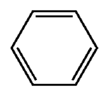 | COO | F | F | $OC_5H_{11}$ | |
| 5216 | $C_2H_5$ | F | H | 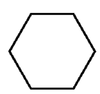 | — | 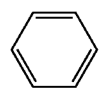 | COO | F | F | $C_4H_9$ | |
| 5217 | $C_5H_{11}$ | F | H | 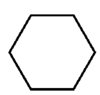 | — | 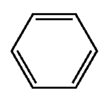 | COO | F | F | $C_2H_5$ | |
| 5218 | $C_2H_5$ | F | H | 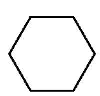 | — | 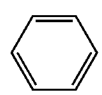 | COO | F | F | $OC_4H_9$ | |
| 5219 | $CH_2{=}CH$ | F | H | 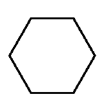 | — | 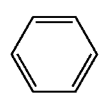 | COO | F | F | $OC_3H_7$ | |
| 5220 | $CH_2{=}CH$ | F | H | 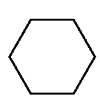 | — | 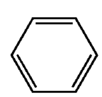 | COO | F | F | $OC_5H_{11}$ | |
TABLE 347
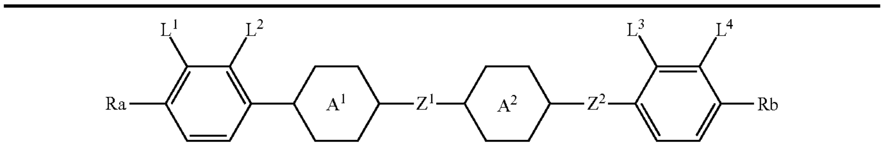
COO = 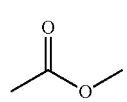
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5221 | $CH_3O$ | F | F | 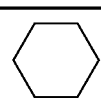 | — | 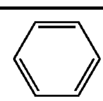 | COO | H | F | $OCH_3$ | |

TABLE 347-continued
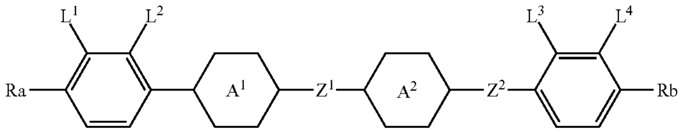
COO = 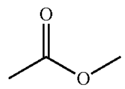
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5222 | $CH_3O$ | F | F | 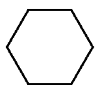 | — |  | COO | H | F | $OC_2H_5$ | |
| 5223 | $CH_3O$ | F | F | 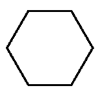 | — |  | COO | H | F | $OC_3H_7$ | |
| 5224 | $CH_3O$ | F | F | 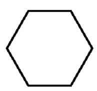 | — | 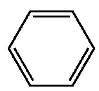 | COO | H | F | $OC_4H_9$ | |
| 5225 | $CH_3O$ | F | F | 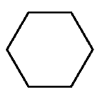 | — | 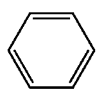 | COO | H | F | $OC_5H_{11}$ | |
| 5226 | $C_2H_5O$ | F | F | 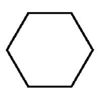 | — | 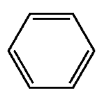 | COO | H | F | $OCH_3$ | |
| 5227 | $C_2H_5O$ | F | F | 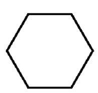 | — | 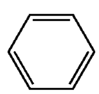 | COO | H | F | $OC_2H_5$ | |
| 5228 | $C_2H_5O$ | F | F | 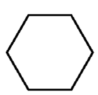 | — | 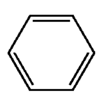 | COO | H | F | $OC_3H_7$ | |
| 5229 | $C_2H_5O$ | F | F | 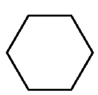 | — | 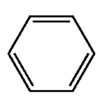 | COO | H | F | $OC_4H_9$ | |
| 5230 | $C_2H_5O$ | F | F | 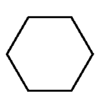 | — | 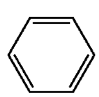 | COO | H | F | $OC_5H_{11}$ | |
| 5231 | $C_3H_7O$ | F | F | 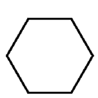 | — | 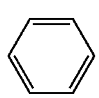 | COO | H | F | $OCH_3$ | |
| 5232 | $C_3H_7O$ | F | F | 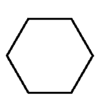 | — | 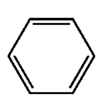 | COO | H | F | $OC_2H_5$ | |
| 5233 | $C_3H_7O$ | F | F | 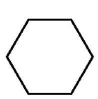 | — | 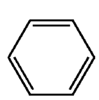 | COO | H | F | $OC_3H_7$ | |

TABLE 347-continued

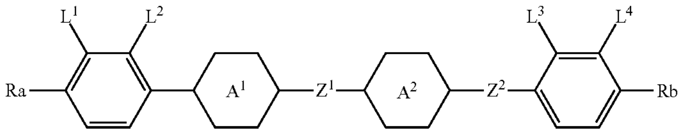

COO = 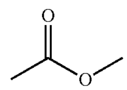

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5234 | $C_3H_7O$ | F | F | 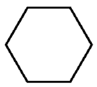 | — | 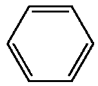 | COO | H | F | $OC_4H_9$ | |
| 5235 | $C_3H_7O$ | F | F | 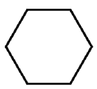 | — | 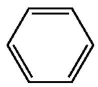 | COO | H | F | $OC_5H_{11}$ | |

TABLE 348

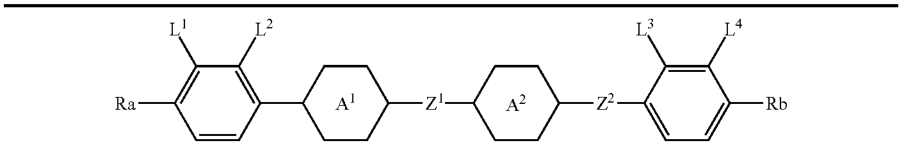

COO = 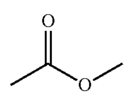

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5236 | $C_4H_9O$ | F | F | 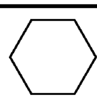 | — | 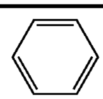 | COO | H | F | $OCH_3$ | |
| 5237 | $C_4H_9O$ | F | F | 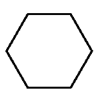 | — | 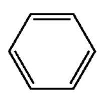 | COO | H | F | $OC_2H_5$ | |
| 5238 | $C_4H_9O$ | F | F | 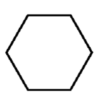 | — | 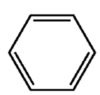 | COO | H | F | $OC_3H_7$ | |
| 5239 | $C_4H_9O$ | F | F | 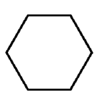 | — | 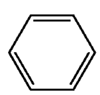 | COO | H | F | $OC_4H_9$ | |
| 5240 | $C_4H_9O$ | F | F | 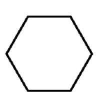 | — | 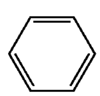 | COO | H | F | $OC_5H_{11}$ | |
| 5241 | $C_5H_{11}O$ | F | F | 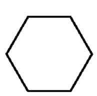 | — | 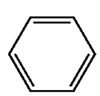 | COO | H | F | $OCH_3$ | |
| 5242 | $C_5H_{11}O$ | F | F | 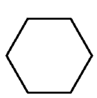 | — | 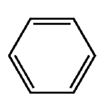 | COO | H | F | $OC_2H_5$ | |
| 5243 | $C_5H_{11}O$ | F | F | 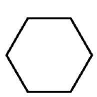 | — | 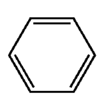 | COO | H | F | $OC_3H_7$ | |

TABLE 348-continued
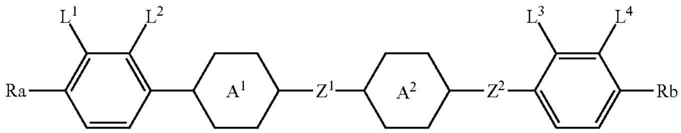
COO = 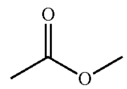
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5244 | $C_5H_{11}O$ | F | F | 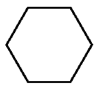 | — | 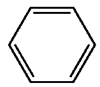 | COO | H | F | $OC_4H_9$ | |
| 5245 | $C_5H_{11}O$ | F | F | 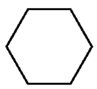 | — |  | COO | H | F | $OC_5H_{11}$ | |
| 5246 | $C_2H_5$ | F | F | 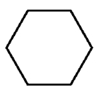 | — | 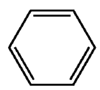 | COO | H | F | $C_4H_9$ | |
| 5247 | $C_5H_{11}$ | F | F | 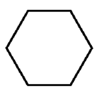 | — | 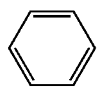 | COO | H | F | $C_2H_5$ | |
| 5248 | $C_2H_5$ | F | F | 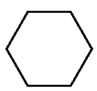 | — | 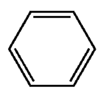 | COO | H | F | $OC_4H_9$ | |
| 5249 | $CH_2{=}CH$ | F | F | 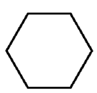 | — | 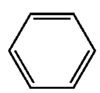 | COO | H | F | $OC_3H_7$ | |
| 5250 | $CH_2{=}CH$ | F | F | 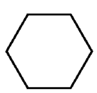 | — | 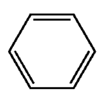 | COO | H | F | $OC_5H_{11}$ | |
TABLE 349
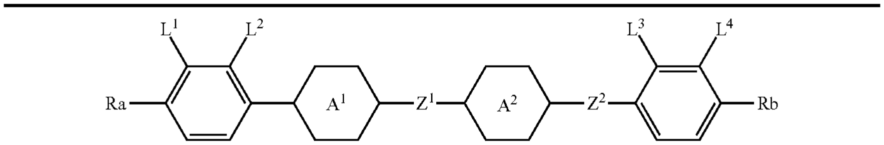
COO = 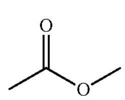
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5251 | $CH_3O$ | F | F | 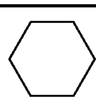 | — | 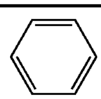 | COO | F | H | $OCH_3$ | |
| 5252 | $CH_3O$ | F | F | 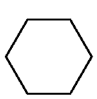 | — | 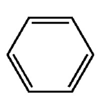 | COO | F | H | $OC_2H_5$ | |

TABLE 349-continued
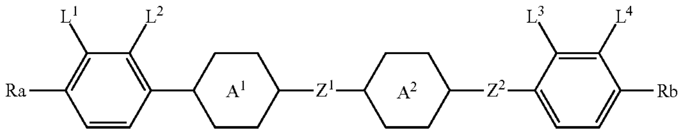
COO = 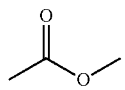
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5253 | $CH_3O$ | F | F | 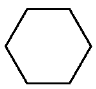 | — | 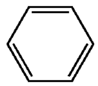 | COO | F | H | $OC_3H_7$ | |
| 5254 | $CH_3O$ | F | F | 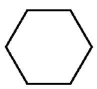 | — | 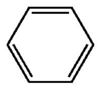 | COO | F | H | $OC_4H_9$ | |
| 5255 | $CH_3O$ | F | F | 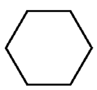 | — | 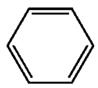 | COO | F | H | $OC_5H_{11}$ | |
| 5256 | $C_2H_5O$ | F | F | 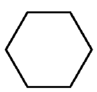 | — |  | COO | F | H | $OCH_3$ | |
| 5257 | $C_2H_5O$ | F | F | 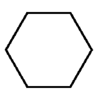 | — | 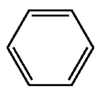 | COO | F | H | $OC_2H_5$ | |
| 5258 | $C_2H_5O$ | F | F | 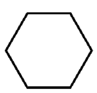 | — |  | COO | F | H | $OC_3H_7$ | |
| 5259 | $C_2H_5O$ | F | F | 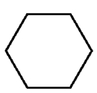 | — |  | COO | F | H | $OC_4H_9$ | |
| 5260 | $C_2H_5O$ | F | F | 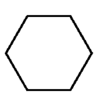 | — | 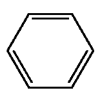 | COO | F | H | $OC_5H_{11}$ | |
| 5261 | $C_3H_7O$ | F | F | 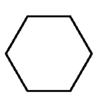 | — | 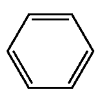 | COO | F | H | $OCH_3$ | |
| 5262 | $C_3H_7O$ | F | F | 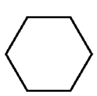 | — | 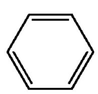 | COO | F | H | $OC_2H_5$ | |
| 5263 | $C_3H_7O$ | F | F | 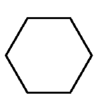 | — | 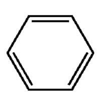 | COO | F | H | $OC_3H_7$ | |
| 5264 | $C_3H_7O$ | F | F | 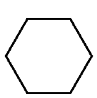 | — | 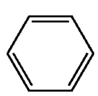 | COO | F | H | $OC_4H_9$ | |
| 5265 | $C_3H_7O$ | F | F | 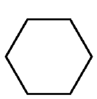 | — | 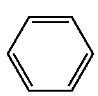 | COO | F | H | $OC_5H_{11}$ | |

TABLE 350
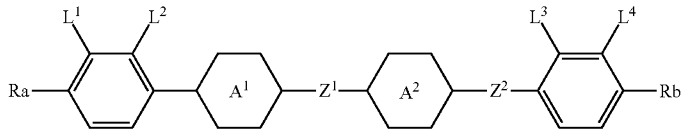
COO = 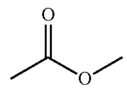
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5266 | $C_4H_9O$ | F | F | 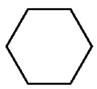 | — | 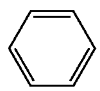 | COO | F | H | $OCH_3$ | |
| 5267 | $C_4H_9O$ | F | F | 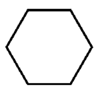 | — | 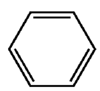 | COO | F | H | $OC_2H_5$ | |
| 5268 | $C_4H_9O$ | F | F | 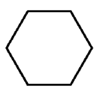 | — | 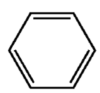 | COO | F | H | $OC_3H_7$ | |
| 5269 | $C_4H_9O$ | F | F | 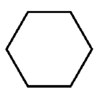 | — | 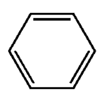 | COO | F | H | $OC_4H_9$ | |
| 5270 | $C_4H_9O$ | F | F | 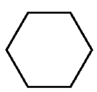 | — | 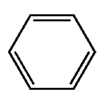 | COO | F | H | $OC_5H_{11}$ | |
| 5271 | $C_5H_{11}O$ | F | F | 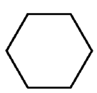 | — | 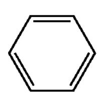 | COO | F | H | $OCH_3$ | |
| 5272 | $C_5H_{11}O$ | F | F | 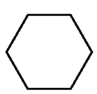 | — | 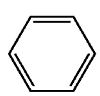 | COO | F | H | $OC_2H_5$ | |
| 5273 | $C_5H_{11}O$ | F | F | 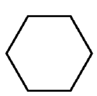 | — | 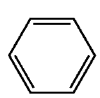 | COO | F | H | $OC_3H_7$ | |
| 5274 | $C_5H_{11}O$ | F | F | 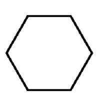 | — | 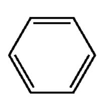 | COO | F | H | $OC_4H_9$ | |
| 5275 | $C_5H_{11}O$ | F | F | 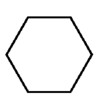 | — | 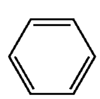 | COO | F | H | $OC_5H_{11}$ | |
| 5276 | $C_2H_5$ | F | F | 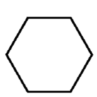 | — | 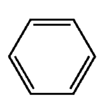 | COO | F | H | $C_4H_9$ | |
| 5277 | $C_5H_{11}$ | F | F | 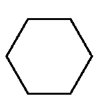 | — | 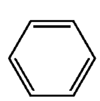 | COO | F | H | $C_2H_5$ | |
| 5278 | $C_2H_5$ | F | F | 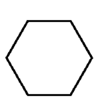 | — | 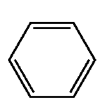 | COO | F | H | $OC_4H_9$ | |

TABLE 350-continued

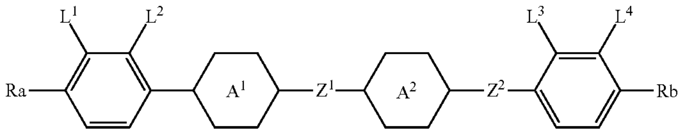

COO = 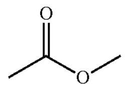

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5279 | $CH_2{=}CH$ | F | F | 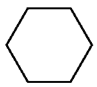 | — | 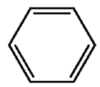 | COO | F | H | $OC_3H_7$ | |
| 5280 | $CH_2{=}CH$ | F | F | 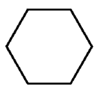 | — | 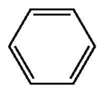 | COO | F | H | $OC_5H_{11}$ | |

TABLE 351

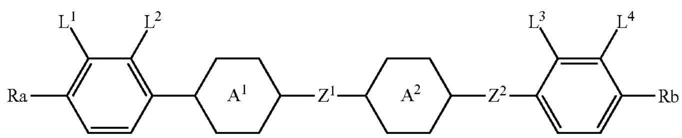

COO = 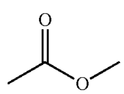

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5281 | $CH_3O$ | F | F | 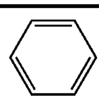 | — | 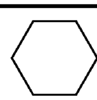 | COO | F | F | $OCH_3$ | |
| 5282 | $CH_3O$ | F | F | 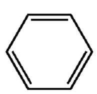 | — | 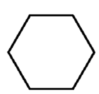 | COO | F | F | $OC_2H_5$ | |
| 5283 | $CH_3O$ | F | F | 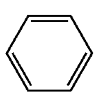 | — | 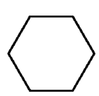 | COO | F | F | $OC_3H_7$ | |
| 5284 | $CH_3O$ | F | F | 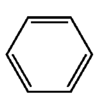 | — | 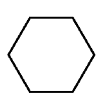 | COO | F | F | $OC_4H_9$ | |
| 5285 | $CH_3O$ | F | F | 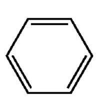 | — | 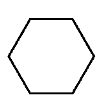 | COO | F | F | $OC_5H_{11}$ | |
| 5286 | $C_2H_5O$ | F | F | 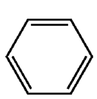 | — | 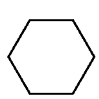 | COO | F | F | $OCH_3$ | |
| 5287 | $C_2H_5O$ | F | F | 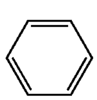 | — | 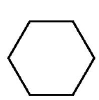 | COO | F | F | $OC_2H_5$ | |
| 5288 | $C_2H_5O$ | F | F | 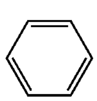 | — | 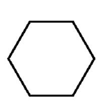 | COO | F | F | $OC_3H_7$ | |

TABLE 351-continued

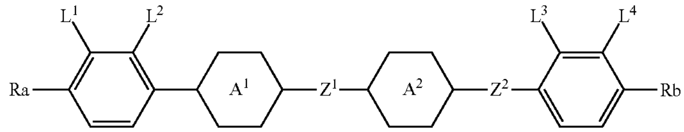

COO = 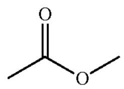

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5289 | $C_2H_5O$ | F | F |  | — | 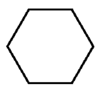 | COO | F | F | $OC_4H_9$ | |
| 5290 | $C_2H_5O$ | F | F |  | — | 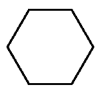 | COO | F | F | $OC_5H_{11}$ | |
| 5291 | $C_3H_7O$ | F | F |  | — | 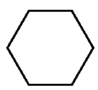 | COO | F | F | $OCH_3$ | |
| 5292 | $C_3H_7O$ | F | F | 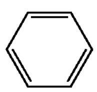 | — | 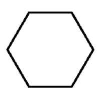 | COO | F | F | $OC_2H_5$ | |
| 5293 | $C_3H_7O$ | F | F | 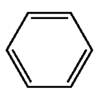 | — | 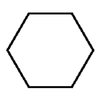 | COO | F | F | $OC_3H_7$ | |
| 5294 | $C_3H_7O$ | F | F |  | — | 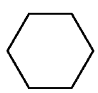 | COO | F | F | $OC_4H_9$ | |
| 5295 | $C_3H_7O$ | F | F | 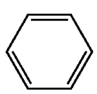 | — | 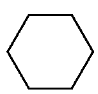 | COO | F | F | $OC_5H_{11}$ | |

TABLE 352

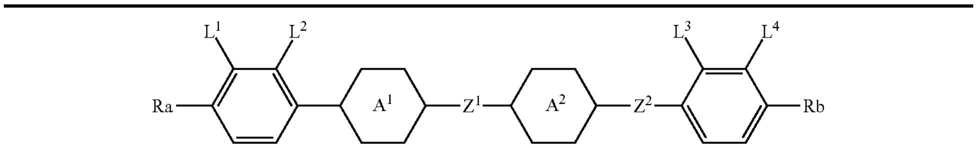

COO = 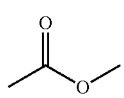

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5296 | $C_4H_9O$ | F | F | 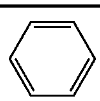 | — | 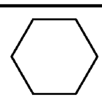 | COO | F | F | $OCH_3$ | |
| 5297 | $C_4H_9O$ | F | F | 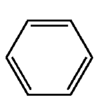 | — | 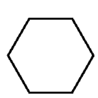 | COO | F | F | $OC_2H_5$ | |

TABLE 352-continued
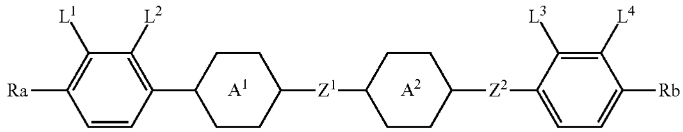
COO = 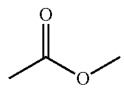
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5298 | $C_4H_9O$ | F | F | 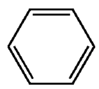 | — | 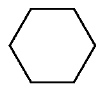 | COO | F | F | $OC_3H_7$ | |
| 5299 | $C_4H_9O$ | F | F | 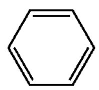 | — | 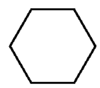 | COO | F | F | $OC_4H_9$ | |
| 5300 | $C_4H_9O$ | F | F | 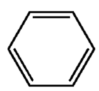 | — | 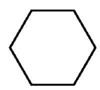 | COO | F | F | $OC_5H_{11}$ | |
| 5301 | $C_5H_{11}O$ | F | F |  | — | 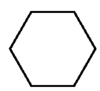 | COO | F | F | $OCH_3$ | |
| 5302 | $C_5H_{11}O$ | F | F | 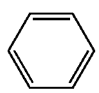 | — | 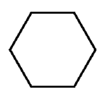 | COO | F | F | $OC_2H_5$ | |
| 5303 | $C_5H_{11}O$ | F | F | 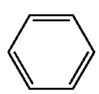 | — | 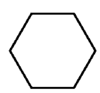 | COO | F | F | $OC_3H_7$ | |
| 5304 | $C_5H_{11}O$ | F | F | 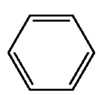 | — | 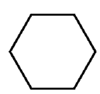 | COO | F | F | $OC_4H_9$ | |
| 5305 | $C_5H_{11}O$ | F | F | 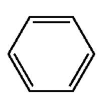 | — | 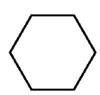 | COO | F | F | $OC_5H_{11}$ | |
| 5306 | $C_2H_5$ | F | F | 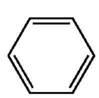 | — | 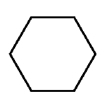 | COO | F | F | $C_4H_9$ | |
| 5307 | $C_5H_{11}$ | F | F | 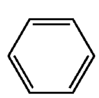 | — | 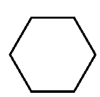 | COO | F | F | $C_2H_5$ | |
| 5308 | $C_2H_5$ | F | F | 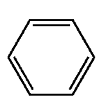 | — | 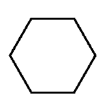 | COO | F | F | $OC_4H_9$ | |
| 5309 | $CH_2{=}CH$ | F | F | 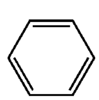 | — | 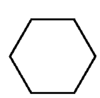 | COO | F | F | $OC_3H_7$ | |
| 5310 | $CH_2{=}CH$ | F | F | 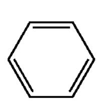 | — | 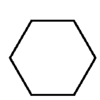 | COO | F | F | $OC_5H_{11}$ | |

TABLE 353

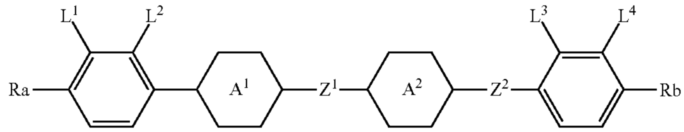

COO = 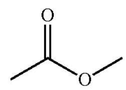

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5311 | $CH_2{=}CHO$ | F | F |  | — | 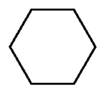 | COO | F | F | $OC_3H_7$ | |
| 5312 | $CH_2{=}CHCH_2O$ | F | F | 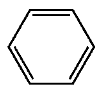 | — | 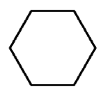 | COO | F | F | $OC_5H_{11}$ | |
| 5313 | $CH_2{=}CHCH_2O$ | F | F | 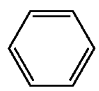 | — | 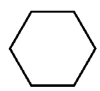 | COO | F | F | $OC_3H_7$ | |
| 5314 | $CH_2{=}CHC_2H_5O$ | F | F | 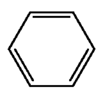 | — | 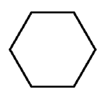 | COO | F | F | $OC_5H_{11}$ | |
| 5315 | $CH_2{=}CHC_2H_5O$ | F | F | 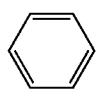 | — | 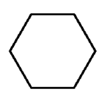 | COO | F | F | $OC_2H_5$ | |
| 5316 | $CH_2{=}CHC_2H_5O$ | F | F | 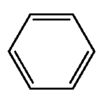 | — | 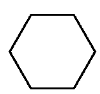 | COO | F | F | $OC_3H_7$ | |
| 5317 | $CH_3CH{=}CHCH_2O$ | F | F | 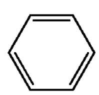 | — | 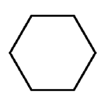 | COO | F | F | $OCH_3$ | |
| 5318 | $CH_3CH{=}CHCH_2O$ | F | F | 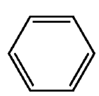 | — | 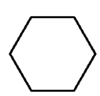 | COO | F | F | $OC_2H_3$ | |
| 5319 | $C_3H_7O$ | F | F | 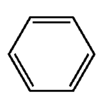 | — | 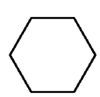 | COO | F | F | $OCH{=}CH_2$ | |
| 5320 | $C_3H_7O$ | F | F | 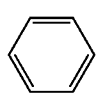 | — | 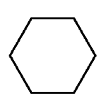 | COO | F | F | $OCH_2CH{=}CH_2$ | |
| 5321 | $C_4H_9O$ | F | F | 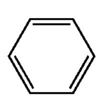 | — | 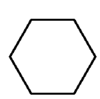 | COO | F | F | $OCH_2CH{=}CH_2$ | |
| 5322 | $C_5H_{11}O$ | F | F | 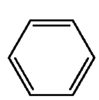 | — | 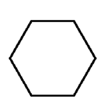 | COO | F | F | $OCH_2CH{=}CH_2$ | |
| 5323 | $CH_3O$ | F | F | 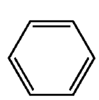 | — | 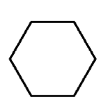 | COO | F | F | $OC_2H_5CH{=}CH_2$ | |

TABLE 353-continued

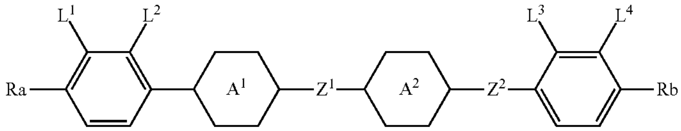

COO = 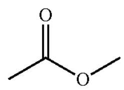

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5324 | $C_2H_5O$ | F | F | 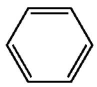 | — | 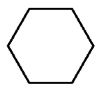 | COO | F | F | $OC_2H_5CH{=}CH_2$ | |
| 5325 | $C_3H_7O$ | F | F | 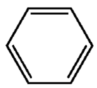 | — | 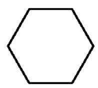 | COO | F | F | $OC_2H_5CH{=}CH_2$ | |

TABLE 354

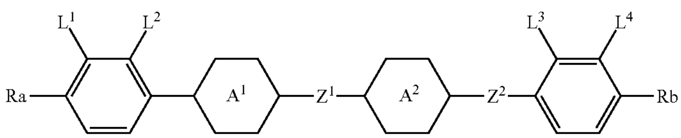

COO = 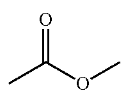

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5326 | $CH_3O$ | F | F | 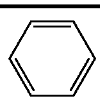 | — | 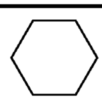 | COO | F | F | $OCH_2CH{=}CHCH_3$ | |
| 5327 | $C_2H_5O$ | F | F | 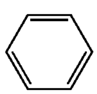 | — | 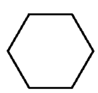 | COO | F | F | $OCH_2CH{=}CHCH_3$ | |
| 5328 | $C_3H_7O$ | F | F | 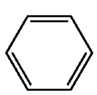 | — | 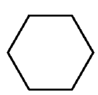 | COO | F | F | $OCH_2CH{=}CHCH_3$ | |
| 5329 | $CH_2{=}CHCH_2O$ | F | F | 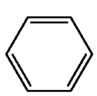 | — | 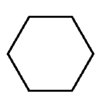 | COO | F | F | $OCH{=}CH_2$ | |
| 5330 | $CH_2{=}CHC_2H_5O$ | F | F | 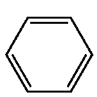 | — | 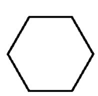 | COO | F | F | $OCH_2CH{=}CH_2$ | |
| 5331 | $C_3H_7OCH_2$ | F | F | 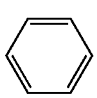 | — | 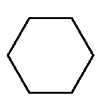 | COO | F | F | $OC_3H_7$ | |
| 5332 | $C_5H_{11}O$ | F | F | 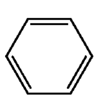 | — | 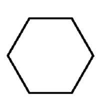 | COO | F | F | $OC_2H_5CH{=}CH_2$ | |
| 5333 | $C_3H_7O$ | F | F | 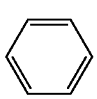 | — | 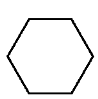 | COO | F | F | H | |

TABLE 354-continued
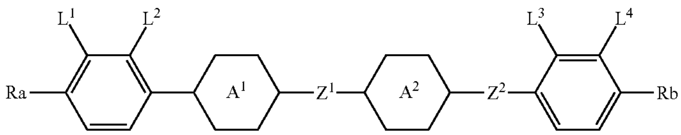
COO = 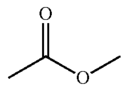
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5334 | $C_5H_{11}O$ | F | F |  | — | 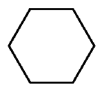 | COO | F | F | $OC_9H_{19}$ | |
| 5335 | $C_3H_7O$ | F | F |  | — | 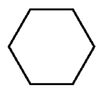 | COO | F | F | $C_2H_5$ | |
| 5336 | $C_5H_{11}O$ | F | F | 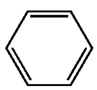 | — | 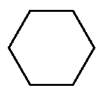 | COO | F | F | $C_3H_7$ | |
| 5337 | H | F | F |  | — | 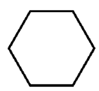 | COO | F | F | $OC_4H_9$ | |
| 5338 | $C_7H_{15}O$ | F | F |  | — | 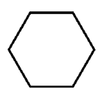 | COO | F | F | $OC_4H_9$ | |
| 5339 | $C_2H_5O$ | F | F | 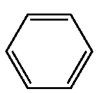 | — | 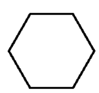 | COO | F | F | $OC_6H_{13}$ | |
| 5340 | $CH_3O$ | F | F | 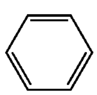 | — | 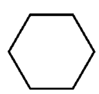 | COO | F | F | $C_2H_5$ | |
TABLE 355
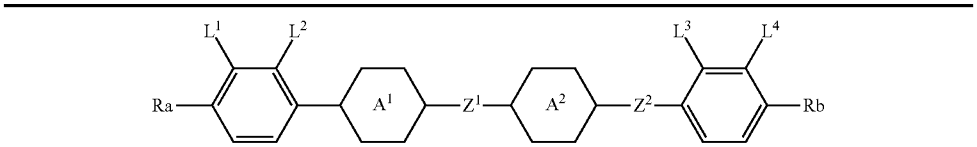
COO = 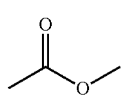
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5341 | $CH_3O$ | H | F | 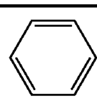 | — | 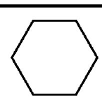 | COO | F | F | $OCH_3$ | |
| 5342 | $CH_3O$ | H | F | 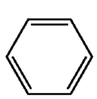 | — | 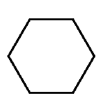 | COO | F | F | $OC_2H_5$ | |

TABLE 355-continued
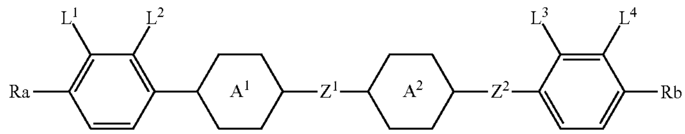
COO = 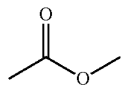
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5343 | $CH_3O$ | H | F | 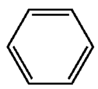 | — | 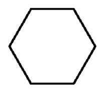 | COO | F | F | $OC_3H_7$ | |
| 5344 | $CH_3O$ | H | F |  | — | 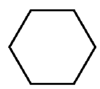 | COO | F | F | $OC_4H_9$ | |
| 5345 | $CH_3O$ | H | F |  | — | 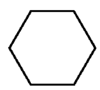 | COO | F | F | $OC_5H_{11}$ | |
| 5346 | $C_2H_5O$ | H | F | 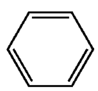 | — | 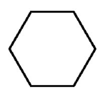 | COO | F | F | $OCH_3$ | |
| 5347 | $C_2H_5O$ | H | F |  | — | 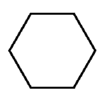 | COO | F | F | $OC_2H_5$ | |
| 5348 | $C_2H_5O$ | H | F | 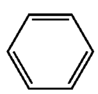 | — | 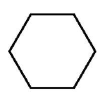 | COO | F | F | $OC_3H_7$ | |
| 5349 | $C_2H_5O$ | H | F | 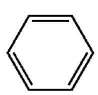 | — | 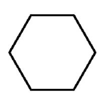 | COO | F | F | $OC_4H_9$ | |
| 5350 | $C_2H_5O$ | H | F | 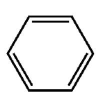 | — | 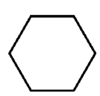 | COO | F | F | $OC_5H_{11}$ | |
| 5351 | $C_3H_7O$ | H | F | 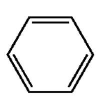 | — | 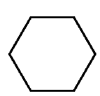 | COO | F | F | $OCH_3$ | |
| 5352 | $C_3H_7O$ | H | F | 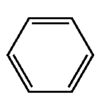 | — | 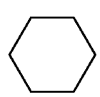 | COO | F | F | $OC_2H_5$ | |
| 5353 | $C_3H_7O$ | H | F | 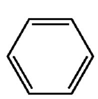 | — | 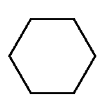 | COO | F | F | $OC_3H_7$ | |
| 5354 | $C_3H_7O$ | H | F | 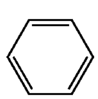 | — | 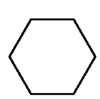 | COO | F | F | $OC_4H_9$ | |
| 5355 | $C_3H_7O$ | H | F | 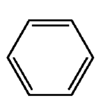 | — | 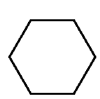 | COO | F | F | $OC_5H_{11}$ | |

TABLE 356
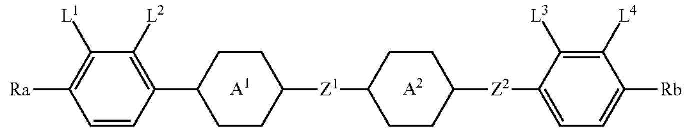
COO = 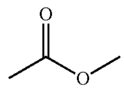
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5356 | $C_4H_9O$ | H | F | 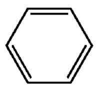 | — | 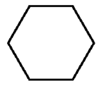 | COO | F | F | $OCH_3$ | |
| 5357 | $C_4H_9O$ | H | F |  | — | 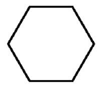 | COO | F | F | $OC_2H_5$ | |
| 5358 | $C_4H_9O$ | H | F |  | — | 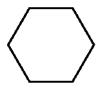 | COO | F | F | $OC_3H_7$ | |
| 5359 | $C_4H_9O$ | H | F |  | — | 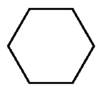 | COO | F | F | $OC_4H_9$ | |
| 5360 | $C_4H_9O$ | H | F |  | — | 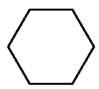 | COO | F | F | $OC_5H_{11}$ | |
| 5361 | $C_5H_{11}O$ | H | F |  | — | 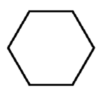 | COO | F | F | $OCH_3$ | |
| 5362 | $C_5H_{11}O$ | H | F | 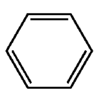 | — | 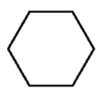 | COO | F | F | $OC_2H_5$ | |
| 5363 | $C_5H_{11}O$ | H | F | 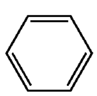 | — | 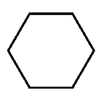 | COO | F | F | $OC_3H_7$ | |
| 5364 | $C_5H_{11}O$ | H | F | 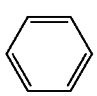 | — | 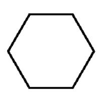 | COO | F | F | $OC_4H_9$ | |
| 5365 | $C_5H_{11}O$ | H | F | 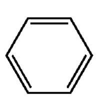 | — | 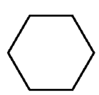 | COO | F | F | $OC_5H_{11}$ | |
| 5366 | $C_2H_5$ | H | F | 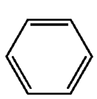 | — | 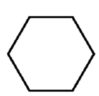 | COO | F | F | $C_4H_9$ | |
| 5367 | $C_5H_{11}$ | H | F | 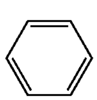 | — | 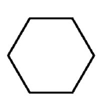 | COO | F | F | $C_2H_5$ | |
| 5368 | $C_2H_5$ | H | F | 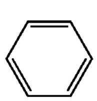 | — | 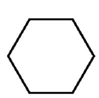 | COO | F | F | $OC_4H_9$ | |

TABLE 356-continued

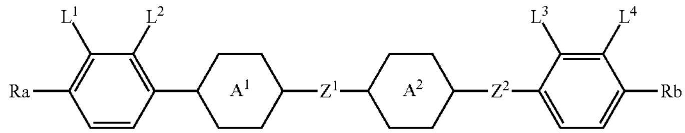

COO = 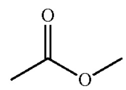

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5369 | $CH_2$=CH | H | F |  | — | 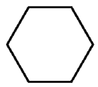 | COO | F | F | $OC_3H_7$ | |
| 5370 | $CH_2$=CH | H | F | 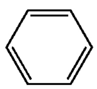 | — | 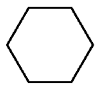 | COO | F | F | $OC_5H_{11}$ | |

TABLE 357

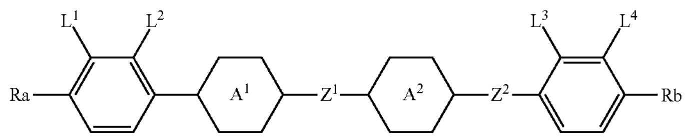

COO = 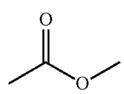

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5371 | $CH_3O$ | F | H | 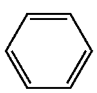 | — | 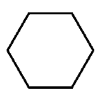 | COO | F | F | $OCH_3$ | |
| 5372 | $CH_3O$ | F | H | 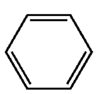 | — | 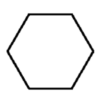 | COO | F | F | $OC_2H_5$ | |
| 5373 | $CH_3O$ | F | H | 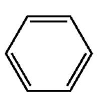 | — | 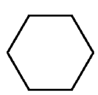 | COO | F | F | $OC_3H_7$ | |
| 5374 | $CH_3O$ | F | H | 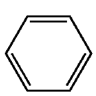 | — | 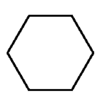 | COO | F | F | $OC_4H_9$ | |
| 5375 | $CH_3O$ | F | H | 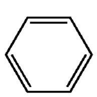 | — | 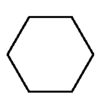 | COO | F | F | $OC_5H_{11}$ | |
| 5376 | $C_2H_5O$ | F | H | 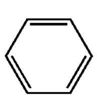 | — | 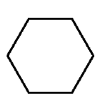 | COO | F | F | $OCH_3$ | |
| 5377 | $C_2H_5O$ | F | H | 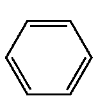 | — | 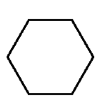 | COO | F | F | $OC_2H_5$ | |

TABLE 357-continued

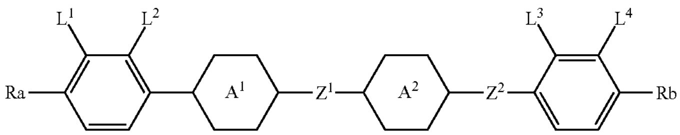

COO = 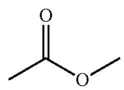

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5378 | $C_2H_5O$ | F | H |  | — | 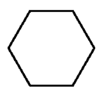 | COO | F | F | $OC_3H_7$ | |
| 5379 | $C_2H_5O$ | F | H |  | — | 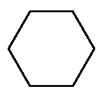 | COO | F | F | $OC_4H_9$ | |
| 5380 | $C_2H_5O$ | F | H |  | — | 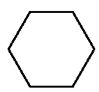 | COO | F | F | $OC_5H_{11}$ | |
| 5381 | $C_3H_7O$ | F | H | 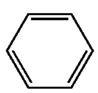 | — | 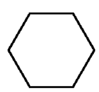 | COO | F | F | $OCH_3$ | |
| 5382 | $C_3H_7O$ | F | H | 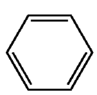 | — | 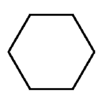 | COO | F | F | $OC_2H_5$ | |
| 5383 | $C_3H_7O$ | F | H | 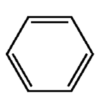 | — | 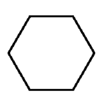 | COO | F | F | $OC_3H_7$ | |
| 5384 | $C_3H_7O$ | F | H | 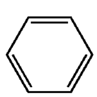 | — | 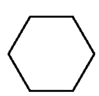 | COO | F | F | $OC_4H_9$ | |
| 5385 | $C_3H_7O$ | F | H | 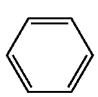 | — | 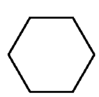 | COO | F | F | $OC_5H_{11}$ | |

TABLE 358

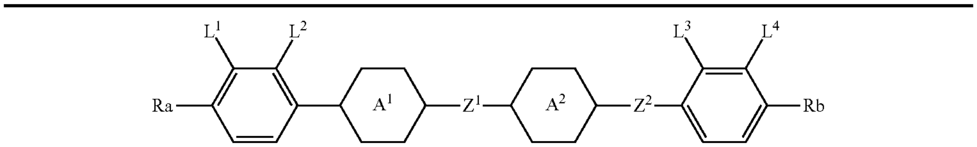

COO = 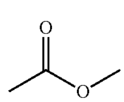

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5386 | $C_4H_9O$ | F | H | 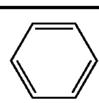 | — | 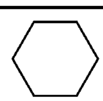 | COO | F | F | $OCH_3$ | |

TABLE 358-continued
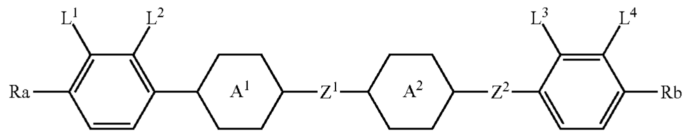
COO = 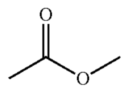
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5387 | $C_4H_9O$ | F | H |  | — | 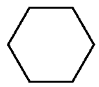 | COO | F | F | $OC_2H_5$ | |
| 5388 | $C_4H_9O$ | F | H |  | — | 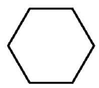 | COO | F | F | $OC_3H_7$ | |
| 5389 | $C_4H_9O$ | F | H |  | — | 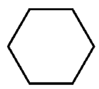 | COO | F | F | $OC_4H_9$ | |
| 5390 | $C_4H_9O$ | F | H | 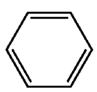 | — | 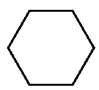 | COO | F | F | $OC_5H_{11}$ | |
| 5391 | $C_5H_{11}O$ | F | H |  | — | 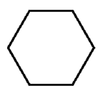 | COO | F | F | $OCH_3$ | |
| 5392 | $C_5H_{11}O$ | F | H | 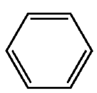 | — | 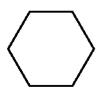 | COO | F | F | $OC_2H_5$ | |
| 5393 | $C_5H_{11}O$ | F | H | 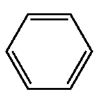 | — | 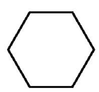 | COO | F | F | $OC_3H_7$ | |
| 5394 | $C_5H_{11}O$ | F | H | 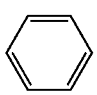 | — | 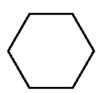 | COO | F | F | $OC_4H_9$ | |
| 5395 | $C_5H_{11}O$ | F | H | 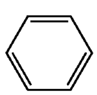 | — | 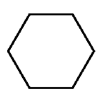 | COO | F | F | $OC_5H_{11}$ | |
| 5396 | $C_2H_5$ | F | H | 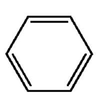 | — | 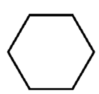 | COO | F | F | $C_4H_9$ | |
| 5397 | $C_5H_{11}$ | F | H | 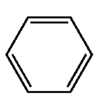 | — | 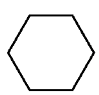 | COO | F | F | $C_2H_5$ | |
| 5398 | $C_2H_5$ | F | H | 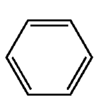 | — | 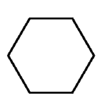 | COO | F | F | $OC_4H_9$ | |

TABLE 358-continued

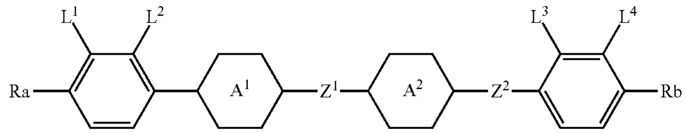

COO = 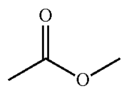

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5399 | $CH_2$═CH | F | H |  | — | 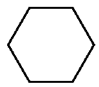 | COO | F | F | $OC_3H_7$ | |
| 5400 | $CH_2$═CH | F | H | 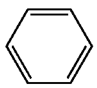 | — | 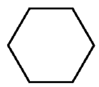 | COO | F | F | $OC_5H_{11}$ | |

TABLE 359

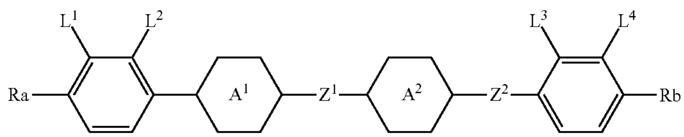

COO = 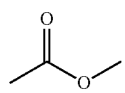

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5401 | $CH_3O$ | F | F |  | — | 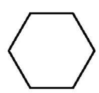 | COO | H | F | $OCH_3$ | |
| 5402 | $CH_3O$ | F | F | 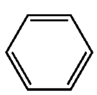 | — | 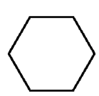 | COO | H | F | $OC_2H_5$ | |
| 5403 | $CH_3O$ | F | F | 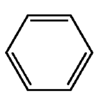 | — | 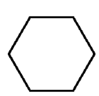 | COO | H | F | $OC_3H_7$ | |
| 5404 | $CH_3O$ | F | F | 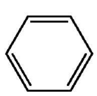 | — | 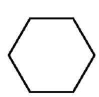 | COO | H | F | $OC_4H_9$ | |
| 5405 | $CH_3O$ | F | F | 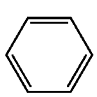 | — | 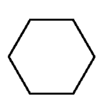 | COO | H | F | $OC_5H_{11}$ | |
| 5406 | $C_2H_5O$ | F | F | 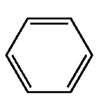 | — | 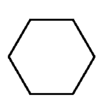 | COO | H | F | $OCH_3$ | |
| 5407 | $C_2H_5O$ | F | F | 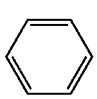 | — | 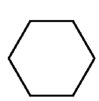 | COO | H | F | $OC_2H_5$ | |

TABLE 359-continued

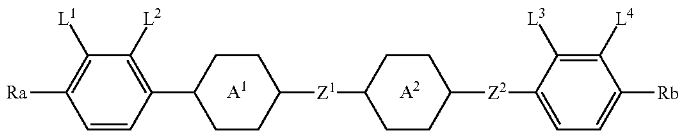

COO = 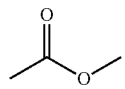

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5408 | $C_2H_5O$ | F | F |  | — | 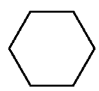 | COO | H | F | $OC_3H_7$ | |
| 5409 | $C_2H_5O$ | F | F | 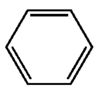 | — | 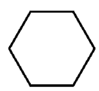 | COO | H | F | $OC_4H_9$ | |
| 5410 | $C_2H_5O$ | F | F |  | — | 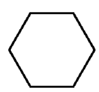 | COO | H | F | $OC_5H_{11}$ | |
| 5411 | $C_3H_7O$ | F | F | 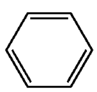 | — | 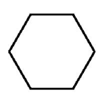 | COO | H | F | $OCH_3$ | |
| 5412 | $C_3H_7O$ | F | F | 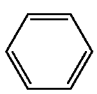 | — | 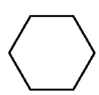 | COO | H | F | $OC_2H_5$ | |
| 5413 | $C_3H_7O$ | F | F | 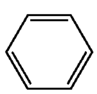 | — | 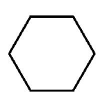 | COO | H | F | $OC_3H_7$ | |
| 5414 | $C_3H_7O$ | F | F | 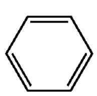 | — | 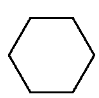 | COO | H | F | $OC_4H_9$ | |
| 5415 | $C_3H_7O$ | F | F | 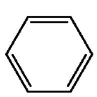 | — | 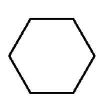 | COO | H | F | $OC_5H_{11}$ | |

TABLE 360

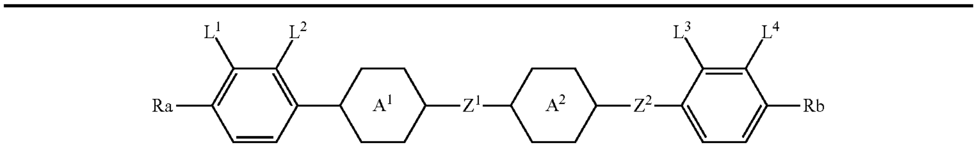

COO = 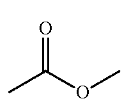

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5416 | $C_4H_9O$ | F | F | 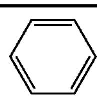 | — | 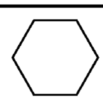 | COO | H | F | $OCH_3$ | |

TABLE 360-continued
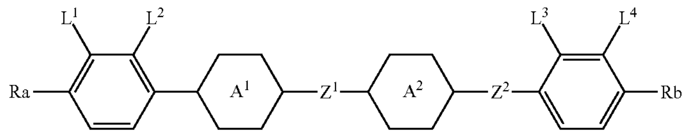
COO = 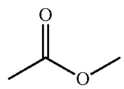
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5417 | $C_4H_9O$ | F | F | 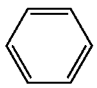 | — | 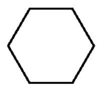 | COO | H | F | $OC_2H_5$ | |
| 5418 | $C_4H_9O$ | F | F | 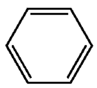 | — | 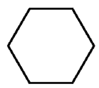 | COO | H | F | $OC_3H_7$ | |
| 5419 | $C_4H_9O$ | F | F |  | — | 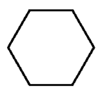 | COO | H | F | $OC_4H_9$ | |
| 5420 | $C_4H_9O$ | F | F |  | — | 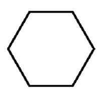 | COO | H | F | $OC_5H_{11}$ | |
| 5421 | $C_5H_{11}O$ | F | F |  | — | 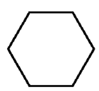 | COO | H | F | $OCH_3$ | |
| 5422 | $C_5H_{11}O$ | F | F | 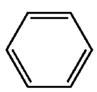 | — | 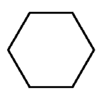 | COO | H | F | $OC_2H_5$ | |
| 5423 | $C_5H_{11}O$ | F | F | 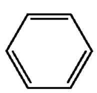 | — | 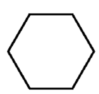 | COO | H | F | $OC_3H_7$ | |
| 5424 | $C_5H_{11}O$ | F | F | 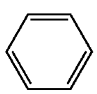 | — | 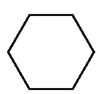 | COO | H | F | $OC_4H_9$ | |
| 5425 | $C_5H_{11}O$ | F | F | 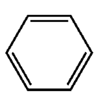 | — | 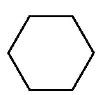 | COO | H | F | $OC_5H_{11}$ | |
| 5426 | $C_2H_5$ | F | F | 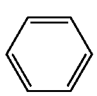 | — | 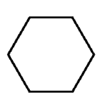 | COO | H | F | $C_4H_9$ | |
| 5427 | $C_5H_5$ | F | F | 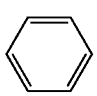 | — | 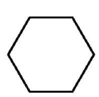 | COO | H | F | $C_2H_5$ | |
| 5428 | $C_2H_5$ | F | F | 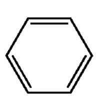 | — | 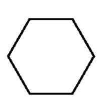 | COO | H | F | $OC_4H_9$ | |

TABLE 360-continued

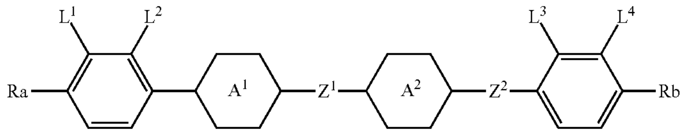

COO = 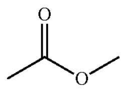

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5429 | $CH_2$═CH | F | F |  | — | 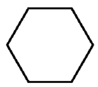 | COO | H | F | $OC_3H_7$ | |
| 5430 | $CH_2$═CH | F | F | 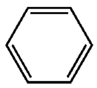 | — | 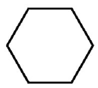 | COO | H | F | $OC_5H_{11}$ | |

TABLE 361

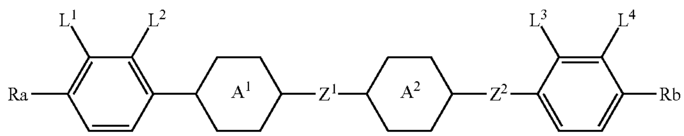

COO = 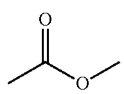

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5431 | $CH_3O$ | F | F | 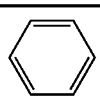 | — | 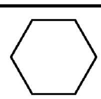 | COO | F | H | $OCH_3$ | |
| 5432 | $CH_3O$ | F | F | 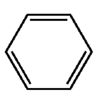 | — | 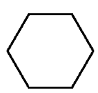 | COO | F | H | $OC_2H_5$ | |
| 5433 | $CH_3O$ | F | F | 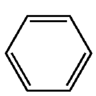 | — | 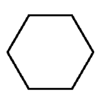 | COO | F | H | $OC_3H_7$ | |
| 5434 | $CH_3O$ | F | F | 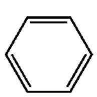 | — | 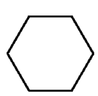 | COO | F | H | $OC_4H_9$ | |
| 5435 | $CH_3O$ | F | F | 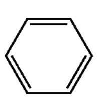 | — | 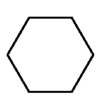 | COO | F | H | $OC_5H_{11}$ | |
| 5436 | $C_2H_5O$ | F | F | 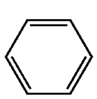 | — | 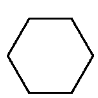 | COO | F | H | $OCH_3$ | |
| 5437 | $C_2H_5O$ | F | F | 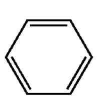 | — | 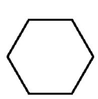 | COO | F | H | $OC_2H_5$ | |

TABLE 361-continued

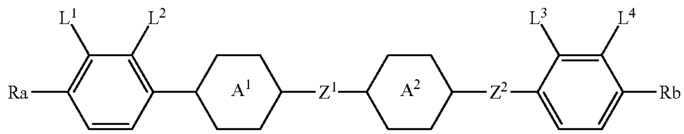

COO = 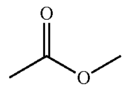

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5438 | $C_2H_5O$ | F | F |  | — | 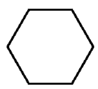 | COO | F | H | $OC_3H_7$ | |
| 5439 | $C_2H_5O$ | F | F | 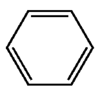 | — | 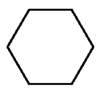 | COO | F | H | $OC_4H_9$ | |
| 5440 | $C_2H_5O$ | F | F | 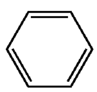 | — | 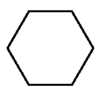 | COO | F | H | $OC_5H_{11}$ | |
| 5441 | $C_3H_7O$ | F | F | 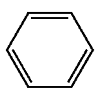 | — | 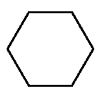 | COO | F | H | $OCH_3$ | |
| 5442 | $C_3H_7O$ | F | F | 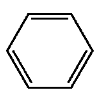 | — | 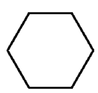 | COO | F | H | $OC_2H_5$ | |
| 5443 | $C_3H_7O$ | F | F | 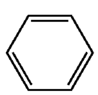 | — | 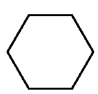 | COO | F | H | $OC_3H_7$ | |
| 5444 | $C_3H_7O$ | F | F | 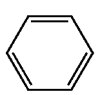 | — | 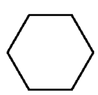 | COO | F | H | $OC_4H_9$ | |
| 5445 | $C_3H_7O$ | F | F | 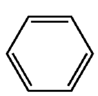 | — | 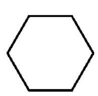 | COO | F | H | $OC_5H_{11}$ | |

TABLE 362

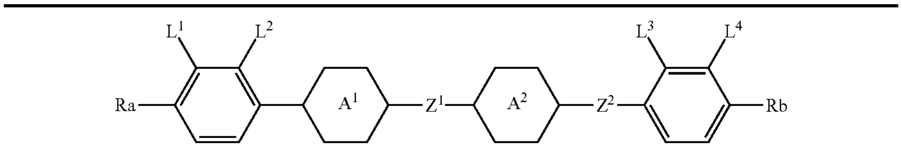

COO = 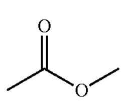

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5446 | $C_4H_9O$ | F | F | 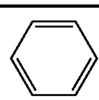 | — | 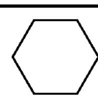 | COO | F | H | $OCH_3$ | |

TABLE 362-continued
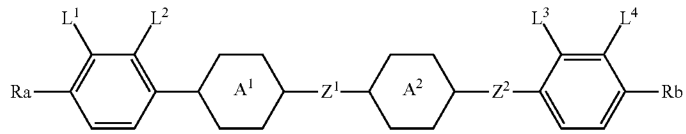
COO = 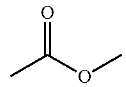
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5447 | $C_4H_9O$ | F | F |  | — | 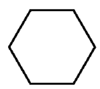 | COO | F | H | $OC_2H_5$ | |
| 5448 | $C_4H_9O$ | F | F | 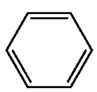 | — | 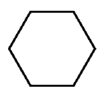 | COO | F | H | $OC_3H_7$ | |
| 5449 | $C_4H_9O$ | F | F | 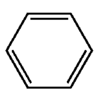 | — | 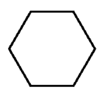 | COO | F | H | $OC_4H_9$ | |
| 5450 | $C_4H_9O$ | F | F | 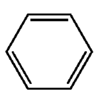 | — | 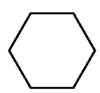 | COO | F | H | $OC_5H_{11}$ | |
| 5451 | $C_5H_{11}O$ | F | F | 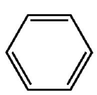 | — | 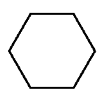 | COO | F | H | $OCH_3$ | |
| 5452 | $C_5H_{11}O$ | F | F | 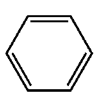 | — | 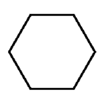 | COO | F | H | $OC_2H_5$ | |
| 5453 | $C_5H_{11}O$ | F | F | 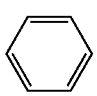 | — | 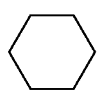 | COO | F | H | $OC_3H_7$ | |
| 5454 | $C_5H_{11}O$ | F | F | 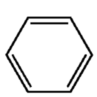 | — | 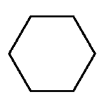 | COO | F | H | $OC_4H_9$ | |
| 5455 | $C_5H_{11}O$ | F | F | 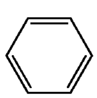 | — | 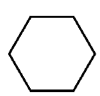 | COO | F | H | $OC_5H_{11}$ | |
| 5456 | $C_2H_5$ | F | F | 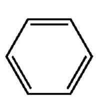 | — | 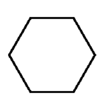 | COO | F | H | $C_4H_9$ | |
| 5457 | $C_5H_{11}$ | F | F | 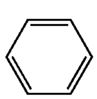 | — | 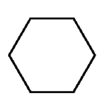 | COO | F | H | $C_2H_5$ | |
| 5458 | $C_2H_5$ | F | F | 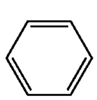 | — | 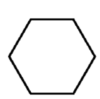 | COO | F | H | $OC_4H_9$ | |

TABLE 362-continued

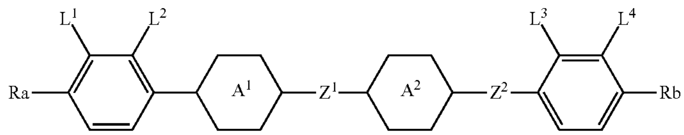

COO = 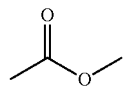

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5459 | $CH_2$=CH | F | F | 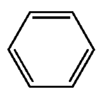 | — | 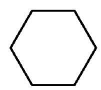 | COO | F | H | $OC_3H_7$ | |
| 5460 | $CH_2$=CH | F | F | 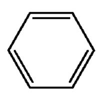 | — | 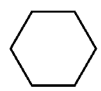 | COO | F | H | $OC_5H_{11}$ | |

TABLE 363

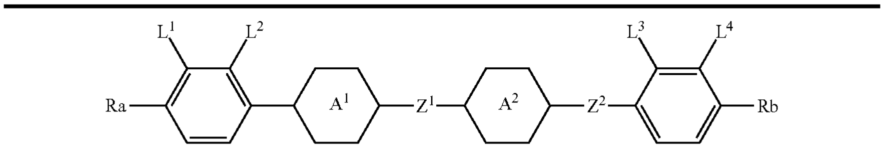

COO = 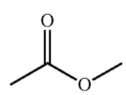

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5461 | $CH_3O$ | F | F | 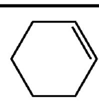 | — | 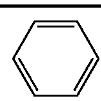 | COO | F | F | $OCH_3$ | |
| 5462 | $CH_3O$ | F | F | 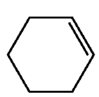 | — | 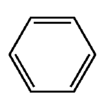 | COO | F | F | $OC_2H_5$ | |
| 5463 | $CH_3O$ | F | F | 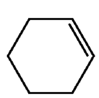 | — | 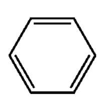 | COO | F | F | $OC_3H_7$ | |
| 5464 | $CH_3O$ | F | F | 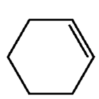 | — | 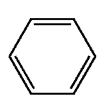 | COO | F | F | $OC_4H_9$ | |
| 5465 | $CH_3O$ | F | F | 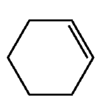 | — | 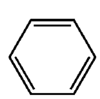 | COO | F | F | $OC_5H_{11}$ | |
| 5466 | $C_2H_5O$ | F | F | 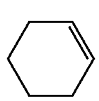 | — | 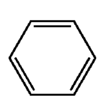 | COO | F | F | $OCH_3$ | |
| 5467 | $C_2H_5O$ | F | F | 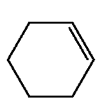 | — | 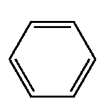 | COO | F | F | $OC_2H_5$ | |

TABLE 363-continued

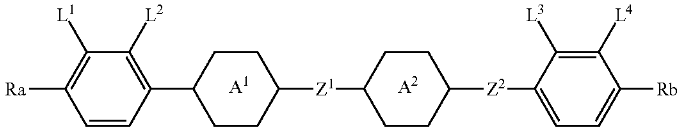

COO = 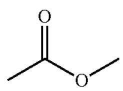

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5468 | $C_2H_5O$ | F | F | 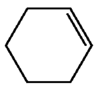 | — | 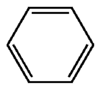 | COO | F | F | $OC_3H_7$ | |
| 5469 | $C_2H_5O$ | F | F | 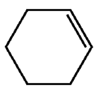 | — | 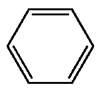 | COO | F | F | $OC_4H_9$ | |
| 5470 | $C_2H_5O$ | F | F | 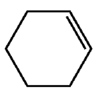 | — |  | COO | F | F | $OC_5H_{11}$ | |
| 5471 | $C_3H_7O$ | F | F | 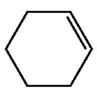 | — |  | COO | F | F | $OCH_3$ | |
| 5472 | $C_3H_7O$ | F | F | 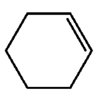 | — |  | COO | F | F | $OC_2H_5$ | |
| 5473 | $C_3H_7O$ | F | F | 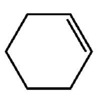 | — | 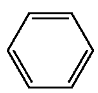 | COO | F | F | $OC_3H_7$ | |
| 5474 | $C_3H_7O$ | F | F | 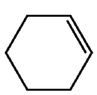 | — | 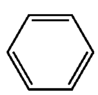 | COO | F | F | $OC_4H_9$ | |
| 5475 | $C_3H_7O$ | F | F | 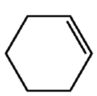 | — | 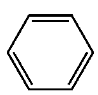 | COO | F | F | $OC_5H_{11}$ | |

TABLE 364

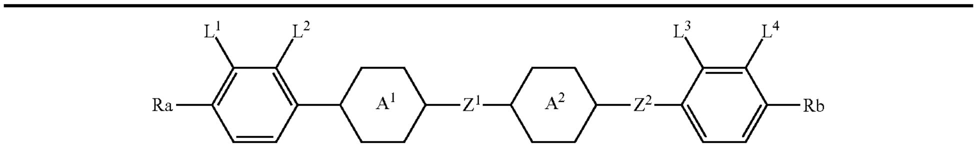

COO = 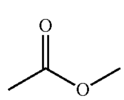

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5476 | $C_4H_9O$ | F | F | 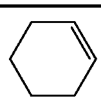 | — | 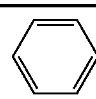 | COO | F | F | $OCH_3$ | |

TABLE 364-continued
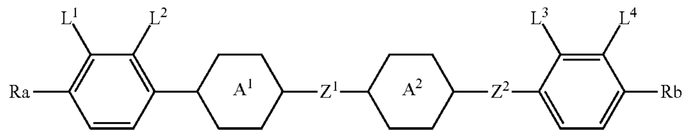
COO = 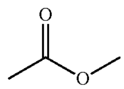
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5477 | $C_4H_9O$ | F | F | 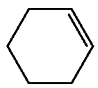 | — | 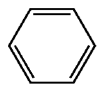 | COO | F | F | $OC_2H_5$ | |
| 5478 | $C_4H_9O$ | F | F | 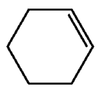 | — | 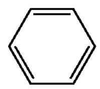 | COO | F | F | $OC_3H_7$ | |
| 5479 | $C_4H_9O$ | F | F | 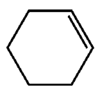 | — | 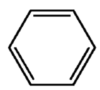 | COO | F | F | $OC_4H_9$ | |
| 5480 | $C_4H_9O$ | F | F | 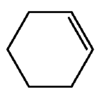 | — | 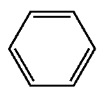 | COO | F | F | $OC_5H_{11}$ | |
| 5481 | $C_5H_{11}O$ | F | F | 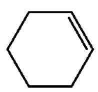 | — | 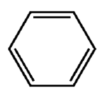 | COO | F | F | $OCH_3$ | |
| 5482 | $C_5H_{11}O$ | F | F | 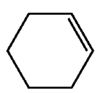 | — | 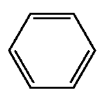 | COO | F | F | $OC_2H_5$ | |
| 5483 | $C_5H_{11}O$ | F | F | 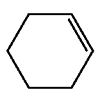 | — | 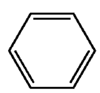 | COO | F | F | $OC_3H_7$ | |
| 5484 | $C_5H_{11}O$ | F | F | 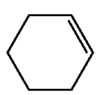 | — | 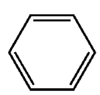 | COO | F | F | $OC_4H_9$ | |
| 5485 | $C_5H_{11}O$ | F | F | 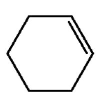 | — | 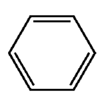 | COO | F | F | $OC_5H_{11}$ | |
| 5486 | $C_2H_5$ | F | F | 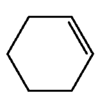 | — | 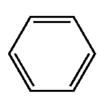 | COO | F | F | $C_4H_9$ | |
| 5487 | $C_5H_{11}$ | F | F | 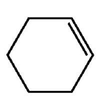 | — | 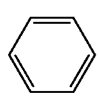 | COO | F | F | $C_2H_5$ | |
| 5488 | $C_2H_5$ | F | F | 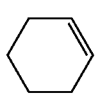 | — | 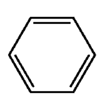 | COO | F | F | $OC_4H_9$ | |

TABLE 364-continued

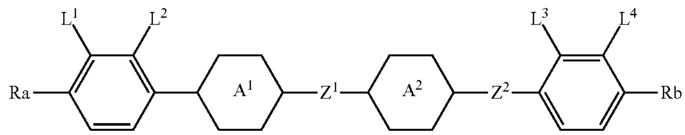

COO = 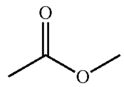

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5489 | $CH_2$═CH | F | F | 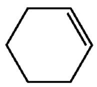 | — | 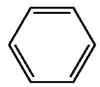 | COO | F | F | $OC_3H_7$ | |
| 5490 | $CH_2$═CH | F | F | 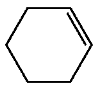 | — | 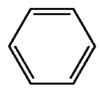 | COO | F | F | $OC_5H_{11}$ | |

TABLE 365

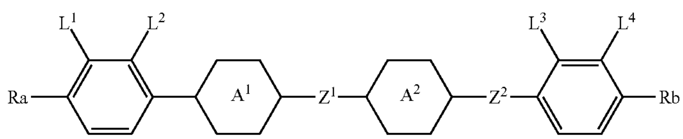

COO = 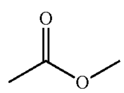

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5491 | $CH_3O$ | F | F | 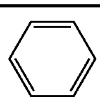 | — | 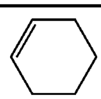 | COO | F | F | $OCH_3$ | |
| 5492 | $CH_3O$ | F | F | 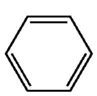 | — | 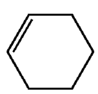 | COO | F | F | $OC_2H_5$ | |
| 5493 | $CH_3O$ | F | F | 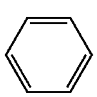 | — | 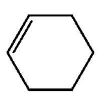 | COO | F | F | $OC_3H_7$ | |
| 5494 | $CH_3O$ | F | F | 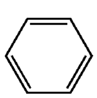 | — | 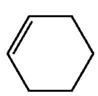 | COO | F | F | $OC_4H_9$ | |
| 5495 | $CH_3O$ | F | F | 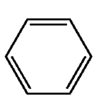 | — | 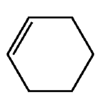 | COO | F | F | $OC_5H_{11}$ | |
| 5496 | $C_2H_5O$ | F | F | 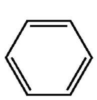 | — | 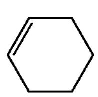 | COO | F | F | $OCH_3$ | |
| 5497 | $C_2H_5O$ | F | F | 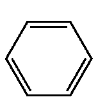 | — | 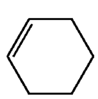 | COO | F | F | $OC_2H_5$ | |

TABLE 365-continued

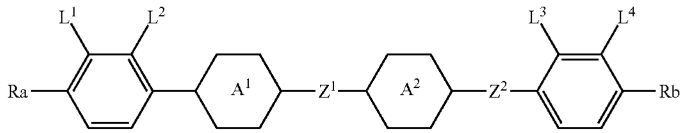

COO = 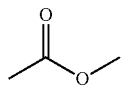

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5498 | $C_2H_5O$ | F | F | 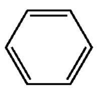 | — | 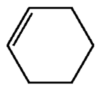 | COO | F | F | $OC_3H_7$ | |
| 5499 | $C_2H_5O$ | F | F | 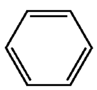 | — | 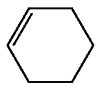 | COO | F | F | $OC_4H_9$ | |
| 5500 | $C_2H_5O$ | F | F | 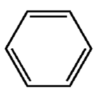 | — | 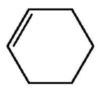 | COO | F | F | $OC_5H_{11}$ | |
| 5501 | $C_3H_7O$ | F | F | 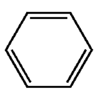 | — | 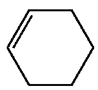 | COO | F | F | $OCH_3$ | |
| 5502 | $C_3H_7O$ | F | F | 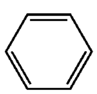 | — | 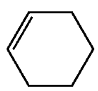 | COO | F | F | $OC_2H_5$ | |
| 5503 | $C_3H_7O$ | F | F | 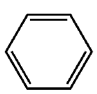 | — | 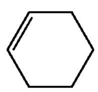 | COO | F | F | $OC_3H_7$ | |
| 5504 | $C_3H_7O$ | F | F | 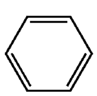 | — | 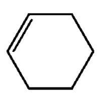 | COO | F | F | $OC_4H_9$ | |
| 5505 | $C_3H_7O$ | F | F | 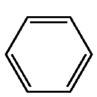 | — | 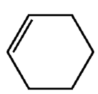 | COO | F | F | $OC_5H_{11}$ | |

TABLE 366

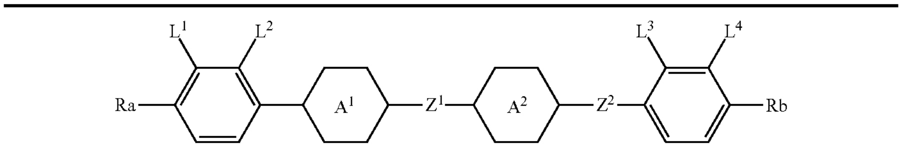

COO = 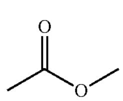

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5506 | $C_4H_9O$ | F | F | 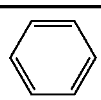 | — | 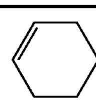 | COO | F | F | $OCH_3$ | |

TABLE 366-continued
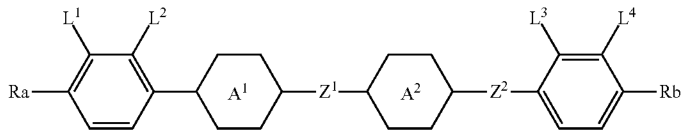
COO = 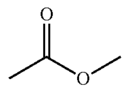
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5507 | $C_4H_9O$ | F | F | 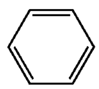 | — | 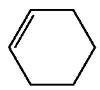 | COO | F | F | $OC_2H_5$ | |
| 5508 | $C_4H_9O$ | F | F | 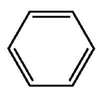 | — | 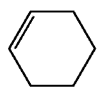 | COO | F | F | $OC_3H_7$ | |
| 5509 | $C_4H_9O$ | F | F | 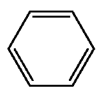 | — | 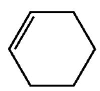 | COO | F | F | $OC_4H_9$ | |
| 5510 | $C_4H_9O$ | F | F | 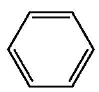 | — | 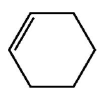 | COO | F | F | $OC_5H_{11}$ | |
| 5511 | $C_5H_{11}O$ | F | F | 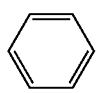 | — | 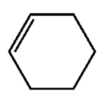 | COO | F | F | $OCH_3$ | |
| 5512 | $C_5H_{11}O$ | F | F | 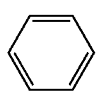 | — | 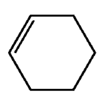 | COO | F | F | $OC_2H_5$ | |
| 5513 | $C_5H_{11}O$ | F | F | 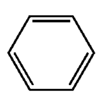 | — | 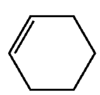 | COO | F | F | $OC_3H_7$ | |
| 5514 | $C_5H_{11}O$ | F | F | 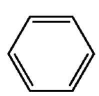 | — | 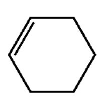 | COO | F | F | $OC_4H_9$ | |
| 5515 | $C_5H_{11}O$ | F | F | 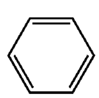 | — | 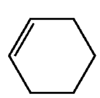 | COO | F | F | $OC_5H_{11}$ | |
| 5516 | $C_2H_5$ | F | F | 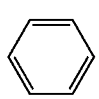 | — | 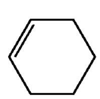 | COO | F | F | $C_4H_9$ | |
| 5517 | $C_5H_{11}$ | F | F | 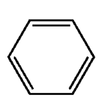 | — | 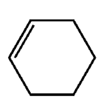 | COO | F | F | $C_2H_5$ | |
| 5518 | $C_2H_5$ | F | F | 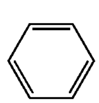 | — | 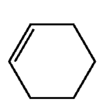 | COO | F | F | $OC_4H_9$ | |

TABLE 366-continued

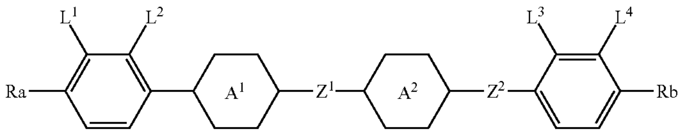

COO = 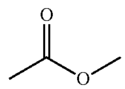

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5519 | $CH_2$=CH | F | F |  | — | 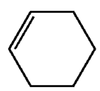 | COO | F | F | $OC_3H_7$ | |
| 5520 | $CH_2$=CH | F | F | 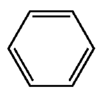 | — | 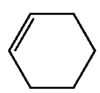 | COO | F | F | $OC_5H_{11}$ | |

TABLE 367

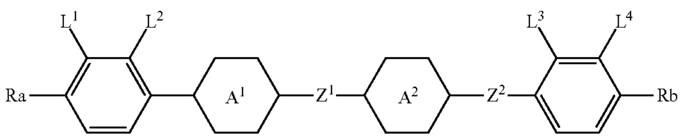

COO = 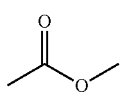

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5521 | $CH_3O$ | F | F | 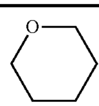 | — | 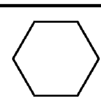 | COO | F | F | $OCH_3$ | |
| 5522 | $CH_3O$ | F | F | 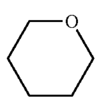 | — | 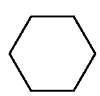 | COO | F | F | $OC_2H_5$ | |
| 5523 | $CH_3O$ | F | F | 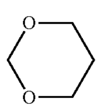 | — | 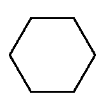 | COO | F | F | $OC_3H_7$ | |
| 5524 | $CH_3O$ | F | F | 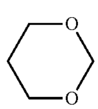 | — | 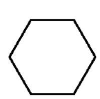 | COO | F | F | $OC_4H_9$ | |
| 5525 | $CH_3O$ | F | F | 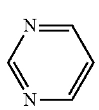 | — | 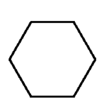 | COO | F | F | $OC_5H_{11}$ | |
| 5526 | $C_2H_5O$ | F | F | 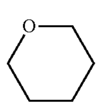 | — | 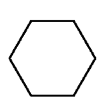 | COO | F | F | $OCH_3$ | |
| 5527 | $C_2H_5O$ | F | F | 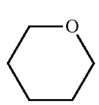 | — | 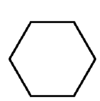 | COO | F | F | $OC_2H_5$ | |

TABLE 367-continued

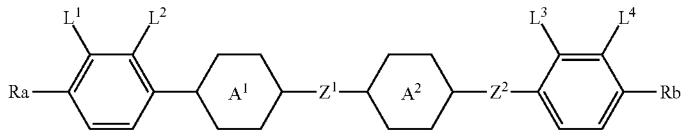

COO = 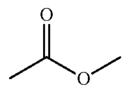

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5528 | $C_2H_5O$ | F | F | 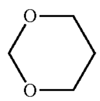 | — | 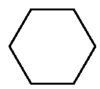 | COO | F | F | $OC_3H_7$ | |
| 5529 | $C_2H_5O$ | F | F | 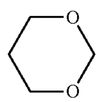 | — | 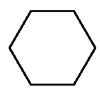 | COO | F | F | $OC_4H_9$ | |
| 5530 | $C_2H_5O$ | F | F | 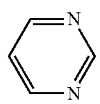 | — | 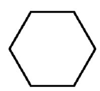 | COO | F | F | $OC_5H_{11}$ | |
| 5531 | $C_3H_7O$ | F | F | 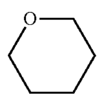 | — | 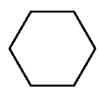 | COO | F | F | $OCH_3$ | |
| 5532 | $C_3H_7O$ | F | F | 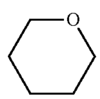 | — | 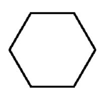 | COO | F | F | $OC_2H_5$ | |
| 5533 | $C_3H_7O$ | F | F | 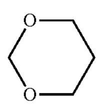 | — | 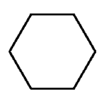 | COO | F | F | $OC_3H_7$ | |
| 5534 | $C_3H_7O$ | F | F | 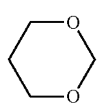 | — | 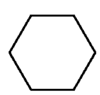 | COO | F | F | $OC_4H_9$ | |
| 5535 | $C_3H_7O$ | F | F | 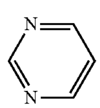 | — | 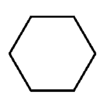 | COO | F | F | $OC_5H_{11}$ | |

TABLE 368

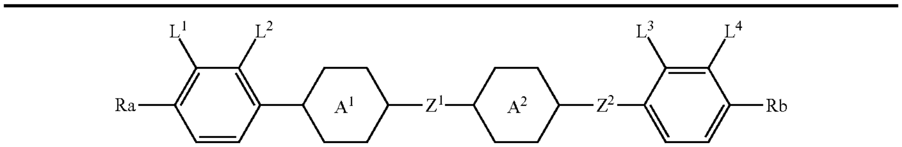

COO = 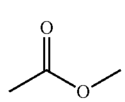

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5536 | $C_4H_9O$ | F | F | 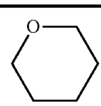 | — | 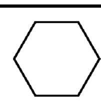 | COO | F | F | $OCH_3$ | |

TABLE 368-continued
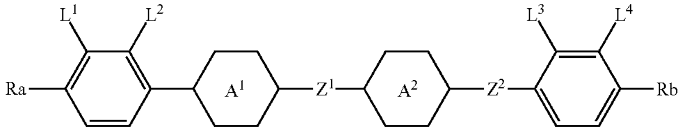
COO = 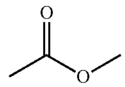
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5537 | $C_4H_9O$ | F | F | 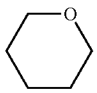 | — | 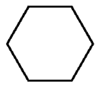 | COO | F | F | $OC_2H_5$ | |
| 5538 | $C_4H_9O$ | F | F | 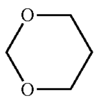 | — | 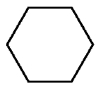 | COO | F | F | $OC_3H_7$ | |
| 5539 | $C_4H_9O$ | F | F | 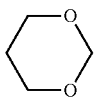 | — | 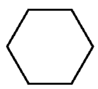 | COO | F | F | $OC_4H_9$ | |
| 5540 | $C_4H_9O$ | F | F | 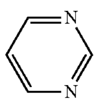 | — | 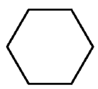 | COO | F | F | $OC_5H_{11}$ | |
| 5541 | $C_5H_{11}O$ | F | F | 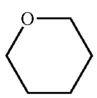 | — | 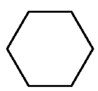 | COO | F | F | $OCH_3$ | |
| 5542 | $C_5H_{11}O$ | F | F | 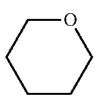 | — | 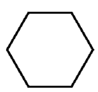 | COO | F | F | $OC_2H_5$ | |
| 5543 | $C_5H_{11}O$ | F | F | 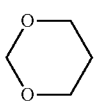 | — | 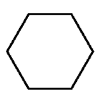 | COO | F | F | $OC_3H_7$ | |
| 5544 | $C_5H_{11}O$ | F | F | 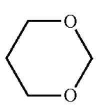 | — | 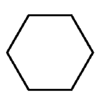 | COO | F | F | $OC_4H_9$ | |
| 5545 | $C_5H_{11}O$ | F | F | 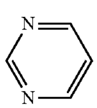 | — | 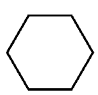 | COO | F | F | $OC_5H_{11}$ | |
| 5546 | $C_2H_5$ | F | F | 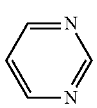 | — | 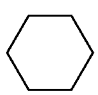 | COO | F | F | $C_4H_9$ | |
| 5547 | $C_5H_{11}$ | F | F | 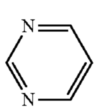 | — | 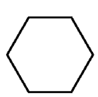 | COO | F | F | $C_2H_5$ | |
| 5548 | $C_2H_5$ | F | F | 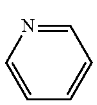 | — | 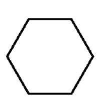 | COO | F | F | $OC_4H_9$ | |

TABLE 368-continued

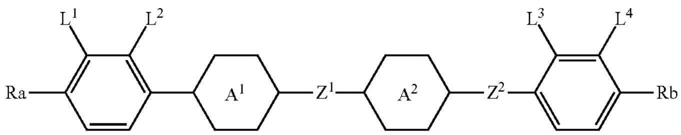

COO = 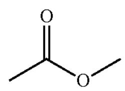

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5549 | $CH_2$═CH | F | F | 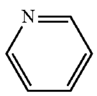 | — | 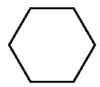 | COO | F | F | $OC_3H_7$ | |
| 5550 | $CH_2$═CH | F | F | 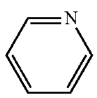 | — | 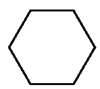 | COO | F | F | $OC_5H_{11}$ | |

TABLE 369

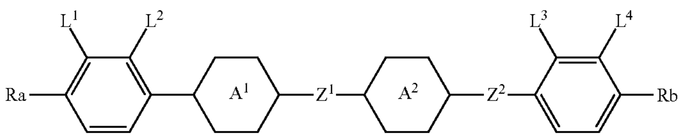

OCO = 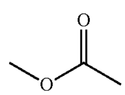

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5551 | $CH_3O$ | F | F | 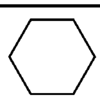 | — | 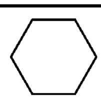 | OCO | F | F | $OCH_3$ | |
| 5552 | $CH_3O$ | F | F | 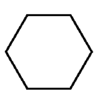 | — | 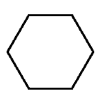 | OCO | F | F | $OC_2H_5$ | |
| 5553 | $CH_3O$ | F | F | 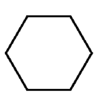 | — | 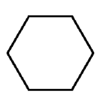 | OCO | F | F | $OC_3H_7$ | |
| 5554 | $CH_3O$ | F | F | 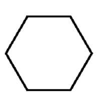 | — | 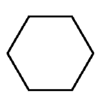 | OCO | F | F | $OC_4H_9$ | |
| 5555 | $CH_3O$ | F | F | 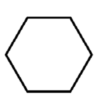 | — | 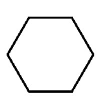 | OCO | F | F | $OC_5H_{11}$ | |
| 5556 | $C_2H_5O$ | F | F | 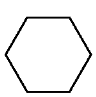 | — | 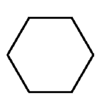 | OCO | F | F | $OCH_3$ | |
| 5557 | $C_2H_5O$ | F | F | 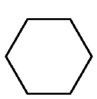 | — | 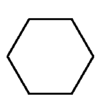 | OCO | F | F | $OC_2H_5$ | |

TABLE 369-continued

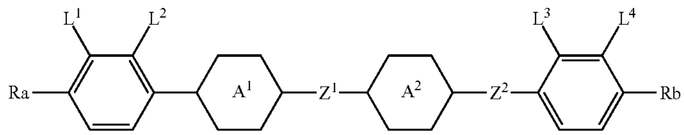

OCO = 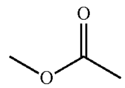

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5558 | $C_2H_5O$ | F | F | 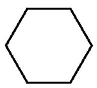 | — | 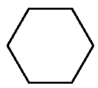 | OCO | F | F | $OC_3H_7$ | |
| 5559 | $C_2H_5O$ | F | F | 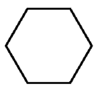 | — | 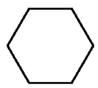 | OCO | F | F | $OC_4H_9$ | |
| 5560 | $C_2H_5O$ | F | F | 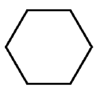 | — | 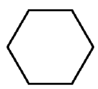 | OCO | F | F | $OC_5H_{11}$ | |
| 5561 | $C_3H_7O$ | F | F | 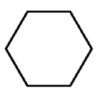 | — | 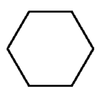 | OCO | F | F | $OCH_3$ | |
| 5562 | $C_3H_7O$ | F | F | 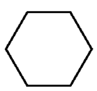 | — | 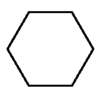 | OCO | F | F | $OC_2H_5$ | |
| 5563 | $C_3H_7O$ | F | F | 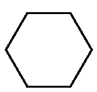 | — | 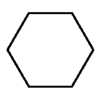 | OCO | F | F | $OC_3H_7$ | |
| 5564 | $C_3H_7O$ | F | F | 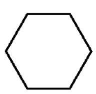 | — | 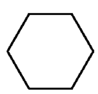 | OCO | F | F | $OC_4H_9$ | |
| 5565 | $C_3H_7O$ | F | F | 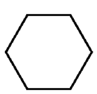 | — | 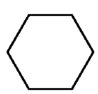 | OCO | F | F | $OC_5H_{11}$ | |

TABLE 370

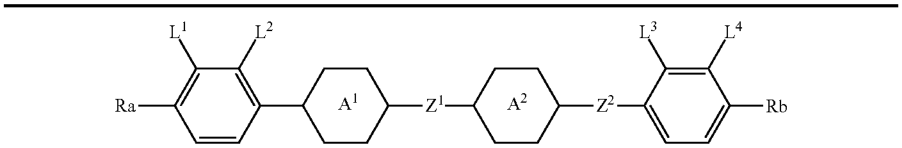

OCO = 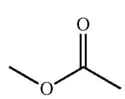

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5566 | $C_4H_9O$ | F | F | 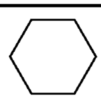 | — | 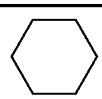 | OCO | F | F | $OCH_3$ | |

TABLE 370-continued
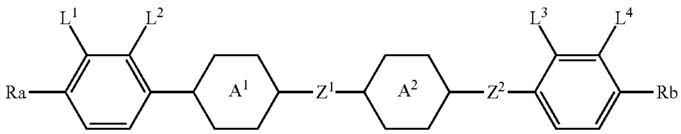
OCO = 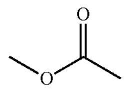
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5567 | $C_4H_9O$ | F | F | 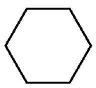 | — | 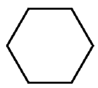 | OCO | F | F | $OC_2H_5$ | |
| 5568 | $C_4H_9O$ | F | F | 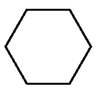 | — | 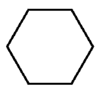 | OCO | F | F | $OC_3H_7$ | |
| 5569 | $C_4H_9O$ | F | F | 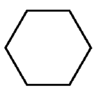 | — | 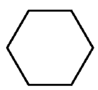 | OCO | F | F | $OC_4H_9$ | |
| 5570 | $C_4H_9O$ | F | F | 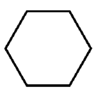 | — | 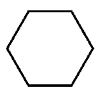 | OCO | F | F | $OC_5H_{11}$ | |
| 5571 | $C_5H_{11}O$ | F | F | 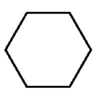 | — | 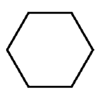 | OCO | F | F | $OCH_3$ | |
| 5572 | $C_5H_{11}O$ | F | F | 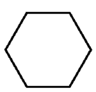 | — | 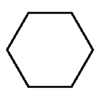 | OCO | F | F | $OC_2H_5$ | |
| 5573 | $C_5H_{11}O$ | F | F | 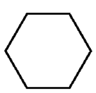 | — | 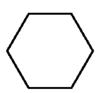 | OCO | F | F | $OC_3H_7$ | |
| 5574 | $C_5H_{11}O$ | F | F | 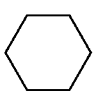 | — | 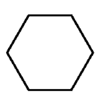 | OCO | F | F | $OC_4H_9$ | |
| 5575 | $C_5H_{11}O$ | F | F | 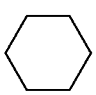 | — | 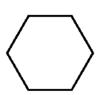 | OCO | F | F | $OC_5H_{11}$ | |
| 5576 | $C_2H_5$ | F | F | 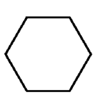 | — | 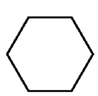 | OCO | F | F | $C_4H_9$ | |
| 5577 | $C_5H_{11}$ | F | F | 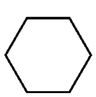 | — | 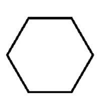 | OCO | F | F | $C_2H_5$ | |
| 5578 | $C_2H_5$ | F | F | 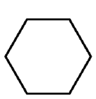 | — | 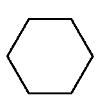 | OCO | F | F | $OC_4H_9$ | |

TABLE 370-continued

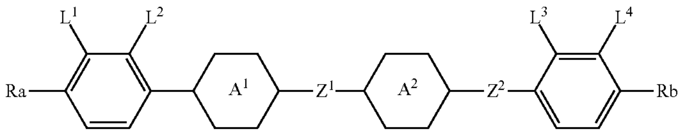

OCO =
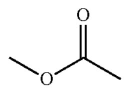

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5579 | $CH_2$═CH | F | F | 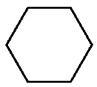 | — | 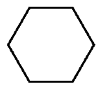 | OCO | F | F | $OC_3H_7$ | |
| 5580 | $CH_2$═CH | F | F | 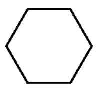 | — | 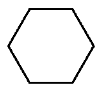 | OCO | F | F | $OC_5H_{11}$ | |

TABLE 371

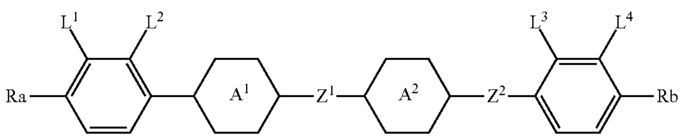

OCO =
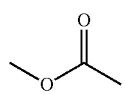

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5581 | $CH_2$═CHO | F | F | 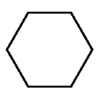 | — | 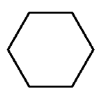 | OCO | F | F | $OC_3H_7$ | |
| 5582 | $CH_2$═$CHCH_2O$ | F | F | 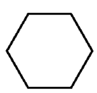 | — | 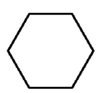 | OCO | F | F | $OC_5H_{11}$ | |
| 5583 | $CH_2$═$CHCH_2O$ | F | F | 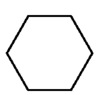 | — | 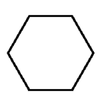 | OCO | F | F | $OC_3H_7$ | |
| 5584 | $CH_2$═$CHC_2H_5O$ | F | F | 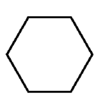 | — | 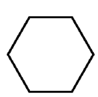 | OCO | F | F | $OC_5H_{11}$ | |
| 5585 | $CH_2$═$CHC_2H_5O$ | F | F | 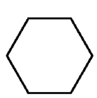 | — | 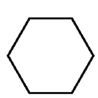 | OCO | F | F | $OC_2H_5$ | |
| 5586 | $CH_2$═$CHC_2H_5O$ | F | F | 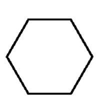 | — | 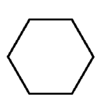 | OCO | F | F | $OC_3H_7$ | |
| 5587 | $CH_3CH$═$CHCH_2O$ | F | F | 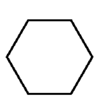 | — | 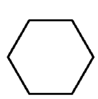 | OCO | F | F | $OCH_3$ | |

TABLE 371-continued

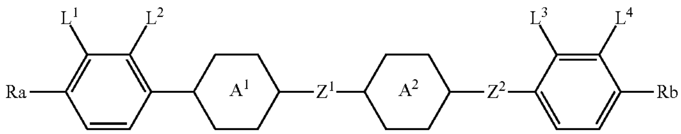

OCO = 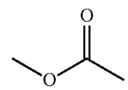

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5588 | $CH_3CH{=}CHCH_2O$ | F | F | 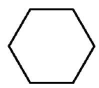 | — | 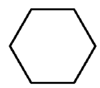 | OCO | F | F | $OC_2H_5$ | |
| 5589 | $C_3H_7O$ | F | F | 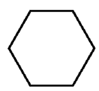 | — | 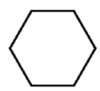 | OCO | F | F | $OCH{=}CH_2$ | |
| 5590 | $C_3H_7O$ | F | F | 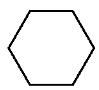 | — | 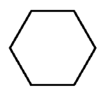 | OCO | F | F | $OCH_2CH{=}CH_2$ | |
| 5591 | $C_4H_9O$ | F | F | 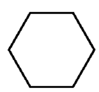 | — | 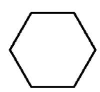 | OCO | F | F | $OCH_2CH{=}CH_2$ | |
| 5592 | $C_5H_{11}O$ | F | F | 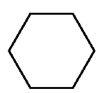 | — | 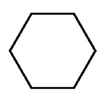 | OCO | F | F | $OCH_2CH{=}CH_2$ | |
| 5593 | $CH_3O$ | F | F | 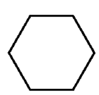 | — | 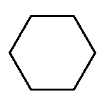 | OCO | F | F | $OC_2H_5CH{=}CH_2$ | |
| 5594 | $C_2H_5O$ | F | F | 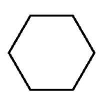 | — | 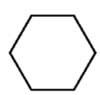 | OCO | F | F | $OC_2H_5CH{=}CH_2$ | |
| 5595 | $C_3H_7O$ | F | F | 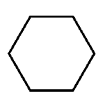 | — | 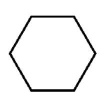 | OCO | F | F | $OC_2H_5CH{=}CH_2$ | |

TABLE 372

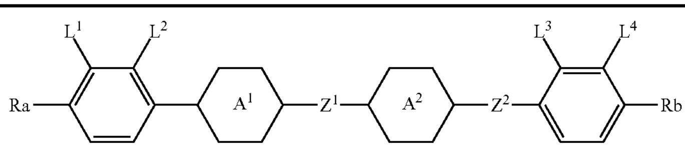

OCO = 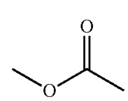

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5596 | $CH_3O$ | F | F | 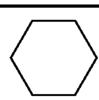 | — | 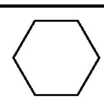 | OCO | F | F | $OCH_2CH{=}CHCH_3$ | |

TABLE 372-continued

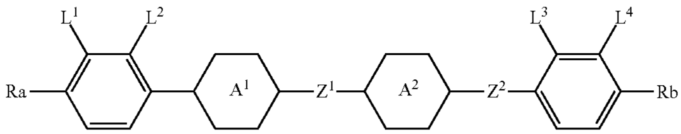

OCO = 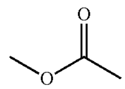

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5597 | $C_2H_5O$ | F | F | 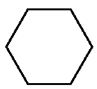 | — | 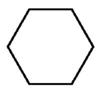 | OCO | F | F | $OCH_2CH{=}CHCH_3$ | |
| 5598 | $C_3H_7O$ | F | F | 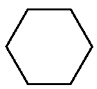 | — | 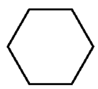 | OCO | F | F | $OCH_2CH{=}CHCH_3$ | |
| 5599 | $CH_2{=}CHCH_2O$ | F | F | 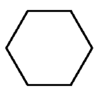 | — | 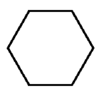 | OCO | F | F | $OCH{=}CH_2$ | |
| 5600 | $CH_2{=}CHC_2H_5O$ | F | F | 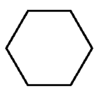 | — | 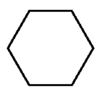 | OCO | F | F | $OCH_2CH{=}CH_2$ | |
| 5601 | $C_3H_7OCH_2$ | F | F | 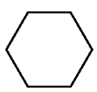 | — | 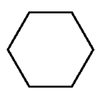 | OCO | F | F | $OC_3H_7$ | |
| 5602 | $C_5H_{11}O$ | F | F | 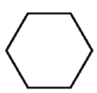 | — | 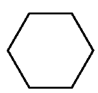 | OCO | F | F | $OC_2H_5CH{=}CH_2$ | |
| 5603 | $C_3H_7O$ | F | F | 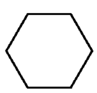 | — | 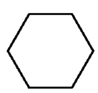 | OCO | F | F | H | |
| 5604 | $C_5H_{11}O$ | F | F | 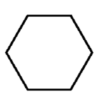 | — | 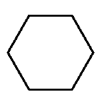 | OCO | F | F | $OC_9H_{19}$ | |
| 5605 | $C_3H_7O$ | F | F | 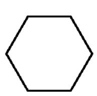 | — | 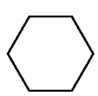 | OCO | F | F | $C_2H_5$ | |
| 5606 | $C_5H_{11}O$ | F | F | 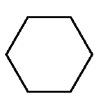 | — | 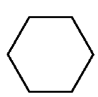 | OCO | F | F | $C_3H_7$ | |
| 5607 | H | F | F | 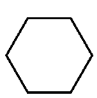 | — | 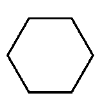 | OCO | F | F | $OC_4H_9$ | |
| 5608 | $C_7H_{15}O$ | F | F | 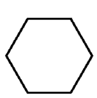 | — | 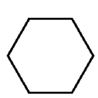 | OCO | F | F | $OC_4H_9$ | |

TABLE 372-continued
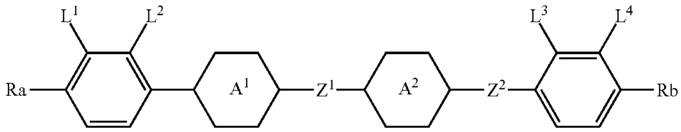
OCO = 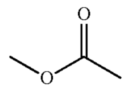
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5609 | $C_2H_5O$ | F | F | 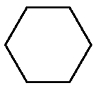 | — | 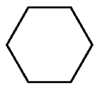 | OCO | F | F | $OC_6H_{13}$ | |
| 5610 | $CH_3O$ | F | F | 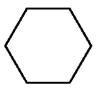 | — | 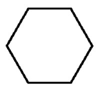 | OCO | F | F | $C_2H_5$ | |
TABLE 373
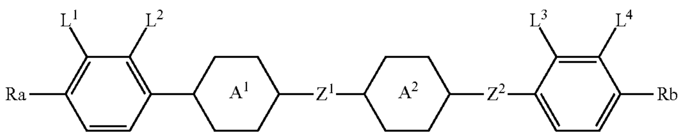
OCO = 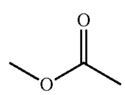
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5611 | $CH_3O$ | H | F | 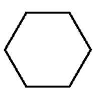 | — | 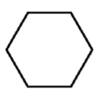 | OCO | F | F | $OCH_3$ | |
| 5612 | $CH_3O$ | H | F | 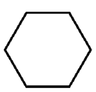 | — | 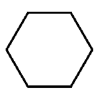 | OCO | F | F | $OC_2H_5$ | |
| 5613 | $CH_3O$ | H | F | 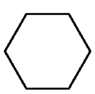 | — | 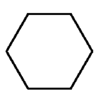 | OCO | F | F | $OC_3H_7$ | |
| 5614 | $CH_3O$ | H | F | 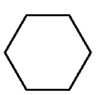 | — | 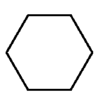 | OCO | F | F | $OC_4H_9$ | |
| 5615 | $CH_3O$ | H | F | 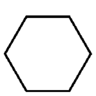 | — | 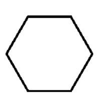 | OCO | F | F | $OC_5H_{11}$ | |
| 5616 | $C_2H_5O$ | H | F | 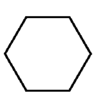 | — | 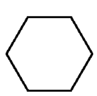 | OCO | F | F | $OCH_3$ | |
| 5617 | $C_2H_5O$ | H | F | 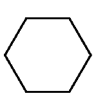 | — | 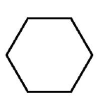 | OCO | F | F | $OC_2H_5$ | |

TABLE 373-continued

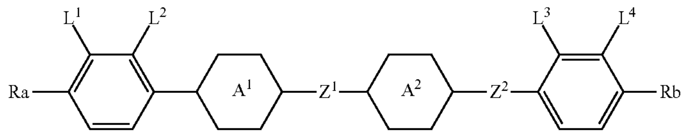

OCO = 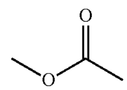

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5618 | $C_2H_5O$ | H | F | 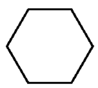 | — | 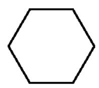 | OCO | F | F | $OC_3H_7$ | |
| 5619 | $C_2H_5O$ | H | F | 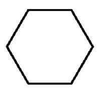 | — | 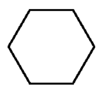 | OCO | F | F | $OC_4H_9$ | |
| 5620 | $C_2H_5O$ | H | F | 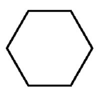 | — | 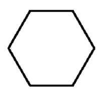 | OCO | F | F | $OC_5H_{11}$ | |
| 5621 | $C_3H_7O$ | H | F | 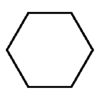 | — | 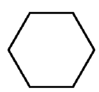 | OCO | F | F | $OCH_3$ | |
| 5622 | $C_3H_7O$ | H | F | 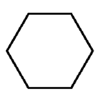 | — | 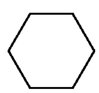 | OCO | F | F | $OC_2H_5$ | |
| 5623 | $C_3H_7O$ | H | F | 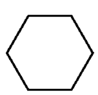 | — | 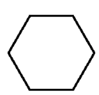 | OCO | F | F | $OC_3H_7$ | |
| 5624 | $C_3H_7O$ | H | F | 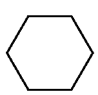 | — | 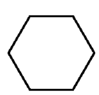 | OCO | F | F | $OC_4H_9$ | |
| 5625 | $C_3H_7O$ | H | F | 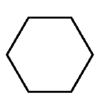 | — | 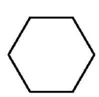 | OCO | F | F | $OC_5H_{11}$ | |

TABLE 374

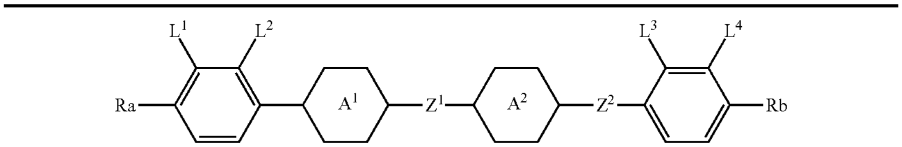

OCO = 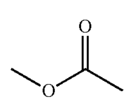

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5626 | $C_4H_9O$ | H | F | 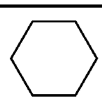 | — | 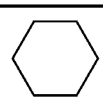 | OCO | F | F | $OCH_3$ | |

TABLE 374-continued
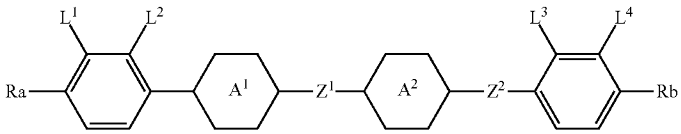
OCO = 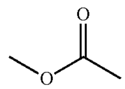
| No. | Ra | L1 | L2 | A1 | Z1 | A2 | Z2 | L3 | L4 | Rb | Physical property values |
|---|---|---|---|---|---|---|---|---|---|---|---|
| 5627 | $C_4H_9O$ | H | F | 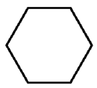 | — | 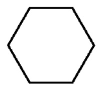 | OCO | F | F | $OC_2H_5$ | |
| 5628 | $C_4H_9O$ | H | F | 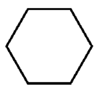 | — | 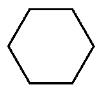 | OCO | F | F | $OC_3H_7$ | |
| 5629 | $C_4H_9O$ | H | F | 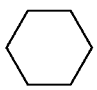 | — | 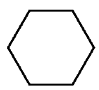 | OCO | F | F | $OC_4H_9$ | |
| 5630 | $C_4H_9O$ | H | F | 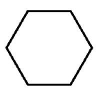 | — | 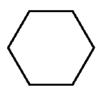 | OCO | F | F | $OC_5H_{11}$ | |
| 5631 | $C_5H_{11}O$ | H | F | 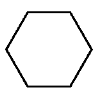 | — | 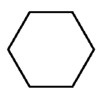 | OCO | F | F | $OCH_3$ | |
| 5632 | $C_5H_{11}O$ | H | F | 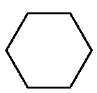 | — | 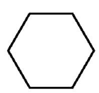 | OCO | F | F | $OC_2H_5$ | |
| 5633 | $C_5H_{11}O$ | H | F | 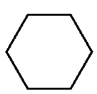 | — | 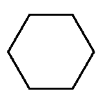 | OCO | F | F | $OC_3H_7$ | |
| 5634 | $C_5H_{11}O$ | H | F | 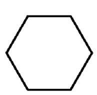 | — | 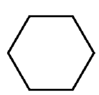 | OCO | F | F | $OC_4H_9$ | |
| 5635 | $C_5H_{11}O$ | H | F | 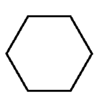 | — | 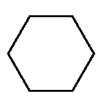 | OCO | F | F | $OC_5H_{11}$ | |
| 5636 | $C_2H_5$ | H | F | 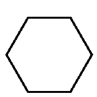 | — | 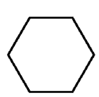 | OCO | F | F | $C_4H_9$ | |
| 5637 | $C_5H_{11}$ | H | F | 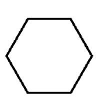 | — | 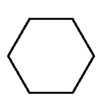 | OCO | F | F | $C_2H_5$ | |
| 5638 | $C_2H_5$ | H | F | 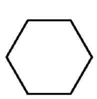 | — | 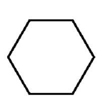 | OCO | F | F | $OC_4H_9$ | |

TABLE 374-continued

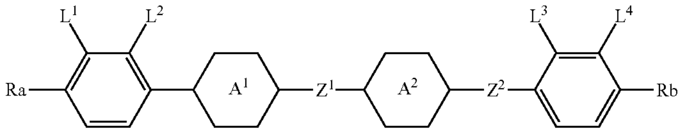

OCO = 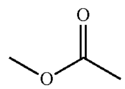

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5639 | $CH_2{=}CH$ | H | F | 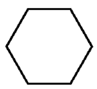 | — | 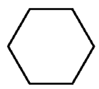 | OCO | F | F | $OC_3H_7$ | |
| 5640 | $CH_2{=}CH$ | H | F | 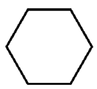 | — | 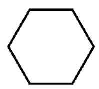 | OCO | F | F | $OC_5H_{11}$ | |

TABLE 375

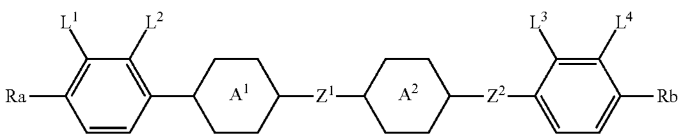

OCO = 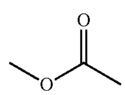

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5641 | $CH_3O$ | F | H | 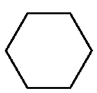 | — | 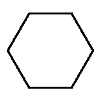 | OCO | F | F | $OCH_3$ | |
| 5642 | $CH_3O$ | F | H | 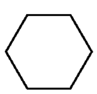 | — | 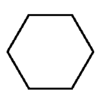 | OCO | F | F | $OC_2H_5$ | |
| 5643 | $CH_3O$ | F | H | 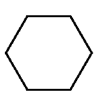 | — | 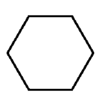 | OCO | F | F | $OC_3H_7$ | |
| 5644 | $CH_3O$ | F | H | 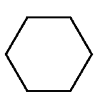 | — | 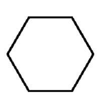 | OCO | F | F | $OC_4H_9$ | |
| 5645 | $CH_3O$ | F | H | 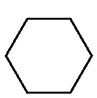 | — | 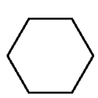 | OCO | F | F | $OC_5H_{11}$ | |
| 5646 | $C_2H_5O$ | F | H | 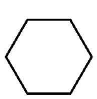 | — | 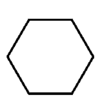 | OCO | F | F | $OCH_3$ | |
| 5647 | $C_2H_5O$ | F | H | 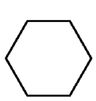 | — | 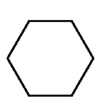 | OCO | F | F | $OC_2H_5$ | |

TABLE 375-continued

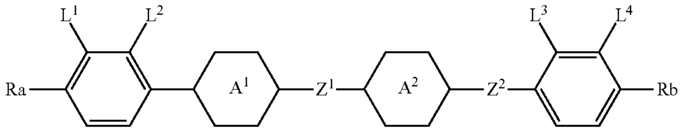

OCO = 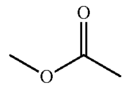

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5648 | $C_2H_5O$ | F | H | 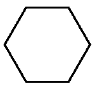 | — | 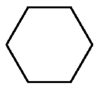 | OCO | F | F | $OC_3H_7$ | |
| 5649 | $C_2H_5O$ | F | H | 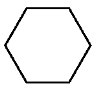 | — | 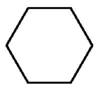 | OCO | F | F | $OC_4H_9$ | |
| 5650 | $C_2H_5O$ | F | H | 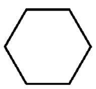 | — | 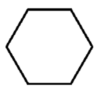 | OCO | F | F | $OC_5H_{11}$ | |
| 5651 | $C_3H_7O$ | F | H | 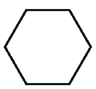 | — | 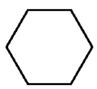 | OCO | F | F | $OCH_3$ | |
| 5652 | $C_3H_7O$ | F | H | 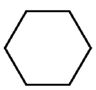 | — | 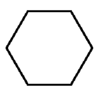 | OCO | F | F | $OC_2H_5$ | |
| 5653 | $C_3H_7O$ | F | H | 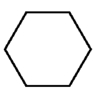 | — | 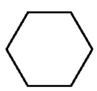 | OCO | F | F | $OC_3H_7$ | |
| 5654 | $C_3H_7O$ | F | H | 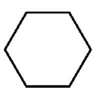 | — | 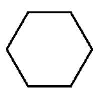 | OCO | F | F | $OC_4H_9$ | |
| 5655 | $C_3H_7O$ | F | H | 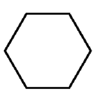 | — | 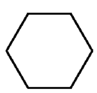 | OCO | F | F | $OC_5H_{11}$ | |

TABLE 376

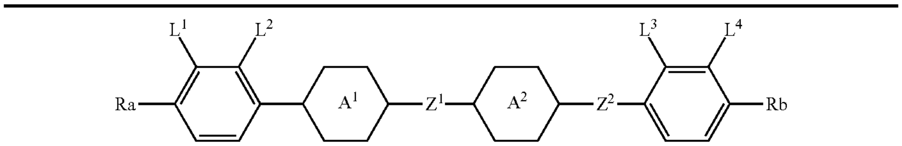

OCO = 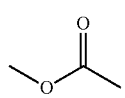

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5656 | $C_4H_9O$ | F | H | 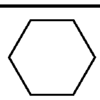 | — | 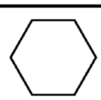 | OCO | F | F | $OCH_3$ | |
| 5657 | $C_4H_9O$ | F | H | 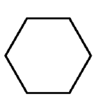 | — | 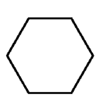 | OCO | F | F | $OC_2H_5$ | |

TABLE 376-continued
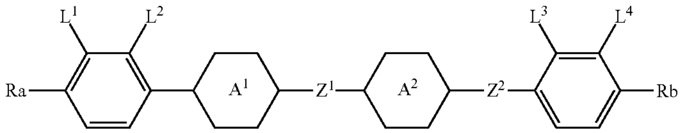
OCO = 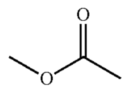
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5658 | $C_4H_9O$ | F | H | 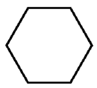 | — | 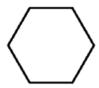 | OCO | F | F | $OC_3H_7$ | |
| 5659 | $C_4H_9O$ | F | H | 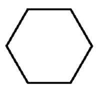 | — | 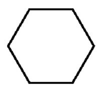 | OCO | F | F | $OC_4H_9$ | |
| 5660 | $C_4H_9O$ | F | H | 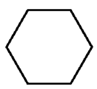 | — | 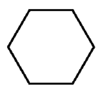 | OCO | F | F | $OC_5H_{11}$ | |
| 5661 | $C_5H_{11}O$ | F | H | 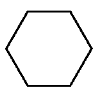 | — | 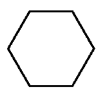 | OCO | F | F | $OCH_3$ | |
| 5662 | $C_5H_{11}O$ | F | H | 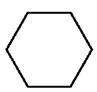 | — | 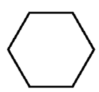 | OCO | F | F | $OC_2H_5$ | |
| 5663 | $C_5H_{11}O$ | F | H | 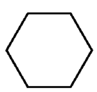 | — | 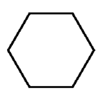 | OCO | F | F | $OC_3H_7$ | |
| 5664 | $C_5H_{11}O$ | F | H | 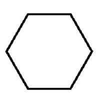 | — | 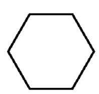 | OCO | F | F | $OC_4H_9$ | |
| 5665 | $C_5H_{11}O$ | F | H | 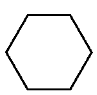 | — | 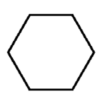 | OCO | F | F | $OC_5H_{11}$ | |
| 5666 | $C_2H_5$ | F | H | 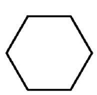 | — | 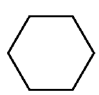 | OCO | F | F | $C_4H_9$ | |
| 5667 | $C_5H_{11}$ | F | H | 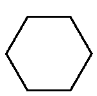 | — | 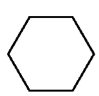 | OCO | F | F | $C_2H_5$ | |
| 5668 | $C_2H_5$ | F | H | 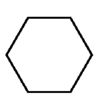 | — | 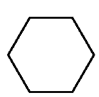 | OCO | F | F | $OC_4H_9$ | |
| 5669 | $CH_2{=}CH$ | F | H | 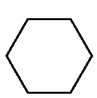 | — | 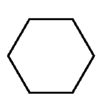 | OCO | F | F | $OC_3H_7$ | |
| 5670 | $CH_2{=}CH$ | F | H | 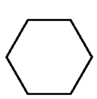 | — | 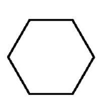 | OCO | F | F | $OC_5H_{11}$ | |

TABLE 377
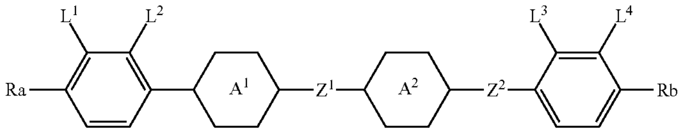
OCO = 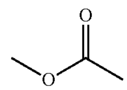
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5671 | $CH_3O$ | F | F | 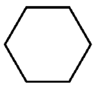 | — | 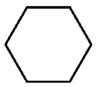 | OCO | H | F | $OCH_3$ | |
| 5672 | $CH_3O$ | F | F | 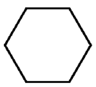 | — | 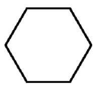 | OCO | H | F | $OC_2H_5$ | |
| 5673 | $CH_3O$ | F | F | 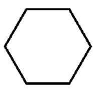 | — | 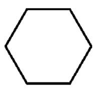 | OCO | H | F | $OC_3H_7$ | |
| 5674 | $CH_3O$ | F | F | 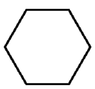 | — | 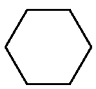 | OCO | H | F | $OC_4H_9$ | |
| 5675 | $CH_3O$ | F | F | 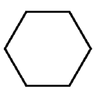 | — | 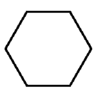 | OCO | H | F | $OC_5H_{11}$ | |
| 5676 | $C_2H_5O$ | F | F | 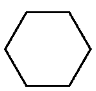 | — | 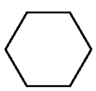 | OCO | H | F | $OCH_3$ | |
| 5677 | $C_2H_5O$ | F | F | 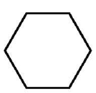 | — | 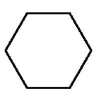 | OCO | H | F | $OC_2H_5$ | |
| 5678 | $C_2H_5O$ | F | F | 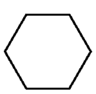 | — | 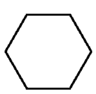 | OCO | H | F | $OC_3H_7$ | |
| 5679 | $C_2H_5O$ | F | F | 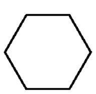 | — | 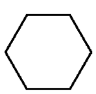 | OCO | H | F | $OC_4H_9$ | |
| 5680 | $C_2H_5O$ | F | F | 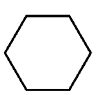 | — | 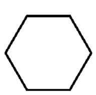 | OCO | H | F | $OC_5H_{11}$ | |
| 5681 | $C_3H_7O$ | F | F | 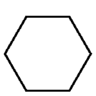 | — | 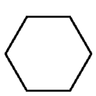 | OCO | H | F | $OCH_3$ | |
| 5682 | $C_3H_7O$ | F | F | 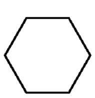 | — | 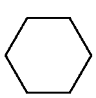 | OCO | H | F | $OC_2H_5$ | |
| 5683 | $C_3H_7O$ | F | F | 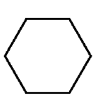 | — | 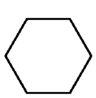 | OCO | H | F | $OC_3H_7$ | |

TABLE 377-continued

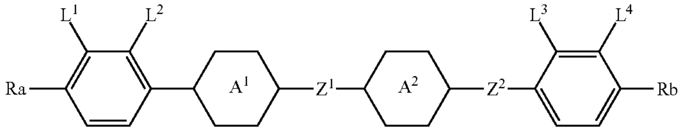

OCO = 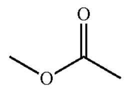

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5684 | $C_3H_7O$ | F | F | 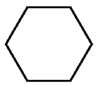 | — | 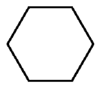 | OCO | H | F | $OC_4H_9$ | |
| 5685 | $C_3H_7O$ | F | F | 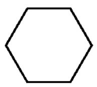 | — | 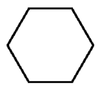 | OCO | H | F | $OC_5H_{11}$ | |

TABLE 378

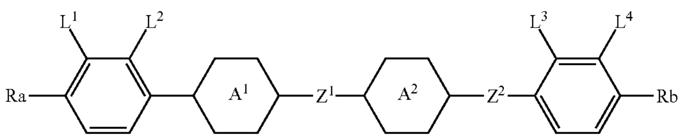

OCO = 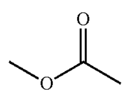

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5686 | $C_4H_9O$ | F | F | 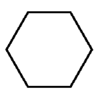 | — | 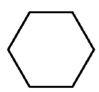 | OCO | H | F | $OCH_3$ | |
| 5687 | $C_4H_9O$ | F | F | 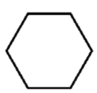 | — | 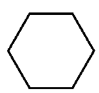 | OCO | H | F | $OC_2H_5$ | |
| 5688 | $C_4H_9O$ | F | F | 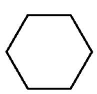 | — | 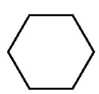 | OCO | H | F | $OC_3H_7$ | |
| 5689 | $C_4H_9O$ | F | F | 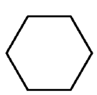 | — | 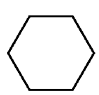 | OCO | H | F | $OC_4H_9$ | |
| 5690 | $C_4H_9O$ | F | F | 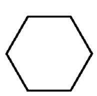 | — | 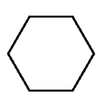 | OCO | H | F | $OC_5H_{11}$ | |
| 5691 | $C_5H_{11}O$ | F | F | 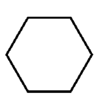 | — | 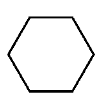 | OCO | H | F | $OCH_3$ | |
| 5692 | $C_5H_{11}O$ | F | F | 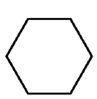 | — | 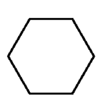 | OCO | H | F | $OC_2H_5$ | |
| 5693 | $C_5H_{11}O$ | F | F | 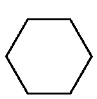 | — | 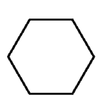 | OCO | H | F | $OC_3H_7$ | |

TABLE 378-continued
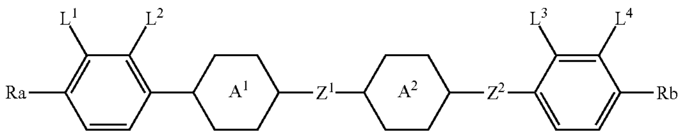
OCO = 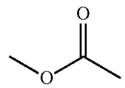
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5694 | $C_5H_{11}O$ | F | F | 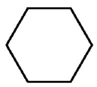 | — | 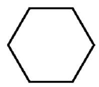 | OCO | H | F | $OC_4H_9$ | |
| 5695 | $C_5H_{11}O$ | F | F | 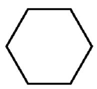 | — | 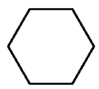 | OCO | H | F | $OC_5H_{11}$ | |
| 5696 | $C_2H_5$ | F | F | 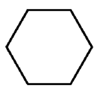 | — | 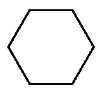 | OCO | H | F | $C_4H_9$ | |
| 5697 | $C_5H_{11}$ | F | F | 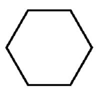 | — | 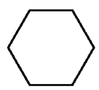 | OCO | H | F | $C_2H_5$ | |
| 5698 | $C_2H_5$ | F | F | 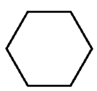 | — | 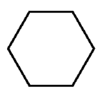 | OCO | H | F | $OC_4H_9$ | |
| 5699 | $CH_2{=}CH$ | F | F | 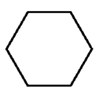 | — | 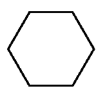 | OCO | H | F | $OC_3H_7$ | |
| 5700 | $CH_2{=}CH$ | F | F | 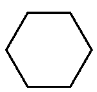 | — | 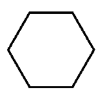 | OCO | H | F | $OC_5H_{11}$ | |
TABLE 379
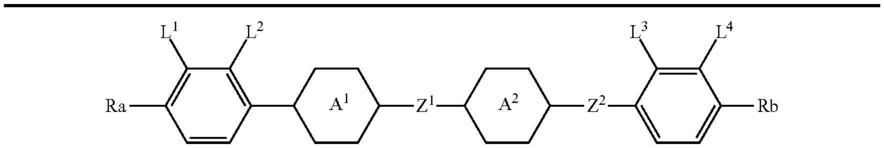
OCO = 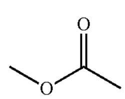
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5701 | $CH_3O$ | F | F | 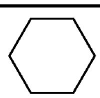 | — | 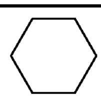 | OCO | F | H | $OCH_3$ | |
| 5702 | $CH_3O$ | F | F | 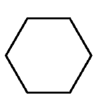 | — | 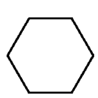 | OCO | F | H | $OC_2H_5$ | |

TABLE 379-continued
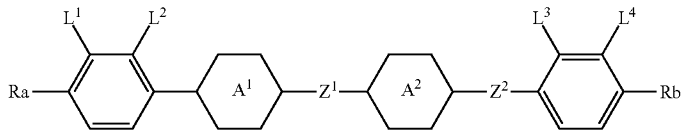
OCO = 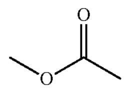
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5703 | $CH_3O$ | F | F | 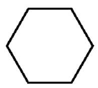 | — | 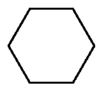 | OCO | F | H | $OC_3H_7$ | |
| 5704 | $CH_3O$ | F | F | 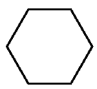 | — | 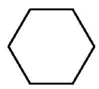 | OCO | F | H | $OC_4H_9$ | |
| 5705 | $CH_3O$ | F | F | 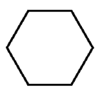 | — | 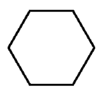 | OCO | F | H | $OC_5H_{11}$ | |
| 5706 | $C_2H_5O$ | F | F | 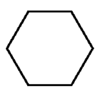 | — | 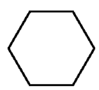 | OCO | F | H | $OCH_3$ | |
| 5707 | $C_2H_5O$ | F | F | 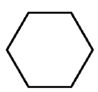 | — | 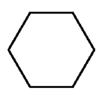 | OCO | F | H | $OC_2H_5$ | |
| 5708 | $C_2H_5O$ | F | F | 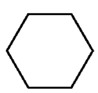 | — | 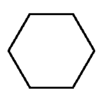 | OCO | F | H | $OC_3H_7$ | |
| 5709 | $C_2H_5O$ | F | F | 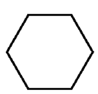 | — | 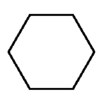 | OCO | F | H | $OC_4H_9$ | |
| 5710 | $C_2H_5O$ | F | F | 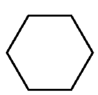 | — | 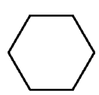 | OCO | F | H | $OC_5H_{11}$ | |
| 5711 | $C_3H_7O$ | F | F | 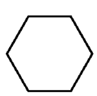 | — | 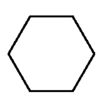 | OCO | F | H | $OCH_3$ | |
| 5712 | $C_3H_7O$ | F | F | 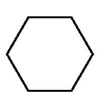 | — | 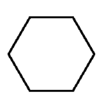 | OCO | F | H | $OC_2H_5$ | |
| 5713 | $C_3H_7O$ | F | F | 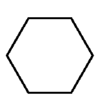 | — | 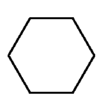 | OCO | F | H | $OC_3H_7$ | |
| 5714 | $C_3H_7O$ | F | F | 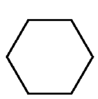 | — | 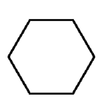 | OCO | F | H | $OC_4H_9$ | |
| 5715 | $C_3H_7O$ | F | F | 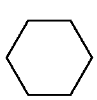 | — | 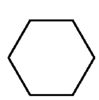 | OCO | F | H | $OC_5H_{11}$ | |

TABLE 380

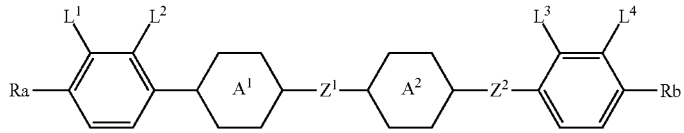

OCO = 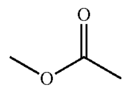

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5716 | $C_4H_9O$ | F | F | 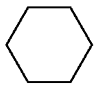 | — | 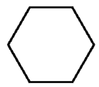 | OCO | F | H | $OCH_3$ | |
| 5717 | $C_4H_9O$ | F | F | 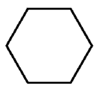 | — | 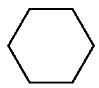 | OCO | F | H | $OC_2H_5$ | C 118.8 SA 133.1 N 294.0 I<br>TNI: 235.9° C., Δϵ: −8.11, Δn: 0.148 |
| 5718 | $C_4H_9O$ | F | F | 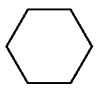 | — | 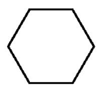 | OCO | F | H | $OC_3H_7$ | |
| 5719 | $C_4H_9O$ | F | F | 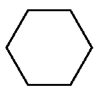 | — | 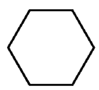 | OCO | F | H | $OC_4H_9$ | |
| 5720 | $C_4H_9O$ | F | F | 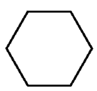 | — | 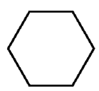 | OCO | F | H | $OC_5H_{11}$ | |
| 5721 | $C_5H_{11}O$ | F | F | 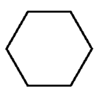 | — | 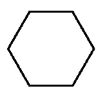 | OCO | F | H | $OCH_3$ | |
| 5722 | $C_5H_{11}O$ | F | F | 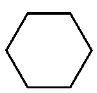 | — | 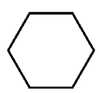 | OCO | F | H | $OC_2H_5$ | |
| 5723 | $C_5H_{11}O$ | F | F | 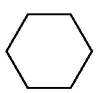 | — | 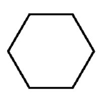 | OCO | F | H | $OC_3H_7$ | |
| 5724 | $C_5H_{11}O$ | F | F | 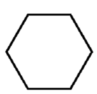 | — | 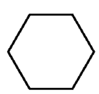 | OCO | F | H | $OC_4H_9$ | |
| 5725 | $C_5H_{11}O$ | F | F | 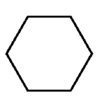 | — | 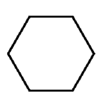 | OCO | F | H | $OC_5H_{11}$ | |
| 5726 | $C_2H_5$ | F | F | 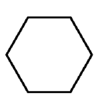 | — | 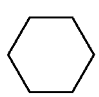 | OCO | F | H | $C_4H_9$ | |
| 5727 | $C_5H_{11}$ | F | F | 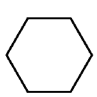 | — | 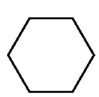 | OCO | F | H | $C_2H_5$ | |
| 5728 | $C_2H_5$ | F | F | 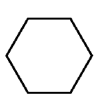 | — | 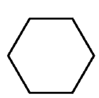 | OCO | F | H | $OC_4H_9$ | |

TABLE 380-continued

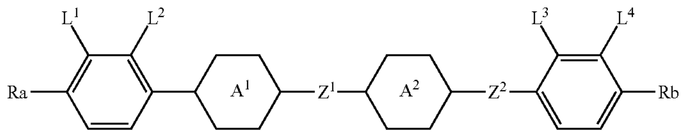

OCO = 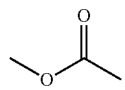

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5729 | $CH_2$═CH | F | F | 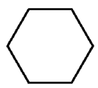 | — | 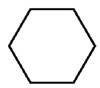 | OCO | F | H | $OC_3H_7$ | |
| 5730 | $CH_2$═CH | F | F | 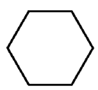 | — | 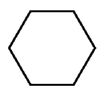 | OCO | F | H | $OC_5H_{11}$ | |

TABLE 381

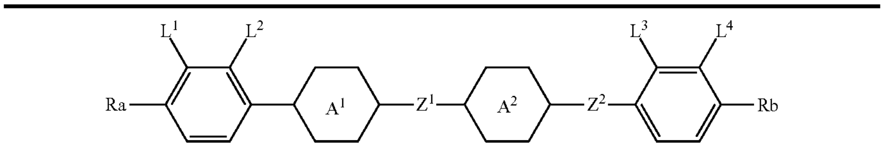

OCO = 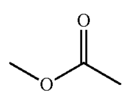

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5731 | $CH_3O$ | F | F | 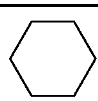 | — | 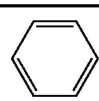 | OCO | F | F | $OCH_3$ | |
| 5732 | $CH_3O$ | F | F | 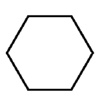 | — | 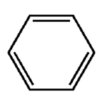 | OCO | F | F | $OC_2H_5$ | |
| 5733 | $CH_3O$ | F | F | 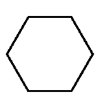 | — | 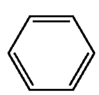 | OCO | F | F | $OC_3H_7$ | |
| 5734 | $CH_3O$ | F | F | 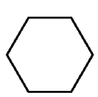 | — | 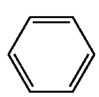 | OCO | F | F | $OC_4H_9$ | |
| 5735 | $CH_3O$ | F | F | 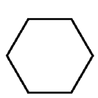 | — | 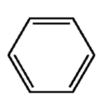 | OCO | F | F | $OC_5H_{11}$ | |
| 5736 | $C_2HO$ | F | F | 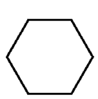 | — | 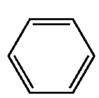 | OCO | F | F | $OCH_3$ | |
| 5737 | $C_2H_5O$ | F | F | 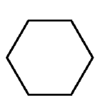 | — | 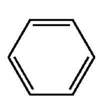 | OCO | F | F | $OC_2H_5$ | |

TABLE 381-continued

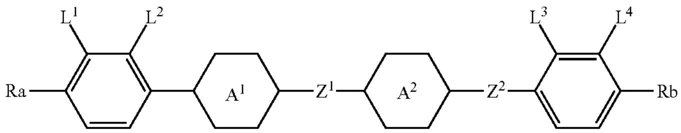

OCO = 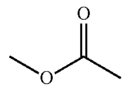

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5738 | $C_2H_5O$ | F | F | 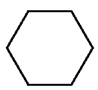 | — | 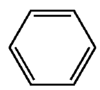 | OCO | F | F | $OC_3H_7$ | |
| 5739 | $C_2H_5O$ | F | F | 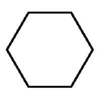 | — | 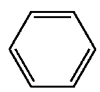 | OCO | F | F | $OC_4H_9$ | |
| 5740 | $C_2H_5O$ | F | F | 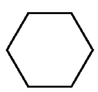 | — | 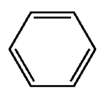 | OCO | F | F | $OC_5H_{11}$ | |
| 5741 | $C_3H_7O$ | F | F | 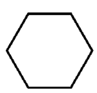 | — | 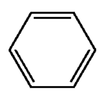 | OCO | F | F | $OCH_3$ | |
| 5742 | $C_3H_7O$ | F | F | 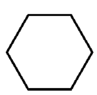 | — | 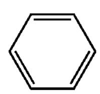 | OCO | F | F | $OC_2H_5$ | |
| 5743 | $C_3H_7O$ | F | F | 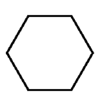 | — | 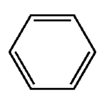 | OCO | F | F | $OC_3H_7$ | |
| 5744 | $C_3H_7O$ | F | F | 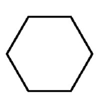 | — | 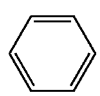 | OCO | F | F | $OC_4H_9$ | |
| 5745 | $C_3H_7O$ | F | F | 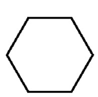 | — | 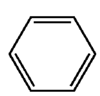 | OCO | F | F | $OC_5H_{11}$ | |

TABLE 382

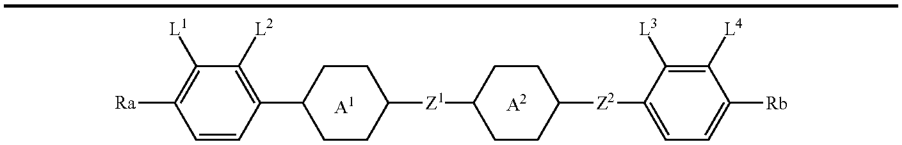

OCO = 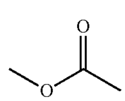

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5746 | $C_4H_9O$ | F | F | 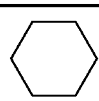 | — | 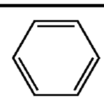 | OCO | F | F | $OCH_3$ | |

TABLE 382-continued
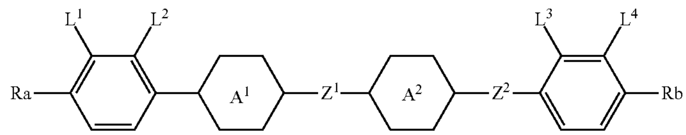
OCO = 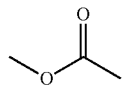
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5747 | $C_4H_9O$ | F | F | 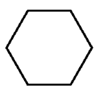 | — |  | OCO | F | F | $OC_2H_5$ | |
| 5748 | $C_4H_9O$ | F | F | 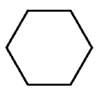 | — | 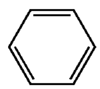 | OCO | F | F | $OC_3H_7$ | |
| 5749 | $C_4H_9O$ | F | F | 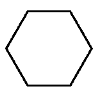 | — | 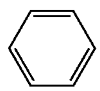 | OCO | F | F | $OC_4H_9$ | |
| 5750 | $C_4H_9O$ | F | F | 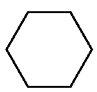 | — | 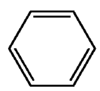 | OCO | F | F | $OC_5H_{11}$ | |
| 5751 | $C_5H_{11}O$ | F | F | 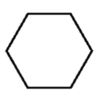 | — | 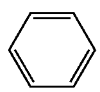 | OCO | F | F | $OCH_3$ | |
| 5752 | $C_5H_{11}O$ | F | F | 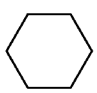 | — | 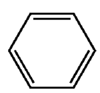 | OCO | F | F | $OC_2H_5$ | |
| 5753 | $C_5H_{11}O$ | F | F | 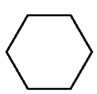 | — | 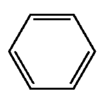 | OCO | F | F | $OC_3H_7$ | |
| 5754 | $C_5H_{11}O$ | F | F | 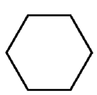 | — | 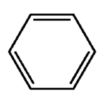 | OCO | F | F | $OC_4H_9$ | |
| 5755 | $C_5H_{11}O$ | F | F | 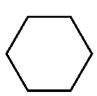 | — | 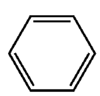 | OCO | F | F | $OC_5H_{11}$ | |
| 5756 | $C_2H_5$ | F | F | 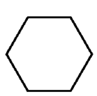 | — | 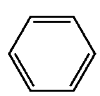 | OCO | F | F | $C_4H_9$ | |
| 5757 | $C_5H_{11}$ | F | F | 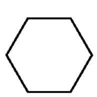 | — | 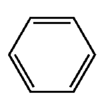 | OCO | F | F | $C_2H_5$ | |
| 5758 | $C_2H_5$ | F | F | 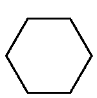 | — | 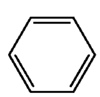 | OCO | F | F | $OC_4H_9$ | |

TABLE 382-continued

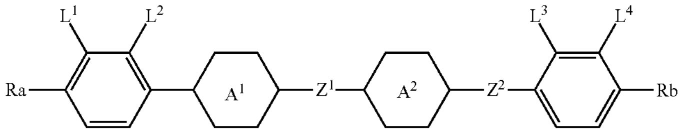

OCO = 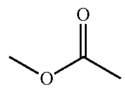

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5759 | $CH_2{=}CH$ | F | F | 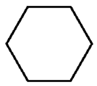 | — | 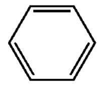 | OCO | F | F | $OC_3H_7$ | |
| 5760 | $CH_2{=}CH$ | F | F | 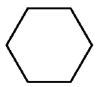 | — | 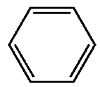 | OCO | F | F | $OC_5H_{11}$ | |

TABLE 383

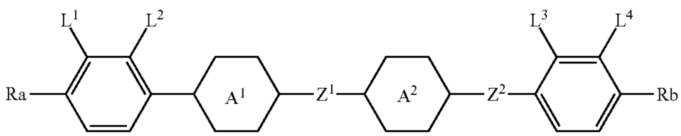

OCO = 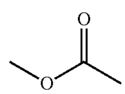

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5761 | $CH_2{=}CHO$ | F | F | 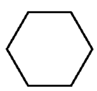 | — | 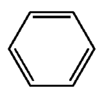 | OCO | F | F | $OC_3H_7$ | |
| 5762 | $CH_2{=}CHCH_2O$ | F | F | 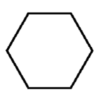 | — | 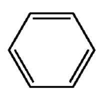 | OCO | F | F | $OC_5H_{11}$ | |
| 5763 | $CH_2{=}CHCH_2O$ | F | F | 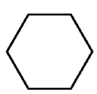 | — | 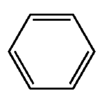 | OCO | F | F | $OC_3H_7$ | |
| 5764 | $CH_2{=}CHC_2H_5O$ | F | F | 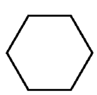 | — | 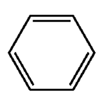 | OCO | F | F | $OC_5H_{11}$ | |
| 5765 | $CH_2{=}CHC_2H_5O$ | F | F | 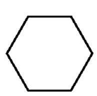 | — | 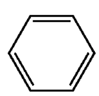 | OCO | F | F | $OC_2H_5$ | |
| 5766 | $CH_2{=}CHC_2H_5O$ | F | F | 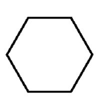 | — | 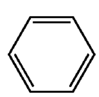 | OCO | F | F | $OC_3H_7$ | |
| 5767 | $CH_3CH{=}CHCH_2O$ | F | F | 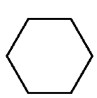 | — | 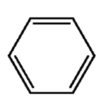 | OCO | F | F | $OCH_3$ | |
| 5768 | $CH_3CH{=}CHCH_2O$ | F | F | 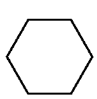 | — | 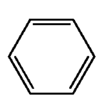 | OCO | F | F | $OC_2H_5$ | |

TABLE 383-continued

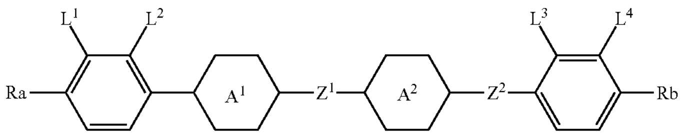

OCO = 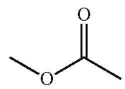

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5769 | $C_3H_7O$ | F | F | 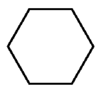 | — | 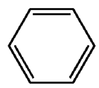 | OCO | F | F | $OCH{=}CH_2$ | |
| 5770 | $C_3H_7O$ | F | F | 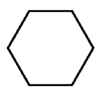 | — | 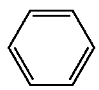 | OCO | F | F | $OCH_2CH{=}CH_2$ | |
| 5771 | $C_4H_9O$ | F | F | 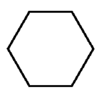 | — | 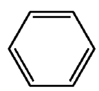 | OCO | F | F | $OCH_2CH{=}CH_2$ | |
| 5772 | $C_5H_{11}O$ | F | F | 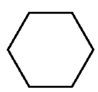 | — | 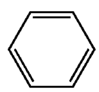 | OCO | F | F | $OCH_2CH{=}CH_2$ | |
| 5773 | $CH_3O$ | F | F | 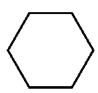 | — | 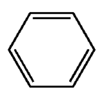 | OCO | F | F | $OC_2H_5CH{=}CH_2$ | |
| 5774 | $C_2H_5O$ | F | F | 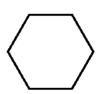 | — | 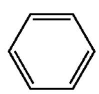 | OCO | F | F | $OC_2H_5CH{=}CH_2$ | |
| 5775 | $C_3H_7O$ | F | F | 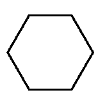 | — | 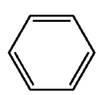 | OCO | F | F | $OC_2H_5CH{=}CH_2$ | |

TABLE 384

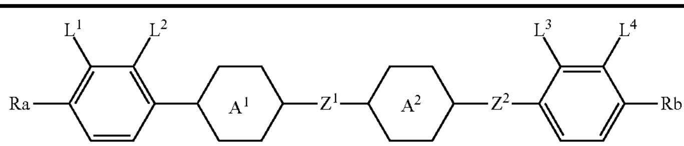

OCO = 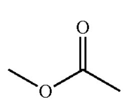

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5776 | $CH_3O$ | F | F | 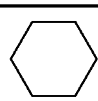 | — | 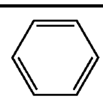 | OCO | F | F | $OCH_2CH{=}CHCH_3$ | |
| 5777 | $C_2H_5O$ | F | F | 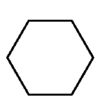 | — | 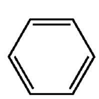 | OCO | F | F | $OCH_2CH{=}CHCH_3$ | |

TABLE 384-continued

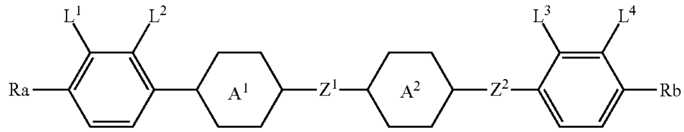

OCO = 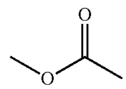

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5778 | $C_3H_7O$ | F | F | 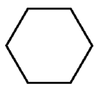 | — | 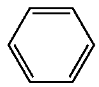 | OCO | F | F | $OCH_2CH{=}CHCH_3$ | |
| 5779 | $CH_2{=}CHCH_2O$ | F | F | 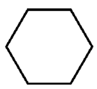 | — | 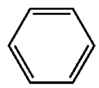 | OCO | F | F | $OCH{=}CH_2$ | |
| 5780 | $CH_2{=}CHC_2H_5O$ | F | F | 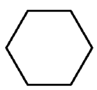 | — | 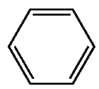 | OCO | F | F | $OCH_2CH{=}CH_2$ | |
| 5781 | $C_3H_7OCH_2$ | F | F | 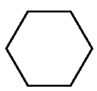 | — | 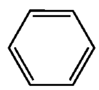 | OCO | F | F | $OC_3H_7$ | |
| 5782 | $C_5H_{11}O$ | F | F | 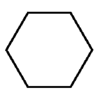 | — | 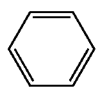 | OCO | F | F | $OC_2H_5CH{=}CH_2$ | |
| 5783 | $C_3H_7O$ | F | F | 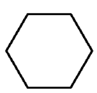 | — | 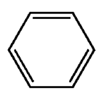 | OCO | F | F | H | |
| 5784 | $C_5H_{11}O$ | F | F | 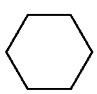 | — | 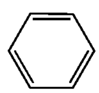 | OCO | F | F | $OC_9H_{19}$ | |
| 5785 | $C_3H_7O$ | F | F | 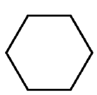 | — | 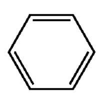 | OCO | F | F | $C_2H_5$ | |
| 5786 | $C_5H_{11}O$ | F | F | 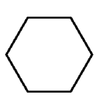 | — | 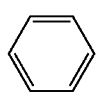 | OCO | F | F | $C_3H_7$ | |
| 5787 | H | F | F | 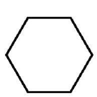 | — | 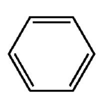 | OCO | F | F | $OC_4H_9$ | |
| 5788 | $C_7H_{15}O$ | F | F | 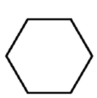 | — | 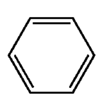 | OCO | F | F | $OC_4H_9$ | |
| 5789 | $C_2H_5O$ | F | F | 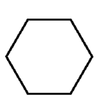 | — | 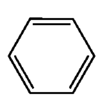 | OCO | F | F | $OC_6H_{13}$ | |
| 5790 | $CH_3O$ | F | F | 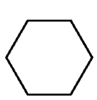 | — | 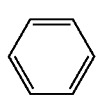 | OCO | F | F | $C_2H_5$ | |

TABLE 385
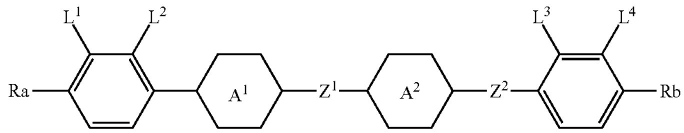
OCO = 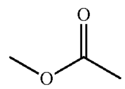
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5791 | $CH_3O$ | H | F | 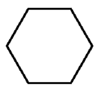 | — | 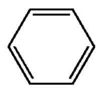 | OCO | F | F | $OCH_3$ | |
| 5792 | $CH_3O$ | H | F | 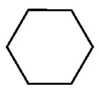 | — | 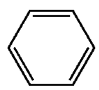 | OCO | F | F | $OC_2H_5$ | |
| 5793 | $CH_3O$ | H | F | 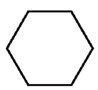 | — | 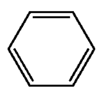 | OCO | F | F | $OC_3H_7$ | |
| 5794 | $CH_3O$ | H | F | 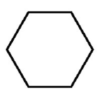 | — | 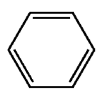 | OCO | F | F | $OC_4H_9$ | |
| 5795 | $CH_3O$ | H | F | 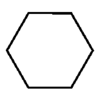 | — | 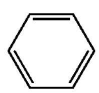 | OCO | F | F | $OC_5H_{11}$ | |
| 5796 | $C_2H_5O$ | H | F | 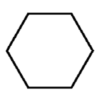 | — | 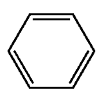 | OCO | F | F | $OCH_3$ | |
| 5797 | $C_2H_5O$ | H | F | 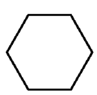 | — | 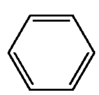 | OCO | F | F | $OC_2H_5$ | |
| 5798 | $C_2H_5O$ | H | F | 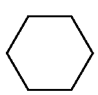 | — | 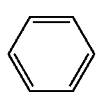 | OCO | F | F | $OC_3H_7$ | |
| 5799 | $C_2H_5O$ | H | F | 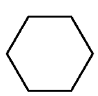 | — | 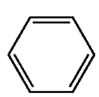 | OCO | F | F | $OC_4H_9$ | |
| 5800 | $C_2H_5O$ | H | F | 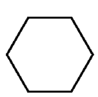 | — | 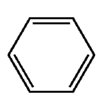 | OCO | F | F | $OC_5H_{11}$ | |
| 5801 | $C_3H_7O$ | H | F | 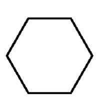 | — | 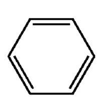 | OCO | F | F | $OCH_3$ | |
| 5802 | $C_3H_7O$ | H | F | 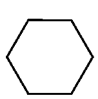 | — | 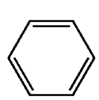 | OCO | F | F | $OC_2H_5$ | |
| 5803 | $C_3H_7O$ | H | F | 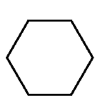 | — | 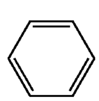 | OCO | F | F | $OC_3H_7$ | |

TABLE 385-continued

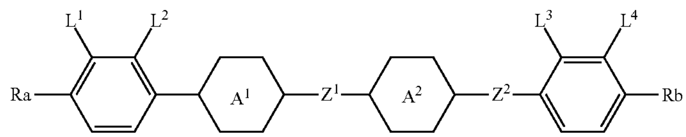

OCO = 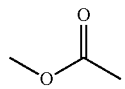

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5804 | $C_3H_7O$ | H | F | 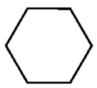 | — | 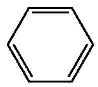 | OCO | F | F | $OC_4H_9$ | |
| 5805 | $C_3H_7O$ | H | F | 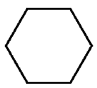 | — |  | OCO | F | F | $OC_5H_{11}$ | |

TABLE 386

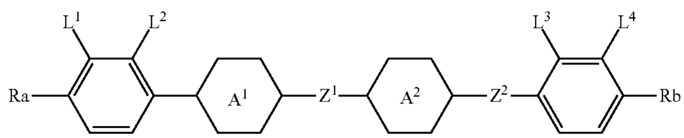

OCO = 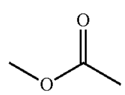

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5806 | $C_4H_9O$ | H | F | 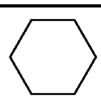 | — | 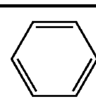 | OCO | F | F | $OCH_3$ | |
| 5807 | $C_4H_9O$ | H | F | 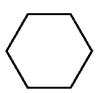 | — | 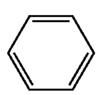 | OCO | F | F | $OC_2H_5$ | |
| 5808 | $C_4H_9O$ | H | F | 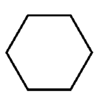 | — | 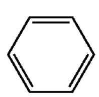 | OCO | F | F | $OC_3H_7$ | |
| 5809 | $C_4H_9O$ | H | F | 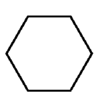 | — | 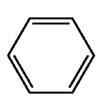 | OCO | F | F | $OC_4H_9$ | |
| 5810 | $C_4H_9O$ | H | F | 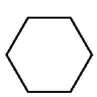 | — | 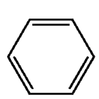 | OCO | F | F | $OC_5H_{11}$ | |
| 5811 | $C_5H_{11}O$ | H | F | 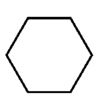 | — | 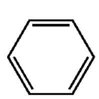 | OCO | F | F | $OCH_3$ | |
| 5812 | $C_5H_{11}O$ | H | F | 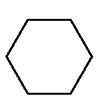 | — | 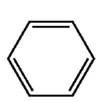 | OCO | F | F | $OC_2H_5$ | |

TABLE 386-continued

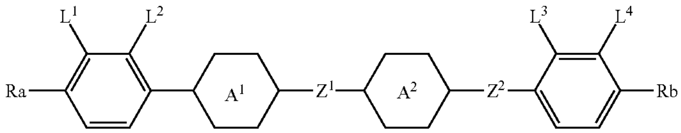

OCO = 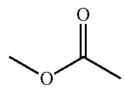

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5813 | $C_5H_{11}O$ | H | F | 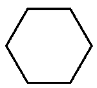 | — | 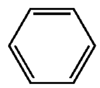 | OCO | F | F | $OC_3H_7$ | |
| 5814 | $C_5H_{11}O$ | H | F | 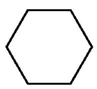 | — | 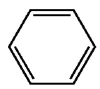 | OCO | F | F | $OC_4H_9$ | |
| 5815 | $C_5H_{11}O$ | H | F | 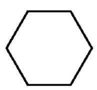 | — | 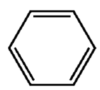 | OCO | F | F | $OC_5H_{11}$ | |
| 5816 | $C_2H_5$ | H | F | 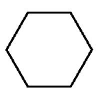 | — | 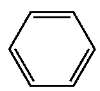 | OCO | F | F | $C_4H_9$ | |
| 5817 | $C_5H_{11}$ | H | F | 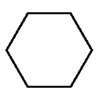 | — | 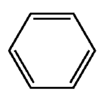 | OCO | F | F | $C_2H_5$ | |
| 5818 | $C_2H_5$ | H | F | 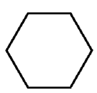 | — | 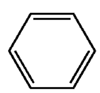 | OCO | F | F | $OC_4H_9$ | |
| 5819 | $CH_2{=}CH$ | H | F | 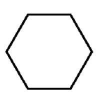 | — | 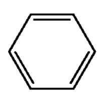 | OCO | F | F | $OC_3H_7$ | |
| 5820 | $CH_2{=}CH$ | H | F | 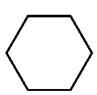 | — | 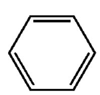 | OCO | F | F | $OC_5H_{11}$ | |

TABLE 387

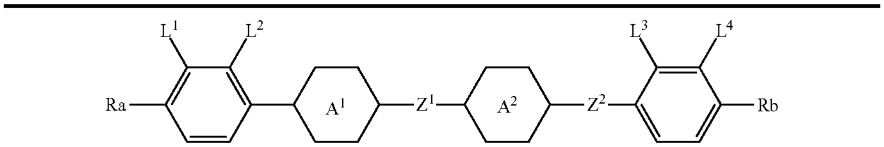

OCO = 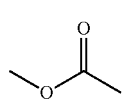

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5821 | $CH_3O$ | F | H | 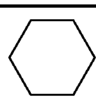 | — | 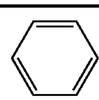 | OCO | F | F | $OCH_3$ | |
| 5822 | $CH_3O$ | F | H | 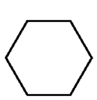 | — | 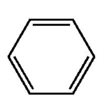 | OCO | F | F | $OC_2H_5$ | |

TABLE 387-continued
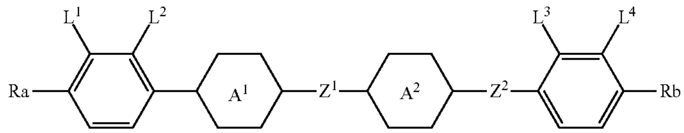
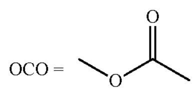
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5823 | $CH_3O$ | F | H | 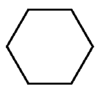 | — | 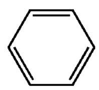 | OCO | F | F | $OC_3H_7$ | |
| 5824 | $CH_3O$ | F | H | 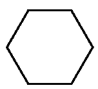 | — | 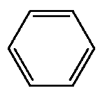 | OCO | F | F | $OC_4H_9$ | |
| 5825 | $CH_3O$ | F | H | 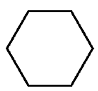 | — |  | OCO | F | F | $OC_5H_{11}$ | |
| 5826 | $C_2H_5O$ | F | H | 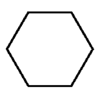 | — | 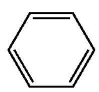 | OCO | F | F | $OCH_3$ | |
| 5827 | $C_2H_5O$ | F | H | 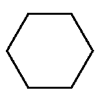 | — | 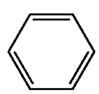 | OCO | F | F | $OC_2H_5$ | |
| 5828 | $C_2H_5O$ | F | H | 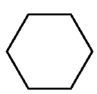 | — | 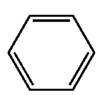 | OCO | F | F | $OC_3H_7$ | |
| 5829 | $C_2H_5O$ | F | H | 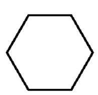 | — | 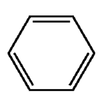 | OCO | F | F | $OC_4H_9$ | |
| 5830 | $C_2H_5O$ | F | H | 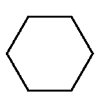 | — | 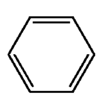 | OCO | F | F | $OC_5H_{11}$ | |
| 5831 | $C_3H_7O$ | F | H | 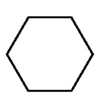 | — | 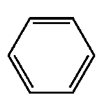 | OCO | F | F | $OCH_3$ | |
| 5832 | $C_3H_7O$ | F | H | 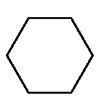 | — | 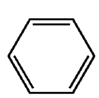 | OCO | F | F | $OC_2H_5$ | |
| 5833 | $C_3H_7O$ | F | H | 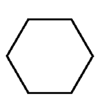 | — | 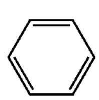 | OCO | F | F | $OC_3H_7$ | |
| 5834 | $C_3H_7O$ | F | H | 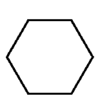 | — | 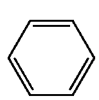 | OCO | F | F | $OC_4H_9$ | |
| 5835 | $C_3H_7O$ | F | H | 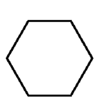 | — | 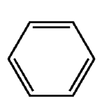 | OCO | F | F | $OC_5H_{11}$ | |

TABLE 388
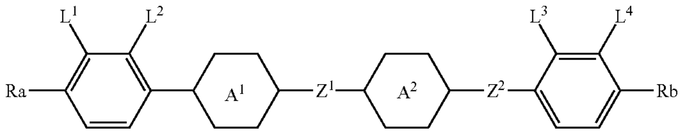
OCO = 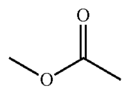
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5836 | $C_4H_9O$ | F | H | 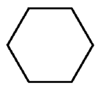 | — | 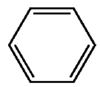 | OCO | F | F | $OCH_3$ | |
| 5837 | $C_4H_9O$ | F | H | 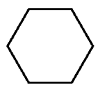 | — |  | OCO | F | F | $OC_2H_5$ | |
| 5838 | $C_4H_9O$ | F | H | 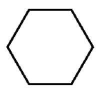 | — |  | OCO | F | F | $OC_3H_7$ | |
| 5839 | $C_4H_9O$ | F | H | 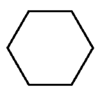 | — | 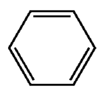 | OCO | F | F | $OC_4H_9$ | |
| 5840 | $C_4H_9O$ | F | H | 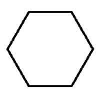 | — | 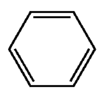 | OCO | F | F | $OC_5H_{11}$ | |
| 5841 | $C_5H_{11}O$ | F | H | 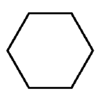 | — | 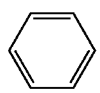 | OCO | F | F | $OCH_3$ | |
| 5842 | $C_5H_{11}O$ | F | H | 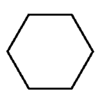 | — | 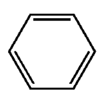 | OCO | F | F | $OC_2H_5$ | |
| 5843 | $C_5H_{11}O$ | F | H | 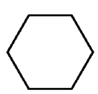 | — | 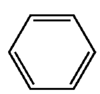 | OCO | F | F | $OC_3H_7$ | |
| 5844 | $C_5H_{11}O$ | F | H | 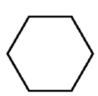 | — | 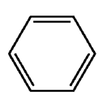 | OCO | F | F | $OC_4H_9$ | |
| 5845 | $C_5H_{11}O$ | F | H | 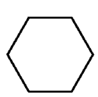 | — | 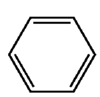 | OCO | F | F | $OC_5H_{11}$ | |
| 5846 | $C_2H_5$ | F | H | 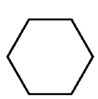 | — | 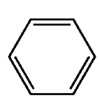 | OCO | F | F | $C_4H_9$ | |
| 5847 | $C_5H_{11}$ | F | H | 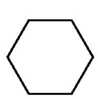 | — | 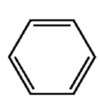 | OCO | F | F | $C_2H_5$ | |
| 5848 | $C_2H_5$ | F | H | 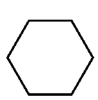 | — | 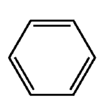 | OCO | F | F | $OC_4H_9$ | |

TABLE 388-continued

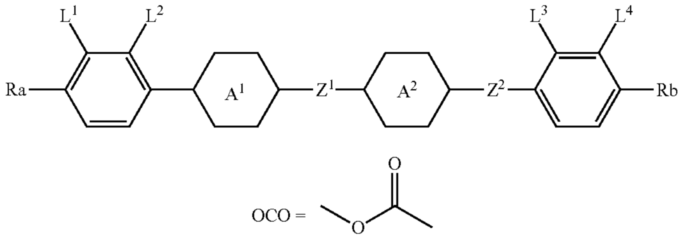

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5849 | $CH_2{=}CH$ | F | H | 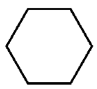 | — | 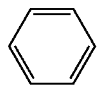 | OCO | F | F | $OC_3H_7$ | |
| 5850 | $CH_2{=}CH$ | F | H | 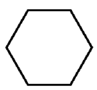 | — | 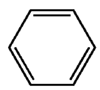 | OCO | F | F | $OC_5H_{11}$ | |

TABLE 389

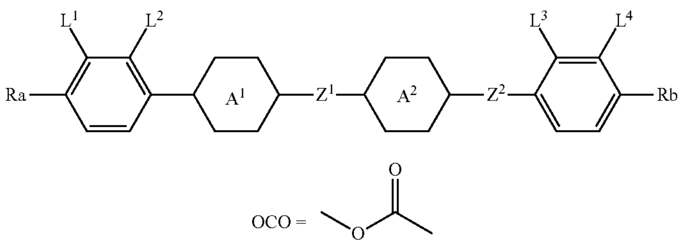

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5851 | $CH_3O$ | F | F | 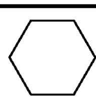 | — | 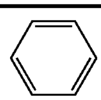 | OCO | H | F | $OCH_3$ | |
| 5852 | $CH_3O$ | F | F | 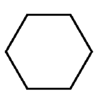 | — | 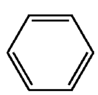 | OCO | H | F | $OC_2H_5$ | |
| 5853 | $CH_3O$ | F | F | 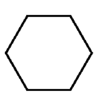 | — | 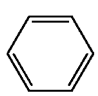 | OCO | H | F | $OC_3H_7$ | |
| 5854 | $CH_3O$ | F | F | 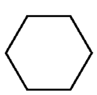 | — | 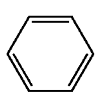 | OCO | H | F | $OC_4H_9$ | |
| 5855 | $CH_3O$ | F | F | 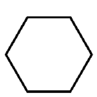 | — | 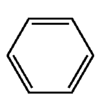 | OCO | H | F | $OC_5H_{11}$ | |
| 5856 | $C_2H_5O$ | F | F | 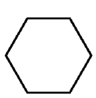 | — | 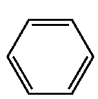 | OCO | H | F | $OCH_3$ | |
| 5857 | $C_2H_5O$ | F | F | 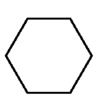 | — | 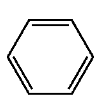 | OCO | H | F | $OC_2H_5$ | |
| 5858 | $C_2H_5O$ | F | F | 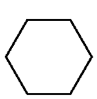 | — | 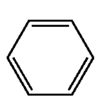 | OCO | H | F | $OC_3H_7$ | |

TABLE 389-continued

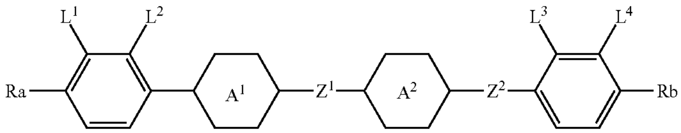

OCO = 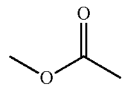

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5859 | $C_2H_5O$ | F | F | 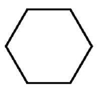 | — | 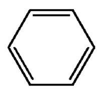 | OCO | H | F | $OC_4H_9$ | |
| 5860 | $C_2H_5O$ | F | F | 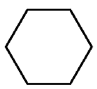 | — |  | OCO | H | F | $OC_5H_{11}$ | |
| 5861 | $C_3H_7O$ | F | F | 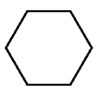 | — | 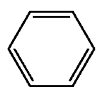 | OCO | H | F | $OCH_3$ | |
| 5862 | $C_3H_7O$ | F | F | 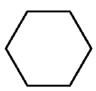 | — | 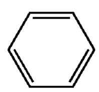 | OCO | H | F | $OC_2H_5$ | |
| 5863 | $C_3H_7O$ | F | F | 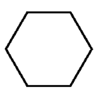 | — | 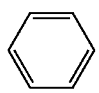 | OCO | H | F | $OC_3H_7$ | |
| 5864 | $C_3H_7O$ | F | F | 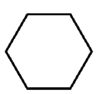 | — | 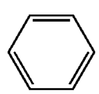 | OCO | H | F | $OC_4H_9$ | |
| 5865 | $C_3H_7O$ | F | F | 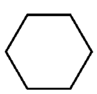 | — | 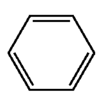 | OCO | H | F | $OC_5H_{11}$ | |

TABLE 390

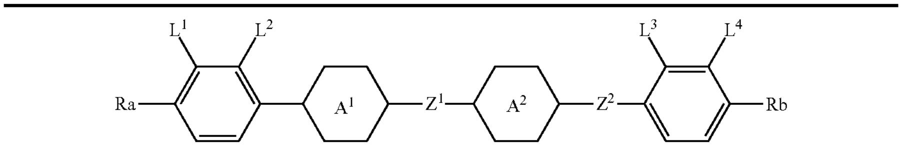

OCO = 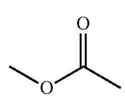

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5866 | $C_4H_9O$ | F | F | 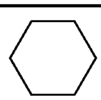 | — | 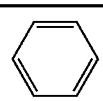 | OCO | H | F | $OCH_3$ | |
| 5867 | $C_4H_9O$ | F | F | 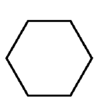 | — | 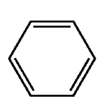 | OCO | H | F | $OC_2H_5$ | |

TABLE 390-continued

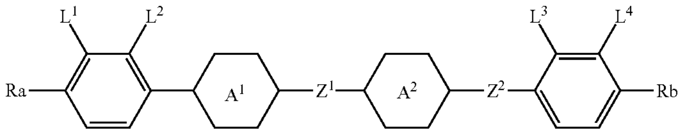

OCO = 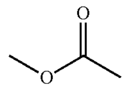

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5868 | $C_4H_9O$ | F | F | 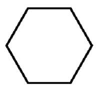 | — | 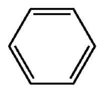 | OCO | H | F | $OC_3H_7$ | |
| 5869 | $C_4H_9O$ | F | F | 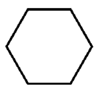 | — | 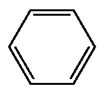 | OCO | H | F | $OC_4H_9$ | |
| 5870 | $C_4H_9O$ | F | F | 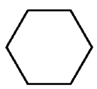 | — | 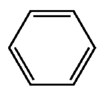 | OCO | H | F | $OC_5H_{11}$ | |
| 5871 | $C_5H_{11}O$ | F | F | 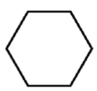 | — | 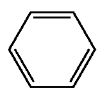 | OCO | H | F | $OCH_3$ | |
| 5872 | $C_5H_{11}O$ | F | F | 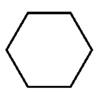 | — | 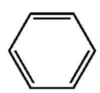 | OCO | H | F | $OC_2H_5$ | |
| 5873 | $C_5H_{11}O$ | F | F | 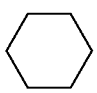 | — | 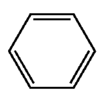 | OCO | H | F | $OC_3H_7$ | |
| 5874 | $C_5H_{11}O$ | F | F | 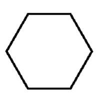 | — | 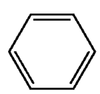 | OCO | H | F | $OC_4H_9$ | |
| 5875 | $C_5H_{11}O$ | F | F | 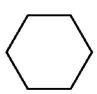 | — | 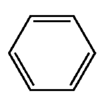 | OCO | H | F | $OC_5H_{11}$ | |
| 5876 | $C_2H_5$ | F | F | 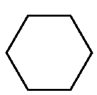 | — | 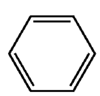 | OCO | H | F | $C_4H_9$ | |
| 5877 | $C_5H_{11}$ | F | F | 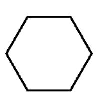 | — | 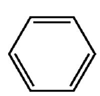 | OCO | H | F | $C_2H_5$ | |
| 5878 | $C_2H_5$ | F | F | 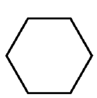 | — | 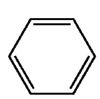 | OCO | H | F | $OC_4H_9$ | |
| 5879 | $CH_2{=\!=}CH$ | F | F | 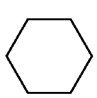 | — | 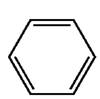 | OCO | H | F | $OC_3H_7$ | |
| 5880 | $CH_2{=\!=}CH$ | F | F | 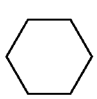 | — | 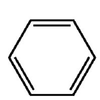 | OCO | H | F | $OC_5H_{11}$ | |

TABLE 391
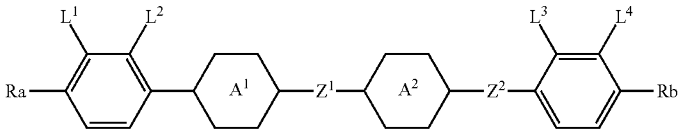
OCO = 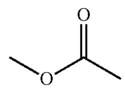
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5881 | $CH_3O$ | F | F | 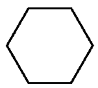 | — | 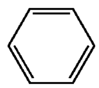 | OCO | F | H | $OCH_3$ | |
| 5882 | $CH_3O$ | F | F | 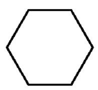 | — | 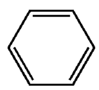 | OCO | F | H | $OC_2H_5$ | |
| 5883 | $CH_3O$ | F | F | 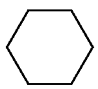 | — | 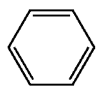 | OCO | F | H | $OC_3H_7$ | |
| 5884 | $CH_3O$ | F | F | 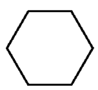 | — |  | OCO | F | H | $OC_4H_9$ | |
| 5885 | $CH_3O$ | F | F | 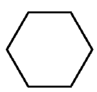 | — |  | OCO | F | H | $OC_5H_{11}$ | |
| 5886 | $C_2H_5O$ | F | F | 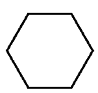 | — | 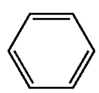 | OCO | F | H | $OCH_3$ | |
| 5887 | $C_2H_5O$ | F | F | 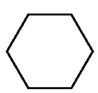 | — | 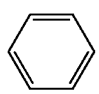 | OCO | F | H | $OC_2H_5$ | |
| 5888 | $C_2H_5O$ | F | F | 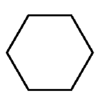 | — | 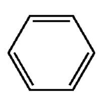 | OCO | F | H | $OC_3H_7$ | |
| 5889 | $C_2H_5O$ | F | F | 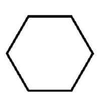 | — | 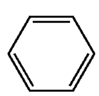 | OCO | F | H | $OC_4H_9$ | |
| 5890 | $C_2H_5O$ | F | F | 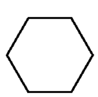 | — | 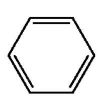 | OCO | F | H | $OC_5H_{11}$ | |
| 5891 | $C_3H_7O$ | F | F | 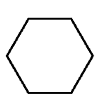 | — | 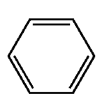 | OCO | F | H | $OCH_3$ | |
| 5892 | $C_3H_7O$ | F | F | 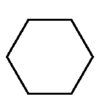 | — | 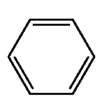 | OCO | F | H | $OC_2H_5$ | |
| 5893 | $C_3H_7O$ | F | F | 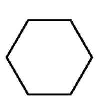 | — | 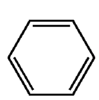 | OCO | F | H | $OC_3H_7$ | |

TABLE 391-continued

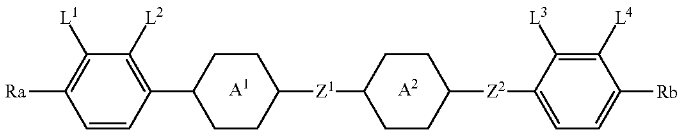

OCO = 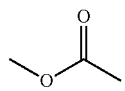

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5894 | $C_3H_7O$ | F | F | 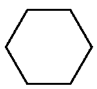 | — |  | OCO | F | H | $OC_4H_9$ | |
| 5895 | $C_3H_7O$ | F | F | 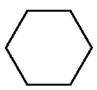 | — |  | OCO | F | H | $OC_5H_{11}$ | |

TABLE 392

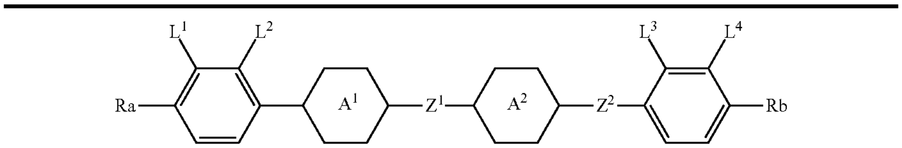

OCO = 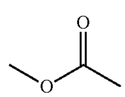

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5896 | $C_4H_9O$ | F | F | 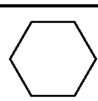 | — | 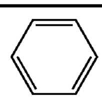 | OCO | F | H | $OCH_3$ | |
| 5897 | $C_4H_9O$ | F | F | 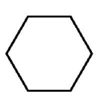 | — | 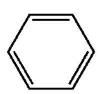 | OCO | F | H | $OC_2H_5$ | |
| 5898 | $C_4H_9O$ | F | F | 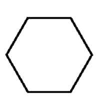 | — | 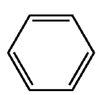 | OCO | F | H | $OC_3H_7$ | |
| 5899 | $C_4H_9O$ | F | F | 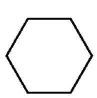 | — | 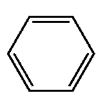 | OCO | F | H | $OC_4H_9$ | |
| 5900 | $C_4H_9O$ | F | F | 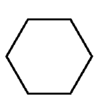 | — | 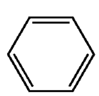 | OCO | F | H | $OC_5H_{11}$ | |
| 5901 | $C_5H_{11}O$ | F | F | 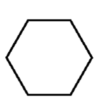 | — | 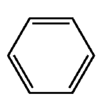 | OCO | F | H | $OCH_3$ | |
| 5902 | $C_5H_{11}O$ | F | F | 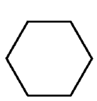 | — | 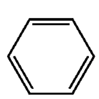 | OCO | F | H | $OC_2H_5$ | |

TABLE 392-continued
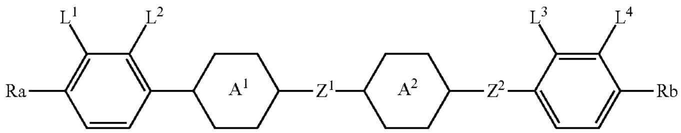
OCO = 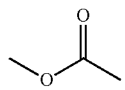
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5903 | $C_5H_{11}O$ | F | F | 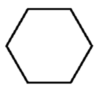 | — | 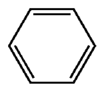 | OCO | F | H | $OC_3H_7$ | |
| 5904 | $C_5H_{11}O$ | F | F | 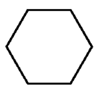 | — | 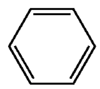 | OCO | F | H | $OC_4H_9$ | |
| 5905 | $C_5H_{11}O$ | F | F | 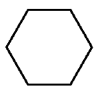 | — | 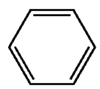 | OCO | F | H | $OC_5H_{11}$ | |
| 5906 | $C_2H_5$ | F | F | 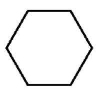 | — | 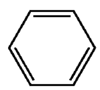 | OCO | F | H | $C_4H_9$ | |
| 5907 | $C_5H_{11}$ | F | F | 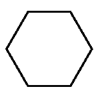 | — | 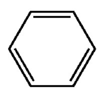 | OCO | F | H | $C_2H_5$ | |
| 5908 | $C_2H_5$ | F | F | 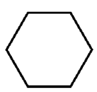 | — | 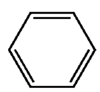 | OCO | F | H | $OC_4H_9$ | |
| 5909 | $CH_2{=}CH$ | F | F | 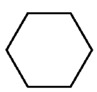 | — | 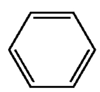 | OCO | F | H | $OC_3H_7$ | |
| 5910 | $CH_2{=}CH$ | F | F | 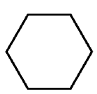 | — | 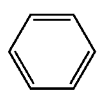 | OCO | F | H | $OC_5H_{11}$ | |
TABLE 393
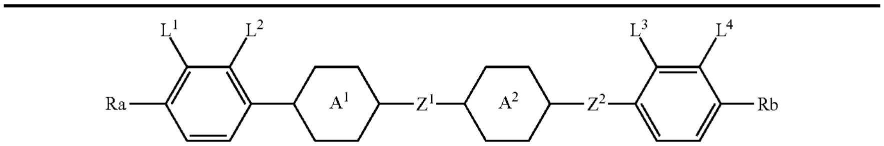
OCO = 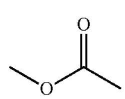
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5911 | $CH_3O$ | F | F | 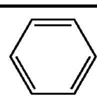 | — | 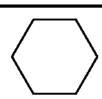 | OCO | F | F | $OCH_3$ | |

TABLE 393-continued
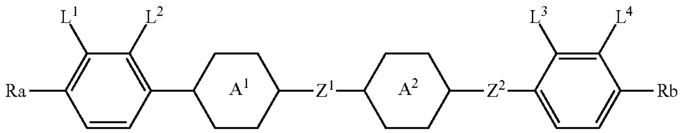
OCO = 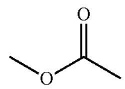
| No. | Ra | L1 | L2 | A1 | Z1 | A2 | Z2 | L3 | L4 | Rb | Physical property values |
|---|---|---|---|---|---|---|---|---|---|---|---|
| 5912 | $CH_3O$ | F | F | 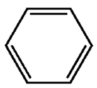 | — | 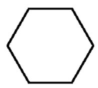 | OCO | F | F | $OC_2H_5$ | |
| 5913 | $CH_3O$ | F | F | 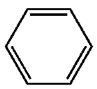 | — | 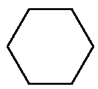 | OCO | F | F | $OC_3H_7$ | |
| 5914 | $CH_3O$ | F | F |  | — | 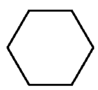 | OCO | F | F | $OC_4H_9$ | |
| 5915 | $CH_3O$ | F | F |  | — | 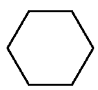 | OCO | F | F | $OC_5H_{11}$ | |
| 5916 | $C_2H_5O$ | F | F | 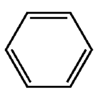 | — | 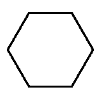 | OCO | F | F | $OCH_3$ | |
| 5917 | $C_2H_5O$ | F | F |  | — | 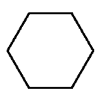 | OCO | F | F | $OC_2H_5$ | |
| 5918 | $C_2H_5O$ | F | F | 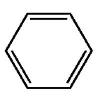 | — | 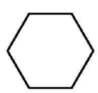 | OCO | F | F | $OC_3H_7$ | |
| 5919 | $C_2H_5O$ | F | F | 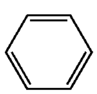 | — | 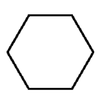 | OCO | F | F | $OC_4H_9$ | |
| 5920 | $C_2H_5O$ | F | F | 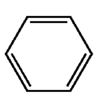 | — | 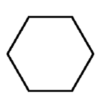 | OCO | F | F | $OC_5H_{11}$ | |
| 5921 | $C_3H_7O$ | F | F | 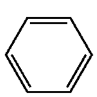 | — | 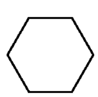 | OCO | F | F | $OCH_3$ | |
| 5922 | $C_3H_7O$ | F | F | 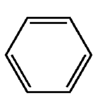 | — | 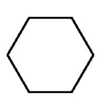 | OCO | F | F | $OC_2H_5$ | |
| 5923 | $C_3H_7O$ | F | F | 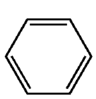 | — | 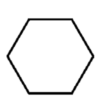 | OCO | F | F | $OC_3H_7$ | |

TABLE 393-continued

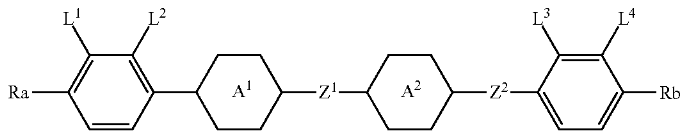

OCO = 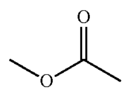

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5924 | $C_3H_7O$ | F | F |  | — | 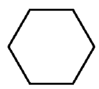 | OCO | F | F | $OC_4H_9$ | |
| 5925 | $C_3H_7O$ | F | F |  | — | 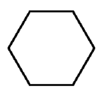 | OCO | F | F | $OC_5H_{11}$ | |

TABLE 394

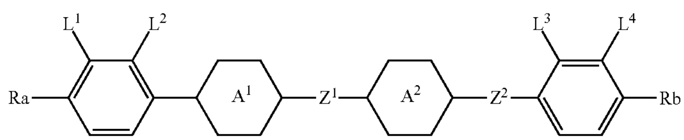

OCO = 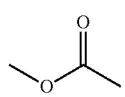

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5926 | $C_4H_9O$ | F | F | 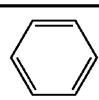 | — | 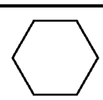 | OCO | F | F | $OCH_3$ | |
| 5927 | $C_4H_9O$ | F | F | 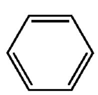 | — | 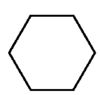 | OCO | F | F | $OC_2H_5$ | |
| 5928 | $C_4H_9O$ | F | F | 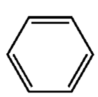 | — | 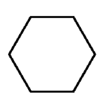 | OCO | F | F | $OC_3H_7$ | |
| 5929 | $C_4H_9O$ | F | F | 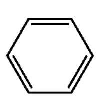 | — | 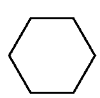 | OCO | F | F | $OC_4H_9$ | |
| 5930 | $C_4H_9O$ | F | F | 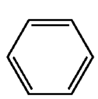 | — | 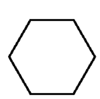 | OCO | F | F | $OC_5H_{11}$ | |
| 5931 | $C_5H_{11}O$ | F | F | 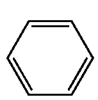 | — | 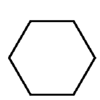 | OCO | F | F | $OCH_3$ | |
| 5932 | $C_5H_{11}O$ | F | F | 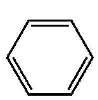 | — | 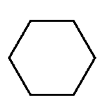 | OCO | F | F | $OC_2H_5$ | |

TABLE 394-continued

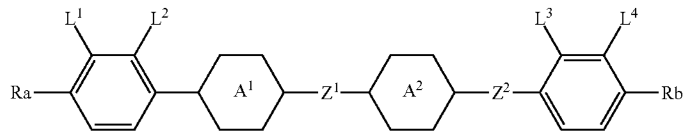

OCO = 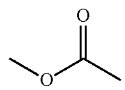

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5933 | $C_5H_{11}O$ | F | F | 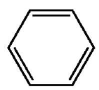 | — | 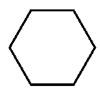 | OCO | F | F | $OC_3H_7$ | |
| 5934 | $C_5H_{11}O$ | F | F | 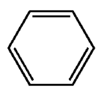 | — | 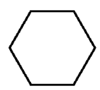 | OCO | F | F | $OC_4H_9$ | |
| 5935 | $C_5H_{11}O$ | F | F | 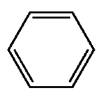 | — | 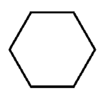 | OCO | F | F | $OC_5H_{11}$ | |
| 5936 | $C_2H_5$ | F | F | 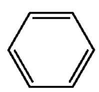 | — | 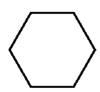 | OCO | F | F | $C_4H_9$ | |
| 5937 | $C_5H_{11}$ | F | F | 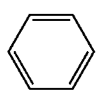 | — | 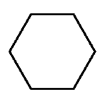 | OCO | F | F | $C_2H_5$ | |
| 5938 | $C_2H_5$ | F | F | 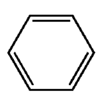 | — | 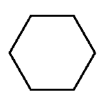 | OCO | F | F | $OC_4H_9$ | |
| 5939 | $CH_2{=\!=}CH$ | F | F | 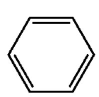 | — | 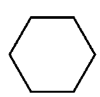 | OCO | F | F | $OC_3H_7$ | |
| 5940 | $CH_2{=\!=}CH$ | F | F | 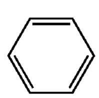 | — | 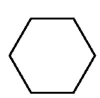 | OCO | F | F | $OC_5H_{11}$ | |

TABLE 395

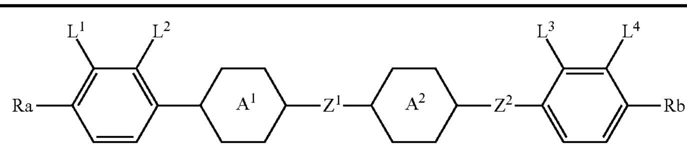

OCO = 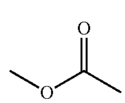

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5941 | $CH_2{=\!=}CHO$ | F | F | 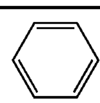 | — | 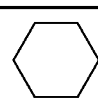 | OCO | F | F | $OC_3H_7$ | |

TABLE 395-continued

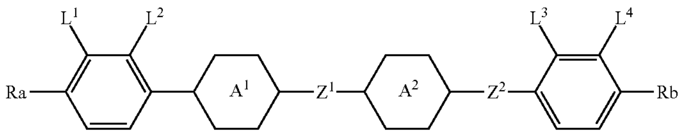

OCO = 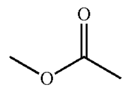

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5942 | $CH_2{=}CHCH_2O$ | F | F | 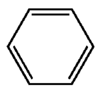 | — | 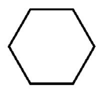 | OCO | F | F | $OC_5H_{11}$ | |
| 5943 | $CH_2{=}CHCH_2O$ | F | F | 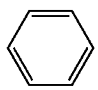 | — | 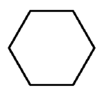 | OCO | F | F | $OC_3H_7$ | |
| 5944 | $CH_2{=}CHC_2H_5O$ | F | F |  | — | 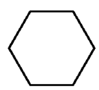 | OCO | F | F | $OC_5H_{11}$ | |
| 5945 | $CH_2{=}CHC_2H_5O$ | F | F | 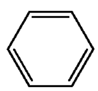 | — | 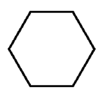 | OCO | F | F | $OC_2H_5$ | |
| 5946 | $CH_2{=}CHC_2H_5O$ | F | F | 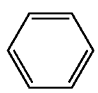 | — | 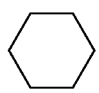 | OCO | F | F | $OC_3H_7$ | |
| 5947 | $CH_3CH{=}CHCH_2O$ | F | F | 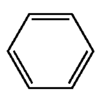 | — | 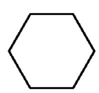 | OCO | F | F | $OCH_3$ | |
| 5948 | $CH_3CH{=}CHCH_2O$ | F | F | 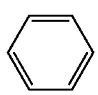 | — | 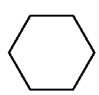 | OCO | F | F | $OC_2H_5$ | |
| 5949 | $C_3H_7O$ | F | F | 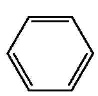 | — | 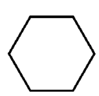 | OCO | F | F | $OCH{=}CH_2$ | |
| 5950 | $C_3H_7O$ | F | F | 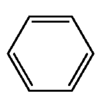 | — | 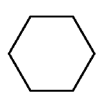 | OCO | F | F | $OCH_2CH{=}CH_2$ | |
| 5951 | $C_4H_9O$ | F | F | 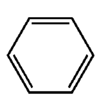 | — | 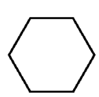 | OCO | F | F | $OCH_2CH{=}CH_2$ | |
| 5952 | $C_5H_{11}O$ | F | F | 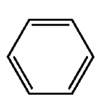 | — | 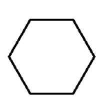 | OCO | F | F | $OCH_2CH{=}CH_2$ | |
| 5953 | $CH_3O$ | F | F | 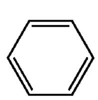 | — | 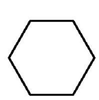 | OCO | F | F | $OC_2H_5CH{=}CH_2$ | |

TABLE 395-continued

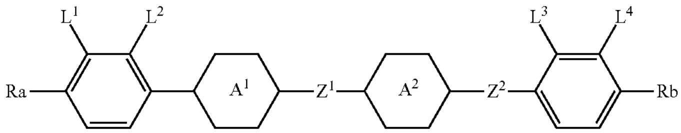

OCO = 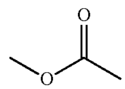

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5954 | $C_2H_5O$ | F | F | 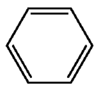 | — | 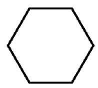 | OCO | F | F | $OC_2H_5CH{=}CH_2$ | |
| 5955 | $C_3H_7O$ | F | F |  | — | 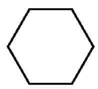 | OCO | F | F | $OC_2H_5CH{=}CH_2$ | |

TABLE 396

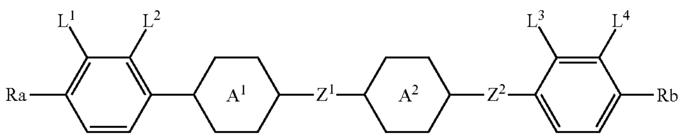

OCO = 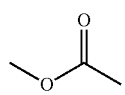

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5956 | $CH_3O$ | F | F | 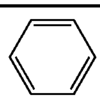 | — | 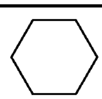 | OCO | F | F | $OCH_2CH{=}CHCH_3$ | |
| 5957 | $C_2H_5O$ | F | F | 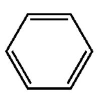 | — | 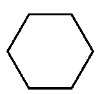 | OCO | F | F | $OCH_2CH{=}CHCH_3$ | |
| 5958 | $C_3H_7O$ | F | F | 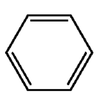 | — | 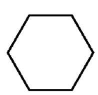 | OCO | F | F | $OCH_2CH{=}CHCH_3$ | |
| 5959 | $CH_2{=}CHCH_2O$ | F | F | 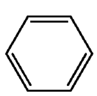 | — | 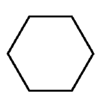 | OCO | F | F | $OCH{=}CH_2$ | |
| 5960 | $CH_2{=}CHC_2H_5O$ | F | F | 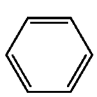 | — | 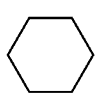 | OCO | F | F | $OCH_2CH{=}CH_2$ | |
| 5961 | $C_3H_7OCH_2$ | F | F | 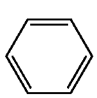 | — | 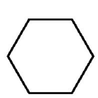 | OCO | F | F | $OC_3H_7$ | |
| 5962 | $C_5H_{11}O$ | F | F | 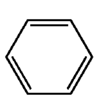 | — | 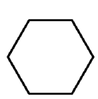 | OCO | F | F | $OC_2H_5CH{=}CH_2$ | |

TABLE 396-continued
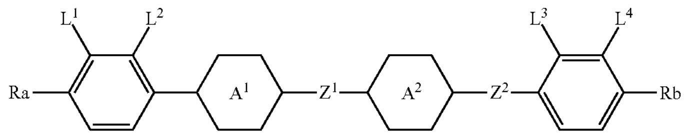
OCO = 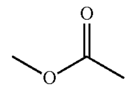
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5963 | $C_3H_7O$ | F | F |  | — | 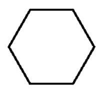 | OCO | F | F | H | |
| 5964 | $C_5H_{11}O$ | F | F |  | — | 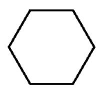 | OCO | F | F | $OC_9H_{19}$ | |
| 5965 | $C_3H_7O$ | F | F | 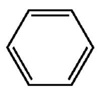 | — | 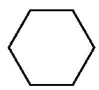 | OCO | F | F | $C_2H_5$ | |
| 5966 | $C_5H_{11}O$ | F | F |  | — | 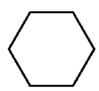 | OCO | F | F | $C_3H_7$ | |
| 5967 | H | F | F | 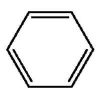 | — | 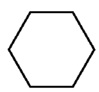 | OCO | F | F | $OC_4H_9$ | |
| 5968 | $C_7H_{15}O$ | F | F | 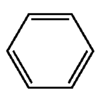 | — | 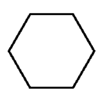 | OCO | F | F | $OC_4H_9$ | |
| 5969 | $C_2H_5O$ | F | F | 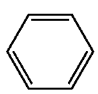 | — | 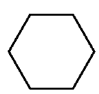 | OCO | F | F | $OC_6H_{13}$ | |
| 5970 | $CH_3O$ | F | F | 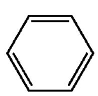 | — | 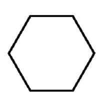 | OCO | F | F | $C_2H_5$ | |
TABLE 397
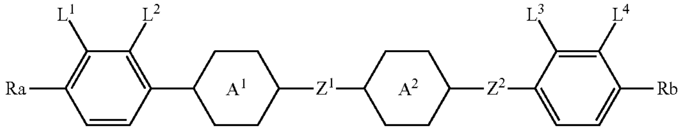
OCO = 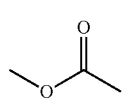
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5971 | $CH_3O$ | H | F | 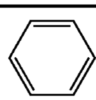 | — | 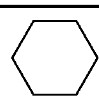 | OCO | F | F | $OCH_3$ | |

TABLE 397-continued
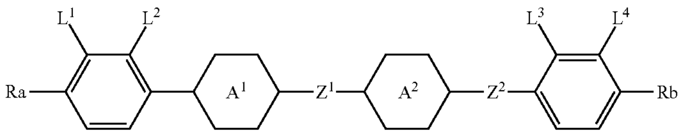
OCO = 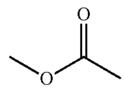
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5972 | $CH_3O$ | H | F |  | — | 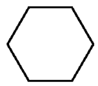 | OCO | F | F | $OC_2H_5$ | |
| 5973 | $CH_3O$ | H | F |  | — | 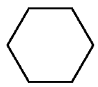 | OCO | F | F | $OC_3H_7$ | |
| 5974 | $CH_3O$ | H | F | 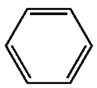 | — | 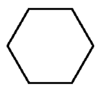 | OCO | F | F | $OC_4H_9$ | |
| 5975 | $CH_3O$ | H | F |  | — | 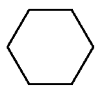 | OCO | F | F | $OC_5H_{11}$ | |
| 5976 | $C_2H_5O$ | H | F | 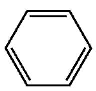 | — | 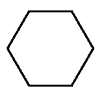 | OCO | F | F | $OCH_3$ | |
| 5977 | $C_2H_5O$ | H | F |  | — | 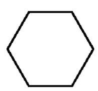 | OCO | F | F | $OC_2H_5$ | |
| 5978 | $C_2H_5O$ | H | F | 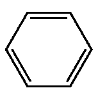 | — | 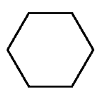 | OCO | F | F | $OC_3H_7$ | |
| 5979 | $C_2H_5O$ | H | F | 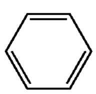 | — | 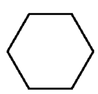 | OCO | F | F | $OC_4H_9$ | |
| 5980 | $C_2H_5O$ | H | F | 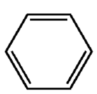 | — | 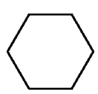 | OCO | F | F | $OC_5H_{11}$ | |
| 5981 | $C_3H_7O$ | H | F | 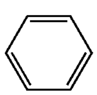 | — | 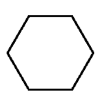 | OCO | F | F | $OCH_3$ | |
| 5982 | $C_3H_7O$ | H | F | 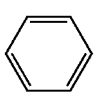 | — | 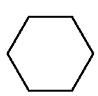 | OCO | F | F | $OC_2H_5$ | |
| 5983 | $C_3H_7O$ | H | F | 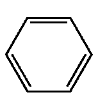 | — | 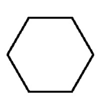 | OCO | F | F | $OC_3H_7$ | |

TABLE 397-continued

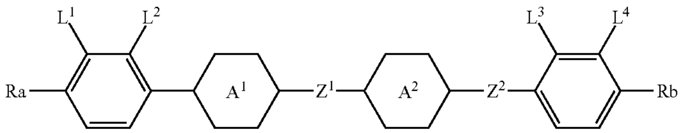

OCO = 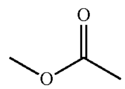

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5984 | $C_3H_7O$ | H | F | 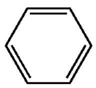 | — | 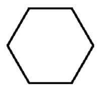 | OCO | F | F | $OC_4H_9$ | |
| 5985 | $C_3H_7O$ | H | F | 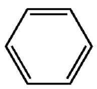 | — | 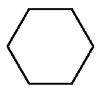 | OCO | F | F | $OC_5H_{11}$ | |

TABLE 398

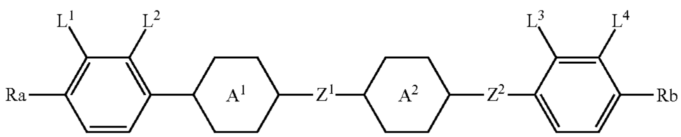

OCO = 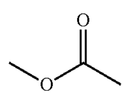

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5986 | $C_4H_9O$ | H | F | 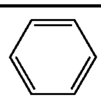 | — | 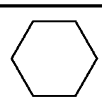 | OCO | F | F | $OCH_3$ | |
| 5987 | $C_4H_9O$ | H | F | 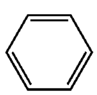 | — | 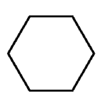 | OCO | F | F | $OC_2H_5$ | |
| 5988 | $C_4H_9O$ | H | F | 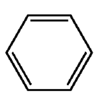 | — | 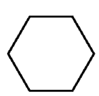 | OCO | F | F | $OC_3H_7$ | |
| 5989 | $C_4H_9O$ | H | F | 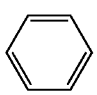 | — | 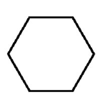 | OCO | F | F | $OC_4H_9$ | |
| 5990 | $C_4H_9O$ | H | F | 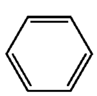 | — | 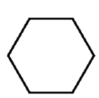 | OCO | F | F | $OC_5H_{11}$ | |
| 5991 | $C_5H_{11}O$ | H | F | 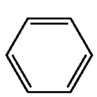 | — | 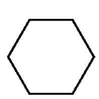 | OCO | F | F | $OCH_3$ | |
| 5992 | $C_5H_{11}O$ | H | F | 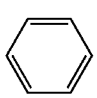 | — | 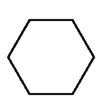 | OCO | F | F | $OC_2H_5$ | |

TABLE 398-continued
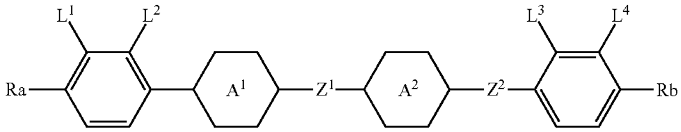
OCO = 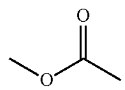
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 5993 | $C_5H_{11}O$ | H | F |  | — | 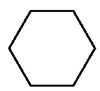 | OCO | F | F | $OC_3H_7$ | |
| 5994 | $C_5H_{11}O$ | H | F |  | — | 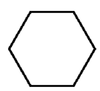 | OCO | F | F | $OC_4H_9$ | |
| 5995 | $C_5H_{11}O$ | H | F | 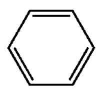 | — | 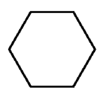 | OCO | F | F | $OC_5H_{11}$ | |
| 5996 | $C_2H_5$ | H | F | 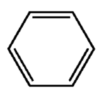 | — | 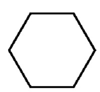 | OCO | F | F | $C_4H_9$ | |
| 5997 | $C_5H_{11}$ | H | F | 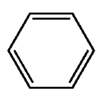 | — | 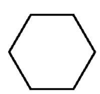 | OCO | F | F | $C_2H_5$ | |
| 5998 | $C_2H_5$ | H | F | 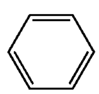 | — | 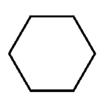 | OCO | F | F | $OC_4H_9$ | |
| 5999 | $CH_2{=}CH$ | H | F | 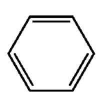 | — | 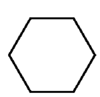 | OCO | F | F | $OC_3H_7$ | |
| 6000 | $CH_2{=}CH$ | H | F | 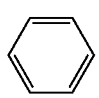 | — | 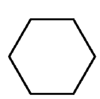 | OCO | F | F | $OC_5H_{11}$ | |
TABLE 399
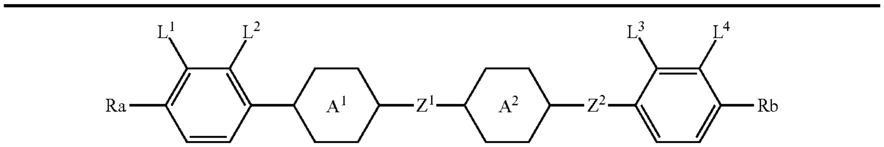
OCO = 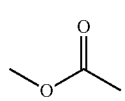
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6001 | $CH_3O$ | F | H | 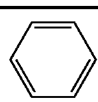 | — | 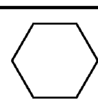 | OCO | F | F | $OCH_3$ | |

TABLE 399-continued
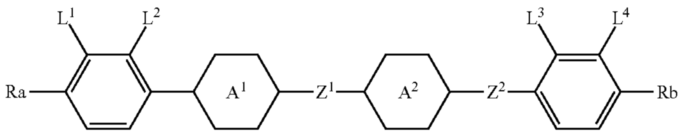
OCO = 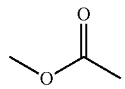
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6002 | $CH_3O$ | F | H |  | — | 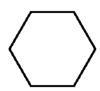 | OCO | F | F | $OC_2H_5$ | |
| 6003 | $CH_3O$ | F | H |  | — | 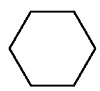 | OCO | F | F | $OC_3H_7$ | |
| 6004 | $CH_3O$ | F | H |  | — | 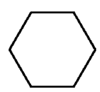 | OCO | F | F | $OC_4H_9$ | |
| 6005 | $CH_3O$ | F | H | 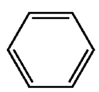 | — | 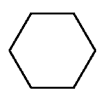 | OCO | F | F | $OC_5H_{11}$ | |
| 6006 | $C_2H_5O$ | F | H | 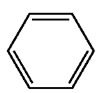 | — | 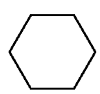 | OCO | F | F | $OCH_3$ | |
| 6007 | $C_2H_5O$ | F | H | 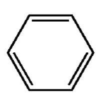 | — | 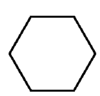 | OCO | F | F | $OC_2H_5$ | |
| 6008 | $C_2H_5O$ | F | H | 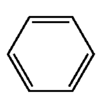 | — | 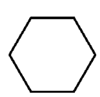 | OCO | F | F | $OC_3H_7$ | |
| 6009 | $C_2H_5O$ | F | H | 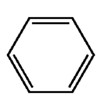 | — | 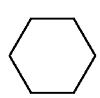 | OCO | F | F | $OC_4H_9$ | |
| 6010 | $C_2H_5O$ | F | H | 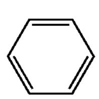 | — | 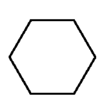 | OCO | F | F | $OC_5H_{11}$ | |
| 6011 | $C_3H_7O$ | F | H | 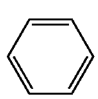 | — | 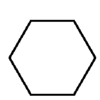 | OCO | F | F | $OCH_3$ | |
| 6012 | $C_3H_7O$ | F | H | 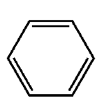 | — | 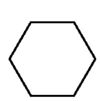 | OCO | F | F | $OC_2H_5$ | |
| 6013 | $C_3H_7O$ | F | H | 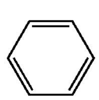 | — | 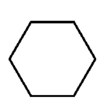 | OCO | F | F | $OC_3H_7$ | |

TABLE 399-continued

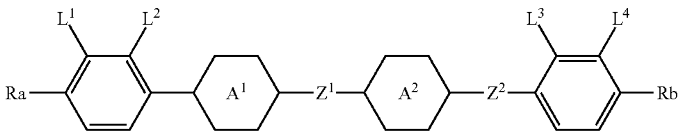

OCO = 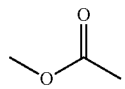

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6014 | $C_3H_7O$ | F | H |  | — | 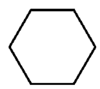 | OCO | F | F | $OC_4H_9$ | |
| 6015 | $C_3H_7O$ | F | H |  | — | 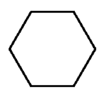 | OCO | F | F | $OC_5H_{11}$ | |

TABLE 400

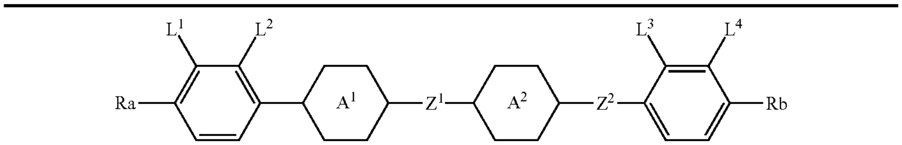

OCO = 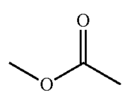

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6016 | $C_4H_9O$ | F | H | 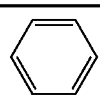 | — | 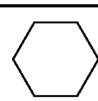 | OCO | F | F | $OCH_3$ | |
| 6017 | $C_4H_9O$ | F | H | 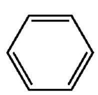 | — | 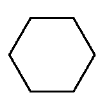 | OCO | F | F | $OC_2H_5$ | |
| 6018 | $C_4H_9O$ | F | H | 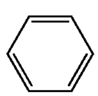 | — | 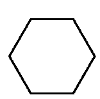 | OCO | F | F | $OC_3H_7$ | |
| 6019 | $C_4H_9O$ | F | H | 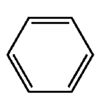 | — | 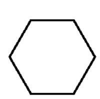 | OCO | F | F | $OC_4H_9$ | |
| 6020 | $C_4H_9O$ | F | H | 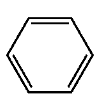 | — | 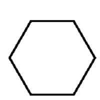 | OCO | F | F | $OC_5H_{11}$ | |
| 6021 | $C_5H_{11}O$ | F | H | 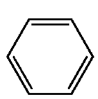 | — | 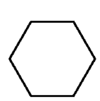 | OCO | F | F | $OCH_3$ | |
| 6022 | $C_5H_{11}O$ | F | H | 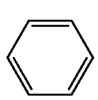 | — | 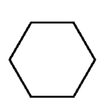 | OCO | F | F | $OC_2H_5$ | |

TABLE 400-continued
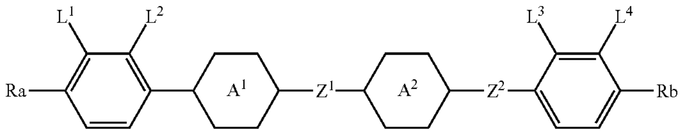
OCO = 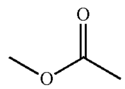
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6023 | $C_5H_{11}O$ | F | H | 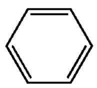 | — | 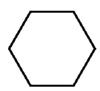 | OCO | F | F | $OC_3H_7$ | |
| 6024 | $C_5H_{11}O$ | F | H | 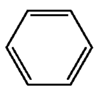 | — | 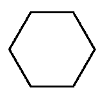 | OCO | F | F | $OC_4H_9$ | |
| 6025 | $C_5H_{11}O$ | F | H |  | — | 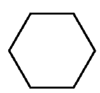 | OCO | F | F | $OC_5H_{11}$ | |
| 6026 | $C_2H_5$ | F | H |  | — | 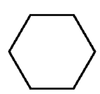 | OCO | F | F | $C_4H_9$ | |
| 6027 | $C_5H_{11}$ | F | H | 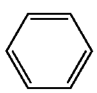 | — | 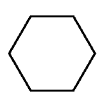 | OCO | F | F | $C_2H_5$ | |
| 6028 | $C_2H_5$ | F | H | 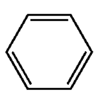 | — | 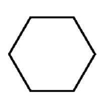 | OCO | F | F | $OC_4H_9$ | |
| 6029 | $CH_2{=}CH$ | F | H | 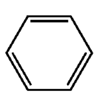 | — | 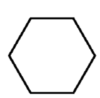 | OCO | F | F | $OC_3H_7$ | |
| 6030 | $CH_2{=}CH$ | F | H | 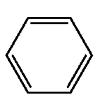 | — | 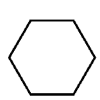 | OCO | F | F | $OC_5H_{11}$ | |
TABLE 401
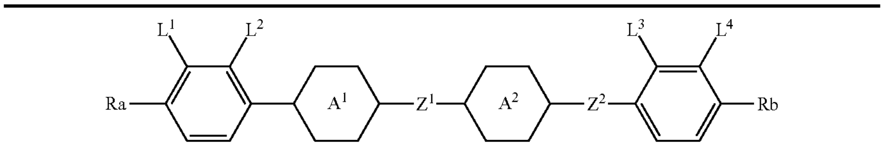
OCO = 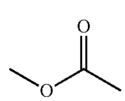
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6031 | $CH_3O$ | F | F | 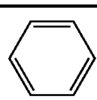 | — | 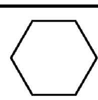 | OCO | H | F | $OCH_3$ | |

TABLE 401-continued
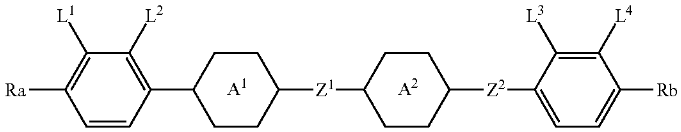
OCO = 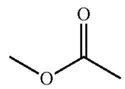
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6032 | $CH_3O$ | F | F | 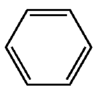 | — | 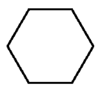 | OCO | H | F | $OC_2H_5$ | |
| 6033 | $CH_3O$ | F | F | 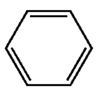 | — | 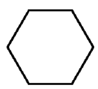 | OCO | H | F | $OC_3H_7$ | |
| 6034 | $CH_3O$ | F | F | 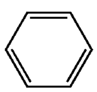 | — | 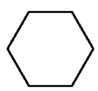 | OCO | H | F | $OC_4H_9$ | |
| 6035 | $CH_3O$ | F | F |  | — | 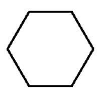 | OCO | H | F | $OC_5H_{11}$ | |
| 6036 | $C_2H_5O$ | F | F | 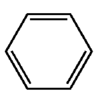 | — | 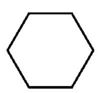 | OCO | H | F | $OCH_3$ | |
| 6037 | $C_2H_5O$ | F | F | 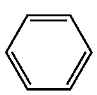 | — | 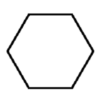 | OCO | H | F | $OC_2H_5$ | |
| 6038 | $C_2H_5O$ | F | F | 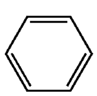 | — | 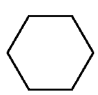 | OCO | H | F | $OC_3H_7$ | |
| 6039 | $C_2H_5O$ | F | F | 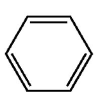 | — | 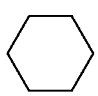 | OCO | H | F | $OC_4H_9$ | |
| 6040 | $C_2H_5O$ | F | F | 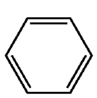 | — | 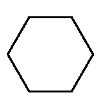 | OCO | H | F | $OC_5H_{11}$ | |
| 6041 | $C_3H_7O$ | F | F | 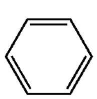 | — | 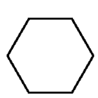 | OCO | H | F | $OCH_3$ | |
| 6042 | $C_3H_7O$ | F | F | 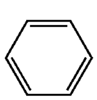 | — | 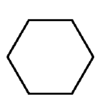 | OCO | H | F | $OC_2H_5$ | |
| 6043 | $C_3H_7O$ | F | F | 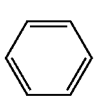 | — | 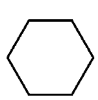 | OCO | H | F | $OC_3H_7$ | |

TABLE 401-continued

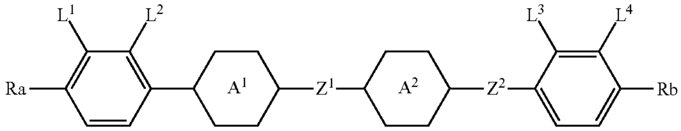

OCO = 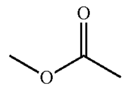

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6044 | $C_3H_7O$ | F | F |  | — | 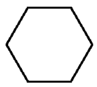 | OCO | H | F | $OC_4H_9$ | |
| 6045 | $C_3H_7O$ | F | F | 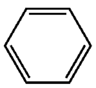 | — | 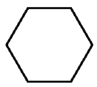 | OCO | H | F | $OC_5H_{11}$ | |

TABLE 402

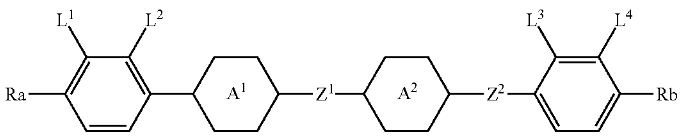

OCO = 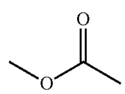

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6046 | $C_4H_9O$ | F | F | 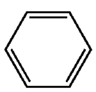 | — | 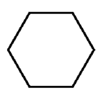 | OCO | H | F | $OCH_3$ | |
| 6047 | $C_4H_9O$ | F | F | 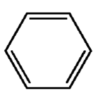 | — | 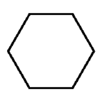 | OCO | H | F | $OC_2H_5$ | |
| 6048 | $C_4H_9O$ | F | F | 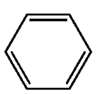 | — | 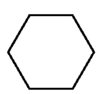 | OCO | H | F | $OC_3H_7$ | |
| 6049 | $C_4H_9O$ | F | F | 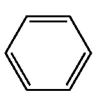 | — | 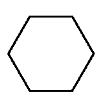 | OCO | H | F | $OC_4H_9$ | |
| 6050 | $C_4H_9O$ | F | F | 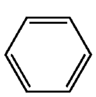 | — | 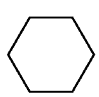 | OCO | H | F | $OC_5H_{11}$ | |
| 6051 | $C_5H_{11}O$ | F | F | 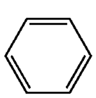 | — | 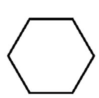 | OCO | H | F | $OCH_3$ | |
| 6052 | $C_5H_{11}O$ | F | F | 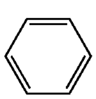 | — | 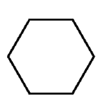 | OCO | H | F | $OC_2H_5$ | |
| 6053 | $C_5H_{11}O$ | F | F | 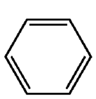 | — | 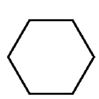 | OCO | H | F | $OC_3H_7$ | |

TABLE 402-continued
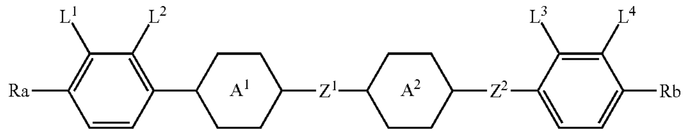
OCO = 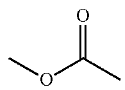
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6054 | $C_5H_{11}O$ | F | F |  | — | 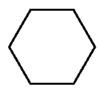 | OCO | H | F | $OC_4H_9$ | |
| 6055 | $C_5H_{11}O$ | F | F | 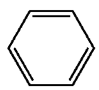 | — | 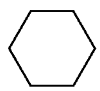 | OCO | H | F | $OC_5H_{11}$ | |
| 6056 | $C_2H_5$ | F | F | 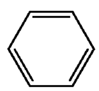 | — | 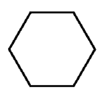 | OCO | H | F | $C_4H_9$ | |
| 6057 | $C_5H_{11}$ | F | F | 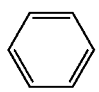 | — | 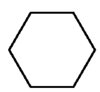 | OCO | H | F | $C_2H_5$ | |
| 6058 | $C_2H_5$ | F | F | 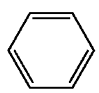 | — | 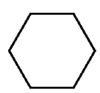 | OCO | H | F | $OC_4H_9$ | |
| 6059 | $CH_2{=}CH$ | F | F | 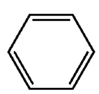 | — | 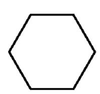 | OCO | H | F | $OC_3H_7$ | |
| 6060 | $CH_2{=}CH$ | F | F | 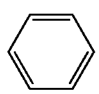 | — | 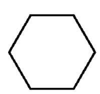 | OCO | H | F | $OC_5H_{11}$ | |
TABLE 403
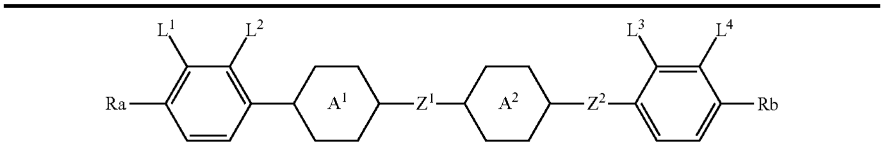
OCO = 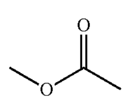
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6061 | $CH_3O$ | F | F | 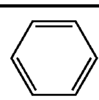 | — | 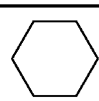 | OCO | F | H | $OCH_3$ | |
| 6062 | $CH_3O$ | F | F | 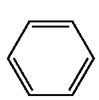 | — | 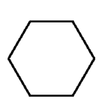 | OCO | F | H | $OC_2H_5$ | |

TABLE 403-continued
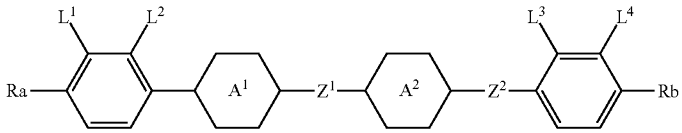
OCO = 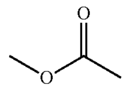
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6063 | $CH_3O$ | F | F | 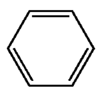 | — | 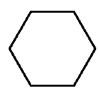 | OCO | F | H | $OC_3H_7$ | |
| 6064 | $CH_3O$ | F | F | 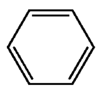 | — | 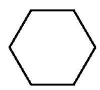 | OCO | F | H | $OC_4H_9$ | |
| 6065 | $CH_3O$ | F | F |  | — | 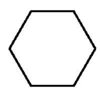 | OCO | F | H | $OC_5H_{11}$ | |
| 6066 | $C_2H_5O$ | F | F |  | — | 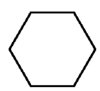 | OCO | F | H | $OCH_3$ | |
| 6067 | $C_2H_5O$ | F | F | 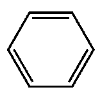 | — | 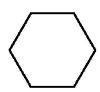 | OCO | F | H | $OC_2H_5$ | |
| 6068 | $C_2H_5O$ | F | F | 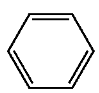 | — | 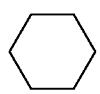 | OCO | F | H | $OC_3H_7$ | |
| 6069 | $C_2H_5O$ | F | F | 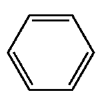 | — | 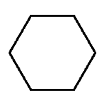 | OCO | F | H | $OC_4H_9$ | |
| 6070 | $C_2H_5O$ | F | F | 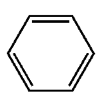 | — | 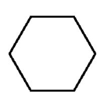 | OCO | F | H | $OC_5H_{11}$ | |
| 6071 | $C_3H_7O$ | F | F | 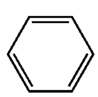 | — | 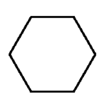 | OCO | F | H | $OCH_3$ | |
| 6072 | $C_3H_7O$ | F | F | 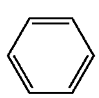 | — | 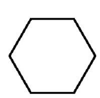 | OCO | F | H | $OC_2H_5$ | |
| 6073 | $C_3H_7O$ | F | F | 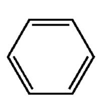 | — | 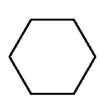 | OCO | F | H | $OC_3H_7$ | |
| 6074 | $C_3H_7O$ | F | F | 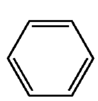 | — | 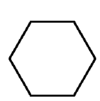 | OCO | F | H | $OC_4H_9$ | |
| 6075 | $C_3H_7O$ | F | F | 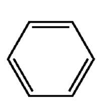 | — | 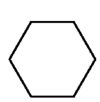 | OCO | F | H | $OC_5H_{11}$ | |

TABLE 404
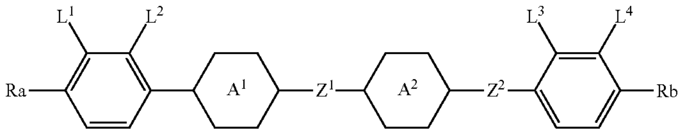
OCO = 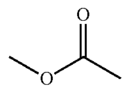
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6076 | $C_4H_9O$ | F | F |  | — | 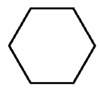 | OCO | F | H | $OCH_3$ | |
| 6077 | $C_4H_9O$ | F | F |  | — | 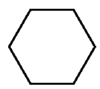 | OCO | F | H | $OC_2H_5$ | |
| 6078 | $C_4H_9O$ | F | F | 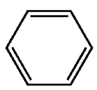 | — | 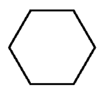 | OCO | F | H | $OC_3H_7$ | |
| 6079 | $C_4H_9O$ | F | F |  | — | 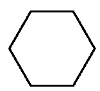 | OCO | F | H | $OC_4H_9$ | |
| 6080 | $C_4H_9O$ | F | F | 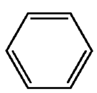 | — | 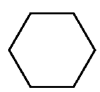 | OCO | F | H | $OC_5H_{11}$ | |
| 6081 | $C_5H_{11}O$ | F | F | 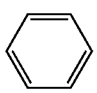 | — | 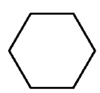 | OCO | F | H | $OCH_3$ | |
| 6082 | $C_5H_{11}O$ | F | F | 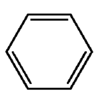 | — | 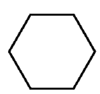 | OCO | F | H | $OC_2H_5$ | |
| 6083 | $C_5H_{11}O$ | F | F | 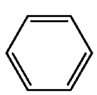 | — | 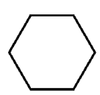 | OCO | F | H | $OC_3H_7$ | |
| 6084 | $C_5H_{11}O$ | F | F | 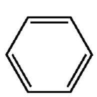 | — | 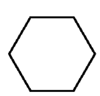 | OCO | F | H | $OC_4H_9$ | |
| 6085 | $C_5H_{11}O$ | F | F | 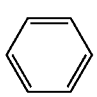 | — | 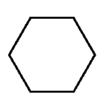 | OCO | F | H | $OC_5H_{11}$ | |
| 6086 | $C_2H_5$ | F | F | 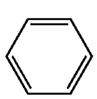 | — | 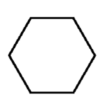 | OCO | F | H | $C_4H_9$ | |
| 6087 | $C_5H_{11}$ | F | F | 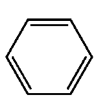 | — | 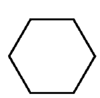 | OCO | F | H | $C_2H_5$ | |
| 6088 | $C_2H_5$ | F | F | 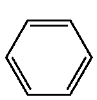 | — | 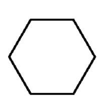 | OCO | F | H | $OC_4H_9$ | |

TABLE 404-continued

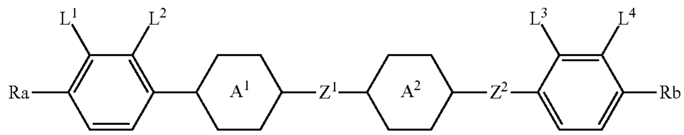

OCO = 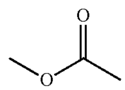

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6089 | $CH_2$=CH | F | F | 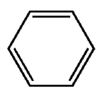 | — | 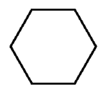 | OCO | F | H | $OC_3H_7$ | |
| 6090 | $CH_2$=CH | F | F | 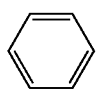 | — | 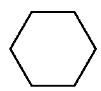 | OCO | F | H | $OC_5H_{11}$ | |

TABLE 405

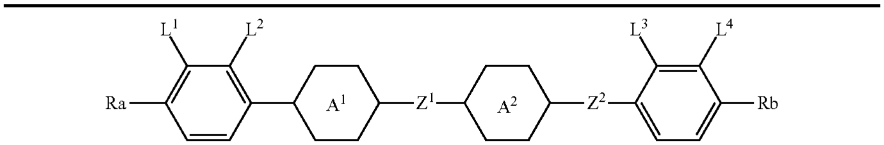

OCO = 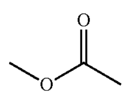

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6091 | $CH_3O$ | F | F | 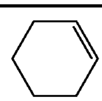 | — | 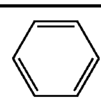 | OCO | F | F | $OCH_3$ | |
| 6092 | $CH_3O$ | F | F | 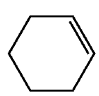 | — | 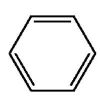 | OCO | F | F | $OC_2H_5$ | |
| 6093 | $CH_3O$ | F | F | 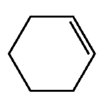 | — | 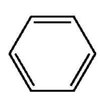 | OCO | F | F | $OC_3H_7$ | |
| 6094 | $CH_3O$ | F | F | 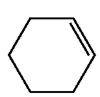 | — | 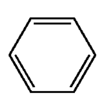 | OCO | F | F | $OC_4H_9$ | |
| 6095 | $CH_3O$ | F | F | 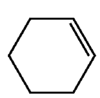 | — | 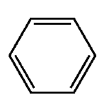 | OCO | F | F | $OC_5H_{11}$ | |
| 6096 | $C_2H_5O$ | F | F | 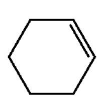 | — | 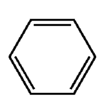 | OCO | F | F | $OCH_3$ | |
| 6097 | $C_2H_5O$ | F | F | 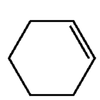 | — | 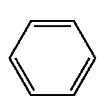 | OCO | F | F | $OC_2H_5$ | |

TABLE 405-continued

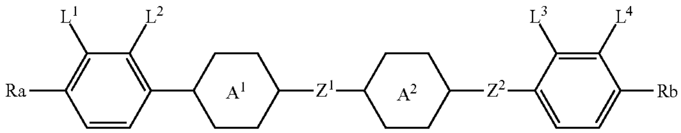

OCO = 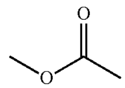

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6098 | $C_2H_5O$ | F | F | 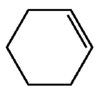 | — | 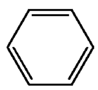 | OCO | F | F | $OC_3H_7$ | |
| 6099 | $C_2H_5O$ | F | F | 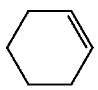 | — |  | OCO | F | F | $OC_4H_9$ | |
| 6100 | $C_2H_5O$ | F | F | 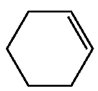 | — |  | OCO | F | F | $OC_5H_{11}$ | |
| 6101 | $C_3H_7O$ | F | F | 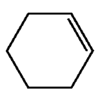 | — | 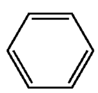 | OCO | F | F | $OCH_3$ | |
| 6102 | $C_3H_7O$ | F | F | 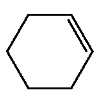 | — | 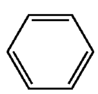 | OCO | F | F | $OC_2H_5$ | |
| 6103 | $C_3H_7O$ | F | F | 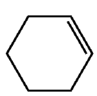 | — | 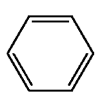 | OCO | F | F | $OC_3H_7$ | |
| 6104 | $C_3H_7O$ | F | F | 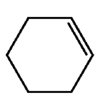 | — | 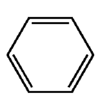 | OCO | F | F | $OC_4H_9$ | |
| 6105 | $C_3H_7O$ | F | F | 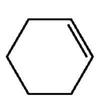 | — | 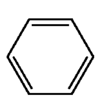 | OCO | F | F | $OC_5H_{11}$ | |

TABLE 406

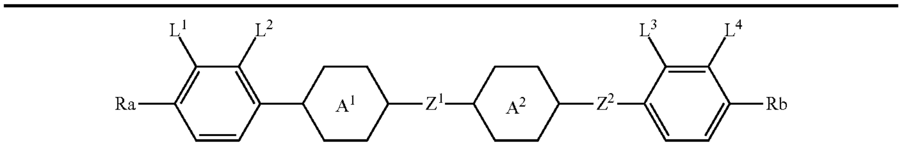

OCO = 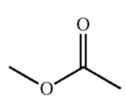

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6106 | $C_4H_9O$ | F | F | 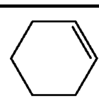 | — | 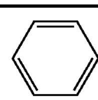 | OCO | F | F | $OCH_3$ | |

TABLE 406-continued
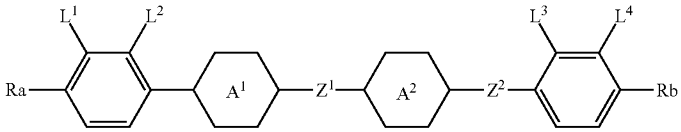
OCO = 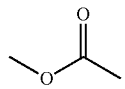
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6107 | $C_4H_9O$ | F | F | 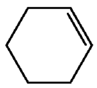 | — | 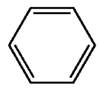 | OCO | F | F | $OC_2H_5$ | |
| 6108 | $C_4H_9O$ | F | F | 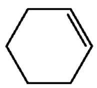 | — | 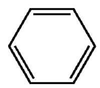 | OCO | F | F | $OC_3H_7$ | |
| 6109 | $C_4H_9O$ | F | F | 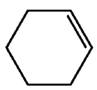 | — | 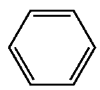 | OCO | F | F | $OC_4H_9$ | |
| 6110 | $C_4H_9O$ | F | F | 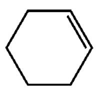 | — | 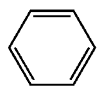 | OCO | F | F | $OC_5H_{11}$ | |
| 6111 | $C_5H_{11}O$ | F | F | 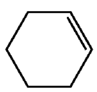 | — | 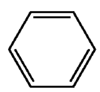 | OCO | F | F | $OCH_3$ | |
| 6112 | $C_5H_{11}O$ | F | F | 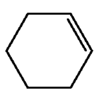 | — | 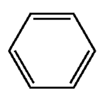 | OCO | F | F | $OC_2H_5$ | |
| 6113 | $C_5H_{11}O$ | F | F | 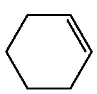 | — | 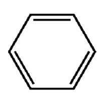 | OCO | F | F | $OC_3H_7$ | |
| 6114 | $C_5H_{11}O$ | F | F | 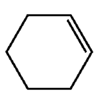 | — | 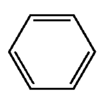 | OCO | F | F | $OC_4H_9$ | |
| 6115 | $C_5H_{11}O$ | F | F | 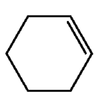 | — | 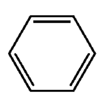 | OCO | F | F | $OC_5H_{11}$ | |
| 6116 | $C_2H_5$ | F | F | 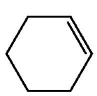 | — | 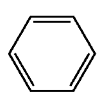 | OCO | F | F | $C_4H_9$ | |
| 6117 | $C_5H_{11}$ | F | F | 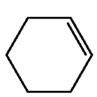 | — | 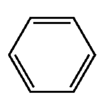 | OCO | F | F | $C_2H_5$ | |
| 6118 | $C_2H_5$ | F | F | 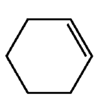 | — | 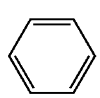 | OCO | F | F | $OC_4H_9$ | |

TABLE 406-continued

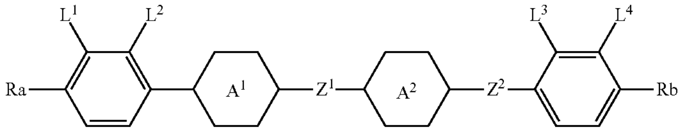

OCO = 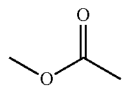

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6119 | $CH_2$═CH | F | F | 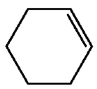 | — | 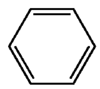 | OCO | F | F | $OC_3H_7$ | |
| 6120 | $CH_2$═CH | F | F | 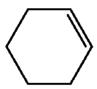 | — |  | OCO | F | F | $OC_5H_{11}$ | |

TABLE 407

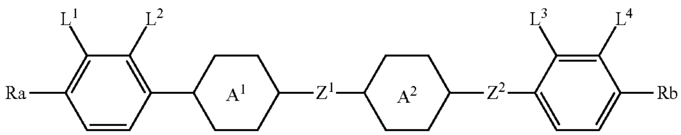

OCO = 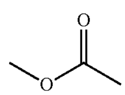

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6121 | $CH_3O$ | F | F |  | — | 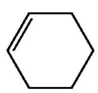 | OCO | F | F | $OCH_3$ | |
| 6122 | $CH_3O$ | F | F | 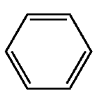 | — | 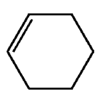 | OCO | F | F | $OC_2H_5$ | |
| 6123 | $CH_3O$ | F | F | 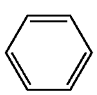 | — | 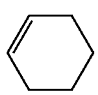 | OCO | F | F | $OC_3H_7$ | |
| 6124 | $CH_3O$ | F | F | 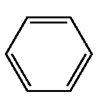 | — | 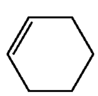 | OCO | F | F | $OC_4H_9$ | |
| 6125 | $CH_3O$ | F | F | 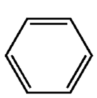 | — | 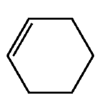 | OCO | F | F | $OC_5H_{11}$ | |
| 6126 | $C_2H_5O$ | F | F | 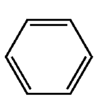 | — | 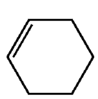 | OCO | F | F | $OCH_3$ | |
| 6127 | $C_2H_5O$ | F | F | 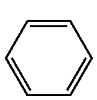 | — | 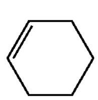 | OCO | F | F | $OC_2H_5$ | |

TABLE 407-continued

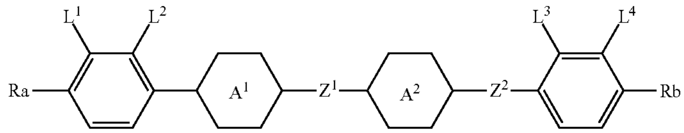

OCO = 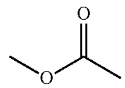

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6128 | $C_2H_5O$ | F | F |  | — | 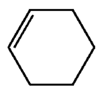 | OCO | F | F | $OC_3H_7$ | |
| 6129 | $C_2H_5O$ | F | F |  | — | 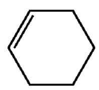 | OCO | F | F | $OC_4H_9$ | |
| 6130 | $C_2H_5O$ | F | F |  | — | 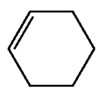 | OCO | F | F | $OC_5H_{11}$ | |
| 6131 | $C_3H_7O$ | F | F | 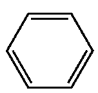 | — | 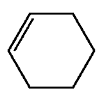 | OCO | F | F | $OCH_3$ | |
| 6132 | $C_3H_7O$ | F | F | 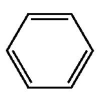 | — | 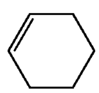 | OCO | F | F | $OC_2H_5$ | |
| 6133 | $C_3H_7O$ | F | F | 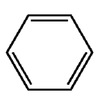 | — | 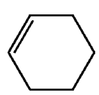 | OCO | F | F | $OC_3H_7$ | |
| 6134 | $C_3H_7O$ | F | F | 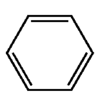 | — | 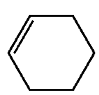 | OCO | F | F | $OC_4H_9$ | |
| 6135 | $C_3H_7O$ | F | F | 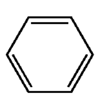 | — | 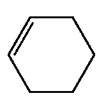 | OCO | F | F | $OC_5H_{11}$ | |

TABLE 408

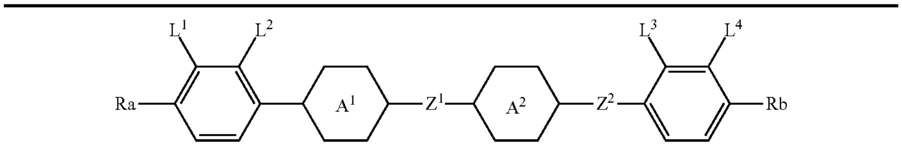

OCO = 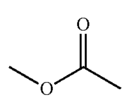

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6136 | $C_4H_9O$ | F | F | 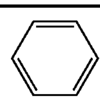 | — | 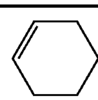 | OCO | F | F | $OCH_3$ | |

TABLE 408-continued
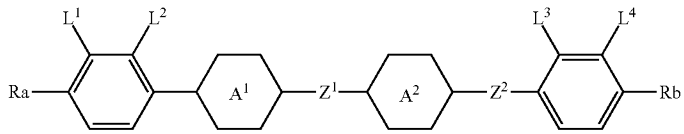
OCO = 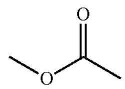
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6137 | $C_4H_9O$ | F | F |  | — | 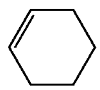 | OCO | F | F | $OC_2H_5$ | |
| 6138 | $C_4H_9O$ | F | F | 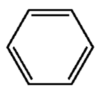 | — | 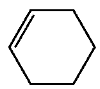 | OCO | F | F | $OC_3H_7$ | |
| 6139 | $C_4H_9O$ | F | F |  | — | 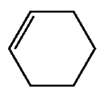 | OCO | F | F | $OC_4H_9$ | |
| 6140 | $C_4H_9O$ | F | F |  | — | 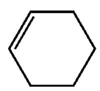 | OCO | F | F | $OC_5H_{11}$ | |
| 6141 | $C_5H_{11}O$ | F | F |  | — | 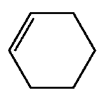 | OCO | F | F | $OCH_3$ | |
| 6142 | $C_5H_{11}O$ | F | F | 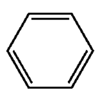 | — | 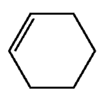 | OCO | F | F | $OC_2H_5$ | |
| 6143 | $C_5H_{11}O$ | F | F | 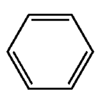 | — | 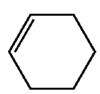 | OCO | F | F | $OC_3H_7$ | |
| 6144 | $C_5H_{11}O$ | F | F | 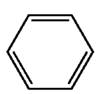 | — | 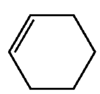 | OCO | F | F | $OC_4H_9$ | |
| 6145 | $C_5H_{11}O$ | F | F | 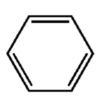 | — | 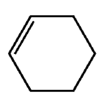 | OCO | F | F | $OC_5H_{11}$ | |
| 6146 | $C_2H_5$ | F | F | 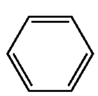 | — | 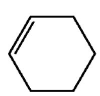 | OCO | F | F | $C_4H_9$ | |
| 6147 | $C_5H_{11}$ | F | F | 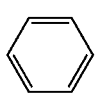 | — | 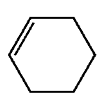 | OCO | F | F | $C_2H_5$ | |
| 6148 | $C_2H_5$ | F | F | 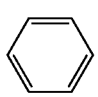 | — | 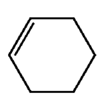 | OCO | F | F | $OC_4H_9$ | |

TABLE 408-continued

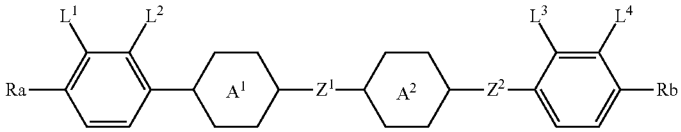

OCO = 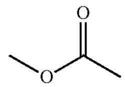

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6149 | $CH_2{=}CH$ | F | F | 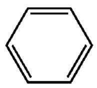 | — | 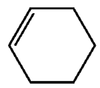 | OCO | F | F | $OC_3H_7$ | |
| 6150 | $CH_2{=}CH$ | F | F | 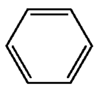 | — | 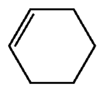 | OCO | F | F | $OC_5H_{11}$ | |

,TABLE 409

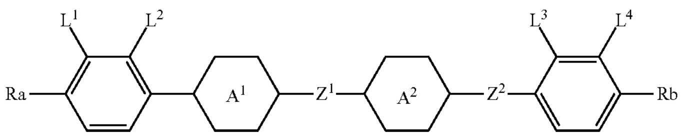

OCO = 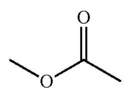

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6151 | $CH_3O$ | F | F | 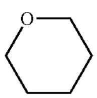 | — | 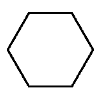 | OCO | F | F | $OCH_3$ | |
| 6152 | $CH_3O$ | F | F | 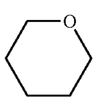 | — | 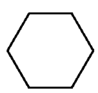 | OCO | F | F | $OC_2H_5$ | |
| 6153 | $CH_3O$ | F | F | 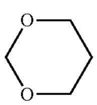 | — | 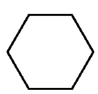 | OCO | F | F | $OC_3H_7$ | |
| 6154 | $CH_3O$ | F | F | 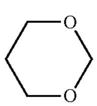 | — | 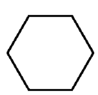 | OCO | F | F | $OC_4H_9$ | |
| 6155 | $CH_3O$ | F | F | 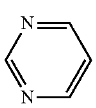 | — | 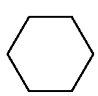 | OCO | F | F | $OC_5H_{11}$ | |
| 6156 | $C_2H_5O$ | F | F | 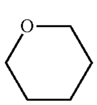 | — | 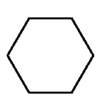 | OCO | F | F | $OCH_3$ | |
| 6157 | $C_2H_5O$ | F | F | 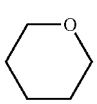 | — | 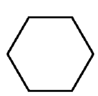 | OCO | F | F | $OC_2H_5$ | |

,TABLE 409-continued
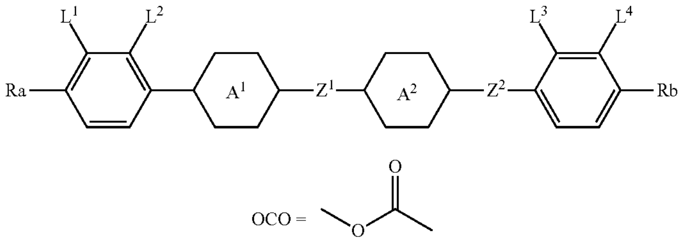
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6158 | $C_2H_5O$ | F | F | 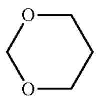 | — | 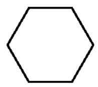 | OCO | F | F | $OC_3H_7$ | |
| 6159 | $C_2H_5O$ | F | F | 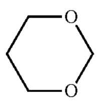 | — | 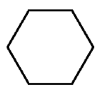 | OCO | F | F | $OC_4H_9$ | |
| 6160 | $C_2H_5O$ | F | F | 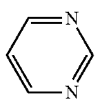 | — | 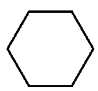 | OCO | F | F | $OC_5H_{11}$ | |
| 6161 | $C_3H_7O$ | F | F | 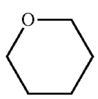 | — | 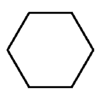 | OCO | F | F | $OCH_3$ | |
| 6162 | $C_3H_7O$ | F | F | 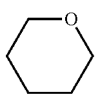 | — | 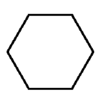 | OCO | F | F | $OC_2H_5$ | |
| 6163 | $C_3H_7O$ | F | F | 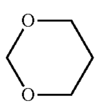 | — | 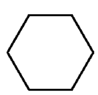 | OCO | F | F | $OC_3H_7$ | |
| 6164 | $C_3H_7O$ | F | F | 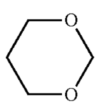 | — | 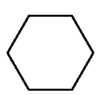 | OCO | F | F | $OC_4H_9$ | |
| 6165 | $C_3H_7O$ | F | F | 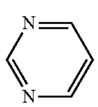 | — | 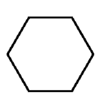 | OCO | F | F | $OC_5H_{11}$ | |
TABLE 410
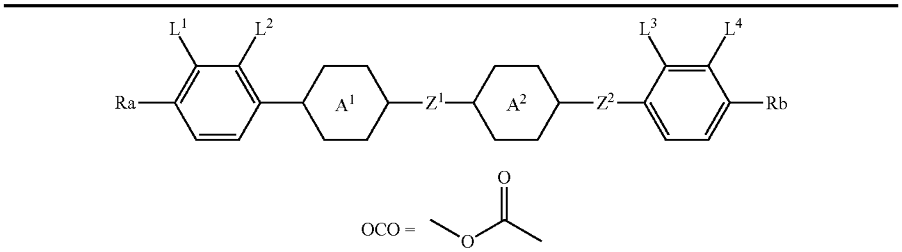
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6166 | $C_4H_9O$ | F | F | 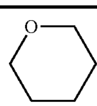 | — | 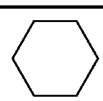 | OCO | F | F | $OCH_3$ | |

TABLE 410-continued
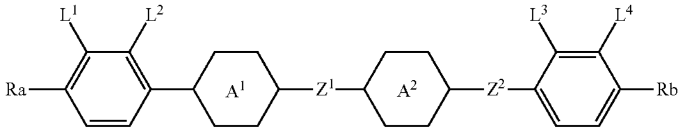
OCO = 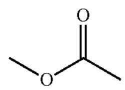
| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6167 | $C_4H_9O$ | F | F | 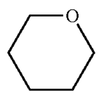 | — | 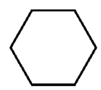 | OCO | F | F | $OC_2H_5$ | |
| 6168 | $C_4H_9O$ | F | F | 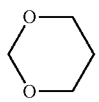 | — | 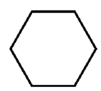 | OCO | F | F | $OC_3H_7$ | |
| 6169 | $C_4H_9O$ | F | F | 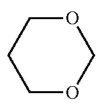 | — | 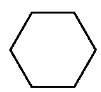 | OCO | F | F | $OC_4H_9$ | |
| 6170 | $C_4H_9O$ | F | F | 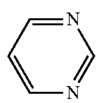 | — | 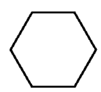 | OCO | F | F | $OC_5H_{11}$ | |
| 6171 | $C_5H_{11}O$ | F | F | 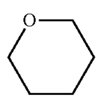 | — | 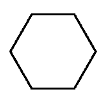 | OCO | F | F | $OCH_3$ | |
| 6172 | $C_5H_{11}O$ | F | F | 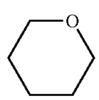 | — | 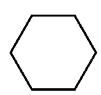 | OCO | F | F | $OC_2H_5$ | |
| 6173 | $C_5H_{11}O$ | F | F | 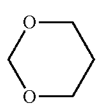 | — | 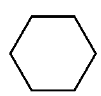 | OCO | F | F | $OC_3H_7$ | |
| 6174 | $C_5H_{11}O$ | F | F | 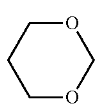 | — | 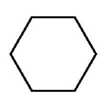 | OCO | F | F | $OC_4H_9$ | |
| 6175 | $C_5H_{11}O$ | F | F | 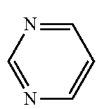 | — | 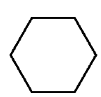 | OCO | F | F | $OC_5H_{11}$ | |
| 6176 | $C_2H_5$ | F | F | 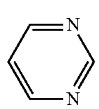 | — | 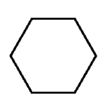 | OCO | F | F | $C_4H_9$ | |
| 6177 | $C_5H_{11}$ | F | F | 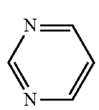 | — | 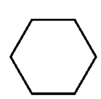 | OCO | F | F | $C_2H_5$ | |
| 6178 | $C_2H_5$ | F | F | 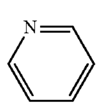 | — | 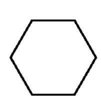 | OCO | F | F | $OC_4H_9$ | |

TABLE 410-continued

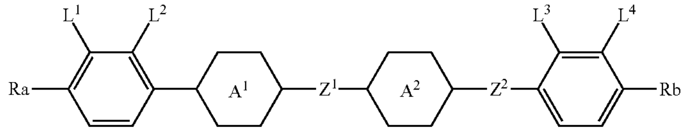

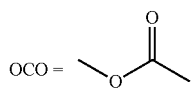

| No. | Ra | $L^1$ | $L^2$ | $A^1$ | $Z^1$ | $A^2$ | $Z^2$ | $L^3$ | $L^4$ | Rb | Physical property values |
|---|---|---|---|---|---|---|---|---|---|---|---|
| 6179 | $CH_2$=CH | F | F | 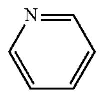 | — | 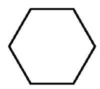 | OCO | F | F | $OC_3H_7$ | |
| 6180 | $CH_2$=CH | F | F | 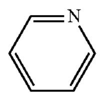 | — | 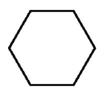 | OCO | F | F | $OC_5H_{11}$ | |

Comparative Example 1 trans-4-Propyl-trans-4'-(2,3-difluoroethoxyphenyl)-1,1'-bicyclohexyl(A) was prepared as a comparative example.

(A)

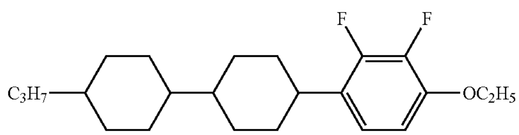

The chemical shift (δ, ppm) in $^1$H-NMR analysis was described below, and the compound obtained was identified as trans-4-propyl-trans-4'-(2,3-difluoroethoxyphenyl)-1,1'-bicyclohexyl (A). The solvent for measurement was $CDCl_3$.

Chemical shift δ (ppm); 6.82 (dd, 1H), 6.64 (dd, 1H), 4.06 (q, 2H), 2.71 (tt, 1H), 1.89-1.79 (m, 4H), 1.79-1.69 (m, 4H), 1.45-1.26 (m, 14H), 1.20-1.04 (m, 4H) and 0.90-0.79 (t, 3H).

The transition temperature of the compound (A) was as follows.

Transition temperature: C 66.9 $S_B$ 79.9 N 185.1 I.

Five compounds described above as the mother liquid crystals (i) were mixed to prepare the mother liquid crystals (i) having a nematic phase. The physical properties of the mother liquid crystals (i) were as follows.

Maximum temperature ($T_{NI}$)=74.6° C.; viscosity ($\eta_{20}$)=18.9 mPa·s; optical anisotropy (Δn)=0.087; and dielectric anisotropy (Δ∈)=−1.3.

The liquid crystal composition (ii) consisting of the mother liquid crystals (i) (85% by weight) and trans-4-propyl-trans-4'-(2,3-difluoroethoxyphenyl)-1,1'-bicyclohexyl (A) prepared (15% by weight) was prepared. The extrapolated values of physical properties of the comparative compound (A) were calculated by measurement of physical properties of the resulting liquid crystal composition (ii) and the extrapolation of the measured values. The values were as follows.

Maximum temperature ($T_{NI}$)=158.7° C.; optical anisotropy (Δn)=0.114; and dielectric anisotropy (Δ∈)=−5.43.

Example 9

Physical Properties of the Liquid Crystal Compound (No. 17)

The liquid crystal composition (iii) consisting of the mother liquid crystals (i) (90% by weight) and 4-(4-ethoxy-2,3-difluorophenyl)-4'-(4-butoxy-2,3-difluorophenyl)-1,1'-bicyclohexyl (No. 17) (10% by weight) obtained in Example 7 was prepared. The extrapolated values of physical properties of the liquid crystal compound (No. 17) were calculated by measurement of physical properties of the resulting liquid crystal composition (iii) and the extrapolation of the measured values. The values were as follows.

Maximum temperature ($T_{NI}$)=212.6° C.; optical anisotropy (Δn)=0.141; and dielectric anisotropy (Δ∈)=−8.18.

From these results, it was found that the liquid crystal compound (No. 17) could increase the maximum temperature ($T_{NI}$), increase the optical anisotropy (Δn) and increase the dielectric anisotropy (Δ∈) negatively of the composition.

It was also found that the liquid crystal compound had a high maximum temperature ($T_{NI}$), a large optical anisotropy (Δn), a large negative dielectric anisotropy (Δ∈), a low melting point in comparison with the comparative compound (A).

Comparative Example 2 trans-4-Pentyl-trans-4"-(2,3-difluoroethoxyphenyl)-1,1',4',1"-tercyclohexyl (C) was prepared as a comparative example.

(C)

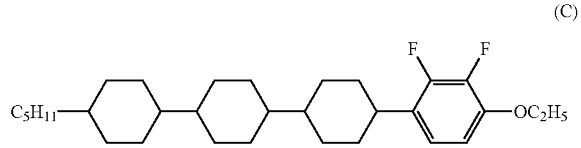

The chemical shift (δ, ppm) in $^1$H-NMR analysis was described below, and the compound obtained was identified as trans-4-pentyl-trans-4"-(2,3-difluoroethoxyphenyl)-1,1',4',1"-tercyclohexyl (C). The solvent for measurement was $CDCl_3$.

Chemical shift δ (ppm); 6.85 (td, 1H), 6.68 (td, 1H), 4.11 (q, 2H), 2.74 (tt, 1H), 1.93-1.82 (m, 4H), 1.82-1.68 (m, 8H), 1.48-1.37 (m, 4H) and 1.37-0.82 (m, 27H).

The transition temperature of the compound (C) was as follows.

Transition temperature: C 71.8 $S_B$ 298.2 N 330.7 I.

The liquid crystal composition (iv) consisting of the mother liquid crystals (i) (97% by weight) and trans-4-pentyl-trans-4"-(2,3-difluoroethoxyphenyl)-1,1',4',1"-tercyclohexyl (C) (3% by weight) prepared was prepared. The extrapolated values of physical properties of the comparative compound (C) were calculated by measurement of physical properties of the resulting liquid crystal composition (iv) and the extrapolation of the measured values. The values were as follows.

Optical anisotropy (Δn)=0.137.

Dielectric anisotropy (Δ∈)=−1.86.

The elastic constant $K_{33}$ of the liquid crystal composition (iv) was 11.31 pN.

Example 10

Physical Properties of the Liquid Crystal Compound (No. 197)

The liquid crystal composition (v) consisting of the mother liquid crystals (i) (97% by weight) and trans-4-[(4'-ethoxy-2',3'-difluoro-1,1'-biphenyl)-4-butoxy-2,3-difluorophenyl] cyclohexane (No. 197) (3% by weight) obtained in Example 7 was prepared. The extrapolated values of physical properties of the liquid crystal compound (No. 197) were calculated by measurement of physical properties of the resulting liquid crystal composition (v) and the extrapolation of the measured values. The values were as follows.

Optical anisotropy (Δn)=0.240.

Dielectric anisotropy (Δ∈)=−8.81.

The elastic constant $K_{33}$ of the liquid crystal composition (v) was 13.97 pN.

From these results, it was found that the liquid crystal compound (No. 197) could increase the maximum temperature ($T_{NI}$), increase the optical anisotropy (Δn) and increase the dielectric anisotropy (Δ∈) negatively of the composition.

It was also found that the liquid crystal compound had a large optical anisotropy (Δn), a large negative dielectric anisotropy (Δ∈) and a large elastic constant $K_{33}$ in comparison with the comparative compound (C).

Comparative Example 3

4-Ethoxy-4'"-pentyl-2'",3'",2,3-tetrafluoro-1,1',4',1",4", 1'"-quaterphenyl (F) that is similar to the compound (D) was prepared as a comparative example.

(F)

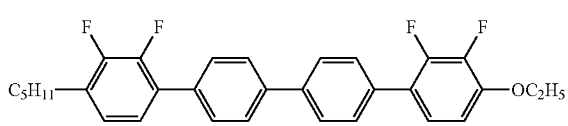

The chemical shift (δ, ppm) in $^1$H-NMR analysis was described below, and the compound obtained was identified as 4-ethoxy-4'"-pentyl-2'",3'",2,3-tetrafluoro-1,1',4',1",4", 1'"-quaterphenyl (F). The solvent for measurement was $CDCl_3$.

Chemical shift δ (ppm); 7.22 (m, 4H), 7.62 (m, 4H), 7.15 (m, 2H), 7.01 (t, 1H), 6.82 (t, 1H), 4.17 (q, 2H), 2.70 (t, 2H), 1.66 (m, 2H), 1.49 (t, 3H), 1.37 (m, 4H) and 0.93 (m, 3H).

The transition temperature of the compound (F) was as follows.

Transition temperature: C 149.8 N 306.7 I.

The liquid crystal composition (v) consisting of the mother liquid crystals (i) (95% by weight) and 4-ethoxy-4'"-pentyl-2'",3'",2,3-tetrafluoro-1,1',4',1",4",1'"-quaterphenyl (F) (5% by weight) prepared was prepared. The extrapolated values of physical properties of the comparative compound (F) were calculated by measurement of physical properties of the resulting liquid crystal composition (v) and the extrapolation of the measured values. The values were as follows.

Dielectric anisotropy (Δ∈)=−6.05.

The elastic constant $K_{33}$ of the liquid crystal composition (v) was 15.78 pN.

Comparative Example 4

4-Ethoxy-4'"-pentyl-2'",2,3-trifluoro-1,1',4',1",4",1'"-quaterphenyl (G) that is similar to the compound (D) was prepared as a comparative example.

(G)

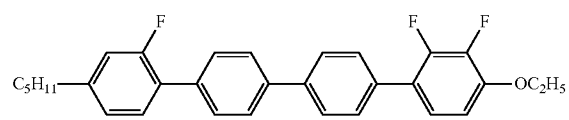

The chemical shift (δ, ppm) in $^1$H-NMR analysis was described below, and the compound obtained was identified as 4-ethoxy-4'"-pentyl-2'",2,3-trifluoro-1,1',4',1",4",1'"-quaterphenyl (F). The solvent for measurement was $CDCl_3$ Chemical shift δ (ppm); 7.71 (m, 4H), 7.64 (d, 2H), 7.60 (d, 2H), 7.40 (t, 1H), 7.16 (t, 1H), 7.05 (d, 1H), 7.00 (d, 1H), 6.82 (t, 1H), 4.17 (q, 2H), 2.65 (t, 2H), 1.66 (m, 2H), 1.49 (t, 3H), 1.36 (m, 4H) and 0.92 (m, 3H).

The transition temperature of the compound (G) was as follows.

Transition temperature: C 138.7 $S_A$ 180.2 N 307.8 I.

The liquid crystal composition (v) consisting of the mother liquid crystals (i) (95% by weight) and 4-ethoxy-4'"-pentyl-2'",2,3-trifluoro-1,1',4',1",4",1'"-quaterphenyl (G) (5% by weight) prepared was prepared. The extrapolated values of physical properties of the comparative compound (G) were calculated by measurement of physical properties of the resulting liquid crystal composition (v) and the extrapolation of the measured values. The values were as follows.

Dielectric anisotropy (A)=−5.20.

The elastic constant $K_{33}$ of the liquid crystal composition (v) was 15.40 pN.

Comparative Example 5

4-Ethoxy-4'''-pentyl-3''',2,3-trifluoro-1,1',4',1'',4'',1'''-quaterphenyl (H) that is similar to the compound (D) was prepared as a comparative example.

(H)

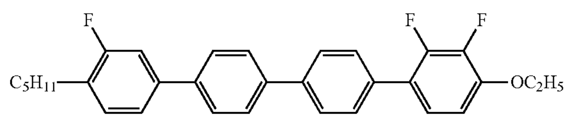

The chemical shift (δ, ppm) in $^1$H-NMR analysis was described below, and the compound obtained was identified as 4-ethoxy-4'''-pentyl-3''',2,3-trifluoro-1,1',4',1'',4'',1'''-quaterphenyl (H). The solvent for measurement was $CDCl_3$.

Chemical shift δ (ppm); 7.71 (dd, 4H), 7.64 (d, 2H), 7.60 (d, 2H), 7.35 (dd, 1H), 7.30 (dd, 1H), 7.26 (t, 1H), 7.15 (td, 1H), 6.82 (t, 1H), 4.17 (q, 2H), 2.68 (t, 2H), 1.66 (m, 2H), 1.49 (t, 3H), 1.37 (m, 4H) and 0.92 (m, 3H).

The transition temperature of the compound (H) was as follows.

Transition temperature: C 154.0 $S_A$ 297.4 N 319.3 I.

The liquid crystal composition (v) consisting of the mother liquid crystals (i) (95% by weight) and 4-ethoxy-4'''-pentyl-3''',2,3-trifluoro-1,1',4',1'',4'',1'''-quaterphenyl (H) (5% by weight) prepared was prepared. The extrapolated values of physical properties of the comparative compound (H) were calculated by measurement of physical properties of the resulting liquid crystal composition (v) and the extrapolation of the measured values. The values were as follows.

Dielectric anisotropy (Δ∈)=−3.46.

The elastic constant $K_{33}$ of the liquid crystal composition (v) was 15.32 pN.

Example 11

Physical Properties of the Liquid Crystal Compound (No. 17)

The liquid crystal composition (vi) consisting of the mother liquid crystals (i) (90% by weight) and 4-(4-ethoxy-2,3-difluorophenyl)-4'-(4-butoxy-2,3-difluorophenyl)-1,1'-bicyclohexyl (No. 17) (10% by weight prepared in Example 7 was prepared. The extrapolated values of physical properties of liquid crystal compound (No. 17) were calculated by measurement of physical properties of the resulting liquid crystal composition (vi) and the extrapolation of the measured values. The values were as follows.

Dielectric anisotropy (Δ∈)=−8.18.

The elastic constant $K_{33}$ of the liquid crystal composition (v) was 17.45 pN.

From these results, it was found that the liquid crystal compound (No. 17) could decrease the melting point, increase the dielectric anisotropy (Δ∈) negatively and increase the elastic constant $K_{33}$ of the composition.

It was also found that the liquid crystal compound a large negative dielectric anisotropy (Δ∈), a low melting point, a large elastic constant $K_{33}$ in comparison with the comparative compound (F), (G) or (H).

Comparative Example 6

4-Ethoxy-2,3,2'',3''-tetrafluoro-4''-(4-pentylphenylethyl)-1,1''-terphenyl (I) that is similar to the compound (E) was prepared as a comparative example.

(I)

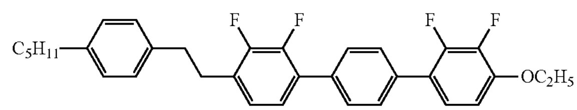

The chemical shift (δ, ppm) in $^1$H-NMR analysis was described below, and the compound obtained was identified as 4-ethoxy-2,3,2'',3''-tetrafluoro-4''-(4-pentylphenylethyl)-1,1''-terphenyl (I). The solvent for measurement was $CDCl_3$.

Chemical shift δ (ppm); 7.60 (dd, 4H), 7.18-7.10 (m, 6H), 6.97 (t, 1H), 6.82 (td, 1H), 4.18 (q, 2H), 3.00 (m, 2H), 2.93 (m, 2H), 2.58 (t, 2H), 1.61 (m, 2H), 1.49 (t, 3H), 1.39-1.27 (m, 4H) and 0.89 (t, 3H).

The transition temperature of the compound (I) was as follows.

Transition temperature: C 146.1 N 209.0 I.

The liquid crystal composition (vi) consisting of the mother liquid crystals (i) (95% by weight) and 4-ethoxy-2,3,2'',3''-tetrafluoro-4''-(4-pentylphenylethyl)-1,1''-terphenyl (I) (5% by weight) prepared was prepared. The extrapolated values of physical properties of the comparative compound (I) was calculated by measurement of physical properties of the resulting liquid crystal composition (vi) and the extrapolation of the measured values. The values were as follows.

Dielectric anisotropy (Δ∈)=−4.33.

Viscosity (η)=139.3 mPa·s

The elastic constant $K_{33}$ of the liquid crystal composition (vi) was 14.37 pN.

Example 12

Physical Properties of the Liquid Crystal Compound (No. 3227)

The liquid crystal composition (vii) consisting of the mother liquid crystals (i) (95% by weight) and 1-butoxy-trans-4-(4-(4-(4-ethoxy-2,3-difluorophenyl)phenyl)cyclohexyl)-2,3-difluorobenzene (No. 3227) (5% by weight) prepared in Example 7 was prepared. The extrapolated values of physical properties of the liquid crystal compound (No. 3227) were calculated by measurement of physical properties of the resulting liquid crystal composition (vii) and the extrapolation of the measured values. The values were as follows.

Dielectric anisotropy (Δ∈)=−8.04; and viscosity (η)=78.8 mPa·s.

The elastic constant $K_{33}$ of the liquid crystal composition (vii) was 14.8 pN.

From these results, it was found that the liquid crystal compound (No. 3227) could decrease the melting point, increase the maximum temperature ($T_{NI}$), increase the optical anisotropy (Δn), decrease the viscosity (η), and increase the dielectric anisotropy (Δ∈) negatively of the composition.

It was also found that the liquid crystal compound had a large negative dielectric anisotropy (Δ∈), a low melting point, a small viscosity (η), a large elastic constant $K_{33}$ in comparison with the comparative compound (I).

Examples of the Liquid Crystal Composition

Hereinafter, the liquid crystal compositions obtained by means of the invention will be explained in detail by way of examples. Liquid crystal compounds used in the examples are expressed as symbols according to the notations in the Table below. In the Table, 1,4-cyclohexylene has a trans-configuration. The ratio (percentage) of each compound means a weight percentage (% by weight) based on the total weight of the liquid crystal composition, unless otherwise indicated. The values of characteristics of the liquid crystal composition obtained are shown in the last part of each example.

A number described next to the name of a liquid crystal compound in each example corresponds to that of the formula of the liquid crystal compound used for the first to third components of the invention described above. When only the symbol "-" is given instead of the number of a formula, it means another compound, which is different from that of the components.

The notations using symbols for compounds are shown below.

TABLE 411

| Method of Description of Compounds using Symbols $R\text{-}(A_1)\text{-}Z_1\text{-} \ldots \text{-}Z_n\text{-}(A_n)\text{-}R'$ | |
|---|---|
| 1) Left-terminal Group R- | Symbol |
| $C_nH_{2n+1}$— | n- |
| $C_nH_{2n+1}O$— | nO- |
| $C_mH_{2m+1}OC_nH_{2n}$- | mOn- |
| $CH_2$═CH— | V- |
| $C_nH_{2n+1}$—CH═CH— | nV- |
| $CH_2$═CH—$C_nH_{2n}$— | Vn- |
| $C_mH_{2m+1}$—CH═CH—$C_nH_{2n}$— | mVn- |
| $CF_2$═CH— | VFF- |
| $CF_2$═CH—$C_nH_{2n}$— | VFFn- |
| 2) Right-terminal Group -R' | Symbol |
| —$C_nH_{2n+1}$ | -n |
| —$OC_nH_{2n+1}$ | -On |
| —CH═$CH_2$ | -V |
| —CH═CH—$C_nH_{2n+1}$ | -Vn |
| —$C_nH_{2n}$—CH═$CH_2$ | -nV |
| —CH═$CF_2$ | -VFF |
| —$COOCH_3$ | -EMe |
| 3) Bonding Group -$Z_n$- | Symbol |
| —$C_nH_{2n}$— | n |
| —COO— | E |
| —OCO— | e |
| —CH═CH— | V |
| —$CH_2O$— | 1O |
| —$OCH_2$— | O1 |
| —$CF_2O$— | X |
| 4) Ring Structure -$A_n$- | Symbol |
| 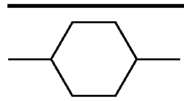 | H |
| 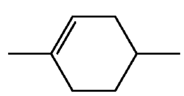 | Ch |
| 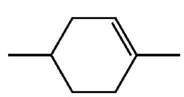 | ch |
| 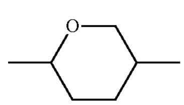 | Dh |
| 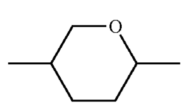 | dh |

TABLE 411-continued
| Method of Description of Compounds using Symbols $R-(A_1)-Z_1- \ldots -Z_n-(A_n)-R'$ | |
|---|---|
| 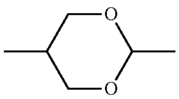 | G |
|  | B |
| 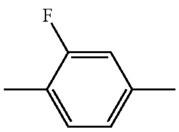 | B(2F) |
| 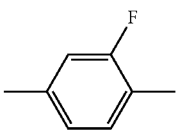 | B(3F) |
| 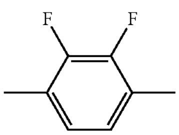 | B(2F,3F) |
| 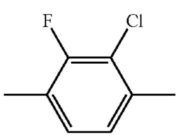 | B(2F,3CL) |
| 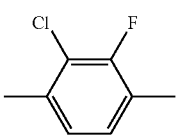 | B(2CL,3F) |
| 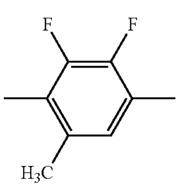 | B(2F,3F,6Me) |
5) Examples of Description
Example 1. 4O-B(2F,3F)BO1HB(2F,3F)-O2
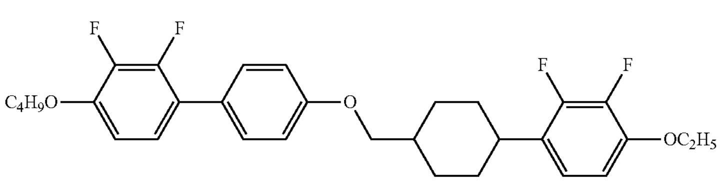

TABLE 411-continued

| Method of Description of Compounds using Symbols $R-(A_1)-Z_1-\ldots-Z_n-(A_n)-R'$ |
|---|
| Example 2. 4O-B(2F,3F)-H2BB(2F,3F)-O2 |
| 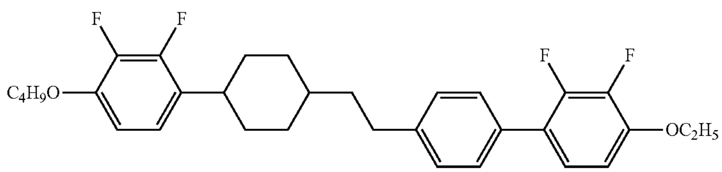 |
| Example 3. 5-HBB(3F)B-3 |
| 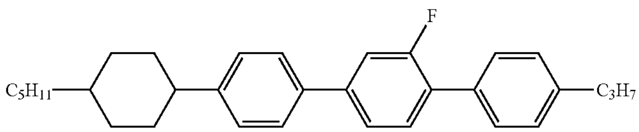 |
| Example 4. 5-HBB(2F,3F)-O2 |
| 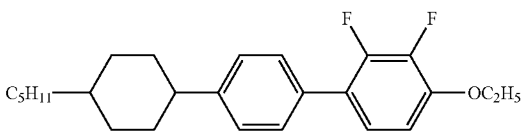 |

Characteristics were measured according to the following methods. Most are methods described in the Standards of Electronic Industries Association of Japan, EIAJ•ED-2521 A, or the methods with some modifications.

(1) Maximum Temperature of a Nematic Phase (NI; ° C.)

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

(2) Minimum Temperature of a Nematic Phase (Tc; ° C.)

A sample having a nematic phase was in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≦−20° C. A lower limit of the temperature range of a nematic phase may be abbreviated to "the minimum temperature."

(3) Optical Anisotropy (Δn; measured at 25° C.)

Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

(4) Viscosity (η; measured at 20° C.; mPa·s)

An E-type viscometer was used for measurement.

(5) Dielectric Anisotropy (Δ∈; measured at 25° C.)

An ethanol (20 mL) solution of octadecyltriethoxysilane (0.16 mL) was applied to well-washed glass substrates. The glass substrates were rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film obtained on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈∥) in the major axis direction of the liquid crystal molecules was measured.

The sample (the liquid crystal composition or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured. The value of the dielectric anisotropy was calculated from the equation: Δ∈=∈∥−∈⊥. A composition in which this value is negative has negative dielectric anisotropy.

(6) Voltage Holding Ratio (VHR; Measured at 25° C. and 100° C.; %)

A TN device was prepared by putting a sample in a cell having a polyimide alignment film, where the distance between two glass substrates (cell gap) was 6 micrometers. The TN device was charged at 25° C. by applying pulse voltage (60 microseconds at 5V). The waveforms of the voltage applied to the TN device were observed with a cathode ray oscilloscope and the area between the voltage curve and the axis of abscissa in a unit period (16.7 milliseconds) was measured. An area was similarly measured based on the waveform of the applied voltage after the TN device had been removed. The value of the voltage holding ratio (%) was calculated from the equation of (voltage holding ratio)=(value of the area in the presence of a TN device)/(value of the area in the absence of a TN device)×100.

The voltage holding ratio thus obtained was referred to as "VHR-1." Then, the TN device was heated at 100° C. for 250 hours. After the TN device had been allowed to return to 25° C., the voltage holding ratio was measured by a method similar to that described above. The voltage holding ratio obtained after the heating test was referred to as "VHR-2." The heating test means an acceleration test and was used as a test corresponding to a long-term durability test for the TN device.

Example 13

| | | |
|---|---|---|
| 4O-B (2F, 3F) BO1HB (2F, 3F)-O2 | (No. 1539) | 3% |
| 4O-B (2F, 3F) H2BB (2F, 3F)-O2 | (No. 647) | 5% |
| 4O-B (2F, 3F) H2HB (2F, 3F)-O2 | (No. 467) | 3% |
| 2-HH-5 | (2-1) | 5% |
| 3-HH-4 | (2-1) | 10% |
| 3-HH-5 | (2-1) | 6% |
| 5-HB-O2 | (2-4) | 10% |
| V-HHB-1 | (2-25) | 10% |
| 3-H2B (2F, 3F)-O2 | (3-3) | 5% |
| 5-H2B (2F, 3F)-O2 | (3-3) | 10% |
| 2-HBB (2F, 3F)-O2 | (3-33) | 9% |
| 3-HBB (2F, 3F)-O2 | (3-33) | 12% |
| 5-HBB (2F, 3F)-O2 | (3-33) | 12% |

NI = 103.4° C.; TC ≦ −20° C.; Δn = 0.118; η = 28.1 mPa · s; Δε = −3.5.

Example 14

| | | |
|---|---|---|
| 4O-B (2F, 3F) HH1OB (2F, 3F)-O2 | (No. 3677) | 5% |
| 4O-B (2F, 3F) BeHB (2F, 3F)-O2 | (No. 2769) | 5% |
| 3-HH-4 | (2-1) | 5% |
| 3-HH-5 | (2-1) | 5% |
| 3-HH-O1 | (2-1) | 10% |
| 3-HB-O2 | (2-4) | 10% |
| V2-HHB-1 | (2-25) | 15% |
| V-HB (2F, 3F)-O2 | (3-1) | 10% |
| 3-H2B (2F, 3F)-O2 | (3-3) | 2% |
| 5-HHB (2F, 3F)-O2 | (3-29) | 10% |
| 2-HBB (2F, 3F)-O2 | (3-33) | 5% |
| 3-HBB (2F, 3F)-O2 | (3-33) | 10% |
| 5-HBB (2F, 3F)-O2 | (3-33) | 8% |

NI = 102.7° C.; Δn = 0.108; η = 28.1 mPa · s; Δε = −3.4.

Example 15

| | | |
|---|---|---|
| 4O-B (2F, 3F) ChchB (2F, 3F)-O2 | (No. 407) | 5% |
| 4O-B (2F, 3F) HchB (2F, 3F)-O2 | (No. 377) | 5% |
| 4O-B (2F, 3F) HHB (2F, 3F)-O2 | (No. 17) | 5% |
| 3-HH-4 | (2-1) | 10% |
| 3-HH-5 | (2-1) | 5% |
| 5-HB-3 | (2-4) | 5% |
| 3-HB-O2 | (2-4) | 10% |
| 5-HB-O2 | (2-4) | 10% |
| 3-H2B (2F, 3F)-O2 | (3-3) | 10% |
| 5-HHB (2F, 3F)-O2 | (3-29) | 10% |
| 3-HBB (2F, 3F)-O2 | (3-33) | 10% |

-continued

| | | |
|---|---|---|
| 5-HBB (2F, 3F)-O2 | (3-33) | 10% |
| 3-HHB (2F, 3CL)-O2 | (3-59) | 5% |

NI = 103.7° C; Δn = 0.110; η = 29.6 mPa · s; Δε = −3.9.

Example 16

| | | |
|---|---|---|
| 4O-B (2F, 3F) HHB (2F, 3F)-O2 | (No. 17) | 5% |
| 4O-B (2F, 3F) BH2B (2F, 3F)-O2 | (No. 3407) | 5% |
| 2-HH-5 | (2-1) | 5% |
| 3-HH-4 | (2-1) | 5% |
| 3-HB-O1 | (2-4) | 5% |
| 3-HHB-1 | (2-25) | 10% |
| 3-HHB-3 | (2-25) | 10% |
| 3-HB (2F, 3F)-O2 | (3-1) | 10% |
| 3-H2B (2F, 3F)-O2 | (3-3) | 5% |
| 5-H2B (2F, 3F)-O2 | (3-3) | 10% |
| 3-HBB (2F, 3F)-O2 | (3-33) | 10% |
| 5-HBB (2F, 3F)-O2 | (3-33) | 10% |
| 2-BB (2F, 3F) B-4 | (3-57) | 5% |
| 3-HHB (2F, 3CL)-O2 | (3-59) | 5% |

Example 17

| | | |
|---|---|---|
| 4O-B (2F, 3F) HH2B (2F, 3F)-O2 | (No. 3047) | 7% |
| 4O-B (2F, 3F) HB2B (2F, 3F)-O2 | (No. 3227) | 8% |
| 2-HH-3 | (2-1) | 10% |
| 2-H2H-3 | (2-2) | 5% |
| 3-HB-O1 | (2-4) | 5% |
| 3-HHB-O1 | (2-25) | 5% |
| 3-HBB-2 | (2-35) | 5% |
| 3-HHEH-3 | (2-46) | 5% |
| 3-HB (2F, 3F)-O2 | (3-1) | 8% |
| 3-H2B (2F, 3F)-O2 | (3-3) | 10% |
| 3-HBB (2F, 3F)-O2 | (3-33) | 6% |
| 5-HBB (2F, 3F)-O2 | (3-33) | 10% |
| 3-HHB (2F, 3CL)-O2 | (3-59) | 5% |
| 3-HHB (2F, 3CL)-O2 | (3-59) | 5% |
| 4-HBB (2F, 3CL)-O2 | (3-63) | 3% |
| 3-HBB (2CL, 3F)-O2 | (3-93) | 3% |

NI = 102.5° C.; Δn = 0.108; η = 36.2 mPa · s; Δε = −3.8.

Example 18

| | | |
|---|---|---|
| 4O-B (2F, 3F) BO1HB (2F, 3F)-O2 | (No. 1539) | 3% |
| 4O-B (2F, 3F) H2BB (2F, 3F)-O2 | (No. 647) | 5% |
| 4O-B (2F, 3F) H2HB (2F, 3F)-O2 | (No. 467) | 3% |
| 3-HH-4 | (2-1) | 10% |
| 3-HB-O2 | (2-4) | 10% |
| 2-BBB (2F)-3 | (2-43) | 5% |
| 2-BBB (2F)-5 | (2-43) | 5% |
| 3-HBBH-5 | (2-69) | 5% |
| 1O1-HBBH-4 | (2-69) | 4% |
| 5-HB (2F, 3F)-O2 | (3-1) | 10% |
| 3-H2B (2F, 3F)-O2 | (3-3) | 10% |
| 5-H2B (2F, 3F)-O2 | (3-3) | 10% |
| V-HHB (2F, 3F)-O2 | (3-29) | 10% |
| 5-HHB (2F, 3F)-O2 | (3-29) | 10% |

NI = 101.2° C.; Δn = 0.118; η = 31.5 mPa · s; Δε = −3.5.

The helical pitch was 60.7 micrometers, when 0.25 part of the compound (Op-05) was added to 100 parts of the preceding composition.

Example 19

| | | |
|---|---|---|
| 4O-B (2F, 3F) HH1OB (2F, 3F)-O2 | (No. 3677) | 5% |
| 4O-B (2F, 3F) BeHB (2F, 3F)-O2 | (No. 2769) | 5% |
| 2-HH-5 | (2-1) | 5% |
| 3-HH-4 | (2-1) | 10% |
| 3-HH-5 | (2-1) | 5% |
| 1V-HBB-2 | (2-35) | 5% |
| 2-BB (3F) B-3 | (2-44) | 5% |
| 2-BB (3F) B-5 | (2-44) | 5% |
| 3-HB (2F, 3F)-O2 | (3-1) | 12% |
| 5-HB (2F, 3F)-O2 | (3-1) | 12% |
| 3-HH2B (2F, 3F)-O2 | (3-30) | 12% |
| 3-HBB (2F, 3F)-O2 | (3-33) | 7% |
| 3-HHB (2F, 3CL)-O2 | (3-59) | 6% |
| 3-HBB (2F, 3CL)-O2 | (3-63) | 6% |

NI = 101.3° C.; Δn = 0.118; η = 32.5 mPa · s; Δε = −3.6.

Example 20

| | | |
|---|---|---|
| 4O-B (2F, 3F) ChchB (2F, 3F)-O2 | (No. 407) | 5% |
| 4O-B (2F, 3F) HchB (2F, 3F)-O2 | (No. 377) | 5% |
| 4O-B (2F, 3F) HHB (2F, 3F)-O2 | (No. 17) | 5% |
| 3-HH-4 | (2-1) | 10% |
| 3-HH-5 | (2-1) | 7% |
| V-HHB-1 | (2-25) | 6% |
| V2-BB (3F) B-1 | (2-44) | 5% |
| 3-HHEH-3 | (2-46) | 5% |
| 3-HHEH-5 | (2-46) | 5% |
| 3-HB (2F, 3F)-O2 | (3-1) | 10% |
| 5-HB (2F, 3F)-O2 | (3-1) | 10% |
| 5-HB (2F, 3CL)-O2 | (3-10) | 5% |
| 3-HB (2CL, 3F)-O2 | (3-19) | 5% |
| 5-HHB (2F, 3F)-O2 | (3-29) | 5% |
| 3-HH2B (2F, 3F)-O2 | (3-30) | 12% |

NI = 102.4° C.; Δn = 0.097; η = 31.5 mPa · s; Δε = −3.6.

Example 21

| | | |
|---|---|---|
| 4O-B (2F, 3F) BH2B (2F, 3F)-O2 | (No. 3407) | 5% |
| 4O-B (2F, 3F) HH2B (2F, 3F)-O2 | (No. 3047) | 5% |
| 3-HH-4 | (2-1) | 12% |
| 3-HB-O1 | (2-4) | 10% |
| 3-HBB-2 | (2-35) | 5% |
| 3-HBBH-5 | (2-69) | 7% |
| 1O1-HBBH-4 | (2-69) | 5% |
| 3-HB (2F, 3F)-O2 | (3-1) | 10% |
| 3-H2B (2F, 3F)-O2 | (3-3) | 5% |
| 5-H2B (2F, 3F)-O2 | (3-3) | 10% |
| 3-HB (2F, 3CL)-O2 | (3-10) | 3% |
| 5-HB (2F, 3CL)-O2 | (3-10) | 3% |
| V-HHB (2F, 3F)-O2 | (3-29) | 5% |
| 5-HHB (2F, 3F)-O2 | (3-29) | 10% |
| 3-HHB (2F, 3CL)-O2 | (3-59) | 5% |

Example 22

| | | |
|---|---|---|
| 4O-B (2F, 3F) HH2B (2F, 3F)-O2 | (No. 3047) | 8% |
| 4O-B (2F, 3F) HB2B (2F, 3F)-O2 | (No. 3227) | 7% |
| 2-HH-3 | (2-1) | 10% |
| 3-HH-4 | (2-1) | 8% |
| 3-HB-O2 | (2-4) | 10% |
| 3-HHEBH-3 | (2-74) | 5% |
| 3-HHEBH-5 | (2-74) | 3% |
| 3-HB (2F, 3F)-O2 | (3-1) | 10% |
| 3-H2B (2F, 3F)-O2 | (3-3) | 10% |
| 2-HHB (2F, 3F)-1 | (3-29) | 5% |
| 3-HBB (2F, 3F)-O2 | (3-33) | 5% |
| 5-HBB (2F, 3F)-O2 | (3-33) | 4% |
| 3-HHB (2F, 3CL)-O2 | (3-59) | 5% |
| 3-HBB (2F, 3CL)-O2 | (3-63) | 5% |
| 4-HBB (2F, 3CL)-O2 | (3-63) | 5% |

NI = 101.2° C.; Δn = 0.102; η = 33.5 mPa · s; Δε = −3.6.

Example 23

| | | |
|---|---|---|
| 4O-B (2F, 3F) H2BB (2F, 3F)-O2 | (No. 647) | 5% |
| 4O-B (2F, 3F) HH1OB (2F, 3F)-O2 | (No. 3677) | 5% |
| 2-HH-3 | (2-1) | 10% |
| 3-HH-4 | (2-1) | 10% |
| 3-H2H-V | (2-2) | 5% |
| 3-HHEBH-3 | (2-74) | 5% |
| 3-HHEBH-5 | (2-74) | 5% |
| 5-HB (2F, 3F)-O2 | (3-1) | 5% |
| V-HB (2F, 3F)-O2 | (3-1) | 4% |
| 3-H2B (2F, 3F)-O2 | (3-3) | 10% |
| 5-H2B (2F, 3F)-O2 | (3-3) | 5% |
| 3-HBB (2F, 3F)-O2 | (3-33) | 5% |
| 5-HBB (2F, 3F)-O2 | (3-33) | 8% |
| 2-BB (2F, 3F) B-3 | (3-57) | 8% |
| 3-HHB (2F, 3CL)-O2 | (3-59) | 5% |
| 3-HBB (2F, 3CL)-O2 | (3-63) | 5% |

NI = 101.2° C.; Δn = 0.106; η = 29.6 mPa · s; Δε = −3.5.

Example 24

| | | |
|---|---|---|
| 4O-B (2F, 3F) BO1HB (2F, 3F)-O2 | (No. 1539) | 5% |
| 4O-B (2F, 3F) H2HB (2F, 3F)-O2 | (No. 467) | 5% |
| 3-HH-4 | (2-1) | 10% |
| 5-HB-3 | (2-4) | 5% |
| 3-HB-O1 | (2-4) | 10% |
| 2-BB (3F) B-3 | (2-44) | 5% |
| 5-HBB (3F) B-2 | (2-73) | 5% |
| 3-H2B (2F, 3F)-O2 | (3-3) | 10% |
| 5-H2B (2F, 3F)-O2 | (3-3) | 10% |
| V-HHB (2F, 3F)-O2 | (3-29) | 5% |
| 3-HHB (2F, 3F)-O2 | (3-29) | 10% |
| 5-HHB (2F, 3F)-O2 | (3-29) | 10% |
| 5-HBB (2F, 3F)-O2 | (3-33) | 10% |

NI = 101.8° C.; Δn = 0.117; η = 33.2 mPa · s; Δε = −3.6.

Example 25

| | | |
|---|---|---|
| 4O-B (2F, 3F) HH2B (2F, 3F)-O2 | (No. 3047) | 7% |
| 4O-B (2F, 3F) HB2B (2F, 3F)-O2 | (No. 3227) | 8% |

-continued

| | | |
|---|---|---|
| 2-HH-3 | (2-1) | 10% |
| 2-H2H-3 | (2-2) | 5% |
| 3-HB-O1 | (2-4) | 5% |
| 3-HHB-1 | (2-25) | 5% |
| 3-HHB-O1 | (2-25) | 5% |
| 3-HBB-2 | (2-35) | 5% |
| 3-HHEH-3 | (2-46) | 5% |
| 3-HB (2F, 3F)-O2 | (3-1) | 8% |
| 3-H2B (2F, 3F)-O2 | (3-3) | 8% |
| 3-HBB (2F, 3F)-O2 | (3-33) | 3% |
| 3-HHB (2F, 3CL)-O2 | (3-59) | 5% |
| 3-HBB (2F, 3CL)-O2 | (3-63) | 3% |
| 3-HBB (2CL, 3F)-O2 | (3-93) | 3% |
| 3-DhHB (2F, 3F)-O2 | (g-1) | 5% |
| 3-HDhB (2F, 3F)-O2 | (g-1) | 5% |
| 3-dhBB (2F, 3F)-O2 | (g-1) | 5% |

NI = 102.6° C.; Δn = 0.104; η = 35.6 mPa · s; Δϵ = −3.7.

Example 26

| | | |
|---|---|---|
| 4O-B (2F, 3F) HH2B(2F, 3F)-O2 | (No. 3047) | 8% |
| 4O-B (2F, 3F) HB2B(2F, 3F)-O2 | (No. 3227) | 7% |
| 2-HH-3 | (2-1) | 10% |
| 3-HH-5 | (2-1) | 8% |
| 3-HB-O2 | (2-4) | 10% |
| 3-HHEBH-3 | (2-74) | 5% |
| 3-HHEBH-5 | (2-74) | 4% |
| 3-HB (2F, 3F)-O2 | (3-1) | 10% |
| 3-H2B (2F, 3F)-O2 | (3-3) | 10% |
| 2-HHB (2F, 3F)-1 | (3-29) | 3% |
| 5-HBB (2F, 3F)-O2 | (3-33) | 5% |
| 3-HHB (2F, 3CL)-O2 | (3-59) | 5% |
| 4-HBB (2F, 3CL)-O2 | (3-63) | 5% |
| 3-HH1OB (2F, 3F)-O2 | (3-31) | 5% |
| 3-HH1OB (2F, 3F, 6Me)-O2 | (-) | 5% |

NI = 102.4° C.; Δn = 0.096; η = 32.3 mPa · s; Δϵ = −3.7.

Example 27

| | | |
|---|---|---|
| 4O-B (2F, 3F) HB2B (2F, 3F)-O2 | (No. 3227) | 8% |
| 2-HH-3 | (2-1) | 10% |
| 2-H2H-3 | (2-2) | 5% |
| 3-HB-O1 | (2-4) | 5% |
| 3-HHB-1 | (2-25) | 5% |
| 3-HHB-O1 | (2-25) | 5% |
| 3-HBB-2 | (2-35) | 5% |
| 3-HHEH-3 | (2-46) | 5% |
| 3-HB (2F, 3F)-O2 | (3-1) | 8% |
| 3-H2B (2F, 3F)-O2 | (3-3) | 8% |
| 3-HBB (2F, 3F)-O2 | (3-33) | 3% |
| 3-HHB (2F, 3CL)-O2 | (3-59) | 5% |
| 3-HBB (2F, 3CL)-O2 | (3-63) | 3% |
| 3-HBB (2CL, 3F)-O2 | (3-93) | 3% |
| 3-DhHB (2F, 3F)-O2 | (g-1) | 5% |
| 3-HDhB (2F, 3F)-O2 | (g-1) | 5% |
| 3-dhBB (2F, 3F)-O2 | (g-1) | 5% |
| 5-HB (3F) BB (2F, 3F)-O2 | (i-1) | 7% |

Example 28

| | | |
|---|---|---|
| 4O-B (2F, 3F) HHeB (2F, 3F)-O2 | (No. 5717) | 5% |
| 2O-B (2F, 3F) BEHB (2F, 3F)-O4 | (No. 2769) | 5% |

-continued

| | | |
|---|---|---|
| 2O-B (2F, 3F) HEHB (2F, 3F)-O4 | (No. 2207) | 3% |
| 4O-B (2F, 3F) HHEB (2F, 3F)-O2 | (No. 4937) | 3% |
| 2-H2H-3 | (2-2) | 10% |
| 3-H2H-V | (2-2) | 15% |
| 3-HB-O2 | (2-4) | 11% |
| 5-HB-O2 | (2-4) | 11% |
| 5-HBB (3F) B-2 | (2-73) | 5% |
| 5-HBB (3F) B-3 | (2-73) | 5% |
| 3-HHEBH-3 | (2-74) | 5% |
| 3-H2B (2F, 3F)-O2 | (3-3) | 12% |
| 3-HBB (2F, 3F)-O2 | (3-33) | 10% |

NI = 100.2° C.; Δn = 0.109; η = 31.3 mPa · s; Δϵ = −2.9.

Example 29

| | | |
|---|---|---|
| 4O-B (2F, 3F) HchB (3F)-O2 | (No. 409) | 6% |
| 4O-B (2F, 3F) HHB (3F)-O2 | (No. 137) | 5% |
| 3-H2H-V | (2-2) | 10% |
| 5-HB-O2 | (2-4) | 14% |
| 3-HHB-1 | (2-25) | 5% |
| V2-HHB-1 | (2-25) | 3% |
| 3-HHB-O1 | (2-25) | 5% |
| 3-HBBH-5 | (2-69) | 5% |
| 5-HBB (3F) B-2 | (2-73) | 2% |
| 3-H2B (2F, 3F)-O2 | (3-3) | 15% |
| 5-H2B (2F, 3F)-O2 | (3-3) | 15% |
| 3-HBB (2F, 3F)-O2 | (3-33) | 4% |
| 5-HBB (2F, 3F)-O2 | (3-33) | 8% |
| 3-HHB (2F, 3CL)-O2 | (3-59) | 3% |

NI = 101.1° C.; Δn = 0.110; η = 29.5 mPa · s; Δϵ = −3.2.

Example 30

| | | |
|---|---|---|
| 4O-B (2F, 3F) HchB (3F)-O2 | (No. 409) | 3% |
| 4O-B (2F, 3F) HHB (3F)-O2 | (No. 137) | 5% |
| 4O-B (2F, 3F) HchB (2F)-O2 | (No. 410) | 3% |
| 4O-B (2F, 3F) HHB (2F)-O2 | (No. 77) | 5% |
| 2-H2H-3 | (2-2) | 10% |
| 3-H2H-V | (2-2) | 5% |
| 3-HB-O2 | (2-4) | 12% |
| 5-HB-O2 | (2-4) | 10% |
| 3-HHB-O1 | (2-25) | 5% |
| 5-HBB (3F) B-2 | (2-73) | 5% |
| 3-HHEBH-5 | (2-74) | 5% |
| 3-H2B (2F, 3F)-O2 | (3-3) | 12% |
| 5-H2B (2F, 3F)-O2 | (3-3) | 5% |
| 3-HBB (2F, 3F)-O2 | (3-33) | 10% |
| 5-HBB (2F, 3F)-O2 | (3-33) | 5% |

NI = 104.8° C.; Δn = 0.113; η = 29.4 mPa · s; Δϵ = −3.2.

INDUSTRIAL APPLICABILITY

The invention includes a liquid crystal compound having general physical properties necessary for a compound, a high stability to heat, light or the like, a wide temperature range of a liquid crystal phase, a high clearing point, an excellent compatibility with other liquid crystal compounds, a large optical anisotropy, a suitable elastic constant $K_{33}$ and a large negative dielectric anisotropy. The invention further includes a liquid crystal composition including this liquid crystal compound. Since a liquid crystal display device contains this liquid crystal composition, it has a wide temperature range in which the device can be used, a short response time, small electric power consumption, a large contrast and a low driving voltage, and can be utilized for displays such as watches, calculators and word processors.

What is claimed is:

1. A liquid crystal compound represented by formula (a):

(a)

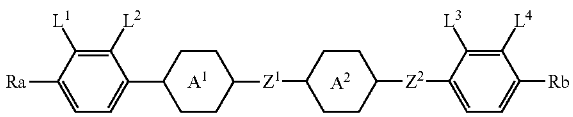

wherein $R^a$ and $R^b$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^1$ and the ring $A^2$ are independently 1,4-phenylene, trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and the ring $A^1$ and the ring $A^2$ are not simultaneously 1,4-phenylene; $L^1$, $L^2$, $L^3$ and $L^4$ are independently hydrogen or fluorine, and at least three of them are fluorine; and $Z^1$ and $Z^2$ are independently a single bond, —$CH_2CH_2$—, —CH═CH—, —C≡C—, —$CH_2O$—, —$OCH_2$—, —COO— or —OCO—.

2. The liquid crystal compound according to claim 1, wherein in formula (a), the ring $A^1$ and the ring $A^2$ are independently 1,4-phenylene, trans-1,4-cyclohexylene, 1,4-cyclohexenylene or tetrahydropyran-2,5-diyl.

3. The liquid crystal compound according to claim 2, wherein the compound is represented by formula (a-1):

(a-1)

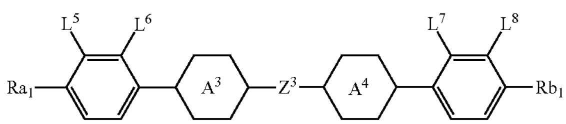

wherein $Ra_1$ and $Rb_1$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^3$ is 1,4-phenylene, trans-1,4-cyclohexylene, 1,4-cyclohexenylene or tetrahydropyran-2,5-diyl; the ring $A^4$ is trans-1,4-cyclohexylene, 1,4-cyclohexenylene or tetrahydropyran-2,5-diyl; $L^5$, $L^6$, $L^7$ and $L^8$ are independently hydrogen or fluorine, and at least three of them are fluorine; and $Z^3$ is independently a single bond, —$CH_2CH_2$—, —CH═CH—, —$CH_2O$—, —$OCH_2$—, —COO— or —OCO—.

4. The liquid crystal compound according to claim 2, wherein the compound is represented by formula (a-2):

(a-2)

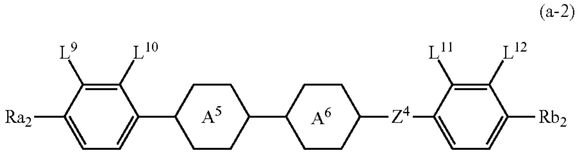

wherein $Ra_2$ and $Rb_2$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^5$ and the ring $A^6$ are independently 1,4-phenylene, trans-1,4-cyclohexylene, 1,4-cyclohexenylene or tetrahydropyran-2,5-diyl, and independently hydrogen or fluorine, and at least three of them are fluorine; and $Z^4$ is independently —$CH_2CH_2$—, —CH═CH—, —$CH_2O$—, —$OCH_2$—, —COO— or —OCO—.

5. The liquid crystal compound according to claim 3, wherein the compound is represented by any one of formulas (a-3) to (a-8):

(a-3)

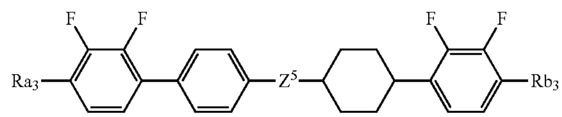

(a-4)

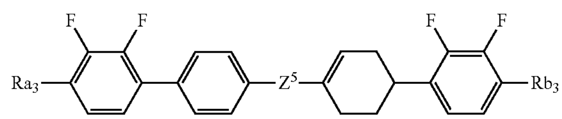

(a-5)

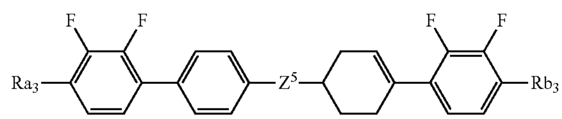

(a-6)

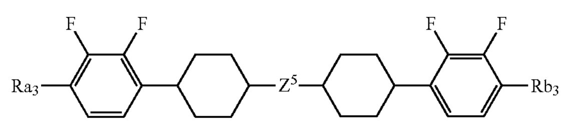

(a-7)

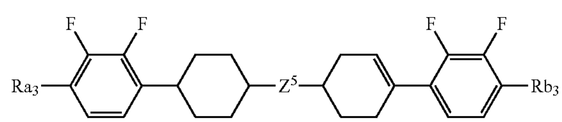

(a-8)

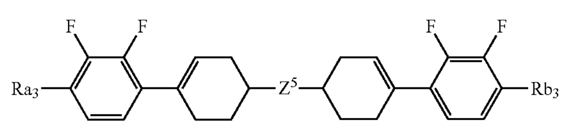

wherein $Ra_3$ and $Rb_3$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^5$ is a single bond, —$CH_2CH_2$—, —CH═CH—, —$CH_2O$—, —$OCH_2$—, —COO— or —OCO—.

6. The liquid crystal compound according to claim 4, wherein the compound is represented by any one of formulas (a-9) to (a-15):

(a-9)

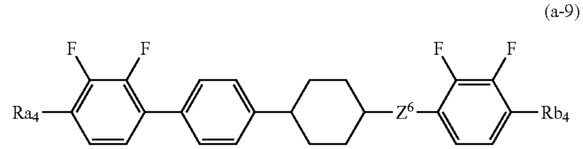

-continued (a-10)

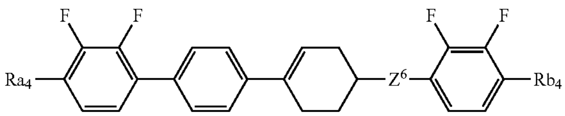

(a-11)

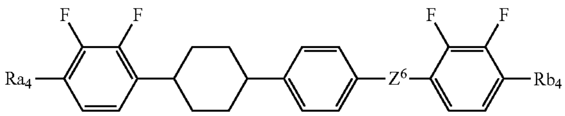

(a-12)

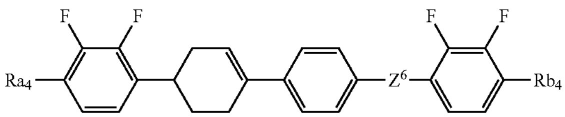

(a-13)

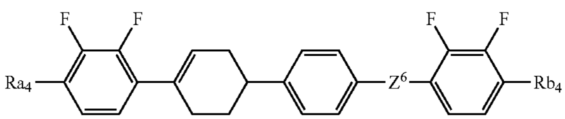

(a-14)

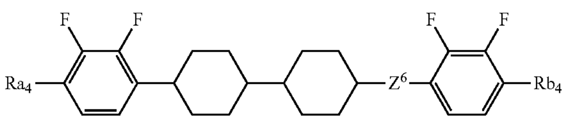

(a-15)

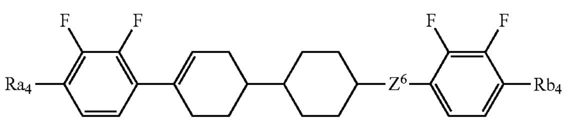

wherein $Ra_4$ and $Rb_4$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^6$ is independently —$CH_2CH_2$—, —CH═CH—, —$CH_2O$—, —$OCH_2$—, —COO— or —OCO—.

7. The liquid crystal compound according to claim 1, wherein in formulas (a-3) to (a-8), $Z^5$ is a single bond.

8. A liquid crystal composition including at least one of the compounds according to claim 1 as a first component and at least one of the compounds represented by formulas (e-1) to (e-3) as a second component:

(e-1)

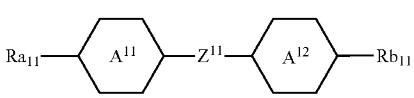

(e-2)

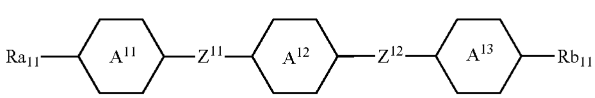

(e-3)

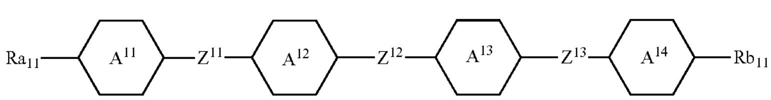

wherein $Ra_{11}$ and $Rb_{11}$ are independently alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{11}$, the ring $A^{12}$, the ring $A^{13}$ and the ring $A^{14}$ are independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are independently a single bond, —$CH_2CH_2$—, —CH═CH—, —C≡C—, —COO— or —$CH_2O$—.

9. A liquid crystal composition, wherein a first component is at least one compound selected from the compounds represented by formula (a-1) and a second component is at least one compound selected from formulas (e-1) to (e-3):

(a-1)

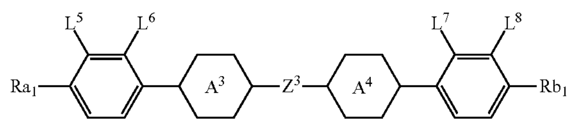

wherein $Ra_1$ and $Rb_1$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^3$ is 1,4-phenylene, trans-1,4-cyclohexylene, 1,4-cyclohexenylene or tetrahydropyran-2,5-diyl; the ring $A^4$ is trans-1,4-cyclohexylene, 1,4-cyclohexenylene or tetrahydropyran-2,5-diyl; $L^5$, $L^6$, $L^7$ and $L^8$ are independently hydrogen or fluorine, and at least three of them are fluorine; and $Z^3$ is independently a single bond, —$CH_2CH_2$—, —CH═CH—, —$CH_2O$—, —$OCH_2$—, —COO— or —OCO—, and then (e-1)

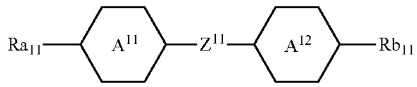

(e-2)

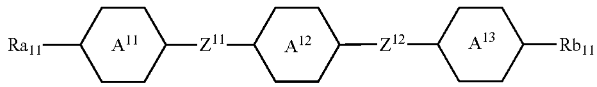

(e-3)

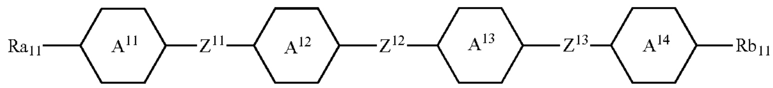

wherein $Ra_{11}$ and $Rb_{11}$ are independently alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{11}$, the ring $A^{12}$, the ring $A^{13}$ and the ring $A^{14}$ are independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $L^{12}$ and $Z^{13}$ are independently a single bond, —$CH_2CH_2$—, —CH═CH—, —C≡C—, —COO— or —$CH_2O$—.

10. A liquid crystal composition, wherein a first component is at least one compound selected from the compounds represented by formula (a-2) and a second component is at least one compound selected from formulas (e-1) to (e-3):

(a-2)

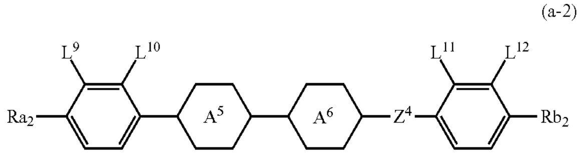

wherein $Ra_2$ and $Rb_2$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^5$ and the ring $A^6$ are independently 1,4-phenylene, trans-1,4-cyclohexylene, 1,4-cyclohexenylene or tetrahydropyran-2,5-diyl, and the ring $A^5$ and the ring $A^6$ are not simultaneously 1,4-phenylene; $L^9$, $L^{10}$, $L^{11}$ and $L^{12}$ are independently hydrogen or fluorine, and at least three of them are fluorine; and $Z^4$ is independently —$CH_2CH_2$—, —CH═CH—, —$CH_2O$—, —$OCH_2$—, —COO— or —OCO—; and then (e-1)

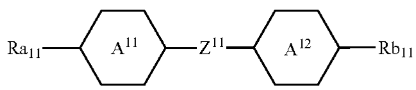

(e-2)

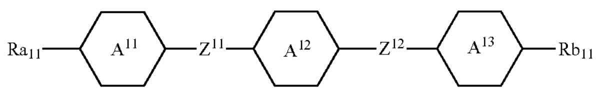

(e-3)

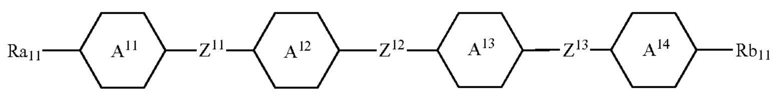

wherein $Ra_{11}$ and $Rb_{11}$ are independently alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{11}$, the ring $A^{12}$, the ring $A^{13}$ and the ring $A^{14}$ are independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are independently a single bond, —$CH_2CH_2$—, —CH═CH—, —C≡C—, —COO— or —$CH_2O$—.

11. The liquid crystal composition according to claim 8, wherein the ratio of the first component is in the range of 5 to 60% by weight, and the ratio of the second component is in the range of 40 to 95% by weight, based on the total weight of the liquid crystal composition.

12. The liquid crystal composition according to claim 9, wherein the ratio of the first component is in the range of 5 to 60% by weight, and the ratio of the second component is in the range of 40 to 95% by weight, based on the total weight of the liquid crystal composition.

13. The liquid crystal composition according to claim 10, wherein the ratio of the first component is in the range of 5 to 60% by weight, and the ratio of the second component is in the range of 40 to 95% by weight, based on the total weight of the liquid crystal composition.

14. The liquid crystal composition according to claim 8, including at least one compound selected from the group of compounds represented by formulas (g-1) to (g-6) and the group of compounds represented by formulas (i-1) to (i-4) as a third component, in addition to the first component and the second component:

(g-1)

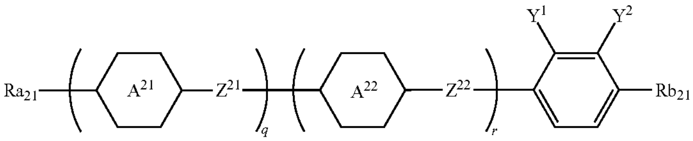

(g-2)

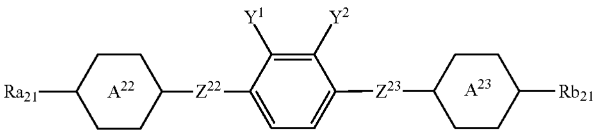

(g-3)

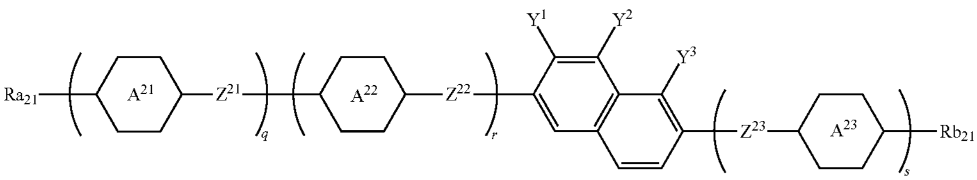

(g-4)

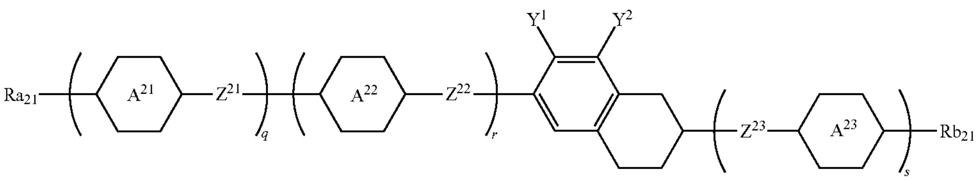

(g-5)

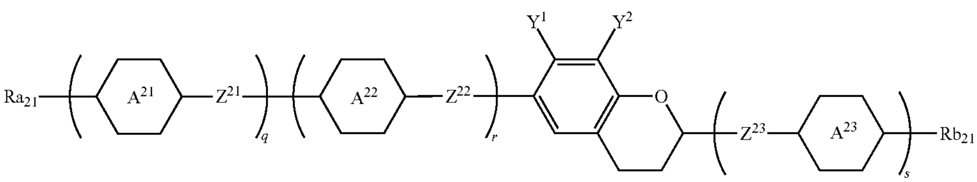

(g-6)

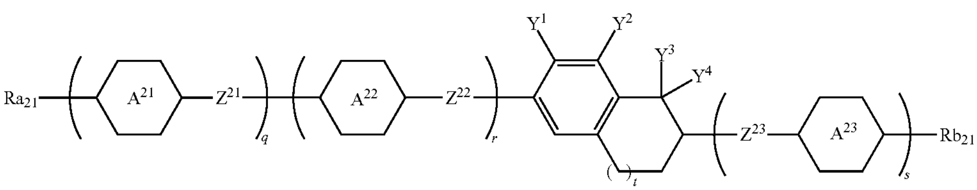

wherein $Ra_{21}$ and $Rb_{21}$ are independently hydrogen or alkyl having 1 to 10 carbons, and in the alkyl, arbitrary —$CH_2$— may be nonadjacently replaced by —O—, and arbitrary —$CH_2CH_2$— may be nonadjacently replaced by —CH═CH—, and hydrogen may be replaced by fluorine; the ring $A^{21}$, the ring $A^{22}$ and the ring $A^{23}$ are independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl; $Z^{21}$, $Z^{22}$, and $Z_{23}$ are independently a single bond —$CH_2CH_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$— or —$CH_2O$—; $Y^1$, $Y^2$, $Y^3$ and $Y^4$ are independently fluorine or chlorine; q, r and s are independently 0, 1 or 2, q+r is 1 or 2, and q+r+s is 1, 2 or 3; and t is 0, 1 or 2; and then (i-1)

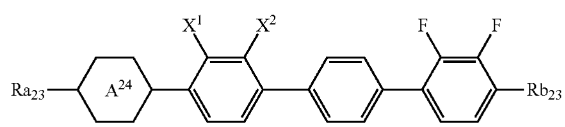

(i-2)

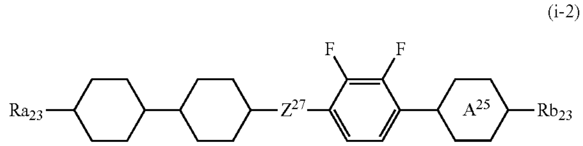

(i-3)

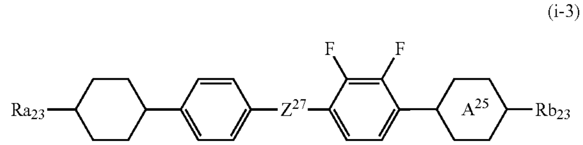

-continued (i-4)

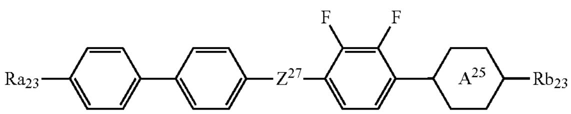

wherein $Ra_{23}$ and $Rb_{23}$ are independently alkyl having 1 to 8 carbons or alkoxy having 1 to 7 carbons; the ring $A^{24}$ is trans-1,4-cyclohexylene, 1,4-cyclohexenylene, 1,4-phenylene or tetrahydropyran-2,5-diyl; the ring $A^{25}$ is trans-1,4-cyclohexylene, 1,4-phenylene, 2-fluoro-1,4-phenylene or 3-fluoro-1,4-phenylene; $Z^{27}$ is independently a single bond, —$CH_2O$—, —COO— or —$CF_2O$—; and both $X^1$ and $X^2$ are fluorine, or one of them is fluorine and the other is hydrogen.

15. The liquid crystal composition according to claim 14, wherein the third component is at least one compound selected from the group of compounds represented by formulas (g-1-1) to (g-2-3):

(g-1-1)

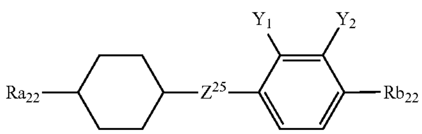

(g-1-2)

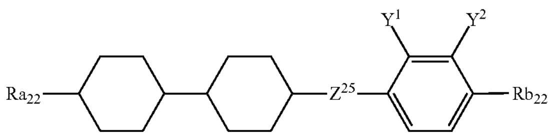

(g-1-3)

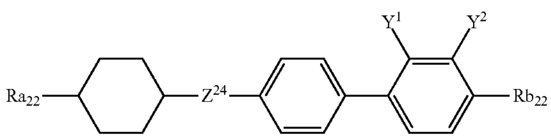

(g-1-4)

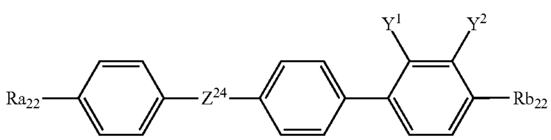

(g-2-1)

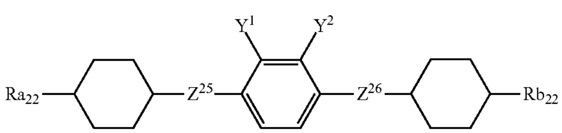

-continued (g-2-2)

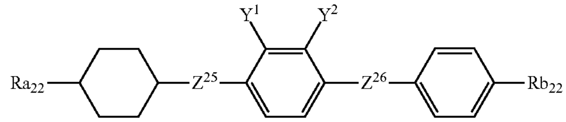

(g-2-3)

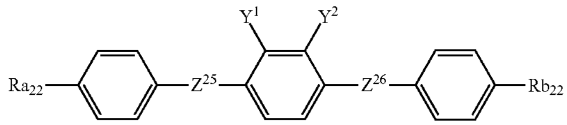

wherein $Ra_{22}$ and $Rb_{22}$ are independently alkyl having 1 to 8 carbons, alkenyl having 2 to 8 carbons or alkoxy having 1 to 7 carbons; $Z^{24}$, $Z^{25}$ and $Z^{26}$ are independently a single bond, —$CH_2CH_2$—, —COO—, —OCO—, —$CH_2O$— or —$OCH_2$—; and both $Y^1$ and $Y^2$ are fluorine, or one of them is fluorine and the other is chlorine.

16. The liquid crystal composition according to claim 14, wherein the ratio of the first component is in the range of 5 to 60% by weight, the ratio of the second component is in the range of 20 to 75% by weight, and the ratio of the third component is in the range of 20 to 75% by weight, based on the total weight of the liquid crystal composition.

17. The liquid crystal composition according to claim 15, wherein the ratio of the first component is in the range of 5 to 60% by weight, the ratio of the second component is in the range of 20 to 75% by weight, and the ratio of the third component is in the range of 20 to 75% by weight, based on the total weight of the liquid crystal composition.

18. A liquid crystal display device containing the liquid crystal composition according to claim 16.

19. A liquid crystal display device containing the liquid crystal composition according to claim 17.

20. The liquid crystal display device according to claim 18, wherein an operating mode of the liquid crystal display device is a VA mode, an IPS mode or a PSA mode, and a driving mode of the liquid crystal display device is an active matrix mode.

21. The liquid crystal display device according to claim 19, wherein an operating mode of the liquid crystal display device is a VA mode, an IPS mode or a PSA mode, and a driving mode of the liquid crystal display device is an active matrix mode.

* * * * *